US012441922B2

(12) United States Patent
Itano et al.

(10) Patent No.: US 12,441,922 B2
(45) Date of Patent: Oct. 14, 2025

(54) REFRIGERANT-CONTAINING COMPOSITION, USE OF SAME, REFRIGERATOR HAVING SAME, OPERATION METHOD FOR SAID REFRIGERATOR, AND REFRIGERATION CYCLE DEVICE EQUIPPED WITH SAME

(71) Applicant: DAIKIN INDUSTRIES, LTD., Osaka (JP)

(72) Inventors: Mitsushi Itano, Osaka (JP); Shun Ohkubo, Osaka (JP); Daisuke Karube, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 826 days.

(21) Appl. No.: 17/554,897

(22) Filed: Dec. 17, 2021

(65) Prior Publication Data

US 2022/0106513 A1 Apr. 7, 2022

Related U.S. Application Data

(63) Continuation of application No. PCT/JP2020/024190, filed on Jun. 19, 2020.

(30) Foreign Application Priority Data

Jun. 19, 2019 (JP) ................................ 2019-114165

(51) Int. Cl.
*C09K 5/04* (2006.01)

(52) U.S. Cl.
CPC ........ *C09K 5/045* (2013.01); *C09K 2205/126* (2013.01)

(58) Field of Classification Search
CPC .............. C09K 5/045; C09K 2205/126; C09K 2205/22; C09K 2205/40; C09K 5/04;
(Continued)

(56) References Cited

U.S. PATENT DOCUMENTS

2015/0376486 A1 12/2015 Hashimoto et al.
2016/0075927 A1* 3/2016 Fukushima ............ C09K 5/045 252/68

(Continued)

FOREIGN PATENT DOCUMENTS

| | | |
|---|---|---|
| CN | 105164228 | 12/2015 |
| CN | 106029823 | 10/2016 |
| WO | 2015/141678 | 9/2015 |

OTHER PUBLICATIONS

Extended European Search Report issued Sep. 1, 2023 in corresponding European Patent Application No. 20826813.6.

(Continued)

*Primary Examiner* — Andrew J. Oyer
(74) *Attorney, Agent, or Firm* — Wenderoth, Lind & Ponack, L.L.P.

(57) ABSTRACT

The present invention addresses a problem of providing a mixed refrigerant that combines three kinds of performances of having a refrigeration capacity (this may also be referred to as a cooling capacity) and of having a coefficient of performance (COP) equivalent to those of R410A, and of having a sufficiently small GWP. As a means for solving the problem, provided is a refrigerant-containing composition,
(Continued)

wherein the refrigerant contains trans-1,2-difluoroethylene (HFO-1132 (E)), trifluoroethylene (HFO-1123) and 2,3,3,3-tetrafluoro-1-propene (R1234yf), and R32.

11 Claims, 215 Drawing Sheets

(58) Field of Classification Search
CPC .......... C09K 2205/122; C09K 2205/34; F24D 17/02; F25B 6/04; F25B 7/00; F25B 13/00; F25B 31/006; F25B 31/026; F25B 40/00; F25B 41/20; F25B 41/22; F25B 41/37; F25B 41/39; F25B 41/40; F25B 49/02; F25B 2313/003; F25B 2313/008; F25B 2313/0233; F25B 2313/02343; F25B 2313/0253; F25B 2313/0254; F25B 2313/0272; F25B 2313/0314; F25B 2313/0315; F25B 2339/047; F25B 2400/01; F25B 2400/053; F25B 2400/054; F25B 2400/13; F25B 2400/23; F25B 2400/24; F25B 2500/01; F25B 2600/2515; F25B 2700/1931; F25B 2700/1933; F25B 2700/2104; F25B 2700/2106; F25B 2700/21151; F25B 2700/21152; F25B 1/00
See application file for complete search history.

(56) References Cited

U.S. PATENT DOCUMENTS

| | | | |
|---|---|---|---|
| 2016/0340565 A1 | 11/2016 | Tasaka et al. | |
| 2017/0002245 A1 | 1/2017 | Fukushima | |
| 2020/0392389 A1* | 12/2020 | Itano | F24F 1/14 |

OTHER PUBLICATIONS

International Preliminary Report on Patentability issued Dec. 21, 2021 in corresponding International (PCT) Patent Application No. PCT/JP2020/024190.

International Search Report issued Sep. 8, 2020 in International (PCT) Application No. PCT/JP2020/024190.

* cited by examiner

Fig. 23C

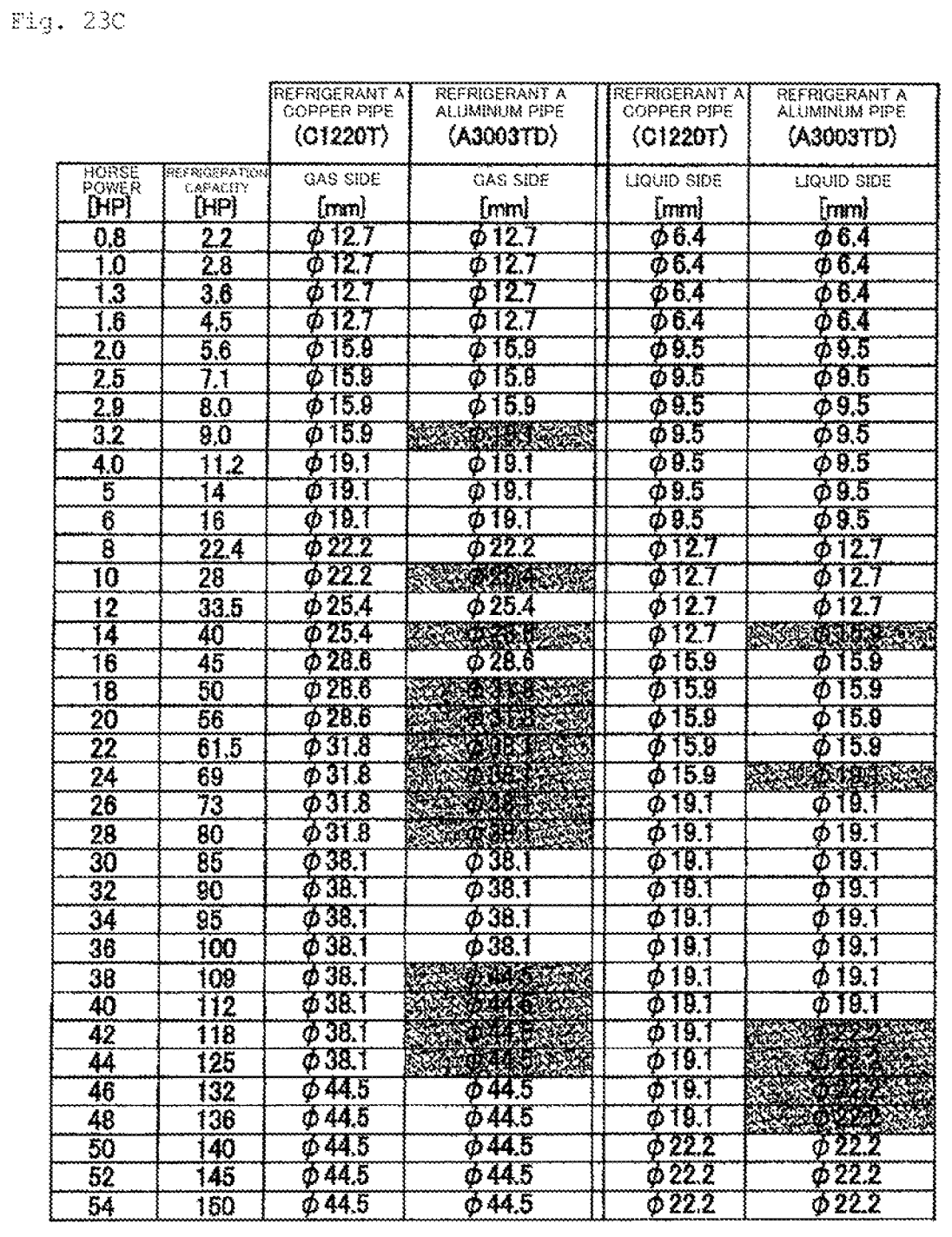

| | | REFRIGERANT A COPPER PIPE (C1220T) | REFRIGERANT A ALUMINUM PIPE (A3003TD) | REFRIGERANT A COPPER PIPE (C1220T) | REFRIGERANT A ALUMINUM PIPE (A3003TD) |
|---|---|---|---|---|---|
| HORSE POWER [HP] | REFRIGERATION CAPACITY [HP] | GAS SIDE [mm] | GAS SIDE [mm] | LIQUID SIDE [mm] | LIQUID SIDE [mm] |
| 0.8 | 2.2 | φ12.7 | φ12.7 | φ6.4 | φ6.4 |
| 1.0 | 2.8 | φ12.7 | φ12.7 | φ6.4 | φ6.4 |
| 1.3 | 3.6 | φ12.7 | φ12.7 | φ6.4 | φ6.4 |
| 1.6 | 4.5 | φ12.7 | φ12.7 | φ6.4 | φ6.4 |
| 2.0 | 5.6 | φ15.9 | φ15.9 | φ9.5 | φ9.5 |
| 2.5 | 7.1 | φ15.9 | φ15.9 | φ9.5 | φ9.5 |
| 2.9 | 8.0 | φ15.9 | φ15.9 | φ9.5 | φ9.5 |
| 3.2 | 9.0 | φ15.9 | φ19.1 | φ9.5 | φ9.5 |
| 4.0 | 11.2 | φ19.1 | φ19.1 | φ9.5 | φ9.5 |
| 5 | 14 | φ19.1 | φ19.1 | φ9.5 | φ9.5 |
| 6 | 16 | φ19.1 | φ19.1 | φ9.5 | φ9.5 |
| 8 | 22.4 | φ22.2 | φ22.2 | φ12.7 | φ12.7 |
| 10 | 28 | φ22.2 | φ25.4 | φ12.7 | φ12.7 |
| 12 | 33.5 | φ25.4 | φ25.4 | φ12.7 | φ12.7 |
| 14 | 40 | φ25.4 | φ28.6 | φ12.7 | φ15.9 |
| 16 | 45 | φ28.6 | φ28.6 | φ15.9 | φ15.9 |
| 18 | 50 | φ28.6 | φ31.8 | φ15.9 | φ15.9 |
| 20 | 56 | φ28.6 | φ31.8 | φ15.9 | φ15.9 |
| 22 | 61.5 | φ31.8 | φ38.1 | φ15.9 | φ15.9 |
| 24 | 69 | φ31.8 | φ38.1 | φ15.9 | φ19.1 |
| 26 | 73 | φ31.8 | φ38.1 | φ19.1 | φ19.1 |
| 28 | 80 | φ31.8 | φ38.1 | φ19.1 | φ19.1 |
| 30 | 85 | φ38.1 | φ38.1 | φ19.1 | φ19.1 |
| 32 | 90 | φ38.1 | φ38.1 | φ19.1 | φ19.1 |
| 34 | 95 | φ38.1 | φ38.1 | φ19.1 | φ19.1 |
| 36 | 100 | φ38.1 | φ38.1 | φ19.1 | φ19.1 |
| 38 | 109 | φ38.1 | φ44.5 | φ19.1 | φ19.1 |
| 40 | 112 | φ38.1 | φ44.5 | φ19.1 | φ19.1 |
| 42 | 118 | φ38.1 | φ44.5 | φ19.1 | φ22.2 |
| 44 | 125 | φ38.1 | φ44.5 | φ19.1 | φ22.2 |
| 46 | 132 | φ44.5 | φ44.5 | φ19.1 | φ22.2 |
| 48 | 136 | φ44.5 | φ44.5 | φ19.1 | φ22.2 |
| 50 | 140 | φ44.5 | φ44.5 | φ22.2 | φ22.2 |
| 52 | 145 | φ44.5 | φ44.5 | φ22.2 | φ22.2 |
| 54 | 150 | φ44.5 | φ44.5 | φ22.2 | φ22.2 |

Fig. 23D

| | MATERIAL OF PIPE | COPPER(C1220T-1/2H) | | ALUMINUM(A3003TD-H14) | |
|---|---|---|---|---|---|
| | DESIGN PRESSURE (MPaG) | 4.0 | | 4.0 | |
| PIPE DESIGNATION | OUTER DIAMETER(mm) | WALL THICKNESS (mm) | INNER DIAMETER (mm) | WALL THICKNESS (mm) | INNER DIAMETER (mm) |
| φ6.4 | φ6.35 | 0.8 | φ4.75 | 0.8 | φ4.75 |
| φ9.5 | φ9.52 | 0.8 | φ7.92 | 0.8 | φ7.92 |
| φ12.7 | φ12.70 | 0.8 | φ11.10 | 1.0 | φ10.70 |
| φ15.9 | φ15.88 | 1.0 | φ13.88 | 1.3 | φ13.28 |
| φ19.1 | φ19.05 | 1.0 | φ17.05 | 1.5 | φ16.05 |
| φ22.2 | φ22.22 | 1.0 | φ20.22 | 1.7 | φ18.82 |
| φ25.4 | φ25.40 | 1.0 | φ23.40 | 2.0 | φ21.40 |
| φ28.6 | φ28.58 | 1.0 | φ26.58 | 2.2 | φ24.18 |
| φ31.8 | φ31.75 | 1.1 | φ29.55 | 2.5 | φ26.75 |
| φ38.1 | φ38.10 | 1.4 | φ35.40 | 3.0 | φ32.10 |
| φ44.5 | φ44.45 | 1.6 | φ41.25 | 3.4 | φ37.65 |
| φ50.8 | φ50.80 | 1.8 | φ47.20 | 3.9 | φ43.00 |
| φ63.5 | φ63.50 | 2.5 | φ58.50 | 4.9 | φ53.70 |

REFRIGERANT-CONTAINING COMPOSITION, USE OF SAME, REFRIGERATOR HAVING SAME, OPERATION METHOD FOR SAID REFRIGERATOR, AND REFRIGERATION CYCLE DEVICE EQUIPPED WITH SAME

TECHNICAL FIELD

The present disclosure relates to a refrigerant-containing composition, use thereof, a refrigerator having the same, a method for operating the refrigerator, and a refrigeration cycle device equipped with the refrigerator.

BACKGROUND ART

As a refrigerant for air conditioning in household air conditioners and the like, R410A is currently used. R410A is a binary mixed refrigerant of difluoromethane ($CH_2F_2$; HFC-32 or R32) and pentafluoroethane ($C_2HF_5$; HFC-125 or R125) and is a pseudo-azeotropic composition.

However, the global warming potential (GWP) of R410A is 2088, and R32, which has a GWP of 675, is becoming more widely used due to increasing concerns about global warming.

For this reason, a variety of low-GWP mixed refrigerants that can replace R410A have been proposed (PTL 1).

CITATION LIST

Patent Literature

PTL 1: International Publication No. WO 2015/141678

SUMMARY

A composition comprising a refrigerant, wherein the refrigerant contains trans-1,2-difluoroethylene (HFO-1132 (E)), trifluoroethylene (HFO-1123) and 2,3,3,3-tetrafluoro-1-propene (R1234yf), and difluoromethane (R32), and wherein, in the refrigerant, when mass percentages of HFO-1132 (E), HFO-1123 and R1234yf, and R32, based on their sum are defined as x, y and z, and a, respectively, in a ternary composition diagram in which a sum of HFO-1132 (E), HFO-1123 and R1234yf is (100−a) % by mass, coordinates (x,y,z) are:

in a case of 0<a≤11.1, within a range of a figure surrounded by lines JL, LM, MN, NK', K'B, BD', D'C, and CJ connecting each of eight points:

point J (100−a−y, −0.0049$a^2$−0.0355a+52.9, 0.0);

point L (−0.0217$a^2$−0.9307a+63.0, 95.0−a−x, 5.0);

point M (0.0292$a^2$−1.7567a+68.9, −0.0194$a^2$+0.8278a+16.1, 100−a−x−y);

point N (0.043$a^2$−2.1084a+66.9, −0.0268$a^2$+0.6129a+9.4, 100−a−x−y);

point K' (−0.051$a^2$+0.0929a+25.95, 100−a−x−z, −0.0191$a^2$+1.0231a+32.4);

point B (0.0, 0.0144$a^2$−1.6377a+58.7, 100−a−y);

point D' (0.0, 0.0224$a^2$+0.968a+75.4, 100−a−y); and point C (−0.2304$a^2$−0.4062a+32.9, 100−a−x, 0.0), or on the lines JL, LM, MN, NK', K'B, and D'C (except for point B, point D', point C, and point J);

in a case of 11.1<a≤18.2, within a range of a figure surrounded by lines JL, LM, MN, NK', K'B, BW, and WJ connecting each of seven points:

point J (100−a−y, −0.0243$a^2$+0.4161a+50.275, 0.0);

point L (0.0187$a^2$−1.4492a+63.783, 95.0−a−x, 5.0);

point M (0.0197$a^2$−1.5633a+67.924, −0.0611$a^2$+1.9179a+9.1435, 100−a−x−y);

point N (0.009$a^2$−1.3469a+62.647, −0.0225$a^2$+0.5467a+9.6045, 100−a−x−y);

point K' (0.0341$a^2$−2.1977a+61.187, 100−a−x−z, −0.0105$a^2$+0.8577a+33.177);

point B (0.0, 0.0075$a^2$−1.5156a+58.199, 100−a−y); and point W (0.0, 100−a, 0.0), or on the lines JL, LM, MN, NK', and K'B (except for point B, point W, and point J);

in a case of 18.2<a≤26.7, within a range of a figure surrounded by lines JL, LM, MN, NK', K'B, BW, and WJ connecting each of seven points:

point J (100−a−y, −0.0246$a^2$+0.4476a+49.816, 0.0);

point L (0.0197$a^2$−1.5187a+64.723, 95.0−a−x, 5.0);

point M (0.0145$a^2$−1.3925a+66.539, 0.01$a^2$−0.5903a+31.23, 100−a−x−y);

point N (0.0213$a^2$−1.8283a+67.31, −0.2706a+17.025, 100−a−x−y);

point K' (0.0196$a^2$−1.7863a+58.515, 100−a−x−z, −0.0117$a^2$+0.8999a+32.783);

point B (0.0, 0.009$a^2$−1.6045a+59.318, 100−a−y); and point W (0.0, 100−a, 0.0), or on the lines JL, LM, MN, NK', and K'B (except for point B, point W, and point J); and in a case of 26.7<a≤36.7, within a range of a figure surrounded by lines JL, LM, MN, NK', K'A, AB, BW, and WJ connecting each of eight points:

point J (100−a−y, −0.0183$a^2$+0.1399a+53.507, 0.0);

point L (0.0081$a^2$−0.9541a+57.893, 95.0−a−x, 5.0);

point M (0.005$a^2$−0.8563a+59.007, 0.03558$a^2$−2.4139a+61.708, 100−a−x−y);

point N (0.0108$a^2$−1.1054a+55.507, 0.005$a^2$−0.3563a+15.757, 100−a−x−y);

point K' (−0.0051$a^2$+0.0929a+25.95, 0.0, 100−a−x);

point A (0.0103$a^2$−1.9225a+68.793, 0.0, 100−a−x);

point B (0.0, 0.0046$a^2$−1.41a+57.286, 100−a−y); and point W (0.0, 100−a, 0.0), or on the lines JL, LM, MN, NK', K'A, and AB (except for point K', point A, point B, point W, and point J).

Advantageous Effects

The refrigerant of the present disclosure combines three kinds of performances of having a refrigeration capacity and of having a coefficient of performance equivalent to those of R410A, and of having a sufficiently small GWP.

BRIEF DESCRIPTION OF DRAWINGS

FIG. 3I is a schematic configuration diagram of a refrigerant circuit according to a fifth embodiment of the technology of the third group.

FIG. 3O is a schematic configuration diagram of a refrigerant circuit according to an eighth embodiment of the technology of the third group.

FIG. 3S is a schematic configuration diagram of a refrigerant circuit according to a tenth embodiment of the technology of the third group.

FIG. 4O is a schematic control block configuration diagram of a refrigeration cycle device according to the third embodiment of the technology of the fourth group.

FIG. 8B is a schematic control block configuration diagram of a refrigeration cycle device according to the first embodiment of the technology of the eighth group.

FIG. 9I is a schematic configuration diagram of a refrigerant circuit according to a third embodiment of the technology of the ninth group.

FIG. 11I is a schematic external perspective view of an outdoor unit according to the second embodiment of the technology of the eleventh group.

FIG. 11J is a perspective view showing the schematic structure of the interior of the outdoor unit according to the second embodiment of the technology of the eleventh group.

FIG. 11K is a schematic external perspective view of an indoor unit according to the second embodiment of the technology of the eleventh group.

FIG. 11L is a cross section in the side view showing the schematic structure of the interior of the indoor unit according to the second embodiment of the technology of the eleventh group.

FIG. 11M is a schematic configuration diagram of a refrigerant circuit according to a third embodiment of the technology of the eleventh group.

FIG. 11N is a schematic control block configuration diagram of a refrigeration cycle device according to the third embodiment of the technology of the eleventh group.

FIG. 11O is a schematic external perspective view of an outdoor unit according to the third embodiment of the technology of the eleventh group.

FIG. 11P is an exploded perspective view showing the schematic structure of the interior of the outdoor unit according to the third embodiment of the technology of the eleventh group.

FIG. 12A is a refrigerant circuit diagram of an air conditioner for which a compressor according to one embodiment of the technology of a twelfth group is utilized.

FIG. 12B is a longitudinal section of the compressor according to one embodiment of the technology of the twelfth group.

FIG. 12C is a cross section of a motor cut in a plane perpendicular to the rotation axis of the technology of the twelfth group.

FIG. 12D is a cross section of a rotor cut in a plane perpendicular to the rotation axis of the technology of the twelfth group.

Figure 12A:
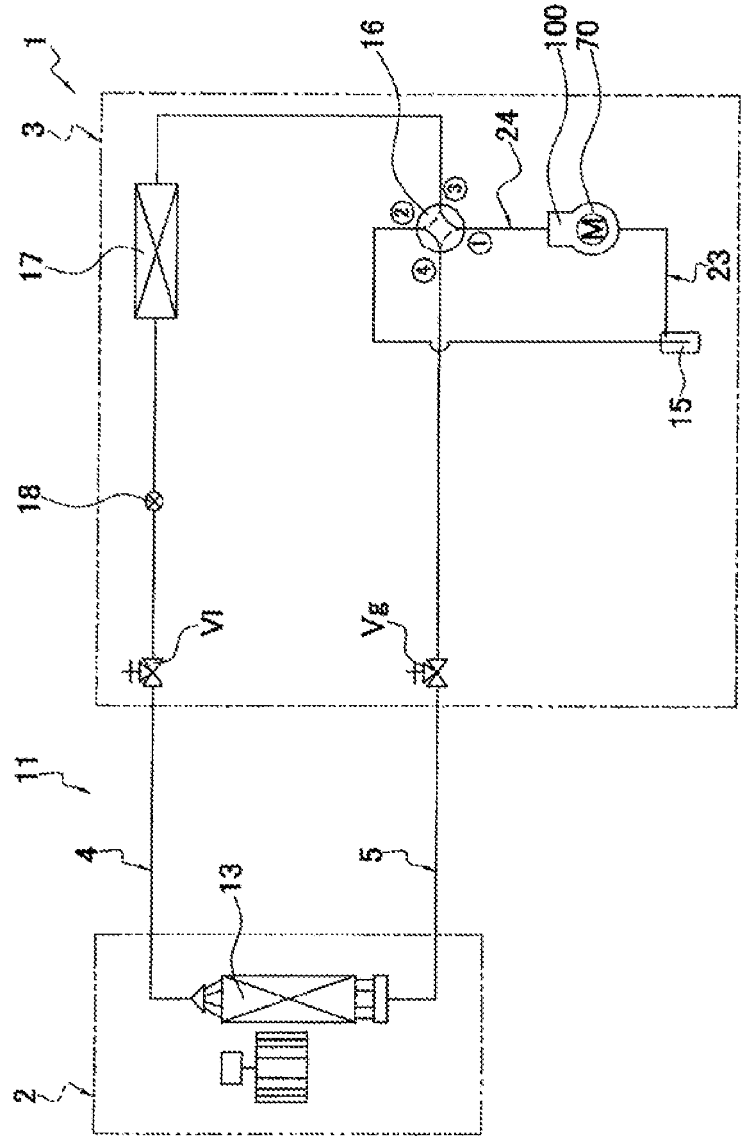
Figure 12B:
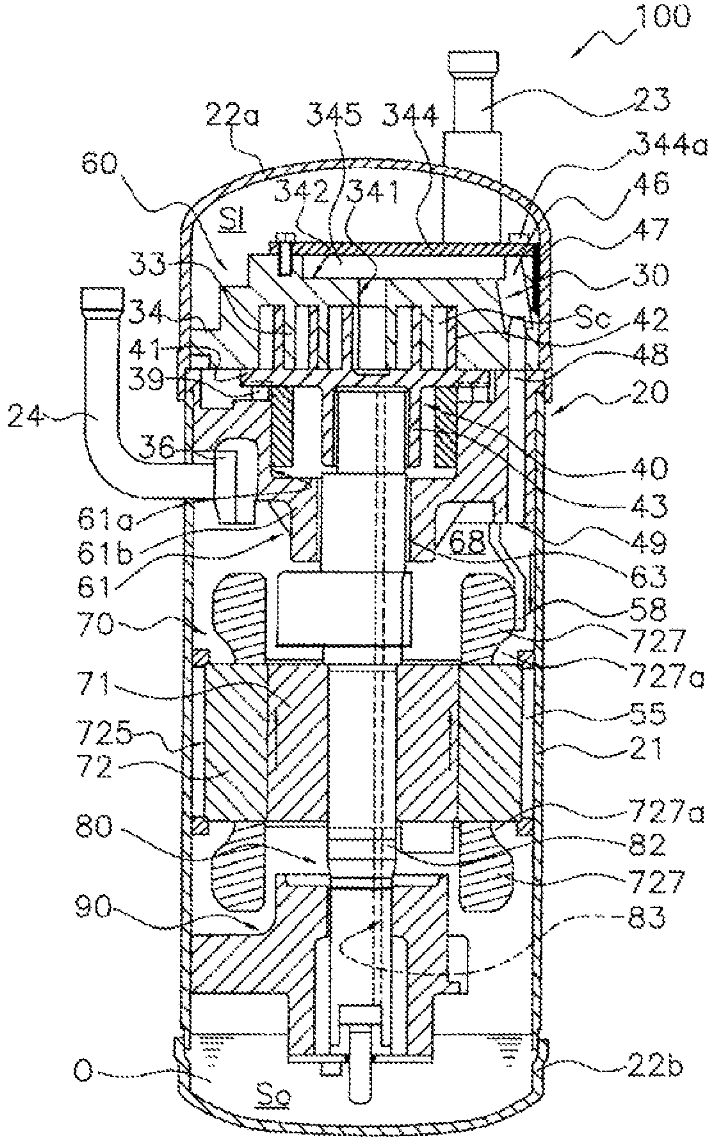
Figure 12C:
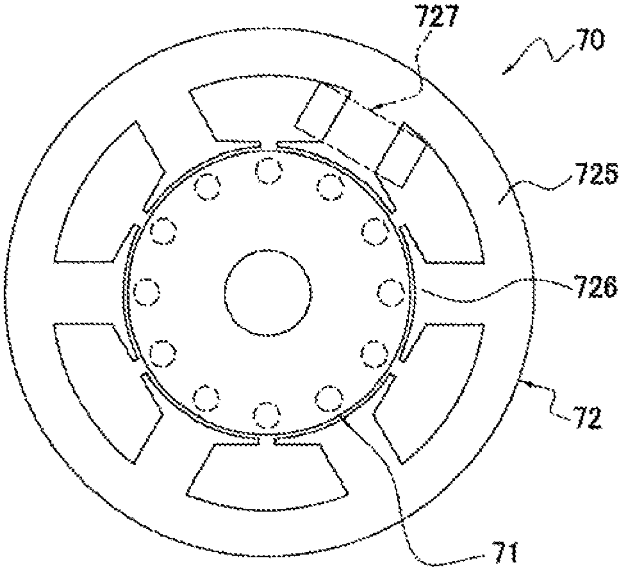
Figure 12D:
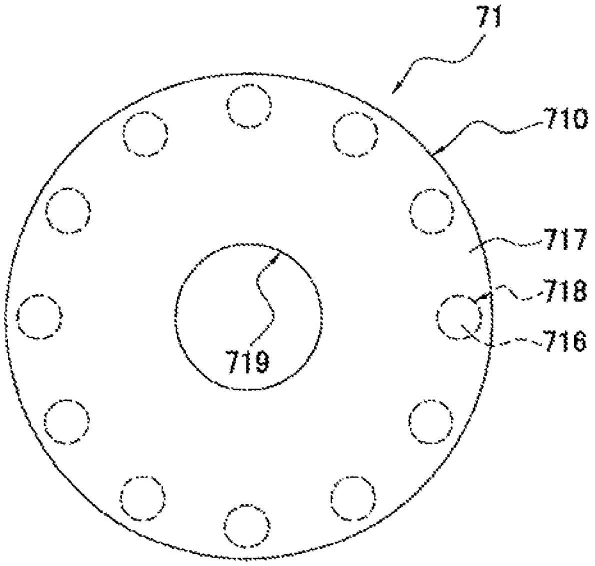
Figure 12E:
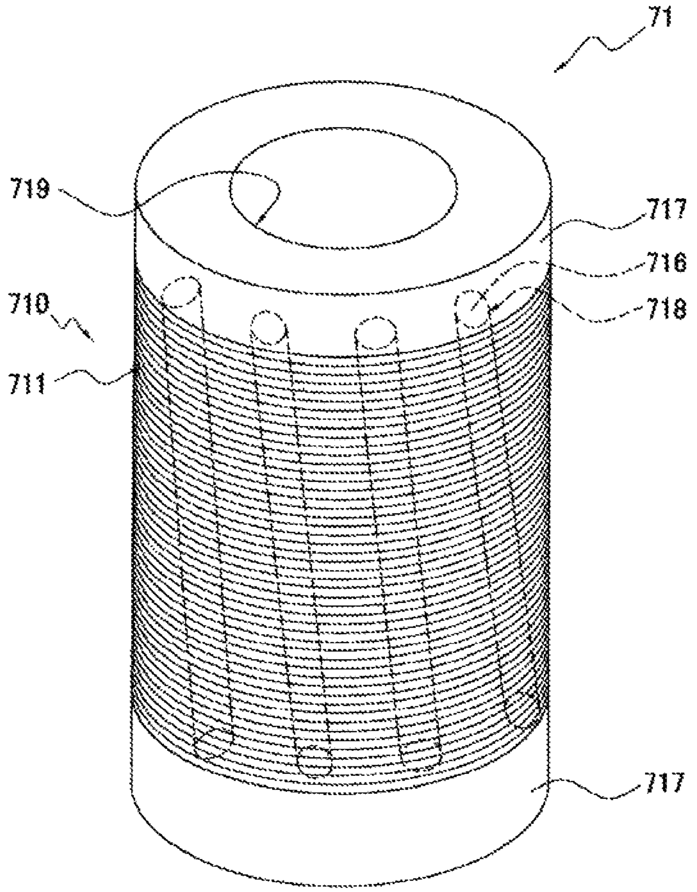

FIG. 12E is a perspective view of the rotor of the technology of the twelfth group.

Figure 12F:
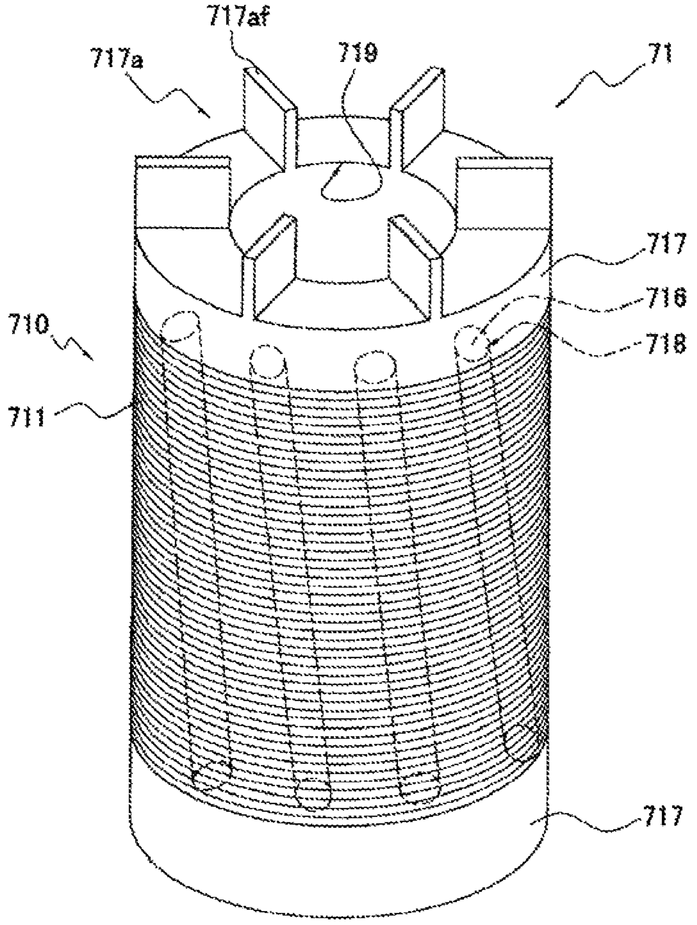

FIG. 12F is a perspective view of a rotor 71 used for an induction motor of a compressor according to a second modification of the technology of the twelfth group.

Figure 12G:
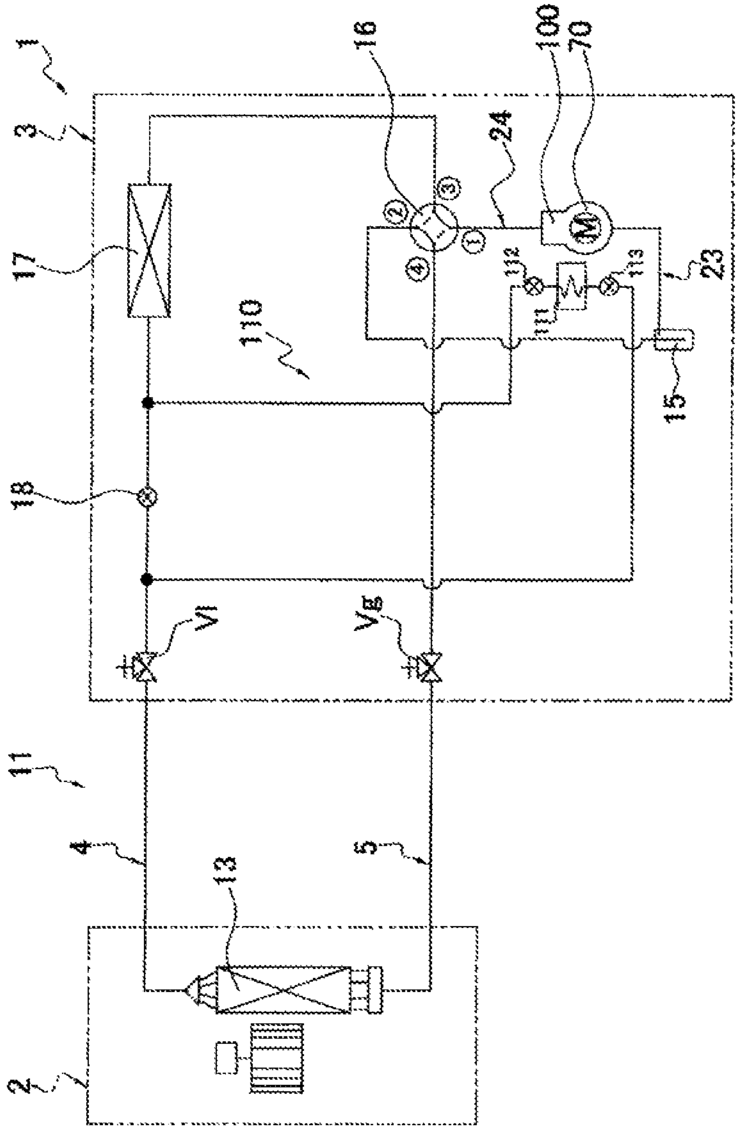

FIG. 12G is a refrigerant circuit diagram of an air conditioner for which a compressor according to a third modification of the technology of the twelfth group is utilized.

Figure 12H:
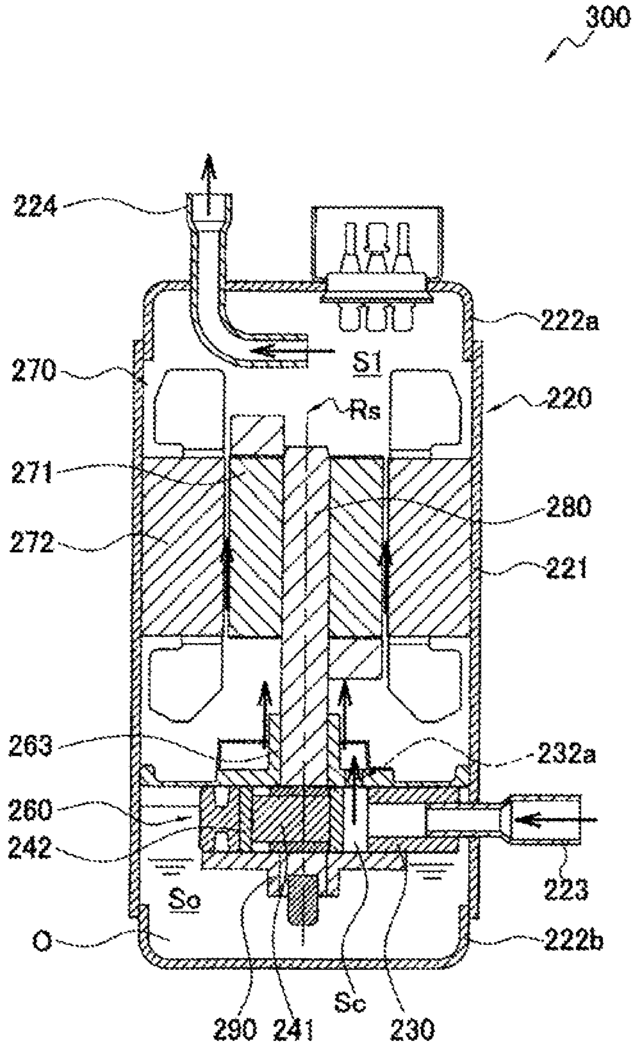

FIG. 12H is a longitudinal section of a compressor according to a second embodiment of the technology of the twelfth group.

Figure 13A:
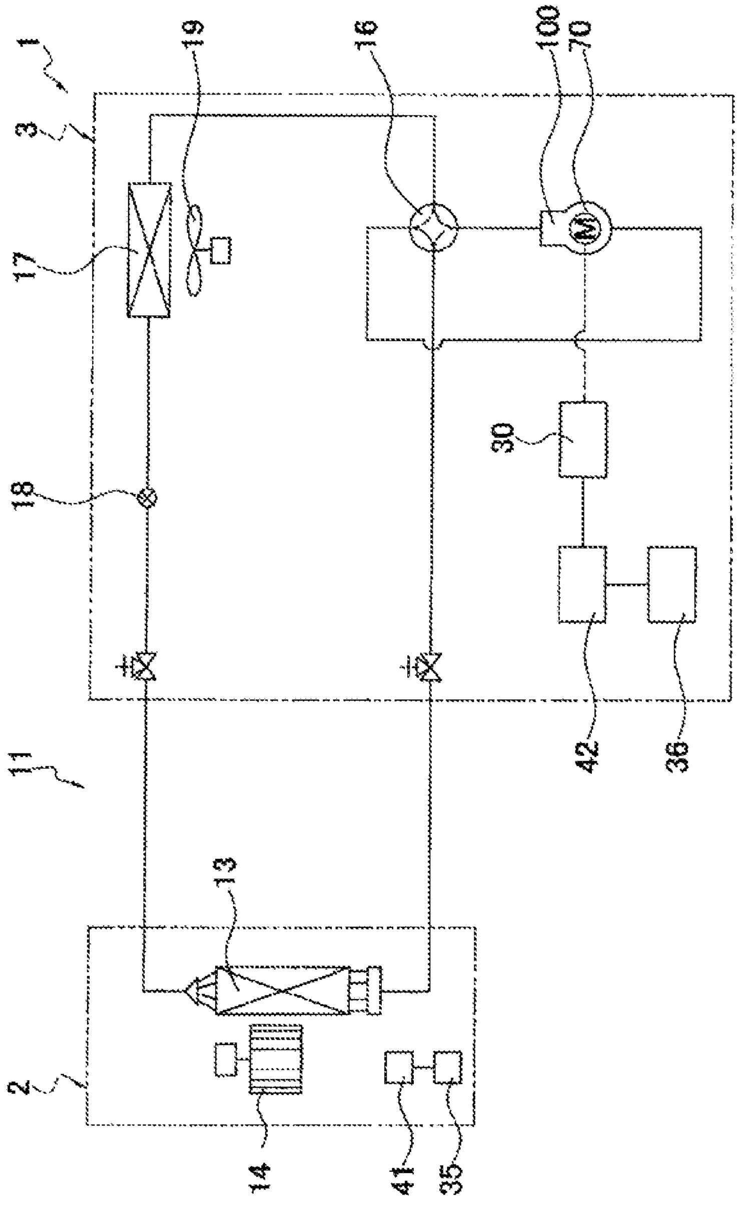

FIG. 13A is a configuration diagram of an air conditioner according to a first embodiment of the technology of a thirteenth group.

Figure 13B:
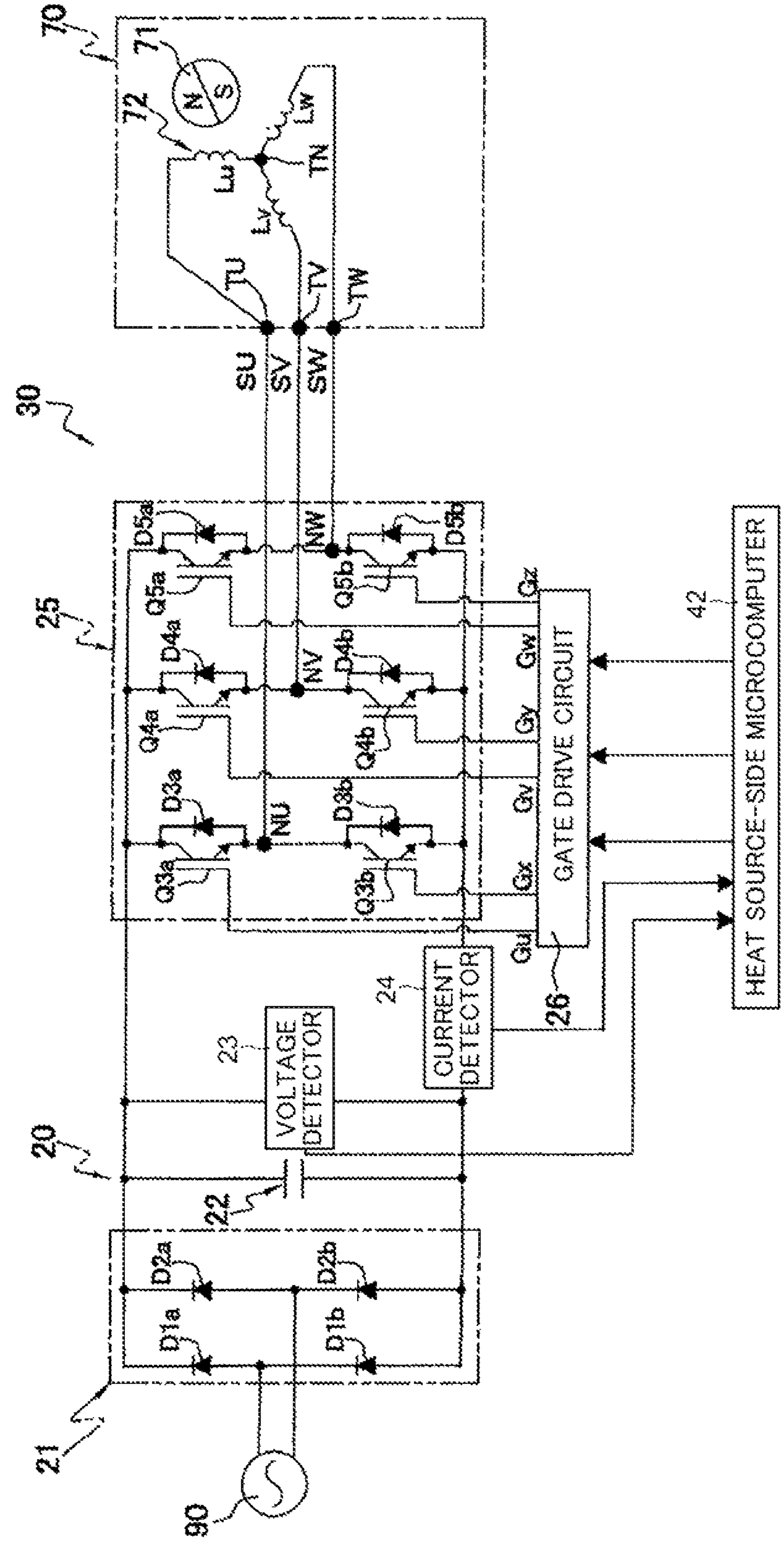

FIG. 13B is a circuit block diagram of a power conversion device mounted in the first embodiment of the technology of the thirteenth group.

Figure 13C:
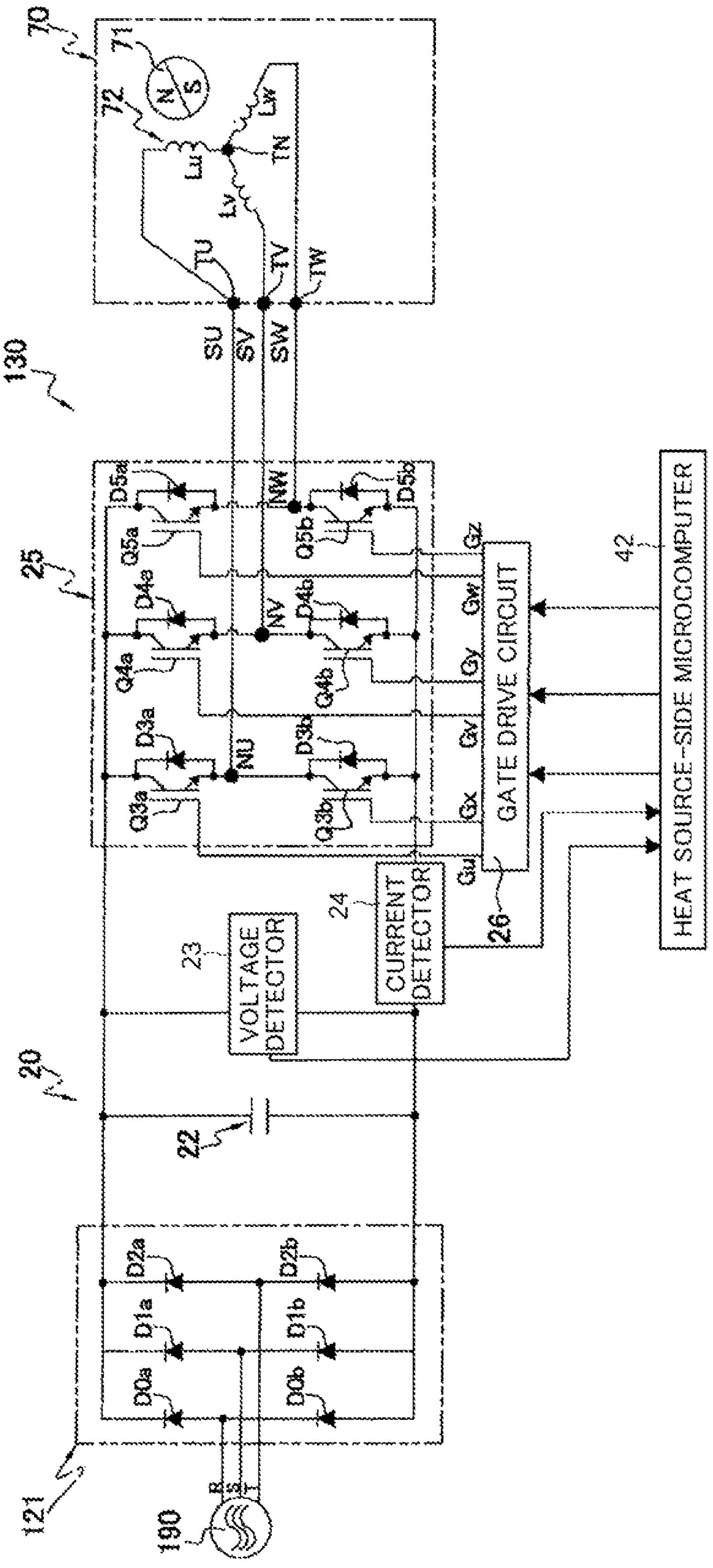

FIG. 13C is a circuit block diagram of a power conversion device in a modification of the first embodiment of the technology of the thirteenth group.

Figure 13D:
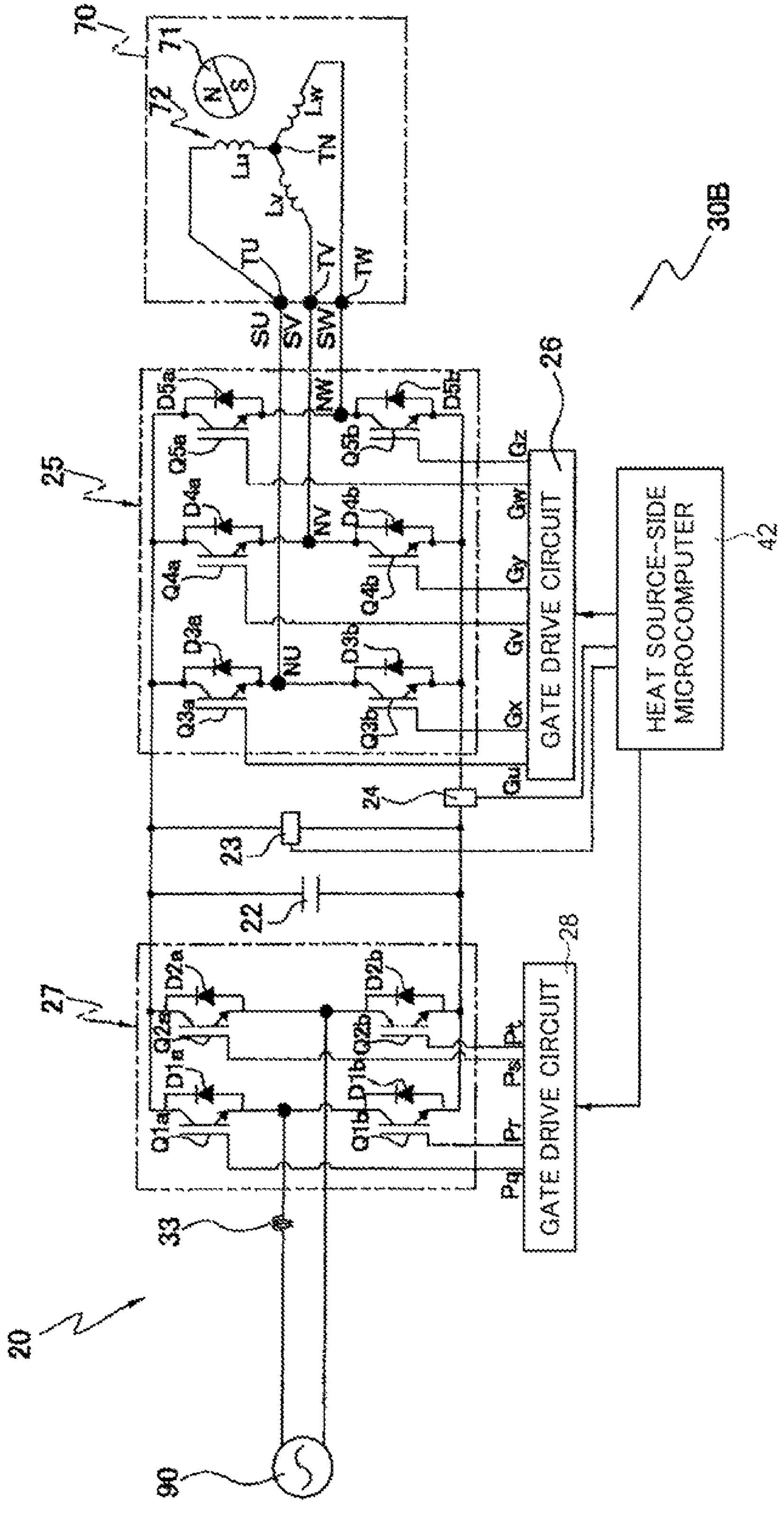

FIG. 13D is a circuit block diagram of a power conversion device mounted in an air conditioner according to a second embodiment of the technology of the thirteenth group.

Figure 13E:
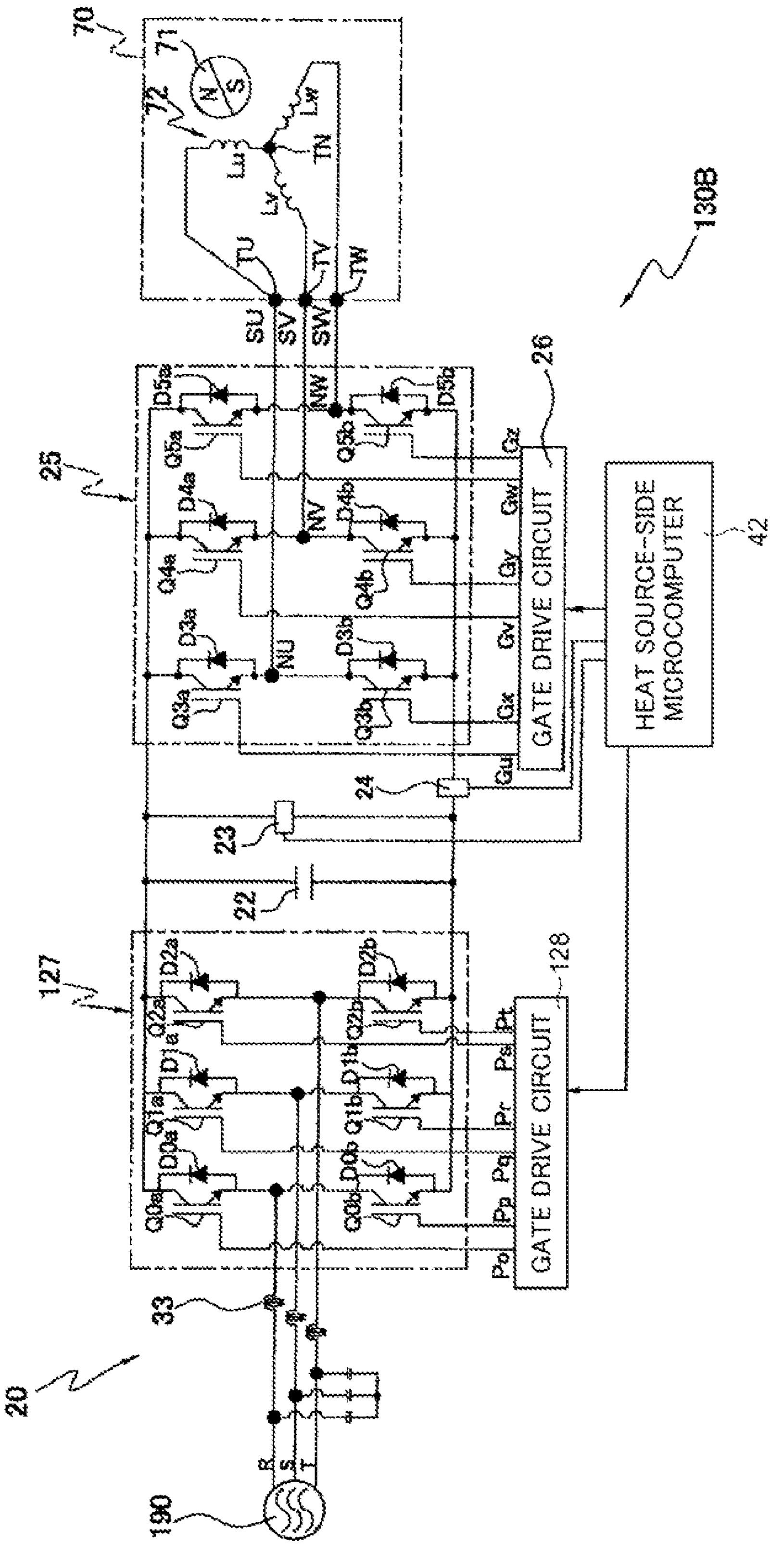

FIG. 13E is a circuit block diagram of a power conversion device in a modification of the second embodiment of the technology of the thirteenth group.

Figure 13F:
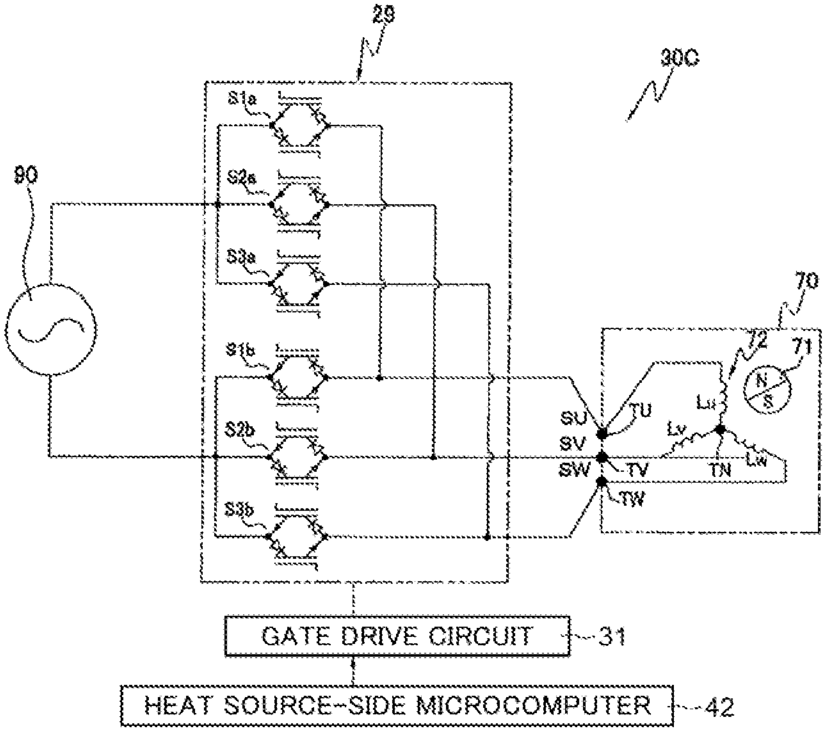

FIG. 13F is a circuit block diagram of a power conversion device mounted in an air conditioner according to a third embodiment of the technology of the thirteenth group.

Figure 13G:
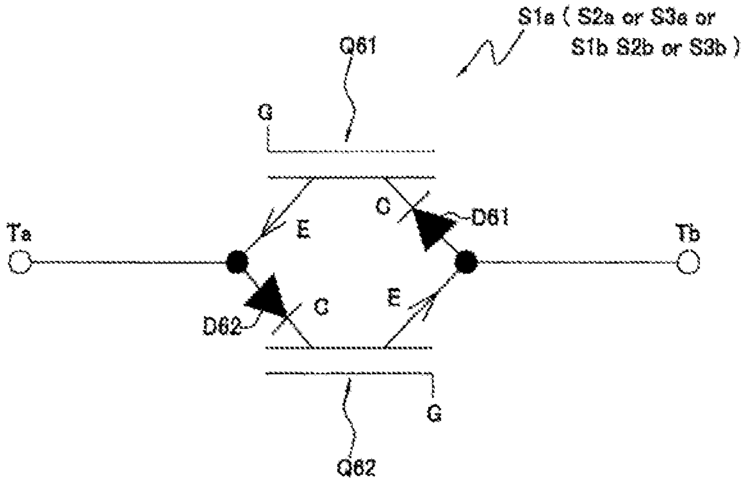

FIG. 13G is a circuit diagram conceptually showing a bidirectional switch of the technology of the thirteenth group.

Figure 13H:
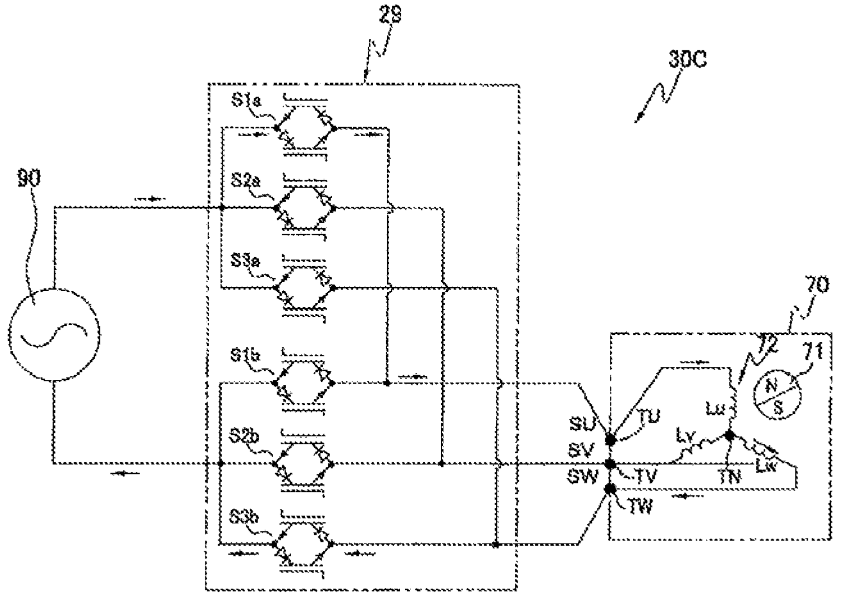

FIG. 13H is a circuit diagram showing one example of electric current direction of a matrix converter of the technology of the thirteenth group.

Figure 13I:
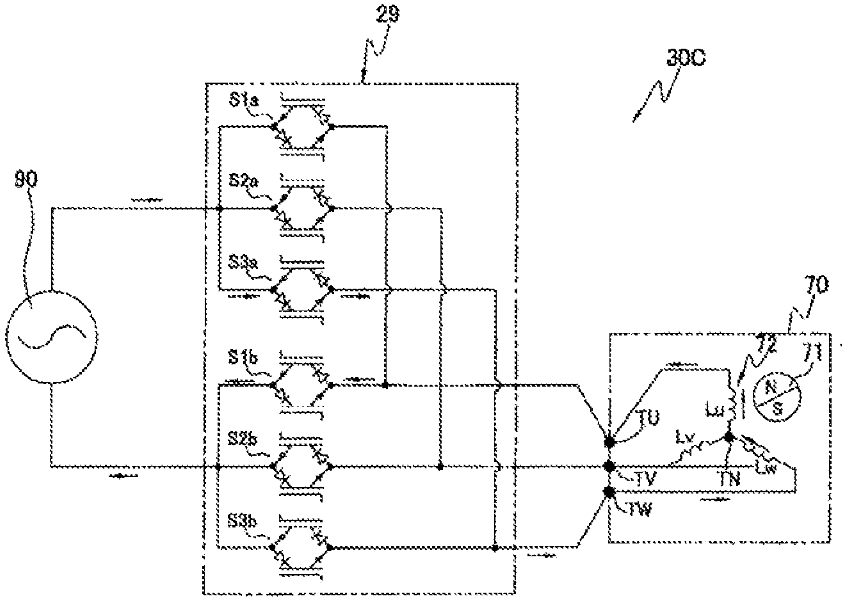
Figure 133:
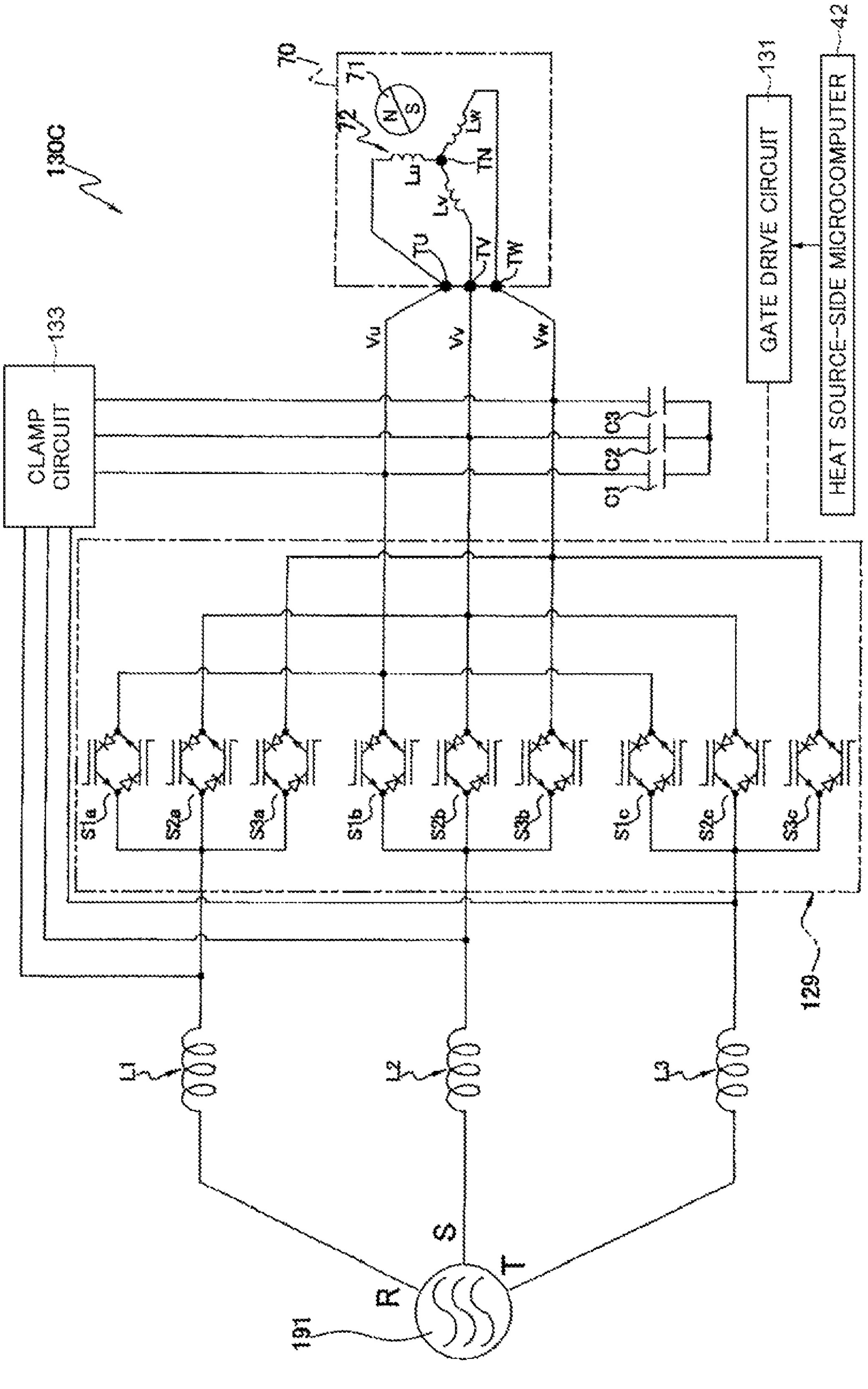

FIG. 13I is a circuit diagram showing another example of electric current direction of the matrix converter of the technology of the thirteenth group.

FIG. 13J is a circuit block diagram of a power conversion device in a modification of the third embodiment of the technology of the thirteenth group.

Figure 13K:
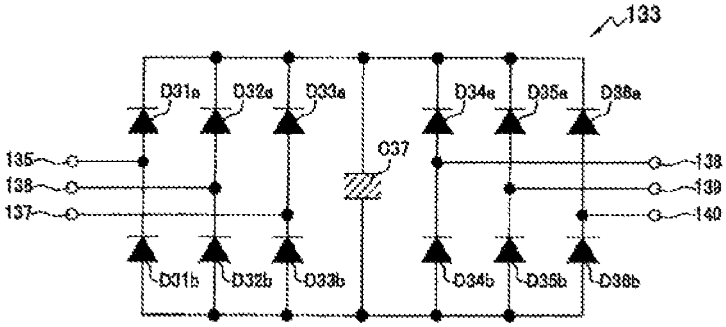

FIG. 13K is a circuit diagram of a clamp circuit of the technology of the thirteenth group.

Figure 14A:
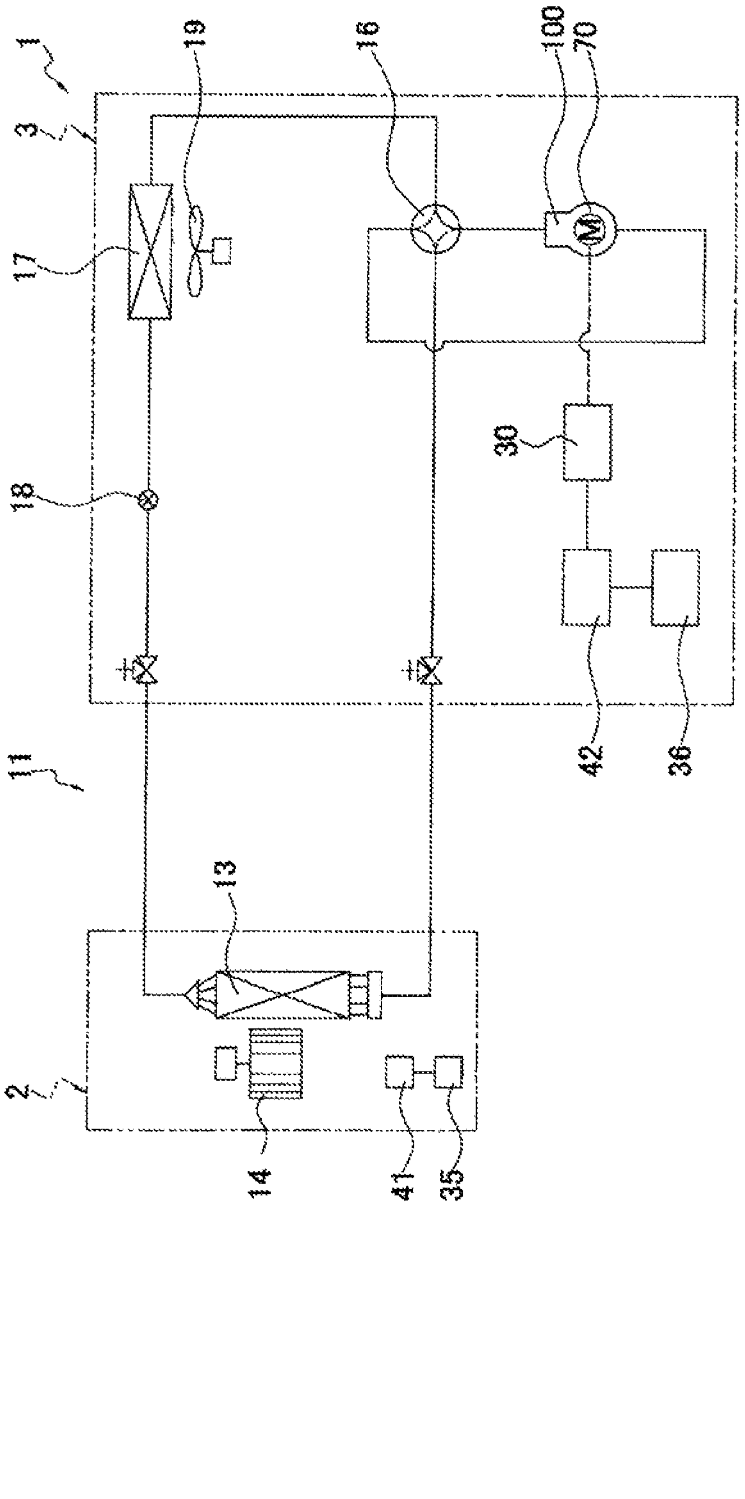

FIG. 14A is a configuration diagram of an air conditioner according to one embodiment of the technology of a fourteenth group.

Figure 14B:
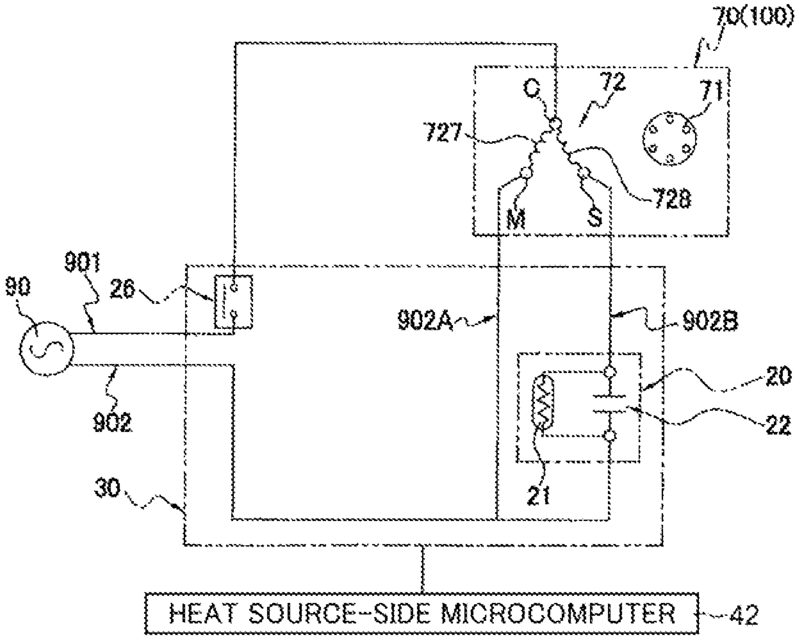

FIG. 14B is an operation circuit diagram of a motor of a compressor of the technology of the fourteenth group.

Figure 14C:
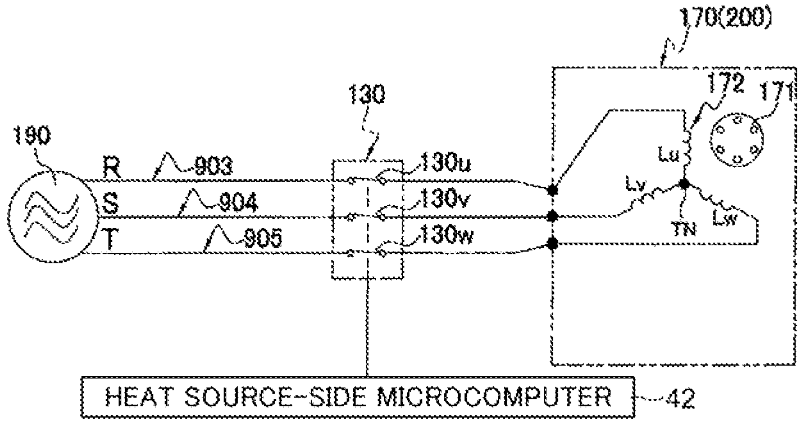

FIG. 14C is an operation circuit diagram of a motor of a compressor in an air conditioner according to a modification of the technology of the fourteenth group.

Figure 15A:
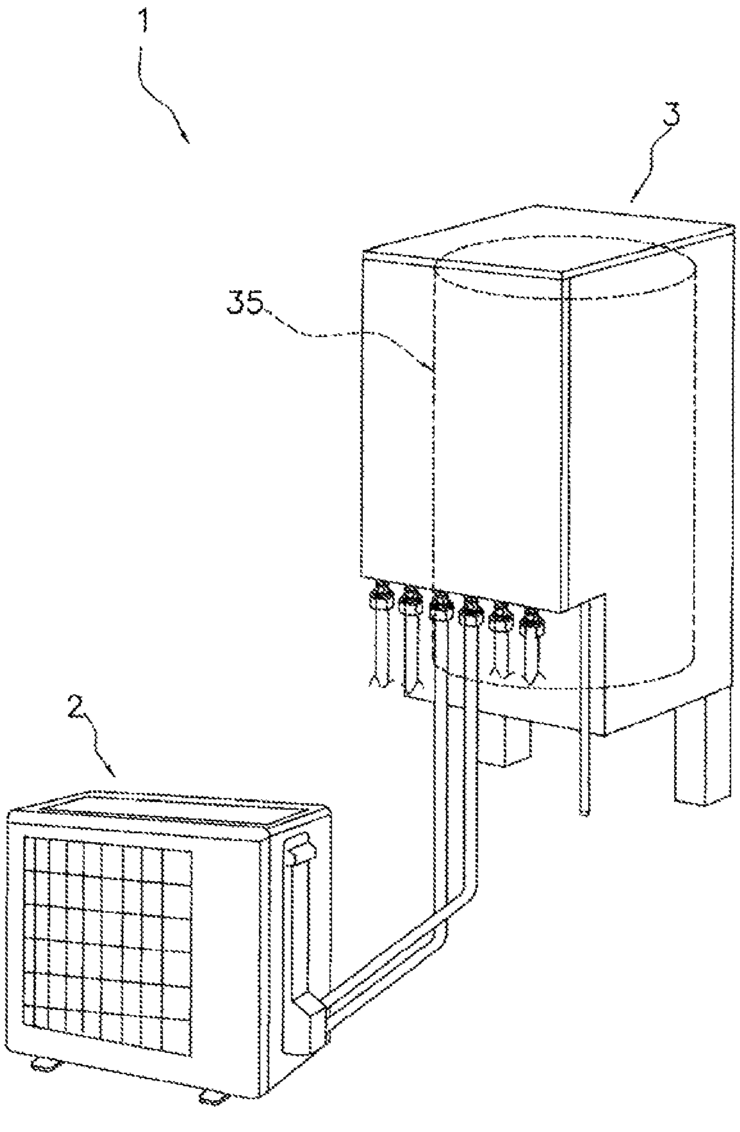

FIG. 15A is an external view of a hot water supply system as a warm water production device according to a first embodiment of the technology of a fifteenth group.

Figure 15B:
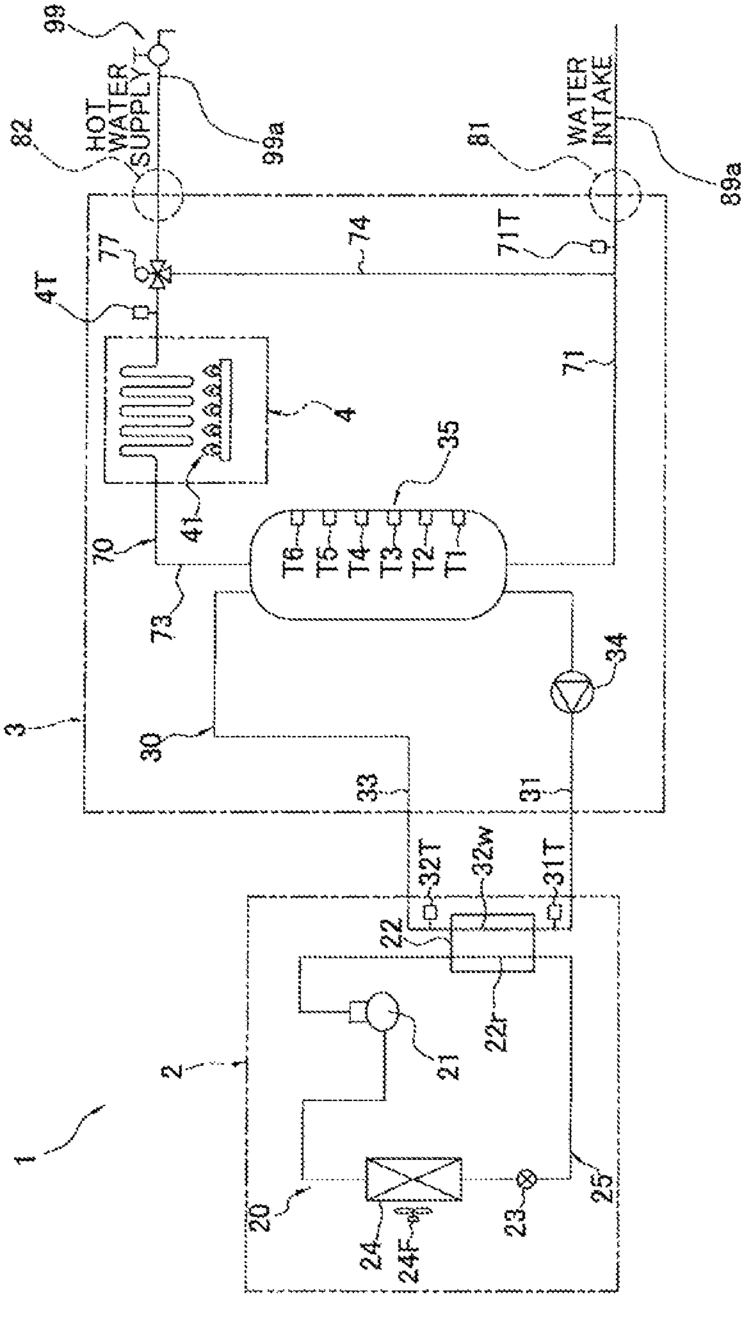

FIG. 15B is a water circuit and refrigerant circuit diagram of the hot water supply system of the first embodiment of the technology of the fifteenth group.

Figure 15C:
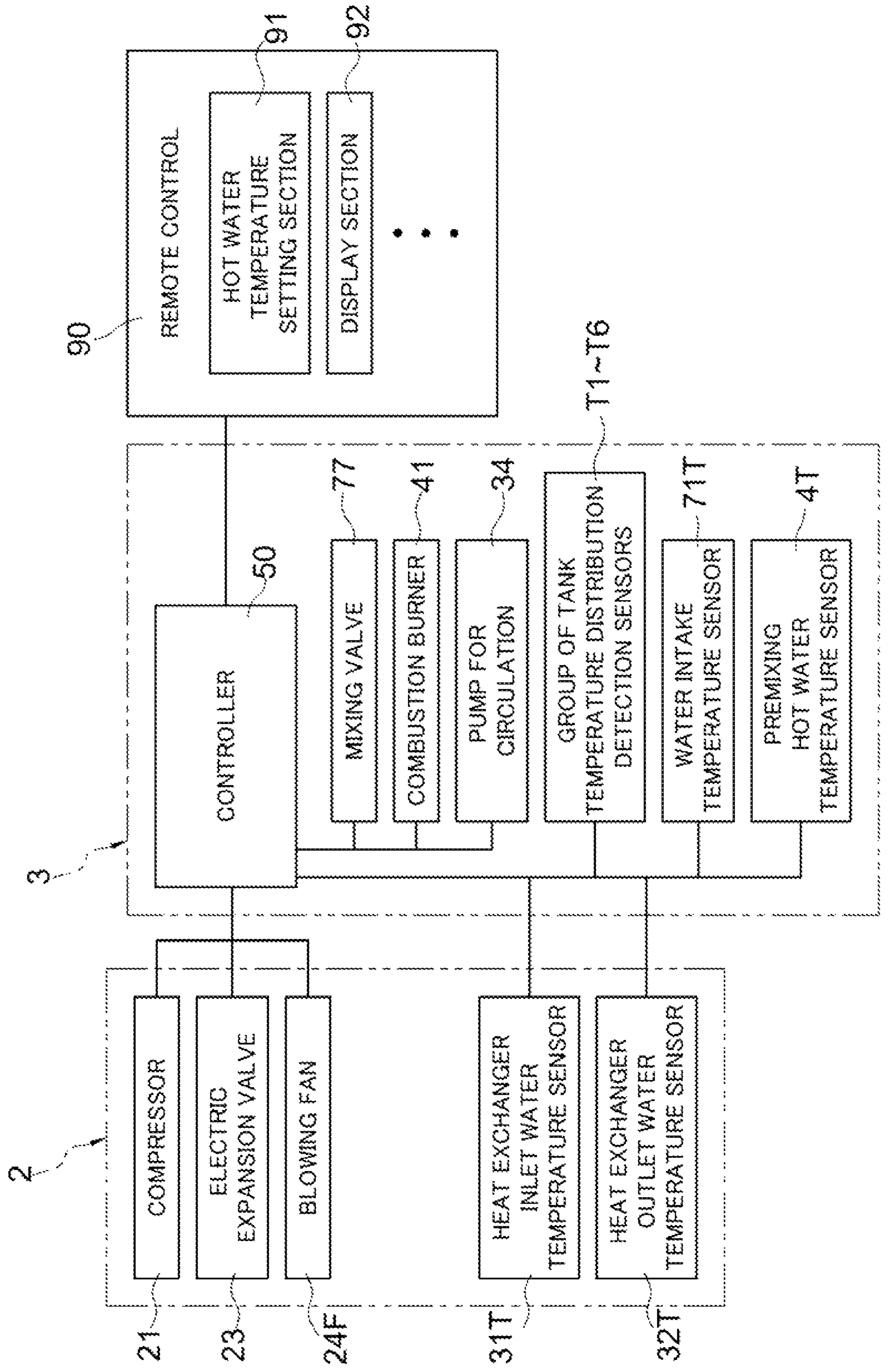

FIG. 15C is a control block diagram of the hot water supply system of the first embodiment of the technology of the fifteenth group.

Figure 15D:
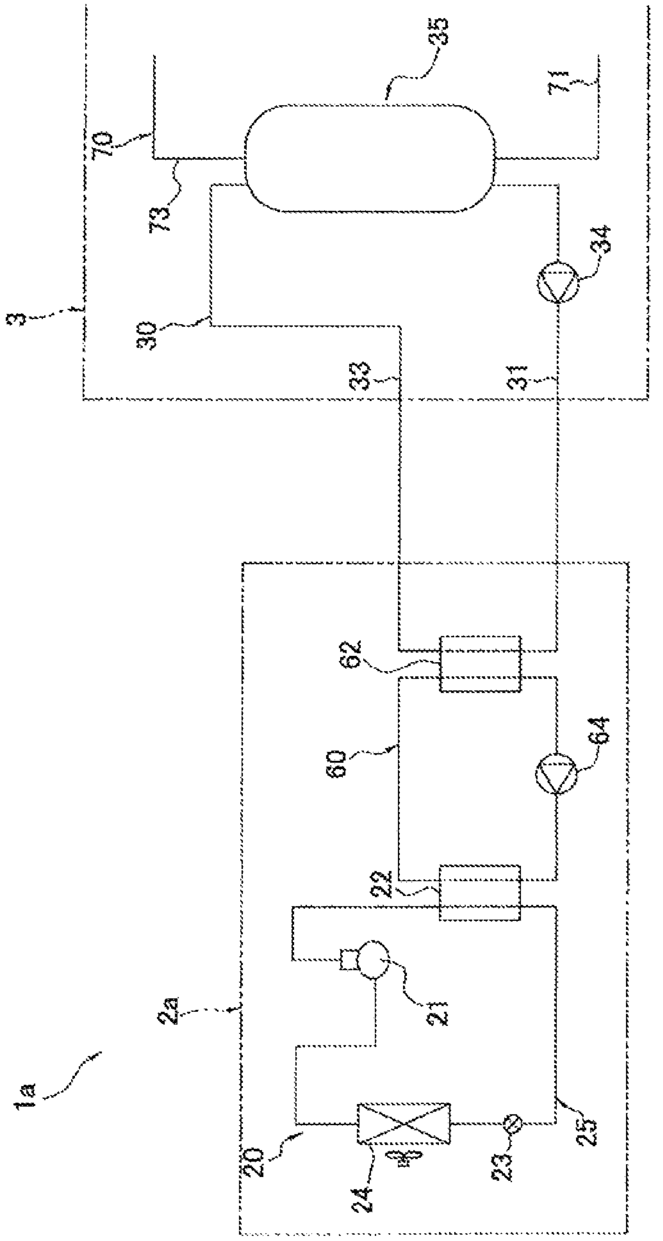

FIG. 15D is a water circuit and refrigerant circuit diagram of a hot water supply system of a first modification of the first embodiment of the technology of the fifteenth group.

Figure 15E:
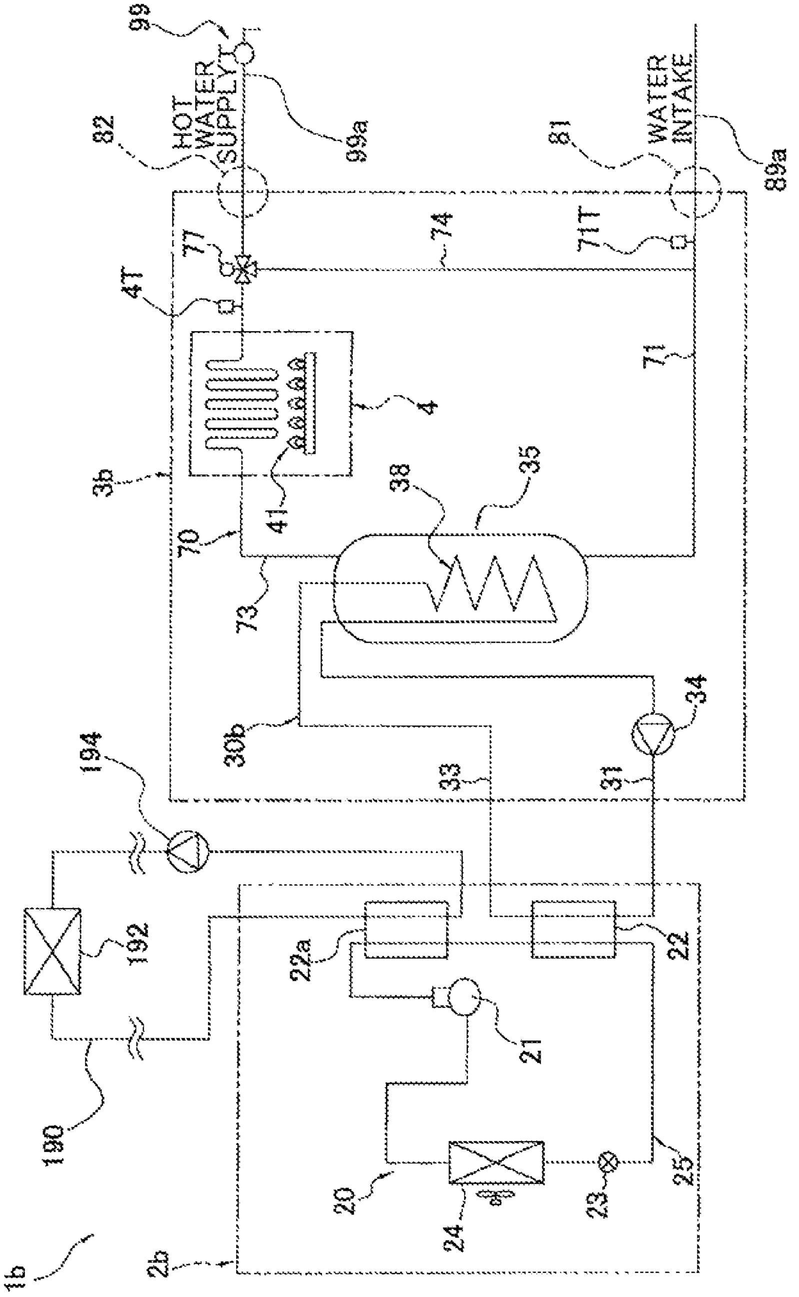
Figure 15E:
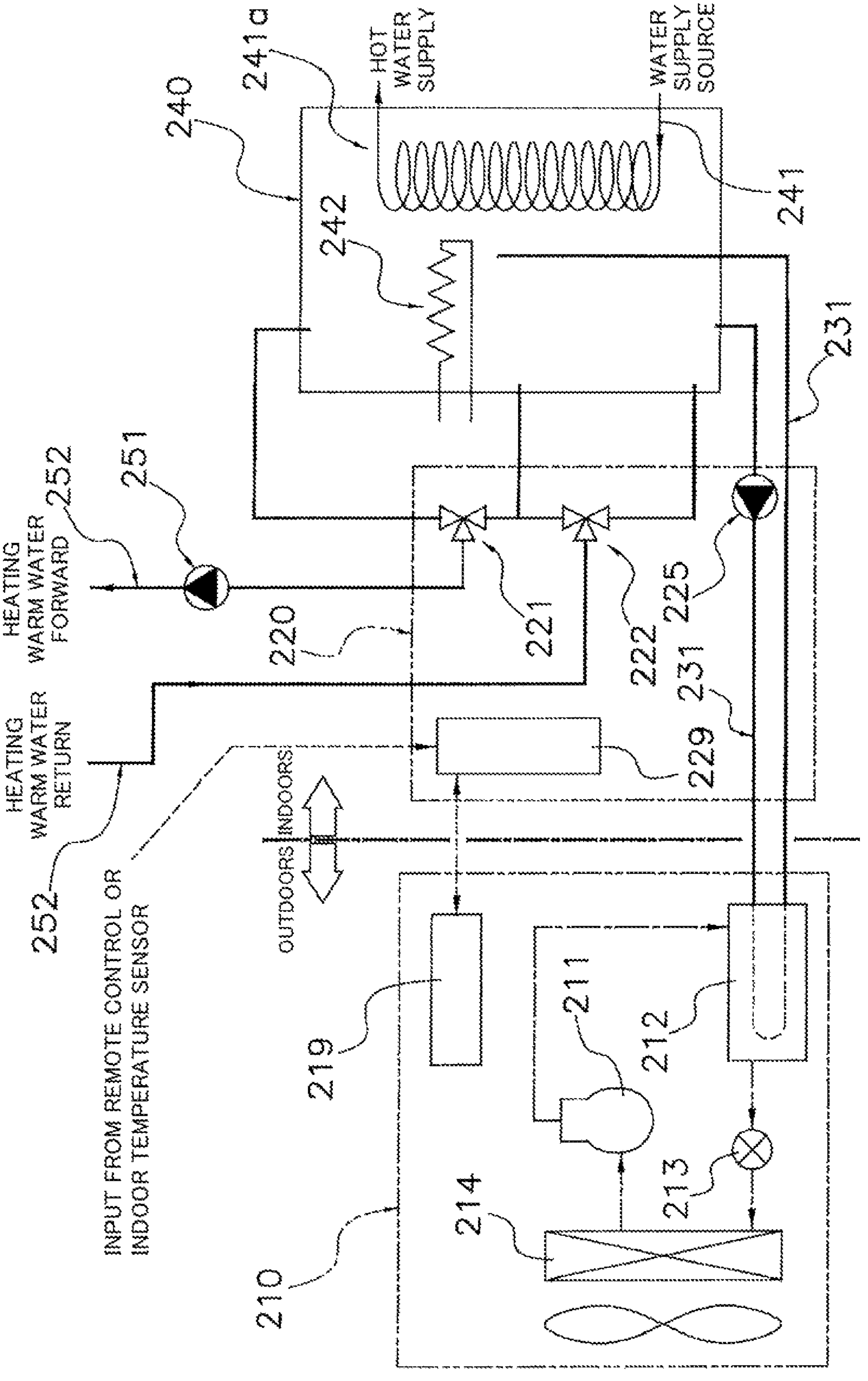

FIG. 15E is a water circuit and refrigerant circuit diagram of a hot water supply system of a second modification of the first embodiment of the technology of the fifteenth group.

FIG. 15F is a diagram showing a part of the configuration of a warm water circulation heating system as a warm water production device according to a second embodiment of the technology of the fifteenth group.

Figure 15G:
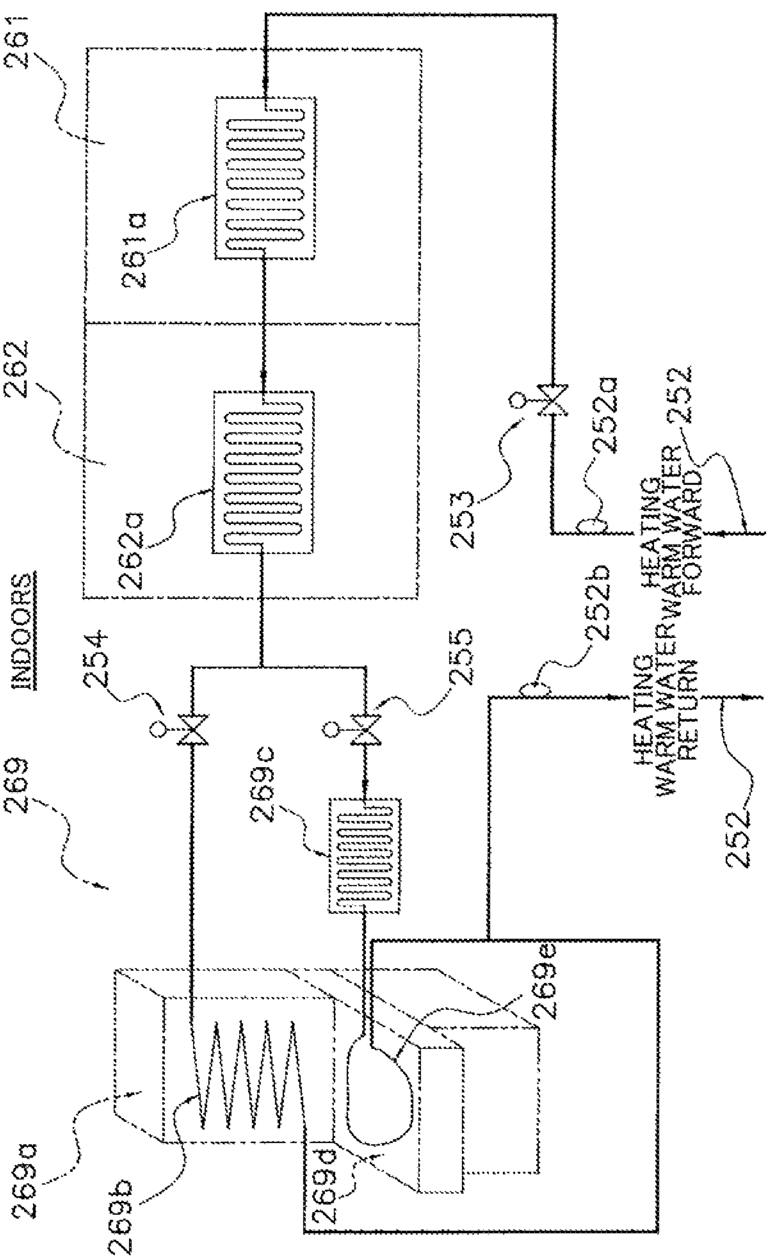

FIG. 15G is a diagram showing a part of the configuration of the warm water circulation heating system of the second embodiment of the technology of the fifteenth group.

Figure 15H:
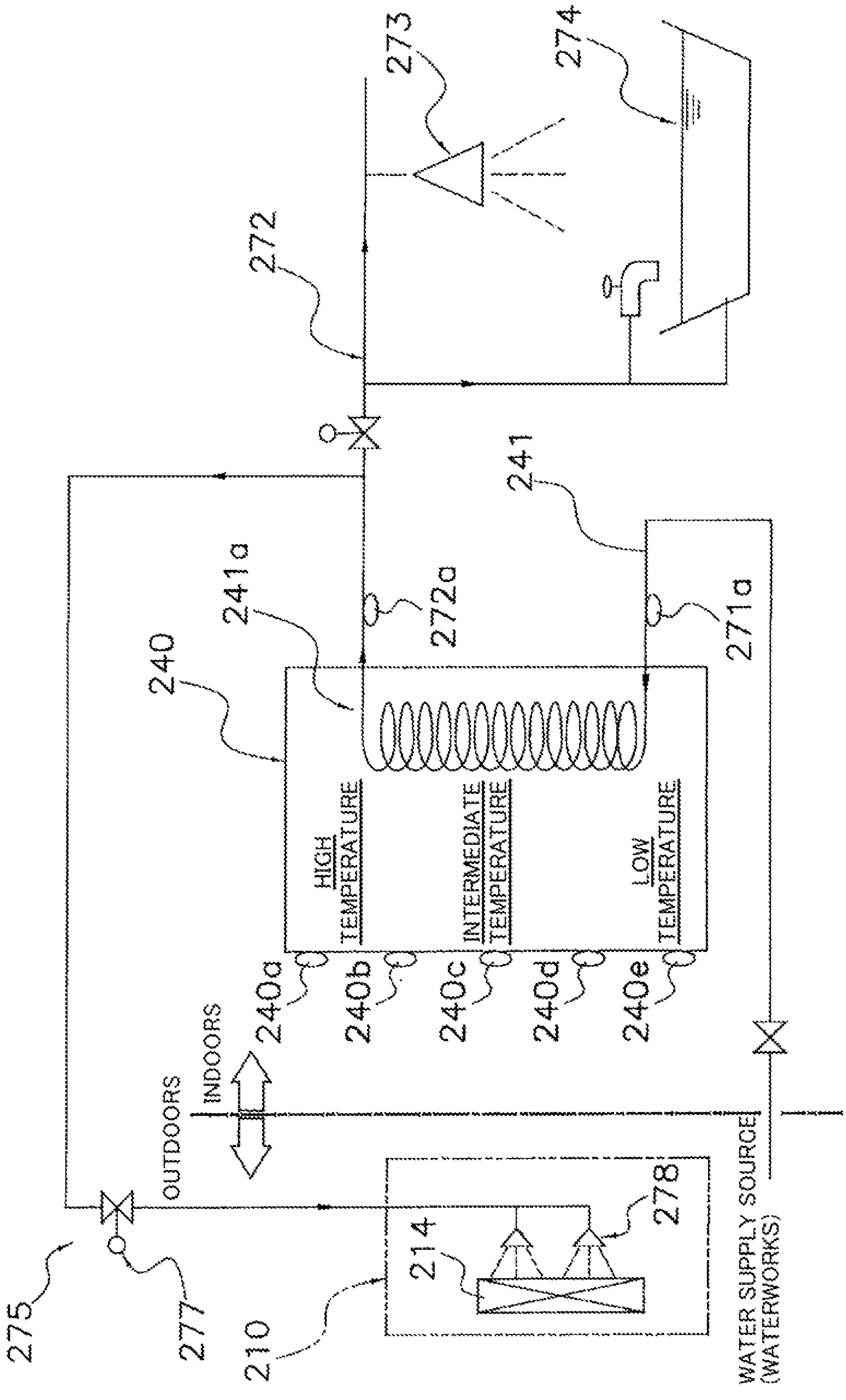

FIG. 15H is a diagram showing a part of the configuration of the warm water circulation heating system of the second embodiment of the technology of the fifteenth group.

Figure 15I:
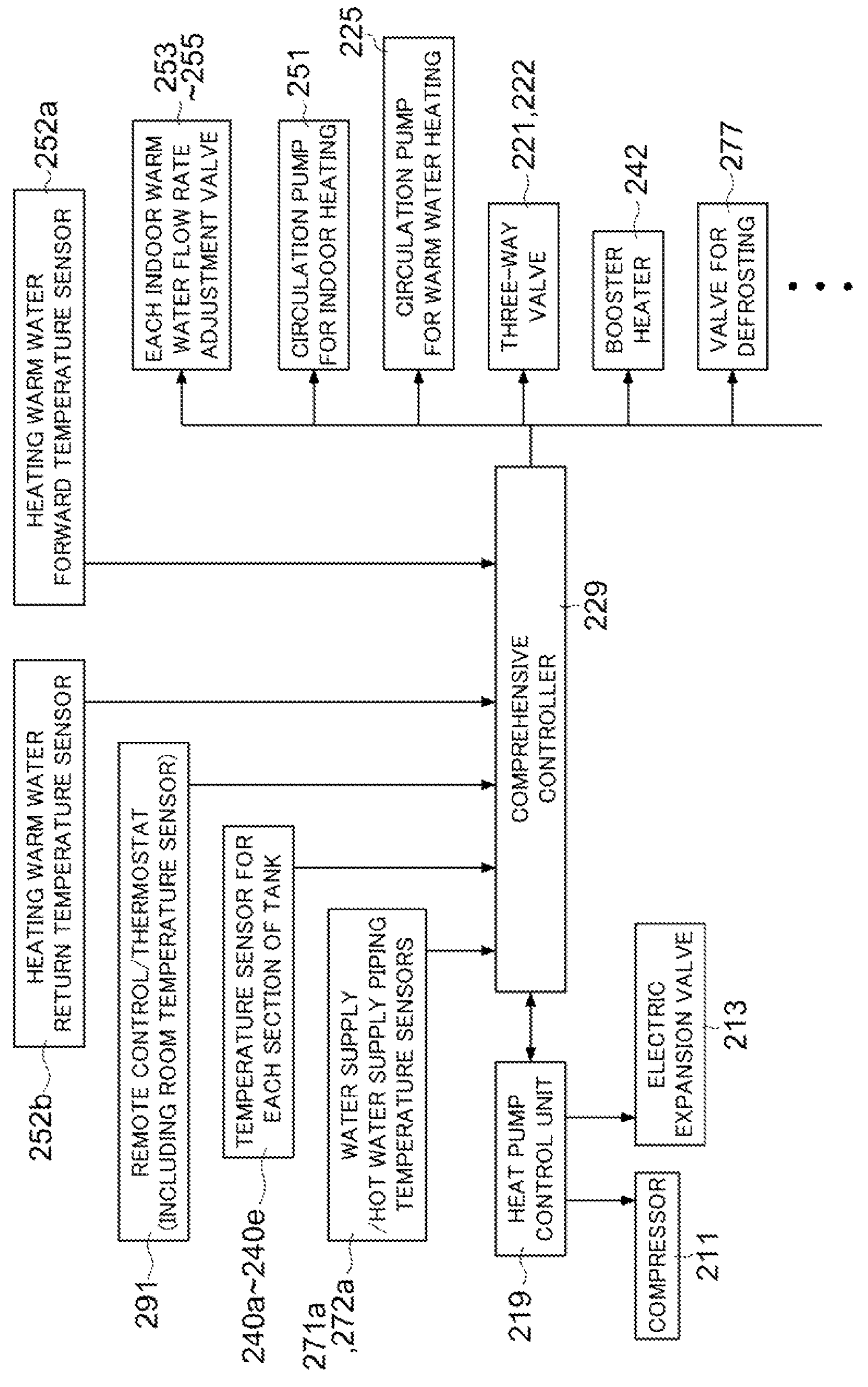

FIG. 15I is a control block diagram of the warm water circulation heating system of the second embodiment of the technology of the fifteenth group.

Figure 15J:
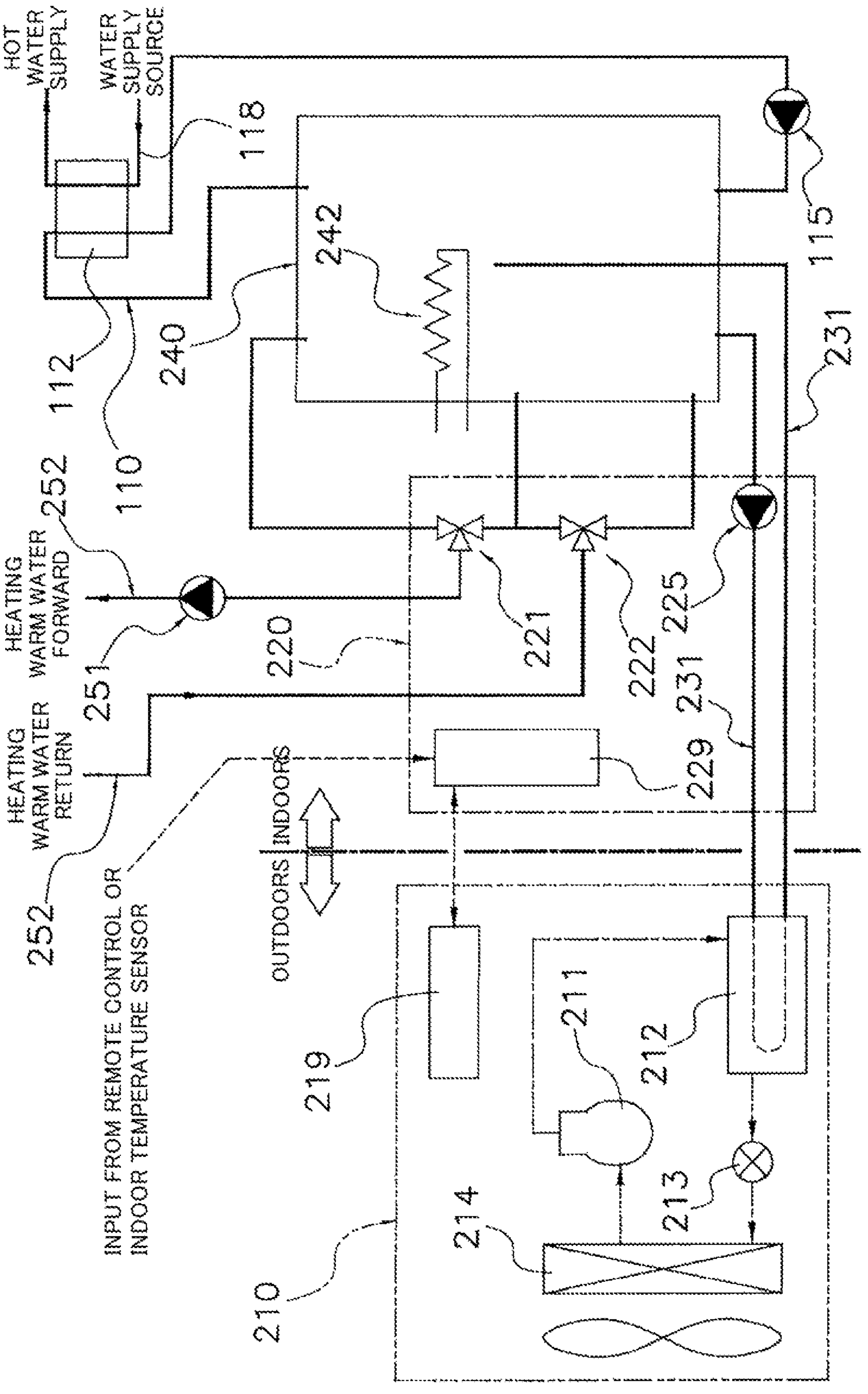

FIG. 15J is a diagram showing a part of the configuration of a warm water circulation heating system of a first modification of the second embodiment of the technology of the fifteenth group.

Figure 15K:
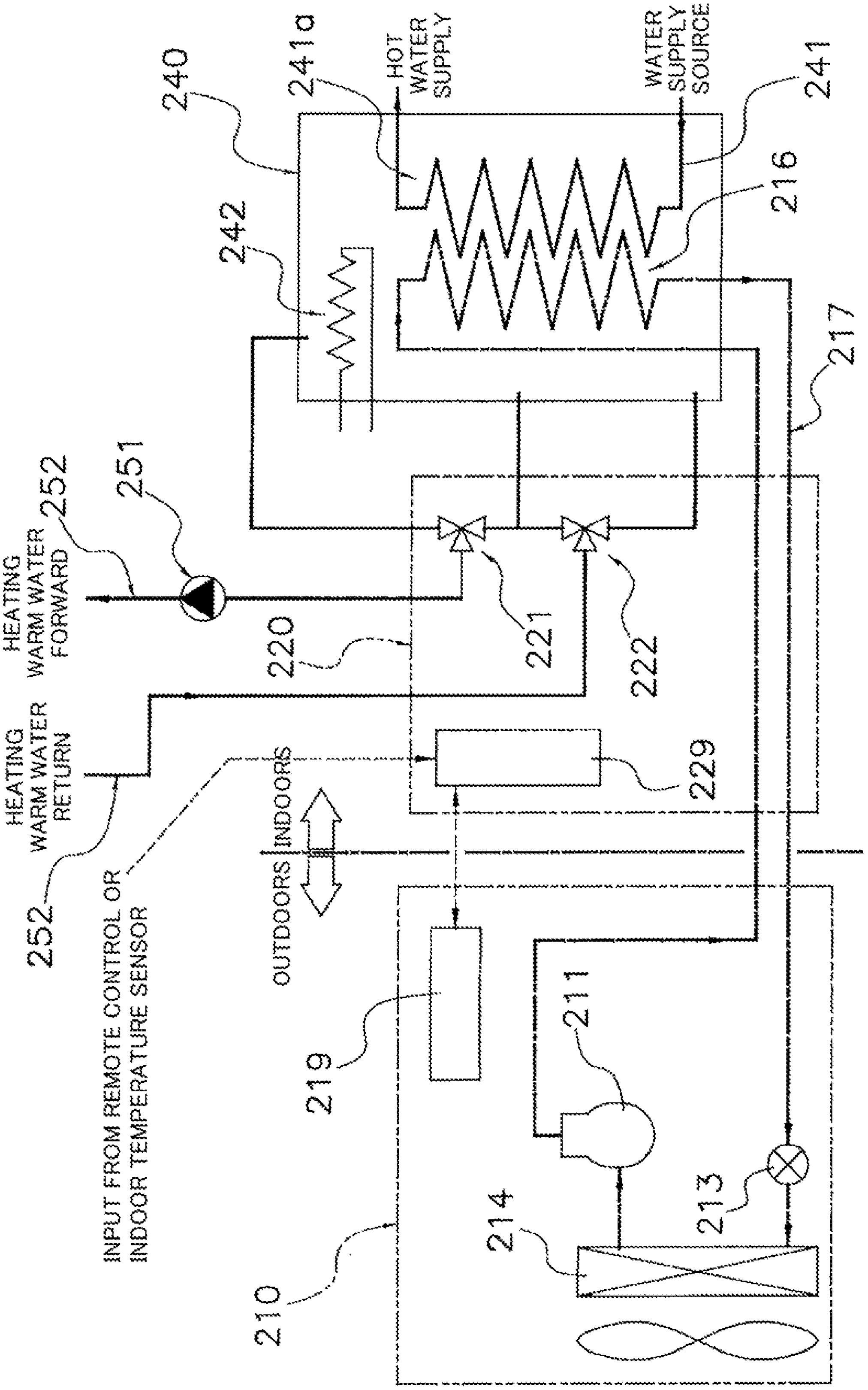

FIG. 15K is a diagram showing a part of the configuration of a warm water circulation heating system of a second modification of the second embodiment of the technology of the fifteenth group.

Figure 15L:
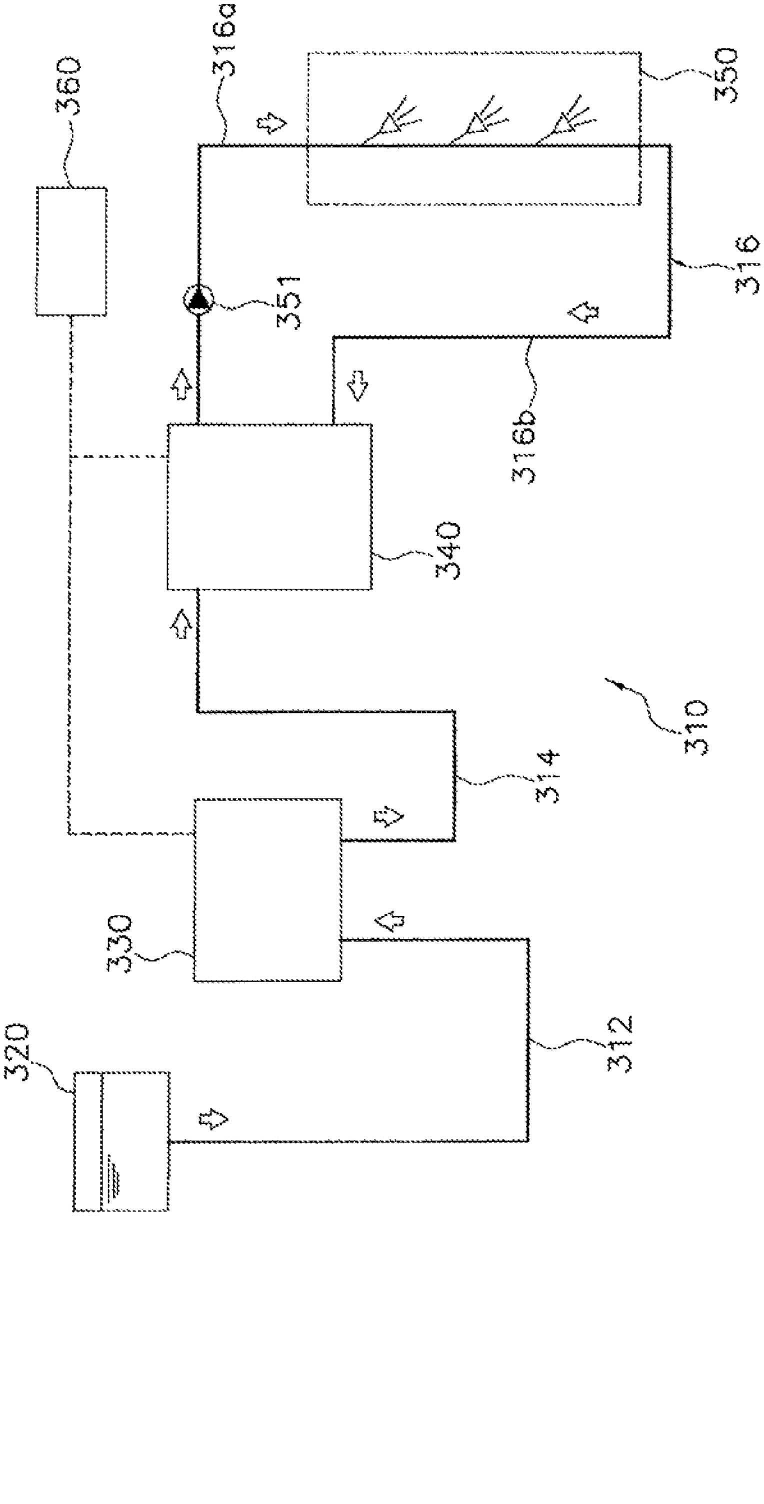

FIG. 15L is a schematic configuration diagram of a hot water supply system as a warm water production device according to a third embodiment of the technology of the fifteenth group.

Figure 15M:
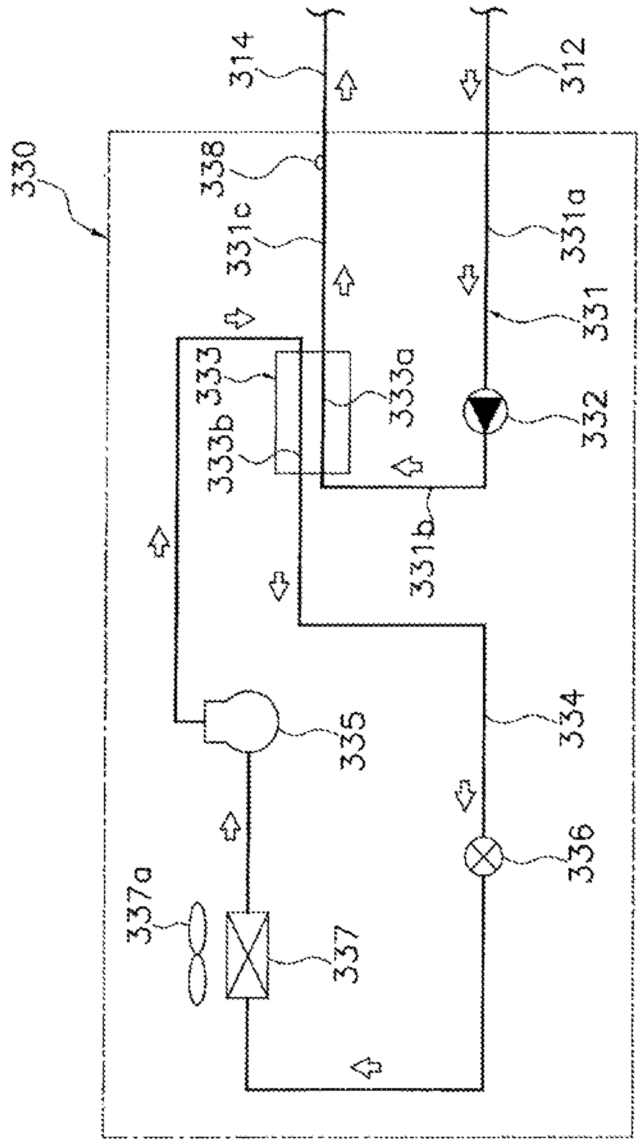

FIG. 15M is a schematic configuration diagram of a heat source unit of the hot water supply system of the third embodiment of the technology of the fifteenth group.

Figure 15N:
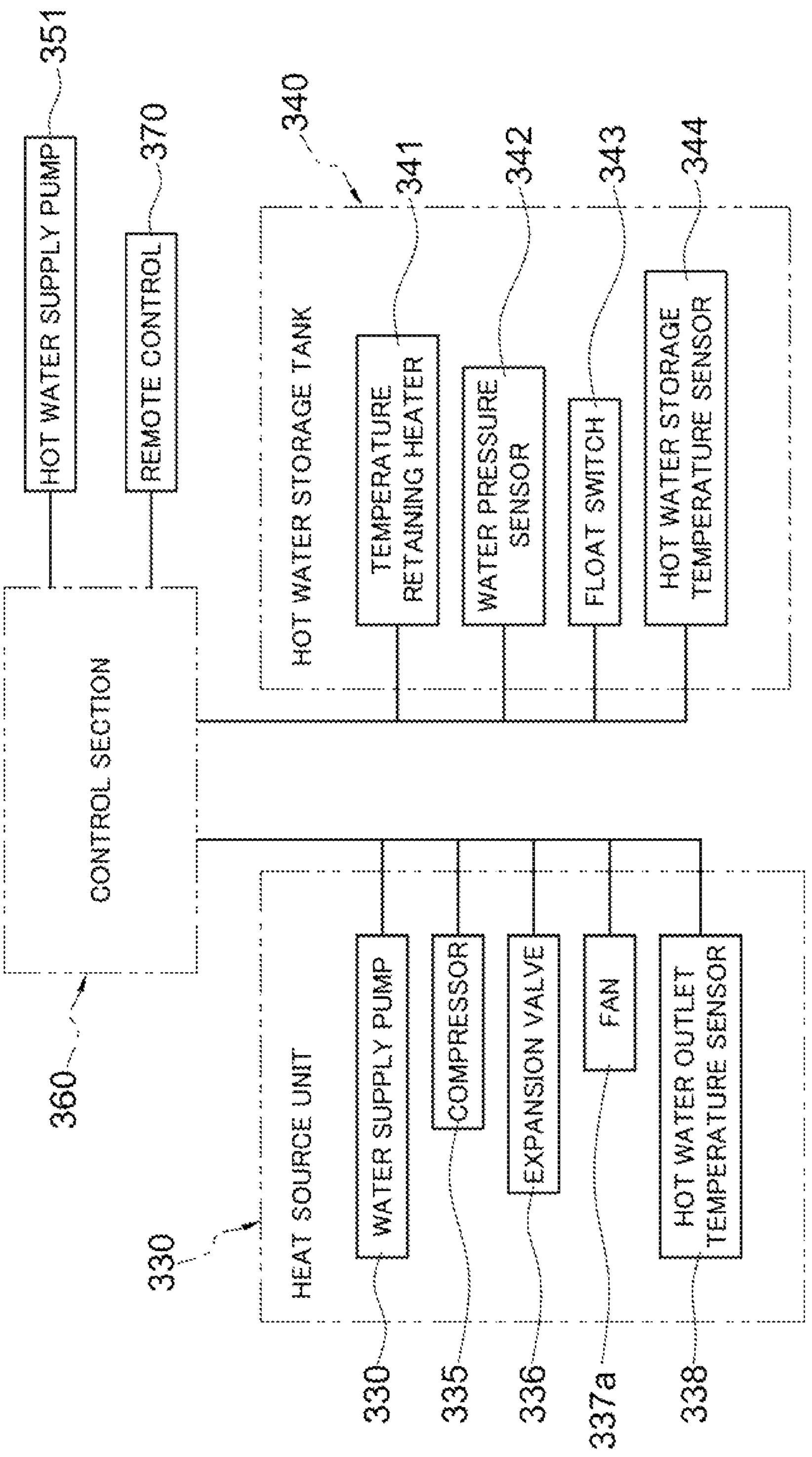

FIG. 15N is a control block diagram of the hot water supply system of the third embodiment of the technology of the fifteenth group.

Figure 16A:
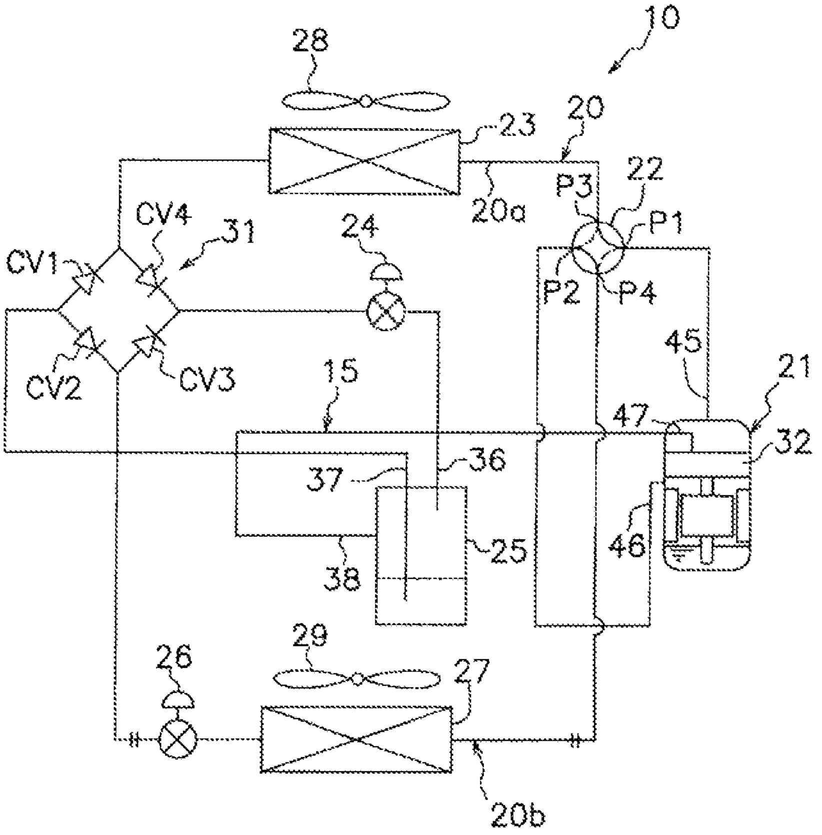

FIG. 16A is a schematic configuration diagram of a refrigeration device of a first embodiment of the technology of a sixteenth group.

Figure 16B:
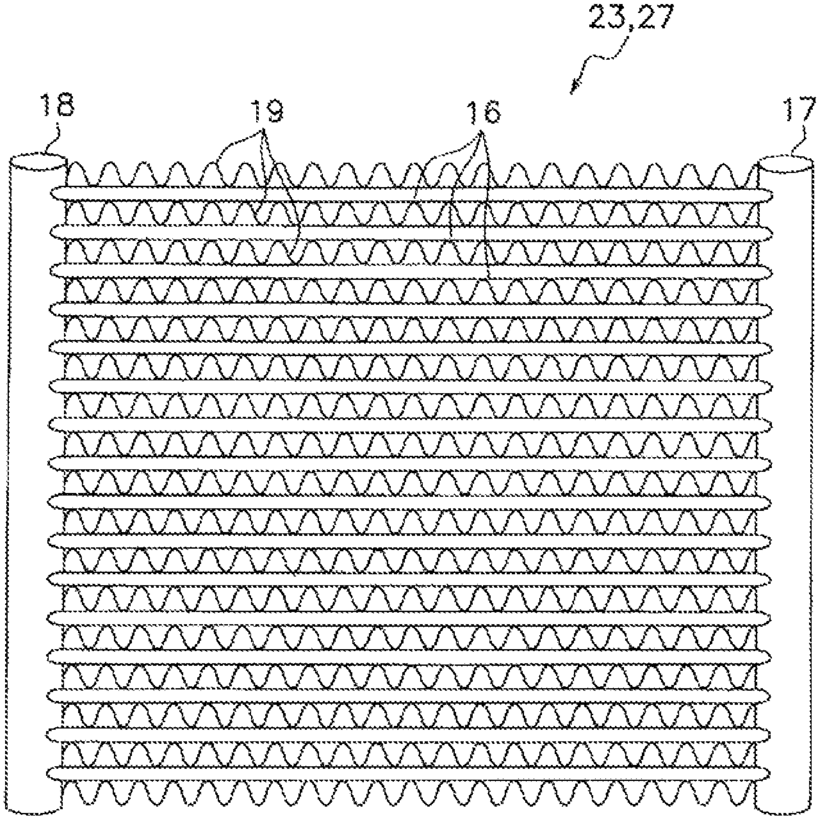

FIG. 16B is a front view of an outdoor heat exchanger or indoor heat exchanger of the first embodiment of the technology of the sixteenth group.

Figure 16C:
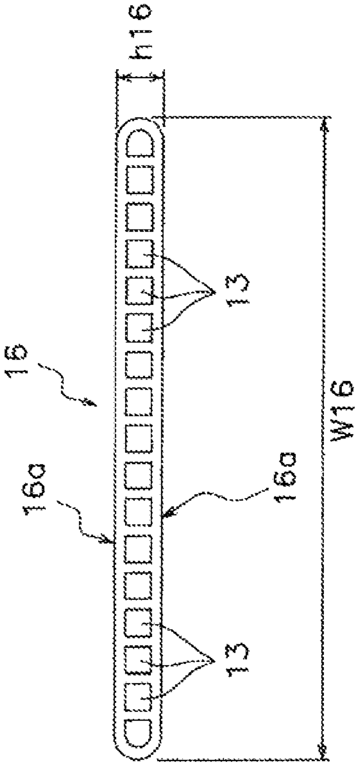

FIG. 16C is a cross section of a flat tube of the heat exchanger of the first embodiment of the technology of the sixteenth group.

Figure 16D:
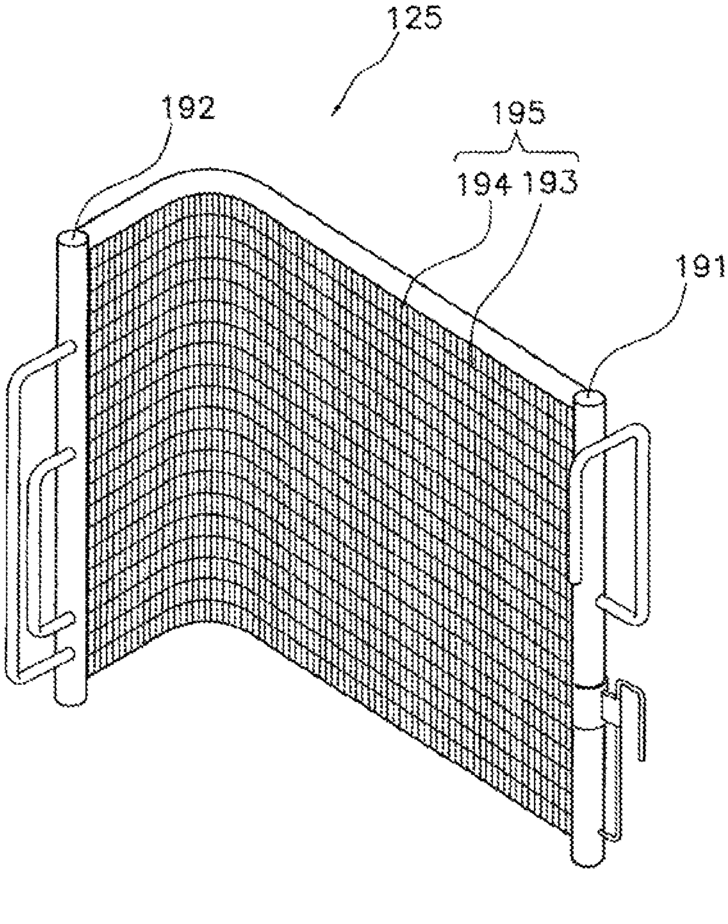

FIG. 16D is a schematic perspective view of an outdoor heat exchanger according to a second embodiment of the technology of the sixteenth group.

Figure 16E:
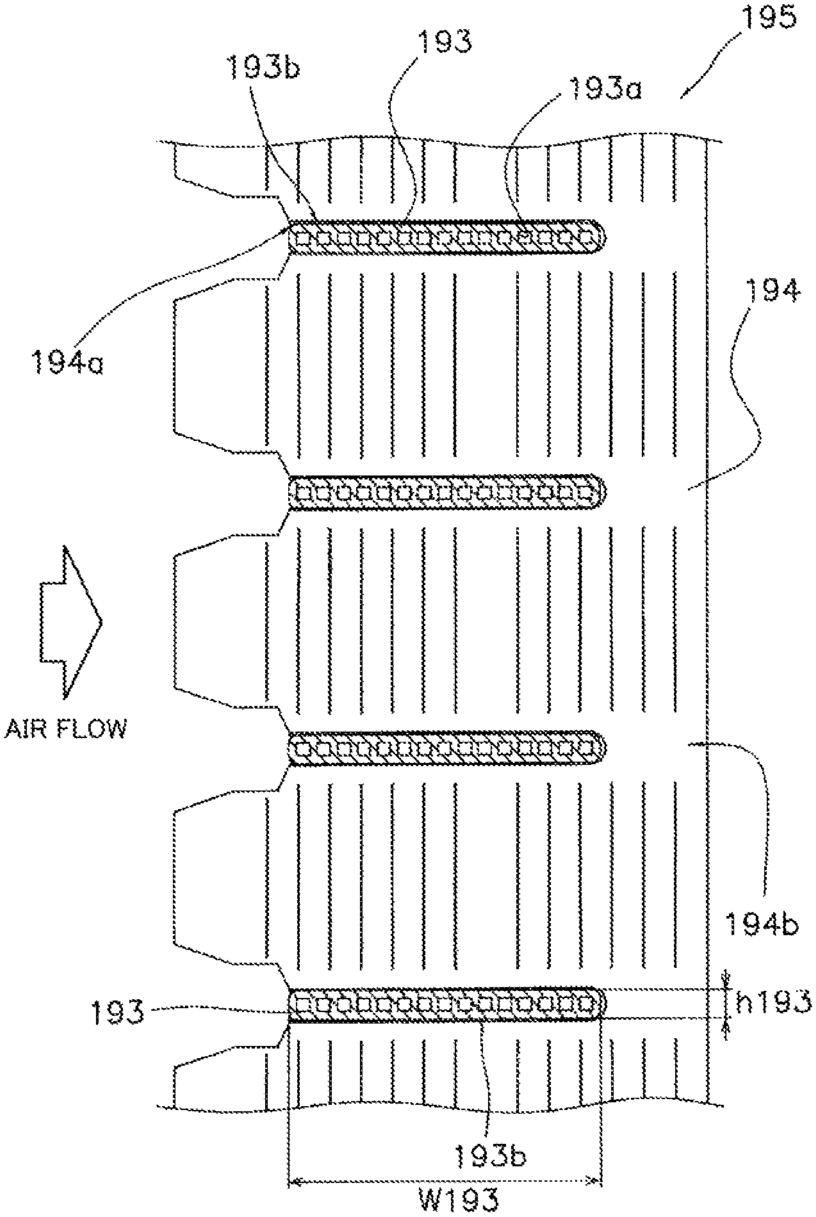

FIG. 16E is a partially enlarged view when a heat exchange section of the outdoor heat exchanger of the technology of the sixteenth group is cut in the vertical direction.

Figure 16F:
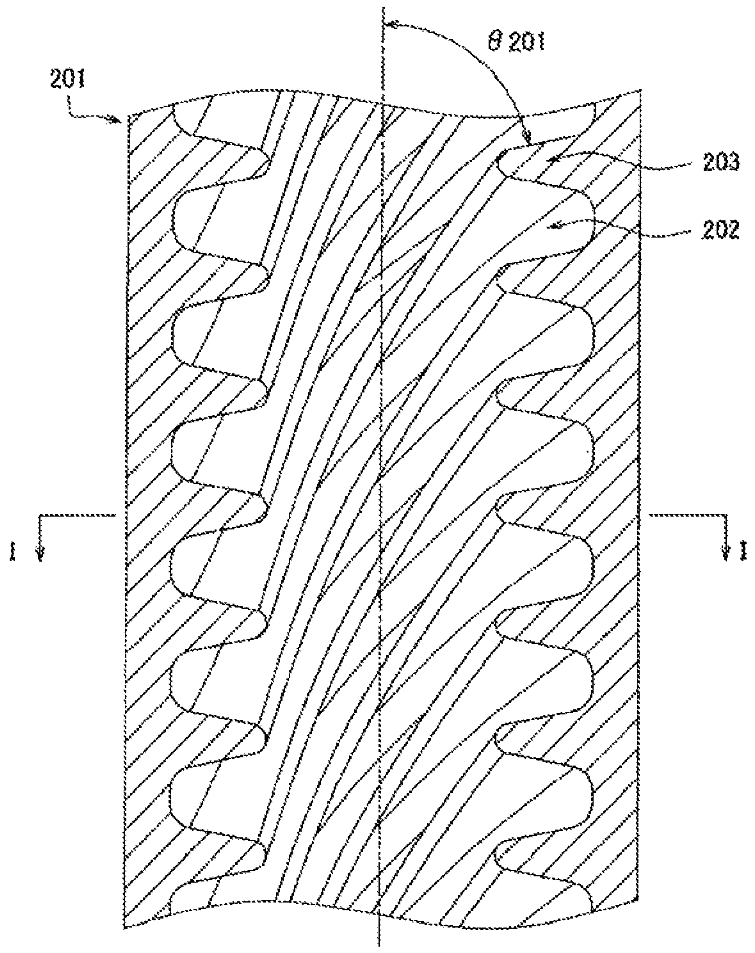

FIG. 16F is a cross section in the pipe axis direction showing the configuration of an internally grooved pipe according to a third embodiment of the technology of the sixteenth group.

Figure 16G:
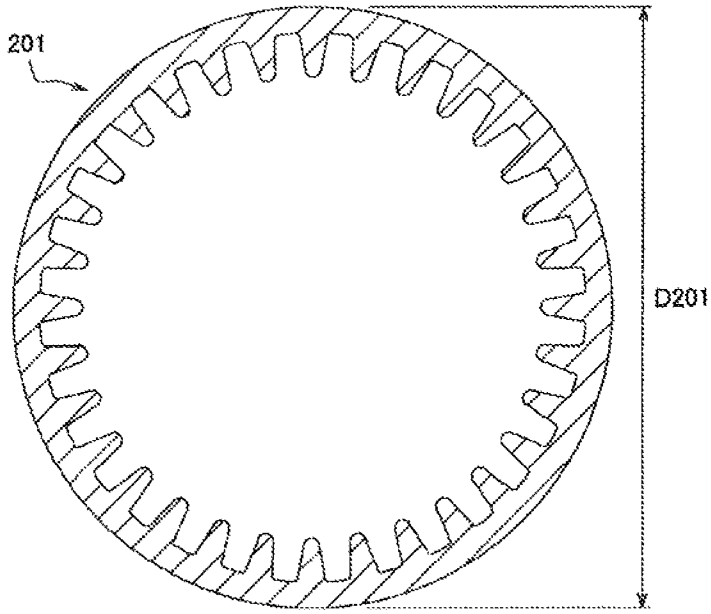

FIG. 16G is a cross section along the I-I line of the internally grooved pipe shown in FIG. 16F.

Figure 16H:
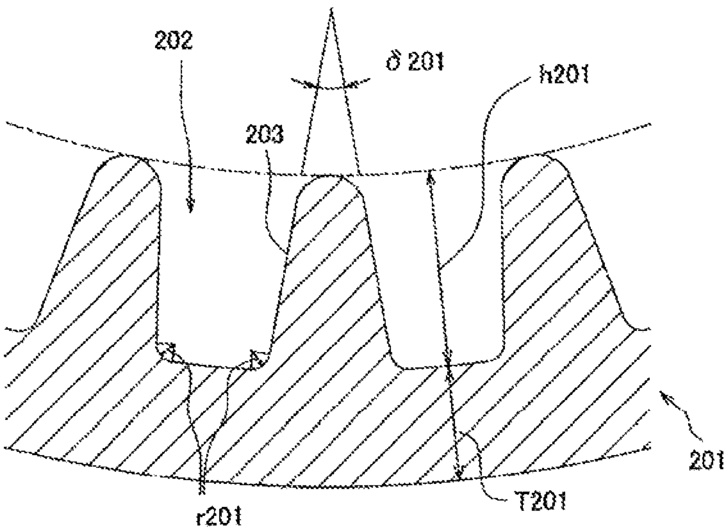

FIG. 16H is a partially enlarged view showing an enlarged part of the internally grooved pipe shown in FIG. 16G.

Figure 16I:
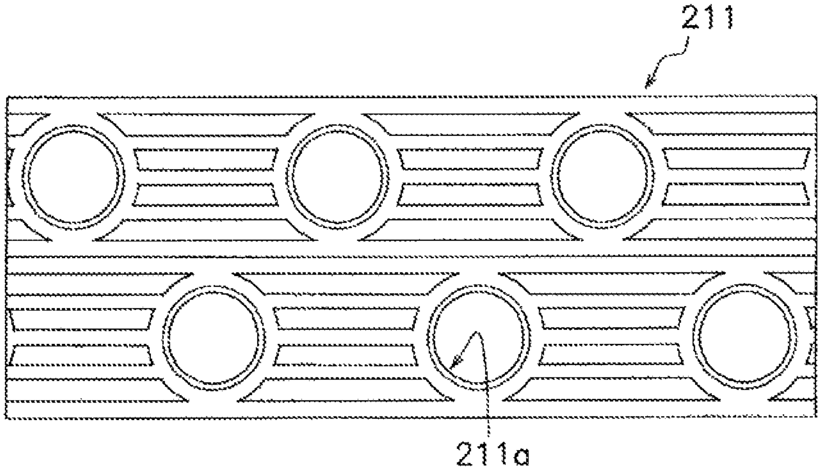

FIG. 16I is a plan view showing the configuration of a plate fin of the technology of the sixteenth group.

Figure 17A:
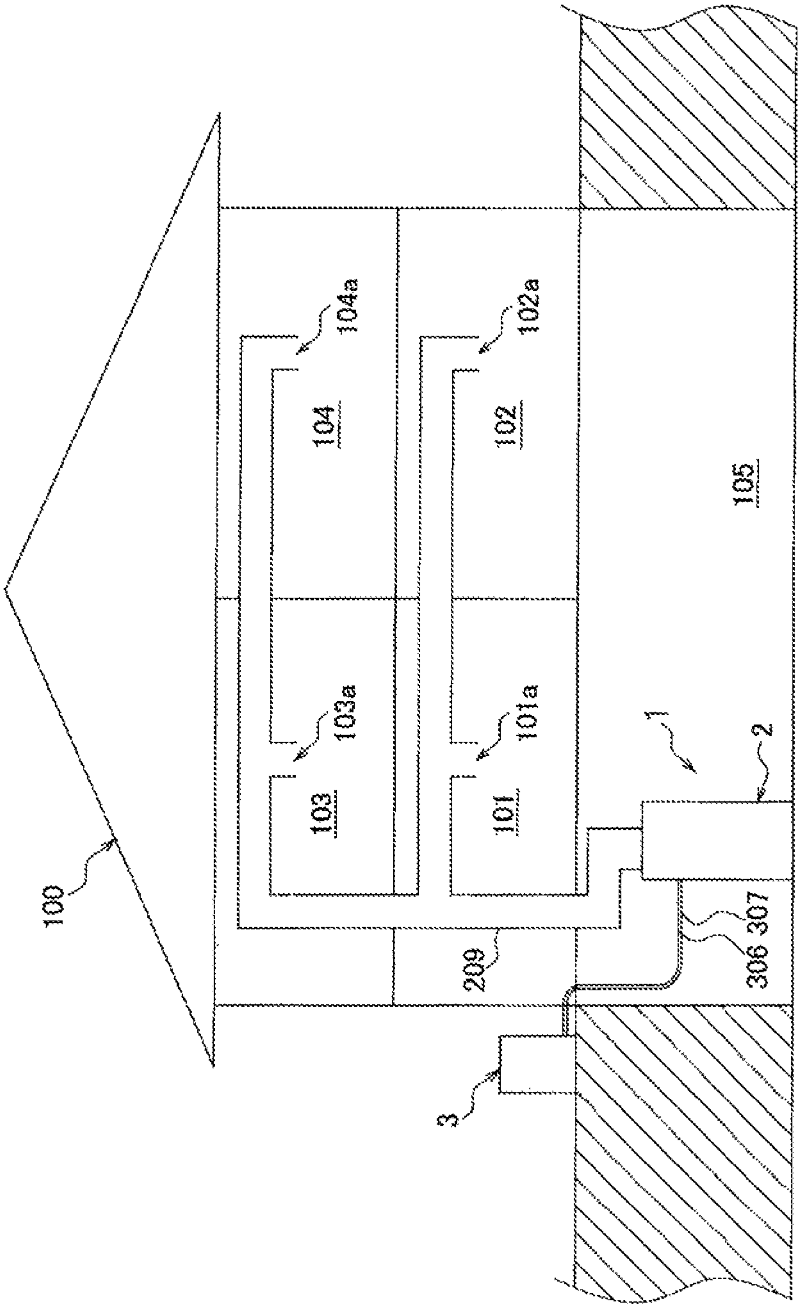

FIG. 17A is a schematic diagram showing the arrangement of an air conditioning device according to a first embodiment of the technology of the seventeenth group.

Figure 17B:
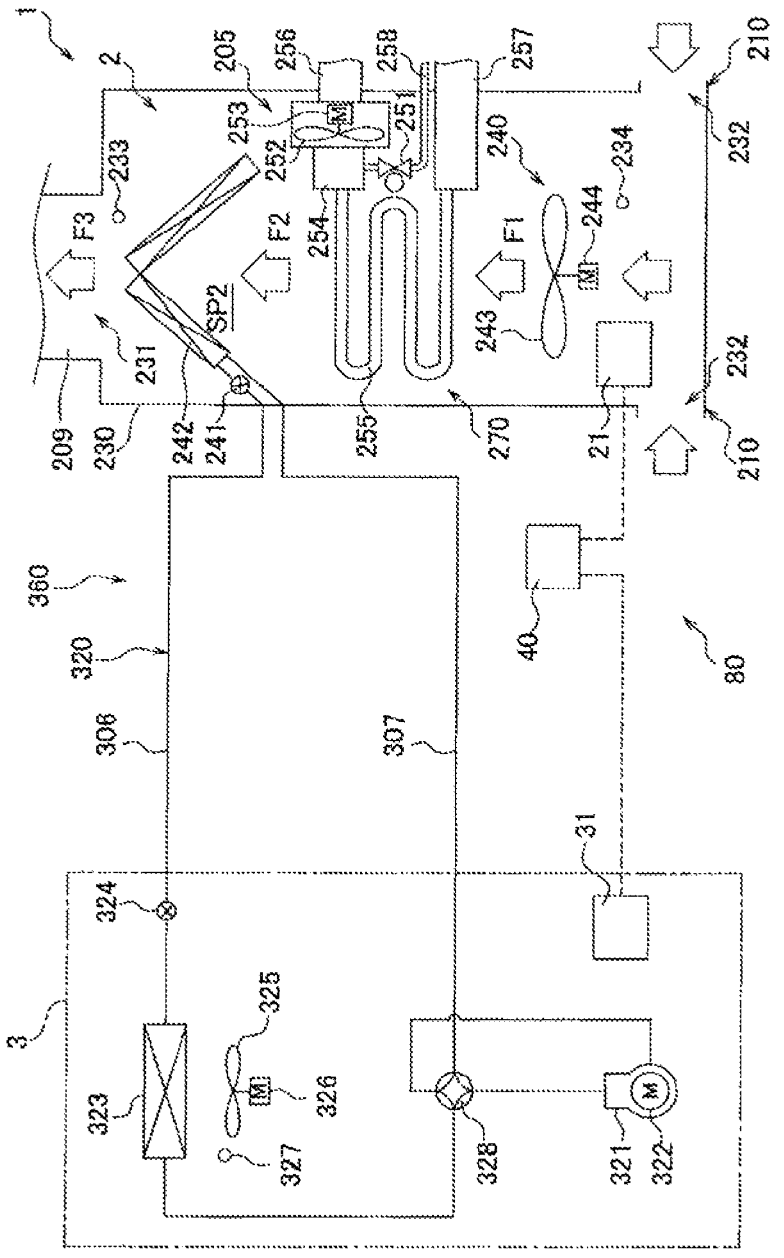

FIG. 17B is a schematic configuration diagram of the air conditioning device of the technology of the seventeenth group.

Figure 17C:
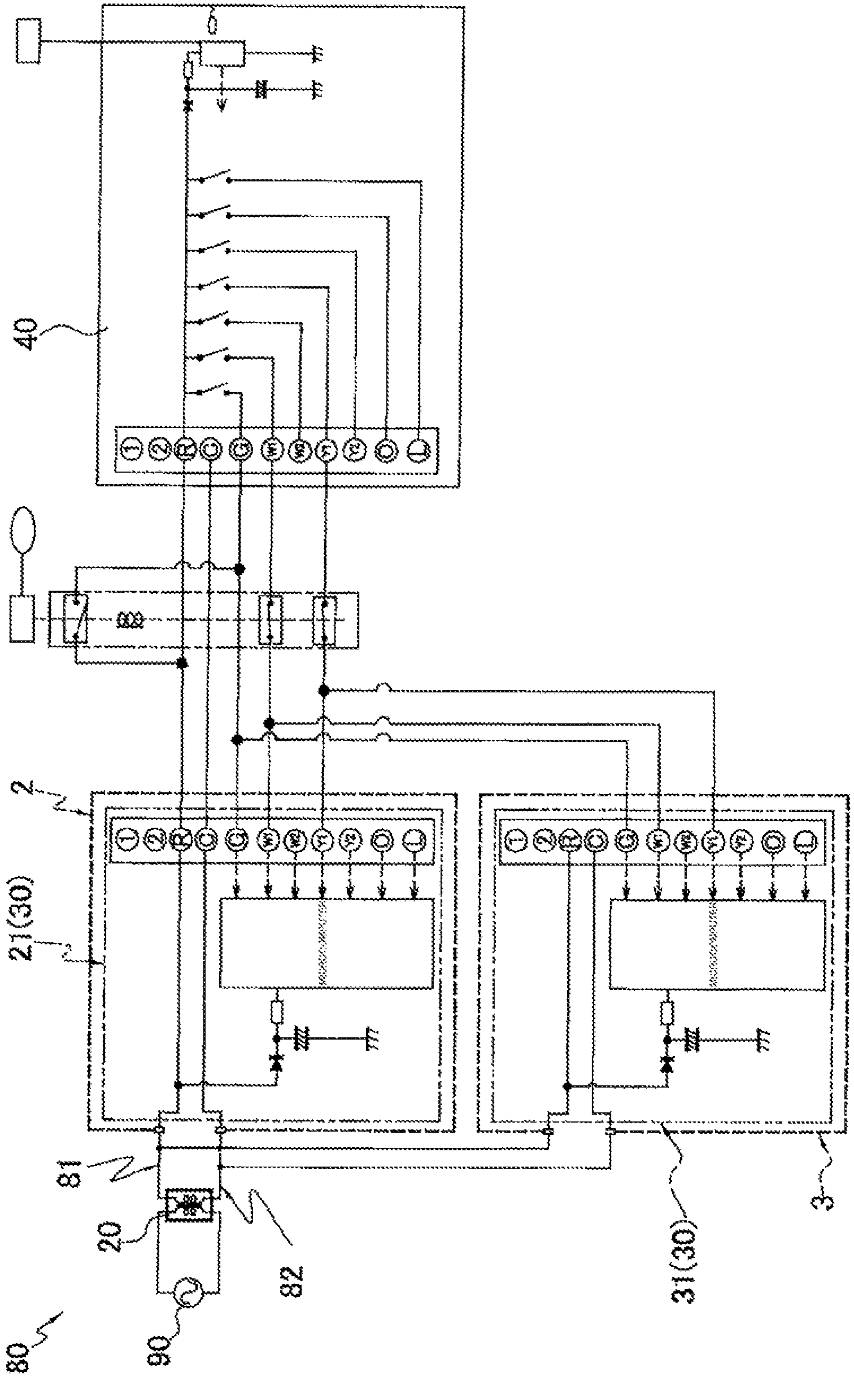

FIG. 17C is a block diagram showing the state of electrical connection of a controller and a thermostat in an air conditioning system according to the first embodiment of the technology of the seventeenth group.

Figure 17D:
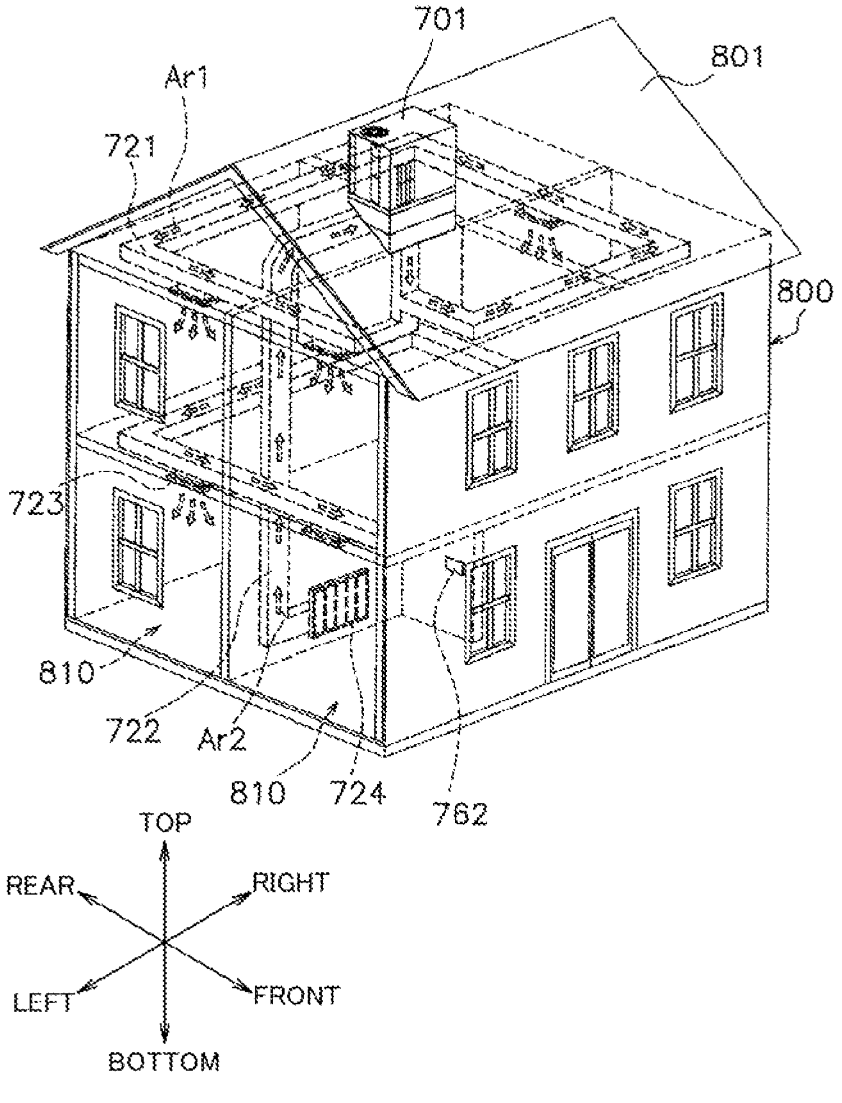

FIG. 17D is a perspective view showing the state of installation of an air conditioning machine according to a second embodiment of the technology of the seventeenth group into a building.

Figure 17E:
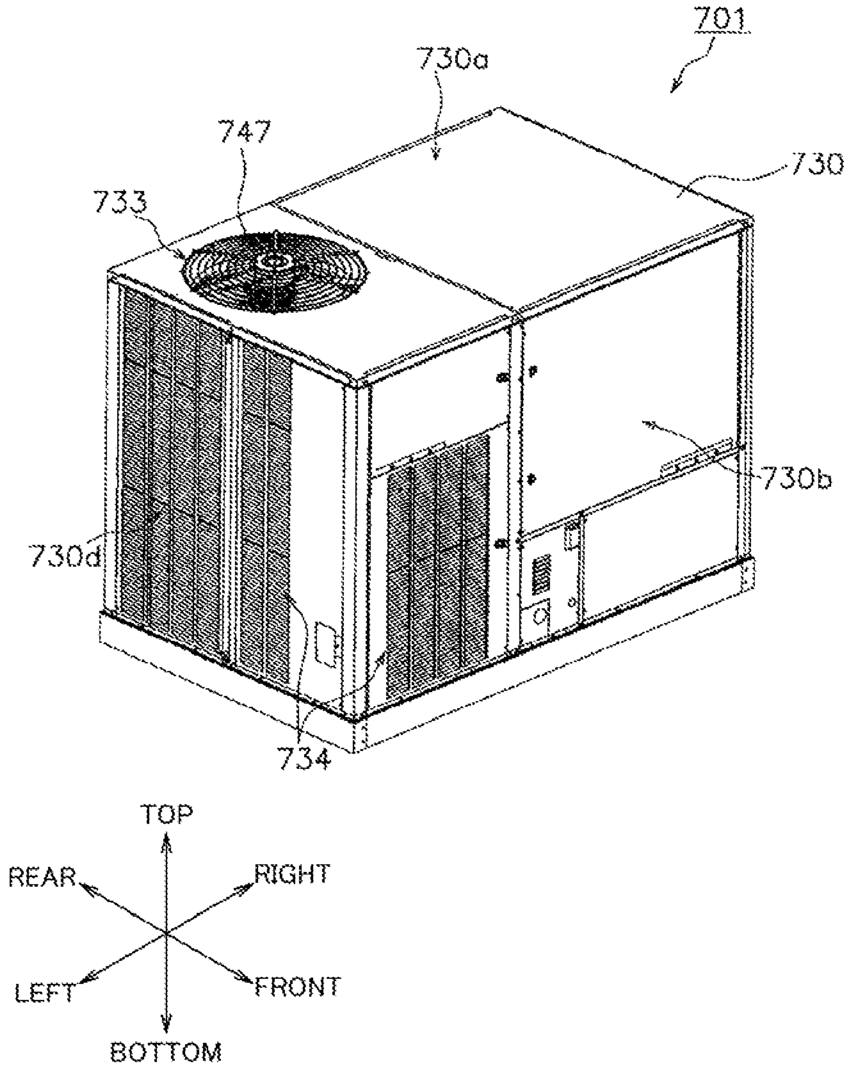

FIG. 17E is a perspective view showing the appearance of the air conditioning machine of the technology of the seventeenth group.

Figure 17F:
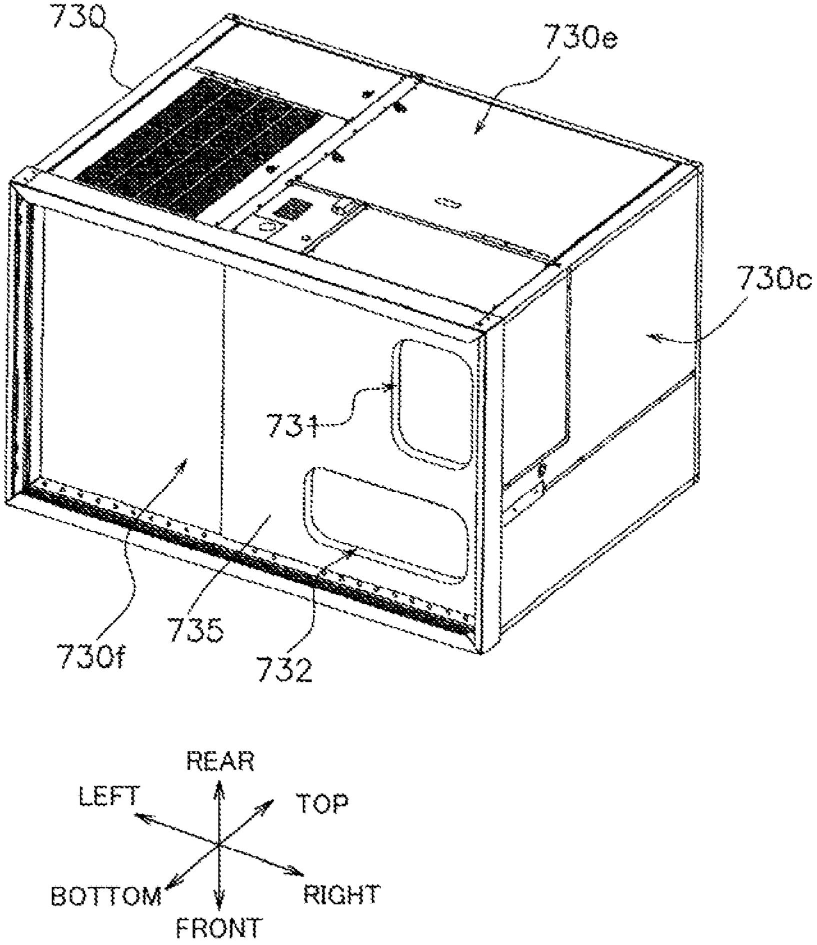

FIG. 17F is a perspective view showing the appearance of the air conditioning machine of the technology of the seventeenth group.

Figure 17G:
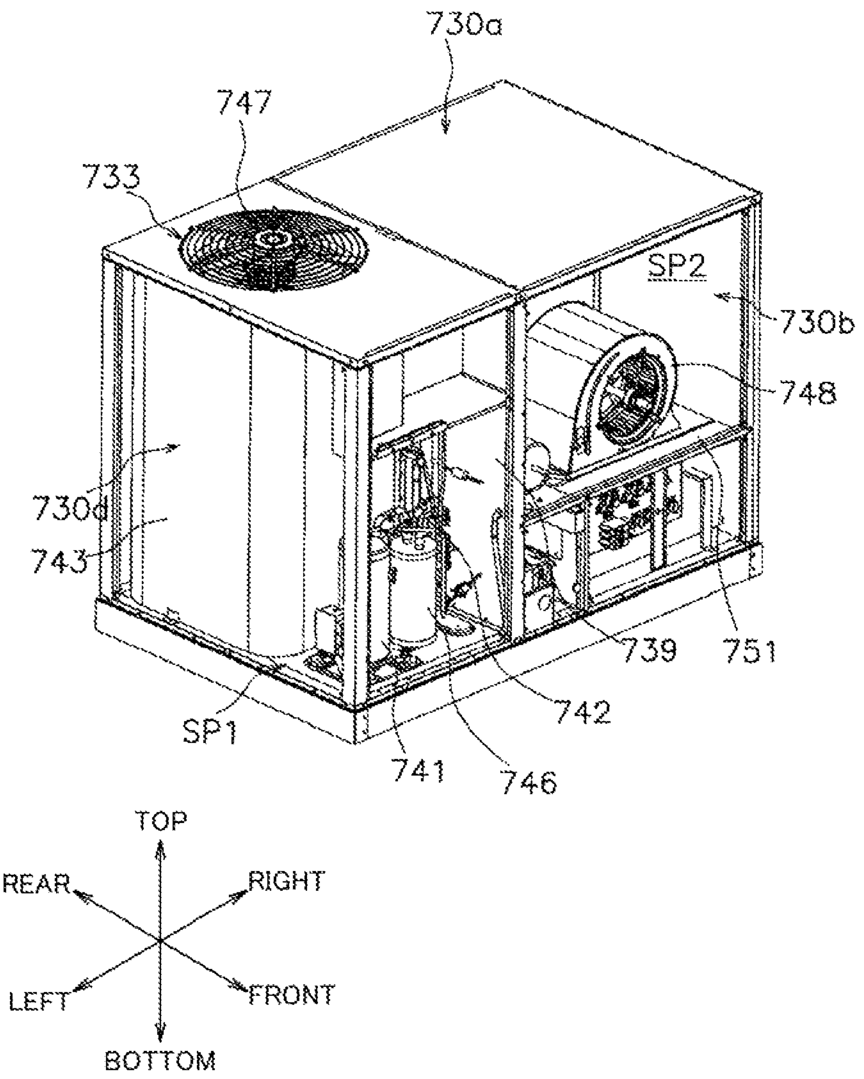

FIG. 17G is a perspective view for describing the internal configuration of the air conditioning machine of the technology of the seventeenth group.

Figure 17H:
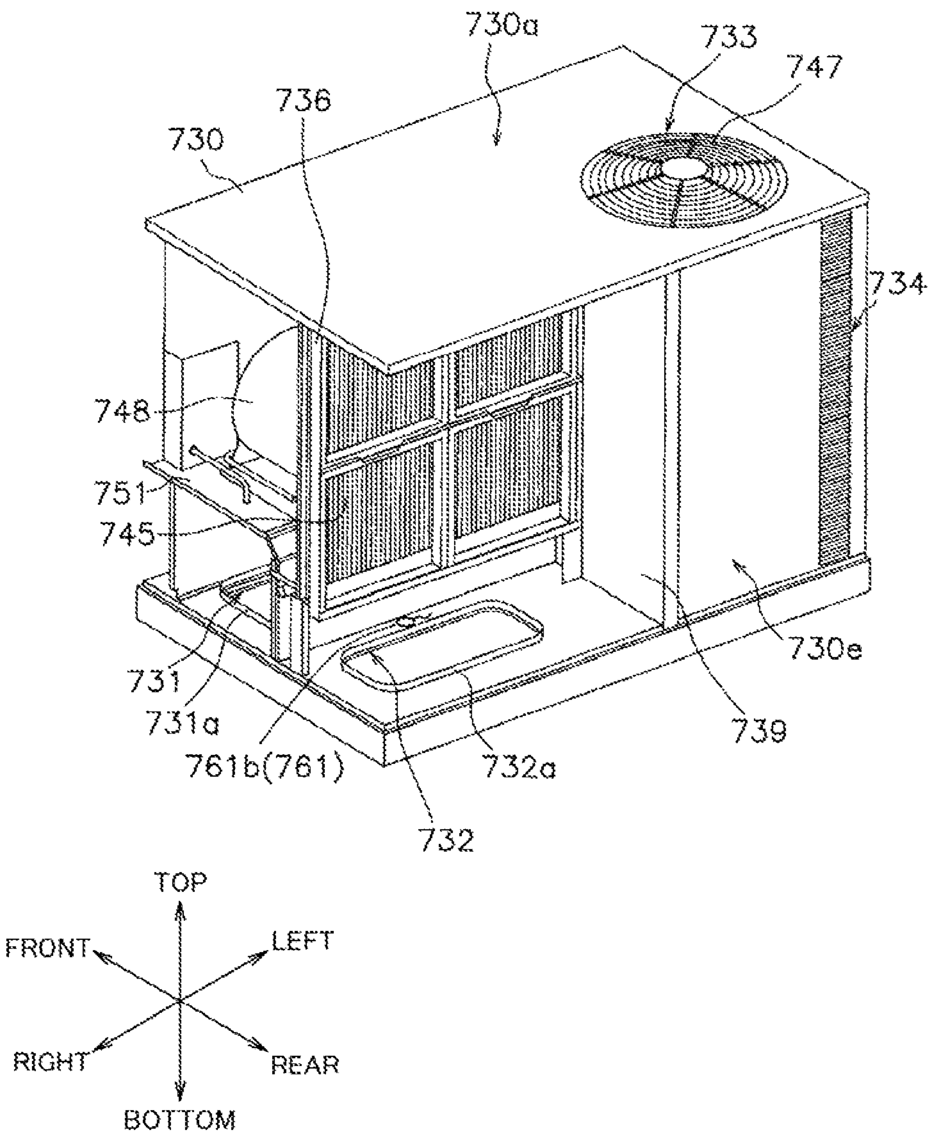

FIG. 17H is a perspective view for describing the internal configuration of the air conditioning machine of the technology of the seventeenth group.

Figure 17I:
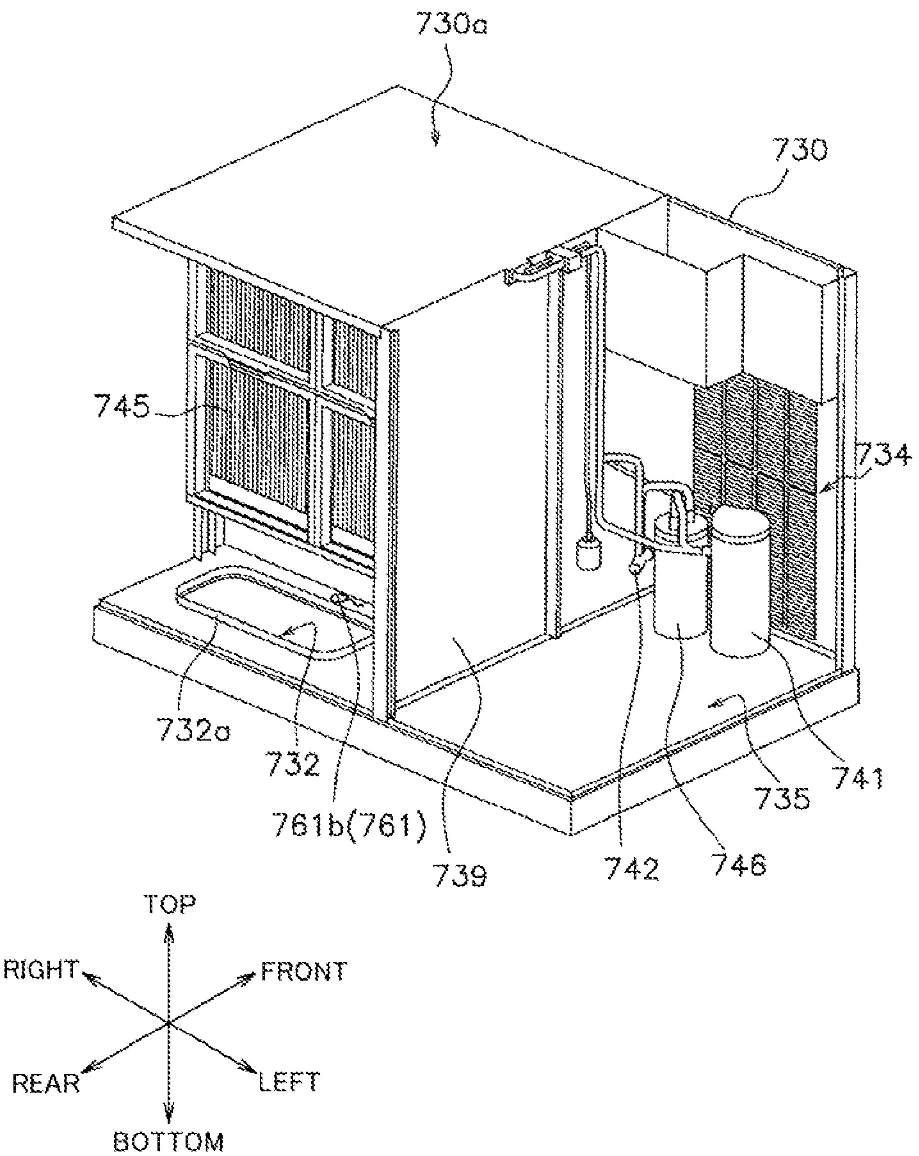

FIG. 17I is a perspective view for describing the internal configuration of the air conditioning machine of the technology of the seventeenth group.

Figure 17J:
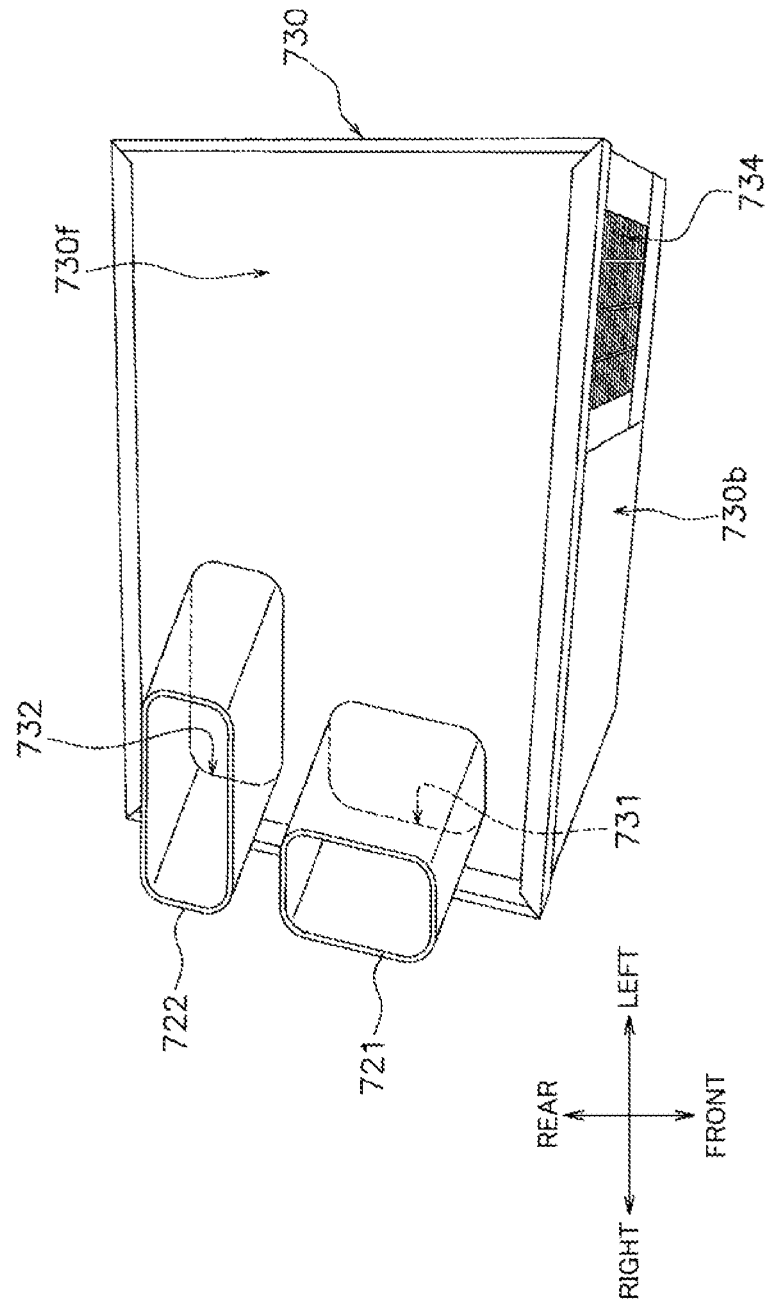

FIG. 17J is a perspective view for describing a duct of the air conditioning machine of the technology of the seventeenth group.

Figure 17K:
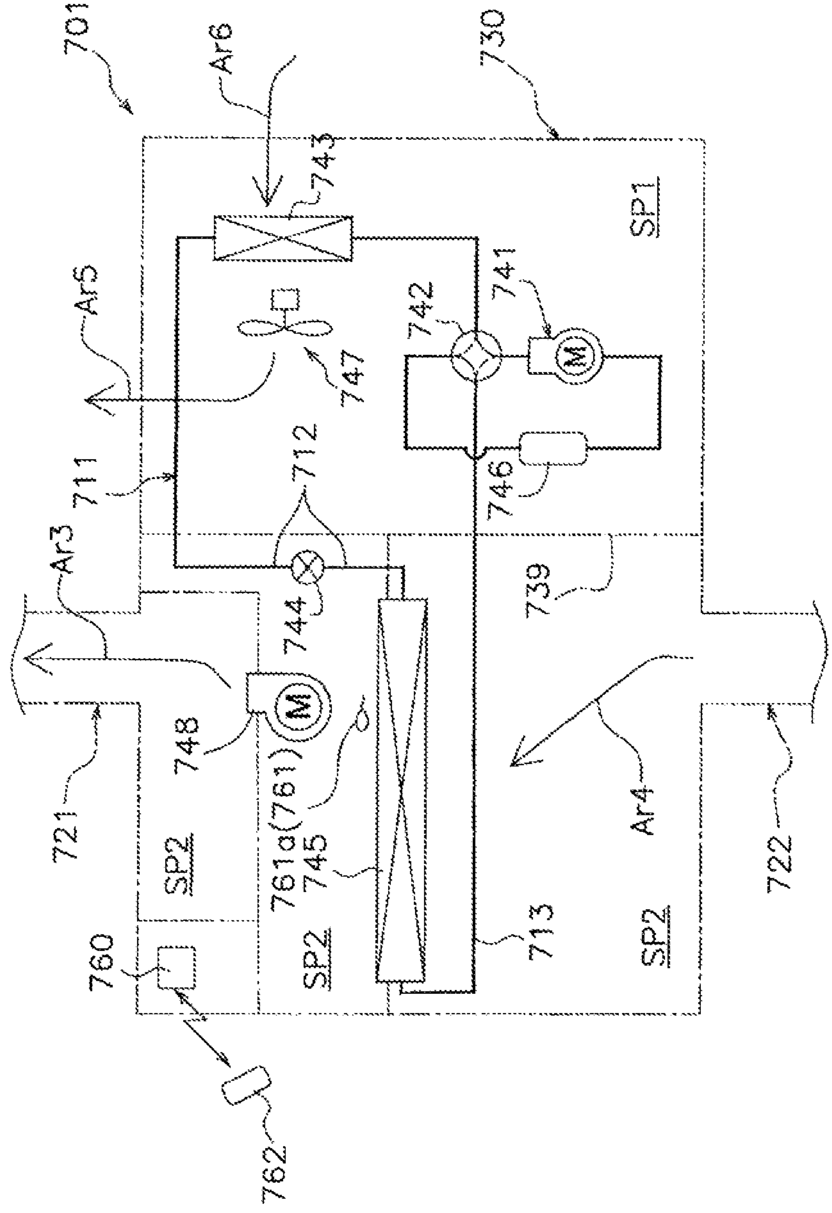

FIG. 17K is a diagram for describing a refrigerant circuit of an air conditioning machine according to a second embodiment of the technology of the seventeenth group.

Figure 17L:
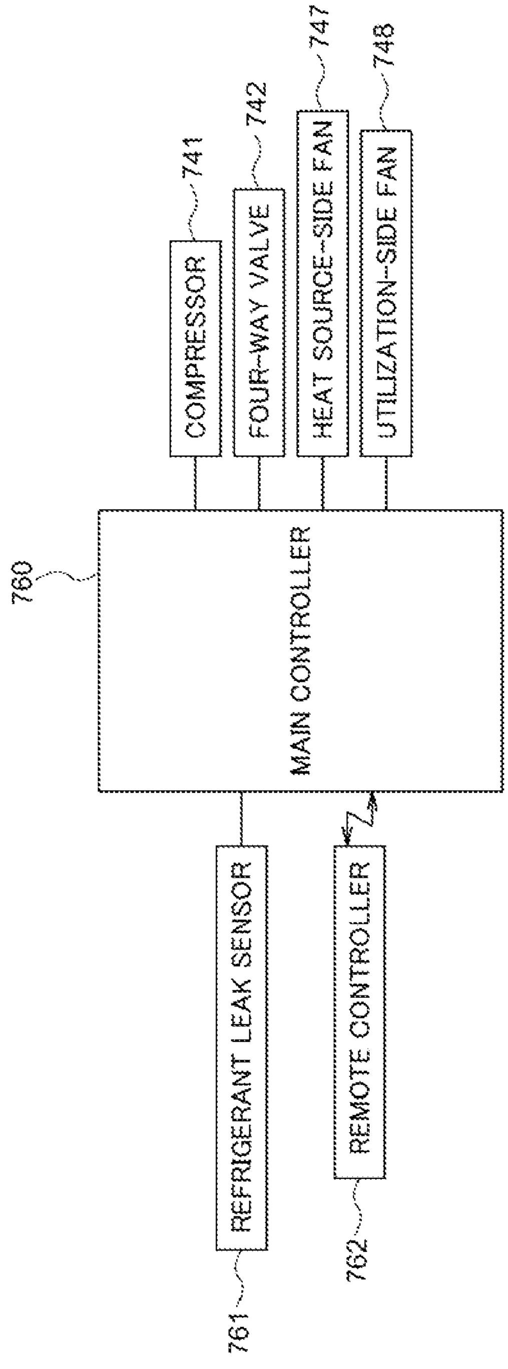

FIG. 17L is a block diagram for describing a control system of the air conditioning machine according to the second embodiment of the technology of the seventeenth group.

Figure 17M:
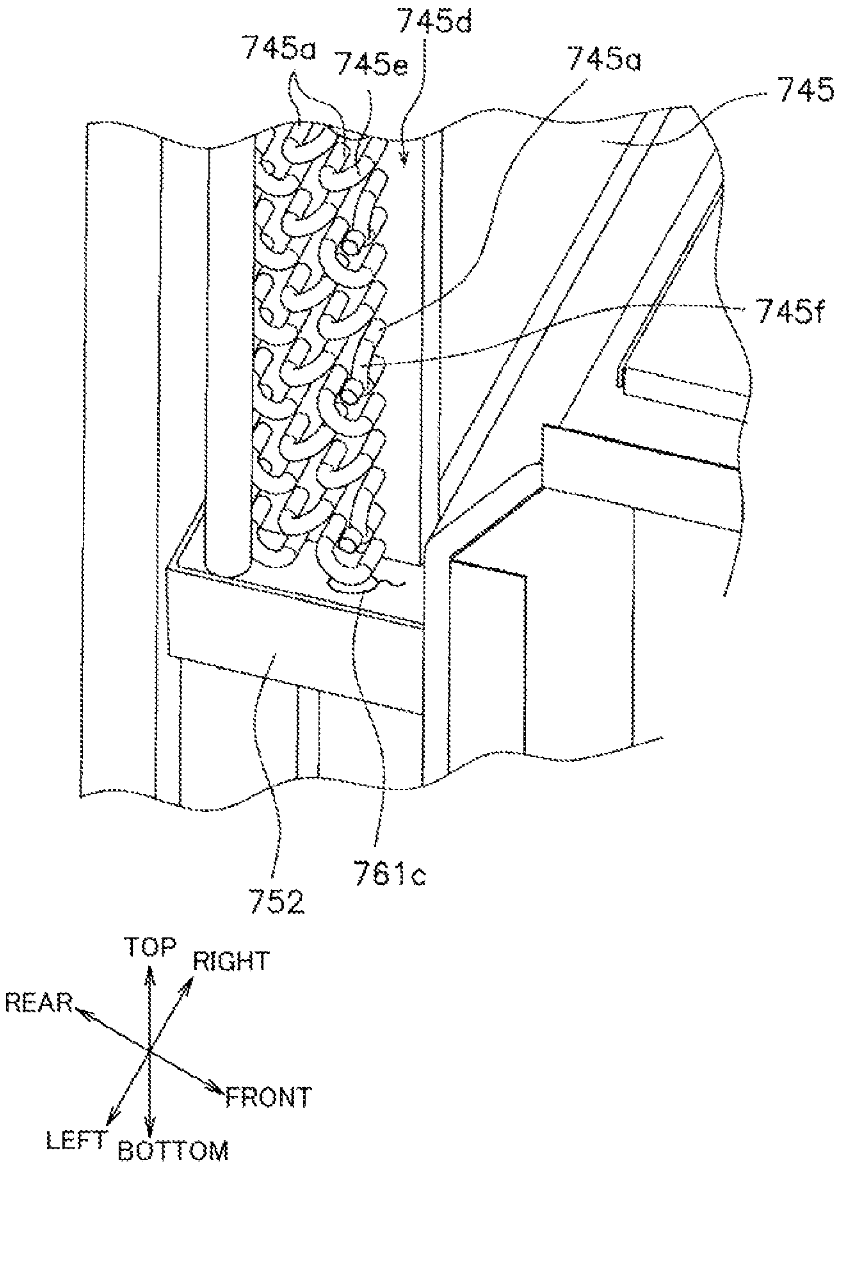

FIG. 17M is a partially enlarged perspective view of an enlarged periphery of the left side of a utilization-side heat exchanger of the technology of the seventeenth group.

Figure 17N:
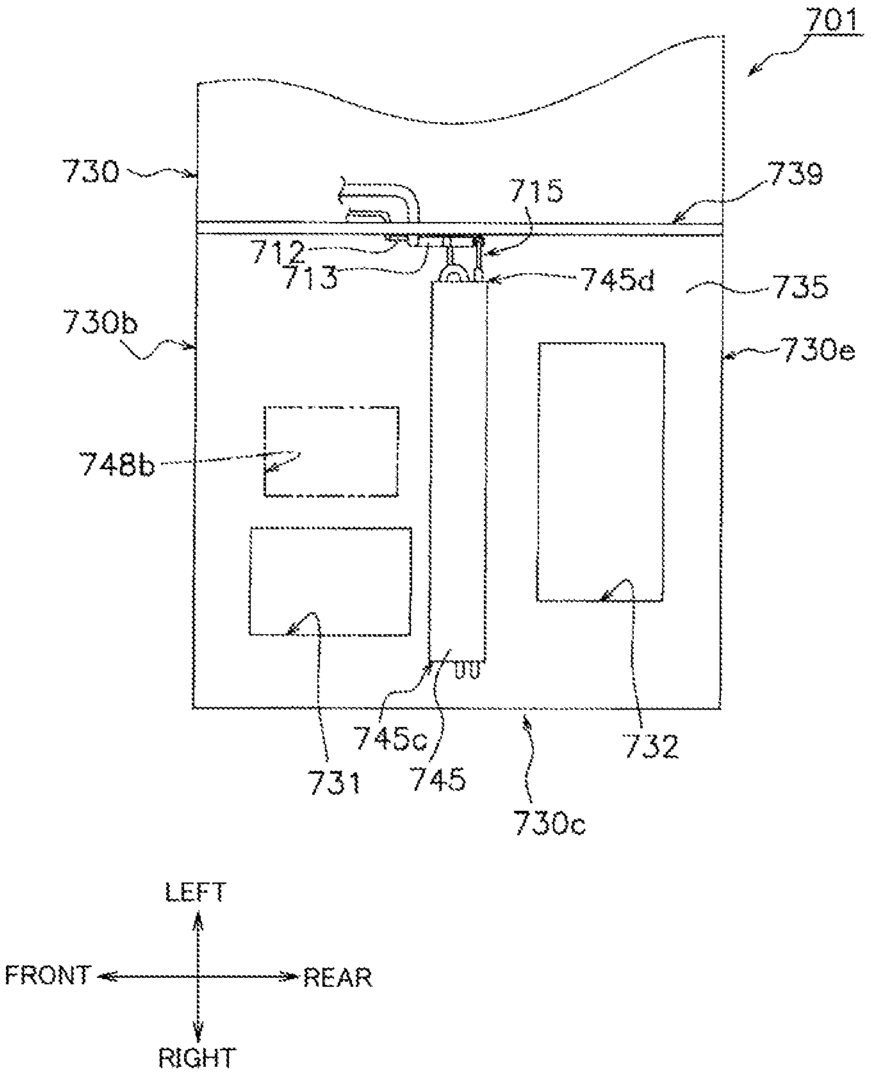
Figure 170:
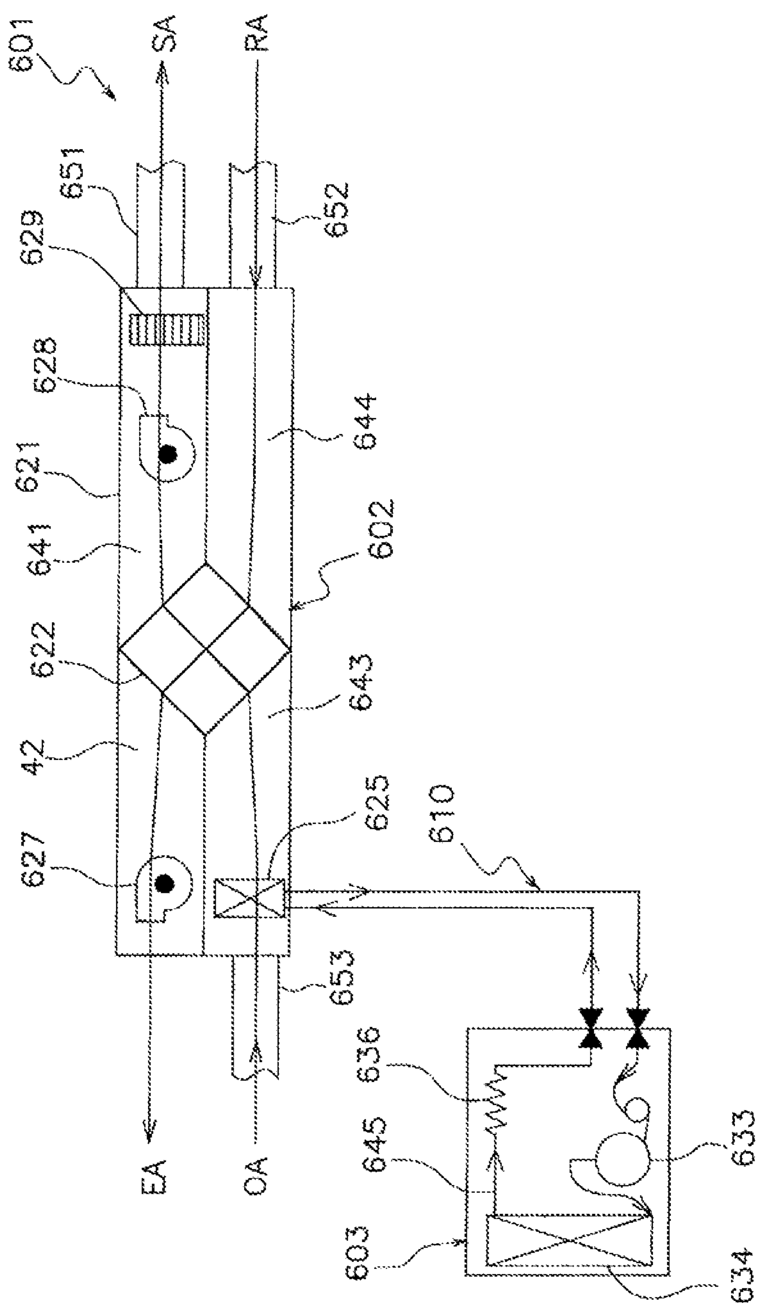

FIG. 17N is a schematic diagram for describing the positional relationship among a first opening, a second opening, and each member of the technology of the seventeenth group.

FIG. 17O is a schematic diagram showing the configuration of an air conditioning device according to a third embodiment of the technology of the seventeenth group.

Figure 18A:
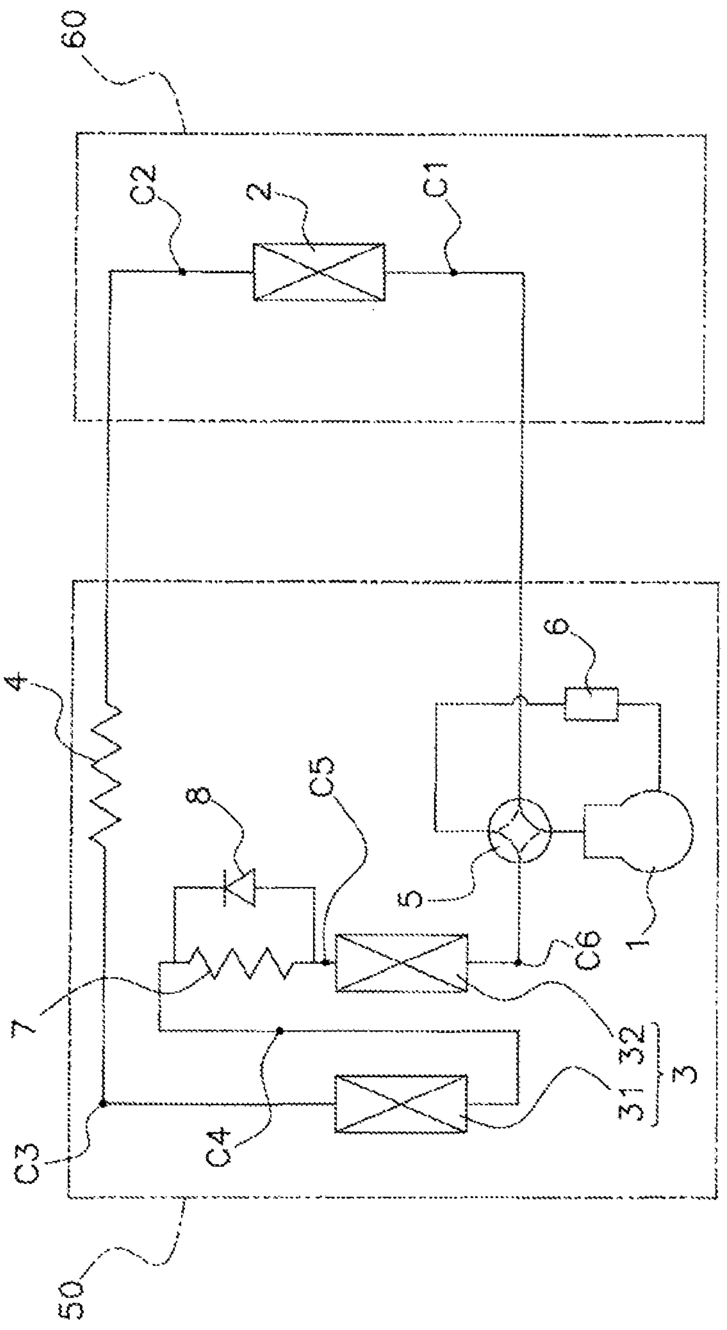

FIG. 18A is a refrigerant circuit diagram showing a refrigeration cycle according to a first embodiment of the technology of an eighteenth group.

Figure 18B:
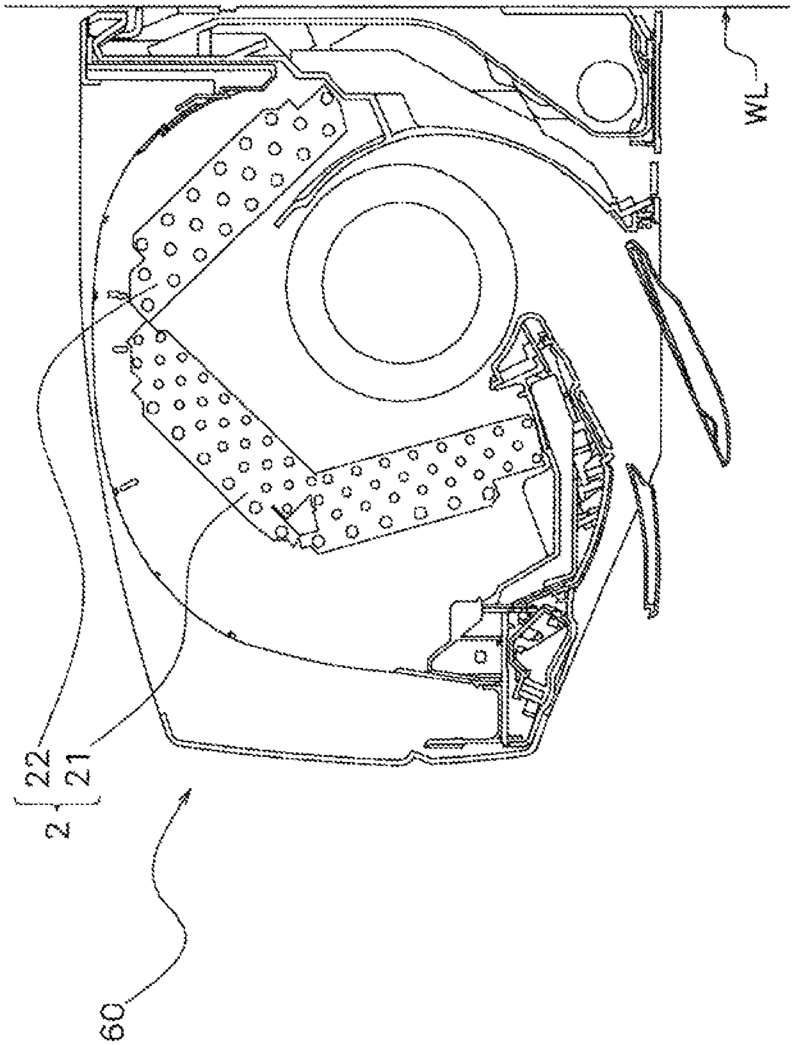

FIG. 18B is a longitudinal section of a utilization unit of the technology of the eighteenth group.

Figure 18C:
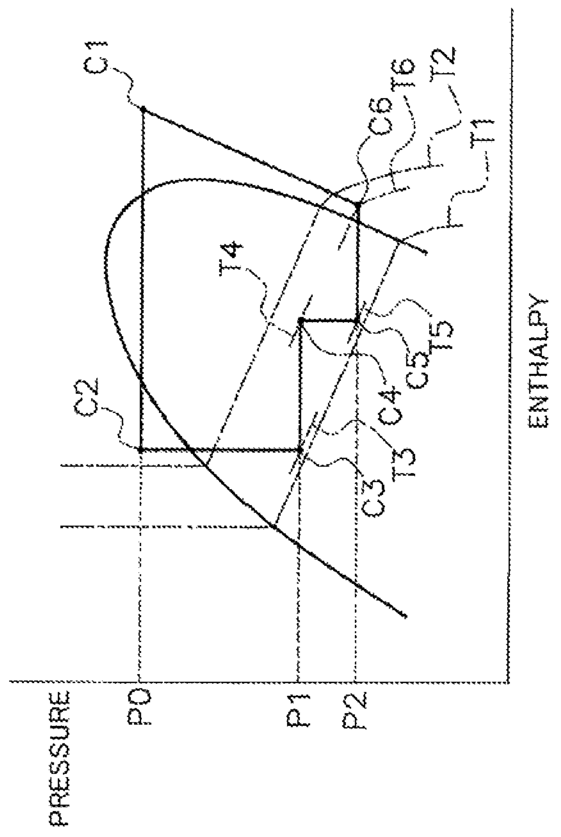

FIG. 18C is a Mollier chart showing the state of operation of the refrigeration cycle according to the first embodiment of the technology of the eighteenth group.

Figure 18D:
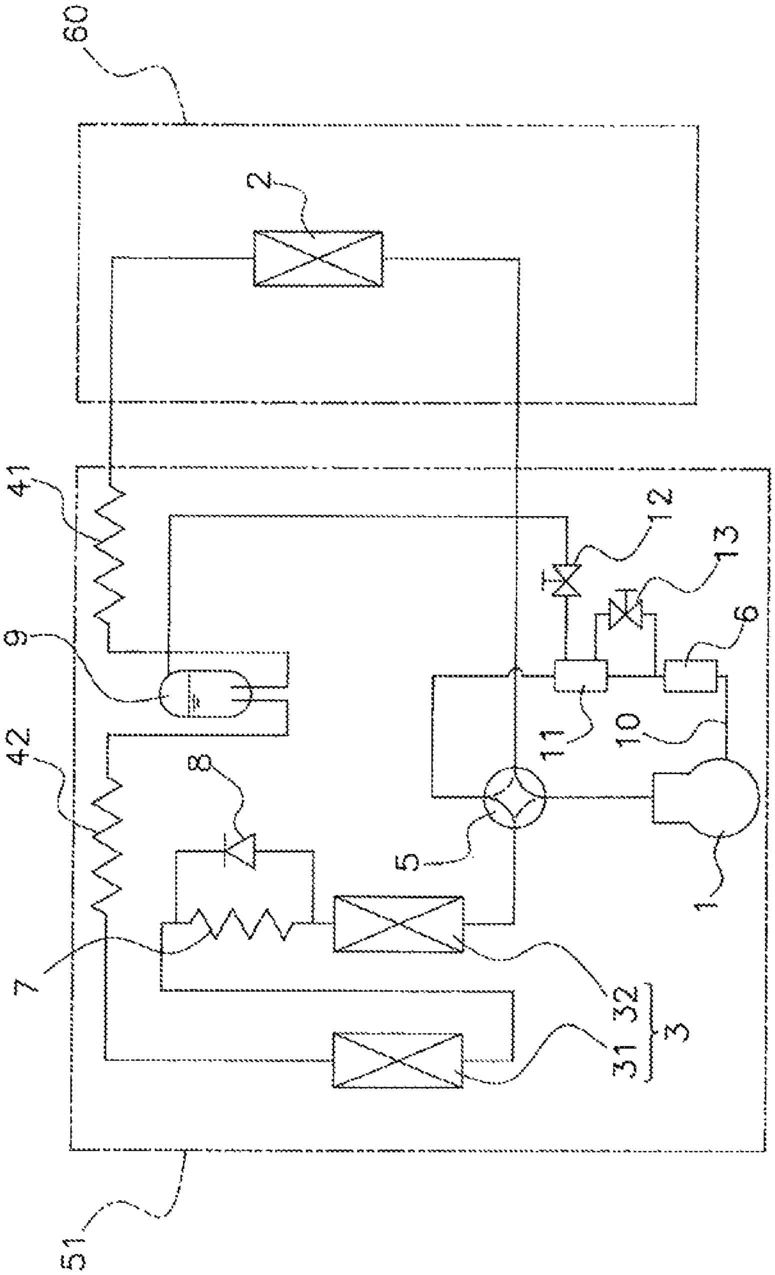

FIG. 18D is a refrigerant circuit diagram showing a refrigeration cycle according to a second embodiment of the technology of the eighteenth group.

Figure 19A:
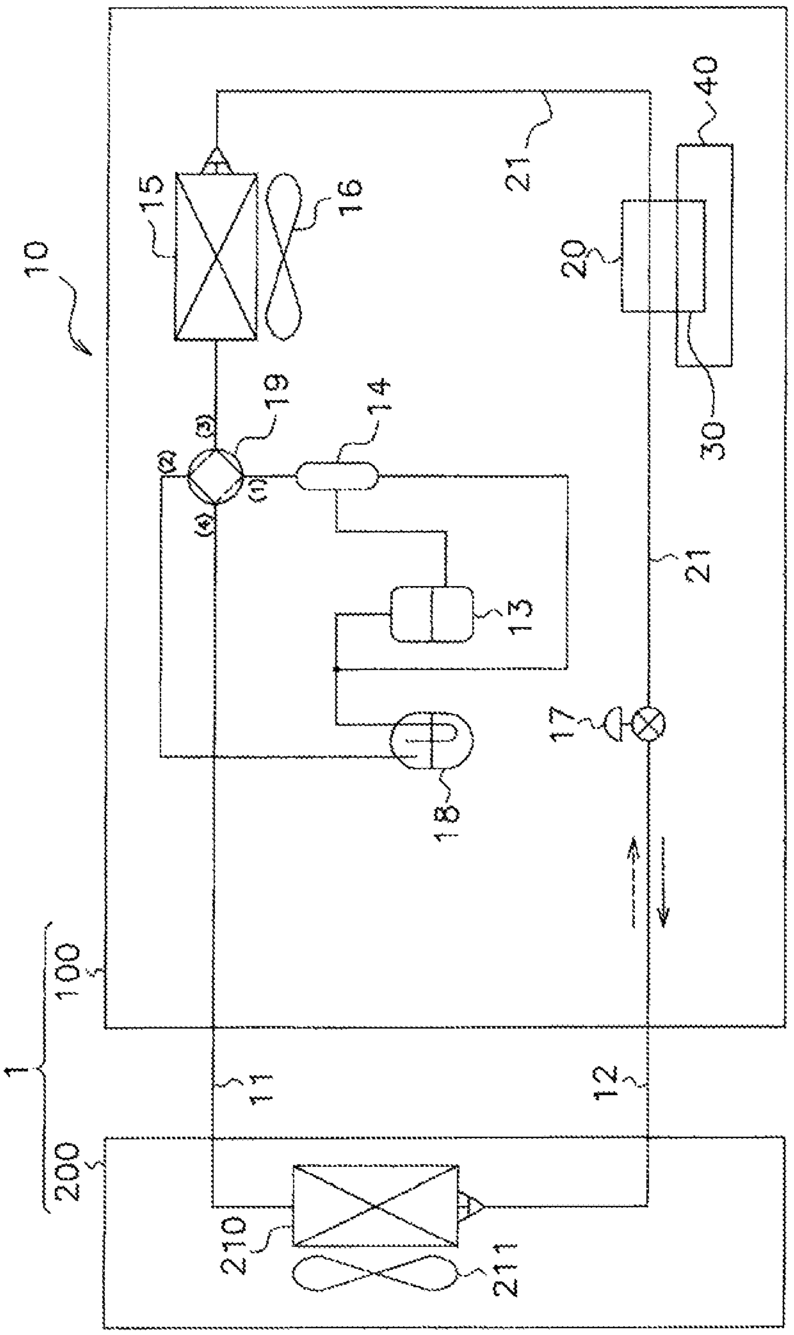

FIG. 19A is a piping system diagram of a refrigerant circuit 10 of an air conditioning machine 1 according to a first embodiment of the technology of a nineteenth group.

Figure 19B:
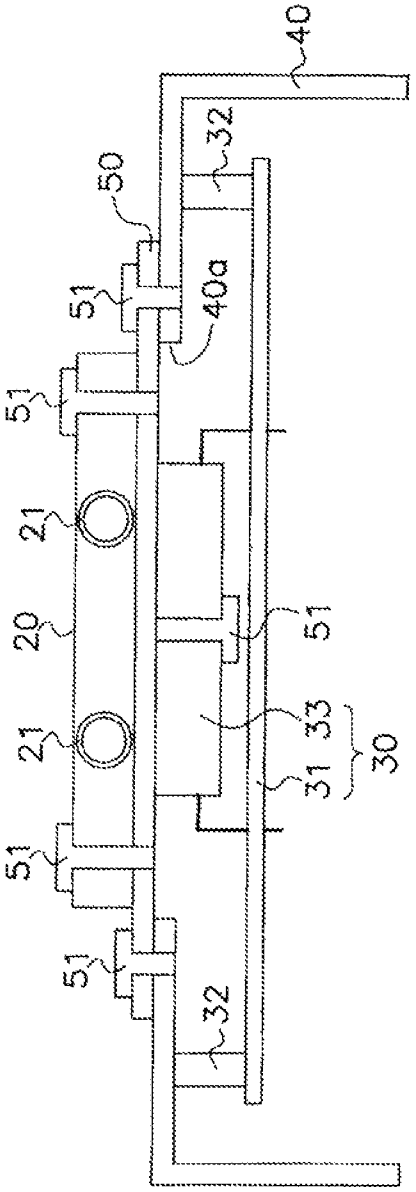

FIG. 19B is a diagram showing the mounting structure of a power element 33, a refrigerant jacket 20, and a heat transfer plate 50 in the first embodiment of the technology of the nineteenth group.

Figure 19C:
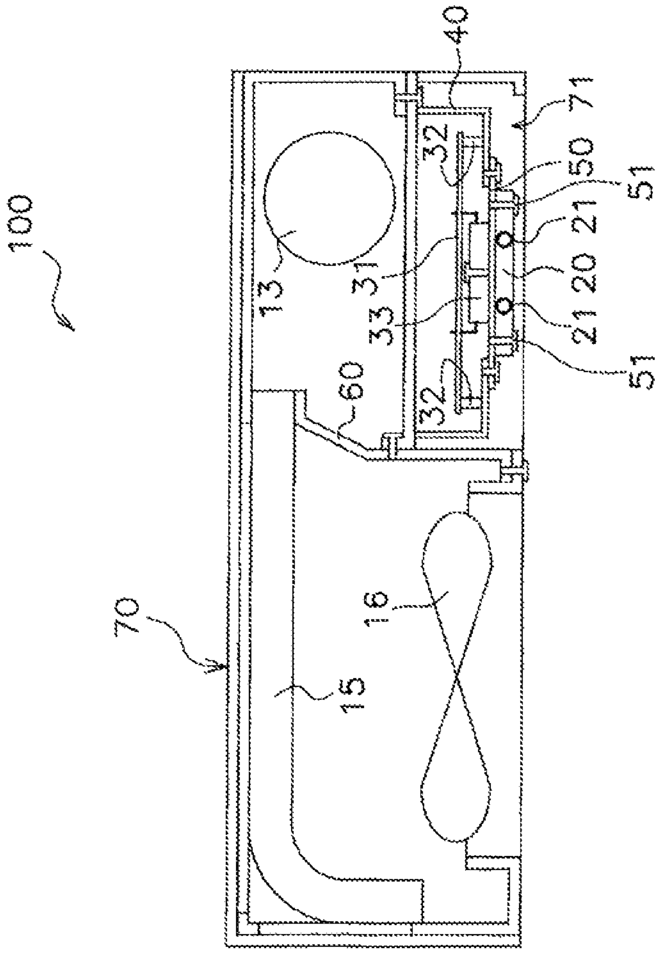

FIG. 19C is a diagram schematically showing the transverse sectional shape of an outdoor machine 100 in the first embodiment of the technology of the nineteenth group.

Figure 19D:
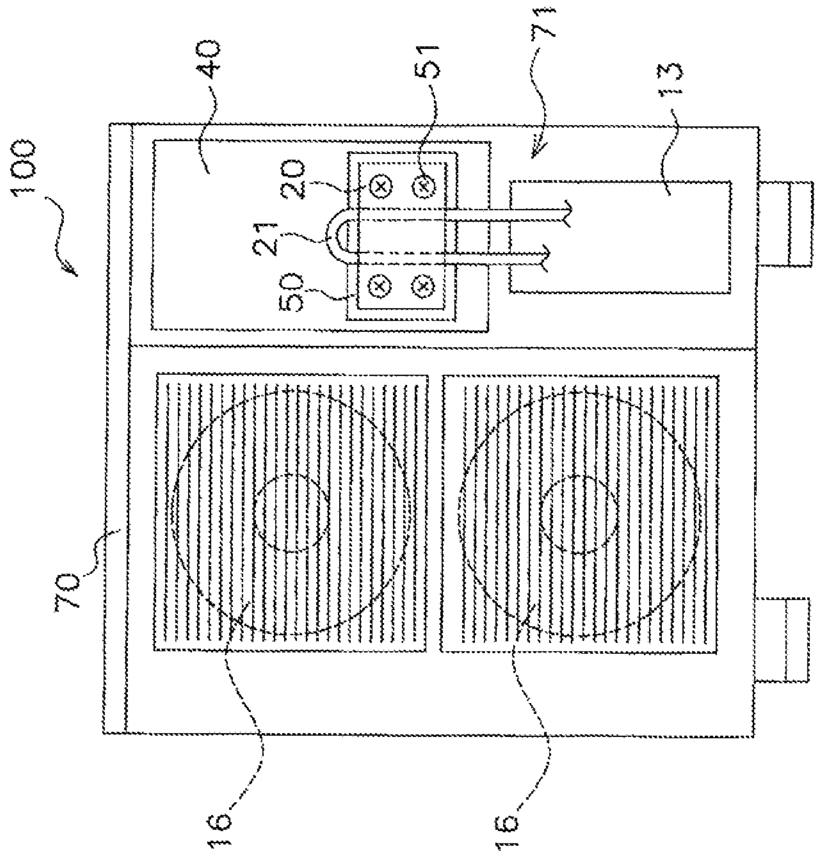

FIG. 19D is a front view of the outdoor machine 100 in the first embodiment of the technology of the nineteenth group.

Figure 19E:
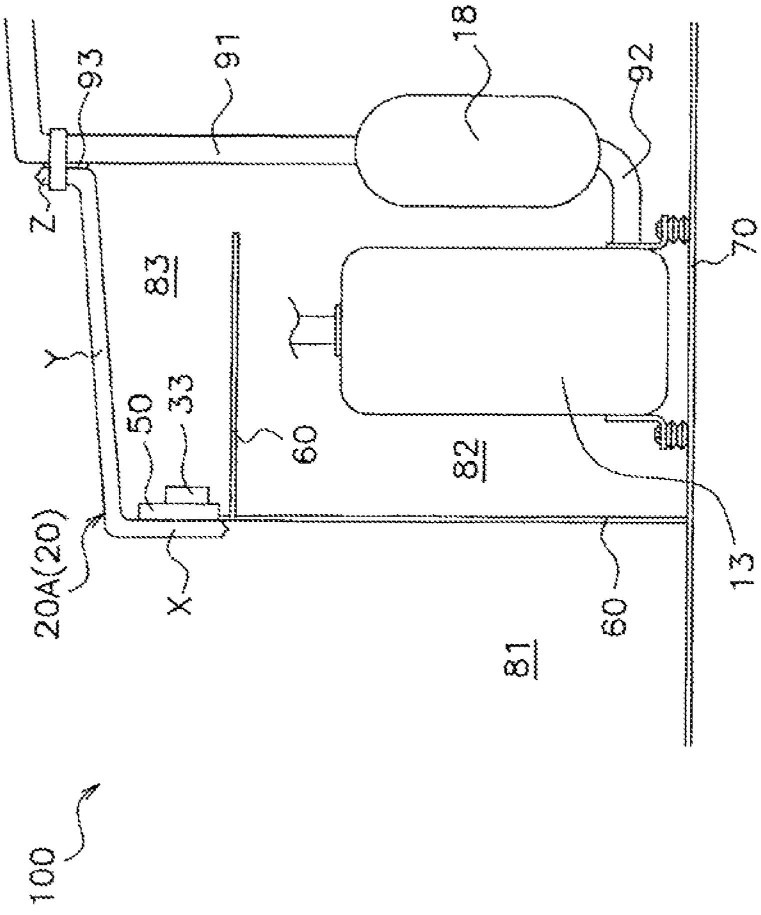

FIG. 19E is a schematic diagram of a main section side of an outdoor machine 100 of an air conditioning machine 1 according to a second embodiment of the technology of the nineteenth group.

Figure 20A:
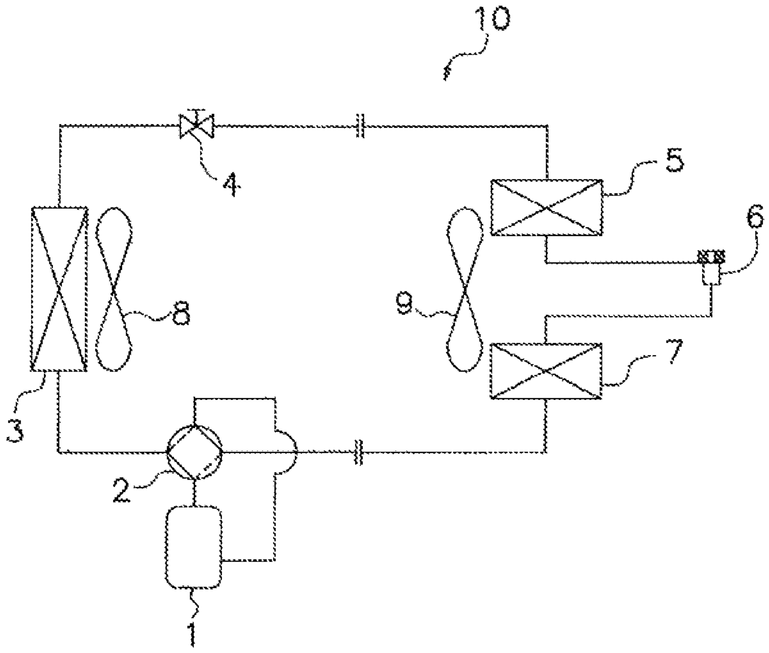

FIG. 20A is a circuit diagram of an air conditioning machine according to an embodiment of the technology of a twentieth group.

Figure 20B:
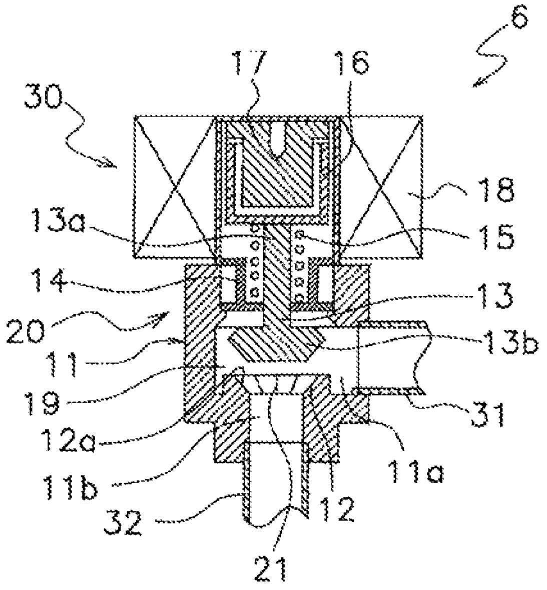

FIG. 20B is a cross section showing the configuration of a solenoid valve for dehumidification according to an embodiment of the technology of the twentieth group.

Figure 20C:
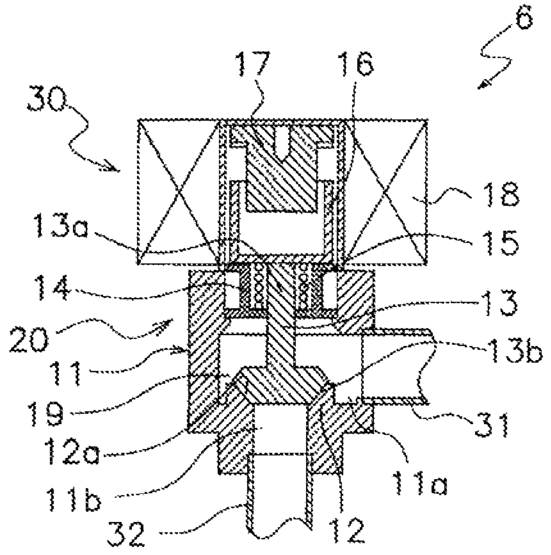

FIG. 20C is a cross section showing the configuration of a solenoid valve for dehumidification according to an embodiment of the technology of the twentieth group.

Figure 20D:
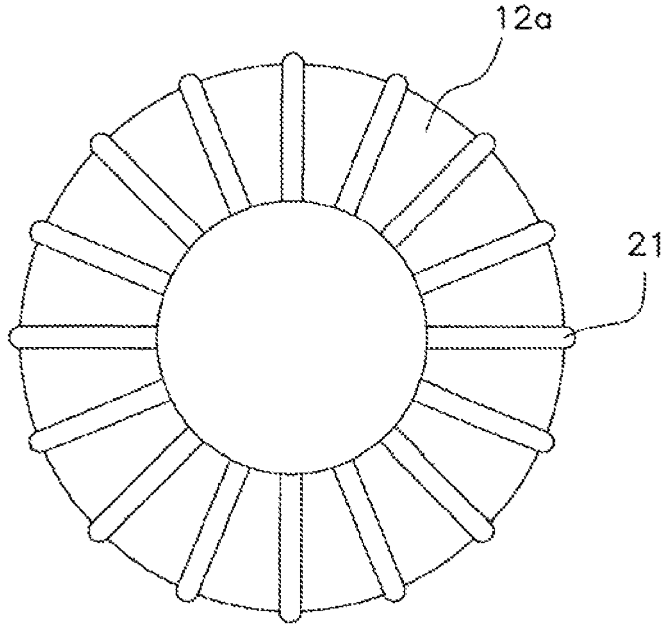

FIG. 20D is a diagram showing the configuration of a tapered face of a valve seat of a solenoid valve for dehumidification in an embodiment of the technology of the twentieth group.

Figure 21A:
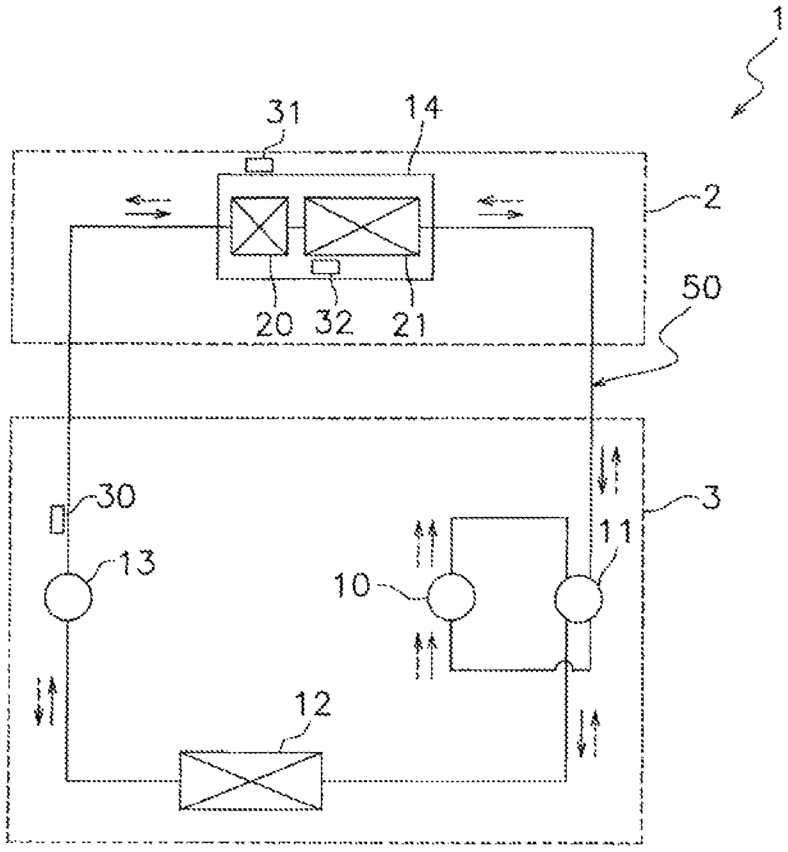

FIG. 21A is a circuit diagram showing a refrigerant circuit of an air conditioning machine according to an embodiment of the technology of a twenty-first group.

Figure 21B:
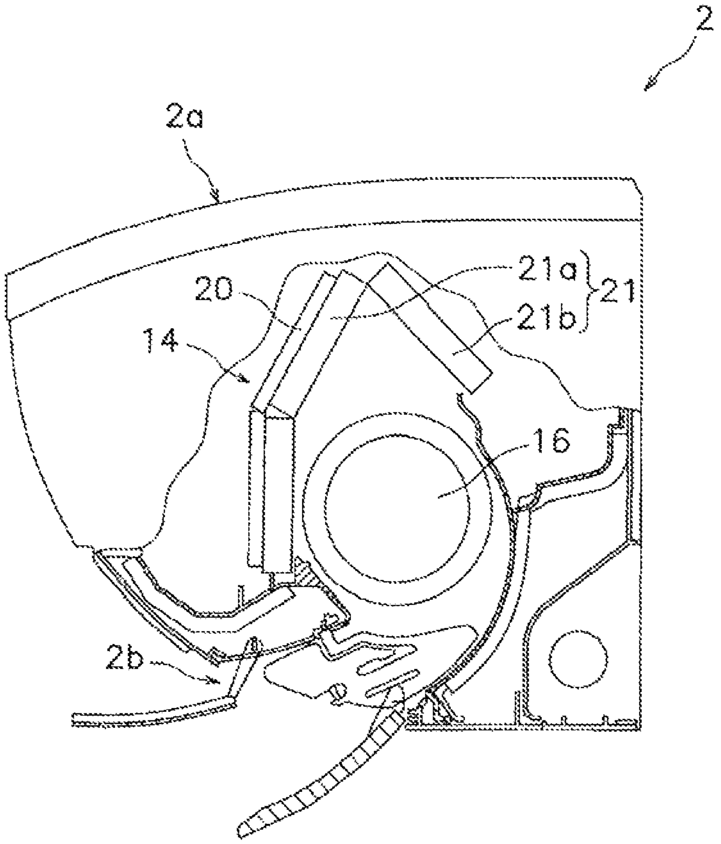

FIG. 21B is a schematic cross section of an indoor machine of an air conditioning machine according to an embodiment of the technology of the twenty-first group.

Figure 21C:
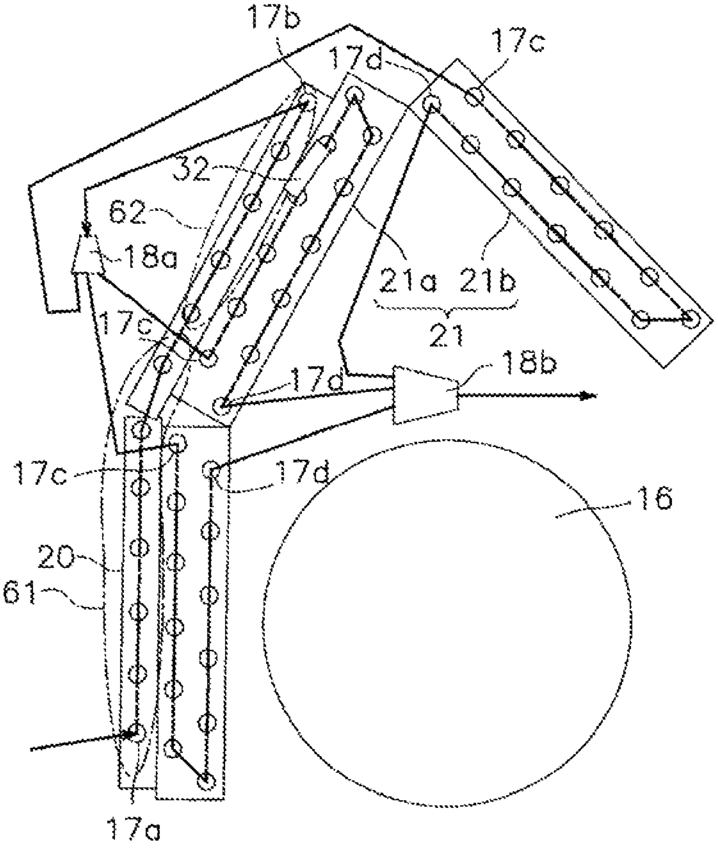

FIG. 21C is a diagram describing the configuration of an indoor heat exchanger in an embodiment of the technology of the twenty-first group.

Figure 21D:
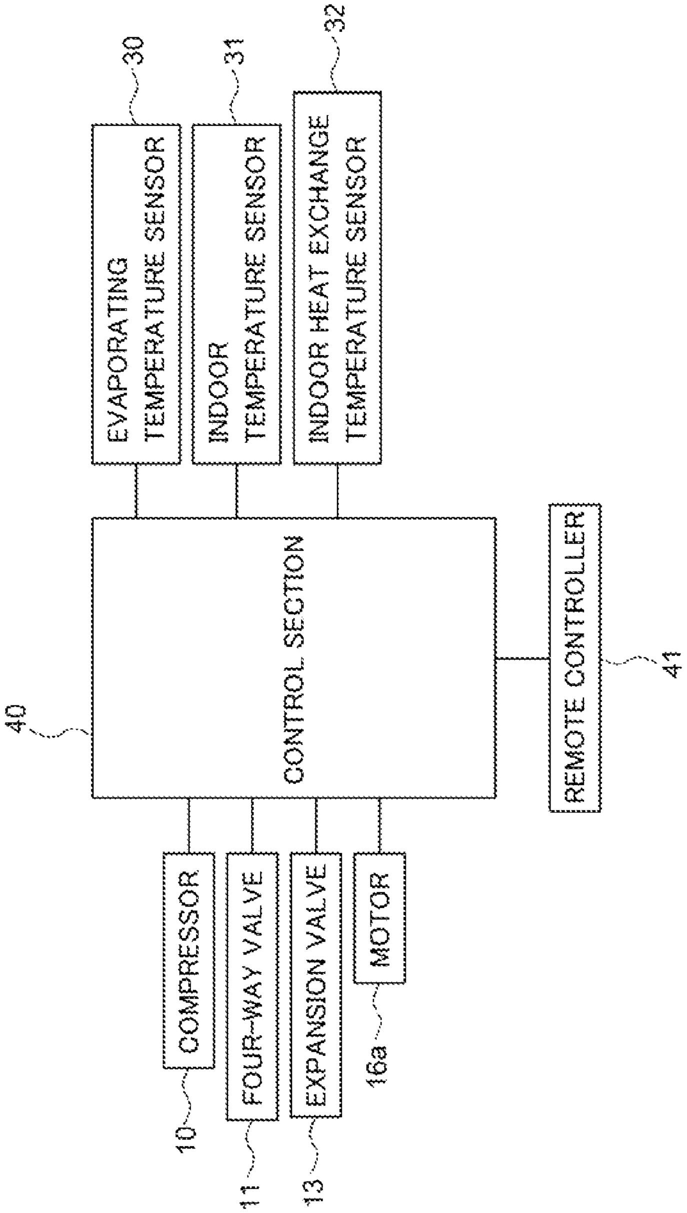

FIG. 21D is a diagram describing a control section of an air conditioning machine according to an embodiment of the technology of the twenty-first group.

Figure 21E:
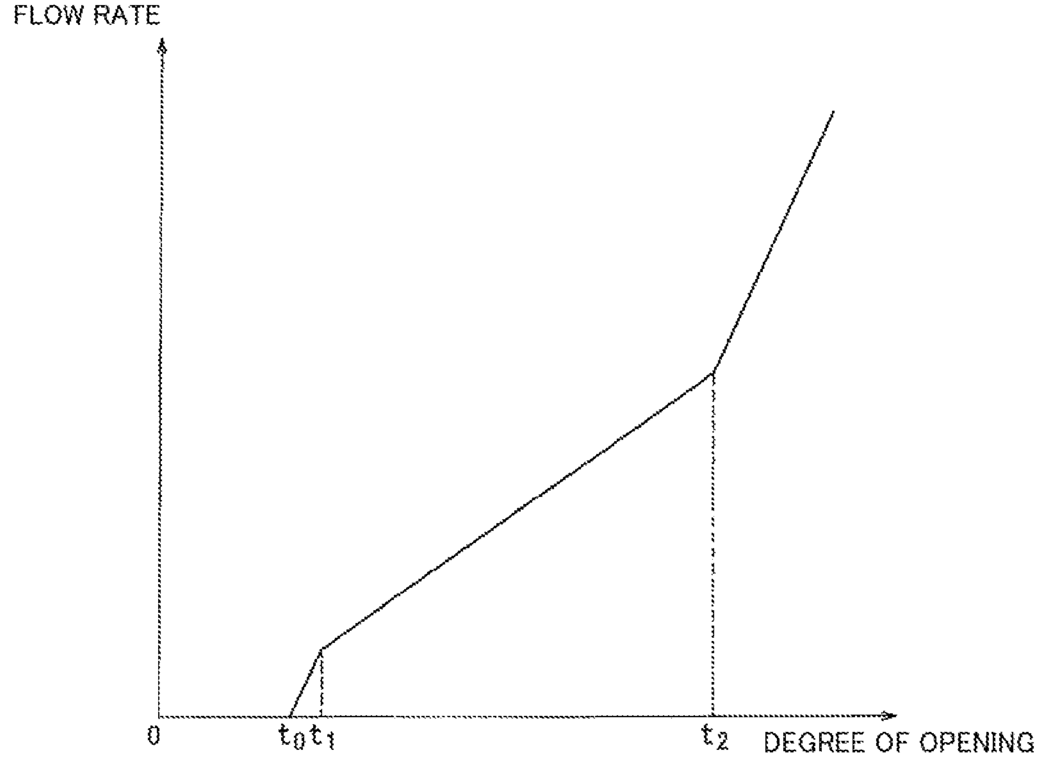

FIG. 21E shows one example of flow rate change when the degree of opening is changed in an expansion valve in an embodiment of the technology of the twenty-first group.

Figure 21F:
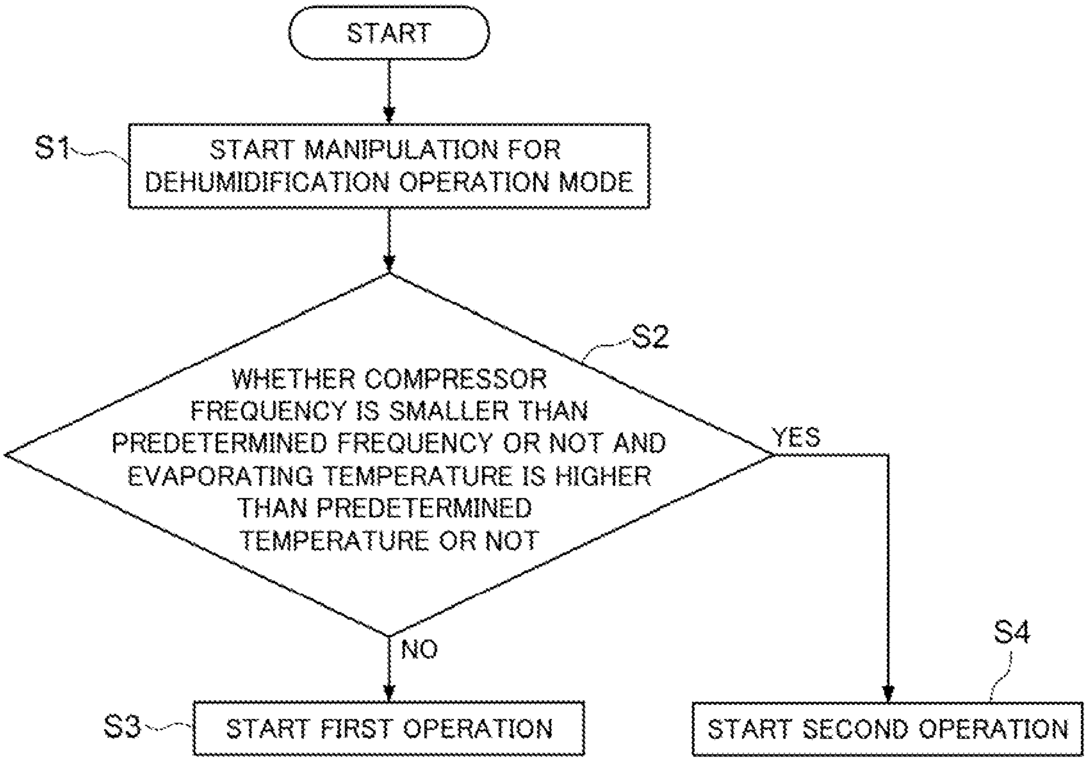

FIG. 21F is a diagram describing the motion of an air conditioning machine according to an embodiment of the technology of the twenty-first group.

Figure 22A:
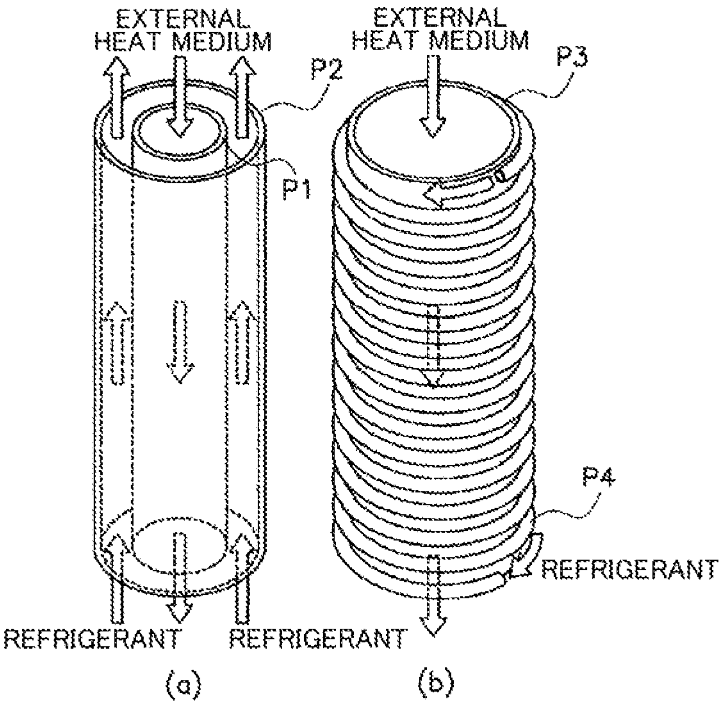

FIG. 22A is a schematic diagram showing one example of a counter flow heat exchanger according to an embodiment of the technology of a twenty-second group.

Figure 22B:
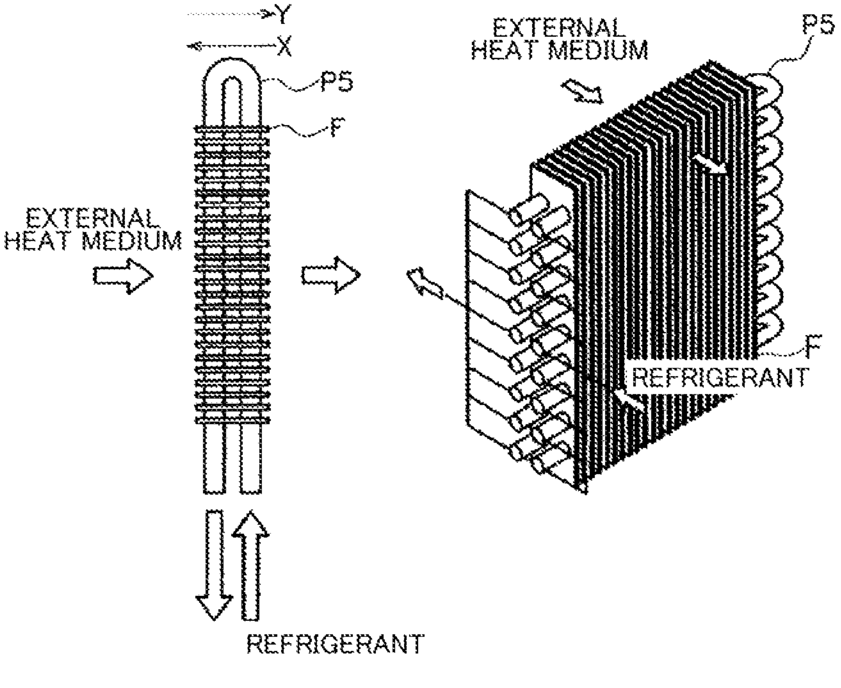

FIG. 22B is a schematic diagram showing another example of a counter flow heat exchanger according to an embodiment of the technology of the twenty-second group, where (a) is a plan view and (b) is a perspective view.

Figure 22C:
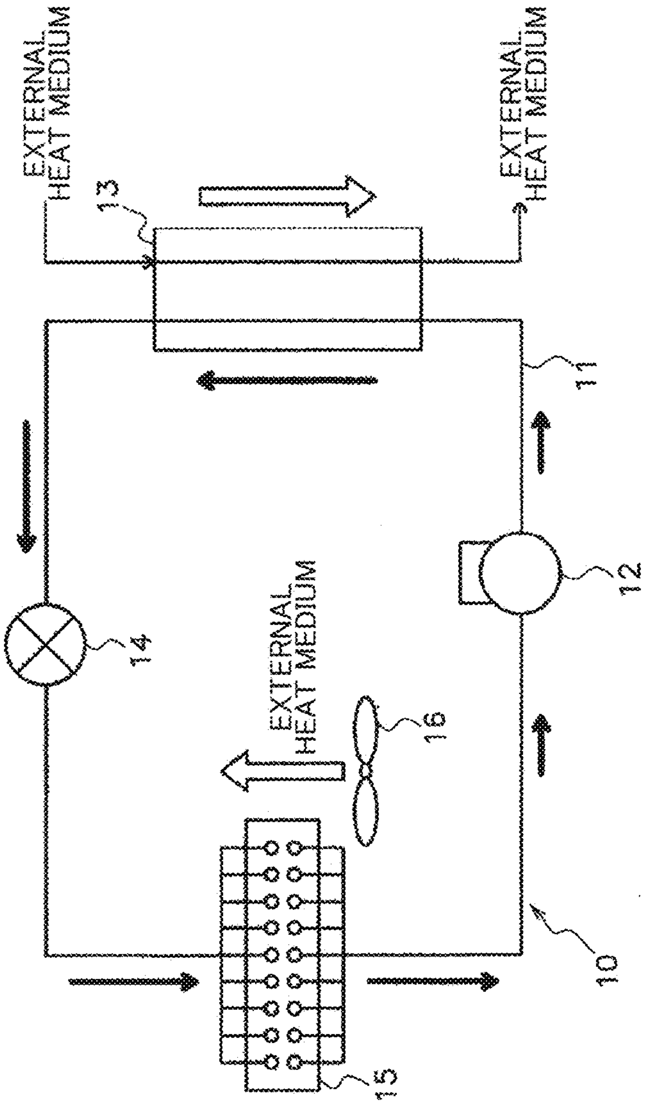
Figure 220:
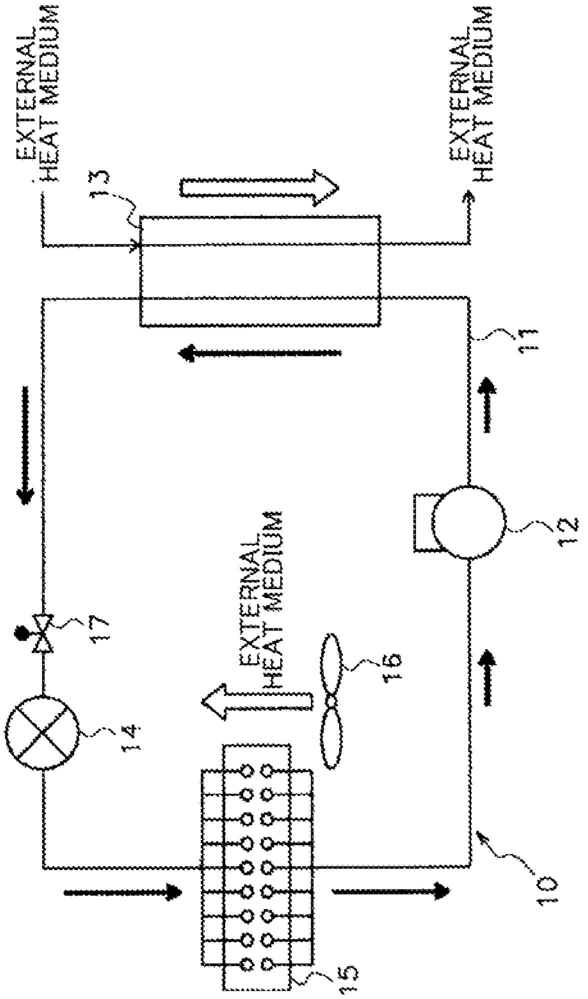

FIG. 22C is a schematic configuration diagram showing one aspect of the configuration of a refrigerant circuit in a refrigeration cycle device according to a first embodiment of the technology of the twenty-second group.

FIG. 22D is a schematic configuration diagram showing a modification of the refrigerant circuit of FIG. 22C.

Figure 22E:
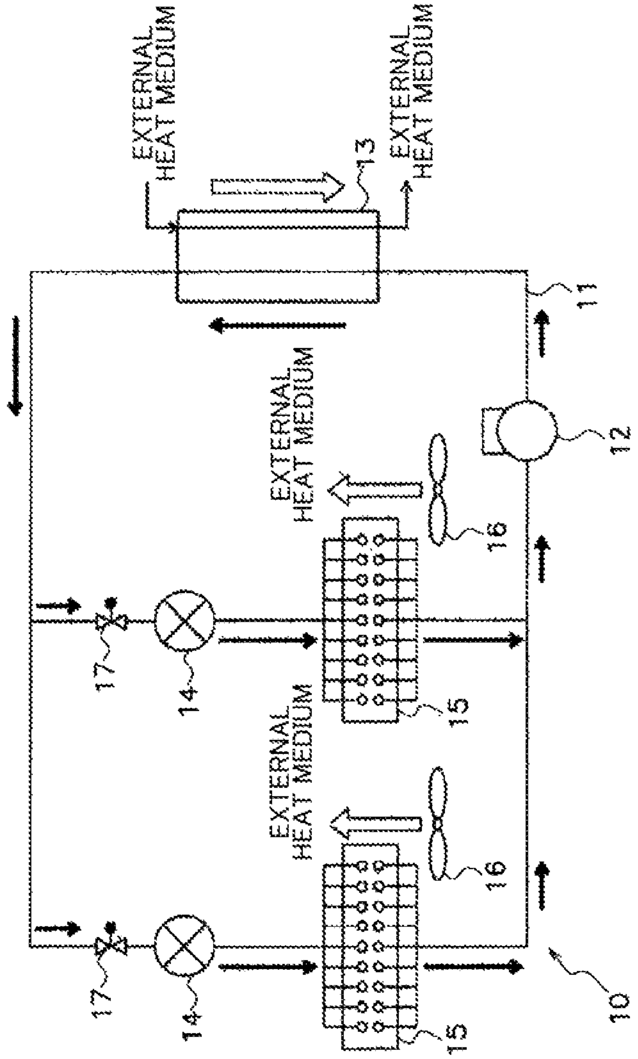

FIG. 22E is a schematic configuration diagram showing a modification of the refrigerant circuit of FIG. 22D.

Figure 22F:
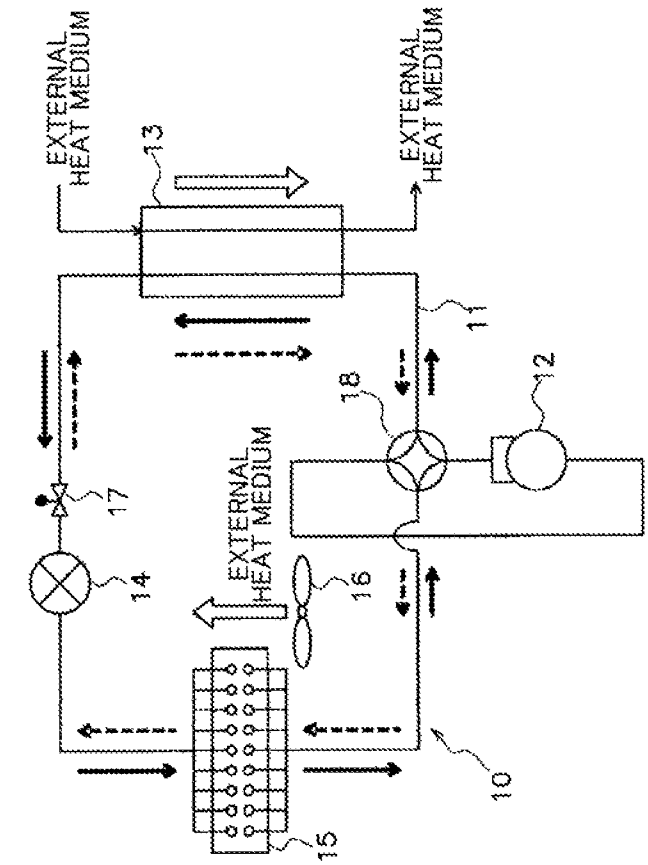

FIG. 22F is a schematic configuration diagram showing a modification of the refrigerant circuit of FIG. 22D.

Figure 22G:
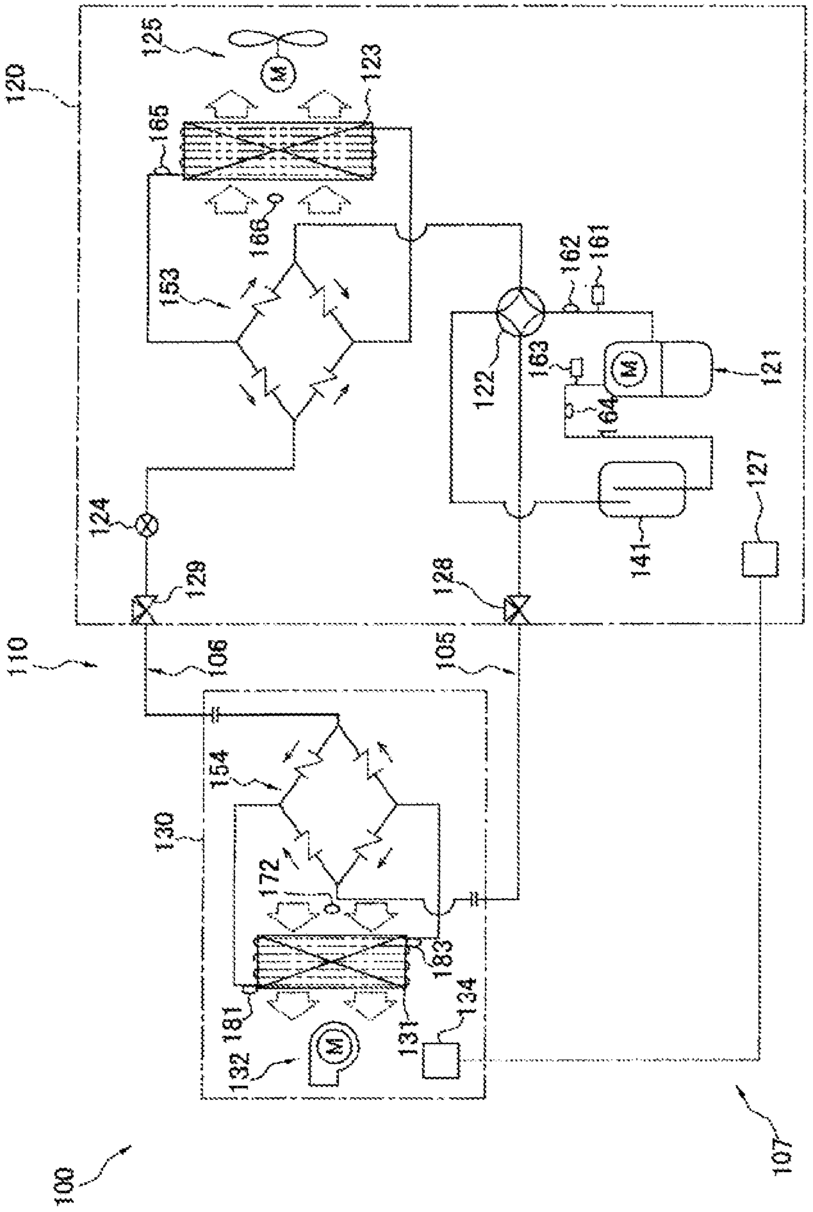

FIG. 22G is a schematic configuration diagram showing the configuration of a refrigerant circuit of an air conditioning device as one example of a refrigeration cycle device according to a second embodiment of the technology of the twenty-second group.

Figure 22H:
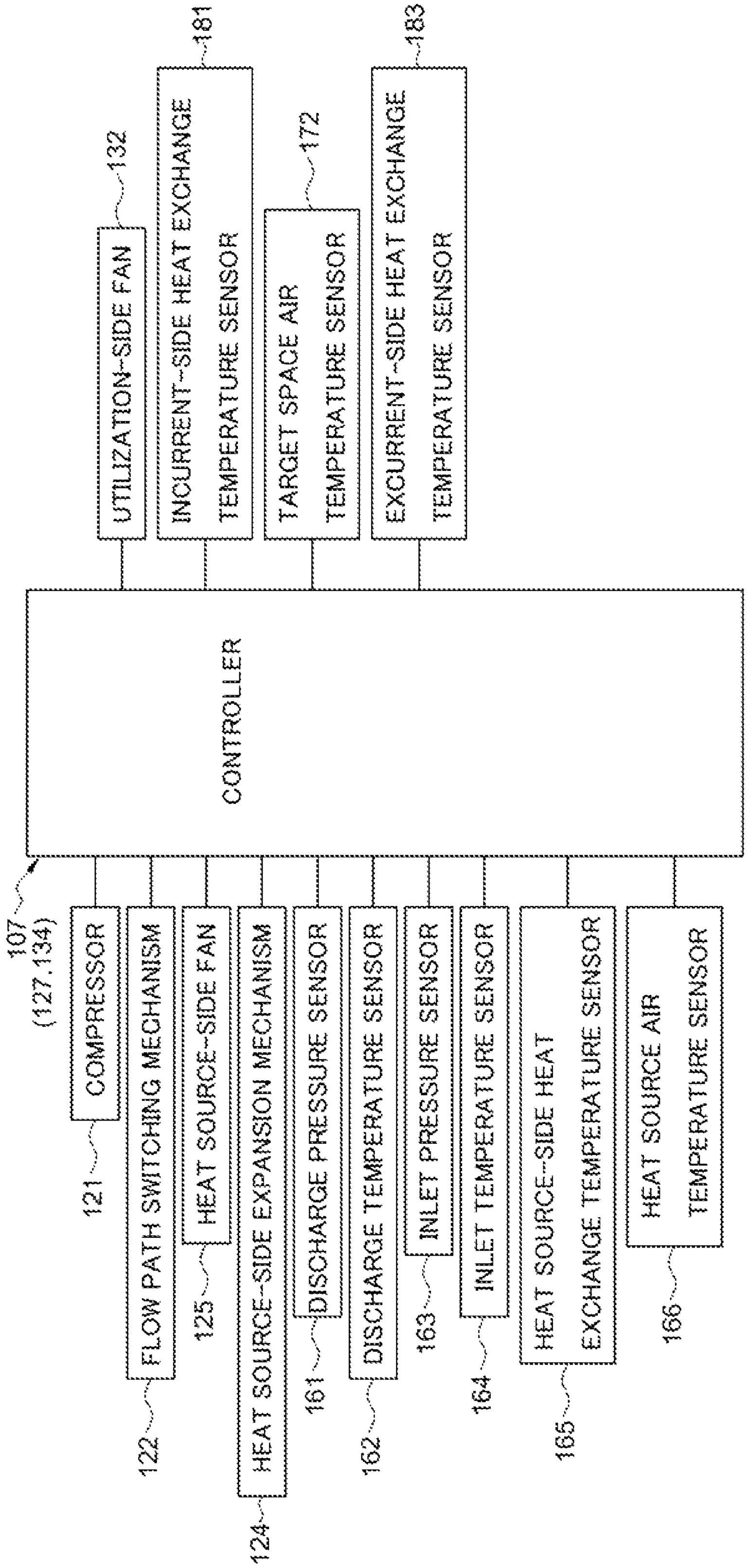

FIG. 22H is a schematic control block configuration diagram of the air conditioning device of FIG. 22G.

Figure 22I:
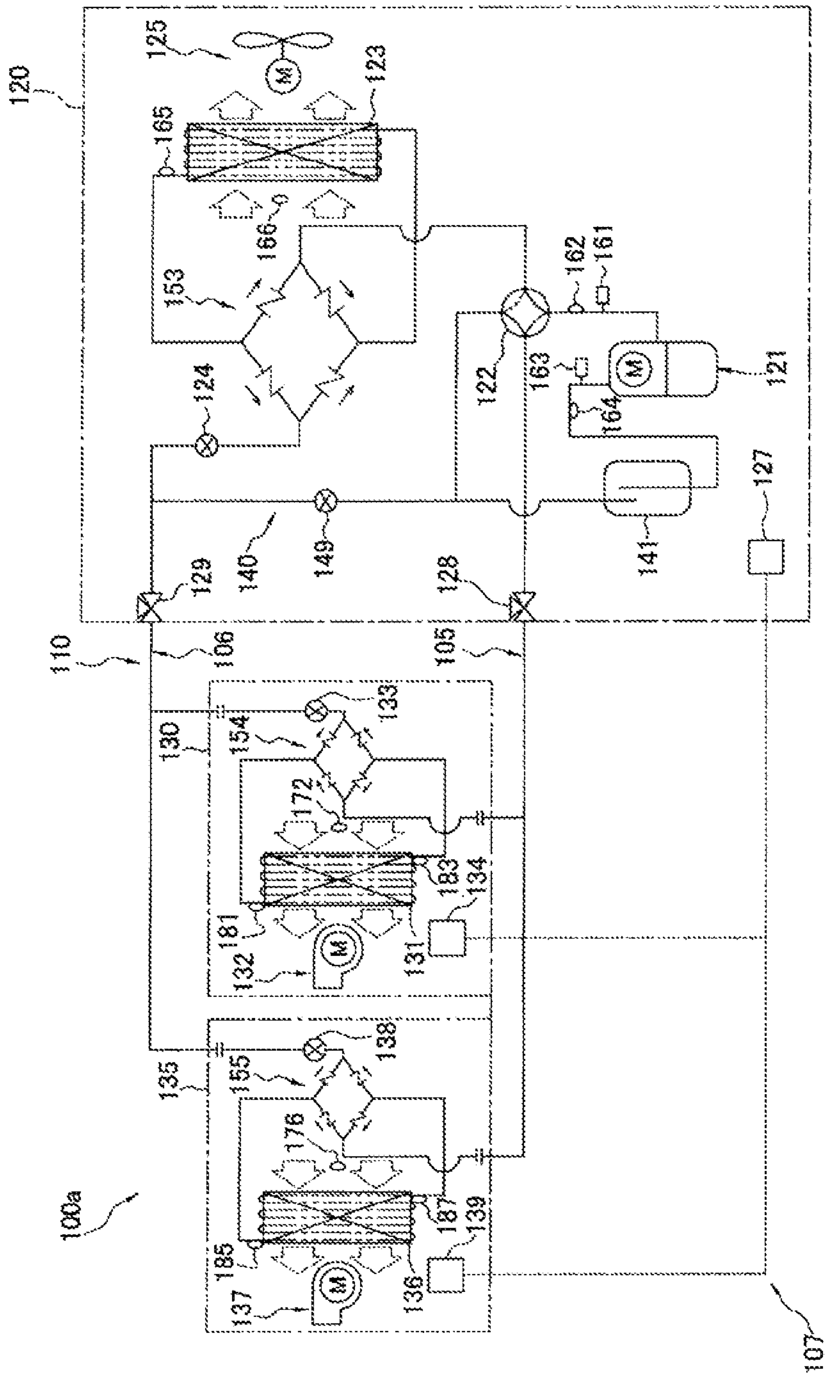

FIG. 22I is a schematic configuration diagram showing the configuration of a refrigerant circuit of an air conditioning device as one example of a refrigeration cycle device according to a third embodiment of the technology of the twenty-second group.

Figure 22J:
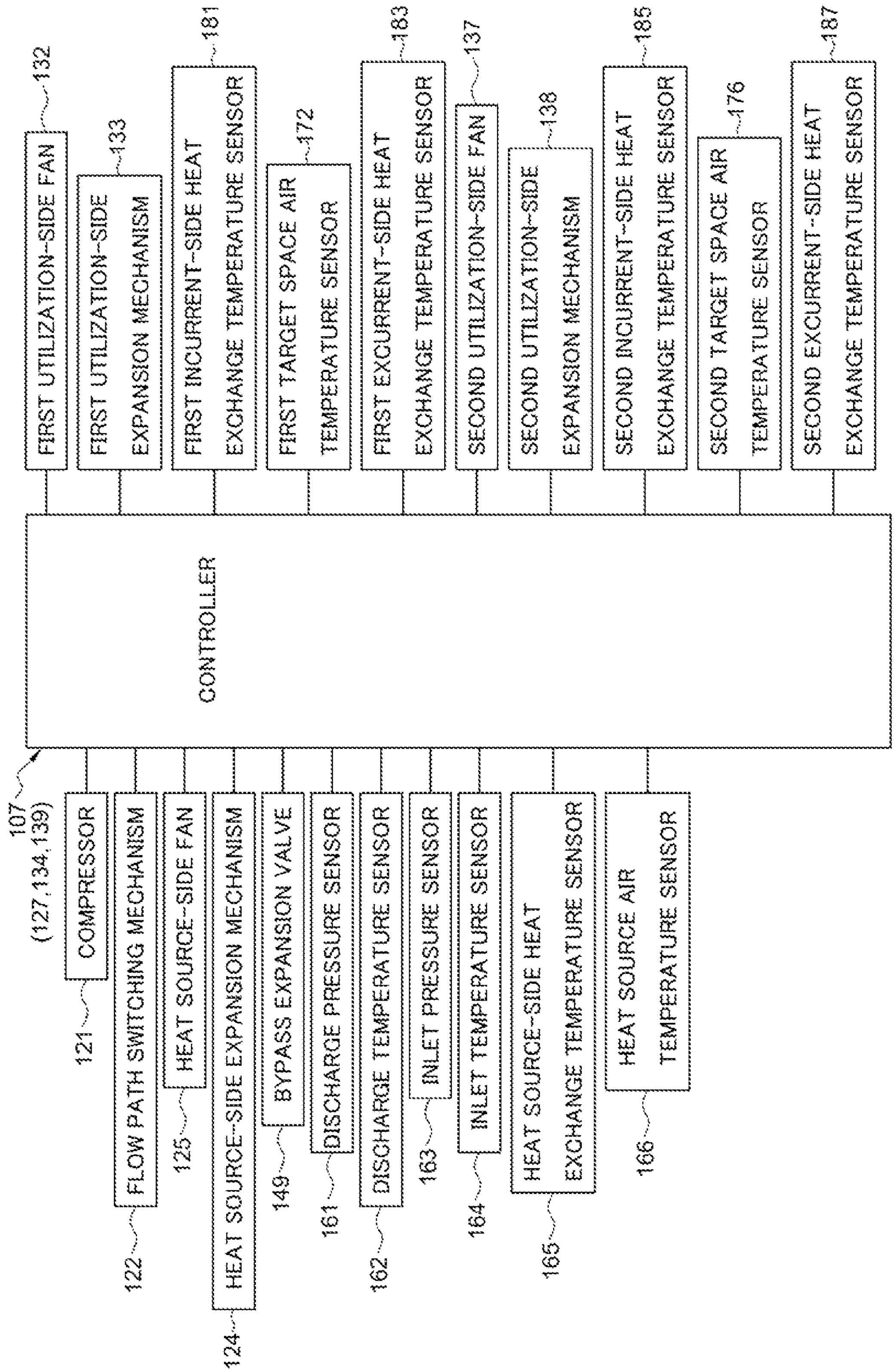

FIG. 22J is a schematic control block configuration diagram of the air conditioning device of FIG. 22I.

Figure 23A:
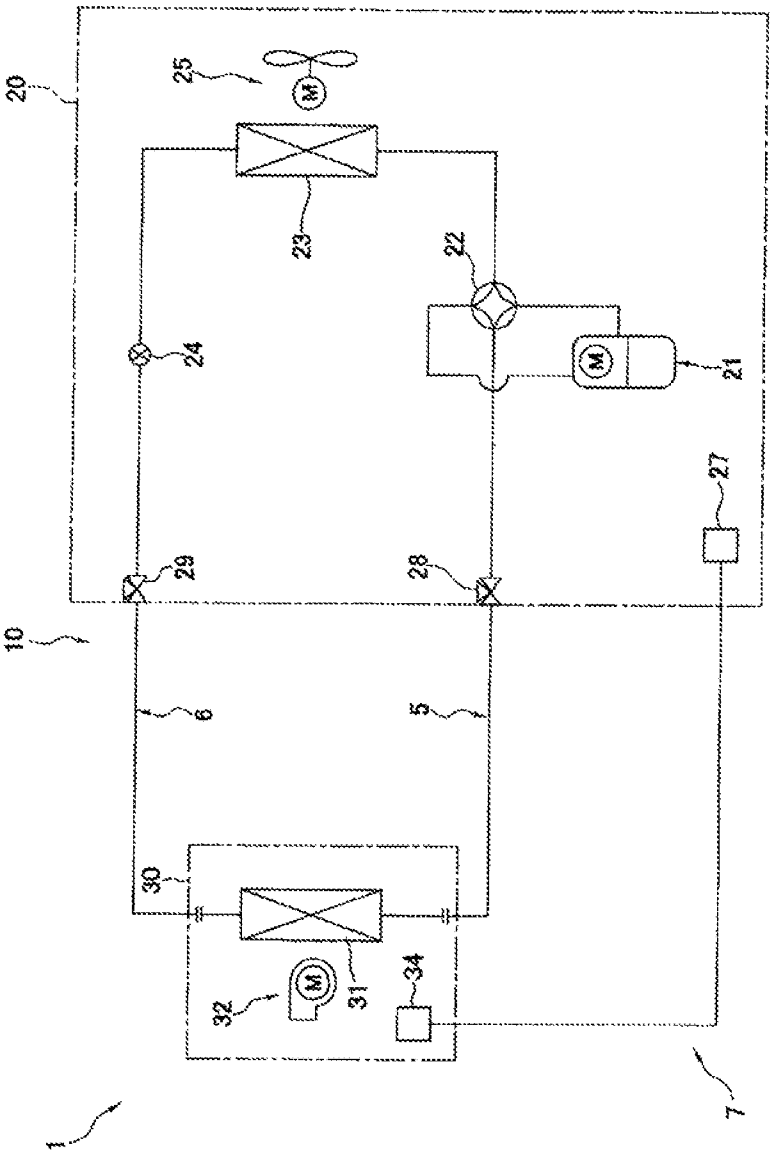

FIG. 23A is a schematic configuration diagram of a refrigerant circuit according to one embodiment of the technology of a twenty-third group.

Figure 23B:
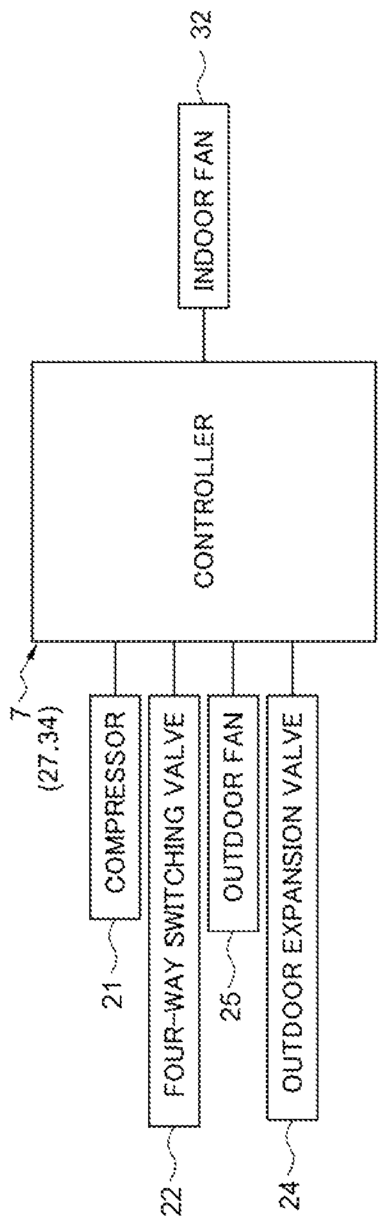

FIG. 23B is a schematic control block configuration diagram of a refrigeration cycle device according to one embodiment of the technology of the twenty-third group.

FIG. 23C is a comparison table showing the pipe outer diameters of copper pipes employed for a gas-side refrigerant communication piping and a liquid-side refrigerant communication piping of an air conditioning device in which the refrigerant of the present disclosure is used, and the pipe outer diameters of the gas-side refrigerant communication piping and the liquid-side refrigerant communication piping in the case where aluminum pipes are employed instead of copper pipes, for each rated refrigeration capacity, in one embodiment of the technology of the twenty-third group.

FIG. 23D is a comparison table showing the wall thicknesses of copper pipe and aluminum pipe for each "pipe designation" in one embodiment of the technology of the twenty-third group.

Figure 24A:
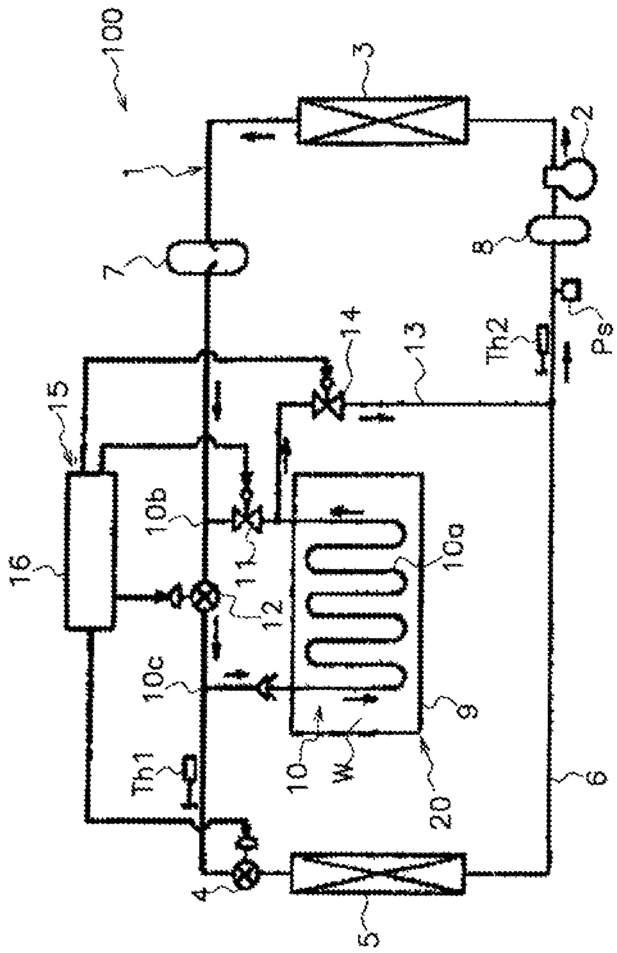

FIG. 24A is a circuit diagram showing the state of heat storage operation of a heat storage device according to a first embodiment of the technology of a twenty-fourth group.

Figure 24B:
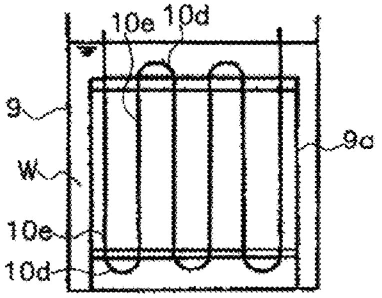

FIG. 24B is a longitudinal section of a heat storage tank of the heat storage device according to the first embodiment of the technology of the twenty-fourth group.

Figure 24C:
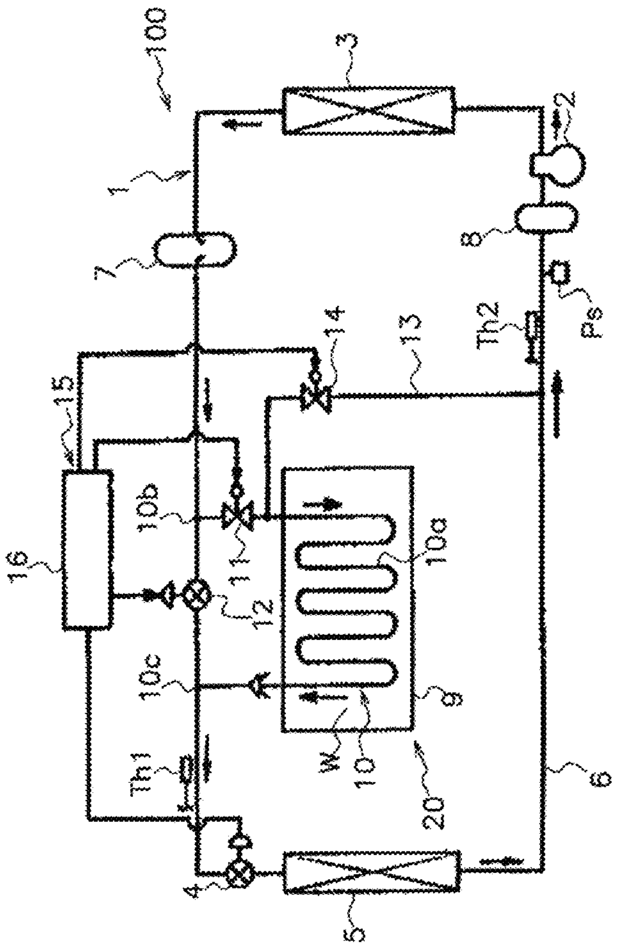

FIG. 24C is a diagram corresponding to FIG. 24A, showing the state of heat storage recovery cooling operation of the heat storage device according to the first embodiment of the technology of the twenty-fourth group.

Figure 24D:
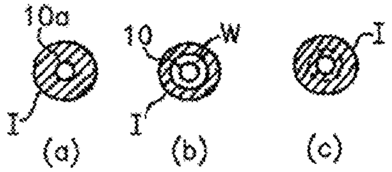

FIG. 24D is a transverse section showing the state of ice adhesion to a cooling pipe of the heat storage device according to the first embodiment of the technology of the twenty-fourth group.

Figure 24E:
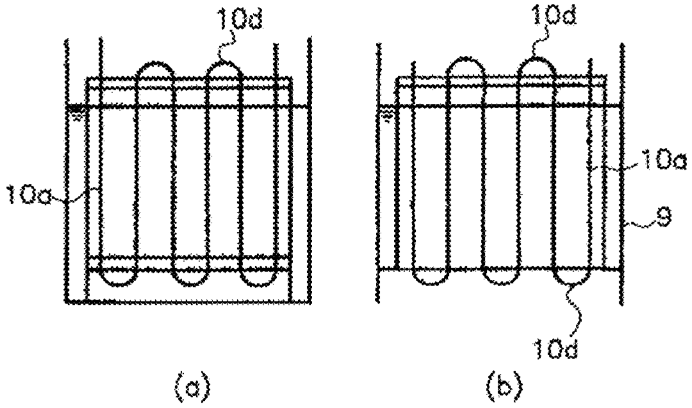

FIG. 24E is a diagram corresponding to FIG. 24B, showing a modification of the cooling pipe.

Figure 24F:
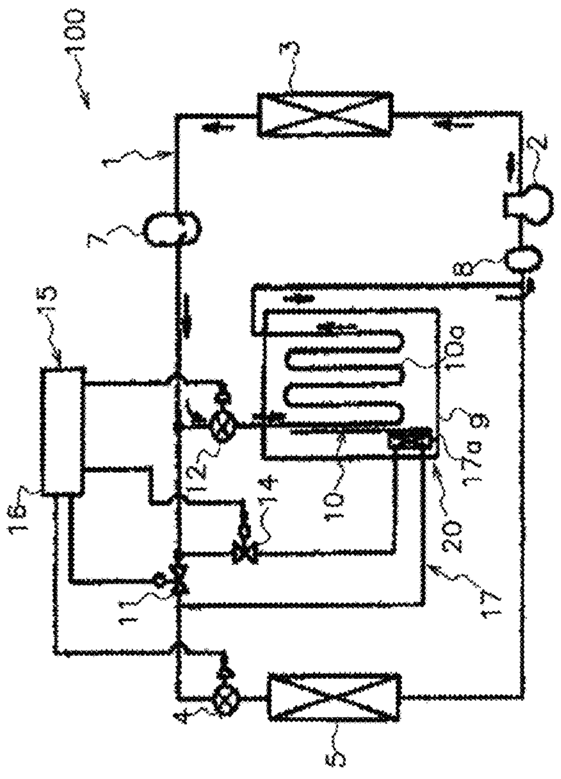

FIG. 24F is a circuit diagram showing the state of heat storage operation of a heat storage device according to a second embodiment of the technology of the twenty-fourth group.

Figure 24G:
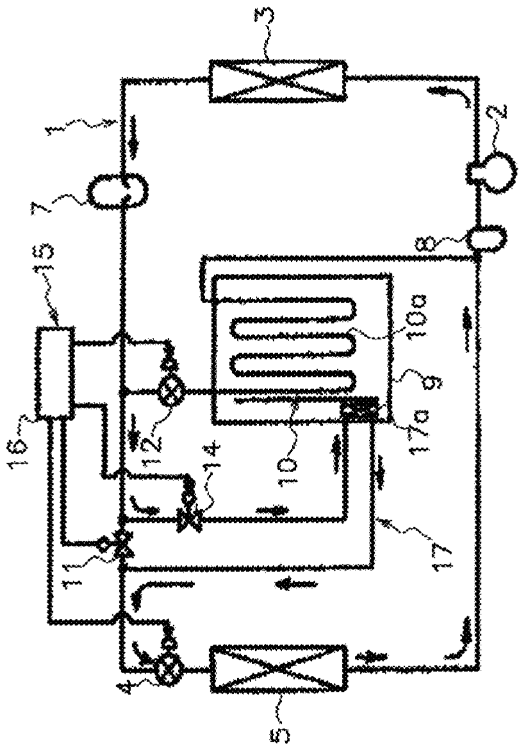

FIG. 24G is a diagram corresponding to FIG. 24F, showing the state of heat storage recovery cooling operation of the heat storage device according to the second embodiment of the technology of the twenty-fourth group.

Figure 24H:
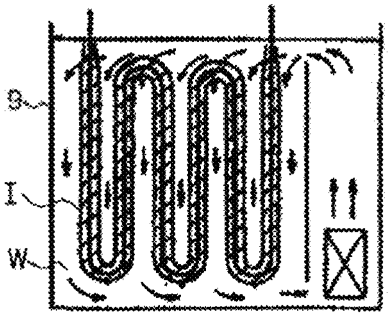

FIG. 24H is a longitudinal section of a heat storage tank of the heat storage device according to the second embodiment of the technology of the twenty-fourth group, during heat storage recovery cooling operation.

Figure 24I:
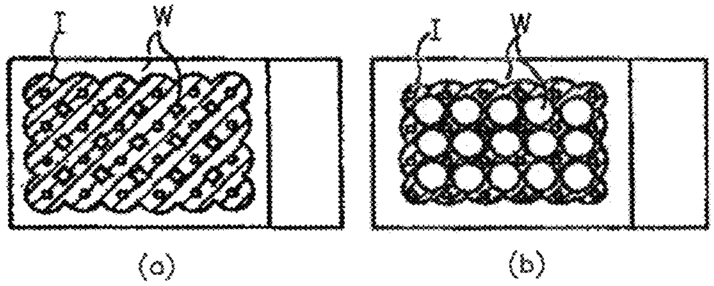

FIG. 24I is a transverse section of the heat storage tank of the heat storage device according to the second embodiment of the technology of the twenty-fourth group, during heat storage recovery cooling operation.

Figure 25A:
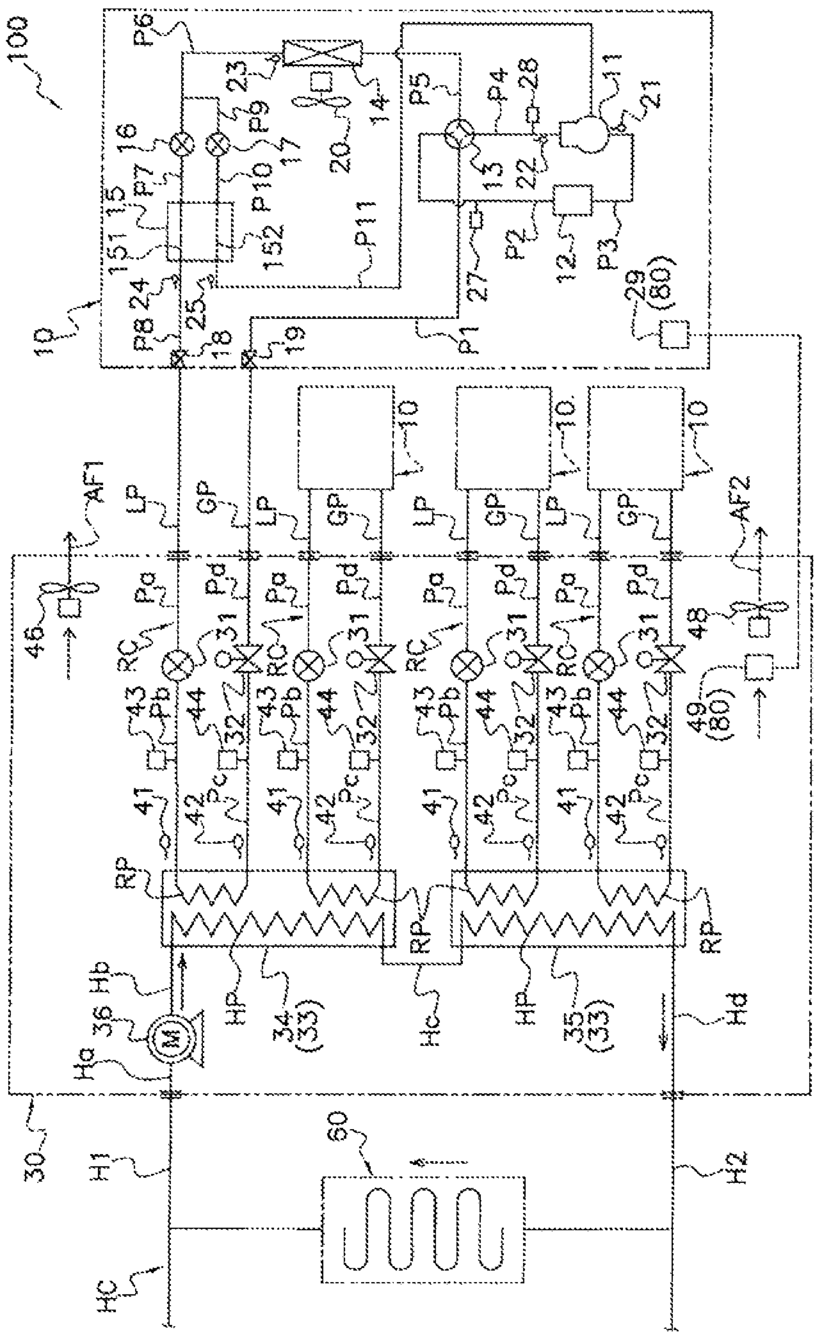

FIG. 25A is a schematic configuration diagram of a heat load treatment system, which is a refrigeration device according to a first embodiment of the technology of a twenty-fifth group.

Figure 25B:
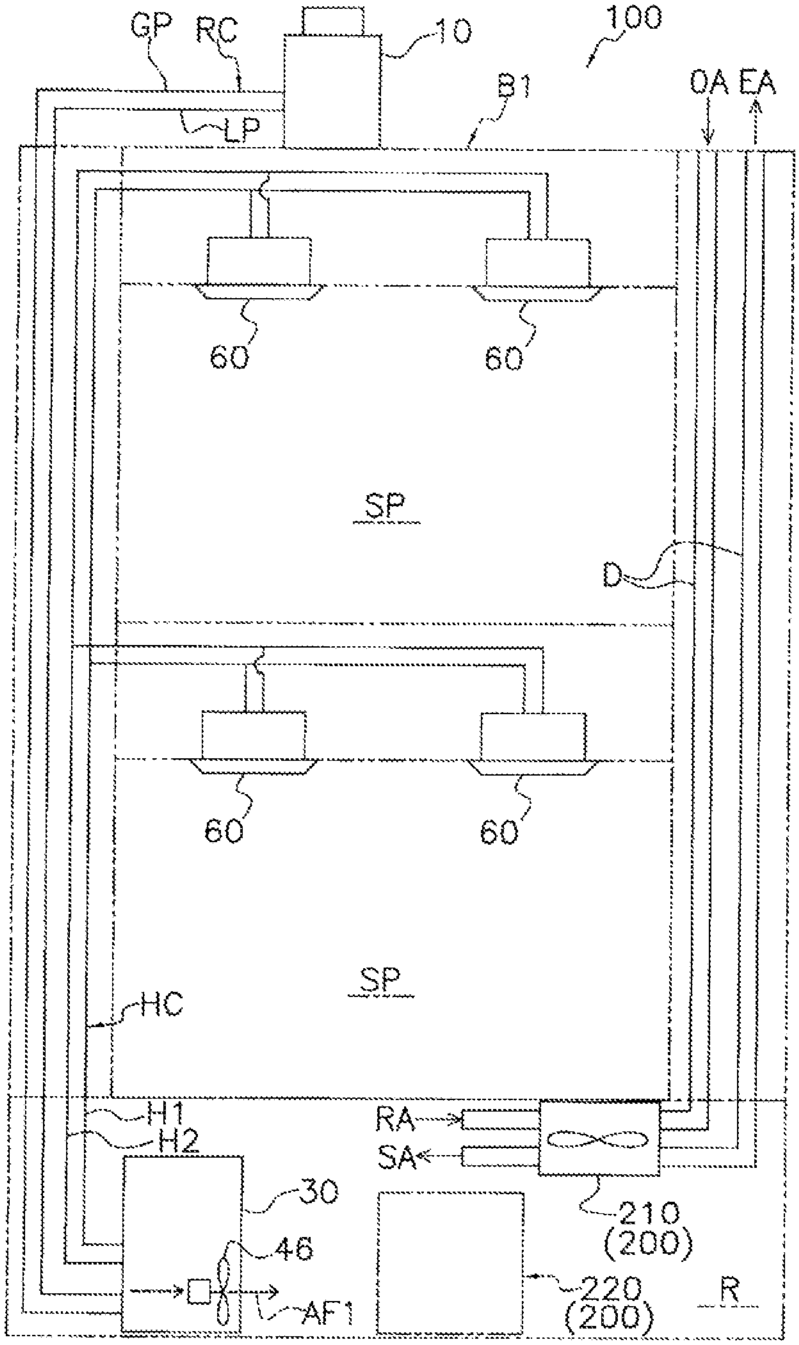

FIG. 25B is a schematic diagram showing the aspect of installation of the heat load treatment system according to the first embodiment of the technology of the twenty-fifth group.

Figure 25C:
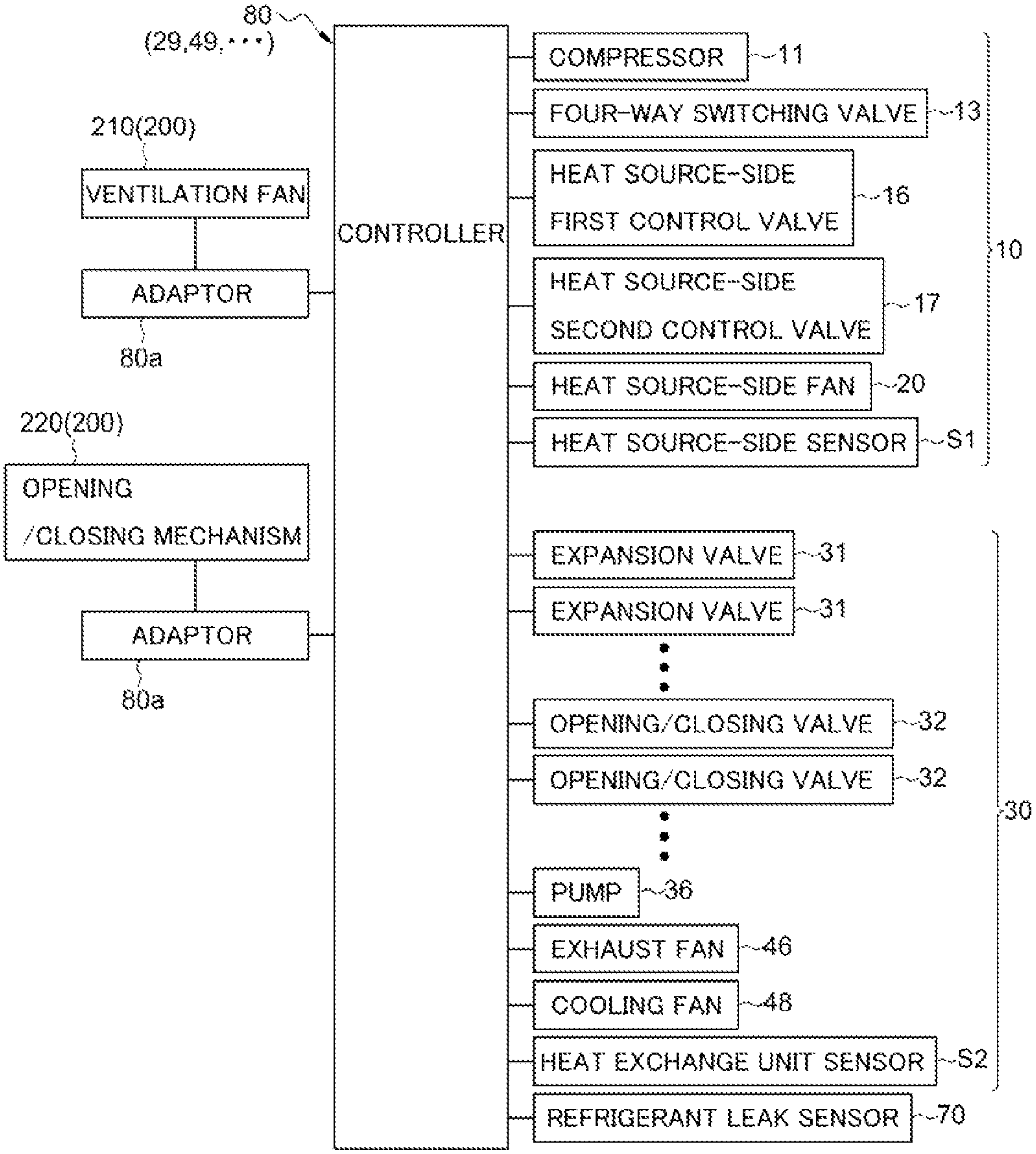

FIG. 25C is a control block diagram of the heat load treatment system of the first embodiment of the technology of the twenty-fifth group.

Figure 25D:
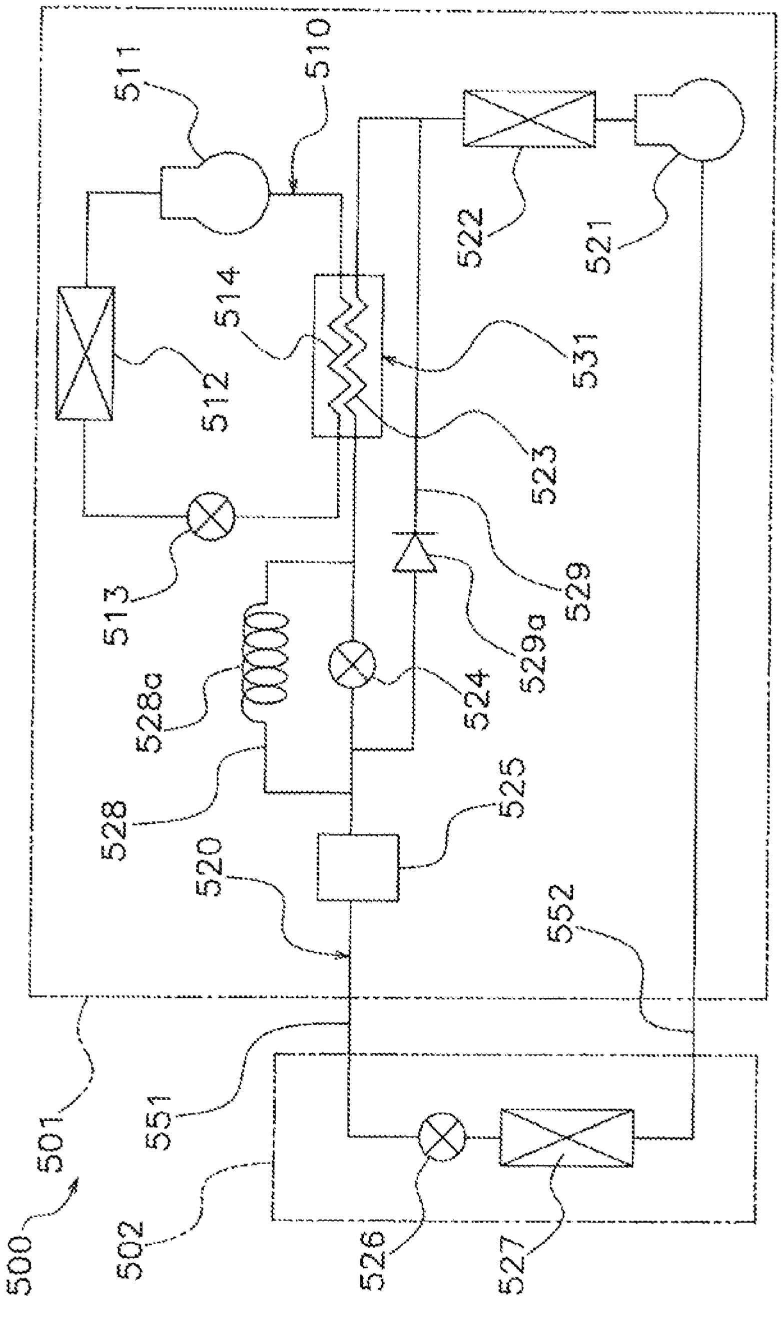

FIG. 25D is a refrigerant circuit diagram of a binary refrigeration device, which is a refrigeration device according to a second embodiment of the technology of the twenty-fifth group.

Figure 25E:
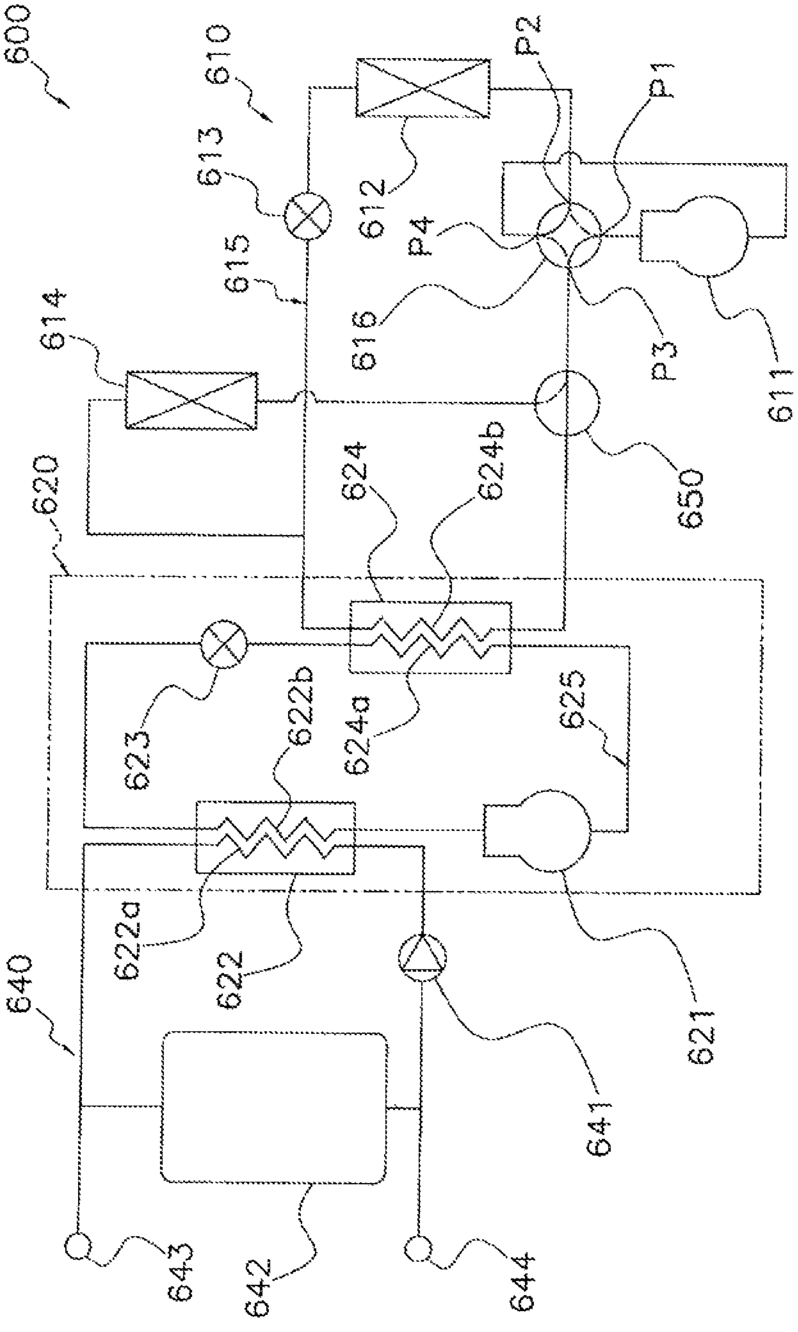

FIG. 25E is a circuit configuration diagram of an air conditioning hot water supply system, which is a refrigeration device according to a second embodiment of the technology of the twenty-fifth group.

DESCRIPTION OF EMBODIMENTS

As a result of diligent studies to solve the above problem, the present inventors have found that a mixed refrigerant containing trans-1,2-difluoroethylene (HFO-1132 (E)), 2,3,3,3-tetrafluoro-1-propene (R1234yf) and trifluoroethylene (HFO-1123), and difluoromethane (R32) has the above characteristics.

The present disclosure was completed as a result of further studies based on such a finding. The present disclosure includes the following embodiments.

Definition of Terms

The term "refrigerant" as used herein at least includes compounds with the refrigerant numbers beginning with the letter R (ASHRAE number), which indicate the types of refrigerants, as defined by ISO 817 (International Organization for Standardization), and also includes those having refrigerant characteristics that are equivalent to those of the above compounds, even if they have not yet been assigned refrigerant numbers. Refrigerants are broadly classified into "fluorocarbon compounds" and "non-fluorocarbon compounds" in terms of the structures of compounds. The "fluorocarbon compounds" include chlorofluorocarbons (CFCs), hydrochlorofluorocarbons (HCFCs), and hydrofluorocarbons (HFCs). Examples of the "non-fluorocarbon compounds" include propane (R290), propylene (R1270), butane (R600), isobutane (R600a), carbon dioxide (R744), and ammonia (R717).

The term "refrigerant-containing composition" as used herein at least includes: (1) refrigerants themselves (including mixtures of refrigerants); (2) compositions that further contain other components and can be used to obtain working fluids for refrigerators by mixing with at least refrigerator oils; and (3) working fluids for refrigerators that contain refrigerator oils. Of these three aspects, the compositions of (2) will be referred to herein as "refrigerant compositions" to distinguish them from the refrigerants themselves (including mixtures of refrigerants). Also, the working fluids for refrigerators of (3) will be referred to as "refrigerator oil-containing working fluids" to distinguish them from the "refrigerant compositions".

The term "alternative" as used herein means that, as a first pattern, when used in the context of substituting a first refrigerant with a second refrigerant, equipment designed to operate using the first refrigerant can be operated using the second refrigerant under optimal conditions with only minor component changes (at least one of the following: refrigerator oils, gaskets, packings, expansion valves, dryers, and other components) and equipment adjustments as required. That is, this pattern refers to the operation of the same equipment with an "alternative" refrigerant. Aspects of this pattern of "alternative" may include "drop-in alternatives", "nearly drop-in alternatives", and "retrofits", in the order where the extent of changes and adjustments required to replace the first refrigerant with the second refrigerant is smaller.

As a second pattern, the term "alternative" also includes the use of equipment designed to operate using a second refrigerant, with the second refrigerant mounted, for the same application as the existing application of a first refrigerant. This pattern refers to the provision of the same application, but with an "alternative" refrigerant.

The term "refrigerator" as used herein refers to any device that removes heat from an object or space to make its temperature lower than the surrounding outside air and maintains this lower temperature. In other words, the refrigerator refers to a conversion device that obtains energy from the outside to do work and perform energy conversion in order to move heat from a lower temperature to a higher one.

When a refrigerant is "WCF slightly flammable" as used herein, it means that the most flammable formulation (worst case of formulation for flammability; WCF) has a burning velocity of 10 cm/s or less according to the U.S. ANSI/ASHRAE Standard 34-2013. Also, when a refrigerant is "ASHRAE slightly flammable" as used herein, it means that the burning velocity of WCF is 10 cm/s or less and that the most flammable fractional formulation (worst case of fractionation for flammability; WCFF), which is identified by carrying out a leak test during storage, transport, and use according to the ANSI/ASHRAE 34-2013 using the WCF, has a burning velocity of 10 cm/s or less, which means that the flammability classification is determined as "Class 2L" according to the U.S. ANSI/ASHRAE Standard 34-2013.

1. Refrigerant 1.1 Refrigerant Component

The refrigerant of the present disclosure is a composition containing trans-1,2-difluoroethylene (HFO-1132 (E)), trifluoroethylene (HFO-1123) and 2,3,3,3-tetrafluoro-1-propene (R1234yf), and difluoromethane (R32), and furthermore, it satisfies the following requirement. The refrigerant of the present disclosure has various desirable characteristics as an alternative refrigerant to R410A, such as having a refrigeration capacity and a coefficient of performance equivalent to those of R410A, and having a sufficiently small GWP.

Requirement:

When the mass percentages of HFO-1132 (E), HFO-1123 and R1234yf, and R32, based on their sum are defined as x, y and z, and a, respectively, in a ternary composition diagram in which the sum of HFO-1132 (E), HFO-1123 and R1234yf is (100−a) % by mass, the coordinates (x,y,z) are:

in the case of $0<a\leq 11.1$, within the range of the figure surrounded by lines JL, LM, MN, NK', K'B, BD', D'C, and CJ connecting each of eight points:

point J ($100-a-y$, $-0.0049a^2-0.0355a+52.9$, 0.0);

point L ($-0.0217a^2-0.9307a+63.0$, $95.0-a-x$, 5.0);

point M ($0.0292a^2-1.7567a+68.9$, $-0.0194a^2+0.8278a+16.1$, $100-a-x-y$);

point N ($0.043a^2-2.1084a+66.9$, $-0.0268a^2+0.6129a+9.4$, $100-a-x-y$);

point K' ($-0.051a^2+0.0929a+25.95$, $100-a-x-z$, $-0.0191a^2+1.0231a+32.4$);

point B (0.0, $0.0144a^2-1.6377a+58.7$, $100-a-y$);

point D' (0.0, $0.0224a^2+0.968a+75.4$, $100-a-y$); and point C ($-0.2304a^2-0.4062a+32.9$, $100-a-x$, 0.0), or on the lines JL, LM, MN, NK', K'B, and D'C (except for point B, point D', point C, and point J);

in the case of $11.1<a\leq 18.2$, within the range of the figure surrounded by lines JL, LM, MN, NK', K'B, BW, and WJ connecting each of seven points:

point J ($100-a-y$, $-0.0243a^2+0.4161a+50.275$, 0.0);

point L ($0.0187a^2-1.4492a+63.783$, $95.0-a-x$, 5.0);

point M ($0.0197a^2-1.5633a+67.924$, $-0.0611a^2+1.9179a+9.1435$, $100-a-x-y$);

point N ($0.009a^2-1.3469a+62.647$, $-0.0225a^2+0.5467a+9.6045$, $100-a-x-y$);

point K' ($0.0341a^2-2.1977a+61.187$, $100-a-x-z$, $-0.0105a^2+0.8577a+33.177$);

point B (0.0, $0.0075a^2-1.5156a+58.199$, $100-a-y$); and point W (0.0, $100-a$, 0.0), or on the lines JL, LM, MN, NK', and K'B (except for point B, point W, and point J);

in the case of $18.2<a\leq 26.7$, within the range of the figure surrounded by lines JL, LM, MN, NK', K'B, BW, and WJ connecting each of seven points:

point J ($100-a-y$, $-0.0246a^2+0.4476a+49.816$, 0.0);

point L ($0.0197a^2-1.5187a+64.723$, $95.0-a-x$, 5.0);

point M ($0.0145a^2-1.3925a+66.539$, $0.01a^2-0.5903a+31.23$, $100-a-x-y$);

point N ($0.0213a^2-1.8283a+67.31$, $-0.2706a+17.025$, $100-a-x-y$);

point K' ($0.0196a^2-1.7863a+58.515$, $100-a-x-z$, $-0.0117a^2+0.8999a+32.783$);

point B (0.0, $0.009a^2-1.6045a+59.318$, $100-a-y$); and point W (0.0, $100-a$, 0.0), or on the lines JL, LM, MN, NK', and K'B (except for point B, point W, and point J); and in the case of $26.7<a\leq 36.7$, within the range of the figure surrounded by lines JL, LM, MN, NK', K'A, AB, BW, and WJ connecting each of eight points:

point J ($100-a-y$, $-0.0183a^2+0.1399a+53.507$, 0.0);

point L ($0.0081a^2-0.9541a+57.893$, $95.0-a-x$, 5.0);

point M ($0.005a^2-0.8563a+59.007$, $0.03558a^2-2.4139a+61.708$, $100-a-x-y$);

point N ($0.0108a^2-1.1054a+55.507$, $0.005a^2-0.3563a+15.757$, $100-a-x-y$);

point K' ($-0.0051a^2+0.0929a+25.95$, 0.0, $100-a-x$);

point A ($0.0103a^2-1.9225a+68.793$, 0.0, $100-a-x$);

point B (0.0, $0.0046a^2-1.41a+57.286$, $100-a-y$); and point W (0.0, $100-a$, 0.0), or on the lines JL, LM, MN, NK', K'A, and AB (except for point K', point A, point B, point W, and point J). When the above requirement is satisfied, the refrigerant of the present disclosure has a coefficient of performance (COP) ratio of 92.5% or more and a refrigeration capacity ratio of 85% or more based on R410A, and is ASHRAE slightly flammable.

The refrigerant of the present disclosure may further contain other additional refrigerants in addition to HFO-1132 (E), HFO-1123 and R1234yf, and R32, to the extent that the above characteristics and effects are not impaired. In this regard, the refrigerant of the present disclosure preferably contains HFO-1132 (E), HFO-1123 and R1234yf, and R32 in an amount of 99.5% by mass or more in total, more preferably in an amount of 99.75% by mass or more, and still more preferably in an amount of 99.9% by mass or more, relative to the entire refrigerant.

The additional refrigerants are not limited and can be selected from a wide range of sources. The mixed refrigerant may contain one kind of refrigerant alone or two or more kinds of refrigerants, as the additional refrigerants.

1.2 Application

The refrigerant of the present disclosure can be preferably used as a working fluid in a refrigerator.

The composition of the present disclosure is suited for use as an alternative refrigerant to R410A.

2. Refrigerant Composition

The refrigerant composition of the present disclosure at least contains the refrigerant of the present disclosure and can be used for the same application as that of the refrigerant of the present disclosure. Also, the refrigerant composition of the present disclosure can be used to obtain a working fluid for a refrigerator by further mixing with at least a refrigerator oil.

The refrigerant composition of the present disclosure further contains at least one kind of other component in addition to the refrigerant of the present disclosure. The refrigerant composition of the present disclosure may contain, as required, at least one of the following other components. As mentioned above, when the refrigerant composition of the present disclosure is used as a working fluid in a refrigerator, it is normally mixed with at least a refrigerator oil for use. Accordingly, the refrigerant composition of the present disclosure is preferably substantially free of refrigerator oil. Specifically, in the refrigerant composition of the present disclosure, the content of the refrigerator oil relative to the entire refrigerant composition is preferably 0 to 1% by mass, and more preferably 0 to 0.1% by mass.

2.1 Water

The refrigerant composition of the present disclosure may contain a minute amount of water. It is preferable to set the water content ratio in the refrigerant composition to 0.1% by mass or less, relative to the entire refrigerant. When the refrigerant composition contains a minute amount of moisture, the intramolecular double bonds of an unsaturated fluorocarbon compound that can be contained in the refrigerant are stabilized, and the oxidation of an unsaturated fluorocarbon compound is also less likely to occur, thus improving the stability of the refrigerant composition.

2.2 Tracer

A tracer is added to the refrigerant composition of the present disclosure at a detectable concentration such that, when the refrigerant composition of the present disclosure is diluted, contaminated, or otherwise changed in any way, that change can be tracked.

The refrigerant composition of the present disclosure may contain one kind of tracer alone or two or more kinds of tracers, as the tracer.

The tracer is not limited and can be selected as appropriate from among generally used tracers.

Examples of the tracer include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). As the tracer, hydrofluorocarbons, hydrochlorofluorocarbons, chlorofluorocarbons, hydrochlorocarbons, fluorocarbons, and fluoroethers are particularly preferable.

As the above tracer, the following compounds are preferable:

FC-14 (tetrafluoromethane, $CF_4$);
HCC-40 (chloromethane, $CH_3Cl$);
HFC-23 (trifluoromethane, $CHF_3$);
HFC-41 (fluoromethane, $CH_3Cl$);
HFC-125 (pentafluoroethane, $CF_3CHF_2$);
HFC-134a (1,1,1,2-tetrafluoroethane, $CF_3CH_2F$);
HFC-134 (1,1,2,2-tetrafluoroethane, $CHF_2CHF_2$);
HFC-143a (1,1,1-trifluoroethane, $CF_3CH_3$);
HFC-143 (1,1,2-trifluoroethane, $CHF_2CH_2F$);
HFC-152a (1,1-difluoroethane, $CHF_2CH_3$);
HFC-152 (1,2-difluoroethane, $CH_2FCH_2F$);
HFC-161 (fluoroethane, $CH_3CH_2F$);
HFC-245fa (1,1,1,3,3-pentafluoropropane, $CF_3CH_2CHF_2$);
HFC-236fa (1,1,1,3,3,3-hexafluoropropane, $CF_3CH_2CF_3$);
HFC-236ea (1,1,1,2,3,3-hexafluoropropane, $CF_3CHFCHF_2$);
HFC-227ea (1,1,1,2,3,3,3-heptafluoropropane, $CF_3CHFCF_3$);
HCFC-22 (chlorodifluoromethane, $CHClF_2$);
HCFC-31 (chlorofluoromethane, $CH_2ClF$);
CFC-1113 (chlorotrifluoroethylene, $CF_2{=}CClF$);
HFE-125 (trifluoromethyl-difluoromethyl ether, $CF_3OCHF_2$);
HFE-134a (trifluoromethyl-fluoromethyl ether, $CF_3OCH_2F$);
HFE-143a (trifluoromethyl-methyl ether, $CF_3OCH_3$);
HFE-227ea (trifluoromethyl-tetrafluoroethyl ether, $CF_3OCHFCF_3$); and
HFE-236fa (trifluoromethyl-trifluoroethyl ether, $CF_3OCH_2CF_3$).

The refrigerant composition of the present disclosure may contain the tracer in an amount of about 10 parts per million by weight (ppm) to about 1000 ppm in total, relative to the entire refrigerant composition. The refrigerant composition of the present disclosure may contain the tracer preferably in an amount of about 30 ppm to about 500 ppm and more preferably in an amount of about 50 ppm to about 300 ppm in total, relative to the entire refrigerant composition.

2.3 Ultraviolet Fluorescent Dye

The refrigerant composition of the present disclosure may contain one kind of ultraviolet fluorescent dye alone or two or more kinds of ultraviolet fluorescent dyes, as the ultraviolet fluorescent dye.

The ultraviolet fluorescent dye is not limited and can be selected as appropriate from among generally used ultraviolet fluorescent dyes.

Examples of the ultraviolet fluorescent dye include naphthalimide, coumarin, anthracene, phenanthrene, xanthene, thioxanthene, naphthoxanthene, fluorescein, and derivatives thereof. As the ultraviolet fluorescent dye, either or both naphthalimide and coumarin are particularly preferable.

2.4 Stabilizer

The refrigerant composition of the present disclosure may contain one kind of stabilizer alone or two or more kinds of stabilizers, as the stabilizer.

The stabilizer is not limited and can be selected as appropriate from among generally used stabilizers.

Examples of the stabilizer include nitro compounds, ethers, and amines.

Examples of the nitro compounds include aliphatic nitro compounds such as nitromethane and nitroethane, and aromatic nitro compounds such as nitrobenzene and nitrostyrene.

Examples of the ethers include 1,4-dioxane.

Examples of the amines include 2,2,3,3,3-pentafluoropropylamine and diphenylamine.

Other examples of the stabilizer include butylhydroxyxylene and benzotriazole.

The content ratio of the stabilizer is not limited, and usually, it is preferable to set it to 0.01 to 5% by mass and more preferable to set it to 0.05 to 2% by mass, relative to the entire refrigerant.

2.5 Polymerization Inhibitor

The refrigerant composition of the present disclosure may contain one kind of polymerization inhibitor alone or two or more kinds of polymerization inhibitors, as the polymerization inhibitor.

The polymerization inhibitor is not limited and can be selected as appropriate from among generally used polymerization inhibitors.

Examples of the polymerization inhibitor include 4-methoxy-1-naphthol, hydroquinone, hydroquinone methyl ether, dimethyl-t-butylphenol, 2,6-di-tert-butyl-p-cresol, and benzotriazole.

The content ratio of the polymerization inhibitor is not limited, and usually, it is preferable to set it to 0.01 to 5% by mass and more preferable to set it to 0.05 to 2% by mass, relative to the entire refrigerant.

3. Refrigerator Oil-Containing Working Fluid

The refrigerator oil-containing working fluid of the present disclosure at least contains the refrigerant or refrigerant composition of the present disclosure and a refrigerator oil, and is used as a working fluid in a refrigerator. Specifically, the refrigerator oil-containing working fluid of the present disclosure is obtained by mixing a refrigerator oil used in a compressor of a refrigerator and a refrigerant or refrigerant composition with each other. The refrigerator oil-containing working fluid generally contains a refrigerator oil in an amount of 10 to 50% by mass.

3.1 Refrigerator Oil

The refrigerator oil-containing working fluid of the present disclosure may contain one kind of refrigerator oil alone or two or more kinds of refrigerator oils, as the refrigerator oil.

The refrigerator oil is not limited and can be selected as appropriate from among generally used refrigerator oils. At that time, as required, a refrigerator oil that is superior in terms of the action of improving miscibility with the above mixture, stability of the mixture, and the like can be selected as appropriate.

As the base oil for the refrigerator oil, for example, at least one selected from the group consisting of polyalkylene glycols (PAGs), polyol esters (POEs), and polyvinyl ethers (PVEs) is preferable.

The refrigerator oil may further contain an additive agent, in addition to the base oil. The additive agent may be at least one selected from the group consisting of antioxidants, extreme pressure agents, acid scavengers, oxygen scavengers, copper deactivators, rust inhibitors, oiliness improvers, and antifoaming agents.

As the refrigerator oil, those with a kinematic viscosity of 5 to 400 cSt at 40° C. are preferable in terms of lubrication.

The refrigerator oil-containing working fluid of the present disclosure may further contain at least one kind of additive agent, if required. Examples of the additive agent include the following compatibilizing agents.

3.2 Compatibilizing Agent

The refrigerator oil-containing working fluid of the present disclosure may contain one kind of compatibilizing agent alone or two or more kinds of compatibilizing agents, as the compatibilizing agent.

The compatibilizing agent is not limited and can be selected as appropriate from among generally used compatibilizing agents.

Examples of the compatibilizing agent include polyoxyalkylene glycol ethers, amides, nitriles, ketones, chlorocarbons, esters, lactones, aryl ethers, fluoroethers, and 1,1,1-trifluoroalkanes. As the compatibilizing agent, polyoxyalkylene glycol ethers are particularly preferable.

4. Method for Operating Refrigerator

The method for operating a refrigerator of the present disclosure is a method for operating a refrigerator using the refrigerant of the present disclosure.

Specifically, the method for operating a refrigerator of the present disclosure includes a step of circulating the refrigerant of the present disclosure in the refrigerator.

5. Refrigeration Cycle Device

Hereinafter, the refrigerants of the present disclosure may be collectively referred to as "Refrigerant A".

(1) First Group

In the case of carrying out a refrigeration cycle using a refrigerant having a sufficiently small GWP, it has not yet been investigated to date how to make the lubricity in the refrigeration cycle device good.

The contents of the present disclosure are in consideration of the above point, and it is intended to provide a refrigeration cycle device that is capable of making the lubricity inside the refrigeration cycle device good when a refrigeration cycle is carried out using a refrigerant having a sufficiently small GWP.

A refrigeration cycle device according to a first viewpoint of the first group includes a working fluid for a refrigerator that contains the refrigerant composition of the present disclosure and a refrigerator oil.

Since this refrigeration cycle device includes a refrigerant having a sufficiently small GWP and a refrigerator oil, the lubricity inside the refrigeration cycle device can be made good when a refrigeration cycle is carried out using the above refrigerant composition. In addition, this refrigeration cycle can also make the lubricity inside the refrigeration cycle device good when using a refrigerant that combines performances of having a refrigeration capacity (this may also be described as a cooling capacity or capacity) and of having a coefficient of performance (COP) equivalent to those of R410A.

A refrigeration cycle device according to a second viewpoint of the first group is the refrigeration cycle device of the first viewpoint, wherein the kinematic viscosity of the refrigerator oil at 40° C. is 1 mm/s or more and 750 $mm^2$/s or less.

A refrigeration cycle device according to a third viewpoint of the first group is the refrigeration cycle device of the first viewpoint or second viewpoint of the first group, wherein the kinematic viscosity of the refrigerator oil at 100° C. is 1 mm/s or more and 100 $mm^2$/s or less.

A refrigeration cycle device according to a fourth viewpoint of the first group is the refrigeration cycle device of any of the first viewpoint to third viewpoint of the first group, wherein the volume resistivity of the refrigerator oil at 25° C. is $1.0\times10^{12}$ Ω·cm or more.

A refrigeration cycle device according to a fifth viewpoint of the first group is the refrigeration cycle device of any of the first viewpoint to fourth viewpoint of the first group, wherein the acid value of the refrigerator oil is 0.1 mgKOH/g or less.

A refrigeration cycle device according to a sixth viewpoint of the first group is the refrigeration cycle device of any of the first viewpoint to fifth viewpoint of the first group, wherein the ash content of the refrigerator oil is 100 ppm or less.

A refrigeration cycle device according to a seventh viewpoint of the first group is the refrigeration cycle device of any of the first viewpoint to sixth viewpoint of the first group, wherein the aniline point of the refrigerator oil is −100° C. or higher and 0° C. or lower.

A refrigeration cycle device according to an eighth viewpoint of the first group is the refrigeration cycle device of any of the first viewpoint to seventh viewpoint of the first group, comprising a refrigerant circuit. The refrigerant circuit is configured with a compressor, a condenser, a decompression section, and an evaporator connected with refrigerant piping. In the refrigerant circuit, the working fluid for a refrigerator is circulated inside.

A refrigeration cycle device according to a ninth viewpoint of the first group is the refrigeration cycle device of any of the first viewpoint to eighth viewpoint of the first group, wherein the compounding ratio of the refrigerator oil in the working fluid for a refrigerator is 5% by mass or more and 60% by mass or less.

A refrigeration cycle device according to a tenth viewpoint of the first group is the refrigeration cycle device of any of the first viewpoint to ninth viewpoint of the first group, wherein the refrigerator oil contains at least one kind of additive agent selected from acid scavengers, extreme pressure agents, antioxidants, antifoaming agents, oiliness improvers, metal deactivators, anti-wear agents, and compatibilizing agents. The proportion of the additive agent relative to the mass of the refrigerator oil containing the additive agent is 5% by mass or less.

(2) Second Group

In the case of carrying out a refrigeration cycle using a refrigerant having a sufficiently small GWP, it has not yet been investigated to date how to make the lubricity in the refrigeration cycle device good.

The contents of the present disclosure are in consideration of the above point, and it is intended to provide a refrigerator oil for a refrigerant or refrigerant composition that is capable of making the lubricity good when a refrigeration cycle is carried out using a refrigerant having a sufficiently small GWP, a method of using a refrigerator oil, and use as a refrigerator oil.

A refrigerator oil for a refrigerant composition according to a first viewpoint of the second group is a refrigerator oil for the refrigerant composition of the present disclosure.

A refrigerator oil for a refrigerant composition according to a second viewpoint of the second group is the refrigerator oil for a refrigerant composition of the first viewpoint of the second group, wherein the kinematic viscosity of the refrigerator oil at 40° C. is 1 $mm^2/s$ or more and 750 $mm^2/s$ or less.

A refrigerator oil for a refrigerant composition according to a third viewpoint of the second group is the refrigerator oil for a refrigerant composition of the first viewpoint or second viewpoint of the second group, wherein the kinematic viscosity of the refrigerator oil at 100° C. is 1 $mm^2/s$ or more and 100 $mm^2/s$ or less.

A refrigerator oil for a refrigerant composition according to a fourth viewpoint of the second group is the refrigerator oil for a refrigerant composition of any of the first viewpoint to third viewpoint of the second group, wherein the volume resistivity of the refrigerator oil at 25° C. is $1.0\times10^{12}$ Ω·cm or more.

A refrigerator oil for a refrigerant composition according to a fifth viewpoint of the second group is the refrigerator oil for a refrigerant composition of any of the first viewpoint to fourth viewpoint of the second group, wherein the acid value of the refrigerator oil is 0.1 mgKOH/g or less.

A refrigerator oil for a refrigerant composition according to a sixth viewpoint of the second group is the refrigerator oil for a refrigerant composition of any of the first viewpoint to fifth viewpoint of the second group, wherein the ash content of the refrigerator oil is 100 ppm or less.

A refrigerator oil for a refrigerant composition according to a seventh viewpoint of the second group is the refrigerator oil for a refrigerant composition of any of the first viewpoint to sixth viewpoint of the second group, wherein the aniline point of the refrigerator oil is −100° C. or higher and 0° C. or lower.

A method of using a refrigerator oil according to an eighth viewpoint of the second group is a method of using a refrigerator oil together with the refrigerant composition of the present disclosure, wherein the refrigerant contains Refrigerant A.

According to this method of using a refrigerator oil, the lubricity can be made good when a refrigeration cycle is carried out using a refrigerant having a sufficiently small GWP or the refrigerant composition of the present disclosure.

A method of using a refrigerator oil according to a ninth viewpoint of the second group is the method of using a refrigerator oil of the eighth viewpoint of the second group, wherein the kinematic viscosity of the refrigerator oil at 40° C. is 1 $mm^2/s$ or more and 750 $mm^2/s$ or less.

A method of using a refrigerator oil according to a tenth viewpoint of the second group is the method of using a refrigerator oil of the eighth viewpoint or ninth viewpoint of the second group, wherein the kinematic viscosity of the refrigerator oil at 100° C. is 1 $mm^2/s$ or more and 100 $mm^2/s$ or less.

A method of using a refrigerator oil according to an eleventh viewpoint of the second group is the method of using a refrigerator oil of any of the eighth viewpoint to tenth viewpoint of the second group, wherein the volume resistivity of the refrigerator oil at 25° C. is $1.0\times10^{12}$ Ω·cm or more.

A method of using a refrigerator oil according to a twelfth viewpoint of the second group is the method of using a refrigerator oil of any of the eighth viewpoint to eleventh viewpoint of the second group, wherein the acid value of the refrigerator oil is 0.1 mgKOH/g or less.

A method of using a refrigerator oil according to a thirteenth viewpoint of the second group is the method of using a refrigerator oil of any of the eighth viewpoint to twelfth viewpoint of the second group, wherein the ash content of the refrigerator oil is 100 ppm or less.

A method of using a refrigerator oil according to a fourteenth viewpoint of the second group is the method of using a refrigerator oil of any of the eighth viewpoint to thirteenth viewpoint of the second group, wherein the aniline point of the refrigerator oil is −100° C. or higher and 0° C. or lower.

Use as a refrigerator oil according to a fifteenth viewpoint of the second group is use as a refrigerator oil used together with the refrigerant composition of the present disclosure, wherein the refrigerant contains any of the refrigerants shown in (26) below.

According to this use as a refrigerator oil, the lubricity can be made good when a refrigeration cycle is carried out using a refrigerant having a sufficiently small GWP or the refrigerant composition of the present disclosure.

Use as a refrigerator oil according to a sixteenth viewpoint of the second group is the use as a refrigerator oil of the fifteenth viewpoint of the second group, wherein the kinematic viscosity of the refrigerator oil at 40° C. is 1 $mm^2/s$ or more and 750 $mm^2/s$ or less.

Use as a refrigerator oil according to a seventeenth viewpoint of the second group is the use as a refrigerator oil of the fifteenth viewpoint or sixteenth viewpoint of the second group, wherein the kinematic viscosity of the refrigerator oil at 100° C. is 1 $mm^2/s$ or more and 100 $mm^2/s$ or less.

Use as a refrigerator oil according to an eighteenth viewpoint of the second group is the use as a refrigerator oil of any of the fifteenth viewpoint to seventeenth viewpoint of the second group, wherein the volume resistivity of the refrigerator oil at 25° C. is $1.0\times10^{12}$ Ω·cm or more.

Use as a refrigerator oil according to a nineteenth viewpoint of the second group is the use as a refrigerator oil of any of the fifteenth viewpoint to eighteenth viewpoint of the second group, wherein the acid value of the refrigerator oil is 0.1 mgKOH/g or less.

Use as a refrigerator oil according to a twentieth viewpoint of the second group is the use as a refrigerator oil of any of the fifteenth viewpoint to nineteenth viewpoint of the second group, wherein the ash content of the refrigerator oil is 100 ppm or less.

Use as a refrigerator oil according to a twenty-first viewpoint of the second group is the use as a refrigerator oil of any of the fifteenth viewpoint to twentieth viewpoint of the second group, wherein the aniline point of the refrigerator oil is −100° C. or higher and 0° C. or lower.

(3) Third Group

No specific refrigerant circuit that can use a refrigerant having a small GWP has been investigated yet to date.

A refrigeration cycle device according to a first viewpoint of the third group comprises a refrigerant circuit and a refrigerant composition of the present disclosure. The refrigerant circuit has a compressor, a condenser, a decompression section, and an evaporator. The refrigerant composition is enclosed in the refrigerant circuit.

This refrigeration cycle device can carry out a refrigeration cycle using a refrigerant containing 1,2-difluoroethylene in the refrigerant circuit having a compressor, a condenser, a decompression section, and an evaporator, and thus makes it possible to carry out a refrigeration cycle using a refrigerant having a small GWP.

A refrigeration cycle device according to a second viewpoint of the third group is the refrigeration cycle device of the first viewpoint of the third group, wherein the refrigerant circuit further has a low-pressure receiver. The low-pressure receiver is provided in the middle of a refrigerant flow path from the evaporator toward the inlet side of the compressor.

This refrigeration cycle device makes it possible to carry out the refrigeration cycle while storing excess refrigerant in the refrigerant circuit in the low-pressure receiver.

A refrigeration cycle device according to a third viewpoint of the third group is the refrigeration cycle device of the first viewpoint or second viewpoint of the third group, wherein the refrigerant circuit further has a high-pressure receiver. The high-pressure receiver is provided in the middle of a refrigerant flow path from the condenser toward the evaporator.

This refrigeration cycle device makes it possible to carry out the refrigeration cycle while storing excess refrigerant in the refrigerant circuit in the high-pressure receiver.

A refrigeration cycle device according to a fourth viewpoint of the third group is the refrigeration cycle device of any of the first viewpoint to third viewpoint of the third group, wherein the refrigerant circuit further has a first decompression section, a second decompression section, and an intermediate pressure receiver. The first decompression section, the second decompression section, and the intermediate pressure receiver are all provided in the middle of a refrigerant flow path from the condenser toward the evaporator. The intermediate pressure receiver is provided between the first decompression section and the second decompression section in the refrigerant flow path from the condenser toward the evaporator.

This refrigeration cycle device makes it possible to carry out the refrigeration cycle while storing excess refrigerant in the refrigerant circuit in the intermediate pressure receiver.

A refrigeration cycle device according to a fifth viewpoint of the third group is the refrigeration cycle device of any of the first viewpoint to fourth viewpoint of the third group, further comprising a control section. The refrigerant circuit further has a first decompression section and a second decompression section. The first decompression section and the second decompression section are provided in the middle of a refrigerant flow path from the condenser toward the evaporator. The control section regulates both the degree of decompression of the refrigerant passing through the first decompression section and the degree of decompression of the refrigerant passing through the second decompression section.

This refrigeration cycle device makes it possible to reduce the density of the refrigerant located between the first decompression section and the second decompression section in the middle of the refrigerant flow path from the condenser toward the evaporator by controlling the respective degrees of decompression of the first decompression section and the second decompression section provided in the middle of the refrigerant flow path from the condenser toward the evaporator. This makes it easier to allow the refrigerant enclosed in the refrigerant circuit to be present in the condenser and/or evaporator in a larger amount, which makes it possible to improve the capacity.

A refrigeration cycle device according to a sixth viewpoint of the third group is the refrigeration cycle device of any of the first viewpoint to fifth viewpoint of the third group, wherein the refrigerant circuit further has a refrigerant heat exchange section. The refrigerant heat exchange section causes heat exchange between the refrigerant from the condenser toward the evaporator and the refrigerant from the evaporator toward the compressor.

In this refrigeration cycle device, the refrigerant from the evaporator toward the compressor is heated by the refrigerant from the condenser toward the evaporator in the refrigerant heat exchange section. This makes it possible to suppress liquid compression in the compressor.

(4) Fourth Group

Refrigerants having a small GWP include those that are flammable. Therefore, it is preferable to adopt an arrangement structure that makes it difficult, even when a flammable refrigerant is leaked, for the leaked refrigerant to reach the periphery of electrical equipment.

The contents of the present disclosure are in consideration of the above point, and it is intended to provide a heat exchange unit that makes it difficult, even when using a refrigerant containing at least 1,2-difluoroethylene and is flammable, for the refrigerant to reach an electrical equipment unit.

A heat exchange unit according to a first viewpoint of the fourth group is a heat exchange unit constituting a portion of a refrigeration cycle device and comprising a housing, a heat exchanger, a piping connection section, and an electrical equipment unit. The heat exchange unit is either a utilization-side unit or a heat source-side unit. The utilization-side unit and the heat source-side unit are connected to each other via communication piping. The heat exchanger is provided inside the housing, and Refrigerant A flows inside. The piping connection section is connected to the communication piping. The electrical equipment unit is provided inside the housing. Refrigerant A is a flammable refrigerant. In the state of installation of the heat exchange unit, the lower end of the electrical equipment unit is arranged at a higher position than the piping connection section.

Here, the flammable refrigerant means a refrigerant that is flammable with a flammability classification of "Class 2L" or higher according to the U.S. ANSI/ASHRAE Standard 34-2013.

Note that, although the piping connection section is not limited, it may be connected to refrigerant piping extending out from the heat exchanger directly or indirectly via another element.

Note that the form of the electrical equipment unit is not limited and it may be an electrical component box in which multiple electrical components are accommodated or it may be a substrate on which multiple electrical components are provided.

In the state of installation of this heat exchange unit, the lower end of the electrical equipment unit is arranged at a higher position than the piping connection section. Therefore, even when the flammable refrigerant containing 1,2-difluoroethylene is leaked from the piping connection section, it is unlikely to reach the electrical equipment unit because 1,2-difluoroethylene is heavier than air.

(5) Fifth Group

In the case of using a refrigerant containing at least 1,2-difluoroethylene as a refrigerant having a sufficiently small GWP, it has not yet been investigated to date how to improve the operation efficiency of a refrigeration cycle.

The contents of the present disclosure are in consideration of the above point, and it is intended to provide a refrigeration cycle device that is capable of improving the operation efficiency in the case of using a refrigerant containing at least 1,2-difluoroethylene.

A refrigeration cycle device according to a first viewpoint of the fifth group comprises a compressor, a condenser, a decompression section, an evaporator, and an injection flow path. The compressor inhales low-pressure Refrigerant A from an inhalation flow path, compresses Refrigerant A, and discharges high-pressure Refrigerant A. The condenser condenses the high-pressure Refrigerant A discharged from the compressor. The decompression section decompresses the high-pressure Refrigerant A exiting the condenser. The evaporator evaporates Refrigerant A that has been decompressed in the decompression section. The injection flow path is at least either an intermediate injection flow path or an inhalation injection flow path. The intermediate injection flow path merges a part of Refrigerant A flowing from the condenser toward the evaporator into Refrigerant A at an intermediate pressure of the compressor. The inhalation injection flow path merges a part of Refrigerant A flowing from the condenser toward the evaporator into low-pressure Refrigerant A that is to be inhaled by the compressor.

This refrigeration cycle device can improve the operation efficiency of a refrigeration cycle by using the injection flow path, while keeping the GWP sufficiently small by using a refrigerant containing 1,2-difluoroethylene.

A refrigeration cycle device according to a second viewpoint of the fifth group is the refrigeration cycle device of the first viewpoint of the fifth group, further comprising a branching flow path, an opening degree adjustment valve, and an injection heat exchanger. The branching flow path branches off from the main refrigerant flow path connecting the condenser and the evaporator. The opening degree adjustment valve is provided in the branching flow path. The injection heat exchanger causes heat exchange between the refrigerant flowing in the main refrigerant flow path and the refrigerant flowing downstream the opening degree adjustment valve in the branching flow path. The refrigerant exiting the heat exchanger for injection and flowing through the branching flow path flows into the injection flow path.

This refrigeration cycle device can further improve the operation efficiency of a refrigeration cycle.

A refrigeration cycle device according to a third viewpoint of the fifth group is the refrigeration cycle device of the first viewpoint or second viewpoint of the fifth group, further comprising a refrigerant storage tank provided in the main refrigerant flow path connecting the condenser and the evaporator. A gas component of the refrigerant that is accumulated inside the refrigerant storage tank flows through the injection flow path.

This refrigeration cycle device makes it possible to improve the efficiency of a refrigeration cycle while allowing excess refrigerant to be stored in the refrigerant storage tank.

A refrigeration cycle device according to a fourth viewpoint of the fifth group is the refrigeration cycle device of any of the first viewpoint to third viewpoint of the fifth group, wherein the compressor has a fixed scroll and a turning scroll. The fixed scroll has an end plate and a wrap spirally rising up from the end plate. The turning scroll meshes with the fixed scroll to form a compression chamber. The refrigerant flowing through the injection flow path merges into the compression chamber.

This refrigeration cycle device makes it possible to improve the operation efficiency of a refrigeration cycle while using the scroll compressor.

(6) Sixth Group

In the case of using a refrigerant containing at least 1,2-difluoroethylene as a refrigerant having a sufficiently small GWP, it has not yet been investigated to date how much pressure resistance is required for a refrigeration cycle device or constituent equipment thereof to be used.

For example, when a refrigeration cycle device that uses a refrigerant that has been widely used conventionally, such as R410A or R32, is upgraded to use a refrigerant containing at least 1,2-difluoroethylene while reusing the existing communication piping, there may be a risk that the existing communication piping is damaged when the equipment constituting the refrigeration cycle device is operated at a pressure that exceeds the pressure resistance of the existing communication piping.

The contents of the present disclosure are in consideration of the above point, and it is intended to provide a heat source unit and a refrigeration cycle device that are capable of suppressing damage to the communication piping in the case of using a refrigerant containing at least 1,2-difluoroethylene.

A heat source unit according to a first viewpoint of the sixth group comprises a compressor and a heat source-side heat exchanger. The heat source unit is connected to a utilization unit via communication piping, thereby constituting a refrigeration cycle device. The utilization unit has a utilization-side heat exchanger. In the heat source unit, Refrigerant A is used. The design pressure of the heat source unit is lower than 1.5 times the design pressure of the communication piping.

Note that the term "design pressure" means gauge pressure (same below).

In this heat source unit, the design pressure is lower than 1.5 times the design pressure of the communication piping, and therefore, the unit is operated at a pressure lower than the pressure resistance of the communication piping, so that damage to the communication piping can be suppressed even when the unit is connected to the communication piping for use.

A refrigeration cycle device according to a second viewpoint of the sixth group comprises a utilization unit, communication piping, and the heat source unit of the first viewpoint. In the refrigeration cycle device, a refrigerant containing at least 1,2-difluoroethylene is used. The design pressure of the heat source unit is equivalent to the design pressure in the refrigeration cycle device when refrigerant R22 or refrigerant R407C was used.

The term "equivalent" here means that the design pressure of the heat source unit is preferably within the range of ±10% to the design pressure in the refrigeration cycle device when refrigerant R22 or refrigerant R407C was used.

In this refrigeration cycle device, even when a refrigeration cycle device that used refrigerant R22 or refrigerant R407C is upgraded to a refrigeration cycle device that uses a refrigerant containing at least 1,2-difluoroethylene while reusing communication piping, damage to the communication piping can be suppressed by using a heat source unit having a design pressure equivalent to or the same as that before the upgrade.

A refrigeration cycle device according to a third viewpoint of the sixth group is the refrigeration cycle device of the second viewpoint of the sixth group, wherein the design pressure of the heat source unit is 3.0 MPa or more and 3.7 MPa or less.

A refrigeration cycle device according to a fourth viewpoint of the sixth group comprises a utilization unit, communication piping, and the heat source unit of the first viewpoint. In the refrigeration cycle device, a refrigerant containing at least 1,2-difluoroethylene is used. The design pressure of the heat source unit is equivalent to the design pressure in the refrigeration cycle device when refrigerant R410A or refrigerant R32 was used.

The term "equivalent" here means that the design pressure of the heat source unit is preferably within the range of ±10% to the design pressure in the refrigeration cycle device when refrigerant R410A or refrigerant R32 was used.

In this refrigeration cycle device, even when a refrigeration cycle device that used refrigerant R410A or refrigerant R32 is upgraded to a refrigeration cycle device that uses a refrigerant containing at least 1,2-difluoroethylene while reusing communication piping, damage to the communication piping can be suppressed by using a heat source unit having a design pressure equivalent to or the same as that before the upgrade.

A refrigeration cycle device according to a fifth viewpoint of the sixth group is the refrigeration cycle device of the fourth viewpoint of the sixth group, wherein the design pressure of the heat source unit is 4.0 MPa or more and 4.8 MPa or less.

A refrigeration cycle device according to a sixth viewpoint of the sixth group comprises a heat source unit, a utilization unit, and communication piping. The heat source unit has a compressor and a heat source-side heat exchanger. The utilization unit has a utilization-side heat exchanger. The communication piping connects the heat source unit and the utilization unit. In the refrigeration cycle device, a refrigerant containing at least 1,2-difluoroethylene is used. The design pressure of the heat source unit is equivalent to the design pressure in the refrigeration cycle device when refrigerant R22 or refrigerant R407C was used.

The term "equivalent" here means that the design pressure of the heat source unit is preferably within the range of ±10% to the design pressure in the refrigeration cycle device when refrigerant R22 or refrigerant R407C was used.

In this refrigeration cycle device, even when a refrigeration cycle device that used refrigerant R22 or refrigerant R407C is upgraded to a refrigeration cycle device that uses a refrigerant containing at least 1,2-difluoroethylene while reusing communication piping, damage to the communication piping can be suppressed by using a heat source unit having a design pressure equivalent to or the same as that before the upgrade.

A refrigeration cycle device according to a seventh viewpoint of the sixth group is the refrigeration cycle device of the sixth viewpoint of the sixth group, wherein the design pressure of the heat source unit is 3.0 MPa or more and 3.7 MPa or less.

A refrigeration cycle device according to an eighth viewpoint of the sixth group comprises a heat source unit, a utilization unit, and communication piping. The heat source unit has a compressor and a heat source-side heat exchanger. The utilization unit has a utilization-side heat exchanger. The communication piping connects the heat source unit and the utilization unit. In the refrigeration cycle device, a refrigerant containing at least 1,2-difluoroethylene is used. The design pressure of the heat source unit is equivalent to the design pressure in the refrigeration cycle device when refrigerant R410A or refrigerant R32 was used.

The term "equivalent" here means that the design pressure of the heat source unit is preferably within the range of ±10% to the design pressure in the refrigeration cycle device when refrigerant R410A or refrigerant R32 was used.

In this refrigeration cycle device, even when a refrigeration cycle device that used refrigerant R410A or refrigerant R32 is upgraded to a refrigeration cycle device that uses a refrigerant containing at least 1,2-difluoroethylene while reusing communication piping, damage to the communication piping can be suppressed by using a heat source unit having a design pressure equivalent to or the same as that before the upgrade.

A refrigeration cycle device according to a ninth viewpoint of the sixth group is the refrigeration cycle device of the eighth viewpoint of the sixth group, wherein the design pressure of the heat source unit is 4.0 MPa or more and 4.8 MPa or less.

A heat source unit according to a tenth viewpoint of the sixth group comprises a compressor, a heat source-side heat exchanger, and a control device. The heat source unit is connected to a utilization unit via communication piping, thereby constituting a refrigeration cycle device. The utilization unit has a utilization-side heat exchanger. In the heat source unit, a refrigerant containing at least 1,2-difluoroethylene is used as the refrigerant. The control device is configured such that the upper limit value of the control pressure of the refrigerant is set or can be set lower than 1.5 times the design pressure of the communication piping.

This heat source unit is configured such that the upper limit value of the control pressure of the refrigerant by the control device is set or can be set to lower than 1.5 times the design pressure of the communication piping. Therefore, even when the heat source unit is connected to the communication piping for use, operation control is ensured at a pressure lower than the pressure resistance of the communication piping, so that damage to the communication piping can be suppressed.

A refrigeration cycle device according to an eleventh viewpoint of the sixth group comprises a utilization unit, communication piping, and the heat source unit of the tenth viewpoint of the sixth group. In the refrigeration cycle device, a refrigerant containing at least 1,2-difluoroethylene is used. The control device is configured such that the upper limit value of the control pressure of the refrigerant is set or can be set equivalent to the upper limit value of the control pressure in the refrigeration cycle device when refrigerant R22 or refrigerant R407C was used.

The term "equivalent" here means that the upper limit value of the control pressure of the refrigerant is preferably within the range of ±10% to the upper limit value of the control pressure in the refrigeration cycle device when refrigerant R22 or refrigerant R407C was used.

In this refrigeration cycle device, even when a refrigeration cycle device that used refrigerant R22 or refrigerant R407C is upgraded to a refrigeration cycle device that uses a refrigerant containing at least 1,2-difluoroethylene while reusing communication piping, damage to the communication piping can be suppressed since the refrigeration cycle device is configured such that the upper limit value of the control pressure of the refrigerant by the control device of the heat source unit is set or can be set to equivalent to or the same as the upper limit value of the control pressure of the heat source unit of the refrigeration cycle device when refrigerant R22 or refrigerant R407C was used.

A refrigeration cycle device according to a twelfth viewpoint of the sixth group is the refrigeration cycle device of the eleventh viewpoint of the sixth group, wherein the upper limit value of the control pressure is set to 3.0 MPa or more and 3.7 MPa or less.

A refrigeration cycle device according to a thirteenth viewpoint of the sixth group comprises a utilization unit, communication piping, and the heat source unit of the tenth viewpoint. In the refrigeration cycle device, a refrigerant containing at least 1,2-difluoroethylene is used. The control device is configured such that the upper limit value of the control pressure of the refrigerant is set or can be set equivalent to the upper limit value of the control pressure in the refrigeration cycle device when refrigerant R410A or refrigerant R32 was used.

The term "equivalent" here means that the upper limit value of the control pressure of the refrigerant is preferably within the range of ±10% to the upper limit value of the control pressure in the refrigeration cycle device when refrigerant R410A or refrigerant R32 was used.

In this refrigeration cycle device, even when a refrigeration cycle device that used refrigerant R410A or refrigerant R32 is upgraded to a refrigeration cycle device that uses a refrigerant containing at least 1,2-difluoroethylene while reusing communication piping, damage to the communication piping can be suppressed since the refrigeration cycle device is configured such that the upper limit value of the control pressure of the refrigerant by the control device of the heat source unit is set or can be set to equivalent to or the same as the upper limit value of the control pressure of the heat source unit of the refrigeration cycle device when refrigerant R410A or refrigerant R32 was used.

A refrigeration cycle device according to a fourteenth viewpoint of the sixth group is the refrigeration cycle device of the thirteenth viewpoint of the sixth group, wherein the upper limit value of the control pressure is set to 4.0 MPa or more and 4.8 MPa or less.

A refrigeration cycle device according to a fifteenth viewpoint of the sixth group comprises a heat source unit, a utilization unit, communication piping, and a control device. The heat source unit has a compressor and a heat source-side heat exchanger. The utilization unit has a utilization-side heat exchanger. The communication piping connects the heat source unit and the utilization unit. In the refrigeration cycle device, a refrigerant containing at least 1,2-difluoroethylene is used. The control device is configured such that the upper limit value of the control pressure of the refrigerant is set or can be set equivalent to the upper limit value of the control pressure in the refrigeration cycle device when refrigerant R22 or refrigerant R407C was used.

The term "equivalent" here means that the upper limit value of the control pressure of the refrigerant is preferably within the range of ±10% to the upper limit value of the control pressure in the refrigeration cycle device when refrigerant R22 or refrigerant R407C was used.

In this refrigeration cycle device, even when a refrigeration cycle device that used refrigerant R22 or refrigerant R407C is upgraded to a refrigeration cycle device that uses a refrigerant containing at least 1,2-difluoroethylene while reusing communication piping, damage to the communication piping can be suppressed since the refrigeration cycle device is configured such that the upper limit value of the control pressure of the refrigerant by the control device of the heat source unit is set or can be set to equivalent to or the same as the upper limit value of the control pressure of the heat source unit of the refrigeration cycle device when refrigerant R22 or refrigerant R407C was used.

A refrigeration cycle device according to a sixteenth viewpoint of the sixth group is the refrigeration cycle device of the fifteenth viewpoint of the sixth group, wherein the upper limit value of the control pressure is set to 3.0 MPa or more and 3.7 MPa or less.

A refrigeration cycle device according to a seventeenth viewpoint of the sixth group comprises a heat source unit, a utilization unit, communication piping, and a control device. The heat source unit has a compressor and a heat source-side heat exchanger. The utilization unit has a utilization-side heat exchanger. The communication piping connects the heat source unit and the utilization unit. In the refrigeration cycle device, a refrigerant containing at least 1,2-difluoroethylene is used. The control device is configured such that the upper limit value of the control pressure of the refrigerant is set or can be set equivalent to the upper limit value of the control pressure in the refrigeration cycle device when refrigerant R410A or refrigerant R32 was used.

The term "equivalent" here means that the upper limit value of the control pressure of the refrigerant is preferably within the range of ±10% to the upper limit value of the control pressure in the refrigeration cycle device when refrigerant R410A or refrigerant R32 was used.

In this refrigeration cycle device, even when a refrigeration cycle device that used refrigerant R410A or refrigerant R32 is upgraded to a refrigeration cycle device that uses a refrigerant containing at least 1,2-difluoroethylene while reusing communication piping, damage to the communication piping can be suppressed since the refrigeration cycle device is configured such that the upper limit value of the control pressure of the refrigerant by the control device of the heat source unit is set or can be set to equivalent to or the same as the upper limit value of the control pressure of the heat source unit of the refrigeration cycle device when refrigerant R410A or refrigerant R32 was used.

A refrigeration cycle device according to an eighteenth viewpoint of the sixth group is the refrigeration cycle device of the seventeenth viewpoint of the sixth group, wherein the upper limit value of the control pressure is set to 4.0 MPa or more and 4.8 MPa or less.

(7) Seventh Group

Refrigerants having a small GWP include those that are flammable. And, in air conditioning units, electric heating devices with high power consumption may be used depending on a variety of purposes. Thus, even if a leak of a flammable refrigerant occurs in an air conditioning unit that uses an electric heating device with high power consumption, it is desired to suppress ignition in the electric heating device.

The contents of the present disclosure are in consideration of the above point, and it is intended to provide an air conditioning unit that is capable of suppressing ignition in an electric heating device even in the event of a refrigerant leak, while using a refrigerant having a small GWP.

An air conditioning unit according to a first viewpoint of the seventh group comprises a housing, equipment, and an electric heating device. The equipment is provided inside the housing. The electric heating device is provided inside the housing. The equipment is a compressor that compresses Refrigerant A and/or a heat exchanger that causes heat exchange between the outside air and Refrigerant A. The power consumption of the electric heating device is 300 W or less.

Note that the air conditioning unit is not limited, and for example, it may be a heat source unit or a utilization unit in a refrigeration cycle device such as an air conditioning device in which a heat source unit such as an outdoor unit and a utilization unit such as an indoor unit are connected via refrigerant communication piping. Note that the heat source unit may be one that has only a heat exchanger and the compressor may be provided in a separate unit.

In this air conditioning unit, a compressor that compresses a refrigerant containing 1,2-difluoroethylene and/or a heat exchanger that causes heat exchange between the outside air and the refrigerant containing 1,2-difluoroethylene are accommodated together with the electric heating device in the housing, but the power consumption of the electric heating device is 300 W or less. Therefore, even if a leak of the above refrigerant occurs, ignition in the electric heating device is suppressed.

An air conditioning unit according to a second viewpoint of the seventh group is the air conditioning unit of the first viewpoint of the seventh group, wherein the housing has an outlet formed on a side surface thereof in the state of installation for blowing out the air that has passed through the heat exchanger. The power consumption of the electric heating device is 75 W or more.

In this air conditioning unit, the power consumption of the electric heating device is 75 W or more, which makes it easy for the function of the electric heating device to be demonstrated.

The air conditioning unit according to a third viewpoint of the seventh group is the air conditioning unit of the second viewpoint of the seventh group, having one fan that causes an air flow passing through the heat exchanger to be formed. The power consumption of the electric heating device is 75 W or more and 100 W or less.

Note that the internal volume (the volume of fluid that can be filled inside) of the heat exchanger that the air conditioning unit provided with only one fan has is preferably 0.4 L or more and less than 3.5 L. Especially, for a refrigerant circuit in which the air conditioning unit is to be used and in which a refrigerant container (such as a low-pressure receiver or a high-pressure receiver, excluding an accumulator that accompanies the compressor) is not provided, the internal volume of the heat exchanger is preferably 0.4 L or more and 2.5 L or less, and for a refrigerant circuit in which a refrigerant container is provided (preferably one utilization unit, such as an indoor unit), it is preferably 1.4 L or more and less than 3.5 L.

Since the capacity of this air conditioning unit is limited by the fact that it is provided with only one fan, the function of the electric heating device is sufficiently demonstrated even with the power consumption of the electric heating device being 100 W or less.

The air conditioning unit according to a fourth viewpoint of the seventh group is the air conditioning unit of the second viewpoint of the seventh group, having two fans that cause an air flow passing through the heat exchanger to be formed. The power consumption of the electric heating device is 100 W or more.

Note that the internal volume (the volume of fluid that can be filled inside) of the heat exchanger that the air conditioning unit provided with two fans has is preferably 3.5 L or more and 7.0 L or less. Especially, for a refrigerant circuit in which the air conditioning unit is to be used and in which one or multiple utilization units such as indoor units having no expansion valve are provided, the internal volume of the heat exchanger is preferably 3.5 L or more and less than 5.0 L, and for a refrigerant circuit in which multiple utilization units such as indoor units having an expansion valve are provided, it is preferably 5.0 L or more and 7.0 L or less.

Since this air conditioning unit is provided with two fans, the capacity of the air conditioning unit is large, and the electric heating device also tends to be required to have a large capacity, but since the electric heating device used here has a power consumption of 100 W or more, the function of the electric heating device can be sufficiently demonstrated to match the capacity of the air conditioning unit.

An air conditioning unit according to a fifth viewpoint of the seventh group is the air conditioning unit of the first viewpoint of the seventh group, wherein the housing has an outlet for blowing out the air that has passed through the heat exchanger upward. The power consumption of the electric heating device is 200 W or more.

Note that the internal volume (the volume of fluid that can be filled inside) of the heat exchanger that the air conditioning unit that blows out the air that has passed through the heat exchanger upward has is preferably 5.5 L or more and 38 L or less. Such a heat exchanger having an internal volume of 5.5 L or more and 38 L or less is preferably employed in a refrigerant circuit in which multiple utilization units such as indoor units having an expansion valve are provided.

Since this air conditioning unit directs the air that has passed through the heat exchanger upward, the capacity of the air conditioning unit is large, and the electric heating device also tends to be required to have a large capacity, but since the electric heating device used here has a power consumption of 200 W or more, the function of the electric heating device can be sufficiently demonstrated to match the capacity of the air conditioning unit.

An air conditioning unit according to a sixth viewpoint of the seventh group is the air conditioning unit of any of the first viewpoint to fifth viewpoint of the seventh group, wherein the electric heating device is at least any of a drain pan heater, a crank case heater, and a refrigerant heater.

When this air conditioning unit is provided with a drain pan heater, it makes it possible to suppress freezing of dew condensation water on the drain pan in an air conditioning unit provided with a drain pan; when it is provided with a crank case heater, it makes it possible to suppress occurrence of foam of the refrigerator oil (oil foaming) at the time of starting of the compressor in an air conditioning unit provided with a compressor; and when it is provided with a refrigerant heater, it makes it possible to heat the refrigerant in a refrigerant circuit.

(8) Eighth Group

As an index when considering prevention of global warming, there is an index called the life cycle climate performance (LCCP). This LCCP is an index when considering prevention of global warming, and is a numerical value expressed in kg-$CO_2$, obtained by adding energy consumption (indirect impact) and leaks to the outside air (direct impact) during production of the used greenhouse gas to the total equivalent warning impact (TEWI). That is, the TEWI is obtained by adding the direct impact and indirect impact, which are both calculated according to the prescribed mathematical expressions. This LCCP is calculated according to the following relational expression.

$$LCCP=GWPRM\times W+GWP\times W\times(1-R)+N\times Q\times A$$

where GWPRM: warming effects related to refrigerant production, W: refrigerant filling amount, R: refrigerant recovery amount at the time of equipment disposal, N: equipment usage period (years), Q: $CO_2$ emission intensity, and A: annual power consumption.

As for the LCCP of refrigeration cycle devices, when the filling amount in the refrigerant circuit is too small, the LCCP becomes large due to worsening of the cycle efficiency caused by shortage of refrigerant, and furthermore, when the filling amount in the refrigerant circuit is too large, the impact of GWP becomes high and the LCCP becomes large. In addition, refrigerants having a GWP lower than that of R32, which has been widely used conventionally, tend to have a lower heat transfer capacity, and thus the LCCP tends to be larger due to worsening of the cycle efficiency.

The contents of the present disclosure are in consideration of the above point, and it is intended to provide a refrigeration cycle device that is capable of keeping the LCCP low when carrying out a heat cycle using a refrigerant having a sufficiently small GWP, and a method for determining the amount of refrigerant to be enclosed in a refrigeration cycle device.

A refrigeration cycle device according to a first viewpoint of the eighth group comprises a heat source unit, a utilization unit, and refrigerant piping. The heat source unit has a compressor and a heat source-side heat exchanger. The utilization unit has a utilization-side heat exchanger. The refrigerant piping connects the heat source unit and the utilization unit. In a refrigerant circuit configured by connecting the compressor, the heat source-side heat exchanger, and the utilization-side heat exchanger, Refrigerant A is enclosed. The amount of refrigerant enclosed in the refrigerant circuit meets the condition of 160 g or more and 560 g or less per 1 kW of refrigeration capacity of the refrigeration cycle device.

Note that the refrigeration capacity of the refrigeration cycle device means the rated refrigeration capacity.

In this refrigeration cycle device, a refrigerant containing at least 1,2-difluoroethylene is enclosed in the refrigerant circuit in an amount of 160 g or more and 560 g or less per 1 kW of refrigeration capacity, so that the LCCP can be kept low when the heat cycle is carried out using a refrigerant having a sufficiently small GWP.

Note that, for a refrigerant circuit in which a refrigerant container (such as a low-pressure receiver or a high-pressure receiver, excluding an accumulator that accompanies the compressor) is not provided, the internal volume (the volume of fluid that can be filled inside) of the above heat source-side heat exchanger is preferably 0.4 L or more and 2.5 L or less, and for a refrigerant circuit in which a refrigerant container is provided, it is preferably 1.4 L or more and less than 5.0 L.

In addition, as for the internal volume (the volume of fluid that can be filled inside) of the heat source-side heat exchanger that a heat source unit provided with only one fan has, when the heat source unit has a housing that has an outlet formed on a side surface thereof in the state of installation for blowing out the air that has passed through the heat source-side heat exchanger (when the heat source unit is in the form of a trunk or the like), it is preferably 0.4 L or more and less than 3.5 L, and as for the internal volume (the volume of fluid that can be filled inside) of the heat source-side heat exchanger that a heat source unit provided with two fans has, when the heat source unit has a housing that has an outlet formed on a side surface thereof in the state of installation for blowing out the air that has passed through the heat source-side heat exchanger (when the heat source unit is in the form of a trunk or the like), it is preferably 3.5 L or more and less than 5.0 L.

A refrigeration cycle device according to a second viewpoint of the eighth group comprises a heat source unit, a first utilization unit, a second utilization unit, and refrigerant piping. The heat source unit has a compressor and a heat source-side heat exchanger. The first utilization unit has a first utilization-side heat exchanger. The second utilization unit has a second utilization-side heat exchanger. The refrigerant piping connects the heat source unit, the first utilization unit, and the second utilization unit. In a refrigerant circuit configured by connecting the first utilization-side heat exchanger and the second utilization-side heat exchanger to the compressor and the heat source-side heat exchanger in parallel, a refrigerant containing at least 1,2-difluoroethylene is enclosed. The amount of refrigerant enclosed in the refrigerant circuit meets the condition of 190 g or more and 1660 g or less per 1 kW of refrigeration capacity.

In this refrigeration cycle device, the refrigerant containing at least 1,2-difluoroethylene is enclosed in the refrigerant circuit that has multiple utilization-side heat exchangers connected in parallel to each other in an amount of 190 g or more and 1660 g or less per 1 kW of refrigeration capacity, so that the LCCP can be kept low when a heat cycle is carried out using a refrigerant having a sufficiently small GWP.

Note that the internal volume (the volume of fluid that can be filled inside) of the above heat source-side heat exchanger is preferably 1.4 L or more and less than 5.0 L when the first utilization unit does not have an expansion valve on the liquid side of the first utilization-side heat exchanger and the second utilization unit does not have an expansion valve on the liquid side of the second utilization-side heat exchanger either, and it is preferably 5.0 L or more and 38 L or less when the first utilization unit has an expansion valve on the liquid side of the first utilization-side heat exchanger and the second utilization unit has an expansion valve on the liquid side of the second utilization-side heat exchanger as well.

In addition, as for the internal volume (the volume of fluid that can be filled inside) of the heat source-side heat exchanger that a heat source unit provided with only one fan has, when the heat source unit has a housing that has an outlet formed on a side surface thereof in the state of installation for blowing out the air that has passed through the heat source-side heat exchanger (when the heat source unit is in the form of a trunk or the like), it is preferably 0.4 L or more and less than 3.5 L; as for the internal volume (the volume of fluid that can be filled inside) of the heat source-side heat exchanger that a heat source unit provided with two fans has, when the heat source unit has a housing that has an outlet formed on a side surface thereof in the state of installation for blowing out the air that has passed through the heat source-side heat exchanger (when the heat source unit is in the form of a trunk or the like), it is preferably 3.5 L or more and 7.0 L or less; and the internal volume (the volume of fluid that can be filled inside) of the heat source-side heat exchanger that a heat source unit that blows out the air that has passed through the heat source-side heat exchanger upward has is preferably 5.5 L or more and 38 L or less.

(9) Ninth Group

For refrigeration cycle devices in which conventional R410A or R32 is used, the pipe outer diameters of liquid-side refrigerant communication piping and gas-side refrigerant communication piping connecting a heat source unit having a heat source-side heat exchanger and a utilization unit having a utilization-side heat exchanger have been specifically investigated and proposed.

However, for refrigeration cycle devices in which a refrigerant containing at least 1,2-difluoroethylene is used as a refrigerant having a sufficiently small GWP, the pipe outer diameters of liquid-side refrigerant communication piping and gas-side refrigerant communication piping have not been investigated in any way, nor have any proposals been made.

The contents of the present disclosure are in consideration of the above point, and it is intended to provide a refrigeration cycle device that can keep reduction in capacity small in the case of using a refrigerant containing at least 1,2-difluoroethylene.

A refrigeration cycle device according to a first viewpoint of the ninth group has a refrigerant circuit in which a compressor, a heat source-side heat exchanger, a decompression section, liquid-side refrigerant communication piping, a utilization-side heat exchanger, and gas-side refrigerant communication piping are connected. In the refrigeration cycle device, Refrigerant A is used. The pipe outer diameter of the liquid-side refrigerant communication piping and the pipe outer diameter of the gas-side refrigerant communication piping are both $D_0/8$ inches (where "$D_0-1/8$ inches" is the pipe outer diameter of refrigerant communication piping when refrigerant R32 is used), and the range of the above $D_0$ is "$2 \leq D_0 \leq 4$" for the liquid-side refrigerant communication piping and the range of the above $D_0$ is "$3 \leq D_0 \leq 8$" for the gas-side refrigerant communication piping.

Note that the decompression section is not limited and it may be an expansion valve or a capillary tube. Note that the range of $D_0$ is preferably "$2 \leq D_0 \leq 3$" for the liquid-side refrigerant communication piping and the range of $D_0$ is preferably "$4 \leq D_0 \leq 7$" for the gas-side refrigerant communication piping.

This refrigeration cycle device can keep reduction in capacity small, while keeping the GWP sufficiently small by using a refrigerant containing 1,2-difluoroethylene.

Note that the refrigeration cycle device according to the first viewpoint of the ninth group may be any of the following refrigeration cycle devices, based on the difference in physical properties between Refrigerant A and refrigerant R32.

In the refrigeration cycle device according to the first viewpoint of the ninth group, the rated refrigeration capacity of the refrigeration cycle device may be 6.3 kW or more and 10.0 kW or less, the pipe outer diameter of the liquid-side refrigerant communication piping is $D_0/8$ inches (where "$D_0-1/8$ inches" is the pipe outer diameter of liquid-side refrigerant communication piping when refrigerant R32 is used), and the liquid-side refrigerant communication piping may have a $D_0$ of 3.

In the refrigeration cycle device according to the first viewpoint of the ninth group, the rated refrigeration capacity of the refrigeration cycle device may be 4.0 kW or less, the pipe outer diameter of the gas-side refrigerant communication piping is $D_0/8$ inches (where "$D_0-1/8$ inches" is the pipe outer diameter of gas-side refrigerant communication piping when refrigerant R32 is used), and the gas-side refrigerant communication piping may have a $D_0$ of 4.

In the refrigeration cycle device according to the first viewpoint of the ninth group, the rated refrigeration capacity of the refrigeration cycle device may be 6.3 kW or more and 10.0 kW or less, the pipe outer diameter of the gas-side refrigerant communication piping is $D_0/8$ inches (where "$D_0-1/8$ inches" is the pipe outer diameter of gas-side refrigerant communication piping when refrigerant R32 is used), and the gas-side refrigerant communication piping may have a $D_0$ of 5.

In the refrigeration cycle device according to the first viewpoint of the ninth group, the rated refrigeration capacity of the refrigeration cycle device may be 15.0 kW or more and 19.0 kW or less, the pipe outer diameter of the gas-side refrigerant communication piping is $D_0/8$ inches (where "$D_0-1/8$ inches" is the pipe outer diameter of gas-side refrigerant communication piping when refrigerant R32 is used), and the gas-side refrigerant communication piping may have a $D_0$ of 6.

In the refrigeration cycle device according to the first viewpoint of the ninth group, the rated refrigeration capacity of the refrigeration cycle device may be 25.0 kW or more, the pipe outer diameter of the gas-side refrigerant communication piping is $D_0/8$ inches (where "$D_0-1/8$ inches" is the pipe outer diameter of gas-side refrigerant communication piping when refrigerant R32 is used), and the gas-side refrigerant communication piping may have a $D_0$ of 7.

A refrigeration cycle device according to a second viewpoint of the ninth group is the refrigeration cycle device of the first viewpoint of the ninth group, wherein the rated refrigeration capacity of the refrigeration cycle device is greater than 5.6 kW and less than 11.2 kW and the liquid-side refrigerant communication piping has a $D_0$ of 3 (that is, the piping diameter is 3/8 inches). Note that the rated refrigeration capacity of the refrigeration cycle device is preferably 6.3 kW or more and 10.0 kW or less and the liquid-side refrigerant communication piping has a $D_0$ of 3 (that is, the piping diameter is 3/8 inches).

A refrigeration cycle device according to a third viewpoint of the ninth group is the refrigeration cycle device of the first viewpoint of the ninth group, either wherein the rated refrigeration capacity of the refrigeration cycle device is greater than 22.4 kW and the gas-side refrigerant communication piping has a $D_0$ of 7 (that is, the piping diameter is ⅞ inches); wherein the rated refrigeration capacity of the refrigeration cycle device is greater than 14.0 kW and less than 22.4 kW and the gas-side refrigerant communication piping has a $D_0$ of 6 (that is, the piping diameter is 6/8 inches); wherein the rated refrigeration capacity of the refrigeration cycle device is greater than 5.6 kW and less than 11.2 kW and the gas-side refrigerant communication piping has a $D_0$ of 5 (that is, the piping diameter is ⅝ inches); or wherein the rated refrigeration capacity of the refrigeration cycle device is less than 4.5 kW and the gas-side refrigerant communication piping has a $D_0$ of 4 (that is, the piping diameter is ½ inches). Note that it is preferable either that the rated refrigeration capacity of the refrigeration cycle device is 25.0 kW or more and the gas-side refrigerant communication piping has a $D_0$ of 7 (that is, the piping diameter is ⅞ inches); that the rated refrigeration capacity of the refrigeration cycle device is 15.0 kW or more and less than 19.0 kW and the gas-side refrigerant communication piping has a $D_0$ of 6 (that is, the piping diameter is 6/8 inches); that the rated refrigeration capacity of the refrigeration cycle device is 6.3 kW or more and less than 10.0 kW and the gas-side refrigerant communication piping has a $D_0$ of 5 (that is, the piping diameter is ⅝ inches); or that the rated refrigeration capacity of the refrigeration cycle device is less than 4.0 kW and the gas-side refrigerant communication piping has a $D_0$ of 4 (that is, the piping diameter is ½ inches).

A refrigeration cycle device according to a fourth viewpoint of the ninth group has a refrigerant circuit in which a compressor, a heat source-side heat exchanger, a decompression section, liquid-side refrigerant communication piping, a utilization-side heat exchanger, and gas-side refrigerant communication piping are connected. In the cycle device, a refrigerant containing at least 1,2-difluoroethylene is used. The pipe outer diameter of the liquid-side refrigerant communication piping and the pipe outer diameter of the gas-side refrigerant communication piping are both $D_0/8$ inches, and the range of Do is "$2 \le D_0 \le 4$" for the liquid-side refrigerant communication piping and the range of $D_0$ is "$3 \le D_0 \le 8$" for the gas-side refrigerant communication piping. The pipe outer diameter of the liquid-side refrigerant communication piping is the same as the pipe outer diameter of liquid-side refrigerant communication piping when refrigerant R410A is used, and the pipe outer diameter of the gas-side refrigerant communication piping is the same as the pipe outer diameter of gas-side refrigerant communication piping when refrigerant R410A is used.

Note that the decompression section is not limited and it may be an expansion valve or a capillary tube. Note that the range of $D_0$ is preferably "$2 \le D_0 \le 3$" for the liquid-side refrigerant communication piping and the range of $D_0$ is preferably "$4 \le D_0 \le 7$" for the gas-side refrigerant communication piping.

This refrigeration cycle device can keep reduction in capacity small, while keeping the GWP sufficiently small by using a refrigerant containing 1,2-difluoroethylene.

A refrigeration cycle device according to a fifth viewpoint of the ninth group is the refrigeration cycle device of the fourth viewpoint of the ninth group, wherein the liquid-side refrigerant communication piping has a $D_0$ of 2 (that is, the piping diameter is ¼ inches).

A refrigeration cycle device according to a sixth viewpoint of the ninth group is the refrigeration cycle device of the fourth viewpoint of the ninth group, wherein the rated refrigeration capacity of the refrigeration cycle device is 6.3 kW or more and the liquid-side refrigerant communication piping has a $D_0$ of 3 (that is, the piping diameter is ⅜ inches), or wherein the rated refrigeration capacity of the refrigeration cycle device is less than 6.3 kW and the liquid-side refrigerant communication piping has a $D_0$ of 2 (that is, the piping diameter is ¼ inches).

A refrigeration cycle device according to a seventh viewpoint of the ninth group is the refrigeration cycle device of the fourth viewpoint of the ninth group, wherein the rated refrigeration capacity of the refrigeration cycle device is 6.0 kW or more and the gas-side refrigerant communication piping has a $D_0$ of 4 (that is, the piping diameter is ½ inches), or wherein the rated refrigeration capacity of the refrigeration cycle device is less than 6.0 kW and the gas-side refrigerant communication piping has a $D_0$ of 3 (that is, the piping diameter is ⅜ inches).

A refrigeration cycle device according to an eighth viewpoint of the ninth group is the refrigeration cycle device of the fourth viewpoint of the ninth group, either wherein the rated refrigeration capacity of the refrigeration cycle device is 25.0 kW or more and the gas-side refrigerant communication piping has a $D_0$ of 7 (that is, the piping diameter is ⅞ inches); wherein the rated refrigeration capacity of the refrigeration cycle device is 15.0 kW or more and less than 25.0 kW and the gas-side refrigerant communication piping has a $D_0$ of 6 (that is, the piping diameter is 6/8 inches); wherein the rated refrigeration capacity of the refrigeration cycle device is 6.3 kW or more and less than 15.0 kW and the gas-side refrigerant communication piping has a $D_0$ of 5 (that is, the piping diameter is ⅝ inches); or wherein the rated refrigeration capacity of the refrigeration cycle device is less than 6.3 kW and the gas-side refrigerant communication piping has a $D_0$ of 4 (that is, the piping diameter is ½ inches).

A refrigeration cycle device according to a ninth viewpoint of the ninth group has a refrigerant circuit in which a compressor, a heat source-side heat exchanger, a decompression section, liquid-side refrigerant communication piping, a utilization-side heat exchanger, and gas-side refrigerant communication piping are connected. In the refrigeration cycle device, a refrigerant containing at least 1,2-difluoroethylene is used. The pipe outer diameter of the liquid-side refrigerant communication piping and the pipe outer diameter of the gas-side refrigerant communication piping are both $D_0/8$ inches, and the range of $D_0$ is "$2 \le D_0 \le 4$" for the liquid-side refrigerant communication piping and the range of $D_0$ is "$3 \le D_0 \le 8$" for the gas-side refrigerant communication piping.

Note that the decompression section is not limited and it may be an expansion valve or a capillary tube. Note that the range of $D_0$ is preferably "$2 \le D_0 \le 3$" for the liquid-side refrigerant communication piping and the range of $D_0$ is preferably "$4 \le D_0 \le 7$" for the gas-side refrigerant communication piping.

This refrigeration cycle device can keep reduction in capacity small, while keeping the GWP sufficiently small by using a refrigerant containing 1,2-difluoroethylene.

A refrigeration cycle device according to a tenth viewpoint of the ninth group is the refrigeration cycle device of the ninth viewpoint of the ninth group, wherein the liquid-side refrigerant communication piping has a $D_0$ of 2 (that is, the piping diameter is ¼ inches).

A refrigeration cycle device according to an eleventh viewpoint of the ninth group is the refrigeration cycle device of the ninth viewpoint of the ninth group, either wherein the rated refrigeration capacity of the refrigeration cycle device is 7.5 kW or more and the liquid-side refrigerant communication piping has a $D_0$ of 2.5 (that is, the piping diameter is 5⁄16 inches); wherein the rated refrigeration capacity of the refrigeration cycle device is 2.6 kW or more and less than 7.5 kW and the liquid-side refrigerant communication piping has a $D_0$ of 2 (that is, the piping diameter is ¼ inches); or wherein the rated refrigeration capacity of the refrigeration cycle device is less than 2.6 kW and the liquid-side refrigerant communication piping has a $D_0$ of 1.5 (that is, the piping diameter is 3⁄16 inches).

A refrigeration cycle device according to a twelfth viewpoint of the ninth group is the refrigeration cycle device of the ninth viewpoint of the ninth group, wherein the rated refrigeration capacity of the refrigeration cycle device is 6.3 kW or more and the liquid-side refrigerant communication piping has a $D_0$ of 3 (that is, the piping diameter is ⅜ inches), or wherein the rated refrigeration capacity of the refrigeration cycle device is less than 6.3 kW and the liquid-side refrigerant communication piping has a $D_0$ of 2 (that is, the piping diameter is ¼ inches).

A refrigeration cycle device according to a thirteenth viewpoint of the ninth group is the refrigeration cycle device of the ninth viewpoint of the ninth group, either wherein the rated refrigeration capacity of the refrigeration cycle device is 12.5 kW or more and the liquid-side refrigerant communication piping has a $D_0$ of 3 (that is, the piping diameter is ⅜ inches); wherein the rated refrigeration capacity of the refrigeration cycle device is 6.3 kW or more and less than 12.5 kW and the liquid-side refrigerant communication piping has a $D_0$ of 2.5 (that is, the piping diameter is 5⁄16 inches); or wherein the rated refrigeration capacity of the refrigeration cycle device is less than 6.3 kW and the liquid-side refrigerant communication piping has a $D_0$ of 2 (that is, the piping diameter is ¼ inches).

A refrigeration cycle device according to a fourteenth viewpoint of the ninth group is the refrigeration cycle device of the ninth viewpoint of the ninth group, wherein the rated refrigeration capacity of the refrigeration cycle device is 6.0 kW or more and the gas-side refrigerant communication piping has a $D_0$ of 4 (that is, the piping diameter is ½ inches), or wherein the rated refrigeration capacity of the refrigeration cycle device is less than 6.0 kW and the gas-side refrigerant communication piping has a $D_0$ of 3 (that is, the piping diameter is ⅜ inches).

A refrigeration cycle device according to a fifteenth viewpoint of the ninth group is the refrigeration cycle device of the ninth viewpoint of the ninth group, either wherein the rated refrigeration capacity of the refrigeration cycle device is 6.0 kW or more and the gas-side refrigerant communication piping has a $D_0$ of 4 (that is, the piping diameter is ½ inches); wherein the rated refrigeration capacity of the refrigeration cycle device is 3.2 kW or more and less than 6.0 kW and the gas-side refrigerant communication piping has a $D_0$ of 3 (that is, the piping diameter is ⅜ inches); or wherein the rated refrigeration capacity of the refrigeration cycle device is less than 3.2 kW and the gas-side refrigerant communication piping has a $D_0$ of 2.5 (that is, the piping diameter is 5⁄16 inches).

A refrigeration cycle device according to a sixteenth viewpoint of the ninth group is the refrigeration cycle device of the ninth viewpoint of the ninth group, either wherein the rated refrigeration capacity of the refrigeration cycle device is 25.0 kW or more and the gas-side refrigerant communication piping has a $D_0$ of 7 (that is, the piping diameter is ⅞ inches); wherein the rated refrigeration capacity of the refrigeration cycle device is 15.0 kW or more and less than 25.0 kW and the gas-side refrigerant communication piping has a $D_0$ of 6 (that is, the piping diameter is 6⁄8 inches); wherein the rated refrigeration capacity of the refrigeration cycle device is 6.3 kW or more and less than 15.0 kW and the gas-side refrigerant communication piping has a $D_0$ of 5 (that is, the piping diameter is ⅝ inches); or wherein the rated refrigeration capacity of the refrigeration cycle device is less than 6.3 kW and the gas-side refrigerant communication piping has a $D_0$ of 4 (that is, the piping diameter is ½ inches).

(10) Tenth Group

In recent years, from the viewpoint of environmental protection, refrigerants with a low global warming potential (GWP) (hereinafter, referred to as low-GWP refrigerants) have been investigated as refrigerants to be used for air conditioners. A promising low-GWP refrigerant is a mixed refrigerant containing 1,2-difluoroethylene.

However, there is little prior art that considers the aspect of increasing the efficiency of air conditioners that use the above refrigerant. When attempting to apply the above refrigerant to air conditioners, the challenge of how to accomplish high efficiency of the compressor is present.

A compressor according to a first viewpoint of the tenth group comprises a compression section and a motor. The compression section compresses Refrigerant A. The motor has a rotor that contains a permanent magnet and drives the compression section.

The compressor is suited for variable displacement compressors in which the number of rotations of the motor can be changed because the motor has a rotor containing a permanent magnet. In this case, in an air conditioner using a mixed refrigerant containing at least 1,2-difluoroethylene, the number of motor rotations can be changed depending on the air conditioning load, which enables the compressor to be made highly efficient.

A compressor according to a second viewpoint of the tenth group is the compressor of the first viewpoint of the tenth group, wherein the rotor is an embedded magnet rotor. In the embedded magnet rotor, the permanent magnet is embedded in the rotor.

A compressor according to a third viewpoint of the tenth group is the compressor of the first viewpoint or second viewpoint of the tenth group, wherein the rotor is formed by stacking multiple electromagnetic steel plates in the plate thickness direction. The thickness of the electromagnetic steel plates is 0.05 mm or more and 0.5 mm or less.

In general, as the plate thickness becomes thinner, eddy current loss can be reduced, but considering the fact that, when the plate thickness is less than 0.05 mm, it is difficult to process the electromagnetic steel plates, and when the plate thickness is greater than 0.5 mm, it takes more time to perform siliconizing treatment from the steel plate surface and diffusion treatment to optimize the Si distribution, the plate thickness is desirably 0.05 to 0.5 mm.

A compressor according to a fourth viewpoint of the tenth group is the compressor of the first viewpoint or second viewpoint of the tenth group, wherein the rotor is formed by stacking multiple plates of amorphous metal in the plate thickness direction.

In this compressor, a motor with low iron loss and high efficiency is realized, which enables the compressor to be made highly efficient.

A compressor according to a fifth viewpoint of the tenth group is the compressor of the first viewpoint or second viewpoint of the tenth group, wherein the rotor is formed by stacking multiple electromagnetic steel plates containing 5% by mass or more of silicon in the plate thickness direction.

In this compressor, by the electromagnetic steel plates that are allowed to contain an appropriate amount of silicon to reduce hysteresis, a motor with low iron loss and high efficiency is realized, which enables the compressor to be made highly efficient.

A compressor according to a sixth viewpoint of the tenth group is the compressor of any one of the first viewpoint to fifth viewpoint of the tenth group, wherein the permanent magnet is a Nd—Fe—B magnet.

In this compressor, a motor that can increase the magnetic energy product is realized, which enables the compressor to be made highly efficient.

A compressor according to a seventh viewpoint of the tenth group is the compressor of any one of the first viewpoint to sixth viewpoint of the tenth group, wherein the permanent magnet is formed by grain boundary diffusion of heavy rare earth.

In this compressor, the demagnetization resistance of the permanent magnet is improved and the holding power of the permanent magnet can be increased with a small amount of heavy rare earth, which enables the compressor to be made highly efficient.

A compressor according to an eighth viewpoint of the tenth group is the compressor of the sixth viewpoint of the tenth group, wherein the permanent magnet contains 1% by mass or less of dysprosium.

In this compressor, the holding power of the permanent magnet is improved, which enables the compressor to be made highly efficient.

A compressor of a ninth viewpoint of the tenth group is the compressor of any one of the first viewpoint to eighth viewpoint of the tenth group, wherein the permanent magnet has an average crystalline particle diameter of 10 μm or less.

In this compressor, the demagnetization resistance of the permanent magnet is improved, which enables the compressor to be made highly efficient.

A compressor according to a tenth viewpoint of the tenth group is the compressor of the first viewpoint or second viewpoint of the tenth group, wherein the permanent magnet is in the form of a flat plate and multiple plates of the permanent magnet are embedded in the rotor so as to form a V-shape. The holding power at the part located in the valley of the V-shape is set higher than the other parts by $\{1/(4n)\}\times10^3$ [A/m] or more.

In this compressor, demagnetization of the permanent magnet is suppressed, which enables the compressor to be made highly efficient.

A compressor according to an eleventh viewpoint of the tenth group is the compressor of the first viewpoint or second viewpoint of the tenth group, wherein the rotor is formed by stacking multiple high-tensile electromagnetic steel plates with a tensile strength of 400 MPa or more in the plate thickness direction.

In this compressor, the durability of the rotor during high-speed rotation is improved, which enables the compressor to be made highly efficient.

A compressor according to a twelfth viewpoint of the tenth group is the compressor of the eleventh viewpoint of the tenth group, wherein the permanent magnet forms a flat plate having a predetermined thickness. The rotor has an accommodation hole, a non-magnetic space, and a bridge. In the accommodation hole, multiple permanent magnets are embedded. The non-magnetic space extends from an end of each permanent magnet accommodated in the accommodation hole to the vicinity of the rotor surface. The bridge is located outside the non-magnetic space and couples magnetic poles together. The thickness of the bridge is 3 mm or more.

In this compressor, the durability during high-speed rotation is improved, which enables the compressor to be made highly efficient.

A compressor according to a thirteenth viewpoint of the tenth group is the compressor of the first viewpoint of the tenth group, wherein the rotor is a surface magnet rotor. In the surface magnet rotor, the permanent magnet is pasted on the rotor surface.

A refrigeration cycle device according to a fourteenth viewpoint of the tenth group is a refrigeration cycle device comprising the compressor of any one of the first viewpoint to thirteenth viewpoint of the tenth group.

(11) Eleventh Group

In International Publication No. WO 2015/141678, a variety of low-GWP mixed refrigerants that can replace R410A are proposed.

Also, as for refrigeration cycle devices using R32 as the refrigerant, for example, as described in Japanese Patent Laid-Open No. 2002-54888, it is proposed that the piping diameter of the heat transfer pipe that the heat exchanger has should be set to 7 mm or more and 10 mm or less in order to increase energy efficiency when using R32 as the refrigerant.

However, there has been no investigation to date on the piping diameter of the heat transfer pipe of a heat exchanger that can keep the amount of refrigerant to be retained low while reducing the pressure loss in the case of using a refrigerant containing at least 1,2-difluoroethylene as a refrigerant having a sufficiently small GWP.

The contents of the present disclosure are in consideration of the above point, and it is intended to provide a refrigeration cycle device that can keep the amount of refrigerant to be retained low while reducing the pressure loss in the case of using a refrigerant containing at least 1,2-difluoroethylene.

A refrigeration cycle device according to a first viewpoint of the eleventh group comprises a refrigerant circuit and Refrigerant A. The refrigerant circuit has a compressor, a heat source-side heat exchanger, a decompression section, and a utilization-side heat exchanger. Refrigerant A is enclosed in the refrigerant circuit. The heat source-side heat exchanger has a heat transfer pipe with a piping diameter of 6.35 mm or more and less than 10.0 mm.

Note that the decompression section is not limited and it may be an expansion valve or a capillary tube.

This refrigeration cycle device can keep the amount of refrigerant to be retained low while keeping the GWP sufficiently small by using the refrigerant containing 1,2-difluoroethylene and reducing the pressure loss.

A refrigeration cycle device according to a second viewpoint of the eleventh group is the refrigeration cycle device of the first viewpoint of the eleventh group, wherein the heat source-side heat exchanger has a heat transfer pipe with a piping diameter of either 6.35 mm, 7.0 mm, 8.0 mm, or 9.5 mm.

A refrigeration cycle device according to a third viewpoint of the eleventh group is the refrigeration cycle device of the first viewpoint or second viewpoint of the eleventh group, wherein the heat source-side heat exchanger has a heat transfer pipe with a piping diameter of 7.0 mm or more.

A refrigeration cycle device according to a fourth viewpoint of the eleventh group comprises a refrigerant circuit and a refrigerant. The refrigerant circuit has a compressor, a heat source-side heat exchanger, a decompression section, and a utilization-side heat exchanger. The refrigerant is enclosed in the refrigerant circuit and contains at least 1,2-difluoroethylene is used. The utilization-side heat exchanger has a heat transfer pipe with a piping diameter of 4.0 mm or more and less than 10.0 mm.

This refrigeration cycle device can keep the amount of refrigerant to be retained low while keeping the GWP sufficiently small by using the refrigerant containing 1,2-difluoroethylene and reducing the pressure loss.

A refrigeration cycle device according to a fifth viewpoint of the eleventh group is the refrigeration cycle device of the fourth viewpoint of the eleventh group, wherein the utilization-side heat exchanger has a heat transfer pipe with a piping diameter of 8.0 mm or less.

A refrigeration cycle device according to a sixth viewpoint of the eleventh group is the refrigeration cycle device of the fourth viewpoint or fifth viewpoint of the eleventh group, wherein the utilization-side heat exchanger has a heat transfer pipe with a piping diameter of either 4.0 mm, 5.0 mm, 6.35 mm, 7.0 mm, or 8.0 mm.

(12) Twelfth Group

In recent years, from the viewpoint of environmental protection, refrigerants with a low global warming potential (GWP) (hereinafter, referred to as low-GWP refrigerants) have been investigated as refrigerants to be used for air conditioners. A promising low-GWP refrigerant is a mixed refrigerant containing 1,2-difluoroethylene.

However, there is little prior art that considers the aspect of increasing the efficiency of air conditioners that use the above refrigerant. When attempting to apply the above refrigerant to air conditioners, the challenge of how to accomplish high power output of the compressor is present.

A compressor according to a first viewpoint of the twelfth group comprises a compression section that compresses Refrigerant A and an induction motor that drives the compression section.

As described above, by employing the induction motor in the compressor that compresses Refrigerant A, it becomes possible to achieve high power output at a relatively low cost.

A compressor according to a second viewpoint of the twelfth group is the compressor of the first viewpoint of the twelfth group, wherein a rotor of the induction motor has multiple conductor rods that are rod-like conductors and are arranged in an annular shape, and an end ring that short-circuits the multiple conductor rods at an end in the axial direction. At least the conductor rods are formed of a metal with lower electrical resistance than aluminum.

In this compressor, the heat generated by the current flowing through the conductor rods of the induction motor is suppressed, which makes it possible to achieve high power output.

A compressor according to a third viewpoint of the twelfth group is the compressor of the first viewpoint of the twelfth group, wherein a rotor the induction motor has a heat dissipation structure.

In this compressor, the temperature rise of the rotor of the induction motor is suppressed, which makes it possible to achieve high power output.

A compressor according to a fourth viewpoint of the twelfth group is the compressor of the third viewpoint of the twelfth group, wherein the rotor of the induction motor has multiple conductor rods that are rod-like conductors and are arranged in an annular shape, and an end ring that short-circuits the multiple conductor rods at an end in the axial direction. The heat dissipation structure is formed in the end ring.

In this compressor, since the heat dissipation structure itself rotates, the heat dissipation property is improved, and since the rotation causes forced convection, the temperature rise in the surrounding area is suppressed, which makes it possible to achieve high power output.

A compressor according to a fifth viewpoint of the twelfth group is the compressor of the third viewpoint or fourth viewpoint of the twelfth group, wherein the heat dissipation structure is a heat sink.

In this compressor, the heat sink can be molded integrally when molding the end ring of the induction motor, which makes it possible to achieve high power output at a relatively low cost.

A compressor according to a sixth viewpoint of the twelfth group is the compressor of the first viewpoint of the twelfth group, further comprising a cooling structure that cools a stator of the induction motor with the refrigerant.

In this compressor, the induction motor is cooled, which makes it possible to achieve high power output.

A compressor according to a seventh viewpoint of the twelfth group is the compressor of the sixth viewpoint of the twelfth group, wherein the cooling structure cools the stator with cold energy of a refrigerant flowing through a refrigerant circuit to which the compressor is connected.

A refrigeration cycle device according to an eighth viewpoint of the twelfth group is a refrigeration cycle device comprising the compressor of any one of the first viewpoint to seventh viewpoint of the twelfth group.

(13) Thirteenth Group

In recent years, from the viewpoint of environmental protection, refrigerants with a low global warming potential (GWP) (hereinafter, referred to as low-GWP refrigerants) have been investigated as refrigerants to be used for air conditioners. A promising low-GWP refrigerant is an azeotropic mixed refrigerant containing 1,2-difluoroethylene.

However, there is little prior art that considers the aspect of increasing the efficiency of air conditioners that use the above refrigerant. For example, when attempting to apply the above refrigerant to air conditioners, the challenge of how to accomplish high efficiency is present.

An air conditioner according to a first viewpoint of the thirteenth group comprises a compressor that compresses Refrigerant A and a power conversion device. The power conversion device has a motor that drives the compressor and a switching element connected between an AC power source and the motor, and controls the switching element such that the power output of the motor meets the target value.

In an air conditioner using a mixed refrigerant containing at least 1,2-difluoroethylene, the number of motor rotations of the compressor can be changed depending on the air conditioning load, which makes it possible to realize a high annual performance factor (APF).

An air conditioner according to a second viewpoint of the thirteenth group is the air conditioner of the first viewpoint of the thirteenth group, wherein the power conversion device includes a rectifier circuit and a capacitor. The rectifier circuit rectifies an AC voltage of the AC power source. The capacitor is connected in parallel to the output side of the rectifier circuit and smooths out voltage fluctuation caused by switching of the power conversion device.

In this air conditioner, no electrolytic capacitor is required on the output side of the rectifier circuit, thereby suppressing increase in size and increase in cost of the circuit.

An air conditioner according to a third viewpoint of the thirteenth group is the air conditioner of the first viewpoint or second viewpoint of the thirteenth group, wherein the AC power source is a single phase power source.

An air conditioner according to a fourth viewpoint of the thirteenth group is the air conditioner of the first viewpoint or second viewpoint of the thirteenth group, wherein the AC power source is a three phase power source.

An air conditioner according to a fifth viewpoint of the thirteenth group is the air conditioner of the first viewpoint of the thirteenth group, wherein the power conversion device is an indirect matrix converter including a converter and an inverter. The converter converts an AC voltage of the AC power source to a DC voltage. The inverter converts a DC voltage into an AC voltage and supplies it to the motor.

This air conditioner is highly efficient and also does not require an electrolytic capacitor at the output side of the rectifier circuit, thereby suppressing increase in size and increase in cost of the circuit.

An air conditioner according to a sixth viewpoint of the thirteenth group is the air conditioner of the first viewpoint of the thirteenth group, wherein the power conversion device is a matrix converter that directly converts an AC voltage of the AC power source into an AC voltage with a predetermined frequency and supplies it to the motor.

This air conditioner is highly efficient and also does not require an electrolytic capacitor at the output side of the rectifier circuit, thereby suppressing increase in size and increase in cost of the circuit.

An air conditioner according to a seventh viewpoint of the thirteenth group is the air conditioner of the first viewpoint of the thirteenth group, wherein the compressor is any of a scroll compressor, a rotary compressor, a turbo compressor, and a screw compressor.

An air conditioner according to an eighth viewpoint of the thirteenth group is the air conditioner of any of the first viewpoint to seventh viewpoint of the thirteenth group, wherein the motor is a permanent magnet synchronous motor having a rotor containing a permanent magnet.

(14) Fourteenth Group

In recent years, from the viewpoint of environmental protection, refrigerants with a low global warming potential (GWP) (hereinafter, referred to as low-GWP refrigerants) have been investigated as refrigerants to be used for air conditioners. A promising low-GWP refrigerant is an azeotropic mixed refrigerant containing 1,2-difluoroethylene.

However, there is little prior art that considers the aspect of increasing the efficiency of air conditioners that use the above refrigerant. For example, when attempting to apply the above refrigerant to air conditioners, the challenge of how to accomplish high efficiency is present.

An air conditioner according to a first viewpoint of the fourteenth group comprises a compressor that compresses Refrigerant A, a motor that drives the compressor, and a connection section that supplies electric power from an AC power source to the motor without frequency conversion.

In the air conditioner in which the mixed refrigerant containing at least 1,2-difluoroethylene is used, the compressor can be driven without an intervening power conversion device between the AC power source and the motor, which makes it possible to provide an air conditioner with consideration for environmental protection in a relatively inexpensive configuration.

An air conditioner according to a second viewpoint of the fourteenth group is the air conditioner of the first viewpoint of the fourteenth group, wherein the connection section directly applies an AC voltage of the AC power source between at least two terminals of the motor.

An air conditioner according to a third viewpoint of the fourteenth group is the air conditioner of the first viewpoint or second viewpoint of the fourteenth group, wherein the AC power source is a single phase power source.

An air conditioner according to a fourth viewpoint of the fourteenth group is the air conditioner of any of the first viewpoint to third viewpoint of the fourteenth group, wherein a starting circuit is connected in series with one terminal of the motor.

An air conditioner according to a fifth viewpoint of the fourteenth group is the air conditioner of the fourth viewpoint of the fourteenth group, wherein the starting circuit is a circuit in which a positive coefficient thermistor and an operation capacitor are connected in parallel.

In the air conditioner in which the mixed refrigerant containing at least 1,2-difluoroethylene is used, after starting up the compressor, the positive coefficient thermistor heats itself up and increases its resistance value, substantially switching to an operation circuit with the operation capacitor, so that the compressor is in a state where it can output a rated torque in a timely manner.

An air conditioner according to a sixth viewpoint of the fourteenth group is the air conditioner of the first viewpoint or second viewpoint of the fourteenth group, wherein the AC power source is a three phase power source.

Since this air conditioner does not require a starting circuit, it is relatively inexpensive.

An air conditioner of a seventh viewpoint of the fourteenth group is the air conditioner of any of the first viewpoint to sixth viewpoint of the fourteenth group, wherein the motor is an induction motor.

In this air conditioner, the motor is relatively low cost and capable of high power output, making it possible to increase the efficiency of the air conditioner.

(15) Fifteenth Group

Conventionally, warm water production devices that produce warm water with a boiler or electric heater have been widely spread. There are also warm water production devices that employ a heat pump unit as the heat source.

Conventional warm water production devices that employ a heat pump unit often use carbon dioxide as the refrigerant in the heat pump unit. However, there is a demand to produce warm water more efficiently than conventional warm water production devices.

A warm water production device according to a first viewpoint of the fifteenth group uses Refrigerant A. This warm water production device comprises a compressor, a first heat exchanger on the heat source side, an expansion mechanism, and a second heat exchanger on the utilization side. The second heat exchanger causes heat exchange between the mixed refrigerant flowing inside thereof and first water, thereby heating the first water.

In this warm water production device, the above mixed refrigerant is used as the refrigerant instead of carbon dioxide, which has been often used conventionally. This makes it possible to produce warm water with high efficiency.

A warm water production device according to a second viewpoint of the fifteenth group is the warm water production device of the first viewpoint of the fifteenth group, further comprising a tank and a circulation flow path. The circulation flow path circulates the first water between the tank and the second heat exchanger.

A warm water production device according to a third viewpoint of the fifteenth group is the warm water production device of the first viewpoint of the fifteenth group, further comprising a first circulation flow path, a second circulation flow path, a third heat exchanger, and a tank. The first circulation flow path circulates the first water that has been heated by the second heat exchanger. The second circulation flow path is a circulation flow path that is separate from the first circulation flow path. The third heat exchanger causes heat exchange between the first water flowing in the first circulation flow path and second water flowing in the second circulation flow path, thereby heating the second water flowing in the second circulation flow path. The tank stores the second water that has been heated by the third heat exchanger.

A warm water production device according to a fourth viewpoint of the fifteenth group is the warm water production device of the first viewpoint of the fifteenth group, further comprising a first circulation flow path and a tank. The first circulation flow path circulates the first water that has been heated by the second heat exchanger. A part of the first circulation flow path is arranged in the tank, and causes heat exchange between the first water flowing in the first circulation flow path and second water in the tank, thereby heating the second water in the tank.

A warm water production device according to a fifth viewpoint of the fifteenth group is the warm water production device of the first viewpoint of the fifteenth group, further comprising a tank, a first circulation flow path, a third heat exchanger, a second circulation flow path, and a third flow path. The first circulation flow path circulates the first water between the second heat exchanger and the tank. The second circulation flow path circulates the first water between the third heat exchanger and the tank. The third flow path is a flow path that is separate from the first circulation flow path and the second circulation flow path. The third heat exchanger causes heat exchange between the first water flowing from the tank and third water flowing in the third flow path, thereby heating the third water flowing in the third flow path.

A warm water production device according to a sixth viewpoint of the fifteenth group is the warm water production device of the first viewpoint of the fifteenth group, further comprising a tank, a first circulation flow path, and a second flow path. The first circulation flow path circulates the first water between the tank and the second heat exchanger. The second flow path is a flow path that is separate from the first circulation flow path. A part of the second flow path is arranged in the tank, and causes heat exchange between the first water in the tank and second water flowing in the second flow path, thereby heating the second water flowing in the second flow path.

A warm water production device according to a seventh viewpoint of the fifteenth group is the warm water production device of the first viewpoint of the fifteenth group, further comprising a tank for storing the first water and a flow path in which second water flows. A part of the flow path is arranged in the tank. In the tank, the second heat exchanger heats the first water that is stored in the tank. The first water stored in the tank heats the second water flowing in the flow path.

A warm water production device according to an eighth viewpoint of the fifteenth group is the warm water production device of the first viewpoint of the fifteenth group, further comprising a tank and a flow path that allows the first water to flow from a water supply source to the tank. The second heat exchanger heats the first water flowing in the flow path.

A warm water production device according to a ninth viewpoint of the fifteenth group is the warm water production device of any of the first viewpoint to eighth viewpoint of the fifteenth group, further comprising a fourth heat exchanger on the utilization side and a fourth circulation flow path. The fourth heat exchanger is a heat exchanger that is separate from the second heat exchanger. In the fourth circulation flow path, fourth water for cooling or heating flows. The fourth heat exchanger causes heat exchange between a mixed refrigerant flowing inside thereof and the fourth water flowing in the fourth circulation flow path, thereby cooling or heating the fourth water.

(16) Sixteenth Group

Conventionally, there have been refrigeration cycle devices comprising a heat exchanger, for example, as described in Japanese Patent Laid-Open No. 11-256358. Like this heat exchanger of the refrigeration cycle device, a copper pipe is sometimes used for the heat transfer pipe. However, heat exchangers that use a copper pipe as the heat transfer pipe are expensive.

As such, for refrigeration cycle devices comprising a heat exchanger, the challenge of reducing material costs is present.

A refrigeration cycle device according to a first viewpoint of the sixteenth group comprises flammable Refrigerant A, an evaporator for evaporating the refrigerant, and a condenser for condensing the refrigerant, wherein at least one of the evaporator and the condenser is a heat exchanger that has multiple fins made of aluminum or an aluminum alloy and multiple heat transfer pipes made of aluminum or an aluminum alloy and causes heat exchange between a refrigerant flowing inside the heat transfer pipes and a fluid flowing along the fins, and is configured such that the refrigerant is circulated between the evaporator and the condenser to repeat a refrigeration cycle.

Since this refrigeration cycle device has multiple fins made of aluminum or an aluminum alloy and multiple heat transfer pipes made of aluminum or an aluminum alloy, the material costs of the heat exchanger can be reduced compared to the case of using a copper pipe for the heat transfer pipe, for example.

A refrigeration cycle device according to a second viewpoint of the sixteenth group is the refrigeration cycle device of the first viewpoint of the sixteenth group, wherein each of the multiple fins has multiple holes, the multiple heat transfer pipes penetrate the multiple holes of the multiple fins, and the outer circumference of the multiple heat transfer pipes is in close contact with the inner circumference of the multiple holes.

A refrigeration cycle device according to a third viewpoint of the sixteenth group is the refrigeration cycle device of the first viewpoint of the sixteenth group, wherein the multiple heat transfer pipes are multiple flat pipes and the planar sections of flat pipes adjacent to each other are arranged so as to face each other.

A refrigeration cycle device according to a fourth viewpoint of the sixteenth group is the refrigeration cycle device of the third viewpoint of the sixteenth group, wherein each of the multiple fins is bent into the form of a wave and arranged between the planar sections of flat pipes adjacent to each other, and connected so as to transfer heat to the planar sections.

A refrigeration cycle device according to a fifth viewpoint of the sixteenth group is the refrigeration cycle device of the third viewpoint of the sixteenth group, wherein each of the multiple fins has multiple cutouts and the multiple flat pipes are inserted into the multiple cutouts of the multiple fins and connected so as to transfer heat to the multiple fins.

(17) Seventeenth Group

Conventionally, multi-type air conditioning devices have been known as air conditioning devices that adjust the air of multiple rooms indoors with a single appliance.

Multi-type air conditioning devices comprise a first indoor machine and a second indoor machine that are arranged in different rooms. In such air conditioning devices, the refrigerant is circulated in the first indoor machine and the second indoor machine, and therefore, the amount of refrigerant to be filled in the air conditioning device is large.

For air conditioning devices that adjust the air in multiple rooms indoors, the challenge of reducing the amount of refrigerant to be filled in the air conditioning device is present.

An air conditioning device according to a first viewpoint of the seventeenth group includes a compressor, a utilization-side heat exchanger for causing heat exchange of first air, a heat source-side heat exchanger for causing heat exchange of second air, and Refrigerant A, and comprises a refrigerant that is circulated in the compressor, the utilization-side heat exchanger, and the heat source-side heat exchanger to repeat a refrigeration cycle, a first duct that supplies the first air to multiple rooms indoors, and a casing that is connected to the first duct, has a utilization-side space that accommodates the utilization-side heat exchanger, and is configured to send out the first air that has undergone heat exchange with the refrigerant in the utilization-side heat exchanger to the first duct.

In this air conditioning device, the number of indoor-side heat exchangers is reduced compared to an air conditioning device in which multiple indoor machines are arranged in multiple rooms, and therefore, the amount of refrigerant to be filled in the air conditioning device can be reduced.

An air conditioning device according to a second viewpoint of the seventeenth group is the air conditioning device of the first viewpoint of the seventeenth group, comprising a second duct for taking in the first air from the rooms indoors, a utilization-side unit that has the casing and is configured to connect the casing to the second duct and to lead the first air taken in from the rooms indoors to the utilization-side heat exchanger, and a heat source-side unit that accommodates the heat source-side heat exchanger and is separate from the utilization-side unit.

In this air conditioning device, the utilization-side unit and the heat source-side unit are separate, which facilitates installation of the air conditioning device.

An air conditioning device according to a third viewpoint of the seventeenth group is the air conditioning device of the first viewpoint of the seventeenth group, comprising a third duct for taking in the first air from outdoors, a utilization-side unit that has the casing and is configured to connect the casing to the third duct and to lead the first air taken in from the outdoors to the utilization-side heat exchanger, and a heat source-side unit that accommodates the heat source-side heat exchanger and is separate from the utilization-side unit.

In this air conditioning device, the utilization-side unit and the heat source-side unit are separate, which facilitates installation of the air conditioning device.

An air conditioning device according to a fourth viewpoint of the seventeenth group is the air conditioning device of the first viewpoint of the seventeenth group, comprising a second duct that is connected to the casing and supplies the first air taken in from the rooms indoors to the utilization-side space, wherein the casing has a partition plate that partitions off a heat source-side space through which the second air taken in from outdoors passes from the utilization-side space and blocks distribution of air between the heat source-side space and the utilization-side space, and the heat source-side heat exchanger is arranged in the heat source-side space.

In this air conditioning device, in one casing, the utilization-side heat exchanger and the heat source-side heat exchanger are accommodated respectively in the utilization-side space and the heat source-side space partitioned off by the partition plate in the same casing, which makes it easier to install the air conditioning device using a limited space.

(18) Eighteenth Group

In a refrigeration cycle using a zeotropic mixed refrigerant, when the refrigerant is evaporated at a constant pressure in a heat source-side heat exchanger, the capacity of heat exchange is not fully demonstrated.

A refrigeration cycle according to a first viewpoint of the eighteenth group is a refrigeration cycle using Refrigerant A, which is a flammable refrigerant, and comprises a compressor, a heat source-side heat exchanger, an expansion mechanism, a utilization-side heat exchanger, and a decompression mechanism. The decompression mechanism decompresses the mixed refrigerant flowing through the heat source-side heat exchanger, which functions as an evaporator, between the inlet and outlet of the heat source-side heat exchanger.

Here, when the refrigerant is evaporated in the heat source-side heat exchanger, the decompression mechanism reduces the pressure of the refrigerant during the process. By doing so, the difference in evaporating temperature at the inlet and outlet of the heat source-side heat exchanger, which occurs when the refrigerant is evaporated at a constant pressure, can be made smaller. As a result, the capacity of heat exchange can be ensured and performance of the refrigeration cycle is improved.

A refrigeration cycle according to a second viewpoint of the eighteenth group is the refrigeration cycle according to the first viewpoint of the eighteenth group, wherein the decompression mechanism decompresses the mixed refrigerant flowing in the heat source-side heat exchanger depending on the temperature gradient of the mixed refrigerant.

A refrigeration cycle according to a third viewpoint of the eighteenth group is the refrigeration cycle of the first viewpoint or second viewpoint of the eighteenth group, wherein the heat source-side heat exchanger has a first heat exchange section and a second heat exchange section. The decompression mechanism is arranged between the first heat exchange section and the second heat exchange section.

A refrigeration cycle according to a fourth viewpoint of the eighteenth group is the refrigeration cycle of any of the first viewpoint to fourth viewpoint of the eighteenth group, wherein the utilization-side heat exchanger is arranged in a utilization unit. The utilization-side heat exchanger has a third heat exchange section located on the front side of the utilization unit and a fourth heat exchange section located on the rear side of the utilization unit. At the vicinity of the top of the third heat exchange section, the top of the fourth heat exchange section is located. The third heat exchange section extends diagonally downward from its top toward the front side of the utilization unit. The fourth heat exchange section extends diagonally downward from its top toward the rear side of the utilization unit. The volume of a refrigerant flow path of the third heat exchange section is larger than the volume of a refrigerant flow path of the fourth heat exchange section.

Here, the third heat exchange section, which is located on the front side of the utilization unit, has a larger volume of refrigerant flow path than that of the fourth heat exchange section. This allows the third heat exchange section, which has a large volume of refrigerant flow path, to cause a large degree of heat exchange between the mixed refrigerant and the air at the front side of the utilization unit, where the velocity of the air passing through the heat exchange section tends to be fast.

(19) Nineteenth Group

A control circuit of air conditioning machines has an inverter circuit or the like that generates heat. For this reason, as shown in Japanese Patent Laid-Open No. 62-69066, cooling of the control circuit is carried out. As the refrigerant of air conditioning machines, a mixed refrigerant containing 1,2-difluoroethylene is sometimes used. The mixed refrigerant containing 1,2-difluoroethylene is less efficient than refrigerant R32. Therefore, in air conditioning machines using the mixed refrigerant containing 1,2-difluoroethylene, the power consumption of the compressor is increased and the amount of heat generation of the control circuit such as inverter circuit is increased. Therefore, the control circuit needs to be cooled.

An air conditioning machine according to a first viewpoint of the nineteenth group comprises a printed substrate and a refrigerant jacket. A power element is attached to the printed substrate. The power element is thermally connected to the refrigerant jacket. A refrigerant is distributed in the refrigerant jacket. The refrigerant distributed in the refrigerant jacket cools the power element. The refrigerant is Refrigerant A.

An air conditioning machine according to a second viewpoint of the nineteenth group is the air conditioning machine of the first viewpoint of the nineteenth group, further comprising a refrigerant circuit that carries out a refrigeration cycle. The refrigerant distributed in the refrigerant jacket is circulated in the refrigerant circuit.

An air conditioning machine according to a third viewpoint of the nineteenth group is the air conditioning machine of the first viewpoint of the nineteenth group, further comprising a refrigerant circuit that carries out a refrigeration cycle. The refrigerant jacket has a pipe that encloses the refrigerant. The pipe does not transfer the refrigerant to and from the refrigerant circuit.

(20) Twentieth Group

With the growing awareness of environmental protection in recent years, air conditioning machines that use a refrigerant having a low global warming potential (GWP) are needed. In that case, it is desirable for the air conditioning machines to be able to conduct dehumidification operation while maintaining comfort.

An air conditioning machine according to a first viewpoint of the twentieth group comprises a refrigerant circuit in which a compressor, an outdoor heat exchanger, a decompressor, a first indoor heat exchanger, a decompression device for dehumidification, and a second indoor heat exchanger are connected in an annular shape. The air conditioning machine carries out dehumidification operation by the decompression device for dehumidification with the decompressor in an open state. Refrigerant A is used in the air conditioning machine.

An air conditioning machine according to a second viewpoint of the twentieth group is the air conditioning machine of the first viewpoint of the twentieth group, wherein the decompression device for dehumidification is arranged between the first indoor heat exchanger and the second indoor heat exchanger.

An air conditioning machine according to a third viewpoint of the twentieth group is the air conditioning machine of the first viewpoint or second viewpoint of the twentieth group, wherein the decompression device for dehumidification is a solenoid valve.

An air conditioning machine according to a fourth viewpoint of the twentieth group is the air conditioning machine of the first viewpoint or second viewpoint of the twentieth group, wherein the decompression device for dehumidification is an expansion valve.

(21) Twenty-First Group

Conventionally, a variety of air conditioning machines with a dehumidification function have been developed. For example, there are air conditioning machines in which an indoor-side heat exchanger is divided into two heat exchangers and these two heat exchangers are connected in series. As for the two heat exchangers, which are the indoor-side heat exchanger, one condenses the refrigerant and the other evaporates the refrigerant at the time of dehumidification.

However, in such air conditioning machines, the mechanism for controlling the indoor-side heat exchanger and the flow of refrigerant in the indoor-side heat exchanger is complicated.

For such air conditioning machines with a dehumidification function, the challenge of simplifying the configuration of the refrigerant circuit is present.

An air conditioning machine according to a first viewpoint of the twenty-first group comprises Refrigerant A and a refrigerant circuit having a compressor that compresses the refrigerant, a first heat exchanger that evaporates the refrigerant in an evaporation zone, a decompression section that decompresses the refrigerant, and a second heat exchanger that condenses the refrigerant, and is configured to be able to switch between first operation in which air that has undergone heat exchange in the first heat exchanger using the entire first heat exchanger as the evaporation zone is blown into the room, and second operation in which air that has undergone heat exchange in the first heat exchanger using only a portion of the first heat exchanger as the evaporation zone is blown into the room.

This air conditioning machine can perform dehumidification by evaporating the refrigerant in the evaporation zone and has a simplified refrigerant circuit.

An air conditioning machine according to a second viewpoint of the twenty-first group is the air conditioning machine of the first viewpoint of the twenty-first group, wherein the first heat exchanger is an auxiliary heat exchanger, and the air conditioning machine comprises a main heat exchanger downwind from the auxiliary heat exchanger and is configured to switch between the first operation in which air that has undergone heat exchange in the auxiliary heat exchanger and the main heat exchanger using the entire auxiliary heat exchanger as the evaporation zone is blown into the room, and the second operation in which air that has undergone heat exchange in the auxiliary heat exchanger and the main heat exchanger using only a portion of the first heat exchanger as the evaporation zone is blown into the room.

In cooling operation, this air conditioning machine can suppress worsening of the COP due to dehumidification operation.

An air conditioning machine according to a third viewpoint of the twenty-first group is the air conditioning machine of the first viewpoint or second viewpoint of the twenty-first group, wherein the air conditioning machine is configured to switch from the first operation to the second operation depending on the load in a dehumidification operation mode for dehumidifying the room.

In the case where the load is large when the dehumidification operation mode is selected and the operation is started, this air conditioning machine can efficiently carry out dehumidification and cooling at the same time by starting the first operation because even the first operation can perform sufficient dehumidification due to a low temperature of the first heat exchanger. Then, as the temperature in the room declines and the load becomes smaller, the evaporating temperature becomes too high for the first operation to dehumidify the room, and at that point, the air conditioning machine is switched to the second operation. In this way, the impact of COP worsening due to dehumidification operation can be suppressed.

An air conditioning machine according to a fourth viewpoint of the twenty-first group is the air conditioning machine of the third viewpoint of the twenty-first group, wherein the load is detected based on the difference between a preset temperature and the temperature of the air in the room that is to undergo heat exchange by the first heat exchanger.

An air conditioning machine according to a fifth viewpoint of the twenty-first group is the air conditioning machine of the third viewpoint or fourth viewpoint of the twenty-first group, wherein the load is detected based on the frequency of the compressor.

An air conditioning machine according to a sixth viewpoint of the twenty-first group is the air conditioning machine of any of the first viewpoint to fifth viewpoint of the twenty-first group, configured to carry out the first operation without switching from the first operation to the second operation when the evaporating temperature of the refrigerant in the first heat exchanger is lower than a predetermined temperature in a dehumidification operation mode for dehumidifying the room.

This air conditioning machine perform dehumidification without switching from the first operation to the second operation because the evaporating temperature is lower than a predetermined value when the load is reduced to a predetermined value or less.

An air conditioning machine according to a seventh viewpoint of the twenty-first group is the air conditioning machine of any of the first viewpoint to sixth viewpoint of the twenty-first group, wherein, in the second operation, a part other than the portion of the first heat exchanger is a superheat zone in which the refrigerant is at or above the evaporating temperature.

(22) Twenty-Second Group

The configuration of refrigerant circuits that realize highly efficient operation using a refrigerant with a low global warming potential has not been sufficiently proposed to date.

A refrigeration cycle device according to a first viewpoint of the twenty-second group comprises a refrigerant circuit that includes a compressor, a heat source-side heat exchanger, an expansion mechanism, and a utilization-side heat exchanger. Refrigerant A is enclosed in the refrigerant circuit. At least at the time of predetermined operation, the flow of the refrigerant and the flow of a heat medium that is to undergo heat exchange with the refrigerant in at least one of the heat source-side heat exchanger and the utilization-side heat exchanger are in counter flow.

The refrigeration cycle device of the first viewpoint of the twenty-second group uses the refrigerant with a low global warming potential, containing 1,2-difluoroethylene (HFO-1132 (E)), and realizes highly efficient operation with effective utilization of the heat exchangers.

A refrigeration cycle device according to a second viewpoint of the twenty-second group is the refrigeration cycle device of the first viewpoint of the twenty-second group, wherein, at the time of operation of the refrigeration cycle device using the heat source-side heat exchanger as an evaporator, the flow of the refrigerant and the flow of the heat medium that is to undergo heat exchange with the refrigerant in the heat source-side heat exchanger are in counter flow.

A refrigeration cycle device according to a third viewpoint of the twenty-second group is the refrigeration cycle device of the first viewpoint or second viewpoint of the twenty-second group, wherein, at the time of operation of the refrigeration cycle device using the heat source-side heat exchanger as a condenser, the flow of the refrigerant and the flow of the heat medium that is to undergo heat exchange with the refrigerant in the heat source-side heat exchanger are in counter flow.

Here, even when a refrigerant that makes it difficult to take the temperature difference between the refrigerant and the heat medium on the outlet side of the condenser due to the impact of temperature glide is used, it is relatively easy to ensure a temperature difference from the inlet to the outlet of the condenser and highly efficient operation of the refrigeration cycle device can be realized.

A refrigeration cycle device according to a fourth viewpoint of the twenty-second group is the refrigeration cycle device of any of the first viewpoint to third viewpoint of the twenty-second group, wherein, at the time of operation of the refrigeration cycle device using the utilization-side heat exchanger as an evaporator, the flow of the refrigerant and the flow of the heat medium that is to undergo heat exchange with the refrigerant in the utilization-side heat exchanger are in counter flow.

A refrigeration cycle device according to a fifth viewpoint of the twenty-second group is the refrigeration cycle device of any of the first viewpoint to fourth viewpoint of the twenty-second group, wherein, at the time of operation of the refrigeration cycle device using the utilization-side heat exchanger as a condenser, the flow of the refrigerant and the flow of the heat medium that is to undergo heat exchange with the refrigerant in the utilization-side heat exchanger are in counter flow.

A refrigeration cycle device according to a sixth viewpoint of the twenty-second group is the refrigeration cycle device of any of the first viewpoint to fifth viewpoint of the twenty-second group, wherein the heat medium is air.

A refrigeration cycle device according to a seventh viewpoint of the twenty-second group is the refrigeration cycle device of any of the first viewpoint to fifth viewpoint of the twenty-second group, wherein the heat medium is liquid.

(23) Twenty-Third Group

In refrigeration cycle devices in which a refrigerant containing at least 1,2-difluoroethylene is used as a refrigerant having a sufficiently small GWP, in order to suppress the pressure loss, the pipe outer diameters of the liquid-side refrigerant communication piping and gas-side refrigerant communication piping are increased, which may lead to increase in cost.

The contents of the present disclosure are in consideration of the above point, and it is intended to provide a refrigeration cycle device that suppresses increase in cost in the case of using a refrigerant containing at least 1,2-difluoroethylene.

A refrigeration cycle device according to a first viewpoint of the twenty-third group is a refrigeration cycle device having a refrigerant circuit in which a compressor, a heat source-side heat exchanger, a decompression section, liquid-side refrigerant communication piping, a utilization-side heat exchanger, and gas-side refrigerant communication piping are connected, wherein Refrigerant A is used and the liquid-side refrigerant communication piping and the gas-side refrigerant communication piping are made of aluminum or an aluminum alloy.

In this refrigeration cycle device, even when the diameters of the liquid-side refrigerant communication piping and the gas-side refrigerant communication piping are increased in order to suppress the pressure loss upon using the refrigerant containing 1,2-difluoroethylene, the increase in cost can be suppressed by using pipes made of aluminum or an aluminum alloy.

A refrigeration cycle device according to a second viewpoint of the twenty-third group is the refrigeration cycle device of the first viewpoint of the twenty-third group, wherein the wall thickness of the liquid-side refrigerant communication piping is more than or equal to the wall thickness of a liquid-side refrigerant communication piping made of copper or a copper alloy used in a refrigeration cycle device with the same rated refrigeration capacity as that of the above refrigeration cycle device. Also, the wall thickness of the gas-side refrigerant communication piping is more than or equal to the wall thickness of a gas-side refrigerant communication piping made of copper or a copper alloy used in a refrigeration cycle device with the same rated refrigeration capacity as that of the above refrigeration cycle device.

A refrigeration cycle device according to a third viewpoint of the twenty-third group is the refrigeration cycle device of the first viewpoint of the twenty-third group, wherein the outer diameter of the liquid-side refrigerant communication piping is more than or equal to the outer diameter of a liquid-side refrigerant communication piping made of copper or a copper alloy used in a refrigeration cycle device with the same rated refrigeration capacity as that of the above refrigeration cycle device. Also, the outer diameter of the gas-side refrigerant communication piping is more than or equal to the outer diameter of a gas-side refrigerant communication piping made of copper or a copper alloy used in a refrigeration cycle device with the same rated refrigeration capacity as that of the above refrigeration cycle device.

A refrigeration cycle device according to a fourth viewpoint of the twenty-third group is the refrigeration cycle device of the third viewpoint of the twenty-third group, wherein the outer diameter of the liquid-side refrigerant communication piping is the same as the outer diameter of a liquid-side refrigerant communication piping made of copper or a copper alloy used in a refrigeration cycle device with the same rated refrigeration capacity as that of the above refrigeration cycle device.

A refrigeration cycle device according to a fifth viewpoint of the twenty-third group is the refrigeration cycle device of the third viewpoint of the twenty-third group, wherein the outer diameter of the liquid-side refrigerant communication piping is in the range of 6.4 mm to 12.7 mm. In addition, the outer diameter of the gas-side refrigerant communication piping is in the range of 12.7 mm to 25.4 mm.

A refrigeration cycle device according to a sixth viewpoint of the twenty-third group is the refrigeration cycle device according to the fifth viewpoint of the twenty-third group, wherein the rated refrigeration capacity of the refrigeration cycle device is 8.5 kW or more and 10.0 kW or less and the outer diameter of the gas-side refrigerant communication piping is 19.1 mm.

A refrigeration cycle device according to a seventh viewpoint of the twenty-third group is the refrigeration cycle device of the fifth viewpoint of the twenty-third group, wherein the rated refrigeration capacity of the refrigeration cycle device is 25.0 kW or more and 28 kW or less and the outer diameter of the gas-side refrigerant communication piping is 25.4 mm.

A refrigeration cycle device according to an eighth viewpoint of the twenty-third group is the refrigeration cycle device of the first viewpoint of the twenty-third group, either wherein the rated refrigeration capacity of the refrigeration cycle device is 25.0 kW or more and the outer diameter of the gas-side refrigerant communication piping is 25.4 mm, wherein the rated refrigeration capacity of the refrigeration cycle device is 19.0 kW or more and less than 25.0 kW and the outer diameter of the gas-side refrigerant communication piping is 22.2 mm, wherein the rated refrigeration capacity of the refrigeration cycle device is 8.5 kW or more and 19.0 kW or less and the outer diameter of the gas-side refrigerant communication piping is 19.1 mm, wherein the rated refrigeration capacity of the refrigeration cycle device is 5.0 kW or more and less than 8.5 kW and the outer diameter of the gas-side refrigerant communication piping is 15.9 nm, or wherein the rated refrigeration capacity of the refrigeration cycle device is less than 5.0 kW and the outer diameter of the gas-side refrigerant communication piping is 12.7 mm.

A refrigeration cycle device according to a ninth viewpoint of the twenty-third group is the refrigeration cycle device of the first viewpoint of the twenty-third group, either wherein the rated refrigeration capacity of the refrigeration cycle device is 19.0 kW or more and the outer diameter of the liquid-side refrigerant communication piping is 12.7 mm, wherein the rated refrigeration capacity of the refrigeration cycle device is 5.0 kW or more and less than 19.0 kW and the outer diameter of the liquid-side refrigerant communication piping is 9.5 mm, or wherein the rated refrigeration capacity of the refrigeration cycle device is less than 5.0 kW and the outer diameter of the liquid-side refrigerant communication piping is 6.4 mm.

A refrigeration cycle device according to a tenth viewpoint of the twenty-third group is the refrigeration cycle device of any one of the first viewpoint to ninth viewpoint of the twenty-third group, wherein a material used for the liquid-side refrigerant communication piping and the gas-side refrigerant communication piping is any of A3003TD, A3003TDS-0, A3005TDS-0, and A6063TDS-T84 as specified in "JIS H 4080" of the Japanese Industrial Standards.

(24) Twenty-Fourth Group

In refrigeration cycles in which a refrigerant with a low global warming potential is used, there have been no sufficient proposals to date on how to realize leveling of the electric power load.

A heat storage device according to a first viewpoint of the twenty-fourth group comprises a heat storage tank and a heat exchanger for heat storage. A heat storage medium is stored in the heat storage tank. The heat exchanger for heat storage is immersed in the heat storage medium in the heat storage tank. The heat exchanger for heat storage is connected to a refrigerant supply device. The heat exchanger for heat storage cools the heat storage medium with Refrigerant A supplied from the refrigerant supply device.

The heat storage device of the first viewpoint of the twenty-fourth group uses the refrigerant with a low global warming potential, containing 1,2-difluoroethylene (HFO-1132 (E)), supplied from the refrigerant supply device to cool the heat storage medium and stores cold energy in the heat storage tank, and thus can contribute to the leveling of the electric power load.

(25) Twenty-Fifth Group

As a conventional refrigeration device, for example, there is a device that comprises a refrigeration cycle on the high temperature side (primary side) and a refrigeration cycle on the low temperature side (secondary side). For example, there is a binary refrigeration device that uses a HFC refrigerant (R410A, R32, or the like), HFO refrigerant, or the like as the refrigerant for the refrigeration cycle on the high temperature side, and uses carbon dioxide refrigerant as the refrigerant for the refrigeration cycle on the low temperature side. In refrigeration devices that combine two cycles, such as binary refrigeration devices, there is a need for further efficient operation.

A refrigeration device according to a first viewpoint of the twenty-fifth group comprises a first cycle and a second cycle. In the first cycle, a first compressor, a first heat dissipator, a first expansion mechanism, and a first heat absorber are connected. In the first cycle, a first refrigerant is circulated. In the second cycle, a second heat dissipator and a second heat absorber are connected. In the second cycle, a second refrigerant is circulated. The first heat absorber and the second heat dissipator are heat exchangers. These heat exchangers cause heat exchange between the first refrigerant flowing in the first heat absorber and the second refrigerant flowing in the second heat dissipator. At least one of the first refrigerant and the second refrigerant is Refrigerant A.

Here, by employing the above mixed refrigerant, it is possible to improve the efficiency of heat exchange in the heat exchangers.

A refrigeration device according to a second viewpoint of the twenty-fifth group comprises a first cycle and a second cycle. In the first cycle, a first compressor, a first heat dissipator, a first expansion mechanism, and a first heat absorber are connected. In the first cycle, a first refrigerant is circulated. In the second cycle, a second heat dissipator and a second heat absorber are connected. In the second cycle, a second refrigerant is circulated. The first heat dissipator and the second heat absorber are heat exchangers. These heat exchangers cause heat exchange between the first refrigerant flowing in the first heat dissipator and the second refrigerant flowing in the second heat absorber. At least one of the first refrigerant and the second refrigerant is Refrigerant A.

Here, by employing the above mixed refrigerant, it is possible to improve the efficiency of heat exchange in the heat exchangers.

A refrigeration device according to a third viewpoint of the twenty-fifth group is the refrigeration device according to the first viewpoint of the twenty-fifth group, wherein the second cycle is a cycle in which a second compressor and a second expansion mechanism are further connected. The first refrigerant flowing in the first heat dissipator of the first cycle releases heat to the outside air. The first refrigerant is the above mixed refrigerant. The second refrigerant is carbon dioxide.

A refrigeration device according to a fourth viewpoint of the twenty-fifth group is the refrigeration device according to the first viewpoint of the twenty-fifth group, wherein the second cycle is a cycle in which a second compressor and a second expansion mechanism are further connected. The first refrigerant flowing in the first heat dissipator of the first cycle releases heat to the outside air. The first refrigerant is the above mixed refrigerant. The second refrigerant is the above mixed refrigerant.

A refrigeration device according to a fifth viewpoint of the twenty-fifth group is the refrigeration device according to the first viewpoint of the twenty-fifth group, wherein the second cycle is a cycle in which a second compressor and a second expansion mechanism are further connected. The first refrigerant flowing in the first heat dissipator of the first cycle releases heat to the outside air. The first refrigerant is R32. The second refrigerant is the above mixed refrigerant.

A refrigeration device according to a sixth viewpoint of the twenty-fifth group is the refrigeration device according to the first viewpoint of the twenty-fifth group, wherein the first refrigerant flowing in the first heat dissipator of the first cycle releases heat to the outside air. The first refrigerant is the above mixed refrigerant. The second refrigerant is a liquid medium.

A refrigeration device according to a seventh viewpoint of the twenty-fifth group is the refrigeration device according to the second viewpoint of the twenty-fifth group, wherein the second cycle is a cycle in which a second compressor and a second expansion mechanism are further connected. The first refrigerant flowing in the first heat absorber of the first cycle removes heat from the outside air. The first refrigerant is the above mixed refrigerant. The second refrigerant is a refrigerant with a lower saturation pressure at a predetermined temperature than the mixed refrigerant.

(26) Characteristics of Technologies of Each Group Using the Above Refrigerants

According to the technology of the first group, which uses any of the above refrigerants having a sufficiently small GWP, the lubricity in the refrigeration cycle device can be made good.

According to the technology of the second group, which uses any of the above refrigerants having a sufficiently small GWP, the lubricity in the case of using the refrigeration cycle can be made good.

According to the technology of the third group, which uses any of the above refrigerants having a sufficiently small GWP, the refrigeration cycle can be carried out.

According to the technology of the fourth group, which uses any of the above refrigerants having a sufficiently small GWP, even in the event of a refrigerant leak, it becomes possible to make it difficult for the refrigerant to reach the electrical equipment unit.

According to the technology of the fifth group, which uses any of the above refrigerants having a sufficiently small GWP, it becomes possible to improve the operation efficiency of the refrigeration cycle.

According to the technology of the sixth group, which uses any of the above refrigerants having a sufficiently small GWP, damage to the communication piping can be suppressed.

According to the technology of the seventh group, which uses any of the above refrigerants having a sufficiently small GWP, even if a leak of the refrigerant occurs, ignition in the electric heating device can be suppressed.

According to the technology of the eighth group, which uses any of the above refrigerants having a sufficiently small GWP, the refrigeration cycle can be carried out.

According to the technology of the ninth group, which uses any of the above refrigerants having a sufficiently small GWP, reduction in capacity can be kept small.

According to the technology of the tenth group, which uses any of the above refrigerants having a sufficiently small GWP, the number of motor rotations can be changed depending on the air conditioning load, which enables the compressor to be made highly efficient.

According to the technology of the eleventh group, which uses any of the above refrigerants having a sufficiently small GWP, the energy efficiency can be made good.

According to the technology of the twelfth group, which uses any of the above refrigerants having a sufficiently small GWP, by employing the induction motor as the motor of the compressor, it becomes possible to achieve high power output at a relatively low cost.

According to the technology of the thirteenth group, which uses any of the above refrigerants having a sufficiently small GWP, the number of motor rotations of the compressor that compresses the refrigerant can be changed depending on the air conditioning load, which makes it possible to realize a high annual performance factor (APF).

According to the technology of the fourteenth group, which uses any of the above refrigerants having a sufficiently small GWP, it is possible to provide an air conditioner with consideration for environmental protection.

According to the technology of the fifteenth group, which uses any of the above refrigerants having a sufficiently small GWP, it is possible to produce warm water efficiently.

According to the technology of the sixteenth group, which uses any of the above refrigerants having a sufficiently small GWP, the material costs of the heat exchanger can be reduced.

According to the technology of the seventeenth group, which uses any of the above refrigerants having a sufficiently small GWP, the amount of refrigerant to be filled in the air conditioning device can be reduced.

According to the technology of the eighteenth group, which uses any of the above refrigerants having a sufficiently small GWP, the capacity of heat exchange of the heat source-side heat exchanger can be improved.

According to the technology of the nineteenth group, which uses any of the above refrigerants having a sufficiently small GWP, it is possible to cool the control circuit.

According to the technology of the twentieth group, which uses any of the above refrigerants having a sufficiently small GWP, the reheat dehumidification operation can be carried out properly.

According to the technology of the twenty-first group, which uses any of the above refrigerants having a sufficiently small GWP, dehumidification can be performed by evaporating the refrigerant in the evaporation zone and the configuration of the refrigerant circuit can be simplified.

According to the technology of the twenty-second group, which uses any of the above refrigerants having a sufficiently small GWP, highly efficient operation can be realized.

According to the technology of the twenty-third group, which uses any of the above refrigerants having a sufficiently small GWP, even when the diameters of the liquid-side refrigerant communication piping and the gas-side refrigerant communication piping are increased in order to suppress the pressure loss, the increase in cost can be suppressed by using pipes made of aluminum or an aluminum alloy.

According to the technology of the twenty-fourth group, which uses any of the above refrigerants having a sufficiently small GWP, cold energy can be stored in the heat storage tank.

According to the technology of the twenty-fifth group, which uses any of the above refrigerants having a sufficiently small GWP, it is possible to improve the efficiency of heat exchange.

(2) REFRIGERATOR OIL

The refrigerator oil as the technology of the second group can enhance the lubricity in the refrigeration cycle device by allowing it to coexist with the refrigerant composition to carry out the refrigeration cycle, and it can also allow efficient cycle performance to be demonstrated.

Examples of the refrigerator oil include oxygen-containing synthetic oils (ester refrigerator oils, ether refrigerator oils, and the like), and hydrocarbon refrigerator oils. Among the above, ester refrigerator oils and ether refrigerator oils are preferable from the viewpoint of miscibility with the refrigerant or refrigerant composition. As the refrigerator oil, one kind of refrigerator oil may be used alone, or two or more kinds of refrigerator oils may be used in combination.

From at least any of the following viewpoints: suppressing reduction in lubricity and sealability of the compressor; ensuring sufficient miscibility with the refrigerant under low temperature conditions; suppressing poor lubrication of the compressor; and making the heat exchange efficiency in the evaporator good, the refrigerator oil preferably has a kinematic viscosity at 40° C. of 1 $mm^2/s$ or more and 750 $mm^2/s$ or less, and more preferably 1 $mm^2/s$ or more and 400 $mm^2/s$ or less. Note that the kinematic viscosity of the refrigerator oil at 100° C. may be, for example, 1 $mm^2/s$ or more and 100 $mm^2/s$ or less, and it is more preferably 1 $mm^2/s$ or more and 50 $mm^2/s$ or less.

The refrigerator oil preferably has an aniline point of −100° C. or higher and 0° C. or lower. The "aniline point" here is a numerical value that indicates the solubility of hydrocarbon solvents and the like, for example, and represents a temperature at which, when a sample (in this case, refrigerator oil) is mixed with an equal volume of aniline and chilled, the two cannot be dissolved in each other and turbidity begins to appear (specified in JIS K 2256). Note that this value is for the refrigerator oil itself in a state where no refrigerant is dissolved. By using a refrigerator oil with such an aniline point, even when, for example, each bearing and insulating materials of electric motor constituting the resin functional components are used at locations in contact with the refrigerator oil, the compatibility of the refrigerator oil to these resin functional components can be improved. Specifically, when the aniline point is too low, the refrigerator oil easily permeates through the bearings and insulating materials, which makes it easier for the bearings and other materials to be swollen. On the other hand, when the aniline point is too high, it becomes difficult for the refrigerator oil to permeate through the bearings and insulating materials, which makes it easier for the bearings and other materials to be contracted. Therefore, by using a refrigerator oil whose aniline point is in the predetermined range (−100° C. or higher and 0° C. or lower) mentioned above, swelling/contraction deformation of the bearings and insulating materials can be prevented. Here, when each bearing is swollen and deformed, it becomes impossible to maintain the gap at the sliding section to the desired length. As a result, there is a risk of leading to increase in sliding resistance. When each bearing is contracted and deformed, the hardness of the bearing is increased and there is a risk that vibration of the compressor may damage the bearing. That is, when each bearing is contracted and deformed, there is a risk of leading to reduction in the rigidity of the sliding section. In addition, when the insulating materials of electric motor (insulating coating materials, insulating films, and the like) are swollen and deformed, the insulating properties of those insulating materials are degraded. When the insulating materials are contracted and deformed, there is a risk that the insulating materials may be damaged, as in the case of the bearings mentioned above, and in this case as well, the insulating properties are degraded. In contrast, when using a refrigerator oil whose aniline point is within the predetermined range as described above, such defects can be avoided because the swelling/contraction deformation of bearings and insulating materials can be suppressed.

The refrigerator oil is mixed with the refrigerant composition and used as a working fluid for a refrigerator. The compounding ratio of the refrigerator oil relative to the entire amount of working fluid for a refrigerator is preferably 5% by mass or more and 60% by mass or less, and more preferably 10% by mass or more and 50% by mass or less.

(2-1) Oxygen-Containing Synthetic Oil

Ester refrigerator oils and ether refrigerator oils, which are oxygen-containing synthetic oils, have and are mainly composed of carbon atoms and oxygen atoms. In ester refrigerator oils and ether refrigerator oils, when the ratio of carbon atoms to oxygen atoms (carbon/oxygen molar ratio) is too small, the moisture absorption properties are increased, and when that ratio is too large, the miscibility with the refrigerant is reduced, and therefore, that ratio is preferably 2 or more and 7.5 or less in molar ratio.

(2-1-1) Ester Refrigerator Oil

As for the ester refrigerator oil, from the viewpoint of chemical stability, mention may be made of dibasic acid ester oils of a dibasic acid and a monohydric alcohol, polyol ester oils of a polyol and a fatty acid or complex ester oils of a polyol, a polybasic acid, and a monohydric alcohol (or fatty acid), polyol carbonate ester oils, and the like as the base oil component.

(Dibasic Acid Ester Oil)

As the dibasic acid ester oil, preferable are esters of a dibasic acid such as oxalic acid, malonic acid, succinic acid, glutaric acid, adipic acid, pimelic acid, suberic acid, azelaic acid, sebacic acid, phthalic acid, isophthalic acid, or terephthalic acid, in particular, a dibasic acid having 5 to 10 carbon atoms (such as glutaric acid, adipic acid, pimelic acid, suberic acid, azelaic acid, or sebacic acid) and a monohydric alcohol with 1 to 15 carbon atoms having a linear or branched alkyl group (such as methanol, ethanol, propanol, butanol, pentanol, hexanol, heptanol, octanol, nonanol, decanol, undecanol, dodecanol, tridecanol, tetradecanol, or pentadecanol). Specific examples of these dibasic acid ester oils include ditridecyl glutarate, di(2-ethylhexyl) adipate, diisodecyl adipate, ditridecyl adipate, and di(3-ethylhexyl) sebacate.

(Polyol Ester Oil)

The polyol ester oil is an ester synthesized from a polyhydric alcohol and a fatty acid (carboxylic acid), and has a carbon/oxygen molar ratio of 2 or more and 7.5 or less, preferably 3.2 or more and 5.8 or less.

Examples of the polyhydric alcohol that constitutes the polyol ester oil include diols (such as ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol) and polyols having 3 to 20 hydroxyl groups (including polyhydric alcohols such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerin (dimer to trimer of glycerin), 1,3,5-pentanetriol, sorbitol, sorbitan, sorbitol glycerin condensate, adonitol, arabitol, xylitol, and mannitol, saccharides such as xylose, arabinose, ribose, rhamnose, glucose, fructose, galactose, mannose, sorbose, cellobiose, maltose, isomaltose, trehalose, sucrose, raffinose, gentianose, and melezitose, and partially etherified products thereof), and the polyhydric alcohol that constitutes the ester may be one kind of the above, or may contain two or more kinds.

As the fatty acid that constitutes the polyol ester, there is no limitation on the number of carbon atoms, but those having 1 to 24 carbon atoms are normally used. Linear fatty acids and branched fatty acids are preferable. Examples of the linear fatty acid include acetic acid, propionic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, oleic acid, linoleic acid, and linolenic acid, and the hydrocarbon group bonded to the carboxyl group may be a fully saturated hydrocarbon or it may have an unsaturated hydrocarbon. Furthermore, examples of the branched fatty acid include 2-methylpropanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, 2,2,3-trimethylbutanoic acid, 2,3,3-trimethylbutanoic acid, 2-ethyl-2-methylbutanoic acid, 2-ethyl-3-methylbutanoic acid, 2-methylheptanoic acid, 3-methylheptanoic acid, 4-methylheptanoic acid, 5-methylheptanoic acid, 6-methylheptanoic acid, 2-ethylhexanoic acid, 3-ethylhexanoic acid, 4-ethylhexanoic acid, 2,2-dimethylhexanoic acid, 2,3-dimethylhexanoic acid, 2,4-dimethylhexanoic acid, 2,5-dimethylhexanoic acid, 3,3-dimethylhexanoic acid, 3,4-dimethylhexanoic acid, 3,5-dimethylhexanoic acid, 4,4-dimethylhexanoic acid, 4,5-dimethylhexanoic acid, 5,5-dimethylhexanoic acid, 2-propylpentanoic acid, 2-methyloctanoic acid, 3-methyloctanoic acid, 4-methyloctanoic acid, 5-methyloctanoic acid, 6-methyloctanoic acid, 7-methyloctanoic acid, 2,2-dimethylheptanoic acid, 2,3-dimethylheptanoic acid, 2,4-dimethylheptanoic acid, 2,5-dimethylheptanoic acid, 2,6-dimethylheptanoic acid, 3,3-dimethylheptanoic acid, 3,4-dimethylheptanoic acid, 3,5-dimethylheptanoic acid, 3,6-dimethylheptanoic acid, 4,4-dimethylheptanoic acid, 4,5-dimethylheptanoic acid, 4,6-dimethylheptanoic acid, 5,5-dimethylheptanoic acid, 5,6-dimethylheptanoic acid, 6,6-dimethylheptanoic acid, 2-methyl-2-ethylhexanoic acid, 2-methyl-3-ethylhexanoic acid, 2-methyl-4-ethylhexanoic acid, 3-methyl-2-ethylhexanoic acid, 3-methyl-3-ethylhexanoic acid, 3-methyl-4-ethylhexanoic acid, 4-methyl-2-ethylhexanoic acid, 4-methyl-3-ethylhexanoic acid, 4-methyl-4-ethylhexanoic acid, 5-methyl-2-ethylhexanoic acid, 5-methyl-3-ethylhexanoic acid, 5-methyl-4-ethylhexanoic acid, 2-ethylheptanoic acid, 3-methyloctanoic acid, 3,5,5-trimethylhexanoic acid, 2-ethyl-2,3,3-trimethylbutyric acid, 2,2,4,4-tetramethylpentanoic acid, 2,2,3,3-tetramethylpentanoic acid, 2,2,3,4-tetramethylpentanoic acid, and 2,2-diisopropylpropanoic acid. The fatty acid may be an ester with one kind of fatty acid or two or more kinds of fatty acids selected from among the above.

The polyhydric alcohol that constitutes the ester may be one kind or a mixture of two or more kinds. Also, the fatty acid that constitutes the ester may be a single component or an ester with two or more kinds of fatty acids. The fatty acids may each be one kind or a mixture of two or more kinds. In addition, the polyol ester oil may have a free hydroxyl group.

As a specific polyol ester oil, esters of a hindered alcohol such as neopentyl glycol, trimethylolethane, trimethylolpropane, trimethylolbutane, di-(trimethylolpropane), tri-(trimethylolpropane), pentaerythritol, di-(pentaerythritol), and tri-(pentaerythritol) are more preferable, esters of neopentyl glycol, trimethylolethane, trimethylolpropane, trimethylolbutane, pentaerythritol, and di-(pentaerythritol) are even more preferable, and esters of neopentyl glycol, trimethylolpropane, pentaerythritol, di-(pentaerythritol), and the like with a fatty acid having 2 to 20 carbon atoms are preferable.

For such a fatty acid that constitutes the polyhydric alcohol fatty acid ester, the fatty acid may only be a fatty acid having a linear alkyl group, or it may be selected from fatty acids having a branched structure. Alternatively, it may be a mixed ester of linear and branched fatty acids. Furthermore, for the fatty acid that constitutes the ester, two or more kinds selected from the above fatty acids may be used.

As a specific example, in the case of a mixed ester of linear and branched fatty acids, the molar ratio between the linear fatty acid having 4 to 6 carbon atoms and the branched fatty acid having 7 to 9 carbon atoms is 15:85 to 90:10, preferably 15:85 to 85:15, more preferably 20:80 to 80:20, still more preferably 25:75 to 75:25, and most preferably 30:70 to 70:30. Also, the proportion of the total of the linear fatty acid having 4 to 6 carbon atoms and the branched fatty acid having 7 to 9 carbon atoms to the entire amount of fatty acids that constitute the polyhydric alcohol fatty acid ester is preferably 20% by mole or more. The compositional features of the fatty acid are preferably those that achieve both sufficient miscibility with the refrigerant and viscosity required for the refrigerator oil. Note that the proportion of fatty acids here is a value based on the entire amount of fatty acids that constitute the polyhydric alcohol fatty acid ester contained in the refrigerator oil.

Especially, as such a refrigerator oil, preferable is one containing an ester (hereinafter, referred to as a "polyhydric alcohol fatty acid ester (A)") in which the molar ratio between the fatty acid having 4 to 6 carbon atoms and the branched fatty acid having 7 to 9 carbon atoms in the fatty acid is 15:85 to 90:10, the fatty acid having 4 to 6 carbon atoms contains 2-methylpropanoic acid, and the proportion of the total of the fatty acid having 4 to 6 carbon atoms and the branched fatty acid having 7 to 9 carbon atoms to the entire amount of fatty acids that constitute the above ester is 20% by mole or more.

The polyhydric alcohol fatty acid ester (A) encompasses complete esters in which all hydroxyl groups of the polyhydric alcohol are esterified, partial esters in which some hydroxyl groups of the polyhydric alcohol remain unesterified, and mixtures of complete esters and partial esters, but the hydroxyl value of the polyhydric alcohol fatty acid ester (A) is preferably 10 mgKOH/g or less, still more preferably 5 mgKOH/g or less, and most preferably 3 mgKOH/g or less.

In the fatty acid that constitutes the polyhydric alcohol fatty acid ester (A), the molar ratio between the fatty acid having 4 to 6 carbon atoms and the branched fatty acid having 7 to 9 carbon atoms is 15:85 to 90:10, preferably 15:85 to 85:15, more preferably 20:80 to 80:20, still more preferably 25:75 to 75:25, and most preferably 30:70 to 70:30. Also, the proportion of the total of the fatty acid having 4 to 6 carbon atoms and the branched fatty acid having 7 to 9 carbon atoms to the entire amount of fatty acids that constitute the polyhydric alcohol fatty acid ester (A) is 20% by mole or more. When the above conditions with respect to the compositional features of the fatty acid are not met, in the case where difluoromethane is contained in the refrigerant composition, it becomes difficult to achieve both sufficient miscibility with that difluoromethane and viscosity required for the refrigerator oil at high levels. Note that the proportion of fatty acids is a value based on the entire amount of fatty acids that constitute the polyhydric alcohol fatty acid ester contained in the refrigerator oil.

Specific examples of the above fatty acid having 4 to 6 carbon atoms include butanoic acid, 2-methylpropanoic acid, pentanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid. Among the above, those having a branch in the alkyl skeleton, such as 2-methylpropanoic acid, are preferable.

Specific examples of the above branched fatty acid having 7 to 9 carbon atoms include 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethyl-pentanoic acid, 3-ethylpentanoic acid, 1,1,2-trimethylbutanoic acid, 1,2,2-trimethylbutanoic acid, 1-ethyl-1-methylbutanoic acid, 1-ethyl-2-methylbutanoic acid, octanoic acid, 2-ethylhexanoic acid, 3-ethylhexanoic acid, 3,5-dimethylhexanoic acid, 2,4-dimethylhexanoic acid, 3,4-dimethylhexanoic acid, 4,5-dimethylhexanoic acid, 2,2-dimethylhexanoic acid, 2-methylheptanoic acid, 3-methylheptanoic acid, 4-methylheptanoic acid, 5-methylheptanoic acid, 6-methylheptanoic acid, 2-propylpentanoic acid, nonanoic acid, 2,2-dimethylheptanoic acid, 2-methyloctanoic acid, 2-ethylheptanoic acid, 3-methyloctanoic acid, 3,5,5-trimethylhexanoic acid, 2-ethyl-2,3,3-trimethylbutyric acid, 2,2,4,4-tetramethylpentanoic acid, 2,2,3,3-tetramethylpentanoic acid, 2,2,3,4-tetramethylpentanoic acid, and 2,2-diisopropylpropanoic acid.

In the polyhydric alcohol fatty acid ester (A), the molar ratio between the fatty acid having 4 to 6 carbon atoms and the branched fatty acid having 7 to 9 carbon atoms is 15:85 to 90:10, and as long as the fatty acid having 4 to 6 carbon atoms contains 2-methylpropanoic acid, a fatty acid other than the fatty acid having 4 to 6 carbon atoms and the branched fatty acid having 7 to 9 carbon atoms may be contained as a constituent acid component.

Specific examples of the above fatty acid other than the fatty acid having 4 to 6 carbon atoms and the branched fatty acid having 7 to 9 carbon atoms include fatty acids having 2 to 3 carbon atoms such as acetic acid and propionic acid; linear fatty acids having 7 to 9 carbon atoms such as heptanoic acid, octanoic acid, and nonanoic acid; and fatty acids having 10 to 20 carbon atoms such as decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, and oleic acid.

When the above fatty acid having 4 to 6 carbon atoms and branched fatty acid having 7 to 9 carbon atoms are used in combination with a fatty acid other than these fatty acids, the proportion of the total of the fatty acid having 4 to 6 carbon atoms and the branched fatty acid having 7 to 9 carbon atoms to the entire amount of fatty acids that constitute the polyhydric alcohol fatty acid ester (A) is preferably 20% by mole or more, more preferably 25% by mole or more, and still more preferably 30% by mole or more. When this proportion is 20% by mole or more, in the case where difluoromethane is contained in the refrigerant composition, the miscibility with that difluoromethane is sufficient.

Among the polyhydric alcohol fatty acid ester (A), those in which the acid constituent consists only of 2-methylpropanoic acid and 3,5,5-trimethylhexanoic acid are particularly preferable in terms of both ensuring the required viscosity and, in the case where difluoromethane is contained in the refrigerant composition, miscibility with that difluoromethane.

The above polyhydric alcohol fatty acid ester may be a mixture of two or more kinds of esters with different molecular structures, and in such a case, the individual molecules do not necessarily need to meet the above conditions, and the above conditions only need to be met as the whole fatty acid that constitutes the pentaerythritol fatty acid ester contained in the refrigerator oil.

As described above, the polyhydric alcohol fatty acid ester (A) requires the fatty acid having 4 to 6 carbon atoms and the branched fatty acid having 7 to 9 carbon atoms as the acid component that constitutes the ester, and includes another fatty acid as a constituent if required. That is, the polyhydric alcohol fatty acid ester (A) may have only two kinds of fatty acids as the acid constituent or three or more kinds of fatty acids with different structures as the acid constituent, but it is preferable that the polyhydric alcohol fatty acid ester contains as the acid constituent only fatty acids whose carbon atom adjacent to the carbonyl carbon (α-position carbon atom) are not a quaternary carbon. When a fatty acid whose α-position carbon atom is a quaternary carbon is contained in the fatty acid that constitutes the polyhydric alcohol fatty acid ester, in the case where difluoromethane is contained in the refrigerant composition, the lubricity in the presence of that difluoromethane tends to be insufficient.

Also, as the polyhydric alcohol that constitutes the polyol ester according to the present embodiment, polyhydric alcohols having 2 to 6 hydroxyl groups are preferably used.

Specific examples of dihydric alcohols (diols) include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol. Also, specific examples of trihydric or higher alcohols include polyhydric alcohols such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerin (dimer to trimer of glycerin), 1,3,5-pentanetriol, sorbitol, sorbitan, sorbitol glycerin condensate, adonitol, arabitol, xylitol, and mannitol, saccharides such as xylose, arabinose, ribose, rhamnose, glucose, fructose, galactose, mannose, sorbose, and cellobiose, and partially etherified products thereof. Among the above, due to their superior hydrolytic stability, esters of a hindered alcohol such as neopentyl glycol, trimethylolethane, trimethylolpropane, trimethylolbutane, di-(trimethylolpropane), tri-(trimethylolpropane), pentaerythritol, di-(pentaerythritol), and tri-(pentaerythritol) are more preferable, esters of neopentyl glycol, trimethylolethane, trimethylolpropane, trimethylolbutane, pentaerythritol, and di-(pentaerythritol) are even more preferable, neopentyl glycol, trimethylolpropane, pentaerythritol, and di-(pentaerythritol) are still more preferable, and because of particularly excellent miscibility with the refrigerant and hydrolytic stability, pentaerythritol, di-(pentaerythritol), or a mixed ester of pentaerythritol and di-(pentaerythritol) is most preferable.

Preferred examples of the acid constituent that constitutes the above polyhydric alcohol fatty acid ester (A) may include the following:

(i) a combination of one to thirteen kinds selected from butanoic acid, 2-methylpropanoic acid, pentanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid, with one to thirteen kinds selected from 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, and 2-ethyl-3-methylbutanoic acid;

(ii) a combination of one to thirteen kinds selected from butanoic acid, 2-methylpropanoic acid, pentanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid, with one to twenty-five kinds selected from 2-methylheptanoic acid, 3-methylheptanoic acid, 4-methylheptanoic acid, 5-methylheptanoic acid, 6-methylheptanoic acid, 2,2-dimethylhexanoic acid, 3,3-dimethylhexanoic acid, 4,4-dimethylhexanoic acid, 5,5-dimethylhexanoic acid, 2,3-dimethylhexanoic acid, 2,4-dimethylhexanoic acid, 2,5-dimethylhexanoic acid, 3,4-dimethylhexanoic acid, 3,5-dimethylhexanoic acid, 4,5-dimethylhexanoic acid, 2,2,3-trimethylpentanoic acid, 2,3,3-trimethylpentanoic acid, 2,4,4-trimethylpentanoic acid, 3,4,4-trimethylpentanoic acid, 2-ethylhexanoic acid, 3-ethylhexanoic acid, 2-propylpentanoic acid, 2-methyl-2-ethylpentanoic acid, 2-methyl-3-ethylpentanoic acid, and 3-methyl-3-ethylpentanoic acid; and (iii) a combination of one to thirteen kinds selected from butanoic acid, 2-methylpropanoic acid, pentanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid, with one to fifty kinds selected from 2-methyloctanoic acid, 3-methyloctanoic acid, 4-methyloctanoic acid, 5-methyloctanoic acid, 6-methyloctanoic acid, 7-methyloctanoic acid, 8-methyloctanoic acid, 2,2-dimethylheptanoic acid, 3,3-dimethylheptanoic acid, 4,4-dimethylheptanoic acid, 5,5-dimethylheptanoic acid, 6,6-dimethylheptanoic acid, 2,3-dimethylheptanoic acid, 2,4-dimethylheptanoic acid, 2,5-dimethylheptanoic acid, 2,6-dimethylheptanoic acid, 3,4-dimethylheptanoic acid, 3,5-dimethylheptanoic acid, 3,6-dimethylheptanoic acid, 4,5-dimethylheptanoic acid, 4,6-dimethylheptanoic acid, 2-ethylheptanoic acid, 3-ethylheptanoic acid, 4-ethylheptanoic acid, 5-ethylheptanoic acid, 2-propylhexanoic acid, 3-propylhexanoic acid, 2-butylpentanoic acid, 2,2,3-trimethylhexanoic acid, 2,2,3-trimethylhexanoic acid, 2,2,4-trimethylhexanoic acid, 2,2,5-trimethylhexanoic acid, 2,3,4-trimethylhexanoic acid, 2,3,5-trimethylhexanoic acid, 3,3,4-trimethylhexanoic acid, 3,3,5-trimethylhexanoic acid, 3,5,5-trimethylhexanoic acid, 4,4,5-trimethylhexanoic acid, 4,5,5-trimethylhexanoic acid, 2,2,3,3-tetramethylpentanoic acid, 2,2,3,4-tetramethylpentanoic acid, 2,2,4,4-tetramethylpentanoic acid, 2,3,4,4-tetramethylpentanoic acid, 3,3,4,4-tetramethylpentanoic acid, 2,2-diethylpentanoic acid, 2,3-diethylpentanoic acid, 3,3-diethylpentanoic acid, 2-ethyl-2,3,3-trimethylbutyric acid, 3-ethyl-2,2,3-trimethylbutyric acid, and 2,2-diisopropylpropionic acid.

Further preferred examples of the acid constituent that constitutes the above polyhydric alcohol fatty acid ester may include the following:

(i) a combination of 2-methylpropanoic acid with one to thirteen kinds selected from 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, and 2-ethyl-3-methylbutanoic acid;

(ii) a combination of 2-methylpropanoic acid with one to twenty-five kinds selected from 2-methylheptanoic acid, 3-methylheptanoic acid, 4-methylheptanoic acid, 5-methylheptanoic acid, 6-methylheptanoic acid, 2,2-dimethylhexanoic acid, 3,3-dimethylhexanoic acid, 4,4-dimethylhexanoic acid, 5,5-dimethylhexanoic acid, 2,3-dimethylhexanoic acid, 2,4-dimethylhexanoic acid, 2,5-dimethylhexanoic acid, 3,4-dimethylhexanoic acid, 3,5-dimethylhexanoic acid, 4,5-dimethylhexanoic acid, 2,2,3-trimethylpentanoic acid, 2,3,3-trimethylpentanoic acid, 2,4,4-trimethylpentanoic acid, 3,4,4-trimethylpentanoic acid, 2-ethylhexanoic acid, 3-ethylhexanoic acid, 2-propylpentanoic acid, 2-methyl-2-ethylpentanoic acid, 2-methyl-3-ethylpentanoic acid, and 3-methyl-3-ethylpentanoic acid; and (iii) a combination of 2-methylpropanoic acid with one to fifty kinds selected from 2-methyloctanoic acid, 3-methyloctanoic acid, 4-methyloctanoic acid, 5-methyloctanoic acid, 6-methyloctanoic acid, 7-methyloctanoic acid, 8-methyloctanoic acid, 2,2-dimethylheptanoic acid, 3,3-dimethylheptanoic acid, 4,4-dimethylheptanoic acid, 5,5-dimethylheptanoic acid, 6,6-dimethylheptanoic acid, 2,3-dimethylheptanoic acid, 2,4-dimethylheptanoic acid, 2,5-dimethylheptanoic acid, 2,6-dimethylheptanoic acid, 3,4-dimethylheptanoic acid, 3,5-dimethylheptanoic acid, 3,6-dimethylheptanoic acid, 4,5-dimethylheptanoic acid, 4,6-dimethylheptanoic acid, 2-ethylheptanoic acid, 3-ethylheptanoic acid, 4-ethylheptanoic acid, 5-ethylheptanoic acid, 2-propylhexanoic acid, 3-propylhexanoic acid, 2-butylpentanoic acid, 2,2,3-trimethylhexanoic acid, 2,2,3-trimethylhexanoic acid, 2,2,4-trimethylhexanoic acid, 2,2,5-trimethylhexanoic acid, 2,3,4-trimethylhexanoic acid, 2,3,5-trimethylhexanoic acid, 3,3,4-trimethylhexanoic acid, 3,3,5-trimethylhexanoic acid, 3,5,5-trimethylhexanoic acid, 4,4,5-trimethylhexanoic acid, 4,5,5-trimethylhexanoic acid, 2,2,3,3-tetramethylpentanoic acid, 2,2,3,4-tetramethylpentanoic acid, 2,2,4,4-tetramethylpentanoic acid, 2,3,4,4-tetramethylpentanoic acid, 3,3,4,4-tetramethylpentanoic acid, 2,2-diethylpentanoic acid, 2,3-diethylpentanoic acid, 3,3-diethylpentanoic acid, 2-ethyl-2,3,3-trimethylbutyric acid, 3-ethyl-2,2,3-trimethylbutyric acid, and 2,2-diisopropylpropionic acid.

The content of the above polyhydric alcohol fatty acid ester (A) is 50% by mass or more, preferably 60% by mass or more, more preferably 70% by mass or more, and still more preferably 75% by mass or more, based on the entire amount of the refrigerator oil. As will be mentioned later, the refrigerator oil according to the present embodiment may contain a lubricating oil base oil or additive agent other than the polyhydric alcohol fatty acid ester (A), but when the content of the polyhydric alcohol fatty acid ester (A) is less than 50% by mass, it becomes impossible to achieve both required viscosity and miscibility at high levels.

In the refrigerator oil according to the present embodiment, the polyhydric alcohol fatty acid ester (A) is mainly used as the base oil. As the base oil of the refrigerator oil according to the present embodiment, only the polyhydric alcohol fatty acid ester (A) may be used alone (that is, the content of the polyhydric alcohol fatty acid ester (A) is 100% by mass), but in addition to this, a base oil other than the polyhydric alcohol fatty acid ester (A) may be further contained to the extent that its excellent performance is not impaired. Examples of the base oil other than the polyhydric alcohol fatty acid ester (A) include hydrocarbon oils such as mineral oils, olefin polymers, alkyldiphenylalkanes, alkylnaphthalenes, and alkylbenzenes; esters other than the polyhydric alcohol fatty acid ester (A) such as polyol esters, complex esters, and alicyclic dicarboxylate esters; and oxygen-containing synthetic oils such as polyglycols, polyvinyl ethers, ketones, polyphenyl ethers, silicones, polysiloxanes, and perfluoroethers (hereinafter, sometimes referred to as "other oxygen-containing synthetic oils").

As the other oxygen-containing synthetic oils, among the above, esters other than the polyhydric alcohol fatty acid ester (A), polyglycols, polyvinyl ethers are preferable, and polyol esters other than the polyhydric alcohol fatty acid ester (A) are particularly preferable. Examples of polyol esters other than the polyhydric alcohol fatty acid ester (A) include esters of a polyhydric alcohol such as neopentyl glycol, trimethylolethane, trimethylolpropane, trimethylolbutane, pentaerythritol, and dipentaerythritol, with a fatty acid, and particularly preferable are esters of neopentyl glycol with a fatty acid, esters of pentaerythritol with a fatty acid, and esters of dipentaerythritol with a fatty acid.

The neopentyl glycol esters are preferably esters of neopentyl glycol with a fatty acid having 5 to 9 carbon atoms. Specific examples of such neopentyl glycol esters include neopentyl glycol di-3,5,5-trimethylhexanoate, neopentyl glycol di-2-ethylhexanoate, neopentyl glycol di-2-methylhexanoate, neopentyl glycol di-2-ethylpentanoate, esters of neopentyl glycol with 2-methylhexanoic acid and 2-ethylpentanoic acid, esters of neopentyl glycol with 3-methylhexanoic acid and 5-methylhexanoic acid, esters of neopentyl glycol with 2-methylhexanoic acid and 2-ethylhexanoic acid, esters of neopentyl glycol with 3,5-dimethylhexanoic acid, 4,5-dimethylhexanoic acid, and 3,4-dimethylhexanoic acid, neopentyl glycol dipentanoate, neopentyl glycol di-2-ethylbutanoate, neopentyl glycol di-2-methylpentanoate, neopentyl glycol di-2-methylbutanoate, and neopentyl glycol di-3-methylbutanoate.

The pentaerythritol esters are preferably esters of pentaerythritol with a fatty acid having 5 to 9 carbon atoms. Specific examples of such pentaerythritol esters include esters of pentaerythritol with one or more kinds of fatty acids selected from pentanoic acid, 2-methylbutanoic acid, 3-methylbutanoic acid, hexanoic acid, 2-methylpentanoic acid, 2-ethylbutanoic acid, 2-ethylpentanoic acid, 2-methylhexanoic acid, 3,5,5-trimethylhexanoic acid, and 2-ethylhexanoic acid.

The dipentaerythritol esters are preferably esters of dipentaerythritol with a fatty acid having 5 to 9 carbon atoms.

Specific examples of such dipentaerythritol esters include esters of dipentaerythritol with one or more kinds of fatty acids selected from pentanoic acid, 2-methylbutanoic acid, 3-methylbutanoic acid, hexanoic acid, 2-methylpentanoic acid, 2-ethylbutanoic acid, 2-ethylpentanoic acid, 2-methylhexanoic acid, 3,5,5-trimethylhexanoic acid, and 2-ethylhexanoic acid.

When the refrigerator oil according to the present embodiment contains an oxygen-containing synthetic oil other than the polyhydric alcohol fatty acid ester (A), the content of the oxygen-containing synthetic oil other than the polyhydric alcohol fatty acid ester (A) is not limited as long as the excellent lubricity and miscibility of the refrigerator oil according to the present embodiment are not impaired; however, when a polyol ester other than the polyhydric alcohol fatty acid ester (A) is compounded, its content is preferably less than 50% by mass, more preferably 45% by mass or less, still more preferably 40% by mass or less, even more preferably 35% by mass or less, further preferably 30% by mass or less, and most preferably 25% by mass or less, based on the entire amount of the refrigerator oil, and when an oxygen-containing synthetic oil other than polyol esters is compounded, its content is preferably less than 50% by mass, more preferably 40% by mass or less, and still more preferably 30% by mass or less, based on the entire amount of the refrigerator oil. When the amount of a polyol ester or other oxygen-containing synthetic oil other than pentaerythritol fatty acid esters to be compounded is too large, the above effects cannot be achieved sufficiently.

Note that the polyol ester other than the polyhydric alcohol fatty acid ester (A) may be a partial ester in which some hydroxyl groups of the polyhydric alcohol remain as hydroxyl groups without being esterified, a complete ester in which all hydroxyl groups are esterified, or a mixture of a partial ester and a complete ester, but its hydroxyl value is preferably 10 mgKOH/g or less, more preferably 5 mgKOH/g or less, and most preferably 3 mgKOH/g or less.

When the refrigerator and working fluid for a refrigerator according to the present embodiment contain a polyol ester other than the polyhydric alcohol fatty acid ester (A), as that polyol ester, they may contain a polyol ester made up of one kind of polyol ester with a single structure, or a mixture of two or more kinds of polyol esters with different structures.

Also, the polyol ester other than the polyhydric alcohol fatty acid ester (A) may be any of an ester of one kind of fatty acid with one kind of polyhydric alcohol, an ester of two or more kinds of fatty acids with one kind of polyhydric alcohol, an ester of one kind of fatty acid with two or more kinds of polyhydric alcohols, and an ester of two or more kinds of fatty acids with two or more kinds of polyhydric alcohols.

The refrigerator oil according to the present embodiment may consist only of the polyhydric alcohol fatty acid ester (A) or may consist of the polyhydric alcohol fatty acid ester (A) and another base oil, but it may further contain various additive agents, which will be mentioned later. The working fluid for a refrigerator according to the present embodiment may also further contain various additive agents. Note that, in the following description, the content of additive agents is shown based on the entire amount of the refrigerator oil, but it is desirable to select the content of these components in the working fluid for a refrigerator such that it is within the preferred range, which will be mentioned later, when based on the entire amount of the refrigerator oil.

In order to further improve the abrasion resistance and load resistance of the refrigerator oil and working fluid for a refrigerator according to the present embodiment, at least one phosphorus compound selected from the group consisting of phosphate esters, acidic phosphate esters, thiophosphate esters, amine salts of acidic phosphate esters, chlorinated phosphate esters, and phosphite esters can be compounded. These phosphorus compounds are esters of phosphoric acid or phosphite with alkanols or polyether-type alcohols, or derivatives thereof.

Specific examples of phosphate esters include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyl diphenyl phosphate, and xylenyl diphenyl phosphate.

Examples of acidic phosphate esters include monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate, and dioleyl acid phosphate.

Examples of thiophosphate esters include tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyl diphenyl phosphorothionate, and xylenyl diphenyl phosphorothionate.

Examples of amine salts of acidic phosphate esters include amine salts of acidic phosphate esters and amines of primary to tertiary linear or branched alkyl groups having 1 to 24, preferably 5 to 18 carbon atoms.

Examples of amines that constitute the amine salts of acidic phosphate esters include salts with linear or branched amines such as methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, oleylamine, tetracosylamine, dimethylamine, diethylamine, dipropylamine, dibutylamine, dipentylamine, dihexylamine, diheptylamine, dioctylamine, dinonylamine, didecylamine, diundecylamine, didodecylamine, ditridecylamine, ditetradecylamine, dipentadecylamine, dihexadecylamine, diheptadecylamine, dioctadecylamine, dioleylamine, ditetracosylamine, trimethylamine, triethylamine, tripropylamine, tributylamine, tripentylamine, trihexylamine, triheptylamine, trioctylamine, trinonylamine, tridecylamine, triundecylamine, tridodecylamine, tritridecylamine, tritetradecylamine, tripentadecylamine, trihexadecylamine, triheptadecylamine, trioctadecylamine, trioleylamine, and tritetracosylamine. The amine may be a single compound or a mixture of two or more kinds of compounds.

Examples of chlorinated phosphate esters include tris-dichloropropyl phosphate, tris-chloroethyl phosphate, tris-chlorophenyl phosphate, and polyoxyalkylene-bis[di(chloroalkyl)]phosphate. Examples of phosphite esters include dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite, and tricresyl phosphite. A mixture of the above can also be used.

When the refrigerator oil and working fluid for a refrigerator according to the present embodiment contain the above phosphorus compound, the content of the phosphorus compound is not limited, but it is preferably 0.01 to 5.0% by mass and more preferably 0.02 to 3.0% by mass, based on the entire amount of the refrigerator oil (based on the total amount of the base oil and all compounded additive agents). Note that the above phosphorus compounds may be used alone as one kind, or two or more kinds may be used in combination.

In addition, to the refrigerator oil and working fluid for a refrigerator according to the present embodiment, a terpene compound can be added in order to further improve their heat and chemical stabilities. The term "terpene compound" in the present disclosure refers to a compound in which isoprene is polymerized or a derivative thereof, and the dimer to octamer of isoprene is preferably used. Specific examples of the terpene compound include monoterpenes such as geraniol, nerol, linalool, citral (including geranial), citronellol, menthol, limonene, terpineol, carvone, ionone, thujone, camphor, and borneol; sesquiterpenes such as farnesene, farnesol, nerolidol, juvenile hormone, humulene, caryophyllene, elemene, cadinol, cadinene, and tutin; diterpenes such as geranylgeraniol, phytol, abietic acid, pimaradiene, daphnetoxin, taxol, and pimaric acid; sesterterpenes such as geranylfarnesene; triterpenes such as squalene, limonin, camelliagenin, hopane, and lanosterol; and tetraterpenes such as carotenoid.

Among these terpene compounds, monoterpenes, sesquiterpenes, and diterpenes are preferable, sesquiterpenes are more preferable, and α-farnesene (3,7,11-trimethyldodeca-1,3,6,10-tetraene) and/or β-farnesene (7,11-dimethyl-3-methylidenedodeca-1,6,10-triene) are particularly preferable. In the present disclosure, one kind of terpene compound may be used alone, or two or more kinds of terpene compounds may be used in combination.

The content of the terpene compound in the refrigerator oil according to the present embodiment is not limited, but it is preferably 0.001 to 10% by mass, more preferably 0.01 to 5% by mass, and still more preferably 0.05 to 3% by mass, based on the entire amount of the refrigerator oil. When the content of the terpene compound is less than 0.001% by mass, the effects of improving heat and chemical stabilities tend to be insufficient, and when the content is greater than 10% by mass, the lubricity tends to be insufficient. Also, as for the content of the terpene compound in the working fluid for a refrigerator according to the present embodiment, it is desirable to select it so as to be within the above preferred range when based on the entire amount of the refrigerator oil.

In addition, in order to further improve their heat and chemical stabilities, the refrigerator oil and working fluid for a refrigerator according to the present embodiment can contain at least one epoxy compound selected from phenyl glycidyl ether-type epoxy compounds, alkyl glycidyl ether-type epoxy compounds, glycidyl ester-type epoxy compounds, allyloxirane compounds, alkyloxirane compounds, alicyclic epoxy compounds, epoxidized fatty acid monoesters, and epoxidized vegetable oils.

As for the phenyl glycidyl ether-type epoxy compounds, specifically, phenyl glycidyl ether or alkylphenyl glycidyl ethers can be exemplified. Examples of the alkylphenyl glycidyl ethers referred to here include those with 1 to 3 alkyl groups having 1 to 13 carbon atoms, and among them, those with one alkyl group having 4 to 10 carbon atoms can be exemplified as preferred ones, such as n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, and decylphenyl glycidyl ether.

As for the alkyl glycidyl ether-type epoxy compounds, specifically, decyl glycidyl ether, undecyl glycidyl ether, dodecyl glycidyl ether, tridecyl glycidyl ether, tetradecyl glycidyl ether, 2-ethylhexyl glycidyl ether, neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ether, polyalkylene glycol diglycidyl ether, and the like can be exemplified.

Specific examples of the glycidyl ester-type epoxy compounds include phenyl glycidyl ester, alkyl glycidyl esters, and alkenyl glycidyl esters, and glycidyl-2,2-dimethyl octanoate, glycidyl benzoate, glycidyl acrylate, glycidyl methacrylate, and the like can be exemplified as preferred ones.

As for the allyloxirane compounds, specifically, 1,2-epoxystyrene, alkyl-1,2-epoxystyrene, and the like can be exemplified.

As for the alkyloxirane compounds, specifically, 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane 1,1,2-epoxyoctadecane, 2-epoxynonadecane, 1,2-epoxyicosan, and the like can be exemplified.

As for the alicyclic epoxy compounds, specifically, 1,2-epoxycyclohexane, 1,2-epoxycyclopentane, 3,4-epoxycyclohexylmethyl-3,4-epoxycyclohexane carboxylate, bis(3,4-epoxycyclohexylmethyl) adipate, exo-2,3-epoxynorbornane, bis(3,4-epoxy-6-methylcyclohexylmethyl) adipate, 2-(7-oxabicyclo[4.1.0]hept-3-yl)-spiro(1,3-dioxane-5,3'-[7]oxabicyclo[4.1.0]heptane, 4-(1'-methylepoxyethyl)-1,2-epoxy-2-methylcyclohexane, 4-epoxyethyl-1,2-epoxycyclohexane, and the like can be exemplified.

As for the epoxidized fatty acid monoesters, specifically, esters of epoxidized fatty acids having 12 to 20 carbon atoms with alcohols having 1 to 8 carbon atoms, phenol, or alkylphenols can be exemplified. In particular, butyl, hexyl, benzyl, cyclohexyl, methoxyethyl, octyl, phenyl, and butylphenyl esters of epoxystearic acid are preferably used.

As for the epoxidized vegetable oils, specifically, epoxy compounds of vegetable oils such as soybean oil, linseed oil, and cottonseed oil, and the like can be exemplified.

Among these epoxy compounds, preferable are phenyl glycidyl ether-type epoxy compounds, alkyl glycidyl ether-type epoxy compounds, glycidyl ester-type epoxy compounds, and alicyclic epoxy compounds.

When the refrigerator oil and working fluid for a refrigerator according to the present embodiment contain the above epoxy compound, the content of the epoxy compound is not limited, but it is preferably 0.01 to 5.0% by mass and more preferably 0.1 to 3.0% by mass, based on the entire amount of the refrigerator oil. Note that the above epoxy compounds may be used alone as one kind, or two or more kinds may be used in combination.

Note that the kinematic viscosity of the refrigerator oil containing the polyhydric alcohol fatty acid ester (A) at 40° C. can be preferably 20 to 80 $mm^2/s$, more preferably 25 to 75 $mm^2/s$, and most preferably 30 to 70 $mm^2/s$. Also, the kinematic viscosity at 100° C. can be preferably 2 to 20 $mm^2/s$ and more preferably 3 to 10 $mm^2/s$. When the kinematic viscosity is at or above the aforementioned lower limit value, it is easy to ensure a viscosity required as a refrigerator oil, whereas, when the kinematic viscosity is at or below the aforementioned upper limit value, in the case where difluoromethane is contained as a refrigerant composition, the miscibility with that difluoromethane can be made sufficient.

Also, the volume resistivity of the refrigerator oil containing the polyhydric alcohol fatty acid ester (A) is not limited, but it can be preferably $1.0\times10^{12}$ Ω·cm or more, more preferably $1.0\times10^{13}$ Ω·cm or more, and most preferably $1.0\times10^{14}$ (2 cm or more. In particular, when used for sealed refrigerators, high electrical insulating properties tend to be required. Note that the volume resistivity means a value at 25° C. measured in accordance with JIS C 2101 "Testing methods of electrical insulating oils".

Also, the content of moisture of the refrigerator oil containing the polyhydric alcohol fatty acid ester (A) is not limited, but it can be preferably 200 ppm or less, more preferably 100 ppm or less, and most preferably 50 ppm or less, based on the entire amount of the refrigerator oil. In particular, when used for sealed refrigerators, the content of moisture is required to be low from the viewpoint of impacts on the heat and chemical stabilities and electrical insulating properties of the refrigerator oil.

Also, the acid value of the refrigerator oil containing the polyhydric alcohol fatty acid ester (A) is not limited, but it can be preferably 0.1 mgKOH/g or less and more preferably 0.05 mgKOH/g or less, in order to prevent corrosion of metals used in the refrigerator or piping. Note that, in the present disclosure, the acid value means an acid value measured in accordance with JIS K 2501 "Petroleum products and lubricants—Determination of neutralization number".

Also, the ash content of the refrigerator oil containing the polyhydric alcohol fatty acid ester (A) is not limited, but it can be preferably 100 ppm or less and more preferably 50 ppm or less, in order to enhance the heat and chemical stabilities of the refrigerator oil and to suppress the occurrence of sludge and the like. Note that the ash content means a value of ash content measured in accordance with JIS K 2272, "Crude oil and petroleum products—Determination of ash and sulfated ash".

(Complex Ester Oil)

Complex ester oils are esters of a fatty acid and a dibasic acid with a monohydric alcohol and a polyol. As for the fatty acid, dibasic acid, monohydric alcohol, and polyol, the same ones as mentioned above can be used.

Examples of the fatty acid include those listed for the fatty acid of the above polyol ester.

Examples of the dibasic acid include oxalic acid, malonic acid, succinic acid, glutaric acid, adipic acid, pimelic acid, suberic acid, azelaic acid, sebacic acid, phthalic acid, isophthalic acid, and terephthalic acid.

Examples of the polyol include those listed as the polyhydric alcohol of the above polyol ester. The complex ester is an ester of these fatty acid, dibasic acid, and polyol, each of which may be a single component or may be made up of multiple components.

(Polyol Carbonate Ester Oil)

Polyol carbonate ester oils are esters of carbonic acid and a polyol.

Examples of the polyol include the same diols and polyols as mentioned above.

Also, the polyol carbonate ester oil may be a ring-opened polymer of a cyclic alkylene carbonate.

(2-1-2) Ether Refrigerator Oil

As for the ether refrigerator oil, mention may be made of polyvinyl ether oils, polyoxyalkylene oils, and the like.

(Polyvinyl Ether Oil)

Examples of the polyvinyl ether oil include polymers of a vinyl ether monomer, copolymers of a vinyl ether monomer and a hydrocarbon monomer having an olefinic double bond, and copolymers of a monomer having an olefinic double bond and a polyoxyalkylene chain and a vinyl ether monomer.

The carbon/oxygen molar ratio of the polyvinyl ether oil is preferably 2 or more and 7.5 or less and more preferably 2.5 or more and 5.8 or less. When the carbon/oxygen molar ratio is lower than the above range, the moisture absorption properties are increased, and when it is higher than the above range, the miscibility is reduced. Also, the weight average molecular weight of the polyvinyl ether is preferably 200 or more and 3000 or less and more preferably 500 or more and 1500 or less.

The polyvinyl ether oil preferably has a pour point of −30° C. or lower. The polyvinyl ether oil preferably has a surface tension at 20° C. of 0.02 N/m or more and 0.04 N/m or less. The polyvinyl ether oil preferably has a density at 15° C. of 0.8 $g/cm^3$ or more and 1.8 $g/cm^3$ or less. The polyvinyl ether oil preferably has a saturated moisture content of 2000 ppm or more at a temperature of 30° C. and a relative humidity of 90%.

In the refrigerator oil, the polyvinyl ether may be contained as the main component. When the refrigerant contains HFO-1234yf, the polyvinyl ether, which is the main component of the refrigerator oil, has miscibility with that HFO-1234yf, and when the kinematic viscosity of the refrigerator oil at 40° C. is 400 $mm^2/s$ or less, HFO-1234yf is dissolved in the refrigerator oil to some extent. Also, when the pour point of the refrigerator oil is −30° C. or lower, it is easy to ensure the flowability of the refrigerator oil even at a site in the refrigerant circuit where the refrigerant composition or refrigerator oil is at a low temperature. In addition, when the surface tension of the refrigerator oil at 20° C. is 0.04 N/m or less, the refrigerator oil discharged from the compressor is less likely to become large oil droplets that are difficult to be pushed away by the refrigerant composition. Therefore, the refrigerator oil discharged from the compressor is dissolved in HFO-1234yf and is easily returned to the compressor together with HFO-1234yf.

Also, when the kinematic viscosity of the refrigerator oil at 40° C. is 30 $mm^2/s$ or more, the lubricating performance can be easily ensured because insufficient oil film strength is prevented due to a too low kinematic viscosity. In addition, when the surface tension of the refrigerator oil at 20° C. is 0.02 N/m or more, it is difficult for the refrigerator oil to become small oil droplets in the gas refrigerant inside the compressor, and it is possible to prevent a large amount of the refrigerator oil from being discharged from the compressor. This makes it easy to ensure a sufficient amount of the refrigerator oil to be stored in the compressor.

Also, when the saturated moisture content of the refrigerator oil is 2000 ppm or more at a temperature of 30° C. and a relative humidity of 90%, the moisture absorption properties of the refrigerator oil can be made relatively high. This means that, when the refrigerant contains HFO-1234yf, the moisture in HFO-1234yf can be captured to some extent by the refrigerator oil. HFO-1234yf has a molecular structure that is susceptible to alteration/deterioration due to the impact of moisture contained therein. Therefore, the moisture absorption effects by the refrigerator oil can suppress such deterioration.

Furthermore, in the case where a predetermined resin functional component is arranged in a sealing section or sliding section that can come into contact with the refrigerant flowing through the refrigerant circuit, and where that resin functional component is constituted of any of polytetrafluoroethylene, polyphenylene sulfide, phenolic resin, polyamide resin, chloroprene rubber, silicon rubber, hydrogenated nitrile rubber, fluoroelastomer, and hydrin rubber, as for the aniline point of the refrigerator oil, it is preferable to set its numerical range in consideration of the compatibility with the resin functional component. By setting the aniline point in this way, for example, the compatibility of the refrigerator oil with bearings that constitute the resin functional component is improved. Specifically, when the aniline point is too low, the refrigerator oil easily permeates through the bearings and the like, which makes it easier for the bearings and the like to be swollen. On the other hand, when the aniline point is too high, it becomes difficult for the refrigerator oil to permeate through the bearings and the like, which makes it easier for the bearings and the like to be contracted. Therefore, by setting the aniline point of the refrigerator oil to the predetermined numerical range, swelling/contraction deformation of the bearings and the like can be prevented. Here, when each bearing or the like undergoes swelling/shrinkage deformation, for example, it becomes impossible to maintain the gap at the sliding section to the desired length. As a result, there is a risk of leading to increase in the sliding resistance and reduction in the rigidity of the sliding section. However, by setting the aniline point of the refrigerator oil to the predetermined numerical range as described above, such defects can be avoided because the swelling/shrinkage deformation of the bearings and the like is suppressed.

As the vinyl ether monomer, one kind of vinyl ether monomer may be used alone, or two or more kinds of vinyl ether monomers may be used in combination. Examples of the hydrocarbon monomer having an olefinic double bond include ethylene, propylene, various butenes, various pentenes, various hexenes, various heptenes, various octenes, diisobutylene, triisobutylene, styrene, α-methylstyrene, and various alkyl-substituted styrenes. As the hydrocarbon monomer having an olefinic double bond, one kind of hydrocarbon monomer may be used alone, or two or more kinds of hydrocarbon monomers may be used in combination.

The polyvinyl ether copolymer may be either a block or random copolymer. As the polyvinyl ether oil, one kind of polyvinyl ether oil may be used alone, or two or more kinds of polyvinyl ether oils may be used in combination.

A polyvinyl ether oil that is preferably used has structural units represented by the following general formula (1):

(1)

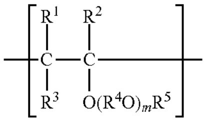

(In the formula, $R^1$, $R^2$, and $R^3$ may be the same as or different from each other, and each represent a hydrogen atom or a hydrocarbon group having 1 to 8 carbon atoms; $R^4$ represents a divalent hydrocarbon group having 1 to 10 carbon atoms or a divalent ether bond oxygen-containing hydrocarbon group having 2 to 20 carbon atoms; $R^5$ represents a hydrocarbon group having 1 to 20 carbon atoms; m is a number such that the average value of m for the above polyvinyl ether is 0 to 10; $R^1$ to $R^5$ may be the same as or different from each other for each structural unit; and when m is 2 or more in one structural unit, multiple $R^4O$ may be the same or different.)

As for $R^1$, $R^2$, and $R^3$ in the above general formula (1), it is preferable that at least one of them is a hydrogen atom, and in particular, all of them are hydrogen atoms. In the general formula (1), m is preferably 0 or more and 10 or less, particularly 0 or more and 5 or less, and furthermore 0. $R^5$ in the general formula (1) represents a hydrocarbon group having 1 to 20 carbon atoms, but specifically, this hydrocarbon group represents any of alkyl groups including a methyl group, an ethyl group, a n-propyl group, an isopropyl group, a n-butyl group, an isobutyl group, a sec-butyl group, a tert-butyl group, various pentyl groups, various hexyl groups, various heptyl groups, and various octyl groups; cycloalkyl groups including a cyclopentyl group, a cyclohexyl group, various methylcyclohexyl groups, various ethylcyclohexyl groups, and various dimethylcyclohexyl groups; aryl groups including a phenyl group, various methylphenyl groups, various ethylphenyl groups, and various dimethylphenyl groups; and arylalkyl groups including a benzyl group, various phenylethyl groups, and various methylbenzyl groups. Note that, among alkyl groups, cycloalkyl groups, phenyl groups, aryl groups, and arylalkyl groups, alkyl groups, in particular alkyl groups having 1 to 5 carbon atoms, are preferable. Note that it is preferable for the above polyvinyl ether oil to contain a polyvinyl ether oil in which $R^5$ is an alkyl group having 1 or 2 carbon atoms and a polyvinyl ether oil in which $R^5$ is an alkyl group having 3 or 4 carbon atoms at a ratio of 40%:60% to 100%:0%.

The polyvinyl ether oil in the present embodiment may be a homopolymer in which structural units represented by the general formula (1) are the same, or it may be a copolymer constituted of two or more kinds of structural units. The copolymer may be either a block copolymer or a random copolymer.

The polyvinyl ether oil according to the present embodiment may be constituted only of structural units represented by the above general formula (1), but it may also be a copolymer that further contains structural units represented by the following general formula (2). In this case, the copolymer may be either a block copolymer or a random copolymer.

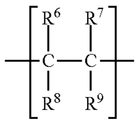

(2)

(In the formula, $R^6$ to $R^9$ may be the same as or different from each other, and each represent a hydrogen atom or a hydrocarbon group having 1 to 20 carbon atoms.)

Examples of the vinyl ether monomer include a compound of the following general formula (3):

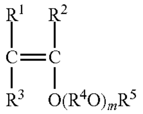

(3)

(In the formula, $R^1$, $R^2$, $R^3$, $R^4$, $R^5$ and m have the same definitions as $R^1$, $R^2$, $R^3$, $R^4$, $R^5$ and m in the general formula (1), respectively.)

There are various vinyl ether monomers corresponding to the above polyvinyl ether compound, but examples thereof include vinyl methyl ether; vinyl ethyl ether; vinyl n-propyl ether; vinyl isopropyl ether; vinyl n-butyl ether; vinyl isobutyl ether; vinyl sec-butyl ether; vinyl tert-butyl ether; vinyl n-pentyl ether; vinyl n-hexyl ether; vinyl 2-methoxyethyl ether; vinyl 2-ethoxyethyl ether; vinyl 2-methoxy-1-methylethyl ether; vinyl 2-methoxy-propyl ether; vinyl 3,6-dioxaheptyl ether; vinyl 3,6,9-trioxadecyl ether; vinyl 1,4-dimethyl-3,6-dioxaheptyl ether; vinyl 1,4,7-trimethyl-3,6,9-trioxadecyl ether; vinyl 2,6-dioxa-4-heptyl ether; vinyl 2,6,9-trioxa-4-decyl ether; 1-methoxypropene; 1-ethoxypropene; 1-n-propoxypropene; 1-isopropoxypropene; 1-n-butoxypropene; 1-isobutoxypropene; 1-sec-butoxypropene; 1-tert-butoxypropene; 2-methoxypropene; 2-ethoxypropene; 2-n-propoxypropene; 2-isopropoxypropene; 2-n-butoxypropene; 2-isobutoxypropene; 2-sec-butoxypropene; 2-tert-butoxypropene; 1-methoxy-1-butene; 1-ethoxy-1-butene; 1-n-propoxy-1-butene; 1-isopropoxy-1-butene; 1-n-butoxy-1-butene; 1-isobutoxy-1-butene; 1-sec-butoxy-1-butene; 1-tert-butoxy-1-butene; 2-methoxy-1-butene; 2-ethoxy-1-butene; 2-n-propoxy-1-butene; 2-isopropoxy-1-butene; 2-n-butoxy-1-butene; 2-isobutoxy-1-butene; 2-sec-butoxy-1-butene; 2-tert-butoxy-1-butene; 2-methoxy-2-butene; 2-ethoxy-2-butene; 2-n-propoxy-2-butene; 2-isopropoxy-2-butene; 2-n-butoxy-2-butene; 2-isobutoxy-2-butene; 2-sec-butoxy-2-butene; and 2-tert-butoxy-2-butene. These vinyl ether monomers can be produced by publicly known methods.

As for the polyvinyl ether compound having constituent units represented by the above general formula (1), its ends can be converted to the desired structure by the method shown in the present disclosure example and other publicly known methods. As for the groups to which they are converted, examples thereof may include saturated hydrocarbons, ethers, alcohols, ketones, amides, and nitriles.

The polyvinyl ether compound preferably has the following end structure:

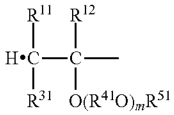

(4)

(In the formula, $R^{11}$, $R^{21}$, and $R^{31}$ may be the same as or different from each other, and each represent a hydrogen atom or a hydrocarbon group having 1 to 8 carbon atoms; $R^{41}$ represents a divalent hydrocarbon group having 1 to 10 carbon atoms or a divalent ether bond oxygen-containing hydrocarbon group having 2 to 20 carbon atoms; $R^{51}$ represents a hydrocarbon group having 1 to 20 carbon atoms; m is a number such that the average value of m for the polyvinyl ether is 0 to 10; and when m is 2 or more, multiple $R^{41}O$ may be the same or different.)

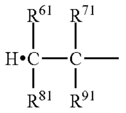

(5)

(In the formula, $R^{61}$, $R^{71}$, $R^{81}$, and $R^{91}$ may be the same as or different from each other, and each represent a hydrogen atom or a hydrocarbon group having 1 to 20 carbon atoms.)

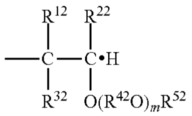

(6)

(In the formula, $R^{12}$, $R^{22}$, and $R^{32}$ may be the same as or different from each other, and each represent a hydrogen atom or a hydrocarbon group having 1 to 8 carbon atoms; $R^{42}$ represents a divalent hydrocarbon group having 1 to 10 carbon atoms or a divalent ether bond oxygen-containing hydrocarbon group having 2 to 20 carbon atoms; $R^{52}$ represents a hydrocarbon group having 1 to 20 carbon atoms; m is a number such that the average value of m for the polyvinyl ether is 0 to 10; and when m is 2 or more, multiple $R^{42}O$ may be the same or different.)

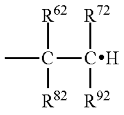

(7)

(In the formula, $R^{62}$, $R^{72}$, $R^{82}$, and $R^{92}$ may be the same as or different from each other, and each represent a hydrogen atom or a hydrocarbon group having 1 to 20 carbon atoms.)

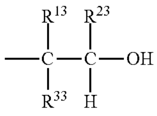

(8)

(In the formula, $R^{13}$, $R^{23}$, and $R^{33}$ may be the same as or different from each other, and each represent a hydrogen atom or a hydrocarbon group having 1 to 8 carbon atoms.) The polyvinyl ether oil in the present embodiment can be produced by radical polymerization, cationic polymerization, radiation polymerization, or the like of the monomers described above. After completion of the polymerization reaction, the polyvinyl ether compound having the target structural units represented by the general formula (1) can be obtained by performing usual separation and purification methods as required.

(Polyoxyalkylene Oil)

Examples of the polyoxyalkylene oil include polyoxyalkylene compounds obtained by a method such as polymerizing alkylene oxides having 2 to 4 carbon atoms (ethylene oxide, propylene oxide, or the like) with water or a hydroxyl group-containing compound as an initiator. It may also be one in which hydroxyl groups of a polyoxyalkylene compound have been etherified or esterified. The oxyalkylene units in the polyoxyalkylene oil may be the same in one molecule, or two or more kinds of oxyalkylene units may be contained. It is preferable that at least oxypropylene units are contained in one molecule.

Specific examples of the polyoxyalkylene oil include a compound represented by the following general formula (9):

$$R^{101}\text{—}[(OR^{102})_k\text{—}OR^{103}]_1 \quad (9)$$

(In the formula, $R^{101}$ represents a hydrogen atom, an alkyl group having 1 to 10 carbon atoms, an acyl group having 2 to 10 carbon atoms, or an aliphatic hydrocarbon group having 1 to 10 carbon atoms with 2 to 6 bonding links; $R^{102}$ represents an alkylene group having 2 to 4 carbon atoms; $R^{103}$ represents a hydrogen atom, an alkyl group having 1 to 10 carbon atoms, or an acyl group having 2 to 10 carbon atoms; 1 represents an integer of 1 to 6; and k represents a number such that the average value of k×1 is 6 to 80.)

In the above general formula (9), the alkyl groups in $R^{101}$ and $R^{203}$ may be either linear, branched, or cyclic. Specific examples of such alkyl groups may include a methyl group, an ethyl group, a n-propyl group, an isopropyl group, various butyl groups, various pentyl groups, various hexyl groups, various heptyl groups, various octyl groups, various nonyl groups, various decyl groups, a cyclopentyl group, and a cyclohexyl group. When the number of carbon atoms in these alkyl groups exceeds 10, the miscibility with the refrigerant is reduced and phase separation may occur. The preferred number of carbon atoms in the alkyl groups is 1 to 6.

Also, the alkyl group moieties of the acyl groups in $R^{101}$ and $R^{103}$ may be either linear, branched, or cyclic. Specific examples of the alkyl group moieties of the acyl groups may include the same various groups having 1 to 9 carbon atoms listed above as the specific examples of alkyl groups. When the number of carbon atoms in these acyl groups exceeds 10, the miscibility with the refrigerant is reduced and phase separation may occur. The preferred number of carbon atoms in the acyl groups is 2 to 6.

When $R^{101}$ and $R^{103}$ are both alkyl groups or acyl groups, $R^{101}$ and $R^{103}$ may be the same as or different from each other.

Furthermore, when 1 is 2 or more, multiple $R^{103}$ in one molecule may be the same or different.

When $R^{101}$ is an aliphatic hydrocarbon group having 1 to 10 carbon atoms with 2 to 6 bonding sites, this aliphatic hydrocarbon group may be chain-like or cyclic. Examples of the aliphatic hydrocarbon group with 2 bonding sites include an ethylene group, a propylene group, a butylene group, a pentylene group, a hexylene group, a heptylene group, an octylene group, a nonylene group, a decylene group, a cyclopentylene group, and a cyclohexylene group. Also, examples of the aliphatic hydrocarbon group with 3 to 6 bonding sites may include residues obtained by removing hydroxyl groups from polyhydric alcohols such as trimethylolpropane, glycerin, pentaerythritol, sorbitol; 1,2,3-trihydroxycyclohexane; and 1,3,5-trihydroxycyclohexane.

When the number of carbon atoms in this aliphatic hydrocarbon group exceeds 10, the miscibility with the refrigerant is reduced and phase separation may occur. The preferred number of carbon atoms is 2 to 6.

$R^{102}$ in the above general formula (9) is an alkylene group having 2 to 4 carbon atoms, and examples of the repeating unit, oxyalkylene group, include an oxyethylene group, an oxypropylene group, and an oxybutylene group. The oxyalkylene groups in one molecule may be the same, or two or more kinds of oxyalkylene groups may be contained, but those containing at least oxypropylene units in one molecule are preferable, and in particular, those containing 50% by mole or more of oxypropylene units in the oxyalkylene units are suitable.

In the above general formula (9), 1 is an integer of 1 to 6, which can be determined depending on the number of bonding sites of $R^{101}$. For example, when $R^{101}$ is an alkyl group or an acyl group, 1 is 1, and when $R^{101}$ is an aliphatic hydrocarbon group with 2, 3, 4, 5, and 6 bonding sites, 1 is 2, 3, 4, 5, and 6, respectively. It is preferable that 1 is 1 or 2. Also, k is preferably a number such that the average value of k×1 is 6 to 80.

As for the structure of the polyoxyalkylene oil, polyoxypropylene diol dimethyl ether represented by the following general formula (10) and poly(oxyethylene/oxypropylene) diol dimethyl ether represented by the following general formula (11) are suitable in terms of economic efficiency and the aforementioned effects, and polyoxypropylene diol monobutyl ether represented by the following general formula (12), and furthermore, polyoxypropylene diol monomethyl ether represented by the following general formula (13), poly(oxyethylene/oxypropylene) diol monomethyl ether represented by the following general formula (14), poly(oxyethylene/oxypropylene) diol monobutyl ether represented by the following general formula (15), and polyoxypropylene diol diacetate represented by the following general formula (16) are also suitable in terms of economic efficiency and the like.

$$CH_3O\text{—}(C_3H_6O)_h\text{—}CH_3 \quad (10)$$

(In the formula, h represents a number of 6 to 80.)

$$CH_3O\text{—}(C_2H_4O)_i\text{—}(C_3H_6O)_j\text{—}CH_3 \quad (11)$$

(In the formula, i and j each represent a number that is 1 or more and the total of i and j is 6 to 80.)

$$C_4H_9O\text{—}(C_3H_6O)_h\text{—}H \quad (12)$$

(In the formula, h represents a number of 6 to 80.)

$$CH_3O\text{—}(C_3H_6O)_h\text{—}H \quad (13)$$

(In the formula, h represents a number of 6 to 80.)

$$CH_3O\text{—}(C_2H_4O)_i\text{—}(C_3H_6O)_j\text{—}H \quad (14)$$

(In the formula, i and j each represent a number that is 1 or more and the total of i and j is 6 to 80.)

$$C_4H_9O\text{—}(C_2H_4O)_i\text{—}(C_3H_6O)_j\text{—}H \quad (15)$$

(In the formula, i and j each represent a number that is 1 or more and the total of i and j is 6 to 80.)

$$CH_3COO\text{—}(C_3H_6O)_h\text{—}COCH_3 \quad (16)$$

(In the formula, h represents a number of 6 to 80.)

As this polyoxyalkylene oil, one kind of polyoxyalkylene oil may be used alone, or two or more kinds of polyoxyalkylene oils may be used in combination.

(2-2) Hydrocarbon Refrigerator Oil

As the hydrocarbon refrigerator oil, for example, an alkylbenzene can be used.

As the alkylbenzene, branched alkylbenzenes synthesized from a propylene polymerized product and benzene as raw materials using a catalyst such as hydrogen fluoride, and linear alkylbenzenes synthesized from normal paraffin and benzene as raw materials using the same catalyst can be used. The number of carbon atoms in the alkyl group is preferably 1 to 30 and more preferably 4 to 20, from the viewpoint of achieving a suitable viscosity as the lubricating oil base oil. Also, the number of alkyl groups that one molecule of alkylbenzene has depends on the number of carbon atoms of the alkyl group, but it is preferably 1 to 4 and more preferably 1 to 3 in order to keep the viscosity within the set range.

Note that the hydrocarbon refrigerator oil is preferably circulated together with the refrigerant in the refrigeration cycle system. Although the most preferable form of the refrigerator oil is that it is dissolved in the refrigerant, as long as the refrigerator oil can be circulated together with the refrigerant in the refrigeration cycle system, even a refrigerator oil with low solubility (for example, the refrigerator oil described in Japanese Patent No. 2,803,451) can be used, for example. In order to circulate the refrigerator oil in the refrigeration cycle system, the kinematic viscosity of the refrigerator oil is required to be small. As for the kinematic viscosity of the hydrocarbon refrigerator oil, it is preferably 1 $mm^2/s$ or more and 50 $mm^2/s$ or less at 40° C., and more preferably 1 $mm^2/s$ or more and 25 $mm^2/s$ or less.

These refrigerator oils may be used alone as one kind, or two or more kinds may be used in combination.

The content of the hydrocarbon refrigerator oil in the working fluid for a refrigerator may be, for example, 10 parts by mass or more and 100 parts by mass or less, and it is more preferably 20 parts by mass or more and 50 parts by mass or less, relative to 100 parts by mass of the refrigerant composition.

(2-3) Additive Agent

The refrigerator oil may contain one kind of additive agent or two or more kinds of additive agents.

Examples of the additive agent include acid scavengers, extreme pressure agents, antioxidants, antifoaming agents, oiliness improvers, metal deactivators such as copper deactivators, anti-wear agents, and compatibilizing agents.

As the acid scavenger, phenyl glycidyl ether, alkyl glycidyl ethers, alkylene glycol glycidyl ethers, cyclohexene oxide, α-olefin oxides, epoxy compounds such as epoxidized soybean oil, carbodiimides, and the like can be used. Note that, among these, phenyl glycidyl ether, alkyl glycidyl ethers, alkylene glycol glycidyl ethers, cyclohexene oxide, and α-olefin oxides are preferable from the viewpoint of miscibility. The alkyl groups of alkyl glycidyl ethers and the alkylene groups of alkylene glycol glycidyl ethers may be branched. The number of carbon atoms in them may be 3 or more and 30 or less, more preferably 4 or more and 24 or less, and still more preferably 6 or more and 16 or less. Also, as for the α-olefin oxide, the total number of carbon atoms may be 4 or more and 50 or less, more preferably 4 or more and 24 or less, and still more preferably 6 or more and 16 or less. Only one kind of acid scavenger may be used, or multiple kinds can be used in combination.

As the extreme pressure agent, those containing phosphate esters can be used, for example.

As the phosphate ester, phosphate esters, phosphite esters, acidic phosphate esters, acidic phosphite esters, and the like can be used, and those containing amine salts of phosphate esters, phosphite esters, acidic phosphate esters, and acidic phosphite esters can also be used.

As for the phosphate ester, there are triaryl phosphates, trialkyl phosphates, trialkylaryl phosphates, triarylalkyl phosphates, trialkenyl phosphates, and the like. Furthermore, when specifically listing the phosphate ester, there are triphenyl phosphate, tricresyl phosphate, benzyl diphenyl phosphate, ethyl diphenyl phosphate, tributyl phosphate, ethyl dibutyl phosphate, cresyl diphenyl phosphate, dicresyl phenyl phosphate, ethylphenyl diphenyl phosphate, diethylphenyl phenyl phosphate, propylphenyl diphenyl phosphate, dipropylphenyl phenyl phosphate, triethylphenyl phosphate, tripropylphenyl phosphate, butylphenyl diphenyl phosphate, dibutylphenyl phenyl phosphate, tributylphenyl phosphate, trihexyl phosphate, tri(2-ethylhexyl) phosphate, tridecyl phosphate, trilauryl phosphate, trimyristyl phosphate, tripalmityl phosphate, tristearyl phosphate, trioleyl phosphate, and the like.

Also, as for specific examples of the phosphite ester, there are triethyl phosphite, tributyl phosphite, triphenyl phosphite, tricresyl phosphite, tri(nonylphenyl) phosphite, tri(2-ethylhexyl) phosphite, tridecyl phosphite, trilauryl phosphite, triisooctyl phosphite, diphenyl isodecyl phosphite, tristearyl phosphite, trioleyl phosphite, and the like.

In addition, as for specific examples of the acidic phosphate ester, there are 2-ethylhexyl acid phosphate, ethyl acid phosphate, butyl acid phosphate, oleyl acid phosphate, tetracosyl acid phosphate, isodecyl acid phosphate, lauryl acid phosphate, tridecyl acid phosphate, stearyl acid phosphate, isostearyl acid phosphate, and the like.

Moreover, as for specific examples of the acidic phosphite ester, there are dibutyl hydrogen phosphite, dilauryl hydrogen phosphite, dioleyl hydrogen phosphite, distearyl hydrogen phosphite, diphenyl hydrogen phosphite, and the like. Among the phosphate esters listed above, oleyl acid phosphate and stearyl acid phosphate are suitable.

Also, among amines used in the amine salts of phosphate esters, phosphite esters, acidic phosphate esters, or acidic phosphite esters, specific examples of monosubstituted amines include butylamine, pentylamine, hexylamine, cyclohexylamine, octylamine, laurylamine, stearylamine, oleylamine, and benzylamine. In addition, specific examples of disubstituted amines include dibutylamine, dipentylamine, dihexylamine, dicyclohexylamine, dioctylamine, dilaurylamine, distearylamine, dioleylamine, dibenzylamine, stearyl monoethanolamine, decyl monoethanolamine, hexyl monopropanolamine, benzyl monoethanolamine, phenyl monoethanolamine, and tolyl monopropanol. Moreover, specific examples of trisubstituted amines include tributylamine, tripentylamine, trihexylamine, tricyclohexylamine, trioctylamine, trilaurylamine, tristearylamine, trioleylamine, tribenzylamine, dioleyl monoethanolamine, dilauryl monopropanolamine, dioctyl monoethanolamine, dihexyl monopropanolamine, dibutyl monopropanolamine, oleyl diethanolamine, stearyl dipropanolamine, lauryl diethanolamine, octyl dipropanolamine, butyl diethanolamine, benzyl diethanolamine, phenyl diethanolamine, tolyl dipropanolamine, xylyl diethanolamine, triethanolamine, and tripropanolamine.

Also, examples of extreme pressure agents other than those described above include organic sulfur compound-based extreme pressure agents such as monosulfides, polysulfides, sulfoxides, sulfones, thiosulfinates, sulfurized oils and fats, thiocarbonates, thiophenes, thiazoles, and methanesulfonate esters; thiophosphate ester-based extreme pressure agents such as thiophosphate triesters; ester-based extreme pressure agents such as higher fatty acids, hydroxyaryl fatty acids, polyhydric alcohol esters, and acrylate esters; organochlorine-based extreme pressure agents such as chlorinated hydrocarbons including chlorinated paraffins, and chlorinated carboxylic acid derivatives; organofluorinated extreme pressure agents such as fluorinated aliphatic carboxylic acids, fluorinated ethylene resins, fluorinated alkyl polysiloxanes, and fluorinated graphites; alcohol-based extreme pressure agents such as higher alcohols; and metal compound-based extreme pressure agents such as naphthenate salts (lead naphthenate and the like), fatty acid salts (lead fatty acid and the like), thiophosphate salts (zinc dialkyldithiophosphates and the like), thiocarbamate salts, organomolybdenum compounds, organotin compounds, organogermanium compounds, and borate esters.

As the antioxidant, phenolic antioxidants and amine-type antioxidants can be used, for example. As for the phenolic antioxidant, there are 2,6-di-tert-butyl-4-methylphenol (DBPC), 2,6-di-tert-butyl-4-ethylphenol, 2,2'-methylenebis (4-methyl-6-tert-butylphenol), 2,4-dimethyl-6-tert-butylphenol, 2,6-di-tert-butylphenol, di-tert-butyl-p-cresol, bisphenol A, and the like. Also, as for the amine-type antioxidant, there are N,N'-diisopropyl-p-phenylenediamine, N,N'-di-sec-butyl-p-phenylenediamine, phenyl-α-naphthylamine, N,N'-di-phenyl-p-phenylenediamine, N,N-di(2-naphthyl)-p-phenylenediamine, and the like. Note that oxygen scavengers, which capture oxygen, can also be used as the antioxidant.

As the antifoaming agent, silicon compounds can be used, for example.

As the oiliness improver, higher alcohols, fatty acids, and the like can be used, for example.

As the metal deactivator such as copper deactivator, benzotriazole and derivatives thereof, and the like can be used.

As the anti-wear agents, zinc dithiophosphate and the like can be used.

The compatibilizing agent is not limited and can be selected as appropriate from among generally used compatibilizing agents, and one kind of compatibilizing agent may be used alone, or two or more kinds of compatibilizing agents may be used. Examples of the compatibilizing agent include polyoxyalkylene glycol ethers, amides, nitriles, ketones, chlorocarbons, esters, lactones, aryl ethers, fluoroethers, and 1,1,1-trifluoroalkanes. As the compatibilizing agent, polyoxyalkylene glycol ethers are particularly preferable.

Note that, as required, a load carrying additive agent, a chlorine scavenger, a detergent dispersant, a viscosity index improver, a heat resistance improver, a stabilizer, a corrosion inhibitor, a heat resistance improver, a pour point depressant, an anti-rust agent, and the like can also be added to the refrigerator oil.

As for the amount of each additive agent to be compounded, the proportion contained in the refrigerator oil may be 0.01% by mass or more and 5% by mass or less, and it is preferably 0.05% by mass or more and 3% by mass or less. Note that the compounding ratio of additive agents in the working fluid for a refrigerator formed by combining the refrigerant composition and the refrigerator oil is preferably 5% by mass or less and more preferably 3% by mass or less.

Note that the refrigerator oil preferably has a chlorine concentration of 50 ppm or less and preferably has a sulfur concentration of 50 ppm or less.

(3) EMBODIMENTS OF TECHNOLOGY OF THIRD GROUP

The refrigeration cycle devices as the technology of the first group and the technology of the third group are air conditioning devices.

(3-1) First Embodiment

Figure 3A:
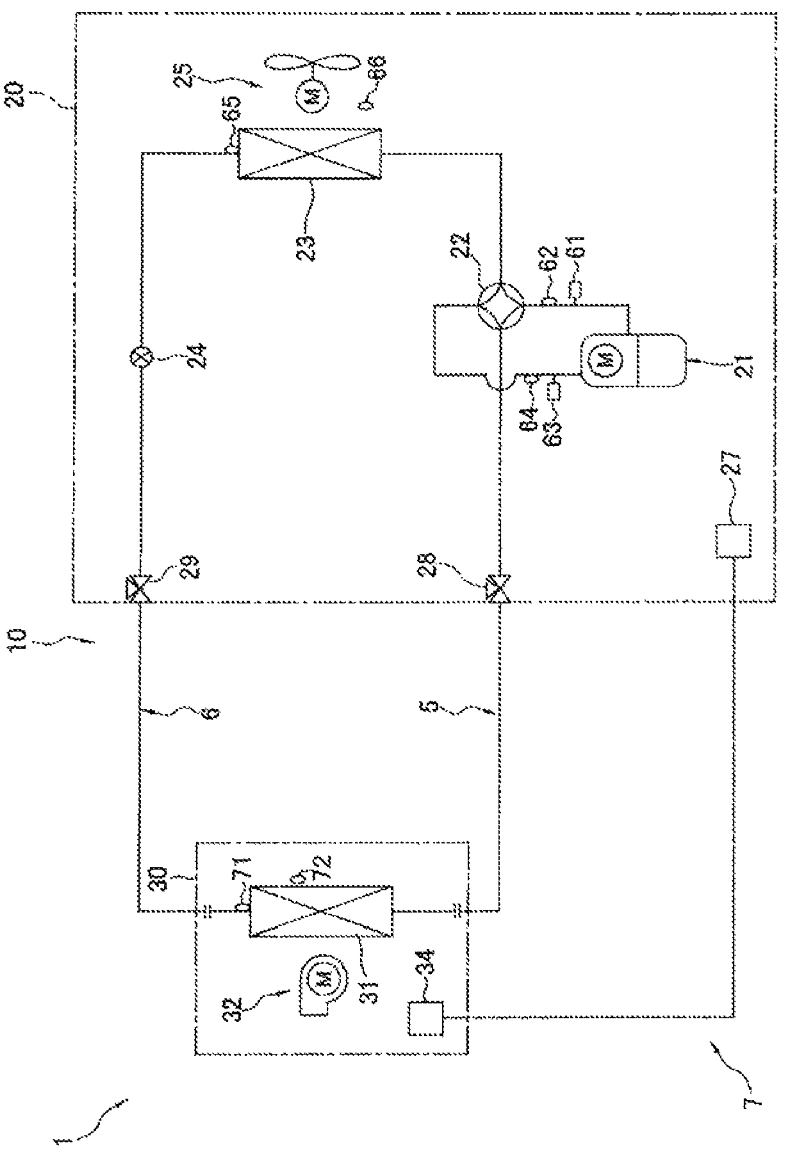
FIG. 3A is a schematic configuration diagram of a refrigerant circuit according to a first embodiment of the technology of a third group.
Figure 3B:
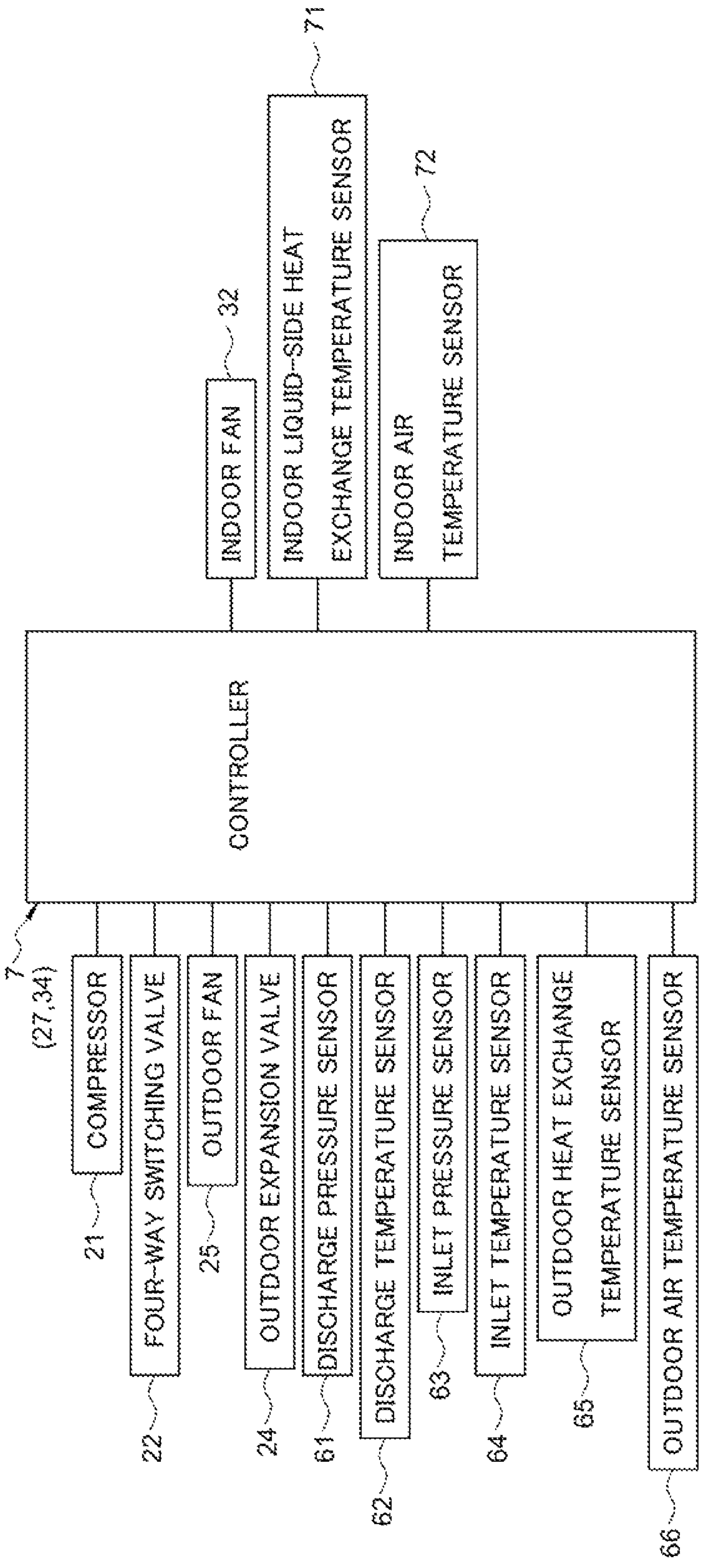
FIG. 3B is a schematic control block configuration diagram of a refrigeration cycle device according to the first embodiment of the technology of the third group.

Hereinafter, while referring to FIG. 3A, which is a schematic configuration diagram of a refrigerant circuit, and FIG. 3B, which is a schematic control block configuration diagram, an air conditioning device 1 as a refrigeration cycle device according to the first embodiment will be described.

The air conditioning device 1 is a device that conditions the air in the target space by carrying out a vapor compression type refrigeration cycle.

The air conditioning device 1 mainly has an outdoor unit 20, an indoor unit 30, liquid-side refrigerant communication piping 6 and gas-side refrigerant communication piping 5 that connect the outdoor unit 20 and the indoor unit 30, a remote control not shown in the figure as an input device and an output device, and a controller 7 that controls the motion of the air conditioning device 1.

In the air conditioning device 1, a refrigeration cycle is carried out in which a refrigerant enclosed in a refrigerant circuit 10 is compressed, cooled or condensed, decompressed, heated or evaporated, and then compressed again. In the present embodiment, the refrigerant circuit 10 is filled with a refrigerant for carrying out a vapor compression type refrigeration cycle. That refrigerant is a mixed refrigerant containing 1,2-difluoroethylene, and any Refrigerant A can be used. The refrigerant circuit 10 is also filled with a refrigerator oil together with that mixed refrigerant.

(3-1-1) Outdoor Unit 20

The outdoor unit 20 is connected to the indoor unit 30 via the liquid-side refrigerant communication piping 6 and the gas-side refrigerant communication piping 5, and constitutes a part of the refrigerant circuit 10. The outdoor unit 20 mainly has a compressor 21, a four-way switching valve 22, an outdoor heat exchanger 23, an outdoor expansion valve 24, an outdoor fan 25, a liquid-side shut-off valve 29, and a gas-side shut-off valve 28.

The compressor 21 is equipment that compresses a low-pressure refrigerant in the refrigeration cycle until it reaches a high pressure. Here, as the compressor 21, a compressor with a sealed structure in which a positive displacement compression element (omitted in the figure) such as a rotary type or scroll type is rotationally driven by a compressor motor is used. The compressor motor is for changing the volume, and the operation frequency can be controlled by an inverter. Note that the compressor 21 is provided with an accompanying accumulator, which is not shown in the figure, on the inlet side thereof (the internal volume of that accompanying accumulator is smaller than that of each of a low-pressure receiver, an intermediate pressure receiver, and a high-pressure receiver, which will be mentioned later, and is preferably half or less).

The four-way switching valve 22 can switch the state of connection between a cooling operation connection state in which the inlet side of the compressor 21 and the gas-side shut-off valve 28 are connected while connecting the discharge side of the compressor 21 and the outdoor heat exchanger 23, and a heating operation connection state in which the inlet side of the compressor 21 and the outdoor heat exchanger 23 are connected while connecting the discharge side of the compressor 21 and the gas-side shut-off valve 28.

The outdoor heat exchanger 23 is a heat exchanger that functions as a condenser for a high-pressure refrigerant in the refrigeration cycle during cooling operation and as an evaporator for a low-pressure refrigerant in the refrigeration cycle during heating operation.

The outdoor fan 25 generates an air flow for inhaling outdoor air into the outdoor unit 20, causing heat exchange between it and the refrigerant in the outdoor heat exchanger 23, and then discharging it outside. The outdoor fan 25 is rotationally driven by an outdoor fan motor.

The outdoor expansion valve 24 is provided between the liquid-side end of the outdoor heat exchanger 23 and the liquid-side shut-off valve 29. The outdoor expansion valve 24 may be a mechanical expansion valve used together with a capillary tube or a temperature sensitive cylinder, but it is preferably an electric expansion valve whose valve opening degree can be regulated by control.

The liquid-side shut-off valve 29 is a manual valve arranged at the connection part in the outdoor unit 20 with the liquid-side refrigerant communication piping 6.

The gas-side shut-off valve 28 is a manual valve arranged at the connection part in the outdoor unit 20 with the gas-side refrigerant communication piping 5.

The outdoor unit 20 has an outdoor unit control section 27 that controls the motion of each section that constitutes the outdoor unit 20. The outdoor unit control section 27 has a microcomputer that includes a CPU, a memory, and other elements. The outdoor unit control section 27 is connected to an indoor unit control section 34 of each indoor unit 30 via a communication line, and sends and receives control signals and the like.

The outdoor unit 20 is provided with a discharge pressure sensor 61, a discharge temperature sensor 62, an inlet pressure sensor 63, an inlet temperature sensor 64, an outdoor heat exchange temperature sensor 65, an outdoor air temperature sensor 66, and the like. Each of these sensors is electrically connected to the outdoor unit control section 27 and sends detection signals to the outdoor unit control section 27. The discharge pressure sensor 61 detects the pressure of the refrigerant flowing through discharge piping that connects the discharge side of the compressor 21 to one of the connection ports of the four-way switching valve 22. The discharge temperature sensor 62 detects the temperature of the refrigerant flowing through the discharge piping. The inlet pressure sensor 63 detects the pressure of the refrigerant flowing through inlet piping that connects the inlet side of the compressor 21 to one of the connection ports of the four-way switching valve 22. The inlet temperature sensor 64 detects the temperature of the refrigerant flowing through the inlet piping. The outdoor heat exchange temperature sensor 65 detects the temperature of the refrigerant flowing through the liquid-side outlet, which is on the opposite side of the outdoor heat exchanger 23 to the side where the four-way switching valve 22 is connected. The outdoor air temperature sensor 66 detects the temperature of the outdoor air before it passes through the outdoor heat exchanger 23.

(3-1-2) Indoor Unit 30

The indoor unit 30 is installed on the wall, ceiling, or the like of a room, which is the target space. The indoor unit 30 is connected to the outdoor unit 20 via the liquid-side refrigerant communication piping 6 and the gas-side refrigerant communication piping 5, and constitutes a part of the refrigerant circuit 10.

The indoor unit 30 has an indoor heat exchanger 31 and an indoor fan 32.

The indoor heat exchanger 31 is connected to the liquid-side refrigerant communication piping 6 on the liquid side, and its gas-side end is connected to the gas-side refrigerant communication piping 5. The indoor heat exchanger 31 is a heat exchanger that functions as an evaporator for a low-pressure refrigerant in the refrigeration cycle during cooling operation and as a condenser for a high-pressure refrigerant in the refrigeration cycle during heating operation.

The indoor fan 32 generates an air flow for inhaling indoor air into the indoor unit 30, causing heat exchange between it and the refrigerant in the indoor heat exchanger 31, and then discharging it outside. The indoor fan 32 is rotationally driven by an indoor fan motor.

Also, the indoor unit 30 has an indoor unit control section 34 that controls the motion of each section that constitutes the indoor unit 30. The indoor unit control section 34 has a microcomputer that includes a CPU, a memory, and other elements. The indoor unit control section 34 is connected to the outdoor unit control section 27 via a communication line, and sends and receives control signals and the like.

The indoor unit 30 is provided with an indoor liquid-side heat exchange temperature sensor 71, indoor air temperature sensor 72, and the like. Each of these sensors is electrically connected to the indoor unit control section 34 and sends detection signals to the indoor unit control section 34. The indoor liquid-side heat exchange temperature sensor 71 detects the temperature of the refrigerant flowing through the liquid-side outlet, which is on the opposite side of the indoor heat exchanger 31 to the side where the four-way switching valve 22 is connected. The indoor air temperature sensor 72 detects the temperature of the indoor air before it passes through the indoor heat exchanger 31.

(3-1-3) Details of Controller 7

In the air conditioning device 1, the outdoor unit control section 27 and the indoor unit control section 34 are connected via a communication line to constitute the controller 7, which controls the motion of the air conditioning device 1.

The controller 7 mainly has a CPU (central processing unit) and a memory such as ROM or RAM. Note that the various processings and controls by the controller 7 are realized by integrated functioning of each section included in the outdoor unit control section 27 and/or the indoor unit control section 34.

(3-1-4) Operation Modes

Hereinafter, the operation modes will be described.

There are two operation modes: a cooling operation mode and a heating operation mode.

The controller 7 determines and executes whether to be in the cooling operation mode or the heating operation mode, based on an instruction received from a remote control or the like.

(3-1-4-1) Cooling Operation Mode

In the cooling operation mode, the air conditioning device 1 sets the state of connection of the four-way switching valve 22 to the cooling operation connection state, in which the inlet side of the compressor 21 and the gas-side shut-off valve 28 are connected while connecting the discharge side of the compressor 21 and the outdoor heat exchanger 23, and circulates the refrigerant filled in the refrigerant circuit 10 mainly through the compressor 21, the outdoor heat exchanger 23, the outdoor expansion valve 24, and the indoor heat exchanger 31 in this order.

More specifically, when the cooling operation mode is started, in the refrigerant circuit 10, the refrigerant is inhaled into the compressor 21, compressed, and then discharged.

In the compressor 21, capacity control is carried out depending on cooling load required by the indoor unit 30. The capacity control is not limited, and for example, when the air conditioning device 1 is controlled such that the temperature of the indoor air satisfies a preset temperature, the operation frequency of the compressor 21 is controlled such that the discharge temperature (detected temperature by the discharge temperature sensor 62) has a value corresponding to the difference between the preset temperature and the indoor temperature (detected temperature by the indoor air temperature sensor 72).

The gas refrigerant that has been discharged from the compressor 21 passes through the four-way switching valve 22 and flows into the gas-side end of the outdoor heat exchanger 23.

The gas refrigerant that has flowed into the gas-side end of the outdoor heat exchanger 23 undergoes heat exchange with the outdoor-side air supplied by the outdoor fan 25 and is condensed in the outdoor heat exchanger 23 to become a liquid refrigerant, which flows out of the liquid-side end of the outdoor heat exchanger 23.

The refrigerant that has flowed out of the liquid-side end of the outdoor heat exchanger 23 is decompressed as it passes through the outdoor expansion valve 24. Note that the outdoor expansion valve 24 is controlled, for example, such that the degree of superheating of the refrigerant that is to be inhaled into the compressor 21 becomes the predetermined target value for the degree of superheating. Here, the degree of superheating of the refrigerant inhaled by the compressor 21 can be determined by, for example, subtracting the saturation temperature corresponding to the inlet pressure (detected pressure by the inlet pressure sensor 63) from the inlet temperature (detected temperature by the inlet temperature sensor 62). Note that the approach for controlling the valve opening degree of the outdoor expansion valve 24 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the outdoor expansion valve 24 passes through the liquid-side shut-off valve 29 and the liquid-side refrigerant communication piping 6, and flows into the indoor unit 30.

The refrigerant that has flowed into the indoor unit 30 flows into the indoor heat exchanger 31, undergoes heat exchange with the indoor air supplied by the indoor fan 32 and is evaporated in the indoor heat exchanger 31 to become a gas refrigerant, which flows out of the gas-side end of the indoor heat exchanger 31. The gas refrigerant that has flowed out of the gas-side end of the indoor heat exchanger 31 flows into the gas-side refrigerant communication piping 5.

The refrigerant that has flowed through the gas-side refrigerant communication piping 5 passes through the gas-side shut-off valve 28 and the four-way switching valve 22, and is again inhaled into the compressor 21.

(3-1-4-2) Heating Operation Mode

In the heating operation mode, the air conditioning device 1 sets the state of connection of the four-way switching valve 22 to the heating operation connection state, in which the inlet side of the compressor 21 and the outdoor heat exchanger 23 are connected while connecting the discharge side of the compressor 21 and the gas-side shut-off valve 28, and circulates the refrigerant filled in the refrigerant circuit 10 mainly through the compressor 21, the indoor heat exchanger 31, the outdoor expansion valve 24, and the outdoor heat exchanger 23 in this order.

More specifically, when the heating operation mode is started, in the refrigerant circuit 10, the refrigerant is inhaled into the compressor 21, compressed, and then discharged.

In the compressor 21, capacity control is carried out depending on heating load required by the indoor unit 30. The capacity control is not limited, and for example, when the air conditioning device 1 is controlled such that the temperature of the indoor air satisfies a preset temperature, the operation frequency of the compressor 21 is controlled such that the discharge temperature (detected temperature by the discharge temperature sensor 62) has a value corresponding to the difference between the preset temperature and the indoor temperature (detected temperature by the indoor air temperature sensor 72).

The gas refrigerant that has been discharged from the compressor 21 flows through the four-way switching valve 22 and the gas-side refrigerant communication piping 5 and then flows into the indoor unit 30.

The refrigerant that has flowed into the indoor unit 30 flows into the gas-side end of the indoor heat exchanger 31, undergoes heat exchange with the indoor air supplied by the indoor fan 32 and is condensed in the indoor heat exchanger 31 to become a refrigerant in a gas-liquid two phase state or liquid refrigerant, which flows out of the liquid-side end of the indoor heat exchanger 31. The refrigerant that has flowed out of the liquid-side end of the indoor heat exchanger 31 flows into the liquid-side refrigerant communication piping 6.

The refrigerant that has flowed through the liquid-side refrigerant communication piping 6 flows into the outdoor unit 20, passes through the liquid-side shut-off valve 29, and is decompressed in the outdoor expansion valve 24 until it reaches the low pressure in the refrigeration cycle. Note that the outdoor expansion valve 24 is controlled, for example, such that the degree of superheating of the refrigerant that is to be inhaled into the compressor 21 becomes the predetermined target value for the degree of superheating. Note that the approach for controlling the valve opening degree of the outdoor expansion valve 24 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the outdoor expansion valve 24 flows into the liquid-side end of the outdoor heat exchanger 23.

The refrigerant that has flowed into the outdoor heat exchanger 23 from its liquid-side end undergoes heat exchange with the outdoor air supplied by the outdoor fan 25 and is evaporated in the outdoor heat exchanger 23 to become a gas refrigerant, which flows out of the gas-side end of the outdoor heat exchanger 23.

The refrigerant that has flowed out of the gas-side end of the outdoor heat exchanger 23 passes through the four-way switching valve 22, and is again inhaled into the compressor 21.

(3-1-5) Characteristics of First Embodiment

The air conditioning device 1 can carry out a refrigeration cycle using a refrigerant containing 1,2-difluoroethylene, and thus makes it possible to carry out a refrigeration cycle using a refrigerant having a small GWP.

(3-2) Second Embodiment

Figure 3C:
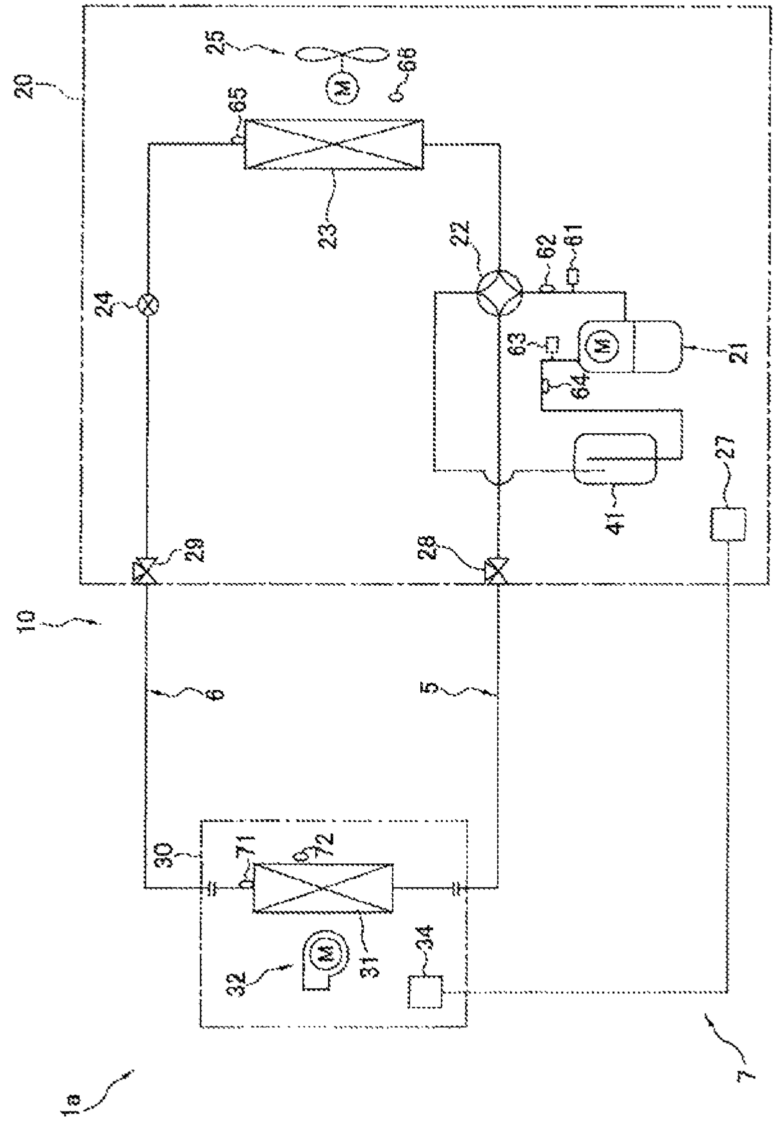
FIG. 3C is a schematic configuration diagram of a refrigerant circuit according to a second embodiment of the technology of the third group.
Figure 3D:
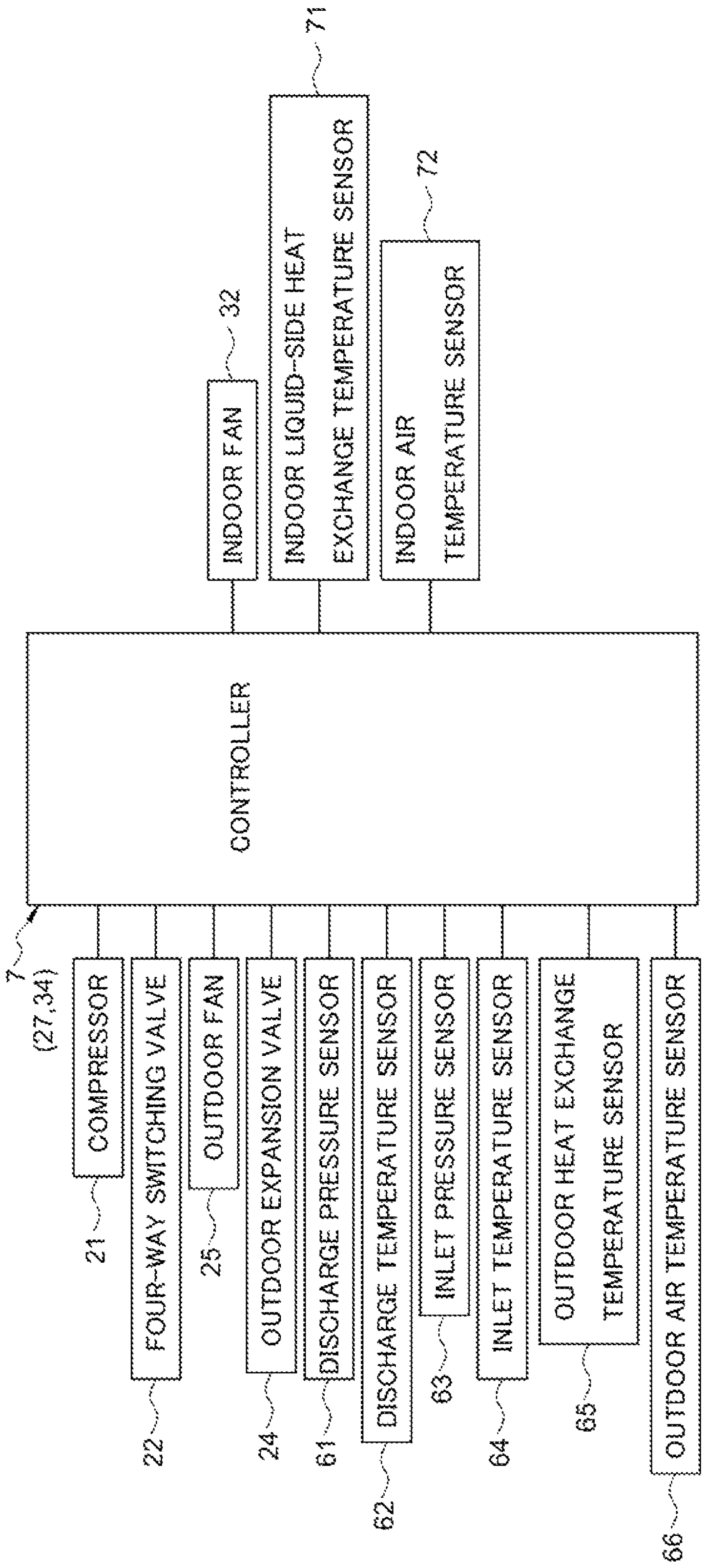
FIG. 3D is a schematic control block configuration diagram of a refrigeration cycle device according to the second embodiment of the technology of the third group.

Hereinafter, while referring to FIG. 3C, which is a schematic configuration diagram of a refrigerant circuit, and FIG. 3D, which is a schematic control block configuration diagram, an air conditioning device 1*a* as a refrigeration cycle device according to the second embodiment will be described. Note that, in the following, the differences from the air conditioning device 1 of the first embodiment will be mainly described.

(3-2-1) Schematic Configuration of Air Conditioning Device 1*a*

The air conditioning device 1*a* differs from the air conditioning device 1 of the first embodiment described above in that the outdoor unit 20 comprises a low-pressure receiver 41.

The low-pressure receiver 41 is provided between the inlet side of the compressor 21 and one of the connection ports of the four-way switching valve 22, and is a refrigerant container that is capable of storing excess refrigerant in the refrigerant circuit 10 as a liquid refrigerant. Note that, in the present embodiment, the inlet pressure sensor 63 and the inlet temperature sensor 64 are provided to detect and target the refrigerant flowing between the low-pressure receiver 41 and the inlet side of the compressor 21. Also, the compressor 21 is provided with an accompanying accumulator, which is not shown in the figure, and the low-pressure receiver 41 is connected to the downstream side of that accompanying accumulator.

(3-2-2) Cooling Operation Mode

In the cooling operation mode of the air conditioning device 1*a*, capacity control is performed on the operation frequency of the compressor 21 such that, for example, the evaporating temperature of the refrigerant in the refrigerant circuit 10 becomes the target evaporating temperature determined depending on the difference between a preset temperature and the indoor temperature (detected temperature by the indoor air temperature sensor 72). Note that the evaporating temperature may be grasped as, but is not limited to, the saturation temperature of the refrigerant corresponding to the detected pressure by the inlet pressure sensor 63, for example.

The gas refrigerant that has been discharged from the compressor 21 flows through the four-way switching valve 22, the outdoor heat exchanger 23, and the outdoor expansion valve 24 in this order.

Here, the valve opening degree of the outdoor expansion valve 24 is controlled so as to satisfy predetermined conditions, for example, the degree of subcooling of the refrigerant flowing through the liquid-side outlet of the outdoor heat exchanger 23 becomes the target value. Note that the degree of subcooling of the refrigerant flowing through the liquid-side outlet of the outdoor heat exchanger 23 can be determined by, with no limitations, subtracting the saturation temperature of the refrigerant corresponding to the high pressure of the refrigerant circuit 10 (detected pressure by the discharge pressure sensor 61) from the detected temperature by the outdoor heat exchange temperature sensor 65, for example. Note that the approach for controlling the valve opening degree of the outdoor expansion valve 24 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the outdoor expansion valve 24 passes through the liquid-side shut-off valve 29 and the liquid-side refrigerant communication piping 6 to flow into the indoor unit 30, is evaporated in the indoor heat exchanger 31, and flows to the gas-side refrigerant communication piping 5. The refrigerant that has flowed through the gas-side refrigerant communication piping 5 passes through the gas-side shut-off valve 28, the four-way switching valve 22, and the low-pressure receiver 41, and is again inhaled into the compressor 21. Note that, in the low-pressure receiver 41, the liquid refrigerant that could not be fully evaporated in the indoor heat exchanger 31 is stored as excess refrigerant.

(3-2-3) Heating Operation Mode

In the heating operation mode of the air conditioning device 1*a*, capacity control is performed on the operation frequency of the compressor 21 such that, for example, the condensation temperature of the refrigerant in the refrigerant circuit 10 becomes the target condensation temperature determined depending on the difference between a preset temperature and the indoor temperature (detected temperature by the indoor air temperature sensor 72). Note that the condensation temperature may be grasped as, but is not limited to, the saturation temperature of the refrigerant corresponding to the detected pressure by the discharge pressure sensor 61, for example.

The gas refrigerant that has been discharged from the compressor 21 flows through the four-way switching valve 22 and the gas-side refrigerant communication piping 5, then flows into the gas-side end of the indoor heat exchanger 31 of the indoor unit 30, and is condensed in the indoor heat exchanger 31. The refrigerant that has flowed out of the liquid-side end of the indoor heat exchanger 31 passes through the liquid-side refrigerant communication piping 6, flows into the outdoor unit 20, passes through the liquid-side shut-off valve 29, and is decompressed in the outdoor expansion valve 24 until it reaches the low pressure in the refrigeration cycle. Note that the valve opening degree of the outdoor expansion valve 24 is controlled so as to satisfy predetermined conditions, for example, the degree of subcooling of the refrigerant flowing through the liquid-side outlet of the indoor heat exchanger 31 becomes the target value. Note that the degree of subcooling of the refrigerant flowing through the liquid-side outlet of the indoor heat exchanger 31 can be determined by, with no limitations, subtracting the saturation temperature of the refrigerant corresponding to the high pressure of the refrigerant circuit 10 (detected pressure by the discharge pressure sensor 61) from the detected temperature by the indoor liquid-side heat exchange temperature sensor 71, for example. Note that the approach for controlling the valve opening degree of the outdoor expansion valve 24 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the outdoor expansion valve 24 is evaporated in the outdoor heat exchanger 23, passes through the four-way switching valve 22 and the low-pressure receiver 41, and is again inhaled into the compressor 21. Note that, in the low-pressure receiver 41, the liquid refrigerant that could not be fully evaporated in the outdoor heat exchanger 23 is stored as excess refrigerant.

(3-2-4) Characteristics of Second Embodiment

The air conditioning device 1*a* can carry out a refrigeration cycle using a refrigerant containing 1,2-difluoroethylene, and thus makes it possible to carry out a refrigeration cycle using a refrigerant having a small GWP.

Also, by providing the low-pressure receiver 41, the air conditioning device 1*a* can suppress occurrence of liquid compression even without carrying out control (control of the outdoor expansion valve 24) that ensures that the degree of superheating of the refrigerant inhaled into the compressor 21 is at or above a predetermined value. Therefore, as for the control of the outdoor expansion valve 24, it is possible to allow it to control the outdoor heat exchanger 23 when it is to function as a condenser (and the indoor heat exchanger 31 when it is to function as a condenser as well) so as to ensure a sufficient degree of subcooling of the refrigerant flowing through the outlet.

(3-3) Third Embodiment

Figure 3E:
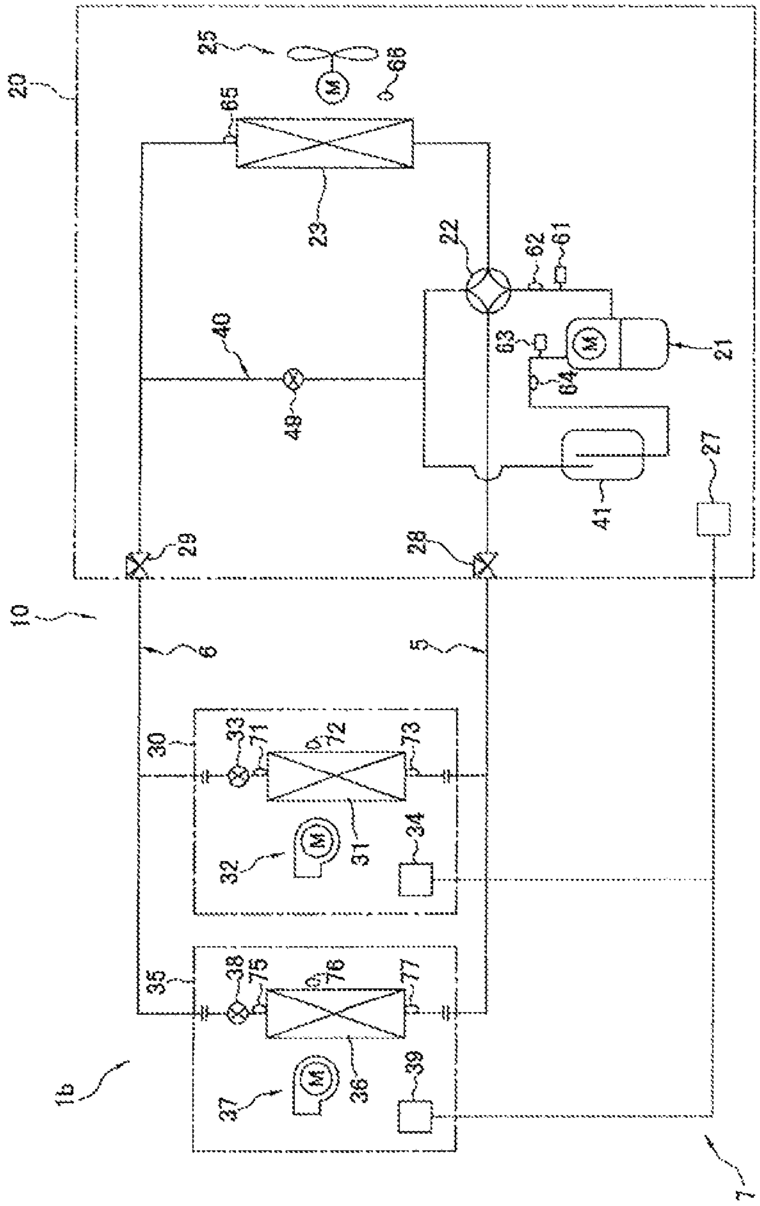
FIG. 3E is a schematic configuration diagram of a refrigerant circuit according to a third embodiment of the technology of the third group.
Figure 3F:
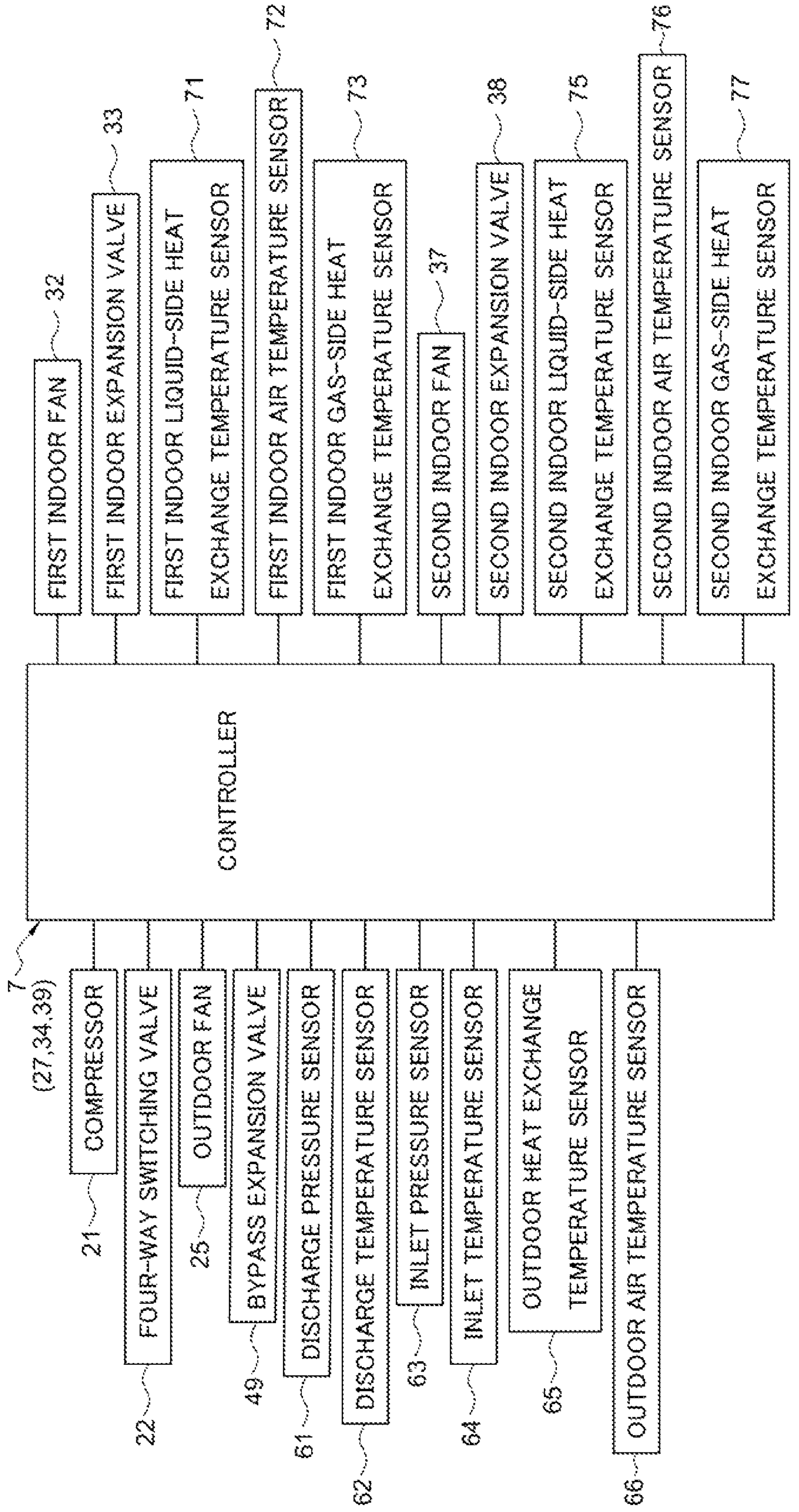
FIG. 3F is a schematic control block configuration diagram of a refrigeration cycle device according to the third embodiment of the technology of the third group.

Hereinafter, while referring to FIG. 3E, which is a schematic configuration diagram of a refrigerant circuit, and FIG. 3F, which is a schematic control block configuration diagram, an air conditioning device 1*b* as a refrigeration cycle device according to the third embodiment will be described. Note that, in the following, the differences from the air conditioning device 1*a* of the second embodiment will be mainly described.

(3-3-1) Schematic Configuration of Air Conditioning Device 1*b*

The air conditioning device 1*b* differs from the air conditioning device 1*a* of the second embodiment described above in that multiple indoor units are provided in parallel and that an indoor expansion valve is provided on the liquid refrigerant side of the indoor heat exchanger in each indoor unit.

The air conditioning device 1*b* has a first indoor unit 30 and a second indoor unit 35 connected in parallel to each other. The first indoor unit 30 has a first indoor heat exchanger 31 and a first indoor fan 32 as in the above embodiments, and a first indoor expansion valve 33 is provided on the liquid refrigerant side of the first indoor heat exchanger 31. The first indoor expansion valve 33 is preferably an electric expansion valve whose valve opening degree can be regulated. The first indoor unit 30 is provided with a first indoor unit control section 34, and a first indoor liquid-side heat exchange temperature sensor 71 and a first indoor air temperature sensor 72 electrically connected to the first indoor unit control section 34 as in the above embodiments, and is further provided with a first indoor gas-side heat exchange temperature sensor 73 and the like. The first indoor liquid-side heat exchange temperature sensor 71 detects the temperature of the refrigerant flowing through the outlet on the liquid refrigerant side of the first indoor heat exchanger 31. The first indoor gas-side heat exchange temperature sensor 73 detects the temperature of the refrigerant flowing through the outlet on the gas refrigerant side of the first indoor heat exchanger 31. The second indoor unit 35 has a second indoor heat exchanger 36 and a second indoor fan 37 as in the first indoor unit 30, and a second indoor expansion valve 38 is provided on the liquid refrigerant side of the second indoor heat exchanger 36. The second indoor expansion valve 38 is preferably an electric expansion valve whose valve opening degree can be regulated. As in the first indoor unit 30, the second indoor unit 35 is provided with a second indoor unit control section 39, and a second indoor liquid-side heat exchange temperature sensor 75, a second indoor air temperature sensor 76, and a second indoor gas-side heat exchange temperature sensor 77, electrically connected to the second indoor unit control section 39.

Also, the air conditioning device 1*b* differs from the air conditioning device 1*a* of the second embodiment described above in that the outdoor expansion valve 24 is not provided in the outdoor unit and that bypass piping 40 having a bypass expansion valve 49 is provided.

The bypass piping 40 is refrigerant piping that connects the refrigerant piping extending from the outlet on the liquid refrigerant side of the outdoor heat exchanger 23 to the liquid-side shut-off valve 29, and the refrigerant piping extending from one of the connection ports of the four-way switching valve 22 to the low-pressure receiver 41. The bypass expansion valve 49 is preferably an electric expansion valve whose valve opening degree can be regulated. Note that the bypass piping 40 is not limited to one provided with an electric expansion valve whose degree of opening can be regulated, and it may be, for example, one having a capillary tube and a solenoid valve that can be opened and closed.

(3-3-2) Cooling Operation Mode

In the cooling operation mode of the air conditioning device 1*b*, capacity control is performed on the operation frequency of the compressor 21 such that, for example, the evaporating temperature of the refrigerant in the refrigerant circuit 10 becomes the target evaporating temperature. Here, it is preferable that the target evaporating temperature is determined depending on the largest difference between a preset temperature and the indoor temperature in each indoor unit 30 or 35 (indoor unit with the largest load). Note that the evaporating temperature can be grasped as, but is not limited to, the saturation temperature of the refrigerant corresponding to the detected pressure by the inlet pressure sensor 63, for example.

The gas refrigerant that has been discharged from the compressor 21 passes through the four-way switching valve 22 and is condensed in the outdoor heat exchanger 23. The refrigerant that has flowed through the outdoor heat exchanger 23 passes through the liquid-side shut-off valve 29 and the liquid-side refrigerant communication piping 6, and is sent to the first indoor unit 30 and the second indoor unit 35.

Here, in the first indoor unit 30, the valve opening degree of the first indoor expansion valve 33 is controlled so as to satisfy predetermined conditions, for example, the degree of superheating of the refrigerant flowing through the gas-side outlet of the first indoor heat exchanger 31 becomes the target value. Note that the degree of superheating of the refrigerant flowing through the gas-side outlet of the first indoor heat exchanger 31 can be determined by, with no limitations, subtracting the saturation temperature of the refrigerant corresponding to the low pressure of the refrigerant circuit 10 (detected pressure by the inlet pressure sensor 63) from the detected temperature by the first indoor gas-side heat exchange temperature sensor 73, for example. The valve opening degree of the second indoor expansion valve 38 of the second indoor unit 35 is also controlled so as to satisfy predetermined conditions, for example, the degree of superheating of the refrigerant flowing through the gas-side outlet of the second indoor heat exchanger 36 becomes the target value, as in the first indoor expansion valve 33. Note that the degree of superheating of the refrigerant flowing through the gas-side outlet of the second indoor heat exchanger 36 can also be determined by, with no limitations, subtracting the saturation temperature of the refrigerant corresponding to the low pressure of the refrigerant circuit 10 (detected pressure by the inlet pressure sensor 63) from the detected temperature by the second indoor gas-side heat exchange temperature sensor 77, for example. Alternatively, the valve opening degree of both the first indoor expansion valve 33 and the second indoor expansion valve 38 may be controlled so as to satisfy predetermined conditions, for example, the degree of superheating of the refrigerant, obtained by subtracting the saturation temperature of the refrigerant corresponding to the detected pressure by the inlet pressure sensor 63 from the detected temperature of the inlet temperature sensor 64, becomes the target value. Furthermore, the approach for controlling the valve opening degree of the first indoor expansion valve 33 and the second indoor expansion valve 38 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the first indoor expansion valve 33 is evaporated in the first indoor heat exchanger 31, and the refrigerant that has been decompressed by the second indoor expansion valve 38 is evaporated in the second indoor heat exchanger 36, and after being combined, they flow into the gas-side refrigerant communication piping 5. The refrigerant that has flowed through the gas-side refrigerant communication piping 5 passes through the gas-side shut-off valve 28, the four-way switching valve 22, and the low-pressure receiver 41, and is again inhaled into the compressor 21. Note that, in the low-pressure receiver 41, the liquid refrigerant that could not be fully evaporated in the first indoor heat exchanger 31 and the second indoor heat exchanger is stored as excess refrigerant. Note that, in the bypass expansion valve 49 of the bypass piping 40, control is carried out by which the valve is opened or the valve opening degree is increased when predetermined conditions with respect to the amount of refrigerant inside the outdoor heat exchanger 23, which functions as a condenser, being excessive are satisfied. The control of the degree of opening of the bypass expansion valve 49 is not limited, but for example, it may be control by which the valve is opened or the degree of opening is increased when the condensation pressure (for example, the detected pressure by the discharge pressure sensor 61) is at or above a predetermined value, or it may be control by which an open state and a closed state are switched at a predetermined time interval so as to increase the passing flow rate.

(3-3-3) Heating Operation Mode

In the heating operation mode of the air conditioning device 1*b*, capacity control is performed on the operation frequency of the compressor 21 such that, for example, the condensation temperature of the refrigerant in the refrigerant circuit 10 becomes the target condensation temperature. Here, it is preferable that the target condensation temperature is determined depending on the largest difference between a preset temperature and the indoor temperature in each indoor unit 30 or 35 (indoor unit with the largest load). Note that the condensation temperature may be grasped as, but is not limited to, the saturation temperature of the refrigerant corresponding to the detected pressure by the discharge pressure sensor 61, for example.

The gas refrigerant that has been discharged from the compressor 21 flows through the four-way switching valve 22 and the gas-side refrigerant communication piping 5, and then a part of the refrigerant flows into the gas-side end of the first indoor heat exchanger 31 of the first indoor unit 30 and is condensed in the first indoor heat exchanger 31, and another part of the refrigerant flows into the gas-side end of the second indoor heat exchanger 36 of the second indoor unit 35 and is condensed in the second indoor heat exchanger 36.

Note that, in the first indoor expansion valve 33 of the first indoor unit 30, the valve opening degree is controlled so as to satisfy predetermined conditions, for example, the degree of subcooling of the refrigerant flowing through the liquid side of the first indoor heat exchanger 31 becomes the predetermined target value. In the second indoor expansion valve 38 of the second indoor unit 35 as well, the valve opening degree is controlled so as to satisfy predetermined conditions, for example, the degree of subcooling of the refrigerant flowing through the liquid side of the second indoor heat exchanger 36 becomes the predetermined target value. Note that the degree of subcooling of the refrigerant flowing through the liquid side of the first indoor heat exchanger 31 can be determined by subtracting the saturation temperature of the refrigerant corresponding to the high pressure in the refrigerant circuit 10 (detected pressure by the discharge pressure sensor 61) from the detected temperature by the first indoor liquid-side heat exchange temperature sensor 71. Similarly, the degree of subcooling of the refrigerant flowing through the liquid side of the second indoor heat exchanger 36 can also be determined by subtracting the saturation temperature of the refrigerant corresponding to the high pressure in the refrigerant circuit 10 (detected pressure by the discharge pressure sensor 61) from the detected temperature by the second indoor liquid-side heat exchange temperature sensor 75.

The refrigerant that has been decompressed by the first indoor expansion valve 33 and the refrigerant that has been decompressed by the second indoor expansion valve 38 are combined, pass through the liquid-side refrigerant communication piping 6 and the liquid-side shut-off valve 29, then are evaporated in the outdoor heat exchanger 23, pass through the four-way switching valve 22 and the low-pressure receiver 41, and are again inhaled into the compressor 21. Note that, in the low-pressure receiver 41, the liquid refrigerant that could not be fully evaporated in the outdoor heat exchanger 23 is stored as excess refrigerant. Note that, during heating operation, the bypass expansion valve 49 of the bypass piping 40 may be maintained in a fully closed state, for example, with no limitations.

(3-3-4) Characteristics of Third Embodiment

The air conditioning device 1*b* can carry out a refrigeration cycle using a refrigerant containing 1,2-difluoroethylene, and thus makes it possible to carry out a refrigeration cycle using a refrigerant having a small GWP.

Also, in the air conditioning device 1*b*, by providing the low-pressure receiver 41, liquid compression in the compressor 21 can be suppressed. In addition, by controlling the degree of superheating with the first indoor expansion valve 33 and the second indoor expansion valve 38 during cooling operation, and by controlling the degree of subcooling with the first indoor expansion valve 33 and the second indoor expansion valve 38 during heating operation, it is easy to sufficiently demonstrate the capacities in the first indoor heat exchanger 31 and the second indoor heat exchanger 36.

(3-4) Fourth Embodiment

Figure 3G:
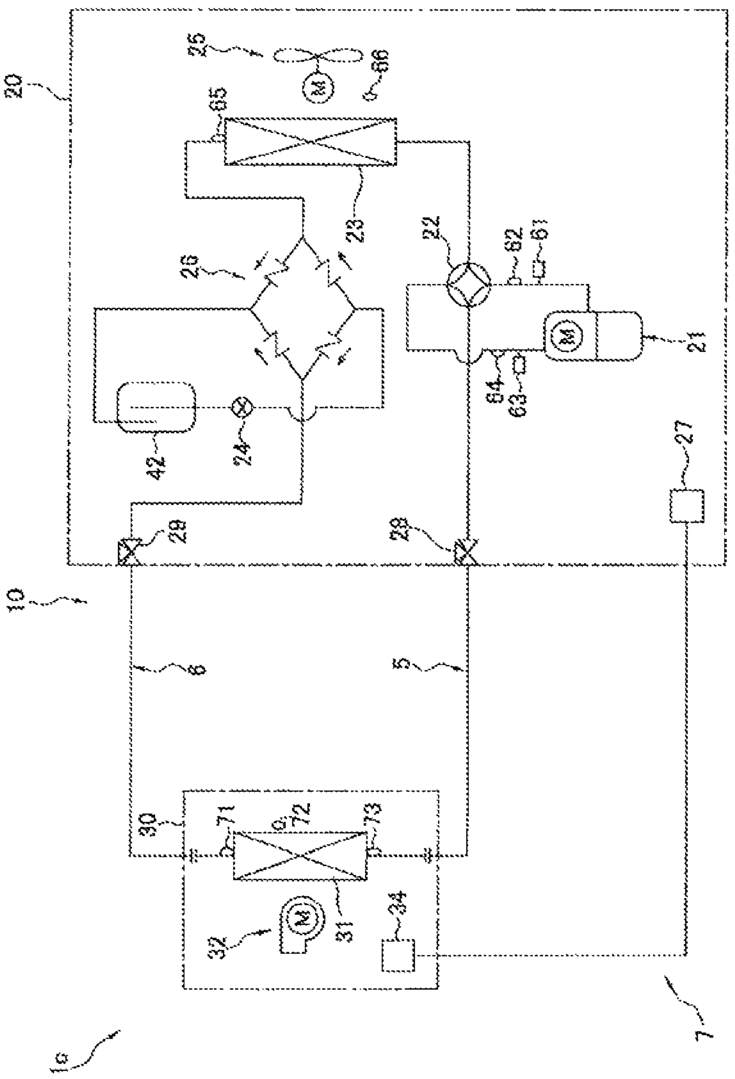
FIG. 3G is a schematic configuration diagram of a refrigerant circuit according to a fourth embodiment of the technology of the third group.
Figure 3H:
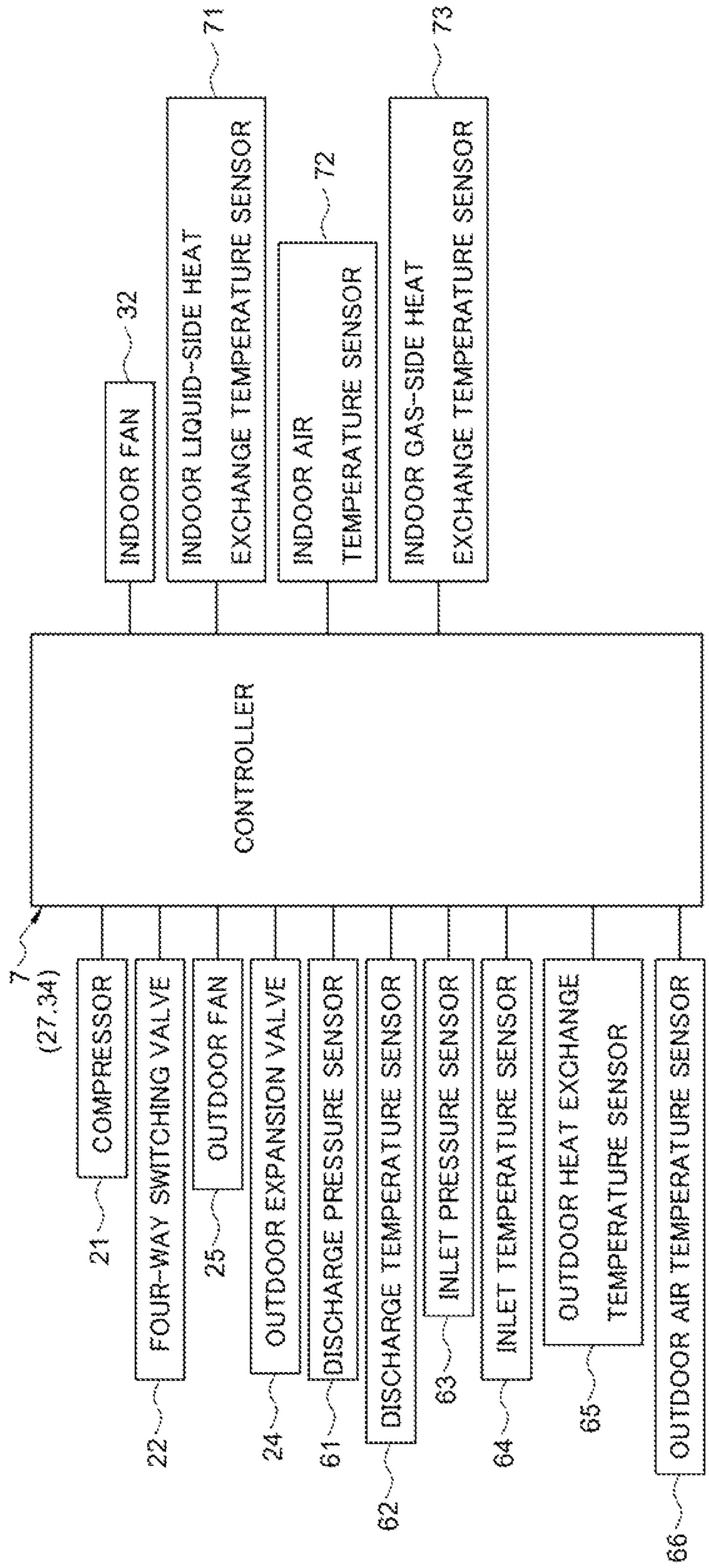
FIG. 3H is a schematic control block configuration diagram of a refrigeration cycle device according to the fourth embodiment of the technology of the third group.
Figure 31:
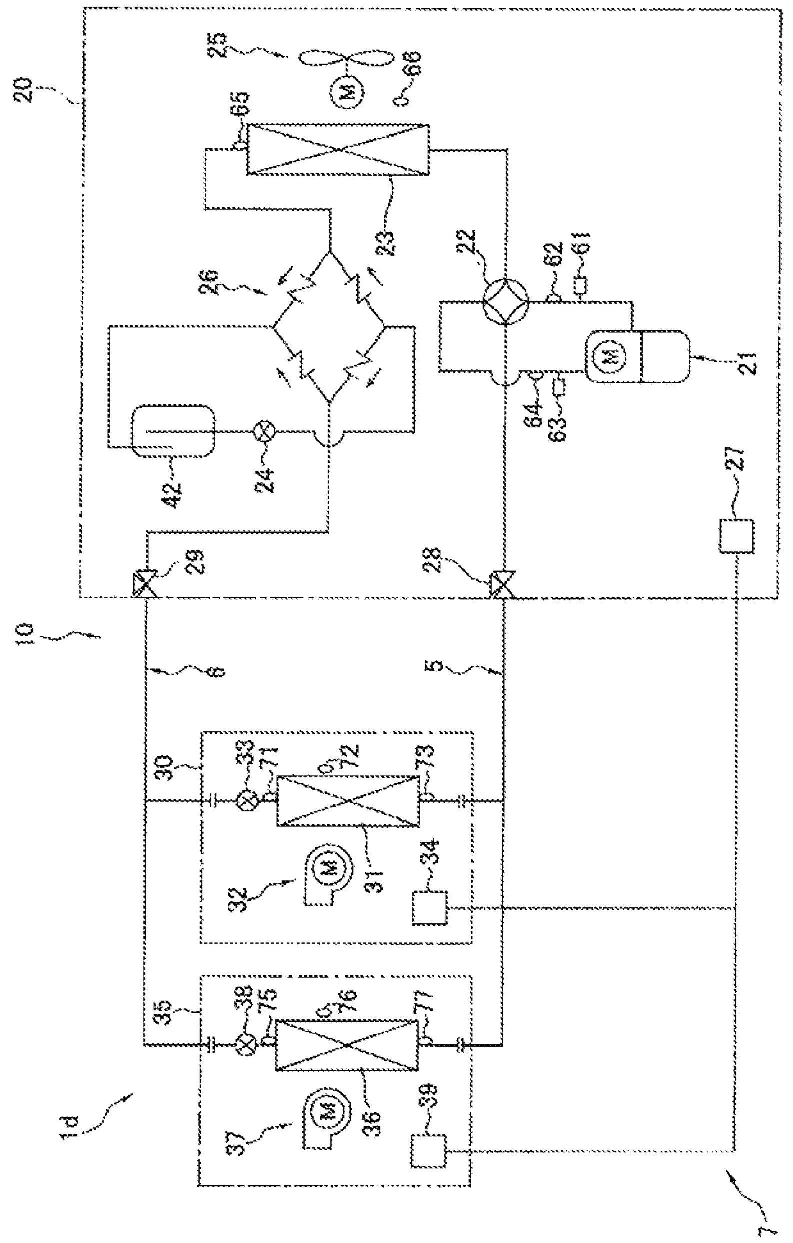

Hereinafter, while referring to FIG. 3G, which is a schematic configuration diagram of a refrigerant circuit, and FIG. 3H, which is a schematic control block configuration diagram, an air conditioning device 1*c* as a refrigeration cycle device according to the fourth embodiment will be described. Note that, in the following, the differences from the air conditioning device 1*a* of the second embodiment will be mainly described.

(3-4-1) Schematic Configuration of Air Conditioning Device 1*c*

The air conditioning device 1*c* differs from the air conditioning device 1*a* of the second embodiment described above in that the outdoor unit 20 does not comprise the low-pressure receiver 41, that it comprises a high-pressure receiver 42, and that it comprises an outdoor bridge circuit 26.

Also, the indoor unit 30 has the indoor liquid-side heat exchange temperature sensor 71 for detecting the temperature of the refrigerant flowing through the liquid side of the indoor heat exchanger 31, the indoor air temperature sensor 72 for detecting the temperature of the indoor air, and an indoor gas-side heat exchange temperature sensor 73 for detecting the temperature of the refrigerant flowing through the gas side of the indoor heat exchanger 31.

The outdoor bridge circuit 26 is provided between the liquid side of the outdoor heat exchanger 23 and the liquid-side shut-off valve 29, and has four connection locations and check valves provided between each of the connection locations. Among the four connection locations that the outdoor bridge circuit 26 has, two locations other than the location connected to the liquid side of the outdoor heat exchanger 23 and the location connected to the liquid-side shut-off valve 29 are each connected to refrigerant piping extending up to the high-pressure receiver 42. Also, among these two sets of refrigerant piping, in the middle of the refrigerant piping extending from the gas region of the inner space of the high-pressure receiver 42, an outdoor expansion valve 24 is provided.

(3-4-2) Cooling Operation Mode

In the cooling operation mode of the air conditioning device 1*c*, capacity control is performed on the operation frequency of the compressor 21 such that, for example, the evaporating temperature of the refrigerant in the refrigerant circuit 10 becomes the target evaporating temperature determined depending on the difference between a preset temperature and the indoor temperature (detected temperature by the indoor air temperature sensor 72). Note that the evaporating temperature may be grasped as, but is not limited to, the detected temperature by the indoor liquid-side heat exchange temperature sensor 71 or the saturation temperature of the refrigerant corresponding to the detected pressure by the inlet pressure sensor 63, for example.

The gas refrigerant that has been discharged from the compressor 21 passes through the four-way switching valve 22 and is condensed in the outdoor heat exchanger 23. The refrigerant that has flowed through the outdoor heat exchanger 23 passes through a part of the outdoor bridge circuit 26 and flows into the high-pressure receiver 42. Note that, in the high-pressure receiver 42, excess refrigerant in the refrigerant circuit 10 is stored as a liquid refrigerant. The gas refrigerant that has flowed out of the gas region of the high-pressure receiver 42 is decompressed in the outdoor expansion valve 24.

Here, the valve opening degree of the outdoor expansion valve 24 is controlled so as to satisfy predetermined conditions, for example, the degree of superheating of the refrigerant flowing through the gas-side outlet of the indoor heat exchanger 31 or the degree of superheating of the refrigerant flowing through the inlet side of the compressor 21 becomes the target value. Note that the degree of superheating of the refrigerant flowing through the gas-side outlet of the indoor heat exchanger 31 may be determined by, with no limitations, subtracting the saturation temperature of the refrigerant corresponding to the low pressure of the refrigerant circuit 10 (detected pressure by the inlet pressure sensor 63) from the detected temperature by the indoor gas-side heat exchange temperature sensor 73, for example. Also, the degree of superheating of the refrigerant flowing through the inlet side of the compressor 21 may be determined by subtracting the saturation temperature of the refrigerant corresponding to the detected pressure by the inlet pressure sensor 63 from the detected temperature by the inlet temperature sensor 64. Note that the approach for controlling the valve opening degree of the outdoor expansion valve 24 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the outdoor expansion valve 24 flows through another part of the outdoor bridge circuit 26, passes through the liquid-side shut-off valve 29 and the liquid-side refrigerant communication piping 6 to flow into the indoor unit 30, and is evaporated in the indoor heat exchanger 31. The refrigerant that has flowed through the indoor heat exchanger 31 passes through the gas-side refrigerant communication piping 5, the gas-side shut-off valve 28, and the four-way switching valve 22, and is again inhaled into the compressor 21.

(3-4-3) Heating Operation Mode

In the heating operation mode of the air conditioning device 1*c*, capacity control is performed on the operation frequency of the compressor 21 such that, for example, the condensation temperature of the refrigerant in the refrigerant circuit 10 becomes the target condensation temperature determined depending on the difference between a preset temperature and the indoor temperature (detected temperature by the indoor air temperature sensor 72). Note that the condensation temperature may be grasped as, but is not limited to, the saturation temperature of the refrigerant corresponding to the detected pressure by the discharge pressure sensor 61, for example.

The gas refrigerant that has been discharged from the compressor 21 flows through the four-way switching valve 22 and the gas-side refrigerant communication piping 5, then flows into the gas-side end of the indoor heat exchanger 31 of the indoor unit 30, and is condensed in the indoor heat exchanger 31. The refrigerant that has flowed out of the liquid-side end of the indoor heat exchanger 31 passes through the liquid-side refrigerant communication piping 6, flows into the outdoor unit 20, passes through the liquid-side shut-off valve 29, flows through a part of the outdoor bridge circuit 26, and flows into the high-pressure receiver 42. Note that, in the high-pressure receiver 42, excess refrigerant in the refrigerant circuit 10 is stored as a liquid refrigerant. The gas refrigerant that has flowed out of the gas region of the high-pressure receiver 42 is decompressed in the outdoor expansion valve 24 until it reaches the low pressure in the refrigeration cycle.

Note that the valve opening degree of the outdoor expansion valve 24 is controlled so as to satisfy predetermined conditions, for example, the degree of superheating of the refrigerant inhaled by the compressor 21 becomes the target value. Note that the degree of superheating of the refrigerant flowing through the inlet side of the compressor 21 can be determined by, with no limitations, subtracting the saturation temperature of the refrigerant corresponding to the detected pressure by the inlet pressure sensor 63 from the detected temperature by the inlet temperature sensor 64, for example. Note that the approach for controlling the valve opening degree of the outdoor expansion valve 24 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the outdoor expansion valve 24 flows through another part of the outdoor bridge circuit 26, is evaporated in the outdoor heat exchanger 23, passes through the four-way switching valve 22, and is again inhaled into the compressor 21.

(3-4-4) Characteristics of Fourth Embodiment

The air conditioning device 1*c* can carry out a refrigeration cycle using a refrigerant containing 1,2-difluoroethylene, and thus makes it possible to carry out a refrigeration cycle using a refrigerant having a small GWP.

Also, in the air conditioning device 1*c*, by providing the high-pressure receiver 42, it becomes possible to store excess refrigerant in the refrigerant circuit 10.

(3-5) Fifth Embodiment

Figure 3J:
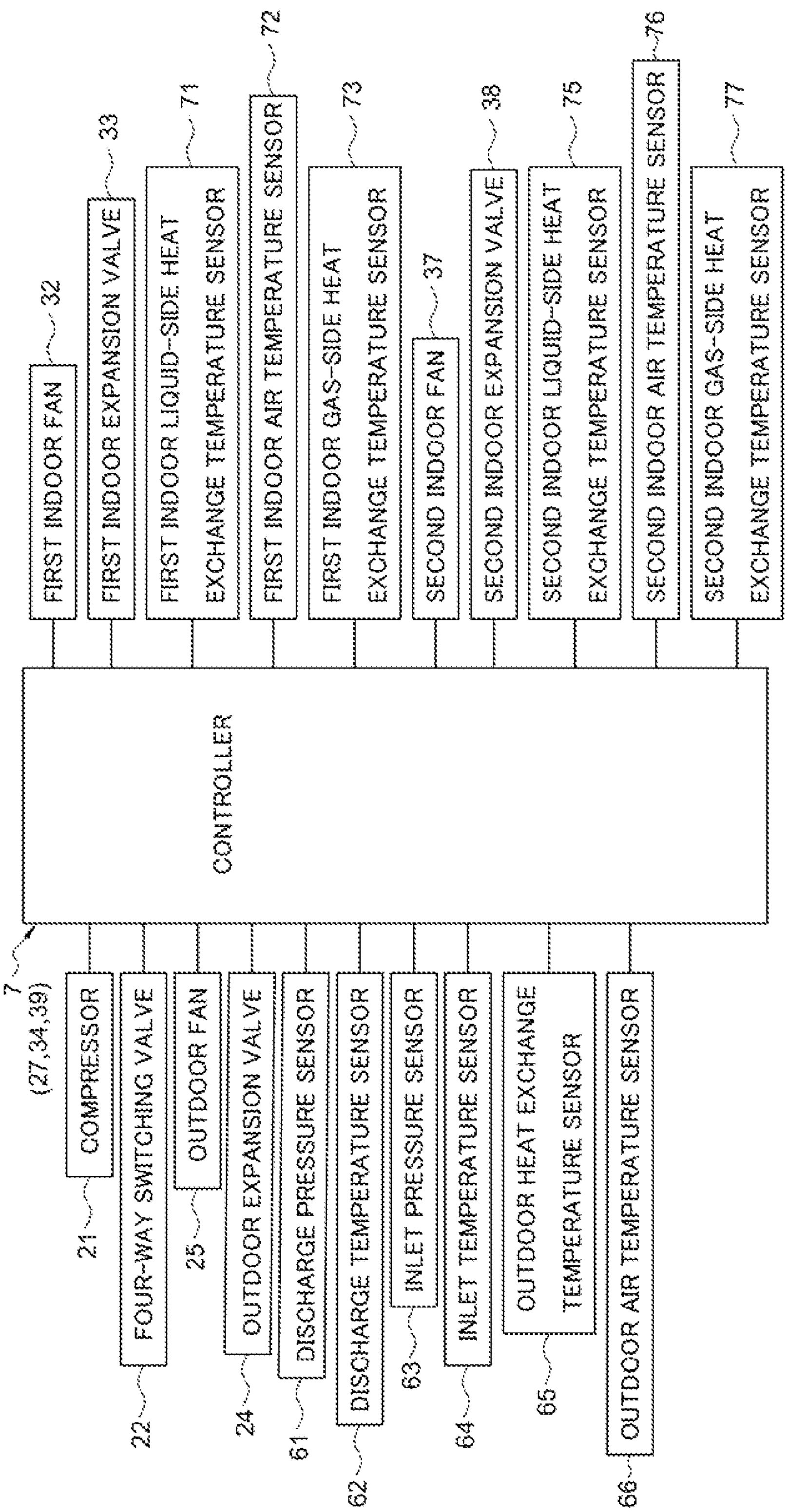
FIG. 3J is a schematic control block configuration diagram of a refrigeration cycle device according to the fifth embodiment of the technology of the third group.

Hereinafter, while referring to FIG. 3I, which is a schematic configuration diagram of a refrigerant circuit, and FIG. 3J, which is a schematic control block configuration diagram, an air conditioning device 1*d* as a refrigeration cycle device according to the fifth embodiment will be described. Note that, in the following, the differences from the air conditioning device 1*c* of the fourth embodiment will be mainly described.

(3-5-1) Schematic Configuration of Air Conditioning Device 1*d*

The air conditioning device 1*d* differs from the air conditioning device 1*c* of the fourth embodiment described above in that multiple indoor units are provided in parallel and that an indoor expansion valve is provided on the liquid refrigerant side of the indoor heat exchanger in each indoor unit.

The air conditioning device 1*d* has a first indoor unit 30 and a second indoor unit 35 connected in parallel to each other. The first indoor unit 30 has a first indoor heat exchanger 31 and a first indoor fan 32 as in the above embodiments, and a first indoor expansion valve 33 is provided on the liquid refrigerant side of the first indoor heat exchanger 31. The first indoor expansion valve 33 is preferably an electric expansion valve whose valve opening degree can be regulated. As in the above embodiments, the first indoor unit 30 is provided with a first indoor unit control section 34, and a first indoor liquid-side heat exchange temperature sensor 71, a first indoor air temperature sensor 72, a first indoor gas-side heat exchange temperature sensor 73, and the like, electrically connected to the first indoor unit control section 34. The first indoor liquid-side heat exchange temperature sensor 71 detects the temperature of the refrigerant flowing through the outlet on the liquid refrigerant side of the first indoor heat exchanger 31. The first indoor gas-side heat exchange temperature sensor 73 detects the temperature of the refrigerant flowing through the outlet on the gas refrigerant side of the first indoor heat exchanger 31. The second indoor unit 35 has a second indoor heat exchanger 36 and a second indoor fan 37 as in the first indoor unit 30, and a second indoor expansion valve 38 is provided on the liquid refrigerant side of the second indoor heat exchanger 36. The second indoor expansion valve 38 is preferably an electric expansion valve whose valve opening degree can be regulated. As in the first indoor unit 30, the second indoor unit 35 is provided with a second indoor unit control section 39, and a second indoor liquid-side heat exchange temperature sensor 75, a second indoor air temperature sensor 76, and a second indoor gas-side heat exchange temperature sensor 77, electrically connected to the second indoor unit control section 39.

(3-5-2) Cooling Operation Mode

In the cooling operation mode of the air conditioning device 1*c*, capacity control is performed on the operation frequency of the compressor 21 such that, for example, the evaporating temperature of the refrigerant in the refrigerant circuit 10 becomes the target evaporating temperature. Here, it is preferable that the target evaporating temperature is determined depending on the largest difference between a preset temperature and the indoor temperature in each indoor unit 30 or 35 (indoor unit with the largest load).

The gas refrigerant that has been discharged from the compressor 21 passes through the four-way switching valve 22 and is condensed in the outdoor heat exchanger 23. The refrigerant that has flowed through the outdoor heat exchanger 23 passes through a part of the outdoor bridge circuit 26 and flows into the high-pressure receiver 42. Note that, in the high-pressure receiver 42, excess refrigerant in the refrigerant circuit 10 is stored as a liquid refrigerant. The gas refrigerant that has flowed out of the gas region of the high-pressure receiver 42 is decompressed in the outdoor expansion valve 24. Here, during cooling operation, the outdoor expansion valve 24 is controlled such that the valve opening degree is in a fully open state, for example.

The refrigerant that has been passed through the outdoor expansion valve 24 flows through another part of the outdoor bridge circuit 26, and passes through the liquid-side shut-off valve 29 and the liquid-side refrigerant communication piping 6 to flow into the first indoor unit 30 and the second indoor unit 35.

The refrigerant that has flowed into the first indoor unit 30 is decompressed in the first indoor expansion valve 33. The valve opening degree of the first indoor expansion valve 33 is controlled so as to satisfy predetermined conditions, for example, the degree of superheating of the refrigerant flowing through the gas-side outlet of the first indoor heat exchanger 31 becomes the target value. Note that the degree of superheating of the refrigerant flowing through the gas-side outlet of the first indoor heat exchanger 31 may be determined by, with no limitations, subtracting the saturation temperature of the refrigerant corresponding to the low pressure of the refrigerant circuit 10 (detected pressure by the inlet pressure sensor 63) from the detected temperature by the first indoor gas-side heat exchange temperature sensor 73, for example. Similarly, the refrigerant that has flowed into the second indoor unit 35 is decompressed in the second indoor expansion valve 38. Note that the valve opening degree of the second indoor expansion valve 38 is controlled so as to satisfy predetermined conditions, for example, the degree of superheating of the refrigerant flowing through the gas-side outlet of the second indoor heat exchanger 36 becomes the target value. Note that the degree of superheating of the refrigerant flowing through the gas-side outlet of the second indoor heat exchanger 36 may be determined by, with no limitations, subtracting the saturation temperature of the refrigerant corresponding to the low pressure of the refrigerant circuit 10 (detected pressure by the inlet pressure sensor 63) from the detected temperature by the second indoor gas-side heat exchange temperature sensor 77, for example. Alternatively, the valve opening degree of both the first indoor expansion valve 33 and the second indoor expansion valve 38 may be controlled so as to satisfy predetermined conditions, for example, the degree of superheating of the refrigerant, obtained by subtracting the saturation temperature of the refrigerant corresponding to the detected pressure by the inlet pressure sensor 63 from the detected temperature of the inlet temperature sensor 64, becomes the target value. Furthermore, the approach for controlling the valve opening degree of the first indoor expansion valve 33 and the second indoor expansion valve 38 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been evaporated in the first indoor heat exchanger 31 and the refrigerant that has been evaporated in the second indoor heat exchanger 36 are combined, then pass through the gas-side refrigerant communication piping 5, the gas-side shut-off valve 28, and the four-way switching valve 22, and are again inhaled into the compressor 21.

(3-5-3) Heating Operation Mode

In the heating operation mode of the air conditioning device 1*c*, capacity control is performed on the operation frequency of the compressor 21 such that, for example, the condensation temperature of the refrigerant in the refrigerant circuit 10 becomes the target condensation temperature. Here, it is preferable that the target condensation temperature is determined depending on the largest difference between a preset temperature and the indoor temperature in each indoor unit 30 or 35 (indoor unit with the largest load). Note that the condensation temperature may be grasped as, but is not limited to, the saturation temperature of the refrigerant corresponding to the detected pressure by the discharge pressure sensor 61, for example.

The gas refrigerant that has been discharged from the compressor 21 flows through the four-way switching valve 22 and the gas-side refrigerant communication piping 5, and then flows into each of the first indoor unit 30 and the second indoor unit 35.

The gas refrigerant that has flowed into the first indoor heat exchanger 31 of the first indoor unit 30 is condensed in the first indoor heat exchanger 31. The refrigerant that has flowed through the first indoor heat exchanger 31 is decompressed in the first indoor expansion valve 33. Note that the valve opening degree of the first indoor expansion valve 33 is controlled so as to satisfy predetermined conditions, for example, the degree of subcooling of the refrigerant flowing through the liquid-side outlet of the first indoor heat exchanger 31 becomes the target value. The degree of subcooling of the refrigerant flowing through the liquid-side outlet of the first indoor heat exchanger 31 can be determined by, for example, subtracting the saturation temperature of the refrigerant corresponding to the detected pressure by the discharge pressure sensor 61 from the detected temperature by the first indoor liquid-side heat exchange temperature sensor 71.

Similarly, the gas refrigerant that has flowed into the second indoor heat exchanger 36 of the second indoor unit 35 is condensed in the second indoor heat exchanger 36. The refrigerant that has flowed through the second indoor heat exchanger 36 is decompressed in the second indoor expansion valve 38. Note that the valve opening degree of the second indoor expansion valve 38 is controlled so as to satisfy predetermined conditions, for example, the degree of subcooling of the refrigerant flowing through the liquid-side outlet of the second indoor heat exchanger 36 becomes the target value. The degree of subcooling of the refrigerant flowing through the liquid-side outlet of the second indoor heat exchanger 36 can be determined by, for example, subtracting the saturation temperature of the refrigerant corresponding to the detected pressure by the discharge pressure sensor 61 from the detected temperature by the second indoor liquid-side heat exchange temperature sensor 75.

The refrigerant that has flowed out of the liquid-side end of the first indoor heat exchanger 31 and the refrigerant that has flowed out of the liquid-side end of the second indoor heat exchanger 36 are combined, and then pass through the liquid-side refrigerant communication piping 6 to flow into the outdoor unit 20.

The refrigerant that has flowed into the outdoor unit 20 passes through the liquid-side shut-off valve 29, flows through a part of the outdoor bridge circuit 26, and flows into the high-pressure receiver 42. Note that, in the high-pressure receiver 42, excess refrigerant in the refrigerant circuit 10 is stored as a liquid refrigerant. The gas refrigerant that has flowed out of the gas region of the high-pressure receiver 42 is decompressed in the outdoor expansion valve 24 until it reaches the low pressure in the refrigeration cycle. That is, during heating operation, a pseudo-intermediate pressure refrigerant is stored in the high-pressure receiver 42.

Note that the valve opening degree of the outdoor expansion valve 24 is controlled so as to satisfy predetermined conditions, for example, the degree of superheating of the refrigerant inhaled by the compressor 21 becomes the target value. Note that the degree of superheating of the refrigerant inhaled by the compressor 21 can be determined by, with no limitations, subtracting the saturation temperature of the refrigerant corresponding to the detected pressure by the inlet pressure sensor 63 from the detected temperature by the inlet temperature sensor 64, for example. Note that the approach for controlling the valve opening degree of the outdoor expansion valve 24 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the outdoor expansion valve 24 flows through another part of the outdoor bridge circuit 26, is evaporated in the outdoor heat exchanger 23, passes through the four-way switching valve 22, and is again inhaled into the compressor 21.

(3-5-4) Characteristics of Fifth Embodiment

The air conditioning device 1*d* can carry out a refrigeration cycle using a refrigerant containing 1,2-difluoroethylene, and thus makes it possible to carry out a refrigeration cycle using a refrigerant having a small GWP.

Also, in the air conditioning device 1*d*, by providing the high-pressure receiver 42, it becomes possible to store excess refrigerant in the refrigerant circuit 10.

Note that, during heating operation, the reliability of the compressor 21 is ensured by controlling the degree of superheating with the valve opening degree of the outdoor expansion valve 24, and therefore, as for the first indoor expansion valve 33 and the second indoor expansion valve 38, it becomes possible to control the degree of subcooling such that the capacities in the first indoor heat exchanger 31 and the second indoor heat exchanger 36 are sufficiently demonstrated.

(3-6) Sixth Embodiment

Figure 3K:
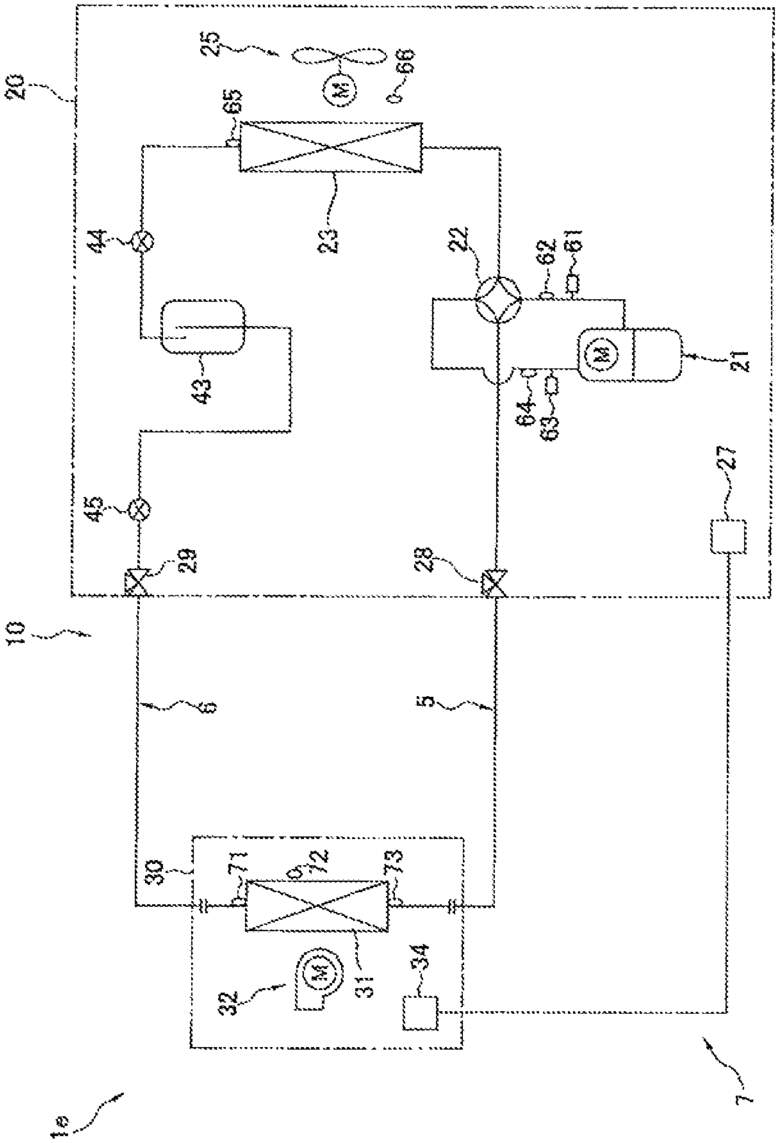
FIG. 3K is a schematic configuration diagram of a refrigerant circuit according to a sixth embodiment of the technology of the third group.
Figure 3L:
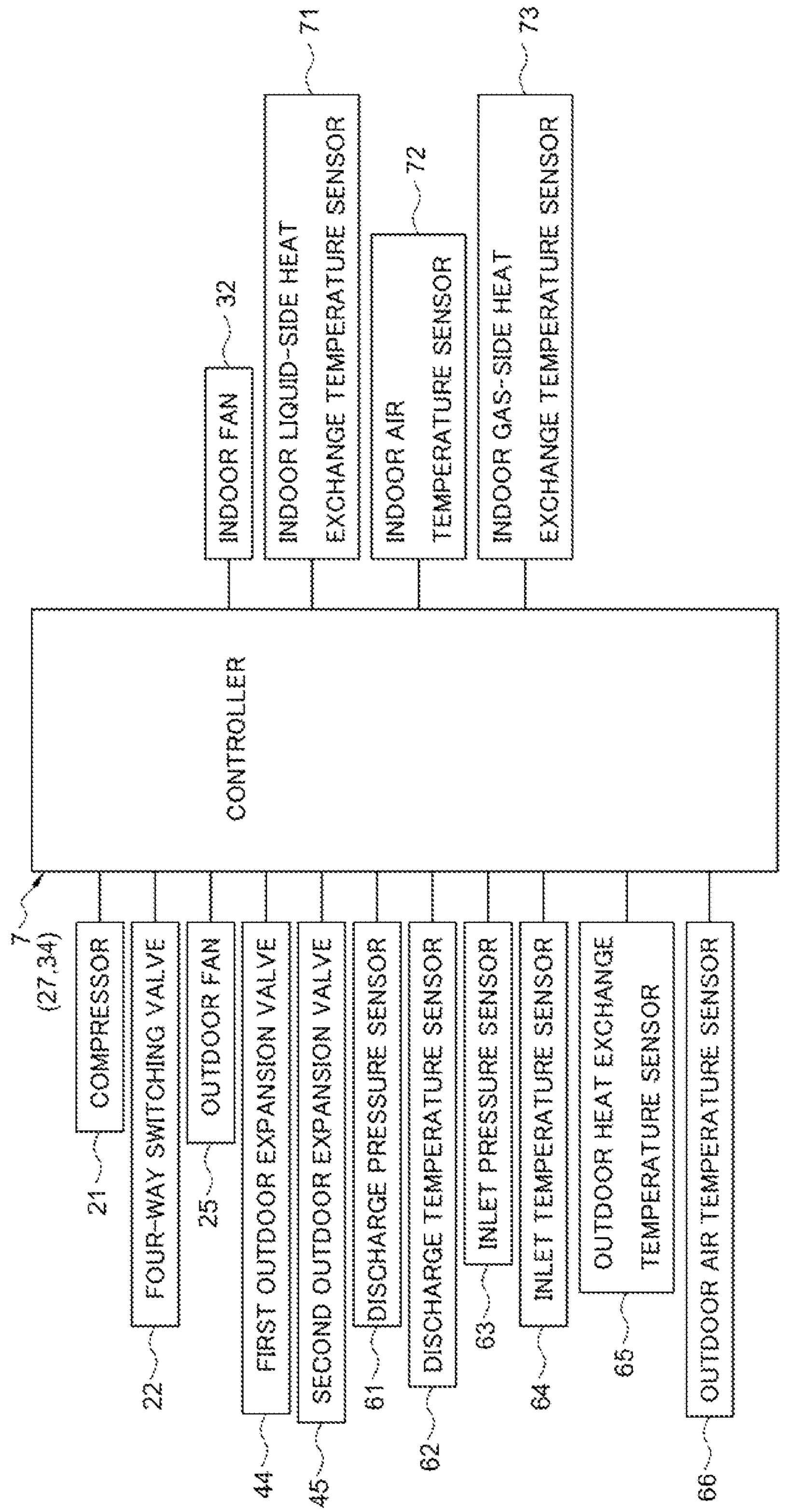
FIG. 3L is a schematic control block configuration diagram of a refrigeration cycle device according to the sixth embodiment of the technology of the third group.

Hereinafter, while referring to FIG. 3K, which is a schematic configuration diagram of a refrigerant circuit, and FIG. 3L, which is a schematic control block configuration diagram, an air conditioning device 1*e* as a refrigeration cycle device according to the sixth embodiment will be described. Note that, in the following, the differences from the air conditioning device 1*a* of the second embodiment will be mainly described.

(3-6-1) Schematic Configuration of Air Conditioning Device 1*e*

The air conditioning device 1*e* differs from the air conditioning device 1*a* of the second embodiment described above in that the outdoor unit 20 does not have the low-pressure receiver 41, that it has an intermediate pressure receiver 43, that it does not have the outdoor expansion valve 24, and that it has a first outdoor expansion valve 44 and a second outdoor expansion valve 45.

The intermediate pressure receiver 43 is provided between the liquid side of the outdoor heat exchanger 23 and the liquid-side shut-off valve 29 in the refrigerant circuit 10, and is a refrigerant container that is capable of storing excess refrigerant in the refrigerant circuit 10 as a liquid refrigerant.

The first outdoor expansion valve 44 is provided in the middle of refrigerant piping extending from the liquid side of the outdoor heat exchanger 23 to the intermediate pressure receiver 43. The second outdoor expansion valve 45 is provided in the middle of refrigerant piping extending from the intermediate pressure receiver 43 to the liquid-side shut-off valve 29. The first outdoor expansion valve 44 and the second outdoor expansion valve 45 are both preferably electric expansion valves whose valve opening degree can be regulated.

(3-6-2) Cooling Operation Mode

In the cooling operation mode of the air conditioning device 1*e*, capacity control is performed on the operation frequency of the compressor 21 such that, for example, the evaporating temperature of the refrigerant in the refrigerant circuit 10 becomes the target evaporating temperature determined depending on the difference between a preset temperature and the indoor temperature (detected temperature by the indoor air temperature sensor 72).

The gas refrigerant that has been discharged from the compressor 21 passes through the four-way switching valve 22 and is then condensed in the outdoor heat exchanger 23. The refrigerant that has flowed through the outdoor heat exchanger 23 is decompressed in the first outdoor expansion valve 44 until it reaches the intermediate pressure in the refrigeration cycle.

Here, the valve opening degree of the first outdoor expansion valve 44 is controlled so as to satisfy predetermined conditions, for example, the degree of subcooling of the refrigerant flowing through the liquid-side outlet of the outdoor heat exchanger 23 becomes the target value.

The refrigerant that has been decompressed in the first outdoor expansion valve 44 flows into the intermediate pressure receiver 43. In the intermediate pressure receiver 43, excess refrigerant in the refrigerant circuit 10 is stored as a liquid refrigerant. The refrigerant that has passed through the intermediate pressure receiver 43 is decompressed in the second outdoor expansion valve 45 until it reaches the low pressure in the refrigeration cycle.

Here, the valve opening degree of the second outdoor expansion valve 45 is controlled so as to satisfy predetermined conditions, for example, the degree of superheating of the refrigerant flowing through the gas side of the indoor heat exchanger 31 or the degree of superheating of the refrigerant inhaled by the compressor 21 becomes the target value. Note that the approach for controlling the valve opening degree of the second outdoor expansion valve 45 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed to the low pressure in the refrigeration cycle by the second outdoor expansion valve 45 passes through the liquid-side shut-off valve 29 and the liquid-side refrigerant communication piping 6 to flow into the indoor unit 30, and is evaporated in the indoor heat exchanger 31. The refrigerant that has flowed through the indoor heat exchanger 31 flows through the gas-side refrigerant communication piping 5, then passes through the gas-side shut-off valve 28 and the four-way switching valve 22, and is again inhaled into the compressor 21.

(3-6-3) Heating Operation Mode

In the heating operation mode of the air conditioning device 1*e*, capacity control is performed on the operation frequency of the compressor 21 such that, for example, the condensation temperature of the refrigerant in the refrigerant circuit 10 becomes the target condensation temperature determined depending on the difference between a preset temperature and the indoor temperature (detected temperature by the indoor air temperature sensor 72).

The gas refrigerant that has been discharged from the compressor 21 flows through the four-way switching valve 22 and the gas-side refrigerant communication piping 5, then flows into the gas-side end of the indoor heat exchanger 31 of the indoor unit 30, and is condensed in the indoor heat exchanger 31. The refrigerant that has flowed out of the liquid-side end of the indoor heat exchanger 31 passes through the liquid-side refrigerant communication piping 6, flows into the outdoor unit 20, passes through the liquid-side shut-off valve 29, and is decompressed in the second outdoor expansion valve 45 until it reaches the intermediate pressure in the refrigeration cycle.

Here, the valve opening degree of the second outdoor expansion valve 45 is controlled so as to satisfy predetermined conditions, for example, the degree of subcooling of the refrigerant flowing through the liquid-side outlet of the indoor heat exchanger 31 becomes the target value.

The refrigerant that has been decompressed in the second outdoor expansion valve 45 flows into the intermediate pressure receiver 43. In the intermediate pressure receiver 43, excess refrigerant in the refrigerant circuit 10 is stored as a liquid refrigerant. The refrigerant that has passed through the intermediate pressure receiver 43 is decompressed in the first outdoor expansion valve 44 until it reaches the low pressure in the refrigeration cycle.

Here, the valve opening degree of the first outdoor expansion valve 44 is controlled so as to satisfy predetermined conditions, for example, the degree of superheating of the refrigerant inhaled by the compressor 21 becomes the target value. Note that the approach for controlling the valve opening degree of the first outdoor expansion valve 44 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the first outdoor expansion valve 44 is evaporated in the outdoor heat exchanger 23, passes through the four-way switching valve 22, and is again inhaled into the compressor 21.

(3-6-4) Characteristics of Sixth Embodiment

The air conditioning device 1*e* can carry out a refrigeration cycle using a refrigerant containing 1,2-difluoroethylene, and thus makes it possible to carry out a refrigeration cycle using a refrigerant having a small GWP.

Also, in the air conditioning device 1*e*, by providing the intermediate pressure receiver 43, it becomes possible to store excess refrigerant in the refrigerant circuit 10. In addition, during cooling operation, it becomes possible to make it easier to sufficiently demonstrate the capacity of the outdoor heat exchanger 23 by controlling the degree of subcooling with the first outdoor expansion valve 44, and during heating operation, it becomes possible to make it easier to sufficiently demonstrate the capacity of the indoor heat exchanger 31 by controlling the degree of subcooling with the second outdoor expansion valve 45.

(3-7) Seventh Embodiment

Figure 3M:
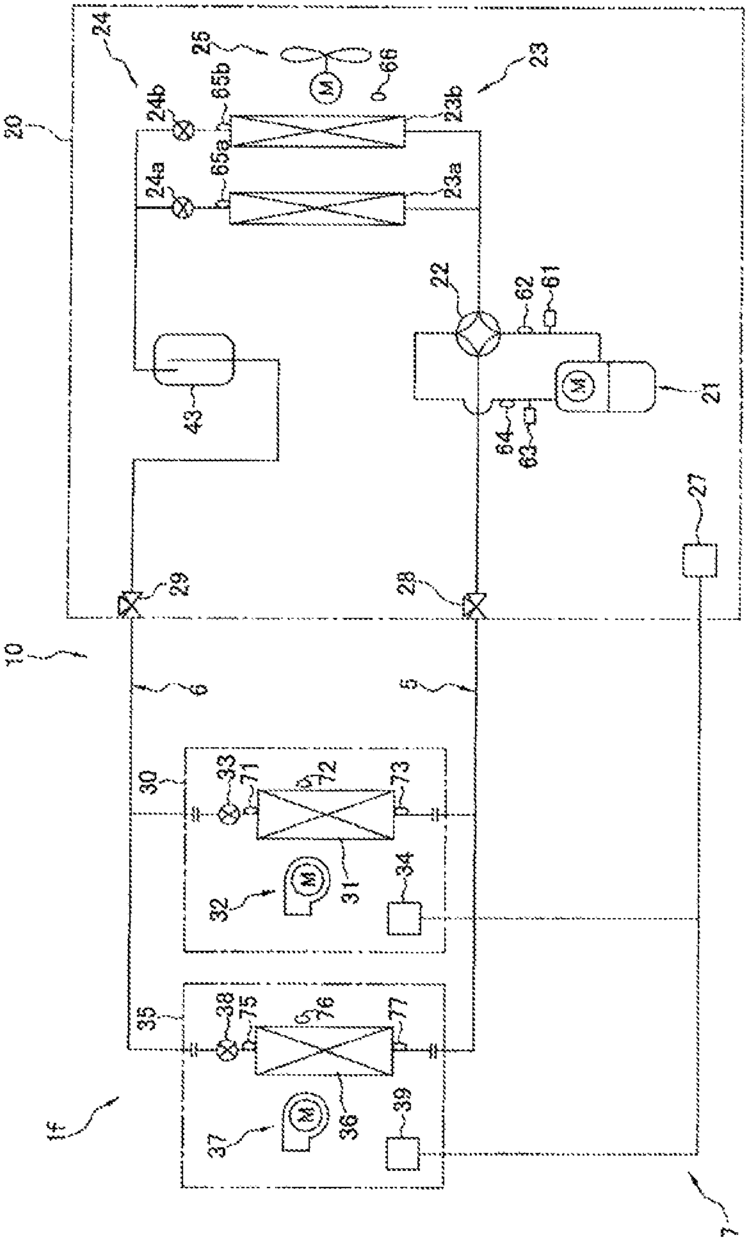
FIG. 3M is a schematic configuration diagram of a refrigerant circuit according to a seventh embodiment of the technology of the third group.
Figure 3N:
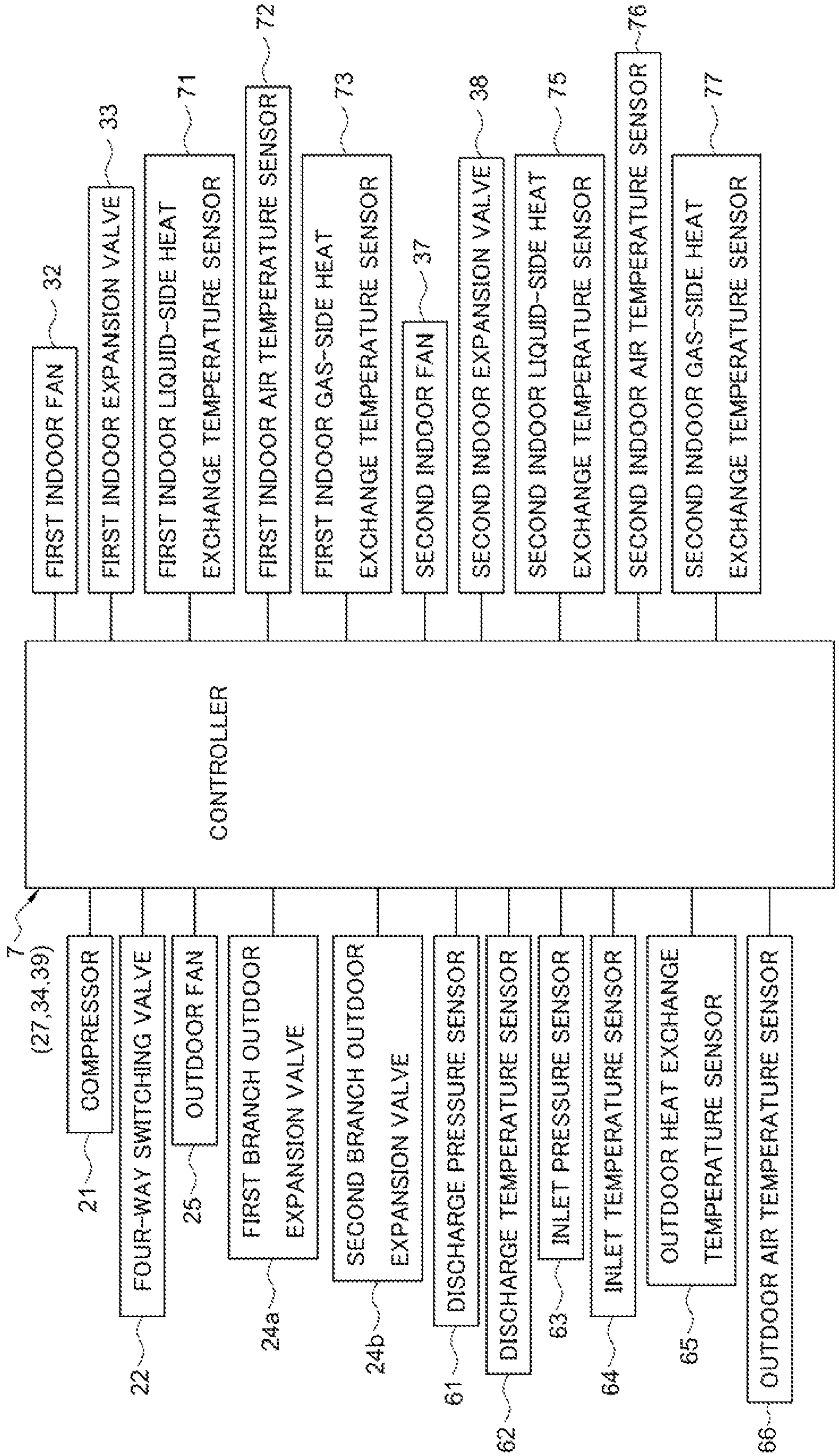
FIG. 3N is a schematic control block configuration diagram of a refrigeration cycle device according to the seventh embodiment of the technology of the third group.
Figure 30:
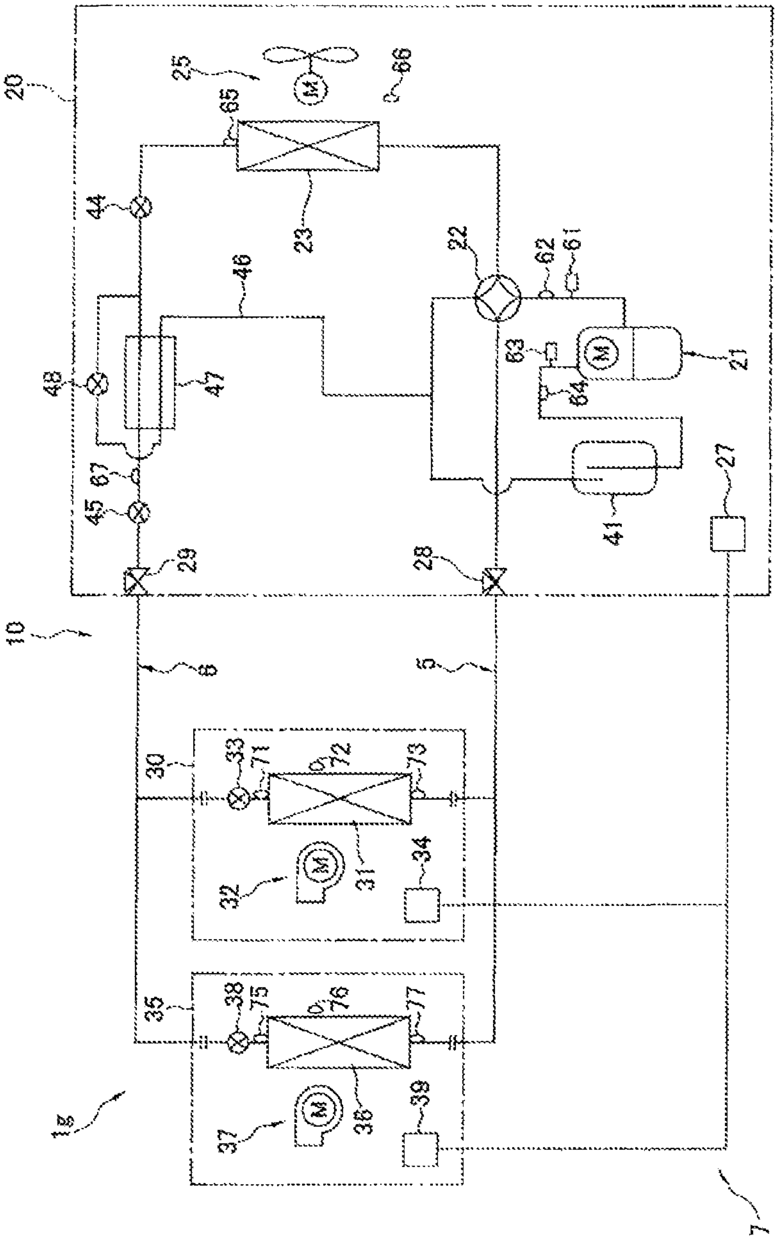

Hereinafter, while referring to FIG. 3M, which is a schematic configuration diagram of a refrigerant circuit, and FIG. 3N, which is a schematic control block configuration diagram, an air conditioning device 1*f* as a refrigeration cycle device according to the seventh embodiment will be described. Note that, in the following, the differences from the air conditioning device 1*e* of the sixth embodiment will be mainly described.

(3-7-1) Schematic Configuration of Air Conditioning Device 1*f*

The air conditioning device 1*f* differs from the air conditioning device 1*e* of the sixth embodiment described above in that the outdoor unit 20 has a first outdoor heat exchanger 23*a* and a second outdoor heat exchanger 23*b* arranged in parallel to each other, and that it has a first branch outdoor expansion valve 24*a* on the liquid refrigerant side of the first outdoor heat exchanger 23*a* and has a second branch outdoor expansion valve 24*b* on the liquid refrigerant side of the second outdoor heat exchanger 23*b*. Note that the first branch outdoor expansion valve 24*a* and the second branch outdoor expansion valve 24*b* are preferably electric expansion valves whose valve opening degree can be regulated.

Also, the air conditioning device 1*f* differs from the air conditioning device 1*e* of the sixth embodiment described above in that multiple indoor units are provided in parallel and that an indoor expansion valve is provided on the liquid refrigerant side of the indoor heat exchanger in each indoor unit.

The air conditioning device 1*f* has a first indoor unit 30 and a second indoor unit 35 connected in parallel to each other. The first indoor unit 30 has a first indoor heat exchanger 31 and a first indoor fan 32 as in the above embodiments, and a first indoor expansion valve 33 is provided on the liquid refrigerant side of the first indoor heat exchanger 31. The first indoor expansion valve 33 is preferably an electric expansion valve whose valve opening degree can be regulated. As in the above embodiments, the first indoor unit 30 is provided with a first indoor unit control section 34, and a first indoor liquid-side heat exchange temperature sensor 71, a first indoor air temperature sensor 72, a first indoor gas-side heat exchange temperature sensor 73, and the like, electrically connected to the first indoor unit control section 34. The first indoor liquid-side heat exchange temperature sensor 71 detects the temperature of the refrigerant flowing through the outlet on the liquid refrigerant side of the first indoor heat exchanger 31. The first indoor gas-side heat exchange temperature sensor 73 detects the temperature of the refrigerant flowing through the outlet on the gas refrigerant side of the first indoor heat exchanger 31. The second indoor unit 35 has a second indoor heat exchanger 36 and a second indoor fan 37 as in the first indoor unit 30, and a second indoor expansion valve 38 is provided on the liquid refrigerant side of the second indoor heat exchanger 36. The second indoor expansion valve 38 is preferably an electric expansion valve whose valve opening degree can be regulated. As in the first indoor unit 30, the second indoor unit 35 is provided with a second indoor unit control section 39, and a second indoor liquid-side heat exchange temperature sensor 75, a second indoor air temperature sensor 76, and a second indoor gas-side heat exchange temperature sensor 77, electrically connected to the second indoor unit control section 39.

(3-7-2) Cooling Operation Mode

In the cooling operation mode of the air conditioning device 1*f*, capacity control is performed on the operation frequency of the compressor 21 such that, for example, the evaporating temperature of the refrigerant in the refrigerant circuit 10 becomes the target evaporating temperature. Here, it is preferable that the target evaporating temperature is determined depending on the largest difference between a preset temperature and the indoor temperature in each indoor unit 30 or 35 (indoor unit with the largest load).

The gas refrigerant that has been discharged from the compressor 21 passes through the four-way switching valve 22, then branches off and flows into the first outdoor heat exchanger 23*a* and the second outdoor heat exchanger 23*b*, and is condensed in each of the first outdoor heat exchanger 23*a* and the second outdoor heat exchanger 23*b*. The refrigerant that has flowed through the first outdoor heat exchanger 23*a* is decompressed in the first branch outdoor expansion valve 24*a* until it reaches the intermediate pressure in the refrigeration cycle. Also, the refrigerant that has flowed through the second outdoor heat exchanger 23*b* is decompressed in the second branch outdoor expansion valve 24*b* until it reaches the intermediate pressure in the refrigeration cycle.

Here, the first branch outdoor expansion valve 24*a* and the second branch outdoor expansion valve 24*b* may be controlled such that they are both in a fully open state, for example.

In addition, when there occurs a difference in the ease of refrigerant flow between the first outdoor heat exchanger 23*a* and the second outdoor heat exchanger 23*b* due to the structure or connection of refrigerant piping, the valve opening degree of the first branch outdoor expansion valve 24*a* may be controlled so as to satisfy predetermined conditions, for example, the degree of subcooling of the refrigerant flowing through the liquid-side outlet of the first outdoor heat exchanger 23*a* becomes the common target value, and the valve opening degree of the second branch outdoor expansion valve 24*b* may be controlled so as to satisfy predetermined conditions, for example, the degree of subcooling of the refrigerant flowing through the liquid-side outlet of the second outdoor heat exchanger 23*b* becomes the same common target value. By these controls, it becomes possible to keep uneven flow of the refrigerant between the first outdoor heat exchanger 23*a* and the second outdoor heat exchanger 23*b* small.

The refrigerant that has passed through the first branch outdoor expansion valve 24*a* and the refrigerant that has passed through the second branch outdoor expansion valve 24*b* are combined, and then flow into the intermediate pressure receiver 43. In the intermediate pressure receiver 43, excess refrigerant in the refrigerant circuit 10 is stored as a liquid refrigerant. The refrigerant that has passed through the intermediate pressure receiver 43 flows through the liquid-side shut-off valve 29 and the liquid-side refrigerant communication piping 6, and flows into each of the first indoor unit 31 and the second indoor unit 35.

The refrigerant that has flowed into the first indoor unit 31 is decompressed in the first indoor expansion valve 33 until it reaches the low pressure in the refrigeration cycle. Also, the refrigerant that has flowed into the second indoor unit 35 is decompressed in the second indoor expansion valve 38 until it reaches the low pressure in the refrigeration cycle.

Here, the valve opening degree of the first indoor expansion valve 33 is controlled so as to satisfy predetermined conditions, for example, the degree of superheating of the refrigerant flowing through the gas side of the first indoor heat exchanger 31 or the degree of superheating of the refrigerant inhaled by the compressor 21 becomes the target value. Similarly, the valve opening degree of the second indoor expansion valve 38 is also controlled so as to satisfy predetermined conditions, for example, the degree of superheating of the refrigerant flowing through the gas side of the second indoor heat exchanger 36 or the degree of superheating of the refrigerant inhaled by the compressor 21 becomes the target value. Note that the approach for controlling the valve opening degree of the first indoor expansion valve 33 and the second indoor expansion valve 38 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed in the first indoor expansion valve 33 is evaporated in the first indoor heat exchanger 31, and the refrigerant that has been decompressed in the second indoor expansion valve 38 is evaporated in the second indoor heat exchanger 36, and after being combined, they pass through the gas-side refrigerant communication piping 5, the gas-side shut-off valve 28, and the four-way switching valve 22, and are again inhaled into the compressor 21.

(3-7-3) Heating Operation Mode

In the heating operation mode of the air conditioning device 1*f*, capacity control is performed on the operation frequency of the compressor 21 such that, for example, the condensation temperature of the refrigerant in the refrigerant circuit 10 becomes the target condensation temperature. Here, it is preferable that the target condensation temperature is determined depending on the largest difference between a preset temperature and the indoor temperature in each indoor unit 30 or 35 (indoor unit with the largest load).

The gas refrigerant that has been discharged from the compressor 21 flows through the four-way switching valve 22 and the gas-side refrigerant communication piping 5, and then flows into each of the first indoor unit 30 and the second indoor unit 35.

The refrigerant that has flowed into the first indoor unit 30 is condensed in the first indoor heat exchanger 31, and the refrigerant that has flowed into the second indoor unit 35 is condensed in the second indoor heat exchanger 36.

The refrigerant that has flowed out of the liquid-side end of the first indoor heat exchanger 31 is decompressed in the first indoor expansion valve 33 until it reaches the intermediate pressure in the refrigeration cycle. Similarly, the refrigerant that has flowed out of the liquid-side end of the second indoor heat exchanger 36 is also decompressed in the second indoor expansion valve 38 until it reaches the intermediate pressure in the refrigeration cycle.

Here, the valve opening degree of the first indoor expansion valve 33 is controlled so as to satisfy predetermined conditions, for example, the degree of subcooling of the refrigerant flowing through the liquid-side outlet of the first indoor heat exchanger 31 becomes the target value. Similarly, in the second indoor expansion valve 38 as well, the valve opening degree is controlled so as to satisfy predetermined conditions, for example, the degree of subcooling of the refrigerant flowing through the liquid-side outlet of the second indoor heat exchanger 36 becomes the target value.

The refrigerant that has passed through the first indoor expansion valve 33 and the refrigerant that has passed through the second indoor expansion valve 38 are combined, and then pass through the liquid-side refrigerant communication piping 6 to flow into the outdoor unit 20.

The refrigerant that has flowed into the outdoor unit 20 passes through the liquid-side shut-off valve 29 and is sent to the intermediate pressure receiver 43. In the intermediate pressure receiver 43, excess refrigerant in the refrigerant circuit 10 is stored as a liquid refrigerant. The refrigerant that has passed through the intermediate pressure receiver 43 is separated and flows through the first branch outdoor expansion valve 24*a* and the second branch outdoor expansion valve 24*b*.

The first branch outdoor expansion valve 24*a* decompresses the passing refrigerant until it reaches the low pressure in the refrigeration cycle. Similarly, the second branch outdoor expansion valve 24*b* also decompresses the passing refrigerant until it reaches the low pressure in the refrigeration cycle.

Here, the valve opening degree of the first branch outdoor expansion valve 24*a* and the second branch outdoor expansion valve 24*b* is controlled so as to satisfy predetermined conditions, for example, the degree of superheating of the refrigerant inhaled by the compressor 21 becomes the target value. Note that the approach for controlling the valve opening degree of the first branch outdoor expansion valve 24*a* and the second branch outdoor expansion valve 24*b* is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed in the first branch outdoor expansion valve 24*a* is evaporated in the first outdoor heat exchanger 23*a*, and the refrigerant that has been decompressed in the second branch outdoor expansion valve 24*b* is evaporated in the second outdoor heat exchanger 23*b*, and after being combined, they pass through the four-way switching valve 22, and are again inhaled into the compressor 21.

(3-7-4) Characteristics of Seventh Embodiment

The air conditioning device 1*f* can carry out a refrigeration cycle using a refrigerant containing 1,2-difluoroethylene, and thus makes it possible to carry out a refrigeration cycle using a refrigerant having a small GWP.

Also, in the air conditioning device 1*f*, by providing the intermediate pressure receiver 43, it becomes possible to store excess refrigerant in the refrigerant circuit 10. In addition, during heating operation, it becomes possible to make it easier to sufficiently demonstrate the capacity of the indoor heat exchanger 31 by controlling the degree of subcooling with the first indoor expansion valve 33 and the second indoor expansion valve 38.

(3-8) Eighth Embodiment

Figure 3P:
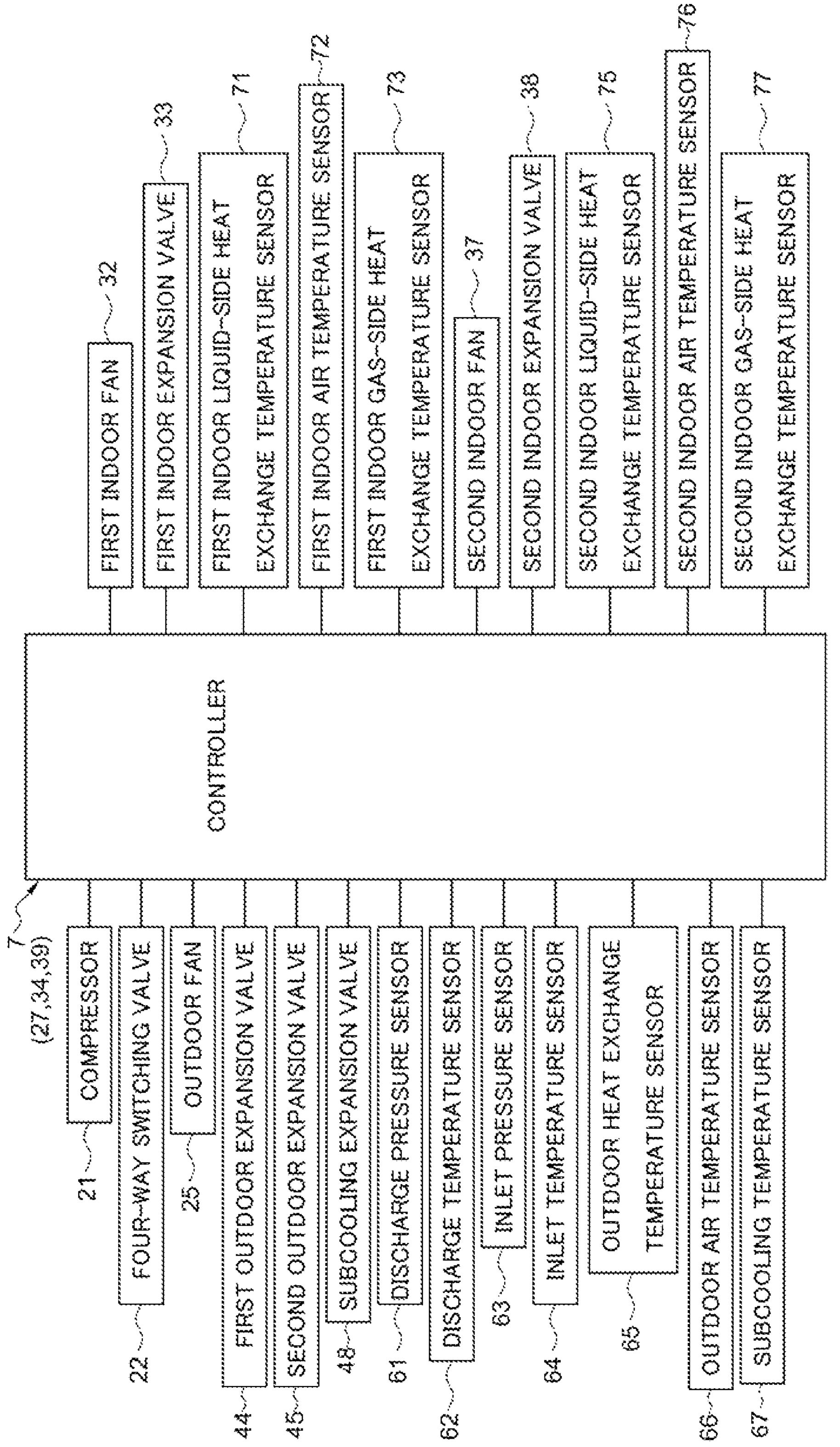
FIG. 3P is a schematic control block configuration diagram of a refrigeration cycle device according to the eighth embodiment of the technology of the third group.

Hereinafter, while referring to FIG. 3O, which is a schematic configuration diagram of a refrigerant circuit, and FIG. 3P, which is a schematic control block configuration diagram, an air conditioning device 1*g* as a refrigeration cycle device according to the eighth embodiment will be described. Note that, in the following, the differences from the air conditioning device 1*b* of the third embodiment will be mainly described.

(3-8-1) Schematic Configuration of Air Conditioning Device 1*g*

The air conditioning device 1*g* differs from the air conditioning device 1*b* of the third embodiment described above in that the bypass piping 40 having the bypass expansion valve 49 is not provided, that a subcooling heat exchanger 47 is provided, that subcooling piping 46 is provided, that a first outdoor expansion valve 44 and a second outdoor expansion valve 45 are provided, and that a subcooling temperature sensor 67 is provided.

The first outdoor expansion valve 44 is provided between the liquid-side outlet of the outdoor heat exchanger 23 and the liquid-side shut-off valve 29 in the refrigerant circuit 10. The second outdoor expansion valve 45 is provided between the first outdoor expansion valve 44 and the liquid-side shut-off valve 29 in the refrigerant circuit 10. The first outdoor expansion valve 44 and the second outdoor expansion valve 45 are both preferably electric expansion valves whose valve opening degree can be regulated.

In the refrigerant circuit 10, the subcooling piping 46 is provided such that it branches off from the branch part between the first outdoor expansion valve 44 and the second outdoor expansion valve 45, and joins the junction location between one of the connection ports of the four-way switching valve 22 and the low-pressure receiver 41. The subcooling piping 46 is provided with a subcooling expansion valve 48. The subcooling expansion valve 48 is preferably an electric expansion valve whose valve opening degree can be regulated.

The subcooling heat exchanger 47 is a heat exchanger that causes heat exchange between the refrigerant flowing through the part between the first outdoor expansion valve 44 and the second outdoor expansion valve 45 in the refrigerant circuit 10 and the refrigerant flowing on the junction location side of the subcooling expansion valve 48 in the subcooling piping 46. In the present embodiment, the subcooling heat exchanger 47 is provided in the part between the first outdoor expansion valve 44 and the second outdoor expansion valve 45, and on the side of the second outdoor expansion valve 45 than the branch part of the subcooling piping 46.

The subcooling temperature sensor 67 is a temperature sensor that detects the temperature of the refrigerant flowing on the side of the second outdoor expansion valve 45 than the subcooling heat exchanger 47 in the part between the first outdoor expansion valve 44 and the second outdoor expansion valve 45 in the refrigerant circuit 10.

(3-8-2) Cooling Operation Mode

In the cooling operation mode of the air conditioning device 1*g*, capacity control is performed on the operation frequency of the compressor 21 such that, for example, the evaporating temperature of the refrigerant in the refrigerant circuit 10 becomes the target evaporating temperature. Here, it is preferable that the target evaporating temperature is determined depending on the largest difference between a preset temperature and the indoor temperature in each indoor unit 30 or 35 (indoor unit with the largest load).

The gas refrigerant that has been discharged from the compressor 21 passes through the four-way switching valve 22 and is condensed in the outdoor heat exchanger 23. The refrigerant that has flowed through the outdoor heat exchanger 23 passes through the first outdoor expansion valve 44. Note that, in this case, the first outdoor expansion valve 44 is controlled so as to be in a fully open state.

After passing through the first outdoor expansion valve 44, a part of the refrigerant flows toward the side of the second outdoor expansion valve 45, and another part branches off and flows into the subcooling piping 46. The refrigerant that has branched off and flowed into the subcooling piping 46 is decompressed in the subcooling expansion valve 48. In the subcooling heat exchanger 47, heat exchange is performed between the refrigerant flowing from the first outdoor expansion valve 44 toward the side of the second outdoor expansion valve 45 and the refrigerant flowing through the subcooling piping 46 that has been decompressed in the subcooling expansion valve 48. After the heat exchange in the subcooling heat exchanger 47 is finished, the refrigerant flowing through the subcooling piping 46 flows to join the junction location between one of the connection ports of the four-way switching valve 22 and the low-pressure receiver 41. After the heat exchange in the subcooling heat exchanger 47 is finished, the refrigerant flowing from the first outdoor expansion valve 44 toward the side of the second outdoor expansion valve 45 is decompressed in the second outdoor expansion valve 45.

In the above, the second outdoor expansion valve 45 is controlled so as to satisfy predetermined conditions, for example, the degree of subcooling of the refrigerant flowing through the liquid-side outlet of the outdoor heat exchanger 23 becomes the target value.

Also, in order to prevent the entire part from the second outdoor expansion valve 45 through the liquid-side refrigerant communication piping 6 to the first indoor expansion valve 33 and the second indoor expansion valve 38 in the refrigerant circuit 10 from being filled with the refrigerant in a liquid state, the valve opening degree of the subcooling expansion valve 48 is controlled such that at least the refrigerant reaching the first indoor expansion valve 33 and the second indoor expansion valve 38 is in a gas-liquid two phase state. For example, it is preferable that the valve opening degree of the subcooling expansion valve 48 is controlled such that the specific enthalpy of the refrigerant that flows from the first outdoor expansion valve 44 toward the side of the second outdoor expansion valve 45 and that has passed through the subcooling heat exchanger 47 is larger than the specific enthalpy at the location where the low pressure of the refrigeration cycle and the saturated liquid line intersect in the Mollier chart. Here, the valve opening degree of the subcooling expansion valve 48 may be controlled by allowing the controller 7 to hold the data of the Mollier chart corresponding to the refrigerant in advance, and using the specific enthalpy of the refrigerant that has passed through the subcooling heat exchanger 47 described above, the detected pressure by the discharge pressure sensor 61, the detected temperature by the subcooling temperature sensor 67, and the data of the Mollier chart corresponding to that refrigerant. Note that it is more preferable to control the valve opening degree of the subcooling expansion valve 48 so as to satisfy predetermined conditions, for example, the temperature of the refrigerant that flows from the first outdoor expansion valve 44 toward the side of the second outdoor expansion valve 45 and that has passed through the subcooling heat exchanger 47 (detected temperature by the subcooling temperature sensor 67) becomes the target value.

The refrigerant that has been decompressed in the second outdoor expansion valve 45 passes through the liquid-side shut-off valve 29 and the liquid-side refrigerant communication piping 6, and is sent to the first indoor unit 30 and the second indoor unit 35.

Here, in the first indoor unit 30, the valve opening degree of the first indoor expansion valve 33 is controlled so as to satisfy predetermined conditions, for example, the degree of superheating of the refrigerant flowing through the gas-side outlet of the first indoor heat exchanger 31 becomes the target value. The valve opening degree of the second indoor expansion valve 38 of the second indoor unit 35 is also controlled so as to satisfy predetermined conditions, for example, the degree of superheating of the refrigerant flowing through the gas-side outlet of the second indoor heat exchanger 36 becomes the target value, as in the first indoor expansion valve 33. Alternatively, the valve opening degree of both the first indoor expansion valve 33 and the second indoor expansion valve 38 may be controlled so as to satisfy predetermined conditions, for example, the degree of superheating of the refrigerant, obtained by subtracting the saturation temperature of the refrigerant corresponding to the detected pressure by the inlet pressure sensor 63 from the detected temperature of the inlet temperature sensor 64, becomes the target value. Furthermore, the approach for controlling the valve opening degree of the first indoor expansion valve 33 and the second indoor expansion valve 38 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the first indoor expansion valve 33 is evaporated in the first indoor heat exchanger 31, and the refrigerant that has been decompressed by the second indoor expansion valve 38 is evaporated in the second indoor heat exchanger 36, and after being combined, they flow into the gas-side refrigerant communication piping 5. The refrigerant that has flowed through the gas-side refrigerant communication piping 5 passes through the gas-side shut-off valve 28 and the four-way switching valve 22, and is combined with the refrigerant that has flowed through the subcooling piping 46. The combined refrigerant passes through the low-pressure receiver 41 and is again inhaled into the compressor 21. Note that, in the low-pressure receiver 41, the liquid refrigerant that could not be fully evaporated in the first indoor heat exchanger 31, the second indoor heat exchanger, and the subcooling heat exchanger 47 is stored as excess refrigerant.

(3-8-3) Heating Operation Mode

In the heating operation mode of the air conditioning device 1*g*, capacity control is performed on the operation frequency of the compressor 21 such that, for example, the condensation temperature of the refrigerant in the refrigerant circuit 10 becomes the target condensation temperature. Here, it is preferable that the target condensation temperature is determined depending on the largest difference between a preset temperature and the indoor temperature in each indoor unit 30 or 35 (indoor unit with the largest load).

The gas refrigerant that has been discharged from the compressor 21 flows through the four-way switching valve

22 and the gas-side refrigerant communication piping 5, and then a part of the refrigerant flows into the gas-side end of the first indoor heat exchanger 31 of the first indoor unit 30 and is condensed in the first indoor heat exchanger 31, and another part of the refrigerant flows into the gas-side end of the second indoor heat exchanger 36 of the second indoor unit 35 and is condensed in the second indoor heat exchanger 36.

Note that, in the first indoor expansion valve 33 of the first indoor unit 30, the valve opening degree is controlled so as to satisfy predetermined conditions, for example, the degree of subcooling of the refrigerant flowing through the liquid side of the first indoor heat exchanger 31 becomes the predetermined target value. In the second indoor expansion valve 38 of the second indoor unit 35 as well, the valve opening degree is controlled so as to satisfy predetermined conditions, for example, the degree of subcooling of the refrigerant flowing through the liquid side of the second indoor heat exchanger 36 becomes the predetermined target value.

The refrigerant that has been decompressed by the first indoor expansion valve 33 and the refrigerant that has been decompressed by the second indoor expansion valve 38 are combined, flow through the liquid-side refrigerant communication piping 6, and flow into the outdoor unit 20.

The refrigerant that has passed through the liquid-side shut-off valve 29 of the outdoor unit 20 passes through the second outdoor expansion valve 45 controlled to be in a fully open state, and undergoes heat exchange with the refrigerant flowing through the subcooling piping 46 in the subcooling heat exchanger 47. After passing through the second outdoor expansion valve 45 and passing through the subcooling heat exchanger 47, a part of the refrigerant branches off to the subcooling piping 46 and another part is sent to the first outdoor expansion valve 44. The refrigerant that has branched off and flowed into the subcooling piping 46 is decompressed in the subcooling expansion valve 48, and is then combined with the refrigerant flowing from each of the indoor units 30 and 35 at the junction location between one of the connection ports of the four-way switching valve 22 and the low-pressure receiver 41. Also, the refrigerant that has flowed from the subcooling heat exchanger 47 toward the first outdoor expansion valve 44 is decompressed in the first outdoor expansion valve 44 and flows into the outdoor heat exchanger 23.

Here, the valve opening degree of the first outdoor expansion valve 44 is controlled so as to satisfy predetermined conditions, for example, the degree of superheating of the refrigerant flowing through the inlet side of the compressor 21 becomes the target value. Note that the approach for controlling the valve opening degree of the first outdoor expansion valve 44 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

Also, the valve opening degree of the subcooling expansion valve 48 is controlled so as to satisfy predetermined conditions, for example, the degree of superheating of the refrigerant flowing through the inlet side of the compressor 21 becomes the target value. Note that the approach for controlling the valve opening degree of the subcooling expansion valve 48 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions. Also, during heating operation, the subcooling expansion valve 48 may be controlled to be in a fully closed state such that no refrigerant flows into the subcooling piping 46.

The refrigerant that has been decompressed by the first outdoor expansion valve 44 is evaporated in the outdoor heat exchanger 23, passes through the four-way switching valve 22, and is combined with the refrigerant that has flowed through the subcooling piping 46. The combined refrigerant passes through the low-pressure receiver 41 and is again inhaled into the compressor 21. Note that, in the low-pressure receiver 41, the liquid refrigerant that could not be fully evaporated in the outdoor heat exchanger 23 and the subcooling heat exchanger 47 is stored as excess refrigerant.

(3-8-4) Characteristics of Eighth Embodiment

The air conditioning device 1*g* can carry out a refrigeration cycle using a refrigerant containing 1,2-difluoroethylene, and thus makes it possible to carry out a refrigeration cycle using a refrigerant having a small GWP.

Also, in the air conditioning device 1*g*, by providing the low-pressure receiver 41, liquid compression in the compressor 21 can be suppressed. In addition, by controlling the degree of superheating with the first indoor expansion valve 33 and the second indoor expansion valve 38 during cooling operation, and by controlling the degree of subcooling with the first indoor expansion valve 33 and the second indoor expansion valve 38 during heating operation, it is easy to sufficiently demonstrate the capacities in the first indoor heat exchanger 31 and the second indoor heat exchanger 36.

Furthermore, during cooling operation, the air conditioning device 1*g* is controlled such that the space inside the piping from the second outdoor expansion valve 45 through the liquid-side refrigerant communication piping 6 to the first indoor expansion valve 33 and the second indoor expansion valve 38 is not filled with the refrigerant in a liquid state but at least partially with the refrigerant in a gas-liquid two phase state. Therefore, compared to the case where the entire space inside the piping from the second outdoor expansion valve 45 to the first indoor expansion valve 33 and the second indoor expansion valve 38 is filled with a liquid refrigerant, the refrigerant density at that location can be reduced. This makes it possible to carry out the refrigeration cycle with a smaller amount of refrigerant enclosed in the refrigerant circuit 10. Accordingly, even if a leak of the refrigerant from the refrigerant circuit 10 occurs, the amount of refrigerant to be leaked can be kept low.

(3-9) Ninth Embodiment

Figure 3Q:
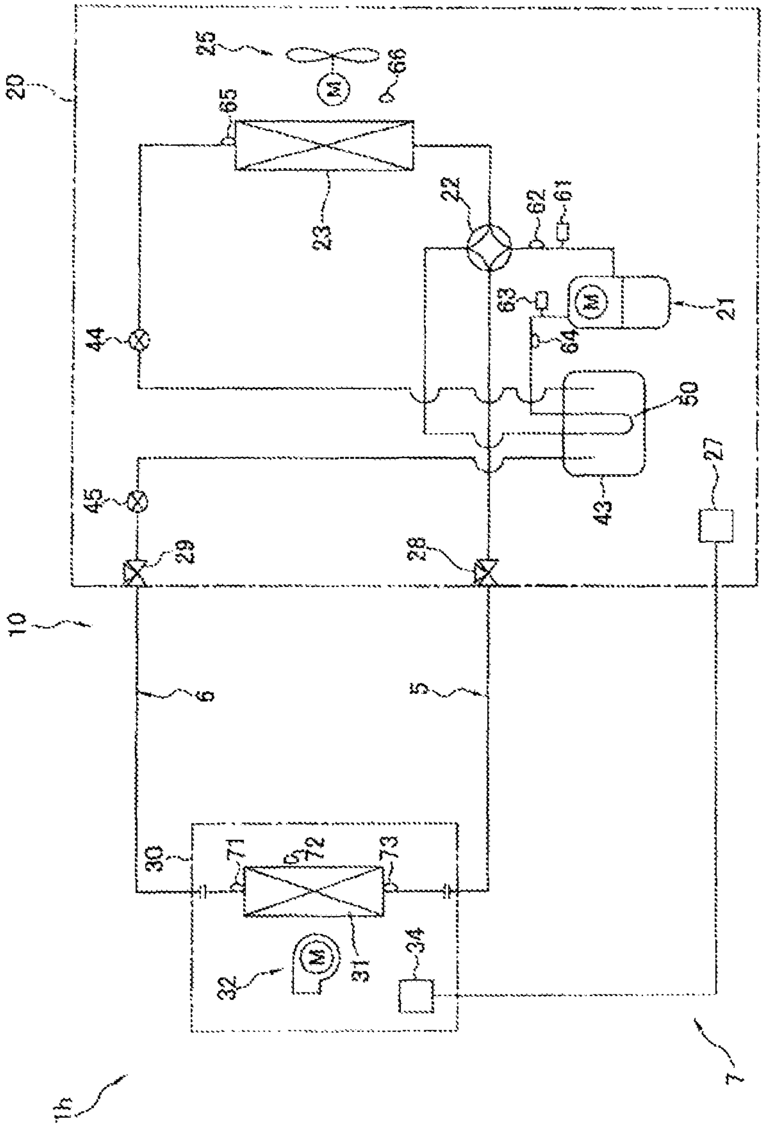
FIG. 3Q is a schematic configuration diagram of a refrigerant circuit according to a ninth embodiment of the technology of the third group.
Figure 3R:
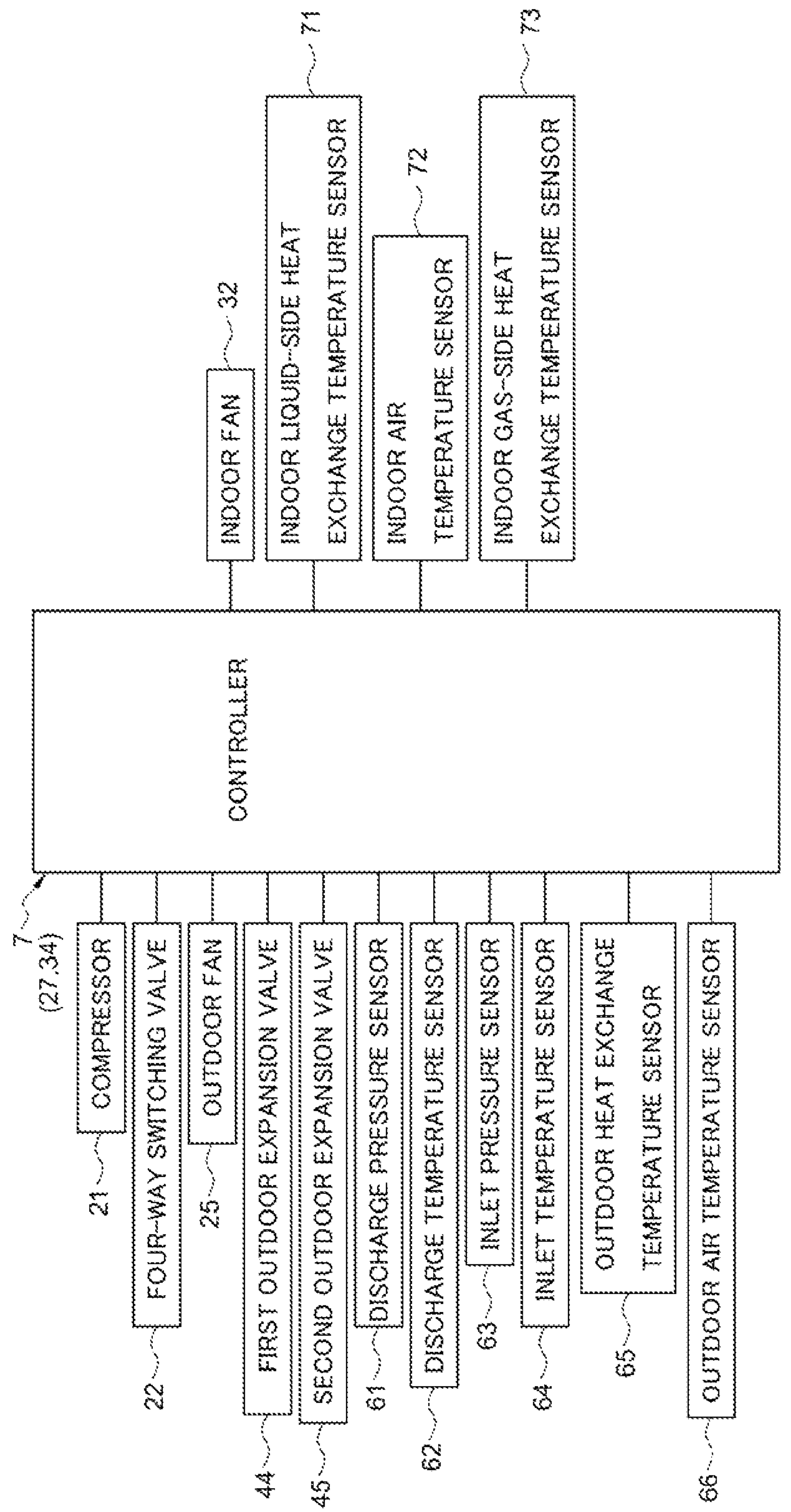
FIG. 3R is a schematic control block configuration diagram of a refrigeration cycle device according to the ninth embodiment of the technology of the third group.
Figure 38:
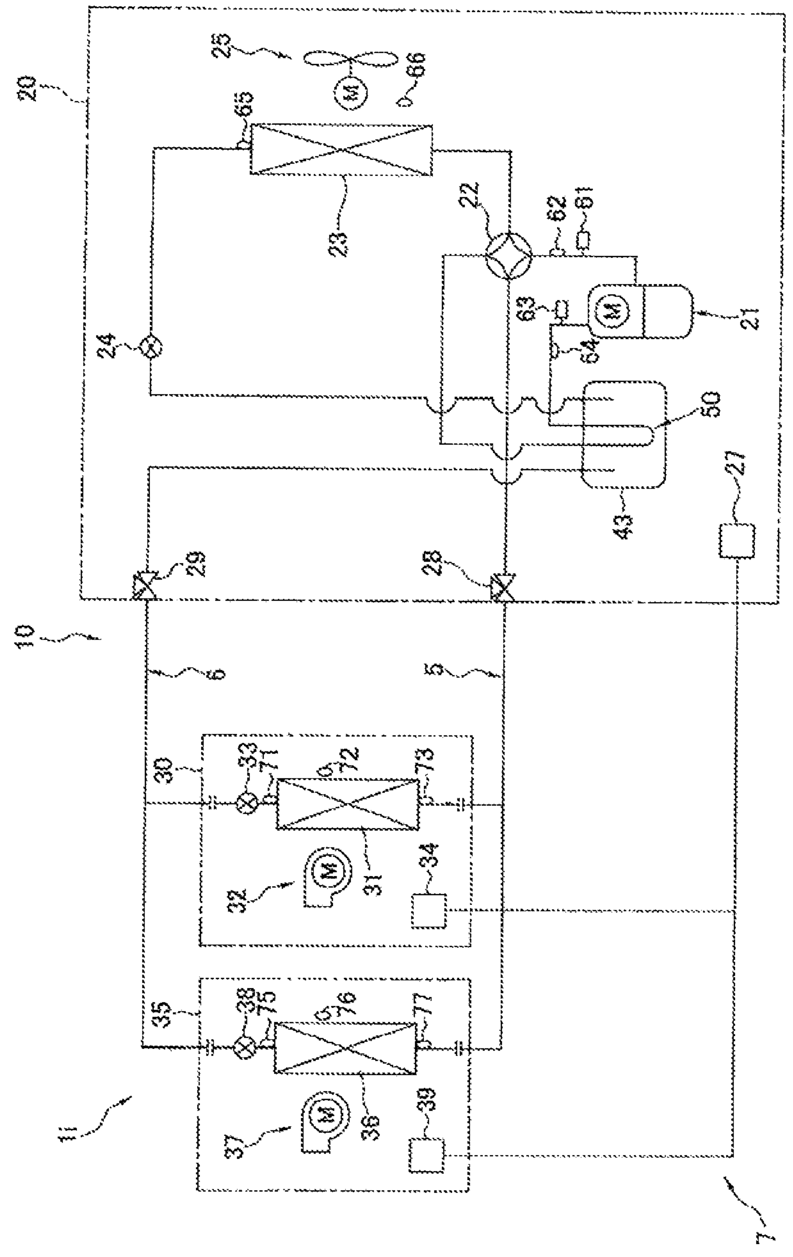

Hereinafter, while referring to FIG. 3Q, which is a schematic configuration diagram of a refrigerant circuit, and FIG. 3R, which is a schematic control block configuration diagram, an air conditioning device 1*h* as a refrigeration cycle device according to the ninth embodiment will be described. Note that, in the following, the differences from the air conditioning device 1*e* of the sixth embodiment will be mainly described.

(3-9-1) Schematic Configuration of Air Conditioning Device 1*h*

The air conditioning device 1*h* differs from the air conditioning device 1*e* of the sixth embodiment described above in that it has an inlet refrigerant heating section 50.

The inlet refrigerant heating section 50 is configured with a part where a part of the refrigerant piping extending from one of the connection ports of the four-way switching valve 22 toward the inlet side of the compressor 21 is located in the intermediate pressure receiver 43. In this inlet refrigerant heating section 50, the refrigerant flowing through the refrigerant piping extending from one of the connection ports of the four-way switching valve 22 toward the inlet side of the compressor 21 and the refrigerant present in the intermediate pressure receiver 43 do not mix with each other, but undergo heat exchange with each other.

(3-9-2) Cooling Operation Mode

In the cooling operation mode of the air conditioning device 1*h*, capacity control is performed on the operation frequency of the compressor 21 such that, for example, the evaporating temperature of the refrigerant in the refrigerant circuit 10 becomes the target evaporating temperature determined depending on the difference between a preset temperature and the indoor temperature (detected temperature by the indoor air temperature sensor 72).

The gas refrigerant that has been discharged from the compressor 21 passes through the four-way switching valve 22 and is then condensed in the outdoor heat exchanger 23. The refrigerant that has flowed through the outdoor heat exchanger 23 is decompressed in the first outdoor expansion valve 44 until it reaches the intermediate pressure in the refrigeration cycle.

Here, the valve opening degree of the first outdoor expansion valve 44 is controlled so as to satisfy predetermined conditions, for example, the degree of subcooling of the refrigerant flowing through the liquid-side outlet of the outdoor heat exchanger 23 becomes the target value.

The refrigerant that has been decompressed in the first outdoor expansion valve 44 flows into the intermediate pressure receiver 43. In the intermediate pressure receiver 43, excess refrigerant in the refrigerant circuit 10 is stored as a liquid refrigerant. Here, the refrigerant that has flowed into the intermediate pressure receiver 43 is cooled by heat exchange with the refrigerant flowing through the inlet side of the compressor 21 in the inlet refrigerant heating section 50. The refrigerant that has been cooled in the inlet refrigerant heating section 50 in the intermediate pressure receiver 43 is decompressed in the second outdoor expansion valve 45 until it reaches the low pressure in the refrigeration cycle.

Here, the valve opening degree of the second outdoor expansion valve 45 is controlled so as to satisfy predetermined conditions, for example, the degree of superheating of the refrigerant flowing through the gas side of the indoor heat exchanger 31 or the degree of superheating of the refrigerant inhaled by the compressor 21 becomes the target value. Note that the approach for controlling the valve opening degree of the second outdoor expansion valve 45 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed to the low pressure in the refrigeration cycle by the second outdoor expansion valve 45 passes through the liquid-side shut-off valve 29 and the liquid-side refrigerant communication piping 6 to flow into the indoor unit 30, and is evaporated in the indoor heat exchanger 31. The refrigerant that has flowed through the indoor heat exchanger 31 flows through the gas-side refrigerant communication piping 5, then passes through the gas-side shut-off valve 28 and the four-way switching valve 22, and flows in the refrigerant piping that passes through the inside of the intermediate pressure receiver 43. The refrigerant flowing in the refrigerant piping that passes through the inside of the intermediate pressure receiver 43 is heated, in the inlet refrigerant heating section 50 in the intermediate pressure receiver 43, by heat exchange with the refrigerant stored in the intermediate pressure receiver 43, and is again inhaled into the compressor 21.

(3-9-3) Heating Operation Mode

In the heating operation mode of the air conditioning device 1*h*, capacity control is performed on the operation frequency of the compressor 21 such that, for example, the condensation temperature of the refrigerant in the refrigerant circuit 10 becomes the target condensation temperature determined depending on the difference between a preset temperature and the indoor temperature (detected temperature by the indoor air temperature sensor 72).

The gas refrigerant that has been discharged from the compressor 21 flows through the four-way switching valve 22 and the gas-side refrigerant communication piping 5, then flows into the gas-side end of the indoor heat exchanger 31 of the indoor unit 30, and is condensed in the indoor heat exchanger 31. The refrigerant that has flowed out of the liquid-side end of the indoor heat exchanger 31 passes through the liquid-side refrigerant communication piping 6, flows into the outdoor unit 20, passes through the liquid-side shut-off valve 29, and is decompressed in the second outdoor expansion valve 45 until it reaches the intermediate pressure in the refrigeration cycle.

Here, the valve opening degree of the second outdoor expansion valve 45 is controlled so as to satisfy predetermined conditions, for example, the degree of subcooling of the refrigerant flowing through the liquid-side outlet of the indoor heat exchanger 31 becomes the target value.

The refrigerant that has been decompressed in the second outdoor expansion valve 45 flows into the intermediate pressure receiver 43. In the intermediate pressure receiver 43, excess refrigerant in the refrigerant circuit 10 is stored as a liquid refrigerant. Here, the refrigerant that has flowed into the intermediate pressure receiver 43 is cooled by heat exchange with the refrigerant flowing through the inlet side of the compressor 21 in the inlet refrigerant heating section 50. The refrigerant that has been cooled in the inlet refrigerant heating section 50 in the intermediate pressure receiver 43 is decompressed in the first outdoor expansion valve 44 until it reaches the low pressure in the refrigeration cycle.

Here, the valve opening degree of the first outdoor expansion valve 44 is controlled so as to satisfy predetermined conditions, for example, the degree of superheating of the refrigerant inhaled by the compressor 21 becomes the target value. Note that the approach for controlling the valve opening degree of the first outdoor expansion valve 44 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the first outdoor expansion valve 44 is evaporated in the outdoor heat exchanger 23, passes through the four-way switching valve 22, and flows in the refrigerant piping that passes through the inside of the intermediate pressure receiver 43. The refrigerant flowing in the refrigerant piping that passes through the inside of the intermediate pressure receiver 43 is heated, in the inlet refrigerant heating section 50 in the intermediate pressure receiver 43, by heat exchange with the refrigerant stored in the intermediate pressure receiver 43, and is again inhaled into the compressor 21.

(3-9-4) Characteristics of Ninth Embodiment

The air conditioning device 1*h* can carry out a refrigeration cycle using a refrigerant containing 1,2-difluoroethylene, and thus makes it possible to carry out a refrigeration cycle using a refrigerant having a small GWP.

Also, in the air conditioning device 1*h*, by providing the intermediate pressure receiver 43, it becomes possible to store excess refrigerant in the refrigerant circuit 10. In addition, during cooling operation, it becomes possible to make it easier to sufficiently demonstrate the capacity of the outdoor heat exchanger 23 by controlling the degree of subcooling with the first outdoor expansion valve 44, and during heating operation, it becomes possible to make it easier to sufficiently demonstrate the capacity of the indoor heat exchanger 31 by controlling the degree of subcooling with the second outdoor expansion valve 45.

Furthermore, by providing the inlet refrigerant heating section 50, the refrigerant to be inhaled into the compressor 21 is heated and liquid compression in the compressor 21 is suppressed, making it possible to control the degree of superheating of the refrigerant flowing through the outlet of the indoor heat exchanger 31, which functions as an evaporator of the refrigerant in cooling operation, to a small value. Similarly, in heating operation as well, it is possible to control the degree of superheating of the refrigerant flowing through the outlet of the outdoor heat exchanger 23, which functions as an evaporator of the refrigerant, to a small value. As a result of this, the capacity of the heat exchanger that functions as the evaporator can be sufficiently demonstrated in both cooling operation and heating operation, even when temperature glide occurs in the evaporator due to the use of a zeotropic mixed refrigerant as the refrigerant.

(3-10) Tenth Embodiment

Figure 3T:
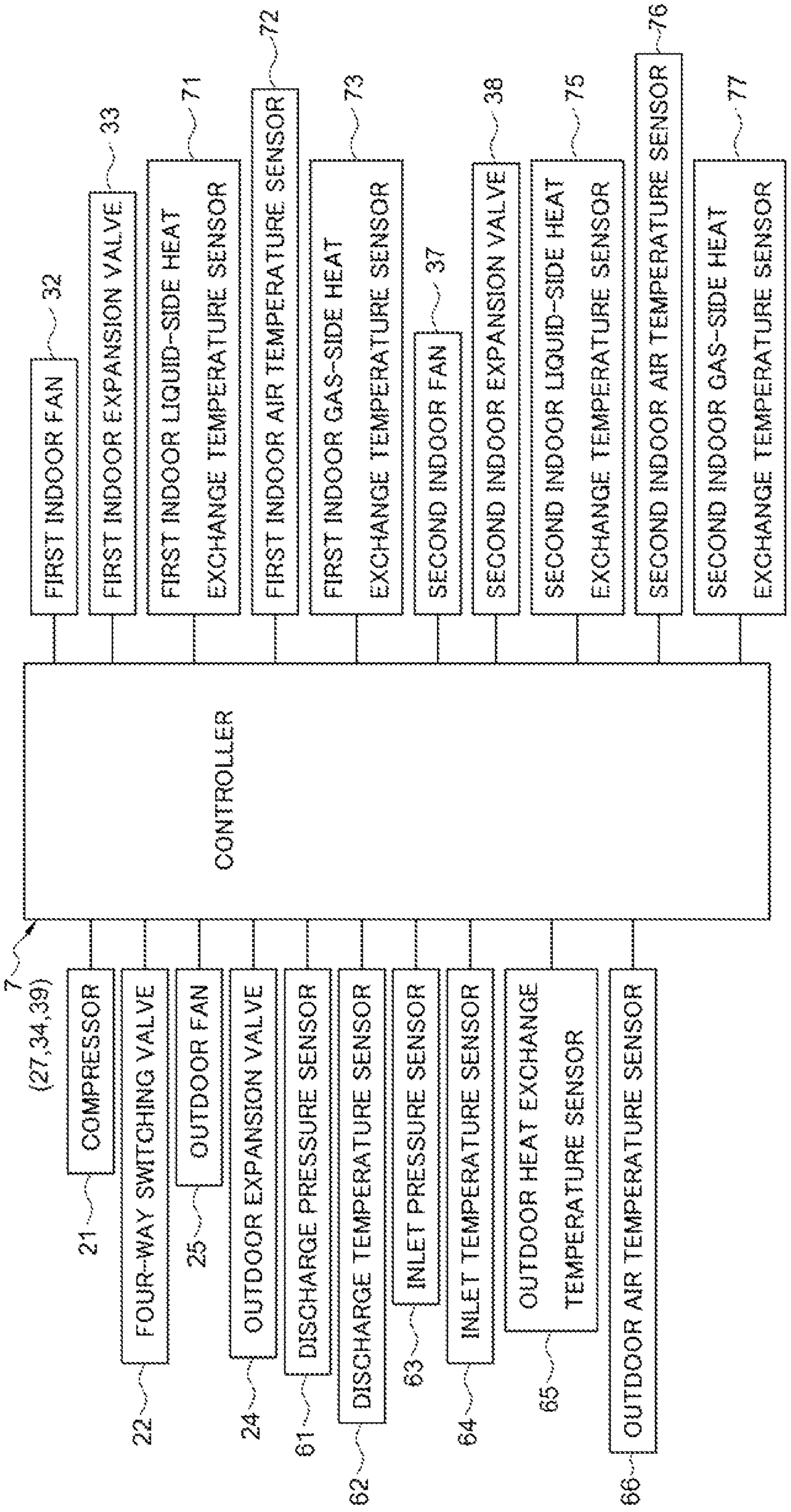
FIG. 3T is a schematic control block configuration diagram of a refrigeration cycle device according to the tenth embodiment of the technology of the third group.

Hereinafter, while referring to FIG. 3S, which is a schematic configuration diagram of a refrigerant circuit, and FIG. 3T, which is a schematic control block configuration diagram, an air conditioning device 1*i* as a refrigeration cycle device according to the tenth embodiment will be described. Note that, in the following, the differences from the air conditioning device 1*h* of the ninth embodiment will be mainly described.

(3-10-1) Schematic Configuration of Air Conditioning Device 1*i*

The air conditioning device 1*i* differs from the air conditioning device 1*h* of the ninth embodiment described above in that the first outdoor expansion valve 44 and the second outdoor expansion valve 45 are not provided, and the outdoor expansion valve 24 is provided, that multiple indoor units (the first indoor unit 30 and the second indoor unit 35) are provided in parallel, and that an indoor expansion valve is provided on the liquid refrigerant side of the indoor heat exchanger in each indoor unit.

The outdoor expansion valve 24 is provided in the middle of refrigerant piping extending from the liquid-side outlet of the outdoor heat exchanger 23 to the intermediate pressure receiver 43. The outdoor expansion valve 24 is preferably an electric expansion valve whose valve opening degree can be regulated.

The first indoor unit 30 has a first indoor heat exchanger 31 and a first indoor fan 32 as in the above embodiments, and a first indoor expansion valve 33 is provided on the liquid refrigerant side of the first indoor heat exchanger 31. The first indoor expansion valve 33 is preferably an electric expansion valve whose valve opening degree can be regulated. As in the above embodiments, the first indoor unit 30 is provided with a first indoor unit control section 34, and a first indoor liquid-side heat exchange temperature sensor 71, a first indoor air temperature sensor 72, a first indoor gas-side heat exchange temperature sensor 73, and the like, electrically connected to the first indoor unit control section 34. The second indoor unit 35 has a second indoor heat exchanger 36 and a second indoor fan 37 as in the first indoor unit 30, and a second indoor expansion valve 38 is provided on the liquid refrigerant side of the second indoor heat exchanger 36. The second indoor expansion valve 38 is preferably an electric expansion valve whose valve opening degree can be regulated. As in the first indoor unit 30, the second indoor unit 35 is provided with a second indoor unit control section 39, and a second indoor liquid-side heat exchange temperature sensor 75, a second indoor air temperature sensor 76, and a second indoor gas-side heat exchange temperature sensor 77, electrically connected to the second indoor unit control section 39.

(3-10-2) Cooling Operation Mode

In the cooling operation mode of the air conditioning device 1*i*, capacity control is performed on the operation frequency of the compressor 21 such that, for example, the evaporating temperature of the refrigerant in the refrigerant circuit 10 becomes the target evaporating temperature. Here, it is preferable that the target evaporating temperature is determined depending on the largest difference between a preset temperature and the indoor temperature in each indoor unit 30 or 35 (indoor unit with the largest load).

The gas refrigerant that has been discharged from the compressor 21 passes through the four-way switching valve 22 and is then condensed in the outdoor heat exchanger 23. The refrigerant that has flowed through the outdoor heat exchanger 23 passes through the outdoor expansion valve 24 controlled to be in a fully open state.

The refrigerant that has passed through the outdoor expansion valve 24 flows into the intermediate pressure receiver 43. In the intermediate pressure receiver 43, excess refrigerant in the refrigerant circuit 10 is stored as a liquid refrigerant. Here, the refrigerant that has flowed into the intermediate pressure receiver 43 is cooled by heat exchange with the refrigerant flowing through the inlet side of the compressor 21 in the inlet refrigerant heating section 50. The refrigerant that has been cooled in the inlet refrigerant heating section 50 in the intermediate pressure receiver 43 passes through the liquid-side shut-off valve 29 and the liquid-side refrigerant communication piping 6, and flows into each of the first indoor unit 30 and the second indoor unit 35.

The refrigerant that has flowed into the first indoor unit 31 is decompressed in the first indoor expansion valve 33 until it reaches the low pressure in the refrigeration cycle. Also, the refrigerant that has flowed into the second indoor unit 35 is decompressed in the second indoor expansion valve 38 until it reaches the low pressure in the refrigeration cycle.

Here, the valve opening degree of the first indoor expansion valve 33 is controlled so as to satisfy predetermined conditions, for example, the degree of superheating of the refrigerant flowing through the gas side of the first indoor heat exchanger 31 or the degree of superheating of the refrigerant inhaled by the compressor 21 becomes the target value. Similarly, the valve opening degree of the second indoor expansion valve 38 is also controlled so as to satisfy predetermined conditions, for example, the degree of superheating of the refrigerant flowing through the gas side of the second indoor heat exchanger 36 or the degree of superheating of the refrigerant inhaled by the compressor 21 becomes the target value.

The refrigerant that has been decompressed in the first indoor expansion valve 33 is evaporated in the first indoor heat exchanger 31, and the refrigerant that has been decompressed in the second indoor expansion valve 38 is evaporated in the second indoor heat exchanger 36, and after being combined, they flow through the gas-side refrigerant communication piping 5, pass through the gas-side shut-off valve 28 and the four-way switching valve 22, and flow in the refrigerant piping that passes through the inside of the intermediate pressure receiver 43. The refrigerant flowing in the refrigerant piping that passes through the inside of the intermediate pressure receiver 43 is heated, in the inlet refrigerant heating section 50 in the intermediate pressure receiver 43, by heat exchange with the refrigerant stored in the intermediate pressure receiver 43, and is again inhaled into the compressor 21.

(3-10-3) Heating Operation Mode

In the heating operation mode of the air conditioning device 1*i*, capacity control is performed on the operation frequency of the compressor 21 such that, for example, the condensation temperature of the refrigerant in the refrigerant circuit 10 becomes the target condensation temperature. Here, it is preferable that the target condensation temperature is determined depending on the largest difference between a preset temperature and the indoor temperature in each indoor unit 30 or 35 (indoor unit with the largest load).

The gas refrigerant that has been discharged from the compressor 21 flows through the four-way switching valve 22 and the gas-side refrigerant communication piping 5, and then flows into each of the first indoor unit 30 and the second indoor unit 35.

The refrigerant that has flowed into the first indoor unit 30 is condensed in the first indoor heat exchanger 31, and the refrigerant that has flowed into the second indoor unit 35 is condensed in the second indoor heat exchanger 36.

The refrigerant that has flowed out of the liquid-side end of the first indoor heat exchanger 31 is decompressed in the first indoor expansion valve 33 until it reaches the intermediate pressure in the refrigeration cycle. Similarly, the refrigerant that has flowed out of the liquid-side end of the second indoor heat exchanger 36 is also decompressed in the second indoor expansion valve 38 until it reaches the intermediate pressure in the refrigeration cycle.

Here, the valve opening degree of the first indoor expansion valve 33 is controlled so as to satisfy predetermined conditions, for example, the degree of subcooling of the refrigerant flowing through the liquid-side outlet of the first indoor heat exchanger 31 becomes the target value. Similarly, in the second indoor expansion valve 38 as well, the valve opening degree is controlled so as to satisfy predetermined conditions, for example, the degree of subcooling of the refrigerant flowing through the liquid-side outlet of the second indoor heat exchanger 36 becomes the target value.

The refrigerant that has passed through the first indoor expansion valve 33 and the refrigerant that has passed through the second indoor expansion valve 38 are combined, and then pass through the liquid-side refrigerant communication piping 6 to flow into the outdoor unit 20.

The refrigerant that has flowed into the outdoor unit 20 passes through the liquid-side shut-off valve 29 and flows into the intermediate pressure receiver 43. In the intermediate pressure receiver 43, excess refrigerant in the refrigerant circuit 10 is stored as a liquid refrigerant. Here, the refrigerant that has flowed into the intermediate pressure receiver 43 is cooled by heat exchange with the refrigerant flowing through the inlet side of the compressor 21 in the inlet refrigerant heating section 50. The refrigerant that has been cooled in the inlet refrigerant heating section 50 in the intermediate pressure receiver 43 is decompressed in the outdoor expansion valve 24 until it reaches the low pressure in the refrigeration cycle.

Here, the valve opening degree of the outdoor expansion valve 24 is controlled so as to satisfy predetermined conditions, for example, the degree of superheating of the refrigerant inhaled by the compressor 21 becomes the target value. Note that the approach for controlling the valve opening degree of the outdoor expansion valve 24 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the outdoor expansion valve 24 is evaporated in the outdoor heat exchanger 23, passes through the four-way switching valve 22, and flows in the refrigerant piping that passes through the inside of the intermediate pressure receiver 43. The refrigerant flowing in the refrigerant piping that passes through the inside of the intermediate pressure receiver 43 is heated, in the inlet refrigerant heating section 50 in the intermediate pressure receiver 43, by heat exchange with the refrigerant stored in the intermediate pressure receiver 43, and is again inhaled into the compressor 21.

(3-10-4) Characteristics of Tenth Embodiment

The air conditioning device 1*i* can carry out a refrigeration cycle using a refrigerant containing 1,2-difluoroethylene, and thus makes it possible to carry out a refrigeration cycle using a refrigerant having a small GWP.

Also, in the air conditioning device 1*i*, by providing the intermediate pressure receiver 43, it becomes possible to store excess refrigerant in the refrigerant circuit 10. In addition, during heating operation, it becomes possible to make it easier to sufficiently demonstrate the capacity of the indoor heat exchanger 31 by controlling the degree of subcooling with the second outdoor expansion valve 45.

Furthermore, by providing the inlet refrigerant heating section 50, the refrigerant to be inhaled into the compressor 21 is heated and liquid compression in the compressor 21 is suppressed, making it possible to control the degree of superheating of the refrigerant flowing through the outlet of the indoor heat exchanger 31, which functions as an evaporator of the refrigerant in cooling operation, to a small value. Similarly, in heating operation as well, it is possible to control the degree of superheating of the refrigerant flowing through the outlet of the outdoor heat exchanger 23, which functions as an evaporator of the refrigerant, to a small value. As a result of this, the capacity of the heat exchanger that functions as the evaporator can be sufficiently demonstrated in both cooling operation and heating operation, even when temperature glide occurs in the evaporator due to the use of a zeotropic mixed refrigerant as the refrigerant.

(3-11) Eleventh Embodiment

Figure 3U:
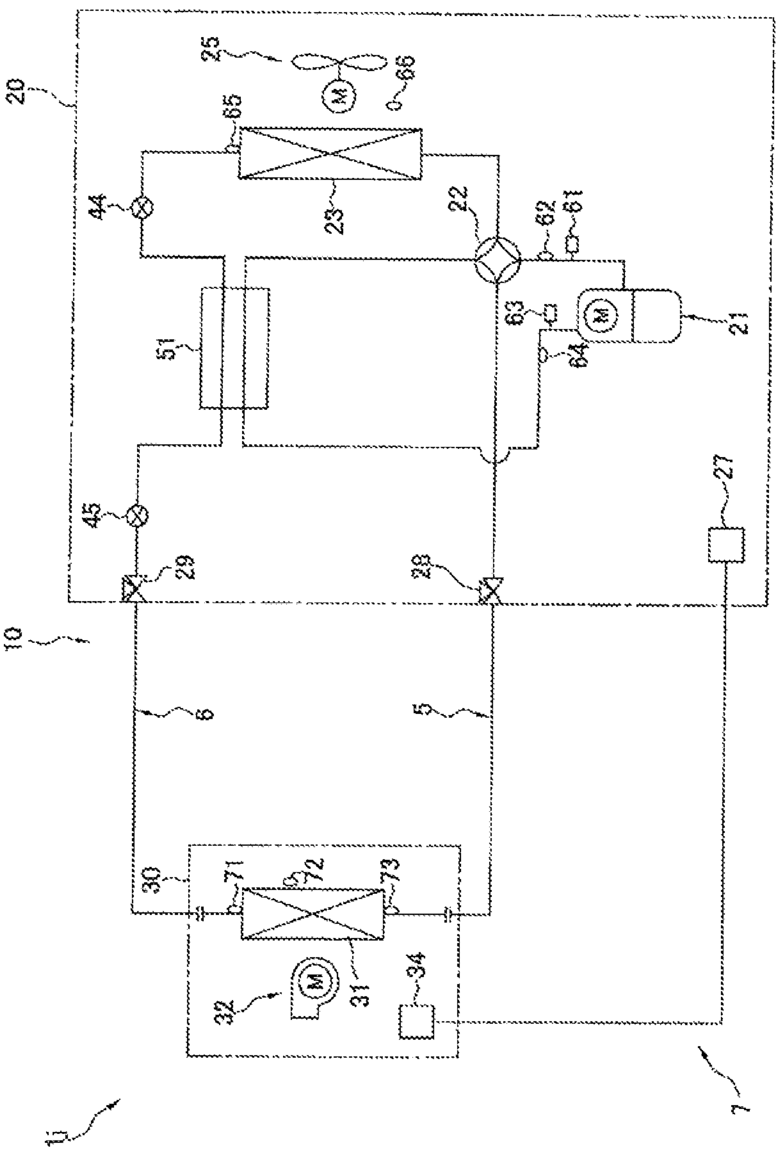
FIG. 3U is a schematic configuration diagram of a refrigerant circuit according to an eleventh embodiment of the technology of the third group.
Figure 3V:
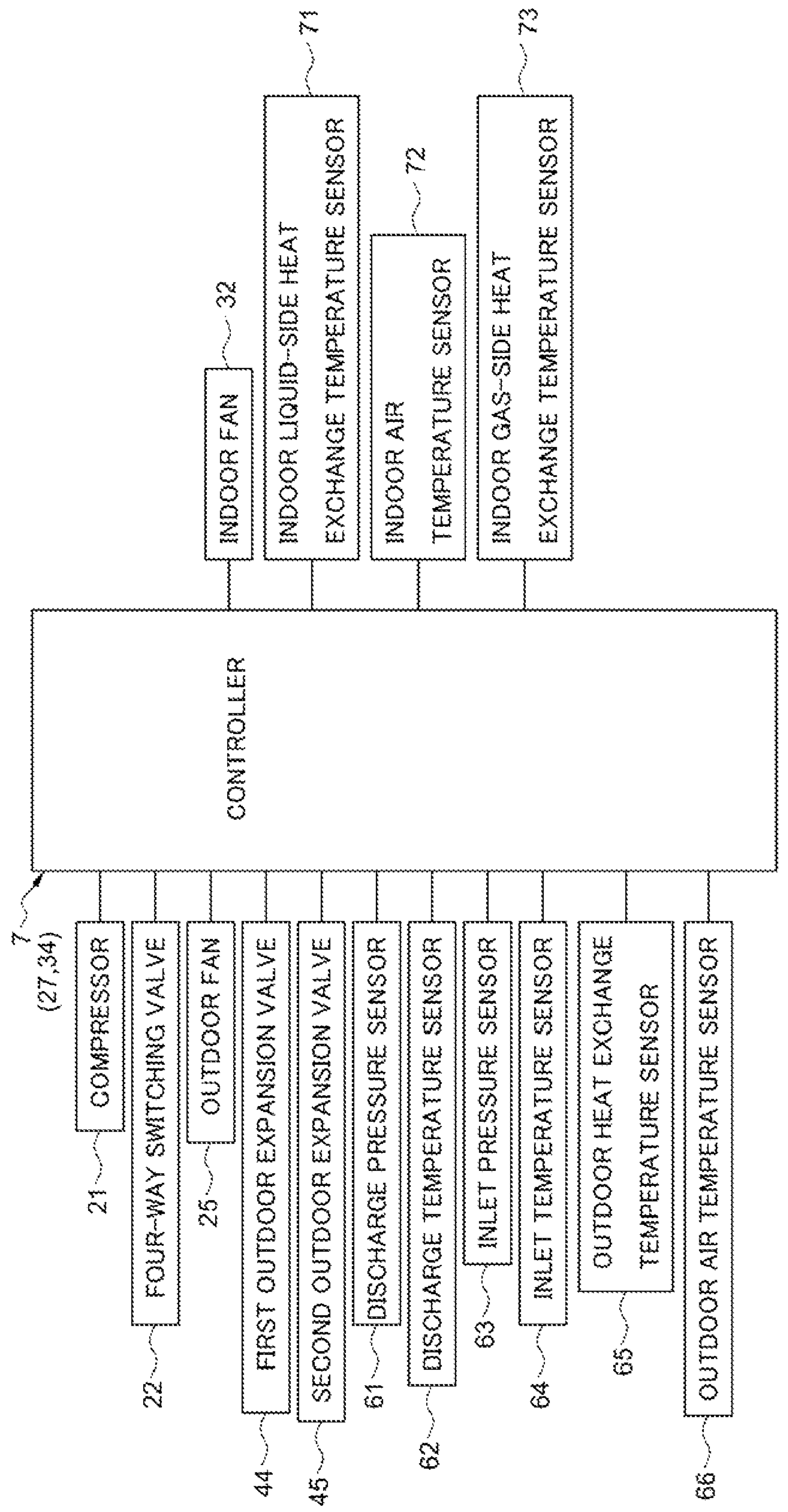
FIG. 3V is a schematic control block configuration diagram of a refrigeration cycle device according to the eleventh embodiment of the technology of the third group.

Hereinafter, while referring to FIG. 3U, which is a schematic configuration diagram of a refrigerant circuit, and FIG. 3V, which is a schematic control block configuration diagram, an air conditioning device 1*j* as a refrigeration cycle device according to the eleventh embodiment will be described. Note that, in the following, the differences from the air conditioning device 1*h* of the ninth embodiment will be mainly described.

(3-11-1) Schematic Configuration of Air Conditioning Device 1*j*

The air conditioning device 1*j* differs from the air conditioning device 1*h* of the ninth embodiment described above in that the inlet refrigerant heating section 50 is not provided and that an internal heat exchanger 51 is provided.

The internal heat exchanger 51 is a heat exchanger that causes heat exchange between the refrigerant flowing between the first outdoor expansion valve 44 and the second outdoor expansion valve 45 and the refrigerant flowing through the refrigerant piping extending from one of the connection ports of the four-way switching valve 22 toward the inlet side of the compressor 21.

(3-11-2) Cooling Operation Mode

In the cooling operation mode of the air conditioning device 1*j*, capacity control is performed on the operation frequency of the compressor 21 such that, for example, the evaporating temperature of the refrigerant in the refrigerant circuit 10 becomes the target evaporating temperature determined depending on the difference between a preset temperature and the indoor temperature (detected temperature by the indoor air temperature sensor 72).

The gas refrigerant that has been discharged from the compressor 21 passes through the four-way switching valve 22 and is then condensed in the outdoor heat exchanger 23. The refrigerant that has flowed through the outdoor heat exchanger 23 passes through the first outdoor expansion valve 44 controlled to be in a fully open state. The refrigerant that has passed through the first outdoor expansion valve 44 is cooled in the internal heat exchanger 51, and is decompressed in the second outdoor expansion valve 45 until it reaches the low pressure in the refrigeration cycle.

Here, the valve opening degree of the second outdoor expansion valve 45 is controlled so as to satisfy predetermined conditions, for example, the degree of superheating of the refrigerant flowing through the gas side of the indoor heat exchanger 31 or the degree of superheating of the refrigerant inhaled by the compressor 21 becomes the target value. Note that the approach for controlling the valve opening degree of the second outdoor expansion valve 45 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed to the low pressure in the refrigeration cycle by the second outdoor expansion valve 45 passes through the liquid-side shut-off valve 29 and the liquid-side refrigerant communication piping 6 to flow into the indoor unit 30, and is evaporated in the indoor heat exchanger 31. The refrigerant that has flowed through the indoor heat exchanger 31 flows through the gas-side refrigerant communication piping 5, then passes through the gas-side shut-off valve 28 and the four-way switching valve 22, is heated in the internal heat exchanger 51, and is again inhaled into the compressor 21.

(3-11-3) Heating Operation Mode

In the heating operation mode of the air conditioning device 1*j*, capacity control is performed on the operation frequency of the compressor 21 such that, for example, the condensation temperature of the refrigerant in the refrigerant circuit 10 becomes the target condensation temperature determined depending on the difference between a preset temperature and the indoor temperature (detected temperature by the indoor air temperature sensor 72).

The gas refrigerant that has been discharged from the compressor 21 flows through the four-way switching valve 22 and the gas-side refrigerant communication piping 5, then flows into the gas-side end of the indoor heat exchanger 31 of the indoor unit 30, and is condensed in the indoor heat exchanger 31. The refrigerant that has flowed out of the liquid-side end of the indoor heat exchanger 31 passes through the liquid-side refrigerant communication piping 6, flows into the outdoor unit 20, passes through the liquid-side shut-off valve 29, and passes through the second outdoor expansion valve 45 controlled to be in a fully open state. The refrigerant that has passed through the second outdoor expansion valve 45 is cooled in the internal heat exchanger 51, and is decompressed in the first outdoor expansion valve 44 until it reaches the intermediate pressure in the refrigeration cycle.

Here, the valve opening degree of the first outdoor expansion valve 44 is controlled so as to satisfy predetermined conditions, for example, the degree of superheating of the refrigerant inhaled by the compressor 21 becomes the target value. Note that the approach for controlling the valve opening degree of the first outdoor expansion valve 44 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the first outdoor expansion valve 44 is evaporated in the outdoor heat exchanger 23, passes through the four-way switching valve 22, is heated in the internal heat exchanger 51, and is again inhaled into the compressor 21.

(3-11-4) Characteristics of Eleventh Embodiment

The air conditioning device 1*j* can carry out a refrigeration cycle using a refrigerant containing 1,2-difluoroethylene, and thus makes it possible to carry out a refrigeration cycle using a refrigerant having a small GWP.

Also, in the air conditioning device 1*j*, by providing the internal heat exchanger 51, the refrigerant to be inhaled into the compressor 21 is heated and liquid compression in the compressor 21 is suppressed, making it possible to control the degree of superheating of the refrigerant flowing through the outlet of the indoor heat exchanger 31, which functions as an evaporator of the refrigerant in cooling operation, to a small value. Similarly, in heating operation as well, it is possible to control the degree of superheating of the refrigerant flowing through the outlet of the outdoor heat exchanger 23, which functions as an evaporator of the refrigerant, to a small value. As a result of this, the capacity of the heat exchanger that functions as the evaporator can be sufficiently demonstrated in both cooling operation and heating operation, even when temperature glide occurs in the evaporator due to the use of a zeotropic mixed refrigerant as the refrigerant.

(3-12) Twelfth Embodiment

Figure 3W:
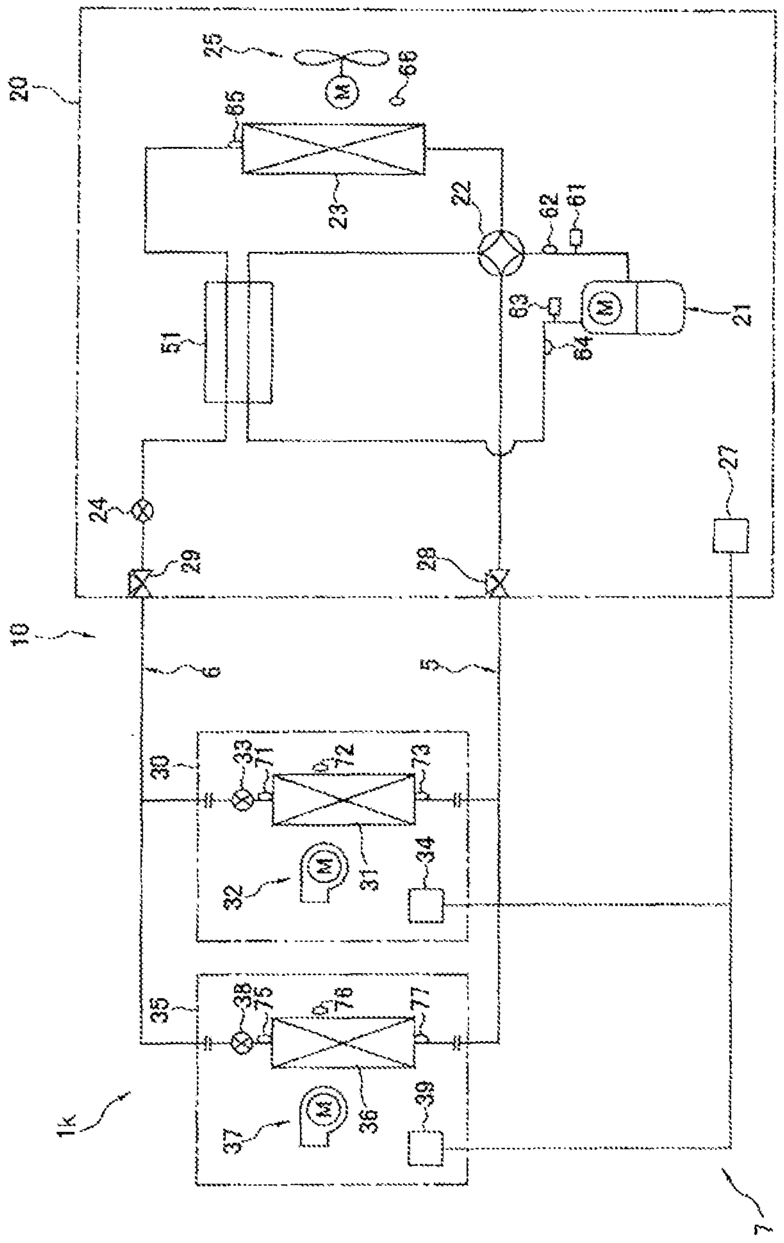
FIG. 3W is a schematic configuration diagram of a refrigerant circuit according to a twelfth embodiment of the technology of the third group.
Figure 3X:
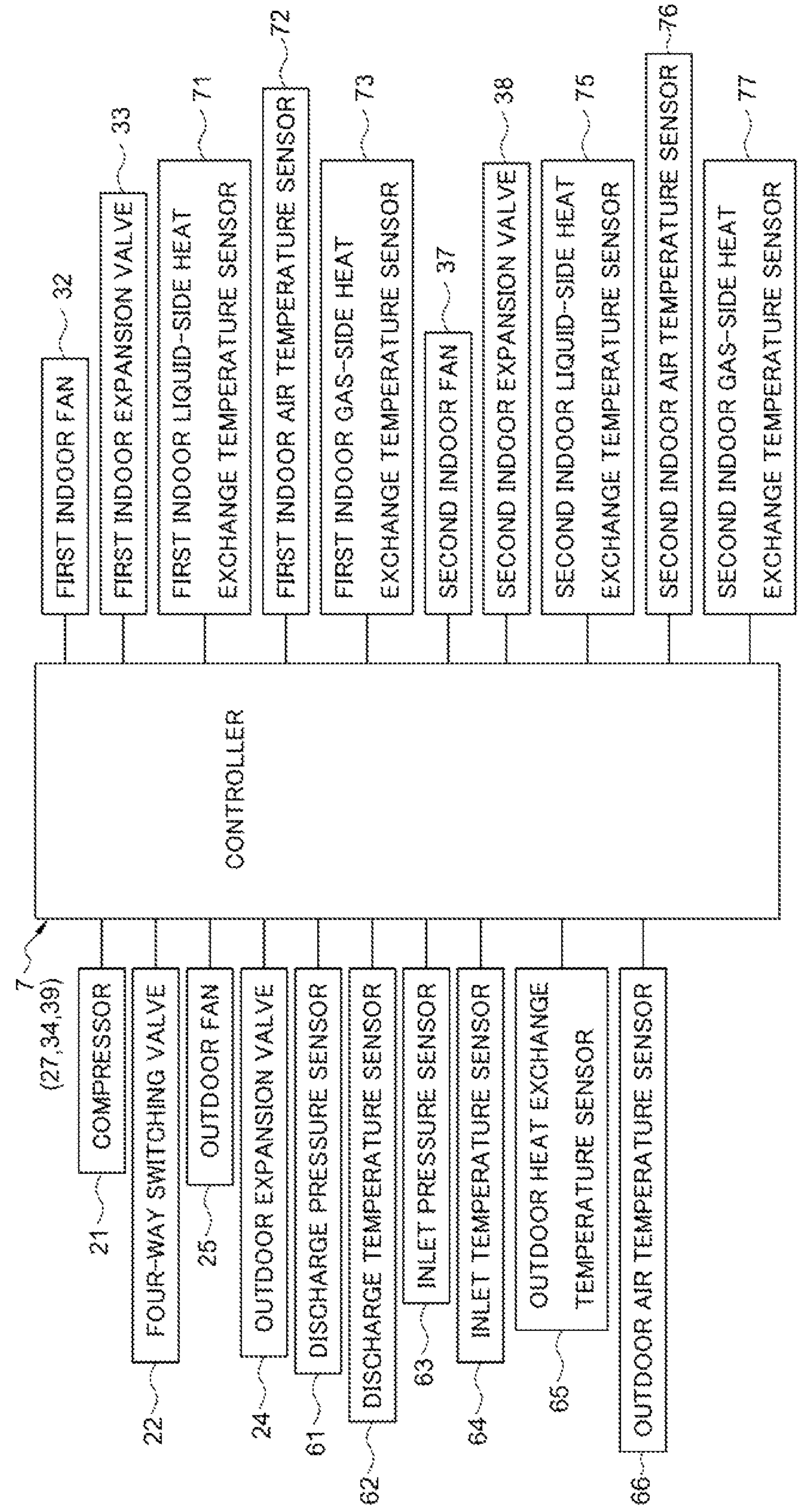
FIG. 3X is a schematic control block configuration diagram of a refrigeration cycle device according to the twelfth embodiment of the technology of the third group.

Hereinafter, while referring to FIG. 3W, which is a schematic configuration diagram of a refrigerant circuit, and FIG. 3X, which is a schematic control block configuration diagram, an air conditioning device 1*k* as a refrigeration cycle device according to the twelfth embodiment will be described. Note that, in the following, the differences from the air conditioning device 1*j* of the tenth embodiment will be mainly described.

(3-12-1) Schematic Configuration of Air Conditioning Device 1*k*

The air conditioning device 1*k* differs from the air conditioning device 1*j* of the tenth embodiment described above in that the first outdoor expansion valve 44 and the second outdoor expansion valve 45 are not provided, and the outdoor expansion valve 24 is provided, that multiple indoor units (the first indoor unit 30 and the second indoor unit 35) are provided in parallel, and that an indoor expansion valve is provided on the liquid refrigerant side of the indoor heat exchanger in each indoor unit.

The outdoor expansion valve 24 is provided in the middle of refrigerant piping extending from the internal heat exchanger 51 to the liquid-side shut-off valve 29. The outdoor expansion valve 24 is preferably an electric expansion valve whose valve opening degree can be regulated.

The first indoor unit 30 has a first indoor heat exchanger 31 and a first indoor fan 32 as in the above embodiments, and a first indoor expansion valve 33 is provided on the liquid refrigerant side of the first indoor heat exchanger 31. The first indoor expansion valve 33 is preferably an electric expansion valve whose valve opening degree can be regulated. As in the above embodiments, the first indoor unit 30 is provided with a first indoor unit control section 34, and a first indoor liquid-side heat exchange temperature sensor 71, a first indoor air temperature sensor 72, a first indoor gas-side heat exchange temperature sensor 73, and the like, electrically connected to the first indoor unit control section 34. The second indoor unit 35 has a second indoor heat exchanger 36 and a second indoor fan 37 as in the first indoor unit 30, and a second indoor expansion valve 38 is provided on the liquid refrigerant side of the second indoor heat exchanger 36. The second indoor expansion valve 38 is preferably an electric expansion valve whose valve opening degree can be regulated. As in the first indoor unit 30, the second indoor unit 35 is provided with a second indoor unit control section 39, and a second indoor liquid-side heat exchange temperature sensor 75, a second indoor air temperature sensor 76, and a second indoor gas-side heat exchange temperature sensor 77, electrically connected to the second indoor unit control section 39.

(3-12-2) Cooling Operation Mode

In the cooling operation mode of the air conditioning device 1*k*, capacity control is performed on the operation frequency of the compressor 21 such that, for example, the evaporating temperature of the refrigerant in the refrigerant circuit 10 becomes the target evaporating temperature. Here, it is preferable that the target evaporating temperature is determined depending on the largest difference between a preset temperature and the indoor temperature in each indoor unit 30 or 35 (indoor unit with the largest load).

The gas refrigerant that has been discharged from the compressor 21 passes through the four-way switching valve 22 and is then condensed in the outdoor heat exchanger 23. The refrigerant that has flowed through the outdoor heat exchanger 23 is cooled in the internal heat exchanger 51, passes through the outdoor expansion valve 24 controlled to be in a fully open state, and passes through the liquid-side shut-off valve 29, the liquid-side shut-off valve 29, and the liquid-side refrigerant communication piping 6 to flow into each of the first indoor unit 30 and the second indoor unit 35.

The refrigerant that has flowed into the first indoor unit 31 is decompressed in the first indoor expansion valve 33 until it reaches the low pressure in the refrigeration cycle. Also, the refrigerant that has flowed into the second indoor unit 35 is decompressed in the second indoor expansion valve 38 until it reaches the low pressure in the refrigeration cycle.

Here, the valve opening degree of the first indoor expansion valve 33 is controlled so as to satisfy predetermined conditions, for example, the degree of superheating of the refrigerant flowing through the gas side of the first indoor heat exchanger 31 or the degree of superheating of the refrigerant inhaled by the compressor 21 becomes the target value. Similarly, the valve opening degree of the second indoor expansion valve 38 is also controlled so as to satisfy predetermined conditions, for example, the degree of superheating of the refrigerant flowing through the gas side of the second indoor heat exchanger 36 or the degree of superheating of the refrigerant inhaled by the compressor 21 becomes the target value.

The refrigerant that has been decompressed in the first indoor expansion valve 33 is evaporated in the first indoor heat exchanger 31, and the refrigerant that has been decompressed in the second indoor expansion valve 38 is evaporated in the second indoor heat exchanger 36, and after being combined, they flow through the gas-side refrigerant communication piping 5, pass through the gas-side shut-off valve 28 and the four-way switching valve 22, are heated in the internal heat exchanger 51, and are again inhaled into the compressor 21.

(3-12-3) Heating Operation Mode

In the heating operation mode of the air conditioning device 1*k*, capacity control is performed on the operation frequency of the compressor 21 such that, for example, the condensation temperature of the refrigerant in the refrigerant circuit 10 becomes the target condensation temperature. Here, it is preferable that the target condensation temperature is determined depending on the largest difference between a preset temperature and the indoor temperature in each indoor unit 30 or 35 (indoor unit with the largest load).

The gas refrigerant that has been discharged from the compressor 21 flows through the four-way switching valve 22 and the gas-side refrigerant communication piping 5, and then flows into each of the first indoor unit 30 and the second indoor unit 35.

The refrigerant that has flowed into the first indoor unit 30 is condensed in the first indoor heat exchanger 31, and the refrigerant that has flowed into the second indoor unit 35 is condensed in the second indoor heat exchanger 36.

The refrigerant that has flowed out of the liquid-side end of the first indoor heat exchanger 31 is decompressed in the first indoor expansion valve 33 until it reaches the intermediate pressure in the refrigeration cycle. Similarly, the refrigerant that has flowed out of the liquid-side end of the second indoor heat exchanger 36 is also decompressed in the second indoor expansion valve 38 until it reaches the intermediate pressure in the refrigeration cycle.

Here, the valve opening degree of the first indoor expansion valve 33 is controlled so as to satisfy predetermined conditions, for example, the degree of subcooling of the refrigerant flowing through the liquid-side outlet of the first indoor heat exchanger 31 becomes the target value. Similarly, in the second indoor expansion valve 38 as well, the valve opening degree is controlled so as to satisfy predetermined conditions, for example, the degree of subcooling of the refrigerant flowing through the liquid-side outlet of the second indoor heat exchanger 36 becomes the target value.

The refrigerant that has passed through the first indoor expansion valve 33 and the refrigerant that has passed through the second indoor expansion valve 38 are combined, and then pass through the liquid-side refrigerant communication piping 6 to flow into the outdoor unit 20.

The refrigerant that has flowed into the outdoor unit 20 passes through the liquid-side shut-off valve 29, and is decompressed in the outdoor expansion valve 24 until it reaches the low pressure in the refrigeration cycle.

Here, the valve opening degree of the outdoor expansion valve 24 is controlled so as to satisfy predetermined conditions, for example, the degree of superheating of the refrigerant inhaled by the compressor 21 becomes the target value. Note that the approach for controlling the valve opening degree of the outdoor expansion valve 24 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the outdoor expansion valve 24 is evaporated in the outdoor heat exchanger 23, passes through the four-way switching valve 22, is heated in the internal heat exchanger 51, and is again inhaled into the compressor 21.

(3-12-4) Characteristics of Twelfth Embodiment

The air conditioning device 1*k* can carry out a refrigeration cycle using a refrigerant containing 1,2-difluoroethylene, and thus makes it possible to carry out a refrigeration cycle using a refrigerant having a small GWP.

Also, in the air conditioning device 1*k*, during heating operation, it becomes possible to make it easier to sufficiently demonstrate the capacities of the first indoor heat exchanger 31 and the second indoor heat exchanger 36 by controlling the degree of subcooling with the first indoor expansion valve 33 and the second indoor expansion valve 38.

Furthermore, in the air conditioning device 1*k*, by providing the internal heat exchanger 51, the refrigerant to be inhaled into the compressor 21 is heated and liquid compression in the compressor 21 is suppressed, making it possible to control the degree of superheating of the refrigerant flowing through the outlets of the first indoor heat exchanger 31 and the second indoor heat exchanger 36, which function as evaporators of the refrigerant in cooling operation, to a small value. Similarly, in heating operation as well, it is possible to control the degree of superheating of the refrigerant flowing through the outlet of the outdoor heat exchanger 23, which functions as an evaporator of the refrigerant, to a small value. As a result of this, the capacity of the heat exchanger that functions as the evaporator can be sufficiently demonstrated in both cooling operation and heating operation, even when temperature glide occurs in the evaporator due to the use of a zeotropic mixed refrigerant as the refrigerant.

(4) EMBODIMENTS OF TECHNOLOGY OF FOURTH GROUP

(4-1) First Embodiment

Figure 4A:
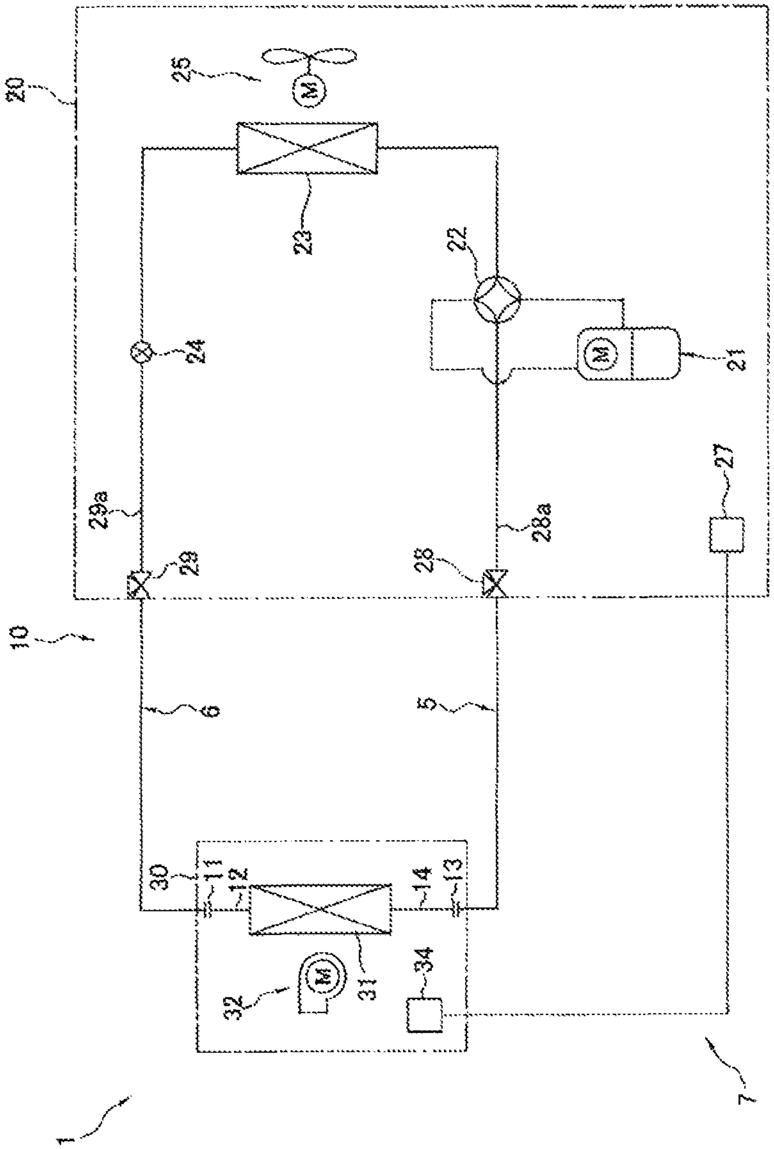
FIG. 4A is a schematic configuration diagram of a refrigerant circuit according to a first embodiment of the technology of a fourth group.
Figure 4B:
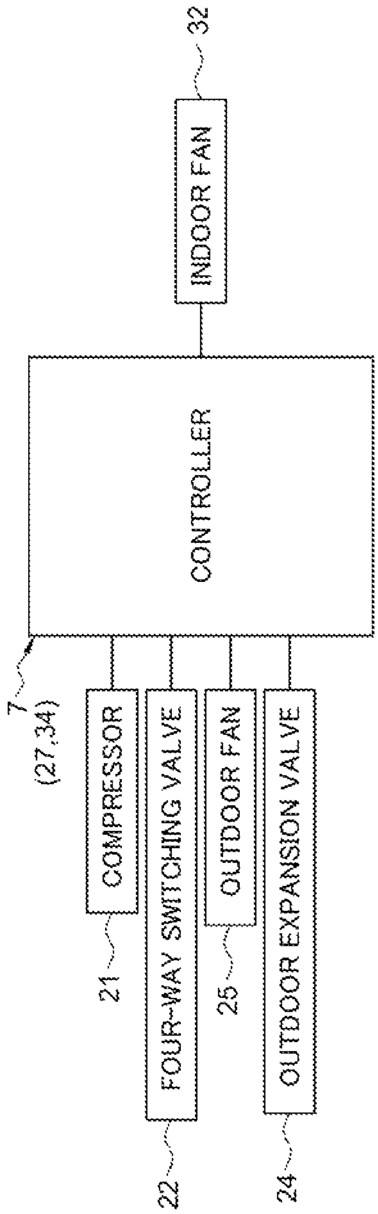
FIG. 4B is a schematic control block configuration diagram of a refrigeration cycle device according to the first embodiment of the technology of the fourth group.

Hereinafter, while referring to FIG. 4A, which is a schematic configuration diagram of a refrigerant circuit, and FIG. 4B, which is a schematic control block configuration diagram, an air conditioning device 1, which is a refrigeration cycle device comprising an indoor unit as a heat exchange unit and an outdoor unit as a heat exchange unit according to the first embodiment, will be described.

The air conditioning device 1 is a device that conditions the air in the target space by carrying out a vapor compression type refrigeration cycle.

The air conditioning device 1 mainly has an outdoor unit 20, an indoor unit 30, liquid-side refrigerant communication piping 6 and gas-side refrigerant communication piping 5 that connect the outdoor unit 20 and the indoor unit 30, a remote control not shown in the figure as an input device and an output device, and a controller 7 that controls the motion of the air conditioning device 1.

In the air conditioning device 1, a refrigeration cycle is carried out in which a refrigerant enclosed in a refrigerant circuit 10 is compressed, cooled or condensed, decompressed, heated or evaporated, and then compressed again. In the present embodiment, the refrigerant circuit 10 is filled with a refrigerant for carrying out a vapor compression type refrigeration cycle. That refrigerant is a refrigerant containing 1,2-difluoroethylene, and any Refrigerant A can be used. The refrigerant circuit 10 is also filled with a refrigerator oil together with that refrigerant.

(4-1-1) Outdoor Unit 20

Figure 4C:
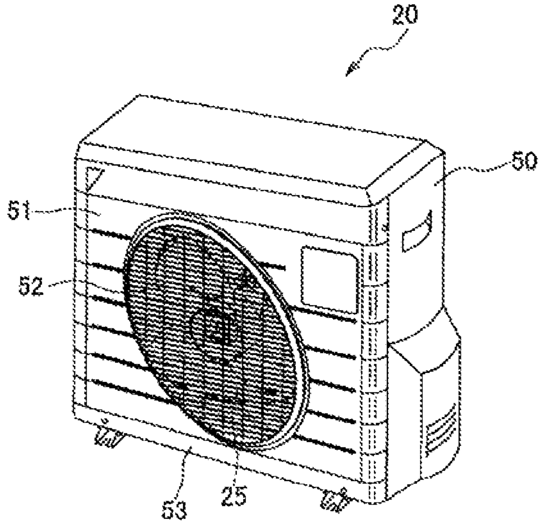
FIG. 4C is a schematic external perspective view of an outdoor unit according to the first embodiment of the technology of the fourth group.
Figure 4D:
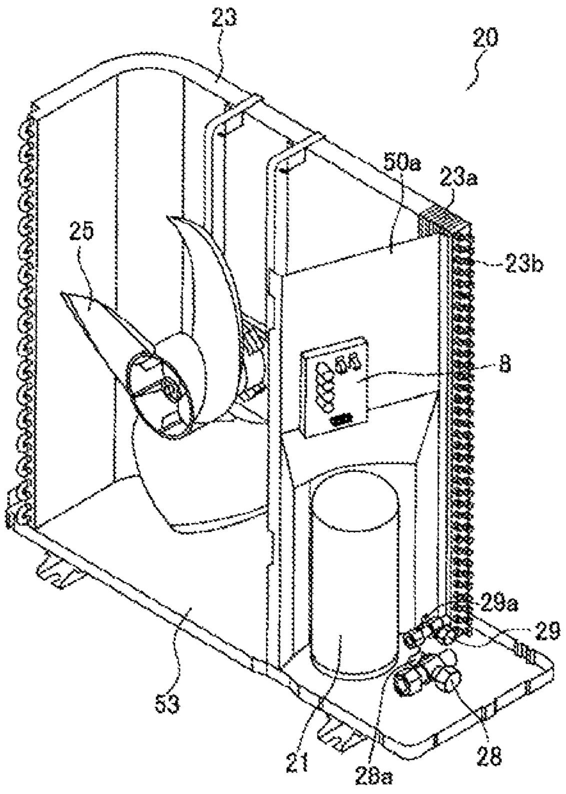
FIG. 4D is a perspective view showing the schematic structure of the interior of the outdoor unit according to the first embodiment of the technology of the fourth group.

As shown in FIG. 4C, the outdoor unit 20 is configured with an outdoor housing 50 that is in the shape of an approximately rectangular box in appearance. In this outdoor unit 20, as shown in FIG. 4D, a blower room and a machine room are formed by dividing the internal space into left and right parts with a partition plate 50*a*.

This outdoor unit 20 is connected to the indoor unit 30 via the liquid-side refrigerant communication piping 6 and the gas-side refrigerant communication piping 5, and constitutes a part of the refrigerant circuit 10. The outdoor unit 20 mainly has a compressor 21, a four-way switching valve 22, an outdoor heat exchanger 23, an outdoor expansion valve 24, an outdoor fan 25, a liquid-side shut-off valve 29, a gas-side shut-off valve 28, the outdoor housing 50, and an outdoor electrical equipment unit 8.

The compressor 21 is equipment that compresses a low-pressure refrigerant in the refrigeration cycle until it reaches a high pressure. Here, as the compressor 21, a compressor with a sealed structure in which a positive displacement compression element (omitted in the figure) such as a rotary type or scroll type is rotationally driven by a compressor motor is used. The compressor motor is for changing the volume, and the operation frequency can be controlled by an inverter. Note that the compressor 21 is provided with an accompanying accumulator, which is not shown in the figure, on the inlet side thereof.

The four-way switching valve 22 can switch the state of connection between a cooling operation connection state in which the inlet side of the compressor 21 and the gas-side shut-off valve 28 are connected while connecting the discharge side of the compressor 21 and the outdoor heat exchanger 23, and a heating operation connection state in which the inlet side of the compressor 21 and the outdoor heat exchanger 23 are connected while connecting the discharge side of the compressor 21 and the gas-side shut-off valve 28.

The outdoor heat exchanger 23 is a heat exchanger that functions as a condenser for a high-pressure refrigerant in the refrigeration cycle during cooling operation and as an evaporator for a low-pressure refrigerant in the refrigeration cycle during heating operation. The outdoor heat exchanger 23 is a cross fin-type, fin and tube-type heat exchanger having multiple heat transfer fins 23*a* arranged in a stack in the plate thickness direction and multiple heat transfer pipes 23*b* penetrating and fixed to the multiple heat transfer fins 23*a*.

The outdoor fan 25 generates an air flow for inhaling outdoor air into the outdoor unit 20, causing heat exchange between it and the refrigerant in the outdoor heat exchanger 23, and then discharging it outside. The outdoor fan 25 is rotationally driven by an outdoor fan motor. Note that, in the present embodiment, only one outdoor fan 25 is provided.

As for the outdoor expansion valve 24, its valve opening degree can be controlled, and it is provided between the liquid-side end of the outdoor heat exchanger 23 and the liquid-side shut-off valve 29.

The liquid-side shut-off valve 29 is a manual valve arranged at the part where the outdoor unit 20 is connected to the liquid-side refrigerant communication piping 6, and it is flared and connected to the liquid-side refrigerant communication piping 6. The liquid-side shut-off valve 29 and the liquid-side outlet of the outdoor heat exchanger 23 are connected by outdoor liquid-side refrigerant piping 29*a*. The outdoor expansion valve 24 is provided in the middle of that outdoor liquid-side refrigerant piping 29*a*.

The gas-side shut-off valve 28 is a manual valve arranged at the part where the outdoor unit 20 is connected to the gas-side refrigerant communication piping 5, and it is flared and connected to the gas-side refrigerant communication piping 5. The gas-side shut-off valve 28 and one of the connection ports of the four-way switching valve 22 are connected by outdoor gas-side refrigerant piping 28*a*.

As shown in FIG. 4C, the outdoor housing 50 is a box-shaped body provided with an outlet 52, which has the outdoor housing 50 accommodating the components of the outdoor unit 20 described above inside. The outdoor housing 50 is in the shape of an approximately rectangular parallelepiped and can intake the outdoor air from the rear side and one side surface side (left side in FIG. 4C), and can blow out the air that has passed through the outdoor heat exchanger 23 to the front side via the outlet 52 formed on a front surface 51. The lower end part of the outdoor housing 50 is covered with a bottom plate 53. On the bottom plate 53, the outdoor heat exchanger 23 stands along the rear side and one side surface side as shown in FIG. 4D. The upper surface of the bottom plate 53 can serve as a drain pan.

The outdoor electrical equipment unit 8 comprises an outdoor unit control section 27 that controls the motion of each section that constitutes the outdoor unit 20. The outdoor electrical equipment unit 8 is arranged above the compressor 21 in the space on the machine room side separated by the partition plate 50*a* among the inside of the outdoor housing 50 of the outdoor unit 20, and is fixed to the partition plate 50*a*. The lower end part of the outdoor electrical equipment unit 8 is arranged above the liquid-side shut-off valve 29 and the gas-side shut-off valve 28 in the vertical direction. The outdoor electrical equipment unit 8 is preferably arranged above and apart from the liquid-side shut-off valve 29 and the gas-side shut-off valve 28 by a further distance of 10 cm or more. The outdoor unit control section 27 that the outdoor electrical equipment unit 8 comprises has a microcomputer that includes a CPU, a memory, and other elements. The outdoor unit control section 27 is connected to an indoor unit control section 34 of each indoor unit 30 via a communication line, and sends and receives control signals and the like. Also, the outdoor unit control section 27 is electrically connected to various sensors, which are not shown in the figure, and receives signals from each sensor.

(4-1-2) Indoor Unit 30

The indoor unit 30 is installed on the wall or the like of a room, which is the target space. The indoor unit 30 is connected to the outdoor unit 20 via the liquid-side refrigerant communication piping 6 and the gas-side refrigerant communication piping 5, and constitutes a part of the refrigerant circuit 10.

The indoor unit 30 has an indoor heat exchanger 31, an indoor fan 32, an indoor liquid-side connection section 11, an indoor gas-side connection section 13, an indoor housing 54, an indoor electrical equipment unit 9, and the like.

The indoor heat exchanger 31 is connected to the liquid-side refrigerant communication piping 6 on the liquid side, and its gas-side end is connected to the gas-side refrigerant communication piping 5. The indoor heat exchanger 31 is a heat exchanger that functions as an evaporator for a low-pressure refrigerant in the refrigeration cycle during cooling operation and as a condenser for a high-pressure refrigerant in the refrigeration cycle during heating operation. The indoor heat exchanger 31 has multiple heat transfer fins 31*a* arranged in a stack in the plate thickness direction and multiple heat transfer pipes 31*b* penetrating and fixed to the multiple heat transfer fins 31*a*.

The indoor liquid-side connection section 11 is provided at the end of indoor liquid-side refrigerant piping 12 extending from the liquid side of the indoor heat exchanger 31, and is a connection part that is flared and connected to the liquid-side refrigerant communication piping 6.

The indoor gas-side connection section 13 is provided at the end of indoor gas-side refrigerant piping 14 extending from the gas side of the indoor heat exchanger 31, and is a connection part that is flared and connected to the gas-side refrigerant communication piping 5.

The indoor fan 32 generates an air flow for inhaling indoor air into the indoor housing 54 of the indoor unit 30, causing heat exchange between it and the refrigerant in the indoor heat exchanger 31, and then discharging it outside. The indoor fan 32 is rotationally driven by an indoor fan motor, which is not shown in the figure.

Figure 4E:
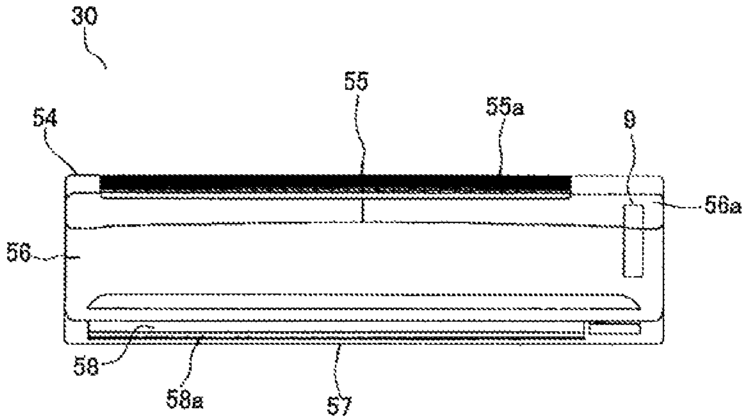
FIG. 4E is a schematic external front view of an indoor unit according to the first embodiment of the technology of the fourth group.
Figure 4F:
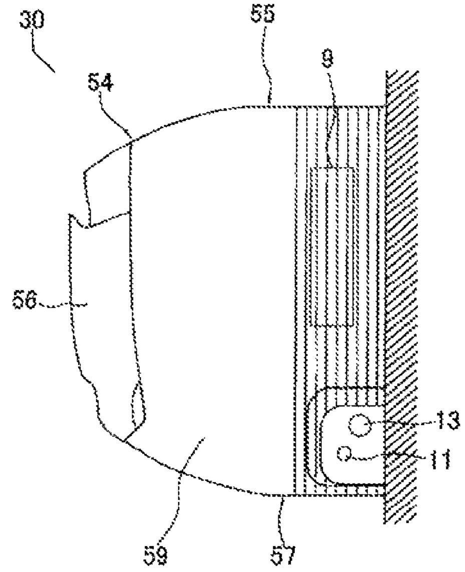
FIG. 4F is a schematic side view of the indoor unit according to the first embodiment of the technology of the fourth group.
Figure 4G:
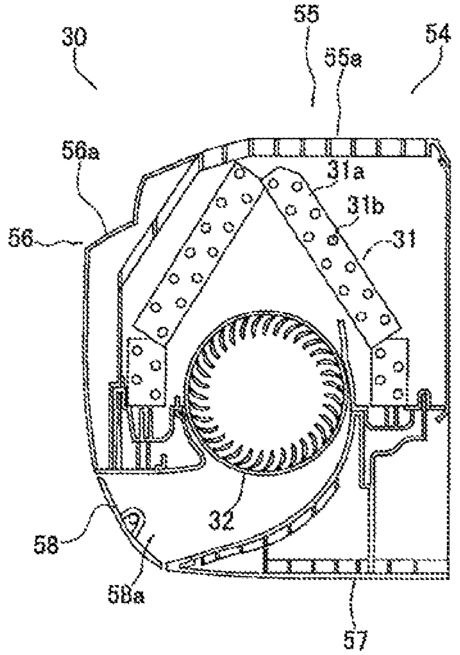
FIG. 4G is a cross section in the side view showing the schematic structure of the interior of the indoor unit according to the first embodiment of the technology of the fourth group.

The indoor housing 54 is a housing in the shape of an approximately rectangular parallelepiped that accommodates the indoor heat exchanger 31, the indoor fan 32, and the indoor unit control section 34 inside, as shown in FIG. 4E, FIG. 4F, and FIG. 4G. The indoor housing 54 has a top surface 55 that constitutes the upper end of the indoor housing 54, a front panel 56 that constitutes the front of the indoor housing 54, a bottom surface 57 that constitutes the bottom of the indoor housing 54, an outlet 58*a*, a louver 58, left and right side surfaces 59, a rear surface that faces the wall of a room, and the like. On the top surface 55, multiple top surface inlets 55*a* are provided, which open in the vertical direction. The front panel 56 is a panel that extends downward from the vicinity of the front side end of the top surface 55. The front panel 56 is provided with a front surface inlet 56*a*, which is formed of an opening elongated in the left and right direction, in its upper part. The indoor air is taken into an air passage composed of the space in the indoor housing 54 where the indoor heat exchanger 31 and the indoor fan 32 are accommodated via these top surface inlet 55*a* and front surface inlet 56*a*. The bottom surface 57 extends approximately horizontally below the indoor heat exchanger 31 and the indoor fan 32. The outlet 58*a* opens toward the front side downward at the lower front side of the indoor housing 54, below the front panel 56 and on the front side of the bottom surface 57. At a lower part of the rear side of the side surface 59 on the right side, an opening toward the side is provided, and the indoor liquid-side connection section 11 and the indoor gas-side connection section 13 are located near that opening.

The indoor electrical equipment unit 9 comprises an indoor unit control section 34 that controls the motion of each section that constitutes the indoor unit 30. The indoor electrical equipment unit 9 is fixed such that it is located above the vicinity of the side end on the right side than the indoor heat exchanger 31, inside the indoor housing 54 of the indoor unit 30. The lower end part of the indoor electrical equipment unit 9 is arranged above the indoor liquid-side connection section 11 and the indoor gas-side connection section 13 in the vertical direction. The indoor electrical equipment unit 9 is preferably arranged above and apart from the indoor liquid-side connection section 11 and the indoor gas-side connection section 13 by a further distance of 10 cm or more. The indoor unit control section 34 that the indoor electrical equipment unit 9 comprises has a microcomputer that includes a CPU, a memory, and other elements. The indoor unit control section 34 is connected to the outdoor unit control section 27 via a communication line, and sends and receives control signals and the like. Also, the indoor unit control section 34 is electrically connected to various sensors provided inside the indoor unit 30, which are not shown in the figure, and receives signals from each sensor.

(4-1-3) Details of Controller 7

In the air conditioning device 1, the outdoor unit control section 27 and the indoor unit control section 34 are connected via a communication line to constitute the controller 7, which controls the motion of the air conditioning device 1.

The controller 7 mainly has a CPU (central processing unit) and a memory such as ROM or RAM. Note that the various processings and controls by the controller 7 are realized by integrated functioning of each section included in the outdoor unit control section 27 and/or the indoor unit control section 34.

(4-1-4) Operation Modes

Hereinafter, the operation modes will be described.

There are two operation modes: a cooling operation mode and a heating operation mode.

The controller 7 determines and executes whether to be in the cooling operation mode or the heating operation mode, based on an instruction received from a remote control or the like.

(4-1-4-1) Cooling Operation Mode

In the cooling operation mode, the air conditioning device 1 sets the state of connection of the four-way switching valve 22 to the cooling operation connection state, in which the inlet side of the compressor 21 and the gas-side shut-off valve 28 are connected while connecting the discharge side of the compressor 21 and the outdoor heat exchanger 23, and circulates the refrigerant filled in the refrigerant circuit 10 mainly through the compressor 21, the outdoor heat exchanger 23, the outdoor expansion valve 24, and the indoor heat exchanger 31 in this order.

More specifically, when the cooling operation mode is started, in the refrigerant circuit 10, the refrigerant is inhaled into the compressor 21, compressed, and then discharged.

In the compressor 21, capacity control is carried out depending on cooling load required by the indoor unit 30. The gas refrigerant that has been discharged from the compressor 21 passes through the four-way switching valve 22 and flows into the gas-side end of the outdoor heat exchanger 23.

The gas refrigerant that has flowed into the gas-side end of the outdoor heat exchanger 23 undergoes heat exchange with the outdoor-side air supplied by the outdoor fan 25 and is condensed in the outdoor heat exchanger 23 to become a liquid refrigerant, which flows out of the liquid-side end of the outdoor heat exchanger 23.

The refrigerant that has flowed out of the liquid-side end of the outdoor heat exchanger 23 is decompressed as it passes through the outdoor expansion valve 24. Note that the outdoor expansion valve 24 is controlled such that the degree of subcooling of the refrigerant passing through the liquid-side outlet of the outdoor heat exchanger 23 satisfies predetermined conditions.

The refrigerant that has been decompressed by the outdoor expansion valve 24 passes through the liquid-side shut-off valve 29 and the liquid-side refrigerant communication piping 6, and flows into the indoor unit 30.

The refrigerant that has flowed into the indoor unit 30 flows into the indoor heat exchanger 31, undergoes heat exchange with the indoor air supplied by the indoor fan 32 and is evaporated in the indoor heat exchanger 31 to become a gas refrigerant, which flows out of the gas-side end of the indoor heat exchanger 31. The gas refrigerant that has flowed out of the gas-side end of the indoor heat exchanger 31 flows into the gas-side refrigerant communication piping 5.

The refrigerant that has flowed through the gas-side refrigerant communication piping 5 passes through the gas-side shut-off valve 28 and the four-way switching valve 22, and is again inhaled into the compressor 21.

(4-1-4-2) Heating Operation Mode

In the heating operation mode, the air conditioning device 1 sets the state of connection of the four-way switching valve 22 to the heating operation connection state, in which the inlet side of the compressor 21 and the outdoor heat exchanger 23 are connected while connecting the discharge side of the compressor 21 and the gas-side shut-off valve 28, and circulates the refrigerant filled in the refrigerant circuit 10 mainly through the compressor 21, the indoor heat exchanger 31, the outdoor expansion valve 24, and the outdoor heat exchanger 23 in this order.

More specifically, when the heating operation mode is started, in the refrigerant circuit 10, the refrigerant is inhaled into the compressor 21, compressed, and then discharged.

In the compressor 21, capacity control is carried out depending on heating load required by the indoor unit 30. The gas refrigerant that has been discharged from the compressor 21 flows through the four-way switching valve 22 and the gas-side refrigerant communication piping 5 and then flows into the indoor unit 30.

The refrigerant that has flowed into the indoor unit 30 flows into the gas-side end of the indoor heat exchanger 31, undergoes heat exchange with the indoor air supplied by the indoor fan 32 and is condensed in the indoor heat exchanger 31 to become a refrigerant in a gas-liquid two phase state or liquid refrigerant, which flows out of the liquid-side end of the indoor heat exchanger 31. The refrigerant that has flowed out of the liquid-side end of the indoor heat exchanger 31 flows into the liquid-side refrigerant communication piping 6.

The refrigerant that has flowed through the liquid-side refrigerant communication piping 6 is decompressed in the liquid-side shut-off valve 29 and the outdoor expansion valve 24 until it reaches the low pressure in the refrigeration cycle. Note that the outdoor expansion valve 24 is controlled such that the degree of subcooling of the refrigerant passing through the liquid-side outlet of the indoor heat exchanger 31 satisfies predetermined conditions. The refrigerant that has been decompressed by the outdoor expansion valve 24 flows into the liquid-side end of the outdoor heat exchanger 23.

The refrigerant that has flowed into the outdoor heat exchanger 23 from its liquid-side end undergoes heat exchange with the outdoor air supplied by the outdoor fan 25 and is evaporated in the outdoor heat exchanger 23 to become a gas refrigerant, which flows out of the gas-side end of the outdoor heat exchanger 23.

The refrigerant that has flowed out of the gas-side end of the outdoor heat exchanger 23 passes through the four-way switching valve 22, and is again inhaled into the compressor 21.

(4-1-5) Characteristics of First Embodiment

In the air conditioning device 1 mentioned above, a refrigerant containing 1,2-difluoroethylene is used, which makes it possible to keep the GWP sufficiently small.

Here, the refrigerant containing 1,2-difluoroethylene is a flammable refrigerant, and the outdoor electrical equipment unit 8 that the outdoor unit 20 of the present embodiment comprises is arranged above the liquid-side shut-off valve 29 and the gas-side shut-off valve 28 for connecting the outdoor unit 20 to the liquid-side refrigerant communication piping 6 and the gas-side refrigerant communication piping 5, respectively. Therefore, even when the flammable refrigerant is leaked from the connection locations of the liquid-side shut-off valve 29 and the gas-side shut-off valve 28, it is difficult for the refrigerant to reach the outdoor electrical equipment unit 8, making it possible to enhance the safety of the outdoor unit 20.

Also, the indoor electrical equipment unit 9 that the indoor unit 30 of the present embodiment comprises is arranged above the indoor liquid-side connection section 11 and the indoor gas-side connection section 13 for connecting the indoor unit 30 to the liquid-side refrigerant communication piping 6 and the gas-side refrigerant communication piping 5, respectively. Therefore, even when the flammable refrigerant is leaked from the connection locations of the indoor liquid-side connection section 11 and the indoor gas-side connection section 13, it is difficult for the leaked refrigerant to reach the indoor electrical equipment unit 9, making it possible to enhance the safety of the indoor unit 30.

(4-1-6) Modification A of First Embodiment

In the above first embodiment, the air conditioning device provided with only one indoor unit has been described as an example, but the air conditioning device may be provided with multiple indoor units connected in parallel to each other.

(4-1-7) Modification B of First Embodiment

As for the indoor unit 30 of the above first embodiment, a type of indoor unit that is installed and used on the wall or the like of a room, which is the target space, has been described as an example.

Figure 4H:
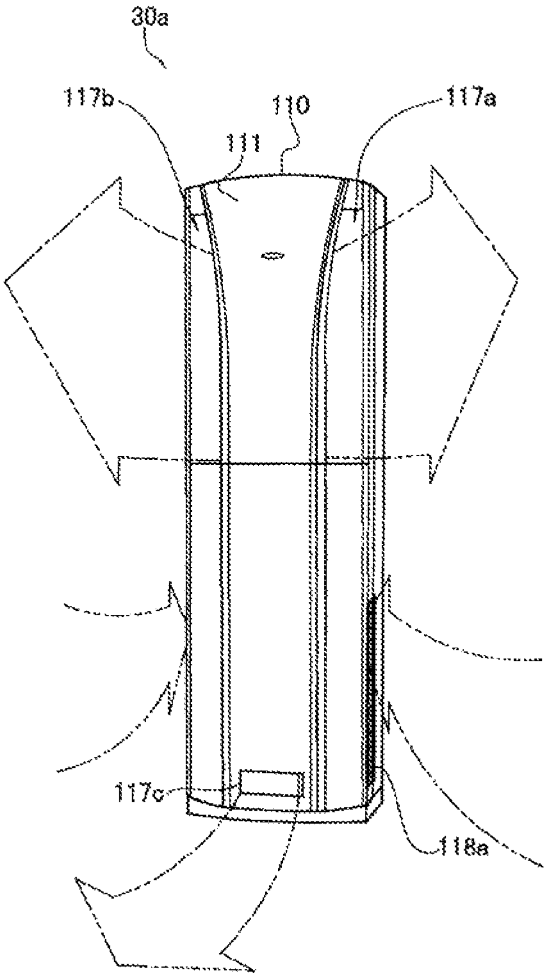
FIG. 4H is a schematic external front view of an indoor unit according to modification B of the first embodiment of the technology of the fourth group.
Figure 4I:
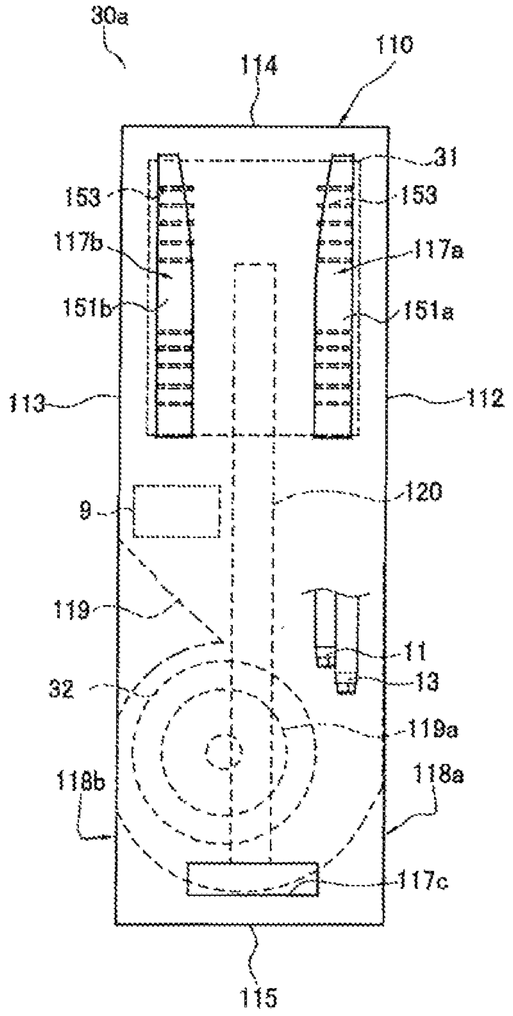
FIG. 4I is a schematic front view showing the internal structure of the indoor unit according to modification B of the first embodiment of the technology of the fourth group.
Figure 4J:
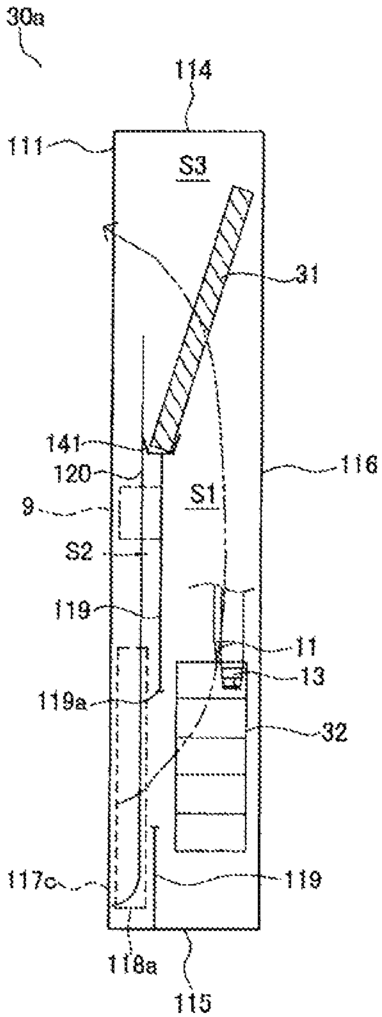
FIG. 4J is a schematic side view showing the schematic structure of the interior of the indoor unit according to modification B of the first embodiment of the technology of the fourth group.

However, the indoor unit is not limited to the type that is to be installed on the wall, but may also be a floor standing type indoor unit 30*a* that is to be used by placing it on the floor of a room, which is the target space for air conditioning, as shown in FIG. 4H, FIG. 4I, and FIG. 4J, for example.

The indoor unit 30*a* mainly comprises an indoor housing 110, an indoor heat exchanger 31, an indoor fan 32, an indoor electrical equipment unit 9, an indoor liquid-side connection section 11, an indoor gas-side connection section 13, and the like. The indoor heat exchanger 31 and the indoor fan 32 are accommodated in the indoor housing 110. The indoor heat exchanger 31 is arranged in an upper space inside the indoor housing 110, and the indoor fan 32 is arranged in a lower space inside the indoor housing 110.

The indoor housing 110 has a rectangular parallelepiped shape surrounded by a front panel 111, a right side panel 112, a left side panel 113, a top panel 114, a bottom panel 115, and a rear panel 116. On the front panel 111, a right-side outlet 117*a* is formed at an upper position on the right side facing the front panel 111, a left-side outlet 117*b* is formed at an upper position on the left side facing the front panel, and a lower outlet 117*c* is formed at the center of a lower part in the left and right direction. On the right-side outlet 117*a*, a vertical flap 151*a* is provided, which covers the right-side outlet 117*a* and becomes a part of the indoor housing 110 when the indoor unit 30*a* is stopped, and regulates the wind direction of air flow (see two-dot chain line) blown out of the right-side outlet 117*a* in the left and right direction when the indoor unit 30*a* is in operation. Similarly, on the left-side outlet 117*b*, a vertical flap 151*b* is provided, which covers the left-side outlet 117*b* and becomes a part of the indoor housing 110 when the indoor unit 30*a* is stopped, and regulates the wind direction of air flow blown out of the left-side outlet 117*b* in the left and right direction when the indoor unit 30*a* is in operation.

On the right side panel 112 of the indoor housing 110, a right-side inlet 118*a* is formed at a lower part near the front. Also, on the left side panel 113 of the indoor housing 110, a left-side inlet 118*b* is formed at a lower part near the front.

The indoor fan 32 is, for example, a sirocco fan with a large number of blades arranged and the rotation axis extending in the front and back direction. The indoor fan 32 is arranged in an internal space S1, which is partitioned off by a partition plate 119. In front of the internal space S1, an internal space S2 is formed between the partition plate 119 and the front panel 111. Also, an internal space S3 is formed above the internal spaces S1 and S2, bordered by the indoor heat exchanger 31.

The indoor heat exchanger 31 is arranged at the boundary part between the internal space S1 and the internal space S3 above the indoor fan 32. The indoor heat exchanger 31 is arranged in an inclined posture such that the closer it is to the upper end, the closer it is to the rear panel 116. The lower end of the indoor heat exchanger 31 is supported by a drain pan 141. This drain pan 141 is provided on the partition plate 119. These partition plate 119 and drain pan 141 serve as the boundary between the internal space S2 and the internal space S3. That is, the internal space S1 is surrounded by the right side panel 112, the left side panel 113, the bottom panel 115, the rear panel 116, the partition plate 119, the drain pan 141, and the indoor heat exchanger 31. Also, the internal space S2 is surrounded by the front panel 111, the right side panel 112, the left side panel 113, the bottom panel 115, the partition plate 119, and the drain pan 141. In addition, the internal space S3 is surrounded by the right side panel 112, the left side panel 113, the top panel 114, the indoor heat exchanger 31, the drain pan 141, and the partition plate 119.

The indoor liquid-side connection section 11 is provided at the end of indoor liquid-side refrigerant piping 12 extending from the liquid side of the indoor heat exchanger 31, and is a connection part that is flared and connected to the liquid-side refrigerant communication piping 6. The indoor liquid-side connection section 11 is provided at a position with the same height as the upper end of the indoor fan 32.

The indoor gas-side connection section 13 is provided at the end of indoor gas-side refrigerant piping 14 extending from the gas side of the indoor heat exchanger 31, and is a connection part that is flared and connected to the gas-side refrigerant communication piping 5. The indoor gas-side connection section 13 is provided at a position with the same height as the upper end of the indoor fan 32.

The indoor electrical equipment unit 9 is arranged below the indoor heat exchanger 31, above the indoor fan 32, and in front of the partition plate 119, inside the indoor housing 110, and is fixed to the partition plate 119. The lower end part of the indoor electrical equipment unit 9 is arranged above the indoor liquid-side connection section 11 and the indoor gas-side connection section 13 in the vertical direction.

In the internal space S2, a duct 120 extending vertically along the front panel 111 is provided. The top of the duct 120 extends to the area between the right-side outlet 117*a* and the left-side outlet 117*b* in the vertical direction. Also, the lower end of the duct 120 reaches the top of the lower outlet 117*c*.

The vertical flap 151*a* is provided at the right-side outlet 117*a*, and the vertical flap 151*b* is provided at the left-side outlet 117*b*. The vertical flaps 151*a* and 151*b* regulate the angle at which they guide the conditioned air to be blown out by changing their angles relative to the front panel 111.

A number of horizontal flaps 153 are provided at each of the right-side outlet 117*a* and left-side outlet 117*b*. The horizontal flaps 153 can be rotated around the rotation axis to change the direction of air to be blown out.

As for the above indoor electrical equipment unit 9 as well, even when the flammable refrigerant is leaked from the connection locations of the indoor liquid-side connection section 11 and the indoor gas-side connection section 13, it is difficult for the leaked refrigerant to reach the indoor electrical equipment unit 9, making it possible to enhance the safety of the indoor unit 30*a*.

(4-2) Second Embodiment

Figure 4K:
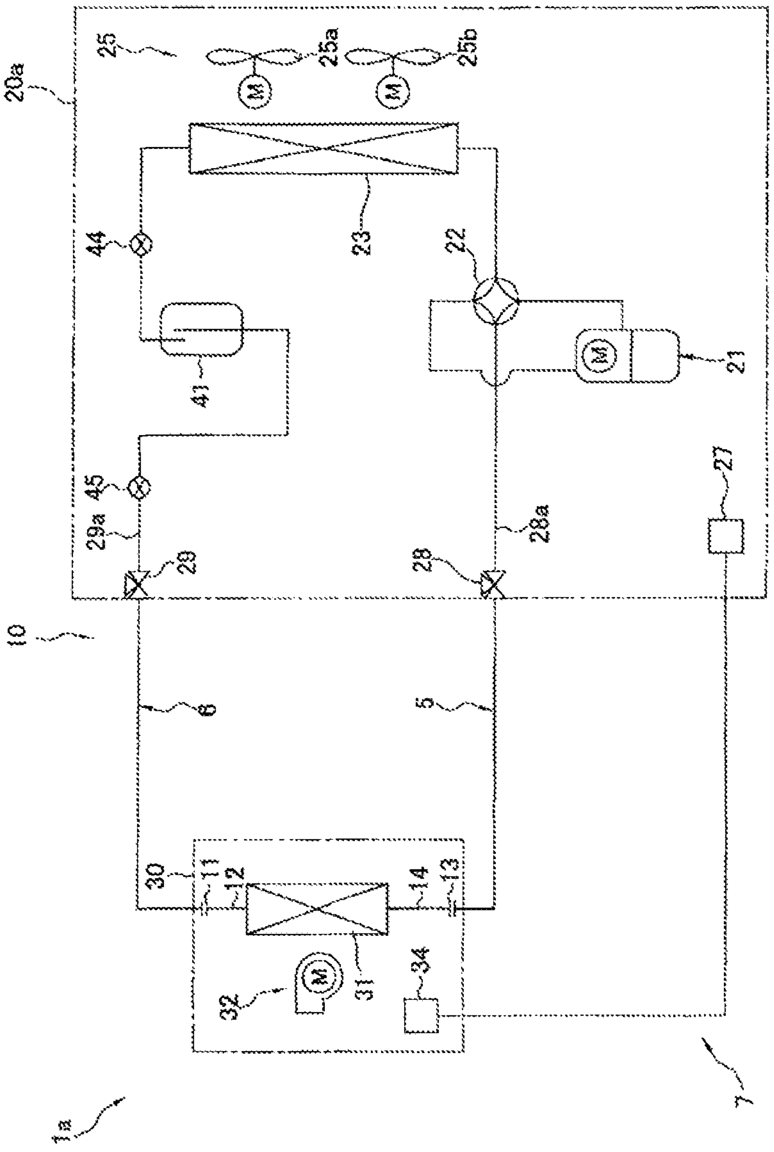
FIG. 4K is a schematic configuration diagram of a refrigerant circuit according to a second embodiment of the technology of the fourth group.
Figure 4L:
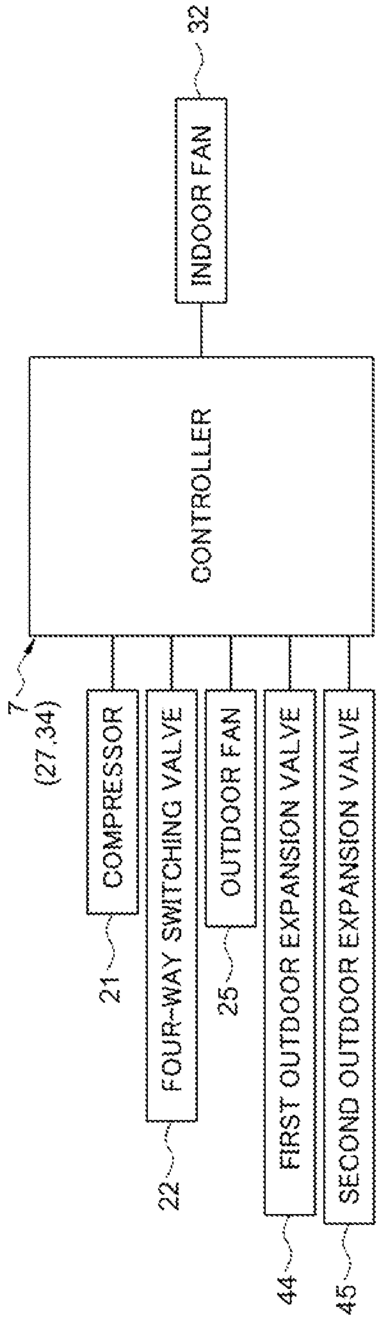
FIG. 4L is a schematic control block configuration diagram of a refrigeration cycle device according to the second embodiment of the technology of the fourth group.

Hereinafter, while referring to FIG. 4K, which is a schematic configuration diagram of a refrigerant circuit, and FIG. 4L, which is a schematic control block configuration diagram, an air conditioning device 1*a*, which is a refrigeration cycle device comprising an indoor unit as a heat exchange unit and an outdoor unit as a heat exchange unit according to the second embodiment, will be described.

In the following, as for the air conditioning device 1*a* of the second embodiment, description will be mainly focused on the differences from the air conditioning device 1 of the first embodiment.

In the air conditioning device 1*a* as well, the refrigerant circuit 10 is filled with any Refrigerant A, which is a mixed refrigerant containing 1,2-difluoroethylene, as the refrigerant for carrying out a vapor compression type refrigeration cycle. The refrigerant circuit 10 is also filled with a refrigerator oil together with that refrigerant.

(4-2-1) Outdoor Unit 20*a*

In an outdoor unit 20*a* of the air conditioning device 1*a* of the second embodiment, a first outdoor fan 25*a* and a second outdoor fan 25*b* are provided as the outdoor fan 25. In the outdoor heat exchanger 23 of the outdoor unit 20*a* of the air conditioning device 1*a*, a large heat exchange area is ensured so as to correspond to an air flow received from the first outdoor fan 25*a* and the second outdoor fan 25*b*.

In the outdoor unit 20*a* of the air conditioning device 1*a*, instead of the outdoor expansion valve 24 of the outdoor unit 20 in the first embodiment described above, a first outdoor expansion valve 44, an intermediate pressure receiver 41, and a second outdoor expansion valve 45 are sequentially provided between the liquid side of the outdoor heat exchanger 23 and the liquid-side shut-off valve 29. The valve opening degree of the first outdoor expansion valve 44 and the second outdoor expansion valve 45 can be controlled. The intermediate pressure receiver 41 is a container that is capable of storing the refrigerant, with both the end of piping extending from the side of the first outdoor expansion valve 44 and the end of piping extending from the side of the second outdoor expansion valve 45 located in the internal space thereof.

Figure 4M:
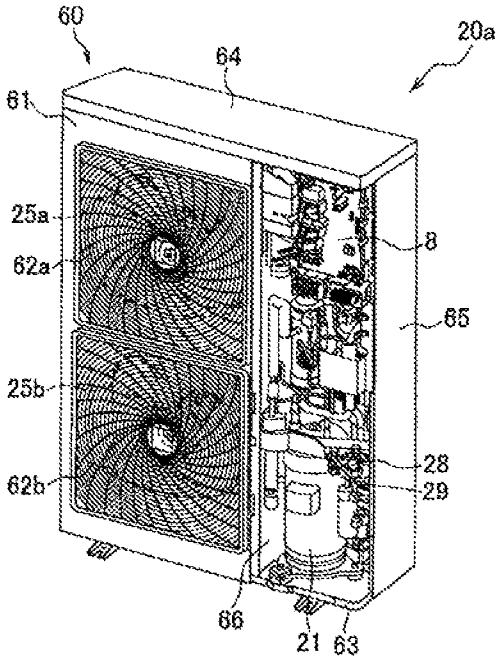
FIG. 4M is a perspective view showing the schematic configuration of an outdoor unit (with front panel removed) according to the second embodiment of the technology of the fourth group.

As shown in FIG. 4M, the outdoor unit 20*a* of the second embodiment has a structure (so-called trunk-type structure) in which the internal space of an outdoor housing 60 that is in the shape of an approximately rectangular box is divided into left and right parts with a vertically extending partition plate 66 to form a blower room and a machine room.

In the blower room in the outdoor housing 60, the outdoor heat exchanger 23, the outdoor fan 25 (the first outdoor fan 25*a* and the second outdoor fan 25*b*), and the like are arranged, and in the machine room in the outdoor housing 60, the compressor 21, the four-way switching valve 22, the first outdoor expansion valve 44, the second outdoor expansion valve 45, the intermediate pressure receiver 41, the gas-side shut-off valve 28, the liquid-side shut-off valve 29, the outdoor electrical equipment unit 8 comprising the outdoor unit control section 27, and the like are arranged.

The outdoor housing 60 mainly has a bottom plate 63, a top plate 64, a left front plate 61, a left side plate (not shown), a right front plate (not shown), a right side plate 65, a partition plate 66, and the like. The bottom plate 63 constitutes the bottom surface part of the outdoor housing 60. The top plate 64 constitutes the top surface part of the outdoor unit 20*a*. The left front plate 61 mainly constitutes the left front part of the outdoor housing 60, on which a first outlet 62*a* and a second outlet 62*b*, which open in the front and back direction and are aligned vertically, are formed. Through the first outlet 62*a*, air that has been sucked inside from the rear side and left side surface side of the outdoor housing 60 by the first outdoor fan 25*a* and that has passed through the upper part of the outdoor heat exchanger 23 mainly passes. Through the second outlet 62*b*, air that has been sucked inside from the rear side and left side surface side of the outdoor housing 60 by the second outdoor fan 25*b* and that has passed through the lower part of the outdoor heat exchanger 23 mainly passes. The first outlet 62*a* and the second outlet 62*b* are each provided with a fan grill. The left side plate mainly constitutes the left side part of the outdoor housing 60, which can also function as an inlet for air to be inhaled into the outdoor housing 60. The right front plate mainly constitutes the right front part and a front side part of the right side of the outdoor housing 60. The right side plate 65 mainly constitutes a rear side part of the right side and a right side part of the rear side of the outdoor housing 60. The partition plate 66 is a vertically extending plate-like member arranged on the bottom plate 63 and divides the internal space of the outdoor housing 60 into the blower room and the machine room.

The outdoor heat exchanger 23 is a cross fin-type, fin and tube-type heat exchanger having multiple heat transfer fins arranged in a stack in the plate thickness direction and multiple heat transfer pipes penetrating and fixed to the multiple heat transfer fins. This outdoor heat exchanger 23 is arranged in the blower room along the left side and rear side of the outdoor housing 60 to be in an L shape in the plan view.

The compressor 21 is mounted on the bottom plate 63 and fixed with bolts in the machine room of the outdoor housing 60.

The gas-side shut-off valve 28 and the liquid-side shut-off valve 29 are arranged in the machine room of the outdoor housing 60 at positions with a height of the vicinity of the upper end of the compressor 21, and in the vicinity of the right front corner.

The outdoor electrical equipment unit 8 is arranged in a space above the compressor 21 in the mechanical room of the outdoor housing 60. The lower end of the outdoor electrical equipment unit 8 is arranged above both the gas-side shut-off valve 28 and the liquid-side shut-off valve 29.

As for the above air conditioning device 1*a*, in the cooling operation mode, the first outdoor expansion valve 44 is controlled such that the degree of subcooling of the refrigerant passing through the liquid-side outlet of the outdoor heat exchanger 23 satisfies predetermined conditions, for example. Also, in the cooling operation mode, the second outdoor expansion valve 45 is controlled such that the degree of superheating of the refrigerant inhaled by the compressor 21 satisfies predetermined conditions, for example.

In addition, in the heating operation mode, the second outdoor expansion valve 45 is controlled such that the degree of subcooling of the refrigerant passing through the liquid-side outlet of the indoor heat exchanger 31 satisfies predetermined conditions, for example. Moreover, in the heating operation mode, the first outdoor expansion valve 44 is controlled such that the degree of superheating of the refrigerant inhaled by the compressor 21 satisfies predetermined conditions, for example.

(4-2-2) Indoor Unit 30

Since the indoor unit 30 of the second embodiment is the same as the indoor unit 30 described in the first embodiment, description will be omitted.

(4-2-3) Characteristics of Second Embodiment

In the air conditioning device 1*a* according to the above second embodiment as well, as in the air conditioning device 1 according to the first embodiment, a refrigerant containing 1,2-difluoroethylene is used, which makes it possible to keep the GWP sufficiently small.

Here, the refrigerant containing 1,2-difluoroethylene is a flammable refrigerant, and the outdoor electrical equipment unit 8 that the outdoor unit 20*a* of the present embodiment comprises is arranged above the liquid-side shut-off valve 29 and the gas-side shut-off valve 28 for connecting the outdoor unit 20*a* to the liquid-side refrigerant communication piping 6 and the gas-side refrigerant communication piping 5, respectively. Therefore, even when the flammable refrigerant is leaked from the connection locations of the liquid-side shut-off valve 29 and the gas-side shut-off valve 28, it is difficult for the refrigerant to reach the outdoor electrical equipment unit 8, making it possible to enhance the safety of the outdoor unit 20*a*.

(4-2-4) Modification A of Second Embodiment

In the above second embodiment, the air conditioning device provided with only one indoor unit has been described as an example, but the air conditioning device may be provided with multiple indoor units connected in parallel to each other.

(4-3) Third Embodiment

Figure 4N:
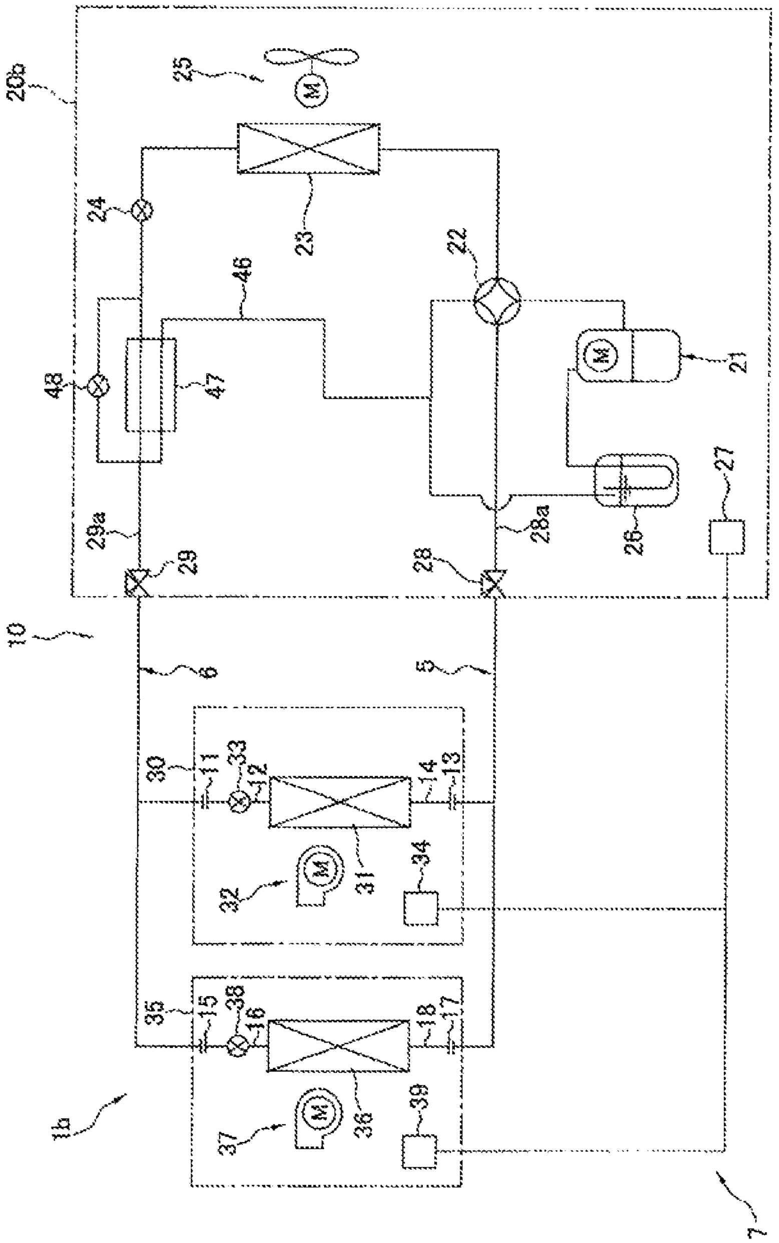
FIG. 4N is a schematic configuration diagram of a refrigerant circuit according to a third embodiment of the technology of the fourth group.
Figure 40:
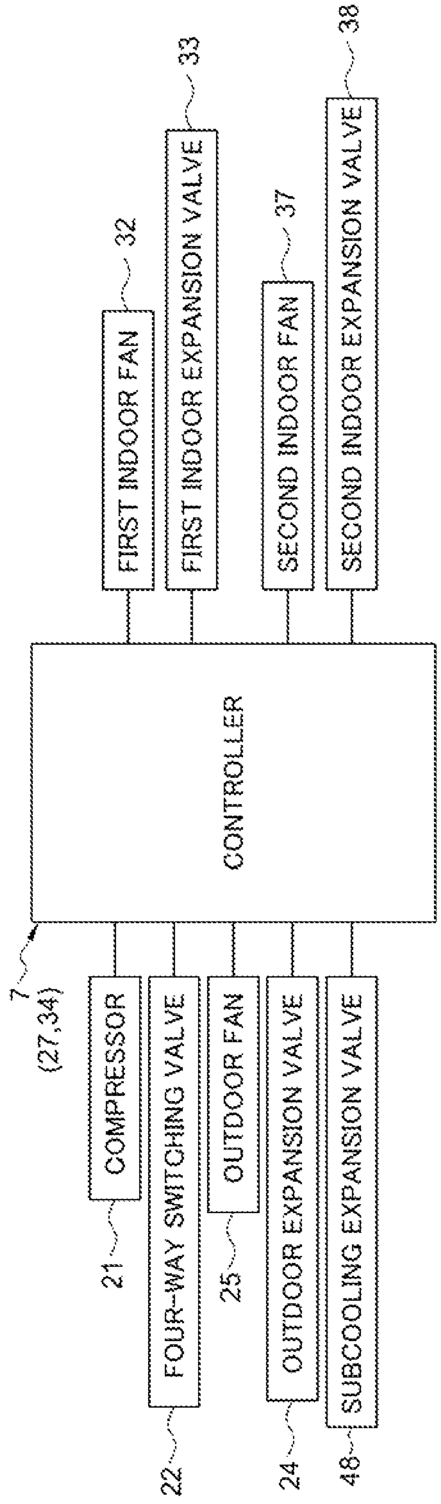

Hereinafter, while referring to FIG. 4N, which is a schematic configuration diagram of a refrigerant circuit, and FIG. 4O, which is a schematic control block configuration diagram, an air conditioning device 1*b*, which is a refrigeration cycle device comprising an indoor unit as a heat exchange unit and an outdoor unit as a heat exchange unit according to the third embodiment, will be described.

In the following, as for the air conditioning device 1*b* of the third embodiment, description will be mainly focused on the differences from the air conditioning device 1 of the first embodiment.

In the air conditioning device 1*b* as well, the refrigerant circuit 10 is filled with any Refrigerant A, which is a mixed refrigerant containing 1,2-difluoroethylene, as the refrigerant for carrying out a vapor compression type refrigeration cycle. The refrigerant circuit 10 is also filled with a refrigerator oil together with that refrigerant.

(4-3-1) Outdoor Unit 20*b*

In an outdoor unit 20*b* of the air conditioning device 1*b* according to the third embodiment, a low-pressure receiver 26, a subcooling heat exchanger 47, and a subcooling circuit 46 are provided in addition to the elements that the outdoor unit 20 in the above first embodiment comprises.

The low-pressure receiver 26 is a container that is installed between one of the connection ports of the four-way switching valve 22 and the inlet side of the compressor 21, and is capable of storing the refrigerant. Note that, in the present embodiment, it is provided separately from the accompanying accumulator that the compressor 21 has.

The subcooling heat exchanger 47 is provided between the outdoor expansion valve 24 and the liquid-side shut-off valve 29.

The subcooling circuit 46 is a circuit that branches off from the main circuit between the outdoor expansion valve 24 and the subcooling heat exchanger 47, and extends to join the part in the middle of piping from one of the connection ports of the four-way switching valve 22 to the low-pressure receiver 26. In the middle of the subcooling circuit 46, a subcooling expansion valve 48 is provided, which decompresses the passing refrigerant. The refrigerant that flows through the subcooling circuit 46 and has been decompressed by the subcooling expansion valve 48 undergoes heat exchange with the refrigerant flowing on the main circuit side in the subcooling heat exchanger 47. Due to this, the refrigerant flowing on the main circuit side is further cooled and the refrigerant flowing through the subcooling circuit 46 is evaporated.

Figure 4P:
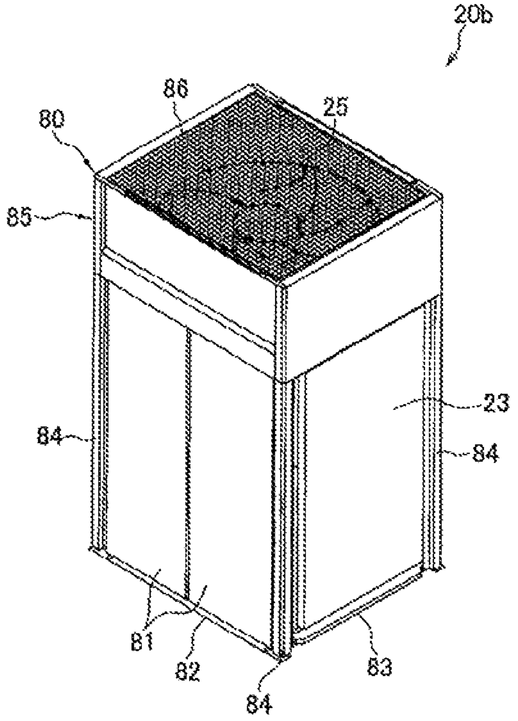
FIG. 4P is a schematic external perspective view of an outdoor unit according to the third embodiment of the technology of the fourth group.
Figure 4Q:
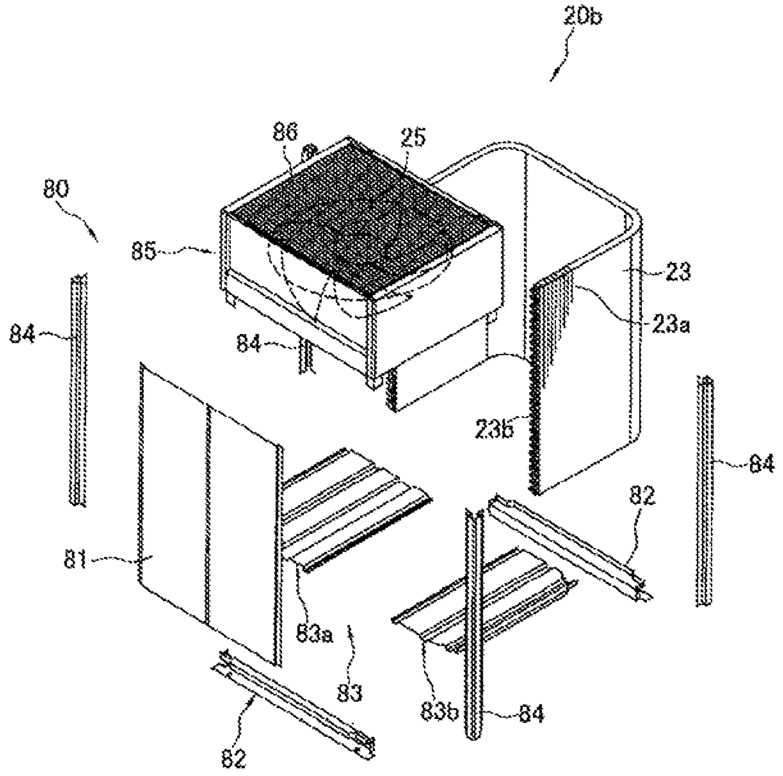
FIG. 4Q is an exploded perspective view showing the schematic structure of the interior of the outdoor unit according to the third embodiment of the technology of the fourth group.
Figure 4R:
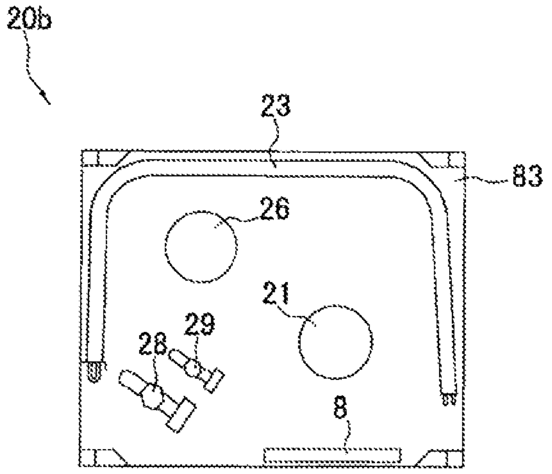
FIG. 4R is a plan view showing the schematic structure of the interior of the outdoor unit according to the third embodiment of the technology of the fourth group.
Figure 4S:
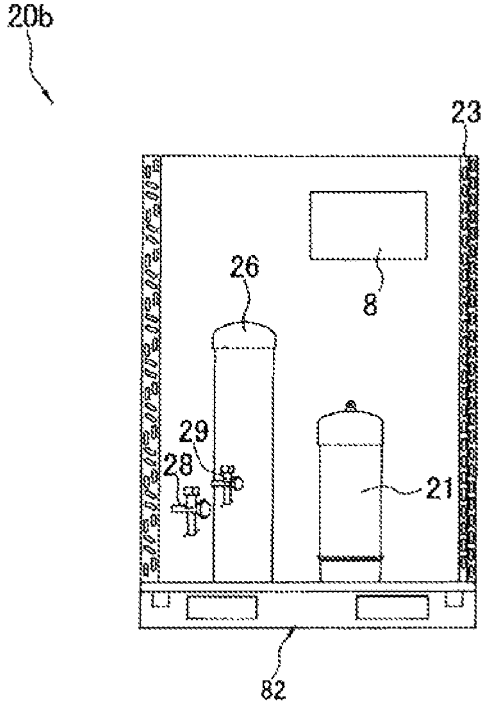
FIG. 4S is a front view showing the schematic structure of the interior of the outdoor unit according to the third embodiment of the technology of the fourth group.

Hereinafter, while referring to an external perspective view of FIG. 4P, an exploded perspective view of FIG. 4Q, a plan view of schematic arrangement configuration of FIG. 4R, and a front view of schematic arrangement configuration of FIG. 4S, the detailed structure of the outdoor unit 20*b* of the air conditioning device 1*b* according to the third embodiment will be described.

The outdoor unit 20*b* of the air conditioning device 1*b* has what is called a top blowing structure that intakes air from a lower part to the inside of an outdoor housing 80 and blows out the air from an upper part to the outside of the outdoor housing 80.

The outdoor housing 80 mainly has a bottom plate 83 bridged over a pair of installation legs 82 extending in the left and right direction, pillars 84 vertically extending from the corners of the bottom plate 83, a front panel 81, and a fan module 85. The bottom plate 83 forms the bottom surface of the outdoor housing 80 and is divided into a first bottom plate 83*a* on the left side and a second bottom plate 83*b* on the right side. The front panel 81 is bridged between the pillars 84 on the front side, below the fan module 85, and constitutes the front surface of the outdoor housing 80. Within the outdoor housing 80, in the space below the fan module 85 and above the bottom plate 83, the compressor 21, the outdoor heat exchanger 23, the low-pressure receiver 26, the four-way switching valve 22, the outdoor expansion valve 24, the subcooling heat exchanger 47, the subcooling expansion valve 48, the subcooling circuit 46, the gas-side shut-off valve 28, the liquid-side shut-off valve 29, the outdoor electrical equipment unit 8 comprising the outdoor unit control section 27, and the like are arranged. The outdoor heat exchanger 23 is in an approximately U shape in the plan view facing the rear surface and both left and right side surfaces among the part below the fan module 85 of the outdoor housing 80, substantially forming the rear surface and both left and right side surfaces of the outdoor housing 80. This outdoor heat exchanger 23 is arranged along the top of the left side edge, rear side edge, and right side edge of the bottom plate 83. The outdoor heat exchanger 23 of the third embodiment is a cross fin-type, fin and tube-type heat exchanger having multiple heat transfer fins 23*a* arranged in a stack in the plate thickness direction and multiple heat transfer pipes 23*b* penetrating and fixed to the multiple heat transfer fins 23*a*.

The fan module 85 is provided on the upper side of the outdoor heat exchanger 23 and has an outdoor fan 25, a bell mouth, which is not shown in the figure, and the like. The outdoor fan 25 is arranged in a posture where the rotation axis is in the vertical direction.

The gas-side shut-off valve 28 and the liquid-side shut-off valve 29 are arranged inside the outdoor housing 80 at positions with a height of the vicinity of the upper end of the compressor 21, and in the vicinity of the left front in the space below the fan module 85. Note that the gas-side shut-off valve 28 of the present embodiment is brazed and connected to the gas-side refrigerant communication piping 5. The liquid-side shut-off valve 29 of the present embodiment is brazed and connected to the liquid-side refrigerant communication piping 6.

The outdoor electrical equipment unit 8 is arranged inside the outdoor housing 80, and above and in front of the compressor 21 in the space below the fan module 85, and it is fixed to the right side part of the front panel 81. The lower end of the outdoor electrical equipment unit 8 is arranged above both the gas-side shut-off valve 28 and the liquid-side shut-off valve 29.

With the structure described above, the air flow formed by the outdoor fan 25 flows from the surroundings of the outdoor heat exchanger 23, through the outdoor heat exchanger 23, and into the inside the outdoor housing 80, and is blown upward through an outlet 86 provided to penetrate in the vertical direction at the upper end surface of the outdoor housing 80.

(4-3-2) First Indoor Unit 30 and Second Indoor Unit 35

Also, the air conditioning device 1*b* according to the third embodiment has the first indoor unit 30 and the second indoor unit 35 provided in parallel to each other, instead of the indoor unit 30 in the above first embodiment.

In the first indoor unit 30, a first indoor heat exchanger 31, a first indoor fan 32, a first indoor liquid-side connection section 11, a first indoor gas-side connection section 13, and a first indoor electrical equipment unit comprising a first indoor unit control section 34 are provided as in the indoor unit 30 in the above first embodiment, and furthermore, a first indoor expansion valve 33 is provided. The first indoor liquid-side connection section 11 is provided at the end of first indoor liquid-side refrigerant piping 12 extending to connect the liquid side of the first indoor heat exchanger 31 and the liquid-side refrigerant communication piping 6. The first indoor gas-side connection section 13 is provided at the end of first indoor gas-side refrigerant piping 14 extending to connect the gas side of the first indoor heat exchanger 31 and the gas-side refrigerant communication piping 5. The first indoor expansion valve 33 is provided in the middle of the first indoor liquid-side refrigerant piping 12, and its valve opening degree can be controlled. Here as well, as in the first embodiment, the first indoor electrical equipment unit is arranged above the first indoor liquid-side connection section 11 and the first indoor gas-side connection section 13.

In the second indoor unit 35, as in the first indoor unit 30, a second indoor heat exchanger 36, a second indoor fan 37, a second indoor liquid-side connection section 15, a second indoor gas-side connection section 17, and a second indoor electrical equipment unit comprising a second indoor unit control section 39 are provided, and furthermore, a second indoor expansion valve 38 is provided. The second indoor liquid-side connection section 15 is provided at the end of second indoor liquid-side refrigerant piping 16 extending to connect the liquid side of the second indoor heat exchanger 36 and the liquid-side refrigerant communication piping 6. The second indoor gas-side connection section 17 is provided at the end of second indoor gas-side refrigerant piping 18 extending to connect the gas side of the second indoor heat exchanger 36 and the gas-side refrigerant communication piping 5. The second indoor expansion valve 38 is provided in the middle of the second indoor liquid-side refrigerant piping 16, and its valve opening degree can be controlled. Here as well, the second indoor electrical equipment unit is arranged above the second indoor liquid-side connection section 15 and the second indoor gas-side connection section 17.

Note that the controller 7 of the third embodiment is configured by connecting the outdoor unit control section 27, the first indoor unit control section 34, and the second indoor unit control section 39 in a communicable manner with each other.

As for the above air conditioning device 1*b*, in the cooling operation mode, the outdoor expansion valve 24 is controlled such that the degree of subcooling of the refrigerant passing through the liquid-side outlet of the outdoor heat exchanger 23 satisfies predetermined conditions. Also, in the cooling operation mode, the subcooling expansion valve 48 is controlled such that the degree of superheating of the refrigerant inhaled by the compressor 21 satisfies predetermined conditions. Note that, in the cooling operation mode, the first indoor expansion valve 33 and the second indoor expansion valve 38 are controlled to be in a fully open state.

In addition, in the heating operation mode, the first indoor expansion valve 33 is controlled such that the degree of subcooling of the refrigerant passing through the liquid-side outlet of the first indoor heat exchanger 31 satisfies predetermined conditions. Similarly, the second indoor expansion valve 38 is also controlled such that the degree of subcooling of the refrigerant passing through the liquid-side outlet of the second indoor heat exchanger 36 satisfies predetermined conditions. Moreover, in the heating operation mode, the outdoor expansion valve 45 is controlled such that the degree of superheating of the refrigerant inhaled by the compressor 21 satisfies predetermined conditions. Note that, in the heating operation mode, the subcooling expansion valve 48 is controlled such that the degree of superheating of the refrigerant inhaled by the compressor 21 satisfies predetermined conditions.

(4-3-3) Characteristics of Third Embodiment

In the air conditioning device 1*b* according to the above third embodiment as well, as in the air conditioning device 1 according to the first embodiment, a refrigerant containing 1,2-difluoroethylene is used, which makes it possible to keep the GWP sufficiently small.

Here, the refrigerant containing 1,2-difluoroethylene is a flammable refrigerant, and the outdoor electrical equipment unit 8 that the outdoor unit 20*b* of the present embodiment comprises is arranged above the liquid-side shut-off valve 29 and the gas-side shut-off valve 28 for connecting the outdoor unit 20*b* to the liquid-side refrigerant communication piping 6 and the gas-side refrigerant communication piping 5, respectively. Therefore, even when the flammable refrigerant is leaked from the connection locations of the liquid-side shut-off valve 29 and the gas-side shut-off valve 28, it is difficult for the refrigerant to reach the outdoor electrical equipment unit 8, making it possible to enhance the safety of the outdoor unit 20*b*.

In addition, the first indoor electrical equipment unit that the first indoor unit 30 of the present embodiment comprises is also arranged above the first indoor liquid-side connection section 11 and the first indoor gas-side connection section 13. Therefore, even when the flammable refrigerant is leaked from the connection locations of the first indoor liquid-side connection section 11 and the first indoor gas-side connection section 13, it is difficult for the leaked refrigerant to reach the first indoor electrical equipment unit, making it possible to enhance the safety of the first indoor unit 30. Similarly, the second indoor electrical equipment unit that the second indoor unit 35 comprises is also arranged above the second indoor liquid-side connection section 15 and the second indoor gas-side connection section 17. Therefore, even when the flammable refrigerant is leaked from the connection locations of the second indoor liquid-side connection section 15 and the second indoor gas-side connection section 17, it is difficult for the leaked refrigerant to reach the second indoor electrical equipment unit, making it possible to enhance the safety of the second indoor unit 35.

(4-4) Fourth Embodiment

Figure 4T:
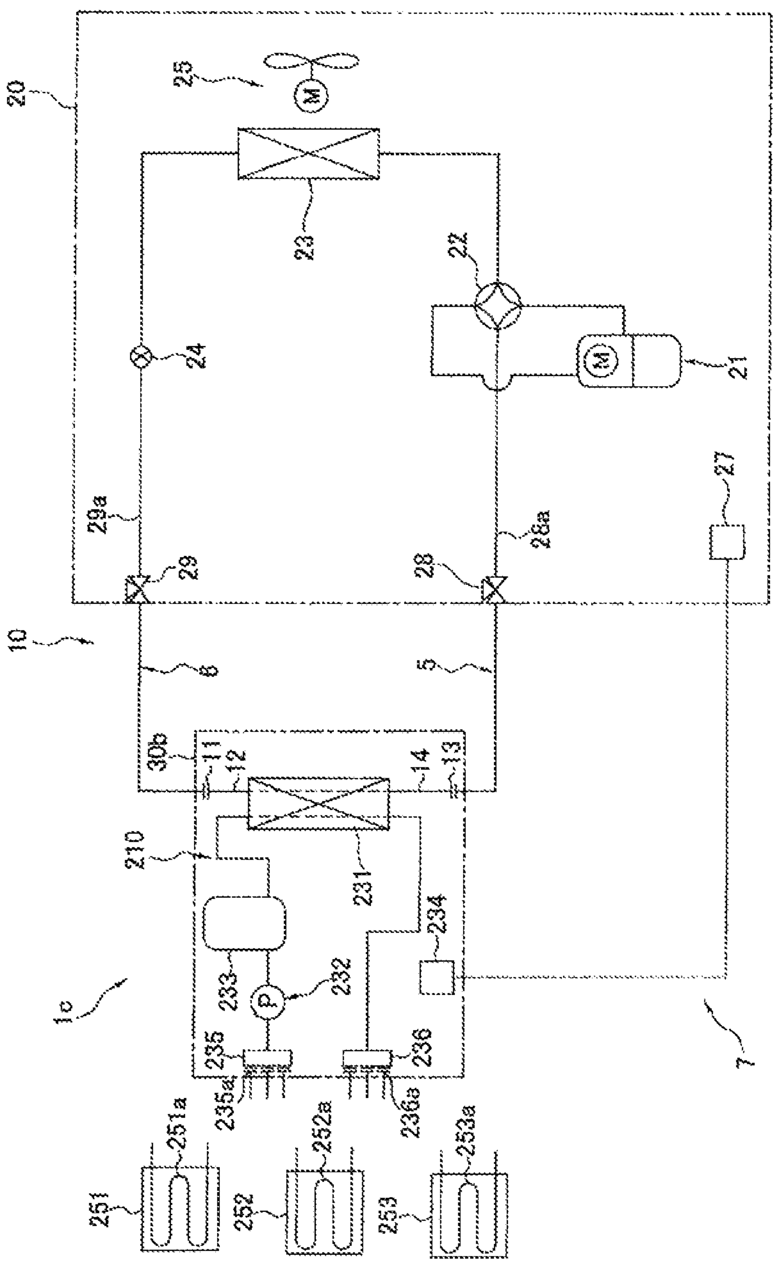
FIG. 4T is a schematic configuration diagram of a refrigerant circuit and a water circuit according to a fourth embodiment of the technology of the fourth group.
Figure 4U:
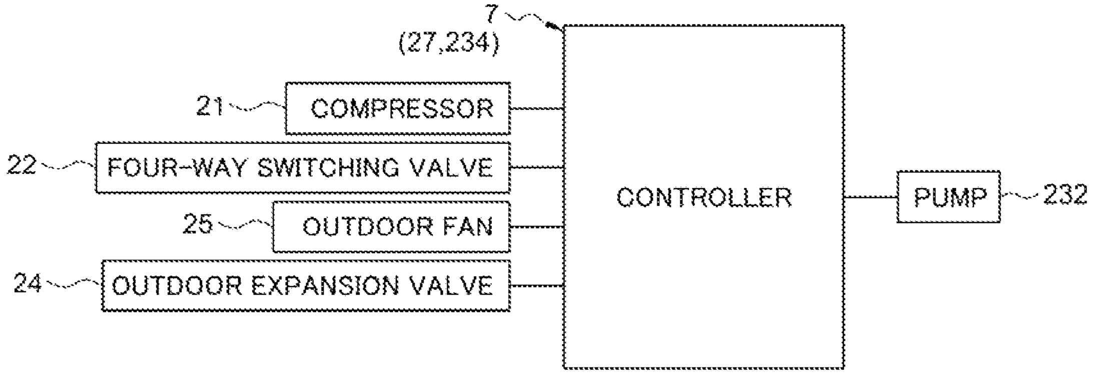
FIG. 4U is a schematic control block configuration diagram of a refrigeration cycle device according to the fourth embodiment of the technology of the fourth group.

Hereinafter, while referring to FIG. 4T, which is a schematic configuration diagram of a refrigerant circuit, and FIG. 4U, which is a schematic control block configuration diagram, a cold/warm water supply device 1*c*, which is a refrigeration cycle device comprising a cold/warm water supply unit as a heat exchange unit and an outdoor unit as a heat exchange unit according to the fourth embodiment, will be described.

In the following, as for the cold/warm water supply device 1*c* of the fourth embodiment, description will be mainly focused on the differences from the air conditioning device 1 of the first embodiment.

The cold/warm water supply device 1*c* is a device for cooling or heating the floor in a room by obtaining cold water or warm water and supplying it to floor cooling/heating panels 251, 252, and 253 installed on the floor in the room.

In the cold/warm water supply device 1*c* as well, the refrigerant circuit 10 is filled with any Refrigerant A, which is a mixed refrigerant containing 1,2-difluoroethylene, as the refrigerant for carrying out a vapor compression type refrigeration cycle. The refrigerant circuit 10 is also filled with a refrigerator oil together with that refrigerant.

(4-4-1) Outdoor Unit 20

Since the outdoor unit 20 of the cold/warm water supply device 1*c* is the same as the outdoor unit 20 described in the first embodiment, description will be omitted.

(4-4-2) Cold/Warm Water Supply Unit 30*b*

The cold/warm water supply unit 30*b* is used to cool or heat the floor surface in a room, which is the target space, and is connected to the outdoor unit 20 via the liquid-side refrigerant communication piping 6 and the gas-side refrigerant communication piping 5 and constitutes a part of the refrigerant circuit 10.

The cold/warm water supply unit 30*b* has a water heat exchanger 231, a pump 232, a tank 233, an indoor liquid-side connection section 11, an indoor gas-side connection section 13, a return header 236, a forward header 235, an indoor housing 237, a cold/warm water electrical equipment unit 9*a*, and the like.

The water heat exchanger 231 causes heat exchange between the refrigerant flowing inside and the water flowing through the water circuit 210. The water heat exchanger 231 is flared and connected to the liquid-side refrigerant communication piping 6 via the indoor liquid-side refrigerant piping 12 and the indoor liquid-side connection section 11, on the liquid refrigerant side, and is flared and connected to the gas-side refrigerant communication piping 5 via the indoor gas-side refrigerant piping 14 and the indoor gas-side connection section 13, on the gas refrigerant side. The water heat exchanger 231 functions as an evaporator for a low-pressure refrigerant in the refrigeration cycle during cooling operation to cool the water flowing through the water circuit 210, and functions as a condenser for a high-pressure refrigerant in the refrigeration cycle during heating operation to heat the water flowing through the water circuit 210.

The pump 232 generates a water flow for circulating the water in the water circuit 210 through the return header 236, the water flow path of the water heat exchanger 231, the tank 233, the forward header 235, and the floor cooling/heating panels 251, 252, and 253. The pump 232 is rotationally driven by a motor, which is not shown in the figure.

The tank 233 stores cold water or warm water, the temperature of which has been regulated in the water heat exchanger 231.

The forward header 235 has the cold/warm water sent from the pump 232 branch and flow to each of the water circulation pipes 251*a*, 252*a*, and 253*a* that the multiple floor cooling/heating panels 251, 252, and 253 have, respectively. The forward header 235 has multiple forward connection sections 235*a* that are connected to each of the ends of the water circulation pipes 251*a*, 252*a*, and 253*a*.

The return header 236 merges the water that has flowed through each of the water circulation pipes 251*a*, 252*a*, and 253*a* that the multiple floor cooling/heating panels 251, 252, and 253 have, and supplies it again to the water heat exchanger 231. The return header 236 has multiple return connection sections 236*a* that are connected to each of the other ends of the water circulation pipes 251*a*, 252*a*, and 253*a*.

The cold/warm water electrical equipment unit 9*a* comprises a cold/warm water supply unit control section 234 that controls the motion of each section that constitutes the cold/warm water supply unit 30*b*. Specifically, the cold/warm water supply unit control section 234 controls the flow rate of the pump depending on the temperature regulation load in the multiple floor cooling/heating panels 251, 252, and 253.

Figure 4V:
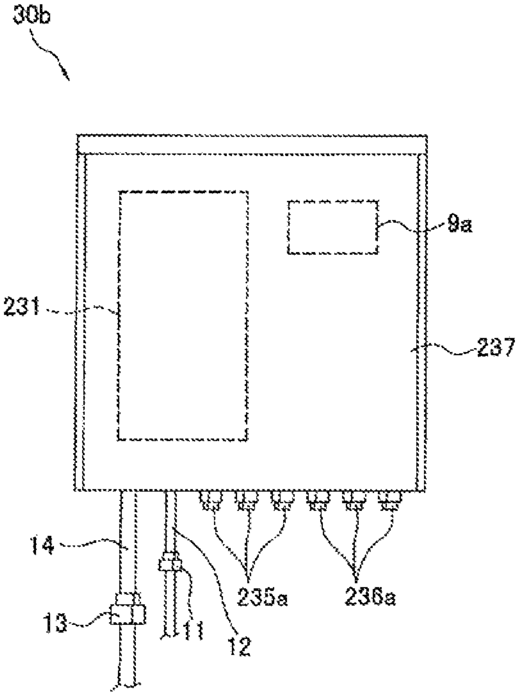
FIG. 4V is a schematic structure diagram of a cold/warm water supply unit of the fourth embodiment of the technology of the fourth group.

The indoor housing 237 is a box-shaped body that accommodates the water heat exchanger 231, the cold/warm water electrical equipment unit 9*a*, and the like inside, as shown in FIG. 4V. Specifically, the cold/warm water electrical equipment unit 9*a* is arranged in an upper space inside the indoor housing 237. Below the indoor housing 237, the multiple forward connection sections 235*a* that the forward header 235 has and the multiple return connection sections 236*a* that the return header 236 has are located. Furthermore, the indoor liquid-side refrigerant piping 12 and the indoor gas-side refrigerant piping 14 extend out from the bottom of the indoor housing 237, and the indoor liquid-side connection section 11 is located at the lower end of the indoor liquid-side refrigerant piping 12 and the indoor gas-side connection section 13 is located at the lower end of the indoor gas-side refrigerant piping 14.

(4-4-3) Characteristics of Fourth Embodiment

In the cold/warm water supply device 1*c* mentioned above, a refrigerant containing 1,2-difluoroethylene is used, which makes it possible to keep the GWP sufficiently small.

Here, the refrigerant containing 1,2-difluoroethylene is a flammable refrigerant, and the cold/warm water electrical equipment unit 9*a* that the cold/warm water supply unit 30*b* of the present embodiment comprises is arranged above the indoor liquid-side connection section 11 and the indoor gas-side connection section 13 for connecting the cold/warm water supply unit 30*b* to the liquid-side refrigerant communication piping 6 and the gas-side refrigerant communication piping 5, respectively. Therefore, even when the flammable refrigerant is leaked from the connection locations of the indoor liquid-side connection section 11 and the indoor gas-side connection section 13, it is difficult for the leaked refrigerant to reach the cold/warm water electrical equipment unit 9*a*, making it possible to enhance the safety of the cold/warm water supply unit 30*b*.

(4-4-4) Modification A of Fourth Embodiment

In the above fourth embodiment, the cold/warm water supply device 1*c* has been described as an example, cools or heats the floor in a room by supplying the cold/warm water obtained by heat exchange with the refrigerant in the water heat exchanger 231 to the floor cooling/heating panels 251, 252, and 253.

Figure 4W:
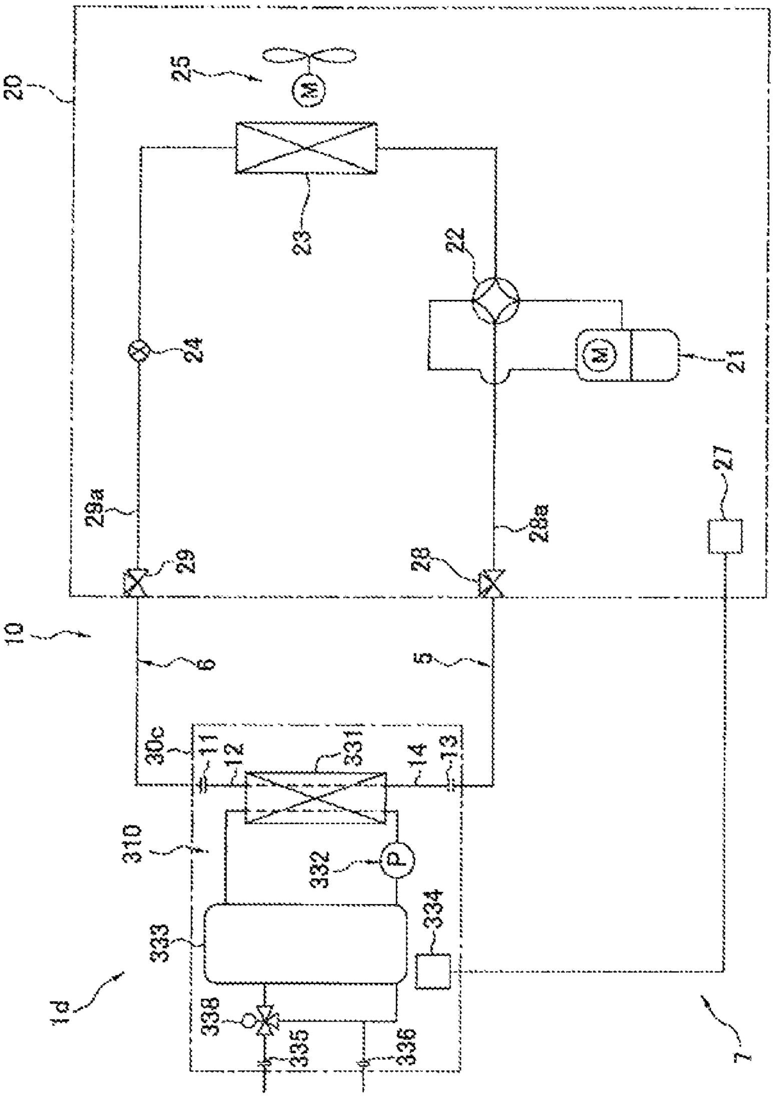
FIG. 4W is a schematic configuration diagram of a refrigerant circuit and a water circuit according to modification A of the fourth embodiment of the technology of the fourth group.
Figure 4X:
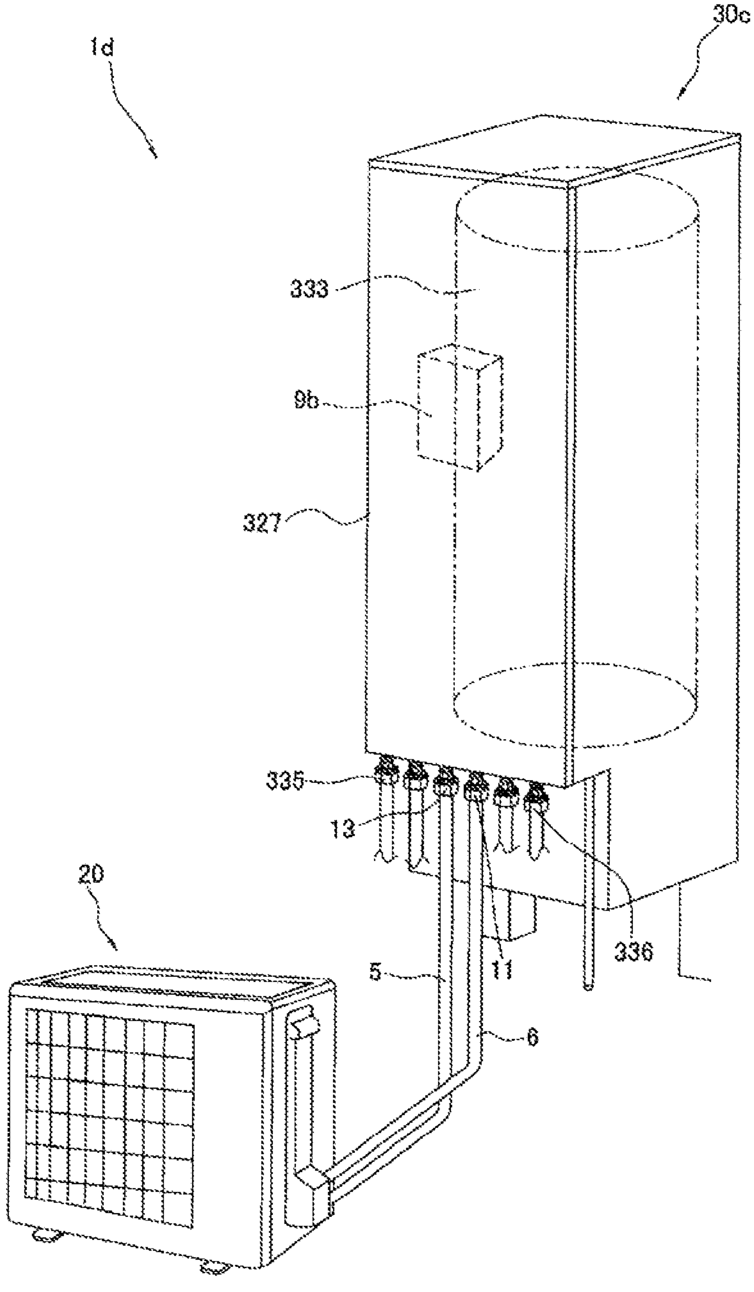
FIG. 4X is a schematic configuration diagram of a hot water storage device according to modification A of the fourth embodiment of the technology of the fourth group.

In contrast, as shown in FIG. 4W and FIG. 4X, warm water may be supplied using a water heat exchanger 231 in a hot water storage device 1*d* configured by connecting a hot water storage unit 30*c* and an outdoor unit 20 via liquid-side refrigerant communication piping 6 and gas-side refrigerant communication piping 5.

Specifically, in a hot water storage housing 327 of the hot water storage unit 30*c*, a water heat exchanger 331, a pump 332, a hot water storage tank 333, a mixing valve 338, a water inlet 336, a water outlet 335, a hot water storage electrical equipment unit 9*b*, and the like are accommodated. Note that the outdoor unit 20 is the same as that of the fourth embodiment and the like.

The water heat exchanger 331, as in the water heat exchanger 231 of the above fourth embodiment, causes heat exchange between the refrigerant circulating in the outdoor unit 20, the liquid-side refrigerant communication piping 6, and the gas-side refrigerant communication piping 5, and the water circulating in the water circuit 310 accommodated in the hot water storage unit 30*c*.

The water circuit 310 has the tank 333, a water forward pipe that extends from the lower end of the tank 333 to the inlet of the water flow path of the water heat exchanger 331 and is provided with the pump 332, and a water return pipe that connects the outlet of the water flow path of the water heat exchanger 331 to the upper end of the tank 333, and water is circulated inside.

The hot water storage tank 333 is supplied with city water from the lower end, which has flowed through a water inlet pipe via the water inlet 336. From the upper end of the hot water storage tank 333, hot water obtained and stored in the water heat exchanger 331 flows through a water outlet pipe and is sent toward the water outlet 335. The water inlet pipe and the water outlet pipe are connected by a bypass pipe, and the mixing valve 338 is provided at the coupling location of the water outlet pipe and the bypass pipe, enabling the mixing of city water and hot water.

The indoor liquid-side connection section 11 provided at the tip of the indoor liquid-side refrigerant piping 12 on the liquid refrigerant side of the water heat exchanger 331 is located below the hot water storage housing 327. The indoor gas-side connection section 13 provided at the tip of the indoor gas-side refrigerant piping 14 on the gas refrigerant side of the water heat exchanger 331 is also located below the hot water storage housing 327.

The hot water storage unit 30*c* is provided with a hot water storage electrical equipment unit 9*b*, which comprises a hot water storage unit control section 334 that carries out drive control of the pump 332. The hot water storage electrical equipment unit 9*b* is installed in an upper space inside the hot water storage housing 327 and is located above the indoor gas-side connection section 13 and the indoor liquid-side connection section 11.

In the above hot water storage unit 30*c* as well, the hot water storage electrical equipment unit 9*b* is arranged above the indoor gas-side connection section 13 and the indoor liquid-side connection section 11, and therefore, even when the refrigerant is leaked from the indoor gas-side connection section 13 or the indoor liquid-side connection section 11, it is difficult for the refrigerant to reach the hot water storage electrical equipment unit 9*b*, making it possible to enhance the safety of the hot water storage unit 30*c*.

(5) EMBODIMENTS OF TECHNOLOGY OF FIFTH GROUP

(5-1) First Embodiment

Figure 5A:
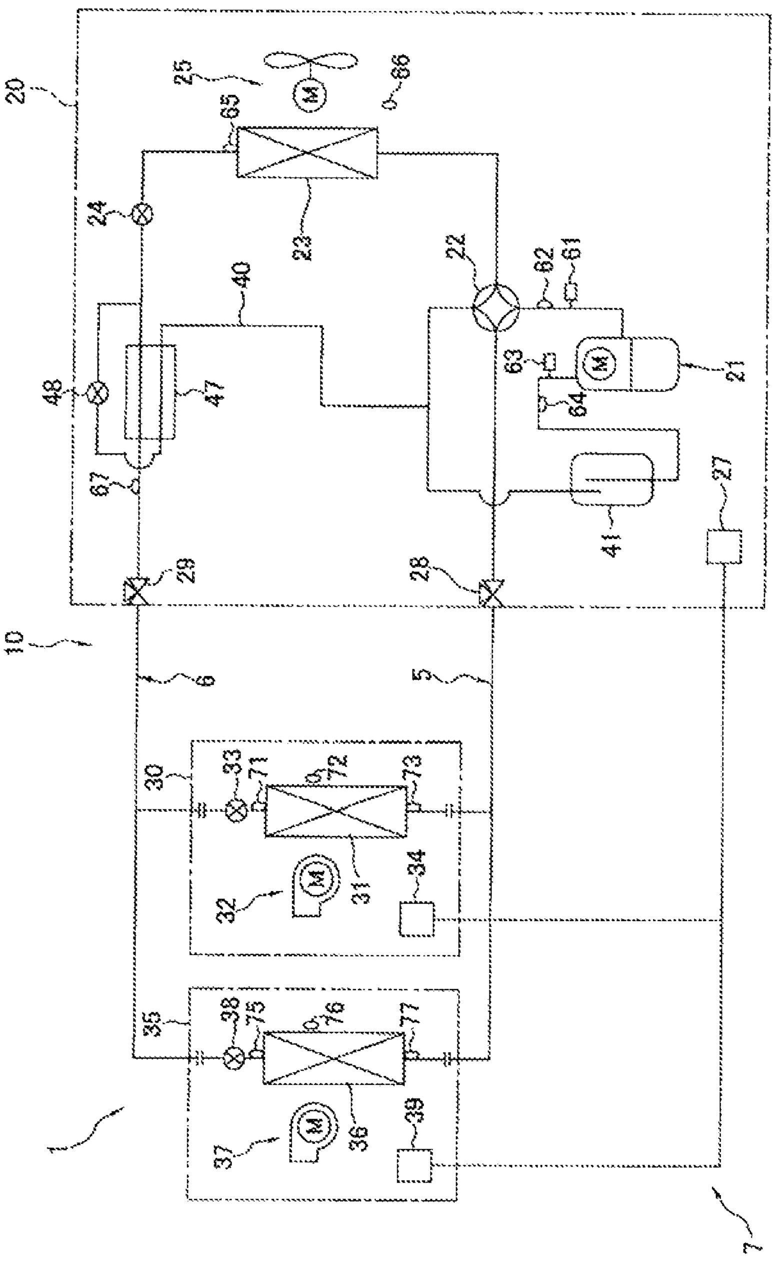
FIG. 5A is a schematic configuration diagram of a refrigerant circuit according to a first embodiment of the technology of a fifth group.
Figure 5B:
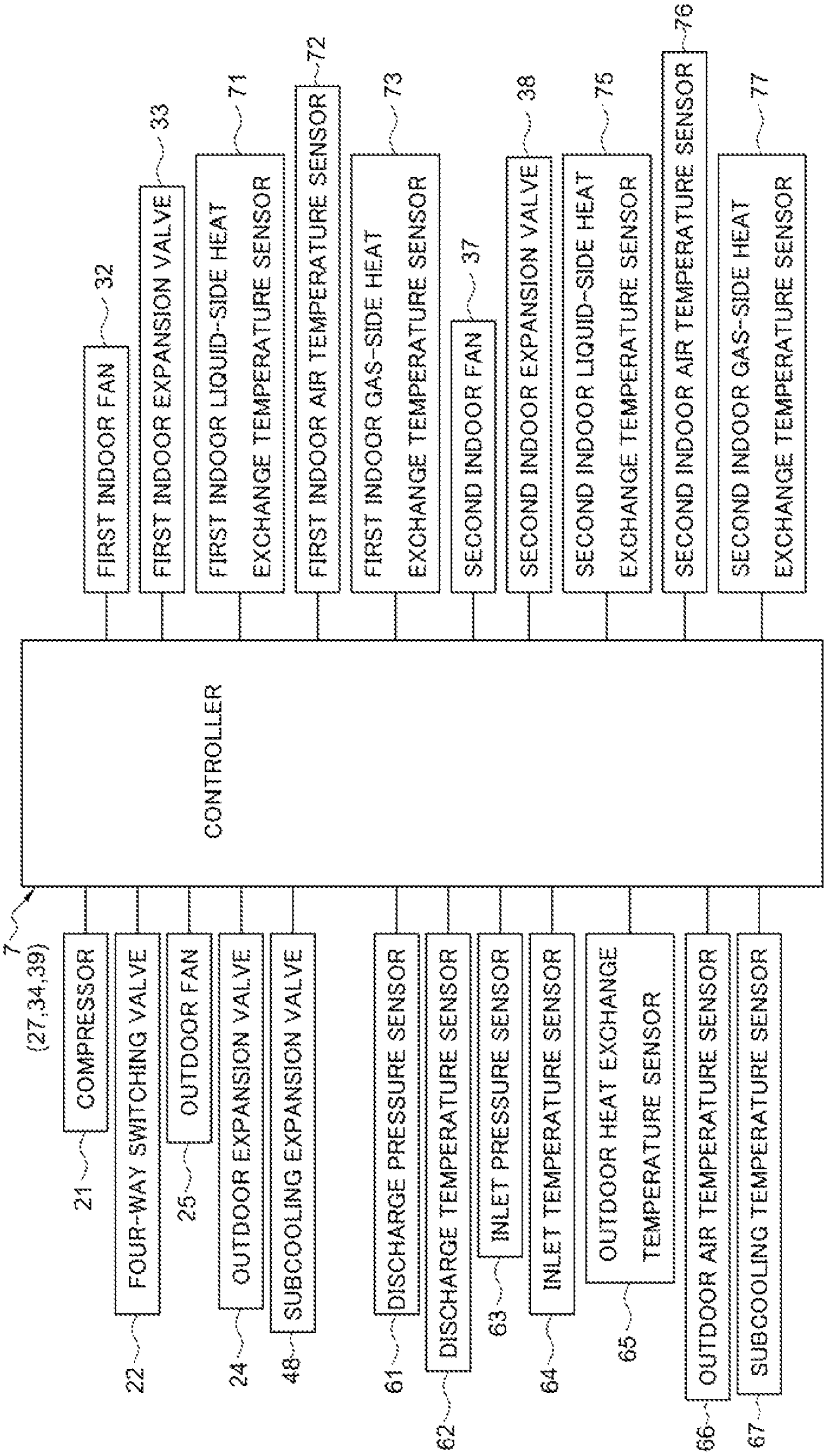
FIG. 5B is a schematic control block configuration diagram of a refrigeration cycle device according to the first embodiment of the technology of the fifth group.

Hereinafter, while referring to FIG. 5A, which is a schematic configuration diagram of a refrigerant circuit, and FIG. 5B, which is a schematic control block configuration diagram, an air conditioning device 1 as a refrigeration cycle device according to the first embodiment will be described.

The air conditioning device 1 is a device that conditions the air in the target space by carrying out a vapor compression type refrigeration cycle.

The air conditioning device 1 mainly has an outdoor unit 20, a first indoor unit 30, a second indoor unit 35, liquid-side refrigerant communication piping 6 and gas-side refrigerant communication piping 5 that connect the first indoor unit 30 and the second indoor unit 35 in parallel to the outdoor unit 20, a remote control not shown in the figure as an input device and an output device, and a controller 7 that controls the motion of the air conditioning device 1.

In the air conditioning device 1, a refrigeration cycle is carried out in which a refrigerant enclosed in a refrigerant circuit 10 is compressed, cooled or condensed, decompressed, heated or evaporated, and then compressed again. In the present embodiment, the refrigerant circuit 10 is filled with a refrigerant for carrying out a vapor compression type refrigeration cycle. That refrigerant is a mixed refrigerant containing 1,2-difluoroethylene, and any Refrigerant A can be used. The refrigerant circuit 10 is also filled with a refrigerator oil together with that mixed refrigerant.

(5-1-1) Outdoor Unit 20

The outdoor unit 20 is connected to the indoor unit 30 via the liquid-side refrigerant communication piping 6 and the gas-side refrigerant communication piping 5, and constitutes a part of the refrigerant circuit 10. The outdoor unit 20 mainly has a compressor 21, a four-way switching valve 22, an outdoor heat exchanger 23, a subcooling heat exchanger 47, inhalation injection piping 40, a subcooling expansion valve 48, an outdoor expansion valve 24, an outdoor fan 25, a low-pressure receiver 41, a liquid-side shut-off valve 29, and a gas-side shut-off valve 28.

The compressor 21 is equipment that compresses a low-pressure refrigerant in the refrigeration cycle until it reaches a high pressure. Here, as the compressor 21, a compressor with a sealed structure in which a positive displacement compression element (omitted in the figure) such as a rotary type or scroll type is rotationally driven by a compressor motor is used. The compressor motor is for changing the volume, and the operation frequency can be controlled by an inverter. Note that the compressor 21 is provided with an accompanying accumulator, which is not shown in the figure, on the inlet side thereof (the internal volume of that accompanying accumulator is smaller than that of a refrigerant container such as a low-pressure receiver, an intermediate pressure receiver, or a high-pressure receiver, and is preferably half or less).

The four-way switching valve 22 can switch the state of connection between a cooling operation connection state in which the inlet side of the compressor 21 and the gas-side shut-off valve 28 are connected while connecting the discharge side of the compressor 21 and the outdoor heat exchanger 23, and a heating operation connection state in which the inlet side of the compressor 21 and the outdoor heat exchanger 23 are connected while connecting the discharge side of the compressor 21 and the gas-side shut-off valve 28.

The outdoor heat exchanger 23 is a heat exchanger that functions as a condenser for a high-pressure refrigerant in the refrigeration cycle during cooling operation and as an evaporator for a low-pressure refrigerant in the refrigeration cycle during heating operation.

The outdoor expansion valve 24 is provided between the liquid-side outlet of the outdoor heat exchanger 23 and the liquid-side shut-off valve 29 in the refrigerant circuit 10. The outdoor expansion valve 24 is an electric expansion valve whose valve opening degree can be regulated.

The inhalation injection piping 40 is provided such that it branches off from the branch part between the outdoor expansion valve 24 and the liquid-side shut-off valve 29 in the main circuit of the refrigerant circuit 10, and joins the junction location between one of the connection ports of the four-way switching valve 22 and the low-pressure receiver 41. The inhalation injection piping 40 is provided with the subcooling expansion valve 48. The subcooling expansion valve 48 is an electric expansion valve whose valve opening degree can be regulated.

The subcooling heat exchanger 47 is a heat exchanger that causes heat exchange between the refrigerant flowing through the part between the outdoor expansion valve 24 and the liquid-side shut-off valve 29 in the refrigerant circuit 10 and the refrigerant flowing on the junction location side of the subcooling expansion valve 48 in the inhalation injection piping 40. In the present embodiment, the subcooling heat exchanger 47 is provided in the part between the outdoor expansion valve 24 and the liquid-side shut-off valve 29, and on the side of the liquid-side shut-off valve 29 than the branch part of the inhalation injection piping 40.

The outdoor fan 25 generates an air flow for inhaling outdoor air into the outdoor unit 20, causing heat exchange between it and the refrigerant in the outdoor heat exchanger 23, and then discharging it outside. The outdoor fan 25 is rotationally driven by an outdoor fan motor.

The low-pressure receiver 41 is provided between the inlet side of the compressor 21 and one of the connection ports of the four-way switching valve 22, and is a refrigerant container that is capable of storing excess refrigerant in the refrigerant circuit 10 as a liquid refrigerant. Also, the compressor 21 is provided with an accompanying accumulator, which is not shown in the figure, and the low-pressure receiver 41 is connected to the downstream side of that accompanying accumulator.

The liquid-side shut-off valve 29 is a manual valve arranged at the connection part in the outdoor unit 20 with the liquid-side refrigerant communication piping 6.

The gas-side shut-off valve 28 is a manual valve arranged at the connection part in the outdoor unit 20 with the gas-side refrigerant communication piping 5.

The outdoor unit 20 has an outdoor unit control section 27 that controls the motion of each section that constitutes the outdoor unit 20. The outdoor unit control section 27 has a microcomputer that includes a CPU, a memory, and other elements. The outdoor unit control section 27 is connected to an indoor unit control section 34 of each indoor unit 30 via a communication line, and sends and receives control signals and the like.

The outdoor unit 20 is provided with a discharge pressure sensor 61, a discharge temperature sensor 62, an inlet pressure sensor 63, an inlet temperature sensor 64, an outdoor heat exchange temperature sensor 65, an outdoor air temperature sensor 66, a subcooling temperature sensor 67, and the like. Each of these sensors is electrically connected to the outdoor unit control section 27 and sends detection signals to the outdoor unit control section 27. The discharge pressure sensor 61 detects the pressure of the refrigerant flowing through discharge piping that connects the discharge side of the compressor 21 to one of the connection ports of the four-way switching valve 22. The discharge temperature sensor 62 detects the temperature of the refrigerant flowing through the discharge piping. The inlet pressure sensor 63 detects the pressure of the refrigerant flowing through inlet piping that connects the inlet side of the compressor 21 to the low-pressure receiver 41. The inlet temperature sensor 64 detects the temperature of the refrigerant flowing through the inlet piping. The outdoor heat exchange temperature sensor 65 detects the temperature of the refrigerant flowing through the liquid-side outlet, which is on the opposite side of the outdoor heat exchanger 23 to the side where the four-way switching valve 22 is connected. The outdoor air temperature sensor 66 detects the temperature of the outdoor air before it passes through the outdoor heat exchanger 23. The subcooling temperature sensor 67 detects the temperature of the refrigerant flowing between the subcooling heat exchanger 47 and the second outdoor expansion valve 45 in the main circuit of the refrigerant circuit 10.

(5-1-2) First Indoor Unit 30 and Second Indoor Unit 35

The first indoor unit 30 and the second indoor unit 35 are each installed on the wall, ceiling, or the like of a room, which is the same or a different target space. The first indoor unit 30 and the second indoor unit 35 are connected to the outdoor unit 20 via the liquid-side refrigerant communication piping 6 and the gas-side refrigerant communication piping 5, and constitutes a part of the refrigerant circuit 10.

The first indoor unit 30 has a first indoor heat exchanger 31, a first indoor expansion valve 33, and a first indoor fan 32.

The first indoor heat exchanger 31 is connected to the liquid-side refrigerant communication piping 6 on the liquid side, and its gas-side end is connected to the gas-side refrigerant communication piping 5. The first indoor heat exchanger 31 is a heat exchanger that functions as an evaporator for a low-pressure refrigerant in the refrigeration cycle during cooling operation and as a condenser for a high-pressure refrigerant in the refrigeration cycle during heating operation.

The first indoor expansion valve 33 is an electric expansion valve provided in the refrigerant piping on the liquid refrigerant side of the first indoor heat exchanger 31, whose valve opening degree can be regulated.

The first indoor fan 32 generates an air flow for inhaling indoor air into the first indoor unit 30, causing heat exchange between it and the refrigerant in the first indoor heat exchanger 31, and then discharging it outside. The first indoor fan 32 is rotationally driven by an indoor fan motor.

Also, the first indoor unit 30 has a first indoor unit control section 34 that controls the motion of each section that constitutes the first indoor unit 30. The first indoor unit control section 34 has a microcomputer that includes a CPU, a memory, and other elements. The first indoor unit control section 34 is connected to a second indoor unit control section 39 and the outdoor unit control section 27 via a communication line, and sends and receives control signals and the like.

The first indoor unit 30 is provided with a first indoor liquid-side heat exchange temperature sensor 71, a first indoor air temperature sensor 72, a first indoor gas-side heat exchange temperature sensor 73, and the like. Each of these sensors is electrically connected to the first indoor unit control section 34 and sends detection signals to the first indoor unit control section 34. The first indoor liquid-side heat exchange temperature sensor 71 detects the temperature of the refrigerant flowing through the outlet on the liquid refrigerant side of the first indoor heat exchanger 31. The first indoor air temperature sensor 72 detects the temperature of the indoor air before it passes through the first indoor heat exchanger 31. The first indoor gas-side heat exchange temperature sensor 73 detects the temperature of the refrigerant flowing through the outlet on the gas refrigerant side of the first indoor heat exchanger 31.

The second indoor unit 35 has a second indoor heat exchanger 36, a second indoor expansion valve 38, and a second indoor fan 37.

The second indoor heat exchanger 36 is connected to the liquid-side refrigerant communication piping 6 on the liquid side, and its gas-side end is connected to the gas-side refrigerant communication piping 5. The second indoor heat exchanger 36 is a heat exchanger that functions as an evaporator for a low-pressure refrigerant in the refrigeration cycle during cooling operation and as a condenser for a high-pressure refrigerant in the refrigeration cycle during heating operation.

The second indoor expansion valve 38 is an electric expansion valve provided in the refrigerant piping on the liquid refrigerant side of the second indoor heat exchanger 36, whose valve opening degree can be regulated.

The second indoor fan 37 generates an air flow for inhaling indoor air into the second indoor unit 35, causing heat exchange between it and the refrigerant in the second indoor heat exchanger 36, and then discharging it outside. The second indoor fan 37 is rotationally driven by an indoor fan motor.

Also, the second indoor unit 35 has the second indoor unit control section 39 that controls the motion of each section that constitutes the second indoor unit 35. The second indoor unit control section 39 has a microcomputer that includes a CPU, a memory, and other elements. The second indoor unit control section 39 is connected to the first indoor unit control section 34 and the outdoor unit control section 27 via a communication line, and sends and receives control signals and the like.

The second indoor unit 35 is provided with a second indoor liquid-side heat exchange temperature sensor 75, a second indoor air temperature sensor 76, a second indoor gas-side heat exchange temperature sensor 77, and the like. Each of these sensors is electrically connected to the second indoor unit control section 39 and sends detection signals to the second indoor unit control section 39. The second indoor liquid-side heat exchange temperature sensor 75 detects the temperature of the refrigerant flowing through the outlet on the liquid refrigerant side of the second indoor heat exchanger 36. The second indoor air temperature sensor 76 detects the temperature of the indoor air before it passes through the second indoor heat exchanger 36. The second indoor gas-side heat exchange temperature sensor 77 detects the temperature of the refrigerant flowing through the outlet on the gas refrigerant side of the second indoor heat exchanger 36.

(5-1-3) Details of Controller 7

In the air conditioning device 1, the outdoor unit control section 27, the first indoor unit control section 34, and the second indoor unit control section 39 are connected via a communication line to constitute the controller 7, which controls the motion of the air conditioning device 1.

The controller 7 mainly has a CPU (central processing unit) and a memory such as ROM or RAM. Note that the various processings and controls by the controller 7 are realized by integrated functioning of each section included in the outdoor unit control section 27, and/or the first indoor unit control section 34, and/or the second indoor unit control section 39.

(5-1-4) Operation Modes

Hereinafter, the operation modes will be described.

There are two operation modes: a cooling operation mode and a heating operation mode.

The controller 7 determines and executes whether to be in the cooling operation mode or the heating operation mode, based on an instruction received from a remote control or the like.

(5-1-4-1) Cooling Operation Mode

In the cooling operation mode of the air conditioning device 1, capacity control is performed on the operation frequency of the compressor 21 such that, for example, the evaporating temperature of the refrigerant in the refrigerant circuit 10 becomes the target evaporating temperature. Here, it is preferable that the target evaporating temperature is determined depending on the largest difference between a preset temperature and the indoor temperature in each indoor unit 30 or 35 (indoor unit with the largest load).

The gas refrigerant that has been discharged from the compressor 21 passes through the four-way switching valve 22 and is condensed in the outdoor heat exchanger 23. The refrigerant that has flowed through the outdoor heat exchanger 23 passes through the outdoor expansion valve 24. Note that, in this case, the outdoor expansion valve 24 is controlled so as to be in a fully open state.

After passing through the outdoor expansion valve 24, a part of the refrigerant flows toward the side of the liquid-side shut-off valve 29, and another part branches off and flows into the inhalation injection piping 40. The refrigerant that has branched off and flowed into the inhalation injection piping 40 is decompressed in the subcooling expansion valve 48. In the subcooling heat exchanger 47, heat exchange is performed between the refrigerant flowing from the outdoor expansion valve 24 toward the side of the liquid-side shut-off valve 29 and the refrigerant flowing through the inhalation injection piping 40 that has been decompressed in the subcooling expansion valve 48. After the heat exchange in the subcooling heat exchanger 47 is finished, the refrigerant flowing through the inhalation injection piping 40 flows to join the junction location between one of the connection ports of the four-way switching valve 22 and the low-pressure receiver 41. Also, the valve opening degree of the subcooling expansion valve 48 is controlled so as to satisfy predetermined conditions, for example, the degree of subcooling of the refrigerant that has passed through the subcooling heat exchanger 47 in the refrigerant circuit 10 becomes the predetermined target value.

After the heat exchange in the subcooling heat exchanger 47 is finished, the refrigerant flowing from the outdoor expansion valve 24 toward the side of the liquid-side shut-off valve 29 passes through the liquid-side shut-off valve 29, flows through the liquid-side refrigerant communication piping 6, and is sent to the first indoor unit 30 and the second indoor unit 35.

Here, in the first indoor unit 30, the valve opening degree of the first indoor expansion valve 33 is controlled so as to satisfy predetermined conditions, for example, the degree of superheating of the refrigerant flowing through the gas-side outlet of the first indoor heat exchanger 31 becomes the target value. The valve opening degree of the second indoor expansion valve 38 of the second indoor unit 35 is also controlled so as to satisfy predetermined conditions, for example, the degree of superheating of the refrigerant flowing through the gas-side outlet of the second indoor heat exchanger 36 becomes the target value, as in the first indoor expansion valve 33. Alternatively, the valve opening degree of both the first indoor expansion valve 33 and the second indoor expansion valve 38 may be controlled so as to satisfy predetermined conditions, for example, the degree of superheating of the refrigerant, obtained by subtracting the saturation temperature of the refrigerant corresponding to the detected pressure by the inlet pressure sensor 63 from the detected temperature of the inlet temperature sensor 64, becomes the target value. Furthermore, the approach for controlling the valve opening degree of the first indoor expansion valve 33 and the second indoor expansion valve 38 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the first indoor expansion valve 33 is evaporated in the first indoor heat exchanger 31, and the refrigerant that has been decompressed by the second indoor expansion valve 38 is evaporated in the second indoor heat exchanger 36, and after being combined, they flow into the gas-side refrigerant communication piping 5. The refrigerant that has flowed through the gas-side refrigerant communication piping 5 passes through the gas-side shut-off valve 28 and the four-way switching valve 22, and is combined with the refrigerant that has flowed through the inhalation injection piping 40. The combined refrigerant passes through the low-pressure receiver 41 and is again inhaled into the compressor 21. Note that, in the low-pressure receiver 41, the liquid refrigerant that could not be fully evaporated in the first indoor heat exchanger 31, the second indoor heat exchanger 36, and the subcooling heat exchanger 47 is stored as excess refrigerant.

(5-1-4-2) Heating Operation Mode

In the heating operation mode of the air conditioning device 1, capacity control is performed on the operation frequency of the compressor 21 such that, for example, the condensation temperature of the refrigerant in the refrigerant circuit 10 becomes the target condensation temperature. Here, it is preferable that the target condensation temperature is determined depending on the largest difference between a preset temperature and the indoor temperature in each indoor unit 30 or 35 (indoor unit with the largest load).

The gas refrigerant that has been discharged from the compressor 21 flows through the four-way switching valve 22 and the gas-side refrigerant communication piping 5, and then a part of the refrigerant flows into the gas-side end of the first indoor heat exchanger 31 of the first indoor unit 30 and is condensed in the first indoor heat exchanger 31, and another part of the refrigerant flows into the gas-side end of the second indoor heat exchanger 36 of the second indoor unit 35 and is condensed in the second indoor heat exchanger 36.

Note that, in the first indoor expansion valve 33 of the first indoor unit 30, the valve opening degree is controlled so as to satisfy predetermined conditions, for example, the degree of subcooling of the refrigerant flowing through the liquid side of the first indoor heat exchanger 31 becomes the predetermined target value. In the second indoor expansion valve 38 of the second indoor unit 35 as well, the valve opening degree is controlled so as to satisfy predetermined conditions, for example, the degree of subcooling of the refrigerant flowing through the liquid side of the second indoor heat exchanger 36 becomes the predetermined target value.

The refrigerant that has been decompressed by the first indoor expansion valve 33 and the refrigerant that has been decompressed by the second indoor expansion valve 38 are combined, flow through the liquid-side refrigerant communication piping 6, and flow into the outdoor unit 20.

The refrigerant that has passed through the liquid-side shut-off valve 29 of the outdoor unit 20 flows through the subcooling heat exchanger 47, and is then decompressed in the outdoor expansion valve 24. Here, the valve opening degree of the outdoor expansion valve 24 is controlled so as to satisfy predetermined conditions, for example, the degree of superheating of the refrigerant flowing through the inlet side of the compressor 21 becomes the target value. Note that the approach for controlling the valve opening degree of the outdoor expansion valve 24 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

Note that, in the heating operation mode, the subcooling expansion valve 48 provided in the inhalation injection piping 40 is controlled to be in a fully closed state, and therefore, the refrigerant does not flow through the inhalation injection piping 40 and heat exchange in the subcooling heat exchanger 47 is not carried out as well.

The refrigerant that has been decompressed by the outdoor expansion valve 24 is evaporated in the outdoor heat exchanger 23, passes through the four-way switching valve 22 and the low-pressure receiver 41, and is again inhaled into the compressor 21. Note that, in the low-pressure receiver 41, the liquid refrigerant that could not be fully evaporated in the outdoor heat exchanger 23 is stored as excess refrigerant.

(5-1-5) Characteristics of First Embodiment

In the air conditioning device 1 mentioned above, a refrigerant containing 1,2-difluoroethylene is used, which makes it possible to keep the GWP sufficiently small.

Also, in the air conditioning device 1, the inhalation injection piping 40 makes it possible to lower the temperature of the refrigerant that is to be inhaled into the compressor 21, and therefore, the operation efficiency in the refrigeration cycle can be improved.

(5-1-6) Modification A of First Embodiment

In the above first embodiment, the air conditioning device in which multiple indoor units are connected in parallel has been described as an example, but the air conditioning device may be one in which one indoor unit is connected in series.

(5-1-7) Modification B of First Embodiment

In the above first embodiment, the air conditioning device 1 comprising the inhalation injection piping 40, through which the refrigerant flows to the subcooling heat exchanger 47 and is then sent to the inlet side of the compressor 21, has been described as an example.

Figure 5C:
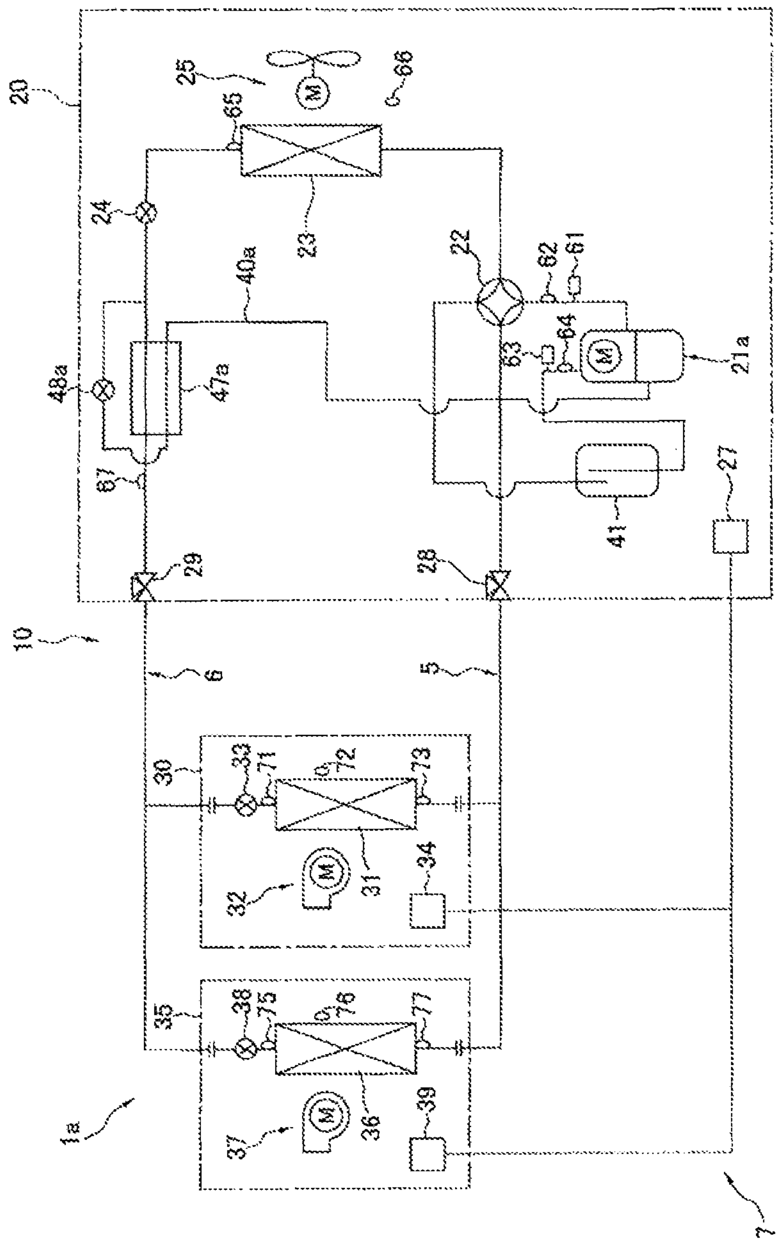
FIG. 5C is a schematic configuration diagram of a refrigerant circuit according to modification B of the first embodiment of the technology of the fifth group.

In contrast, the air conditioning device may be, for example, an air conditioning device 1*a* comprising economizer injection piping 40*a* through which the refrigerant flows to an economizer heat exchanger 47*a* and is then sent to the intermediate pressure region of a compressor 21*a*, as shown in FIG. 5C.

The economizer injection piping 40*a* is piping that branches off from the part between the outdoor expansion valve 24 and the liquid-side shut-off valve 29 in the main circuit of the refrigerant circuit 10, and extends to the intermediate pressure region of the compressor 21*a*. In the middle of the economizer injection piping 40*a*, an economizer expansion valve 48*a* is provided, whose valve opening degree can be controlled.

The economizer heat exchanger 47*a* is a heat exchanger that causes heat exchange between the refrigerant that branches off from the main circuit of the refrigerant circuit 10 and flows through the economizer injection piping 40*a* and that has been decompressed in the economizer expansion valve 48*a*, and the refrigerant that flows between the outdoor expansion valve 24 and the liquid-side shut-off valve 29 in the main circuit of the refrigerant circuit 10.

Figure 5D:
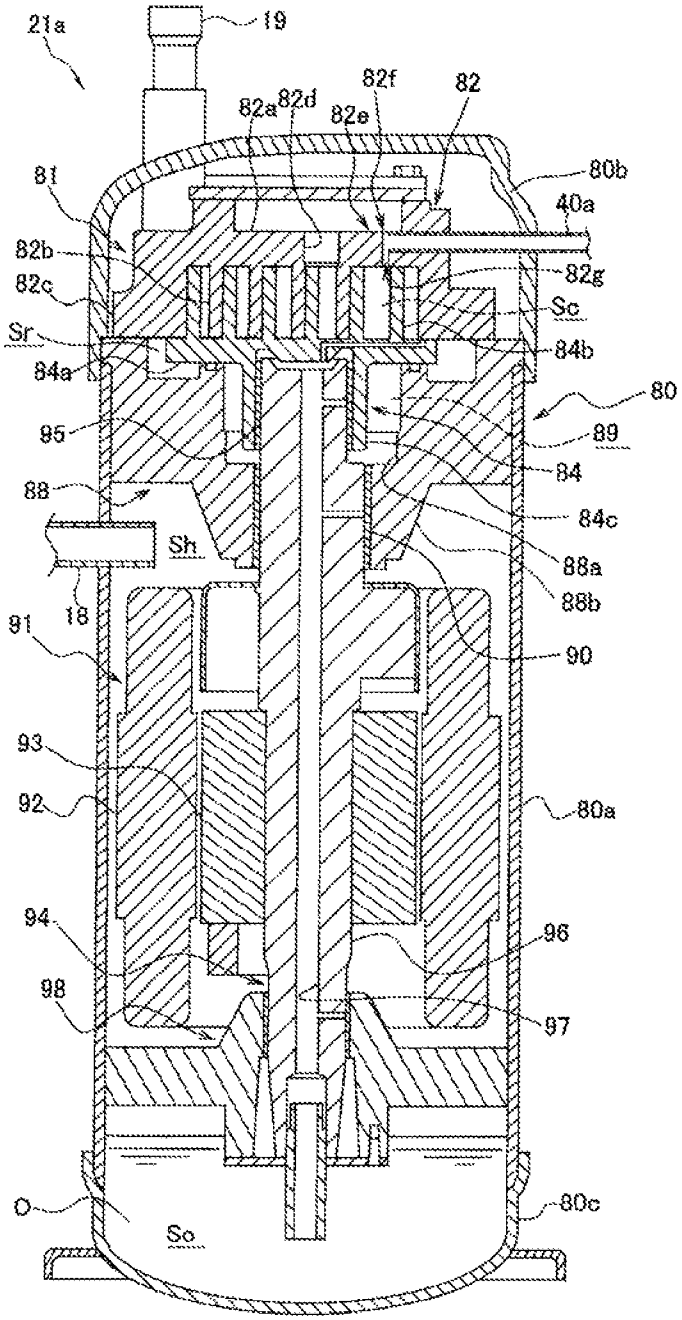
FIG. 5D is a cross section in the side view showing the schematic configuration of a compressor according to modification B of the first embodiment of the technology of the fifth group.

The compressor 21*a* is not limited, but for example, a scroll compressor, as shown in FIG. 5D, can be used.

This compressor 21*a* comprises a casing 80, a scroll compression mechanism 81 including a fixed scroll 82, a drive motor 91, a crank shaft 94, and a lower bearing 98.

The casing 80 has a cylindrical member 80*a* that is open at the top and bottom and has an approximately cylindrical shape, and an upper lid 80*b* and a lower lid 80*c* that are provided at the upper end and lower end of the cylindrical member 80*a*, respectively. The cylindrical member 80*a* and the upper lid 80*b* and lower lid 80*c* are fixed by welding so as to maintain airtightness. The casing 80 accommodates the constituent equipment of the compressor 21*a*, including the scroll compression mechanism 81, the drive motor 91, the crank shaft 94, and the lower bearing 98. Also, an oil reservoir space So is formed at the bottom of the casing 80. In the oil reservoir space So, refrigerator oil O for lubricating the scroll compression mechanism 81 and the like is stored. At the top of the casing 80, an inlet pipe 19, which inhales the low-pressure gas refrigerant in the refrigeration cycle of the refrigerant circuit 10 and supplies the gas refrigerant to the scroll compression mechanism 81, is provided penetrating the upper lid 80*b*. The lower end of the inlet pipe 19 is connected to the fixed scroll 82 of the scroll compression mechanism 81. The inlet pipe 19 is in communication with a compression chamber Sc of the scroll compression mechanism 81, which will be mentioned later. In a middle section of the cylindrical member 80*a* of the casing 80, a discharge pipe 18 is provided through which the refrigerant to be discharged outside the casing 80 passes. The discharge pipe 18 is arranged such that the end of the discharge pipe 18 inside the casing 80 protrudes into a high-pressure space Sh formed below a housing 88 of the scroll compression mechanism 81. Through the discharge pipe 18, the high-pressure refrigerant in the refrigeration cycle after compression by the scroll compression mechanism 81 flows. On the side of the upper lid 80*b* of the casing 80, an injection connection hole is provided, and the economizer injection piping 40*a* is connected at this injection connection hole.

The scroll compression mechanism 81 mainly has the housing 88, the fixed scroll 82 arranged above the housing 88, and a movable scroll 84, which is combined with the fixed scroll 82 to form the compression chamber Sc.

The fixed scroll 82 has a flat plate-shaped fixed side mirror plate 82*a*, a spiral-shaped fixed side wrap 82*b* projecting from the front surface of the fixed side mirror plate 82*a*, and an outer edge 82*c* surrounding the fixed side wrap 82*b*. At the center of the fixed side mirror plate 82*a*, a non-circular discharge hole 82*d*, which is in communication with the compression chamber Sc of the scroll compression mechanism 81, is formed penetrating the fixed side mirror plate 82*a* in the thickness direction. The refrigerant that has been compressed in the compression chamber Sc is discharged from the discharge hole 82*d*, passes through a refrigerant passage not shown in the figure formed in the fixed scroll 82 and housing 88, and flows into the high-pressure space Sh. Also, on the fixed side mirror plate 82*a*, a supply passage 82*e* is formed, which opens at the side of the fixed side mirror plate 82*a* and is in communication with the compression chamber Sc. Through this supply passage 82*e*, the intermediate pressure refrigerant that has flowed through the economizer injection piping 40*a* is supplied to the compression chamber Sc. The supply passage 82*e* has a horizontal passage section 82*f* that extends in the horizontal direction from the opening at the side of the fixed side mirror plate 82*a* toward the central side of the fixed side mirror plate 82*a*. In addition, the supply passage 82*e* has an injection port 82*g*, which extends from the part of the horizontal passage section 82*f* on the central side of the fixed side mirror plate 82*a* (the vicinity of the end of the horizontal passage section 82*f* on the central side of the fixed side mirror plate 82*a*) toward the compression chamber Sc and is in direct communication with the compression chamber Sc. The injection port 82*g* is a circular hole.

The movable scroll 84 has a flat plate-shaped movable side mirror plate 84*a*, a spiral-shaped movable side wrap 84*b* protruding from the front surface of the movable side mirror plate 84*a*, and a cylindrically formed boss section 84*c* protruding from the rear surface of the movable side mirror plate 84*a*. The fixed side wrap 82*b* of the fixed scroll 82 and the movable side wrap 84*b* of the movable scroll 84 are assembled in a state where the lower surface of the fixed side mirror plate 82*a* and the upper surface of the movable side mirror plate 84*a* face each other. The compression chamber Sc is formed between the adjacent fixed side wrap 82*b* and movable side wrap 84*b*. As will be mentioned later, the volume of the compression chamber Sc is periodically changed as the movable scroll 84 is revolved relative to the fixed scroll 82, and the refrigerant is inhaled, compressed, and discharged in the scroll compression mechanism 81. The boss section 84*c* is a cylindrical part with the upper end blocked. By inserting an eccentric section 95 of the crank shaft 94, which will be mentioned later, into the hollow section of the boss section 84*c*, the movable scroll 84 and the crank shaft 94 are coupled. The boss section 84*c* is arranged in an eccentric section space 89 formed between the movable scroll 84 and the housing 88. The eccentric section space 89 is in communication with the high-pressure space Sh via an oil supply route 97 or the like of the crank shaft 94, which will be mentioned later, and a high pressure acts on the eccentric section space 89. This pressure pushes the lower surface of the movable side mirror plate 84*a* in the eccentric section space 89 upward toward the fixed scroll 82. Due to this force, the movable scroll 84 comes into close contact with the fixed scroll 82. The movable scroll 84 is supported by the housing 88 via an oldham ring arranged in an "oldham ring space Sr". The oldham ring is a member that prevents rotation of the movable scroll 84 and makes it revolved. By using the oldham ring, when the crank shaft 94 is rotated, the movable scroll 84 coupled to the crank shaft 94 at the boss section 84*c* is revolved without being rotated relative to the fixed scroll 82, and the refrigerant in the compression chamber Sc is compressed.

The housing 88 is press-fitted into the cylindrical member 80*a* and is fixed to the cylindrical member 80*a* over the entire circumferential direction at its outer circumferential surface. Also, the housing 88 and the fixed scroll 82 are fixed by a bolt or the like, not shown in the figure, such that the upper end surface of the housing 88 is in close contact with the lower surface of the outer edge 82*c* of the fixed scroll 82. In the housing 88, a recessed section 88*a* arranged to be recessed in the center of the upper surface and a bearing section 88*b* arranged below the recessed section 88*a* are formed. The recessed section 88*a* surrounds the side of the eccentric section space 89 where the boss section 84*c* of the movable scroll 84 is arranged. A bearing 90, which journals a main axis 96 of the crank shaft 94, is arranged in the bearing section 88*b*. The bearing 90 rotatably supports the main axis 96, which is inserted into the bearing 90. Also, in the housing 88, the oldham ring space Sr is formed where the oldham ring is arranged.

The drive motor 91 has an annular stator 92 fixed to the inner wall of the cylindrical member 80*a*, and a rotor 93 accommodated rotatably inside the stator 92 with a small gap (air gap passage). The rotor 93 is coupled to the movable scroll 84 via the crank shaft 94, which is arranged to extend in the vertical direction along the axial center of the cylindrical member 80*a*. As the rotor 93 is rotated, the movable scroll 84 is revolved relative to the fixed scroll 82.

The crank shaft 94 transmits the drive force of the drive motor 91 to the movable scroll 84. The crank shaft 94 is arranged to extend in the vertical direction along the axial center of the cylindrical member 80*a*, and couples the rotor 93 of the drive motor 91 and the movable scroll 84 of the scroll compression mechanism 81. The crank shaft 94 has the main axis 96, whose central axis coincides with the axial center of the cylindrical member 80*a*, and the eccentric section 95, which is eccentric to the axial center of the cylindrical member 80*a*. As previously mentioned, the eccentric section 95 is inserted into the boss section 84*c* of the movable scroll 84. The main axis 96 is rotatably supported by the bearing 90 of the bearing section 88*b* of the housing 88 and the lower bearing 98, which will be mentioned later. The main axis 96 is coupled to the rotor 93 of the drive motor 91 between the bearing section 88*b* and the lower bearing 98. Inside the crank shaft 94, the oil supply route 97 is formed for supplying refrigerator oil O to the scroll compression mechanism 81 and the like. The lower end of the main axis 96 is located in the oil reservoir space So formed at the bottom of the casing 80, and refrigerator oil O in the oil reservoir space So is supplied to the scroll compression mechanism 81 and the like through the oil supply route 97.

The lower bearing 98 is arranged below the drive motor 91. The lower bearing 98 is fixed to the cylindrical member 80*a*. The lower bearing 98 constitutes the bearing on the lower end side of the crank shaft 94 and rotatably supports the main axis 96 of the crank shaft 94.

Next, the motion of the compressor 21*a* will be described.

When the drive motor 91 is started, the rotor 93 is rotated relative to the stator 92, and the crank shaft 94 fixed to the rotor 93 is rotated. As the crank shaft 94 is rotated, the movable scroll 84, which is coupled to the crank shaft 94, is revolved relative to the fixed scroll 82. Then, the low-pressure gas refrigerant in the refrigeration cycle passes through the inlet pipe 19 and is inhaled into the compression chamber Sc from the periphery side of the compression chamber Sc. As the movable scroll 84 is revolved, the inlet pipe 19 becomes out of communication with the compression chamber Sc. Then, as the volume of the compression chamber Sc is decreased, the pressure in the compression chamber Sc begins to rise.

In the compression chamber Sc in the middle of compression, the intermediate pressure refrigerant that has flowed through the economizer injection piping 40*a* is supplied to the compression chamber Sc via the horizontal passage section 82*f* and the injection port 82*g*.

As the compression of refrigerant progresses, the compression chamber Sc becomes out of communication with the injection port 82*g*. The refrigerant in the compression chamber Sc is compressed as the volume of the compression chamber Sc is decreased, and finally becomes a high-pressure gas refrigerant. The high-pressure gas refrigerant is discharged from the discharge hole 82*d* located near the center of the fixed side mirror plate 82*a*. Thereafter, the high-pressure gas refrigerant passes through a refrigerant passage not shown in the figure formed in the fixed scroll 82 and housing 88, and flows into the high-pressure space Sh. The high-pressure gas refrigerant in the refrigeration cycle that has been flowed into the high-pressure space Sh after compression by the scroll compression mechanism 81 is discharged from the discharge pipe 18.

In this air conditioning device 1*a*, as the refrigerant that has flowed through the economizer injection piping 40*a* merges into the intermediate pressure region of the compressor 21*a*, it is possible to lower the temperature of the intermediate pressure refrigerant of the compressor 21*a*, and therefore, the operation efficiency in the refrigeration cycle can be improved.

(5-1-8) Modification C of First Embodiment

In modification B of the above first embodiment, the scroll compressor has been described as an example of the compressor.

In contrast, the compressor used in the first embodiment may be a compressor 21*b*, which is a rotary compressor described in the second embodiment mentioned below.

(5-2) Second Embodiment

Figure 5E:
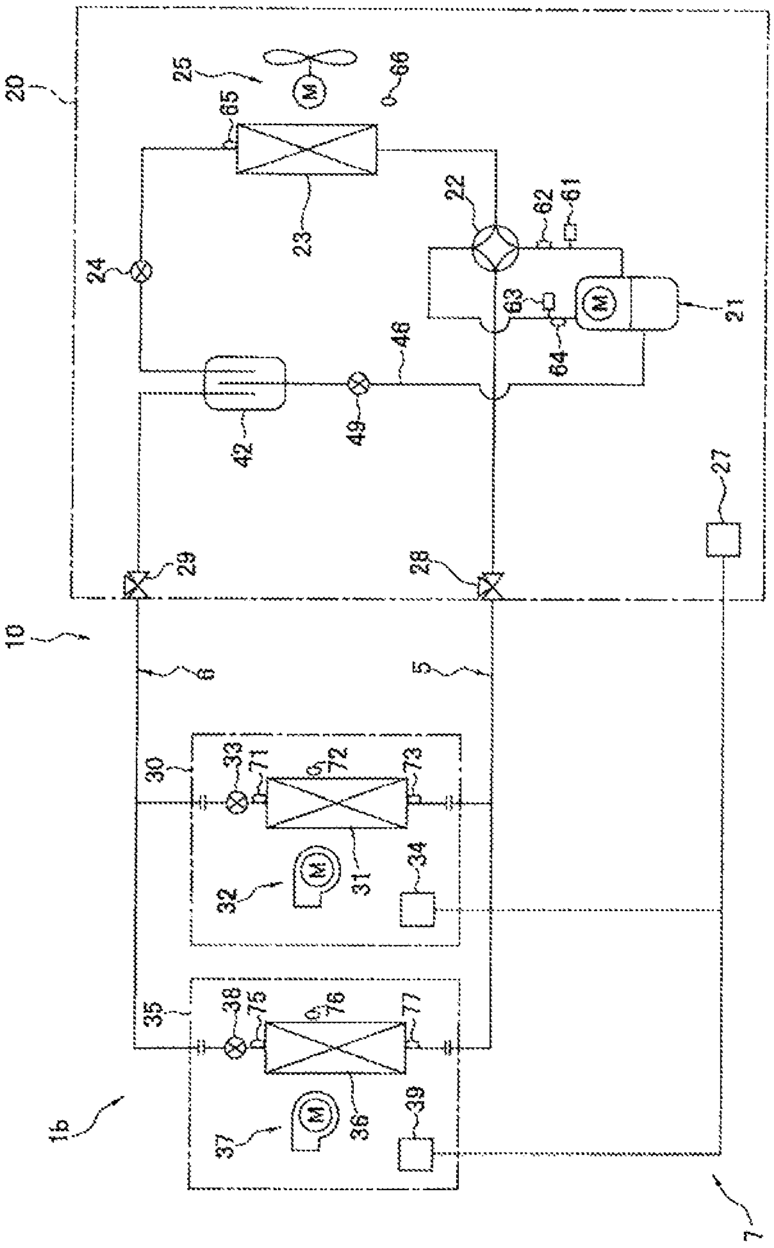
FIG. 5E is a schematic configuration diagram of a refrigerant circuit according to a second embodiment of the technology of the fifth group.
Figure 5F:
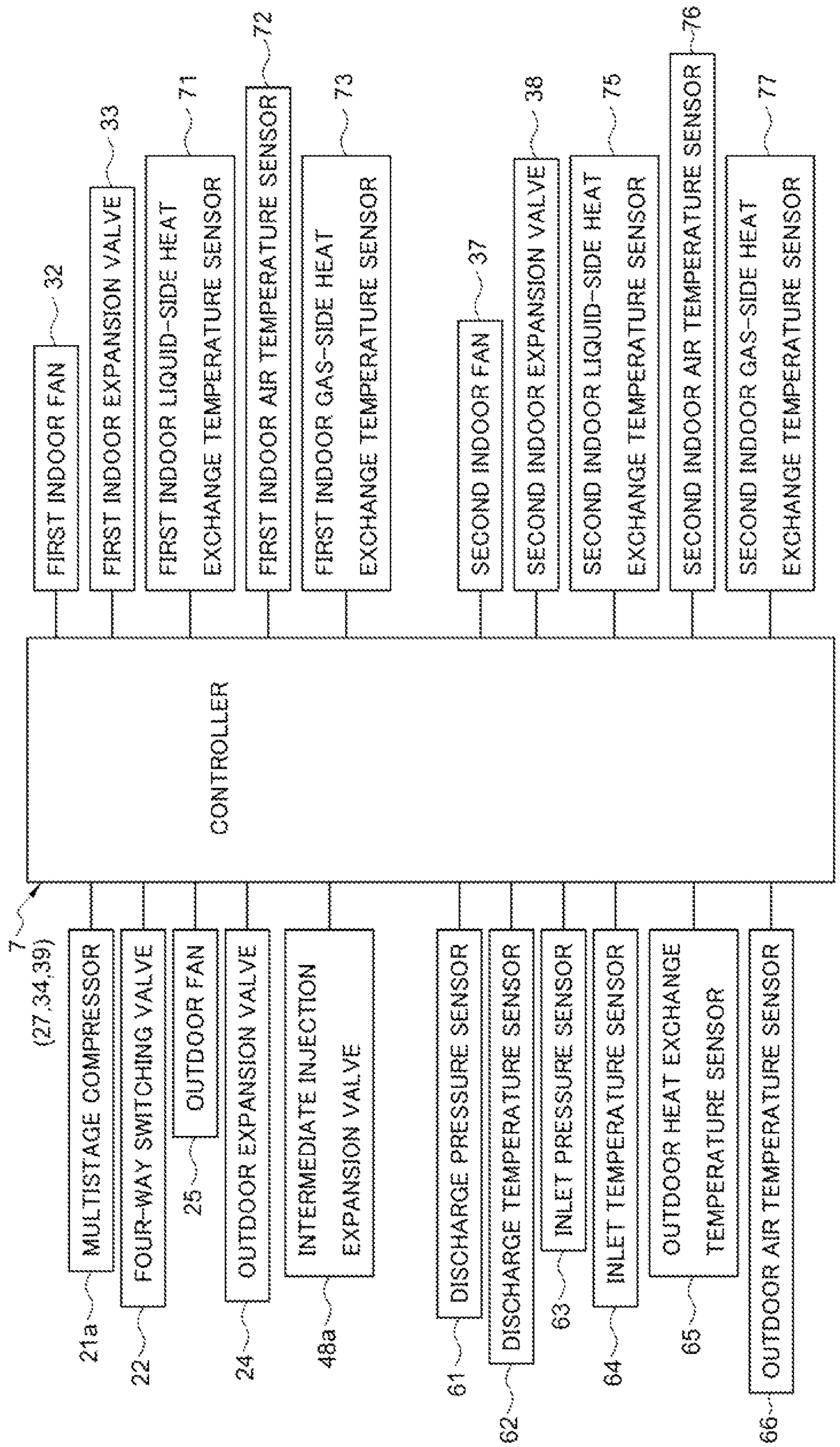
FIG. 5F is a schematic control block configuration diagram of a refrigeration cycle device according to the second embodiment of the technology of the fifth group.

Hereinafter, while referring to FIG. 5E, which is a schematic configuration diagram of a refrigerant circuit, and FIG. 5F, which is a schematic control block configuration diagram, an air conditioning device 1*b* as a refrigeration cycle device according to the second embodiment will be described.

In the following, as for the air conditioning device 1*b* of the second embodiment, description will be mainly focused on the differences from the air conditioning device 1 of the first embodiment.

In the air conditioning device 1*b* as well, the refrigerant circuit 10 is filled with any Refrigerant A, which is a mixed refrigerant containing 1,2-difluoroethylene, as the refrigerant for carrying out a vapor compression type refrigeration cycle. The refrigerant circuit 10 is also filled with a refrigerator oil together with that refrigerant.

(5-2-1) Outdoor Unit 20

In an outdoor unit 20 of the air conditioning device 1*b* of the second embodiment, the compressor 21, the low-pressure receiver 41, the inhalation injection piping 40, the subcooling expansion valve 48, the subcooling heat exchanger 47, and the subcooling temperature sensor 67 of the outdoor unit 20 in the above first embodiment are not provided, and instead, a compressor 21*b*, a high-pressure receiver 42, intermediate injection piping 46, and an intermediate injection expansion valve 49 are provided.

The high-pressure receiver 42 is provided in the main flow path of the refrigerant circuit 10 between the outdoor expansion valve 24 and the liquid-side shut-off valve 29. The high-pressure receiver 42 is a container that is capable of storing the refrigerant, with both the end of piping extending from the side of the outdoor expansion valve 24 and the end of piping extending from the side of the liquid-side shut-off valve 29 located in the internal space thereof.

The intermediate injection piping 46 is piping that extends from the gas region of the internal space of the high-pressure receiver 42 and is connected to the intermediate pressure region of the compressor 21*b*. The intermediate injection expansion valve 49 is provided in the middle of the intermediate injection piping 46, and its valve opening degree can be controlled.

(5-2-2) Indoor Unit 30

Since a first indoor unit 30 and a second indoor unit 35 of the second embodiment are the same as those of the first embodiment, description will be omitted.

(5-2-3) Cooling Operation Mode and Heating Operation Mode

As for the above air conditioning device 1*b*, in the cooling operation mode, the outdoor expansion valve 24 is controlled such that the degree of subcooling of the refrigerant passing through the liquid-side outlet of the outdoor heat exchanger 23 satisfies predetermined conditions, for example. Also, the intermediate injection expansion valve 49 is controlled so as to reduce the pressure of the refrigerant that has flowed from the high-pressure receiver 42 until it reaches the intermediate pressure in the compressor 21*b*.

Moreover, in the heating operation mode, the outdoor expansion valve 24 is controlled such that the degree of superheating of the refrigerant inhaled by the compressor 21*b* satisfies predetermined conditions, for example. Also, the intermediate injection expansion valve 49 is controlled so as to reduce the pressure of the refrigerant that has flowed from the high-pressure receiver 42 until it reaches the intermediate pressure in the compressor 21*b*.

(5-2-4) Compressor 21*b*

Figure 5G:
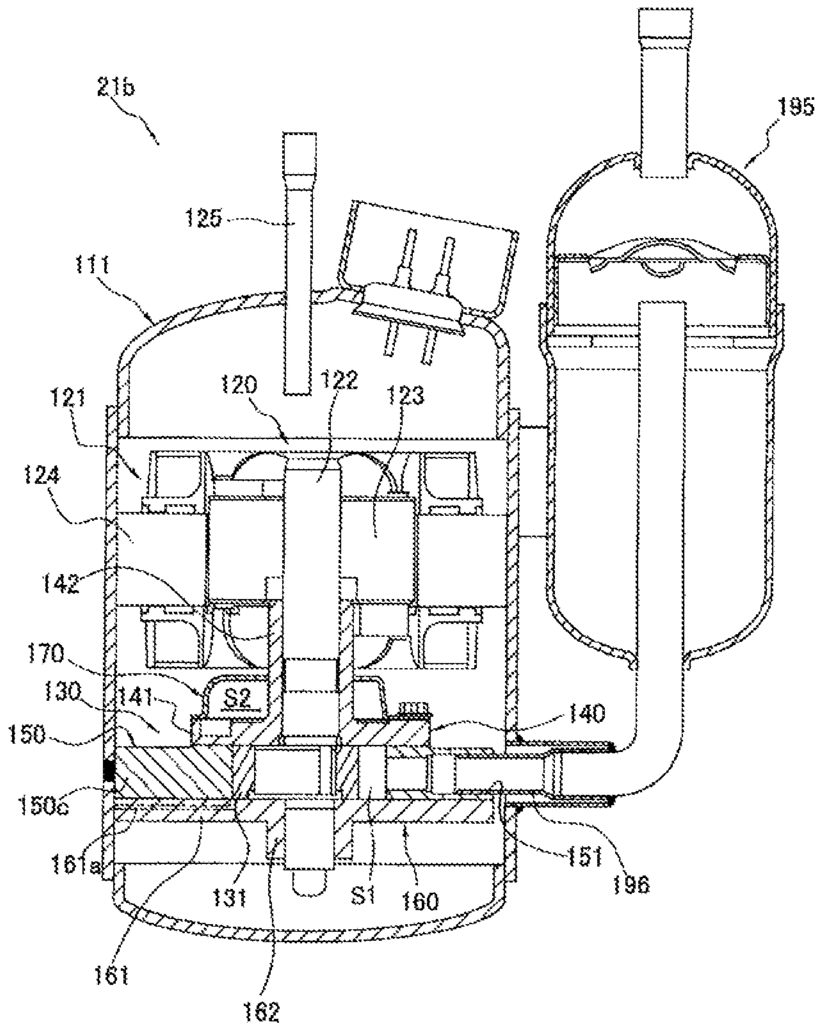
FIG. 5G is a cross section in the side view showing the schematic configuration of a compressor according to the second embodiment of the technology of the fifth group.

As shown in FIG. 5G, the compressor 21*b* is a one cylinder-type rotary compressor, and is a rotary compressor that comprises a casing 111, and a drive mechanism 120 and a compression mechanism 130 arranged in the casing 111. As for this compressor 21*b*, the compression mechanism 130 is arranged below the drive mechanism 120 in the casing 111.

(5-2-4-1) Drive Mechanism

The drive mechanism 120 is accommodated in an upper part of the internal space of the casing 111 and drives the compression mechanism 130. The drive mechanism 120 has a motor 121 that serves as the drive source, and a crank shaft 122 that is the drive shaft attached to the motor 121.

The motor 121 is a motor for rotationally driving the crank shaft 122, and mainly has a rotor 123 and a stator 124. The rotor 123 has the crank shaft 122 fitted in its internal space, and is rotated together with the crank shaft 122. The rotor 123 is made up of stacked electromagnetic steel plates and a magnet embedded in the rotor body. The stator 124 is arranged outside the rotor 123 in the radial direction via a predetermined space. The stator 124 is made up of stacked electromagnetic steel plates and a coil wound on the stator body. The motor 121 rotates the rotor 123 together with the crank shaft 122 by the electromagnetic force generated in the stator 124 by running electric current through the coil.

Figure 5H:
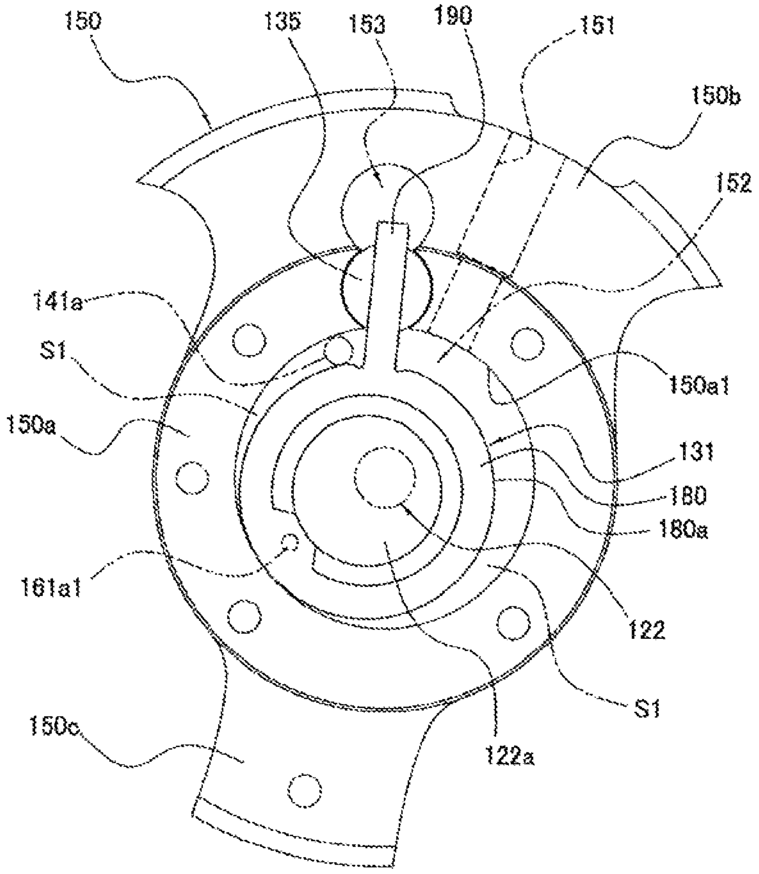
FIG. 5H is a cross section in the plan view showing the periphery of a cylinder chamber of the compressor according to the second embodiment of the technology of the fifth group.

The crank shaft 122 is fitted in the rotor 123 and is rotated around the rotation axis. Also, a crank pin 122*a*, which is the eccentric section of the crank shaft 122, is inserted into a roller 180 (which will be mentioned later) of a piston 131 of the compression mechanism 130, as shown in FIG. 5H, and is fitted into the roller 180 in a state where the rotational force from the rotor 123 can be transmitted. The crank shaft 122 is rotated to follow the rotation of the rotor 123, eccentrically rotates the crank pin 122*a*, and revolves the roller 180 of the piston 131 of the compression mechanism 130. That is, the crank shaft 122 has a function of transmitting the drive force of the motor 121 to the compression mechanism 130.

(5-2-4-2) Compression Mechanism

The compression mechanism 130 is accommodated on the lower side inside the casing 111. The compression mechanism 130 compresses the refrigerant that has been inhaled via an inlet pipe 196. The compression mechanism 130 is a rotary-type compression mechanism, and is mainly made up of a front head 140, a cylinder 150, a piston 131, and a rear head 160. Also, the refrigerant that has been compressed in a compression chamber S1 of the compression mechanism 130 is discharged from a front head discharge hole 141*a* formed in the front head 140, through a muffler space S2 surrounded by the front head 140 and a muffler 170, and into a space where the motor 121 is arranged and the lower end of a discharge pipe 125 is located.

(5-2-4-2-1) Cylinder

The cylinder 150 is a casting member made of a metal. The cylinder 150 has a cylindrical central section 150*a*, a first outer extension section 150*b* that extends from the central section 150*a* to the side of an accompanying accumulator 195, and a second outer extension section 150*c* that extends from the central section 150*a* to the opposite side of the first outer extension section 150*b*. In the first outer extension section 150*b*, an inlet hole 151 is formed for inhaling the low-pressure refrigerant in the refrigeration cycle. A cylindrical space inside an inner circumferential surface 150*a*1 of the central section 150*a* becomes a cylinder chamber 152 into which the refrigerant inhaled from the inlet hole 151 flows. The inlet hole 151 extends from the cylinder chamber 152 toward the outer circumferential surface of the first outer extension section 150*b* and opens at the outer circumferential surface of the first outer extension section 150*b*. Into this inlet hole 151, the tip section of the inlet pipe 196 extending from the accumulator 195 is inserted. Also, in the cylinder chamber 152, the piston 131 for compressing the refrigerant that has flowed into the cylinder chamber 152 and the like are accommodated.

As for the cylinder chamber 152 formed by the cylindrical central section 150*a* of the cylinder 150, a first end, which is its lower end, opens, and a second end, which is its upper end, also opens. The lower end of the central section 150*a*, the first end, is blocked by the rear head 160, which will be mentioned later. Also, the upper end of the central section 150*a*, the second end, is blocked by the front head 140, which will be mentioned later.

In addition, in the cylinder 150, a blade swinging space 153 is formed in which a bush 135 and a blade 190, which will be mentioned later, are arranged. The blade swinging space 153 is formed across the central section 150*a* and the first outer extension section 150*b*, and the blade 190 of the piston 131 is swingably supported by the cylinder 150 via the bush 135. The blade swinging space 153 is formed, in plan, in the vicinity of the inlet hole 151, extending from the cylinder chamber 152 toward the outer circumference side.

(5-2-4-2-2) Front Head

As shown in FIG. 5G, the front head 140 has a front head disc section 141 that occludes the opening at the second end, which is the upper end of the cylinder 150, and a front head boss section 142 that extends upward from the periphery of the front head opening at the center of the front head disc section 141. The front head boss section 142 is in the shape of a cylinder and functions as the bearing for the crank shaft 122.

On the front head disc section 141, the front head discharge hole 141*a* is formed at the plan position shown in FIG. 5H. From the front head discharge hole 141*a*, the refrigerant that has been compressed in the compression chamber S1, whose volume is changed in the cylinder chamber 152 of the cylinder 150, is discharged intermittently. On the front head disc section 141, a discharge valve for opening and closing the outlet of the front head discharge hole 141*a* is provided. This discharge valve opens due to the pressure difference when the pressure in the compression chamber S1 becomes higher than the pressure in the muffler space S2, and discharges the refrigerant from the front head discharge hole 141*a* to the muffler space S2.

(5-2-4-2-3) Muffler

The muffler 170 is attached to the upper surface of the periphery of the front head disc section 141 of the front head 140, as shown in FIG. 5G. The muffler 170 forms the muffler space S2 together with the upper surface of the front head disc section 141 and the outer circumferential surface of the front head boss section 142 in an attempt to reduce the noise associated with the discharge of refrigerant. The muffler space S2 and the compression chamber S1 are in communication via the front head discharge hole 141*a* when the discharge valve is open, as mentioned above.

Also, in the muffler 170, a central muffler opening that penetrates the front head boss section 142 and a muffler discharge hole that flows refrigerant from the muffler space S2 to the accommodation space of the motor 121 upward are formed.

Note that the muffler space S2, the accommodation space of the motor 121, the space above the motor 121 where the discharge pipe 125 is located, and the space below the compression mechanism 130 where the lubricating oil is stored are all linked together to form a high-pressure space with an equal pressure.

(5-2-4-2-4) Rear Head

The rear head 160 has a rear head disc section 161 that occludes the opening at the first end, which is the lower end of the cylinder 150, and a rear head boss section 162 as a bearing that extends downward from the periphery of the central opening of the rear head disc section 161. As shown in FIG. 5H, the front head disc section 141, the rear head disc section 161, and the central section 150*a* of the cylinder 150 form the cylinder chamber 152. The front head boss section 142 and the rear head boss section 162 are cylinder-shaped boss sections and journal the crank shaft 122.

In the rear head disc section 161, a supply flow path 161*a* is formed. The supply flow path 161*a* is linked to a hole for injection (not shown in the figure) drilled on the casing 111, and is linked to the intermediate injection piping 46. The supply flow path 161*a* extends horizontally from the hole for injection on the casing 111 toward the rotation axis CA of the crank shaft 122, bends upward in the middle, and opens on the upper surface of the rear head disc section 161. This outlet opening 161*a*1 of the supply flow path 161*a* opens at the plan position shown by the two-dot chain line in FIG. 5H. That is, the outlet opening 161*a*1 of the supply flow path 161*a* opens to the cylinder chamber 152 inside the inner circumferential surface 150*a*1 of the central section 150*a* of the cylinder 150. This supply flow path 161*a* plays a role of flowing the intermediate pressure refrigerant introduced from outside the compressor 21*b* to the compression chamber S1, whose volume is changed in the cylinder chamber 152, when the revolution angle of the roller 180 of the piston 131 is in a certain range. Accordingly, when the revolution angle of the roller 180 of the piston 131 is in a predetermined range other than the certain range mentioned above, it is blocked by a part of the lower end surface of the roller 180.

(5-2-4-2-5) Piston

The piston 131 is arranged in the cylinder chamber 152 and is outfitted to the crank pin 122*a*, which is the eccentric section of the crank shaft 122. The piston 131 is a member in which the roller 180 and the blade 190 are integrated. The blade 190 of the piston 131 is arranged in the blade swinging space 153 formed in the cylinder 150, and is swingably supported by the cylinder 150 via the bush 135, as mentioned above. Also, the blade 190 is slidable with the bush 135, and during operation, it repeatedly moves away from the crank shaft 122 and moves closer to the crank shaft 122, while also swinging.

Figure 5I:
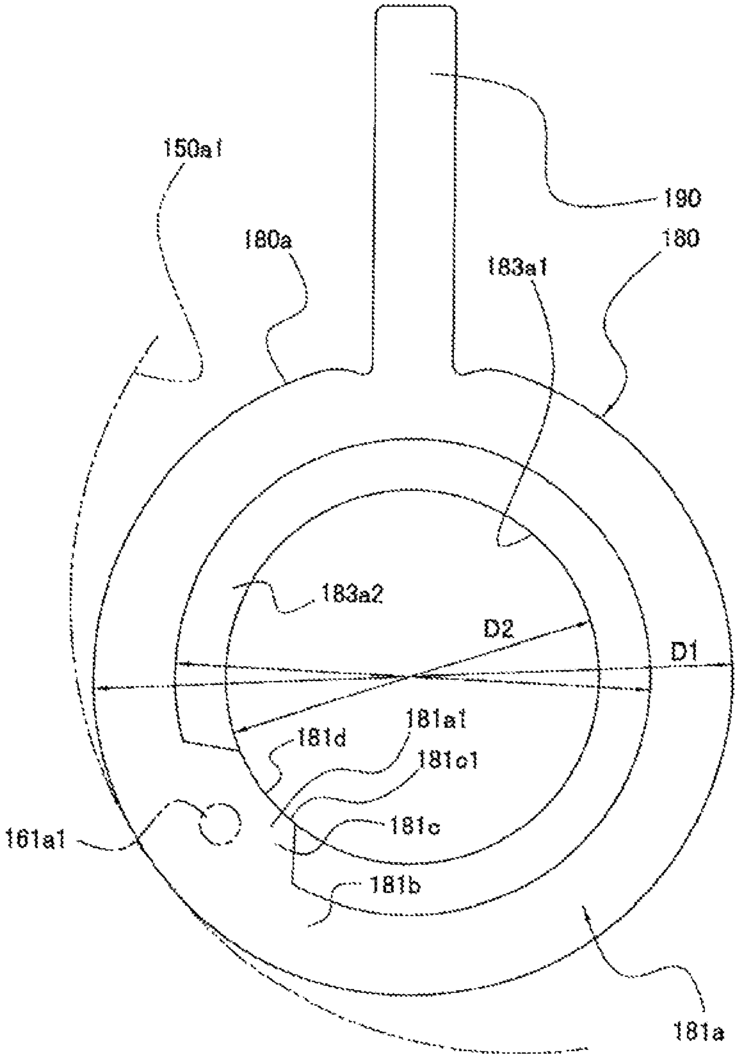
FIG. 5I is a cross section in the plan view of a piston of the compressor according to the second embodiment of the technology of the fifth group.

The roller 180 is constituted of a first end 181 where a first end surface 181*a*, which is the lower end surface of the roller, is formed, a second end 182 where a second end surface 182*a*, which is the upper end surface of the roller, is formed, and a central section 183 located between those first end 181 and second end 182. The central section 183 is a cylinder-shaped part with an inner diameter of D2 and an outer diameter of D1, as shown in FIG. 5I. The first end 181 is constituted of a cylinder-shaped first body section 181*b*, which has an inner diameter of D3 and an outer diameter of D1, and a first protruding section 181*c*, which protrudes inside from that first body section 181*b*. The outer diameter D1 of the first body section 181*b* is the same dimension as the outer diameter D1 of the central section 183. In addition, the inner diameter D3 of the first body section 181*b* is larger than the inner diameter D2 of the central section 183. The second end 182 is constituted of a cylinder-shaped second body section 182*b*, which has an inner diameter of D3 and an outer diameter of D1, and a second protruding section 182*c*, which protrudes inside from that second body section 182*b*. The outer diameter D1 of the second body section 182*b* is the same dimension as the outer diameter D1 of the central section 183, as is the outer diameter D1 of the first body section 181*b*. In addition, the inner diameter D3 of the second body section 182*b* is the same dimension as the inner diameter D3 of the first body section 181*b* and is larger than the inner diameter D2 of the central section 183. An inner surface 181*c*1 of the first protruding section 181*c* and an inner surface 182*c*1 of the second protruding section 182*c* almost overlap with an inner circumferential surface 183*a*1 of the central section 183 when viewed in the rotation axis direction of the crank shaft 122. In details, the inner surface 181*c*1 of the first protruding section 181*c* and the inner surface 182*c*1 of the second protruding section 182*c* are located slightly outside the inner circumferential surface 183*a*1 of the central section 183 in the plan view. As described above, except for the first protruding section 181*c* and the second protruding section 182*c*, the inner diameter D3 of the first body section 181*b* and the second body section 182*b* is larger than the inner diameter D2 of the central section 183, and therefore, a first stepped surface 183*a*2 is formed at a position with the height of the boundary between the first end 181 and the central section 183, and a second stepped surface 183*a*3 is formed at a position with the height of the boundary between the second end 182 and the central section 183 (see FIG. 5I).

The annular first end surface 181*a* of the first end 181 of the roller 180 is in contact with the upper surface of the rear head disc section 161 and slides with the upper surface of the rear head disc section 161. The first end surface 181*a* of the roller 180 includes a first wide surface 181*a*1 whose width in the radial direction is partially increased. The first protruding section 181*c* of the first end 181 and a part of the first body section 181*b* of the first end 181 located outside thereof form the first wide surface 181*a*1 (see FIG. 5I).

The annular second end surface 182*a* of the second end 182 of the roller 180 is in contact with the lower surface of the front head disc section 141 and slides with the lower surface of the front head disc section 141. The second end surface 182*a* of the roller 180 includes a second wide surface 182*a*1 whose width in the radial direction is partially increased. The second wide surface 182*a*1 is at the same position as the first wide surface 181*a*1 when viewed in the rotation axis direction of the crank shaft 122. The second protruding section 182*c* of the second end 182 and a part of the second body section 182*b* of the second end 182 located outside thereof form the second wide surface 182*a*1.

The roller 180 and blade 190 of the piston 131 form a compression chamber S1 whose volume is changed according to the revolution of the piston 131, in the form of partitioning the cylinder chamber 152, as shown in FIG. 5H. The compression chamber S1 is a space surrounded by the inner circumferential surface 150*a*1 of the central section 150*a* of the cylinder 150, the upper surface of the rear head disc section 161, the lower surface of the front head disc section 141, and the piston 131. The volume of the compression chamber S1 is changed following the revolution of the piston 131, and the low-pressure refrigerant sucked in from the inlet hole 151 is compressed to become high-pressure refrigerant, which is discharged from the front head discharge hole 141*a* to the muffler space S2.

(5-2-4-3) Motion

In the above compressor 121*b*, the volume of the compression chamber S1 is changed by the movement of the piston 131 of the compression mechanism 130, which is revolved by the eccentric rotation of the crank pin 122*a*. Specifically, first of all, the low-pressure refrigerant is inhaled from the inlet hole 151 into the compression chamber S1 while the piston 131 is being revolved. The volume of the compression chamber S1 facing the inlet hole 151 is gradually increased when the refrigerant is being inhaled. When the piston 131 is further revolved, the state of communication between the compression chamber S1 and the inlet hole 151 is dissolved, and refrigerant compression is started in the compression chamber S1. Thereafter, the intermediate pressure refrigerant is injected into the compression chamber S1 from the outlet opening 161*a*1 of the supply flow path 161*a*, and then the compression chamber S1, which comes into the state of communication with the front head discharge hole 141*a*, becomes much smaller in volume and the refrigerant pressure is also increased. At that time, the first wide surface 181*a*1 of the first end surface 181*a* of the roller 180 of the piston 131 blocks the outlet opening 161*a*1 of the supply flow path 161*a* of the rear head disc section 161, resulting in a state where no injection of intermediate pressure refrigerant is made into the compression chamber S1. Then, as the piston 131 is further revolved, the refrigerant, now at high pressure, pushes and opens the discharge valve from the front head discharge hole 141*a* and is discharged into the muffler space S2. The refrigerant that has been introduced into the muffler space S2 is discharged from the muffler discharge hole of the muffler 170 into the space above the muffler space S2. The refrigerant that has been discharged to the outside of the muffler space S2 passes through the space between the rotor 123 and stator 124 of the motor 121, cools the motor 121, and then is discharged from the discharge pipe 125.

(5-2-5) Characteristics of Second Embodiment

In the air conditioning device 1*b* according to the above second embodiment as well, as in the air conditioning device 1 according to the first embodiment, a refrigerant containing 1,2-difluoroethylene is used, which makes it possible to keep the GWP sufficiently small.

Also, in this air conditioning device 1*b*, as the refrigerant that has flowed through the intermediate injection piping 46 merges into the intermediate pressure region of the compressor 21*b*, it is possible to lower the temperature of the intermediate pressure refrigerant of the compressor 21*b*, and therefore, the operation efficiency in the refrigeration cycle can be improved.

(5-2-6) Modification A of Second Embodiment

In the above second embodiment, the air conditioning device in which multiple indoor units are connected in parallel has been described as an example, but the air conditioning device may be one in which one indoor unit is connected in series.

(5-2-7) Modification B of Second Embodiment

In the above second embodiment, the rotary compressor has been described as an example of the compressor 21*b*.

In contrast, the compressor used in the second embodiment may be the compressor 21*a*, which is the scroll compressor described in modification B of the first embodiment described above.

(5-2-8) Modification C of Second Embodiment

In the above second embodiment, the case where the gas refrigerant in the high-pressure receiver 42 is merged into the intermediate pressure region of the compressor 21*b* by the intermediate injection piping 46 has been described as an example.

In contrast, the gas refrigerant in the high-pressure receiver 42 in the second embodiment may be merged into the inlet side instead of the intermediate pressure region of the compressor. In this case, it is possible to improve the operation efficiency in the refrigeration cycle by lowering the temperature of the refrigerant that is to be inhaled into the compressor.

(6) EMBODIMENTS OF TECHNOLOGY OF SIXTH GROUP

(6-1) First Embodiment

Figure 6A:
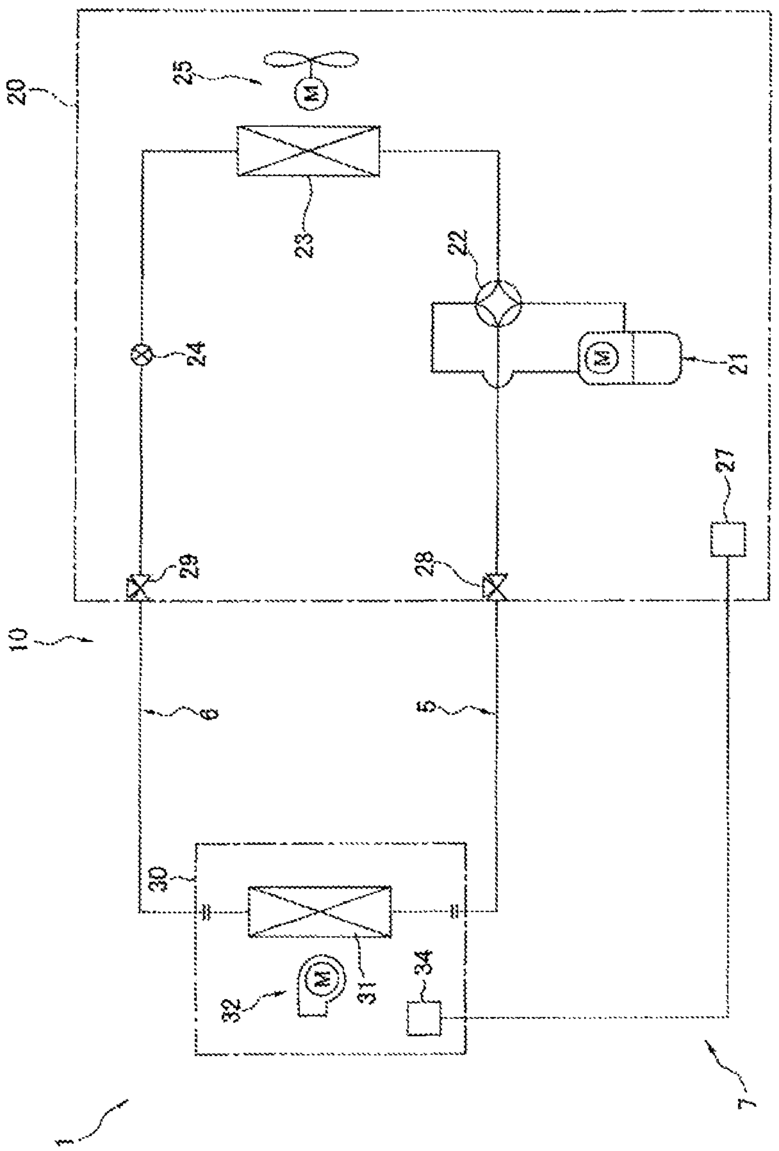
FIG. 6A is a schematic configuration diagram of a refrigerant circuit according to a first embodiment of the technology of a sixth group.
Figure 6B:
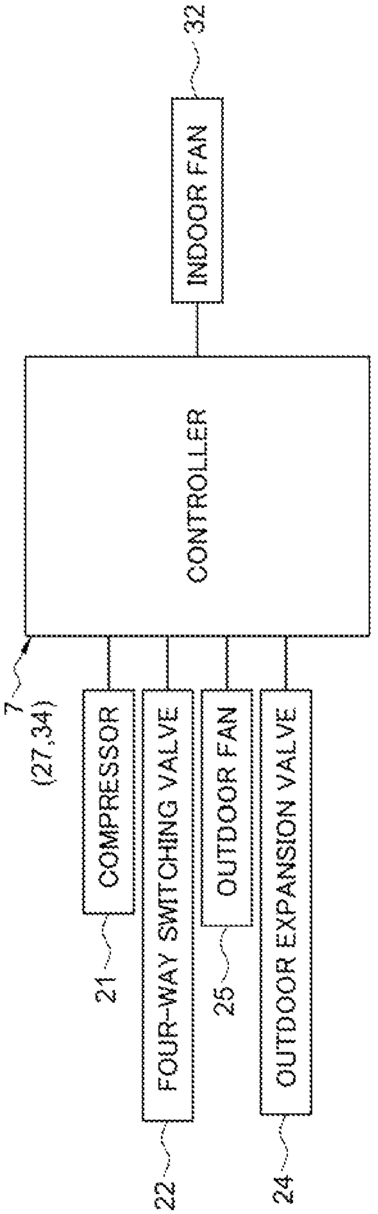
FIG. 6B is a schematic control block configuration diagram of a refrigeration cycle device according to the first embodiment of the technology of the sixth group.

Hereinafter, while referring to FIG. 6A, which is a schematic configuration diagram of a refrigerant circuit, and FIG. 6B, which is a schematic control block configuration diagram, an air conditioning device 1 as a refrigeration cycle device comprising an outdoor unit 20 as a heat source unit according to the first embodiment will be described.

The air conditioning device 1 is a device that conditions the air in the target space by carrying out a vapor compression type refrigeration cycle.

The air conditioning device 1 mainly has an outdoor unit 20, an indoor unit 30, liquid-side refrigerant communication piping 6 and gas-side refrigerant communication piping 5 that connect the outdoor unit 20 and the indoor unit 30, a remote control not shown in the figure as an input device and an output device, and a controller 7 that controls the motion of the air conditioning device 1. The design pressure of the liquid-side refrigerant communication piping 6 and the gas-side refrigerant communication piping 5 can be, for example, 4.5 MPa (3/8-inch ones) or more and 5.0 MPa (4/8-inch ones) or less.

In the air conditioning device 1, a refrigeration cycle is carried out in which a refrigerant enclosed in a refrigerant circuit 10 is compressed, cooled or condensed, decompressed, heated or evaporated, and then compressed again. In the present embodiment, the refrigerant circuit 10 is filled with a refrigerant for carrying out a vapor compression type refrigeration cycle. That refrigerant is a refrigerant containing 1,2-difluoroethylene, and any Refrigerant A can be used. The refrigerant circuit 10 is also filled with a refrigerator oil together with that refrigerant.

(6-1-1) Outdoor Unit 20

The outdoor unit 20 is in the shape of an approximately rectangular box in appearance, and has a structure (so-called trunk-type structure) in which the inside thereof is divided by a partition plate or the like to form a blower room and a machine room.

This outdoor unit 20 is connected to the indoor unit 30 via the liquid-side refrigerant communication piping 6 and the gas-side refrigerant communication piping 5, and constitutes a part of the refrigerant circuit 10. The outdoor unit 20 mainly has a compressor 21, a four-way switching valve 22, an outdoor heat exchanger 23, an outdoor expansion valve 24, an outdoor fan 25, a liquid-side shut-off valve 29, and a gas-side shut-off valve 28.

The outdoor unit 20 has a design pressure (gauge pressure) lower than 1.5 times the design pressure of the liquid-side refrigerant communication piping 6 and the gas-side refrigerant communication piping 5 (pressure resistance of the liquid-side refrigerant communication piping 6 and gas-side refrigerant communication piping 5). The design pressure of such an outdoor unit 20 can be, for example, 4.0 MPa or more and 4.5 MPa or less.

The compressor 21 is equipment that compresses a low-pressure refrigerant in the refrigeration cycle until it reaches a high pressure. Here, as the compressor 21, a compressor with a sealed structure in which a positive displacement compression element (omitted in the figure) such as a rotary type or scroll type is rotationally driven by a compressor motor is used. The compressor motor is for changing the volume, and the operation frequency can be controlled by an inverter. Note that the compressor 21 is provided with an accompanying accumulator, which is not shown in the figure, on the inlet side thereof. Note that the outdoor unit 20 of the present embodiment does not have a refrigerant container (such as a low-pressure receiver arranged on the inlet side of the compressor 21 or a high-pressure receiver arranged on the liquid side of the outdoor heat exchanger 23) that is larger than such an accompanying accumulator.

The four-way switching valve 22 can switch the state of connection between a cooling operation connection state in which the inlet side of the compressor 21 and the gas-side shut-off valve 28 are connected while connecting the discharge side of the compressor 21 and the outdoor heat exchanger 23, and a heating operation connection state in which the inlet side of the compressor 21 and the outdoor heat exchanger 23 are connected while connecting the discharge side of the compressor 21 and the gas-side shut-off valve 28.

The outdoor heat exchanger 23 is a heat exchanger that functions as a condenser for a high-pressure refrigerant in the refrigeration cycle during cooling operation and as an evaporator for a low-pressure refrigerant in the refrigeration cycle during heating operation. The outdoor heat exchanger 23 has multiple heat transfer fins and multiple heat transfer pipes penetrating and fixed to them.

The outdoor fan 25 generates an air flow for inhaling outdoor air into the outdoor unit 20, causing heat exchange between it and the refrigerant in the outdoor heat exchanger 23, and then discharging it outside. The outdoor fan 25 is rotationally driven by an outdoor fan motor. Note that, in the present embodiment, only one outdoor fan 25 is provided.

As for the outdoor expansion valve 24, its valve opening degree can be controlled, and it is provided between the liquid-side end of the outdoor heat exchanger 23 and the liquid-side shut-off valve 29.

The liquid-side shut-off valve 29 is a manual valve arranged at the connection part in the outdoor unit 20 with the liquid-side refrigerant communication piping 6.

The gas-side shut-off valve 28 is a manual valve arranged at the connection part in the outdoor unit 20 with the gas-side refrigerant communication piping 5.

The outdoor unit 20 has an outdoor unit control section 27 that controls the motion of each section that constitutes the outdoor unit 20. The outdoor unit control section 27 has a microcomputer that includes a CPU, a memory, and other elements. The outdoor unit control section 27 is connected to an indoor unit control section 34 of each indoor unit 30 via a communication line, and sends and receives control signals and the like. Also, the outdoor unit control section 27 is electrically connected to various sensors, which are not shown in the figure, and receives signals from each sensor.

This outdoor unit control section 27 (and the controller 7 including the same) is set such that the upper limit value of the control pressure (gauge pressure) of the refrigerant is lower than 1.5 times the design pressure of the liquid-side refrigerant communication piping 6 and the gas-side refrigerant communication piping 5 (pressure resistance of the liquid-side refrigerant communication piping 6 and gas-side refrigerant communication piping 5).

(6-1-2) Indoor Unit 30

The indoor unit 30 is installed on the wall or the like of a room, which is the target space. The indoor unit 30 is connected to the outdoor unit 20 via the liquid-side refrigerant communication piping 6 and the gas-side refrigerant communication piping 5, and constitutes a part of the refrigerant circuit 10. Note that the design pressure of the indoor unit 30 can be, for example, 4.0 MPa or more and 4.5 MPa or less, as in the outdoor unit 20.

The indoor unit 30 has an indoor heat exchanger 31, an indoor fan 32, and the like.

The indoor heat exchanger 31 is connected to the liquid-side refrigerant communication piping 6 on the liquid side, and its gas-side end is connected to the gas-side refrigerant communication piping 5. The indoor heat exchanger 31 is a heat exchanger that functions as an evaporator for a low-pressure refrigerant in the refrigeration cycle during cooling operation and as a condenser for a high-pressure refrigerant in the refrigeration cycle during heating operation. The indoor heat exchanger 31 has multiple heat transfer fins and multiple heat transfer pipes penetrating and fixed to them.

The indoor fan 32 generates an air flow for inhaling indoor air into the indoor unit 30, causing heat exchange between it and the refrigerant in the indoor heat exchanger 31, and then discharging it outside. The indoor fan 32 is rotationally driven by an indoor fan motor, which is not shown in the figure.

Also, the indoor unit 30 has an indoor unit control section 34 that controls the motion of each section that constitutes the indoor unit 30. The indoor unit control section 34 has a microcomputer that includes a CPU, a memory, and other elements. The indoor unit control section 34 is connected to the outdoor unit control section 27 via a communication line, and sends and receives control signals and the like.

The indoor unit control section 34 is electrically connected to various sensors provided inside the indoor unit 30, which are not shown in the figure, and receives signals from each sensor.

(6-1-3) Details of Controller 7

In the air conditioning device 1, the outdoor unit control section 27 and the indoor unit control section 34 are connected via a communication line to constitute the controller 7, which controls the motion of the air conditioning device 1.

The controller 7 mainly has a CPU (central processing unit) and a memory such as ROM or RAM. Note that the various processings and controls by the controller 7 are realized by integrated functioning of each section included in the outdoor unit control section 27 and/or the indoor unit control section 34.

(6-1-4) Operation Modes

Hereinafter, the operation modes will be described.

There are two operation modes: a cooling operation mode and a heating operation mode.

The controller 7 determines and executes whether to be in the cooling operation mode or the heating operation mode, based on an instruction received from a remote control or the like.

(6-1-4-1) Cooling Operation Mode

In the cooling operation mode, the air conditioning device 1 sets the state of connection of the four-way switching valve 22 to the cooling operation connection state, in which the inlet side of the compressor 21 and the gas-side shut-off valve 28 are connected while connecting the discharge side of the compressor 21 and the outdoor heat exchanger 23, and circulates the refrigerant filled in the refrigerant circuit 10 mainly through the compressor 21, the outdoor heat exchanger 23, the outdoor expansion valve 24, and the indoor heat exchanger 31 in this order.

More specifically, when the cooling operation mode is started, in the refrigerant circuit 10, the refrigerant is inhaled into the compressor 21, compressed, and then discharged.

In the compressor 21, capacity control is carried out depending on cooling load required by the indoor unit 30. The gas refrigerant that has been discharged from the compressor 21 passes through the four-way switching valve 22 and flows into the gas-side end of the outdoor heat exchanger 23.

The gas refrigerant that has flowed into the gas-side end of the outdoor heat exchanger 23 undergoes heat exchange with the outdoor-side air supplied by the outdoor fan 25 and is condensed in the outdoor heat exchanger 23 to become a liquid refrigerant, which flows out of the liquid-side end of the outdoor heat exchanger 23.

The refrigerant that has flowed out of the liquid-side end of the outdoor heat exchanger 23 is decompressed as it passes through the outdoor expansion valve 24. Note that the outdoor expansion valve 24 is controlled such that the degree of subcooling of the refrigerant passing through the liquid-side outlet of the outdoor heat exchanger 23 satisfies predetermined conditions.

The refrigerant that has been decompressed by the outdoor expansion valve 24 passes through the liquid-side shut-off valve 29 and the liquid-side refrigerant communication piping 6, and flows into the indoor unit 30.

The refrigerant that has flowed into the indoor unit 30 flows into the indoor heat exchanger 31, undergoes heat exchange with the indoor air supplied by the indoor fan 32 and is evaporated in the indoor heat exchanger 31 to become a gas refrigerant, which flows out of the gas-side end of the indoor heat exchanger 31. The gas refrigerant that has flowed out of the gas-side end of the indoor heat exchanger 31 flows into the gas-side refrigerant communication piping 5.

The refrigerant that has flowed through the gas-side refrigerant communication piping 5 passes through the gas-side shut-off valve 28 and the four-way switching valve 22, and is again inhaled into the compressor 21.

(6-1-4-2) Heating Operation Mode

In the heating operation mode, the air conditioning device 1 sets the state of connection of the four-way switching valve 22 to the heating operation connection state, in which the inlet side of the compressor 21 and the outdoor heat exchanger 23 are connected while connecting the discharge side of the compressor 21 and the gas-side shut-off valve 28, and circulates the refrigerant filled in the refrigerant circuit 10 mainly through the compressor 21, the indoor heat exchanger 31, the outdoor expansion valve 24, and the outdoor heat exchanger 23 in this order.

More specifically, when the heating operation mode is started, in the refrigerant circuit 10, the refrigerant is inhaled into the compressor 21, compressed, and then discharged.

In the compressor 21, capacity control is carried out depending on heating load required by the indoor unit 30. Here, for example, at least either the drive frequency of the compressor 21 or the air volume of the outdoor fan 25 is controlled such that the maximum value of the pressure in the refrigerant circuit 10 is lower than 1.5 times the design pressure of the gas-side refrigerant communication piping 5.

The gas refrigerant that has been discharged from the compressor 21 flows through the four-way switching valve 22 and the gas-side refrigerant communication piping 5 and then flows into the indoor unit 30.

The refrigerant that has flowed into the indoor unit 30 flows into the gas-side end of the indoor heat exchanger 31, undergoes heat exchange with the indoor air supplied by the indoor fan 32 and is condensed in the indoor heat exchanger 31 to become a refrigerant in a gas-liquid two phase state or liquid refrigerant, which flows out of the liquid-side end of the indoor heat exchanger 31. The refrigerant that has flowed out of the liquid-side end of the indoor heat exchanger 31 flows into the liquid-side refrigerant communication piping 6.

The refrigerant that has flowed through the liquid-side refrigerant communication piping 6 is decompressed in the liquid-side shut-off valve 29 and the outdoor expansion valve 24 until it reaches the low pressure in the refrigeration cycle. Note that the outdoor expansion valve 24 is controlled such that the degree of subcooling of the refrigerant passing through the liquid-side outlet of the indoor heat exchanger 31 satisfies predetermined conditions. The refrigerant that has been decompressed by the outdoor expansion valve 24 flows into the liquid-side end of the outdoor heat exchanger 23.

The refrigerant that has flowed into the outdoor heat exchanger 23 from its liquid-side end undergoes heat exchange with the outdoor air supplied by the outdoor fan 25 and is evaporated in the outdoor heat exchanger 23 to become a gas refrigerant, which flows out of the gas-side end of the outdoor heat exchanger 23.

The refrigerant that has flowed out of the gas-side end of the outdoor heat exchanger 23 passes through the four-way switching valve 22, and is again inhaled into the compressor 21.

(6-1-5) Characteristics of First Embodiment

In the air conditioning device 1 mentioned above, a refrigerant containing 1,2-difluoroethylene is used, which makes it possible to keep the GWP sufficiently small.

Also, in the air conditioning device 1, the outdoor unit 20 whose design pressure is lower than 1.5 times the design pressure of the liquid-side refrigerant communication piping 6 and the gas-side refrigerant communication piping 5 is used. In addition, the outdoor unit control section 27 that the outdoor unit 20 of the air conditioning device 1 has is set such that the upper limit value of the control pressure of the refrigerant is lower than 1.5 times the design pressure of the liquid-side refrigerant communication piping 6 and the gas-side refrigerant communication piping 5. Therefore, even when specific Refrigerant A is used, damage to the liquid-side refrigerant communication piping 6 and the gas-side refrigerant communication piping 5 can be suppressed.

(6-1-6) Modification A of First Embodiment

In the above first embodiment, the air conditioning device provided with only one indoor unit has been described as an example, but the air conditioning device may be provided with multiple indoor units connected in parallel to each other (those not having an indoor expansion valve).

(6-1-7) Modification B of First Embodiment

In the above first embodiment, the case has been described as an example, where the design pressure of the outdoor unit 20 is set to lower than 1.5 times the design pressure of the liquid-side refrigerant communication piping 6 and the gas-side refrigerant communication piping 5, and where the upper limit value of the control pressure of the refrigerant as for the outdoor unit control section 27 of the outdoor unit 20 is set to lower than 1.5 times the design pressure of the liquid-side refrigerant communication piping 6 and the gas-side refrigerant communication piping 5.

In contrast, for example, even when the outdoor unit 20 has a design pressure of 1.5 or more times the design pressure of the liquid-side refrigerant communication piping 6 and the gas-side refrigerant communication piping 5, it can be used in the air conditioning device 1 of the above embodiment as long as the outdoor unit 20 is configured such that the upper limit value of the control pressure of the refrigerant can be selected from among multiple kinds and the outdoor unit has an outdoor unit control section 27 that can be set to lower than 1.5 times the design pressure of the liquid-side refrigerant communication piping 6 and the gas-side refrigerant communication piping 5.

(6-2) Second Embodiment

Figure 6C:
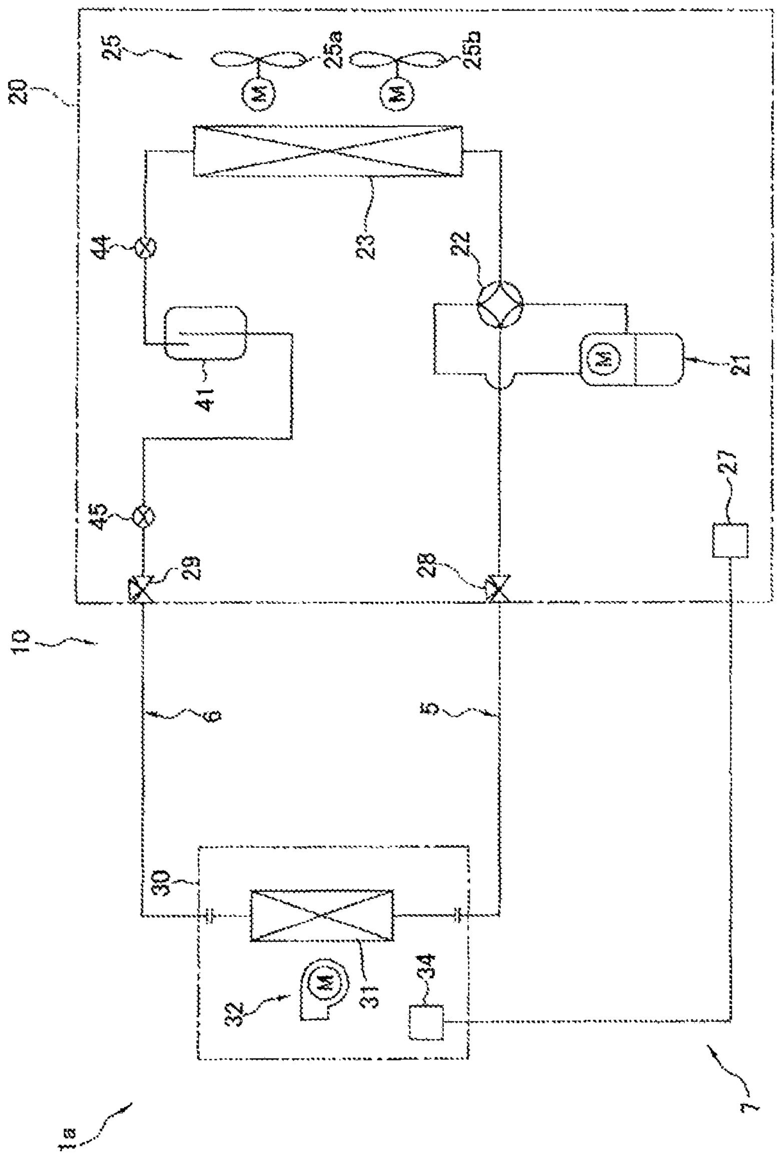
FIG. 6C is a schematic configuration diagram of a refrigerant circuit according to a second embodiment of the technology of the sixth group.
Figure 6D:
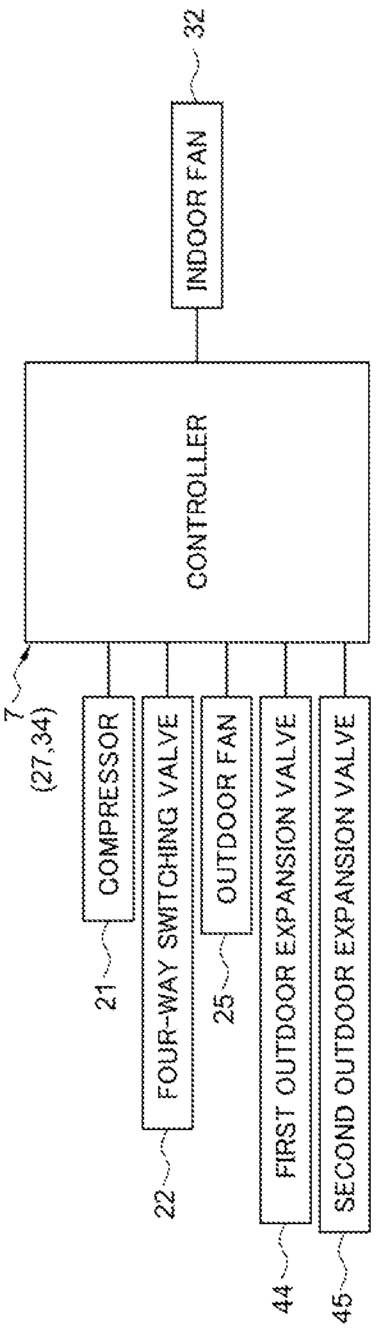
FIG. 6D is a schematic control block configuration diagram of a refrigeration cycle device according to the second embodiment of the technology of the sixth group.

Hereinafter, while referring to FIG. 6C, which is a schematic configuration diagram of a refrigerant circuit, and FIG. 6D, which is a schematic control block configuration diagram, an air conditioning device 1*a* as a refrigeration cycle device comprising an outdoor unit 20 as a heat source unit according to the second embodiment will be described.

In the following, as for the air conditioning device 1*a* of the second embodiment, description will be mainly focused on the differences from the air conditioning device 1 of the first embodiment.

In the air conditioning device 1*a* as well, the refrigerant circuit 10 is filled with any Refrigerant A, which is a refrigerant containing 1,2-difluoroethylene, as the refrigerant for carrying out a vapor compression type refrigeration cycle. The refrigerant circuit 10 is also filled with a refrigerator oil together with that refrigerant.

(6-2-1) Outdoor Unit 20

In the outdoor unit 20 of the air conditioning device 1*a* of the second embodiment, a first outdoor fan 25*a* and a second outdoor fan 25*b* are provided as the outdoor fan 25. In the outdoor heat exchanger 23 of the outdoor unit 20 of the air conditioning device 1*a*, a large heat exchange area is ensured so as to correspond to an air flow received from the first outdoor fan 25*a* and the second outdoor fan 25*b*. Note that, as in the above first embodiment, the outdoor unit 20 has a design pressure (gauge pressure) lower than 1.5 times the design pressure of the liquid-side refrigerant communication piping 6 and the gas-side refrigerant communication piping 5 (pressure resistance of the liquid-side refrigerant communication piping 6 and gas-side refrigerant communication piping 5). The design pressure of such an outdoor unit 20 can be, for example, 4.0 MPa or more and 4.5 MPa or less.

In the outdoor unit 20 of the air conditioning device 1*a*, instead of the outdoor expansion valve 24 of the outdoor unit 20 in the first embodiment described above, a first outdoor expansion valve 44, an intermediate pressure receiver 41, and a second outdoor expansion valve 45 are sequentially provided between the liquid side of the outdoor heat exchanger 23 and the liquid-side shut-off valve 29. The valve opening degree of the first outdoor expansion valve 44 and the second outdoor expansion valve 45 can be controlled. The intermediate pressure receiver 41 is a container that is capable of storing the refrigerant, with both the end of piping extending from the side of the first outdoor expansion valve 44 and the end of piping extending from the side of the second outdoor expansion valve 45 located in the internal space thereof. Note that the internal volume of the intermediate pressure receiver 41 is larger than the internal volume of the accompanying accumulator that accompanies the compressor 21, and is preferably twice as large or more.

The outdoor unit 20 of the second embodiment is in the shape of an approximately rectangular box, and has a structure (so-called trunk-type structure) in which a blower room and a machine room are formed by being divided by a vertically extending partition plate or the like.

The outdoor heat exchanger 23 has multiple heat transfer fins and multiple heat transfer pipes penetrating and fixed to them, for example. This outdoor heat exchanger 23 is arranged to be in an L shape in the plan view.

Note that, as for the outdoor unit 20 of the second embodiment as well, the outdoor unit control section 27 (and the controller 7 including the same) is set such that the upper limit value of the control pressure (gauge pressure) of the refrigerant is lower than 1.5 times the design pressure of the liquid-side refrigerant communication piping 6 and the gas-side refrigerant communication piping 5 (pressure resistance of the liquid-side refrigerant communication piping 6 and gas-side refrigerant communication piping 5).

As for the above air conditioning device 1*a*, in the cooling operation mode, the first outdoor expansion valve 44 is controlled such that the degree of subcooling of the refrigerant passing through the liquid-side outlet of the outdoor heat exchanger 23 satisfies predetermined conditions, for example. Also, in the cooling operation mode, the second outdoor expansion valve 45 is controlled such that the degree of superheating of the refrigerant inhaled by the compressor 21 satisfies predetermined conditions, for example.

In addition, in the heating operation mode, the second outdoor expansion valve 45 is controlled such that the degree of subcooling of the refrigerant passing through the liquid-side outlet of the indoor heat exchanger 31 satisfies predetermined conditions, for example. Moreover, in the heating operation mode, the first outdoor expansion valve 44 is controlled such that the degree of superheating of the refrigerant inhaled by the compressor 21 satisfies predetermined conditions, for example. Note that, in the heating operation mode, at least either the drive frequency of the compressor 21 or the air volume of the outdoor fan 25 is controlled such that the maximum value of the pressure in the refrigerant circuit 10 is lower than 1.5 times the design pressure of the gas-side refrigerant communication piping 5, for example.

(6-2-2) Indoor Unit 30

The indoor unit 30 of the second embodiment is installed by being suspended in an upper space of a room, which is the target space, or installed against a ceiling surface, or installed against a wall surface, for use. The indoor unit 30 is connected to the outdoor unit 20 via the liquid-side refrigerant communication piping 6 and the gas-side refrigerant communication piping 5, and constitutes a part of the refrigerant circuit 10. Note that the design pressure of the indoor unit 30 can be, for example, 4.0 MPa or more and 4.5 MPa or less, as in the outdoor unit 20.

The indoor unit 30 has an indoor heat exchanger 31, an indoor fan 32, and the like.

The indoor heat exchanger 31 of the second embodiment has multiple heat transfer fins and multiple heat transfer pipes penetrating and fixed to them.

(6-2-3) Characteristics of Second Embodiment

In the air conditioning device 1*a* according to the above second embodiment as well, as in the air conditioning device 1 according to the first embodiment, a refrigerant containing 1,2-difluoroethylene is used, which makes it possible to keep the GWP sufficiently small.

Also, in the air conditioning device 1*a*, the outdoor unit 20 whose design pressure is lower than 1.5 times the design pressure of the liquid-side refrigerant communication piping 6 and the gas-side refrigerant communication piping 5 is used. In addition, the outdoor unit control section 27 that the outdoor unit 20 of the air conditioning device 1*a* has is set such that the upper limit value of the control pressure of the refrigerant is lower than 1.5 times the design pressure of the liquid-side refrigerant communication piping 6 and the gas-side refrigerant communication piping 5. Therefore, even when specific Refrigerant A is used, damage to the liquid-side refrigerant communication piping 6 and the gas-side refrigerant communication piping 5 can be suppressed.

(6-2-4) Modification A of Second Embodiment

In the above second embodiment, the air conditioning device provided with only one indoor unit has been described as an example, but the air conditioning device may be provided with multiple indoor units connected in parallel to each other (those not having an indoor expansion valve).

(6-2-5) Modification B of Second Embodiment

In the above second embodiment, the case has been described as an example, where the design pressure of the outdoor unit 20 is set to lower than 1.5 times the design pressure of the liquid-side refrigerant communication piping 6 and the gas-side refrigerant communication piping 5, and where the upper limit value of the control pressure of the refrigerant as for the outdoor unit control section 27 of the outdoor unit 20 is set to lower than 1.5 times the design pressure of the liquid-side refrigerant communication piping 6 and the gas-side refrigerant communication piping 5.

In contrast, for example, even when the outdoor unit 20 has a design pressure of 1.5 or more times the design pressure of the liquid-side refrigerant communication piping 6 and the gas-side refrigerant communication piping 5, it can be used in the air conditioning device 1*a* of the above embodiment as long as the outdoor unit 20 is configured such that the upper limit value of the control pressure of the refrigerant can be selected from among multiple kinds and the outdoor unit has an outdoor unit control section 27 that can be set to lower than 1.5 times the design pressure of the liquid-side refrigerant communication piping 6 and the gas-side refrigerant communication piping 5.

(6-3) Third Embodiment

Figure 6E:
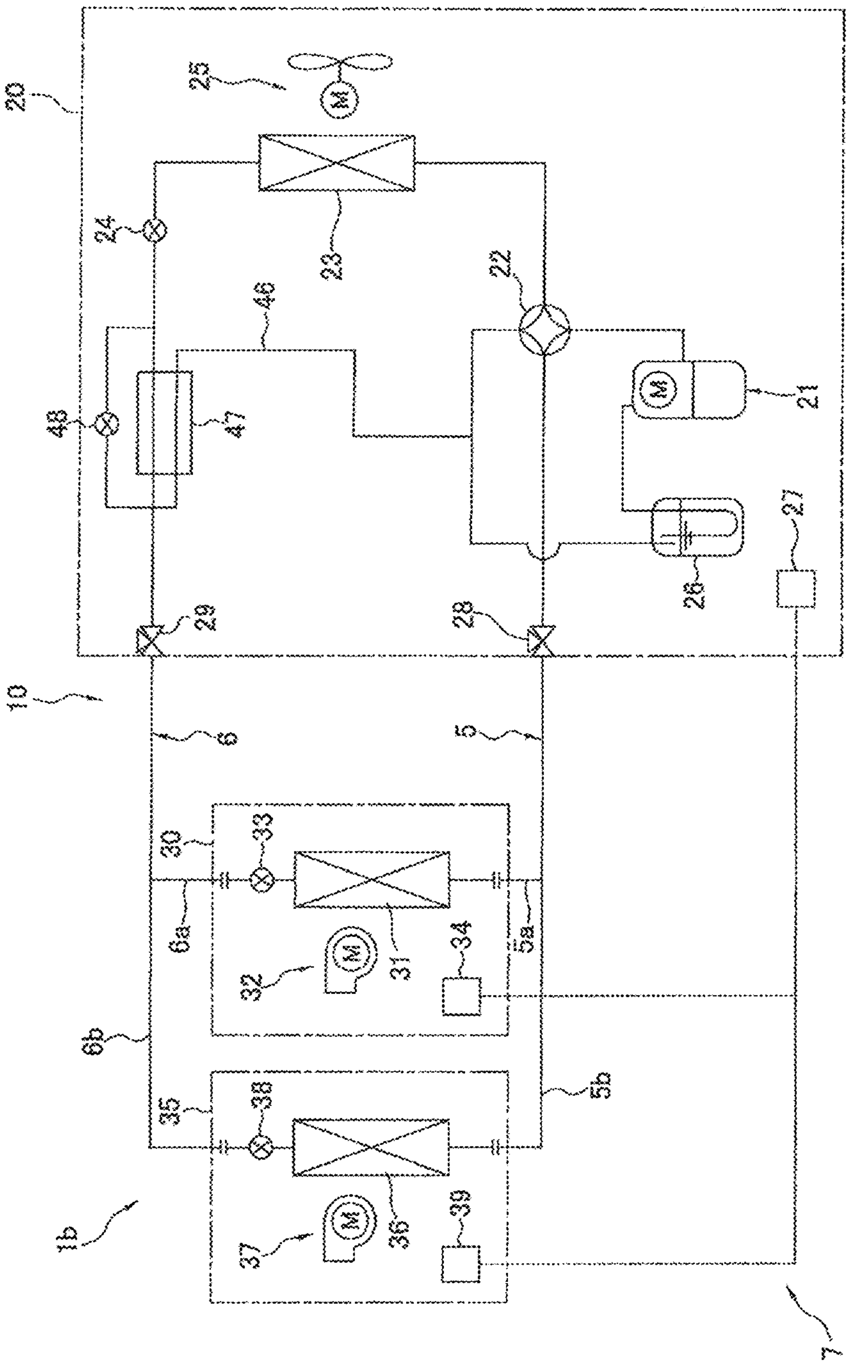
FIG. 6E is a schematic configuration diagram of a refrigerant circuit according to a third embodiment of the technology of the sixth group.
Figure 6F:
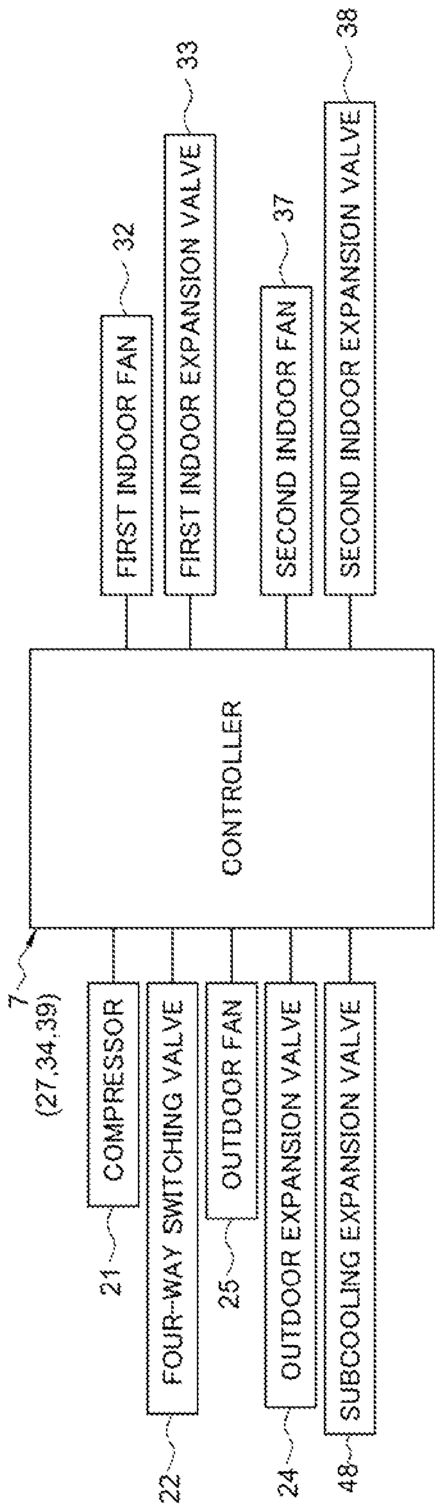
FIG. 6F is a schematic control block configuration diagram of a refrigeration cycle device according to the third embodiment of the technology of the sixth group.

Hereinafter, while referring to FIG. 6E, which is a schematic configuration diagram of a refrigerant circuit, and FIG. 6F, which is a schematic control block configuration diagram, an air conditioning device 1*b* as a refrigeration cycle device comprising an outdoor unit 20 as a heat source unit according to the third embodiment will be described.

In the following, as for the air conditioning device 1*b* of the third embodiment, description will be mainly focused on the differences from the air conditioning device 1 of the first embodiment.

In the air conditioning device 1*b* as well, the refrigerant circuit 10 is filled with any Refrigerant A, which is a refrigerant containing 1,2-difluoroethylene, as the refrigerant for carrying out a vapor compression type refrigeration cycle. The refrigerant circuit 10 is also filled with a refrigerator oil together with that refrigerant.

(6-3-1) Outdoor Unit 20

The outdoor unit 20 of the air conditioning device 1*b* according to the third embodiment is the outdoor unit 20 in the above first embodiment provided with a low-pressure receiver 26, a subcooling heat exchanger 47, and a subcooling circuit 46. Note that, as in the above first embodiment, the outdoor unit 20 has a design pressure (gauge pressure) lower than 1.5 times the design pressure of the liquid-side refrigerant communication piping 6 and the gas-side refrigerant communication piping 5 (pressure resistance of the liquid-side refrigerant communication piping 6 and gas-side refrigerant communication piping 5), and in the air conditioning device 1*b* of the present embodiment, which has multiple indoor units 30 and 35, it is preferably lower than the design pressure of branch pipes 5*a*, 5*b*, 6*a*, and 6*b*, which will be mentioned later. The design pressure of such an outdoor unit 20 can be, for example, 4.0 MPa or more and 4.5 MPa or less.

The low-pressure receiver 26 is a container that is installed between one of the connection ports of the four-way switching valve 22 and the inlet side of the compressor 21, and is capable of storing the refrigerant. Note that, in the present embodiment, it is provided separately from the accompanying accumulator that the compressor 21 has. Note that the internal volume of the low-pressure receiver 26 is larger than the internal volume of the accompanying accumulator that accompanies the compressor 21, and is preferably twice as large or more.

The subcooling heat exchanger 47 is provided between the outdoor expansion valve 24 and the liquid-side shut-off valve 29.

The subcooling circuit 46 is a circuit that branches off from the main circuit between the outdoor expansion valve 24 and the subcooling heat exchanger 47, and extends to join the part in the middle of piping from one of the connection ports of the four-way switching valve 22 to the low-pressure receiver 26. In the middle of the subcooling circuit 46, a subcooling expansion valve 48 is provided, which decompresses the passing refrigerant. The refrigerant that flows through the subcooling circuit 46 and has been decompressed by the subcooling expansion valve 48 undergoes heat exchange with the refrigerant flowing on the main circuit side in the subcooling heat exchanger 47. Due to this, the refrigerant flowing on the main circuit side is further cooled and the refrigerant flowing through the subcooling circuit 46 is evaporated.

The outdoor unit 20 of the air conditioning device 1*b* according to the third embodiment may have, for example, what is called a top blowing structure that intakes air from the bottom to the inside and blows out the air from the top to the outside.

Note that, as for the outdoor unit 20 of the third embodiment as well, the outdoor unit control section 27 (and the controller 7 including the same) is set such that the upper limit value of the control pressure (gauge pressure) of the refrigerant is lower than 1.5 times the design pressure of the liquid-side refrigerant communication piping 6 and the gas-side refrigerant communication piping 5 (pressure resistance of the liquid-side refrigerant communication piping 6 and gas-side refrigerant communication piping 5), and in the air conditioning device 1*b* of the present embodiment, which has multiple indoor units 30 and 35, it is preferably set to lower than the design pressure of branch pipes 5*a*, 5*b*, 6*a*, and 6*b*, which will be mentioned later.

(6-3-2) First Indoor Unit 30 and Second Indoor Unit 35

Also, the air conditioning device 1*b* according to the third embodiment has the first indoor unit 30 and the second indoor unit 35 provided in parallel to each other, instead of the indoor unit 30 in the above first embodiment. Note that the design pressure of each of the first indoor unit 30 and the second indoor unit 35 can be, for example, 4.0 MPa or more and 4.5 MPa or less, as in the outdoor unit 20.

In the first indoor unit 30, a first indoor heat exchanger 31, a first indoor fan 32, and a first indoor unit control section 34 are provided as in the indoor unit 30 in the above first embodiment, and furthermore, a first indoor expansion valve 33 is provided on the liquid side of the first indoor heat exchanger 31. The valve opening degree of the first indoor expansion valve 33 can be controlled. The first indoor unit 30 is connected on the liquid side to a first liquid-side branch pipe 6*a*, which branches off and extends from the indoor unit-side end of the liquid-side refrigerant communication piping 6, and is connected on the gas side to a first gas-side branch pipe 5*a*, which branches off and extends from the indoor unit-side end of the gas-side refrigerant communication piping 5.

As in the first indoor unit 30, the second indoor unit 35 has a second indoor heat exchanger 36, a second indoor fan 37, a second indoor unit control section 39, and a second indoor expansion valve 38 provided on the liquid side of the second indoor heat exchanger 36. The valve opening degree of the second indoor expansion valve 38 can be controlled. The second indoor unit 35 is connected on the liquid side to a second liquid-side branch pipe 6*b*, which branches off and extends from the indoor unit-side end of the liquid-side refrigerant communication piping 6, and is connected on the gas side to a second gas-side branch pipe 5*b*, which branches off and extends from the indoor unit-side end of the gas-side refrigerant communication piping 5.

The design pressure of each of the above first liquid-side branch pipe 6*a*, second liquid-side branch pipe 6*b*, first gas-side branch pipe 5*a*, and second gas-side branch pipe 5*b* can be, for example, 4.5 MPa.

Note that the specific structures of the first indoor unit 30 and the second indoor unit 35 of the air conditioning device 1*b* according to the third embodiment are the same as that of the indoor unit 30 of the second embodiment, except for the first indoor expansion valve 33 and second indoor expansion valve 38 described above.

Note that the controller 7 of the third embodiment is configured by connecting the outdoor unit control section 27, the first indoor unit control section 34, and the second indoor unit control section 39 in a communicable manner with each other.

As for the above air conditioning device 1*b*, in the cooling operation mode, the outdoor expansion valve 24 is controlled such that the degree of subcooling of the refrigerant passing through the liquid-side outlet of the outdoor heat exchanger 23 satisfies predetermined conditions. Also, in the cooling operation mode, the subcooling expansion valve 48 is controlled such that the degree of superheating of the refrigerant inhaled by the compressor 21 satisfies predetermined conditions. Note that, in the cooling operation mode, the first indoor expansion valve 33 and the second indoor expansion valve 38 are controlled to be in a fully open state.

In addition, in the heating operation mode, the first indoor expansion valve 33 is controlled such that the degree of subcooling of the refrigerant passing through the liquid-side outlet of the first indoor heat exchanger 31 satisfies predetermined conditions. Similarly, the second indoor expansion valve 38 is also controlled such that the degree of subcooling of the refrigerant passing through the liquid-side outlet of the second indoor heat exchanger 36 satisfies predetermined conditions. Moreover, in the heating operation mode, the outdoor expansion valve 45 is controlled such that the degree of superheating of the refrigerant inhaled by the compressor 21 satisfies predetermined conditions. Note that, in the heating operation mode, the subcooling expansion valve 48 is controlled such that the degree of superheating of the refrigerant inhaled by the compressor 21 satisfies predetermined conditions. Note that, in the heating operation mode, at least either the drive frequency of the compressor 21 or the air volume of the outdoor fan 25 is controlled such that the maximum value of the pressure in the refrigerant circuit 10 is lower than 1.5 times the design pressure of the gas-side refrigerant communication piping 5, for example. Note that it is preferable that at least either the drive frequency of the compressor 21 or the air volume of the outdoor fan 25 is controlled such that the maximum value of the pressure in the refrigerant circuit 10 is lower than the design pressure of the first gas-side branch pipe 5*a* and the second gas-side branch pipe 5*b*.

(6-3-3) Characteristics of Third Embodiment

In the air conditioning device 1*b* according to the above third embodiment as well, as in the air conditioning device 1 according to the first embodiment, a refrigerant containing 1,2-difluoroethylene is used, which makes it possible to keep the GWP sufficiently small.

Also, in the air conditioning device 1*b*, the outdoor unit 20 whose design pressure is lower than 1.5 times the design pressure of the liquid-side refrigerant communication piping 6 and the gas-side refrigerant communication piping 5 is used. In addition, the outdoor unit control section 27 that the outdoor unit 20 of the air conditioning device 1*b* has is set such that the upper limit value of the control pressure of the refrigerant is lower than 1.5 times the design pressure of the liquid-side refrigerant communication piping 6 and the gas-side refrigerant communication piping 5. Therefore, even when specific Refrigerant A is used, damage to the liquid-side refrigerant communication piping 6 and the gas-side refrigerant communication piping 5 can be suppressed.

(6-3-4) Modification A of Third Embodiment

In the above third embodiment, the case has been described as an example, where the design pressure of the outdoor unit 20 is set to lower than 1.5 times the design pressure of the liquid-side refrigerant communication piping 6 and the gas-side refrigerant communication piping 5, and where the upper limit value of the control pressure of the refrigerant as for the outdoor unit control section 27 of the outdoor unit 20 is set to lower than 1.5 times the design pressure of the liquid-side refrigerant communication piping 6 and the gas-side refrigerant communication piping 5.

In contrast, for example, even when the outdoor unit 20 has a design pressure of 1.5 or more times the design pressure of the liquid-side refrigerant communication piping 6 and the gas-side refrigerant communication piping 5, it can be used in the air conditioning device 1*b* of the above embodiment as long as the outdoor unit 20 is configured such that the upper limit value of the control pressure of the refrigerant can be selected from among multiple kinds and the outdoor unit has an outdoor unit control section 27 that can be set to lower than 1.5 times the design pressure of the liquid-side refrigerant communication piping 6 and the gas-side refrigerant communication piping 5.

(6-4) Fourth Embodiment

In the above first to third embodiments and their respective modifications, the newly established outdoor unit 20 and air conditioning devices 1, 1*a*, and 1*b*, in which any Refrigerant A is used, have been described as examples.

In contrast, as will be mentioned below, an air conditioning device according to the fourth embodiment is, as for an air conditioning device in which a different refrigerant was used, the air conditioning device that has been upgraded by changing the refrigerant to be used to any Refrigerant A, while re-utilizing the liquid-side refrigerant communication piping 6 and the gas-side refrigerant communication piping 5.

(6-4-1) Air Conditioning Device Upgraded from R22

The air conditioning devices 1, 1*a*, and 1*b* in the above first to third embodiments and their respective modifications may be air conditioning devices 1, 1*a*, and 1*b* for which R22 was used and that have been upgraded such that any Refrigerant A containing 1,2-difluoroethylene is used.

Here, the design pressure of the liquid-side refrigerant communication piping 6 and the gas-side refrigerant communication piping 5 in the air conditioning devices for which refrigerant R22 (which is a refrigerant with a lower design pressure than any of the refrigerants of Refrigerant A) was used is determined by the outer diameter and wall thickness of the piping, as well as the material of copper pipe, which is the material of the piping. Of the copper pipes generally used in such liquid-side refrigerant communication piping 6 and gas-side refrigerant communication piping 5, the combination of outer diameter, wall thickness, and material of the piping with the lowest design pressure is the case of φ19.05, 1.0 mm wall thickness, and O material according to the copper pipe for general refrigerant piping (JIS B 8607), and the design pressure is 3.72 MPa (gauge pressure).

Therefore, in the outdoor unit 20 of the air conditioning devices 1, 1*a*, and 1*b* that have been upgraded to use any of the refrigerants of Refrigerant A, the heat transfer area of the outdoor heat exchanger 23 and the air volume (the amount of air blown by the outdoor fan 25) in the outdoor heat exchanger 23 are set such that the upper limit value of the control pressure of the refrigerant is 3.7 MPa (gauge pressure) or less. Alternatively, the outdoor unit control section 27 that the outdoor unit 20 of the air conditioning devices 1, 1*a*, and 1*b* that have been upgraded to use any of the refrigerants of Refrigerant A has is set such that the upper limit value of the control pressure of the refrigerant is 3.7 MPa (gauge pressure) or less. As a result, the outdoor unit control section 27 carries out adjustment of the refrigerant circulation amount by controlling the operation frequency of the compressor 21, and adjustment of the air volume of the outdoor fan 25 in the outdoor heat exchanger 23.

As described above, it becomes possible to re-utilize the liquid-side refrigerant communication piping 6 and gas-side refrigerant communication piping 5 that were used in the air conditioning devices (old machines) for which refrigerant R22 was used in the introduction of the air conditioning devices (new machines) 1, 1*a*, and 1*b* that have been upgraded to use any of the refrigerants of Refrigerant A, and it becomes possible to suppress damage to the liquid-side refrigerant communication piping 6 and gas-side refrigerant communication piping 5 in that case.

In this case, the design pressure of the outdoor unit 20 of the air conditioning devices 1, 1*a*, and 1*b* that have been upgraded to any Refrigerant A is equivalent to the design pressure of the outdoor unit in the air conditioning devices for which R22 was used, and specifically, it is preferably 3.0 MPa or more and 3.7 MPa or less. Also, the outdoor unit and indoor unit that the air conditioning devices for which R22 was used have may be re-utilized, or new ones may be used.

When a new one is used for the outdoor unit 20, its design pressure or the upper limit value of the control pressure of the refrigerant should be equivalent to the design pressure or the upper limit value of the control pressure of the refrigerant of the outdoor unit that the air conditioning devices for which R22 was used had. For example, in the case where the design pressure and the upper limit value of the control pressure of the refrigerant of the outdoor unit that the air conditioning devices for which R22 was used had is 3.0 MPa, the new outdoor unit 20 is preferably one with a design pressure equivalent to 3.0 MPa or one with a larger design pressure (one with a design pressure of 4.0 MPa or more and 4.5 MPa or less, which can be used connected to the liquid-side refrigerant communication piping 6 and the gas-side refrigerant communication piping 5 used for any Refrigerant A) but with an upper limit value of the control pressure of the refrigerant set equivalent to 3.0 MPa.

Note that, as shown in the third embodiment and the like, for air conditioning devices in which multiple indoor units 30 and 35 are connected via branch pipes such as the first liquid-side branch pipe 6*a*, the second liquid-side branch pipe 6*b*, the first gas-side branch pipe 5*a*, and the second gas-side branch pipe **5*b*, the design pressure of these branch pipes when R22 is used as the refrigerant is 3.4 MPa, which means that those with a design pressure even lower than the above 3.7 MPa are used. Therefore, for the air conditioning devices 1, 1*a*, and 1*b* that have multiple indoor units 30 and 35 and where the refrigerant to be used has been upgraded from R22 to any of the refrigerants of Refrigerant A, in order to ensure that the pressure of the refrigerant flowing through each of the branch pipes described above does not exceed 3.4 MPa, it is preferable that the outdoor unit 20 with a design pressure of 3.4 MPa or less is used, or that the outdoor unit control section 27 that the outdoor unit 20** has is set such that the upper limit value of the control pressure of the refrigerant is 3.4 MPa or less.

(6-4-2) Air Conditioning Device Upgraded from R407C

The air conditioning devices 1, **1*a*, and 1*b* in the above first to third embodiments and their respective modifications may be air conditioning devices 1, 1*a*, and 1*b*** for which refrigerant R407C was used and that have been upgraded such that any Refrigerant A containing 1,2-difluoroethylene is used.

Here, as for the design pressure of the liquid-side refrigerant communication piping 6 and the gas-side refrigerant communication piping 5 in the air conditioning devices for which refrigerant R407C (which is a refrigerant with a lower design pressure than any of the refrigerants of Refrigerant A) was used, the design pressure of the piping with the lowest design pressure for the liquid-side refrigerant communication piping 6 and the gas-side refrigerant communication piping 5 is 3.72 MPa (gauge pressure), as in the above case where R22 was used.

Therefore, in the outdoor unit 20 of the air conditioning devices 1, **1*a*, and 1*b* that have been upgraded to use any of the refrigerants of Refrigerant A, the heat transfer area of the outdoor heat exchanger 23 and the air volume (the amount of air blown by the outdoor fan 25) in the outdoor heat exchanger 23 are set such that the upper limit value of the control pressure of the refrigerant is 3.7 MPa (gauge pressure) or less, as in the above case of the upgrade from R22. Alternatively, the outdoor unit control section 27 that the outdoor unit 20 of the air conditioning devices 1, 1*a*, and 1*b* that have been upgraded to use any of the refrigerants of Refrigerant A has is set such that the upper limit value of the control pressure of the refrigerant is 3.7 MPa (gauge pressure) or less. As a result, the outdoor unit control section 27 carries out adjustment of the refrigerant circulation amount by controlling the operation frequency of the compressor 21, and adjustment of the air volume of the outdoor fan 25 in the outdoor heat exchanger 23**.

As described above, it becomes possible to re-utilize the liquid-side refrigerant communication piping 6 and gas-side refrigerant communication piping 5 that were used in the air conditioning devices (old machines) for which refrigerant R407C was used in the introduction of the air conditioning devices (new machines) 1, **1*a*, and 1*b* that have been upgraded to use any of the refrigerants of Refrigerant A, and it becomes possible to suppress damage to the liquid-side refrigerant communication piping 6 and gas-side refrigerant communication piping 5** in that case.

In this case, the design pressure of the outdoor unit 20 of the air conditioning devices 1, **1*a*, and 1*b*** that have been upgraded to any Refrigerant A is equivalent to the design pressure of the outdoor unit in the air conditioning devices for which R407C was used, and specifically, it is preferably 3.0 MPa or more and 3.7 MPa or less. Also, the outdoor unit and indoor unit that the air conditioning devices for which R407C was used have may be re-utilized, or new ones may be used.

When a new one is used for the outdoor unit 20, its design pressure or the upper limit value of the control pressure of the refrigerant should be equivalent to the design pressure or the upper limit value of the control pressure of the refrigerant of the outdoor unit that the air conditioning devices for which R407C was used had. For example, in the case where the design pressure and the upper limit value of the control pressure of the refrigerant of the outdoor unit that the air conditioning devices for which R407C was used had is 3.0 MPa, the new outdoor unit 20 is preferably one with a design pressure equivalent to 3.0 MPa or one with a larger design pressure (one with a design pressure of 4.0 MPa or more and 4.5 MPa or less, which can be used connected to the liquid-side refrigerant communication piping 6 and the gas-side refrigerant communication piping 5 used for any Refrigerant A) but with an upper limit value of the control pressure of the refrigerant set equivalent to 3.0 MPa.

Note that, as shown in the third embodiment and the like, for air conditioning devices in which multiple indoor units 30 and 35 are connected via branch pipes such as the first liquid-side branch pipe **6*a*, the second liquid-side branch pipe 6*b*, the first gas-side branch pipe 5*a*, and the second gas-side branch pipe 5*b*, the design pressure of these branch pipes when R407C is used as the refrigerant is 3.4 MPa as in the case of R22, which means that those with a design pressure even lower than the above 3.7 MPa are used. Therefore, for the air conditioning devices 1, 1*a*, and 1*b* that have multiple indoor units 30 and 35 and where the refrigerant to be used has been upgraded from R407C to any of the refrigerants of Refrigerant A, in order to ensure that the pressure of the refrigerant flowing through each of the branch pipes described above does not exceed 3.4 MPa, it is preferable that the outdoor unit 20 with a design pressure of 3.4 MPa or less is used, or that the outdoor unit control section 27 that the outdoor unit 20** has is set such that the upper limit value of the control pressure of the refrigerant is 3.4 MPa or less.

(6-4-3) Air Conditioning Device Upgraded from R410A

The air conditioning devices 1, **1*a*, and 1*b* in the above first to third embodiments and their respective modifications may be air conditioning devices 1, 1*a*, and 1*b*** for which refrigerant R410A was used and that have been upgraded such that any Refrigerant A containing 1,2-difluoroethylene is used.

Here, as for the design pressure of the liquid-side refrigerant communication piping 6 and the gas-side refrigerant communication piping 5 in the air conditioning devices for which refrigerant R410A (which is a refrigerant with a design pressure approximately equivalent to that of any of the refrigerants of Refrigerant A) was used, it is 4.3 MPa (gauge pressure) for piping with an outer diameter of ⅜ inches, and 4.8 MPa (gauge pressure) for piping with an outer diameter of ½ inches.

Therefore, in the outdoor unit 20 of the air conditioning devices 1, **1*a*, and 1*b* that have been upgraded to use any of the refrigerants of Refrigerant A, the heat transfer area of the outdoor heat exchanger 23 and the air volume (the amount of air blown by the outdoor fan 25) in the outdoor heat exchanger 23 are set such that the upper limit value of the control pressure of the refrigerant is 4.3 MPa or less for the case where communication piping with an outer diameter of ⅜ inches is used, and is 4.8 MPa or less for the case where communication piping with an outer diameter of ½ inches is used. Alternatively, the outdoor unit control section 27 that the outdoor unit 20 of the air conditioning devices 1, 1***a*, and 1*b* that have been upgraded to use any of the refrigerants of Refrigerant A has is set such that the upper limit value of the control pressure of the refrigerant is 4.3 MPa or less for the case where communication piping with an outer diameter of ⅜ inches is used, and is 4.8 MPa or less for the case where communication piping with an outer diameter of ½ inches is used. As a result, the outdoor unit control section 27 carries out adjustment of the refrigerant circulation amount by controlling the operation frequency of the compressor 21, and adjustment of the air volume of the outdoor fan 25 in the outdoor heat exchanger 23.

As described above, it becomes possible to re-utilize the liquid-side refrigerant communication piping 6 and gas-side refrigerant communication piping 5 that were used in the air conditioning devices (old machines) for which refrigerant R410A was used in the introduction of the air conditioning devices (new machines) 1, 1*a*, and 1*b* that have been upgraded to use any of the refrigerants of Refrigerant A, and it becomes possible to suppress damage to the liquid-side refrigerant communication piping 6 and gas-side refrigerant communication piping 5 in that case.

In this case, the design pressure of the outdoor unit 20 of the air conditioning devices 1, 1*a*, and 1*b* that have been upgraded to any Refrigerant A is equivalent to the design pressure of the outdoor unit in the air conditioning devices for which R410A was used, and specifically, it is preferably 4.0 MPa or more and 4.8 MPa or less. Also, the outdoor unit and indoor unit that the air conditioning devices for which R410A was used have may be re-utilized, or new ones may be used.

When a new one is used for the outdoor unit 20, its design pressure or the upper limit value of the control pressure of the refrigerant should be equivalent to the design pressure or the upper limit value of the control pressure of the refrigerant of the outdoor unit that the air conditioning devices for which R410A was used had. For example, in the case where the design pressure and the upper limit value of the control pressure of the refrigerant of the outdoor unit that the air conditioning devices for which R410A was used had is 4.2 MPa, the new outdoor unit 20 is preferably one with a design pressure equivalent to 4.2 MPa or one with a larger design pressure (one with a design pressure of greater than 4.2 MPa and 4.5 MPa or less, which can be used connected to the liquid-side refrigerant communication piping 6 and the gas-side refrigerant communication piping 5 used for any Refrigerant A) but with an upper limit value of the control pressure of the refrigerant set equivalent to 4.2 MPa.

Note that, as shown in the third embodiment and the like, for air conditioning devices in which multiple indoor units 30 and 35 are connected via branch pipes such as the first liquid-side branch pipe 6*a*, the second liquid-side branch pipe 6*b*, the first gas-side branch pipe 5*a*, and the second gas-side branch pipe 5*b*, the design pressure of these branch pipes when R410A is used as the refrigerant is 4.2 MPa, which means that those with a design pressure even lower than the above 4.8 MPa are used. Therefore, for the air conditioning devices 1, 1*a*, and 1*b* that have multiple indoor units 30 and 35 and where the refrigerant to be used has been upgraded from R410A to any of the refrigerants of Refrigerant A, in order to ensure that the pressure of the refrigerant flowing through each of the branch pipes described above does not exceed 4.2 MPa, it is preferable that the outdoor unit 20 with a design pressure of 4.2 MPa or less is used, or that the outdoor unit control section 27 that the outdoor unit 20 has is set such that the upper limit value of the control pressure of the refrigerant is 4.2 MPa or less.

(6-4-4) Air Conditioning Device Upgraded from R32

The air conditioning devices 1, 1*a*, and 1*b* in the above first to third embodiments and their respective modifications may be air conditioning devices 1, 1*a*, and 1*b* for which refrigerant R32 was used and that have been upgraded such that any Refrigerant A containing 1,2-difluoroethylene is used.

Here, as for the design pressure of the liquid-side refrigerant communication piping 6 and the gas-side refrigerant communication piping 5 in the air conditioning devices for which refrigerant R32 (which is a refrigerant with a design pressure approximately equivalent to that of any of the above-mentioned refrigerants of Refrigerant A) was used, it is 4.3 MPa (gauge pressure) for piping with an outer diameter of ⅜ inches, and 4.8 MPa (gauge pressure) for piping with an outer diameter of ½ inches.

Therefore, in the outdoor unit 20 of the air conditioning devices 1, 1*a*, and 1*b* that have been upgraded to use any of the refrigerants of Refrigerant A, the heat transfer area of the outdoor heat exchanger 23 and the air volume (the amount of air blown by the outdoor fan 25) in the outdoor heat exchanger 23 are set such that the upper limit value of the control pressure of the refrigerant is 4.3 MPa or less for the case where communication piping with an outer diameter of ⅜ inches is used, and is 4.8 MPa or less for the case where communication piping with an outer diameter of ½ inches is used. Alternatively, the outdoor unit control section 27 that the outdoor unit 20 of the air conditioning devices 1, 1*a*, and 1*b* that have been upgraded to use any of the refrigerants of Refrigerant A has is set such that the upper limit value of the control pressure of the refrigerant is 4.3 MPa or less for the case where communication piping with an outer diameter of ⅜ inches is used, and is 4.8 MPa or less for the case where communication piping with an outer diameter of ½ inches is used. As a result, the outdoor unit control section 27 carries out adjustment of the refrigerant circulation amount by controlling the operation frequency of the compressor 21, and adjustment of the air volume of the outdoor fan 25 in the outdoor heat exchanger 23.

As described above, it becomes possible to re-utilize the liquid-side refrigerant communication piping 6 and gas-side refrigerant communication piping 5 that were used in the air conditioning devices (old machines) for which refrigerant R32 was used in the introduction of the air conditioning devices (new machines) 1, 1*a*, and 1*b* that have been upgraded to use any of the refrigerants of Refrigerant A, and it becomes possible to suppress damage to the liquid-side refrigerant communication piping 6 and gas-side refrigerant communication piping 5 in that case.

In this case, the design pressure of the outdoor unit 20 of the air conditioning devices 1, 1*a*, and 1*b* that have been upgraded to any Refrigerant A is equivalent to the design pressure of the outdoor unit in the air conditioning devices for which R32 was used, and specifically, it is preferably 4.0 MPa or more and 4.8 MPa or less. Also, the outdoor unit and indoor unit that the air conditioning devices for which R32 was used have may be re-utilized, or new ones may be used.

When a new one is used for the outdoor unit 20, its design pressure or the upper limit value of the control pressure of the refrigerant should be equivalent to the design pressure or the upper limit value of the control pressure of the refrigerant of the outdoor unit that the air conditioning devices for which R32 was used had. For example, in the case where the design pressure and the upper limit value of the control pressure of the refrigerant of the outdoor unit that the air conditioning devices for which R32 was used had is 4.2 MPa, the new outdoor unit 20 is preferably one with a design pressure equivalent to 4.2 MPa or one with a larger design pressure (one with a design pressure of greater than 4.2 MPa and 4.5 MPa or less, which can be used connected to the liquid-side refrigerant communication piping 6 and the gas-side refrigerant communication piping 5 used for any Refrigerant A) but with an upper limit value of the control pressure of the refrigerant set equivalent to 4.2 MPa.

Note that, as shown in the third embodiment and the like, for air conditioning devices in which multiple indoor units 30 and 35 are connected via branch pipes such as the first liquid-side branch pipe 6*a*, the second liquid-side branch pipe 6*b*, the first gas-side branch pipe 5*a*, and the second gas-side branch pipe 5*b*, the design pressure of these branch pipes when R32 is used as the refrigerant is 4.2 MPa, which means that those with a design pressure even lower than the above 4.8 MPa are used. Therefore, for the air conditioning devices 1, 1*a*, and 1*b* that have multiple indoor units 30 and 35 and where the refrigerant to be used has been upgraded from R32 to any of the refrigerants of Refrigerant A, in order to ensure that the pressure of the refrigerant flowing through each of the branch pipes described above does not exceed 4.2 MPa, it is preferable that the outdoor unit 20 with a design pressure of 4.2 MPa or less is used, or that the outdoor unit control section 27 that the outdoor unit 20 has is set such that the upper limit value of the control pressure of the refrigerant is 4.2 MPa or less.

(7) EMBODIMENTS OF TECHNOLOGY OF SEVENTH GROUP

(7-1) First Embodiment

Figure 7A:
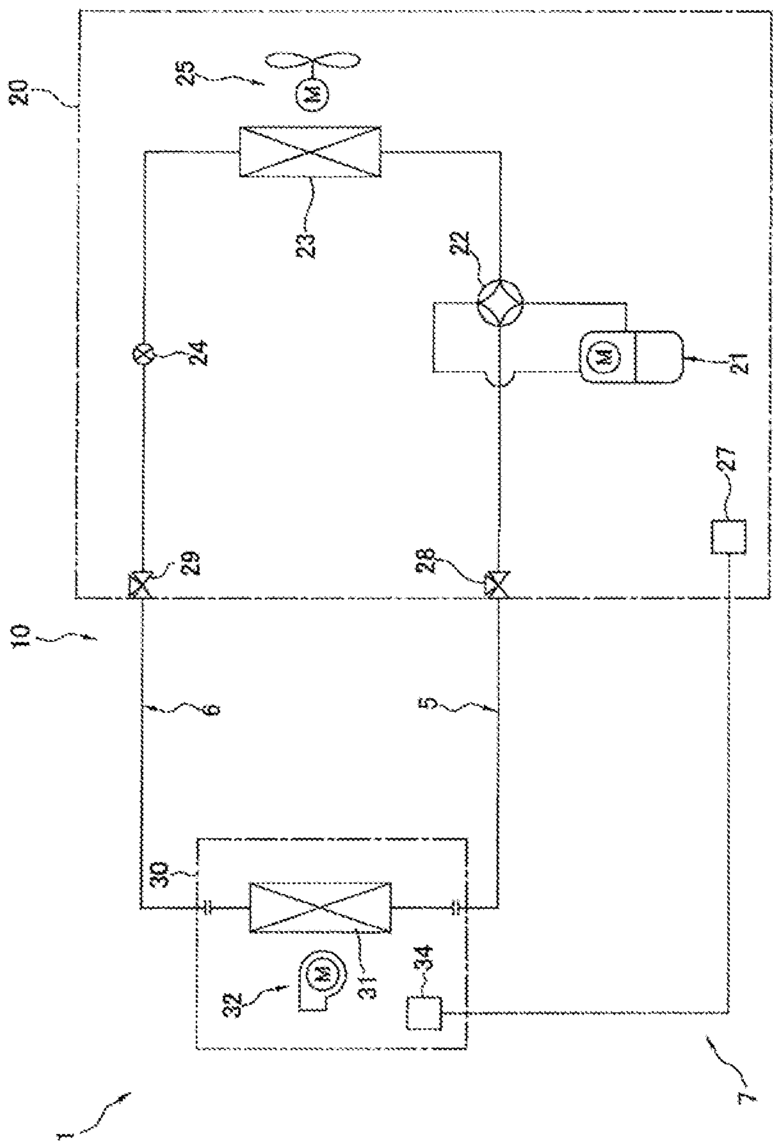
FIG. 7A is a schematic configuration diagram of a refrigerant circuit according to a first embodiment of the technology of a seventh group.
Figure 7B:
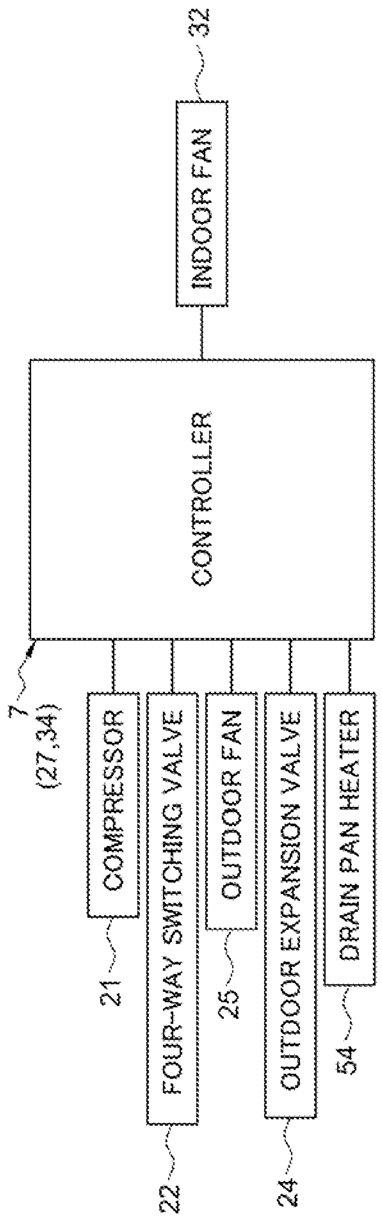
FIG. 7B is a schematic control block configuration diagram of a refrigeration cycle device according to the first embodiment of the technology of the seventh group.

Hereinafter, while referring to FIG. 7A, which is a schematic configuration diagram of a refrigerant circuit, and FIG. 7B, which is a schematic control block configuration diagram, an air conditioning device 1 as a refrigeration cycle device according to the first embodiment will be described.

The air conditioning device 1 is a device that conditions the air in the target space by carrying out a vapor compression type refrigeration cycle.

The air conditioning device 1 mainly has an outdoor unit 20, an indoor unit 30, liquid-side refrigerant communication piping 6 and gas-side refrigerant communication piping 5 that connect the outdoor unit 20 and the indoor unit 30, a remote control not shown in the figure as an input device and an output device, and a controller 7 that controls the motion of the air conditioning device 1.

In the air conditioning device 1, a refrigeration cycle is carried out in which a refrigerant enclosed in a refrigerant circuit 10 is compressed, cooled or condensed, decompressed, heated or evaporated, and then compressed again. In the present embodiment, the refrigerant circuit 10 is filled with a refrigerant for carrying out a vapor compression type refrigeration cycle. That refrigerant is a mixed refrigerant containing 1,2-difluoroethylene, and any Refrigerant A can be used. The refrigerant circuit 10 is also filled with a refrigerator oil together with that refrigerant. Note that the rated cooling capacity of the air conditioning device 1 provided with only one indoor unit 30 is not limited and can be, for example, 2.0 kW or more and 17.0 kW or less, and above all, it is preferably 2.0 kW or more and 6.0 kW or less for the air conditioning device 1 of the present embodiment, which is of a scale not provided with a refrigerant container.

(7-1-1) Outdoor Unit 20

The outdoor unit 20 has a structure (so-called trunk-type structure) in which the internal space of a housing 50 that is in the shape of an approximately rectangular box is divided into left and right parts with a vertically extending partition plate, which is not shown in the figure, to form a blower room and a machine room.

This outdoor unit 20 is connected to the indoor unit 30 via the liquid-side refrigerant communication piping 6 and the gas-side refrigerant communication piping 5, and constitutes a part of the refrigerant circuit 10. The outdoor unit 20 mainly has a compressor 21, a four-way switching valve 22, an outdoor heat exchanger 23, an outdoor expansion valve 24, an outdoor fan 25, a liquid-side shut-off valve 29, and a gas-side shut-off valve 28.

The compressor 21 is equipment that compresses a low-pressure refrigerant in the refrigeration cycle until it reaches a high pressure. Here, as the compressor 21, a compressor with a sealed structure in which a positive displacement compression element (omitted in the figure) such as a rotary type or scroll type is rotationally driven by a compressor motor is used. The compressor motor is for changing the volume, and the operation frequency can be controlled by an inverter. Note that the compressor 21 is provided with an accompanying accumulator, which is not shown in the figure, on the inlet side thereof.

The four-way switching valve 22 can switch the state of connection between a cooling operation connection state in which the inlet side of the compressor 21 and the gas-side shut-off valve 28 are connected while connecting the discharge side of the compressor 21 and the outdoor heat exchanger 23, and a heating operation connection state in which the inlet side of the compressor 21 and the outdoor heat exchanger 23 are connected while connecting the discharge side of the compressor 21 and the gas-side shut-off valve 28.

The outdoor heat exchanger 23 is a heat exchanger that functions as a condenser for a high-pressure refrigerant in the refrigeration cycle during cooling operation and as an evaporator for a low-pressure refrigerant in the refrigeration cycle during heating operation. Note that, in the present embodiment where a refrigerant container (such as a low-pressure receiver or a high-pressure receiver, excluding an accumulator that accompanies the compressor) is not provided in the refrigerant circuit 10, the internal volume (the volume of fluid that can be filled inside) of the outdoor heat exchanger 23 is preferably 0.4 L or more and 2.5 L or less.

The outdoor fan 25 generates an air flow for inhaling outdoor air into the outdoor unit 20, causing heat exchange between it and the refrigerant in the outdoor heat exchanger 23, and then discharging it outside. The outdoor fan 25 is rotationally driven by an outdoor fan motor. Note that, in the present embodiment, only one outdoor fan 25 is provided.

As for the outdoor expansion valve 24, its valve opening degree can be controlled, and it is provided between the liquid-side end of the outdoor heat exchanger 23 and the liquid-side shut-off valve 29.

The liquid-side shut-off valve 29 is a manual valve arranged at the connection part in the outdoor unit 20 with the liquid-side refrigerant communication piping 6.

The gas-side shut-off valve 28 is a manual valve arranged at the connection part in the outdoor unit 20 with the gas-side refrigerant communication piping 5.

The outdoor unit 20 has an outdoor unit control section 27 that controls the motion of each section that constitutes the outdoor unit 20. The outdoor unit control section 27 has a microcomputer that includes a CPU, a memory, and other elements. The outdoor unit control section 27 is connected to an indoor unit control section 34 of each indoor unit 30 via a communication line, and sends and receives control signals and the like. Also, the outdoor unit control section 27 is electrically connected to various sensors, which are not shown in the figure, and receives signals from each sensor.

Figure 7C:
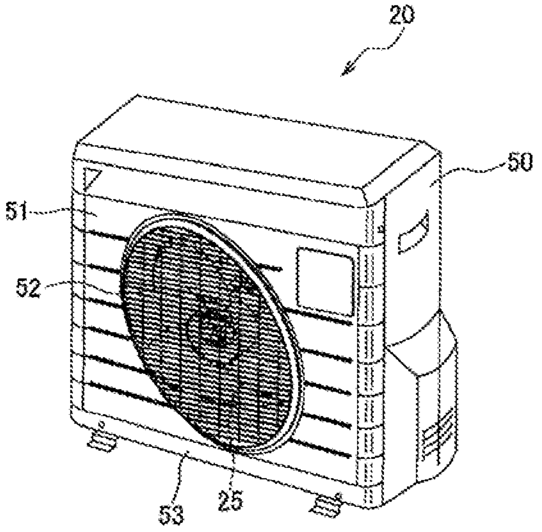
FIG. 7C is a schematic external perspective view of an outdoor unit according to the first embodiment of the technology of the seventh group.
Figure 7D:
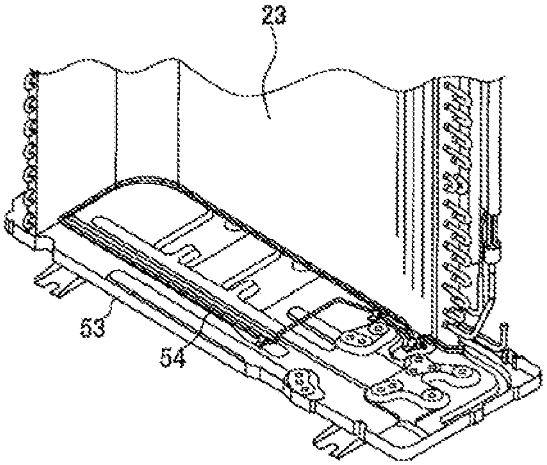
FIG. 7D is a schematic perspective view of a drain pan heater provided on a bottom plate of the technology of the seventh group.

As shown in FIG. 7C, the outdoor unit 20 has a housing 50 provided with an outlet 52. The housing 50 is in the shape of an approximately rectangular parallelepiped and can intake the outdoor air from the rear side and one side surface side (left side in FIG. 7C), and can blow out the air that has passed through the outdoor heat exchanger 23 to the front side via the outlet 52 formed on a front surface 51. The lower end part of the housing 50 is covered with a bottom plate 53. On the bottom plate 53, the outdoor heat exchanger 23 stands along the rear side and one side surface side as shown in FIG. 7D. The upper surface of the bottom plate 53 can serve as a drain pan. Also, a drain pan heater 54, which is a sheathed heater constituted of electric heating wires, is provided along the upper surface of the bottom plate 53. The drain pan heater 54 is above the bottom plate 53, and has two parts: one part that passes vertically below the outdoor heat exchanger 23; and the other part that passes on the front side than the outdoor heat exchanger 23. The drain pan heater 54 is connected to the outdoor unit control section 27, which also serves as the power supply section, and is supplied with electric power. The drain pan heater 54 has a rated power consumption of 300 W or less, and in the present embodiment, it is preferably 75 W or more and 100 W or less.

(7-1-2) Indoor Unit 30

The indoor unit 30 is installed on the wall, ceiling, or the like of a room, which is the target space. The indoor unit 30 is connected to the outdoor unit 20 via the liquid-side refrigerant communication piping 6 and the gas-side refrigerant communication piping 5, and constitutes a part of the refrigerant circuit 10.

The indoor unit 30 has an indoor heat exchanger 31 and an indoor fan 32.

The indoor heat exchanger 31 is connected to the liquid-side refrigerant communication piping 6 on the liquid side, and its gas-side end is connected to the gas-side refrigerant communication piping 5. The indoor heat exchanger 31 is a heat exchanger that functions as an evaporator for a low-pressure refrigerant in the refrigeration cycle during cooling operation and as a condenser for a high-pressure refrigerant in the refrigeration cycle during heating operation.

The indoor fan 32 generates an air flow for inhaling indoor air into the indoor unit 30, causing heat exchange between it and the refrigerant in the indoor heat exchanger 31, and then discharging it outside. The indoor fan 32 is rotationally driven by an indoor fan motor.

Also, the indoor unit 30 has an indoor unit control section 34 that controls the motion of each section that constitutes the indoor unit 30. The indoor unit control section 34 has a microcomputer that includes a CPU, a memory, and other elements. The indoor unit control section 34 is connected to the outdoor unit control section 27 via a communication line, and sends and receives control signals and the like.

The indoor unit control section 34 is electrically connected to various sensors provided inside the indoor unit 30, which are not shown in the figure, and receives signals from each sensor.

(7-1-3) Details of Controller 7

In the air conditioning device 1, the outdoor unit control section 27 and the indoor unit control section 34 are connected via a communication line to constitute the controller 7, which controls the motion of the air conditioning device 1.

The controller 7 mainly has a CPU (central processing unit) and a memory such as ROM or RAM. Note that the various processings and controls by the controller 7 are realized by integrated functioning of each section included in the outdoor unit control section 27 and/or the indoor unit control section 34.

(7-1-4) Operation Modes

Hereinafter, the operation modes will be described.

There are two operation modes: a cooling operation mode and a heating operation mode.

The controller 7 determines and executes whether to be in the cooling operation mode or the heating operation mode, based on an instruction received from a remote control or the like.

(7-1-4-1) Cooling Operation Mode

In the cooling operation mode, the air conditioning device 1 sets the state of connection of the four-way switching valve 22 to the cooling operation connection state, in which the inlet side of the compressor 21 and the gas-side shut-off valve 28 are connected while connecting the discharge side of the compressor 21 and the outdoor heat exchanger 23, and circulates the refrigerant filled in the refrigerant circuit 10 mainly through the compressor 21, the outdoor heat exchanger 23, the outdoor expansion valve 24, and the indoor heat exchanger 31 in this order.

More specifically, when the cooling operation mode is started, in the refrigerant circuit 10, the refrigerant is inhaled into the compressor 21, compressed, and then discharged.

In the compressor 21, capacity control is carried out depending on cooling load required by the indoor unit 30. The capacity control is not limited, and for example, it may be one in which the target value of the inlet pressure is set depending on the cooling load required by the indoor unit 30 and the operation frequency of the compressor 21 is controlled such that the inlet pressure becomes the target value.

The gas refrigerant that has been discharged from the compressor 21 passes through the four-way switching valve 22 and flows into the gas-side end of the outdoor heat exchanger 23.

The gas refrigerant that has flowed into the gas-side end of the outdoor heat exchanger 23 undergoes heat exchange with the outdoor-side air supplied by the outdoor fan 25 and is condensed in the outdoor heat exchanger 23 to become a liquid refrigerant, which flows out of the liquid-side end of the outdoor heat exchanger 23.

The refrigerant that has flowed out of the liquid-side end of the outdoor heat exchanger 23 is decompressed as it passes through the outdoor expansion valve 24. Note that the outdoor expansion valve 24 is controlled such that the degree of subcooling of the refrigerant passing through the liquid-side outlet of the outdoor heat exchanger 23 satisfies predetermined conditions. Note that the approach for controlling the valve opening degree of the outdoor expansion valve 24 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the outdoor expansion valve 24 passes through the liquid-side shut-off valve 29 and the liquid-side refrigerant communication piping 6, and flows into the indoor unit 30.

The refrigerant that has flowed into the indoor unit 30 flows into the indoor heat exchanger 31, undergoes heat exchange with the indoor air supplied by the indoor fan 32 and is evaporated in the indoor heat exchanger 31 to become a gas refrigerant, which flows out of the gas-side end of the indoor heat exchanger 31. The gas refrigerant that has flowed out of the gas-side end of the indoor heat exchanger 31 flows into the gas-side refrigerant communication piping 5.

The refrigerant that has flowed through the gas-side refrigerant communication piping 5 passes through the gas-side shut-off valve 28 and the four-way switching valve 22, and is again inhaled into the compressor 21.

(7-1-4-2) Heating Operation Mode

In the heating operation mode, the air conditioning device 1 sets the state of connection of the four-way switching valve 22 to the heating operation connection state, in which the inlet side of the compressor 21 and the outdoor heat exchanger 23 are connected while connecting the discharge side of the compressor 21 and the gas-side shut-off valve 28, and circulates the refrigerant filled in the refrigerant circuit 10 mainly through the compressor 21, the indoor heat exchanger 31, the outdoor expansion valve 24, and the outdoor heat exchanger 23 in this order.

More specifically, when the heating operation mode is started, in the refrigerant circuit 10, the refrigerant is inhaled into the compressor 21, compressed, and then discharged.

In the compressor 21, capacity control is carried out depending on heating load required by the indoor unit 30. The capacity control is not limited, and for example, the target value of the discharge pressure is set depending on the heating load required by the indoor unit 30 and the operation frequency of the compressor 21 is controlled such that the discharge pressure becomes the target value.

The gas refrigerant that has been discharged from the compressor 21 flows through the four-way switching valve 22 and the gas-side refrigerant communication piping 5 and then flows into the indoor unit 30.

The refrigerant that has flowed into the indoor unit 30 flows into the gas-side end of the indoor heat exchanger 31, undergoes heat exchange with the indoor air supplied by the indoor fan 32 and is condensed in the indoor heat exchanger 31 to become a refrigerant in a gas-liquid two phase state or liquid refrigerant, which flows out of the liquid-side end of the indoor heat exchanger 31. The refrigerant that has flowed out of the liquid-side end of the indoor heat exchanger 31 flows into the liquid-side refrigerant communication piping 6.

The refrigerant that has flowed through the liquid-side refrigerant communication piping 6 is decompressed in the liquid-side shut-off valve 29 and the outdoor expansion valve 24 until it reaches the low pressure in the refrigeration cycle. Note that the outdoor expansion valve 24 is controlled such that the degree of subcooling of the refrigerant passing through the liquid-side outlet of the indoor heat exchanger 31 satisfies predetermined conditions. Note that the approach for controlling the valve opening degree of the outdoor expansion valve 24 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the outdoor expansion valve 24 flows into the liquid-side end of the outdoor heat exchanger 23.

The refrigerant that has flowed into the outdoor heat exchanger 23 from its liquid-side end undergoes heat exchange with the outdoor air supplied by the outdoor fan 25 and is evaporated in the outdoor heat exchanger 23 to become a gas refrigerant, which flows out of the gas-side end of the outdoor heat exchanger 23.

The refrigerant that has flowed out of the gas-side end of the outdoor heat exchanger 23 passes through the four-way switching valve 22, and is again inhaled into the compressor 21.

(7-1-4-3) Defrosting Operation Mode

The defrosting operation mode is operation that is carried out when the above heating operation mode satisfies predetermined defrosting conditions, for example, operation in a state where the outdoor temperature has fallen to or below a predetermined temperature continues for a predetermined period of time or longer, and this operation mode carries out the same refrigeration cycle as the cooling operation mode except that the operation of the indoor fan 32 is stopped while switching the state of connection of the four-way switching valve 22 in the same way as in the cooling operation mode. By doing so, the frost adhered to the outdoor heat exchanger 23 can be partially melted and dropped onto the bottom plate 53 of the housing 50. Note that, at this time, control of electrifying the drain pan heater 54 is carried out to heat the bottom plate 53, which makes it possible to melt the frost that has fallen on the bottom plate 53 and turn it into a liquid form to promote drainage.

(7-1-5) Characteristics of First Embodiment

In the air conditioning device 1 mentioned above, a refrigerant containing 1,2-difluoroethylene is used, which makes it possible to keep the GWP sufficiently small.

Also, in the outdoor unit 20 that the air conditioning device 1 has, the drain pan heater 54 is provided on the bottom plate 53 of the housing 50, and therefore, even in the case where frost is deposited on the bottom plate 53, that frost can be melted and drainage properties can be improved.

In addition, by using a drain pan heater 54 with a rated power consumption of 75 W or more, in the outdoor unit 20 with a capacity to the extent that only one outdoor fan 25 is provided, the function of the drain pan heater 54 can be sufficiently demonstrated to match that capacity.

Furthermore, by using a drain pan heater 54 with a rated power consumption of 100 W or less, even if a refrigerant containing 1,2-difluoroethylene is leaked in the outdoor unit 20, the drain pan heater 54 can be prevented from becoming an ignition source.

(7-1-6) Modification A of First Embodiment

In the above first embodiment, the air conditioning device in which no refrigerant container other than the accumulator accompanying the compressor 21 is provided on the inlet side of the compressor 21 has been described as an example, but the air conditioning device may be provided with a refrigerant container (such as a low-pressure receiver or a high-pressure receiver, excluding an accumulator that accompanies the compressor) in the refrigerant circuit.

In this case, the internal volume (the volume of fluid that can be filled inside) of the outdoor heat exchanger 23 is preferably 1.4 L or more and less than 3.5 L.

(7-1-7) Modification B of First Embodiment

In the above first embodiment, the air conditioning device provided with only one indoor unit has been described as an example, but the air conditioning device may be provided with multiple indoor units connected in parallel to each other (those not having an indoor expansion valve).

In this case, the internal volume (the volume of fluid that can be filled inside) of the outdoor heat exchanger 23 is preferably 0.4 L or more and less than 3.5 L.

(7-2) Second Embodiment

Hereinafter, while referring to FIG. 7C, which is a schematic configuration diagram of a refrigerant circuit, and FIG. 7D, which is a schematic control block configuration diagram, an air conditioning device 1*a* as a refrigeration cycle device according to the second embodiment will be described.

In the following, as for the air conditioning device 1*a* of the second embodiment, description will be mainly focused on the differences from the air conditioning device 1 of the first embodiment.

In the air conditioning device 1*a* as well, the refrigerant circuit 10 is filled with any Refrigerant A, which is a mixed refrigerant containing 1,2-difluoroethylene, as the refrigerant for carrying out a vapor compression type refrigeration cycle. The refrigerant circuit 10 is also filled with a refrigerator oil together with that refrigerant. Note that the rated cooling capacity of the air conditioning device 1*a* provided with only one indoor unit 30 is not limited and can be, for example, 2.0 kW or more and 17.0 kW or less, and it is preferably 10.0 kW or more and 17.0 kW or less for the air conditioning device 1*a* of the present embodiment, which is provided with an intermediate pressure receiver 41, a refrigerant container, as will be mentioned later.

In the outdoor unit 20 of the air conditioning device 1*a*, a first outdoor fan 25*a* and a second outdoor fan 25*b* are provided as the outdoor fan 25. In the outdoor heat exchanger 23 of the outdoor unit 20 of the air conditioning device 1*a*, a large heat exchange area is ensured so as to correspond to an air flow received from the first outdoor fan 25*a* and the second outdoor fan 25*b*. Note that the internal volume (the volume of fluid that can be filled inside) of the outdoor heat exchanger 23 that the outdoor unit 20 of the air conditioning device 1*a* has is preferably 3.5 L or more and 7.0 L or less, and in the air conditioning device 1*a* of the present embodiment, which has the indoor unit 30 with which no indoor expansion valve is provided, the internal volume of the outdoor heat exchanger 23 is more preferably 3.5 L or more and less than 5.0 L.

In the outdoor unit 20 of the air conditioning device 1*a*, instead of the outdoor expansion valve 24 of the outdoor unit 20 in the first embodiment described above, a first outdoor expansion valve 44, an intermediate pressure receiver 41, and a second outdoor expansion valve 45 are sequentially provided between the liquid side of the outdoor heat exchanger 23 and the liquid-side shut-off valve 29.

The valve opening degree of the first outdoor expansion valve 44 and the second outdoor expansion valve 45 can be controlled.

The intermediate pressure receiver 41 is a container that is capable of storing the refrigerant, with both the end of piping extending from the side of the first outdoor expansion valve 44 and the end of piping extending from the side of the second outdoor expansion valve 45 located in the internal space thereof.

In the outdoor unit 20 of the air conditioning device 1*a*, a crank case heater 67 is provided for the compressor 21. The crank case heater 67 is an electric heater attached to an oil reservoir section at a lower part inside the compressor 21, where the refrigerator oil is accumulated. Even in the case where the compressor 21 has been stopped for a long period of time, by heating the oil reservoir section by electrifying the crank case heater 67 before starting up the compressor 21, the refrigerant that has been dissolved in the refrigerator oil stored in the oil reservoir section is evaporated and reduced, making it possible to suppress occurrence of foam of the refrigerator oil at the time of starting of the compressor 21. The crank case heater 67 has a rated power consumption of 300 W or less, and it is preferably 100 W or more.

Figure 7E:
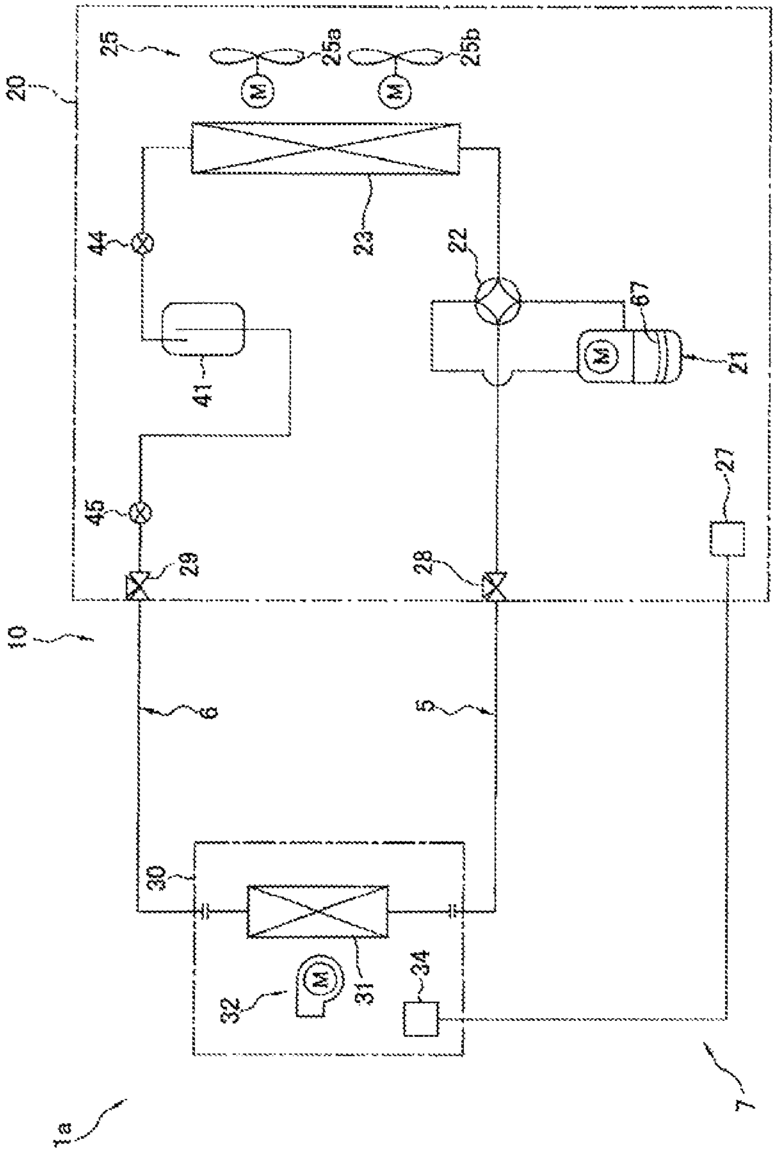
FIG. 7E is a schematic configuration diagram of a refrigerant circuit according to a second embodiment of the technology of the seventh group.
Figure 7F:
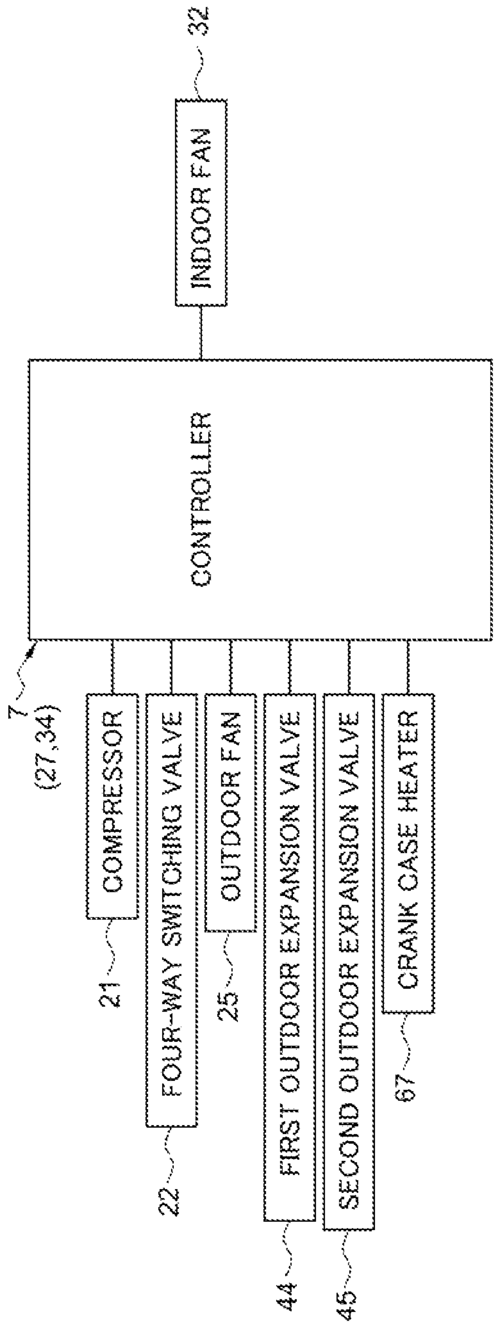
FIG. 7F is a schematic control block configuration diagram of a refrigeration cycle device according to the second embodiment of the technology of the seventh group.
Figure 7G:
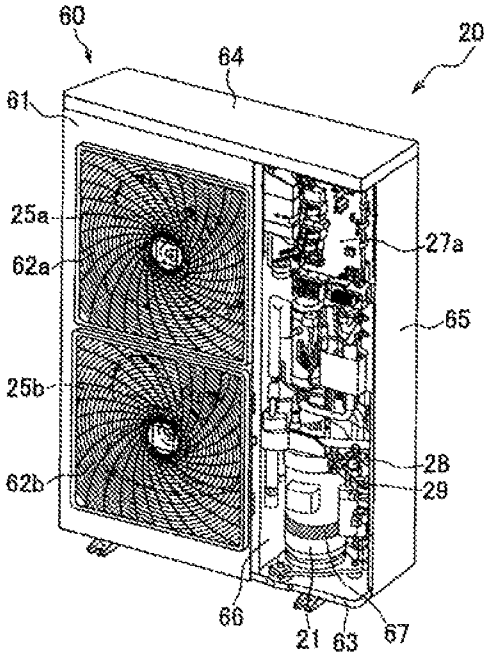
FIG. 7G is a schematic external perspective view of an outdoor unit (with front plate of machine room removed) according to the second embodiment of the technology of the seventh group.
Figure 7H:
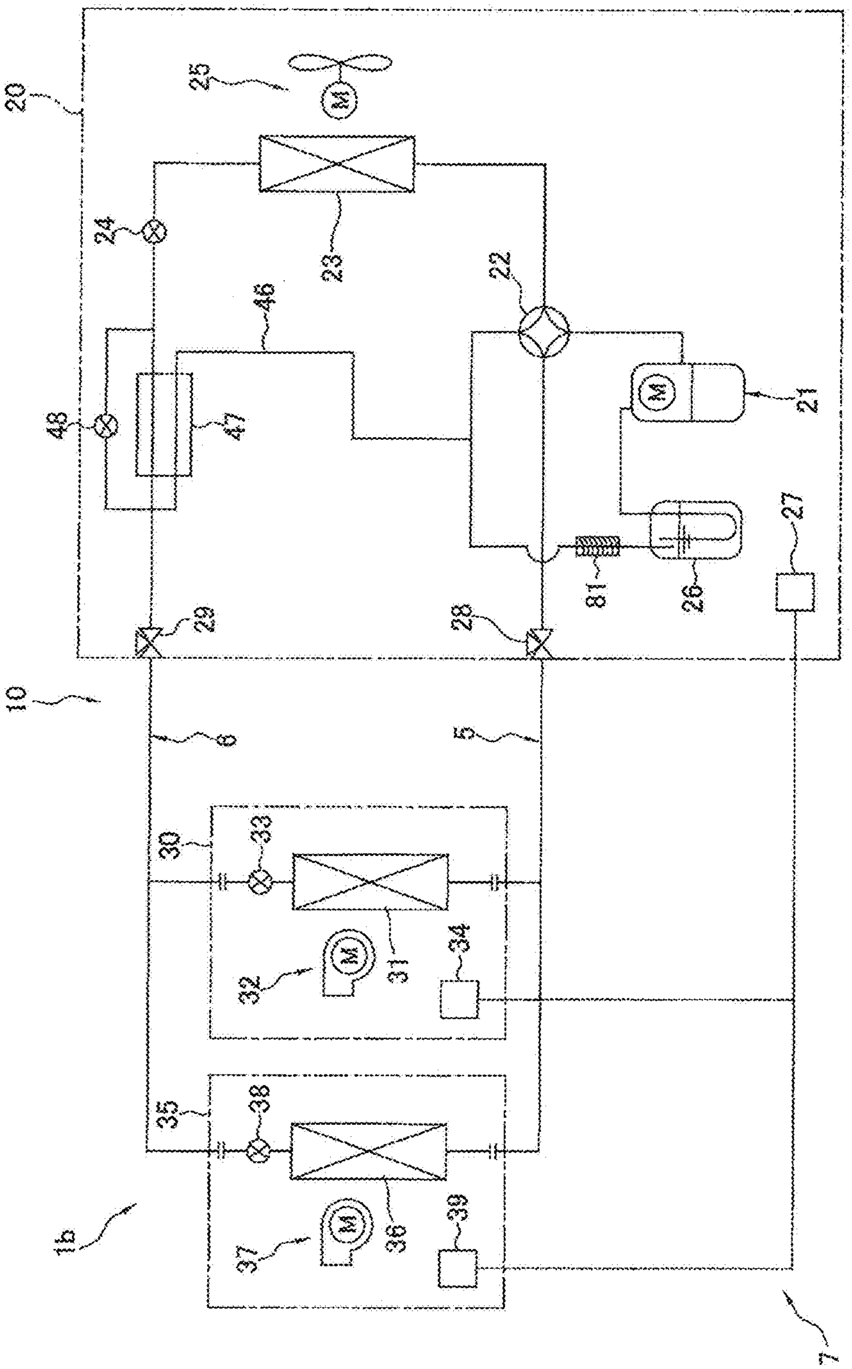
FIG. 7H is a schematic configuration diagram of a refrigerant circuit according to a third embodiment of the technology of the seventh group.
Figure 7I:
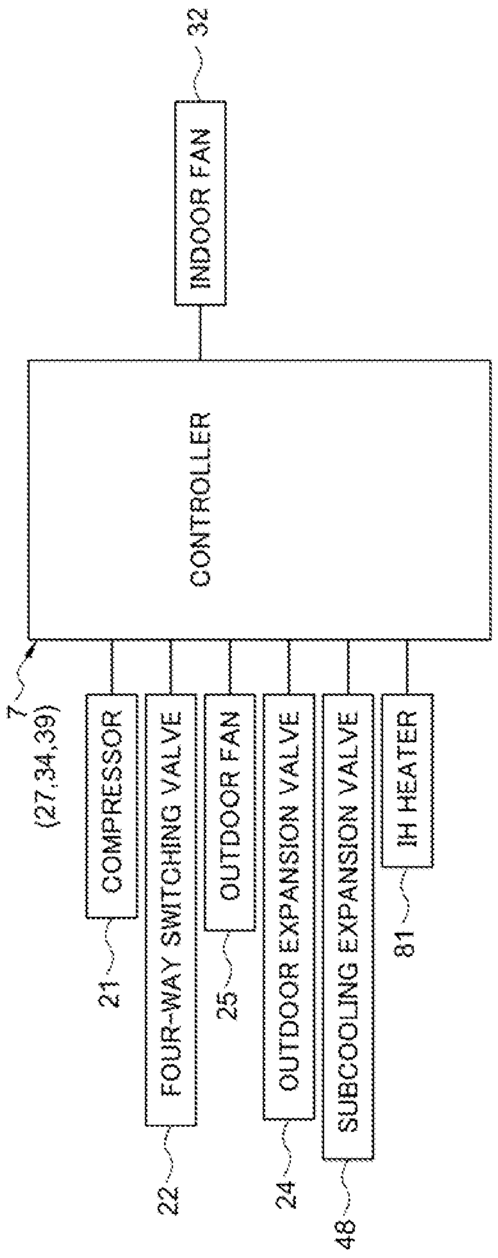
FIG. 7I is a schematic control block configuration diagram of a refrigeration cycle device according to the third embodiment of the technology of the seventh group.

As shown in FIG. 7G, the outdoor unit 20 of the second embodiment has a structure (so-called trunk-type structure) in which the internal space of a housing 60 that is in the shape of an approximately rectangular box is divided into left and right parts with a vertically extending partition plate 66 to form a blower room and a machine room.

In the blower room in the housing 60, the outdoor heat exchanger 23, the outdoor fan 25 (the first outdoor fan 25*a* and the second outdoor fan 25*b*), and the like are arranged, and in the machine room in the housing 60, the compressor 21, the four-way switching valve 22, the first outdoor expansion valve 44, the second outdoor expansion valve 45, the intermediate pressure receiver 41, the gas-side shut-off valve 28, the liquid-side shut-off valve 29, the electrical equipment unit 27*a* constituting the outdoor unit control section 27, and the like are arranged.

The housing 60 mainly has a bottom plate 63, a top plate 64, a left front plate 61, a left side plate (not shown), a right front plate (not shown), a right side plate 65, a partition plate 66, and the like. The bottom plate 63 constitutes the bottom surface part of the housing 60. The top plate 64 constitutes the top surface part of the outdoor unit 20. The left front plate 61 mainly constitutes the left front part of the housing 60, on which a first outlet 62*a* and a second outlet 62*b*, which open in the front and back direction and are aligned vertically, are formed. Through the first outlet 62*a*, air that has been sucked inside from the rear side and left side surface side of the housing 60 by the first outdoor fan 25*a* and that has passed through the upper part of the outdoor heat exchanger 23 mainly passes. Through the second outlet 62*b*, air that has been sucked inside from the rear side and left side surface side of the housing 60 by the second outdoor fan 25*b* and that has passed through the lower part of the outdoor heat exchanger 23 mainly passes. The first outlet 62*a* and the second outlet 62*b* are each provided with a fan grill. The left side plate mainly constitutes the left side part of the housing 60, which can also function as an inlet for air to be inhaled into the housing 60. The right front plate mainly constitutes the right front part and a front side part of the right side of the housing 60. The right side plate 65 mainly constitutes a rear side part of the right side and a right side part of the rear side of the housing 60. The partition plate 66 is a vertically extending plate-like member arranged on the bottom plate 63 and divides the internal space of the housing 60 into the blower room and the machine room.

The outdoor heat exchanger 23 is configured with a cross fin-type, fin and tube-type heat exchanger configured with heat transfer pipes and a large number of fins, and it is arranged in the blower room along the left side and rear side of the housing 60 to be in an L shape in the plan view.

The compressor 21 is mounted on the bottom plate 63 and fixed with bolts in the machine room of the housing 60.

The gas-side shut-off valve 28 and the liquid-side shut-off valve 29 are arranged in the machine room of the housing 60 at positions with a height of the vicinity of the upper end of the compressor 21, and in the vicinity of the right front corner.

In the machine room of the housing 60, the electrical equipment unit 27*a* is arranged in a space above both the gas-side shut-off valve 28 and the liquid-side shut-off valve 29.

As for the above air conditioning device 1*a*, in the cooling operation mode, the first outdoor expansion valve 44 is controlled such that the degree of subcooling of the refrigerant passing through the liquid-side outlet of the outdoor heat exchanger 23 satisfies predetermined conditions. Also, in the cooling operation mode, the second outdoor expansion valve 45 is controlled such that the degree of superheating of the refrigerant inhaled by the compressor 21 satisfies predetermined conditions. Note that, in the cooling operation mode, the second outdoor expansion valve 45 may be controlled such that the temperature of the refrigerant discharged from the compressor 21 becomes a predetermined temperature, or it may be controlled such that the degree of superheating of the refrigerant discharged from the compressor 21 satisfies predetermined conditions.

In addition, in the heating operation mode, the second outdoor expansion valve 45 is controlled such that the degree of subcooling of the refrigerant passing through the liquid-side outlet of the indoor heat exchanger 31 satisfies predetermined conditions. Moreover, in the heating operation mode, the first outdoor expansion valve 44 is controlled such that the degree of superheating of the refrigerant inhaled by the compressor 21 satisfies predetermined conditions. Note that, in the heating operation mode, the first outdoor expansion valve 44 may be controlled such that the temperature of the refrigerant discharged from the compressor 21 becomes a predetermined temperature, or it may be controlled such that the degree of superheating of the refrigerant discharged from the compressor 21 satisfies predetermined conditions. Here, in the heating operation mode of the air conditioning device 1*a*, when the compressor 21 is to be started, it is determined whether predetermined conditions are satisfied or not, such as the state of drive stoppage of the compressor 21 being for a predetermined period of time or longer, and if the predetermined conditions are satisfied, before starting up the compressor 21, a treatment is carried out to electrify the crank case heater 67 for a predetermined period of time or until the temperature of the oil reservoir section reaches a predetermined temperature.

In the air conditioning device 1*a* according to the above second embodiment as well, as in the air conditioning device 1 according to the first embodiment, a refrigerant containing 1,2-difluoroethylene is used, which makes it possible to keep the GWP sufficiently small.

Also, in the outdoor unit 20 that the air conditioning device 1*a* has, the crank case heater 67 is provided, and therefore, oil foaming during start-up of the compressor 21 can be suppressed.

In addition, by using a crank case heater 67 with a rated power consumption of 100 W or more, also in the outdoor unit 20 with a capacity to the extent that two outdoor fans 25 (the first outdoor fan 25*a* and the second outdoor fan 25*b*) are provided, the function of the crank case heater 67 can be sufficiently demonstrated to match that capacity.

Furthermore, by using a crank case heater 67 with a rated power consumption of 300 W or less, even if a refrigerant containing 1,2-difluoroethylene is leaked in the outdoor unit 20, the crank case heater 67 can be prevented from becoming an ignition source.

(7-2-1) Modification A of Second Embodiment

In the above second embodiment, the air conditioning device provided with only one indoor unit has been described as an example, but the air conditioning device may be provided with multiple indoor units connected in parallel to each other (those not having an indoor expansion valve).

In this case, the internal volume (the volume of fluid that can be filled inside) of the outdoor heat exchanger 23 is preferably 3.5 L or more and less than 5.0 L.

(7-2-2) Modification B of Second Embodiment

In the above second embodiment, the air conditioning device provided with only one indoor unit having no indoor expansion valve has been described as an example, but the air conditioning device may be provided with multiple indoor units connected in parallel to each other (those having an indoor expansion valve).

In this case, the internal volume (the volume of fluid that can be filled inside) of the outdoor heat exchanger 23 is preferably 5.0 L or more and 7.0 L or less.

(7-3) Third Embodiment

Hereinafter, while referring to FIG. 7E, which is a schematic configuration diagram of a refrigerant circuit, and FIG. 7F, which is a schematic control block configuration diagram, an air conditioning device 1*b* as a refrigeration cycle device according to the third embodiment will be described.

In the following, as for the air conditioning device 1*b* of the third embodiment, description will be mainly focused on the differences from the air conditioning device 1 of the first embodiment.

In the air conditioning device 1*b* as well, the refrigerant circuit 10 is filled with any Refrigerant A mentioned above, which is a mixed refrigerant containing 1,2-difluoroethylene, as the refrigerant for carrying out a vapor compression type refrigeration cycle. The refrigerant circuit 10 is also filled with a refrigerator oil together with that refrigerant. Note that the rated cooling capacity of the air conditioning device 1*b* provided with multiple indoor units 30 is not limited, and it can be, for example, 18.0 kW or more and 160.0 kW or less.

The outdoor unit 20 of the air conditioning device 1*b* according to the third embodiment is the outdoor unit 20 in the above first embodiment provided with a low-pressure receiver 26, an IH heater 81, a subcooling heat exchanger 47, and a subcooling circuit 46.

The low-pressure receiver 26 is a container that is installed between one of the connection ports of the four-way switching valve 22 and the inlet side of the compressor 21, and is capable of storing the refrigerant. Note that, in the present embodiment, it is provided separately from the accompanying accumulator that the compressor 21 has.

The IH heater 81 is an electric heating device that is capable of heating the refrigerant flowing in the refrigerant piping. This electric heating device is not limited, but it is preferably one that heats the refrigerant by an electromagnetic induction heating scheme, which is an electrical scheme, rather than a scheme using fire such as a burner. According to the electromagnetic induction heating scheme, for example, a material containing a magnetic material is provided at a location where it is in direct or indirect contact with the refrigerant, an electromagnetic induction coil is wound around the material containing the magnetic material, and electric current is passed through this electromagnetic induction coil to generate magnetic flux, which can generate heat in the material containing the magnetic material and heat the refrigerant.

The subcooling heat exchanger 47 is provided between the outdoor expansion valve 24 and the liquid-side shut-off valve 29.

The subcooling circuit 46 is a circuit that branches off from the main circuit between the outdoor expansion valve 24 and the subcooling heat exchanger 47, and extends to join the part in the middle of piping from one of the connection ports of the four-way switching valve 22 to the low-pressure receiver 26. In the middle of the subcooling circuit 46, a subcooling expansion valve 48 is provided, which decompresses the passing refrigerant. The refrigerant that flows through the subcooling circuit 46 and has been decompressed by the subcooling expansion valve 48 undergoes heat exchange with the refrigerant flowing on the main circuit side in the subcooling heat exchanger 47. Due to this, the refrigerant flowing on the main circuit side is further cooled and the refrigerant flowing through the subcooling circuit 46 is evaporated.

Figure 7J:
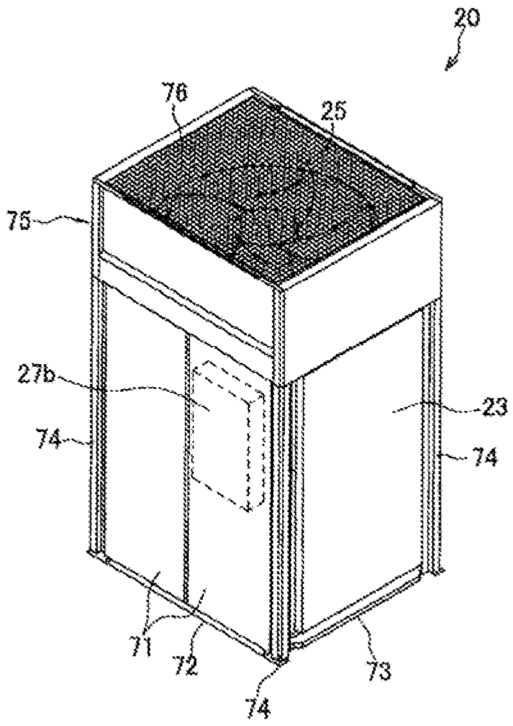
FIG. 7J is a schematic external perspective view of an outdoor unit according to the third embodiment of the technology of the seventh group.
Figure 7K:
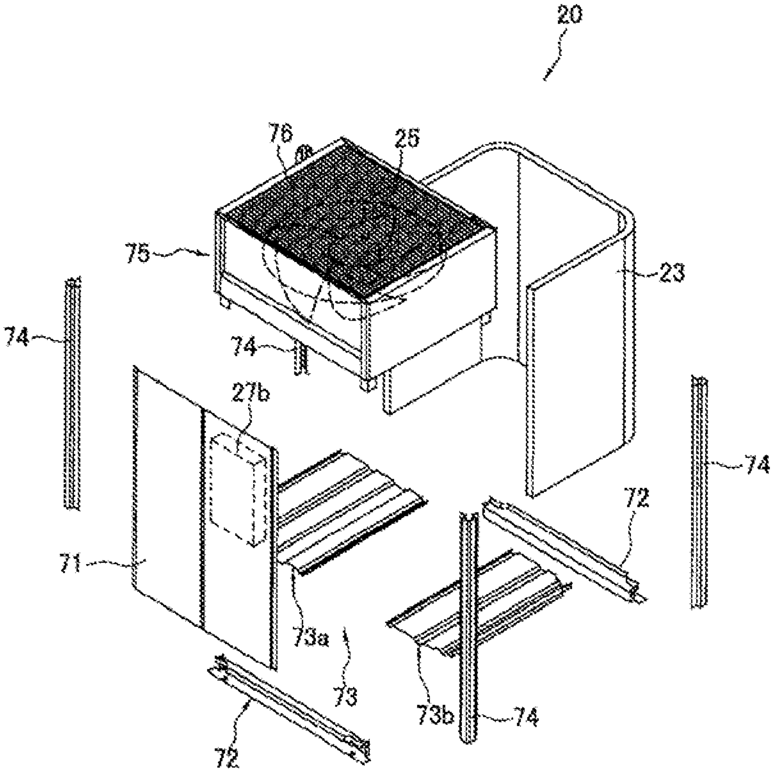
FIG. 7K is a schematic exploded perspective view of an outdoor unit according to the third embodiment of the technology of the seventh group.

Hereinafter, while referring to an external perspective view of FIG. 7J and an exploded perspective view of FIG. 7K, the detailed structure of the outdoor unit 20 of the air conditioning device 1*b* according to the third embodiment will be described.

The outdoor unit 20 of the air conditioning device 1*b* has what is called a top blowing structure that intakes air from a lower part to the inside of a housing 70 and blows out the air from an upper part to the outside of the housing 70.

The housing 70 mainly has a bottom plate 73 bridged over a pair of installation legs 72 extending in the left and right direction, pillars 74 vertically extending from the corners of the bottom plate 73, a front panel 71, and a fan module 75. The bottom plate 73 forms the bottom surface of the housing 70 and is divided into a first bottom plate 73*a* on the left side and a second bottom plate 73*b* on the right side. The front panel 71 is bridged between the pillars 74 on the front side, below the fan module 75, and constitutes the front surface of the housing 70. Within the housing 70, in the space below the fan module 75 and above the bottom plate 73, the compressor 21, the outdoor heat exchanger 23, the low-pressure receiver 26, the four-way switching valve 22, the IH heater 81, the outdoor expansion valve 24, the subcooling heat exchanger 47, the subcooling expansion valve 48, the subcooling circuit 46, the gas-side shut-off valve 28, the liquid-side shut-off valve 29, the electrical equipment unit 27*b* constituting the outdoor unit control section 27, and the like are arranged. The outdoor heat exchanger 23 is in an approximately U shape in the plan view facing the rear surface and both left and right side surfaces among the part below the fan module 75 of the housing 70, substantially forming the rear surface and both left and right side surfaces of the housing 70. This outdoor heat exchanger 23 is arranged along the top of the left side edge, rear side edge, and right side edge of the bottom plate 73. The electrical equipment unit 27*b* is provided such that it is fixed to the right side part of the front panel 71 from the rear side.

The fan module 75 is provided on the upper side of the outdoor heat exchanger 23 and has an outdoor fan 25, a bell mouth, which is not shown in the figure, and the like. The outdoor fan 25 is arranged in a posture where the rotation axis is in the vertical direction.

With the structure described above, the air flow formed by the outdoor fan 25 flows from the surroundings of the outdoor heat exchanger 23, through the outdoor heat exchanger 23, and into the inside the housing 70, and is blown upward through an outlet 76 provided to penetrate in the vertical direction at the upper end surface of the housing 70.

Figure 7L:
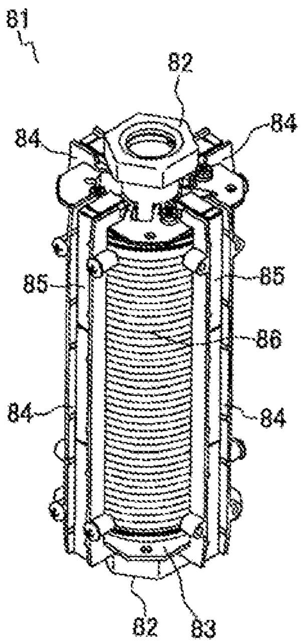
FIG. 7L is a schematic external perspective view of an IH heater of the technology of the seventh group.
Figure 7M:
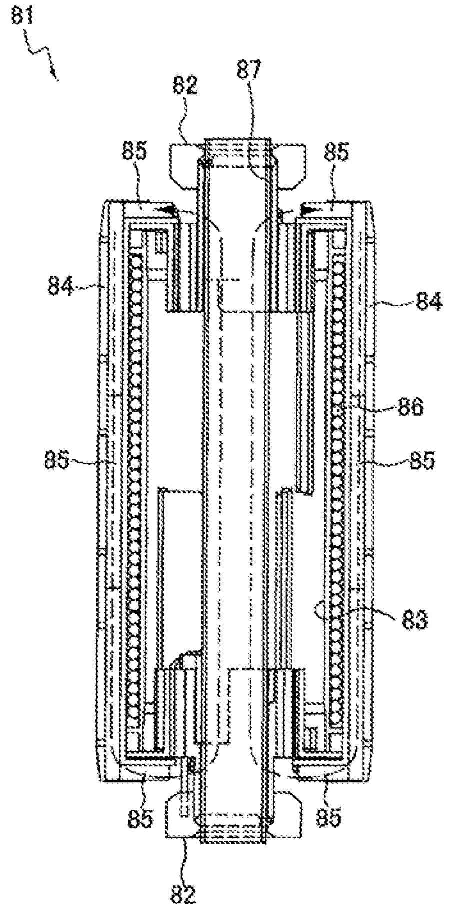
FIG. 7M is a schematic cross section of the IH heater of the technology of the seventh group.

Hereinafter, while referring to an external perspective view of FIG. 7L and a cross section of FIG. 7M, the detailed structure of the IH heater 81 will be described below.

The IH heater 81 comprises a piping section 87, a fixing member 82, a cylindrical member 83, a ferrite case 84, a ferrite member 85, a coil 86, and the like. The piping section 87 is constituted of a metal, and the both ends are coupled and fixed to the refrigerant piping that constitutes the refrigerant circuit 10 by welding or the like. Although not limited, as for the piping section 87, the inner part may be constituted of a copper alloy and the outer part may be constituted of iron. The location at which the refrigerant is heated by the IH heater 81 in the refrigerant circuit 10 is not limited, but in the present embodiment, it is provided such that the location from one of the connection ports of the four-way switching valve 22 to the low-pressure receiver 26 can be heated. The cylindrical member 83 is a member made of a resin with the piping section 87 located inside and the coil 86 wound around the outer circumferential surface. The both ends of the coil 86 are connected to a power supply section not shown in the figure, and the output is controlled by the outdoor unit control section 27. The cylindrical member 83 around which the coil 86 is wound is fixed to the piping section 87 via the fixing members 82 made of a resin, which are provided at one end and the other end of the piping section 87. In this way, the piping section 87 is located inside the coil 86 that is wound around the cylindrical member 83. Also, on the outside of the cylindrical member 83, multiple ferrite cases 84 made of a resin are attached, extending along the longitudinal direction of the piping section 87. Each ferrite case 84 accommodates multiple ferrite members 85 aligned in a direction along the longitudinal direction of the piping section 87. Note that, among the multiple ferrite members 85, those arranged at the both ends of the longitudinal direction of the piping section 87 are provided so as to come closer to the side of the piping section 87.

In the above configuration, when high-frequency current is supplied to the coil 86 of the IH heater 81, magnetic flux can be generated in and around the coil 86. Then, as this magnetic flux penetrates the piping section 87, eddy current is induced in the piping section 87, and heat is generated by the electrical resistance of the piping section 87 itself. This makes it possible to heat the refrigerant passing through the inside of the piping section 87. Note that the magnetic flux generated on the outside of the coil 86 is allowed to pass mainly through the ferrite member 85 (see dotted arrows).

The above IH heater 81 has a rated power consumption of 300 W or less, and it is preferably 200 W or more.

Also, the air conditioning device 1*b* according to the third embodiment has the first indoor unit 30 and the second indoor unit 35 provided in parallel to each other, instead of the indoor unit 30 in the above first embodiment.

In the first indoor unit 30, a first indoor heat exchanger 31, a first indoor fan 32, and a first indoor unit control section 34 are provided as in the indoor unit 30 in the above first embodiment, and furthermore, a first indoor expansion valve 33 is provided on the liquid side of the first indoor heat exchanger 31. The valve opening degree of the first indoor expansion valve 33 can be controlled.

As in the first indoor unit 30, the second indoor unit 35 has a second indoor heat exchanger 36, a second indoor fan 37, a second indoor unit control section 39, and a second indoor expansion valve 38 provided on the liquid side of the second indoor heat exchanger 36. The valve opening degree of the second indoor expansion valve 38 can be controlled.

As described above, in the air conditioning device 1*b* according to the third embodiment, which has multiple indoor units provided with an indoor expansion valve and has a top blowing outdoor unit, the internal volume (the volume of fluid that can be filled inside) of the outdoor heat exchanger 23 that the outdoor unit 20 has is preferably 5.5 L or more and 38 L or less.

Note that the controller 7 of the third embodiment is configured by connecting the outdoor unit control section 27, the first indoor unit control section 34, and the second indoor unit control section 39 in a communicable manner with each other.

As for the above air conditioning device 1*b*, in the cooling operation mode, the outdoor expansion valve 24 is controlled such that the degree of subcooling of the refrigerant passing through the liquid-side outlet of the outdoor heat exchanger 23 satisfies predetermined conditions. Also, in the cooling operation mode, the subcooling expansion valve 48 is controlled such that the degree of superheating of the refrigerant inhaled by the compressor 21 satisfies predetermined conditions. Note that, in the cooling operation mode, the first indoor expansion valve 33 and the second indoor expansion valve 38 are controlled to be in a fully open state.

In addition, in the heating operation mode, the first indoor expansion valve 33 is controlled such that the degree of subcooling of the refrigerant passing through the liquid-side outlet of the first indoor heat exchanger 31 satisfies predetermined conditions. Similarly, the second indoor expansion valve 38 is also controlled such that the degree of subcooling of the refrigerant passing through the liquid-side outlet of the second indoor heat exchanger 36 satisfies predetermined conditions. Moreover, in the heating operation mode, the outdoor expansion valve 45 is controlled such that the degree of superheating of the refrigerant inhaled by the compressor 21 satisfies predetermined conditions. Note that, in the heating operation mode, the subcooling expansion valve 48 is controlled such that the degree of superheating of the refrigerant inhaled by the compressor 21 satisfies predetermined conditions.

In the air conditioning device 1*b* of the above third embodiment as well, as in the air conditioning device 1 according to the first embodiment, a refrigerant containing 1,2-difluoroethylene is used, which makes it possible to keep the GWP sufficiently small.

Also, since the outdoor unit 20 that the air conditioning device 1*b* has is provided with the IH heater 81, the refrigerant flowing through the location at which the IH heater 81 is provided in the refrigerant circuit 10 can be heated. Note that, by heating the refrigerant flowing on the inlet side of the compressor 21, it becomes possible to make the refrigerant to be inhaled into the compressor 21 more reliably in a gaseous state, thereby suppressing liquid compression in the compressor 21.

In addition, by using an IH heater 81 with a rated power consumption of 200 W or more, even in the outdoor unit 20 with some extent of capacity, such as top blowing type, the function of the IH heater 81 can be sufficiently demonstrated to match that capacity.

Furthermore, by using an IH heater 81 with a rated power consumption of 300 W or less, even if a refrigerant containing 1,2-difluoroethylene is leaked in the outdoor unit 20, the IH heater 81 can be prevented from becoming an ignition source.

(7-4) Fourth Embodiment

An air conditioning device or an outdoor unit may be configured by combining the above first embodiment to third embodiment and each modification as appropriate. For example, the outdoor unit of the second embodiment may further comprise a drain pan heater and an IH heater. In this case, it is only necessary that the rated power consumption of each electric heating device does not exceed a predetermined value, but it may be configured such that the total of the rated power consumption of each electric heating device is 300 W or less.

(8) EMBODIMENTS OF TECHNOLOGY OF EIGHTH GROUP

(8-1) First Embodiment

Figure 8A:
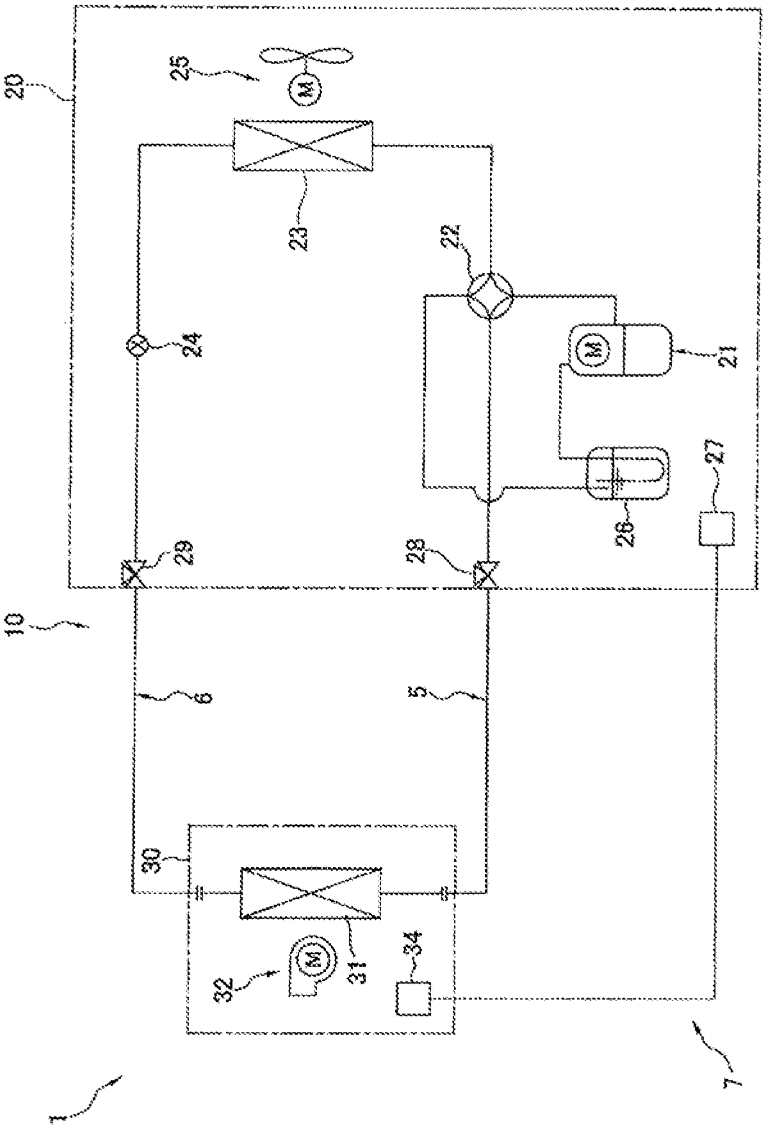
FIG. 8A is a schematic configuration diagram of a refrigerant circuit according to a first embodiment of the technology of an eighth group.
Figure 83:
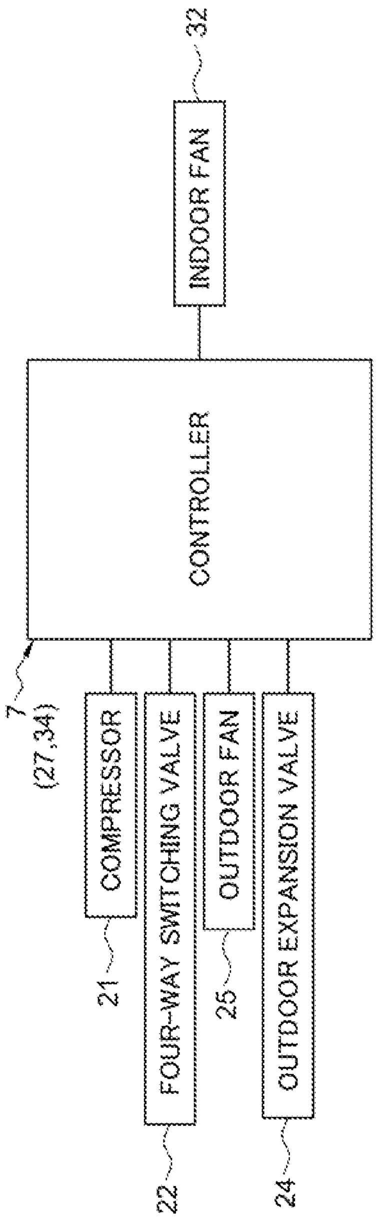

Hereinafter, while referring to FIG. 8A, which is a schematic configuration diagram of a refrigerant circuit, and FIG. 8B, which is a schematic control block configuration diagram, an air conditioning device 1 as a refrigeration cycle device according to the first embodiment will be described.

The air conditioning device 1 is a device that conditions the air in the target space by carrying out a vapor compression type refrigeration cycle.

The air conditioning device 1 mainly has an outdoor unit 20, an indoor unit 30, liquid-side refrigerant communication piping 6 and gas-side refrigerant communication piping 5 that connect the outdoor unit 20 and the indoor unit 30, a remote control not shown in the figure as an input device and an output device, and a controller 7 that controls the motion of the air conditioning device 1.

In the air conditioning device 1, a refrigeration cycle is carried out in which a refrigerant enclosed in a refrigerant circuit 10 is compressed, cooled or condensed, decompressed, heated or evaporated, and then compressed again. In the present embodiment, the refrigerant circuit 10 is filled with a refrigerant for carrying out a vapor compression type refrigeration cycle. That refrigerant is a refrigerant containing 1,2-difluoroethylene, and any Refrigerant A can be used. Note that the rated cooling capacity of the air conditioning device 1 provided with only one indoor unit 30 can be, for example, 2.0 kW or more and 17.0 kW or less, and above all, it is preferably 4.0 kW or more and 17.0 kW or less for the present embodiment where a low-pressure receiver 26, which is a refrigerant container, is provided.

(8-1-1) Outdoor Unit 20

The outdoor unit 20 is connected to the indoor unit 30 via the liquid-side refrigerant communication piping 6 and the gas-side refrigerant communication piping 5, and constitutes a part of the refrigerant circuit 10. The outdoor unit 20 mainly has a compressor 21, a four-way switching valve 22, an outdoor heat exchanger 23, an outdoor expansion valve 24, an outdoor fan 25, a low-pressure receiver 26, a liquid-side shut-off valve 29, and a gas-side shut-off valve 28.

The compressor 21 is equipment that compresses a low-pressure refrigerant in the refrigeration cycle until it reaches a high pressure. Here, as the compressor 21, a compressor with a sealed structure in which a positive displacement compression element (omitted in the figure) such as a rotary type or scroll type is rotationally driven by a compressor motor is used. The compressor motor is for changing the volume, and the operation frequency can be controlled by an inverter. Note that the compressor 21 is provided with an accompanying accumulator, which is not shown in the figure, on the inlet side thereof.

The four-way switching valve 22 can switch the state of connection between a cooling operation connection state in which the inlet side of the compressor 21 and the gas-side shut-off valve 28 are connected while connecting the discharge side of the compressor 21 and the outdoor heat exchanger 23, and a heating operation connection state in which the inlet side of the compressor 21 and the outdoor heat exchanger 23 are connected while connecting the discharge side of the compressor 21 and the gas-side shut-off valve 28.

The outdoor heat exchanger 23 is a heat exchanger that functions as a condenser for a high-pressure refrigerant in the refrigeration cycle during cooling operation and as an evaporator for a low-pressure refrigerant in the refrigeration cycle during heating operation. Note that the internal volume (the volume of fluid that can be filled inside) of the outdoor heat exchanger 23 is preferably 1.4 L or more and less than 5.0 L for those in which a refrigerant container (such as a low-pressure receiver or a high-pressure receiver, excluding an accumulator that accompanies the compressor) is provided in the refrigerant circuit 10, as in the present embodiment. Also, the internal volume (the volume of fluid that can be filled inside) of the outdoor heat exchanger 23 that the trunk-type outdoor unit 20 provided with only one outdoor fan 25 has, as in the present embodiment, is preferably 0.4 L or more and less than 3.5 L.

The outdoor fan 25 generates an air flow for inhaling outdoor air into the outdoor unit 20, causing heat exchange between it and the refrigerant in the outdoor heat exchanger 23, and then discharging it outside. The outdoor fan 25 is rotationally driven by an outdoor fan motor.

As for the outdoor expansion valve 24, its valve opening degree can be controlled, and it is provided between the liquid-side end of the outdoor heat exchanger 23 and the liquid-side shut-off valve 29.

The low-pressure receiver 26 is a container that is installed between one of the connection ports of the four-way switching valve 22 and the inlet side of the compressor 21, and is capable of storing the refrigerant.

The liquid-side shut-off valve 29 is a manual valve arranged at the connection part in the outdoor unit 20 with the liquid-side refrigerant communication piping 6.

The gas-side shut-off valve 28 is a manual valve arranged at the connection part in the outdoor unit 20 with the gas-side refrigerant communication piping 5.

The outdoor unit 20 has an outdoor unit control section 27 that controls the motion of each section that constitutes the outdoor unit 20. The outdoor unit control section 27 has a microcomputer that includes a CPU, a memory, and other elements. The outdoor unit control section 27 is connected to an indoor unit control section 34 of each indoor unit 30 via a communication line, and sends and receives control signals and the like. Also, the outdoor unit control section 27 is electrically connected to various sensors, which are not shown in the figure, and receives signals from each sensor.

(8-1-2) Indoor Unit 30

The indoor unit 30 is installed on the wall, ceiling, or the like of a room, which is the target space. The indoor unit 30 is connected to the outdoor unit 20 via the liquid-side refrigerant communication piping 6 and the gas-side refrigerant communication piping 5, and constitutes a part of the refrigerant circuit 10.

The indoor unit 30 has an indoor heat exchanger 31 and an indoor fan 32.

The indoor heat exchanger 31 is connected to the liquid-side refrigerant communication piping 6 on the liquid side, and its gas-side end is connected to the gas-side refrigerant communication piping 5. The indoor heat exchanger 31 is a heat exchanger that functions as an evaporator for a low-pressure refrigerant in the refrigeration cycle during cooling operation and as a condenser for a high-pressure refrigerant in the refrigeration cycle during heating operation.

The indoor fan 32 generates an air flow for inhaling indoor air into the indoor unit 30, causing heat exchange between it and the refrigerant in the indoor heat exchanger 31, and then discharging it outside. The indoor fan 32 is rotationally driven by an indoor fan motor.

Also, the indoor unit 30 has an indoor unit control section 34 that controls the motion of each section that constitutes the indoor unit 30. The indoor unit control section 34 has a microcomputer that includes a CPU, a memory, and other elements. The indoor unit control section 34 is connected to the outdoor unit control section 27 via a communication line, and sends and receives control signals and the like.

The indoor unit control section 34 is electrically connected to various sensors provided inside the indoor unit 30, which are not shown in the figure, and receives signals from each sensor.

(8-1-3) Details of Controller 7

In the air conditioning device 1, the outdoor unit control section 27 and the indoor unit control section 34 are connected via a communication line to constitute the controller 7, which controls the motion of the air conditioning device 1.

The controller 7 mainly has a CPU (central processing unit) and a memory such as ROM or RAM. Note that the various processings and controls by the controller 7 are realized by integrated functioning of each section included in the outdoor unit control section 27 and/or the indoor unit control section 34.

(8-1-4) Operation Modes

Hereinafter, the operation modes will be described.

There are two operation modes: a cooling operation mode and a heating operation mode.

The controller 7 determines and executes whether to be in the cooling operation mode or the heating operation mode, based on an instruction received from a remote control or the like.

(8-1-4-1) Cooling Operation Mode

In the cooling operation mode, the air conditioning device 1 sets the state of connection of the four-way switching valve 22 to the cooling operation connection state, in which the inlet side of the compressor 21 and the gas-side shut-off valve 28 are connected while connecting the discharge side of the compressor 21 and the outdoor heat exchanger 23, and circulates the refrigerant filled in the refrigerant circuit 10 mainly through the compressor 21, the outdoor heat exchanger 23, the outdoor expansion valve 24, and the indoor heat exchanger 31 in this order.

More specifically, when the cooling operation mode is started, in the refrigerant circuit 10, the refrigerant is inhaled into the compressor 21, compressed, and then discharged.

In the compressor 21, capacity control is carried out depending on cooling load required by the indoor unit 30. The capacity control is not limited, and for example, it may be one in which the target value of the inlet pressure is set depending on the cooling load required by the indoor unit 30 and the operation frequency of the compressor 21 is controlled such that the inlet pressure becomes the target value.

The gas refrigerant that has been discharged from the compressor 21 passes through the four-way switching valve 22 and flows into the gas-side end of the outdoor heat exchanger 23.

The gas refrigerant that has flowed into the gas-side end of the outdoor heat exchanger 23 undergoes heat exchange with the outdoor-side air supplied by the outdoor fan 25 and is condensed in the outdoor heat exchanger 23 to become a liquid refrigerant, which flows out of the liquid-side end of the outdoor heat exchanger 23.

The refrigerant that has flowed out of the liquid-side end of the outdoor heat exchanger 23 is decompressed as it passes through the outdoor expansion valve 24. Note that the outdoor expansion valve 24 is controlled such that the degree of subcooling of the refrigerant passing through the liquid-side outlet of the outdoor heat exchanger 23 satisfies predetermined conditions. Note that the approach for controlling the valve opening degree of the outdoor expansion valve 24 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the outdoor expansion valve 24 passes through the liquid-side shut-off valve 29 and the liquid-side refrigerant communication piping 6, and flows into the indoor unit 30.

The refrigerant that has flowed into the indoor unit 30 flows into the indoor heat exchanger 31, undergoes heat exchange with the indoor air supplied by the indoor fan 32 and is evaporated in the indoor heat exchanger 31 to become a gas refrigerant, which flows out of the gas-side end of the indoor heat exchanger 31. The gas refrigerant that has flowed out of the gas-side end of the indoor heat exchanger 31 flows into the gas-side refrigerant communication piping 5.

The refrigerant that has flowed through the gas-side refrigerant communication piping 5 passes through the gas-side shut-off valve 28 and the four-way switching valve 22, and is again inhaled into the compressor 21.

(8-1-4-2) Heating Operation Mode

In the heating operation mode, the air conditioning device 1 sets the state of connection of the four-way switching valve 22 to the heating operation connection state, in which the inlet side of the compressor 21 and the outdoor heat exchanger 23 are connected while connecting the discharge side of the compressor 21 and the gas-side shut-off valve 28, and circulates the refrigerant filled in the refrigerant circuit 10 mainly through the compressor 21, the indoor heat exchanger 31, the outdoor expansion valve 24, and the outdoor heat exchanger 23 in this order.

More specifically, when the heating operation mode is started, in the refrigerant circuit 10, the refrigerant is inhaled into the compressor 21, compressed, and then discharged.

In the compressor 21, capacity control is carried out depending on heating load required by the indoor unit 30. The capacity control is not limited, and for example, the target value of the discharge pressure is set depending on the heating load required by the indoor unit 30 and the operation frequency of the compressor 21 is controlled such that the discharge pressure becomes the target value.

The gas refrigerant that has been discharged from the compressor 21 flows through the four-way switching valve 22 and the gas-side refrigerant communication piping 5 and then flows into the indoor unit 30.

The refrigerant that has flowed into the indoor unit 30 flows into the gas-side end of the indoor heat exchanger 31, undergoes heat exchange with the indoor air supplied by the indoor fan 32 and is condensed in the indoor heat exchanger 31 to become a refrigerant in a gas-liquid two phase state or liquid refrigerant, which flows out of the liquid-side end of the indoor heat exchanger 31. The refrigerant that has flowed out of the liquid-side end of the indoor heat exchanger 31 flows into the liquid-side refrigerant communication piping 6.

The refrigerant that has flowed through the liquid-side refrigerant communication piping 6 is decompressed in the liquid-side shut-off valve 29 and the outdoor expansion valve 24 until it reaches the low pressure in the refrigeration cycle. Note that the outdoor expansion valve 24 is controlled such that the degree of subcooling of the refrigerant passing through the liquid-side outlet of the indoor heat exchanger 31 satisfies predetermined conditions. Note that the approach for controlling the valve opening degree of the outdoor expansion valve 24 is not limited, and for example, it may be controlled such that the discharge temperature of the refrigerant discharged from the compressor 21 becomes a predetermined temperature, or it may be controlled such that the degree of superheating of the refrigerant discharged from the compressor 21 satisfies predetermined conditions.

The refrigerant that has been decompressed by the outdoor expansion valve 24 flows into the liquid-side end of the outdoor heat exchanger 23.

The refrigerant that has flowed into the outdoor heat exchanger 23 from its liquid-side end undergoes heat exchange with the outdoor air supplied by the outdoor fan 25 and is evaporated in the outdoor heat exchanger 23 to become a gas refrigerant, which flows out of the gas-side end of the outdoor heat exchanger 23.

The refrigerant that has flowed out of the gas-side end of the outdoor heat exchanger 23 passes through the four-way switching valve 22, and is again inhaled into the compressor 21.

(8-1-5) Amount of Refrigerant to be Enclosed

In the above air conditioning device 1 provided with only one indoor unit 30, the refrigerant is filled in the refrigerant circuit 10 such that the amount to be enclosed is 160 g or more and 560 g or less per 1 kW of refrigeration capacity, and in particular, in the air conditioning device 1 provided with the low-pressure receiver 26 as the refrigerant container, the refrigerant is filled in the refrigerant circuit 10 such that the amount to be enclosed is 260 g or more and 560 g or less per 1 kW of refrigeration capacity.

(8-1-6) Characteristics of First Embodiment

For example, in refrigeration cycle devices using R32 refrigerant, which has been widely used conventionally, when the filling amount of R32 is too small, the LCCP tends to become large due to worsening of the cycle efficiency caused by shortage of refrigerant, and when the filling amount of R32 is too large, the impact of GWP tends to become high and the LCCP tends to become large.

In contrast, in the air conditioning device 1 provided with only one indoor unit 30 of the present embodiment, any of the refrigerants of Refrigerant A containing 1,2-difluoroethylene is used as the refrigerant, and furthermore, as for the amount of refrigerant to be enclosed, the amount to be enclosed is set to 160 g or more and 560 g or less (in particular, 260 g or more and 560 g or less, since the low-pressure receiver 26 is provided) per 1 kW of refrigeration capacity.

This makes it possible to, while using a refrigerant with a sufficiently smaller GWP than R32, keep the LCCP low by limiting the amount to be enclosed up to 560 g per 1 kW of refrigeration capacity. Also, even with a refrigerant with a lower heat transfer capacity than R32, by setting the amount to be enclosed to 160 g or more per 1 kW of refrigeration capacity (in particular, 260 g or more since the low-pressure receiver 26 is provided), it becomes possible to suppress reduction in the cycle efficiency due to shortage of refrigerant and suppress the rise in LCCP. From the above, it is possible to keep the LCCP low when carrying out a heat cycle using a refrigerant having a sufficiently small GWP.

(8-1-7) Modification A of First Embodiment

In the above first embodiment, the air conditioning device in which the low-pressure receiver is provided on the inlet side of the compressor 21 has been described as an example, but the air conditioning device may be one not provided with a refrigerant container (such as a low-pressure receiver or a high-pressure receiver, excluding an accumulator that accompanies the compressor) in the refrigerant circuit.

In this case, the refrigerant is filled in the refrigerant circuit 10 such that the amount of refrigerant to be enclosed is 160 g or more and 400 g or less per 1 kW of refrigeration capacity. And, in this case, the internal volume (the volume of fluid that can be filled inside) of the outdoor heat exchanger 23 is preferably 0.4 L or more and 2.5 L or less.

(8-1-8) Modification B of First Embodiment

In the above first embodiment, the air conditioning device provided with only one indoor unit has been described as an example, but the air conditioning device may be provided with multiple indoor units connected in parallel to each other (those not having an indoor expansion valve).

In this case, the refrigerant is filled in the refrigerant circuit 10 such that the amount of refrigerant to be enclosed is 260 g or more and 560 g or less per 1 kW of refrigeration capacity. And, in this case, the internal volume (the volume of fluid that can be filled inside) of the outdoor heat exchanger 23 is preferably 1.4 L or more and less than 5.0 L.

(8-1-9) Modification C of First Embodiment

In the above first embodiment, the air conditioning device having the trunk-type outdoor unit 20 provided with only one outdoor fan 25 has been described as an example, but the air conditioning device may be one having the trunk-type outdoor unit 20 provided with two outdoor fans 25.

In this case, the refrigerant is filled in the refrigerant circuit 10 such that the amount of refrigerant to be enclosed is 350 g or more and 540 g or less per 1 kW of refrigeration capacity. And, in this case, the internal volume (the volume of fluid that can be filled inside) of the outdoor heat exchanger 23 is preferably 3.5 L or more and 7.0 L or less.

(8-2) Second Embodiment

Figure 8C:
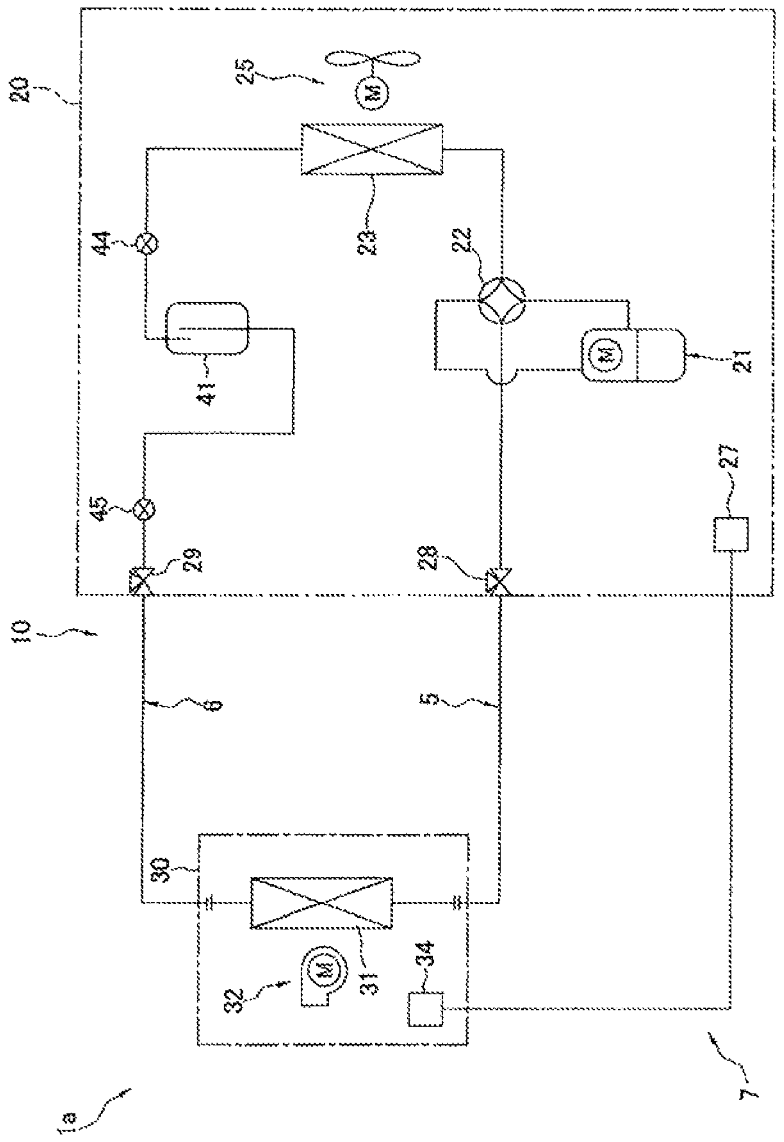
FIG. 8C is a schematic configuration diagram of a refrigerant circuit according to a second embodiment of the technology of the eighth group.
Figure 8D:
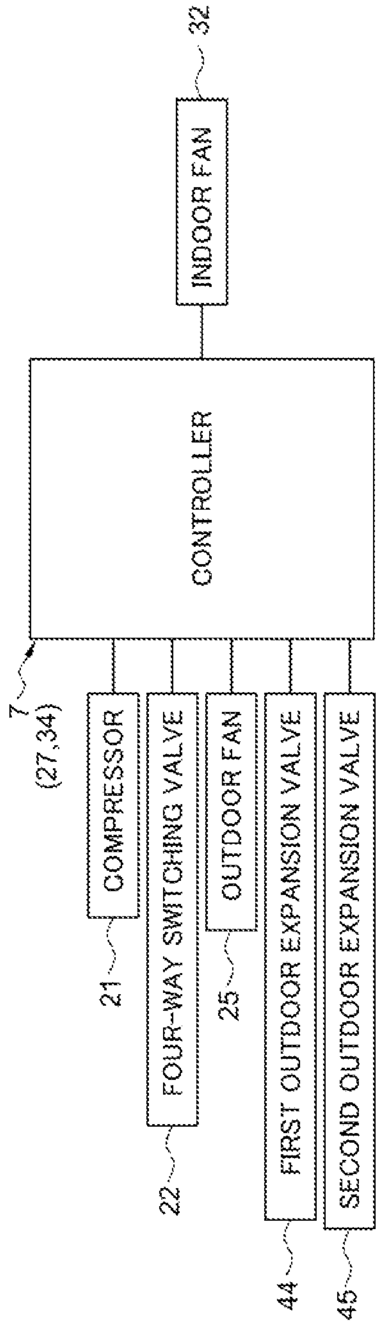
FIG. 8D is a schematic control block configuration diagram of a refrigeration cycle device according to the second embodiment of the technology of the eighth group.

Hereinafter, while referring to FIG. 8C, which is a schematic configuration diagram of a refrigerant circuit, and FIG. 8D, which is a schematic control block configuration diagram, an air conditioning device 1*a* as a refrigeration cycle device according to the second embodiment will be described.

In the following, as for the air conditioning device 1*a* of the second embodiment, description will be mainly focused on the differences from the air conditioning device 1 of the first embodiment.

In the air conditioning device 1*a* as well, the refrigerant circuit 10 is filled with any Refrigerant A, which is a refrigerant containing 1,2-difluoroethylene, as the refrigerant for carrying out a vapor compression type refrigeration cycle.

In the outdoor unit 20 of the air conditioning device 1*a*, instead of the outdoor expansion valve 24 of the outdoor unit 20 in the first embodiment described above, a first outdoor expansion valve 44, an intermediate pressure receiver 41, and a second outdoor expansion valve 45 are sequentially provided between the liquid side of the outdoor heat exchanger 23 and the liquid-side shut-off valve 29. Also, the low-pressure receiver 26 of the outdoor unit 20 in the above first embodiment is not provided in the outdoor unit 20 of the second embodiment.

The valve opening degree of the first outdoor expansion valve 44 and the second outdoor expansion valve 45 can be controlled.

The intermediate pressure receiver 41 is a container that is capable of storing the refrigerant, with both the end of piping extending from the side of the first outdoor expansion valve 44 and the end of piping extending from the side of the second outdoor expansion valve 45 located in the internal space thereof.

Note that, since the intermediate pressure receiver 41, which is a refrigerant container, is provided in the refrigerant circuit 10 in the air conditioning device 1*a* according to the second embodiment, the internal volume (the volume of fluid that can be filled inside) of the outdoor heat exchanger 23 that the outdoor unit 20 has is preferably 1.4 L or more and less than 5.0 L. Also, the internal volume (the volume of fluid that can be filled inside) of the outdoor heat exchanger 23 that the trunk-type outdoor unit 20 provided with only one outdoor fan 25 has, as in the present embodiment, is preferably 0.4 L or more and less than 3.5 L.

As for the above air conditioning device 1*a*, in the cooling operation mode, the first outdoor expansion valve 44 is controlled such that the degree of subcooling of the refrigerant passing through the liquid-side outlet of the outdoor heat exchanger 23 satisfies predetermined conditions. Also, in the cooling operation mode, the second outdoor expansion valve 45 is controlled such that the degree of superheating of the refrigerant inhaled by the compressor 21 satisfies predetermined conditions. Note that, in the cooling operation mode, the second outdoor expansion valve 45 may be controlled such that the temperature of the refrigerant discharged from the compressor 21 becomes a predetermined temperature, or it may be controlled such that the degree of superheating of the refrigerant discharged from the compressor 21 satisfies predetermined conditions.

In addition, in the heating operation mode, the second outdoor expansion valve 45 is controlled such that the degree of subcooling of the refrigerant passing through the liquid-side outlet of the indoor heat exchanger 31 satisfies predetermined conditions. Moreover, in the heating operation mode, the first outdoor expansion valve 44 is controlled such that the degree of superheating of the refrigerant inhaled by the compressor 21 satisfies predetermined conditions. Note that, in the heating operation mode, the first outdoor expansion valve 44 may be controlled such that the temperature of the refrigerant discharged from the compressor 21 becomes a predetermined temperature, or it may be controlled such that the degree of superheating of the refrigerant discharged from the compressor 21 satisfies predetermined conditions.

In the above air conditioning device 1*a* provided with only one indoor unit 30, the refrigerant is filled in the refrigerant circuit 10 such that the amount to be enclosed is 160 g or more and 560 g or less per 1 kW of refrigeration capacity, and in particular, in the air conditioning device 1 provided with the intermediate pressure receiver 41 as the refrigerant container, the refrigerant is filled in the refrigerant circuit 10 such that the amount to be enclosed is 260 g or more and 560 g or less per 1 kW of refrigeration capacity.

Note that the rated cooling capacity of the air conditioning device 1 provided with only one indoor unit 30 can be, for example, 2.2 kW or more and 16.0 kW or less, and it is preferably 4.0 kW or more and 16.0 kW or less.

In the air conditioning device 1*a* according to the above second embodiment as well, as in the air conditioning device 1 according to the first embodiment, it is possible to keep the LCCP low when carrying out a heat cycle using a refrigerant having a sufficiently small GWP.

(8-2-1) Modification A of Second Embodiment

In the above second embodiment, the air conditioning device provided with only one indoor unit has been described as an example, but the air conditioning device may be provided with multiple indoor units connected in parallel to each other (those not having an indoor expansion valve).

In this case, the refrigerant is filled in the refrigerant circuit 10 such that the amount of refrigerant to be enclosed is 260 g or more and 560 g or less per 1 kW of refrigeration capacity. And, in this case, the internal volume (the volume of fluid that can be filled inside) of the outdoor heat exchanger 23 is preferably 1.4 L or more and less than 5.0 L.

(8-2-2) Modification B of Second Embodiment

In the above second embodiment, the air conditioning device having the trunk-type outdoor unit 20 provided with only one outdoor fan 25 has been described as an example, but the air conditioning device may be one having the trunk-type outdoor unit 20 provided with two outdoor fans 25.

In this case, the refrigerant is filled in the refrigerant circuit 10 such that the amount of refrigerant to be enclosed is 350 g or more and 540 g or less per 1 kW of refrigeration capacity. And, in this case, the internal volume (the volume of fluid that can be filled inside) of the outdoor heat exchanger 23 is preferably 3.5 L or more and 7.0 L or less.

(8-3) Third Embodiment

Figure 8E:
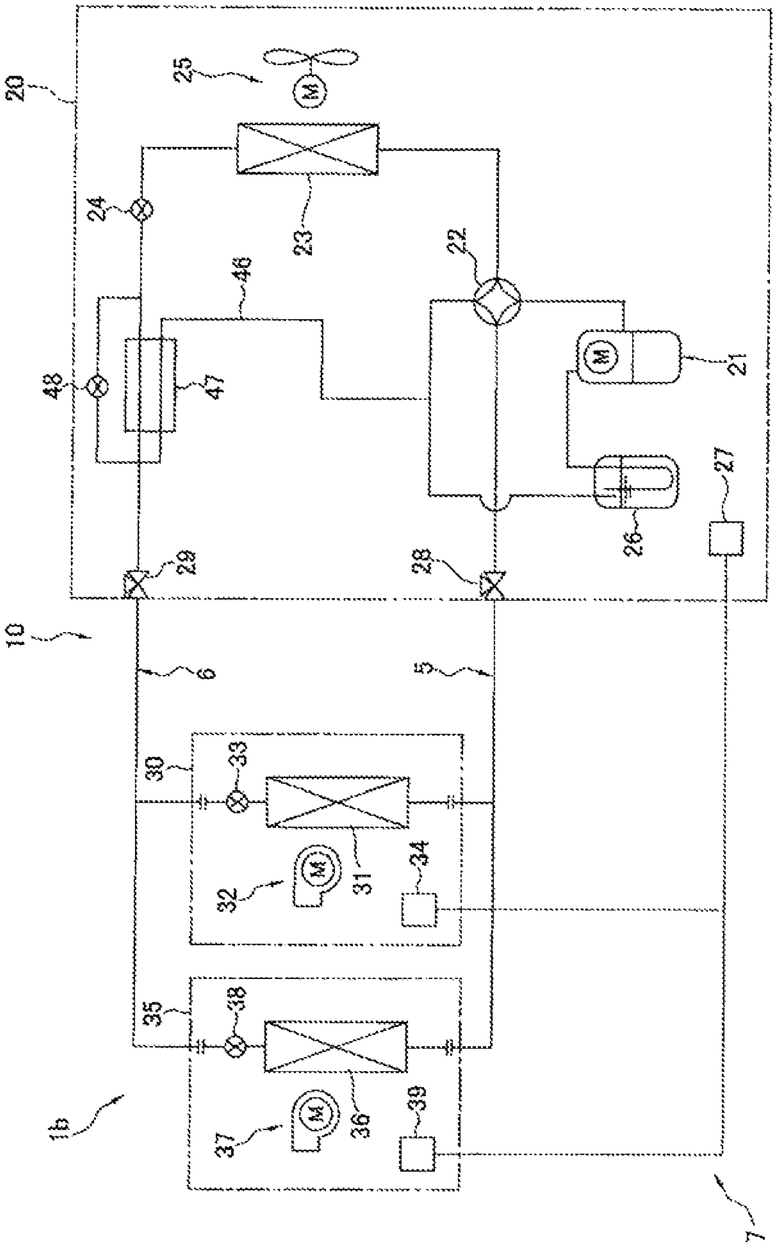
FIG. 8E is a schematic configuration diagram of a refrigerant circuit according to a third embodiment of the technology of the eighth group.
Figure 8F:
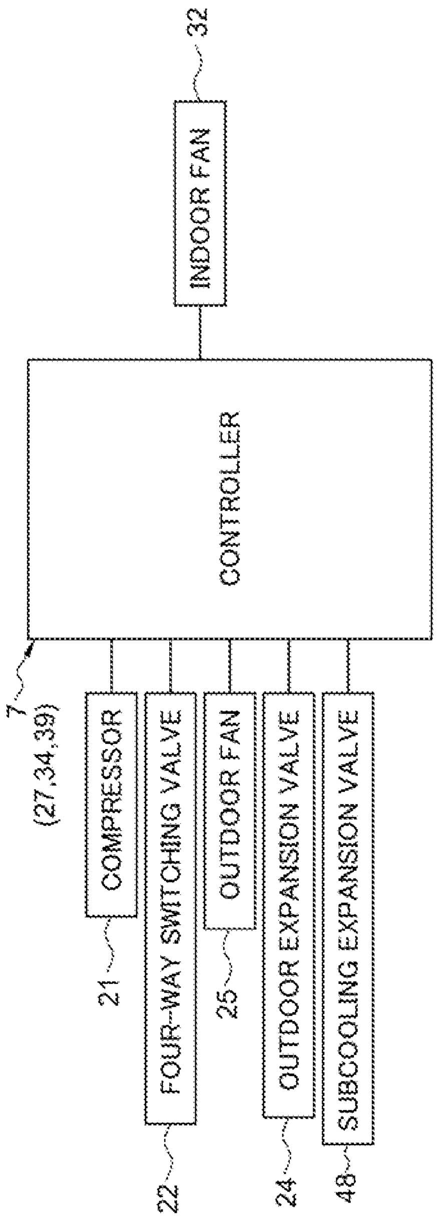
FIG. 8F is a schematic control block configuration diagram of a refrigeration cycle device according to the third embodiment of the technology of the eighth group.

Hereinafter, while referring to FIG. 8E, which is a schematic configuration diagram of a refrigerant circuit, and FIG. 8F, which is a schematic control block configuration diagram, an air conditioning device 1*b* as a refrigeration cycle device according to the third embodiment will be described.

In the following, as for the air conditioning device 1*b* of the third embodiment, description will be mainly focused on the differences from the air conditioning device 1 of the first embodiment.

In the air conditioning device 1*b* as well, the refrigerant circuit 10 is filled with any Refrigerant A, which is a refrigerant containing 1,2-difluoroethylene, as the refrigerant for carrying out a vapor compression type refrigeration cycle.

The outdoor unit 20 of the air conditioning device 1*b* according to the third embodiment is the outdoor unit 20 in the above first embodiment provided with a subcooling heat exchanger 47 and a subcooling circuit 46.

The subcooling heat exchanger 47 is provided between the outdoor expansion valve 24 and the liquid-side shut-off valve 29.

The subcooling circuit 46 is a circuit that branches off from the main circuit between the outdoor expansion valve 24 and the subcooling heat exchanger 47, and extends to join the part in the middle of piping from one of the connection ports of the four-way switching valve 22 to the low-pressure receiver 26. In the middle of the subcooling circuit 46, a subcooling expansion valve 48 is provided, which decompresses the passing refrigerant. The refrigerant that flows through the subcooling circuit 46 and has been decompressed by the subcooling expansion valve 48 undergoes heat exchange with the refrigerant flowing on the main circuit side in the subcooling heat exchanger 47. Due to this, the refrigerant flowing on the main circuit side is further cooled and the refrigerant flowing through the subcooling circuit 46 is evaporated.

Note that, in the air conditioning device 1*b* according to the third embodiment, which has multiple indoor units provided with an indoor expansion valve, the internal volume (the volume of fluid that can be filled inside) of the outdoor heat exchanger 23 that the outdoor unit 20 has is preferably 5.0 L or more and 38 L or less. Especially, in the case where two outdoor fans 25 are provided in the outdoor unit 20 in which the outlet of the air that has passed through the outdoor heat exchanger 23 faces toward the side, the internal volume (the volume of fluid that can be filled inside) of the outdoor heat exchanger 23 is preferably 7.0 L or less, and in the case of the outdoor unit 20 in which the air that has passed through the outdoor heat exchanger 23 is blown out upward, the internal volume of the outdoor heat exchanger 23 is preferably 5.5 L or more.

Also, the air conditioning device 1*b* according to the third embodiment has the first indoor unit 30 and the second indoor unit 35 provided in parallel to each other, instead of the indoor unit 30 in the above first embodiment.

In the first indoor unit 30, a first indoor heat exchanger 31, a first indoor fan 32, and a first indoor unit control section 34 are provided as in the indoor unit 30 in the above first embodiment, and furthermore, a first indoor expansion valve 33 is provided on the liquid side of the first indoor heat exchanger 31. The valve opening degree of the first indoor expansion valve 33 can be controlled.

As in the first indoor unit 30, the second indoor unit 35 has a second indoor heat exchanger 36, a second indoor fan 37, a second indoor unit control section 39, and a second indoor expansion valve 38 provided on the liquid side of the second indoor heat exchanger 36. The valve opening degree of the second indoor expansion valve 38 can be controlled.

Note that the controller 7 of the third embodiment is configured by connecting the outdoor unit control section 27, the first indoor unit control section 34, and the second indoor unit control section 39 in a communicable manner with each other.

In the cooling operation mode, the outdoor expansion valve 24 is controlled such that the degree of subcooling of the refrigerant passing through the liquid-side outlet of the outdoor heat exchanger 23 satisfies predetermined conditions. Also, in the cooling operation mode, the subcooling expansion valve 48 is controlled such that the degree of superheating of the refrigerant inhaled by the compressor 21 satisfies predetermined conditions. Note that, in the cooling operation mode, the first indoor expansion valve 33 and the second indoor expansion valve 38 are controlled to be in a fully open state.

In the heating operation mode, the first indoor expansion valve 33 is controlled such that the degree of subcooling of the refrigerant passing through the liquid-side outlet of the first indoor heat exchanger 31 satisfies predetermined conditions. Similarly, the second indoor expansion valve 38 is also controlled such that the degree of subcooling of the refrigerant passing through the liquid-side outlet of the second indoor heat exchanger 36 satisfies predetermined conditions. Moreover, in the heating operation mode, the outdoor expansion valve 45 is controlled such that the degree of superheating of the refrigerant inhaled by the compressor 21 satisfies predetermined conditions. Note that, in the heating operation mode, the subcooling expansion valve 48 is controlled such that the degree of superheating of the refrigerant inhaled by the compressor 21 satisfies predetermined conditions.

In the above air conditioning device 1*b*, in which multiple indoor units 30 and 35 are provided, the refrigerant is filled in the refrigerant circuit 10 such that the amount to be enclosed is 190 g or more and 1660 g or less per 1 kW of refrigeration capacity.

Note that the rated cooling capacity of the air conditioning device 1*b* provided with multiple indoor units 30 can be, for example, 4.0 kW or more and 150.0 kW or less, it is preferably 14.0 kW or more and 150.0 kW or less, and above all, for the case where the outdoor unit 20 is of top blowing type, it is preferably 22.4 kW or more and 150.0 kW or less.

In the above air conditioning device 1*b* provided with multiple indoor units of the third embodiment, any Refrigerant A, which is a refrigerant containing 1,2-difluoroethylene, is used as the refrigerant, and furthermore, as for the amount of refrigerant to be enclosed, the amount to be enclosed is set to 190 g or more and 1660 g or less per 1 kW of refrigeration capacity.

In the air conditioning device 1*b* provided with multiple indoor units as well, this makes it possible to, while using a refrigerant with a sufficiently smaller GWP than R32, keep the LCCP low by limiting the amount to be enclosed up to 1660 g per 1 kW of refrigeration capacity. Also, in the air conditioning device 1*b* provided with multiple indoor units as well, even with a refrigerant with a lower heat transfer capacity than R32, by setting the amount to be enclosed to 190 g or more per 1 kW of refrigeration capacity, it becomes possible to suppress reduction in the cycle efficiency due to shortage of refrigerant and suppress the rise in LCCP. From the above, in the air conditioning device 1*b* provided with multiple indoor units as well, it is possible to keep the LCCP low when carrying out a heat cycle using a refrigerant having a sufficiently small GWP.

(8-4) Fourth Embodiment

As for the amount of refrigerant to be enclosed in the case where the refrigerant circuit of the refrigeration cycle device is filled with any Refrigerant A, which is a refrigerant containing 1,2-difluoroethylene, the amount to be enclosed is set to 160 g or more and 560 g or less per 1 kW of refrigeration capacity for refrigeration cycle devices provided with only one indoor unit 30, as in the air conditioning device 1 of the first embodiment and the air conditioning device 1*a* of the second embodiment, whereas the amount to be enclosed is set to 190 g or more and 1660 g or less per 1 kW of refrigeration capacity for refrigeration cycle devices provided with multiple indoor units 30, as in the air conditioning device 1*b* of the third embodiment.

By doing so, it becomes possible to keep the GWP and LCCP low in accordance with the type of refrigeration cycle device.

(9) EMBODIMENTS OF TECHNOLOGY OF NINTH GROUP (9-1) First Embodiment

Figure 9A:
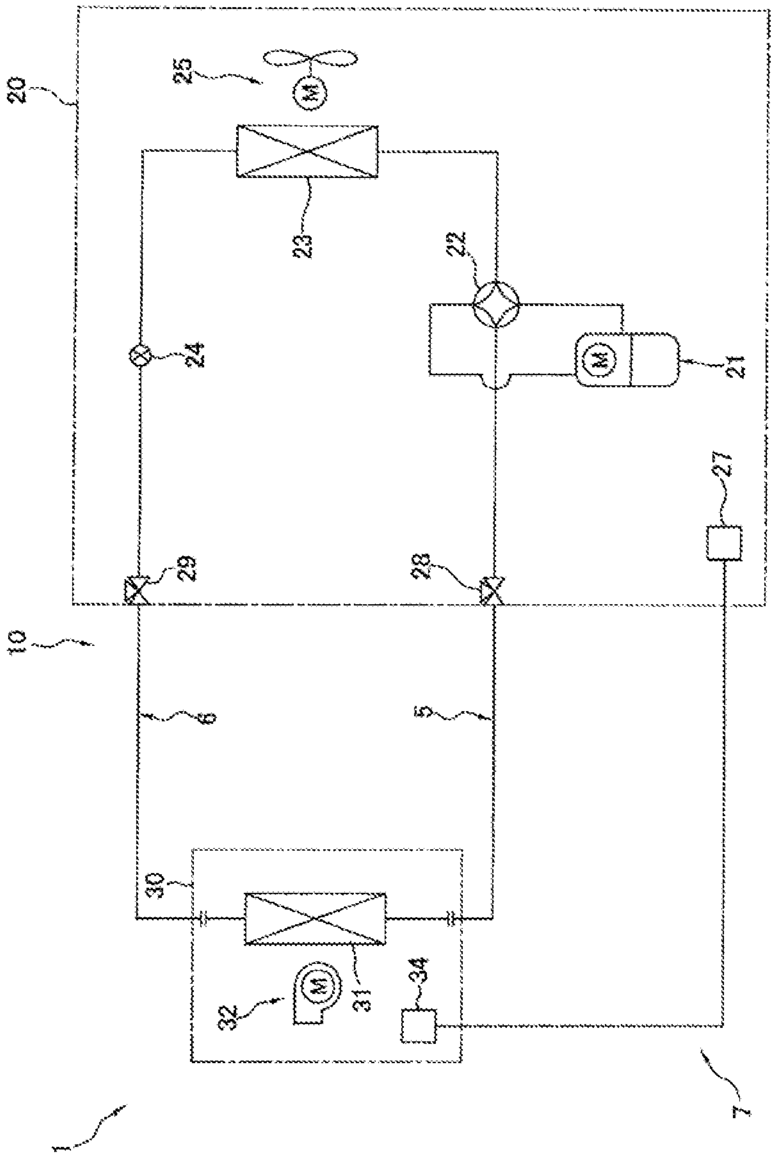
FIG. 9A is a schematic configuration diagram of a refrigerant circuit according to a first embodiment of the technology of a ninth group.
Figure 9B:
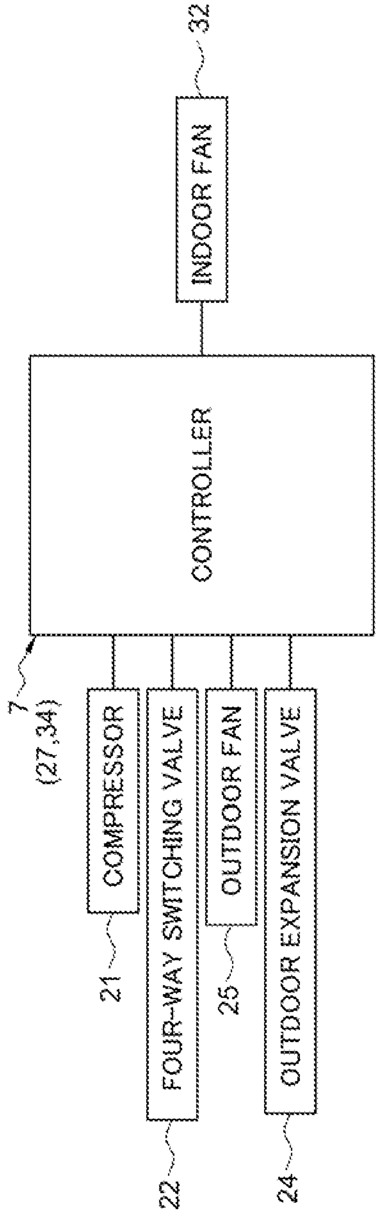
FIG. 9B is a schematic control block configuration diagram of a refrigeration cycle device according to the first embodiment of the technology of the ninth group.

Hereinafter, while referring to FIG. 9A, which is a schematic configuration diagram of a refrigerant circuit, and FIG. 9B, which is a schematic control block configuration diagram, an air conditioning device 1 as a refrigeration cycle device according to the first embodiment will be described.

The air conditioning device 1 is a device that conditions the air in the target space by carrying out a vapor compression type refrigeration cycle.

The air conditioning device 1 mainly has an outdoor unit 20, an indoor unit 30, liquid-side refrigerant communication piping 6 and gas-side refrigerant communication piping 5 that connect the outdoor unit 20 and the indoor unit 30, a remote control not shown in the figure as an input device and an output device, and a controller 7 that controls the motion of the air conditioning device 1.

In the air conditioning device 1, a refrigeration cycle is carried out in which a refrigerant enclosed in a refrigerant circuit 10 is compressed, cooled or condensed, decompressed, heated or evaporated, and then compressed again. In the present embodiment, the refrigerant circuit 10 is filled with a refrigerant for carrying out a vapor compression type refrigeration cycle. That refrigerant is a refrigerant containing 1,2-difluoroethylene, and any Refrigerant A can be used. The refrigerant circuit 10 is also filled with a refrigerator oil together with that refrigerant.

(9-1-1) Outdoor Unit 20

The outdoor unit 20 is in the shape of an approximately rectangular box in appearance, and has a structure (so-called trunk-type structure) in which the inside thereof is divided by a partition plate or the like to form a blower room and a machine room.

This outdoor unit 20 is connected to the indoor unit 30 via the liquid-side refrigerant communication piping 6 and the gas-side refrigerant communication piping 5, and constitutes a part of the refrigerant circuit 10. The outdoor unit 20 mainly has a compressor 21, a four-way switching valve 22, an outdoor heat exchanger 23, an outdoor expansion valve 24, an outdoor fan 25, a liquid-side shut-off valve 29, and a gas-side shut-off valve 28.

The compressor 21 is equipment that compresses a low-pressure refrigerant in the refrigeration cycle until it reaches a high pressure. Here, as the compressor 21, a compressor with a sealed structure in which a positive displacement compression element (omitted in the figure) such as a rotary type or scroll type is rotationally driven by a compressor motor is used. The compressor motor is for changing the volume, and the operation frequency can be controlled by an inverter. Note that the compressor 21 is provided with an accompanying accumulator, which is not shown in the figure, on the inlet side thereof. Note that the outdoor unit 20 of the present embodiment does not have a refrigerant container (such as a low-pressure receiver arranged on the inlet side of the compressor 21 or a high-pressure receiver arranged on the liquid side of the outdoor heat exchanger 23) that is larger than such an accompanying accumulator.

The four-way switching valve 22 can switch the state of connection between a cooling operation connection state in which the inlet side of the compressor 21 and the gas-side shut-off valve 28 are connected while connecting the discharge side of the compressor 21 and the outdoor heat exchanger 23, and a heating operation connection state in which the inlet side of the compressor 21 and the outdoor heat exchanger 23 are connected while connecting the discharge side of the compressor 21 and the gas-side shut-off valve 28.

The outdoor heat exchanger 23 is a heat exchanger that functions as a condenser for a high-pressure refrigerant in the refrigeration cycle during cooling operation and as an evaporator for a low-pressure refrigerant in the refrigeration cycle during heating operation. The outdoor heat exchanger 23 has multiple heat transfer fins and multiple heat transfer pipes penetrating and fixed to them.

The outdoor fan 25 generates an air flow for inhaling outdoor air into the outdoor unit 20, causing heat exchange between it and the refrigerant in the outdoor heat exchanger 23, and then discharging it outside. The outdoor fan 25 is rotationally driven by an outdoor fan motor. Note that, in the present embodiment, only one outdoor fan 25 is provided.

As for the outdoor expansion valve 24, its valve opening degree can be controlled, and it is provided between the liquid-side end of the outdoor heat exchanger 23 and the liquid-side shut-off valve 29.

The liquid-side shut-off valve 29 is a manual valve arranged at the connection part in the outdoor unit 20 with the liquid-side refrigerant communication piping 6.

The gas-side shut-off valve 28 is a manual valve arranged at the connection part in the outdoor unit 20 with the gas-side refrigerant communication piping 5.

The outdoor unit 20 has an outdoor unit control section 27 that controls the motion of each section that constitutes the outdoor unit 20. The outdoor unit control section 27 has a microcomputer that includes a CPU, a memory, and other elements. The outdoor unit control section 27 is connected to an indoor unit control section 34 of each indoor unit 30 via a communication line, and sends and receives control signals and the like. Also, the outdoor unit control section 27 is electrically connected to various sensors, which are not shown in the figure, and receives signals from each sensor.

(9-1-2) Indoor Unit 30

The indoor unit 30 is installed on the wall or the like of a room, which is the target space. The indoor unit 30 is connected to the outdoor unit 20 via the liquid-side refrigerant communication piping 6 and the gas-side refrigerant communication piping 5, and constitutes a part of the refrigerant circuit 10.

The indoor unit 30 has an indoor heat exchanger 31, an indoor fan 32, and the like.

The indoor heat exchanger 31 is connected to the liquid-side refrigerant communication piping 6 on the liquid side, and its gas-side end is connected to the gas-side refrigerant communication piping 5. The indoor heat exchanger 31 is a heat exchanger that functions as an evaporator for a low-pressure refrigerant in the refrigeration cycle during cooling operation and as a condenser for a high-pressure refrigerant in the refrigeration cycle during heating operation. The indoor heat exchanger 31 has multiple heat transfer fins and multiple heat transfer pipes penetrating and fixed to them.

The indoor fan 32 generates an air flow for inhaling indoor air into the indoor unit 30, causing heat exchange between it and the refrigerant in the indoor heat exchanger 31, and then discharging it outside. The indoor fan 32 is rotationally driven by an indoor fan motor, which is not shown in the figure.

Also, the indoor unit 30 has an indoor unit control section 34 that controls the motion of each section that constitutes the indoor unit 30. The indoor unit control section 34 has a microcomputer that includes a CPU, a memory, and other elements. The indoor unit control section 34 is connected to the outdoor unit control section 27 via a communication line, and sends and receives control signals and the like.

The indoor unit control section 34 is electrically connected to various sensors provided inside the indoor unit 30, which are not shown in the figure, and receives signals from each sensor.

(9-1-3) Details of Controller 7

In the air conditioning device 1, the outdoor unit control section 27 and the indoor unit control section 34 are connected via a communication line to constitute the controller 7, which controls the motion of the air conditioning device 1.

The controller 7 mainly has a CPU (central processing unit) and a memory such as ROM or RAM. Note that the various processings and controls by the controller 7 are realized by integrated functioning of each section included in the outdoor unit control section 27 and/or the indoor unit control section 34.

(9-1-4) Operation Modes

Hereinafter, the operation modes will be described.

There are two operation modes: a cooling operation mode and a heating operation mode.

The controller 7 determines and executes whether to be in the cooling operation mode or the heating operation mode, based on an instruction received from a remote control or the like.

(9-1-4-1) Cooling Operation Mode

In the cooling operation mode, the air conditioning device 1 sets the state of connection of the four-way switching valve 22 to the cooling operation connection state, in which the inlet side of the compressor 21 and the gas-side shut-off valve 28 are connected while connecting the discharge side of the compressor 21 and the outdoor heat exchanger 23, and circulates the refrigerant filled in the refrigerant circuit 10 mainly through the compressor 21, the outdoor heat exchanger 23, the outdoor expansion valve 24, and the indoor heat exchanger 31 in this order.

More specifically, when the cooling operation mode is started, in the refrigerant circuit 10, the refrigerant is inhaled into the compressor 21, compressed, and then discharged.

In the compressor 21, capacity control is carried out depending on cooling load required by the indoor unit 30. The gas refrigerant that has been discharged from the compressor 21 passes through the four-way switching valve 22 and flows into the gas-side end of the outdoor heat exchanger 23.

The gas refrigerant that has flowed into the gas-side end of the outdoor heat exchanger 23 undergoes heat exchange with the outdoor-side air supplied by the outdoor fan 25 and is condensed in the outdoor heat exchanger 23 to become a liquid refrigerant, which flows out of the liquid-side end of the outdoor heat exchanger 23.

The refrigerant that has flowed out of the liquid-side end of the outdoor heat exchanger 23 is decompressed as it passes through the outdoor expansion valve 24. Note that the outdoor expansion valve 24 is controlled such that the degree of subcooling of the refrigerant passing through the liquid-side outlet of the outdoor heat exchanger 23 satisfies predetermined conditions.

The refrigerant that has been decompressed by the outdoor expansion valve 24 passes through the liquid-side shut-off valve 29 and the liquid-side refrigerant communication piping 6, and flows into the indoor unit 30.

The refrigerant that has flowed into the indoor unit 30 flows into the indoor heat exchanger 31, undergoes heat exchange with the indoor air supplied by the indoor fan 32 and is evaporated in the indoor heat exchanger 31 to become a gas refrigerant, which flows out of the gas-side end of the indoor heat exchanger 31. The gas refrigerant that has flowed out of the gas-side end of the indoor heat exchanger 31 flows into the gas-side refrigerant communication piping 5.

The refrigerant that has flowed through the gas-side refrigerant communication piping 5 passes through the gas-side shut-off valve 28 and the four-way switching valve 22, and is again inhaled into the compressor 21.

(9-1-4-2) Heating Operation Mode

In the heating operation mode, the air conditioning device 1 sets the state of connection of the four-way switching valve 22 to the heating operation connection state, in which the inlet side of the compressor 21 and the outdoor heat exchanger 23 are connected while connecting the discharge side of the compressor 21 and the gas-side shut-off valve 28, and circulates the refrigerant filled in the refrigerant circuit 10 mainly through the compressor 21, the indoor heat exchanger 31, the outdoor expansion valve 24, and the outdoor heat exchanger 23 in this order.

More specifically, when the heating operation mode is started, in the refrigerant circuit 10, the refrigerant is inhaled into the compressor 21, compressed, and then discharged.

In the compressor 21, capacity control is carried out depending on heating load required by the indoor unit 30. The gas refrigerant that has been discharged from the compressor 21 flows through the four-way switching valve 22 and the gas-side refrigerant communication piping 5 and then flows into the indoor unit 30.

The refrigerant that has flowed into the indoor unit 30 flows into the gas-side end of the indoor heat exchanger 31, undergoes heat exchange with the indoor air supplied by the indoor fan 32 and is condensed in the indoor heat exchanger 31 to become a refrigerant in a gas-liquid two phase state or liquid refrigerant, which flows out of the liquid-side end of the indoor heat exchanger 31. The refrigerant that has flowed out of the liquid-side end of the indoor heat exchanger 31 flows into the liquid-side refrigerant communication piping 6.

The refrigerant that has flowed through the liquid-side refrigerant communication piping 6 is decompressed in the liquid-side shut-off valve 29 and the outdoor expansion valve 24 until it reaches the low pressure in the refrigeration cycle. Note that the outdoor expansion valve 24 is controlled such that the degree of subcooling of the refrigerant passing through the liquid-side outlet of the indoor heat exchanger 31 satisfies predetermined conditions. The refrigerant that has been decompressed by the outdoor expansion valve 24 flows into the liquid-side end of the outdoor heat exchanger 23.

The refrigerant that has flowed into the outdoor heat exchanger 23 from its liquid-side end undergoes heat exchange with the outdoor air supplied by the outdoor fan 25 and is evaporated in the outdoor heat exchanger 23 to become a gas refrigerant, which flows out of the gas-side end of the outdoor heat exchanger 23.

The refrigerant that has flowed out of the gas-side end of the outdoor heat exchanger 23 passes through the four-way switching valve 22, and is again inhaled into the compressor 21.

(9-1-5) Liquid-Side Refrigerant Communication Piping 6

As for the liquid-side refrigerant communication piping 6 of the air conditioning device 1 of the first embodiment in which Refrigerant A is used, when the pipe outer diameter is expressed as $D_0/8$ inches, the range of $D_0$ is "$2 \le D_0 \le 4$", which is the same as the pipe outer diameter of liquid-side refrigerant communication piping when refrigerant R410A is used. Since the physical properties of Refrigerant A, such as pressure loss, are similar to those of refrigerant R410A, reduction in capacity can be suppressed by making the pipe outer diameter of this liquid-side refrigerant communication piping 6 the same as the pipe outer diameter of liquid-side refrigerant communication piping when refrigerant R410A is used.

Especially, in the liquid-side refrigerant communication piping 6 of the first embodiment, $D_0$ is preferably 2 (that is, the piping diameter is ¼ inches).

In particular, as for the liquid-side refrigerant communication piping 6 of the present embodiment, $D_0$ is more preferably 2.5 (that is, the piping diameter is 5/16 inches) in the case where the rated refrigeration capacity of the air conditioning device 1 is 7.5 kW or more, $D_0$ is more preferably 2 (that is, the piping diameter is ¼ inches) in the case where the rated refrigeration capacity of the air conditioning device 1 is 2.6 kW or more and less than 7.5 kW, and $D_0$ is more preferably 1.5 (that is, the piping diameter is 3/16 inches) in the case where the rated refrigeration capacity of the air conditioning device 1 is less than 2.6 kW.

(9-1-6) Gas-Side Refrigerant Communication Piping 5

As for the gas-side refrigerant communication piping 5 of the air conditioning device 1 of the first embodiment in which Refrigerant A is used, when the pipe outer diameter is expressed as $D_0/8$ inches, the range of $D_0$ is "$3 \le D_0 \le 8$", which is the same as the pipe outer diameter of gas-side refrigerant communication piping when refrigerant R410A is used. Since the physical properties of Refrigerant A, such as pressure loss, are similar to those of refrigerant R410A, reduction in capacity can be suppressed by making the pipe outer diameter of this gas-side refrigerant communication piping 5 the same as the pipe outer diameter of gas-side refrigerant communication piping when refrigerant R410A is used.

Especially, as for the gas-side refrigerant communication piping 5 of the first embodiment, $D_0$ is preferably 4 (that is, the piping diameter is ½ inches) in the case where the rated refrigeration capacity of the air conditioning device 1 is 6.0 kW or more, and $D_0$ is preferably 3 (that is, the piping diameter is ⅜ inches) in the case where the rated refrigeration capacity of the air conditioning device 1 is less than 6.0 kW.

In particular, as for the gas-side refrigerant communication piping 5 of the first embodiment, $D_0$ is more preferably 4 (that is, the piping diameter is ½ inches) in the case where the rated refrigeration capacity of the air conditioning device 1 is 6.0 kW or more, $D_0$ is more preferably 3 (that is, the piping diameter is ⅜ inches) in the case where the rated refrigeration capacity of the air conditioning device 1 is 3.2 kW or more and less than 6.0 kW, and $D_0$ is more preferably 2.5 (that is, the piping diameter is 5/16 inches) in the case where the rated refrigeration capacity of the air conditioning device 1 is less than 3.2 kW.

(9-1-7) Characteristics of First Embodiment

In the air conditioning device 1 mentioned above, a refrigerant containing 1,2-difluoroethylene is used, which makes it possible to keep the GWP sufficiently small.

(9-1-8) Relationship Between Refrigerant and Pipe Outer Diameter of Refrigerant Communication Piping In the air conditioning device 1 of the first embodiment, when refrigerants R410A and R32 are to be used instead of Refrigerant A, the liquid-side refrigerant communication piping 6 and the gas-side refrigerant communication piping 5 with the pipe outer diameters (in inches) as shown in Table 1 and Table 2 below are generally used in accordance with the range of rated cooling capacity.

In contrast, in the air conditioning device 1 of the first embodiment, when Refrigerant A containing 1,2-difluoroethylene is used, by using the liquid-side refrigerant communication piping 6 and the gas-side refrigerant communication piping 5 with the pipe outer diameters (in inches) as shown in Table 1 or Table 2 below in accordance with the range of rated cooling capacity, it is possible to keep the reduction in capacity when Refrigerant A containing 1,2-difluoroethylene is used small.

TABLE 1

| | | R410A, R32 | | Refrigerant A | |
|---|---|---|---|---|---|
| Horsepower [HP] | Rated cooling capacity [kW] | Gas-side refrigerant communication piping | Liquid-side refrigerant communication piping | Gas-side refrigerant communication piping | Liquid-side refrigerant communication piping |
| 0.8 | 2.2 | ⅜ | ¼ | ⅜ | ¼ |
| 0.9 | 2.5 | ⅜ | ¼ | ⅜ | ¼ |
| 1.0 | 2.8 | ⅜ | ¼ | ⅜ | ¼ |
| 1.3 | 3.6 | ⅜ | ¼ | ⅜ | ¼ |
| 1.4 | 4.0 | ⅜ | ¼ | ⅜ | ¼ |
| 2.0 | 5.6 | ⅜ | ¼ | ⅜ | ¼ |
| 2.3 | 6.3 | ½ | ¼ | ½ | ¼ |
| 2.5 | 7.1 | ½ | ¼ | ½ | ¼ |
| 2.9 | 8.0 | ½ | ¼ | ½ | ¼ |
| 3.2 | 9.0 | ½ | ¼ | ½ | ¼ |

TABLE 2

| | | R410A, R32 | | Refrigerant A | |
|---|---|---|---|---|---|
| Horsepower [HP] | Rated cooling capacity [kW] | Gas-side refrigerant communication piping | Liquid-side refrigerant communication piping | Gas-side refrigerant communication piping | Liquid-side refrigerant communication piping |
| 0.8 | 2.2 | ⅜ | ¼ | 5/16 | 3/16 |
| 0.9 | 2.5 | ⅜ | ¼ | 5/16 | 3/16 |
| 1.0 | 2.8 | ⅜ | ¼ | 5/16 | ¼ |
| 1.3 | 3.6 | ⅜ | ¼ | ⅜ | ¼ |
| 1.4 | 4.0 | ⅜ | ¼ | ⅜ | ¼ |
| 2.0 | 5.6 | ⅜ | ¼ | ⅜ | ¼ |
| 2.3 | 6.3 | ½ | ¼ | ½ | ¼ |
| 2.5 | 7.1 | ½ | ¼ | ½ | ¼ |
| 2.9 | 8.0 | ½ | ¼ | ½ | 5/16 |
| 3.2 | 9.0 | ½ | ¼ | ½ | 5/16 |

Also, by setting the pipe outer diameter of the liquid-side refrigerant communication piping 6 and the pipe outer diameter of the gas-side refrigerant communication piping 5 to a predetermined range in the air conditioning device 1, reduction in capacity can be kept small even when specific Refrigerant A is used.

Figure 9C:
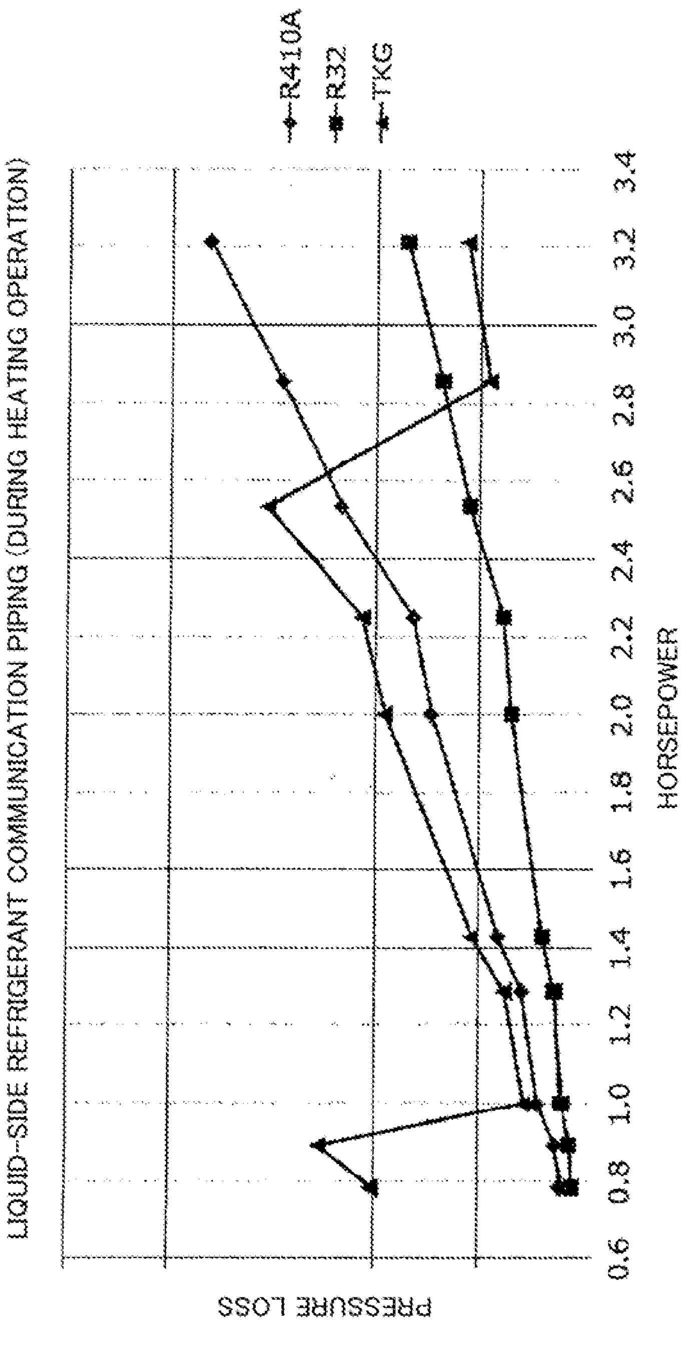
FIG. 9C is a graph of the pressure loss during heating operation of a liquid-side refrigerant communication piping for each pipe outer diameter when refrigerants R410A and R32 and the refrigerant of the present disclosure are used in an air conditioning device according to the first embodiment of the technology of the ninth group.
Figure 9D:
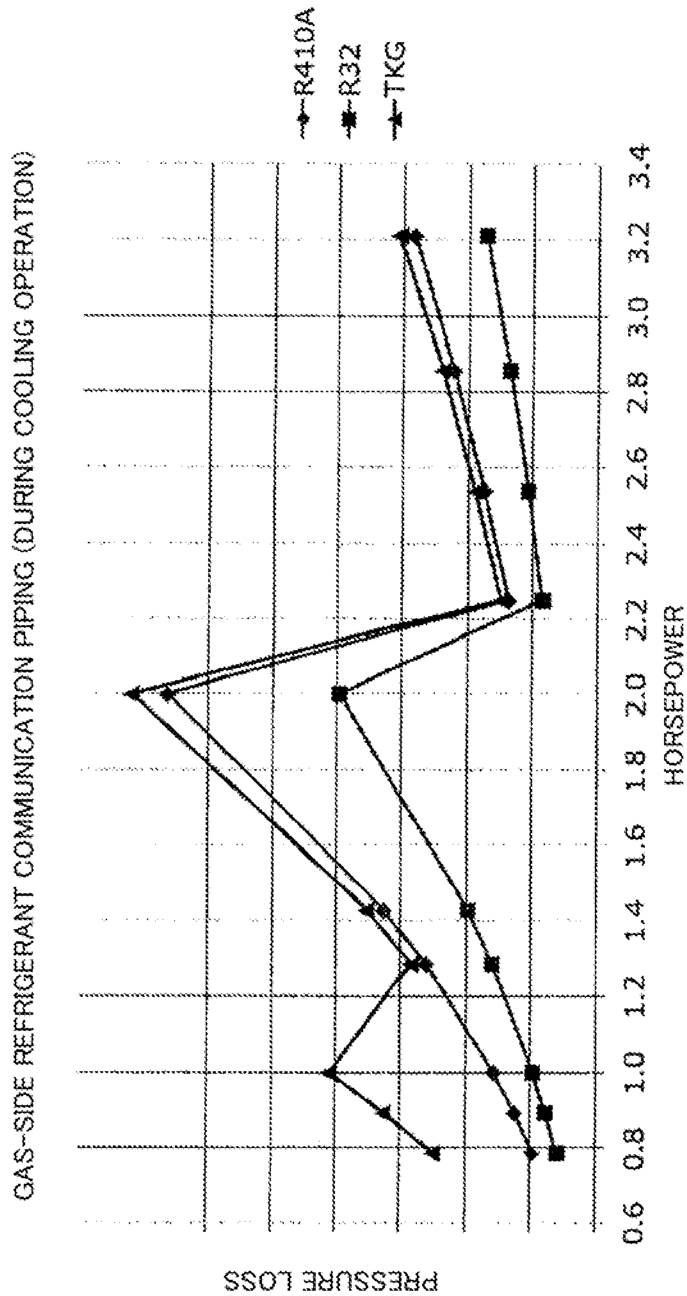
FIG. 9D is a graph of the pressure loss during cooling operation of a gas-side refrigerant communication piping for each pipe outer diameter when refrigerants R410A and R32 and the refrigerant of the present disclosure are used in the air conditioning device according to the first embodiment of the technology of the ninth group.

Here, for the case where each of refrigerants R410A and R32 and the above Refrigerant A of the present disclosure containing 1,2-difluoroethylene is used in the air conditioning device 1 of the first embodiment, and the liquid-side refrigerant communication piping 6 and the gas-side refrigerant communication piping 5 having the pipe outer diameters described in Table 2 are used, FIG. 9C shows the pressure loss during heating operation of the liquid-side refrigerant communication piping 6, and FIG. 9D shows the pressure loss during cooling operation of the gas-side refrigerant communication piping 5. Note that the pressure loss was calculated as the pressure loss of the refrigerant occurring in the refrigerant communication piping based on the refrigerant circulation amount required when the device is operated at the rated capacity in accordance with the horsepower, with a common control target value for each of the condensation temperature, the evaporating temperature, the degree of subcooling of the refrigerant at the condenser outlet, and the degree of superheating of the refrigerant at the evaporator outlet. Also, the unit for horsepower is HP.

As can be seen from these FIG. 9C and FIG. 9D, Refrigerant A of the present disclosure containing 1,2-difluoroethylene is able to approximate the behavior of pressure loss with that of refrigerant R410A, and it can be seen that the reduction in capacity when Refrigerant A is used in the air conditioning device 1 can be kept small. This point is common for every Refrigerant A of the present disclosure, sharing the point of containing 1,2-difluoroethylene.

(9-1-9) Modification A of First Embodiment

In the above first embodiment, the air conditioning device provided with only one indoor unit has been described as an example, but the air conditioning device may be provided with multiple indoor units connected in parallel to each other (those not having an indoor expansion valve).

(9-2) Second Embodiment

Figure 9E:
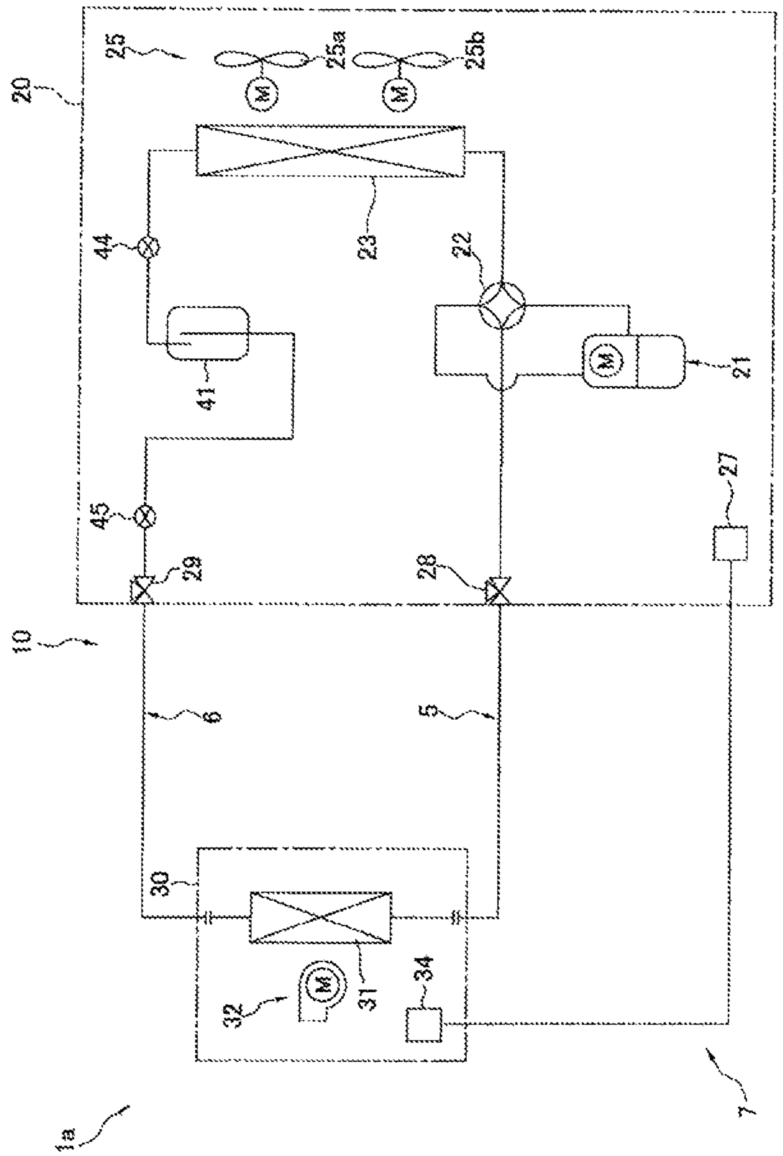
FIG. 9E is a schematic configuration diagram of a refrigerant circuit according to a second embodiment of the technology of the ninth group.
Figure 9F:
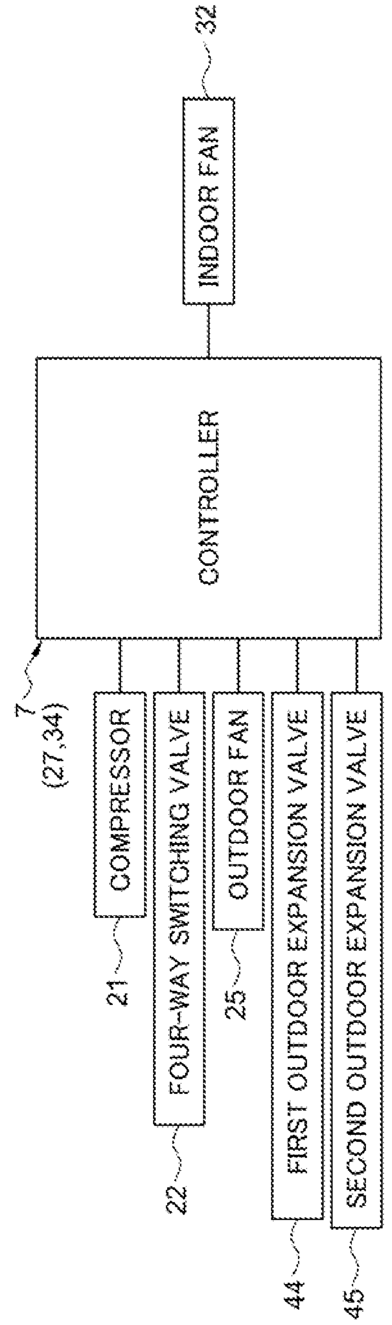
FIG. 9F is a schematic control block configuration diagram of a refrigeration cycle device according to the second embodiment of the technology of the ninth group.

Hereinafter, while referring to FIG. 9E, which is a schematic configuration diagram of a refrigerant circuit, and FIG. 9F, which is a schematic control block configuration diagram, an air conditioning device 1*a* as a refrigeration cycle device according to the second embodiment will be described.

In the following, as for the air conditioning device 1*a* of the second embodiment, description will be mainly focused on the differences from the air conditioning device 1 of the first embodiment.

In the air conditioning device 1*a* as well, the refrigerant circuit 10 is filled with any Refrigerant A, which is a mixed refrigerant containing 1,2-difluoroethylene, as the refrigerant for carrying out a vapor compression type refrigeration cycle. The refrigerant circuit 10 is also filled with a refrigerator oil together with that refrigerant.

(9-2-1) Outdoor Unit 20

In the outdoor unit 20 of the air conditioning device 1*a* of the second embodiment, a first outdoor fan 25*a* and a second outdoor fan 25*b* are provided as the outdoor fan 25. In the outdoor heat exchanger 23 of the outdoor unit 20 of the air conditioning device 1*a*, a large heat exchange area is ensured so as to correspond to an air flow received from the first outdoor fan 25*a* and the second outdoor fan 25*b*.

In the outdoor unit 20 of the air conditioning device 1*a*, instead of the outdoor expansion valve 24 of the outdoor unit 20 in the first embodiment described above, a first outdoor expansion valve 44, an intermediate pressure receiver 41, and a second outdoor expansion valve 45 are sequentially provided between the liquid side of the outdoor heat exchanger 23 and the liquid-side shut-off valve 29. The valve opening degree of the first outdoor expansion valve 44 and the second outdoor expansion valve 45 can be controlled. The intermediate pressure receiver 41 is a container that is capable of storing the refrigerant, with both the end of piping extending from the side of the first outdoor expansion valve 44 and the end of piping extending from the side of the second outdoor expansion valve 45 located in the internal space thereof. Note that the internal volume of the intermediate pressure receiver 41 is larger than the internal volume of the accompanying accumulator that accompanies the compressor 21, and is preferably twice as large or more.

The outdoor unit 20 of the second embodiment is in the shape of an approximately rectangular box, and has a structure (so-called trunk-type structure) in which a blower room and a machine room are formed by being divided by a vertically extending partition plate or the like.

The outdoor heat exchanger 23 has multiple heat transfer fins and multiple heat transfer pipes penetrating and fixed to them, for example. This outdoor heat exchanger 23 is arranged to be in an L shape in the plan view.

As for the above air conditioning device 1*a*, in the cooling operation mode, the first outdoor expansion valve 44 is controlled such that the degree of subcooling of the refrigerant passing through the liquid-side outlet of the outdoor heat exchanger 23 satisfies predetermined conditions, for example. Also, in the cooling operation mode, the second outdoor expansion valve 45 is controlled such that the degree of superheating of the refrigerant inhaled by the compressor 21 satisfies predetermined conditions, for example.

In addition, in the heating operation mode, the second outdoor expansion valve 45 is controlled such that the degree of subcooling of the refrigerant passing through the liquid-side outlet of the indoor heat exchanger 31 satisfies predetermined conditions, for example. Moreover, in the heating operation mode, the first outdoor expansion valve 44 is controlled such that the degree of superheating of the refrigerant inhaled by the compressor 21 satisfies predetermined conditions, for example.

(9-2-2) Indoor Unit 30

The indoor unit 30 of the second embodiment is installed by being suspended in an upper space of a room, which is the target space, or installed against a ceiling surface, or installed against a wall surface, for use. The indoor unit 30 is connected to the outdoor unit 20 via the liquid-side refrigerant communication piping 6 and the gas-side refrigerant communication piping 5, and constitutes a part of the refrigerant circuit 10.

The indoor unit 30 has an indoor heat exchanger 31, an indoor fan 32, and the like.

The indoor heat exchanger 31 of the second embodiment has multiple heat transfer fins and multiple heat transfer pipes penetrating and fixed to them.

(9-2-3) Liquid-Side Refrigerant Communication Piping 6

As for the liquid-side refrigerant communication piping 6 of the air conditioning device 1*a* of the second embodiment in which Refrigerant A is used, when the pipe outer diameter is expressed as $D_0$/8 inches, the range of Do can be "$2 \leq D_0 \leq 4$", irrespective of the relationship with the pipe outer diameter when R410A or R32 is used.

Also, as for the liquid-side refrigerant communication piping 6 of the air conditioning device 1*a* of the second embodiment in which Refrigerant A is used, when the pipe outer diameter is expressed as $D_0/8$ inches (where "$D_0-1/8$ inches" is the pipe outer diameter of liquid-side refrigerant communication piping when refrigerant R32 is used), the range of $D_0$ is "$2 \le D_0 \le 4$". Although Refrigerant A is more prone to pressure loss than refrigerant R32, the pipe outer diameter of the liquid-side refrigerant communication piping 6 of the air conditioning device 1*a* of the second embodiment is of a size larger than or equal to the pipe outer diameter when refrigerant R32 is used, and therefore, reduction in capacity can be suppressed. Especially, as for the liquid-side refrigerant communication piping 6 of the air conditioning device 1*a*, when the pipe outer diameter is expressed as $D_0/8$ inches (where "$D_0-1/8$ inches" is the pipe outer diameter of liquid-side refrigerant communication piping when refrigerant R32 is used), it is preferable that $D_0$ is 3 (that is, the piping diameter is 3/8 inches) in the case where the rated refrigeration capacity of the air conditioning device 1*a* is greater than 5.6 kW or more and less than 11.2 kW, and it is more preferable that $D_0$ is 3 (that is, the piping diameter is 3/8 inches) in the case where the rated refrigeration capacity of the air conditioning device 1*a* is 6.3 kW or more and 10.0 kW or less.

In addition, as for the liquid-side refrigerant communication piping 6 of the air conditioning device 1*a* of the second embodiment in which Refrigerant A is used, when the pipe outer diameter is expressed as $D_0/8$ inches, the range of $D_0$ is "$2 \le D_0 \le 4$", which is the same as the pipe outer diameter of liquid-side refrigerant communication piping when refrigerant R410A is used. Since the physical properties of Refrigerant A, such as pressure loss, are similar to those of refrigerant R410A, reduction in capacity can be suppressed by making the pipe outer diameter of this liquid-side refrigerant communication piping 6 the same as the pipe outer diameter of liquid-side refrigerant communication piping when refrigerant R410A is used.

Especially, as for the liquid-side refrigerant communication piping 6 of the air conditioning device 1*a* of the second embodiment in which Refrigerant A is used, when the pipe outer diameter is expressed as $D_0/8$ inches, it is preferable that $D_0$ is 3 (that is, the piping diameter is 3/8 inches) in the case where the rated refrigeration capacity of the air conditioning device 1*a* is 6.3 kW or more, it is preferable that $D_0$ is 2 (that is, the piping diameter is 1/4 inches) in the case where the rated refrigeration capacity of the air conditioning device 1*a* is less than 6.3 kW, and it is more preferable that both of them are the same as the pipe outer diameter of liquid-side refrigerant communication piping when refrigerant R410A is used.

In particular, as for the liquid-side refrigerant communication piping 6 of the air conditioning device 1*a* of the second embodiment in which Refrigerant A is used, when the pipe outer diameter is expressed as $D_0/8$ inches, it is preferable that $D_0$ is 3 (that is, the piping diameter is 3/8 inches) in the case where the rated refrigeration capacity of the air conditioning device 1*a* is 12.5 kW or more, it is preferable that $D_0$ is 2.5 (that is, the piping diameter is 5/16 inches) in the case where the rated refrigeration capacity of the air conditioning device 1*a* is 6.3 kW or more and less than 12.5 kW, and it is preferable that $D_0$ is 2 (that is, the piping diameter is 1/4 inches) in the case where the rated refrigeration capacity of the air conditioning device 1*a* is less than 6.3 kW.

(9-2-4) Gas-Side Refrigerant Communication Piping 5

As for the gas-side refrigerant communication piping 5 of the air conditioning device 1*a* of the second embodiment in which Refrigerant A is used, when the pipe outer diameter is expressed as $D_0/8$ inches, the range of Do can be "$3 \le D_0 \le 8$", irrespective of the relationship with the pipe outer diameter when R410A or R32 is used.

Also, as for the gas-side refrigerant communication piping 5 of the air conditioning device 1*a* of the second embodiment in which Refrigerant A is used, when the pipe outer diameter is expressed as $D_0/8$ inches (where "$D_0-1/8$ inches" is the pipe outer diameter of gas-side refrigerant communication piping when refrigerant R32 is used), the range of $D_0$ is "$3 \le D_0 \le 8$". Although Refrigerant A is more prone to pressure loss than refrigerant R32, the pipe outer diameter of the gas-side refrigerant communication piping 5 of the air conditioning device 1*a* of the second embodiment is of a size larger than or equal to the pipe outer diameter when refrigerant R32 is used, and therefore, reduction in capacity can be suppressed. Especially, as for the gas-side refrigerant communication piping 5 of the air conditioning device 1*a*, when the pipe outer diameter is expressed as $D_0/8$ inches (where "$D_0-1/8$ inches" is the pipe outer diameter of gas-side refrigerant communication piping when refrigerant R32 is used), it is preferable that $D_0$ is 7 (that is, the piping diameter is 7/8 inches) in the case where the rated refrigeration capacity of the air conditioning device 1*a* is greater than 22.4 kW, it is preferable that $D_0$ is 6 (that is, the piping diameter is 6/8 inches) in the case where the rated refrigeration capacity of the air conditioning device 1*a* is greater than 14.0 kW and less than 22.4 kW, it is preferable that $D_0$ is 5 (that is, the piping diameter is 5/8 inches) in the case where the rated refrigeration capacity of the air conditioning device 1*a* is greater than 5.6 kW and less than 11.2 kW, and it is preferable that $D_0$ is 4 (that is, the piping diameter is 1/2 inches) in the case where the rated refrigeration capacity of the air conditioning device 1*a* is less than 4.5 kW. In this case, it is more preferable that $D_0$ is 7 (that is, the piping diameter is 7/8 inches) in the case where the rated refrigeration capacity of the air conditioning device 1*a* is 25.0 kW or more, it is more preferable that $D_0$ is 6 (that is, the piping diameter is 6/8 inches) in the case where the rated refrigeration capacity of the air conditioning device 1*a* is 15.0 kW or more and less than 19.0 kW, it is more preferable that $D_0$ is 5 (that is, the piping diameter is 5/8 inches) in the case where the rated refrigeration capacity of the air conditioning device 1*a* is 6.3 kW or more and less than 10.0 kW, and it is more preferable that $D_0$ is 4 (that is, the piping diameter is 1/2 inches) in the case where the rated refrigeration capacity of the air conditioning device 1*a* is less than 4.0 kW.

In addition, as for the gas-side refrigerant communication piping 5 of the air conditioning device 1*a* of the second embodiment in which Refrigerant A is used, when the pipe outer diameter is expressed as $D_0/8$ inches, the range of $D_0$ is "$3 \le D_0 \le 8$", which is the same as the pipe outer diameter of gas-side refrigerant communication piping when refrigerant R410A is used. Since the physical properties of Refrigerant A, such as pressure loss, are similar to those of refrigerant R410A, reduction in capacity can be suppressed by making the pipe outer diameter of this gas-side refrigerant communication piping 5 the same as the pipe outer diameter of gas-side refrigerant communication piping when refrigerant R410A is used.

Especially, as for the gas-side refrigerant communication piping 5 of the air conditioning device 1*a* of the second embodiment in which Refrigerant A is used, when the pipe outer diameter is expressed as $D_0/8$ inches, it is preferable that $D_0$ is 7 (that is, the piping diameter is 7/8 inches) in the case where the rated refrigeration capacity of the air conditioning device 1*a* is 25.0 kW or more, it is preferable that $D_0$ is 6 (that is, the piping diameter is 6/8 inches) in the case where the rated refrigeration capacity of the air conditioning device 1*a* is 15.0 kW or more and less than 25.0 kW, it is preferable that Do is 5 (that is, the piping diameter is ⅝ inches) in the case where the rated refrigeration capacity of the air conditioning device 1*a* is 6.3 kW or more and less than 15.0 kW, it is preferable that $D_0$ is 4 (that is, the piping diameter is ½ inches) in the case where the rated refrigeration capacity of the air conditioning device 1*a* is less than 6.3 kW, and it is more preferable that all of them are the same as the pipe outer diameter of gas-side refrigerant communication piping when refrigerant R410A is used.

(9-2-5) Characteristics of Second Embodiment

In the air conditioning device 1*a* according to the above second embodiment as well, as in the air conditioning device 1 according to the first embodiment, a refrigerant containing 1,2-difluoroethylene is used, which makes it possible to keep the GWP sufficiently small.

Also, by setting the pipe outer diameter of the liquid-side refrigerant communication piping 6 and the pipe outer diameter of the gas-side refrigerant communication piping 5 to a predetermined range in the air conditioning device 1*a*, reduction in capacity can be kept small even when specific Refrigerant A is used.

(9-2-6) Relationship Between Refrigerant and Pipe Outer Diameter of Refrigerant Communication Piping In the air conditioning device 1*a* of the second embodiment, when refrigerants R410A and R32 are to be used instead of Refrigerant A, the liquid-side refrigerant communication piping 6 and the gas-side refrigerant communication piping 5 with the pipe outer diameters (in inches) as shown in Table 3 and Table 4 below are generally used in accordance with the range of rated cooling capacity.

In contrast, in the air conditioning device 1*a* of the second embodiment, when Refrigerant A of the present disclosure containing 1,2-difluoroethylene is used, by using the liquid-side refrigerant communication piping 6 and the gas-side refrigerant communication piping 5 with the pipe outer diameters (in inches) as shown in Table 3 or Table 4 below in accordance with the range of rated cooling capacity, it is possible to keep the reduction in capacity, when Refrigerant A of the present disclosure containing 1,2-difluoroethylene is used small.

TABLE 3

| | | R410A | | R32 | | Refrigerant A | |
|---|---|---|---|---|---|---|---|
| Horse-power [HP] | Rated cooling capacity [kW] | Gas-side refrigerant communication piping | Liquid-side refrigerant communication piping | Gas-side refrigerant communication piping | Liquid-side refrigerant communication piping | Gas-side refrigerant communication piping | Liquid-side refrigerant communication piping |
| 0.8 | 2.2 | ½ | ¼ | ⅜ | ¼ | ½ | ¼ |
| 1.0 | 2.8 | ½ | ¼ | ⅜ | ¼ | ½ | ¼ |
| 1.3 | 3.6 | ½ | ¼ | ⅜ | ¼ | ½ | ¼ |
| 1.6 | 4.5 | ½ | ¼ | ½ | ¼ | ½ | ¼ |
| 2.0 | 5.6 | ½ | ¼ | ½ | ¼ | ½ | ¼ |
| 2.5 | 7.1 | ⅝ | ⅜ | ½ | ¼ | ⅝ | ⅜ |
| 2.9 | 8.0 | ⅝ | ⅜ | ½ | ¼ | ⅝ | ⅜ |
| 3.2 | 9.0 | ⅝ | ⅜ | ½ | ¼ | ⅝ | ⅜ |
| 4.0 | 11.2 | ⅝ | ⅜ | ⅝ | ⅜ | ⅝ | ⅜ |
| 5.0 | 14.0 | ⅝ | ⅜ | ⅝ | ⅜ | ⅝ | ⅜ |
| 6.0 | 16.0 | 6/8 | ⅜ | ⅝ | ⅜ | 6/8 | ⅜ |
| 8.0 | 22.4 | 6/8 | ⅜ | 6/8 | ⅜ | 6/8 | ⅜ |
| 10.0 | 28.0 | ⅞ | ⅜ | 6/8 | ⅜ | ⅞ | ⅜ |

TABLE 4

| | | R410A | | R32 | | Refrigerant A | |
|---|---|---|---|---|---|---|---|
| Horse-power [HP] | Rated cooling capacity [kW] | Gas-side refrigerant communication piping | Liquid-side refrigerant communication piping | Gas-side refrigerant communication piping | Liquid-side refrigerant communication piping | Gas-side refrigerant communication piping | Liquid-side refrigerant communication piping |
| 0.8 | 2.2 | ½ | ¼ | ⅜ | ¼ | ½ | ¼ |
| 1.0 | 2.8 | ½ | ¼ | ⅜ | ¼ | ½ | ¼ |
| 1.3 | 3.6 | ½ | ¼ | ⅜ | ¼ | ½ | ¼ |
| 1.6 | 4.5 | ½ | ¼ | ½ | ¼ | ½ | ¼ |
| 2.0 | 5.6 | ½ | ¼ | ½ | ¼ | ½ | ¼ |
| 2.5 | 7.1 | ⅝ | ⅜ | ½ | ¼ | ⅝ | 5/16 |
| 2.9 | 8.0 | ⅝ | ⅜ | ½ | ¼ | ⅝ | 5/16 |
| 3.2 | 9.0 | ⅝ | ⅜ | ½ | ¼ | ⅝ | 5/16 |
| 4.0 | 11.2 | ⅝ | ⅜ | ⅝ | ⅜ | ⅝ | 5/16 |
| 5.0 | 14.0 | ⅝ | ⅜ | ⅝ | ⅜ | ⅝ | ⅜ |
| 6.0 | 16.0 | 6/8 | ⅜ | ⅝ | ⅜ | 6/8 | ⅜ |
| 8.0 | 22.4 | 6/8 | ⅜ | 6/8 | ⅜ | 6/8 | ⅜ |
| 10.0 | 28.0 | ⅞ | ⅜ | 6/8 | ⅜ | ⅞ | ⅜ |

Figure 9G:
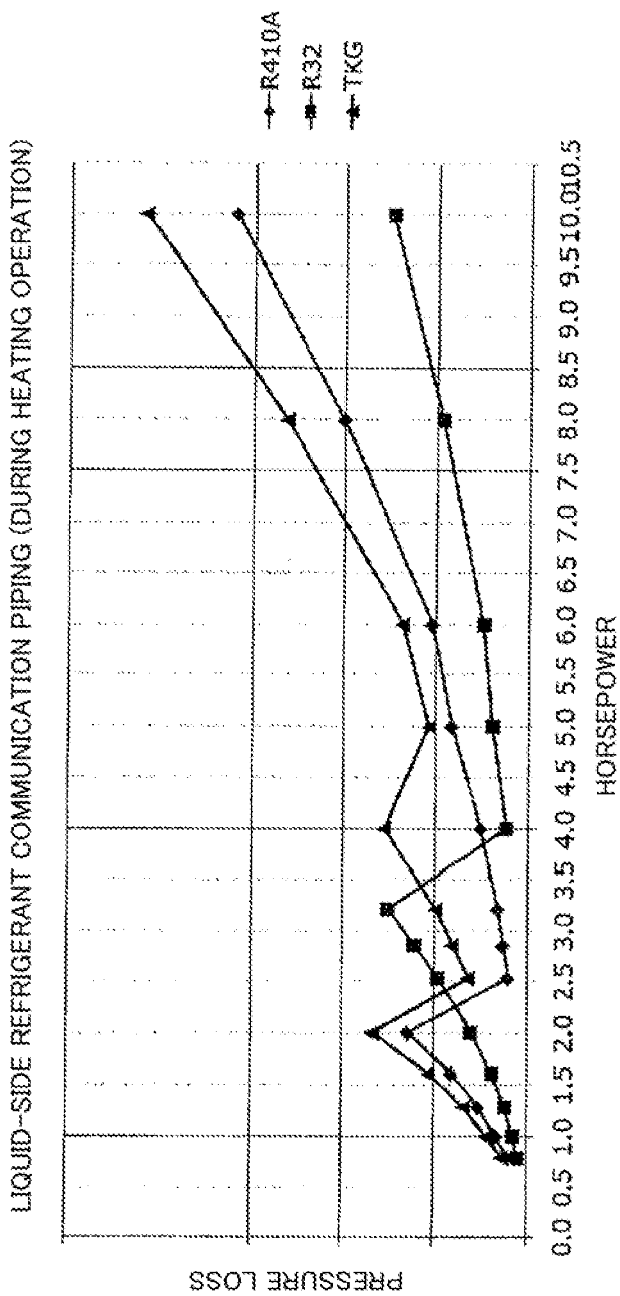
FIG. 9G is a graph of the pressure loss during heating operation of a liquid-side refrigerant communication piping for each pipe outer diameter when refrigerants R410A and R32 and the refrigerant of the present disclosure are used in an air conditioning device according to the second embodiment of the technology of the ninth group.
Figure 9H:
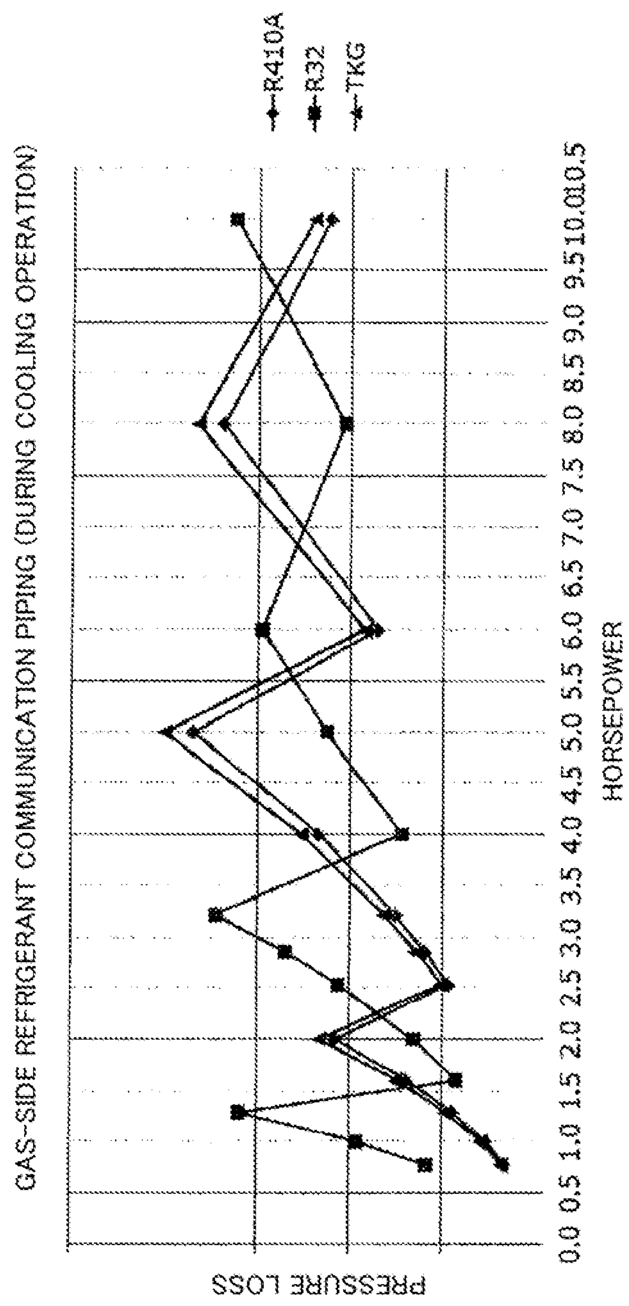
FIG. 9H is a graph of the pressure loss during cooling operation of a gas-side refrigerant communication piping for each pipe outer diameter when refrigerants R410A and R32 and the refrigerant of the present disclosure are used in the air conditioning device according to the second embodiment of the technology of the ninth group.
Figure 91:
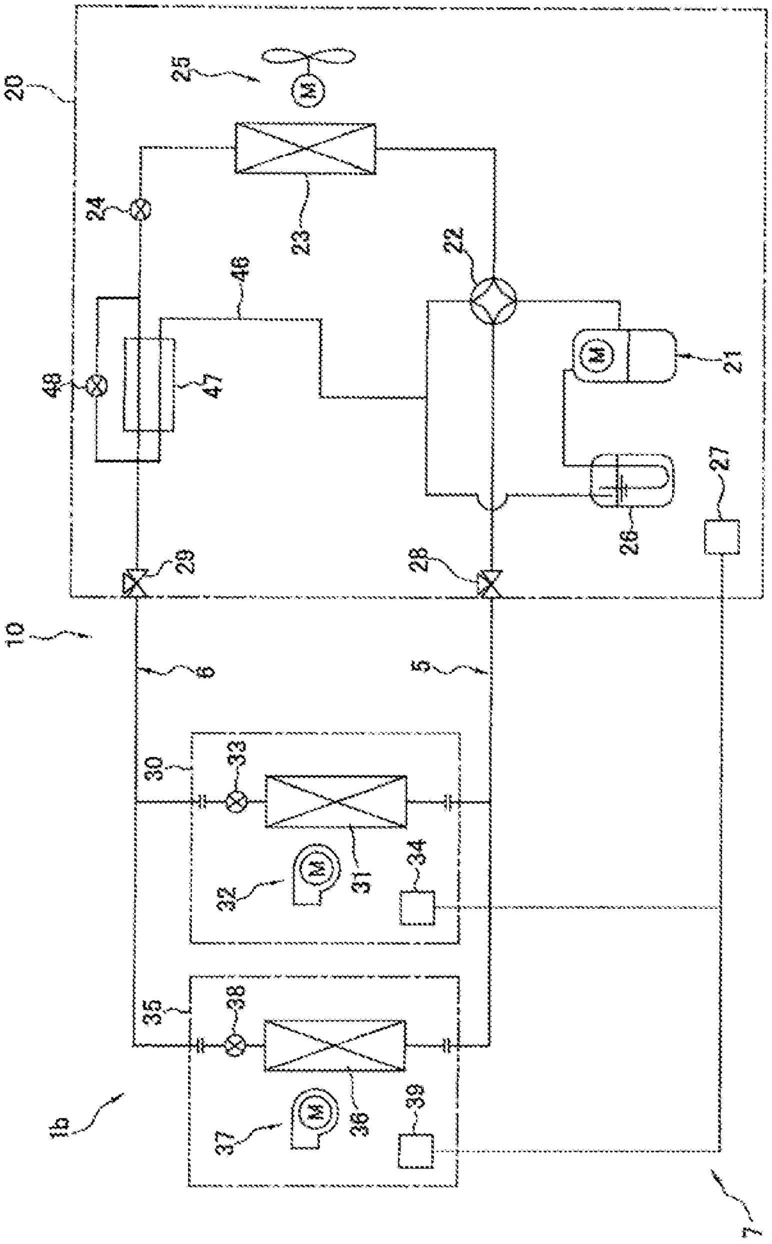

Here, for the case where each of refrigerants R410A and R32 and the above Refrigerant A of the present disclosure containing 1,2-difluoroethylene is used in the air conditioning device 1*a* of the second embodiment, and the liquid-side refrigerant communication piping 6 and the gas-side refrigerant communication piping 5 having the pipe outer diameters described in Table 4 are used, FIG. 9G shows the pressure loss during heating operation of the liquid-side refrigerant communication piping 6, and FIG. 9H shows the pressure loss during cooling operation of the gas-side refrigerant communication piping 5. Note that the pressure loss was calculated as the pressure loss of the refrigerant occurring in the refrigerant communication piping based on the refrigerant circulation amount required when the device is operated at the rated capacity in accordance with the horsepower, with a common control target value for each of the condensation temperature, the evaporating temperature, the degree of subcooling of the refrigerant at the condenser outlet, and the degree of superheating of the refrigerant at the evaporator outlet. Also, the unit for horsepower is HP.

As can be seen from these FIG. 9G and FIG. 9H, Refrigerant A of the present disclosure containing 1,2-difluoroethylene is able to approximate the behavior of pressure loss with that of refrigerant R410A, and it can be seen that the reduction in capacity when Refrigerant A is used in the air conditioning device 1*a* can be kept small. This point is common for every Refrigerant A, sharing the point of containing 1,2-difluoroethylene.

(9-2-7) Modification A of Second Embodiment

In the above second embodiment, the air conditioning device provided with only one indoor unit has been described as an example, but the air conditioning device may be provided with multiple indoor units connected in parallel to each other (those not having an indoor expansion valve).

(9-3) Third Embodiment

Figure 9J:
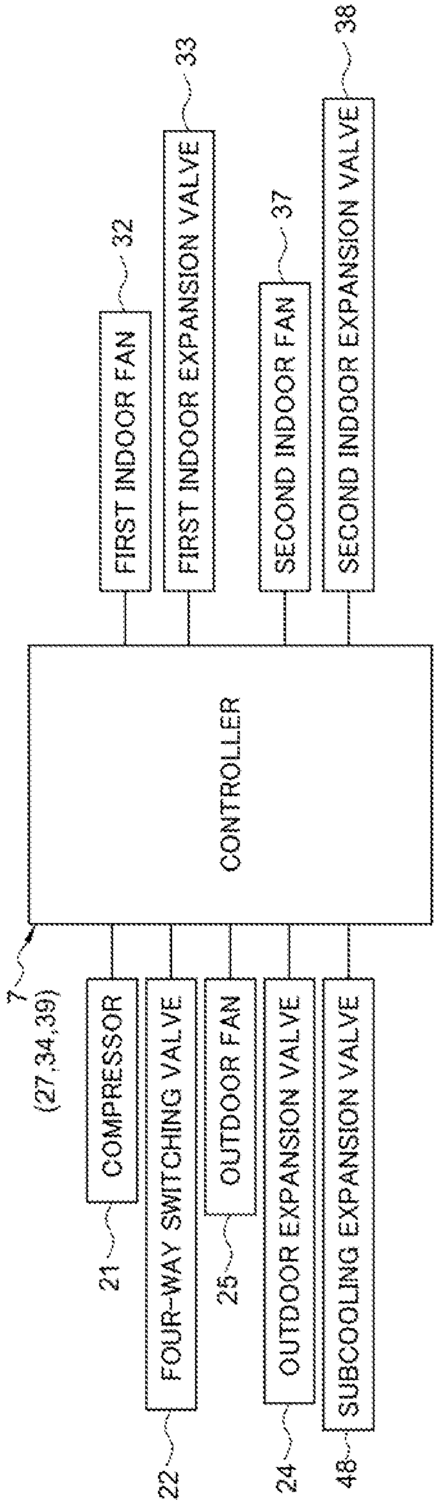
FIG. 9J is a schematic control block configuration diagram of a refrigeration cycle device according to the third embodiment of the technology of the ninth group.

Hereinafter, while referring to FIG. 9I, which is a schematic configuration diagram of a refrigerant circuit, and FIG. 9J, which is a schematic control block configuration diagram, an air conditioning device 1*b* as a refrigeration cycle device according to the third embodiment will be described.

In the following, as for the air conditioning device 1*b* of the third embodiment, description will be mainly focused on the differences from the air conditioning device 1 of the first embodiment.

In the air conditioning device 1*b* as well, the refrigerant circuit 10 is filled with any Refrigerant A, which is a mixed refrigerant containing 1,2-difluoroethylene, as the refrigerant for carrying out a vapor compression type refrigeration cycle. The refrigerant circuit 10 is also filled with a refrigerator oil together with that refrigerant.

(9-3-1) Outdoor Unit 20

The outdoor unit 20 of the air conditioning device 1*b* according to the third embodiment is the outdoor unit 20 in the above first embodiment provided with a low-pressure receiver 26, a subcooling heat exchanger 47, and a subcooling circuit 46.

The low-pressure receiver 26 is a container that is installed between one of the connection ports of the four-way switching valve 22 and the inlet side of the compressor 21, and is capable of storing the refrigerant. Note that, in the present embodiment, it is provided separately from the accompanying accumulator that the compressor 21 has. Note that the internal volume of the low-pressure receiver 26 is larger than the internal volume of the accompanying accumulator that accompanies the compressor 21, and is preferably twice as large or more.

The subcooling heat exchanger 47 is provided between the outdoor expansion valve 24 and the liquid-side shut-off valve 29.

The subcooling circuit 46 is a circuit that branches off from the main circuit between the outdoor expansion valve 24 and the subcooling heat exchanger 47, and extends to join the part in the middle of piping from one of the connection ports of the four-way switching valve 22 to the low-pressure receiver 26. In the middle of the subcooling circuit 46, a subcooling expansion valve 48 is provided, which decompresses the passing refrigerant. The refrigerant that flows through the subcooling circuit 46 and has been decompressed by the subcooling expansion valve 48 undergoes heat exchange with the refrigerant flowing on the main circuit side in the subcooling heat exchanger 47. Due to this, the refrigerant flowing on the main circuit side is further cooled and the refrigerant flowing through the subcooling circuit 46 is evaporated.

The outdoor unit 20 of the air conditioning device 1*b* according to the third embodiment may have, for example, what is called a top blowing structure that intakes air from the bottom to the inside and blows out the air from the top to the outside.

(9-3-2) First Indoor Unit 30 and Second Indoor Unit 35

Also, the air conditioning device 1*b* according to the third embodiment has the first indoor unit 30 and the second indoor unit 35 provided in parallel to each other, instead of the indoor unit 30 in the above first embodiment.

In the first indoor unit 30, a first indoor heat exchanger 31, a first indoor fan 32, and a first indoor unit control section 34 are provided as in the indoor unit 30 in the above first embodiment, and furthermore, a first indoor expansion valve 33 is provided on the liquid side of the first indoor heat exchanger 31. The valve opening degree of the first indoor expansion valve 33 can be controlled.

As in the first indoor unit 30, the second indoor unit 35 has a second indoor heat exchanger 36, a second indoor fan 37, a second indoor unit control section 39, and a second indoor expansion valve 38 provided on the liquid side of the second indoor heat exchanger 36. The valve opening degree of the second indoor expansion valve 38 can be controlled.

Note that the specific structures of the first indoor unit 30 and the second indoor unit 35 of the air conditioning device 1*b* according to the third embodiment are the same as that of the indoor unit 30 of the second embodiment, except for the first indoor expansion valve 33 and second indoor expansion valve 38 described above.

Note that the controller 7 of the third embodiment is configured by connecting the outdoor unit control section 27, the first indoor unit control section 34, and the second indoor unit control section 39 in a communicable manner with each other.

As for the above air conditioning device 1*b*, in the cooling operation mode, the outdoor expansion valve 24 is controlled such that the degree of subcooling of the refrigerant passing through the liquid-side outlet of the outdoor heat exchanger 23 satisfies predetermined conditions. Also, in the cooling operation mode, the subcooling expansion valve 48 is controlled such that the degree of superheating of the refrigerant inhaled by the compressor 21 satisfies predetermined conditions. Note that, in the cooling operation mode, the first indoor expansion valve 33 and the second indoor expansion valve 38 are controlled to be in a fully open state.

In addition, in the heating operation mode, the first indoor expansion valve 33 is controlled such that the degree of subcooling of the refrigerant passing through the liquid-side outlet of the first indoor heat exchanger 31 satisfies predetermined conditions. Similarly, the second indoor expansion valve 38 is also controlled such that the degree of subcooling of the refrigerant passing through the liquid-side outlet of the second indoor heat exchanger 36 satisfies predetermined conditions. Moreover, in the heating operation mode, the outdoor expansion valve 45 is controlled such that the degree of superheating of the refrigerant inhaled by the compressor 21 satisfies predetermined conditions. Note that, in the heating operation mode, the subcooling expansion valve 48 is controlled such that the degree of superheating of the refrigerant inhaled by the compressor 21 satisfies predetermined conditions.

(9-3-3) Liquid-Side Refrigerant Communication Piping 6

As for the liquid-side refrigerant communication piping 6 of the air conditioning device 1*b* of the third embodiment in which Refrigerant A is used, when the pipe outer diameter is expressed as $D_0/8$ inches, the range of $D_0$ can be "$2 \le D_0 \le 4$", irrespective of the relationship with the pipe outer diameter when R410A or R32 is used.

Also, as for the liquid-side refrigerant communication piping 6 of the air conditioning device 1*b* of the third embodiment in which Refrigerant A is used, when the pipe outer diameter is expressed as $D_0/8$ inches (where "$D_0$−⅛ inches" is the pipe outer diameter of liquid-side refrigerant communication piping when refrigerant R32 is used), the range of $D_0$ is "$2 \le D_0 \le 4$". Although Refrigerant A is more prone to pressure loss than refrigerant R32, the pipe outer diameter of the liquid-side refrigerant communication piping 6 of the air conditioning device 1*b* of the third embodiment is of a size larger than or equal to the pipe outer diameter when refrigerant R32 is used, and therefore, reduction in capacity can be suppressed. Especially, as for the liquid-side refrigerant communication piping 6 of the air conditioning device 1*b*, when the pipe outer diameter is expressed as $D_0/8$ inches (where "$D_0$−⅛ inches" is the pipe outer diameter of liquid-side refrigerant communication piping when refrigerant R32 is used), it is preferable that $D_0$ is 3 (that is, the piping diameter is ⅜ inches) in the case where the rated refrigeration capacity of the air conditioning device 1*b* is greater than 5.6 kW or more and less than 11.2 kW, and it is more preferable that $D_0$ is 3 (that is, the piping diameter is ⅜ inches) in the case where the rated refrigeration capacity of the air conditioning device 1*b* is 6.3 kW or more and 10.0 kW or less.

In addition, as for the liquid-side refrigerant communication piping 6 of the air conditioning device 1*b* of the third embodiment in which Refrigerant A is used, when the pipe outer diameter is expressed as $D_0/8$ inches, the range of $D_0$ is "$2 \le D_0 \le 4$", which is the same as the pipe outer diameter of liquid-side refrigerant communication piping when refrigerant R410A is used. Since the physical properties of Refrigerant A, such as pressure loss, are similar to those of refrigerant R410A, reduction in capacity can be suppressed by making the pipe outer diameter of this liquid-side refrigerant communication piping 6 the same as the pipe outer diameter of liquid-side refrigerant communication piping when refrigerant R410A is used.

Especially, as for the liquid-side refrigerant communication piping 6 of the air conditioning device 1*b* of the third embodiment in which Refrigerant A is used, when the pipe outer diameter is expressed as $D_0/8$ inches, it is preferable that $D_0$ is 3 (that is, the piping diameter is ⅜ inches) in the case where the rated refrigeration capacity of the air conditioning device 1*b* is 6.3 kW or more, it is preferable that $D_0$ is 2 (that is, the piping diameter is ¼ inches) in the case where the rated refrigeration capacity of the air conditioning device 1*b* is less than 6.3 kW, and it is more preferable that both of them are the same as the pipe outer diameter of liquid-side refrigerant communication piping when refrigerant R410A is used.

In particular, as for the liquid-side refrigerant communication piping 6 of the air conditioning device 1*b* of the third embodiment in which Refrigerant A is used, when the pipe outer diameter is expressed as $D_0/8$ inches, it is preferable that $D_0$ is 3 (that is, the piping diameter is ⅜ inches) in the case where the rated refrigeration capacity of the air conditioning device 1*b* is 12.5 kW or more, it is preferable that $D_0$ is 2.5 (that is, the piping diameter is 5/16 inches) in the case where the rated refrigeration capacity of the air conditioning device 1*b* is 6.3 kW or more and less than 12.5 kW, and it is preferable that $D_0$ is 2 (that is, the piping diameter is ¼ inches) in the case where the rated refrigeration capacity of the air conditioning device 1*b* is less than 6.3 kW.

(9-3-4) Gas-Side Refrigerant Communication Piping 5

As for the gas-side refrigerant communication piping 5 of the air conditioning device 1*b* of the third embodiment in which Refrigerant A is used, when the pipe outer diameter is expressed as $D_0/8$ inches, the range of Do can be "$3 \le D_0 \le 8$", irrespective of the relationship with the pipe outer diameter when R410A or R32 is used.

Also, as for the gas-side refrigerant communication piping 5 of the air conditioning device 1*b* of the third embodiment in which Refrigerant A is used, when the pipe outer diameter is expressed as $D_0/8$ inches (where "$D_0$−⅛ inches" is the pipe outer diameter of gas-side refrigerant communication piping when refrigerant R32 is used), the range of $D_0$ is "$3 \le D_0 \le 8$". Although Refrigerant A is more prone to pressure loss than refrigerant R32, the pipe outer diameter of the gas-side refrigerant communication piping 5 of the air conditioning device 1*b* of the third embodiment is of a size larger than or equal to the pipe outer diameter when refrigerant R32 is used, and therefore, reduction in capacity can be suppressed. Especially, as for the gas-side refrigerant communication piping 5 of the air conditioning device 1*a*, when the pipe outer diameter is expressed as $D_0/8$ inches (where "$D_0$−⅛ inches" is the pipe outer diameter of gas-side refrigerant communication piping when refrigerant R32 is used), it is preferable that $D_0$ is 7 (that is, the piping diameter is ⅞ inches) in the case where the rated refrigeration capacity of the air conditioning device 1*a* is greater than 22.4 kW, it is preferable that $D_0$ is 6 (that is, the piping diameter is 6/8 inches) in the case where the rated refrigeration capacity of the air conditioning device 1*a* is greater than 14.0 kW and less than 22.4 kW, it is preferable that $D_0$ is 5 (that is, the piping diameter is ⅝ inches) in the case where the rated refrigeration capacity of the air conditioning device 1*a* is greater than 5.6 kW and less than 11.2 kW, and it is preferable that $D_0$ is 4 (that is, the piping diameter is ½ inches) in the case where the rated refrigeration capacity of the air conditioning device 1*a* is less than 4.5 kW. In this case, it is more preferable that $D_0$ is 7 (that is, the piping diameter is ⅞ inches) in the case where the rated refrigeration capacity of the air conditioning device 1*a* is 25.0 kW or more, it is more preferable that $D_0$ is 6 (that is, the piping diameter is 6/8 inches) in the case where the rated refrigeration capacity of the air conditioning device 1*a* is 15.0 kW or more and less than 19.0 kW, it is more preferable that $D_0$ is 5 (that is, the piping diameter is ⅝ inches) in the case where the rated refrigeration capacity of the air conditioning device 1*a* is 6.3 kW or more and less than 10.0 kW, and it is more preferable that $D_0$ is 4 (that is, the piping diameter is ½ inches) in the case where the rated refrigeration capacity of the air conditioning device 1*a* is less than 4.0 kW.

In addition, as for the gas-side refrigerant communication piping 5 of the air conditioning device 1*b* of the third embodiment in which Refrigerant A is used, when the pipe outer diameter is expressed as $D_0$/8 inches, the range of $D_0$ is "$3 \leq D_0 \leq 8$", which is the same as the pipe outer diameter of gas-side refrigerant communication piping when refrigerant R410A is used. Since the physical properties of Refrigerant A, such as pressure loss, are similar to those of refrigerant R410A, reduction in capacity can be suppressed by making the pipe outer diameter of this gas-side refrigerant communication piping 5 the same as the pipe outer diameter of gas-side refrigerant communication piping when refrigerant R410A is used.

Especially, as for the gas-side refrigerant communication piping 5 of the air conditioning device 1*b* of the third embodiment in which Refrigerant A is used, when the pipe outer diameter is expressed as $D_0$/8 inches, it is preferable that $D_0$ is 7 (that is, the piping diameter is ⅞ inches) in the case where the rated refrigeration capacity of the air conditioning device 1*b* is 25.0 kW or more, it is preferable that $D_0$ is 6 (that is, the piping diameter is 6/8 inches) in the case where the rated refrigeration capacity of the air conditioning device 1*b* is 15.0 kW or more and less than 25.0 kW, it is preferable that Do is 5 (that is, the piping diameter is ⅝ inches) in the case where the rated refrigeration capacity of the air conditioning device 1*b* is 6.3 kW or more and less than 15.0 kW, it is preferable that $D_0$ is 4 (that is, the piping diameter is ½ inches) in the case where the rated refrigeration capacity of the air conditioning device 1*b* is less than 6.3 kW, and it is more preferable that all of them are the same as the pipe outer diameter of gas-side refrigerant communication piping when refrigerant R410A is used.

(9-3-5) Characteristics of Third Embodiment

In the air conditioning device 1*b* according to the above third embodiment as well, as in the air conditioning device 1 according to the first embodiment, a refrigerant containing 1,2-difluoroethylene is used, which makes it possible to keep the GWP sufficiently small.

Also, by setting the pipe outer diameter of the liquid-side refrigerant communication piping 6 and the pipe outer diameter of the gas-side refrigerant communication piping 5 to a predetermined range in the air conditioning device 1*b*, reduction in capacity can be kept small even when specific Refrigerant A is used.

(9-3-6) Relationship Between Refrigerant and Pipe Outer Diameter of Refrigerant Communication Piping In the air conditioning device 1*b* of the third embodiment, when refrigerants R410A and R32 are to be used instead of Refrigerant A, the liquid-side refrigerant communication piping 6 and the gas-side refrigerant communication piping 5 with the pipe outer diameters (in inches) as shown in Table 5 and Table 6 below are generally used in accordance with the range of rated cooling capacity.

In contrast, in the air conditioning device 1*b* of the third embodiment, when Refrigerant A containing 1,2-difluoroethylene is used, by using the liquid-side refrigerant communication piping 6 and the gas-side refrigerant communication piping 5 with the pipe outer diameters (in inches) as shown in Table 5 or Table 6 below in accordance with the range of rated cooling capacity, it is possible to keep the reduction in capacity when Refrigerant A containing 1,2-difluoroethylene is used small.

TABLE 5

| | | R410A | | R32 | | Refrigerant A | |
|---|---|---|---|---|---|---|---|
| Horse-power [HP] | Rated cooling capacity [kW] | Gas-side refrigerant communication piping | Liquid-side refrigerant communication piping | Gas-side refrigerant communication piping | Liquid-side refrigerant communication piping | Gas-side refrigerant communication piping | Liquid-side refrigerant communication piping |
| 0.8 | 2.2 | ½ | ¼ | ⅜ | ¼ | ½ | ¼ |
| 1.0 | 2.8 | ½ | ¼ | ⅜ | ¼ | ½ | ¼ |
| 1.3 | 3.6 | ½ | ¼ | ⅜ | ¼ | ½ | ¼ |
| 1.6 | 4.5 | ½ | ¼ | ½ | ¼ | ½ | ¼ |
| 2.0 | 5.6 | ½ | ¼ | ½ | ¼ | ½ | ¼ |
| 2.5 | 7.1 | ⅝ | ⅜ | ½ | ¼ | ⅝ | ⅜ |
| 2.9 | 8.0 | ⅝ | ⅜ | ½ | ¼ | ⅝ | ⅜ |
| 3.2 | 9.0 | ⅝ | ⅜ | ½ | ¼ | ⅝ | ⅜ |
| 4.0 | 11.2 | ⅝ | ⅜ | ⅝ | ⅜ | ⅝ | ⅜ |
| 5.0 | 14.0 | ⅝ | ⅜ | ⅝ | ⅜ | ⅝ | ⅜ |
| 6.0 | 16.0 | 6/8 | ⅜ | ⅝ | ⅜ | 6/8 | ⅜ |
| 8.0 | 22.4 | 6/8 | ⅜ | 6/8 | ⅜ | 6/8 | ⅜ |
| 10.0 | 28.0 | ⅞ | ⅜ | 6/8 | ⅜ | ⅞ | ⅜ |

TABLE 6

| | | R410A | | R32 | | Refrigerant A | |
|---|---|---|---|---|---|---|---|
| Horse-power [HP] | Rated cooling capacity [kW] | Gas-side refrigerant communication piping | Liquid-side refrigerant communication piping | Gas-side refrigerant communication piping | Liquid-side refrigerant communication piping | Gas-side refrigerant communication piping | Liquid-side refrigerant communication piping |
| 0.8 | 2.2 | 1/2 | 1/4 | 3/8 | 1/4 | 1/2 | 1/4 |
| 1.0 | 2.8 | 1/2 | 1/4 | 3/8 | 1/4 | 1/2 | 1/4 |
| 1.3 | 3.6 | 1/2 | 1/4 | 3/8 | 1/4 | 1/2 | 1/4 |
| 1.6 | 4.5 | 1/2 | 1/4 | 1/2 | 1/4 | 1/2 | 1/4 |
| 2.0 | 5.6 | 1/2 | 1/4 | 1/2 | 1/4 | 1/2 | 1/4 |
| 2.5 | 7.1 | 5/8 | 3/8 | 1/2 | 1/4 | 5/8 | 5/16 |
| 2.9 | 8.0 | 5/8 | 3/8 | 1/2 | 1/4 | 5/8 | 5/16 |
| 3.2 | 9.0 | 5/8 | 3/8 | 1/2 | 1/4 | 5/8 | 5/16 |
| 4.0 | 11.2 | 5/8 | 3/8 | 5/8 | 3/8 | 5/8 | 5/16 |
| 5.0 | 14.0 | 5/8 | 3/8 | 5/8 | 3/8 | 5/8 | 3/8 |
| 6.0 | 16.0 | 6/8 | 3/8 | 5/8 | 3/8 | 6/8 | 3/8 |
| 8.0 | 22.4 | 6/8 | 3/8 | 6/8 | 3/8 | 6/8 | 3/8 |
| 10.0 | 28.0 | 7/8 | 3/8 | 6/8 | 3/8 | 7/8 | 3/8 |

Figure 9K:
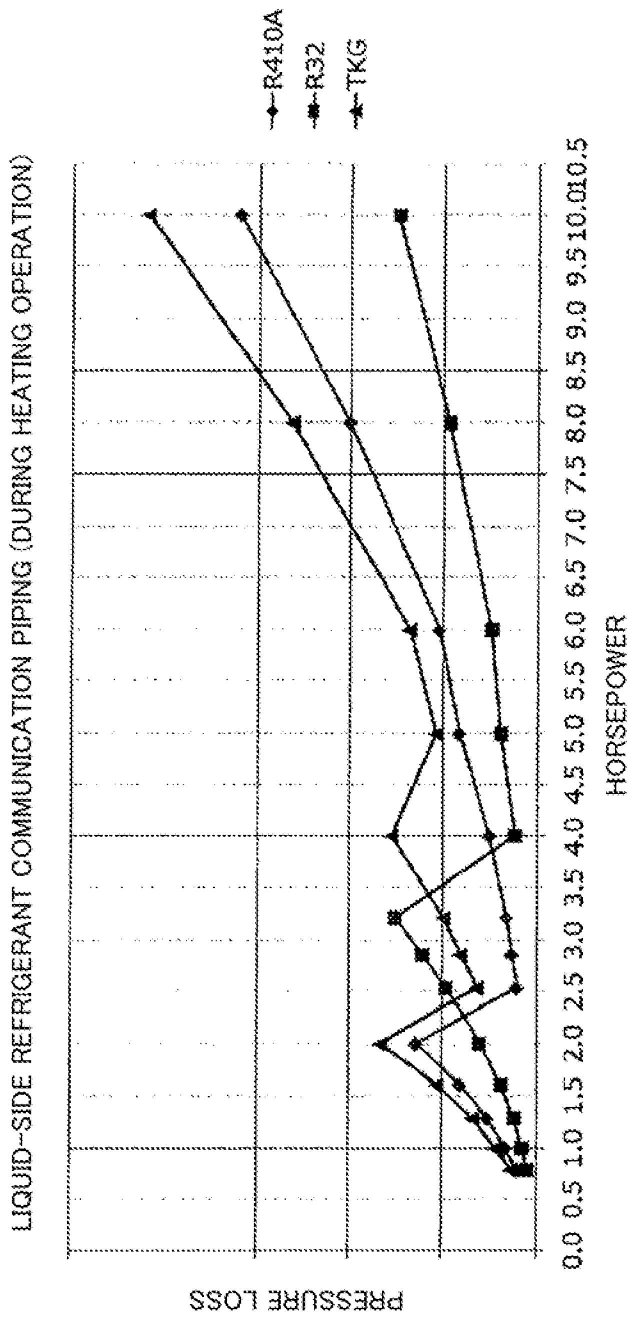
FIG. 9K is a graph of the pressure loss during heating operation of a liquid-side refrigerant communication piping for each pipe outer diameter when refrigerants R410A and R32 and the refrigerant of the present disclosure are used in an air conditioning device according to the third embodiment of the technology of the ninth group.
Figure 9L:
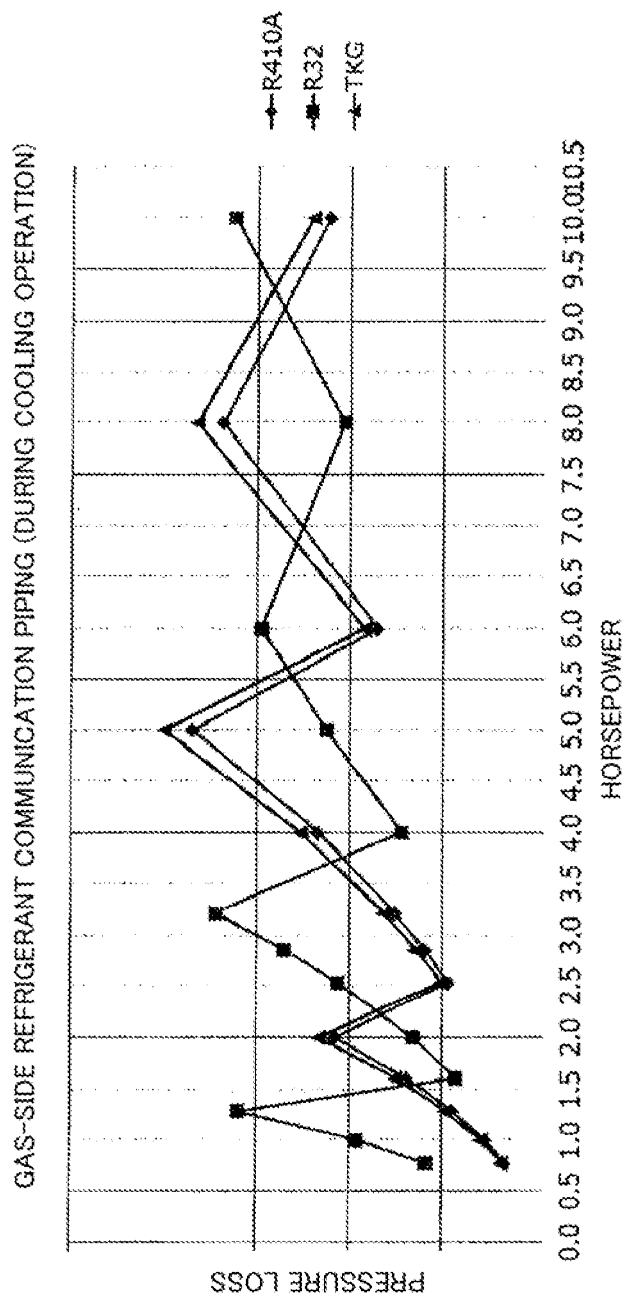
FIG. 9L is a graph of the pressure loss during cooling operation of a gas-side refrigerant communication piping for each pipe outer diameter when refrigerants R410A and R32 and the refrigerant of the present disclosure are used in the air conditioning device according to the third embodiment of the technology of the ninth group.

Here, for the case where each of refrigerants R410A and R32 and the above Refrigerant A of the present disclosure containing 1,2-difluoroethylene is used in the air conditioning device 1*b* of the third embodiment, and the liquid-side refrigerant communication piping 6 and the gas-side refrigerant communication piping 5 having the pipe outer diameters described in Table 6 are used, FIG. 9K shows the pressure loss during heating operation of the liquid-side refrigerant communication piping 6, and FIG. 9L shows the pressure loss during cooling operation of the gas-side refrigerant communication piping 5. Note that the pressure loss was calculated as the pressure loss of the refrigerant occurring in the refrigerant communication piping based on the refrigerant circulation amount required when the device is operated at the rated capacity in accordance with the horsepower, with a common control target value for each of the condensation temperature, the evaporating temperature, the degree of subcooling of the refrigerant at the condenser outlet, and the degree of superheating of the refrigerant at the evaporator outlet. Also, the unit for horsepower is HP.

As can be seen from these FIG. 9K and FIG. 9L, Refrigerant A containing 1,2-difluoroethylene is able to approximate the behavior of pressure loss with that of refrigerant R410A, and it can be seen that the reduction in capacity when Refrigerant A is used in the air conditioning device 1*b* can be kept small. This point is common for every Refrigerant A, sharing the point of containing 1,2-difluoroethylene.

(9-4) Others

An air conditioning device or an outdoor unit may be configured by combining the above first embodiment to third embodiment and each modification as appropriate.

(10) EMBODIMENTS OF TECHNOLOGY OF TENTH GROUP

(10-1) Configuration of Air Conditioner 1

Figure 10A:
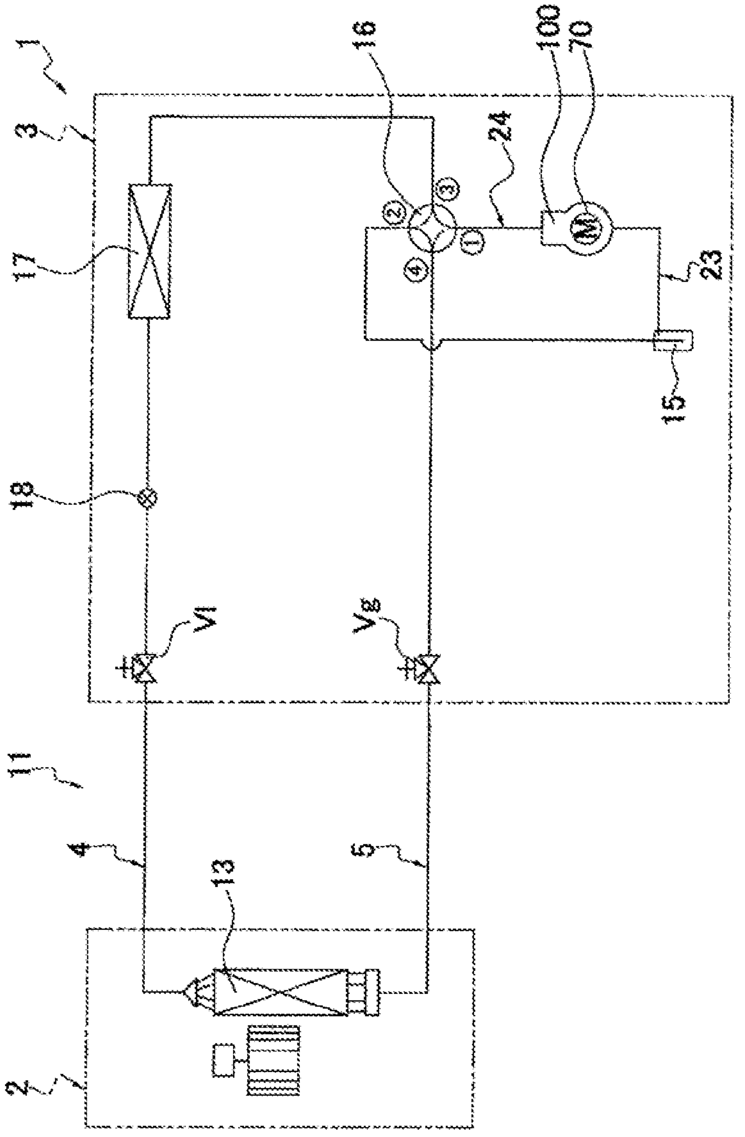
FIG. 10A is a refrigerant circuit diagram of an air conditioner for which a compressor according to one embodiment of the technology of a tenth group is utilized.

FIG. 10A is a refrigerant circuit diagram of an air conditioner 1 for which a compressor 100 according to one embodiment is utilized. The air conditioner 1 is a refrigeration cycle device comprising the compressor 100. Examples of the air conditioner 1 for which the compressor 100 is employed include an "air conditioner dedicated to cooling operation", an "air conditioner dedicated to heating operation", and an "air conditioner that can be switched to either cooling operation or heating operation using a four-way switching valve". Here, the description will be given using the "air conditioner that can be switched to either cooling operation or heating operation using a four-way switching valve".

In FIG. 10A, the air conditioner 1 comprises an indoor unit 2 and an outdoor unit 3, and the indoor unit 2 and the outdoor unit 3 are connected by liquid refrigerant communication piping 4 and gas refrigerant communication piping 5. As shown in FIG. 10A, the air conditioner 1 is of a pair-type, having one each of indoor unit 2 and outdoor unit 3. However, the air conditioner 1 is not limited to this, and it may be of a multi-type having multiple indoor units 2.

In the air conditioner 1, a refrigerant circuit 11 is configured by connecting equipment such as an accumulator 15, the compressor 100, a four-way switching valve 16, an outdoor heat exchanger 17, an expansion valve 18, and an indoor heat exchanger 13 by piping.

In the present embodiment, the refrigerant circuit 11 is filled with a refrigerant for carrying out a vapor compression type refrigeration cycle. That refrigerant is a mixed refrigerant containing 1,2-difluoroethylene, and any Refrigerant A can be used. The refrigerant circuit 11 is also filled with a refrigerator oil together with that mixed refrigerant.

(10-1-1) Indoor Unit 2

The indoor heat exchanger 13 mounted in the indoor unit 2 is a cross fin-type, fin and tube-type heat exchanger configured with heat transfer pipes and a large number of heat transfer fins. The indoor heat exchanger 13 is connected to the liquid refrigerant communication piping 4 on the liquid side and connected to the gas refrigerant communication piping 5 on the gas side, and functions as an evaporator for the refrigerant during cooling operation.

(10-1-2) Outdoor Unit 3

In the outdoor unit 3, the accumulator 15, compressor 100, the outdoor heat exchanger 17, and the expansion valve 18 are mounted.

(10-1-2-1) Outdoor Heat Exchanger 17

The outdoor heat exchanger 17 is a cross fin-type, fin and tube-type heat exchanger configured with heat transfer pipes and a large number of heat transfer fins. The outdoor heat exchanger 17 is connected on one side to a discharge pipe 24 through which the refrigerant discharged from the compressor 100 flows, and on the other side to the liquid refrigerant communication piping 4. The outdoor heat exchanger 17 functions as a condenser for the gas refrigerant supplied from the compressor 100 via the discharge pipe 24.

(10-1-2-2) Expansion Valve 18

The expansion valve 18 is provided in piping that connects the outdoor heat exchanger 17 and the liquid refrigerant communication piping 4. The expansion valve 18 is an electric valve whose degree of opening can be adjusted to regulate the pressure and flow rate of the refrigerant flowing through the piping.

(10-1-2-3) Accumulator 15

The accumulator 15 is provided in piping that connects the gas refrigerant communication piping 5 and an inlet pipe 23 of the compressor 100. The accumulator 15 separates the refrigerant that goes from the indoor heat exchanger 13 through the gas refrigerant communication piping 5 toward the inlet pipe 23 into the gas phase and the liquid phase, in order to prevent the liquid refrigerant from being supplied to the compressor 100. The compressor 100 is supplied with the refrigerant in the gas phase that is accumulated in an upper space of the accumulator 15.

(10-1-2-4) Compressor 100

Figure 10B:
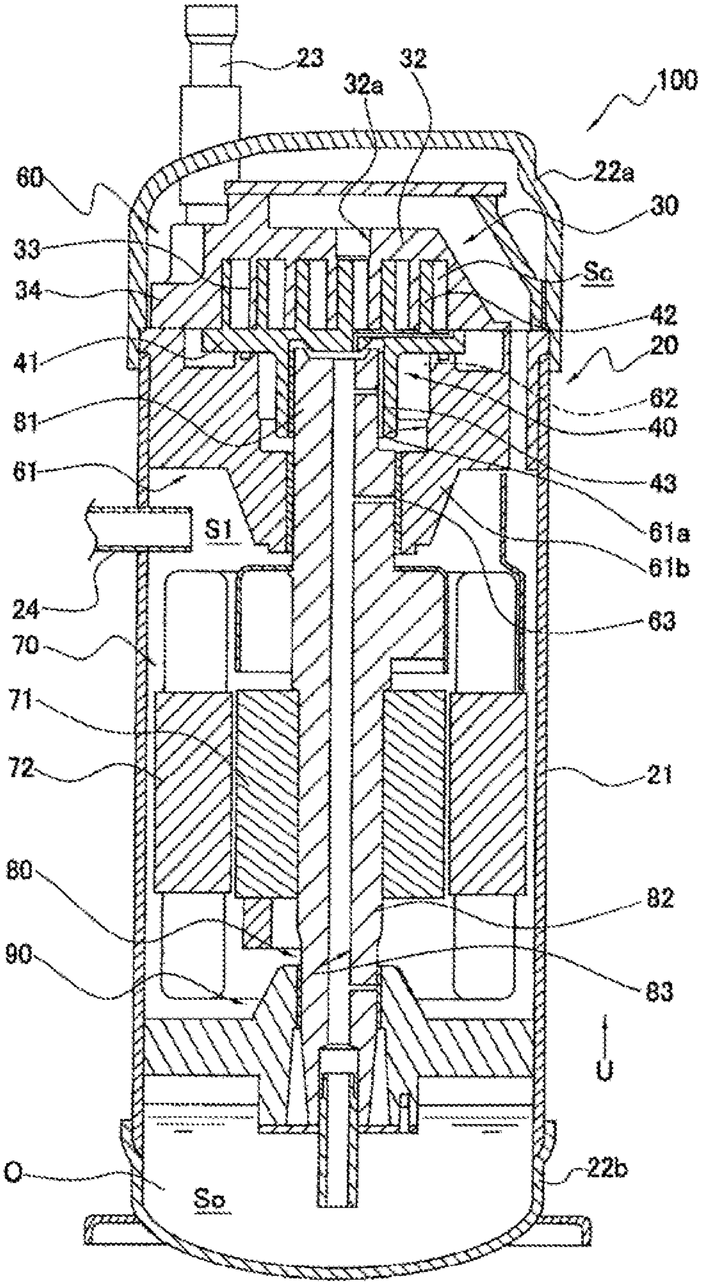
FIG. 10B is a longitudinal section of the compressor according to one embodiment of the technology of the tenth group.

FIG. 10B is a longitudinal section of the compressor 100 according to one embodiment. In FIG. 10B, the compressor 100 is a scroll compressor. The compressor 100 compresses the refrigerant that has been inhaled via the inlet pipe 23 in a compression chamber Sc, and discharges the refrigerant after compression from the discharge pipe 24. Note that the details of the compressor 100 will be described in the section of "(10-2) Configuration of Compressor 100".

(10-1-2-5) Four-Way Switching Valve 16

The four-way switching valve 16 has first to fourth ports. In the four-way switching valve 16, the first port is connected to the discharge side of the compressor 100, the second port is connected to the inlet side of the compressor 100, the third port is connected to the gas-side end of the outdoor heat exchanger 17, and the fourth port is connected to a gas-side shut-off valve Vg.

Figure 1:
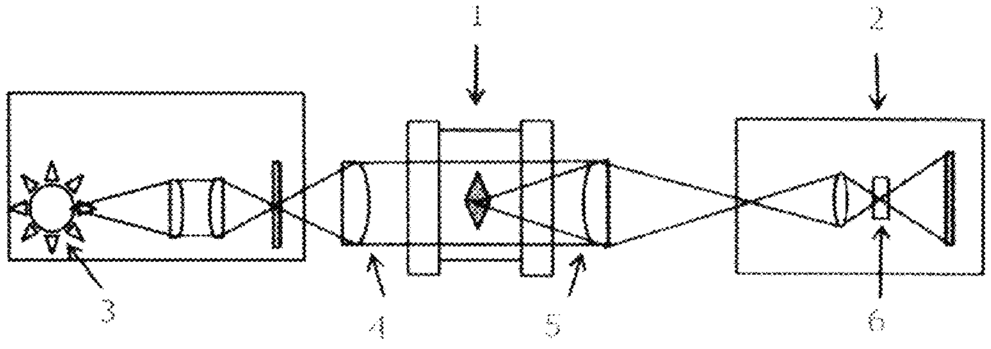
FIG. 1 is a schematic diagram of a device used for a flammability test.
Figure 2A:
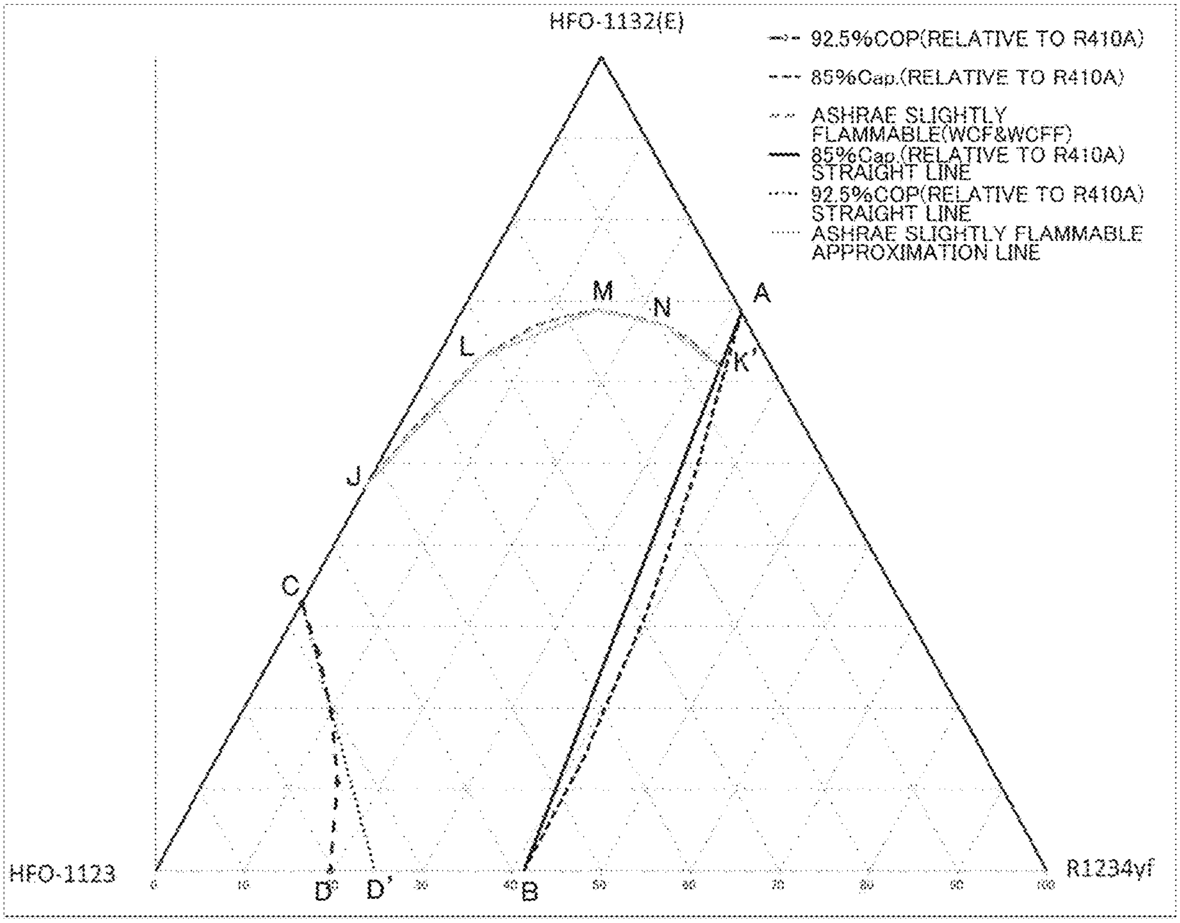
FIG. 2A shows a ternary composition diagram in which the sum of HFO-1132 (E), HFO-1123, and R1234yf is 100% by mass (the content ratio of R32 is 0% by mass), with points A to D and J to N and the line segments connecting them to each other.
Figure 2B:
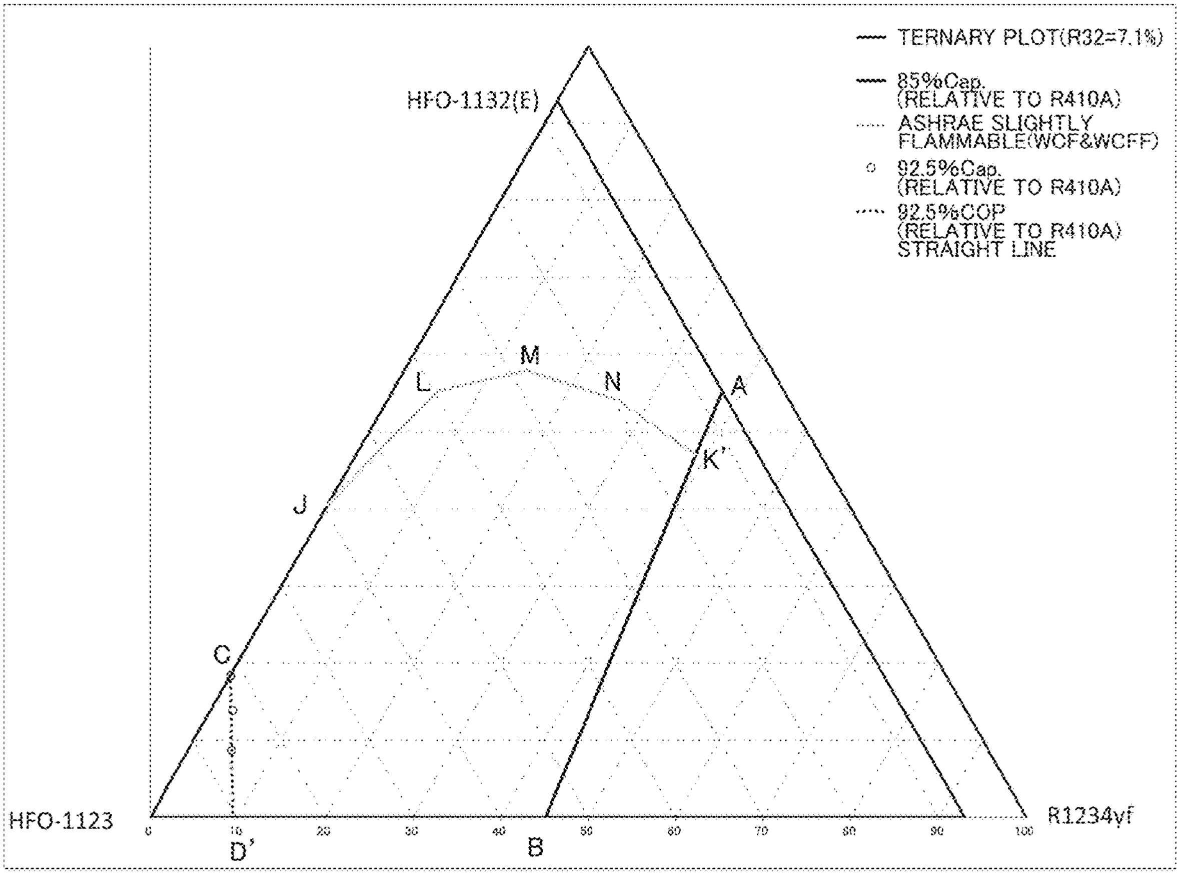
FIG. 2B shows a ternary composition diagram in which the sum of HFO-1132 (E), HFO-1123, and R1234yf is 92.9% by mass (the content ratio of R32 is 7.1% by mass), with points A to D and J to N and the line segments connecting them to each other.
Figure 2C:
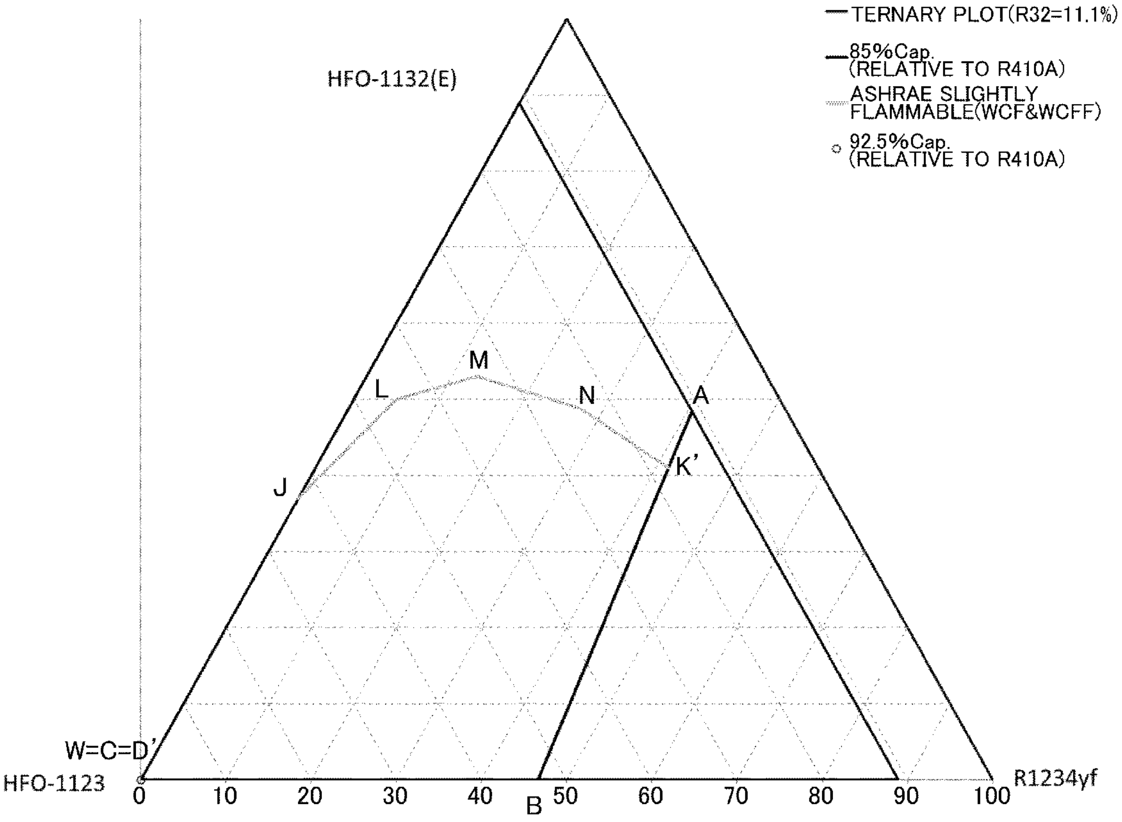
FIG. 2C shows a ternary composition diagram in which the sum of HFO-1132 (E), HFO-1123, and R1234yf is 88.9% by mass (the content ratio of R32 is 11.1% by mass), with points A, B, J to N, and W and the line segments connecting them to each other.
Figure 2D:
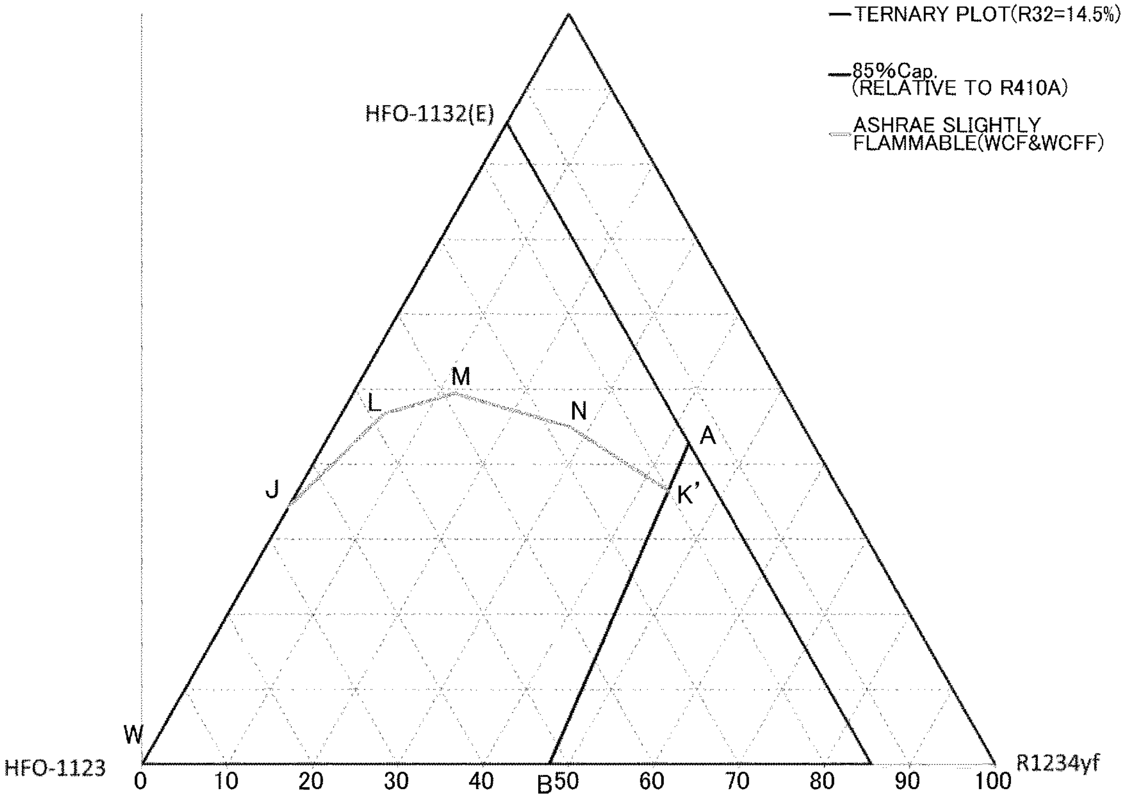
FIG. 2D shows a ternary composition diagram in which the sum of HFO-1132 (E), HFO-1123, and R1234yf is 85.5% by mass (the content ratio of R32 is 14.5% by mass), with points A, B, J to N, and W and the line segments connecting them to each other.
Figure 2E:
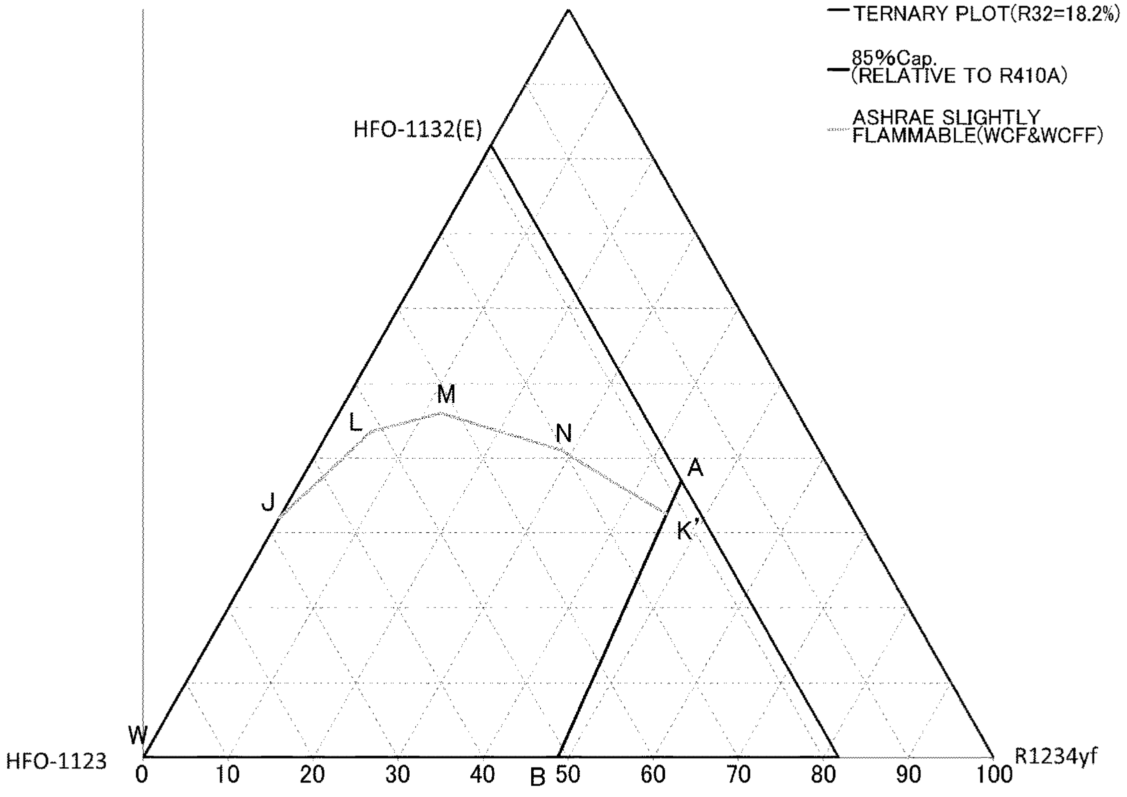
FIG. 2E shows a ternary composition diagram in which the sum of HFO-1132 (E), HFO-1123, and R1234yf is 81.8% by mass (the content ratio of R32 is 18.2% by mass), with points A, B, J to N, and W and the line segments connecting them to each other.
Figure 2F:
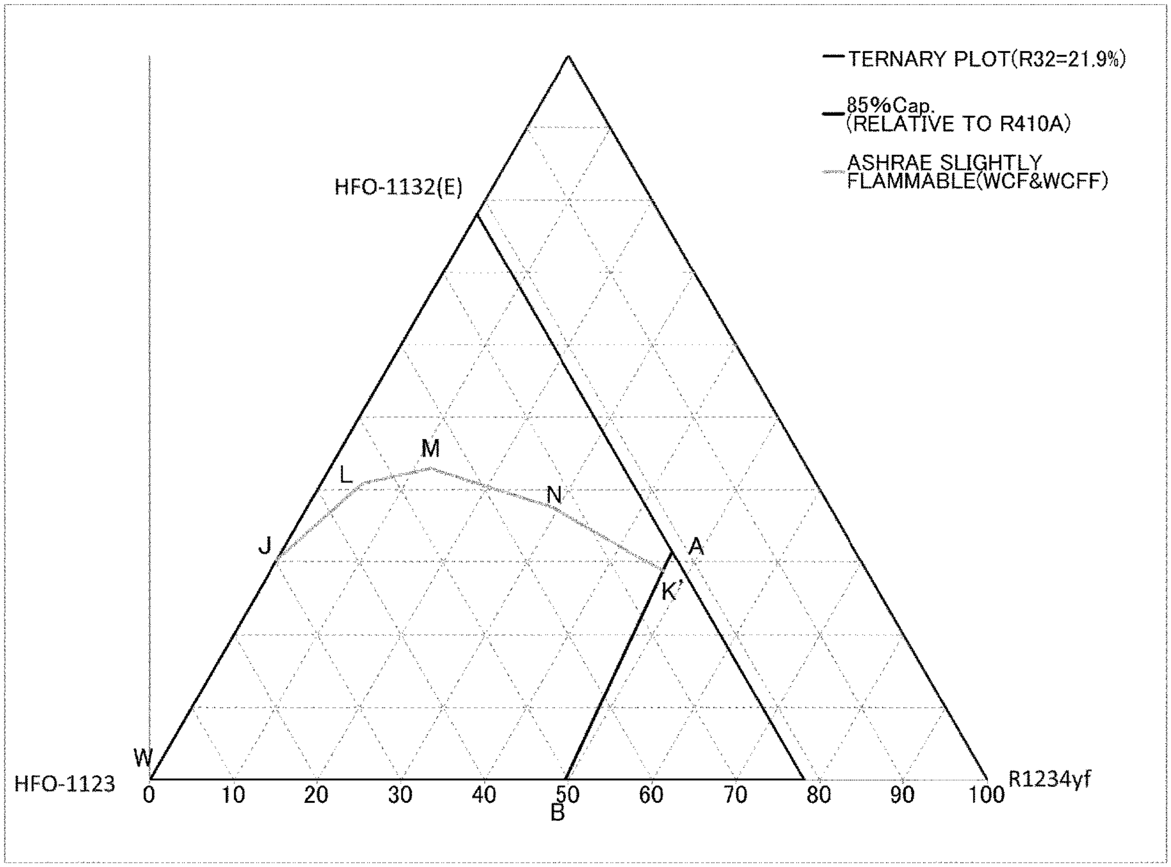
FIG. 2F shows a ternary composition diagram in which the sum of HFO-1132 (E), HFO-1123, and R1234yf is 78.1% by mass (the content ratio of R32 is 21.9% by mass), with points A, B, J to N, and W and the line segments connecting them to each other.
Figure 2G:
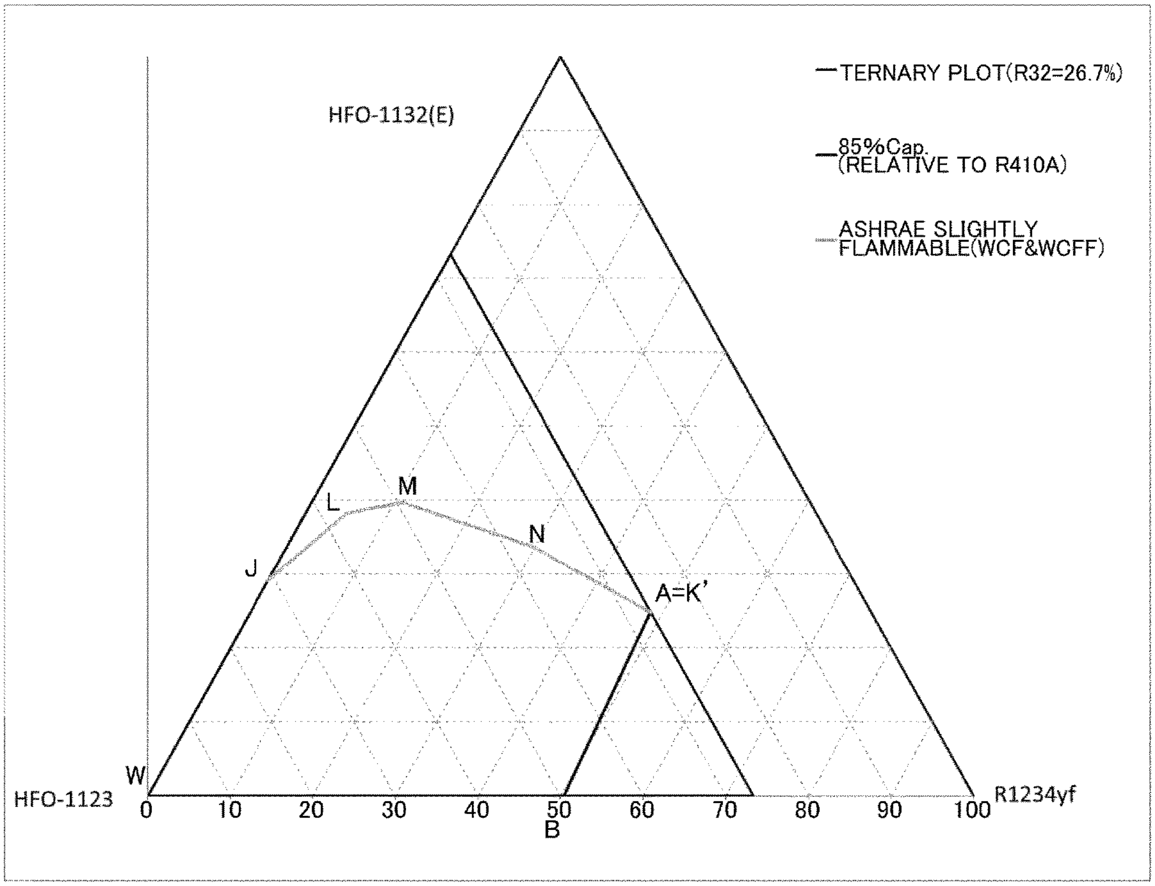
FIG. 2G shows a ternary composition diagram in which the sum of HFO-1132 (E), HFO-1123, and R1234yf is 73.3% by mass (the content ratio of R32 is 26.7% by mass), with points A, B, J to N, and W and the line segments connecting them to each other.
Figure 2H:
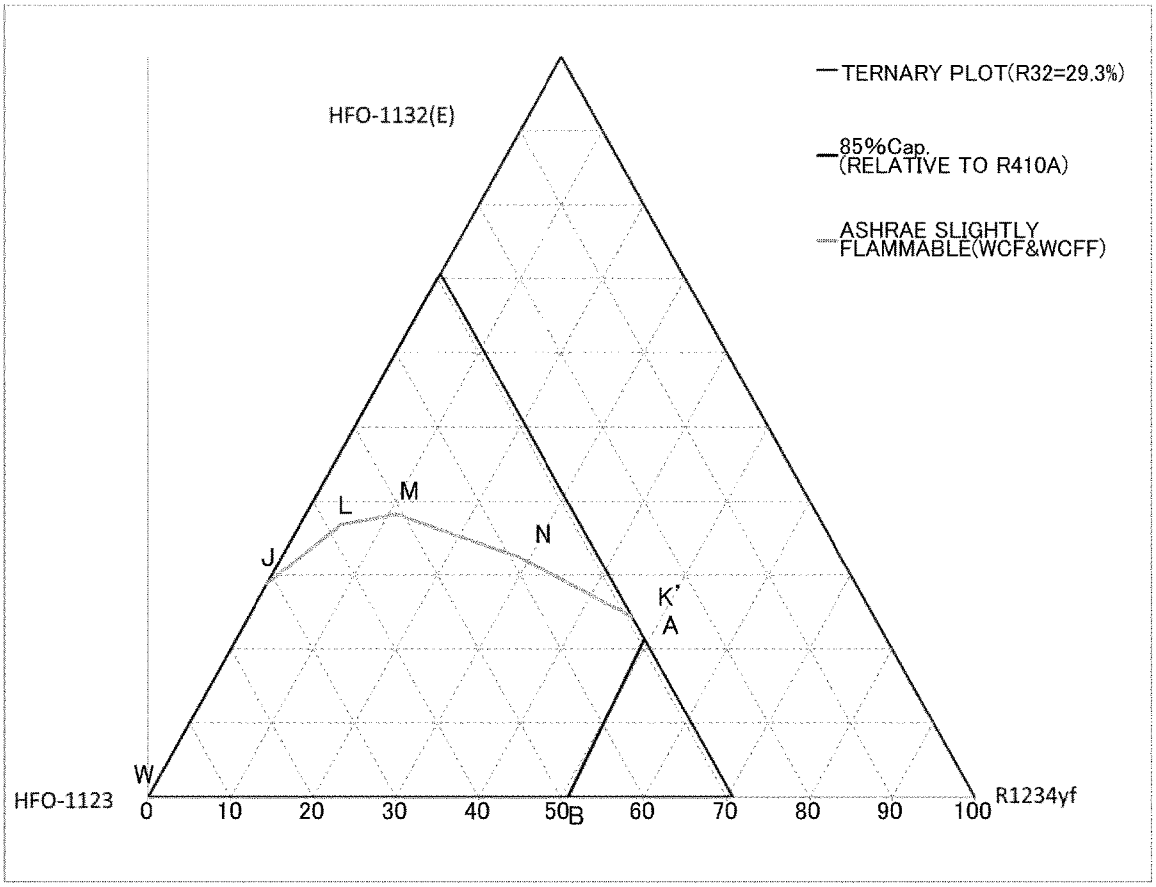
FIG. 2H shows a ternary composition diagram in which the sum of HFO-1132 (E), HFO-1123, and R1234yf is 70.7% by mass (the content ratio of R32 is 29.3% by mass), with points A, B, J to N, and W and the line segments connecting them to each other.
Figure 2I:
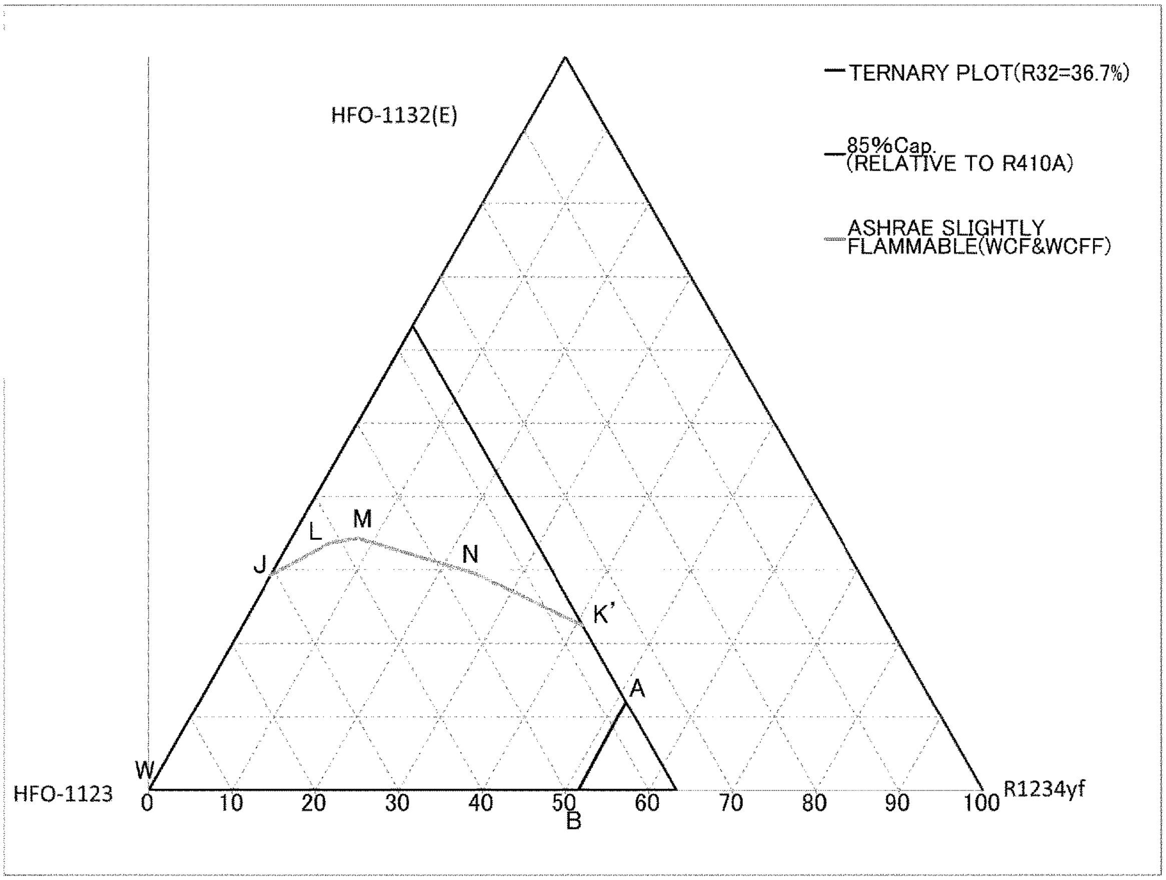
FIG. 2I shows a ternary composition diagram in which the sum of HFO-1132 (E), HFO-1123, and R1234yf is 63.3% by mass (the content ratio of R32 is 36.7% by mass), with points A, B, J to N, and W and the line segments connecting them to each other.

The four-way switching valve 16 switches between a first state (the state shown by the solid line in FIG. 1) and a second state (the state shown by the dashed line in FIG. 1). In the four-way switching valve 16 in the first state, the first port and the third port are in communication and the second port and the fourth port are in communication. In the four-way switching valve 16 in the second state, the first port and the fourth port are in communication and the second port and the third port are in communication.

(10-2) Configuration of Compressor 100

As shown in FIG. 10B, the compressor 100 comprises a casing 20, a compression mechanism 60 including a fixed scroll 30, a motor 70, a crank shaft 80, and a lower bearing 90.

Hereinafter, expressions such as "upper" and "lower" may be used to describe the positional relationship and the like of the constituent members, but here, the direction of arrow U in FIG. 10B is referred to as upper, and the direction opposite to arrow U as lower. Also, expressions such as "vertical," "horizontal," "longitudinal," and "transverse" may be used, but the up and down direction is defined as the vertical direction and the longitudinal direction.

(10-2-1) Casing 20

The compressor 100 has a longitudinal cylindrical casing 20. The casing 20 has a cylindrical member 21 that is open at the top and bottom and has an approximately cylindrical shape, and an upper lid 22*a* and a lower lid 22*b* that are provided at the upper end and lower end of the cylindrical member 21, respectively. The cylindrical member 21 and the upper lid 22*a* and lower lid 22*b* are fixed by welding so as to maintain airtightness.

The casing 20 accommodates the constituent equipment of the compressor 100, including the compression mechanism 60, the motor 70, the crank shaft 80, and the lower bearing 90. Also, an oil reservoir space So is formed at the bottom of the casing 20. In the oil reservoir space So, refrigerator oil O for lubricating the compression mechanism 60 and the like is stored. Note that refrigerator oil O refers to the refrigerator oil described in the section of "(1-4-1) Refrigerator Oil".

At the top of the casing 20, the inlet pipe 23, which inhales the gas refrigerant and supplies the gas refrigerant to the compression mechanism 60, is provided penetrating the upper lid 22*a*. The lower end of the inlet pipe 23 is connected to the fixed scroll 30 of the compression mechanism 60. The inlet pipe 23 is in communication with the compression chamber Sc of the compression mechanism 60. Through the inlet pipe 23, the low-pressure refrigerant in the refrigeration cycle before compression by the compressor 100 flows.

In a middle section of the cylindrical member 21 of the casing 20, a discharge pipe 24 is provided through which the refrigerant to be discharged outside the casing 20 passes. More specifically, the discharge pipe 24 is arranged such that the end of the discharge pipe 24 inside the casing 20 protrudes into a high-pressure space S1 formed below a housing 61 of the compression mechanism 60. Through the discharge pipe 24, the high-pressure refrigerant in the refrigeration cycle after compression by the compression mechanism 60 flows.

(10-2-2) Compression Mechanism 60

As shown in FIG. 10B, the compression mechanism 60 mainly has the housing 61, the fixed scroll 30 arranged above the housing 61, and a movable scroll 40, which is combined with the fixed scroll 30 to form the compression chamber Sc.

(10-2-2-1) Fixed Scroll 30

As shown in FIG. 10B, the fixed scroll 30 has a flat plate-shaped fixed side mirror plate 32, a spiral-shaped fixed side wrap 33 projecting from the front surface (lower surface in FIG. 10B) of the fixed side mirror plate 32, and an outer edge 34 surrounding the fixed side wrap 33.

At the center of the fixed side mirror plate 32, a non-circular discharge hole 32*a*, which is in communication with the compression chamber Sc of the compression mechanism 60, is formed penetrating the fixed side mirror plate 32 in the thickness direction. The refrigerant that has been compressed in the compression chamber Sc is discharged from the discharge hole 32*a*, passes through a refrigerant passage not shown in the figure formed in the fixed scroll 30 and housing 61, and flows into the high-pressure space S1.

(10-2-2-2) Movable Scroll 40

As shown in FIG. 10B, the movable scroll 40 has a flat plate-shaped movable side mirror plate 41, a spiral-shaped movable side wrap 42 protruding from the front surface (upper surface in FIG. 10B) of the movable side mirror plate 41, and a cylindrically formed boss section 43 protruding from the rear surface (lower surface in FIG. 10B) of the movable side mirror plate 41.

The fixed side wrap 33 of the fixed scroll 30 and the movable side wrap 42 of the movable scroll 40 are assembled in a state where the lower surface of the fixed side mirror plate 32 and the upper surface of the movable side mirror plate 41 face each other. The compression chamber Sc is formed between the adjacent fixed side wrap 33 and movable side wrap 42. As will be mentioned later, the volume of the compression chamber Sc is periodically changed as the movable scroll 40 is revolved relative to the fixed scroll 30, and the refrigerant is inhaled, compressed, and discharged in the compression mechanism 60. [1511].

The boss section 43 is a cylindrical part with the upper end blocked. By inserting an eccentric section 81 of the crank shaft 80 into the hollow section of the boss section 43, the movable scroll 40 and the crank shaft 80 are coupled. The boss section 43 is arranged in an eccentric section space 62 formed between the movable scroll 40 and the housing 61. The eccentric section space 62 is in communication with the high-pressure space S1 via an oil supply route 83 or the like of the crank shaft 80, and a high pressure acts on the eccentric section space 62. This pressure pushes the lower surface of the movable side mirror plate 41 in the eccentric section space 62 upward toward the fixed scroll 30. Due to this force, the movable scroll 40 comes into close contact with the fixed scroll 30.

The movable scroll 40 is supported by the housing 61 via an oldham joint, which is not shown in the figure. The oldham joint is a member that prevents rotation of the movable scroll 40 and makes it revolved. By using the oldham joint, when the crank shaft 80 is rotated, the movable scroll 40 coupled to the crank shaft 80 at the boss section 43 is revolved without being rotated relative to the fixed scroll 30, and the refrigerant in the compression chamber Sc is compressed.

(10-2-2-3) Housing 61

The housing 61 is press-fitted into the cylindrical member 21 and is fixed to the cylindrical member 21 over the entire circumferential direction at its outer circumferential surface. Also, the housing 61 and the fixed scroll 30 are fixed by a bolt or the like, not shown in the figure, such that the upper end surface of the housing 61 is in close contact with the lower surface of the outer edge 34 of the fixed scroll 30.

In the housing 61, a recessed section 61*a* arranged to be recessed in the center of the upper surface and a bearing section 61*b* arranged below the recessed section 61*a* are formed.

The recessed section 61*a* surrounds the side of the eccentric section space 62 where the boss section 43 of the movable scroll 40 is arranged.

A bearing 63, which journals a main axis 82 of the crank shaft 80, is arranged in the bearing section 61*b*. The bearing 63 rotatably supports the main axis 82, which is inserted into the bearing 63.

(10-2-3) Motor 70

The motor 70 has an annular stator 72 fixed to the inner wall of the cylindrical member 21, and a rotor 71 accommodated rotatably inside the stator 72 with a small gap (air gap).

The rotor 71 is coupled to the movable scroll 40 via the crank shaft 80, which is arranged to extend in the vertical direction along the axial center of the cylindrical member 21. As the rotor 71 is rotated, the movable scroll 40 is revolved relative to the fixed scroll 30.

Note that the details of the motor 70 will be described in the section of "(10-4) Configuration of Motor 70".

(10-2-4) Crank Shaft 80

The crank shaft 80 transmits the drive force of the motor 70 to the movable scroll 40. The crank shaft 80 is arranged to extend in the vertical direction along the axial center of the cylindrical member 21, and couples the rotor 71 of the motor 70 and the movable scroll 40 of the compression mechanism 60.

The crank shaft 80 has the main axis 82, whose central axis coincides with the axial center of the cylindrical member 21, and the eccentric section 81, which is eccentric to the axial center of the cylindrical member 21. The eccentric section 81 is inserted into the boss section 43 of the movable scroll 40.

The main axis 82 is rotatably supported by the bearing 63 of the bearing section 61*b* of the housing 61 and the lower bearing 90. The main axis 82 is coupled to the rotor 71 of the motor 70 between the bearing section 61*b* and the lower bearing 90.

Inside the crank shaft 80, the oil supply route 83 is formed for supplying refrigerator oil O to the compression mechanism 60 and the like. The lower end of the main axis 82 is located in the oil reservoir space So formed at the bottom of the casing 20, and refrigerator oil O in the oil reservoir space So is supplied to the compression mechanism 60 and the like through the oil supply route 83.

(10-2-5) Lower Bearing 90

The lower bearing 90 is arranged below the motor 70. The lower bearing 90 is fixed to the cylindrical member 21. The lower bearing 90 constitutes the bearing on the lower end side of the crank shaft 80 and rotatably supports the main axis 82 of the crank shaft 80.

(10-3) Motion of Compressor 100

The motion of the compressor 100 will be described.

When the motor 70 is started, the rotor 71 is rotated relative to the stator 72, and the crank shaft 80 fixed to the rotor 71 is rotated. As the crank shaft 80 is rotated, the movable scroll 40, which is coupled to the crank shaft 80, is revolved relative to the fixed scroll 30. Then, the low-pressure gas refrigerant in the refrigeration cycle passes through the inlet pipe 23 and is inhaled into the compression chamber Sc from the periphery side of the compression chamber Sc. As the movable scroll 40 is revolved, the inlet pipe 23 becomes out of communication with the compression chamber Sc, and as the volume of the compression chamber Sc is decreased, the pressure in the compression chamber Sc begins to rise.

The refrigerant in the compression chamber Sc is compressed as the volume of the compression chamber Sc is decreased, and finally becomes a high-pressure gas refrigerant. The high-pressure gas refrigerant is discharged from the discharge hole 32*a* located near the center of the fixed side mirror plate 32. Thereafter, the high-pressure gas refrigerant passes through a refrigerant passage not shown in the figure formed in the fixed scroll 30 and housing 61, and flows into the high-pressure space S1. The high-pressure gas refrigerant in the refrigeration cycle that has been flowed into the high-pressure space S1 after compression by the compression mechanism 60 is discharged from the discharge pipe 24.

(10-4) Configuration of Motor 70

Figure 10C:
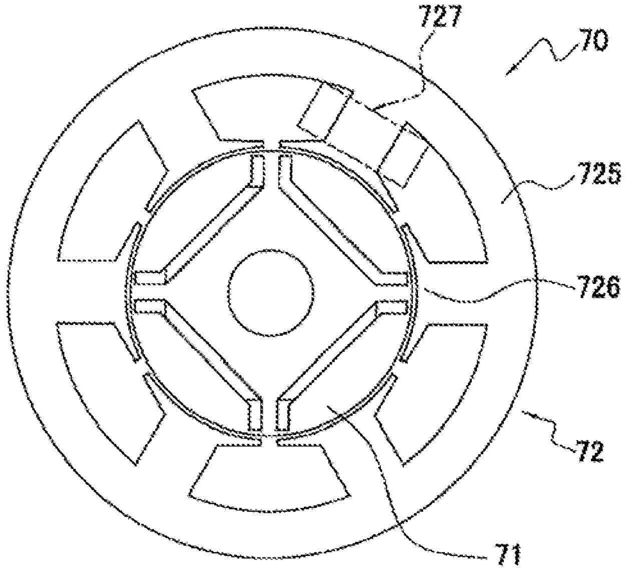
FIG. 10C is a cross section of a motor cut in a plane perpendicular to the rotation axis of the technology of the tenth group.
Figure 10D:
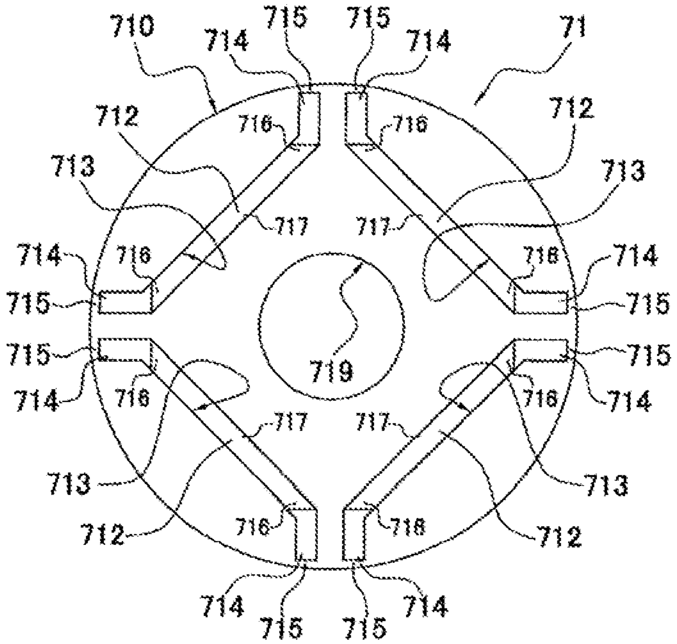
FIG. 10D is a cross section of a rotor cut in a plane perpendicular to the rotation axis of the technology of the tenth group.

FIG. 10C is a cross section of the motor 70 cut in a plane perpendicular to the rotation axis. Also, FIG. 10D is a cross section of the rotor 71 cut in a plane perpendicular to the rotation axis. Furthermore, FIG. 10E is a perspective view of the rotor 71.

Figure 10E:
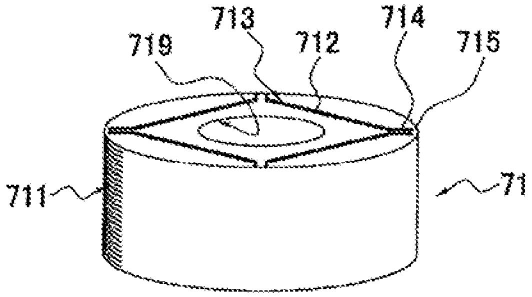
FIG. 10E is a perspective view of the rotor of the technology of the tenth group.

Note that, in FIG. 10C to FIG. 10E, the shaft coupled to the rotor 71 to transmit the rotational force to the outside is omitted and not shown. In FIG. 10C to FIG. 10E, the motor 70 is a permanent magnet synchronous motor. The motor 70 has the rotor 71 and the stator 72.

(10-4-1) Stator 72

The stator 72 has a body section 725 and multiple tooth sections 726. The body section 725 is formed into an approximately cylindrical shape with an inner circumferential diameter that is larger than the outer circumferential diameter of the rotor 71. The body section 725 is formed integrally with the tooth sections 726, by processing thin electromagnetic steel plates with a thickness of 0.05 mm or more and 0.5 mm or less into a predetermined shape and stacking a predetermined number of plates.

The multiple tooth sections 726 protrude in an aspect where they are located at the inner circumferential section of the body section 725 along its circumferential direction with approximately consistent intervals. Each tooth section 726 extends from the inner circumferential section of the body section 725 toward the center along the radial direction of a circle centered on the rotation axis and faces the rotor 71 with a predetermined gap.

Each tooth section 726 is magnetically coupled via the body section 725 on the outer circumference side. Around each tooth section 726, a coil 727 is wound as a winding wire (only one is shown in FIG. 10C). Three-phase alternating current is allowed to flow through the coil 727, for generating a rotating magnetic field that rotates the rotor 71. The winding scheme of the coil 727 is not limited, and may be in a form where it is intensively wound on the multiple tooth sections 726 or in a form where it is distributively wound.

These rotor 71 and stator 72 are assembled into the casing 20 and used as rotary electrical machinery.

(10-4-2) Rotor 71

The appearance shape of the rotor 71 is formed into an approximately cylindrical shape, and the main axis 82 of the crank shaft 80 is coupled and fixed along its central axis. The rotor 71 has a rotor core 710 and multiple permanent magnets 712. The rotor 71 is an embedded magnet rotor in which the permanent magnets 712 are embedded in the rotor core 710.

(10-4-2-1) Rotor Core 710

The rotor core 710 is formed into an approximately cylindrical shape with a magnetic material. It is formed by processing thin electromagnetic steel plates 711 with a thickness of 0.05 mm or more and 0.5 mm or less into a predetermined shape and stacking a predetermined number of plates. As the electromagnetic steel plates, multiple high-tensile electromagnetic steel plates with a tensile strength of 400 MPa or more are desirable in order to improve the durability of the rotor during high-speed rotation.

An axis insertion hole 719 is formed for fixing the main axis 82 of the crank shaft 80 along the central axis of the rotor core 710 (see FIG. 10B). Also, in the rotor core 710, multiple magnet accommodation holes 713 are formed along the circumferential direction around the rotation axis.

(10-4-2-1-1) Magnet Accommodation Holes 713

The magnet accommodation holes 713 are spaces in the shape of a rectangular parallelepiped that are flat in the direction approximately orthogonal to the radial direction of a circle centered on the rotation axis. The magnet accommodation holes 713 may be through holes or have a bottom, as long as they are in a shape that allows the permanent magnets 712 to be embedded.

Also, as shown in FIG. 10D, each magnet accommodation hole 713 is provided such that any two adjacent magnet accommodation holes 713 form an approximately V shape.

(10-4-2-1-2) Non-magnetic Spaces 714

Non-magnetic spaces 714 are bent from the ends of the magnet accommodation holes 713 and extend toward the outer circumference side of the rotor core 710. The non-magnetic spaces 714 have a role of, when a demagnetizing field is generated, making it easier for the magnetic flux caused by the demagnetizing field to avoid the permanent magnets 712 and pass through the non-magnetic spaces 714, and prevention of demagnetization is also attempted by the non-magnetic spaces 714.

(10-4-2-1-3) Bridges 715

Bridges 715 are located outside the non-magnetic spaces 714 in the radial direction and couple magnetic poles together. The thickness of the bridges 715 are set to 3 mm or more in order to improve durability during high-speed rotation.

Note that the rotor 71 shown in FIG. 10C to FIG. 10E is just one example and is not limited to this.

Figure 10F:
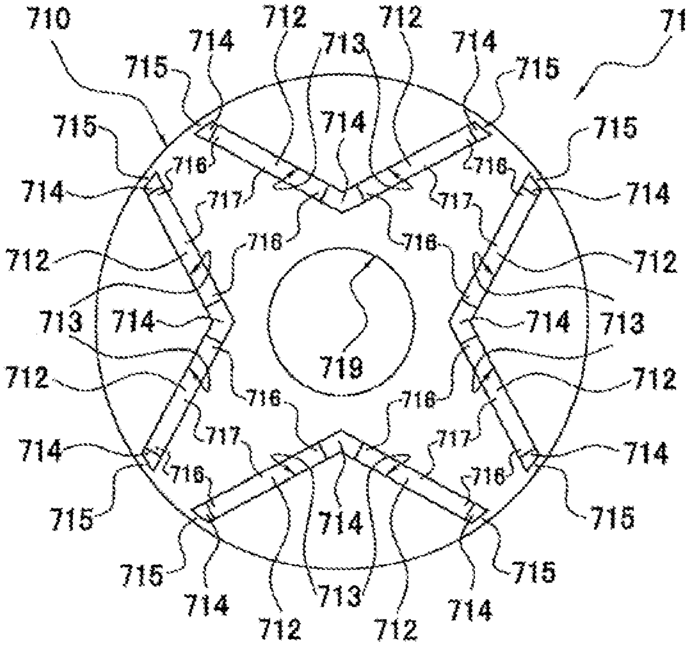
FIG. 10F is a cross section of another rotor cut in a plane perpendicular to the rotation axis of the technology of the tenth group.

FIG. 10F is a cross section of another rotor 71 cut in a plane perpendicular to the rotation axis. The difference from the rotor of FIG. 10D is that any two adjacent magnet accommodation holes are provided to form an approximately V shape in FIG. 10D, whereas a set of two adjacent magnet accommodation holes 713 is provided to form a V shape in FIG. 10F.

For this purpose, in the rotor 71 of FIG. 10F, eight magnet accommodation holes 713, which are narrower in width than the magnet accommodation holes shown in FIG. 10D, are provided in the rotor core 710, and a set of two adjacent magnet accommodation holes 713 forms a V shape, forming a total of four V shapes. Also, on the side of the V-shaped valley formed by a set of magnet accommodation holes 713, two non-magnetic spaces are linked to form one V-shaped non-magnetic space 714.

Non-magnetic spaces 714 on the outer side are formed at the ends opposite to the valley sides of the magnet accommodation holes 713 and extend toward the outer circumference side of the rotor core 710.

In addition, since the transverse width of the magnet accommodation holes 713 is set smaller compared to the magnet accommodation holes shown in FIG. 10D, and accordingly, the transverse width of the permanent magnets 712 is also molded smaller compared to the permanent magnets shown in FIG. 10D.

The functions of the permanent magnets 712, the magnet accommodation holes 713, the non-magnetic spaces 714, and the bridges 715 shown in FIG. 10F are the same as those shown in FIG. 10D.

(10-4-2-2) Permanent Magnets 712

The permanent magnets 712 are neodymium rare earth magnets mainly composed of Nd—Fe—B (neodymium, iron, boron). Since the coercive force of Nd—Fe—B magnets is deteriorated by the impact of temperature, when a motor using Nd—Fe—B magnets is used in a compressor, the coercive force is reduced by the high temperature atmosphere (100° C. or higher) inside the compressor.

Hence, it is desirable that the permanent magnets 712 are formed by grain boundary diffusion of heavy rare earth (for example, dysprosium). In the grain boundary diffusion method where heavy rare earth is diffused through the grain boundary, the permanent magnets 712 are produced by sintering a predetermined composition to form a sintered product, applying a heavy rare earth workpiece to that sintered product, and then carrying out a heat treatment at a temperature lower than the sintering temperature.

According to the grain boundary diffusion method, the amount of heavy rare earth added can be reduced and the coercive force can be enhanced. The permanent magnets 712 of the present embodiment contain 1% by mass or less of dysprosium, thereby improving the holding power.

Also, in the present embodiment, in order to improve the demagnetization resistance of the permanent magnets 712, the average crystalline particle diameter of the permanent magnets 712 is set to 10 μm or less, and 5 μm or less is desirable.

The permanent magnets 712 are molded into a quadrilateral plate of uniform thickness with two main surfaces. One permanent magnet 712 is embedded in each magnet accommodation hole 713. As shown in FIG. 10D and FIG. 10F, among the permanent magnets 712 embedded in the magnet accommodation holes 713, any two adjacent permanent magnets 712 form an approximately V shape.

The outer facing surface of the permanent magnets 712 is a magnetic pole surface that generates a magnetic pole with respect to the rotor core 710, and the inner facing surface of the permanent magnets 712 is the anti-magnetic pole surface opposite to it. Also, when considering the permanent magnets 712 as the parts that generate magnetic poles with respect to the stator 72, both ends in the circumferential direction of the permanent magnets 712 are the magnetic pole tips, and the central section in the circumferential direction is the magnetic pole center.

In the posture of the permanent magnets 712 as described above, both ends of the permanent magnets 712 are near the ends of the magnetic poles and the parts close to the air gap are referred to as "proximity parts 716". The proximity parts 716 are the parts located in the valleys of the V shapes. Also, the middle sections in the permanent magnets 712 are closer to the central section of the magnetic poles than the proximity parts 716 and the parts that are far from the air gap are referred to as "far parts 717".

In the motor 70 of the intensively wound type with the coil 727 wound around each tooth section 726, the magnetic flux caused by the coil 727 flows to the nearest adjacent tooth section 726. Therefore, the demagnetizing field acts more strongly on the proximity parts 716 of the permanent magnets 712 located near the surface of the rotor core 710. Hence, in the present embodiment, the holding power of the proximity parts 716 (the parts located in the valleys of the V shapes) is set higher than the other parts by $\{1/(4n)\}\times10^3$ [A/m] or more, thereby suppressing demagnetization.

For this reason, when the present form is applied to the motor 70 of the intensively wound type, the effect of demagnetization suppression is large.

The thickness dimension of the permanent magnets 712 and the dimension of the magnet accommodation holes 713 in the thickness direction of the permanent magnets 712 are formed to be substantially the same, and both main surfaces of the permanent magnets 712 are substantially in contact with the inner surface of the magnet accommodation holes 713. As a result, the magnetic resistance between the permanent magnets 712 and the rotor core 710 can be made small.

Note that "the case where both main surfaces of the permanent magnets 712 are substantially in contact with the inner surface of the magnet accommodation holes 713" includes "the case where a small gap is created between the permanent magnets 712 and the magnet accommodation holes 713 to the extent that it is required when inserting the permanent magnets 712 into the magnet accommodation holes 713", as well.

(10-5) Characteristics (10-5-1)

The compressor 100 is suited for variable displacement compressors in which the number of rotations of the motor can be changed because the motor 70 has the rotor 71 containing the permanent magnets 712. In this case, in the air conditioner 1 using a mixed refrigerant containing at least 1,2-difluoroethylene, the number of motor rotations can be changed depending on the air conditioning load, which enables the compressor 100 to be made highly efficient.

(10-5-2)

The rotor 71 is an embedded magnet rotor. In the embedded magnet rotor, the permanent magnets 712 are embedded in the rotor 71.

(10-5-3)

The rotor 71 is formed by stacking the multiple electromagnetic steel plates 711 in the plate thickness direction. The thickness of the electromagnetic steel plates 711 is 0.05 mm or more and 0.5 mm or less.

In general, as the plate thickness becomes thinner, eddy current loss can be reduced, but considering the fact that, when the plate thickness is less than 0.05 mm, it is difficult to process the electromagnetic steel plates, and when the plate thickness is greater than 0.5 mm, it takes more time to perform siliconizing treatment from the steel plate surface and diffusion treatment to optimize the Si distribution, the plate thickness is desirably 0.05 to 0.5 mm.

(10-5-4)

The permanent magnets 712 are Nd—Fe—B magnets. As a result, the motor 70, which can increase the magnetic energy product, is realized, which enables the compressor 100 to be made highly efficient.

(10-5-5)

The permanent magnets 712 are formed by grain boundary diffusion of heavy rare earth. As a result, the demagnetization resistance of the permanent magnets 712 is improved and the holding power of the permanent magnets can be increased with a small amount of heavy rare earth, which enables the compressor 100 to be made highly efficient.

(10-5-6)

The permanent magnets 712 contain 1% by mass or less of dysprosium. As a result, the holding power of the permanent magnets 712 is improved, which enables the compressor 100 to be made highly efficient.

(10-5-7)

The permanent magnets 712 have an average crystalline particle diameter of 10 μm or less. As a result, the demagnetization resistance of the permanent magnets 712 is improved, which enables the compressor 100 to be made highly efficient.

(10-5-8)

The permanent magnets 712 are in the form of a flat plate, and the multiple permanent magnets 712 are embedded in the rotor 71 so as to form V shapes. The holding power at the parts located in the valleys of the V shapes is set higher than the other parts by $\{1/(4n)\}\times10^3$ [A/m] or more. As a result, demagnetization of the permanent magnets 712 is suppressed, which enables the compressor 100 to be made highly efficient.

(10-5-9)

The rotor 71 is formed by stacking multiple high-tensile electromagnetic steel plates with a tensile strength of 400 MPa or more in the plate thickness direction. As a result, the durability of the rotor 71 during high-speed rotation is improved, which enables the compressor 100 to be made highly efficient.

(10-5-10)

The thickness of the bridges 715 of the rotor 71 is 3 mm or more. As a result, the durability of the rotor during high-speed rotation is improved, which enables the compressor to be made highly efficient.

(10-6) Modifications (10-6-1)

The rotor 71 may be formed by stacking multiple plates of amorphous metal in the plate thickness direction. In this case, a motor with low iron loss and high efficiency is realized, which enables the compressor to be made highly efficient.

(10-6-2)

The rotor 71 may be formed by stacking multiple electromagnetic steel plates containing 5% by mass or more of silicon in the plate thickness direction. In this case, by the electromagnetic steel plates that are allowed to contain an appropriate amount of silicon to reduce hysteresis, a motor with low iron loss and high efficiency is realized, which enables the compressor to be made highly efficient.

(10-6-3)

In the above embodiment, the rotor 71 has been described as an embedded magnet rotor, but it is not limited to this. For example, it may be a surface magnet rotor, in which the permanent magnets are pasted on the rotor surface.

(10-7) Configuration of Compressor 300 According to Second Embodiment

In the first embodiment, a scroll compressor has been described as the compressor 100, but the compressor is not limited to a scroll compressor.

Figure 10G:
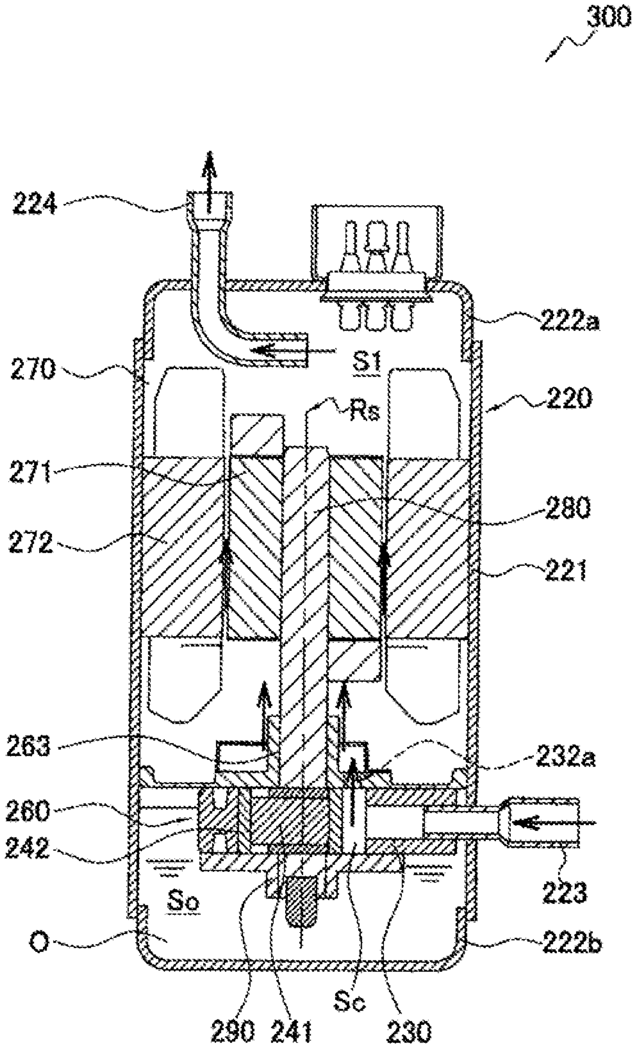
FIG. 10G is a longitudinal section of a compressor according to a second embodiment of the technology of the tenth group.

FIG. 10G is a longitudinal section of the compressor 300 according to the second embodiment of the present disclosure. In FIG. 10G, the compressor 300 is a rotary compressor. The compressor 300 constitutes a part of a refrigerant circuit in which any of the refrigerants of Refrigerant A is circulated. The compressor 300 compresses the refrigerant and discharges a high-pressure gas refrigerant. The arrows in the figure represent the flow of the refrigerant.

(10-7-1) Casing 220

The compressor 300 has a longitudinal cylindrical casing 220. The casing 220 has a cylindrical member 221 that is open at the top and bottom and has an approximately cylindrical shape, and an upper lid 222*a* and a lower lid 222*b* that are provided at the upper end and lower end of the cylindrical member 221, respectively. The cylindrical member 221 and the upper lid 22*a* and lower lid 22*b* are fixed by welding so as to maintain airtightness.

The casing 220 accommodates the constituent equipment of the compressor 300, including a compression mechanism 260, a motor 270, a crank shaft 280, an upper bearing 263, and a lower bearing 290. Also, an oil reservoir space So is formed at the bottom of the casing 220.

At the bottom of the casing 220, an inlet pipe 223, which inhales the gas refrigerant and supplies the gas refrigerant to the compression mechanism 260, is provided penetrating the bottom of the cylindrical member 221. One end of the inlet pipe 223 is connected to a cylinder 230 of the compression mechanism 260. The inlet pipe 223 is in communication with a compression chamber Sc of the compression mechanism 260. Through the inlet pipe 223, a low-pressure refrigerant in the refrigeration cycle before compression by the compressor 300 flows.

The upper lid 222*a* of the casing 220 is provide with a discharge pipe 224 through which the refrigerant to be discharged outside the casing 220 passes. More specifically, the end of the discharge pipe 224 inside the casing 220 is arranged in a high-pressure space S1 formed above the motor 270. Through the discharge pipe 224, a high-pressure refrigerant in the refrigeration cycle after compression by the compression mechanism 260 flows.

(10-7-2) Motor 270

The motor 270 has a stator 272 and a rotor 271. The motor 270 is basically the same as the motor 70 of the first embodiment, except that it is used in the compressor 300, which is a rotary compressor, and demonstrates performances, actions, and effects equivalent to those of the motor 70 of the first embodiment. Accordingly, the description of the motor 270 will be omitted here.

(10-7-3) Crank Shaft 280, Upper Bearing 263, and Lower Bearing 290

The crank shaft 280 is fixed to the rotor 271. Furthermore, the crank shaft 280 is supported by the upper bearing 263 and the lower bearing 290 such that it can be rotated around a rotational axial center Rs. The crank shaft 280 has an eccentric section 241.

(10-7-4) Compression Mechanism 260

The compression mechanism 260 has the single cylinder 230 and a single piston 242 installed in that cylinder 230. The cylinder 230 has a predetermined volume and is fixed to the casing 220.

The piston 242 is installed at the eccentric section 241 of the crank shaft 280. The cylinder 230 and the piston 242 define the compression chamber Sc. The rotation of the rotor 271 revolves the piston 242 via the eccentric section 241. Along with this revolution, the volume of the compression chamber Sc is fluctuated, thereby compressing the gaseous refrigerant.

Here, the "cylinder volume" means the so-called theoretical volume, which corresponds to the volume of gaseous refrigerant to be inhaled from the inlet pipe 223 into the cylinder 230 during one rotation of the piston 242.

(10-7-5) Oil Reservoir Space So

The oil reservoir space So is provided at the bottom of the casing 220. In the oil reservoir space So, refrigerator oil O for lubricating the compression mechanism 260 is stored. Note that refrigerator oil O refers to the refrigerator oil described in the section of "(1-4-1) Refrigerator Oil".

(10-8) Motion of Compressor 300

The motion of the compressor 300 will be described. When the motor 270 is started, the rotor 271 is rotated relative to the stator 272, and the crank shaft 280 fixed to the rotor 271 is rotated. As the crank shaft 280 is rotated, the piston 242, which is coupled to the crank shaft 280, is revolved relative to the cylinder 230. Then, the low-pressure gas refrigerant in the refrigeration cycle passes through the inlet pipe 223 and is inhaled into the compression chamber Sc. As the piston 242 is revolved, the inlet pipe 223 becomes out of communication with the compression chamber Sc, and as the volume of the compression chamber Sc is decreased, the pressure in the compression chamber Sc begins to rise.

The refrigerant in the compression chamber Sc is compressed as the volume of the compression chamber Sc is decreased, and finally becomes a high-pressure gas refrigerant. The high-pressure gas refrigerant is discharged from a discharge hole 232*a*. Thereafter, the high-pressure gas refrigerant passes through the gap between the stator 272 and the rotor 271 and other locations, and is discharged from the discharge pipe 224 installed at the top of the casing 220.

(10-9) Characteristics of Second Embodiment (10-9-1)

Since the compressor 300 employs the motor 270, which is equivalent to the motor 70 of the first embodiment, it is suited for variable displacement compressors in which the number of rotations of the motor can be changed. In this case, in the air conditioner 1 using a mixed refrigerant containing at least 1,2-difluoroethylene, the number of motor rotations can be changed depending on the air conditioning load, which enables the compressor 300 to be made highly efficient.

(10-9-2)

Since the compressor 300 employs the motor 270, which is equivalent to the motor 70 of the first embodiment, it has "Characteristics of (10-5-2) to (10-5-10)" of "(10-5) Characteristics" of the first embodiment.

(10-9-3)

When the compressor 300, which is a rotary compressor, is used as the compressor of the air conditioner 1, the refrigerant filling amount can be made smaller compared to the case where a scroll compressor is used, making it suited for air conditioners that use flammable refrigerants.

(10-10) Modifications of Second Embodiment

Since the compressor 300 employs the motor 270, which is equivalent to the motor 70 of the first embodiment, modifications can be applied to all of those described in "(10-6) Modifications" of the first embodiment.

(10-11) Other Embodiments

The form of the compressor may be a screw compressor or a turbo compressor, as long as a motor equivalent to the motor 70 is used.

(11) EMBODIMENTS OF TECHNOLOGY OF ELEVENTH GROUP (11-1) First Embodiment

Figure 11A:
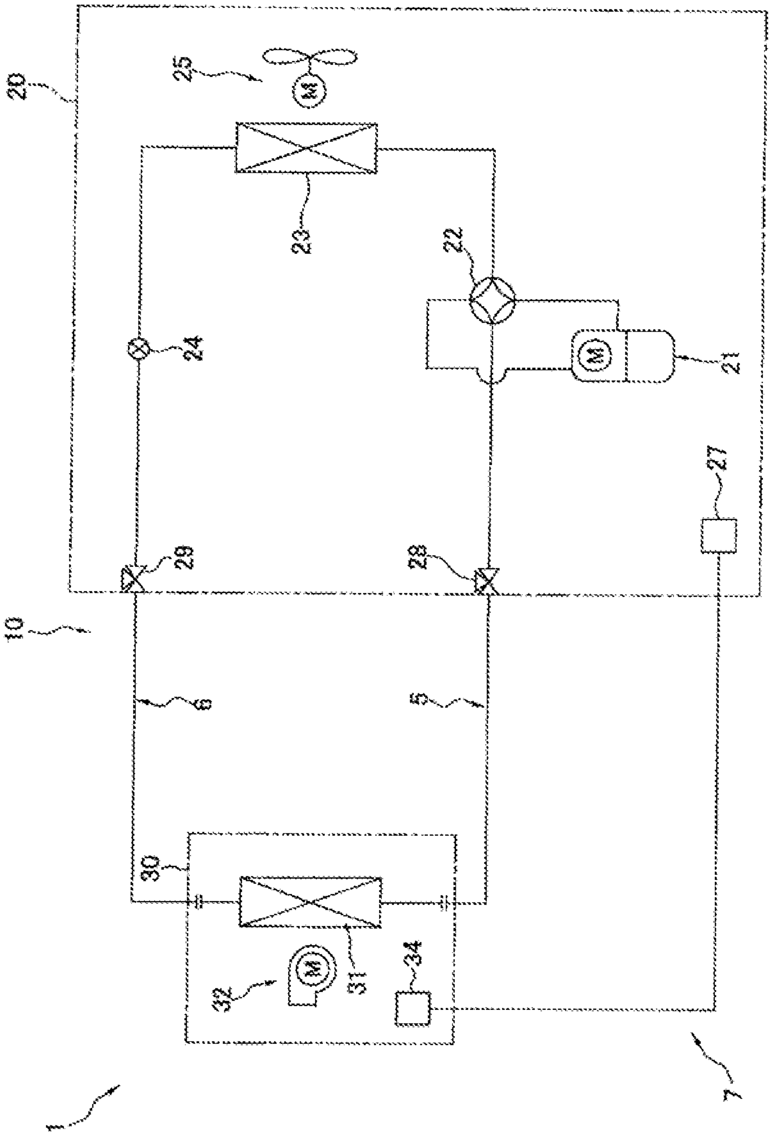
FIG. 11A is a schematic configuration diagram of a refrigerant circuit according to a first embodiment of the technology of an eleventh group.
Figure 11B:
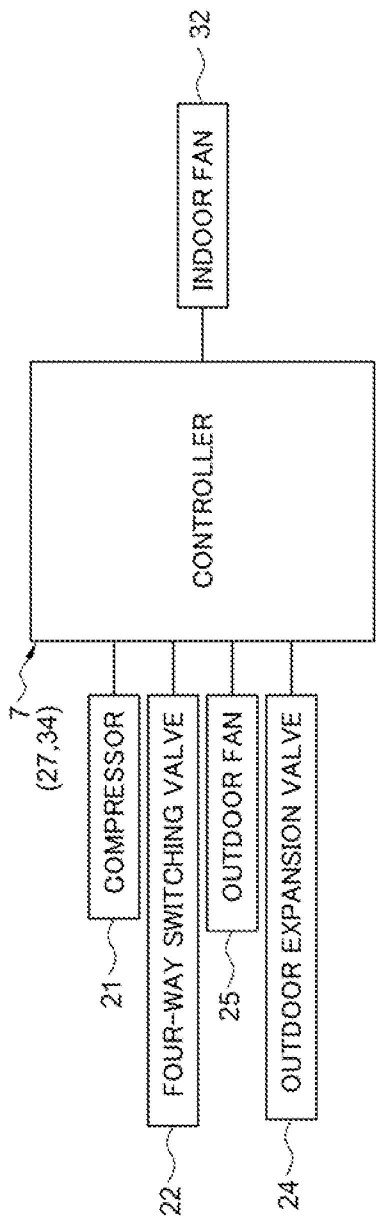
FIG. 11B is a schematic control block configuration diagram of a refrigeration cycle device according to the first embodiment of the technology of the eleventh group.

Hereinafter, while referring to FIG. 11A, which is a schematic configuration diagram of a refrigerant circuit, and FIG. 11B, which is a schematic control block configuration diagram, an air conditioning device 1 as a refrigeration cycle device according to the first embodiment will be described.

The air conditioning device 1 is a device that conditions the air in the target space by carrying out a vapor compression type refrigeration cycle.

The air conditioning device 1 mainly has an outdoor unit 20, an indoor unit 30, liquid-side refrigerant communication piping 6 and gas-side refrigerant communication piping 5 that connect the outdoor unit 20 and the indoor unit 30, a remote control not shown in the figure as an input device and an output device, and a controller 7 that controls the motion of the air conditioning device 1.

In the air conditioning device 1, a refrigeration cycle is carried out in which a refrigerant enclosed in a refrigerant circuit 10 is compressed, cooled or condensed, decompressed, heated or evaporated, and then compressed again. In the present embodiment, the refrigerant circuit 10 is filled with a refrigerant for carrying out a vapor compression type refrigeration cycle. That refrigerant is a refrigerant containing 1,2-difluoroethylene, and any Refrigerant A can be used. The refrigerant circuit 10 is also filled with a refrigerator oil together with that refrigerant.

(11-1-1) Outdoor Unit 20

Figure 11C:
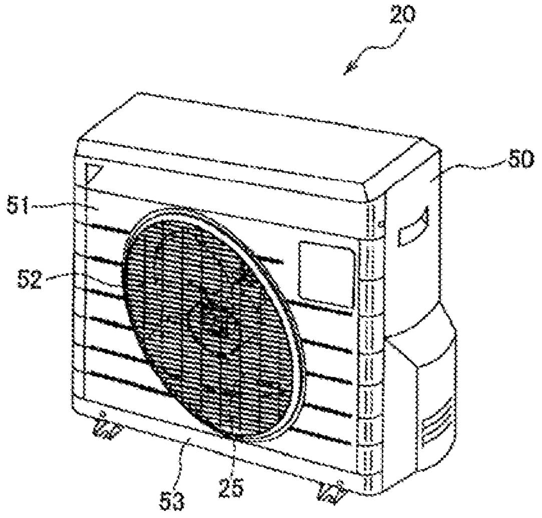
FIG. 11C is a schematic external perspective view of an outdoor unit according to the first embodiment of the technology of the eleventh group.
Figure 11D:
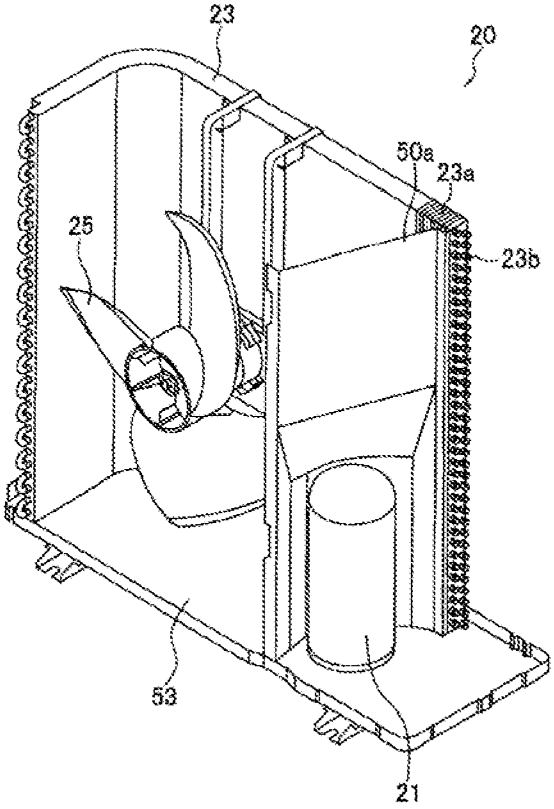
FIG. 11D is a perspective view showing the schematic structure of the interior of the outdoor unit according to the first embodiment of the technology of the eleventh group.

As shown in FIG. 11C, the outdoor unit 20 is configured with an outdoor housing 50 that is in the shape of an approximately rectangular box in appearance. In this outdoor unit 20, as shown in FIG. 11D, a blower room and a machine room are formed by dividing the internal space into left and right parts with a partition plate 50*a*.

This outdoor unit 20 is connected to the indoor unit 30 via the liquid-side refrigerant communication piping 6 and the gas-side refrigerant communication piping 5, and constitutes a part of the refrigerant circuit 10. The outdoor unit 20 mainly has a compressor 21, a four-way switching valve 22, an outdoor heat exchanger 23, an outdoor expansion valve 24, an outdoor fan 25, a liquid-side shut-off valve 29, and a gas-side shut-off valve 28.

The compressor 21 is equipment that compresses a low-pressure refrigerant in the refrigeration cycle until it reaches a high pressure. Here, as the compressor 21, a compressor with a sealed structure in which a positive displacement compression element (omitted in the figure) such as a rotary type or scroll type is rotationally driven by a compressor motor is used. The compressor motor is for changing the volume, and the operation frequency can be controlled by an inverter. Note that the compressor 21 is provided with an accompanying accumulator, which is not shown in the figure, on the inlet side thereof.

The four-way switching valve 22 can switch the state of connection between a cooling operation connection state in which the inlet side of the compressor 21 and the gas-side shut-off valve 28 are connected while connecting the discharge side of the compressor 21 and the outdoor heat exchanger 23, and a heating operation connection state in which the inlet side of the compressor 21 and the outdoor heat exchanger 23 are connected while connecting the discharge side of the compressor 21 and the gas-side shut-off valve 28.

The outdoor heat exchanger 23 is a heat exchanger that functions as a condenser for a high-pressure refrigerant in the refrigeration cycle during cooling operation and as an evaporator for a low-pressure refrigerant in the refrigeration cycle during heating operation. The outdoor heat exchanger 23 is a cross fin-type, fin and tube-type heat exchanger having multiple heat transfer fins 23*a* arranged in a stack in the plate thickness direction and multiple heat transfer pipes 23*b* penetrating and fixed to the multiple heat transfer fins 23*a*. The outdoor heat exchanger 23 of the present embodiment may have, with no limitations, multiple refrigerant flow paths such that the refrigerant branches off and flows into 2 or more and 10 or less. The multiple heat transfer pipes 23*b* of the outdoor heat exchanger 23 of the present embodiment are cylinder-shaped piping except for the curved part, and are constituted of one type selected from the group consisting of those with an outer diameter of 6.35 mm, 7.0 mm, 8.0 mm, and 9.5 mm. Note that the heat transfer pipes 23*b* with an outer diameter of 6.35 mm have a wall thickness of 0.25 mm or more and 0.28 mm or less, and preferably 0.266 mm. The heat transfer pipes 23*b* with an outer diameter of 7.0 mm have a wall thickness of 0.26 mm or more and 0.29 mm or less, and preferably 0.273 mm. The heat transfer pipes 23*b* with an outer diameter of 8.0 mm have a wall thickness of 0.28 mm or more and 0.31 mm or less, and preferably 0.295 mm. The heat transfer pipes 23*b* with an outer diameter of 9.5 mm have a wall thickness of 0.32 mm or more and 0.36 mm or less, and preferably 0.340 mm.

The outdoor fan 25 generates an air flow for inhaling outdoor air into the outdoor unit 20, causing heat exchange between it and the refrigerant in the outdoor heat exchanger 23, and then discharging it outside. The outdoor fan 25 is rotationally driven by an outdoor fan motor. Note that, in the present embodiment, only one outdoor fan 25 is provided.

As for the outdoor expansion valve 24, its valve opening degree can be controlled, and it is provided between the liquid-side end of the outdoor heat exchanger 23 and the liquid-side shut-off valve 29.

The liquid-side shut-off valve 29 is a manual valve arranged at the connection part in the outdoor unit 20 with the liquid-side refrigerant communication piping 6.

The gas-side shut-off valve 28 is a manual valve arranged at the connection part in the outdoor unit 20 with the gas-side refrigerant communication piping 5.

The outdoor unit 20 has an outdoor unit control section 27 that controls the motion of each section that constitutes the outdoor unit 20. The outdoor unit control section 27 has a microcomputer that includes a CPU, a memory, and other elements. The outdoor unit control section 27 is connected to an indoor unit control section 34 of each indoor unit 30 via a communication line, and sends and receives control signals and the like. Also, the outdoor unit control section 27 is electrically connected to various sensors, which are not shown in the figure, and receives signals from each sensor.

As shown in FIG. 11C, the outdoor unit 20 has the outdoor housing 50 provided with an outlet 52. The outdoor housing 50 is in the shape of an approximately rectangular parallelepiped and can intake the outdoor air from the rear side and one side surface side (left side in FIG. 11C), and can blow out the air that has passed through the outdoor heat exchanger 23 to the front side via the outlet 52 formed on a front surface 51. The lower end part of the outdoor housing 50 is covered with a bottom plate 53. On the bottom plate 53, the outdoor heat exchanger 23 stands along the rear side and one side surface side as shown in FIG. 11D. The upper surface of the bottom plate 53 can serve as a drain pan.

(11-1-2) Indoor Unit 30

The indoor unit 30 is installed on the wall or the like of a room, which is the target space. The indoor unit 30 is connected to the outdoor unit 20 via the liquid-side refrigerant communication piping 6 and the gas-side refrigerant communication piping 5, and constitutes a part of the refrigerant circuit 10.

The indoor unit 30 has an indoor heat exchanger 31, an indoor fan 32, an indoor housing 54, and the like.

The indoor heat exchanger 31 is connected to the liquid-side refrigerant communication piping 6 on the liquid side, and its gas-side end is connected to the gas-side refrigerant communication piping 5. The indoor heat exchanger 31 is a heat exchanger that functions as an evaporator for a low-pressure refrigerant in the refrigeration cycle during cooling operation and as a condenser for a high-pressure refrigerant in the refrigeration cycle during heating operation. The indoor heat exchanger 31 has multiple heat transfer fins 31*a* arranged in a stack in the plate thickness direction and multiple heat transfer pipes 31*b* penetrating and fixed to the multiple heat transfer fins 31*a*. The multiple heat transfer pipes 31*b* of the indoor heat exchanger 31 of the present embodiment are cylinder-shaped, and are constituted of one type selected from the group consisting of those with an outer diameter of 4.0 mm, 5.0 mm, 6.35 mm, 7.0 mm, and 8.0 mm. Note that the heat transfer pipes 31*b* with an outer diameter of 4.0 mm have a wall thickness of 0.24 mm or more and 0.26 mm or less, and preferably 0.251 mm. The heat transfer pipes 31*b* with an outer diameter of 5.0 mm have a wall thickness of 0.22 mm or more and 0.25 mm or less, and preferably 0.239 mm. The heat transfer pipes 31*b* with an outer diameter of 6.35 mm have a wall thickness of 0.25 mm or more and 0.28 mm or less, and preferably 0.266 mm. The heat transfer pipes 31*b* with an outer diameter of 7.0 mm have a wall thickness of 0.26 mm or more and 0.29 mm or less, and preferably 0.273 mm. The heat transfer pipes 31*b* with an outer diameter of 8.0 mm have a wall thickness of 0.28 mm or more and 0.31 mm or less, and preferably 0.295 mm.

The indoor fan 32 generates an air flow for inhaling indoor air into the indoor housing 54 of the indoor unit 30, causing heat exchange between it and the refrigerant in the indoor heat exchanger 31, and then discharging it outside. The indoor fan 32 is rotationally driven by an indoor fan motor, which is not shown in the figure.

Figure 11E:
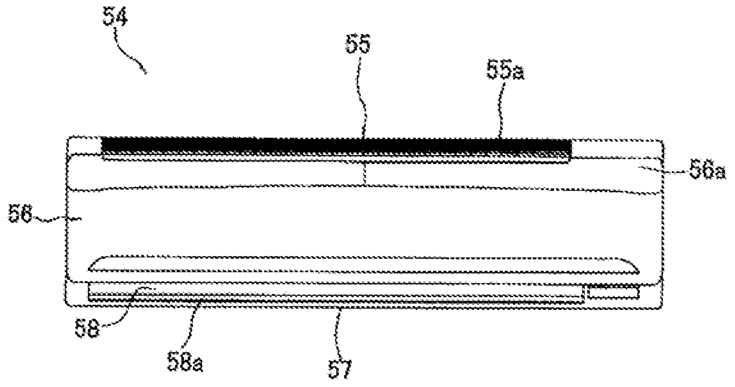
FIG. 11E is a schematic external front view of an indoor unit according to the first embodiment of the technology of the eleventh group.
Figure 11F:
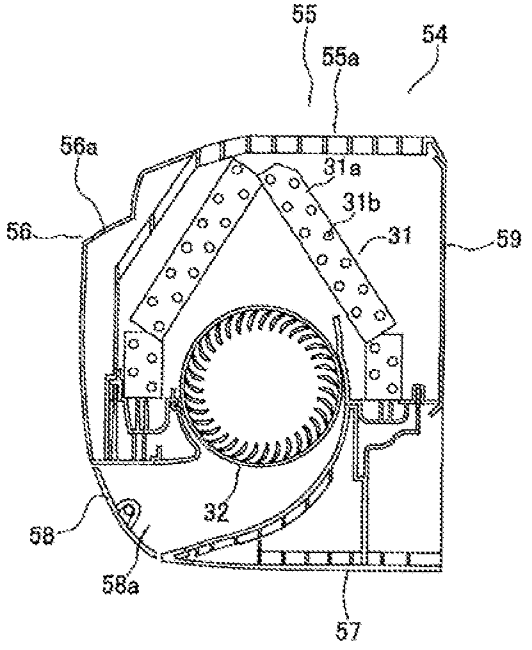
FIG. 11F is a cross section in the side view showing the schematic structure of the interior of the indoor unit according to the first embodiment of the technology of the eleventh group.

The indoor housing 54 is a housing in the shape of an approximately rectangular parallelepiped that accommodates the indoor heat exchanger 31, the indoor fan 32, and the indoor unit control section 34 inside, as shown in FIG. 11E and FIG. 11F. The indoor housing 54 has a top surface 55 that constitutes the upper end of the indoor housing 54, a front panel 56 that constitutes the front of the indoor housing 54, a bottom surface 57 that constitutes the bottom of the indoor housing 54, an outlet 58*a*, a louver 58, a rear surface 59 that faces the wall of a room, left and right side surfaces, which are not shown in the figure, and the like. On the top surface 55, multiple top surface inlets 55*a* are provided, which open in the vertical direction. The front panel 56 is a panel that extends downward from the vicinity of the front side end of the top surface 55. The front panel 56 is provided with a front surface inlet 56*a*, which is formed of an opening elongated in the left and right direction, in its upper part. The indoor air is taken into an air passage composed of the space in the indoor housing 54 where the indoor heat exchanger 31 and the indoor fan 32 are accommodated via these top surface inlet 55*a* and front surface inlet 56*a*. The bottom surface 57 extends approximately horizontally below the indoor heat exchanger 31 and the indoor fan 32. The outlet 58*a* opens toward the front side downward at the lower front side of the indoor housing 54, below the front panel 56 and on the front side of the bottom surface 57.

Also, the indoor unit 30 has an indoor unit control section 34 that controls the motion of each section that constitutes the indoor unit 30. The indoor unit control section 34 has a microcomputer that includes a CPU, a memory, and other elements. The indoor unit control section 34 is connected to the outdoor unit control section 27 via a communication line, and sends and receives control signals and the like.

The indoor unit control section 34 is electrically connected to various sensors provided inside the indoor unit 30, which are not shown in the figure, and receives signals from each sensor.

(11-1-3) Details of Controller 7

In the air conditioning device 1, the outdoor unit control section 27 and the indoor unit control section 34 are connected via a communication line to constitute the controller 7, which controls the motion of the air conditioning device 1.

The controller 7 mainly has a CPU (central processing unit) and a memory such as ROM or RAM. Note that the various processings and controls by the controller 7 are realized by integrated functioning of each section included in the outdoor unit control section 27 and/or the indoor unit control section 34.

(11-1-4) Operation Modes

Hereinafter, the operation modes will be described.

There are two operation modes: a cooling operation mode and a heating operation mode.

The controller 7 determines and executes whether to be in the cooling operation mode or the heating operation mode, based on an instruction received from a remote control or the like.

(11-1-4-1) Cooling Operation Mode

In the cooling operation mode, the air conditioning device 1 sets the state of connection of the four-way switching valve 22 to the cooling operation connection state, in which the inlet side of the compressor 21 and the gas-side shut-off valve 28 are connected while connecting the discharge side of the compressor 21 and the outdoor heat exchanger 23, and circulates the refrigerant filled in the refrigerant circuit 10 mainly through the compressor 21, the outdoor heat exchanger 23, the outdoor expansion valve 24, and the indoor heat exchanger 31 in this order.

More specifically, when the cooling operation mode is started, in the refrigerant circuit 10, the refrigerant is inhaled into the compressor 21, compressed, and then discharged.

In the compressor 21, capacity control is carried out depending on cooling load required by the indoor unit 30. The gas refrigerant that has been discharged from the compressor 21 passes through the four-way switching valve 22 and flows into the gas-side end of the outdoor heat exchanger 23.

The gas refrigerant that has flowed into the gas-side end of the outdoor heat exchanger 23 undergoes heat exchange with the outdoor-side air supplied by the outdoor fan 25 and is condensed in the outdoor heat exchanger 23 to become a liquid refrigerant, which flows out of the liquid-side end of the outdoor heat exchanger 23.

The refrigerant that has flowed out of the liquid-side end of the outdoor heat exchanger 23 is decompressed as it passes through the outdoor expansion valve 24. Note that the outdoor expansion valve 24 is controlled such that the degree of subcooling of the refrigerant passing through the liquid-side outlet of the outdoor heat exchanger 23 satisfies predetermined conditions.

The refrigerant that has been decompressed by the outdoor expansion valve 24 passes through the liquid-side shut-off valve 29 and the liquid-side refrigerant communication piping 6, and flows into the indoor unit 30.

The refrigerant that has flowed into the indoor unit 30 flows into the indoor heat exchanger 31, undergoes heat exchange with the indoor air supplied by the indoor fan 32 and is evaporated in the indoor heat exchanger 31 to become a gas refrigerant, which flows out of the gas-side end of the indoor heat exchanger 31. The gas refrigerant that has flowed out of the gas-side end of the indoor heat exchanger 31 flows into the gas-side refrigerant communication piping 5.

The refrigerant that has flowed through the gas-side refrigerant communication piping 5 passes through the gas-side shut-off valve 28 and the four-way switching valve 22, and is again inhaled into the compressor 21.

(11-1-4-2) Heating Operation Mode

In the heating operation mode, the air conditioning device 1 sets the state of connection of the four-way switching valve 22 to the heating operation connection state, in which the inlet side of the compressor 21 and the outdoor heat exchanger 23 are connected while connecting the discharge side of the compressor 21 and the gas-side shut-off valve 28, and circulates the refrigerant filled in the refrigerant circuit 10 mainly through the compressor 21, the indoor heat exchanger 31, the outdoor expansion valve 24, and the outdoor heat exchanger 23 in this order.

More specifically, when the heating operation mode is started, in the refrigerant circuit 10, the refrigerant is inhaled into the compressor 21, compressed, and then discharged.

In the compressor 21, capacity control is carried out depending on heating load required by the indoor unit 30. The gas refrigerant that has been discharged from the compressor 21 flows through the four-way switching valve 22 and the gas-side refrigerant communication piping 5 and then flows into the indoor unit 30.

The refrigerant that has flowed into the indoor unit 30 flows into the gas-side end of the indoor heat exchanger 31, undergoes heat exchange with the indoor air supplied by the indoor fan 32 and is condensed in the indoor heat exchanger 31 to become a refrigerant in a gas-liquid two phase state or liquid refrigerant, which flows out of the liquid-side end of the indoor heat exchanger 31. The refrigerant that has flowed out of the liquid-side end of the indoor heat exchanger 31 flows into the liquid-side refrigerant communication piping 6.

The refrigerant that has flowed through the liquid-side refrigerant communication piping 6 is decompressed in the liquid-side shut-off valve 29 and the outdoor expansion valve 24 until it reaches the low pressure in the refrigeration cycle. Note that the outdoor expansion valve 24 is controlled such that the degree of subcooling of the refrigerant passing through the liquid-side outlet of the indoor heat exchanger 31 satisfies predetermined conditions. The refrigerant that has been decompressed by the outdoor expansion valve 24 flows into the liquid-side end of the outdoor heat exchanger 23.

The refrigerant that has flowed into the outdoor heat exchanger 23 from its liquid-side end undergoes heat exchange with the outdoor air supplied by the outdoor fan 25 and is evaporated in the outdoor heat exchanger 23 to become a gas refrigerant, which flows out of the gas-side end of the outdoor heat exchanger 23.

The refrigerant that has flowed out of the gas-side end of the outdoor heat exchanger 23 passes through the four-way switching valve 22, and is again inhaled into the compressor 21.

(11-1-5) Characteristics of First Embodiment

In the air conditioning device 1 mentioned above, a refrigerant containing 1,2-difluoroethylene is used, which makes it possible to keep the GWP sufficiently small.

Also, in the outdoor heat exchanger 23 of the outdoor unit 20 that the air conditioning device 1 has, the heat transfer pipes 23*b* with a piping diameter of 6.35 mm or more are used. Therefore, even when the above refrigerant, which is more prone to pressure loss than R32, is used, the pressure loss when passing through the heat transfer pipes 23*b* can be reduced. And, even in the case where changes in the temperature (temperature glide) of the refrigerant flowing through the outdoor heat exchanger 23 occur, the degree of such changes can be kept small. Furthermore, in the outdoor heat exchanger 23, the heat transfer pipes 23*b* with a piping diameter of less than 10.0 mm are used. As a result, the amount of refrigerant to be retained in the outdoor heat exchanger 23 can be kept low.

Also, in the indoor heat exchanger 31 of the indoor unit 30 that the air conditioning device 1 has, the heat transfer pipes 31*b* with a piping diameter of 4.0 mm or more are used. Therefore, even when the above refrigerant, which is more prone to pressure loss than R32, is used, the pressure loss when passing through the heat transfer pipes 31*b* can be reduced. Therefore, even when the above refrigerant, which is more prone to pressure loss than R32, is used, the pressure loss when passing through the heat transfer pipes 31*b* can be reduced. And, even in the case where changes in the temperature (temperature glide) of the refrigerant flowing through the indoor heat exchanger 31 occur, the degree of such changes can be kept small. Furthermore, in the indoor heat exchanger 31 as well, the heat transfer pipes 31*b* with a piping diameter of less than 10.0 mm are used. As a result, the amount of refrigerant to be retained in the indoor heat exchanger 31 can be kept low.

(11-1-6) Modification A of First Embodiment

In the above first embodiment, the air conditioning device provided with only one indoor unit has been described as an example, but the air conditioning device may be provided with multiple indoor units connected in parallel to each other (those not having an indoor expansion valve).

(11-2) Second Embodiment

Figure 11G:
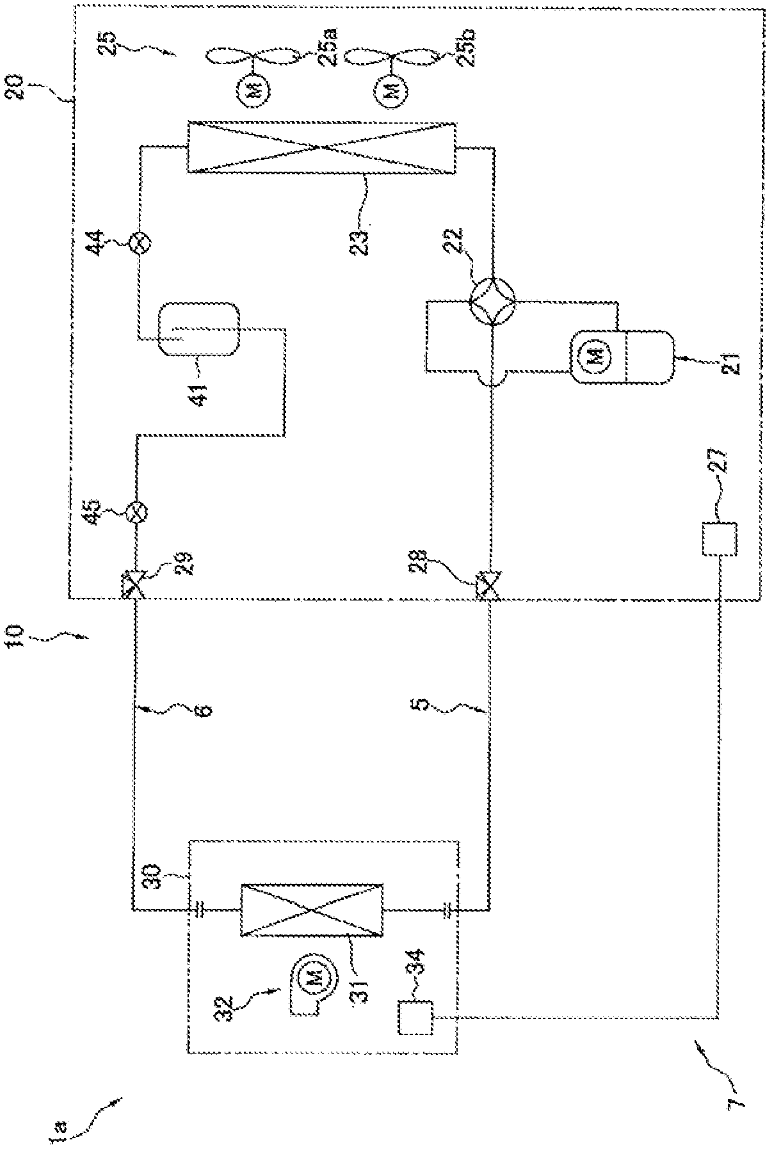
FIG. 11G is a schematic configuration diagram of a refrigerant circuit according to a second embodiment of the technology of the eleventh group.
Figure 11H:
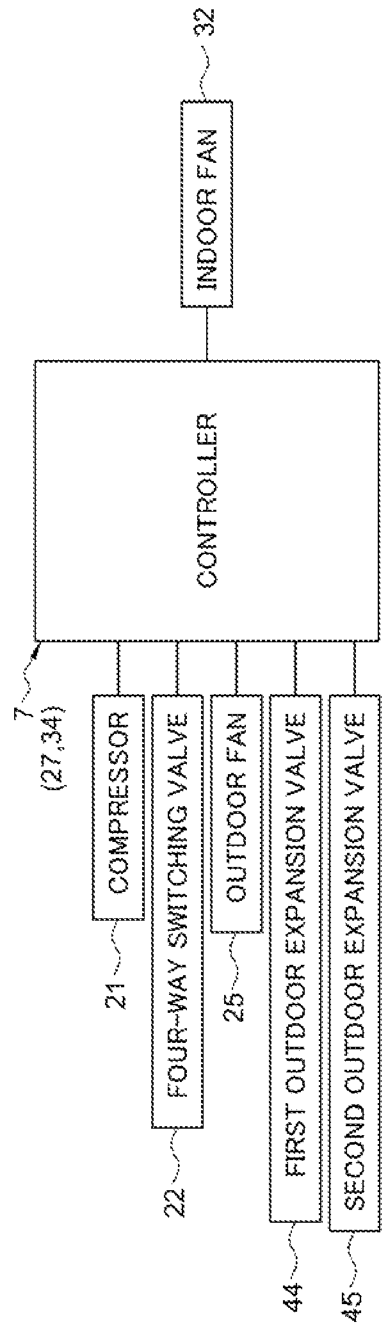
FIG. 11H is a schematic control block configuration diagram of a refrigeration cycle device according to the second embodiment of the technology of the eleventh group.

Hereinafter, while referring to FIG. 11G, which is a schematic configuration diagram of a refrigerant circuit, and FIG. 11H, which is a schematic control block configuration diagram, an air conditioning device 1*a* as a refrigeration cycle device according to the second embodiment will be described.

In the following, as for the air conditioning device 1*a* of the second embodiment, description will be mainly focused on the differences from the air conditioning device 1 of the first embodiment.

In the air conditioning device 1*a* as well, the refrigerant circuit 10 is filled with any Refrigerant A, which is a mixed refrigerant containing 1,2-difluoroethylene, as the refrigerant for carrying out a vapor compression type refrigeration cycle. The refrigerant circuit 10 is also filled with a refrigerator oil together with that refrigerant.

(11-2-1) Outdoor Unit 20

In the outdoor unit 20 of the air conditioning device 1*a* of the second embodiment, a first outdoor fan 25*a* and a second outdoor fan 25*b* are provided as the outdoor fan 25. In the outdoor heat exchanger 23 of the outdoor unit 20 of the air conditioning device 1*a*, a large heat exchange area is ensured so as to correspond to an air flow received from the first outdoor fan 25*a* and the second outdoor fan 25*b*.

In the outdoor unit 20 of the air conditioning device 1*a*, instead of the outdoor expansion valve 24 of the outdoor unit 20 in the first embodiment described above, a first outdoor expansion valve 44, an intermediate pressure receiver 41, and a second outdoor expansion valve 45 are sequentially provided between the liquid side of the outdoor heat exchanger 23 and the liquid-side shut-off valve 29. The valve opening degree of the first outdoor expansion valve 44 and the second outdoor expansion valve 45 can be controlled. The intermediate pressure receiver 41 is a container that is capable of storing the refrigerant, with both the end of piping extending from the side of the first outdoor expansion valve 44 and the end of piping extending from the side of the second outdoor expansion valve 45 located in the internal space thereof.

Figure 11I:
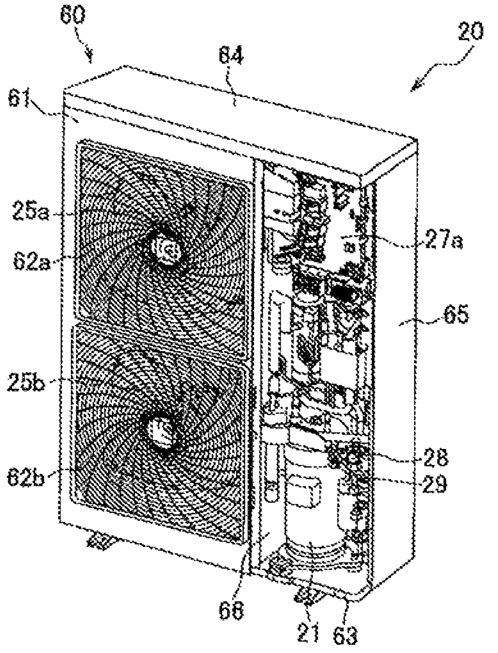

As shown in FIG. 11I, the outdoor unit 20 of the second embodiment has a structure (so-called trunk-type structure)

in which the internal space of a housing 60 that is in the shape of an approximately rectangular box is divided into left and right parts with a vertically extending partition plate 66 to form a blower room and a machine room.

In the blower room in the housing 60, the outdoor heat exchanger 23, the outdoor fan 25 (the first outdoor fan 25*a* and the second outdoor fan 25*b*), and the like are arranged, and in the machine room in the housing 60, the compressor 21, the four-way switching valve 22, the first outdoor expansion valve 44, the second outdoor expansion valve 45, the intermediate pressure receiver 41, the gas-side shut-off valve 28, the liquid-side shut-off valve 29, the electrical equipment unit 27*a* constituting the outdoor unit control section 27, and the like are arranged.

The housing 60 mainly has a bottom plate 63, a top plate 64, a left front plate 61, a left side plate (not shown), a right front plate (not shown), a right side plate 65, a partition plate 66, and the like. The bottom plate 63 constitutes the bottom surface part of the housing 60. The top plate 64 constitutes the top surface part of the outdoor unit 20. The left front plate 61 mainly constitutes the left front part of the housing 60, on which a first outlet 62*a* and a second outlet 62*b*, which open in the front and back direction and are aligned vertically, are formed. Through the first outlet 62*a*, air that has been sucked inside from the rear side and left side surface side of the housing 60 by the first outdoor fan 25*a* and that has passed through the upper part of the outdoor heat exchanger 23 mainly passes. Through the second outlet 62*b*, air that has been sucked inside from the rear side and left side surface side of the housing 60 by the second outdoor fan 25*b* and that has passed through the lower part of the outdoor heat exchanger 23 mainly passes. The first outlet 62*a* and the second outlet 62*b* are each provided with a fan grill. The left side plate mainly constitutes the left side part of the housing 60, which can also function as an inlet for air to be inhaled into the housing 60. The right front plate mainly constitutes the right front part and a front side part of the right side of the housing 60. The right side plate 65 mainly constitutes a rear side part of the right side and a right side part of the rear side of the housing 60. The partition plate 66 is a vertically extending plate-like member arranged on the bottom plate 63 and divides the internal space of the housing 60 into the blower room and the machine room.

Figure 11J:
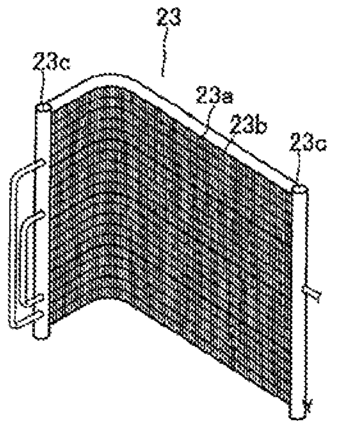

The outdoor heat exchanger 23 is, for example, a cross fin-type, fin and tube-type heat exchanger having multiple heat transfer fins 23*a* arranged in a stack in the plate thickness direction and multiple heat transfer pipes 23*b* penetrating and fixed to the multiple heat transfer fins 23*a*, as shown in FIG. 11J. This outdoor heat exchanger 23 is arranged in the blower room along the left side and rear side of the housing 60 to be in an L shape in the plan view. The outdoor heat exchanger 23 of the present embodiment may have, with no limitations, multiple refrigerant flow paths such that the refrigerant branches off and flows into 10 or more and 20 or less. The multiple heat transfer pipes 23*b* of the outdoor heat exchanger 23 of the present embodiment are cylinder-shaped piping except for the curved part, and are constituted of one type selected from the group consisting of those with an outer diameter of 6.35 mm, 7.0 mm, 8.0 mm, and 9.5 mm. Note that the relationship between the outer diameter and wall thickness of the heat transfer pipes 23*b* is the same as in the above first embodiment.

The compressor 21 is mounted on the bottom plate 63 and fixed with bolts in the machine room of the housing 60.

The gas-side shut-off valve 28 and the liquid-side shut-off valve 29 are arranged in the machine room of the housing 60 at positions with a height of the vicinity of the upper end of the compressor 21, and in the vicinity of the right front corner.

In the machine room of the housing 60, the electrical equipment unit 27*a* is arranged in a space above both the gas-side shut-off valve 28 and the liquid-side shut-off valve 29.

As for the above air conditioning device 1*a*, in the cooling operation mode, the first outdoor expansion valve 44 is controlled such that the degree of subcooling of the refrigerant passing through the liquid-side outlet of the outdoor heat exchanger 23 satisfies predetermined conditions, for example. Also, in the cooling operation mode, the second outdoor expansion valve 45 is controlled such that the degree of superheating of the refrigerant inhaled by the compressor 21 satisfies predetermined conditions, for example.

In addition, in the heating operation mode, the second outdoor expansion valve 45 is controlled such that the degree of subcooling of the refrigerant passing through the liquid-side outlet of the indoor heat exchanger 31 satisfies predetermined conditions, for example. Moreover, in the heating operation mode, the first outdoor expansion valve 44 is controlled such that the degree of superheating of the refrigerant inhaled by the compressor 21 satisfies predetermined conditions, for example.

(11-2-2) Indoor Unit 30

The indoor unit 30 of the second embodiment is installed by being suspended in an upper space of a room, which is the target space, or installed against a ceiling surface. The indoor unit 30 is connected to the outdoor unit 20 via the liquid-side refrigerant communication piping 6 and the gas-side refrigerant communication piping 5, and constitutes a part of the refrigerant circuit 10.

The indoor unit 30 has an indoor heat exchanger 31, an indoor fan 32, an indoor housing 70, and the like.

Figure 11K:
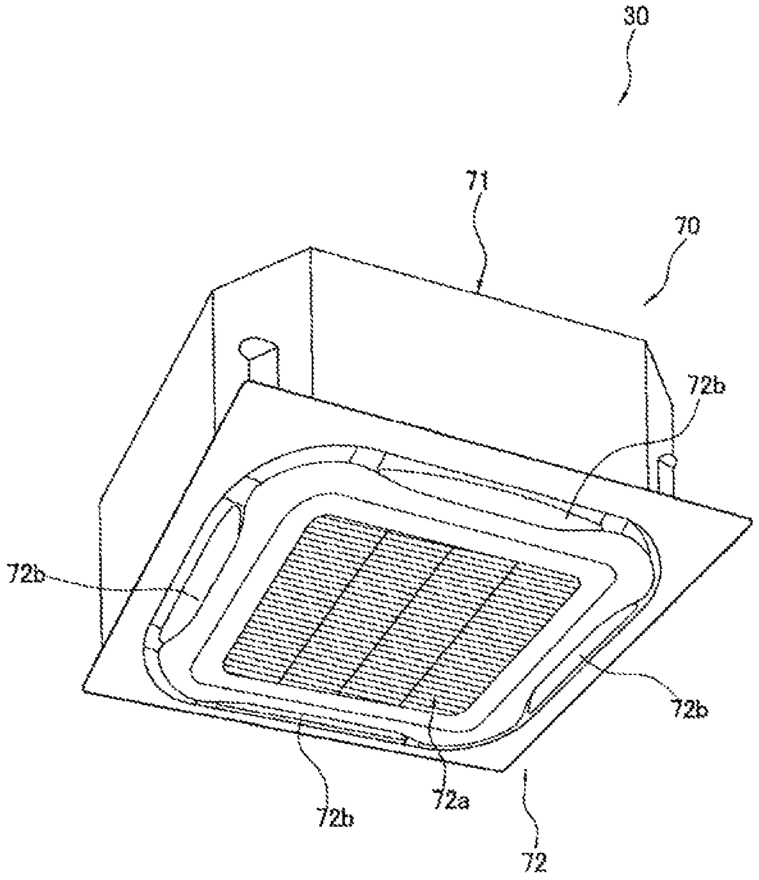
Figure 11L:
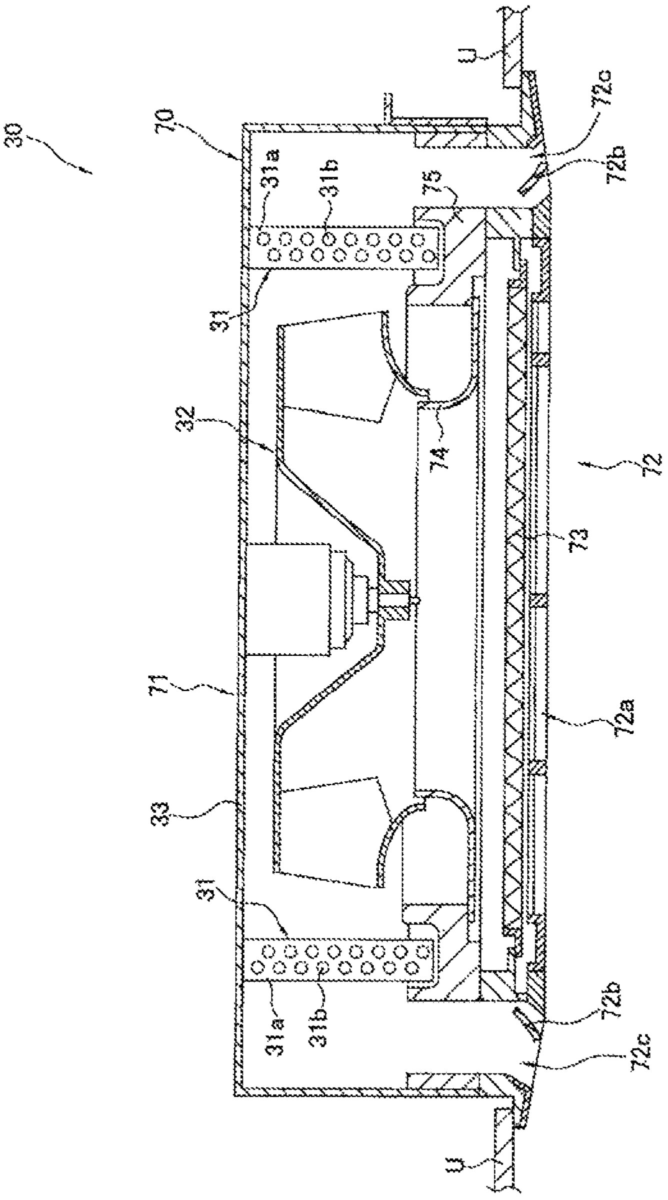

The indoor housing 70 has a housing body 71 and a decorative panel 72, as shown in FIG. 11K and FIG. 11L. The housing body 71 is open at the bottom and accommodates the indoor heat exchanger 31, the indoor fan 32, and the like inside. The decorative panel 72 covers the lower surface of the housing body 71, and has an inlet 72*a*, multiple flaps 72*b*, multiple outlets 72*c*, and the like. The indoor air that has been sucked in from the inlet 72*a* passes through the filter 73 and is then guided by a bell mouth 74 to the inlet side of the indoor fan 32. The air that has been sent out from the indoor fan 32 passes through the indoor heat exchanger 31 arranged on top of a drain pan 75, passes through a flow path provided around the drain pan 75, and is then blown out into the room from the outlets 72*c*.

The indoor heat exchanger 31 of the second embodiment is provided so as to be in an approximately quadrilateral shape in the plan view, surrounding the indoor fan 32. This indoor heat exchanger 31 has multiple heat transfer fins 31*a* arranged in a stack in the plate thickness direction and multiple heat transfer pipes 31*b* penetrating and fixed to the multiple heat transfer fins 31*a*. Note that the multiple heat transfer pipes 31*b* of the indoor heat exchanger 31 of the second embodiment are cylinder-shaped, and are constituted of one type selected from the group consisting of those with an outer diameter of 4.0 mm, 5.0 mm, 6.35 mm, 7.0 mm, 8.0 mm, and 9.5 mm. Note that the heat transfer pipes 31*b* with an outer diameter of 9.5 mm have a wall thickness of 0.32 mm or more and 0.36 mm or less, and preferably 0.340 mm. Note that the relationship between the other outer diameters and wall thicknesses as for the heat transfer pipes 31*b* is the same as in the above first embodiment.

(11-2-3) Characteristics of Second Embodiment

In the air conditioning device 1*a* according to the above second embodiment as well, as in the air conditioning device 1 according to the first embodiment, a refrigerant containing 1,2-difluoroethylene is used, which makes it possible to keep the GWP sufficiently small.

Also, in the outdoor heat exchanger 23 of the outdoor unit 20 that the air conditioning device 1*a* has as well, for the above refrigerant, which is more prone to pressure loss than R32, the pressure loss when passing through the heat transfer pipes 23*b* can be reduced, and even in the case where changes in the temperature (temperature glide) of the refrigerant flowing through the outdoor heat exchanger 23 occur, the degree of such changes can be kept small. Furthermore, the amount of refrigerant to be retained in the outdoor heat exchanger 23 can be kept low.

Also, in the indoor heat exchanger 31 of the indoor unit 30 that the air conditioning device 1*a* has as well, even when the above refrigerant, which is more prone to pressure loss than R32, is used, the pressure loss when passing through the heat transfer pipes 31*b* can be reduced for the above refrigerant, which is more prone to pressure loss than R32, and even in the case where changes in the temperature (temperature glide) of the refrigerant flowing through the indoor heat exchanger 31 occur, the degree of such changes can be kept small. Furthermore, the amount of refrigerant to be retained in the indoor heat exchanger 31 can be kept low.

(11-2-4) Modification A of Second Embodiment

In the above second embodiment, the air conditioning device provided with only one indoor unit has been described as an example, but the air conditioning device may be provided with multiple indoor units connected in parallel to each other (those not having an indoor expansion valve).

(11-3) Third Embodiment

Figure 11M:
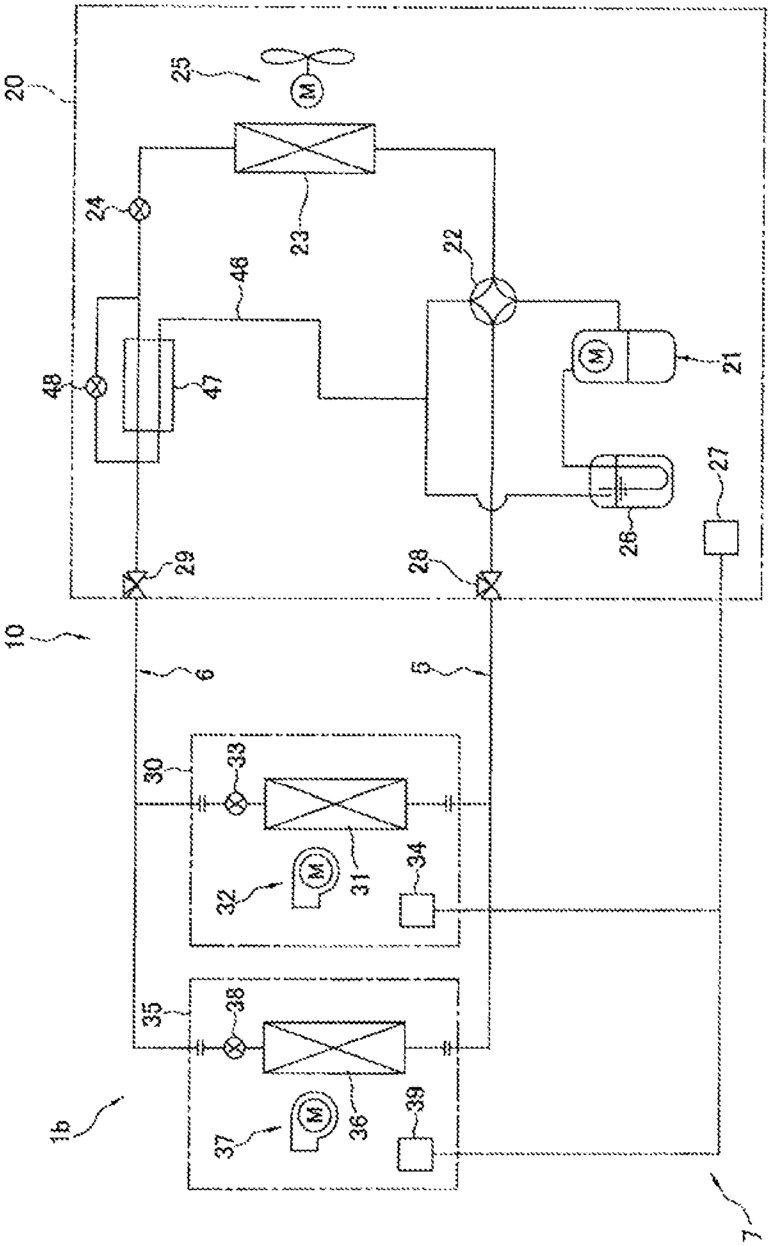
Figure 11N:
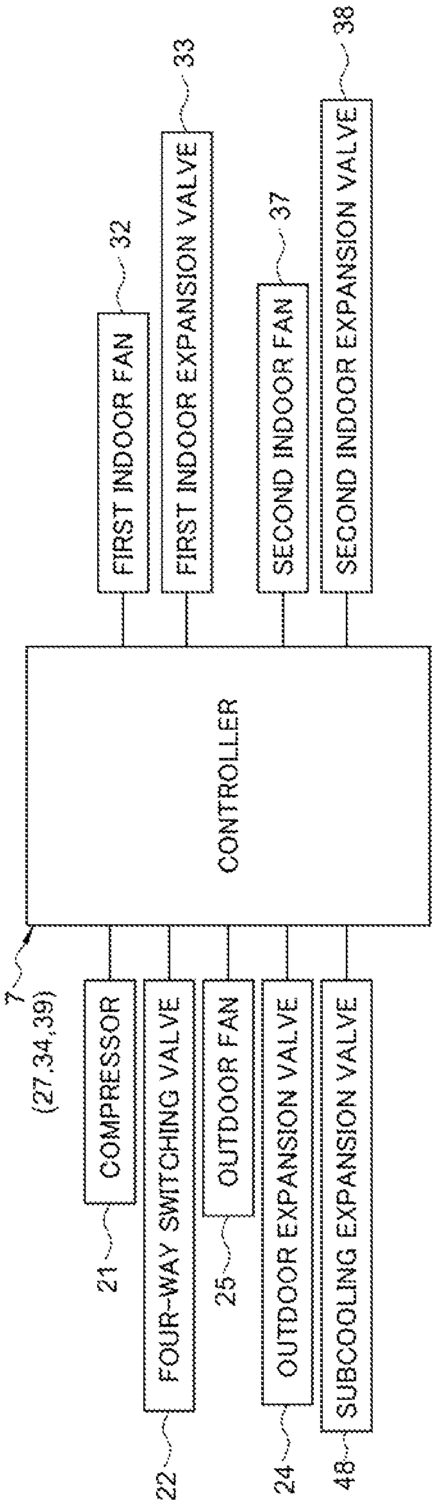
Figure 110:
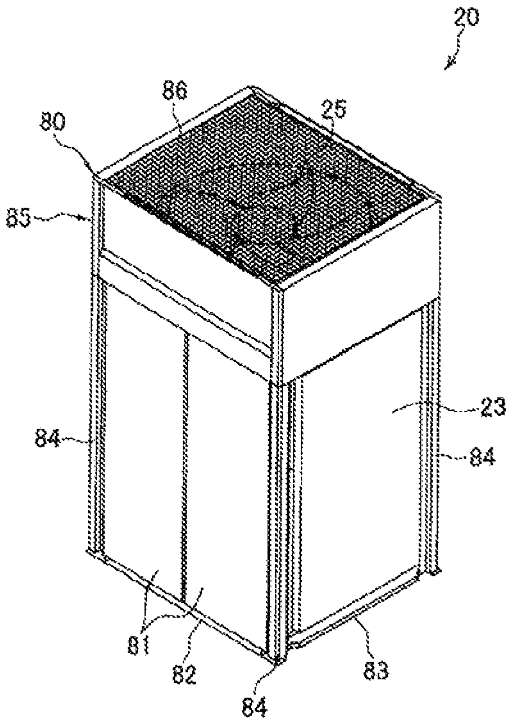

Hereinafter, while referring to FIG. 11M, which is a schematic configuration diagram of a refrigerant circuit, and FIG. 11N, which is a schematic control block configuration diagram, an air conditioning device 1*b* as a refrigeration cycle device according to the third embodiment will be described.

In the following, as for the air conditioning device 1*b* of the third embodiment, description will be mainly focused on the differences from the air conditioning device 1 of the first embodiment.

In the air conditioning device 1*b* as well, the refrigerant circuit 10 is filled with any Refrigerant A, which is a mixed refrigerant containing 1,2-difluoroethylene, as the refrigerant for carrying out a vapor compression type refrigeration cycle. The refrigerant circuit 10 is also filled with a refrigerator oil together with that refrigerant.

(11-3-1) Outdoor Unit 20

The outdoor unit 20 of the air conditioning device 1*b* according to the third embodiment is the outdoor unit 20 in the above first embodiment provided with a low-pressure receiver 26, a subcooling heat exchanger 47, and a subcooling circuit 46.

The low-pressure receiver 26 is a container that is installed between one of the connection ports of the four-way switching valve 22 and the inlet side of the compressor 21, and is capable of storing the refrigerant. Note that, in the present embodiment, it is provided separately from the accompanying accumulator that the compressor 21 has.

The subcooling heat exchanger 47 is provided between the outdoor expansion valve 24 and the liquid-side shut-off valve 29.

The subcooling circuit 46 is a circuit that branches off from the main circuit between the outdoor expansion valve 24 and the subcooling heat exchanger 47, and extends to join the part in the middle of piping from one of the connection ports of the four-way switching valve 22 to the low-pressure receiver 26. In the middle of the subcooling circuit 46, a subcooling expansion valve 48 is provided, which decompresses the passing refrigerant. The refrigerant that flows through the subcooling circuit 46 and has been decompressed by the subcooling expansion valve 48 undergoes heat exchange with the refrigerant flowing on the main circuit side in the subcooling heat exchanger 47. Due to this, the refrigerant flowing on the main circuit side is further cooled and the refrigerant flowing through the subcooling circuit 46 is evaporated.

Figure 11P:
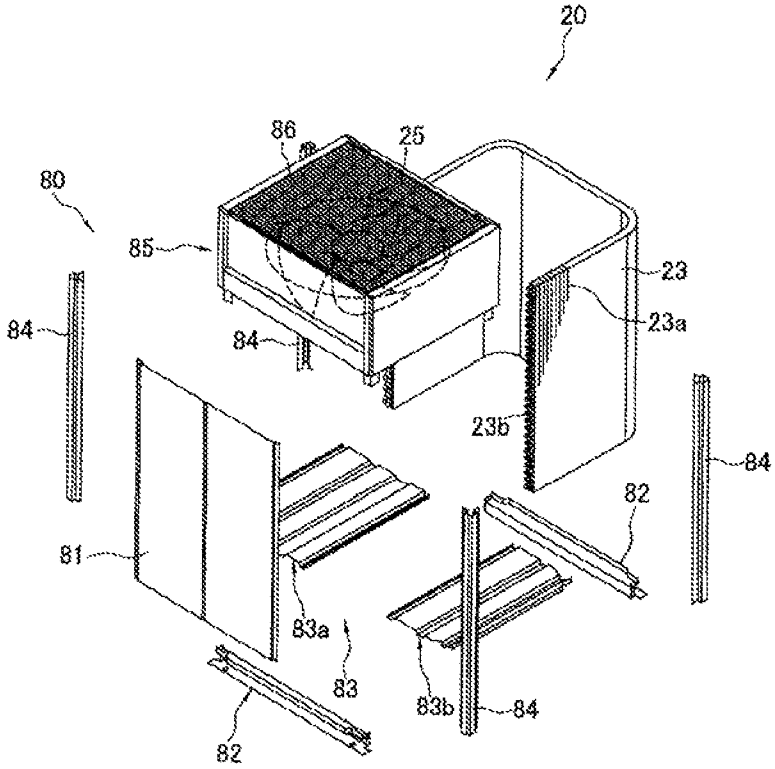

Hereinafter, while referring to an external perspective view of FIG. 11O and an exploded perspective view of FIG. 11P, the detailed structure of the outdoor unit 20 of the air conditioning device 1*b* according to the third embodiment will be described.

The outdoor unit 20 of the air conditioning device 1*b* has what is called a top blowing structure that intakes air from a lower part to the inside of an outdoor housing 80 and blows out the air from an upper part to the outside of the outdoor housing 80.

The outdoor housing 80 mainly has a bottom plate 83 bridged over a pair of installation legs 82 extending in the left and right direction, pillars 84 vertically extending from the corners of the bottom plate 83, a front panel 81, and a fan module 85. The bottom plate 83 forms the bottom surface of the outdoor housing 80 and is divided into a first bottom plate 83*a* on the left side and a second bottom plate 83*b* on the right side. The front panel 81 is bridged between the pillars 84 on the front side, below the fan module 85, and constitutes the front surface of the outdoor housing 80. Within the outdoor housing 80, in the space below the fan module 85 and above the bottom plate 83, the compressor 21, the outdoor heat exchanger 23, the low-pressure receiver 26, the four-way switching valve 22, the outdoor expansion valve 24, the subcooling heat exchanger 47, the subcooling expansion valve 48, the subcooling circuit 46, the gas-side shut-off valve 28, the liquid-side shut-off valve 29, the outdoor unit control section 27, and the like are arranged. The outdoor heat exchanger 23 is in an approximately U shape in the plan view facing the rear surface and both left and right side surfaces among the part below the fan module 85 of the outdoor housing 80, substantially forming the rear surface and both left and right side surfaces of the outdoor housing 80. This outdoor heat exchanger 23 is arranged along the top of the left side edge, rear side edge, and right side edge of the bottom plate 83. The outdoor heat exchanger 23 of the third embodiment is a cross fin-type, fin and tube-type heat exchanger having multiple heat transfer fins 23*a* arranged in a stack in the plate thickness direction and multiple heat transfer pipes 23*b* penetrating and fixed to the multiple heat transfer fins 23*a*. The outdoor heat exchanger 23 of the present embodiment may have, with no limitations, multiple refrigerant flow paths such that the refrigerant branches off and flows into 20 or more and 40 or less. The multiple heat transfer pipes 23*b* of the outdoor heat exchanger 23 of the third embodiment are cylinder-shaped piping except for the curved part, and are constituted of one type selected from the group consisting of those with an outer diameter of 7.0 mm, 8.0 mm, and 9.5 mm. Note that the relationship between the outer diameter and wall thickness of the heat transfer pipes 23*b* is the same as in the above first embodiment.

The fan module 85 is provided on the upper side of the outdoor heat exchanger 23 and has an outdoor fan 25, a bell mouth, which is not shown in the figure, and the like. The outdoor fan 25 is arranged in a posture where the rotation axis is in the vertical direction.

With the structure described above, the air flow formed by the outdoor fan 25 flows from the surroundings of the outdoor heat exchanger 23, through the outdoor heat exchanger 23, and into the inside the outdoor housing 80, and is blown upward through an outlet 86 provided to penetrate in the vertical direction at the upper end surface of the outdoor housing 80.

(11-3-2) First Indoor Unit 30 and Second Indoor Unit 35

Also, the air conditioning device 1*b* according to the third embodiment has the first indoor unit 30 and the second indoor unit 35 provided in parallel to each other, instead of the indoor unit 30 in the above first embodiment.

In the first indoor unit 30, a first indoor heat exchanger 31, a first indoor fan 32, and a first indoor unit control section 34 are provided as in the indoor unit 30 in the above first embodiment, and furthermore, a first indoor expansion valve 33 is provided on the liquid side of the first indoor heat exchanger 31. The valve opening degree of the first indoor expansion valve 33 can be controlled.

As in the first indoor unit 30, the second indoor unit 35 has a second indoor heat exchanger 36, a second indoor fan 37, a second indoor unit control section 39, and a second indoor expansion valve 38 provided on the liquid side of the second indoor heat exchanger 36. The valve opening degree of the second indoor expansion valve 38 can be controlled.

Note that the specific structures of the first indoor unit 30 and the second indoor unit 35 of the air conditioning device 1*b* according to the third embodiment are the same as that of the indoor unit 30 of the second embodiment, except for the first indoor expansion valve 33 and second indoor expansion valve 38 described above. Note that the first indoor heat exchanger 31 and the second indoor heat exchanger 36 both have multiple, cylinder-shaped heat transfer pipes, and those heat transfer pipes are constituted of one type selected from the group consisting of those with an outer diameter of 4.0 mm, 5.0 mm, 6.35 mm, 7.0 mm, 8.0 mm, and 9.5 mm. Note that the relationship between the outer diameter and wall thickness of the heat transfer pipes 23*b* is the same as in the above second embodiment.

Note that the controller 7 of the third embodiment is configured by connecting the outdoor unit control section 27, the first indoor unit control section 34, and the second indoor unit control section 39 in a communicable manner with each other.

As for the above air conditioning device 1*b*, in the cooling operation mode, the outdoor expansion valve 24 is controlled such that the degree of subcooling of the refrigerant passing through the liquid-side outlet of the outdoor heat exchanger 23 satisfies predetermined conditions. Also, in the cooling operation mode, the subcooling expansion valve 48 is controlled such that the degree of superheating of the refrigerant inhaled by the compressor 21 satisfies predetermined conditions. Note that, in the cooling operation mode, the first indoor expansion valve 33 and the second indoor expansion valve 38 are controlled to be in a fully open state.

In addition, in the heating operation mode, the first indoor expansion valve 33 is controlled such that the degree of subcooling of the refrigerant passing through the liquid-side outlet of the first indoor heat exchanger 31 satisfies predetermined conditions. Similarly, the second indoor expansion valve 38 is also controlled such that the degree of subcooling of the refrigerant passing through the liquid-side outlet of the second indoor heat exchanger 36 satisfies predetermined conditions. Moreover, in the heating operation mode, the outdoor expansion valve 45 is controlled such that the degree of superheating of the refrigerant inhaled by the compressor 21 satisfies predetermined conditions. Note that, in the heating operation mode, the subcooling expansion valve 48 is controlled such that the degree of superheating of the refrigerant inhaled by the compressor 21 satisfies predetermined conditions.

(11-3-3) Characteristics of Third Embodiment

In the air conditioning device 1*b* according to the above third embodiment as well, as in the air conditioning device 1 according to the first embodiment, a refrigerant containing 1,2-difluoroethylene is used, which makes it possible to keep the GWP sufficiently small.

Also, in the outdoor heat exchanger 23 of the outdoor unit 20 that the air conditioning device 1*b* has as well, for the above refrigerant, which is more prone to pressure loss than R32, the pressure loss when passing through the heat transfer pipes 23*b* can be reduced, and even in the case where changes in the temperature (temperature glide) of the refrigerant flowing through the outdoor heat exchanger 23 occur, the degree of such changes can be kept small. Furthermore, the amount of refrigerant to be retained in the outdoor heat exchanger 23 can be kept low.

Also, in the indoor heat exchanger 31 of the indoor unit 30 that the air conditioning device 1*b* has as well, even when the above refrigerant, which is more prone to pressure loss than R32, is used, the pressure loss when passing through the heat transfer pipes 31*b* can be reduced for the above refrigerant, which is more prone to pressure loss than R32, and even in the case where changes in the temperature (temperature glide) of the refrigerant flowing through the indoor heat exchanger 31 occur, the degree of such changes can be kept small. Furthermore, the amount of refrigerant to be retained in the indoor heat exchanger 31 can be kept low.

(11-4) Others

An air conditioning device or an outdoor unit may be configured by combining the above first embodiment to third embodiment and each modification as appropriate.

(12) EMBODIMENTS OF TECHNOLOGY OF TWELFTH GROUP

(12-1) Configuration of Air Conditioner 1

FIG. 12A is a refrigerant circuit diagram of an air conditioner 1 for which a compressor 100 according to one embodiment is utilized. The air conditioner 1 is a refrigeration cycle device comprising the compressor 100. Examples of the air conditioner 1 for which the compressor 100 is employed include an "air conditioner dedicated to cooling operation", an "air conditioner dedicated to heating operation", and an "air conditioner that can be switched to either cooling operation or heating operation using a four-way switching valve". Here, the description will be given using the "air conditioner that can be switched to either cooling operation or heating operation using a four-way switching valve".

In FIG. 12A, the air conditioner 1 comprises an indoor unit 2 and an outdoor unit 3, and the indoor unit 2 and the outdoor unit 3 are connected by liquid refrigerant communication piping 4 and gas refrigerant communication piping 5. As shown in FIG. 12A, the air conditioner 1 is of a pair-type, having one each of indoor unit 2 and outdoor unit 3. However, the air conditioner 1 is not limited to this, and it may be of a multi-type having multiple indoor units 2.

In the air conditioner 1, a refrigerant circuit 11 is configured by connecting equipment such as an accumulator 15, the compressor 100, a four-way switching valve 16, an outdoor heat exchanger 17, an expansion valve 18, and an indoor heat exchanger 13 by piping.

In the present embodiment, the refrigerant circuit 11 is filled with a refrigerant for carrying out a vapor compression type refrigeration cycle. That refrigerant is a mixed refrigerant containing 1,2-difluoroethylene, and any Refrigerant A can be used. The refrigerant circuit 11 is also filled with a refrigerator oil together with that mixed refrigerant.

(12-1-1) Indoor Unit 2

The indoor heat exchanger 13 mounted in the indoor unit 2 is a cross fin-type, fin and tube-type heat exchanger configured with heat transfer pipes and a large number of heat transfer fins. The indoor heat exchanger 13 is connected to the liquid refrigerant communication piping 4 on the liquid side and connected to the gas refrigerant communication piping 5 on the gas side, and functions as an evaporator for the refrigerant during cooling operation.

(12-1-2) Outdoor Unit 3

In the outdoor unit 3, the accumulator 15, compressor 100, the outdoor heat exchanger 17, and the expansion valve 18 are mounted.

(12-1-2-1) Outdoor Heat Exchanger 17

The outdoor heat exchanger 17 is a cross fin-type, fin and tube-type heat exchanger configured with heat transfer pipes and a large number of heat transfer fins. The outdoor heat exchanger 17 is connected on one side to a discharge pipe 24 through which the refrigerant discharged from the compressor 100 flows, and on the other side to the liquid refrigerant communication piping 4. The outdoor heat exchanger 17 functions as a condenser for the gas refrigerant supplied from the compressor 100 via the discharge pipe 24.

(12-1-2-2) Expansion Valve 18

The expansion valve 18 is provided in piping that connects the outdoor heat exchanger 17 and the liquid refrigerant communication piping 4. The expansion valve 18 is an electric valve whose degree of opening can be adjusted to regulate the pressure and flow rate of the refrigerant flowing through the piping.

(12-1-2-3) Accumulator 15

The accumulator 15 is provided in piping that connects the gas refrigerant communication piping 5 and an inlet pipe 23 of the compressor 100. The accumulator 15 separates the refrigerant that goes from the indoor heat exchanger 13 through the gas refrigerant communication piping 5 toward the inlet pipe 23 into the gas phase and the liquid phase, in order to prevent the liquid refrigerant from being supplied to the compressor 100. The compressor 100 is supplied with the refrigerant in the gas phase that is accumulated in an upper space of the accumulator 15.

(12-1-2-4) Compressor 100

FIG. 12B is a longitudinal section of the compressor 100 according to one embodiment. In FIG. 12B, the compressor 100 is a scroll compressor. The compressor 100 compresses the refrigerant that has been inhaled via the inlet pipe 23 in a compression chamber Sc, and discharges the refrigerant after compression from the discharge pipe 24. Note that the details of the compressor 100 will be described in the section of "(12-2) Configuration of Compressor 100".

(12-1-2-5) Four-Way Switching Valve 16

The four-way switching valve 16 has first to fourth ports. In the four-way switching valve 16, the first port is connected to the discharge side of the compressor 100, the second port is connected to the inlet side of the compressor 100, the third port is connected to the gas-side end of the outdoor heat exchanger 17, and the fourth port is connected to a gas-side shut-off valve Vg.

The four-way switching valve 16 switches between a first state (the state shown by the solid line in FIG. 12A) and a second state (the state shown by the dashed line in FIG. 12A). In the four-way switching valve 16 in the first state, the first port and the third port are in communication and the second port and the fourth port are in communication. In the four-way switching valve 16 in the second state, the first port and the fourth port are in communication and the second port and the third port are in communication.

(12-2) Configuration of Compressor 100

The compressor 100 constitutes the refrigerant circuit together with the evaporator, the condenser, and the expansion mechanism, and plays a role of compressing the gas refrigerant in that refrigerant circuit. As shown in FIG. 12B, the compressor 100 is mainly constituted of a longitudinal cylindrical, sealed dome-shaped casing 20, a motor 70, a compression mechanism 60, an oldham ring 39, a lower bearing 90, an inlet pipe 23, and a discharge pipe 24.

(12-2-1) Casing 20

The casing 20 has a cylindrical member 21 having an approximately cylindrical shape, a bowl-shaped upper lid 22*a* that is airtightly welded to the upper end of the cylindrical member 21, and a bowl-shaped lower lid 22*b* that is airtightly welded to the lower end of the cylindrical member 21.

In the casing 20, the compression mechanism 60, which compresses the gas refrigerant, and the motor 70, which is arranged below the compression mechanism 60, are mainly accommodated. The compression mechanism 60 and the motor 70 are coupled by a crank shaft 80 that is arranged to extend in the vertical direction in the casing 20. A gap space 68 occurs between the compression mechanism 60 and the motor 70.

Also, an oil reservoir space So is formed at the bottom of the casing 20. In the oil reservoir space So, refrigerator oil O for lubricating the compression mechanism 60 and the like is stored. Note that refrigerator oil O refers to the refrigerator oil described in the section of "(1-4-1) Refrigerator Oil".

Inside the crank shaft 80, the oil supply route 83 is formed for supplying refrigerator oil O to the compression mechanism 60 and the like. The lower end of the main axis 82 of the crank shaft 80 is located in the oil reservoir space So formed at the bottom of the casing 20, and refrigerator oil O in the oil reservoir space So is supplied to the compression mechanism 60 and the like through the oil supply route 83.

(12-2-2) Motor 70

The motor 70 is an induction motor, and is mainly constituted of an annular stator 72 fixed to the inner wall of the casing 20, and a rotor 71 accommodated rotatably inside the stator 72 with a small gap (air gap).

The motor 70 is arranged such that the upper end of the coil end of the coil 727 formed on the upper side of the stator 72 is at a position with approximately the same height as the lower end of a bearing section 61*b* of a housing 61.

As for the stator 72, copper wires are wound around its tooth sections, and coil ends of the coil 727 are formed above and below it.

The rotor 71 is drivingly coupled to a movable scroll 40 of the compression mechanism 60 via the crank shaft 80, which is arranged to extend in the vertical direction at the axial center of the cylindrical member 21. Also, a guide plate 58, which guides the refrigerant that has flowed out of an outlet 49 of a communication passage 46 to a motor cooling passage 55, is disposed in the gap space 68.

The stator 72 is a so-called distributively wound stator, and it has a body section 725, which is the iron core, and the coil 727, which is wound around the body section 725. Also, at the upper part and lower part of the body section 725, necked portions 727*a* are formed, which are necked parts of the coil 727 that are recessed inward than the outer circumferential surface of the body section 725.

Note that the details of the motor 70 will be described in the section of "(12-4) Configuration of Motor 70".

(12-2-3) Compression Mechanism 60

As shown in FIG. 12B, the compression mechanism 60 is mainly constituted of the housing 61, a fixed scroll 30 arranged above and in close contact with the housing 61, and the movable scroll 40, which is engaged with the fixed scroll 30.

(12-2-3-1) Fixed Scroll 30

The fixed scroll 30 is mainly constituted of a mirror plate 34 and a spiral (involute) wrap 33 formed on the lower surface of the mirror plate 34, as shown in FIG. 12B.

On the mirror plate 34, a discharge hole 341 that is in communication with the compression chamber Sc and an enlarged and recessed section 342 that is in communication with the discharge hole 341 are formed. The discharge hole 341 is formed so as to extend in the vertical direction at the central part of the mirror plate 34.

The enlarged and recessed section 342 is configured with a recessed section that extends in the horizontal direction on the upper surface of the mirror plate 34. And, on the upper surface of the fixed scroll 30, a lid body 344 is fastened and fixed with bolts 344*a* to block this enlarged and recessed section 342. Then, by covering the enlarged and recessed section 342 with the lid body 344, a muffler space 345, which is composed of an expansion chamber that muffles the operation noise of the compression mechanism 60, is formed.

(12-2-3-2) Movable Scroll 40

The movable scroll 40 is mainly constituted of a mirror plate 41, a spiral (involute) wrap 42 formed on the upper surface of the mirror plate 41, and a boss section 43 formed on the lower surface of the mirror plate 41, as shown in FIG. 12B.

The movable scroll 40 is an outer drive movable scroll. That is, the movable scroll 40 has the boss section 43, which fits on the outside of the crank shaft 80.

The movable scroll 40 is supported by the housing 61 with the oldham ring 39 fitted into groove sections formed on the mirror plate 41. Also, the upper end of the crank shaft 80 is fitted into the boss section 43. By being incorporated into the compression mechanism 60 in such a way, the movable scroll 40 is revolved in the housing 61 without being rotated due to the rotation of the crank shaft 80. And, the wrap 42 of the movable scroll 40 is engaged with the wrap 33 of the fixed scroll 30, and the compression chamber Sc is formed between the contact sections of the both wraps 33 and 42. In the compression chamber Sc, the volume between the both wraps 33 and 42 is contracted toward the center along with the revolution of the movable scroll 40. This makes it possible to compress the gas refrigerant.

(12-2-3-3) Housing 61

The housing 61 is press-fitted into and fixed to the cylindrical member 21 over the entire circumferential direction at its outer circumferential surface. That is, the cylindrical member 21 and the housing 61 are in close contact with each other in an airtight manner over the entire circumference. Therefore, the inside of the casing 20 is compartmentalized into a high-pressure space below the housing 61 and a low-pressure space above the housing 61. Also, in this housing 61, a housing recessed section 61*a* recessed in the center of the upper surface and a bearing section 61*b* extending downward from the center of the lower surface are formed. In the bearing section 61*b*, a bearing hole 63 is formed penetrating in the vertical direction, and the crank shaft 80 is rotatably fitted into it through the bearing hole 63.

(12-2-4) Oldham Ring 39

The oldham ring 39 is a member for preventing the rotational movement of the movable scroll 40, and is fitted into oldham grooves (not shown in the figure) formed in the housing 61. Note that these oldham grooves are ellipse-shaped grooves, and are disposed at positions facing each other in the housing 61.

(12-2-5) Lower Bearing 90

The lower bearing 90 is disposed in a lower space below the motor 70. This lower bearing 90 is fixed to the cylindrical member 21 and also constitutes the lower end-side bearing of the crank shaft 80, supporting the crank shaft 80.

(12-2-6) Inlet Pipe 23

The inlet pipe 23 is for leading the refrigerant of the refrigerant circuit to the compression mechanism 60, and is airtightly fitted into the upper lid 22*a* of the casing 20. The inlet pipe 23 penetrates the low-pressure space S1 in the vertical direction, while its inner end is fitted into the fixed scroll 30.

(12-2-7) Discharge Pipe 24

The discharge pipe 24 is for discharging the refrigerant in the casing 20 to the outside of the casing 20, and is airtightly fitted into the cylindrical member 21 of the casing 20. And, this discharge pipe 24 has an inner end 36, which is formed into a cylinder shape extending in the vertical direction and fixed to the lower end of the housing 61. Note that the inner end opening of the discharge pipe 24, that is, the inlet, is open toward the bottom.

(12-3) Motion of Compressor 100

When the motor 70 is driven, the crank shaft 80 is rotated and the movable scroll 40 carries out revolutionary operation without being rotated. Then, a low-pressure gas refrigerant passes through the inlet pipe 23, is inhaled into the compression chamber Sc from the periphery side of the compression chamber Sc, and is compressed as the volume of the compression chamber Sc is changed, becoming a high-pressure gas refrigerant.

The high-pressure gas refrigerant is discharged from the center of the compression chamber Sc through the discharge hole 341 into the muffler space 345, and then flows out through the communication passage 46, a scroll-side passage 47, a housing-side passage 48, and the outlet 49 into the gap space 68, and flows downward between the guide plate 58 and the inner surface of the cylindrical member 21.

As the gas refrigerant flows downward between the guide plate 58 and the inner surface of the cylindrical member 21, a part of it is diverted and flows between the guide plate 58 and the motor 70 in the circumferential direction. Note that, at this time, the lubricating oil mixed in the gas refrigerant is separated.

Meanwhile, the other part of the diverted gas refrigerant flows downward through the motor cooling passage 55 and flows to the lower space of the motor, then is reversed and flows upward through an air gap passage between the stator 72 and the rotor 71, or the motor cooling passage 55 on the side facing the communication passage 46 (left side in FIG. 12B).

Thereafter, the gas refrigerant that has passed through the guide plate 58 and the gas refrigerant that has flowed through the air gap or motor cooling passage 55 are combined in the gap space 68, flow into the discharge pipe 24 from the inner end 36 of the discharge pipe 24, and are discharged outside the casing 20.

Then, the gas refrigerant that has been discharged outside the casing 20 is circulated in the refrigerant circuit, then pass through the inlet pipe 23, and is inhaled into and compressed in the compression mechanism 60 again.

(12-4) Configuration of Motor 70

FIG. 12C is a cross section of the motor 70 cut in a plane perpendicular to the rotation axis. Also, FIG. 12D is a cross section of the rotor 71 cut in a plane perpendicular to the rotation axis. Furthermore, FIG. 12E is a perspective view of the rotor 71.

Note that, in FIG. 12C to FIG. 12E, the shaft coupled to the rotor 71 to transmit the rotational force to the outside is omitted and not shown. In FIG. 12C to FIG. 12E, the motor 70 is an induction motor. The motor 70 has the rotor 71 and the stator 72.

(12-4-1) Stator 72

The stator 72 has a body section 725 and multiple tooth sections 726. The body section 725 is formed into an approximately cylindrical shape with an inner circumferential diameter that is larger than the outer circumferential diameter of the rotor 71. The body section 725 is formed by processing thin electromagnetic steel plates with a thickness of 0.05 mm or more and 0.5 mm or less into a predetermined shape and stacking a predetermined number of plates.

The multiple tooth sections 726 protrude in an aspect where they are located at the inner circumferential section of the body section 725 along its circumferential direction with approximately consistent intervals. Each tooth section 726 extends from the inner circumferential section of the body section 725 toward the center along the radial direction of a circle centered on the rotation axis and faces the rotor 71 with a predetermined gap.

Each tooth section 726 is magnetically coupled via the body section 725 on the outer circumference side. Around each tooth section 726, a coil 727 is wound as a winding wire (only one is shown in FIG. 12C). Three phase alternating current is allowed to flow through the coil 727, for generating a rotating magnetic field that rotates the rotor 71. The winding scheme of the coil 727 is not limited, and may be in a form where it is intensively wound on the multiple tooth sections 726 or in a form where it is distributively wound.

These rotor 71 and stator 72 are assembled into the casing 20 and used as rotary electrical machinery.

(12-4-2) Rotor 71

The rotor 71 is a cage rotor. The appearance shape of the rotor 71 is formed into an approximately cylindrical shape, and the main axis 82 of the crank shaft 80 is coupled and fixed along its central axis. The rotor 71 has a rotor core 710, multiple conductor rods 716, and an end ring 717.

(12-4-2-1) Rotor Core 710

The rotor core 710 is formed into an approximately cylindrical shape with a magnetic material. It is formed by processing thin electromagnetic steel plates with a thickness of 0.05 mm or more and 0.5 mm or less into a predetermined shape and stacking a predetermined number of plates, as shown in FIG. 12E.

As the electromagnetic steel plates, multiple high-tensile electromagnetic steel plates with a tensile strength of 400 MPa or more are desirable in order to improve the durability of the rotor during high-speed rotation. As shown in FIG. 12D, the rotor core 710 has multiple conductor rod formation holes 718 and an axis insertion hole 719.

On one electromagnetic steel plate 711, a [hole with the same planar shape as the axis insertion hole 719] is provided in the center, and furthermore, [holes with the same planar shape as the conductor rod formation holes 718] are provided at a predetermined interval. The conductor rod formation holes 718 and the axis insertion hole 719 are formed by stacking the electromagnetic steel plates 711 in a state where the [holes with the same planar shape as the conductor rod formation holes 718] are shifted at a predetermined angle. The conductor rod formation holes 718 are holes for molding the conductor rods 716 in the rotor core 710. Note that only some of the conductor rods 716 and conductor rod formation holes 718 are shown in FIG. 12E.

The axis insertion hole 719 is a hole for fixing the main axis 82 of the crank shaft 80 along the central axis of the rotor core 710 (see FIG. 12B).

(12-4-2-2) Conductor Rods 716 and End Ring 717

The conductor rods 716, which are filled in the conductor rod formation holes 718, and the end ring 717, which sandwiches the rotor core 710 from both ends, are integrally molded. For example, when aluminum or an aluminum alloy is employed as the conductor, they are integrally molded by, after setting the rotor core 710 in an aluminum die casting mold, press-fitting molten aluminum or aluminum alloy into the mold.

As a result, the cage rotor 71 is realized, which has the multiple conductor rods 716 arranged in an annular shape and the end ring 717 that short-circuits the multiple conductor rods 716 at the end in the axial direction.

(12-5) Characteristics

The compressor 100 is a compressor that compresses a mixed refrigerant containing at least 1,2-difluoroethylene, and by employing the induction motor 70, it becomes possible to achieve high power output at a relatively low cost.

(12-6) Modifications

(12-6-1) First Modification

In the above embodiment, the description has been given for the aspect in which the conductor rods 716 and the end ring 717 are integrally molded with aluminum or an aluminum alloy, but is not limited to this.

For example, the conductor rods 716 and the end ring 717 may be molded with a metal that has lower electrical resistance than aluminum. Specifically, the conductor rods 716 and the end ring 717 may be molded with copper or a copper alloy.

According to the first modification, the heat generated by the electric current flowing through the conductor rods 716 of the induction motor 70 is suppressed, which makes it possible to achieve high power output of the compressor 100.

Note that, in the case of copper and a copper alloy, the conductor rods 716 and the end ring 717 cannot be molded by the die casting scheme, and therefore, the conductor rods 716 and the end ring 717 are welded by brazing.

Of course, the conductor rods 716 and the end ring 717 may be of different kinds of metals, and for example, the conductor rods 716 may be molded with copper or a copper alloy, and the end ring 717 may be molded with aluminum or an aluminum alloy.

(12-6-2) Second Modification

FIG. 12F is a perspective view of a rotor 71 used for an induction motor 70 of a compressor 100 according to the second modification. In FIG. 12F, the rotor 71 has a heat sink 717*a* as a heat dissipation structure.

The heat sink 717*a* has heat dissipation fins 717*af* that protrude from the end surface of the end ring 717 in the central axis direction of the rotor 71 and extend along the radial direction of the rotor 71. In the present modification, six heat dissipation fins 717*af* are arranged around the central axis at a central angle interval of 60°.

In the compressor 100, since the heat sink 717*a* rotates due to the rotation of the rotor 71, the heat dissipation property of the heat dissipation fins 717*af* is improved, and since the rotation causes forced convection, the temperature rise in the surrounding area is suppressed, which makes it possible to achieve high power output of the compressor 100.

Also, since the heat sink 717*a* is formed on the end ring 717 and the heat sink 717*a* can be integrally molded with the end ring 717 when the end ring 717 is molded, the increase in production cost can be suppressed.

(12-6-3) Third Modification

FIG. 12G is a refrigerant circuit diagram of an air conditioner 1 for which a compressor 100 according to the third modification is utilized. In FIG. 12G, the difference from FIG. 12A is that the refrigerant circuit 11 has a cooling structure that includes a branch circuit 110, and otherwise, the configuration is the same as that in FIG. 12A.

In the branch circuit 110, the refrigerant that branches off from the refrigerant circuit 11 flows. The branch circuit 110 is provided in parallel at the part of the refrigerant circuit 11 from between the outdoor heat exchanger 17 and the expansion valve 18 to between the expansion valve 18 and the indoor heat exchanger 13. To the branch circuit 110, a second expansion valve 112, a cooling section 111, and a third expansion valve 113 are connected.

The cooling section 111 is outfitted to the outer circumferential surface of the casing 20 of the compressor 100 via a heat transfer plate, and its outfitting position corresponds to the side of the stator 72 of the induction motor 70. The cooling section 111 indirectly cools the stator 72 using the cold energy of the refrigerant flowing through the refrigerant circuit 11. Specifically, the second expansion valve 112 is connected to one end of a pipe that is fitted into the aforementioned heat transfer plate in a state bent into a serpentine shape, and the third expansion valve 113 is connected to the other end.

During cooling operation, a part of the refrigerant flowing through the refrigerant circuit 11 branches off from between the outdoor heat exchanger 17 and the expansion valve 18 to the branch circuit 110, flows through the second expansion valve 112 whose degree of opening is regulated, the cooling section 111, and the third expansion valve 113 whose degree of opening is fully open in this order, and merges into between the expansion valve 18 and the indoor heat exchanger 13. The degree of opening of the second expansion valve 112 is regulated such that the refrigerant that has been decompressed in the second expansion valve 112 can absorb heat and be evaporated in the cooling section 111.

Also, during heating operation, a part of the refrigerant flowing through the refrigerant circuit 11 branches off from between the indoor heat exchanger 13 and the expansion valve 18 to the branch circuit 110, flows through the third expansion valve 113 whose degree of opening is regulated, the cooling section 111, and the second expansion valve 112 whose degree of opening is fully open in this order, and merges into between the expansion valve 18 and the outdoor heat exchanger 17. The degree of opening of the third expansion valve 113 is regulated such that the refrigerant that has been decompressed in the third expansion valve 113 can absorb heat and be evaporated in the cooling section 111.

Due to the cooling structure described above, the stator 72 can be cooled by the cold energy of the refrigerant flowing through the refrigerant circuit 11, which makes it possible to achieve high power output of the compressor.

(12-7) Configuration of Compressor 300 According to Second Embodiment

In the first embodiment, a scroll compressor has been described as the compressor 100, but the compressor is not limited to a scroll compressor.

FIG. 12H is a longitudinal section of the compressor 300 according to the second embodiment of the present disclosure. In FIG. 12H, the compressor 300 is a rotary compressor. The compressor 300 constitutes a part of a refrigerant circuit in which any of the refrigerants of Refrigerant A is circulated. The compressor 300 compresses the refrigerant and discharges a high-pressure gas refrigerant. The arrows in the figure represent the flow of the refrigerant.

(12-7-1) Casing 220

The compressor 300 has a longitudinal cylindrical casing 220. The casing 220 has a cylindrical member 221 that is open at the top and bottom and has an approximately cylindrical shape, and an upper lid 222*a* and a lower lid 222*b* that are provided at the upper end and lower end of the cylindrical member 221, respectively. The cylindrical member 221 and the upper lid 22*a* and lower lid 22*b* are fixed by welding so as to maintain airtightness.

The casing 220 accommodates the constituent equipment of the compressor 300, including a compression mechanism 260, a motor 270, a crank shaft 280, an upper bearing 263, and a lower bearing 290. Also, an oil reservoir space So is formed at the bottom of the casing 220.

At the bottom of the casing 220, an inlet pipe 223, which inhales the gas refrigerant and supplies the gas refrigerant to the compression mechanism 260, is provided penetrating the bottom of the cylindrical member 221. One end of the inlet pipe 223 is connected to a cylinder 230 of the compression mechanism 260. The inlet pipe 223 is in communication with a compression chamber Sc of the compression mechanism 260. Through the inlet pipe 223, a low-pressure refrigerant in the refrigeration cycle before compression by the compressor 300 flows.

The upper lid 222*a* of the casing 220 is provide with a discharge pipe 224 through which the refrigerant to be discharged outside the casing 220 passes. More specifically, the end of the discharge pipe 224 inside the casing 220 is arranged in a high-pressure space S1 formed above the motor 270. Through the discharge pipe 224, a high-pressure refrigerant in the refrigeration cycle after compression by the compression mechanism 260 flows.

(12-7-2) Motor 270

The motor 270 has a stator 272 and a rotor 271. The motor 270 is basically the same as the motor 70 of the first embodiment, except that it is used in the compressor 300, which is a rotary compressor, and demonstrates performances, actions, and effects equivalent to those of the motor 70 of the first embodiment. Accordingly, the description of the motor 270 will be omitted here.

(12-7-3) Crank Shaft 280, Upper Bearing 263, and Lower Bearing 290

The crank shaft 280 is fixed to the rotor 271. Furthermore, the crank shaft 280 is supported by the upper bearing 263 and the lower bearing 290 such that it can be rotated around a rotational axial center Rs. The crank shaft 280 has an eccentric section 241.

(12-7-4) Compression Mechanism 260

The compression mechanism 260 has the single cylinder 230 and a single piston 242 installed in that cylinder 230. The cylinder 230 has a predetermined volume and is fixed to the casing 220.

The piston 242 is installed at the eccentric section 241 of the crank shaft 280. The cylinder 230 and the piston 242 define the compression chamber Sc. The rotation of the rotor 271 revolves the piston 242 via the eccentric section 241. Along with this revolution, the volume of the compression chamber Sc is fluctuated, thereby compressing the gaseous refrigerant.

Here, the “cylinder volume” means the so-called theoretical volume, which corresponds to the volume of gaseous refrigerant to be inhaled from the inlet pipe 223 into the cylinder 230 during one rotation of the piston 242.

(12-7-5) Oil Reservoir Space So

The oil reservoir space So is provided at the bottom of the casing 220. In the oil reservoir space So, refrigerator oil O for lubricating the compression mechanism 260 is stored. Note that refrigerator oil O refers to the refrigerator oil described in the section of “(1-4-1) Refrigerator Oil”.

(12-8) Motion of Compressor 300

The motion of the compressor 300 will be described. When the motor 270 is started, the rotor 271 is rotated relative to the stator 272, and the crank shaft 280 fixed to the rotor 271 is rotated. As the crank shaft 280 is rotated, the piston 242, which is coupled to the crank shaft 280, is revolved relative to the cylinder 230. Then, the low-pressure gas refrigerant in the refrigeration cycle passes through the inlet pipe 223 and is inhaled into the compression chamber Sc. As the piston 242 is revolved, the inlet pipe 223 becomes out of communication with the compression chamber Sc, and as the volume of the compression chamber Sc is decreased, the pressure in the compression chamber Sc begins to rise.

The refrigerant in the compression chamber Sc is compressed as the volume of the compression chamber Sc is decreased, and finally becomes a high-pressure gas refrigerant. The high-pressure gas refrigerant is discharged from a discharge hole 232*a*. Thereafter, the high-pressure gas refrigerant passes through the gap between the stator 272 and the rotor 271 and other locations, and is discharged from the discharge pipe 224 installed at the top of the casing 220.

(12-9) Characteristics of Second Embodiment (12-9-1)

The compressor 300 is a compressor that compresses a mixed refrigerant containing at least 1,2-difluoroethylene, and by employing the induction motor for the compressor 270, it becomes possible to achieve high power output at a relatively low cost.

(12-9-2)

When the compressor 300, which is a rotary compressor, is used as the compressor of the air conditioner 1, the refrigerant filling amount can be made smaller compared to the case where a scroll compressor is used, making it suited for air conditioners that use flammable refrigerants.

(12-10) Modifications of Second Embodiment

Since the compressor 300 employs the motor 270, which is equivalent to the motor 70 of the first embodiment, modifications can be applied to all of those described in "(12-6) Modifications" of the first embodiment.

(12-11) Other Embodiments

The form of the compressor may be a screw compressor or a turbo compressor, as long as a motor equivalent to the motor 70 is used.

(13) EMBODIMENTS OF TECHNOLOGY OF THIRTEENTH GROUP

(13-1) First Embodiment

FIG. 13A is a configuration diagram of an air conditioner 1 according to the first embodiment of the present disclosure. In FIG. 13A, the air conditioner 1 is configured with a utilization unit 2 and a heat source unit 3.

(13-1-1) Configuration of Air Conditioner 1

The air conditioner 1 has a refrigerant circuit 11 in which a compressor 100, a four-way switching valve 16, a heat source-side heat exchanger 17, an expansion valve 18 as a decompression mechanism, and a utilization-side heat exchanger 13 are connected in an annular shape by refrigerant piping.

In the present embodiment, the refrigerant circuit 11 is filled with a refrigerant for carrying out a vapor compression type refrigeration cycle. That refrigerant is a mixed refrigerant containing 1,2-difluoroethylene, and any Refrigerant A can be used. The refrigerant circuit 11 is also filled with a refrigerator oil together with that mixed refrigerant.

(13-1-1-1) Utilization Unit 2

In the refrigerant circuit 11, the utilization-side heat exchanger 13 belongs to the utilization unit 2. Also, in the utilization unit 2, a utilization-side fan 14 is mounted. The utilization-side fan 14 generates an air flow to the utilization-side heat exchanger 13.

On the side of the utilization unit 2, a utilization-side communicator 35 and a utilization-side microcomputer 41 are mounted. The utilization-side communicator 35 is connected to the utilization-side microcomputer 41.

The utilization-side communicator 35 is used when the utilization unit 2 carries out communication with the heat source unit 3. Even during the standby period when the air conditioner 1 is not operated, the utilization-side microcomputer 41 is supplied with voltage for control, and therefore, the utilization-side microcomputer 41 is always started up.

(13-1-1-2) Heat Source Unit 3

In the refrigerant circuit 11, the compressor 100, the four-way switching valve 16, the heat source-side heat exchanger 17, and the expansion valve 18 belong to the heat source unit 3. Also, in the heat source unit 3, a heat source-side fan 19 is mounted. The heat source-side fan 19 generates an air flow to the heat source-side heat exchanger 17.

Also, on the side of the heat source unit 3, a power conversion device 30, a heat source-side communicator 36, and a heat source-side microcomputer 42 are mounted. The power conversion device 30 and the heat source-side communicator 36 are both connected to the heat source-side microcomputer 42.

The power conversion device 30 is a circuit for driving a motor 70 of the compressor 100. The heat source-side communicator 36 is used when the heat source unit 3 carries out communication with the utilization unit 2. The heat source-side microcomputer 42 controls the motor 70 of the compressor 100 via the power conversion device 30, and furthermore, it also carries out control of other equipment of the heat source unit 3 (for example, the heat source-side fan 19).

FIG. 13B is a circuit block diagram of the power conversion device 30. In FIG. 13B, the motor 70 of the compressor 100 is a three phase brushless DC motor, and comprises a stator 72 and a rotor 71. The stator 72 includes star-connected U-phase, V-phase and W-phase windings Lu, Lv and Lw, respectively. One end of each phase winding Lu, Lv, and Lw is connected to respective phase winding terminals TU, TV, and TW of the U-phase, V-phase, and W-phase wiring extending from an inverter 25, respectively. The other end of each phase winding Lu, Lv, and Lw is connected to each other as a terminal TN. Each of these phase windings Lu, Lv, Lw generates an induced voltage as the rotor 71 is rotated, depending on the rotational speed and the position of the rotor 71.

The rotor 71 contains a permanent magnet with multiple poles, composed of N pole and S pole, and is rotated around the rotation axis relative to the stator 72.

(13-1-2) Configuration of Power Conversion Device 30

The power conversion device 30 is mounted on the side of the heat source unit 3, as shown in FIG. 13A. As shown in FIG. 13B, the power conversion device 30 is constituted of a power supply circuit 20, the inverter 25, a gate drive circuit 26, and the heat source-side microcomputer 42. The power supply circuit 20 is constituted of a rectifier circuit 21 and a capacitor 22.

(13-1-2-1) Rectifier Circuit 21

The rectifier circuit 21 is configured to be in the form of a bridge with four diodes D1*a*, D1*b*, D2*a*, and D2*b*. Specifically, the diodes D1*a* and D1*b*, and D2*a* and D2*b* are connected in series to each other. The respective cathode terminals of diodes D1*a* and D2*a* are both connected to the plus-side terminal of the capacitor 22 and function as the positive-side output terminal of the rectifier circuit 21. The respective anode terminals of diodes D1*b* and D2*b* are both connected to the minus-side terminal of the capacitor 22 and function as the negative-side output terminal of the rectifier circuit 21.

The connection point of diode D1*a* and diode D1*b* is connected to one pole of an AC power source 90. The connection point of diode D2*a* and diode D2*b* is connected to the other pole of the AC power source 90. The rectifier circuit 21 rectifies the AC voltage output from the AC power source 90 to generate a DC voltage, and supplies this to the capacitor 22.

(13-1-2-2) Capacitor 22

The capacitor 22 is connected at one end to the positive-side output terminal of the rectifier circuit 21, and at the other end to the negative-side output terminal of the rectifier circuit 21. The capacitor 22 is a capacitor with a small capacity that does not have a large enough electrostatic capacity to smooth the voltage rectified by the rectifier circuit 21. Hereinafter, for the sake of convenience of description, the voltage between the terminals of the capacitor 22 is referred to as a DC bus voltage Vdc.

The DC bus voltage Vdc is applied to the inverter 25, which is connected to the output side of the capacitor 22. In other words, the rectifier circuit 21 and the capacitor 22 constitute the power supply circuit 20 for the inverter 25.

And, the capacitor 22 smooths out voltage fluctuations caused by the switching of the inverter 25. Note that, in the present embodiment, a film capacitor is employed as the capacitor 22.

(13-1-2-3) Voltage Detector 23

A voltage detector 23 is connected to the output side of the capacitor 22 and is for detecting the value of voltage between both ends of the capacitor 22, that is, DC bus voltage Vdc. The voltage detector 23 is configured such that, for example, two resistors connected in series to each other are connected in parallel to the capacitor 22 and the DC bus voltage Vdc is divided. The voltage value at the connection point between those two resistors is input to the heat source-side microcomputer 42.

(13-1-2-4) Current Detector 24

A current detector 24 is connected between the capacitor 22 and the inverter 25, and on the side of the negative-side output terminal of the capacitor 22. The current detector 24 detects the motor current flowing through the motor 70 after starting up the motor 70, as the total value of electric currents for three phases.

The current detector 24 may be constituted of, for example, an amplifier circuit using a shunt resistor and an operational amplifier that amplifies the voltage between both ends of the resistor. The motor current detected by the current detector 24 is input to the heat source-side microcomputer 42.

(13-1-2-5) Inverter 25

As for the inverter 25, three vertical arms corresponding to the respective phase windings Lu, Lv, and Lw of the U-phase, V-phase, and W-phase of the motor 70 are connected in parallel to each other and to the output side of the capacitor 22.

In FIG. 13B, the inverter 25 includes multiple IGBTs (insulated gate bipolar transistors, hereinafter simply referred to as transistors) Q3*a*, Q3*b*, Q4*a*, Q4*b*, Q5*a*, and Q5*b*, and multiple diodes for reflux D3*a*, D3*b*, D4*a*, D4*b*, D5*a*, and D5*b*.

The transistors Q3*a* and Q3*b*, Q4*a* and Q4*b*, and Q5*a* and Q5*b* are connected in series to each other to constitute the respective vertical arms, and from each of the connection points NU, NV, and NW formed by them, output lines extend toward the respective phase windings Lu, Lv, and Lw of the corresponding phases.

Each diode D3*a* to D5*b* is connected in parallel to each transistor Q3*a* to Q5*b* such that the collector terminal of the transistor is connected to the cathode terminal of the diode, and the emitter terminal of the transistor is connected to the anode terminal of the diode. These transistors and diodes, respectively connected in parallel, constitute switching elements.

By applying the DC bus voltage Vdc from the capacitor 22 to the inverter 25, and by turning on and off each of the transistors Q3*a* to Q5*b* at the timing indicated by the gate drive circuit 26, drive voltages SU, SV, and SW to drive the motor 70 are generated. These drive voltages SU, SV, and SW are output from the respective connection points NU, NV, and NW of the transistors Q3*a* and Q3*b*, Q4*a* and Q4*b*, and Q5*a* and Q5*b* to the respective phase windings Lu, Lv, and Lw of the motor 70.

(13-1-2-6) Gate Drive Circuit 26

The gate drive circuit 26 changes the on and off states of each of the transistors Q3*a* to Q5*b* of the inverter 25 based on the command voltage from the heat source-side microcomputer 42. Specifically, the gate drive circuit 26 generates gate control voltages Gu, Gx, Gv, Gy, Gw, and Gz to be applied to the gate of each transistor Q3*a* to Q5*b* such that pulsed drive voltages SU, SV, and SW having duties determined by the heat source-side microcomputer 42 are output from the inverter 25 to the motor 70. The generated gate control voltages Gu, Gx, Gv, Gy, Gw, and Gz are applied to the gate terminals of the respective transistors Q3*a* to Q5*b*.

(13-1-2-8) Heat Source-Side Microcomputer 42

The heat source-side microcomputer 42 is connected to the voltage detector 23, the current detector 24, and the gate drive circuit 26. In the present embodiment, the heat source-side microcomputer 42 drives the motor 70 in a rotor position sensorless scheme. Note that, since this drive is not limited to the rotor position sensorless scheme, it may also be carried out by a sensor scheme.

The rotor position sensorless scheme is a scheme in which the motor is driven by carrying out estimation of the rotor position and the number of rotations, PI control for the number of rotations, PI control for the motor current, and the like, using various parameters that indicate the characteristics of the motor 70, the detection results of the voltage detector 23 after starting up the motor 70, the detection results of the current detector 24, and a predetermined mathematical model for the control of the motor 70, and the like. Examples of the various parameters that indicate the characteristics of the motor 70 include the winding resistance, inductance component, induced voltage, and number of poles of the motor 70 to be used. Note that, since there are many patent literatures about the rotor position sensorless control, reference should be made to them for details (for example, Japanese Patent Laid-Open No. 2013-17289).

(13-1-3) Characteristics of First Embodiment (13-1-3-1)

In the air conditioner 1 using a mixed refrigerant containing at least 1,2-difluoroethylene, the number of rotations of the motor 70 can be changed through the power conversion device 30, if required. In other words, the number of motor rotations of the compressor 100 can be changed depending on the air conditioning load, which makes it possible to realize a high annual performance factor (APF).

(13-1-3-2)

Also, no electrolytic capacitor is required on the output side of the rectifier circuit 21, thereby suppressing increase in size and increase in cost of the circuit.

(13-1-4) Modification of First Embodiment

FIG. 13C is a circuit block diagram of a power conversion device 130 in the modification of the first embodiment. In FIG. 13C, the difference between the present modification and the above first embodiment is that a rectifier circuit 121 for three phases is employed instead of the rectifier circuit 21 for a single phase so as to be able to support a three phase AC power source 190 instead of the single phase AC power source 90.

The rectifier circuit 121 is configured to be in the form of a bridge with six diodes D0*a*, D0*b*, D1*a*, D1*b*, D2*a*, and D2*b*. Specifically, the diodes D0*a* and D0*b*, diodes D1*a* and D1*b*, and diodes D2*a* and D2*b* are connected in series to each other.

The respective cathode terminals of diodes D0*a*, D1*a*, and D2*a* are all connected to the plus-side terminal of the capacitor 22 and function as the positive-side output terminal of the rectifier circuit 121. The respective anode terminals of diodes D0*b*, D1*b*, and D2*b* are both connected to the minus-side terminal of the capacitor 22 and function as the negative-side output terminal of the rectifier circuit 121.

The connection point of diode D0*a* and diode D0*b* is connected to the output side of R-phase of the AC power source 190. The connection point of diode D1*a* and diode D1*b* is connected to the output side of S-phase of the AC power source 190. The connection point of diode D2*a* and diode D2*b* is connected to the output side of T-phase of the AC power source 190. The rectifier circuit 121 rectifies the AC voltage output from the AC power source 190 to generate a DC voltage, and supplies this to the capacitor 22.

Note that, since the other configurations are the same as in the above embodiment, description will be omitted.

(13-1-5) Characteristics of Modification of First Embodiment (13-1-5-1)

In the air conditioner 1 using a mixed refrigerant containing at least 1,2-difluoroethylene, the number of rotations of the motor 70 can be changed through the power conversion device 130, if required. In other words, the number of motor rotations of the compressor 100 can be changed depending on the air conditioning load, which makes it possible to realize a high annual performance factor (APF).

(13-1-5-2)

Also, no electrolytic capacitor is required on the output side of the rectifier circuit 121, thereby suppressing increase in size and increase in cost of the circuit.

(13-2) Second Embodiment

FIG. 13D is a circuit block diagram of a power conversion device 30B mounted in an air conditioner according to the second embodiment of the present disclosure.

(13-2-1) Configuration of Power Conversion Device 30B

In FIG. 13D, the power conversion device 30B is an indirect matrix converter. The differences from the power conversion device 30 of the first embodiment in FIG. 13B is that a converter 27 is employed instead of the rectifier circuit 21 and that a gate drive circuit 28 and a reactor 33 are newly added, and other than these, it is the same as the first embodiment.

Here, the converter 27, the gate drive circuit 28, and the reactor 33 will be described, and description will be omitted for the other configurations.

(13-2-1-1) Converter 27

In FIG. 13D, the converter 27 includes multiple IGBTs (insulated gate bipolar transistors, hereinafter simply referred to as transistors) Q1*a*, Q1*b*, Q2*a*, and Q2*b*, and multiple diodes D1*a*, D1*b*, D2*a*, and D2*b*.

The transistors Q1*a* and Q1*b* are connected in series to each other to constitute a vertical arm, and the connection point formed by them is connected to one pole of the AC power source 90. The transistors Q2*a* and Q2*b* are connected in series to each other to constitute a vertical arm, and the connection point formed by them is connected to the other pole of the AC power source 90.

Each diode D1*a* to D2*b* is connected in parallel to each transistor Q1*a* to Q2*b* such that the collector terminal of the transistor is connected to the cathode terminal of the diode, and the emitter terminal of the transistor is connected to the anode terminal of the diode. These transistors and diodes, respectively connected in parallel, constitute switching elements.

In the converter 27, each transistor Q1*a* to Q2*b* is turned on and off at the timing indicated by the gate drive circuit 28.

(13-2-1-2) Gate Drive Circuit 28

The gate drive circuit 28 changes the on and off states of each of the transistors Q1*a* to Q2*b* of the converter 27 based on the command voltage from the heat source-side microcomputer 42. Specifically, the gate drive circuit 28 generates pulsed gate control voltages Pq, Pr, Ps, and Pt having duties determined by the heat source-side microcomputer 42 so as to control the electric current flowing from the AC power source 90 to the heat source side to a predetermined value. The generated gate control voltages Pq, Pr, Ps, and Pt are applied to the gate terminals of the respective transistors Q1*a* to Q2*b*.

(13-2-1-3) Reactor 33

The reactor 33 is connected in series to the AC power source 90 between the AC power source 90 and the converter 27. Specifically, its one end is connected to one pole of the AC power-source 90, and the other end is connected to one input end of the converter 27.

(13-2-2) Motion

The heat source-side microcomputer 42 turns on and off the transistors Q1*a* and Q1*b* or the transistors Q2*a* and Q2*b* of the vertical arms of the converter 27 to short-circuit and open them for a predetermined period of time and controls the electric current in an approximately sinusoidal manner, for example, thereby carrying out improvement of the power input power factor and suppression of harmonic components.

Also, the heat source-side microcomputer 42 carries out cooperative control between the converter and the inverter, such as controlling the short circuit period based on the duty ratio of the gate control voltage that controls the inverter 25.

(13-2-3) Characteristics of Second Embodiment

The air conditioner 1 is highly efficient and also does not require an electrolytic capacitor at the output side of the converter 27, thereby suppressing increase in size and increase in cost of the circuit.

(13-2-4) Configuration of Power Conversion Device 130B in Modification of Second Embodiment FIG. 13E is a circuit block diagram of a power conversion device 130B in the modification of the second embodiment. In FIG. 13E, a difference between the present modification and the above second embodiment is that a converter 127 for three phases is employed instead of the converter 27 for a single phase so as to be able to support a three phase AC power source 190 instead of the single phase AC power source 90. Also, another difference is that a gate drive circuit 128 is employed instead of the gate drive circuit 28 along with the change from the converter 27 for a single phase to the converter 127 for three phases. Furthermore, the reactor 33 is connected between the output side of each phase and the converter 127. Note that, although capacitors are connected between the input side terminals of the reactor 33, they can be removed as well.

(13-2-4-1) Converter 127

The converter 127 includes multiple IGBTs (insulated gate bipolar transistors, hereinafter simply referred to as transistors) Q0*a*, Q0*b*, Q1*a*, Q1*b*, Q2*a*, and Q2*b*, and multiple diodes D0*a*, D0*b*, D1*a*, D1*b*, D2*a*, and D2*b*.

The transistors Q0*a* and Q0*b* are connected in series to each other to constitute a vertical arm, and the connection point formed by them is connected to the output side of R-phase of the AC power source 190. The transistors Q1*a* and Q1*b* are connected in series to each other to constitute a vertical arm, and the connection point formed by them is connected to the output side of S-phase of the AC power source 190. The transistors Q2*a* and Q2*b* are connected in series to each other to constitute a vertical arm, and the connection point formed by them is connected to the output side of T-phase of the AC power source 190.

Each diode D0*a* to D2*b* is connected in parallel to each transistor Q0*a* to Q2*b* such that the collector terminal of the transistor is connected to the cathode terminal of the diode, and the emitter terminal of the transistor is connected to the anode terminal of the diode. These transistors and diodes, respectively connected in parallel, constitute switching elements.

In the converter 127, each transistor Q1*a* to Q2*b* is turned on and off at the timing indicated by the gate drive circuit 128.

(13-2-4-2) Gate Drive Circuit 128

The gate drive circuit 128 changes the on and off states of each of the transistors Q0*a* to Q2*b* of the converter 127 based on the command voltage from the heat source-side microcomputer 42. Specifically, the gate drive circuit 128 generates pulsed gate control voltages Po, Pp, Pq, Pr, Ps, and Pt having duties determined by the heat source-side microcomputer 42 so as to control the electric current flowing from the AC power source 190 to the heat source side to a predetermined value. The generated gate control voltages Po, Pp, Pq, Pr, Ps, and Pt are applied to the gate terminals of the respective transistors Q0*a* to Q2*b*.

(13-2-5) Characteristics of Modification of Second Embodiment

The air conditioner 1 is highly efficient and also does not require an electrolytic capacitor at the output side of the converter 127, thereby suppressing increase in size and increase in cost of the circuit.

(13-3) Third Embodiment

FIG. 13F is a circuit block diagram of a power conversion device 30C mounted in an air conditioner according to the third embodiment of the present disclosure.

(13-3-1) Configuration of Power Conversion Device 30C in Third Embodiment In FIG. 13F, the power conversion device 30C is a matrix converter 29.

(13-3-1-1) Configuration of Matrix Converter 29

The matrix converter 29 is configured by connecting bidirectional switches S1*a*, S2*a*, and S3*a* to one end of the input from an AC power source 90, and by connecting bidirectional switches S1*b*, S2*b*, and S3*b* to the other end.

To the intermediate end of the bidirectional switch Sla and the bidirectional switch S1*b*, which are connected in series, one end of a U-phase winding Lu among three phase windings of a motor 70 is connected. Also, to the intermediate end of the bidirectional switch S2*a* and the bidirectional switch S2*b*, which are connected in series, one end of a V-phase winding Lv among three phase windings of the motor 70 is connected. In addition, to the intermediate end of the bidirectional switch S3*a* and the bidirectional switch S3*b*, which are connected in series, one end of a W-phase winding Lw among three phase windings of the motor 70 is connected.

The AC power input from the AC power source 90 is converted to an AC of a predetermined frequency by switching with the bidirectional switches Sla to S3*b*, and can drive the motor 70.

(13-3-1-2) Configuration of Bidirectional Switch

FIG. 13G is a circuit diagram conceptually showing a bidirectional switch. In FIG. 13G, the bidirectional switch has transistors Q61 and Q62, diodes D61 and D62, and terminals Ta and Tb. The transistors Q61 and Q62 are IGBTs (insulated gate bipolar transistors).

In the transistor Q61, the emitter E is connected to the terminal Ta, and the collector C is connected to the terminal Tb via the diode D61. To this collector C, the cathode of the diode D61 is connected.

In the transistor Q62, the emitter E is connected to the terminal Tb, and the collector C is connected to the terminal Ta via the diode D62. To this collector C, the cathode of the diode D62 is connected. The terminal Ta is connected to the input side, and the terminal Tb is connected to the output side.

By turning on the transistor Q61 and turning off the transistor Q62, electric current is allowed to flow from the terminal Tb to the terminal Ta through the diode D61 and the transistor Q61 in this order. At this time, a flow of electric current from the terminal Ta to the terminal Tb (countercurrent) is rejected by the diode D61.

On the other hand, by turning off the transistor Q61 and turning on the transistor Q62, electric current is allowed to flow from the terminal Ta to the terminal Tb through the diode D62 and the transistor Q62 in this order. At this time, a flow of electric current from the terminal Tb to the terminal Ta (countercurrent) is rejected by the diode D62.

(13-3-2) Motion

FIG. 13H is a circuit diagram showing one example of electric current direction of the matrix converter 29. The figure shows one example of route of electric current flowing from the AC power source 90 through the matrix converter 29 to the motor 70. Electric current flows from one pole of the AC power source 90, through the bidirectional switch Sla, through the U-phase winding Lu, which is one of the three phase windings of the motor 70, through the W-phase winding Lw, through the bidirectional switch S3*b*, and to the other pole of the AC power source 90. As a result, electric power is supplied to the motor 70, and the motor 70 is driven.

FIG. 13I is a circuit diagram showing another example of electric current direction of the matrix converter 29. In FIG. 13I, electric current flows from one pole of the AC power source 90, through the bidirectional switch S3*a*, through the W-phase winding Lw, which is one of the three phase windings of the motor 70, through the U-phase winding Lu, through the bidirectional switch S1*b*, and to the other pole of the AC power source 90. As a result, electric power is supplied to the motor 70, and the motor 70 is driven.

(13-3-3) Characteristics of Third Embodiment

The air conditioner 1 is highly efficient and also does not require an electrolytic capacitor at the output side of the matrix converter 29, thereby suppressing increase in size and increase in cost of the circuit.

(13-3-4) Configuration of Power Conversion Device 130C in Modification of Third Embodiment FIG. 13J is a circuit block diagram of a power conversion device 130C in the modification of the third embodiment. In FIG. 13J, a difference between the present modification and the above third embodiment is that a matrix converter 129 for three phases is employed instead of the matrix converter 29 for a single phase so as to be able to support a three phase AC power source 190 instead of the single phase AC power source 90.

(13-3-4-1) Configuration of Matrix Converter 129

Also, another difference is that a gate drive circuit 131 is employed instead of the gate drive circuit 31 along with the change from the matrix converter 29 for a single phase to the matrix converter 129 for three phases. Furthermore, reactors L1, L2, and L3 are connected between the output side of each phase and the matrix converter 129.

A predetermined three phase AC voltage obtained by conversion with the bidirectional switches Sla to S3*c* is supplied to the motor 70 via the respective phase winding terminals TU, TV, and TW. Each of the reactors L1, L2, and L3 is connected to the respective input terminals. Each capacitor C1, C2, and C3 is connected to each other at one end and to the output terminals at the other end.

In the power conversion device 130C, by short-circuiting the reactors L1, L2, and L3 via the matrix converter 129, the energy supplied from the three phase AC power source 190 can be accumulated in the reactors L1, L2, and L3, and the voltage between both ends of the capacitors C1, C2, and C3 can be boosted. Therefore, the voltage utilization factor can be made to be 1 or more.

At this time, voltage-type three phase AC voltages Vr, Vs, and Vt are input to the input terminals of the matrix converter 129, and current-type three phase AC voltages Vu, Vv, and Vw are output from the output terminals.

In addition, since each of the capacitors C1, C2, and C3 constitutes an LC filter with the reactors L1, L2, and L3, high frequency components included in the voltage output to the output terminals can be reduced, and pulsation components of the torque occurring in the motor 70 and noise can be reduced.

Furthermore, compared to an AC-AC conversion circuit using a rectifier circuit and an inverter, the number of switching elements may be fewer, and the losses occurring in the power conversion device 130C can be reduced.

(13-3-4-2) Configuration of Clamp Circuit 133

Also, in the power conversion device 30, since a clamp circuit 133 is connected between the input terminals and the output terminals, the surge voltage occurring between the input terminals of the matrix converter 129 and the output terminals due to the switching of the bidirectional switches Sla to S3*b* can be absorbed by a capacitor in the clamp circuit 133 (see FIG. 13I).

FIG. 13K is a circuit diagram of the clamp circuit 133. In FIG. 13I, the clamp circuit 133 has diodes D31*a* to D36*b*, a capacitor C21, and terminals 135 to 140.

To the terminal 135, the anode of the diode D31*a* and the cathode of the diode D31*b* are connected. To the terminal 136, the anode of the diode D32*a* and the cathode of the diode D32*b* are connected. To the terminal 137, the anode of the diode D33*a* and the cathode of the diode D33*b* are connected.

The cathode of each diode D31*a*, D32*a*, or D33*a* is connected to one end of the capacitor C37, and the anode of each diode D31*b*, D32*b*, or D33*b* is connected to the other end of the capacitor C37.

To the terminal 138, the anode of the diode D34*a* and the cathode of the diode D34*b* are connected. To the terminal 139, the anode of the diode D35*a* and the cathode of the diode D35*b* are connected. To the terminal 140, the anode of the diode D36*a* and the cathode of the diode D36*b* are connected.

The cathode of each diode D34*a*, D35*a*, or D36*a* is connected to one end of the capacitor C37, and the anode of each diode D34*b*, D35*b*, or D36*b* is connected to the other end of the capacitor C37.

Each terminal 135, 136, or 137 is connected to the input side of the matrix converter 129, and terminals 138, 139, and 140 are connected to the output side of the matrix converter 129. Since the clamp circuit 133 is connected between the input terminals and the output terminals, with the clamp circuit 133, the surge voltage occurring between the input terminals of the matrix converter 129 and the output terminals due to the switching of the bidirectional switches Sla to S3*b* can be absorbed by the capacitor C37 in the clamp circuit 133.

As described above, since the power conversion device 130C can supply a voltage greater than the power supply voltage to the motor 70, a predetermined motor output can be obtained even when the electric current flowing through the power conversion device 130C and the motor 70 is small, and in other words, since the electrical current may be small, the losses occurring in the power conversion device 130C and the motor 70 can be reduced.

(13-3-5) Characteristics of Modification of Third Embodiment

The air conditioner 1 is highly efficient and also does not require an electrolytic capacitor at the output side of the matrix converter 129, thereby suppressing increase in size and increase in cost of the circuit.

(13-4) Others (13-4-1)

For the compressor 100 of the air conditioner 1, any of a scroll compressor, a rotary compressor, a turbo compressor, and a screw compressor are employed.

(13-4-2)

The motor 70 of the compressor 100 is a permanent magnet synchronous motor having the rotor 71 containing permanent magnets.

(14) EMBODIMENTS OF TECHNOLOGY OF FOURTEENTH GROUP (14-1)

FIG. 14A is a configuration diagram of an air conditioner 1 according to one embodiment of the present disclosure. In FIG. 14A, the air conditioner 1 is configured with a utilization unit 2 and a heat source unit 3.

(14-1-1) Configuration of Air Conditioner 1

The air conditioner 1 has a refrigerant circuit 11 in which a compressor 100, a four-way switching valve 16, a heat source-side heat exchanger 17, an expansion valve 18 as a decompression mechanism, and a utilization-side heat exchanger 13 are connected in an annular shape by refrigerant piping.

In the present embodiment, the refrigerant circuit 11 is filled with a refrigerant for carrying out a vapor compression type refrigeration cycle. That refrigerant is a mixed refrigerant containing 1,2-difluoroethylene, and any Refrigerant A can be used. The refrigerant circuit 11 is also filled with a refrigerator oil together with that mixed refrigerant.

(14-1-1-1) Utilization Unit 2

In the refrigerant circuit 11, the utilization-side heat exchanger 13 belongs to the utilization unit 2. Also, in the utilization unit 2, a utilization-side fan 14 is mounted. The utilization-side fan 14 generates an air flow to the utilization-side heat exchanger 13.

On the side of the utilization unit 2, a utilization-side communicator 35 and a utilization-side microcomputer 41 are mounted. The utilization-side communicator 35 is connected to the utilization-side microcomputer 41.

The utilization-side communicator 35 is used when the utilization unit 2 carries out communication with the heat source unit 3. Even during the standby period when the air conditioner 1 is not operated, the utilization-side microcomputer 41 is supplied with voltage for control, and therefore, the utilization-side microcomputer 41 is always started up.

(14-1-1-2) Heat Source Unit 3

In the refrigerant circuit 11, the compressor 100, the four-way switching valve 16, the heat source-side heat exchanger 17, and the expansion valve 18 belong to the heat source unit 3. Also, in the heat source unit 3, a heat source-side fan 19 is mounted. The heat source-side fan 19 generates an air flow to the heat source-side heat exchanger 17.

Also, on the side of the heat source unit 3, a connection section 30, a heat source-side communicator 36, and a heat source-side microcomputer 42 are mounted. The connection section 30 and the heat source-side communicator 36 are both connected to the heat source-side microcomputer 42.

(14-1-2) Configuration of Connection Section 30

FIG. 14B is an operation circuit diagram of a motor 70 of the compressor 100. In FIG. 14B, the connection section 30 is a circuit that supplies electric power from an AC power source 90 to the motor 70 of the compressor 100 without frequency conversion.

The motor 70 is an induction motor and includes a cage rotor 71 and a stator 72 having a main winding 727 and an auxiliary winding 728. The cage rotor 71 is rotated following the rotating magnetic field generated by the stator 72.

The compressor 100 has an M terminal, an S terminal, and a C terminal. The M terminal and the C terminal are linked to each other by the main winding 727. The S terminal and the M terminal are linked to each other by the auxiliary winding 728.

The AC power source 90 and the compressor 100 are linked by power source lines 901 and 902, which supply an AC voltage to the compressor 100. The power source line 901 is connected to the C terminal via a thermostat 26.

The thermostat 26 detects the temperature in a room where the air conditioner 1 is installed, and opens the contact point when the room temperature is within the preset temperature range, and closes the contact point when the room temperature is outside the preset temperature range.

The power source line 902 is divided into a first branch line 902A and a second branch line 902B in the middle, and the first branch line 902A is connected to the M terminal, while the second branch line 902B is connected to the S terminal via a starting circuit 20.

The starting circuit 20 is a circuit in which a positive coefficient thermistor 21 and an operation capacitor 22 are connected in parallel.

In the present embodiment, the thermostat 26 connected to the power source line 901 and the starting circuit 20 connected to the power source line 902 are referred to as the connection section 30.

(14-1-3) Motion

In the operation circuit of the compressor 100 configured as described above, when the AC power source 90 is launched, electric current flows through the auxiliary winding 728 via the positive coefficient thermistor 21, and the motor 70 is started.

After starting up the motor 70, the positive coefficient thermistor 21 heats itself up by the electric current flowing through it, and increases its resistance value. As a result, instead of the positive coefficient thermistor 21, the operation capacitor 22 and the auxiliary winding 728 come into a state where they are connected, shifting to stable motion.

(14-1-4) Characteristics (14-1-4-1)

In the air conditioner 1 in which the mixed refrigerant containing at least 1,2-difluoroethylene is used, the compressor 100 can be driven without an intervening power conversion device between the AC power source 90 and the motor 70, which makes it possible to provide the air conditioner 1 with consideration for environmental protection in a relatively inexpensive configuration.

(14-1-4-2)

In the air conditioner 1 in which the mixed refrigerant containing at least 1,2-difluoroethylene is used, by connecting the starting circuit 20, which is a parallel circuit of the positive coefficient thermistor 21 and the operation capacitor 22, to the auxiliary winding 728, the starting torque of the motor 70 of the compressor 100 can be made large.

After starting up the compressor 100, the positive coefficient thermistor 21 heats itself up and increases its resistance value, substantially switching to a state where the operation capacitor 22 and the auxiliary winding 728 are connected, and the compressor 100 is operated at a constant number of rotations (power supply frequency), and thus is in a state where it can output a rated torque. As described above, in the air conditioner 1, connection switching to the operation capacitor 22 is performed in a timely manner, which enables the compressor 100 to be made highly efficient.

(14-1-4-3)

The motor 70 is an induction motor, and it is relatively low cost and capable of high power output, making it possible to increase the efficiency of the air conditioner 1.

(14-1-5) Modification

FIG. 14C is an operation circuit diagram of a motor 170 of a compressor 200 in an air conditioner 1 according to the modification. In FIG. 14C, the motor 170 is a three phase induction motor and is connected to a three phase AC power source 190 via a connection section 130.

The connection section 130 is a relay having contact points 130*u*, 130*v*, and 130*w*. The contact point 130*u* opens and closes a power source line 903 between an R terminal of the three phase AC power source 190 and a U-phase winding Lu of the motor 170. The contact point 130*v* opens and closes a power source line 904 between an S terminal of the three phase AC power source 190 and a V-phase winding Lv of the motor 170. The contact point 130*w* opens and closes a power source line 905 between a T terminal of the three phase AC power source 190 and a W-phase winding Lw of the motor 170.

And, AC voltages are supplied from the R terminal, S terminal, and T terminal of the three phase AC power source 190 to the corresponding U-phase winding Lu, V-phase winding Lv, and W-phase winding Lw of the motor 170. The AC voltage supplied to the V-phase winding Lv of the motor 170 is shifted by 120° in phase relative to the AC voltage supplied to the U-phase winding Lu. Also, the AC voltage supplied to the W-phase winding Lw of the motor 170 is shifted by 120° in phase relative to the AC voltage supplied to the V-phase winding Lv.

Accordingly, just by supplying the AC voltages from the three phase AC power source 190 to the motor 170, a rotating magnetic field is generated in the stator 172, and the rotor 171 follows that rotating magnetic field and is rotated. As a result, the compressor 200 is operated at a constant number of rotations (power supply frequency). Therefore, the operation circuit of the motor 170 does not require the starting circuit 20 as in the above embodiment, but only the relay circuit of the connection section 130.

(14-1-5) Characteristics of Modification (14-1-5-1)

In the air conditioner 1 in which the mixed refrigerant containing at least 1,2-difluoroethylene is used, the compressor 200 can be driven without an intervening power conversion device between the three phase AC power source 190 and the motor 170, which makes it possible to provide the air conditioner 1 with consideration for environmental protection in a relatively inexpensive configuration.

(14-1-5-2)

The motor 170 is an induction motor, and it is relatively low cost and capable of high power output, making it possible to increase the efficiency of the air conditioner 1.

(15) EMBODIMENTS OF TECHNOLOGY OF FIFTEENTH GROUP

(15-1) First Embodiment

A hot water supply system 1, which is a warm water production device according to the first embodiment, comprises a heat pump 2, a hot water storage unit 3, a controller 50 for managing and controlling them, a remote control 90 for displaying information to users and accepting user manipulations, and the like, as shown in FIG. 15A to FIG. 15C.

(15-1-1) Heat Pump

The heat pump 2 is a unit that functions as a heat source device for heating water, and comprises a refrigerant circuit 20 in which a refrigerant is circulated, a blowing fan 24F, various sensors, and the like. In the present embodiment, the refrigerant circuit 20 is filled with a refrigerant for carrying out a vapor compression type refrigeration cycle. That refrigerant is a mixed refrigerant containing 1,2-difluoroethylene, and any Refrigerant A can be used.

The refrigerant circuit 20 is constituted of a compressor 21, a water heat exchanger 22 on the utilization side, an electric expansion valve 23, an air heat exchanger 24 on the heat source side, refrigerant piping 25, and the like.

The compressor 21 is an inverter-type, variable output electric compressor.

The water heat exchanger 22 functions as a heat exchanger on the utilization side, utilizing the heat of the refrigerant, and has a refrigerant pipe 22*r* and a water pipe 32*w*. The water heat exchanger 22 causes heat exchange between a high-temperature, high-pressure gas refrigerant that has been discharged by the compressor 21 of the heat pump 2 and then flows through the refrigerant pipe 22*r*, and circulating water that has flowed from the hot water storage unit 3, which will be mentioned later, and flows through the water pipe 32*w*. This heat exchange in the water heat exchanger 22 cools the refrigerant passing through the refrigerant pipe 22*r* and simultaneously heats the water passing through the water pipe 32*w* to produce hot water (water at a high temperature=warm water).

The electric expansion valve 23 expands a low-temperature, high-pressure refrigerant that has exited the compressor 21 and been cooled by the heat exchange with water.

The air heat exchanger 24 functions as a heat exchanger on the heat source side, removing heat from the outside air, and causes heat exchange between a low-temperature, low-pressure refrigerant in a two phase state that has been expanded by the electric expansion valve 23 and the outside air. The refrigerant that has absorbed heat from the outside air is evaporated to become a low-pressure gas refrigerant, which is then inhaled into the compressor 21.

The refrigerant piping 25 connects each equipment in the following order: the discharge hole of the compressor 21, the refrigerant pipe 22*r* in the water heat exchanger 22, the electric expansion valve 23, the air heat exchanger 24, and the inlet of the compressor 21.

As the various sensors, for example, sensors that detect the temperature and pressure with respect to the refrigerant are provided. Among these sensors, FIG. 15B shows a heat exchanger inlet water temperature sensor 31T and a heat exchanger outlet water temperature sensor 32T. The heat exchanger inlet water temperature sensor 31T detects the temperature of water before entering the water heat exchanger 22. That is, the heat exchanger inlet water temperature sensor 31T detects the temperature of water before passing through the water heat exchanger 22. The heat exchanger outlet water temperature sensor 32T detects the temperature of water that has passed through the water heat exchanger 22.

(15-1-2) Hot Water Storage Unit

The hot water storage unit 3 is a unit that sends water supplied from outside, such as city water (tap water), to the heat pump 2 to be heated, and stores the water (hot water) returned from the heat pump 2. Also, the hot water storage unit 3 has a function of sending hot water, whose temperature has been adjusted by a combustion heating device 4 or a mixing valve 77, to a hot water supply section 82 such that hot water at a temperature set by the user is supplied.

The hot water storage unit 3 comprises a water intake section 81, the hot water supply section 82, a hot water storage tank 35, circulating water piping 30, water intake and hot water supply piping 70, the combustion heating device 4, and the like.

(15-1-2-1) Water Intake Section and Hot Water Supply Section

The water intake section 81 has a connection hole, to which a supply pipe 89*a* of city water (tap water) is connected.

The hot water supply section 82 has a connection hole, to which in-building piping 99*a* is connected for water supply and hot water supply, extending from a faucet 99 or the like in a building, which is the installation target.

(15-1-2-2) Hot Water Storage Tank

The hot water storage tank 35 is a tank in which water (hot water) that has been heated by the heat pump 2 is stored in advance even before the user turns the faucet 99 for utilization. The hot water storage tank 35 is always filled with water. And, the hot water storage tank 35 is provided with tank temperature distribution detection sensors to allow the controller 50 to grasp the amount of water at a predetermined temperature or higher, here, a high temperature of 70° C. or higher (hereinafter, referred to as high-temperature water). The tank temperature distribution detection sensors are configured with the following six sensors in order from the bottom to the top of the hot water storage tank 35: a first sensor T1, a second sensor T2, a third sensor T3, a fourth sensor T4, a fifth sensor T5, and a sixth sensor T6. The controller 50 drives the heat pump 2 to carry out boiling operation based on the water temperature at the respective positions with heights in the hot water storage tank 35 detected by these tank temperature distribution detection sensors T1 to T6 and the settings made by the remote control 90. The boiling operation is operation in which the amount of heat in the water is increased until the temperature of the water in the hot water storage tank 35 reaches the target temperature. The target temperature in the boiling operation, that is, the target hot water storage temperature of the water in the hot water storage tank 35, is set in advance, for example, at the production plant of the hot water supply system 1. In the present embodiment, the target hot water storage temperature is 75° C.

Note that, when the temperature detection value of the sixth sensor T6 is below 70° C., the amount of remaining hot water is 0, and when the temperature detection value of the sixth sensor T6 is 70° C. or higher, the amount of remaining hot water is 1. Furthermore, when the temperature detection value of the fifth sensor T5 is also 70° C. or higher, the amount of remaining hot water is 2. Similarly, the amount of remaining hot water can be up to 3, 4, 5, and 6, and when the temperature detection value of the first sensor T1 is also 70° C. or higher, the amount of remaining hot water is the maximum of 6.

(15-1-2-3) Circulating Water Piping

The circulating water piping 30 is a circuit for transferring heat obtained by the heat pump 2 to the water in the hot water storage tank 35, and has a forward pipe 31, the water pipe 32*w* in the water heat exchanger 22, a return pipe 33, and a pump for circulation 34. The forward pipe 31 connects the vicinity of the lower end of the hot water storage tank 35 to the upstream-side end of the water pipe 32*w* in the water heat exchanger 22. The return pipe 33 connects the downstream-side end of the water pipe 32*w* in the water heat exchanger 22 to the vicinity of the upper end of the hot water storage tank 35. The pump for circulation 34 is provided in the middle of the forward pipe 31. The pump for circulation 34 is an electric pump whose output can be adjusted, and it plays a role of circulating water between the hot water storage tank 35 and the water heat exchanger 22. Specifically, in the circulating water piping 30, when the pump for circulation 34 is driven in response to a command from the controller 50, among the water in the hot water storage tank 35, low-temperature water existing at the bottom flows out to the forward pipe 31, rises in temperature by passing through the water pipe 32*w* in the water heat exchanger 22, and returns through the return pipe 33 to the vicinity of the upper end of the hot water storage tank 35. This causes the boundary between the high-temperature water and the water at a lower temperature in the hot water storage tank 35 to move from top to bottom, thus increasing the amount of high-temperature water in the storage tank 35.

(15-1-2-4) Water Intake and Hot Water Supply Piping, and Combustion Heating Device The water intake and hot water supply piping 70 is a circuit for utilizing the high-temperature water stored in the hot water storage tank 35 while receiving supply of water from external city water or the like, and has a water intake pipe 71, a hot water supply pipe 73, a bypass pipe 74, and the mixing valve 77.

The water intake pipe 71 receives supply of water from external city water or the like, and supplies water at ordinary temperature to the vicinity of the lower end of the hot water storage tank 35. The water intake pipe 71 is provided with a water intake temperature sensor 71T for detecting the temperature of water supplied by city water.

The hot water supply pipe 73 leads, among the water stored in the hot water storage tank 35, water at a high temperature existing in the vicinity of the upper end, from the hot water supply section 82 to the in-building piping 99*a* extending from the utilization location by the user, such as the faucet 99 in the building.

The combustion heating device 4 is deployed in the middle of the hot water supply pipe 73. The combustion heating device 4 is arranged between the hot water storage tank 35 and the mixing valve 77, and comprises a combustion burner 41 that combusts fuel gas. The combustion burner 41 is a gas burner whose heating capacity can be adjusted, and it heats water flowing through the hot water supply pipe 73 while adjusting the heating amount depending on a command from the controller 50.

Also, a premixing hot water temperature sensor 4T is provided between the combustion heating device 4 and the mixing valve 77 in the hot water supply pipe 73 for detecting the temperature of water passing therethrough.

The bypass pipe 74 is piping for mixing the water at ordinary temperature flowing through the water intake pipe 71 and the water (hot water) that has flowed through the hot water supply pipe 73. The bypass pipe 74 extends from the water intake pipe 71 to the hot water supply pipe 73, and is connected to the hot water supply pipe 73 by the mixing valve 77.

The mixing valve 77 is an adjustment valve for regulating the mixing ratio of the water at a high temperature (hot water) that has flowed through the hot water supply pipe 73 and the water at ordinary temperature that has flowed through the bypass pipe 74 in response to a command from the controller 50.

(15-1-3) Controller and Remote Control

The controller 50 is installed inside the hot water storage unit 3, and it is connected to the actuators such as the compressor 21, the electric expansion valve 23, the blowing fan 24F, the mixing valve 77, the combustion burner 41, and the pump for circulation 34 and sends motion instructions to these actuators. Also, the controller 50 is connected to sensors such as the heat exchanger inlet water temperature sensor 31T, the heat exchanger outlet water temperature sensor 32T, the tank temperature distribution detection sensors T1 to T6, the water intake temperature sensor 71T, and the premixing hot water temperature sensor 4T, and acquires detection results from these sensors. Furthermore, the controller 50 is connected to the remote control 90 for accepting setting input from the user and providing information to the user.

As shown in FIG. 15C, the remote control 90 is provided with, for example, a hot water temperature setting section 91 for setting the required temperature of hot water (water), a display section 92 for displaying the set hot water temperature and the amount of remaining hot water, and the like.

(15-1-4) Characteristics of Hot Water Supply System

In the hot water supply system 1 according to the present embodiment, water is heated by the water heat exchanger 22 using any Refrigerant A, which is thus highly efficient. When the supplied water is hard water, there is a disadvantage of scale formation, but when the supplied water is soft water, the advantage of employing the hot water supply system 1 according to the present embodiment is particularly great.

(15-1-5) First Modification of First Embodiment

By employing a hot water supply system 1*a* shown in FIG. 15D instead of the hot water supply system 1 of the first embodiment, the disadvantages of scale formation can be suppressed. In the hot water supply system 1*a* of FIG. 15D, a heat pump 2*a* comprises sub-circulating water piping 60 that the heat pump 2 of the first embodiment does not possess. The sub-circulating water piping 60 is provided with a sub-pump for circulation 64. The water in the sub-circulating water piping 60 removes heat from the refrigerant in the water heat exchanger 22 and dissipates it to the water flowing through the main circulating water piping 30 in a sub-water heat exchanger 62. The main water heat exchanger 22 is a heat exchanger that causes heat exchange between refrigerant and water, while the sub-water heat exchanger 62 is a heat exchanger that causes heat exchange between water and water.

In the hot water supply system 1*a* shown in FIG. 15D, a high-temperature gas refrigerant discharged from the compressor 21 of the heat pump 2*a* heats the water flowing through the sub-circulating water piping 60 in the sub-water heat exchanger 62, and that heated water heats the water flowing through the main circulating water piping 30 in the sub-water heat exchanger 62. The flow path of water configured with the sub-circulating water piping 60 is a closed loop, where almost no scale is formed.

(15-1-6) Second Modification of First Embodiment

By employing a hot water supply system 1*b* shown in FIG. 15E instead of the hot water supply system 1 of the first embodiment, the disadvantages of scale formation can be suppressed. In the hot water supply system 1*b* of FIG. 15E, a hot water storage unit 3*b* comprises a heat exchange section 38 that the hot water storage unit 3 of the first embodiment does not possess. The heat exchange section 38 is part of circulating water piping 30*b* and is arranged inside the hot water storage tank 35. In the hot water supply system 1 of the first embodiment, water flows out from the bottom of the hot water storage tank 35 to the circulating water piping 30, and the water after heating is returned to the vicinity of the upper end of the hot water storage tank 35, whereas in the hot water supply system 1*b* shown in FIG. 15E, heated water flowing through the circulating water piping 30*b*, which constitutes a closed loop, causes boiling of the water in the hot water storage tank 35. The water in the hot water storage tank 35 rises in temperature as it removes heat from the warm water flowing through the heat exchange section 38.

In the hot water supply system 1*b* shown in FIG. 15E, the flow path of water configured with the circulating water piping 30*b* is a closed loop, where almost no scale is formed.

Also, a heat pump 2*b* of the hot water supply system 1*b* shown in FIG. 15E comprises, in addition to the water heat exchanger 22, which functions as a heat exchanger on the utilization side, a water heat exchanger 22*a*, also on the utilization side. The water heat exchanger 22*a* is arranged on the upstream side of the refrigerant flow of the water heat exchanger 22 and heats water flowing through a water circulation flow path 190. The water circulation flow path 190 is a closed loop flow path connecting a heat exchanger 192 arranged under the floor for carrying out floor heating and the water heat exchanger 22*a* of the heat pump 2*b*. A pump 194 is provided in the water circulation flow path 190. In the water heat exchanger 22*a*, the water heated by removing heat from the high-temperature mixed refrigerant discharged from the compressor 21 is sent to the heat exchanger 192 under the floor by the drive of the pump 194. The water dissipates heat in the heat exchanger 192 to carry out floor heating, and then passes through the water circulation flow path 190 and again flows into the water heat exchanger 22*a*.

Here, the heat pump 2*b* heats the water in the hot water storage tank 35 to serve for hot water supply, and also plays a role as the heat source for floor heating.

(15-2) Second Embodiment

(15-2-1) Main Configuration of Warm Water Circulation Heating System

The configuration of a warm water circulation heating system, which is a warm water production device according to the second embodiment, is shown in FIG. 15F to FIG. 15H. The warm water circulation heating system is a system that circulates warm water in a building to carry out heating and also has a function of supplying hot water, and comprises a tank 240 for storing warm water, in-living room radiators 261*a* and 262*a*, in-toilet heat dissipators 269*b*, 269*c*, and 269*e*, a circulation pump for indoor heating 251, a vapor compression type heat pump 210 for heating warm water, a circulation pump for warm water heating 225, a heat exchanger for hot water supply 241*a*, a heated water spraying device 275, and a control unit 220.

The in-living room radiators 261*a* and 262*a* are arranged in living rooms 261 and 262 of the building, and dissipate the heat that warm water has to the indoor air of the living rooms 261 and 262.

The in-toilet heat dissipators 269*b*, 269*c*, and 269*e* are arranged in a toilet 269 of the building, and dissipate the heat that warm water has into the toilet 269.

The circulation pump for indoor heating 251 allows warm water to flow from the tank 240 to the in-living room radiators 261*a* and 262*a* and the in-toilet heat dissipators 269*b*, 269*c*, and 269*e*, and then returns the warm water that has dissipated heat in the in-living room radiators 261*a* and 262*a* and the in-toilet heat dissipators 269*b*, 269*c*, and 269*e* back to the tank 240 again. The warm water that has exited the tank 240 flows through the in-living room radiators 261*a* and 262*a*, then flows through the in-toilet heat dissipators 269*b*, 269*c*, and 269*e*, and returns to the tank 240.

The heat pump 210 comprises a refrigerant circuit having a compressor 211, a heat dissipator 212, an expansion valve 213, and an evaporator 214, and it removes heat from the outside air by the evaporator 214 and heats warm water flowing from the tank 240 by the heat released from the heat dissipator 212. In the present embodiment, the refrigerant circuit is filled with a refrigerant for carrying out a vapor compression type refrigeration cycle. That refrigerant is a mixed refrigerant containing 1,2-difluoroethylene, and any Refrigerant A can be used.

The circulation pump for warm water heating 225 allows warm water to flow from the tank 240 to the heat dissipator 212 of the heat pump 210, and returns the warm water from the heat dissipator 212 of the heat pump 210 back to the tank 240 again.

The heat exchanger for hot water supply 241*a* is arranged inside the tank 240 and causes heat exchange between water taken in from a water supply source and the warm water in the tank 240, heating the water and supplying it to hot water supply piping 272 of the building. Hereinafter, the water heated by the heat exchanger for hot water supply 241*a* and to be supplied to the hot water supply piping 272 is referred to as heated water. Note that the water taken in from the water supply source and to be supplied to the hot water supply piping 272 and the warm water in the tank 240 do not mix with each other. The reference sign 241 in FIG. 15F is a flow path of water from the water supply source to the hot water supply piping 272.

The heated water spraying device 275 is a device that sprays heated water supplied from the heat exchanger for hot water supply 241*a* to the hot water supply piping 272 onto the outer surface of the evaporator 214 of the heat pump 210.

Note that ordinary water is used here as the warm water that is stored in the tank 240 and circulated through the closed loop by the circulation pump for indoor heating 251 and the circulation pump for warm water heating 225, but it does not necessarily need to be water ($H_2O$) as long as it is a liquid. If there is a liquid that can reduce the motive power of the circulation pump for indoor heating 251 and the circulation pump for warm water heating 225, and can reduce the size of piping 252, 231, and the like, which serve as circulation routes, to a size smaller than water ($H_2O$), it is desirable to use that liquid.

(15-2-2) Schematic Motion of Warm Water Circulation Heating System

In the warm water circulation heating system, the warm water flowing from the tank 240 to the heat dissipator 212 of the heat pump 210 by working of the circulation pump for warm water heating 225 is heated by using the heat released from the heat dissipator 212 by working of the heat pump 210. As a result, high-temperature warm water is returned from the heat pump 210 to the tank 240. Meanwhile, the warm water in the tank 240 is sent to the in-living room radiators 261*a* and 262*a* in the living rooms 261 and 262 and the in-toilet heat dissipators 269*b*, 269*c*, and 269*e* in the toilet 269 by working of the circulation pump for indoor heating 251. The heat of the warm water moves to the indoor air in the living rooms 261 and 262 and to the surroundings of the in-toilet heat dissipators 269*b*, 269*c*, and 269*e*, heating the living rooms 261 and 262 and also heating washing water in a toilet tank 269*a*, a toilet seat 269*d*, and the like in the toilet 269. Then, the warm water, whose temperature has dropped to about 10° C. to 20° C., is returned to the tank 240 again. This warm water with a dropped temperature is brought to a high temperature again by working of the heat pump 210.

As described above, here, a first loop that circulates between the tank 240 and the heat pump 210, which are connected by the piping 231, and a second loop that circulates between the tank 240 and the in-living room radiators 261*a* and 262*a* and the in-toilet heat dissipators 269*b*, 269*c*, and 269*e*, which are connected by the piping 252, are formed, and warm water is circulated through each of the loops. As a result, the heat collected from outdoors by working of the heat pump 210 and the heat generated by working of the compressor 211 will eventually be moved to the indoor air of the living rooms 261 and 262 and to each section of the toilet 269 via the warm water stored in the tank 240.

Also, the heat exchanger for hot water supply 241*a* is deployed inside the tank 240, and when the water taken in from the water supply source passes through the heat exchanger for hot water supply 241*a*, it removes heat from the warm water in the tank 240 to become heated water, which flows to the hot water supply piping 272 of the building. This heated water that has flowed to the hot water supply piping 272 will be used in a shower 273 or a bathtub 274. Furthermore, a part of the heated water that has flowed to the hot water supply piping 272 is sprayed onto the outer surface of the evaporator 214 of the heat pump 210 by the heated water spraying device 275. This spraying is carried out periodically under predetermined conditions when frost is formed on the evaporator 214 of the heat pump 210.

(15-2-3) Detailed Configuration of Control Unit 220

A comprehensive controller 229 controls equipment accompanying the heat pump 210 and equipment accompanying the tank 240 based on signals input from the outside, as shown in FIG. 15F and FIG. 15I. The comprehensive controller 229 is accommodated in a casing together with three-way valves 221 and 222 and the circulation pump for warm water heating 225, forming the one control unit 220 (see FIG. 15F).

The three-way valves 221 and 222 are provided in order to adjust from which part of the tank 240 in the height direction warm water is withdrawn and sent out to the in-living room radiators 261*a*, 262*a*, and the like, and to which part of the tank 240 in the height direction low-temperature warm water returned from the in-toilet heat dissipators 269*b*, 269*c*, and 269*e* is returned. These three-way valves 221 and 222 work in accordance with an instruction from the comprehensive controller 229.

The comprehensive controller 229 controls, in addition to the three-way valves 221 and 222, a booster heater 242, a heat pump control unit 219, the circulation pump for indoor heating 251, the circulation pump for warm water heating 225, warm water flow rate adjustment valves 253 to 255, a valve for defrosting 277, and the like. Also, while receiving signals of measurement results from a heating warm water forward temperature sensor 252*a*, a heating warm water return temperature sensor 252*b*, temperature sensors 240*a* to 240*e* of the tank 240, a water supply piping temperature sensor 271*a*, a hot water supply piping temperature sensor 272*a*, and the like, the comprehensive controller 229 also receives, for example, information on indoor temperature and indoor preset temperature from a remote control/thermostat 291 deployed in the living rooms 261, 262, and the like.

(15-2-4) Characteristics of Warm Water Circulation Heating System

In the warm water circulation heating system according to the second embodiment, water is heated by the heat dissipator 212 of the heat pump 210 using any Refrigerant A, which is thus highly efficient. Also, the water heated by the heat dissipator 212 of the heat pump 210 is stored in the tank 240 and circulated through the closed loop by the circulation pump for indoor heating 251 and the circulation pump for warm water heating 225. In other words, the water heated by the heat dissipator 212 of the heat pump 210 does not mix with the water taken in from the water supply source and to be supplied to the hot water supply piping 272. Therefore, the heating of water by the heat dissipator 212 of the heat pump 210 will not cause excessive scale formation.

(15-2-5) First Modification of Second Embodiment

In the warm water circulation heating system of the second embodiment, the heated water for hot water supply is made by heating the water taken in from the water supply source by the heat exchanger for hot water supply 241*a* arranged inside the tank 240, but the heated water may be made by a water heat exchanger 112 as shown in FIG. 15J. In a warm water circulation heating system shown in FIG. 15J, by providing a water circulation flow path 110 and a pump 115 that constitute a third loop, warm water is taken out from the top of the tank 240 and passed through the water heat exchanger 112, after which the warm water that has dissipated heat is returned to the bottom of the tank 240. In the water heat exchanger 112, water taken in from the water supply source is heated by the heat dissipation of the warm water flowing from the tank 240, and becomes heated water for hot water supply and flows to the hot water supply piping 272. The reference sign 118 in FIG. 15J is a flow path of water from the water supply source to the hot water supply piping 272.

(15-2-6) Second Modification of Second Embodiment

In the warm water circulation heating system of the second embodiment, warm water is allowed to flow from the bottom of the tank 240 to the heat dissipator 212 of the heat pump 210 by the circulation pump for warm water heating 225 and the warm water is then returned from the heat dissipator 212 of the heat pump 210 to the top of the tank 240 again; however, as shown in FIG. 15K, a configuration may be employed in which the heat dissipator 212 is eliminated, a refrigerant circulation flow path 217 is provided to lead the high-temperature, high-pressure mixed refrigerant discharged from the compressor 211 to the inside of the tank 240, and the water in the tank 240 is heated by a heat exchanger 216 arranged inside the tank 240. In the warm water circulation heating system shown in FIG. 15K, the heat exchanger 216 in the tank 240 is arranged in the vicinity of the heat exchanger for hot water supply 241*a*. The high-temperature mixed refrigerant that has flowed through the refrigerant circulation flow path 217 dissipates heat to the water in the tank 240 in the heat exchanger 216, is condensed to become a low-temperature, high-pressure refrigerant in the liquid phase, and is returned to the unit of heat pump 210. The liquid refrigerant that has returned to the heat pump 210 unit is decompressed by the expansion valve 213 and flows into the evaporator 214, where it removes heat from the outside air and is evaporated. After that, the mixed refrigerant is compressed again in the compressor 211 to high temperature and high pressure. The water in the tank 240 heated by the heat exchanger 216 heats the water flowing through the heat exchanger for hot water supply 241*a*, which is adjacent to the heat exchanger 216. Also, the heat of the refrigerant is transferred from the heat exchanger 216 to the heat exchanger for hot water supply 241*a* by radiation as well. The water taken in from the water supply source and flowing through the heat exchanger for hot water supply 241*a* removes heat from the heat exchanger 216 via the water in the tank 240 and also removes heat from the heat exchanger 216 by radiation to become heated water.

In the warm water circulation heating system shown in FIG. 15K, the water in the tank 240 and the water from the water supply source to the hot water supply piping 272 (water flowing through a flow path 241) are separated, and even when there is rapid heating of water by the heat exchanger 216 in the tank 240, which functions as a condenser for the mixed refrigerant, the amount of scale formation is reduced.

(15-3) Third Embodiment

FIG. 15L is a schematic configuration diagram of a hot water supply system 310, which is a warm water production device according to the third embodiment. The hot water supply system 310 is hot water supply equipment utilized in large facilities such as hotels, hospitals, and sports facilities. As shown in FIG. 15L, the hot water supply system 310 mainly comprises a water receiving tank 320, a heat source unit 330, a hot water storage tank 340, a hot water utilization section 350, a control section 360, a water supply line 312, a hot water outlet line 314, and a hot water circulation path 316. The water supply line 312 is a pipe that connects the water receiving tank 320 to the heat source unit 330. The hot water outlet line 314 is a pipe that connects the heat source unit 330 to the hot water storage tank 340. The hot water circulation path 316 is a pipe that connects the hot water storage tank 340 to the hot water utilization section 350. In FIG. 15L, the arrows along the water supply line 312, the hot water outlet line 314, and the hot water circulation path 316 represent the direction in which water or hot water flows. Next, the water receiving tank 320, the heat source unit 330, the hot water storage tank 340, the hot water utilization section 350, and the control section 360 will each be described.

(15-3-1) Water Receiving Tank

The water receiving tank 320 is a tank for storing water that is to be used by the hot water supply system 310. The water receiving tank 320 is connected to waterworks or the like. The water receiving tank 320 supplies water to the heat source unit 330 via the water supply line 312. The water supply pressure of the water receiving tank 320 is 40 kPa to 500 kPa.

(15-3-2) Heat Source Unit

The heat source unit 330 is installed outdoors. The heat source unit 330 receives supply of water from the water receiving tank 320 via the water supply line 312. The heat source unit 330 heats the water taken in from the water supply line 312. The heat source unit 330 sends the hot water, which is heated water, to the hot water storage tank 340 via the hot water outlet line 314.

FIG. 15M is a schematic configuration diagram of the heat source unit 330. FIG. 15N is a block diagram of the hot water supply system 310. As shown in FIG. 15M and FIG. 15N, the heat source unit 330 mainly has a water flow path 331, a water supply pump 332, a second heat exchanger 333, a refrigerant circulation flow path 334, a compressor 335, an expansion valve 336, a first heat exchanger 337, and a hot water outlet temperature sensor 338. The water flow path 331 is connected to the water supply pump 332 and the second heat exchanger 333. The refrigerant circulation flow path 334 is connected to the compressor 335, the expansion valve 336, and the first heat exchanger 337. In FIG. 15M, the arrows along the water flow path 331 and the refrigerant circulation flow path 334 represent the direction in which water or refrigerant flows. Next, each component of the heat source unit 330 will be described.

(15-3-2-1) Water Flow Path

The water flow path 331 is a pipe through which the water taken in from the water supply line 312 flows. The water flow path 331 is constituted of first water piping 331*a*, second water piping 331*b*, and third water piping 331*c*. The first water piping 331*a* is connected to the water supply line 312 and is also connected to the inlet of the water supply pump 332. The second water piping 331*b* is connected to the discharge hole of the water supply pump 332 and is also connected to a water pipe 333*a* of the second heat exchanger 333. The third water piping 331*c* is connected to the water pipe 333*a* of the second heat exchanger 333 and is also connected to the hot water outlet line 314. To the third water piping 331*c*, the hot water outlet temperature sensor 338 for measuring the temperature of the water flowing through the third water piping 331*c* is attached in the vicinity of the connection section with the hot water outlet line 314.

(15-3-2-2) Hot Water Supply Pump

The water supply pump 332 is a variable displacement pump and can regulate the amount of water flowing through the water flow path 331. The water flowing through the water flow path 331 is supplied from the water supply line 312, passes through the water supply pump 332 and the second heat exchanger 333, and is supplied to the hot water outlet line 314.

(15-3-2-3) Second Heat Exchanger

The second heat exchanger 333 has the water pipe 333*a* through which the water flowing through the water flow path 331 passes, and a refrigerant pipe 333*b* through which the refrigerant flowing through the refrigerant circulation flow path 334 passes. The second heat exchanger 333 is, for example, a tornado-type heat exchanger having a configuration in which the refrigerant pipe 333*b* is helically wound around the outer circumference of the water pipe 333*a* and a groove is formed inside the water pipe 333*a*. The second heat exchanger 333 causes heat exchange between the low-temperature water flowing through the water pipe 333*a* and the high-temperature, high-pressure refrigerant flowing through the refrigerant pipe 333*b*. The low-temperature water flowing through the water pipe 333*a* of the second heat exchanger 333 undergoes heat exchange with the high-temperature refrigerant flowing through the refrigerant pipe 333*b* of the second heat exchanger 333 and is heated. As a result, the water supplied from the water supply line 312 is heated by the second heat exchanger 333, and is supplied to the hot water outlet line 314 as hot water.

(15-3-2-4) Refrigerant Circulation Flow Path

The refrigerant circulation flow path 334 is a pipe through which the refrigerant that is to undergo heat exchange with water in the second heat exchanger 333 is circulated. In the present embodiment, the refrigerant circulation flow path 334 is filled with a refrigerant for carrying out a vapor compression type refrigeration cycle. That refrigerant is a mixed refrigerant containing 1,2-difluoroethylene, and any Refrigerant A can be used.

As shown in FIG. 15M, the refrigerant circulation flow path 334 couples the discharge hole of the compressor 335 to the refrigerant pipe 333*b* of the second heat exchanger 333, couples the refrigerant pipe 333*b* of the second heat exchanger 333 to the expansion valve 336, couples the expansion valve 336 to the first heat exchanger 337, and couples the first heat exchanger 337 to the inlet of the compressor 335. The second heat exchanger 333 has a function as a condenser in the refrigeration cycle. The first heat exchanger 337 has a function as an evaporator in the refrigeration cycle.

(15-3-2-5) Compressor

The compressor 335 is a variable displacement inverter compressor. The compressor 335 inhales the low-pressure gas refrigerant flowing through the refrigerant circulation flow path 334 and compresses it. The high-temperature, high-pressure gas refrigerant that has been compressed in the compressor 335 is discharged from the compressor 335 and is sent to the refrigerant pipe 333*b* of the second heat exchanger 333. In the second heat exchanger 333, the high-temperature, high-pressure gas refrigerant flowing through the refrigerant pipe 333*b* of the second heat exchanger 333 undergoes heat exchange with the low-temperature water flowing through the water pipe 333*a* of the second heat exchanger 333. As a result, in the second heat exchanger 333, the high-temperature, high-pressure gas refrigerant is condensed to become a high-pressure liquid refrigerant.

(15-3-2-6) Expansion Valve

The expansion valve 336 is an electric valve for regulating the pressure and flow rate of refrigerant flowing through the refrigerant circulation flow path 334. The high-pressure liquid refrigerant that has undergone heat exchange in the refrigerant pipe 333*b* of the second heat exchanger 333 is decompressed by passing through the expansion valve 336 to become a low-pressure refrigerant in a gas-liquid two phase state.

(15-3-2-7) First Heat Exchanger

The first heat exchanger 337 is, for example, a plate fin coil heat exchanger. A fan 337*a* is installed in the vicinity of the first heat exchanger 337. The fan 337*a* blows outside air to the first heat exchanger 337 and discharges the outside air that has undergone heat exchange with the refrigerant in the first heat exchanger 337. In the first heat exchanger 337, the low-pressure refrigerant in a gas-liquid two phase state, which has been decompressed by the expansion valve 336, is evaporated by heat exchange with the outside air supplied by the fan 337*a* to become a low-pressure gas refrigerant. The low-pressure gas refrigerant that has passed through the first heat exchanger 337 is sent to the compressor 335.

(15-3-2-8) Hot Water Outlet Temperature Sensor

The hot water outlet temperature sensor 338 is a temperature sensor attached to the third water piping 331*c* in the vicinity of the connection section between the third water piping 331*c* of the water flow path 331 and the hot water outlet line 314. The hot water outlet temperature sensor 338 measures the temperature of water that has been heated in the second heat exchanger 333 and flows through the third water piping 331*c*. That is, the hot water outlet temperature sensor 338 measures the temperature of the hot water supplied by the heat source unit 330.

(15-3-3) Hot Water Storage Tank

The hot water storage tank 340 is an open-type hot water storage tank for storing hot water supplied from the heat source unit 330 via the hot water outlet line 314. The hot water storage tank 340 is, for example, a tank made of stainless steel or a tank made of FRP. The hot water stored in the hot water storage tank 340 is supplied to the hot water utilization section 350 via the hot water circulation path 316. The hot water circulation path 316 is constituted of first hot water piping 316*a* and second hot water piping 316*b*, as shown in FIG. 15L. The hot water storage tank 340 supplies the hot water stored inside to the first hot water piping 316*a*, and sends the hot water to the hot water utilization section 350 via the first hot water piping 316*a*. Hot water not utilized in the hot water utilization section 350 is returned to the hot water storage tank 340 via the second hot water piping 316*b*. That is, a part of the hot water stored in the hot water storage tank 340 flows through the first hot water piping 316*a* and the second hot water piping 316*b*, and is returned to the hot water storage tank 340 again.

Note that, as shown in FIG. 15L, a hot water supply pump 351 is attached to the first hot water piping 316*a*. The hot water supply pump 351 is a pressurization pump for transferring the hot water stored in the hot water storage tank 340 to the hot water utilization section 350. The hot water supply pump 351 is a variable displacement pump and can regulate the amount of hot water sent to the hot water utilization section 350.

As shown in FIG. 15N, the hot water storage tank 340 mainly has a temperature retaining heater 341, a water pressure sensor 342, a float switch 343, and a hot water storage temperature sensor 344. Next, each component of the hot water storage tank 340 will be described.

(15-3-3-1) Temperature Retaining Heater

The temperature retaining heater 341 is a heater attached to the inside of the hot water storage tank 340 in order to maintain the temperature of the hot water stored in the tank 340 at or above the temperature that allows it to be utilized as hot water in the hot water utilization section 350. The hot water storage tank 340 uses the temperature retaining heater 341 to carry out thermal insulation operation of the hot water stored inside.

(15-3-3-2) Water Pressure Sensor

The water pressure sensor 342 is a sensor for measuring the remaining amount of hot water stored in the hot water storage tank 340. The water pressure sensor 342 is attached to the bottom of the inside of the hot water storage tank 340 and detects the water pressure caused by the hot water inside the hot water storage tank 340 to calculate the remaining amount of hot water stored in the hot water storage tank 340 and the water level. The water pressure sensor 342 can, for example, detect whether the remaining amount of hot water stored in the hot water storage tank 340 is less than the target amount of remaining hot water that has been set in advance.

(15-3-3-3) Float Switch

The float switch 343 supplementarily detects the remaining amount of hot water stored in the hot water storage tank 340 by using a float that rises and falls depending on the water level of the hot water stored in the tank 340 as a supplement.

(15-3-3-4) Hot Water Storage Temperature Sensor

The hot water storage temperature sensor 344 is a temperature sensor installed inside the hot water storage tank 340 in the vicinity of the connection section between the first hot water piping 316*a* of the hot water circulation path 316 and the hot water storage tank 340. The hot water storage temperature sensor 344 measures the temperature of hot water stored in the hot water storage tank 340.

(15-3-4) Hot Water Utilization Section

The hot water utilization section 350 is a place where the hot water stored in the hot water storage tank 340 is utilized, such as kitchens, showers, and swimming pools. The hot water stored in the hot water storage tank 340 is supplied by the hot water supply pump 351 to the hot water utilization section 350 via the first hot water piping 316*a* of the hot water circulation path 316. In the hot water utilization section 350, not all of the hot water supplied via the first hot water piping 316*a* is necessarily utilized. Hot water not utilized in the hot water utilization section 350 is returned to the hot water storage tank 340 via the second hot water piping 316*b* of the hot water circulation path 316.

(15-3-5) Control Section

The control section 360 is connected to the components of the hot water supply system 310, as shown in FIG. 15N. Specifically, the control section 360 is connected to the water supply pump 332, the compressor 335, the expansion valve 336, the fan 337*a*, the hot water outlet temperature sensor 338, the temperature retaining heater 341, the water pressure sensor 342, the float switch 343, the hot water storage temperature sensor 344, and the hot water supply pump 351. The control section 360 is installed in, for example, an electrical equipment unit (not shown in the figure) inside the heat source unit 330.

The control section 360 is a computer for controlling the components of the hot water supply system 310. For example, the control section 360 controls the number of rotations of the water supply pump 332, the operation frequency of the compressor 335, the degree of opening of the expansion valve 336, the number of rotations of the fan 337*a*, the power consumption of the temperature retaining heater 341, and the number of rotations of the hot water supply pump 351, and acquires the measured values of the hot water outlet temperature sensor 338, the water pressure sensor 342, the float switch 343, and the hot water storage temperature sensor 344.

Also, as shown in FIG. 15N, the control section 360 is further connected to a remote control 370. The remote control 370 is equipment for controlling the hot water supply system 310.

(15-3-6) Characteristics of Hot Water Supply System

In the hot water supply system according to the third embodiment, water is heated by the second heat exchanger 333 of the heat source unit 330 using any Refrigerant A, which is thus highly efficient.

(16) EMBODIMENTS OF TECHNOLOGY OF SIXTEENTH GROUP (16-1) First Embodiment

In the first embodiment, an air conditioning device 10, which is one example of a refrigeration cycle device, will be described. The term "refrigeration cycle device" refers to all devices operated by the refrigeration cycle and encompasses air conditioning machines, dehumidifiers, heat pump-type hot water supply devices, refrigerators, refrigeration devices for freezing, cooling devices for production processes, and the like.

This air conditioning device 10 is a separate-type air conditioning device that comprises an outdoor machine (omitted in the figure) and an indoor machine (omitted in the figure), and is configured to switch between cooling operation and heating operation.

The air conditioning device 10 comprises a refrigerant circuit 20 that carries out a vapor compression type refrigeration cycle, as shown in FIG. 16A. The refrigerant circuit 20 comprises an outdoor circuit 20*a* mounted on the outdoor machine and an indoor circuit 20*b* mounted on the indoor machine. The outdoor circuit 20*a* is connected to a compressor 21, an outdoor heat exchanger 23, an outdoor expansion valve 24, a four-way valve 22, a bridge circuit 31, and a gas-liquid separator 25. The outdoor heat exchanger 23 constitutes the heat source-side heat exchanger. On the other hand, the indoor circuit 20*b* is connected to an indoor heat exchanger 27 and an indoor expansion valve 26. The indoor heat exchanger 27 constitutes the utilization-side heat exchanger. A discharge pipe 45 of the compressor 21 is connected to a first port P1 of the four-way valve 22. An inlet pipe 46 of the compressor 21 is connected to a second port P2 of the four-way valve 22.

The gas-liquid separator 25 is connected to an incurrent pipe 36, an excurrent pipe 37, and an injection pipe 38. The incurrent pipe 36 opens to the top of the internal space of the gas-liquid separator 25. The excurrent pipe 37 opens to the bottom of the internal space of the gas-liquid separator 25. The injection pipe 38 opens to the top of the internal space of the gas-liquid separator 25. In the gas-liquid separator 25, the refrigerant flowing in from the incurrent pipe 36 is separated into saturated liquid and saturated gas, and the saturated liquid flows out from the excurrent pipe 37 and the saturated gas flows out from the injection pipe 38. The incurrent pipe 36 and the excurrent pipe 37 are each connected to the bridge circuit 31. The injection pipe 38 is connected to an intermediate connection pipe 47 of the compressor 21.

Meanwhile, the refrigerant in the saturated gas state flowing out of the injection pipe 38 is injected into a compression chamber at an intermediate pressure of a compression mechanism 32 through an intermediate port. In the present embodiment, the incurrent pipe 36, the excurrent pipe 37, the injection pipe 38, and the gas-liquid separator 25 constitutes an injection circuit 15 for supplying the refrigerant in the saturated liquid state to the indoor heat exchanger 27 and supplying the refrigerant in the saturated gas state to the compressor 21, among the refrigerant that has flowed out of the outdoor heat exchanger 23 during cooling motion and has been decompressed to the intermediate pressure in the refrigeration cycle.

The bridge circuit 31 is a circuit in which a first check valve CV1, a second check valve CV2, a third check valve CV3, and a fourth check valve CV4 are connected in the form of a bridge. In the bridge circuit 31, the connection end located on the incurrent side of the first check valve CV1 and on the incurrent side of the second check valve CV2 is connected to the excurrent pipe 37. The connection end located on the excurrent side of the second check valve CV2 and on the incurrent side of the third check valve CV3 is connected to the indoor heat exchanger 27. The refrigerant piping that links this connection end to the indoor heat exchanger 27 is provided with the indoor expansion valve 26 whose degree of opening is variable. The connection end located on the excurrent side of the third check valve CV3 and on the excurrent side of the fourth check valve CV4 is connected to the incurrent pipe 36. The connection end located on the excurrent side of the first check valve CV1 and on the incurrent side of the fourth check valve CV4 is connected to the outdoor heat exchanger 23.

In cooling operation, the four-way valve 22 is set to a state where the first port P1 and a third port P3 are in communication with each other and the second port P2 and a fourth port P4 are in communication with each other (the state shown by the solid line in FIG. 16A). Then, when operation of the compressor 21 is carried out in this state, cooling motion in which the outdoor heat exchanger 23 runs as a condenser and the indoor heat exchanger 27 runs as an evaporator is carried out in the refrigerant circuit 20.

In heating operation, the four-way valve 22 is set to a state where the first port P1 and the fourth port P4 are in communication with each other and the second port P2 and the third port P3 are in communication with each other (the state shown by the dashed line in FIG. 16A). Then, when operation of the compressor 21 is carried out in this state, heating motion in which the outdoor heat exchanger 23 runs as an evaporator and the indoor heat exchanger 27 runs as a condenser is carried out in the refrigerant circuit 20.

The outdoor heat exchanger 23 is configured with a microchannel heat exchanger (also referred to as a micro heat exchanger) in which microchannels 13 are formed to serve as flow paths for the refrigerant. The microchannels 13 are fine flow paths (flow paths with an extremely small flow path area) that have been processed using fine processing technology or the like. In general, a heat exchanger having microchannels 13, which are flow paths with a diameter of a few millimeters or less where the effect of surface tension appears, is referred to as a microchannel heat exchanger.

Specifically, the outdoor heat exchanger 23 comprises multiple flat pipes 16 and a pair of headers 17 and 18, as shown in FIG. 16B. The pair of headers 17 and 18 are configured with cylindrical sealed containers. In each flat pipe 16, multiple microchannels 13 are formed, as shown in FIG. 16C. Multiple microchannels 13 are formed at a predetermined pitch in the width direction of the flat pipe 16. Each flat pipe 16 is fixed to the pair of headers 17 and 18 such that one end of the microchannels 13 opens into one header 17 and the other end of the microchannels 13 opens into the other header 18. Also, wavelike metal plates 19 are provided between the flat pipes 16.

An outdoor fan 28 is provided in the vicinity of the outdoor heat exchanger 23. In the outdoor heat exchanger 23, the outdoor air supplied by the outdoor fan 28 flows through gaps formed by the flat pipes 16 and the metal plates 19. The outdoor air flows in the width direction of the flat pipes 16.

In the outdoor heat exchanger 23, one header 17 is connected to the third port P3 of the four-way valve 22, and the other header 18 is connected to the bridge circuit 31. In the outdoor heat exchanger 23, the refrigerant flowing into one header 17 or 18 is distributed into the multiple microchannels 13, and the refrigerant that has passed through each microchannel 13 merges at the other header 17 or 18. Each microchannel 13 serves as a refrigerant flow path through which the refrigerant flows. The outdoor heat exchanger 23 causes heat exchange between the refrigerant flowing through each microchannel 13 and the outdoor air.

The indoor heat exchanger 27 is configured with a microchannel heat exchanger. Since the indoor heat exchanger 27 has the same structure as that of the outdoor heat exchanger 23, description will be omitted for the structure of the indoor heat exchanger 27. An indoor fan 29 is provided in the vicinity of the indoor heat exchanger 27. The indoor heat exchanger 27 causes heat exchange between the refrigerant flowing through each microchannel 13 and the indoor air supplied by the indoor fan 29. In the indoor heat exchanger 27, one header 17 is connected to the fourth port P4 of the four-way valve 22, and the other header 18 is connected to the bridge circuit 31.

In the present embodiment, the outdoor heat exchanger 23 and the indoor heat exchanger 27 are each configured with a microchannel heat exchanger. The volume inside the microchannel heat exchanger is smaller than that of other structural models of heat exchangers with equivalent performance (for example, cross fin-type, fin and tube-type heat exchangers). Therefore, it is possible to reduce the total volume in the refrigerant circuit 20 compared to refrigeration cycle devices using other structural models of heat exchangers.

It is preferable to achieve "0.9 mm flat pipe thickness (vertical height h16 of the flat pipe 16 shown in FIG. 16C) 4.0 mm" in consideration of pressure resistance and corrosion resistance, and it is preferable to achieve "8.0 mm S flat pipe thickness (horizontal width W16 of the flat pipe 16 shown in FIG. 16C)≤25.0 mm" in consideration of heat exchange capacity.

In the present embodiment, the refrigerant circuit 20 is filled with a refrigerant for carrying out a vapor compression type refrigeration cycle. That refrigerant is a mixed refrigerant containing 1,2-difluoroethylene, and any Refrigerant A can be used.

(16-2) Second Embodiment

As shown in FIG. 16D, the outdoor heat exchanger 125 has a heat exchange section 195 and header collecting pipes 191 and 192. The heat exchange section 195 has multiple flat porous pipes 193 and multiple insertion fins 194. The flat porous pipes 193 are one example of a flat pipe. The outdoor heat exchanger 125 is included in a refrigerant circuit of a refrigeration cycle device. The refrigerant circuit of the refrigeration cycle device comprises a compressor, an evaporator, a condenser, and an expansion valve. In heating operation, the outdoor heat exchanger 125 functions as an evaporator in the refrigerant circuit of the refrigeration cycle device. In cooling operation, the outdoor heat exchanger 125 functions as a condenser in the refrigerant circuit of the refrigeration cycle device.

FIG. 16E is a partially enlarged view of the heat exchange section 195 when the flat porous pipes 193 and the insertion fins 194 are cut in the vertical direction. The flat porous pipes 193 function as heat transfer pipes and transfer the heat that moves between the insertion fins 194 and the outdoor air to the refrigerant flowing inside.

The flat porous pipes 193 have side surface sections that serve as heat transfer surfaces and multiple internal flow paths 193*a* through which the refrigerant flows. The flat porous pipes 193 are arrayed in multiple stages with intervals in a state where the side surface sections of adjacent flat porous pipes 193 face each other vertically. The insertion fins 194 are multiple fins with the shape shown in FIG. 16E, and are connected to the flat porous pipes 193. In the insertion fins 194, multiple cutouts 194*a* horizontally extending and elongated are formed such that the insertion fins 194 can be inserted into the multiple stages of flat porous pipes 193 arrayed between the both header collecting pipes 191 and 192. The shape of these cutouts 194*a* of the insertion fins 194 approximately coincides with the external profile of the cross section of the flat porous pipes 193, as shown in FIG. 16E.

Here, the case where a communication part 194*b* of the insertion fins 194 is arranged downwind has been described. In this case, the communication part 194*b* is the part among the insertion fins 194 that has no cutout 194*a* and is linked in a straight line. However, in the outdoor heat exchanger 125, the communication part 194*b* of the insertion fins 194 may be arranged upwind. In the case where the communication part 194*b* is arranged upwind, the wind is first dehumidified by the insertion fins 194 and then hits the flat porous pipes 193.

Here, the case where the heat exchanger shown in FIG. 16D is used for the outdoor heat exchanger 125 has been described, but the heat exchanger shown in FIG. 16D may be used for the indoor heat exchanger. When the insertion fins are used in the indoor heat exchanger, the communication part of the insertion fins can be arranged downwind. As described above, when the communication part of the insertion fins is arranged downwind in the indoor heat exchanger, water splashing can be prevented.

It is preferable to achieve "0.9 mm≤flat pipe thickness (vertical height h193 of the flat porous pipe 193 shown in FIG. 16E)≤4.0 mm" in consideration of pressure resistance and corrosion resistance, and it is preferable to achieve "8.0 mm≤flat pipe thickness (horizontal width W193 of the flat porous pipe 193 shown in FIG. 16E)≤25.0 mm" in consideration of heat exchange capacity.

In the present embodiment, the refrigerant circuit including the outdoor heat exchanger 125 is filled with a refrigerant for carrying out a vapor compression type refrigeration cycle. That refrigerant is a mixed refrigerant containing 1,2-difluoroethylene, and any Refrigerant A can be used.

(16-3) Third Embodiment

Internally grooved pipes 201 are inserted into through holes 211*a* of multiple plate fins 211 arranged in parallel, shown in FIG. 16I. Next, this pipe expanding tool (not shown in the figure) is press-fitted into the internally grooved pipes 201. This causes the internally grooved pipes 201 to expand, eliminating the clearance between the internally grooved pipes 201 and the plate fins 211, and enhancing the close contact between the internally grooved pipes 201 and the plate fins 211. Next, the pipe expanding tool is taken out from the internally grooved pipes 201. This produces a heat exchanger in which the internally grooved pipes 201 and the plate fins 211 are joined with no gap.

The internally grooved pipes 201 are used in a plate fin tube-type heat exchanger of a refrigeration cycle device such as an air conditioning machine and refrigeration air conditioning equipment. The plate fin tube-type heat exchanger is included in the refrigerant circuit of the refrigeration cycle device. The refrigerant circuit of the refrigeration cycle device comprises a compressor, an evaporator, a condenser, and an expansion valve. In heating operation, the plate fin tube-type heat exchanger functions as an evaporator in the refrigerant circuit of the refrigeration cycle device. In cooling operation, the plate fin tube-type heat exchanger functions as a condenser in the refrigerant circuit of the refrigeration cycle device.

For the internally grooved pipes 201, pipes with a pipe outer diameter D201 of 4 mm or more and 10 mm or less are used. Also, as the material of the original pipes of the internally grooved pipes 201, aluminum or an aluminum alloy is used. Note that the method for forming the internal groove shape of the internally grooved pipes 201 can be, but is not limited to, a thread rolling method or a rolling method.

And, as shown in FIG. 16F, FIG. 16G, and FIG. 16H, the internally grooved pipes 201 comprise a configuration having, on their inner surface, a large number of grooves 202 formed in a direction inclined to the pipe axis direction and in-pipe fins 203 formed between the grooves 202, wherein the groove number of grooves 202 is 30 or more and 100 or less; the groove lead angle θ201 formed between the grooves 202 and the pipe axis is 10 degrees or more and 50 degrees or less; the bottom wall thickness T201 of the internally grooved pipes 201 in the cross section orthogonal to the pipe axis of the internally grooved pipes 201 (cut along the I-I line) is 0.2 mm or more and 1.0 mm or less; the fin height h201 of the in-pipe fins is 0.1 mm or more and is 1.2 times the bottom wall thickness T201 or less; the fin peak angle δ201 is 5 degrees or more and 45 degrees or less; and the fin root radius r201 is 20% or more and 50% or less of the fin height h201.

Next, the numerical limitations on the internal groove shape of the internally grooved pipes 201 will be described.

(16-3-1) Groove Number: 30 or More and 100 or Less

The groove number is determined as appropriate in consideration of heat transfer performance, individual weight, and the like, in combination with various specifications of the internal groove shape, which will be described later, but it is preferably 30 or more and 100 or less. When the groove number is less than 30, the groove moldability is likely to be poor, and when the groove number is greater than 100, the grooving tool (grooving plug) is likely to become defective. In both cases, the mass productivity of the internally grooved pipes 201 is likely to be reduced.

Furthermore, when the internally grooved pipes 201 are used in the outdoor heat exchanger and indoor heat exchanger included in the refrigerant circuit of the refrigeration cycle device, it is preferable to achieve the following: the groove number of the internally grooved pipes 201 in the outdoor heat exchanger>the groove number of the internally grooved pipes 201 in the indoor heat exchanger. By doing so, it is possible to reduce the in-pipe pressure loss of the internally grooved pipes 201 and to improve the heat transfer performance.

(16-3-2) Groove Lead Angle θ201: 10 Degrees or More and 50 Degrees or Less

The groove lead angle θ201 is preferably 10 degrees or more and 50 degrees or less. When the groove lead angle θ201 is less than 10 degrees, the heat transfer performance of the internally grooved pipes 201 (heat exchanger) is likely to be reduced. Also, when the groove lead angle θ201 is greater than 50 degrees, it becomes difficult to ensure mass productivity of the internally grooved pipes 201 and to suppress deformation of the in-pipe fins 203 due to pipe expansion.

Furthermore, when the internally grooved pipes 201 are used in the outdoor heat exchanger and indoor heat exchanger included in the refrigerant circuit of the refrigeration cycle device, it is preferable to achieve the following: the groove lead angle of the internally grooved pipes 201 in the outdoor heat exchanger<the groove number of the internally grooved pipes 201 in the indoor heat exchanger. By doing so, it is possible to reduce the in-pipe pressure loss of the internally grooved pipes 201 and to improve the heat transfer performance.

(16-3-3) Bottom Wall Thickness T201: 0.2 mm or More and 1.0 mm or Less

The bottom wall thickness T201 is preferably 0.2 mm or more and 1.0 mm or less. When the bottom wall thickness T201 is outside the range described above, it becomes difficult to produce the internally grooved pipes 201. Also, when the bottom wall thickness T201 is less than 0.2 mm, the strength of the internally grooved pipes 201 is likely to be reduced, making it difficult to retain the pressure resistance strength.

(16-3-4) Fin Height h201: 0.1 mm or More and (Bottom Wall Thickness T201×1.2) mm or Less The fin height h201 is preferably 0.1 mm or more and (bottom wall thickness T201×1.2) mm or less. When the fin height h201 is less than 0.1 mm, the heat transfer performance of the internally grooved pipes 201 (heat exchanger) is likely to be reduced. Also, when the fin height h201 is greater than (bottom wall thickness T201×1.2) mm, it becomes difficult to ensure mass productivity of the internally grooved pipes 201 and to suppress extreme deformation of the in-pipe fins 203 due to pipe expansion.

Furthermore, when the internally grooved pipes 201 are used in the outdoor heat exchanger and indoor heat exchanger included in the refrigerant circuit of the refrigeration cycle device, it is preferable to achieve the following: the fin height h201 of the internally grooved pipes 201 in the outdoor heat exchanger>the fin height h201 of the internally grooved pipes 201 in the indoor heat exchanger. By doing so, it is possible to reduce the in-pipe pressure loss of the internally grooved pipes 201 and to further improve the heat transfer performance of the outdoor heat exchanger.

(16-3-5) Fin Peak Angle δ201: 5 Degrees or More and 45 Degrees or Less

The fin peak angle δ201 is preferably 5 degrees or more and 45 degrees or less. When the fin peak angle δ201 is less than 5 degrees, it becomes difficult to ensure mass productivity of the internally grooved pipes 201 and to suppress deformation of the in-pipe fins 203 due to pipe expansion. Also, when the peak angle δ201 is greater than 45 degrees, it becomes difficult to maintain the heat transfer performance of the internally grooved pipes 201 (heat exchanger) and the individual weight of the internally grooved pipes 201 is likely to be excessive.

(16-3-6) Fin Root Radius r201: 20% or More and 50% or Less of Fin Height h201

The fin root radius r201 is preferably 20% or more and 50% or less of the fin height h201. When the fin root radius r201 is less than 20% of the fin height h201, the fin inclination due to pipe expansion is likely to be excessive and the mass productivity is likely to be reduced as well. Also, when the fin root radius r201 is greater than 50% of the fin height h201, the effective heat transfer area of the refrigerant gas-liquid interface is likely to be decreased and the heat transfer performance of the internally grooved pipes 201 (heat exchanger) is likely to be reduced.

In the present embodiment, the refrigerant circuit including the plate fin tube-type heat exchanger using the internally grooved pipes 201 is filled with a refrigerant for carrying out a vapor compression type refrigeration cycle. That refrigerant is a mixed refrigerant containing 1,2-difluoroethylene, and any Refrigerant A can be used.

(16-4) Characteristics

The air conditioning device 10, which is a refrigeration cycle device of the first embodiment, the refrigeration cycle device of the second embodiment, and the refrigeration cycle device of the third embodiment comprise a flammable refrigerant containing at least 1,2-difluoroethylene, an evaporator for evaporating the refrigerant, and a condenser for condensing the refrigerant. In these refrigeration cycle devices, these refrigeration cycle devices are configured such that the refrigerant is circulated between the evaporator and the condenser to repeat the refrigeration cycle.

In the first embodiment, the outdoor heat exchanger 23 is one of the evaporator and the condenser, and the indoor heat exchanger 27 is the other of the evaporator and the condenser, and they have metal plates 19, which are multiple fins made of aluminum or an aluminum alloy, and flat pipes 16, which are multiple heat transfer pipes made of aluminum or an aluminum alloy. The outdoor heat exchanger 23 and the indoor heat exchanger 27 are heat exchangers that cause heat exchange between the refrigerant flowing inside the flat pipes 16 and the air, which is a fluid flowing along the metal plates 19. The flat pipes 16 have planar sections 16*a*, shown in FIG. 16C. In the outdoor heat exchanger 23 and the indoor heat exchanger 27, the planar sections 16*a* of flat pipes 16 adjacent to each other are arranged to face each other. Each of the multiple metal plates 19 is bent into the form of a wave and arranged between the planar sections 16*a* of flat pipes 16 adjacent to each other. Each metal plate 19 is connected to the planar sections 16*a* so as to transfer heat to the planar sections 16*a*.

In the second embodiment, the outdoor heat exchanger 125 is one of the evaporator and the condenser, and it has multiple insertion fins 194 made of aluminum or an aluminum alloy, and flat porous pipes 193, which are multiple heat transfer pipes made of aluminum or an aluminum alloy. The outdoor heat exchanger 125 is a heat exchanger that causes heat exchange between the refrigerant flowing inside the flat porous pipes 193 and the air, which is a fluid flowing along the insertion fins 194. The flat porous pipes 193 have planar sections 193*b*, shown in FIG. 16E. In the outdoor heat exchanger 125, the planar sections 193*b* of flat porous pipes 193 adjacent to each other are arranged to face each other. Each of the multiple insertion fins 194 has multiple cutouts 194*a*. The multiple flat porous pipes 193 are inserted into the multiple cutouts 194*a* of the multiple insertion fins 194 and are connected so as to be able to transfer heat to the multiple insertion fins 194.

In the third embodiment, the heat exchanger having multiple plate fins 211 made of aluminum or an aluminum alloy, and internally grooved pipes 201, which are multiple heat transfer pipes made of aluminum or an aluminum alloy, serves as one of the evaporator and the condenser. This heat exchanger is a heat exchanger that causes heat exchange between the refrigerant flowing inside the internally grooved pipes 201 and the air, which is a fluid flowing along the plate fins 211. Each of the multiple plate fins 211 has multiple through holes 211*a*. In the heat exchanger, the multiple internally grooved pipes 201 penetrate the multiple through holes 211*a* of the multiple plate fins 211. The outer circumference of these multiple internally grooved pipes 201 is in close contact with the inner circumference of the multiple through holes 211*a*.

The above refrigeration cycle devices have, in the heat exchanger, the metal plates 19, insertion fins 194, or plate fins 211, which are multiple fins made of aluminum or an aluminum alloy, and the flat pipes 16, flat porous pipes 193, or internally grooved pipes 201, which are multiple heat transfer pipes made of aluminum or an aluminum alloy. Since the refrigeration cycle devices have such a configuration, the material costs of the heat exchanger can be reduced compared to the case of using copper pipes for the heat transfer pipes, for example.

(17) EMBODIMENTS OF TECHNOLOGY OF SEVENTEENTH GROUP (17-1) First Embodiment

FIG. 17A is a schematic diagram showing the arrangement of an air conditioning device 1 according to the first embodiment. FIG. 17B is a schematic configuration diagram of the air conditioning device 1. In FIGS. 17A and 17B, the air conditioning device 1 is a device used for air conditioning in houses and buildings.

Here, the air conditioning device 1 is installed in a house 100 with a two-story structure. In the house 100, rooms 101 and 102 are provided on the first floor, and rooms 103 and 104 are provided on the second floor. Also, a basement 105 is provided in the house 100.

The air conditioning device 1 is a so-called duct-type air conditioning system. The air conditioning device 1 has an indoor machine 2, which is a utilization-side unit, an outdoor machine 3, which is a heat source-side unit, refrigerant communication pipes 306 and 307, and a first duct 209 that sends the air conditioned by the indoor machine 2 to rooms 101 to 104. The first duct 209 branches to the rooms 101 to 104 and is connected to vent holes 101*a* to 104*a* in the respective rooms 101 to 104. Note that, for the sake of convenience of description, the indoor machine 2, the outdoor machine 3, and the refrigerant communication pipes 306 and 307 are collectively referred to as air conditioning equipment 80. The indoor machine 2, which is a utilization-side unit, and the outdoor machine 3, which is a heat source-side unit, are separate from each other.

In FIG. 17B, the indoor machine 2, the outdoor machine 3, and the refrigerant communication pipes 306 and 307 constitute a heat pump section 360 that carries out indoor heating by a vapor compression type refrigeration cycle. Also, a gas furnace unit 205, which is a part of the indoor machine 2, constitutes a separate heat source section 270 that carries out indoor heating by another heat source (here, heat from gas combustion) separate from the heat pump section 360.

As described above, the indoor machine 2 has the gas furnace unit 205, which constitutes the separate heat source section 270, in addition to those constituting the heat pump section 360. Also, the indoor machine 2 has an indoor fan 240 as well for intaking the air in the rooms 101 to 104 into a casing 230 and supplying the air conditioned by the heat pump section 360 and the separate heat source section 270 (gas furnace unit 205) into the rooms 101 to 104. In addition, the indoor machine 2 is provided with a blowing air temperature sensor 233 that detects the blowing air temperature Trd, which is the temperature of the air at an air outlet 231 of the casing 230, and an indoor temperature sensor 234 that detects the indoor temperature Tr, which is the temperature of the air at an air inlet 232 of the casing 230. Note that the indoor temperature sensor 234 may be provided not in the indoor machine 2 but in the rooms 101 to 104. A second duct 210 is connected to the air inlet 232 of the casing 230. The indoor machine 2, which is a utilization-side unit, has the casing 230 and the equipment accommodated in them. The indoor machine 2 is configured to lead an indoor air F1, which is a first air taken in from indoors, to an indoor heat exchanger 242, which is a utilization-side heat exchanger.

(17-1-1) Heat Pump Section 360

In the heat pump section 360 of the air conditioning equipment 80, the refrigerant circuit 320 is configured by connecting the indoor machine 2 and the outdoor machine 3 via the refrigerant communication pipes 306 and 307. The refrigerant communication pipes 306 and 307 are refrigerant pipes that are executed on site when the air conditioning equipment 80 is installed.

The indoor machine 2 is installed in the basement 105 of the house 100. Note that the installation place of the indoor machine 2 is not limited to the basement 105, and it may be arranged in any other indoor place. The indoor machine 2 has the indoor heat exchanger 242 as a refrigerant heat dissipator that heats the air by heat dissipation of the refrigerant in the refrigeration cycle, and an indoor expansion valve 241.

During cooling operation, the indoor expansion valve 241 decompresses the refrigerant circulating in the refrigerant circuit 320 and flows it to the indoor heat exchanger 242. Here, the indoor expansion valve 241 is an electric expansion valve connected to the liquid side of the indoor heat exchanger 242.

The indoor heat exchanger 242 is arranged at the most downwind side in an air passage from the air inlet 232 to the air outlet 231 formed in the casing 230.

The outdoor machine 3 is installed outside the house 100. The outdoor machine 3 has a compressor 321, an outdoor heat exchanger 323, an outdoor expansion valve 324, and a four-way valve 328. The compressor 321 is a sealed compressor in which the casing accommodates a compression element not shown in the figure and a compressor motor 322 that rotationally drives the compression element.

The compressor motor 322 is supplied with electric power via an inverter device not shown in the figure, and the operation capacity can be varied by changing the frequency (that is, the number of rotations) of the inverter device.

The outdoor heat exchanger 323 is a heat exchanger that functions as a refrigerant evaporator to evaporate the refrigerant in the refrigeration cycle with the outdoor air. In the vicinity of the outdoor heat exchanger 323, an outdoor fan 325 is provided for sending the outdoor air to the outdoor heat exchanger 323. The outdoor fan 325 is rotationally driven by an outdoor fan motor 326.

During heating operation, the outdoor expansion valve 324 decompresses the refrigerant circulating in the refrigerant circuit 320 and flows it to the outdoor heat exchanger 323. Here, the outdoor expansion valve 324 is an electric expansion valve connected to the liquid side of the outdoor heat exchanger 323. Also, the outdoor machine 3 is provided with an outdoor temperature sensor 327 that detects the temperature of the outdoor air outside the house 100 where the outdoor machine 3 is arranged, that is, the outdoor air temperature Ta.

In the present embodiment, the refrigerant circuit 320 is filled with a refrigerant for carrying out a vapor compression type refrigeration cycle. That refrigerant is a mixed refrigerant containing 1,2-difluoroethylene, and any Refrigerant A can be used.

The four-way valve 328 is a valve that switches the direction of the refrigerant flow. During cooling operation, the four-way valve 328 connects the discharge side of the compressor 321 to the gas side of the outdoor heat exchanger 323, and also connects the inlet side of the compressor 321 to the gas refrigerant communication pipe 307 (cooling operation state: see the solid line of the four-way valve 328 in FIG. 17B). As a result, the outdoor heat exchanger 323 functions as a condenser for the refrigerant and the indoor heat exchanger 242 functions as an evaporator for the refrigerant.

During heating operation, the four-way valve 328 connects the discharge side of the compressor 321 to the gas refrigerant communication pipe 307, and also connects the inlet side of the compressor 321 to the gas side of the outdoor heat exchanger 323 (heating operation state: see the dashed line of the four-way valve 328 in FIG. 17B). As a result, the indoor heat exchanger 242 functions as a condenser for the refrigerant and the outdoor heat exchanger 323 functions as an evaporator for the refrigerant.

(17-1-2) Summary of Important Configuration of Air Conditioning Device 1

When heat pump heating operation is being carried out, in the air conditioning device 1, the refrigerant containing at least 1,2-difluoroethylene is circulated through the compressor 321, the indoor heat exchanger 242, which is a utilization-side heat exchanger, and the outdoor heat exchanger 323, which is a heat source-side heat exchanger, to repeat the refrigeration cycle. The indoor heat exchanger 242 causes heat exchange between the indoor air F1, which is the first air, and the refrigerant. The indoor air F1 is supplied to the indoor heat exchanger 242 by the indoor fan 240. An indoor air F3 (first air), which has been heated in the indoor heat exchanger 242, is sent from the indoor machine 2 through the first duct 209 to each room 101 to 104 to carry out heating. The outdoor heat exchanger 323 causes heat exchange between the outdoor air, which is a second air, and the refrigerant. The casing 230 has a utilization-side space SP2 that is connected to the first duct 209 and also accommodates the indoor heat exchanger 242, and is configured to send out the indoor air F3 that has undergone heat exchange with the refrigerant in the indoor heat exchanger 242 to the first duct 209.

When separate heat source heating operation is being carried out, high-temperature combustion gas sent to a furnace heat exchanger 255 undergoes heat exchange with the indoor air F1 supplied by the indoor fan 240 in the furnace heat exchanger 255 and is cooled to become low-temperature combustion gas. This low-temperature combustion gas is discharged from the gas furnace unit 205 via an exhaust pipe 257. On the other hand, an indoor air F2, which has been heated in the furnace heat exchanger 255, is sent from the indoor machine 2 through the first duct 209 to each room 101 to 104 to carry out heating.

(17-1-3) Separate Heat Source Section 270

The separate heat source section 270 is configured with the gas furnace unit 205, which is a part of the indoor machine 2 of the air conditioning equipment 80.

The gas furnace unit 205 is provided inside the casing 230 installed in the basement 105 of the house 100. The gas furnace unit 205 is a gas combustion-type heating device and has a fuel gas valve 251, a furnace fan 252, a combustion section 254, the furnace heat exchanger 255, an air supply pipe 256, and the exhaust pipe 257.

The fuel gas valve 251 is composed of a solenoid valve or the like that can be controlled to be opened and closed, and is provided in a fuel gas supply pipe 258 that extends from outside the casing 230 to the combustion section 254. As the fuel gas, natural gas, petroleum gas, or the like is used.

The furnace fan 252 is a fan that generates an air flow by intaking air into the combustion section 254 through the air supply pipe 256, then sending the air to the furnace heat exchanger 255, and discharging it from the exhaust pipe 257. The furnace fan 252 is rotationally driven by a furnace fan motor 253.

The combustion section 254 is equipment that combusts mixed gas of fuel gas and air by means of a gas burner or the like (not shown in the figure) to obtain high-temperature combustion gas.

The furnace heat exchanger 255 is a heat exchanger that heats the air by heat dissipation of the combustion gas obtained in the combustion section 254, and functions as a separate heat source heat dissipator that heats the air by heat dissipation of another heat source (here, heat from gas combustion) separate from the heat pump section 360.

The furnace heat exchanger 255 is arranged on the upwind side than the indoor heat exchanger 242 as a refrigerant heat dissipator in the air passage from the air inlet 232 to the air outlet 231 formed in the casing 230.

(17-1-4) Indoor Fan 240

The indoor fan 240 is a blower for supplying air heated by the indoor heat exchanger 242 as a refrigerant heat dissipator that constitutes the heat pump section 360 and the furnace heat exchanger 255 as a separate heat source heat dissipator that constitutes the separate heat source section 270 into the rooms 101 to 104.

The indoor fan 240 is arranged on the upwind side than both the indoor heat exchanger 242 and the furnace heat exchanger 255 in the air passage from the air inlet 232 to the air outlet 231 formed in the casing 230. The indoor fan 240 has blades 243 and a fan motor 244 that rotationally drives the blades 243.

(17-1-5) Controller 30

In the indoor machine 2, an indoor-side control board 21 that controls the motion of each section of the indoor machine 2 is mounted. In the outdoor machine 3, an outdoor-side control board 31 that controls the motion of each section of the outdoor machine 3 is mounted. And, the indoor-side control board 21 and the outdoor-side control board 31 have microcomputers or the like, and exchange control signals and the like with a thermostat 40. Also, no control signals are exchanged between the indoor-side control board 21 and the outdoor-side control board 31. A control device including the indoor-side control board 21 and the outdoor-side control board 31 is called a controller 30.

(17-1-6) Detailed Structure of Controller 30

FIG. 17C is a block diagram showing the state of electrical connection of the controller 30 and the thermostat 40 in the air conditioning device 1 according to the first embodiment. The thermostat 40 is attached to an indoor space as is the indoor machine 2. Note that the places where the thermostat 40 and the indoor machine 2 are each attached may be different places in the indoor space. Also, the thermostat 40 is linked by communication lines to the respective control systems of the indoor machine 2 and the outdoor machine 3.

A transformer 20 transforms the voltage of a commercial power source 90 to a usable low voltage and then supplies it to each of the indoor machine 2, the outdoor machine 3, and the thermostat 40 via power source lines 81 and 82.

(17-2) Second Embodiment

(17-2-1) Entire Configuration

An air conditioning device 701 according to the second embodiment is installed on top of a roof 801 of a building 800, that is, on a rooftop, as shown in FIG. 17D. The air conditioning device 701 is equipment that carries out indoor air conditioning inside the building 800. The building 800 has multiple rooms 810. The rooms 810 of the building 800 are the target spaces for air conditioning for the air conditioning device 701. FIG. 17D shows an example of the air conditioning device 701 comprising one first duct 721 and one second duct 722. However, the air conditioning device 701 can also be configured to comprise each of these first duct 721 and second duct 722 in a multiple number. Note that the first duct 721 shown in FIG. 17D branches off in the middle. The first duct 721 is provided for a supply air, and the second duct 722 is provided for a return air. The supply air supplied to the multiple rooms 810 indoors by the first duct 721 is a first air. The return air taken in from indoors by the second duct 722 is also the first air. In FIG. 17D, the arrows Ar1 and Ar2 in the first duct 721 and the second duct 722 indicate the directions in which the air in the first duct 721 and the second duct 722 is flowing. Air is sent from the air conditioning device 701 to the rooms 810 through the first duct 721, and the indoor air of the rooms 810, which is the air of the target spaces for air conditioning, is sent to the air conditioning device 701 through the second duct 722. Multiple outlets 723 are provided at the boundary between the first duct 721 and the rooms 810. The supply air supplied by the first duct 721 is blown out of the outlets 723 into the rooms 810. Also, at the boundary between the second duct 722 and the rooms 810, at least one inlet 724 is provided. The indoor air that has been sucked in from the inlet 724 becomes the return air to be returned to the air conditioning device 701 by the second duct 722.

(17-2-2) Appearance of Air Conditioning Device 701

FIG. 17E shows the appearance of the air conditioning device 701 viewed from diagonally above, and FIG. 17F shows the appearance of the air conditioning device 701 viewed from diagonally below. Hereinafter, for the sake of convenience, description will be given using the directions of top, bottom, front, rear, left, and right, indicated by the arrows in the figures. The air conditioning device 701 comprises a casing 730 having a shape based on a rectangular parallelepiped. This casing 730 includes metal plates that cover a top surface 730*a*, a front surface 730*b*, a right side surface 730*c*, a left side surface 730*d*, a rear surface 730*e*, and a bottom surface 730*f*. The casing 730 has a third opening 733 on the top surface 730*a*. This third opening 733 is in communication with a heat source-side space SP1 (see FIG. 17G). A heat source-side fan 747, which blows the air of the heat source-side space SP1 through the third opening

733 and out of the casing 730, is attached to the third opening 733. As the heat source-side fan 747, a propeller fan is used, for example. Also, the casing 730 has slits 734 on the front surface 730*b*, the left side surface 730*d*, and the rear surface 730*e*. These slits 734 are also in communication with the heat source-side space SP1. When air is blown out of the heat source-side space SP1 by the heat source-side fan 747 toward the outside of the casing 730, the heat source-side space SP1 has a negative pressure against the atmospheric pressure, and outdoor air is sucked in from the outside of the casing 730 through the slits 734 into the heat source-side space SP1. Note that the third opening 733 and the slits 734 are not in communication with the utilization-side space SP2 (see FIG. 17G). Accordingly, in an ordinary state, there is no location other than the first duct 721 and the second duct 722 that is in communication with the outside of the casing 730 from the utilization-side space SP2.

A bottom plate 735 having a first opening 731 and a second opening 732 is attached to the bottom surface 730*f* of the casing 730. As shown in FIG. 17J, the first duct 721 is connected to the first opening 731 for the supply air. Also, as shown in FIG. 17J, the second duct 722 is connected to the second opening 732 for the return air. The air that has been returned from the rooms 810, which are the target spaces for air conditioning, through the second duct 722 to the utilization-side space SP2 of the casing 730 is sent from the utilization-side space SP2 to the rooms 810 through the first duct 721. Ribs 731*a* and 732*a* with a height of less than 3 cm are formed around the first opening 731 and the second opening 732 to reinforce the strength of the bottom plate 735 (see FIG. 17H). The ribs 731*a* and 732*a* are integrally formed with the bottom plate 735 by standing up a metal plate that is the material of the bottom plate 735 by press molding, for example, when the first opening 731 and the second opening 732 are formed on the bottom plate 735 by press molding.

(17-2-3) Internal Configuration of Air Conditioning Device 701

(17-2-3-1) Heat Source-Side Space SP1 and Utilization-Side Space SP2 in Casing 730

FIG. 17G shows a state where the metal plate covering the front surface 730*b* and the metal plate covering the left side surface 730*d* of the casing 730 have been removed. FIG. 17H shows a state where the metal plate covering the right side surface 730*c* and some metal plates covering the rear surface 730*e* of the casing 730 have been removed. In FIG. 17H, the removed metal plate among the metal plates covering the rear surface 730*e* is the metal plate covering the utilization-side space SP2. Accordingly, the metal plate shown in FIG. 17H, covering the rear surface 730*e*, covers only the heat source-side space SP1. And, FIG. 17I shows a state where the metal plate covering the right side surface 730*c*, the metal plate covering the left side surface 730*d*, the metal plates covering the rear surface 730*e*, and the metal plate covering a part of the top surface 730*a* of the casing 730 have been removed, and a heat source-side heat exchanger 743 and the heat source-side fan 747 have also been removed.

The heat source-side space SP1 and the utilization-side space SP2 are partitioned off by a partition plate 739. Outdoor air flows through the heat source-side space SP1 and indoor air flows through the utilization-side space SP2, but by partitioning off the heat source-side space SP1 and the utilization-side space SP2, the partition plate 739 blocks distribution of air between the heat source-side space SP1 and the utilization-side space SP2. Accordingly, in an ordinary state, the indoor air and the outdoor air do not mix in the casing 730, and the outdoors and the indoors are not in communication via the air conditioning device 701.

(17-2-3-2) Configuration Inside Heat Source-Side Space SP1

In addition to the heat source-side fan 747, the heat source-side space SP1 accommodates a compressor 741, a four-way valve 742, the heat source-side heat exchanger 743, and an accumulator 746. The heat source-side heat exchanger 743 includes multiple heat transfer pipes (not shown in the figure) in which the refrigerant flows, and multiple heat transfer fins (not shown in the figure) where air flows through gaps therebetween. The multiple heat transfer pipes are aligned in the vertical direction (hereinafter, also referred to as the row direction), and each heat transfer pipe extends in a direction substantially orthogonal to the vertical direction (substantially horizontal direction). Also, the multiple heat transfer pipes are provided in multiple columns in order from the side closer to the casing 730. At the end of the heat source-side heat exchanger 743, the heat transfer pipes are bent into U-shapes or connected to each other with U-shaped pipes, for example, such that the refrigerant flow is turned back from one column to another column and/or from one row to another row. The multiple heat transfer fins, extending long in the vertical direction, are aligned along the direction in which the heat transfer pipes extend, keeping a predetermined distance from each other. The multiple heat transfer fins and the multiple heat transfer pipes are combined such that multiple heat transfer pipes penetrate each heat transfer fin. And, the multiple heat transfer fins are also arranged in multiple columns.

The heat source-side heat exchanger 743 has a C shape in the top view, and is arranged so as to face the front surface 730*b*, the left side surface 730*d*, and the rear surface 730*e* of the casing 730. The part not surrounded by the heat source-side heat exchanger 743 is the part facing the partition plate 739. And, side ends, which are the two ends of the C shape, are arranged in the vicinity of the partition plate 739, and the space between the two side ends of the heat source-side heat exchanger 743 and the partition plate 739 is blocked by a metal plate (not shown in the figure) that blocks passage of air. Also, the heat source-side heat exchanger 743 has a height that substantially reaches from the bottom surface 730*f* to the top surface 730*a* of the casing 730. With such a configuration, a flow path is formed for air entering through the slits 734, passing through the heat source-side heat exchanger 743, and exiting from the third opening 733. When the outdoor air that has been sucked into the heat source-side space SP1 through the slits 734 passes through the heat source-side heat exchanger 743, it undergoes heat exchange with the refrigerant flowing in the heat source-side heat exchanger 743. The air after heat exchange in the heat source-side heat exchanger 743 is exhausted out of the casing 730 from the third opening 733 by the heat source-side fan 747.

(17-2-3-3) Configuration Inside Utilization-Side Space SP2

In the utilization-side space SP2, an expansion valve 744, a utilization-side heat exchanger 745, and a utilization-side fan 748 are arranged. As the utilization-side fan 748, a centrifugal fan is used, for example. Examples of the centrifugal fan include a sirocco fan. Note that the expansion valve 744 may be arranged in the heat source-side space SP1. As shown in FIG. 17H, the utilization-side fan 748 is arranged above the first opening 731 by means of a supporting stand 751. As shown in FIG. 17N, an outlet 748*b* of the utilization-side fan 748 is arranged at a position that does not overlap with the first opening 731 in the top view. Since the part other than the outlet 748*b* of the utilization-side fan 748 and the first opening 731 is surrounded by the supporting stand 751 and the casing 730, substantially all of the air blown out of the outlet 748*b* of the utilization-side fan 748 is supplied indoors from the first opening 731 through the first duct 721.

The utilization-side heat exchanger 745 includes multiple heat transfer pipes 745*a* (see FIG. 17M) in which the refrigerant flows, and multiple heat transfer fins (not shown in the figure) where air flows through gaps therebetween. The multiple heat transfer pipes 745*a* are aligned in the vertical direction (row direction), and each heat transfer pipe 745*a* extends in a direction substantially orthogonal to the vertical direction (in the second embodiment, left and right direction). Here, the refrigerant flows inside the multiple heat transfer pipes 745*a* in the left and right direction. Also, the multiple heat transfer pipes 745*a* are provided in multiple columns in the front and back direction. At the end of the utilization-side heat exchanger 745, the heat transfer pipes 745*a* are bent into U-shapes or connected to each other with U-shaped pipes, for example, such that the refrigerant flow is turned back from one column to another column and/or from one row to another row. The multiple heat transfer fins, extending long in the vertical direction, are aligned along the direction in which the heat transfer pipes 745*a* extend, keeping a predetermined distance from each other. And, the multiple heat transfer fins and the multiple heat transfer pipes 745*a* are combined such that multiple heat transfer pipes 745*a* penetrate each heat transfer fin. For example, copper pipes can be used for the heat transfer pipes 745*a* that constitute the utilization-side heat exchanger 745, and aluminum can be used for the heat transfer fins.

The utilization-side heat exchanger 745 has a shape that is short in front and back and long in top and bottom, and left and right. A drain pan 752 has a shape of a rectangular parallelepiped extending long to left and right, with the top surface removed. The drain pan 752 has a dimension in the front and back direction that is longer than the length of the front and back of the utilization-side heat exchanger 745, in the top view. The utilization-side heat exchanger 745 is fitted into such a drain pan 752. And, this drain pan 752 catches dew condensation water generated on the utilization-side heat exchanger 745 that drips downward. The drain pan 752 extends from the right side surface 730*c* of the casing 730 to the partition plate 739. A drainage outlet 752*a* of the drain pan 752 penetrates the right side surface 730*c* of the casing 730, and the dew condensation water caught by the drain pan 752 is drained out of the casing 730 through the drainage outlet 752*a*.

Also, the utilization-side heat exchanger 745 extends from the vicinity of the right side surface 730*c* of the casing 730 to the vicinity of the partition plate 739. The space between the right side surface 730*c* of the casing 730 and the right side 745*c* of the utilization-side heat exchanger 745 and the space between the partition plate 739 and the left side 745*d* of the utilization-side heat exchanger 745 are blocked with metal plates. The drain pan 752 is supported by a supporting frame 736 at a position with a height of hi based on the bottom plate 735, away from the bottom plate 735 upward. The supporting of the utilization-side heat exchanger 745 is assisted by an auxiliary frame 753, which includes rod-shaped frame members that fit around the top, bottom, left and right perimeters of the utilization-side heat exchanger 745 and are fixed directly or indirectly to the casing 730 and the partition plate 739. The space between the utilization-side heat exchanger 745 and the top surface 730*a* of the casing 730 is blocked by the utilization-side heat exchanger 745 itself or the auxiliary frame 753. In addition, the opening between the utilization-side heat exchanger 745 and the bottom plate 735 is blocked by the supporting stand 751 and the drain pan 752.

In this way, the utilization-side heat exchanger 745 divides the utilization-side space SP2 into a space on the upstream side than the utilization-side heat exchanger 745 and a space on the downstream side than the utilization-side heat exchanger 745. And, all of the air flowing from the upstream side to the downstream side of the utilization-side heat exchanger 745 passes through the utilization-side heat exchanger 745. The utilization-side fan 748 is arranged in the space on the downstream side of the utilization-side heat exchanger 745 and generates air flow passing through the utilization-side heat exchanger 745. The supporting stand 751, which has already been described, further divides the space on the downstream side of the utilization-side heat exchanger 745 into a space on the inlet side of the utilization-side fan 748 and a space on the outlet side.

(17-2-3-4) Refrigerant Circuit

FIG. 17K shows a refrigerant circuit 711 configured in the air conditioning device 701. The refrigerant circuit 711 includes the utilization-side heat exchanger 745 and the heat source-side heat exchanger 743. In this refrigerant circuit 711, the refrigerant is circulated between the utilization-side heat exchanger 745 and the heat source-side heat exchanger 743. In this refrigerant circuit 711, when a vapor compression type refrigeration cycle is being performed in cooling operation or heating operation, heat exchange is carried out between the utilization-side heat exchanger 745 and the heat source-side heat exchanger 743. In FIG. 17K, the arrow Ar3 indicates the supply air, which is the air flow on the downstream side of the utilization-side heat exchanger 745 and is blown out of the utilization-side fan 748, and the arrow Ar4 indicates the return air, which is the air flow on the upstream side of the utilization-side heat exchanger 745. Also, the arrow Ar5 indicates the air flow on the downstream side of the heat source-side heat exchanger 743, which is blown out of the third opening 733 by the heat source-side fan 747, and the arrow Ar6 indicates the air flow on the upstream side of the heat source-side heat exchanger 743, which is sucked in by the heat source-side fan 747 through the slits 734.

The refrigerant circuit 711 includes the compressor 741, the four-way valve 742, the heat source-side heat exchanger 743, the expansion valve 744, the utilization-side heat exchanger 745, and the accumulator 746. The four-way valve 742 is switched to the state of connection shown by the solid line during cooling operation, and is switched to the state of connection shown by the dashed line during heating operation.

During cooling operation, the gas refrigerant that has been compressed by the compressor 741 is sent through the four-way valve 742 to the heat source-side heat exchanger 743. This refrigerant dissipates heat to the outdoor air in the heat source-side heat exchanger 743 and is sent through refrigerant piping 712 to the expansion valve 744. In the expansion valve 744, the refrigerant is expanded and decompressed, and then sent through the refrigerant piping 712 to the utilization-side heat exchanger 745. The low-temperature, low-pressure refrigerant that has been sent from the expansion valve 744 undergoes heat exchange in the utilization-side heat exchanger 745 to remove heat from the indoor air. The cooled air, which has been deprived of heat in the utilization-side heat exchanger 745, is supplied through the first duct 721 to the rooms 810. The gas refrigerant or gas-liquid two phase refrigerant that has undergone heat exchange in the utilization-side heat exchanger 745 passes through refrigerant piping 713, the four-way valve 742, and the accumulator 746, and is inhaled into the compressor 741.

During heating operation, the gas refrigerant that has been compressed by the compressor 741 is sent through the four-way valve 742 and the refrigerant piping 713 to the utilization-side heat exchanger 745. This refrigerant undergoes heat exchange with the indoor air in the utilization-side heat exchanger 745 to give heat to the indoor air. The heated air, which has been given heat in the utilization-side heat exchanger 745, is supplied through the first duct 721 to the rooms 810. The refrigerant that has undergone heat exchange in the utilization-side heat exchanger 745 is sent through the refrigerant piping 712 to the expansion valve 744. The low-temperature, low-pressure refrigerant, which has been expanded and decompressed by the expansion valve 744, is sent through the refrigerant piping 712 to the heat source-side heat exchanger 743, and undergoes heat exchange in the heat source-side heat exchanger 743 to obtain heat from the outdoor air. The gas refrigerant or gas-liquid two phase refrigerant that has undergone heat exchange in the heat source-side heat exchanger 743 passes through the four-way valve 742 and the accumulator 746, and is inhaled into the compressor 741.

(17-2-3-5) Control System

FIG. 17L shows a main controller 760 that controls the air conditioning device 701 and main equipment controlled by that main controller 760. The main controller 760 controls the compressor 741, the four-way valve 742, the heat source-side fan 747, and the utilization-side fan 748. The main controller 760 is configured to be able to communicate with a remote controller 762. The user can send the set value for the indoor temperature and the like of the rooms 810 from the remote controller 762 to the main controller 760.

For the control of the air conditioning device 701, multiple temperature sensors for measuring the refrigerant temperature at each section of the refrigerant circuit 711 and/or pressure sensors for measuring the pressure at each section, as well as temperature sensors for measuring the air temperature at each location, are provided.

The main controller 760 carries out at least on/off control of the compressor 741, on/off control of the heat source-side fan 747, and on/off control of the utilization-side fan 748. Note that, when any or all of the compressor 741, the heat source-side fan 747, and the utilization-side fan 748 have a motor of a type whose number of rotations can be changed, the main controller 760 may be configured to be able to control the number of rotations of the motor with a variable number of rotations among those of the compressor 741, the heat source-side fan 747, and the utilization-side fan 748. In that case, the main controller 760 can change the circulation amount of refrigerant flowing through the refrigerant circuit 711 by changing the number of rotations of the motor of the compressor 741. By changing the number of rotations of the motor of the heat source-side fan 747, the main controller 760 can change the flow rate of the outdoor air flowing between heat transfer fins of the heat source-side heat exchanger 743. Also, by changing the number of rotations of the motor of the utilization-side fan 748, the main controller 760 can change the flow rate of the indoor air flowing between heat transfer fins of the utilization-side heat exchanger 745.

A refrigerant leak sensor 761 is connected to the main controller 760. When the refrigerant gas leaked into the air is at or above the lower detection limit concentration, the refrigerant leak sensor 761 sends a signal that indicates the detection of a refrigerant gas leak to the main controller 760.

The main controller 760 is, for example, one that is realized by a computer. The computer that constitutes the main controller 760 comprises a control arithmetic device and a memory device. As the control arithmetic device, a processor such as CPU or GPU can be used. The control arithmetic device reads a program memorized in the memory device and carries out a predetermined image processing and arithmetic processing, following this program. Furthermore, the control arithmetic device can write arithmetic results to the memory device or read information memorized in the memory device, following the program. However, the main controller 760 may be configured using an integrated circuit (IC) that can carry out control similar to that carried out using a CPU and a memory. The IC here includes LSIs (large-scale integrated circuits), ASICs (application-specific integrated circuits), gate arrays, FPGAs (field programmable gate arrays), and the like.

In the present embodiment, the refrigerant circuit 711 is filled with a refrigerant for carrying out a vapor compression type refrigeration cycle. That refrigerant is a mixed refrigerant containing 1,2-difluoroethylene, and any Refrigerant A can be used.

(17-3) Third Embodiment

FIG. 17O shows the configuration of an air conditioning device 601 according to the third embodiment. This air conditioning device 601 is configured to carry out indoor ventilation and humidity control. A sensible heat exchanger 622 is provided in the central section in a casing 621 of the air conditioning device 601. The sensible heat exchanger 622 is one that does not exchange moisture among distributed air, but functions to carry out only heat exchange of sensible heat.

The air conditioning device 601 comprises a compressor 633, an outdoor heat exchanger 634, which is a heat source-side heat exchanger, an air supply heat exchanger 625, which is a utilization-side heat exchanger, an air supply duct 651, which supplies supply air SA to multiple rooms indoors, an air return duct 652, which intakes indoor air RA from indoors, an inlet duct 653, which intakes outdoor air OA from outdoors, and the casing 621. A first air before undergoing heat exchange with a refrigerant in the air supply heat exchanger 625 is the outdoor air OA, and a first air after undergoing heat exchange with a refrigerant in the air supply heat exchanger 625 is the supply air SA. Outdoor air with which the outdoor heat exchanger 634 causes heat exchange is a second air. The outdoor air, which is the second air, and the outdoor air OA, which is the first air, are different from each other.

A refrigerant containing at least 1,2-difluoroethylene is circulated through the compressor 633, the air supply heat exchanger 625, and the outdoor heat exchanger 634 to repeat a refrigeration cycle. In further details, the refrigerant is compressed in the compressor 633, condensed in the outdoor heat exchanger 634, decompressed in a capillary tube 636, and evaporated in the air supply heat exchanger 625. Instead of the capillary tube 636, an expansion valve can be used.

The space in the casing 621 that includes an air supply passage 641 and an outdoor air passage 643 is a utilization-side space that is connected to the air supply duct 651 and accommodates the air supply heat exchanger 625. The casing 621 is configured to be able to send out the supply air SA (first air) that has undergone heat exchange with the refrigerant in the air supply heat exchanger 625 to the air supply duct 651. The air supply duct 651 is a first duct and the inlet duct 653 is a third duct.

Here, when viewed from a different perspective, the air conditioning device 601 can be regarded as being constituted of a utilization-side unit 602 and a heat source-side unit 603. The utilization-side unit 602 and the heat source-side unit 603 are units separate from each other. The utilization-side unit 602 has the casing 621, the sensible heat exchanger 622, the air supply heat exchanger 625, an exhaust fan 627, an air supply fan 628, and a humidifier 629. The heat source-side unit 603 comprises the compressor 633, the outdoor heat exchanger 634, and the capillary tube 636. The utilization-side unit 602 is configured to connect the casing 621 to the inlet duct 653, which is the third duct, and to lead the outdoor air OA, which is the first air taken in from outdoors, to the air supply heat exchanger 625, which is the utilization-side heat exchanger.

The air supply passage 641 and an inlet passage 644 are formed on the indoor side than this sensible heat exchanger 622. An exhaust passage 642 and the outdoor air passage 643 are formed on the outdoor side than the sensible heat exchanger 622. The air supply fan 628 and the humidifier 629 are provided in the air supply passage 641. The exhaust fan 627 is provided in the exhaust passage 642. The air supply heat exchanger 625 is provided in the outdoor air passage 643. This air supply heat exchanger 625 is connected to the heat source-side unit 603. In the heat source-side unit 603, the compressor 633, the outdoor heat exchanger 634, and the capillary tube 636, which constitute a refrigerant circuit 610 together with the above air supply heat exchanger 625, are provided. The compressor 633, the outdoor heat exchanger 634, and the capillary tube 636 are connected by refrigerant piping 645. An outdoor fan (not shown in the figure) is established in parallel to the outdoor heat exchanger 634. In the air conditioning device 601, by driving the exhaust fan 627, the indoor air RA is sucked into the inlet passage 644, and by driving the air supply fan 628, the outdoor air OA is sucked into the outdoor air passage 643. At this time, the outdoor air OA sucked into the outdoor air passage 643 is cooled and dehumidified in the above air supply heat exchanger 625, which functions as an evaporator, and reaches the sensible heat exchanger 622. In this sensible heat exchanger 622, it undergoes exchange of sensible heat with the above indoor air RA that has been sucked into the inlet passage 644. As a result of this sensible heat exchange, only the temperature of the above outdoor air OA becomes approximately the same as that of the indoor air RA while remaining dehumidified, and it is supplied to indoors as the supply air SA. Meanwhile, the indoor air RA that has been cooled in the sensible heat exchanger 622 is discharged to outdoors as exhaust air EA.

The air conditioning device 601 of the third embodiment cools the outdoor air OA in the air supply heat exchanger 625. The air that has been cooled by the air supply heat exchanger 625 reaches the sensible heat exchanger 622. The air conditioning device 601 causes sensible heat exchange between the air that has been cooled in the air supply heat exchanger 625 and the indoor air RA in the sensible heat exchanger 622. Then, the air conditioning device 601 supplies the air that has undergone sensible heat exchange with the indoor air RA to indoors as the supply air SA.

However, the configuration for introducing outdoor air is not limited to this configuration. For example, an air conditioning device first causes sensible heat exchange between the outdoor air OA and the indoor air RA in the sensible heat exchanger. Thereafter, the air conditioning device cools the air that has undergone sensible heat exchange with the indoor air RA, in the utilization-side heat exchanger. The air conditioning device supplies the air that has been cooled in the utilization-side heat exchanger to indoors as the supply air SA.

The air conditioning device may be configured to heat outdoor air OA and supply it to indoors so as to cope with a season when the temperature of outdoor air is low. Such an air conditioning device causes sensible heat exchange between the outdoor air OA and the indoor air RA in the sensible heat exchanger, for example. The air conditioning device then heats the air that has undergone sensible heat exchange with the indoor air RA, in the utilization-side heat exchanger. The air conditioning device supplies the air that has been heated in the utilization-side heat exchanger to indoors as the supply air SA.

By comprising the configuration as mentioned above, the above-mentioned air conditioning device can cool or heat the outdoor air OA, whose temperature has been regulated in the sensible heat exchanger earlier, in the utilization-side heat exchanger later, thereby increasing the efficiency of the refrigeration cycle.

In the present embodiment, the refrigerant circuit 610 is filled with a refrigerant for carrying out a vapor compression type refrigeration cycle. That refrigerant is a mixed refrigerant containing 1,2-difluoroethylene, and any Refrigerant A can be used.

(17-4) Characteristics

The air conditioning devices (1, 601, and 701) of the first embodiment, the second embodiment, and the third embodiment mentioned above comprise the compressor (321, 633, or 741), the indoor heat exchanger 242, air supply heat exchanger 625, or utilization-side heat exchanger 745, the outdoor heat exchanger 323, 634, or heat source-side heat exchanger 743, any Refrigerant A, the first duct 209, 721, or air supply duct 651, and the casing 230, 621, or 730.

The indoor heat exchanger 242, air supply heat exchanger 625, or utilization-side heat exchanger 745 is a utilization-side heat exchanger that causes heat exchange with the first air. The outdoor heat exchanger 323, 634, or heat source-side heat exchanger 743 is a heat source-side heat exchanger that causes heat exchange with the second air. The first duct 209, 721, or air supply duct 651 is a first duct that supplies the first air to the multiple rooms 101 to 104 or 810 indoors. Refrigerant A contains at least 1,2-difluoroethylene, and is circulated through the compressor, the utilization-side heat exchanger, and the heat source-side heat exchanger to repeat a refrigeration cycle. The casing 230, 621, or 730 has the utilization-side space SP2, which is connected to the first duct 209, 721, or air supply duct 651 and accommodates the indoor heat exchanger 242, air supply heat exchanger 625, or utilization-side heat exchanger 745, and is configured to send out the first air that has been undergone heat exchange with the refrigerant in the indoor heat exchanger 242, air supply heat exchanger 625, or utilization-side heat exchanger 745 to the first duct 209, 721, or air supply duct 651.

Since the air conditioning devices 1, 601, and 701 configured as described above supply the first air after heat exchange to the multiple rooms by the first duct 209, 721, or air supply duct 651, the configuration of the refrigerant circuits 320, 711, and 610 is simplified, thereby making it possible to reduce the amount of refrigerant to be filled in the air conditioning devices 1, 601, and 701.

(18) EMBODIMENTS OF TECHNOLOGY OF EIGHTEENTH GROUP

(18-1) First Embodiment

A refrigeration cycle shown in FIG. 18A is a vapor compression type refrigeration cycle using a zeotropic mixed refrigerant. In FIG. 18A, 1 is a compressor, 2 is a utilization-side heat exchanger, 3 is a heat source-side heat exchanger, and 4 is a first capillary tube that acts as an expansion mechanism. These pieces of equipment are connected via a four-way switching valve 5 to constitute a reversible cycle. 6 is an accumulator.

In the present embodiment, the refrigerant cycle is filled with a refrigerant for carrying out a vapor compression type refrigeration cycle. That refrigerant is a mixed refrigerant containing 1,2-difluoroethylene, and any Refrigerant A can be used.

In this refrigeration cycle, the heat source-side heat exchanger 3 is divided into a first heat exchange section 31 and a second heat exchange section 32. These first and second heat exchange sections 31 and 32 are connected in series via a second capillary tube 7 as a decompression mechanism. During heating operation, the evaporating pressure of the mixed refrigerant is reduced by the second capillary tube 7 while it is flowing through the heat source-side heat exchanger 3. 8 is a check valve provided to allow the mixed refrigerant to bypass the second capillary tube 7 during cooling operation.

The compressor 1, the heat source-side heat exchanger 3, the first capillary tube 4, the four-way switching valve 5, the accumulator 6, and the second capillary tube 7 are arranged in a heat source unit 50 outdoors. The utilization-side heat exchanger 2 is arranged in a utilization unit 60 indoors.

The utilization unit 60 is fixed with its rear surface to a side wall WL indoors, as shown in FIG. 18B. Indoor air flows into the utilization-side heat exchanger 2 from the front side (left side in FIG. 18B) and the top side of the utilization unit 60. The utilization-side heat exchanger 2 has a third heat exchange section 21 located on the front side of the utilization unit 60 and a fourth heat exchange section 22 located on the rear side of the utilization unit 60. At the vicinity of the top of the third heat exchange section 21, the top of the fourth heat exchange section 22 is located. The third heat exchange section 21 extends diagonally downward from its top toward the front side of the utilization unit 60. The fourth heat exchange section 22 extends diagonally downward from its top toward the rear side of the utilization unit 60. The volume of a refrigerant flow path of the third heat exchange section 21 is larger than the volume of a refrigerant flow path of the fourth heat exchange section 22. The wind velocity of air passing through the third heat exchange section 21 is fast, while the wind velocity of air passing through the fourth heat exchange section 22 is slow, and the third heat exchange section 21 and the fourth heat exchange section are designed so as to have volumes of refrigerant flow paths corresponding to them. As a result, the efficiency of heat exchange in the utilization-side heat exchanger 2 also becomes high.

Next, the setting of each decompression amount by each capillary tube 4 or 7 will be described based on a Mollier chart in FIG. 18C.

In FIG. 18C, T1 is an isotherm showing the frost limit temperature (for example, −3° C.) and T2 is an isotherm showing the standard outdoor air temperature during heating operation (for example, 7° C.).

The decompression amount of the first capillary tube 4 present at the inlet side of the first heat exchange section 31 is set so as to be a pressure P1, at which the evaporating temperature of the refrigerant at the inlet of the first heat exchange section 31 is a temperature T3, which is slightly higher than the frost limit temperature T1, during heating operation.

The decompression amount of the second capillary tube 7 arranged between the first and second heat exchange sections 31 and 32 is determined in correspondence with the temperature gradient of the mixed refrigerant. Specifically, it is set to perform decompression to a pressure P2, at which the evaporating temperature at the inlet of the second heat exchange section 32 is a temperature T5, which is at or above the frost limit temperature T1, and the evaporating temperature at the outlet of the second heat exchange section 32 is a temperature T6, which is below the standard outdoor air temperature T2.

Next, the action of the refrigeration cycle will be described.

In heating operation, the four-way switching valve (5) is switched to the state shown by the solid line in FIG. 18A to form a heating cycle. And, when the compressor 1 is driven, the mixed refrigerant is circulated through the compressor 1, the utilization-side heat exchanger 2, the first capillary tube 4, the heat source-side heat exchanger 3, and the accumulator 6 in this order. The change in state of the mixed refrigerant due to this circulation will be described using the Mollier chart in FIG. 18C.

The mixed refrigerant is discharged from the compressor 1 as a high-temperature, high-pressure gas with a pressure P0 (point C1 in FIG. 18C). Thereafter, the refrigerant is condensed in the utilization-side heat exchanger 2 at the same pressure to a liquid state (C2). Next, the refrigerant is expanded (decompressed) in the first capillary tube 4 to become a state with the pressure P1 and flows into the first heat exchange section 31 of the heat source-side heat exchanger 3 (C3).

The refrigerant that has flowed into the first heat exchange section 31 starts evaporation at the temperature T3, which is higher than the frost limit temperature T1, near the inlet of the first heat exchange section 31, and along with this evaporation, the evaporating temperature rises to T4 (but equal to or lower than T2) near the outlet of the first heat exchange section 31 (C4). This mixed refrigerant that has been flowed out of the first heat exchange section 31 is again decompressed in the second capillary tube 7 to the pressure P2. Along with this, the evaporating temperature at the inlet of the second heat exchange section 32 drops to the temperature T5, which is lower than the evaporating temperature at the outlet of the first heat exchange section 31 and higher than the frost limit temperature T1 (C5).

Along with the evaporation in the second heat exchange section 32, the evaporating temperature of the refrigerant rises, and near the outlet of the second heat exchange section 32, the refrigerant becomes a gas refrigerant with the temperature T6, which is lower than the standard outdoor air temperature T2. Thereafter, the refrigerant is returned to the compressor 1, where it is compressed again.

As described above, since the second capillary tube 7 as a decompression mechanism is provided between the first heat exchange section 31 and the second heat exchange section 32 of the heat source-side heat exchanger 3, the difference in evaporating temperature between the inlet and outlet of the heat source-side heat exchanger 3 is small. In other words, in this refrigeration cycle, the range of rise in the evaporating temperature in the heat source-side heat exchanger 3 is small. As a result, the evaporating temperature can be kept within a suitable evaporating temperature range, thus avoiding frosting (frost formation) in the heat source-side heat exchanger 3, and also ensuring the difference between the outdoor air temperature and the evaporating temperature. Due to these effects, the efficiency of heat exchange in the heat source-side heat exchanger 3 is improved in this refrigeration cycle.

Also, in this refrigeration cycle, even when a mixed refrigerant with a large temperature gradient in the evaporating temperature is used, capacity reduction of the heat source-side heat exchanger 3 is suppressed.

Note that, when the four-way switching valve 5 is switched to the state shown by the dashed line, cooling operation can be carried out, but this is the same as in conventional operation, and therefore description will be omitted.

(18-2) Second Embodiment

A refrigeration cycle shown in FIG. 18D is a heat pump-type refrigeration device using a zeotropic refrigerant, as in the refrigeration cycle of the above first embodiment. The difference from the first embodiment is that the capacity can be increased or decreased by changing the compositional features of the mixed refrigerant depending on the load. Specifically, a gas-liquid separator 9 is provided between third and fourth capillary tubes 41 and 42, which act as expansion mechanisms. An inlet gas pipe 10 is provided with a container for refrigerant storage 11. One end of the container 11 is connected to the gas region of the gas-liquid separator 9 via a first opening/closing valve 12. The other end of the container 11 is connected to the inlet gas pipe 10 via a second opening/closing valve 13.

By making the second opening/closing valve 13 in a closed state and making the first opening/closing valve 12 in an open state, it becomes possible to allow the mixed refrigerant with a high proportion of a low-boiling point refrigerant to flow into the container 11 from the gas-liquid separator 9 and to be condensed and stored. As a result, the composition ratio of a high-boiling point refrigerant in the circulated mixed refrigerant is increased, which can reduce the capacity.

Also, when the second opening/closing valve 13 is made in an open state and the first opening/closing valve 12 is made in a closed state, the composition ratio of the mixed refrigerant returns to the original level again and the capacity is increased.

Since the other configurations are the same as those in the first embodiment, the same reference signs as in the configuration of the first embodiment are given in FIG. 18D and description will be omitted.

Note that, in each of the above embodiments, the evaporating pressure in heating operation is set to two steps, but the evaporating pressure may be changed to three or more steps by dividing the heat source-side heat exchanger 3 into three or more sections and providing a decompression mechanism in between each of these divided heat exchange sections.

Also, in each of the above embodiments, the capillary tube 7 is provided as a decompression mechanism, but the decompression mechanism may be configured by selecting the inner diameter of heat transfer pipes of the heat source-side heat exchanger 3 such that an appropriate decompression gradient is obtained.

In addition, the decompression amount of the decompression mechanism does not necessarily have to be such that the evaporating temperature at the inlet of the heat source-side heat exchanger 3 during heating operation is at or above the frost limit temperature.

(19) EMBODIMENTS OF TECHNOLOGY OF NINETEENTH GROUP

(19-1) First Embodiment

In the present embodiment, a refrigerant circuit 10 is filled with a refrigerant for carrying out a vapor compression type refrigeration cycle. That refrigerant is a mixed refrigerant containing 1,2-difluoroethylene, and any Refrigerant A can be used.

FIG. 19A is a piping system diagram of the refrigerant circuit 10 of an air conditioning machine 1 according to the first embodiment of the present disclosure. This air conditioning machine 1 is a heat pump-type air conditioning machine that is capable of cooling operation and heating operation. As shown in FIG. 19A, the air conditioning machine 1 comprises an outdoor machine 100 installed outdoors and an indoor machine 200 installed indoors. The outdoor machine 100 and the indoor machine 200 are connected to each other via first connection piping 11 and second connection piping 12 and constitute the refrigerant circuit 10 in which the refrigerant is circulated to carry out a vapor compression type refrigeration cycle.

<Indoor Machine>

The indoor machine 200 is provided with an indoor heat exchanger 210 for causing heat exchange between the refrigerant and outdoor air. As this indoor heat exchanger 210, a cross fin-type, fin and tube heat exchanger can be employed, for example. Also, an indoor fan 211 is installed in the vicinity of the indoor heat exchanger 210.

<Outdoor Machine>

The outdoor machine 100 is provided with a compressor 13, an oil separator 14, an outdoor heat exchanger 15, an outdoor fan 16, an expansion valve 17, an accumulator 18, a four-way switching valve 19, a refrigerant jacket 20, and an electric circuit 30, which are accommodated in a case (an outdoor machine casing 70, which will be mentioned later).

The compressor 13 inhales the refrigerant from an inlet port, compresses it, and discharges the compressed refrigerant from a discharge port. As this compressor 13, a variety of compressors can be employed, such as scroll compressors.

The oil separator 14 separates the refrigerant discharged from the compressor 13, which is mixed with a lubricating oil, into the refrigerant and the lubricating oil, and sends the refrigerant to the four-way switching valve 19 and returns the lubricating oil to the compressor 13.

The outdoor heat exchanger 15 is an air heat exchanger for causing heat exchange between the refrigerant and outdoor air, and is, for example, a cross fin-type, fin and tube heat exchanger or the like. In the vicinity of the outdoor heat exchanger 15, an outdoor fan 16 is installed for blowing the outdoor air to the outdoor heat exchanger 15.

The expansion valve 17 is connected to the outdoor heat exchanger 15 and the indoor heat exchanger 210, and expands the refrigerant that has flowed in to reduce its pressure to a predetermined pressure and then allows it to flow out. The expansion valve 17 can be constituted of, for example, an electronic expansion valve whose degree of opening is variable.

The accumulator 18 separates the refrigerant that flows in into gas and liquid, and sends the separated gas refrigerant to the compressor 13.

The four-way switching valve 19 is provided with four ports, from the first to the fourth. The four-way switching valve 19 can be switched between a first state in which the first port and the third port are in communication while the second port and the fourth port are in communication (the state shown by the solid line in FIG. 19A), and a second state in which the first port and the fourth port are in communication while the second port and the third port are in communication (the state shown by the dashed line in FIG. 19A). In this outdoor machine 100, the first port and the second port are connected to the discharge port of the compressor 13 via the oil separator 14, and to the inlet port of the compressor 13 via the accumulator 18, respectively. Also, the third port and the fourth port are connected to the second connection piping 12 via the outdoor heat exchanger 15 and the expansion valve 17 and to the first connection piping 11, respectively. And, when cooling operation is carried out in the outdoor machine 100, it is switched to the first state, and when heating operation is carried out, it is switched to the second state.

The refrigerant jacket 20 is obtained by forming a metal such as aluminum into the shape of a flat rectangular parallelepiped, for example, and covers a part of refrigerant piping 21 that connects the outdoor heat exchanger 15 to the expansion valve 17 and is thermally connected to the refrigerant piping 21. In details, this refrigerant jacket 20 is provided with two through holes into which the refrigerant piping 21 is fitted, as shown in FIG. 19B, and the refrigerant piping 21 passes through one of the through holes, then turns back in a U shape, and passes through the other through hole. That is, the refrigerant used in the refrigeration cycle is distributed inside the refrigerant jacket 20.

The electric circuit 30 carries out control of the number of rotations and the like of an electric motor of the compressor 13. This electrical circuit 30 is formed on a printed substrate 31, and the printed substrate 31 is fixed by spacers 32 inside a switch box 40. On this printed substrate 31, as shown in FIG. 19B, a power element 33 and other elements are arranged. This power element 33 is, for example, a switching element of an inverter circuit that supplies electric power to the electric motor of the compressor 13 and generates heat when the compressor 13 is in operation, and unless the power element 33 is cooled down, the temperature at which the power element 33 can run (for example, 90° C.) may be exceeded. Therefore, in the air conditioning machine 1, the power element 33 is designed to be cooled by the refrigerant distributed in the refrigerant jacket 20.

Specifically, in the air conditioning machine 1, as shown in FIG. 19B, the refrigerant jacket 20 is fixed to the switch box 40 to cool the power element 33 inside the switch box 40. In more details, the switch box 40 is formed into the shape of a flat box with one surface open, through holes 40*a* are provided on the surface facing the opening, and a heat transfer plate 50 formed into the shape of a plate is fixed with attaching screws 51 to cover the through holes 40*a*. The heat transfer plate 50 is constituted of a material with relatively low thermal resistance, such as aluminum.

To this heat transfer plate 50, the refrigerant jacket 20 is fixed with attaching screws 51 from outside of the switch box 40, and the power element 33 is fixed with attaching screws 51 from inside of the switch box 40. In this structure, the heat of the power element 33 is conducted to the refrigerant jacket 20 via the heat transfer plate 50 and dissipated to the refrigerant distributed in the refrigerant jacket 20.

In details, in the refrigerant jacket 20, the refrigerant condensed in the outdoor heat exchanger 15 and at a lower temperature than that of the power element 33 flows during cooling operation, and the refrigerant condensed in the indoor heat exchanger 210 and at a lower temperature than that of the power element 33 flows during heating operation. Therefore, the heat generated by the power element 33 of the electric circuit 30 is transferred to the refrigerant jacket 20 via the heat transfer plate 50, and is dissipated to the refrigerant in the refrigerant piping 21 in the refrigerant jacket 20. As a result of this, the power element 33 is maintained at an operable temperature.

FIG. 19C is a diagram schematically showing the transverse sectional shape of the outdoor machine 100, showing the arrangement of main components such as the compressor 13. As shown in FIG. 19C, the outdoor machine casing 70 is partitioned off into two by a partition plate 60. In one compartment (heat exchange room), the outdoor heat exchanger 15, whose cross sectional shape is formed into an L shape, is arranged facing a side surface and the rear surface of the outdoor machine casing 70, and the outdoor fan 16 is installed in the vicinity of this outdoor heat exchanger 15. Also, in the other compartment (machine room), the refrigerant jacket 20, the compressor 13, the switch box 40, and the like are arranged. In details, this outdoor machine casing 70 is provided with a service opening 71 penetrating into the machine room on the surface of the front side, and the switch box 40 is arranged such that the side of the heat transfer plate 50 faces the front side as seen from the service opening 71. In addition, the refrigerant jacket 20 is arranged on the front side than the heat transfer plate 50 (that is, on the front side than the power element 33) as seen from the service opening 71.

—Assembly of Switch Box 40 into Outdoor Machine Casing 70—

In the present embodiment, the printed substrate 31 and the heat transfer plate 50 are attached to the switch box 40 in advance. Specifically, the heat transfer plate 50 is first fixed to the switch box 40 with attaching screws 51, and in that state, the printed substrate 31 is placed inside the switch box 40 and fixed to the switch box 40 via the spacers 32, and also the power element 33 is fixed and thermally connected to the heat transfer plate 50 with attaching screws 51. The switch box 40 thus assembled is placed into the outdoor machine casing 70 from the service opening 71 when the air conditioning machine 1 is produced or when the printed substrate 31 is reassembled for repair, for example.

FIG. 19D is a front view of the outdoor machine 100. In this example, the outdoor machine casing 70 is provided with a space above the refrigerant jacket 20 through which the switch box 40 is allowed to pass, and the service opening 71 is also open to this space. And, the switch box 40 is incorporated into the outdoor machine casing 70 from this service opening 71. In this case, the switch box 40 is placed on the back side than the refrigerant jacket 20, by having it overcome the above of the refrigerant jacket 20. At this time, the switch box 40 is arranged such that the side of the heat transfer plate 50 is on the front side (that is, the side facing the refrigerant jacket 20). Then, in this state, the refrigerant jacket 20 and the heat transfer plate 50 are fixed with attaching screws 51.

At this time, if there is a gap between the refrigerant jacket 20 and the heat transfer plate 50, heat exchange is not carried out properly between the refrigerant jacket 20 and the power element 33, and the desired cooling effect cannot be obtained. In the present embodiment, since the refrigerant jacket 20 is arranged on the front side than the power element 33 as seen from the service opening 71, when the refrigerant jacket 20 and the heat transfer plate 50 are to be fixed with attaching screws 51, the connection state between the two can be visually confirmed. Therefore, according to the present embodiment, it is possible to properly connect the refrigerant jacket 20 to the power element 33 at the time of production or repair, thereby achieving the desired cooling effect.

(19-2) Second Embodiment

In the present embodiment as well, the refrigerant is a mixed refrigerant containing 1,2-difluoroethylene, and any Refrigerant A can be used.

FIG. 19E shows the internal configuration of an outdoor machine 100 of an air conditioning machine 1 according to the second embodiment of the present disclosure. The outdoor machine 100 of the present embodiment differs from the first embodiment in that the refrigerant jacket 20 is configured with a heat pipe 20A attached to a heat dissipation plate 50. The heat pipe 20A is a pipe in which a refrigerant is enclosed. The heat pipe 20A is not in communication with a refrigerant circuit that carries out a refrigeration cycle, and thus does not transfer the refrigerant to and from the refrigerant circuit.

The outdoor machine 100 according to the second embodiment has a casing 70 and a partition plate 60 provided in the casing 70. The partition plate 60 partitions the internal space of the casing 70 into a heat exchange room 81, a machine room 82, and a control equipment room 83. The machine room 82 is provided with a compressor 13, an accumulator 18, inlet piping 91, and coupling piping 92. The compressor 13, the accumulator 18, the inlet piping 91, and the coupling piping 92 belong to the refrigerant circuit that carries out the refrigeration cycle. The inlet piping 91 introduces the refrigerant in the low-pressure gas state to the accumulator 18. The coupling piping 92 communicates between the inlet of the compressor 13 and the accumulator 18. The control equipment room 83 is provided with a power element 33, the heat dissipation plate 50, and the refrigerant jacket 20. The power element 33 is thermally connected to the refrigerant jacket 20, as in the first embodiment.

The refrigerant jacket 20, that is, the heat pipe 20A, has a left end vertical section X, an inclined section Y, and a right end vertical section Z. The left end vertical section X is configured to be in contact with the heat dissipation plate 50. In the right end vertical section Z, the inlet piping 91 is arranged so as to be in contact with it via an elastic body 93. The elastic body 93 has a relatively large thermal conductivity, and is, for example, silicon rubber.

The heat generated by the power element 33 is transferred to the heat pipe 20A at the left end vertical section X. This heat evaporates the refrigerant inside the left end vertical section X. The gas refrigerant generated by the evaporation rises up the inclined section Y to reach the right end vertical section Z. The gas refrigerant releases heat to the inlet piping 91 at the right end vertical section Z. This causes the gas refrigerant to be condensed and changed into a liquid refrigerant. The liquid refrigerant descends down the inclined section Y to reach the left end vertical section X. As described above, the power element 33 is cooled by an inexpensive configuration using the heat pipe 20A.

(20) EMBODIMENT OF TECHNOLOGY OF TWENTIETH GROUP

(20-1) Embodiment

Hereinafter, an air conditioning machine according to one embodiment of the present disclosure will be described. In the present embodiment, a refrigerant circuit of an air conditioning machine 10 is filled with a refrigerant for carrying out a vapor compression type refrigeration cycle. That refrigerant is a mixed refrigerant containing 1,2-difluoroethylene, and any Refrigerant A can be used.

<Entire Configuration of Air Conditioning Machine 10>

As shown in FIG. 20A, the air conditioning machine 10 of the present embodiment comprises a refrigerant circuit in which a compressor 1, a four-way valve 2, an outdoor heat exchanger 3, an expansion valve 4 as one example of a decompressor, a first indoor heat exchanger 5, a solenoid valve for dehumidification 6, and a second indoor heat exchanger 7 are connected in an annular shape. Also, the air conditioning machine 10 comprises an outdoor fan 8 arranged in the vicinity of the outdoor heat exchanger 3 and an indoor fan 9 arranged in the vicinity of the first indoor heat exchanger 5 and the second indoor heat exchanger 7. The solenoid valve for dehumidification 6 is arranged between the first indoor heat exchanger 5 and the second indoor heat exchanger 7.

In the air conditioning machine 10, during cooling operation, the four-way valve 2 is switched to the position shown in the solid line with the solenoid valve for dehumidification 6 being in an open state, and the refrigerant discharged from the compressor 1 passes through the outdoor heat exchanger 3, the expansion valve 4, the first indoor heat exchanger 5, the solenoid valve for dehumidification 6, and the second indoor heat exchanger 7 to be returned to the inlet side of the compressor 1. In this refrigerant circuit, the heat is dissipated in the outdoor heat exchanger 3, which works as a condenser, and the indoor air is cooled in the first indoor heat exchanger 5 and the second indoor heat exchanger 7, which work as evaporators, to carry out cooling. On the other hand, during heating operation, the four-way valve 2 is switched to the position shown in the dotted line with the solenoid valve for dehumidification 6 being in an open state, and heating is carried out in the opposite refrigeration cycle from that during cooling operation.

And, in reheat dehumidification operation, the expansion valve 4 is opened while closing the solenoid valve for dehumidification 6 to a narrowed state, and furthermore, the four-way valve 2 is switched to the position shown in the solid line, and the refrigerant discharged from the compressor 1 passes through the outdoor heat exchanger 3, the expansion valve 4, the first indoor heat exchanger 5, the solenoid valve for dehumidification 6, and the second indoor heat exchanger 7 to be returned to the inlet side of the compressor 1. In this refrigerant circuit, the outdoor heat exchanger 3 and the first indoor heat exchanger 5 work as condensers, whereas the second indoor heat exchanger 7 works as an evaporator. Accordingly, while warming the indoor air in the first indoor heat exchanger 5, dehumidification and cooling are carried out in the second indoor heat exchanger 7, thereby carrying out dehumidification without lowering the indoor temperature. Therefore, comfort is maintained in the reheat dehumidification operation.

FIG. 20B shows the case where the solenoid valve for dehumidification 6 is in an open state, and FIG. 20C shows the case where the solenoid valve for dehumidification 6 is in a narrowed state (closed state). The solenoid valve for dehumidification 6 comprises a valve main body 20 and an opening/closing mechanism 30, as shown in FIG. 20B and FIG. 20C. The valve main body 20 has a cylindrical section 11 having a valve chamber 19 and a valve seat 12 formed at the bottom inside that valve chamber 19, a valve body 13 having a tapered surface 13*b* facing a tapered surface 12*a* of the valve seat 12, and a guide section 14 that is internally fitted at the top of the cylindrical section 11 and guides an axial section 13*a* of the valve body 13 in the axial direction. The cylindrical section 11 is provided with an inlet 11*a* to which an inlet-side passage 31 is connected, and an outlet 11*b* to which an outlet-side passage 32 is connected.

Also, the opening/closing mechanism 30 has a coil spring 15 arranged outside the axial section 13*a* of the valve body 13, a cylinder-shaped plunger 16 fixed to the end of the axial section 13*a* of the valve body 13, an electromagnetic guide 17 arranged inside the plunger 16, and an electromagnetic coil 18 arranged outside the plunger 16 and the electromagnetic guide 17. The coil spring 15 biases the plunger 16 toward the side of the electromagnetic guide 17.

And, multiple grooves (bleed grooves) 21 are provided on the tapered surface 12*a* of the valve seat 12, as shown in FIG. 20D. Accordingly, as shown in FIG. 20C, when the solenoid valve for dehumidification 6 is in a narrowed state (closed state), refrigerant narrowed flow paths with small gaps are configured between the tapered surface 13*b* of the valve body 13 and the tapered surface 12*a* of the valve seat 12 by the multiple grooves 21 present on the tapered surface 12*a* of the valve seat 12.

In the solenoid valve for dehumidification 6 configured as described above, when the electromagnetic coil 18 is electrified, an electromagnetic force is generated between the electromagnetic guide 17 and the plunger 16, causing the plunger 16 to move downward against the bias force of the coil spring 15, and the tapered surface 13*b* of the valve body 13 comes into contact with the tapered surface 12*a* of the valve seat 12. Accordingly, although the space between the tapered surface 13*b* of the valve body 13 and the tapered surface 12*a* of the valve seat 12 is shut off, the refrigerant narrowed flow paths with small gaps are configured by the multiple grooves 21 present on the tapered surface 12*a* of the valve seat 12. Therefore, the solenoid valve for dehumidification 6 comes to a narrowed state (closed state), and the inlet 11*a* to which the inlet-side passage 31 is connected and the outlet 11*b* to which the outlet-side passage 32 is connected are in communication by the multiple grooves 21 of the valve seat 12.

Also, when the electrification to the electromagnetic coil 18 is stopped, the electromagnetic force between the electromagnetic guide 17 and the plunger 16 disappears, which causes the plunger 16 to move upward by the bias force of the coil spring 15, and the tapered surface 13*b* of the valve body 13 moves away from the tapered surface 12*a* of the valve seat 12. Accordingly, the solenoid valve for dehumidification 6 comes to an open state, and the inlet 11*a* to which the inlet-side passage 31 is connected and the outlet 11*b* to which the outlet-side passage 32 is connected are in communication.

In the embodiment described above, the air conditioning machine 10 comprises the solenoid valve for dehumidification 6, which can be switched to be open or closed. Instead of this, the air conditioning machine 10 may comprise an expansion valve for dehumidification whose degree of opening can be regulated.

(21) EMBODIMENT OF TECHNOLOGY OF TWENTY-FIRST GROUP

(21-1) Entire Configuration of Air Conditioning Machine

As shown in FIG. 21A, an air conditioning machine 1 of the present embodiment comprises an indoor machine 2 installed indoors and an outdoor machine 3 installed outdoors. And, the air conditioning machine 1 comprises a refrigerant circuit 50 connecting a compressor 10, a four-way valve 11, an outdoor heat exchanger 12, an expansion valve 13, and an indoor heat exchanger 14. In the refrigerant circuit 50, the outdoor heat exchanger 12 is connected to the discharge hole of the compressor 10 via the four-way valve 11, and the expansion valve 13 is connected to that outdoor heat exchanger 12. And, one end of the indoor heat exchanger 14 is connected to the expansion valve 13, and the inlet of the compressor 10 is connected to the other end of that indoor heat exchanger 14 via the four-way valve 11. The indoor heat exchanger 14 has an auxiliary heat exchanger 20 and a main heat exchanger 21.

The refrigerant circuit 50 is filled with a refrigerant for carrying out a vapor compression type refrigeration cycle. That refrigerant is a mixed refrigerant containing 1,2-difluoroethylene, and any Refrigerant A can be used.

The air conditioning machine 1 can be operated in a cooling operation mode, a predetermined dehumidification operation mode, and a heating operation mode, and with a remote controller 41, any of the operation modes can be selected to carry out an operation start manipulation, an operation switching manipulation, and an operation stop manipulation. Also, with the remote controller 41, the preset temperature for the indoor temperature can be set and the air volume of the indoor machine 2 can be changed by changing the number of rotations of an indoor fan.

In the cooling operation mode and the predetermined dehumidification operation mode, as shown by the solid line arrows in the figure, a cooling cycle or dehumidification cycle is formed in which the refrigerant discharged from the compressor 10 flows from the four-way valve 11 to the outdoor heat exchanger 12, the expansion valve 13, the auxiliary heat exchanger 20, and the main heat exchanger 21 in this order, and the refrigerant that has passed through the main heat exchanger 21 passes through the four-way valve 11 to be returned to the compressor 10. That is, the outdoor heat exchanger 12 functions as a condenser and the indoor heat exchanger 14 (the auxiliary heat exchanger 20 and the main heat exchanger 21) functions as an evaporator.

On the other hand, in the heating operation mode, by switching of the four-way valve 11, as shown by the dashed line arrow in the figure, a heating cycle is formed in which the refrigerant discharged from the compressor 10 flows from the four-way valve 11 to the main heat exchanger 21, the auxiliary heat exchanger 20, the expansion valve 13, and the outdoor heat exchanger 12 in this order, and the refrigerant that has passed through the outdoor heat exchanger 12 passes through the four-way valve 11 to be returned to the compressor 10. That is, the indoor heat exchanger 14 (the auxiliary heat exchanger 20 and the main heat exchanger 21) functions as a condenser and the outdoor heat exchanger 12 functions as an evaporator.

The indoor machine 2 shown in FIG. 21B has an indoor air inlet 2*a* on the top surface and an outlet 2*b* for air conditioning air on the lower front surface. In the indoor machine 2, an air flow path is formed from the inlet 2*a* toward the outlet 2*b*, and in this air flow path, the indoor heat exchanger 14 and a lateral flow-type indoor fan 16 are arranged. Accordingly, when the indoor fan 16 is rotated, the indoor air is sucked into the indoor machine 2 from the inlet 2*a*. On the front side of the indoor machine 2, the air sucked in from the inlet 2*a* flows through the auxiliary heat exchanger 20 and the main heat exchanger 21 to the side of the indoor fan 16. On the other hand, on the rear side of the indoor machine 2, the air sucked in from the inlet 2*a* flows through the main heat exchanger 21 to the side of the indoor fan 16.

As mentioned above, the indoor heat exchanger 14 has the main heat exchanger 21 arranged on the downstream side of the auxiliary heat exchanger 20. The main heat exchanger 21 has a front heat exchanger 21*a* arranged on the front side of the indoor machine 2 and a rear heat exchanger 21*b* arranged on the rear side of the indoor machine 2, and these heat exchangers 21*a* and 21*b* are arranged in the shape of an inverted V to surround the indoor fan 16. Then, the auxiliary heat exchanger 20 is arranged in front of the front heat exchanger 21*a*. The auxiliary heat exchanger 20 and the main heat exchanger 21 (the front heat exchanger 21*a* and the rear heat exchanger 21*b*) each comprise heat exchange pipes and a large number of fins.

In the cooling operation mode and the predetermined dehumidification operation mode, as shown in FIG. 21C, a liquid refrigerant is supplied from a liquid inlet 17*a* arranged near the lower end of the auxiliary heat exchanger 20, and the supplied liquid refrigerant flows closer to the upper end of the auxiliary heat exchanger 20. Then, it flows out of an outlet 17*b* arranged near the upper end of the auxiliary heat exchanger 20 and flows to a branch section 18*a*. The refrigerant branched at the branch section 18*a* is supplied from three inlets 17*c* of the main heat exchanger 21 to each of the lower part and upper part of the front heat exchanger 21*a*, and the rear heat exchanger 21*b*, and then flows out of the outlet 17*d* and merges at a merging section 18*b*. Also, in the heating operation mode, the refrigerant flows in the opposite direction from the above.

And, when the air conditioning machine 1 is operated in the predetermined dehumidification operation mode, the liquid refrigerant that has been supplied from the liquid inlet 17*a* of the auxiliary heat exchanger 20 is entirely evaporated in the middle of the auxiliary heat exchanger 20. Accordingly, only a limited area near the liquid inlet 17*a* of the auxiliary heat exchanger 20 is an evaporation zone 61 where the liquid refrigerant is evaporated. Therefore, when the air conditioning machine is operated in the predetermined dehumidification operation mode, in the indoor heat exchanger 14, only a part of the upstream side of the auxiliary heat exchanger 20 is the evaporation zone 61, and the range on the downstream side of the evaporation zone 61 of the auxiliary heat exchanger 20 and the main heat exchanger 21 are both superheat zones 62.

And, the refrigerant that has flowed through the superheat zone 62 near the upper end of the auxiliary heat exchanger 20 flows through the lower part of the front heat exchanger 21*a*, which is arranged on the downwind side of the lower part of the auxiliary heat exchanger 20. Accordingly, in the air sucked in from the inlet 2*a*, the air cooled in the evaporation zone 61 of the auxiliary heat exchanger 20 is heated in the front heat exchanger 21*a* and then blown out of the outlet 2*b*. On the other hand, in the air sucked in from the inlet 2*a*, the air that has flowed through the superheat zone 62 of the auxiliary heat exchanger 20 and the front heat exchanger 21*a*, and the air that has flowed through the rear heat exchanger 21*b* are blown out of the outlet 2*b* at the approximately same temperature as the indoor temperature.

In the air conditioning machine 1, as shown in FIG. 21A, an evaporating temperature sensor 30 is attached to the outdoor machine 3 to detect the evaporating temperature on the downstream side of the expansion valve 13 in the refrigerant circuit 50. And, an indoor temperature sensor 31, which detects the indoor temperature (temperature of the air sucked in from the inlet 2*a* of the indoor machine 2), and an indoor heat exchange temperature sensor 32, which detects the completion of the evaporation of the liquid refrigerant in the auxiliary heat exchanger 20, are attached to the indoor machine 2.

The indoor heat exchange temperature sensor 32 is arranged on the downwind side near the upper end of the auxiliary heat exchanger 20, as shown in FIG. 21C. And, in the superheat zone 62 near the upper end of the auxiliary heat exchanger 20, the air sucked in from the inlet 2*a* is hardly cooled. Accordingly, when the temperature detected by the indoor heat exchange temperature sensor 32 is approximately the same as the indoor temperature detected by the indoor temperature sensor 31, it can be detected that evaporation is completed in the middle of the auxiliary heat exchanger 20 and the range near the upper end of the auxiliary heat exchanger 20 is the superheat zone 62. Also, the indoor heat exchange temperature sensor 32 is arranged in a heat transfer pipe in the middle section of the indoor heat exchanger 14. Accordingly, the condensation temperature or evaporating temperature in the cooling and heating operations can be detected near the middle section of the indoor heat exchanger 14.

As shown in FIG. 21D, to a control section 40 of the air conditioning machine 1, the compressor 10, the four-way valve 11, the expansion valve 13, a motor 16*a* that drives the indoor fan 16, the evaporating temperature sensor 30, the indoor temperature sensor 31, and the indoor heat exchange temperature sensor 32 are connected. Accordingly, the control section 40 controls the operation of the air conditioning machine 1 based on a command from the remote controller 41 (operation start manipulation, preset temperature for the indoor temperature, and the like), the evaporating temperature detected by the evaporating temperature sensor 30, the indoor temperature (temperature of the air sucked in) detected by the indoor temperature sensor 31, and the heat exchange intermediate temperature detected by the indoor heat exchange temperature sensor 32.

And, in the predetermined dehumidification operation mode of the air conditioning machine 1, the auxiliary heat exchanger 20 has the evaporation zone 61 where the liquid refrigerant is evaporated and the superheat zone 62 on the downstream side of the evaporation zone 61, and the compressor 10 and the expansion valve 13 are controlled such that the range of this evaporation zone 61 changes depending on the load. Here, the term "changes depending on the load" means that it changes depending on the amount of heat supplied to the evaporation zone 61, and the amount of heat is determined by, for example, the indoor temperature (temperature of the air sucked in) and the indoor air volume. Also, the load corresponds to the required dehumidification capacity (required cooling capacity), which can be detected based on the difference between the indoor temperature and the preset temperature, for example.

The compressor 10 is controlled based on the difference between the indoor temperature and the preset temperature. When the difference between the indoor temperature and the preset temperature is large, the load is large, so the frequency of the compressor 10 is controlled to be increased, and when the difference between the indoor temperature and the preset temperature is small, the load is small, so the frequency of the compressor 10 is controlled to be decreased.

The expansion valve 13 is controlled based on the evaporating temperature detected by the evaporating temperature sensor 30. As mentioned above, in a state where the frequency of the compressor 10 is controlled, the expansion valve 13 is controlled such that the evaporating temperature is a temperature within a predetermined range (10° C. to 14° C.) near the target evaporating temperature (12° C.). It is preferable that this predetermined range of the evaporating temperature is controlled to be constant regardless of the frequency of the compressor 10. However, it does not matter as long as the predetermined range is substantially constant, even if it changes slightly depending on the frequency.

As described above, in the predetermined dehumidification operation mode, the control section 40 changes the range of the evaporation zone 61 of the auxiliary heat exchanger 20 by controlling the compressor 10 and the expansion valve 13 depending on the load. The control section 40 can control the evaporating temperature to be within the predetermined range by changing the range of the evaporation zone 61 of the auxiliary heat exchanger 20.

In the air conditioning machine 1, the auxiliary heat exchanger 20 and the front heat exchanger 21*a* each have 12 stages of heat transfer pipes. And, when the number of stages that serve as the evaporation zone 61 of the auxiliary heat exchanger 20 in the predetermined dehumidification operation mode is half or more of the number of stages of the front heat exchanger 21*a*, the range of the evaporation zone 61 of the auxiliary heat exchanger can be sufficiently broad, and therefore, fluctuations of the load can be sufficiently coped with. This is particularly effective when the load is large.

FIG. 21E shows the change in flow rate when the degree of opening is changed in the expansion valve 13. As for the expansion valve 13, the degree of opening continuously changes depending on the number of driving pulses to be input. And, as the degree of opening is decreased, the flow rate of the refrigerant flowing through the expansion valve 13 is decreased. The expansion valve 13 is in a fully closed state at a degree of opening t0, and between degrees of opening t0 and t1, the flow rate is increased following a first slope as the degree of opening is increased, and between degrees of opening t1 and t2, the flow rate is increased following a second slope as the degree of opening is increased. Here, the first slope is greater than the second slope.

As for the control carried out to change the range of the evaporation zone 61 of the auxiliary heat exchanger 20, one example will be described. For example, in the predetermined dehumidification operation mode, in the case where the load has become large when the range of the evaporation zone 61 of the auxiliary heat exchanger 20 has a predetermined area, the frequency of the compressor 10 is increased and also the degree of opening of the expansion valve 13 is changed to be larger. Accordingly, the range of the evaporation zone 61 of the auxiliary heat exchanger 20 becomes larger than the predetermined area, and even if the air volume sucked into the indoor machine 2 remains constant, the air volume that actually passes through the evaporation zone 61 is increased.

On the other hand, in the predetermined dehumidification operation mode, in the case where the load has become small when the range of the evaporation zone 61 of the auxiliary heat exchanger 20 has a predetermined area, the frequency of the compressor 10 is decreased and also the degree of opening of the expansion valve 13 is changed to be smaller. Accordingly, the range of the evaporation zone 61 of the auxiliary heat exchanger 20 becomes smaller than the predetermined area, and even if the air volume sucked into the indoor machine 2 remains constant, the air volume that actually passes through the evaporation zone 61 is decreased.

Description will be given for motion in the case where the dehumidification operation mode is selected in the remote controller 41 of the air conditioning machine 1 to carry out a manipulation for starting operation (start manipulation for the dehumidification operation mode). In the air conditioning machine 1, in the case where the load is large when the start manipulation for the dehumidification operation mode is carried out, a second operation in which only a portion of the auxiliary heat exchanger 20 serves as the evaporation zone 61 is not started, but a first operation is started and then switched to the second operation depending on a decrease in the load. Here, the first operation is an operation in which the entire auxiliary heat exchanger 20 serves as the evaporation zone 61 and the air that has undergone heat exchange in the indoor heat exchanger 14 is blown out to indoors.

And, in the air conditioning machine 1, the load is detected based on the frequency of the compressor, which changes corresponding to the difference between the indoor temperature and the preset temperature. Accordingly, when the frequency of the compressor 10 is smaller than a predetermined frequency, the air conditioning machine 1 detects that the load is small and the evaporating temperature is too high for dehumidification in the first operation. Also, when the evaporating temperature (evaporating temperature detected by the evaporating temperature sensor 30 or the heat exchange intermediate temperature detected by the indoor heat exchange temperature sensor 32) is detected and that evaporating temperature is lower than a predetermined temperature, the air conditioning machine 1 is not switched to the second operation because sufficient dehumidification can be achieved even by the first operation. Accordingly, in the air conditioning machine 1, the second operation is started when the compressor frequency is smaller than the predetermined frequency and the evaporating temperature is higher than the predetermined temperature.

As shown in FIG. 21F, at first, when the start manipulation for the dehumidification operation mode is carried out in the remote controller 41 (step S1), it is determined whether the compressor frequency is smaller than the predetermined frequency or not and the evaporating temperature is higher than the predetermined temperature or not (step S2). The predetermined frequency is the upper limit frequency in the dehumidification operation mode. The predetermined temperature is the dehumidification limit temperature in the first operation. Then, when it is determined that the compressor frequency is at or above the predetermined frequency or the evaporating temperature is at or below the predetermined temperature (step S2: NO), the first operation is started (step S3). Thereafter, the determination of step S2 is repeated. On the other hand, in step S2, when it is determined that the compressor frequency is smaller than the predetermined frequency or the evaporating temperature is higher than the predetermined temperature (step S2: YES), the second operation is started (step S4).

Note that, in the cooling operation mode, for example, the air conditioning machine 1 is controlled by the control section 40 such that the first operation is carried out and the entire indoor heat exchanger 14 functions as an evaporator.

(21-2) Characteristics of Air Conditioning Machine 1 of Present Embodiment (21-2-1)

In the dehumidification operation mode of the air conditioning machine 1 of the present embodiment, the auxiliary heat exchanger 20 serves as the first heat exchanger to evaporate the refrigerant in the evaporation zone 61, and the outdoor heat exchanger 12 serves as the second heat exchanger to condense the refrigerant. In the air conditioning machine 1, the expansion valve 13 is a decompression section that decompresses the refrigerant. This air conditioning machine 1 has the refrigerant circuit 50 that can evaporate the refrigerant in the evaporation zone 61 of the indoor heat exchanger 14, which is the first heat exchanger, to perform dehumidification and that is simplified.

In the case where the load is large when the start manipulation for the dehumidification operation mode is carried out, the air conditioning machine 1 of the present embodiment can efficiently carry out dehumidification and cooling at the same time by starting the first operation because even the first operation can perform sufficient dehumidification due to a low temperature of the heat exchanger. Then, as the temperature in the room declines and the load becomes smaller, the evaporating temperature becomes too high for the first operation to dehumidify the room, and at that point, the air conditioning machine is switched to the second operation. In this way, the impact of COP worsening due to dehumidification can be minimized.

Also, after the first operation is started by the start manipulation for the dehumidification operation mode, in the case where the evaporating temperature is lower than the predetermined temperature, the air conditioning machine 1 of the present embodiment is not switched to the second operation. In this case, since the evaporating temperature is lower than the predetermined value, dehumidification can be performed without switching from the first operation to the second operation.

(21-2-2)

When seen in further details, in the air conditioning machine 1, the auxiliary heat exchanger 20 can be regarded as the first heat exchanger. When seen in this way, the air conditioning machine 1 comprises the main heat exchanger 21, which is arranged downwind from the auxiliary heat exchanger 20 as the first heat exchanger. When the first operation is carried out by the start manipulation for the dehumidification operation mode, the entire auxiliary heat exchanger 20 functions as the evaporation zone. When the entire auxiliary heat exchanger 20 functions as the evaporation zone, the control section 40 may be configured such that the entire main heat exchanger 21 can be controlled to function as the evaporation zone. When the entire auxiliary heat exchanger 20 functions as the evaporation zone, the control section 40 may be configured such that a part of the main heat exchanger 21 can be controlled to function as the evaporation zone. When the entire auxiliary heat exchanger 20 functions as the evaporation zone, the control section 40 may be configured such that the entire main heat exchanger 21 can be controlled to function as the superheat zone. Also, the control section 40 may be configured by combining one or more of these configurations. For this purpose, an indoor heat exchange temperature sensor may be added as appropriate.

(21-3) Modifications (21-3-1) Modification A

In the above-mentioned embodiment, the case where the auxiliary heat exchanger 20 is provided on the front heat exchanger 21*a* and not provided on the rear heat exchanger 21*b* has been described. However, the auxiliary heat exchanger 20 may be provided on the most upwind side of the rear heat exchanger 21*b*.

(21-3-2) Modification B

In the above-mentioned embodiment, the auxiliary heat exchanger and the main heat exchanger may be integrally configured. Accordingly, in this case, the indoor heat exchanger is integrally configured, and the part corresponding to the auxiliary heat exchanger is provided on the most upwind side of the indoor heat exchanger, and the part corresponding to the main heat exchanger is provided on its downwind side.

In this case, the first operation is operation in which the entire part corresponding to the auxiliary heat exchanger on the most upwind side of the indoor heat exchanger is used as the evaporation zone, and the second operation is operation in which the entire part corresponding to the auxiliary heat exchanger on the most upwind side of the indoor heat exchanger is used as the evaporation zone.

(21-3-3) Modification C

Also, in the above-mentioned embodiment, the air conditioning machine that is operated in the cooling operation mode, the predetermined dehumidification operation mode, and the heating operation mode has been described, but it may be an air conditioning machine that is operated in a dehumidification operation mode in which dehumidification operation is carried out in a way other than the predetermined dehumidification operation mode.

(21-3-4) Modification D

The above-mentioned embodiment can also be seen as considering the indoor heat exchanger 14 as the first heat exchanger, and using a part of the first heat exchanger as the evaporation zone in the dehumidification operation mode, and using the entire first heat exchanger as the evaporation zone in the cooling operation mode.

(22) EMBODIMENTS OF TECHNOLOGY OF TWENTY-SECOND GROUP (22-1) Refrigeration Cycle Devices Next, refrigeration cycle devices according to embodiments of the present disclosure will be described with reference to drawings.

The refrigeration cycle devices of the embodiments described below of the present disclosure are characterized by that, at least at the time of predetermined operation, the flow of the refrigerant and the flow of a heat medium that is to undergo heat exchange with the refrigerant in at least one of the heat source-side and the utilization-side heat exchangers are in counter flow. Hereinafter, for the sake of simplicity of description, refrigeration cycle devices having such characteristics may be referred to as refrigeration cycle devices having a counter flow heat exchanger. Note that the term "counter flow" means that the flow direction of the refrigerant in the heat exchanger is in the opposite direction to the flow direction of the external heat medium (the heat medium flowing outside the refrigerant circuit). In other words, the counter flow means that, in the heat exchanger, the refrigerant flows from the downstream side to the upstream side of the direction in which the external heat medium flows. Note that, in the following description, when the flow direction of the refrigerant in the heat exchanger is in the forward direction relative to the flow direction of the external heat medium, or in other words, when the refrigerant flows in the heat exchanger from the upstream side to the downstream side of the direction in which the external heat medium flows, the refrigerant flow is referred to as being in parallel flow.

The counter flow heat exchanger will be described using specific examples.

In the case where the external heat medium is a liquid (for example, water), the heat exchanger can be a double pipe-type heat exchanger as shown in FIG. 22A (a), and for example, the flow of the refrigerant and the flow of the external heat medium can be made to be in counter flow by allowing the external heat medium to flow from one side to the other (top side to bottom side in the figure) inside an inner pipe P1 of a double pipe and the refrigerant to flow from the other side to one side (bottom side to top side in the figure) inside an outer pipe P2. Also, the heat exchanger can be a heat exchanger with a configuration in which a helical pipe P4 is wound around the outer circumferential surface of a cylindrical pipe P3, as shown in FIG. 22A (b), and the flow of the refrigerant and the flow of the external heat medium can be made to be in counter flow by, for example, allowing the external heat medium to flow from one side to the other (top side to bottom side in the figure) inside the cylindrical pipe P3 and the refrigerant to flow from the other side to one side (bottom side to top side in the figure) inside the helical pipe P4. Furthermore, although not shown in the figure, counter flow may be realized in other publicly known heat exchangers, such as plate-type heat exchangers, by setting the direction in which the refrigerant flows in the opposite direction to that of the external heat medium.

When the external heat medium is air, the heat exchanger can be a fin tube-type heat exchanger as shown in FIG. 22B, for example. The fin tube-type heat exchanger has, for example, multiple fins F established in parallel at a predetermined interval and U-shaped heat transfer pipes P5 meandering in the plan view, as shown in FIG. 22B. In the fin tube-type heat exchanger, multiple columns (two columns in FIG. 22B) of mutually parallel straight sections that the heat transfer pipes P5 have are provided to penetrate the multiple fins F. Of the two ends of each heat transfer pipe P5, one is the incurrent hole of the refrigerant and the other is the excurrent hole of the refrigerant. By allowing the refrigerant to flow from the downstream side of the air distribution direction Y to the upstream side, as shown by the arrow X in the figure, the flow of the refrigerant and the flow of the external heat medium in the heat exchanger can be made to be in counter flow.

Note that the refrigerant enclosed in the refrigerant circuit of the refrigeration cycle devices according to the present disclosure is a mixed refrigerant containing 1,2-difluoroethylene, and any Refrigerant A can be used. With Refrigerant A, the temperature of the heat medium rises or falls during evaporation and condensation.

This kind of refrigeration cycle that involves changes in the temperature (temperature glide) during evaporation and condensation is called a Lorentz cycle. In the Lorentz cycle, the temperature difference between the refrigerant during evaporation and condensation is reduced since each of the evaporator and condenser, which functions as the heat exchangers for carrying out heat exchange, is of the counter flow type, but a temperature difference large enough to effectively transfer heat between the refrigerant and the external heat medium is maintained, allowing for efficient heat exchange. Also, another advantage of a refrigeration cycle device having a counter flow heat exchanger is that the pressure difference is also minimized. Thus, a refrigeration cycle device having a counter flow heat exchanger can bring about improvements in energy efficiency and capacity compared to conventional systems.

(22-1-1) First Embodiment

FIG. 22C is a schematic configuration diagram of a refrigeration cycle device 10 according to one example.

Note that the description here will use as an example the case where the refrigerant and the air as the external heat medium undergo heat exchange in a utilization-side heat exchanger 15 of the refrigeration cycle device 10, which will be mentioned later, but the utilization-side heat exchanger 15 may cause heat exchange with a liquid (for example, water) as the external heat medium. Also, the description here will use as an example the case where the refrigerant and a liquid as the external heat medium undergo heat exchange in a heat source-side heat exchanger 13 of the refrigeration cycle device 10, which will be mentioned later, but the utilization-side heat exchanger 15 may cause heat exchange with air as the external heat medium. In other words, the combination of refrigerant and external heat medium that undergo heat exchange with each other in the heat source-side heat exchanger 13 and the utilization-side heat exchanger 15 may be any of (liquid, air), (air, liquid), (liquid, liquid), and (air, air). This applies to other embodiments as well.

Here, the refrigeration cycle device 10 is an air conditioning device. However, the refrigeration cycle device 10 is not limited to an air conditioning device, and it may be, for example, a refrigerator, a freezer, a water cooler, an ice machine, a refrigeration showcase, a freezing showcase, a freezing and refrigeration unit, a refrigerating machine used in a freezing and refrigeration warehouse or the like, a chiller (chilling unit), a turbo refrigerator, a screw refrigerator, or the like.

Also, here, in the refrigeration cycle device 10, the heat source-side heat exchanger 13 is used as a condenser for the refrigerant, the utilization-side heat exchanger 15 is used as an evaporator for the refrigerant, and the external heat medium (air in the present embodiment) is cooled in the utilization-side heat exchanger 15, but the device is not limited to this configuration. In the refrigeration cycle device 10, the heat source-side heat exchanger 13 may be used as an evaporator for the refrigerant, the utilization-side heat exchanger 15 may be used as a condenser for the refrigerant, and the external heat medium (air in the present embodiment) may be heated in the utilization-side heat exchanger 15. In this case, however, the flow direction of the refrigerant is the opposite to that of FIG. 22C. In this case, counter flow is achieved by setting the direction of the external heat medium flowing through the heat exchangers 13 and 15 to be also opposite to that of FIG. 22C. Note that, when the heat source-side heat exchanger 13 is used as an evaporator for the refrigerant and the utilization-side heat exchanger 15 is used as a condenser for the refrigerant, the refrigeration cycle device 10 may be not only an air conditioning device (heating device) but also a hot water supply device, floor heating device, or the like, although the application is not limited.

In the refrigeration cycle device 10, a mixed refrigerant containing 1,2-difluoroethylene is enclosed, and it has a refrigerant circuit 11 in which the refrigerant is circulated. Note that, for the mixed refrigerant containing 1,2-difluoroethylene, any Refrigerant A can be used.

The refrigerant circuit 11 mainly has a compressor 12, a heat source-side heat exchanger 13, an expansion mechanism 14, and a utilization-side heat exchanger 15, and is configured by sequentially connecting these pieces of equipment 12 to 15 and the like. In the refrigerant circuit 11, the refrigerant is circulated in the direction of the solid line arrows in FIG. 22C.

The compressor 12 is equipment that compresses a low-pressure gas refrigerant to discharge a high-temperature, high-pressure gas refrigerant in the refrigeration cycle. The high-pressure gas refrigerant that has been discharged from the compressor 12 is supplied to the heat source-side heat exchanger 13.

The heat source-side heat exchanger 13 functions as a condenser that condenses the high-temperature, high-pressure gas refrigerant that has been compressed in the compressor 12. The heat source-side heat exchanger 13 is arranged in a machine room, for example. In the present embodiment, a liquid (here, cooling water) is supplied to the heat source-side heat exchanger 13 as the external heat medium. The heat source-side heat exchanger 13 is not limited to, but is a double pipe-type heat exchanger, for example. In the heat source-side heat exchanger 13, the refrigerant and the external heat medium undergo heat exchange, thereby condensing the high-temperature, high-pressure gas refrigerant into a high-pressure liquid refrigerant. The high-pressure liquid refrigerant that has passed through the heat source-side heat exchanger 13 is sent to the expansion mechanism 14.

The expansion mechanism 14 is equipment for decompressing the high-pressure liquid refrigerant that has dissipated heat in the heat source-side heat exchanger 13 until it reaches the low pressure in the refrigeration cycle. As the expansion mechanism 14, an electronic expansion valve is used, for example.

However, a temperature sensing expansion valve may be used as the expansion mechanism 14, as shown in FIG. 22D. When a temperature sensing expansion valve is used as the expansion mechanism 14, the temperature sensing expansion valve detects the temperature of the refrigerant that has passed through the utilization-side heat exchanger 15 with a temperature sensing cylinder directly connected to the expansion valve, and controls the degree of opening of the expansion valve based on the detected refrigerant temperature. This means that, for example, when the utilization-side heat exchanger 15, the expansion valve, and the temperature sensing cylinder are provided in the utilization-side unit, control of the expansion valve is completed only in the utilization-side unit. As a result, communication regarding the control of the expansion valve between the heat source-side unit, where the heat source-side heat exchanger 13 is provided, and the utilization-side unit is not necessary, and low cost and omission of construction work can be accomplished. Note that, when a temperature sensing expansion valve is used for the expansion mechanism 14, it is preferable that a solenoid valve 17 is arranged on the side of the heat source-side heat exchanger 13 of the expansion mechanism 14.

Alternatively, the expansion mechanism 14 may be a capillary tube (not shown in the figure).

The low-pressure liquid refrigerant or gas-liquid two phase refrigerant that has passed through the expansion mechanism 14 is supplied to the utilization-side heat exchanger 15.

The utilization-side heat exchanger 15 functions as an evaporator to evaporate the low-pressure liquid refrigerant. The utilization-side heat exchanger 15 is arranged in the target space for air conditioning. In the present embodiment, to the utilization-side heat exchanger 15, air as the external heat medium is supplied by a fan 16. The utilization-side heat exchanger 15 is not limited to, but is a fin tube-type heat exchanger, for example. The refrigerant and the air undergo heat exchange in the utilization-side heat exchanger 15, and the low-pressure liquid refrigerant is thus evaporated to become a low-pressure gas refrigerant, while the air as the external heat medium is cooled. The low-pressure gas refrigerant that has passed through the utilization-side heat exchanger 13 is supplied to the compressor 12 and is again circulated in the refrigerant circuit 11.

In the refrigeration cycle device 10 described above, during operation, both the heat source-side heat exchanger 13 and the utilization-side heat exchanger 15 are counter flow heat exchangers.

<Characteristics of Refrigeration Cycle Device>

The refrigeration cycle device 10 comprises the refrigerant circuit 11 that includes the compressor 12, the heat source-side heat exchanger 13, the expansion mechanism 14, and the utilization-side heat exchanger 15. In the refrigerant circuit 11, a refrigerant containing at least 1,2-difluoroethylene (HFO-1132 (E)) is enclosed. At least at the time of predetermined operation, the flow of the refrigerant and the flow of the heat medium that is to undergo heat exchange with the refrigerant in at least one of the heat source-side heat exchanger 13 and the utilization-side heat exchanger 15 are in counter flow.

The present refrigeration cycle device uses the refrigerant with a low global warming potential, containing 1,2-difluoroethylene (HFO-1132 (E)), and realizes highly efficient operation with effective utilization of the heat exchangers 13 and 15.

Note that, when the heat exchangers 13 and 15 are functioning as a condenser for the refrigerant, the temperature of the refrigerant passing through them tends to be lower at the outlet side than at the inlet side. However, in the case where the heat exchangers 13 and 15 when functioning as a condenser are configured to be of the counter flow type, it is easy to ensure a sufficient temperature difference between the air and the refrigerant at both the inlet side and the outlet side for the refrigerant of the heat exchangers 13 and 15.

Also, when the heat exchangers 13 and 15 are functioning as an evaporator for the refrigerant, the temperature of the refrigerant passing through them tends to be higher at the outlet side than at the inlet side. However, in the case where the heat exchangers 13 and 15 when functioning as an evaporator are configured to be of the counter flow type, it is easy to ensure a sufficient temperature difference between the air and the refrigerant at both the inlet side and the outlet side for the refrigerant of the heat exchangers 13 and 15.

Modifications

The refrigeration cycle device 10 may have a refrigerant circuit 11 that has multiple (two in the example shown in the figure) expansion mechanisms 14 and utilization-side heat exchangers 15 in parallel, as shown in FIG. 22E. Also, although not shown in the figure, the refrigerant circuit 11 may have multiple heat source-side heat exchangers 13 arranged in parallel, or may have multiple compressors 12.

Alternatively, in the refrigeration cycle device 10, the refrigerant circuit 11 may further have a flow path switching mechanism 18, as shown in FIG. 22F. The flow path switching mechanism 18 is a mechanism that switches the destination of the gas refrigerant discharged from the compressor 12 to either one of the heat source-side heat exchanger 13 or the utilization-side heat exchanger 15. The flow path switching mechanism 18 is, but not limited to, a four-way switching valve, for example, and the flow path switching mechanism may be realized by multiple valves. By using the flow path switching mechanism 18, it is possible to switch between cooling operation, in which the heat source-side heat exchanger 13 functions as a condenser and the utilization-side heat exchanger 15 functions as an evaporator, and heating operation, in which the heat source-side heat exchanger 13 functions as an evaporator and the utilization-side heat exchanger 15 functions as a condenser.

Note that, in the example shown in FIG. 22F, during cooling operation, the heat source-side heat exchanger 13, which functions as a condenser, and the utilization-side heat exchanger 15, which functions as an evaporator, are both counter flow heat exchangers (see solid line arrows indicating the refrigerant flow). On the other hand, during heating operation, the heat source-side heat exchanger 13, which functions as an evaporator, and the utilization-side heat exchanger 15, which functions as a condenser, are both heat exchangers of the parallel flow type (the flow direction of the refrigerant is in the forward direction relative to the flow direction of the external heat medium) (see dashed line arrows indicating the refrigerant flow).

However, not limited to the above, the flow direction of the external heat medium flowing through the heat source-side heat exchanger 13 may be designed such that the heat source-side heat exchanger 13, which functions as a condenser during cooling operation, becomes a parallel flow heat exchanger, and the heat source-side heat exchanger 13, which functions as an evaporator during heating operation, becomes a counter flow heat exchanger. Also, the flow direction of the external heat medium flowing through the utilization-side heat exchanger 15 may be designed such that the utilization-side heat exchanger 15, which functions as an evaporator during cooling operation, becomes a parallel flow heat exchanger, and the utilization-side heat exchanger 15, which functions as a condenser during heating operation, becomes a counter flow heat exchanger.

Note that the flow direction of the external heat medium is preferably designed such that the flow direction of the refrigerant when the heat exchangers 13 and 15 function as a condenser is in the opposite direction to the flow direction of the external heat medium. In other words, preferably, when the heat exchangers 13 and 15 function as a condenser, those heat exchangers 13 and 15 are preferably counter flow heat exchangers.

(22-1-2) Second Embodiment

Hereinafter, while referring to FIG. 22G, which is a schematic configuration diagram of a refrigerant circuit, and FIG. 22H, which is a schematic control block configuration diagram, an air conditioning device 100 as a refrigeration cycle device according to the second embodiment will be described.

The air conditioning device 100 is a device that conditions the air in the target space by carrying out a vapor compression type refrigeration cycle.

The air conditioning device 100 mainly has a heat source-side unit 120, a utilization-side unit 130, liquid-side refrigerant communication piping 106 and gas-side refrigerant communication piping 105 that connect the heat source-side unit 120 and the utilization-side unit 130, a remote control not shown in the figure as an input device and an output device, and a controller 107 that controls the motion of the air conditioning device 100.

In a refrigerant circuit 110, a refrigerant for carrying out a vapor compression type refrigeration cycle is enclosed. In the air conditioning device 100, a refrigeration cycle is carried out in which a refrigerant enclosed in the refrigerant circuit 110 is compressed, cooled or condensed, decompressed, heated or evaporated, and then compressed again. That refrigerant is a mixed refrigerant containing 1,2-difluoroethylene, and any Refrigerant A can be used. The refrigerant circuit 110 is also filled with a refrigerator oil together with that mixed refrigerant.

(22-1-2-1) Heat Source-Side Unit

The heat source-side unit 120 is connected to the utilization-side unit 130 via the liquid-side refrigerant communication piping 106 and the gas-side refrigerant communication piping 105, and constitutes a part of the refrigerant circuit 110. The heat source-side unit 120 mainly has a compressor 121, a flow path switching mechanism 122, a heat source-side heat exchanger 123, a heat source-side expansion mechanism 124, a low-pressure receiver 141, a heat source-side fan 125, a liquid-side shut-off valve 129, a gas-side shut-off valve 128, and a heat source-side bridge circuit 153.

The compressor 121 is equipment that compresses a low-pressure refrigerant in the refrigeration cycle until it reaches a high pressure. Here, as the compressor 121, a compressor with a sealed structure in which a positive displacement compression element (omitted in the figure) such as a rotary type or scroll type is rotationally driven by a compressor motor is used. The compressor motor is for changing the volume, and the operation frequency can be controlled by an inverter. Note that the compressor 121 is provided with an accompanying accumulator, which is not shown in the figure, on the inlet side thereof.

The flow path switching mechanism 122 is, for example, a four-way switching valve. The flow path switching mechanism 122 can switch the state of connection between a cooling operation connection state in which the inlet side of the compressor 121 and the gas-side shut-off valve 128 are connected while connecting the discharge side of the compressor 121 and the heat source-side heat exchanger 123, and a heating operation connection state in which the inlet side of the compressor 121 and the heat source-side heat exchanger 123 are connected while connecting the discharge side of the compressor 121 and the gas-side shut-off valve 128.

The heat source-side heat exchanger 123 is a heat exchanger that functions as a condenser for a high-pressure refrigerant in the refrigeration cycle during cooling operation and as an evaporator for a low-pressure refrigerant in the refrigeration cycle during heating operation.

The heat source-side fan 125 generates an air flow for inhaling air, which is to be the heat source, into the heat source-side unit 120, causing heat exchange between it and the refrigerant in the heat source-side heat exchanger 123, and then discharging it outside. The heat source-side fan 125 is rotationally driven by an outdoor fan motor.

The heat source-side expansion mechanism 124 is provided between the liquid-side end of the heat source-side heat exchanger 123 and the liquid-side shut-off valve 129. The heat source-side expansion mechanism 124 may be a mechanical expansion valve used together with a capillary tube or a temperature sensitive cylinder, but it is preferably an electric expansion valve whose valve opening degree can be regulated by control.

The low-pressure receiver 141 is provided between the inlet side of the compressor 121 and one of the connection ports of the flow path switching mechanism 122, and is a refrigerant container that is capable of storing excess refrigerant in the refrigerant circuit 110 as a liquid refrigerant. Also, the compressor 121 is provided with an accompanying accumulator, which is not shown in the figure, and the low-pressure receiver 141 is connected to the upstream side of that accompanying accumulator.

The liquid-side shut-off valve 129 is a manual valve arranged at the connection part in the heat source-side unit 120 with the liquid-side refrigerant communication piping 106.

The gas-side shut-off valve 128 is a manual valve arranged at the connection part in the heat source-side unit 120 with the gas-side refrigerant communication piping 105.

The heat source-side bridge circuit 153 has four connection locations and check valves provided between each of the connection locations. To the four connection locations of the heat source-side bridge circuit 153, refrigerant piping extending from the incurrent side of the heat source-side heat exchanger 123, refrigerant piping extending from the excurrent side of the heat source-side heat exchanger 123, refrigerant piping extending from the liquid-side shut-off valve 129, and refrigerant piping extending from one of the connection ports of the flow path switching mechanism 122 are each connected. The respective check valves block the refrigerant flow from one of the connection ports of the flow path switching mechanism 122 toward the excurrent side of the heat source-side heat exchanger 123, block the refrigerant flow from the liquid-side shut-off valve 129 toward the excurrent side of the heat source-side heat exchanger 123, block the refrigerant flow from the incurrent side of the heat source-side heat exchanger 123 toward one of the connection ports of the flow path switching mechanism 122, and block the refrigerant flow from the incurrent side of the heat source-side heat exchanger 123 toward the liquid-side shut-off valve 129. Note that the heat source-side expansion mechanism 124 is provided in the middle of refrigerant piping extending from the liquid-side shut-off valve 129 to one of the connection locations of the heat source-side bridge circuit 153.

Note that FIG. 22G shows an air flow formed by the heat source-side fan 125 with dotted arrows. Here, in both cases of functioning as an evaporator of the refrigerant and of functioning as a condenser of the refrigerant, the heat source-side heat exchanger 123 of the heat source-side unit 120 having the heat source-side bridge circuit 153 is configured such that the location in the heat source-side heat exchanger 123 where the refrigerant flows in (downstream side of the air flow) is the same, the location where the refrigerant flows out of the heat source-side heat exchanger 123 (upstream side of the air flow) is the same, and the direction of refrigerant flow in the heat source-side heat exchanger 123 is the same. As a result, the flow direction of the refrigerant flowing in the heat source-side heat exchanger 123 is configured to be in the opposite direction (always counter flow) from the direction of the air flow formed by the heat source-side fan 125 in both cases of functioning as an evaporator of the refrigerant and of functioning as a condenser of the refrigerant.

The heat source-side unit 120 has a heat source-side unit control section 127 that controls the motion of each section that constitutes the heat source-side unit 120. The heat source-side unit control section 127 has a microcomputer that includes a CPU, a memory, and other elements. The heat source-side unit control section 127 is connected to a utilization-side unit control section 134 of each utilization-side unit 130 via a communication line, and sends and receives control signals and the like.

The heat source-side unit 120 is provided with a discharge pressure sensor 161, a discharge temperature sensor 162, an inlet pressure sensor 163, an inlet temperature sensor 164, a heat source-side heat exchange temperature sensor 165, a heat source air temperature sensor 166, and the like. Each of these sensors is electrically connected to the heat source-side unit control section 127 and sends detection signals to the heat source-side unit control section 127. The discharge pressure sensor 161 detects the pressure of the refrigerant flowing through discharge piping that connects the discharge side of the compressor 121 to one of the connection ports of the flow path switching mechanism 122. The discharge temperature sensor 162 detects the temperature of the refrigerant flowing through the discharge piping. The inlet pressure sensor 163 detects the pressure of the refrigerant flowing through inlet piping that connects the low-pressure receiver 141 to the inlet side of the compressor 121. The inlet temperature sensor 164 detects the temperature of the refrigerant flowing through the inlet piping. The heat source-side heat exchange temperature sensor 165 detects the temperature of the refrigerant flowing through the liquid-side outlet, which is on the opposite side of the heat source-side heat exchanger 123 to the side where the flow path switching mechanism 122 is connected. The heat source air temperature sensor 166 detects the temperature of the heat source air before it passes through the heat source-side heat exchanger 123.

(22-1-2-2) Utilization-Side Unit

The utilization-side unit 130 is installed on the wall, ceiling, or the like of the target space for air conditioning. The utilization-side unit 130 is connected to the heat source-side unit 120 via the liquid-side refrigerant communication piping 106 and the gas-side refrigerant communication piping 105, and constitutes a part of the refrigerant circuit 110.

The utilization-side unit 130 has a utilization-side heat exchanger 131, a utilization-side fan 132, and a utilization-side bridge circuit 154.

The utilization-side heat exchanger 131 is connected to the liquid-side refrigerant communication piping 106 on the liquid side, and its gas-side end is connected to the gas-side refrigerant communication piping 105. The utilization-side heat exchanger 131 is a heat exchanger that functions as an evaporator for a low-pressure refrigerant in the refrigeration cycle during cooling operation and as a condenser for a high-pressure refrigerant in the refrigeration cycle during heating operation.

The utilization-side fan 132 generates an air flow for inhaling indoor air into the utilization-side unit 130, causing heat exchange between it and the refrigerant in the utilization-side heat exchanger 131, and then discharging it outside. The utilization-side fan 132 is rotationally driven by an indoor fan motor.

The utilization-side bridge circuit 154 has four connection locations and check valves provided between each of the connection locations. To the four connection locations of the utilization-side bridge circuit 154, refrigerant piping extending from the incurrent side of the utilization-side heat exchanger 131, refrigerant piping extending from the excurrent side of the utilization-side heat exchanger 131, refrigerant piping connected to the utilization-side unit 130-side end of the liquid-side refrigerant communication piping 106, and refrigerant piping connected to the utilization-side unit 130-side end of the gas-side refrigerant communication piping 105 are each connected. The respective check valves block the refrigerant flow from the incurrent side of the utilization-side heat exchanger 131 toward the liquid-side refrigerant communication piping 106, block the refrigerant flow from the incurrent side of the utilization-side heat exchanger 131 toward the gas-side refrigerant communication piping 105, block the refrigerant flow from the liquid-side refrigerant communication piping 106 toward the excurrent side of the utilization-side heat exchanger 131, and block the refrigerant flow from the gas-side refrigerant communication piping 105 toward the excurrent side of the utilization-side heat exchanger 131.

Note that FIG. 22G shows an air flow formed by the utilization-side fan 132 with dotted arrows. Here, in both cases of functioning as an evaporator of the refrigerant and of functioning as a condenser of the refrigerant, the utilization-side heat exchanger 131 of the utilization-side unit 130 having the utilization-side bridge circuit 154 is configured such that the location in the utilization-side heat exchanger 131 where the refrigerant flows in (downstream side of the air flow) is the same, the location where the refrigerant flows out of the utilization-side heat exchanger 131 (upstream side of the air flow) is the same, and the direction of refrigerant flow in the utilization-side heat exchanger 131 is the same. As a result, the flow direction of the refrigerant flowing in the utilization-side heat exchanger 131 is configured to be in the opposite direction (always counter flow) from the direction of the air flow formed by the utilization-side fan 132 in both cases of functioning as an evaporator of the refrigerant and of functioning as a condenser of the refrigerant.

Also, the utilization-side unit 130 has a utilization-side unit control section 134 that controls the motion of each section that constitutes the utilization-side unit 130. The utilization-side unit control section 134 has a microcomputer that includes a CPU, a memory, and other elements. The utilization-side unit control section 134 is connected to the heat source-side unit control section 127 via a communication line, and sends and receives control signals and the like.

The utilization-side unit 130 is provided with a target space air temperature sensor 172, an incurrent-side heat exchange temperature sensor 181, an excurrent-side heat exchange temperature sensor 183, and the like. Each of these sensors is electrically connected to the utilization-side unit control section 134 and sends detection signals to the utilization-side unit control section 134. The target space air temperature sensor 172 detects the temperature of the air in the target space for air conditioning before it passes through the utilization-side heat exchanger 131. The incurrent-side heat exchange temperature sensor 181 detects the temperature of the refrigerant before it flows into the utilization-side heat exchanger 131. The excurrent-side heat exchange temperature sensor 183 detects the temperature of the refrigerant flowing out of the utilization-side heat exchanger 131.

(22-1-2-3) Details of Controller

In the air conditioning device 100, the heat source-side unit control section 127 and the utilization-side unit control section 134 are connected via a communication line to constitute the controller 107, which controls the motion of the air conditioning device 100.

The controller 107 mainly has a CPU (central processing unit) and a memory such as ROM or RAM. Note that the various processings and controls by the controller 107 are realized by integrated functioning of each section included in the heat source-side unit control section 127 and/or the utilization-side unit control section 134.

(22-1-2-4) Operation Modes

Hereinafter, the operation modes will be described.

There are two operation modes: a cooling operation mode and a heating operation mode.

The controller 107 determines and executes whether to be in the cooling operation mode or the heating operation mode, based on an instruction received from a remote control or the like.

(A) Cooling Operation Mode

In the cooling operation mode, the air conditioning device 100 sets the state of connection of the flow path switching mechanism 122 to the cooling operation connection state, in which the inlet side of the compressor 121 and the gas-side shut-off valve 128 are connected while connecting the discharge side of the compressor 121 and the heat source-side heat exchanger 123, and circulates the refrigerant filled in the refrigerant circuit 110 mainly through the compressor 121, the heat source-side heat exchanger 123, the heat source-side expansion mechanism 124, and the utilization-side heat exchanger 131 in this order.

Specifically, capacity control is performed on the operation frequency of the compressor 121 such that, for example, the evaporating temperature of the refrigerant in the refrigerant circuit 110 becomes the target evaporating temperature determined depending on the difference between a preset temperature and the indoor temperature (detected temperature by the target space air temperature sensor 172).

The gas refrigerant that has been discharged from the compressor 121 passes through the flow path switching mechanism 122 and is then condensed in the heat source-side heat exchanger 123. Note that, in the heat source-side heat exchanger 123, the refrigerant flows in the opposite direction from the direction of the air flow formed by the heat source-side fan 125. In other words, during operation of the air conditioning device 100 that uses the heat source-side heat exchanger 123 as a condenser, the flow of the refrigerant and the flow of the heat medium that exchanges heat with the refrigerant in the heat source-side heat exchanger 123 are in counter flow. The refrigerant that has flowed through the heat source-side heat exchanger 123 passes through a part of the heat source-side bridge circuit 153 and is decompressed in the heat source-side expansion mechanism 124 until it reaches the low pressure in the refrigeration cycle.

Here, the valve opening degree of the heat source-side expansion mechanism 124 is controlled so as to satisfy predetermined conditions, for example, the degree of superheating of the refrigerant flowing through the gas side of the utilization-side heat exchanger 131 or the degree of superheating of the refrigerant inhaled by the compressor 121 becomes the target value. Here, the degree of superheating of the refrigerant flowing through the gas side of the utilization-side heat exchanger 131 may be determined by subtracting the saturation temperature of the refrigerant corresponding to the detected temperature by the inlet pressure sensor 163 from the detected temperature by the excurrent-side heat exchange temperature sensor 183, for example. Note that the approach for controlling the valve opening degree of the heat source-side expansion mechanism 124 is not limited, and for example, it may be controlled such that the discharge temperature of the refrigerant discharged from the compressor 121 becomes a predetermined temperature, or it may be controlled such that the degree of superheating of the refrigerant discharged from the compressor 121 satisfies predetermined conditions.

The refrigerant that has been decompressed to the low pressure in the refrigeration cycle by the heat source-side expansion mechanism 124 passes through the liquid-side shut-off valve 129 and the liquid-side refrigerant communication piping 106 to flow into the utilization-side unit 130, and is evaporated in the utilization-side heat exchanger 131. Note that, in the utilization-side heat exchanger 131, the refrigerant flows in the opposite direction from the direction of the air flow formed by the utilization-side fan 132. In other words, during operation of the air conditioning device 100 that uses the utilization-side heat exchanger 131 as an evaporator, the flow of the refrigerant and the flow of the heat medium that exchanges heat with the refrigerant in the utilization-side heat exchanger 131 are in counter flow. The refrigerant that has flowed through the utilization-side heat exchanger 131 flows through the gas-side refrigerant communication piping 105, then passes through the gas-side shut-off valve 128, the flow path switching mechanism 122, and the low-pressure receiver 141, and is again inhaled into the compressor 121. Note that, in the low-pressure receiver 141, the liquid refrigerant that could not be fully evaporated in the utilization-side heat exchanger 131 is stored as excess refrigerant.

(B) Heating Operation Mode

In the heating operation mode, the air conditioning device 100 sets the state of connection of the flow path switching mechanism 122 to the heating operation connection state, in which the inlet side of the compressor 121 and the heat source-side heat exchanger 123 are connected while connecting the discharge side of the compressor 121 and the gas-side shut-off valve 128, and circulates the refrigerant filled in the refrigerant circuit 110 mainly through the compressor 121, the utilization-side heat exchanger 131, the heat source-side expansion mechanism 124, and the heat source-side heat exchanger 123 in this order.

More specifically, in the heating operation mode, capacity control is performed on the operation frequency of the compressor 121 such that, for example, the condensation temperature of the refrigerant in the refrigerant circuit 110 becomes the target condensation temperature determined depending on the difference between a preset temperature and the indoor temperature (detected temperature by the target space air temperature sensor 172).

The gas refrigerant that has been discharged from the compressor 121 flows through the flow path switching mechanism 122 and the gas-side refrigerant communication piping 105, then flows into the gas-side end of the utilization-side heat exchanger 131 of the utilization-side unit 130, and is condensed in the utilization-side heat exchanger 131. Note that, in the utilization-side heat exchanger 131, the refrigerant flows in the opposite direction from the direction of the air flow formed by the utilization-side fan 132. In other words, during operation of the air conditioning device 100 that uses the utilization-side heat exchanger 131 as a condenser, the flow of the refrigerant and the flow of the heat medium that exchanges heat with the refrigerant in the utilization-side heat exchanger 131 are in counter flow. The refrigerant that has flowed out of the liquid-side end of the utilization-side heat exchanger 131 passes through the liquid-side refrigerant communication piping 106, flows into the heat source-side unit 120, passes through the liquid-side shut-off valve 129, and is decompressed in the heat source-side expansion mechanism 124 until it reaches the low pressure in the refrigeration cycle.

Here, the valve opening degree of the heat source-side expansion mechanism 124 is controlled so as to satisfy predetermined conditions, for example, the degree of superheating of the refrigerant inhaled by the compressor 121 becomes the target value. Note that the approach for controlling the valve opening degree of the heat source-side expansion mechanism 124 is not limited, and for example, it may be controlled such that the discharge temperature of the refrigerant discharged from the compressor 121 becomes a predetermined temperature, or it may be controlled such that the degree of superheating of the refrigerant discharged from the compressor 121 satisfies predetermined conditions.

The refrigerant that has been decompressed in the heat source-side expansion mechanism 124 is evaporated in the heat source-side heat exchanger 123. Note that, in the heat source-side heat exchanger 123, the refrigerant flows in the opposite direction from the direction of the air flow formed by the heat source-side fan 125. In other words, during operation of the air conditioning device 100 that uses the heat source-side heat exchanger 123 as an evaporator, the flow of the refrigerant and the flow of the heat medium that exchanges heat with the refrigerant in the heat source-side heat exchanger 123 are in counter flow. The refrigerant that has been evaporated in the heat source-side heat exchanger 123 passes through the flow path switching mechanism 122 and the low-pressure receiver 141, and is again inhaled into the compressor 121. Note that, in the low-pressure receiver 141, the liquid refrigerant that could not be fully evaporated in the heat source-side heat exchanger 123 is stored as excess refrigerant.

(22-1-2-5) Characteristics of Air Conditioning Device 100

The air conditioning device 100 can carry out a refrigeration cycle using a refrigerant containing 1,2-difluoroethylene, and thus makes it possible to carry out a refrigeration cycle using a refrigerant having a small GWP.

Also, by providing the low-pressure receiver 141, the air conditioning device 100 can suppress occurrence of liquid compression even without carrying out control (control of the heat source-side expansion mechanism 124) that ensures that the degree of superheating of the refrigerant inhaled into the compressor 121 is at or above a predetermined value. Therefore, as for the control of the heat source-side expansion mechanism 124, it is possible to allow it to control the heat source-side heat exchanger 123 when it is to function as a condenser (and the utilization-side heat exchanger 131 when it is to function as a condenser as well) so as to ensure a sufficient degree of subcooling of the refrigerant flowing through the outlet.

Also, in the heat source-side heat exchanger 123, both during cooling operation and during heating operation, the refrigerant flows in the opposite direction from the direction of the air flow formed by the heat source-side fan 125 (they are in counter flow). Therefore, when the heat source-side heat exchanger 123 functions as an evaporator of the refrigerant, the temperature of the refrigerant passing through it tends to be higher at the outlet side than at the inlet side, but even in such a case, since the air flow formed by the heat source-side fan 125 is in the opposite direction, it is easy to ensure a sufficient temperature difference between the air and the refrigerant at both the inlet side and the outlet side for the refrigerant of the heat source-side heat exchanger 123. In addition, when the heat source-side heat exchanger 123 functions as a condenser of the refrigerant, the temperature of the refrigerant passing through it tends to be lower at the outlet side than at the inlet side, but even in such a case, since the air flow formed by the heat source-side fan 125 is in the opposite direction, it is easy to ensure a sufficient temperature difference between the air and the refrigerant at both the inlet side and the outlet side for the refrigerant of the heat source-side heat exchanger 123.

Furthermore, in the utilization-side heat exchanger 131, both during cooling operation and during heating operation, the refrigerant flows in the opposite direction from the direction of the air flow formed by the utilization-side fan 132 (they are in counter flow). Therefore, when the utilization-side heat exchanger 131 functions as an evaporator of the refrigerant, the temperature of the refrigerant passing through it tends to be higher at the outlet side than at the inlet side, but even in such a case, since the air flow formed by the utilization-side fan 132 is in the opposite direction, it is easy to ensure a sufficient temperature difference between the air and the refrigerant at both the inlet side and the outlet side for the refrigerant of the utilization-side heat exchanger 131. Also, when the utilization-side heat exchanger 131 functions as a condenser of the refrigerant, the temperature of the refrigerant passing through it tends to be lower at the outlet side than at the inlet side, but even in such a case, since the air flow formed by the utilization-side fan 132 is in the opposite direction, it is easy to ensure a sufficient temperature difference between the air and the refrigerant at both the inlet side and the outlet side for the refrigerant of the utilization-side heat exchanger 131.

As a result of this, the capacity of both the heat exchanger that functions as the evaporator and the heat exchanger that functions as the condenser can be sufficiently demonstrated in both cooling operation and heating operation, even when temperature glide occurs in the evaporator and in the condenser due to the use of a zeotropic mixed refrigerant as the refrigerant.

(22-1-3) Third Embodiment

Hereinafter, while referring to FIG. 22I, which is a schematic configuration diagram of a refrigerant circuit, and FIG. 22J, which is a schematic control block configuration diagram, an air conditioning device 100*a* as a refrigeration cycle device according to the third embodiment will be described. Note that, since the air conditioning device 100 of the second embodiment and the air conditioning device 100*a* of the third embodiment have many points in common, hereinafter, the differences from the air conditioning device 100 of the first embodiment will be mainly described.

(22-1-3-1) Configuration of Air Conditioning Device

The air conditioning device 100*a* mainly differs from the air conditioning device 100 of the second embodiment described above in that bypass piping 140 having a bypass expansion valve 149 is provided in the heat source-side unit 120, that multiple indoor units (the first utilization-side unit 130 and the second utilization-side unit 135) are provided in parallel, and that an indoor expansion valve is provided on the liquid refrigerant side of the indoor heat exchanger in each indoor unit. Note that, in the following description of the air conditioning device 100*a*, description will be made with the same reference sign for the same or similar configuration as the air conditioning device 100.

The bypass piping 140 that the heat source-side unit 120 has is refrigerant piping that connects the part between the heat source-side expansion mechanism 124 and the liquid-side shut-off valve 129 in the refrigerant circuit 110, and the refrigerant piping extending from one of the connection ports of the flow path switching mechanism 122 to the low-pressure receiver 141. Although not limited, the bypass expansion valve 149 is preferably an electric expansion valve whose valve opening degree can be regulated.

The first utilization-side unit 130 has a first utilization-side heat exchanger 131, a first utilization-side fan 132, and a first utilization-side bridge circuit 154 as in the above embodiments, and also has a first utilization-side expansion mechanism 133. The first utilization-side bridge circuit 154 has four connection locations and check valves provided between each of the connection locations. To the four connection locations of the first utilization-side bridge circuit 154, refrigerant piping extending from the liquid side of the first utilization-side heat exchanger 131, refrigerant piping extending from the gas side of the first utilization-side heat exchanger 131, refrigerant piping branching off from the liquid-side refrigerant communication piping 106 toward the first utilization-side unit 130, and refrigerant piping branching off from the gas-side refrigerant communication piping 105 toward the first utilization-side unit 130 are each connected.

Note that FIG. 22I shows an air flow formed by the first utilization-side fan 132 with dotted arrows. Here, in both cases of functioning as an evaporator of the refrigerant and of functioning as a condenser of the refrigerant, the first utilization-side heat exchanger 131 of the first utilization-side unit 130 having the first utilization-side bridge circuit 154 is configured such that the location in the first utilization-side heat exchanger 131 where the refrigerant flows in (downstream side of the air flow) is the same, the location where the refrigerant flows out of the first utilization-side heat exchanger 131 (upstream side of the air flow) is the same, and the direction of refrigerant flow in the first utilization-side heat exchanger 131 is the same. As a result, the flow direction of the refrigerant flowing in the first utilization-side heat exchanger 131 is configured to be in the opposite direction (always counter flow) from the direction of the air flow formed by the first utilization-side fan 132 in both cases of functioning as an evaporator of the refrigerant and of functioning as a condenser of the refrigerant. Also, the first utilization-side expansion mechanism 133 is provided in the middle of refrigerant piping branching off from the liquid-side refrigerant communication piping 106 toward the first utilization-side unit 130 (liquid refrigerant side of the first utilization-side bridge circuit 154). The first utilization-side expansion mechanism 133 is preferably an electric expansion valve whose valve opening degree can be regulated. As in the above embodiments, the first utilization-side unit 130 is provided with a first utilization-side unit control section 134, and a first incurrent-side heat exchange temperature sensor 181, a first target space air temperature sensor 172, a first excurrent-side heat exchange temperature sensor 183, and the like, electrically connected to the first utilization-side unit control section 134.

The second utilization-side unit 135 has a second utilization-side heat exchanger 136, a second utilization-side fan 137, a second utilization-side expansion mechanism 138, and a second utilization-side bridge circuit 155 as in the first utilization-side unit 130. The second utilization-side bridge circuit 155 has four connection locations and check valves provided between each of the connection locations. To the four connection locations of the second utilization-side bridge circuit 155, refrigerant piping extending from the liquid side of the second utilization-side heat exchanger 136, refrigerant piping extending from the gas side of the second utilization-side heat exchanger 136, refrigerant piping branching off from the liquid-side refrigerant communication piping 106 toward the second utilization-side unit 135, and refrigerant piping branching off from the gas-side refrigerant communication piping 105 toward the second utilization-side unit 135 are each connected. Note that FIG. 22I shows an air flow formed by the second utilization-side fan 137 with dotted arrows. Here, in both cases of functioning as an evaporator of the refrigerant and of functioning as a condenser of the refrigerant, the second utilization-side heat exchanger 136 of the second utilization-side unit 135 having the second utilization-side bridge circuit 155 is configured such that the location in the second utilization-side heat exchanger 136 where the refrigerant flows in (downstream side of the air flow) is the same, the location where the refrigerant flows out of the second utilization-side heat exchanger 136 (upstream side of the air flow) is the same, and the direction of refrigerant flow in the second utilization-side heat exchanger 136 is the same. As a result, the flow direction of the refrigerant flowing in the second utilization-side heat exchanger 136 is configured to be in the opposite direction (always counter flow) from the direction of the air flow formed by the second utilization-side fan 137 in both cases of functioning as an evaporator of the refrigerant and of functioning as a condenser of the refrigerant. Also, the second utilization-side expansion mechanism 138 is provided in the middle of refrigerant piping branching off from the liquid-side refrigerant communication piping 106 toward the second utilization-side unit 135 (liquid refrigerant side of the second utilization-side bridge circuit 155). The second utilization-side expansion mechanism 138 is preferably an electric expansion valve whose valve opening degree can be regulated. As in the first utilization-side unit 130, the second utilization-side unit 135 is provided with a second utilization-side unit control section 139, and a second incurrent-side heat exchange temperature sensor 185, a second target space air temperature sensor 176, and a second excurrent-side heat exchange temperature sensor 187, electrically connected to the second utilization-side unit control section 139.

(22-1-3-2) Operation Modes (A) Cooling Operation Mode

In the cooling operation mode of the air conditioning device 100*a*, capacity control is performed on the operation frequency of the compressor 121 such that, for example, the evaporating temperature of the refrigerant in the refrigerant circuit 110 becomes the target evaporating temperature. Here, it is preferable that the target evaporating temperature is determined depending on the largest difference between a preset temperature and the utilization-side temperature in each utilization-side unit 130 or 135 (utilization-side unit with the largest load).

The gas refrigerant that has been discharged from the compressor 121 passes through the flow path switching mechanism 122 and is then condensed in the heat source-side heat exchanger 123. Note that, in the heat source-side heat exchanger 123, the refrigerant flows in the opposite direction from the direction of the air flow formed by the heat source-side fan 125. In other words, during operation of the air conditioning device 100*a* that uses the heat source-side heat exchanger 123 as a condenser, the flow of the refrigerant and the flow of the heat medium that exchanges heat with the refrigerant in the heat source-side heat exchanger 123 are in counter flow. The refrigerant that has flowed through the heat source-side heat exchanger 123 passes through a part of the heat source-side bridge circuit 153, then passes through the heat source-side expansion mechanism 124 controlled to be in a fully open state, and passes through the liquid-side shut-off valve 129 and the liquid-side refrigerant communication piping 106 to flow into each of the first utilization-side unit 130 and the second utilization-side unit 135.

Note that the valve opening degree of the bypass expansion valve 149 of the bypass piping 140 is controlled depending on the situation of occurrence of excess refrigerant. Specifically, the bypass expansion valve 149 is controlled based on, for example, the high-pressure pressure detected by the discharge pressure sensor 161 and/or the degree of subcooling of the refrigerant flowing through the liquid side of the heat source-side heat exchanger 123. As a result, the excess refrigerant, which is a part of the refrigerant that has passed through the heat source-side expansion mechanism 124 mentioned above, is sent to the low-pressure receiver 141 via the bypass piping 140.

The refrigerant that has flowed into the first utilization-side unit 130 is decompressed in the first utilization-side expansion mechanism 133 until it reaches the low pressure in the refrigeration cycle. Also, the refrigerant that has flowed into the second utilization-side unit 135 is decompressed in the second utilization-side expansion mechanism 138 until it reaches the low pressure in the refrigeration cycle.

Here, the valve opening degree of the first utilization-side expansion mechanism 133 is controlled so as to satisfy predetermined conditions, for example, the degree of superheating of the refrigerant flowing through the gas side of the first utilization-side heat exchanger 131 or the degree of superheating of the refrigerant inhaled by the compressor 121 becomes the target value. Here, the degree of superheating of the refrigerant flowing through the gas side of the first utilization-side heat exchanger 131 may be determined by subtracting the saturation temperature of the refrigerant corresponding to the detected temperature by the inlet pressure sensor 163 from the detected temperature by the first excurrent-side heat exchange temperature sensor 183, for example. Similarly, the valve opening degree of the second utilization-side expansion mechanism 138 is also controlled so as to satisfy predetermined conditions, for example, the degree of superheating of the refrigerant flowing through the gas side of the second utilization-side heat exchanger 136 or the degree of superheating of the refrigerant inhaled by the compressor 121 becomes the target value. Here, the degree of superheating of the refrigerant flowing through the gas side of the second utilization-side heat exchanger 136 may be determined by subtracting the saturation temperature of the refrigerant corresponding to the detected temperature by the inlet pressure sensor 163 from the detected temperature by the second excurrent-side heat exchange temperature sensor 187, for example.

The refrigerant that has been decompressed in the first utilization-side expansion mechanism 133 passes through a part of the first utilization-side bridge circuit 154, flows into the first utilization-side heat exchanger 131, and is evaporated in the first utilization-side heat exchanger 131. Note that, in the first utilization-side heat exchanger 131, the refrigerant flows in the opposite direction from the direction of the air flow formed by the first utilization-side fan 132. In other words, during operation of the air conditioning device 100*a* that uses the first utilization-side heat exchanger 131 as an evaporator, the flow of the refrigerant and the flow of the heat medium that exchanges heat with the refrigerant in the first utilization-side heat exchanger 131 are in counter flow. The refrigerant that has passed through the first utilization-side heat exchanger 131 passes through a part of the first utilization-side bridge circuit 154 and flows out to the outside of the first utilization-side unit 130.

Similarly, the refrigerant that has been decompressed in the second utilization-side expansion mechanism 138 passes through a part of the second utilization-side bridge circuit 155, flows into the second utilization-side heat exchanger 136, and is evaporated in the second utilization-side heat exchanger 136. Note that, in the second utilization-side heat exchanger 136, the refrigerant flows in the opposite direction from the direction of the air flow formed by the second utilization-side fan 137. In other words, during operation of the air conditioning device 100*a* that uses the second utilization-side heat exchanger 136 as an evaporator, the flow of the refrigerant and the flow of the heat medium that exchanges heat with the refrigerant in the second utilization-side heat exchanger 136 are in counter flow. The refrigerant that has passed through the second utilization-side heat exchanger 136 passes through a part of the second utilization-side bridge circuit 155 and flows out to the outside of the second utilization-side unit 135. The refrigerant that has flowed out of the first utilization-side unit 130 and the refrigerant that has flowed out of the second utilization-side unit 135 are combined, then flow through the gas-side refrigerant communication piping 105, pass through the gas-side shut-off valve 128, the flow path switching mechanism 122, and the low-pressure receiver 141, and are again inhaled into the compressor 121. Note that, in the low-pressure receiver 141, the liquid refrigerant that could not be fully evaporated in the first utilization-side heat exchanger 131 and the second utilization-side heat exchanger 136 is stored as excess refrigerant.

(B) Heating Operation Mode

In the heating operation mode of the air conditioning device 100*a*, capacity control is performed on the operation frequency of the compressor 121 such that, for example, the condensation temperature of the refrigerant in the refrigerant circuit 110 becomes the target condensation temperature. Here, it is preferable that the target condensation temperature is determined depending on the largest difference between a preset temperature and the utilization-side temperature in each utilization-side unit 130 or 135 (utilization-side unit with the largest load).

The gas refrigerant that has been discharged from the compressor 121 flows through the flow path switching mechanism 122 and the gas-side refrigerant communication piping 105, and then flows into each of the first utilization-side unit 130 and the second utilization-side unit 135.

The refrigerant that has flowed into the first utilization-side unit 130 passes through a part of the first utilization-side bridge circuit 154 and is then condensed in the first utilization-side heat exchanger 131. Note that, in the first utilization-side heat exchanger 131, the refrigerant flows in the opposite direction from the direction of the air flow formed by the first utilization-side fan 132. In other words, during operation of the air conditioning device 100*a* that uses the first utilization-side heat exchanger 131 as a condenser, the flow of the refrigerant and the flow of the heat medium that exchanges heat with the refrigerant in the first utilization-side heat exchanger 131 are in counter flow. The refrigerant that has flowed into the second utilization-side unit 135 passes through a part of the second utilization-side bridge circuit 155 and is then condensed in the second utilization-side heat exchanger 136. Note that, in the second utilization-side heat exchanger 136, the refrigerant flows in the opposite direction from the direction of the air flow formed by the second utilization-side fan 137. In other words, during operation of the air conditioning device 100*a* that uses the second utilization-side heat exchanger 136 as a condenser, the flow of the refrigerant and the flow of the heat medium that exchanges heat with the refrigerant in the second utilization-side heat exchanger 136 are in counter flow.

The refrigerant that has flowed out of the liquid-side end of the first utilization-side heat exchanger 131 passes through a part of the first utilization-side bridge circuit 154, and is then decompressed in the first utilization-side expansion mechanism 133 until it reaches the intermediate pressure in the refrigeration cycle. Similarly, the refrigerant that has flowed out of the liquid-side end of the second utilization-side heat exchanger 136 also passes through a part of the second utilization-side bridge circuit 155, and is then decompressed in the second utilization-side expansion mechanism 138 until it reaches the intermediate pressure in the refrigeration cycle.

Here, the valve opening degree of the first utilization-side expansion mechanism 133 is controlled so as to satisfy predetermined conditions, for example, the degree of subcooling of the refrigerant flowing through the liquid-side outlet of the first utilization-side heat exchanger 131 becomes the target value. Here, the degree of subcooling of the refrigerant flowing through the liquid-side outlet of the first utilization-side heat exchanger 131 may be determined by subtracting the saturation temperature of the refrigerant corresponding to the detected temperature by the discharge pressure sensor 161 from the detected temperature by the first excurrent-side heat exchange temperature sensor 183, for example. Similarly, in the second utilization-side expansion mechanism 138 as well, the valve opening degree is controlled so as to satisfy predetermined conditions, for example, the degree of subcooling of the refrigerant flowing through the liquid-side outlet of the second utilization-side heat exchanger 136 becomes the target value. Here, the degree of subcooling of the refrigerant flowing through the liquid-side outlet of the second utilization-side heat exchanger 136 may be determined by subtracting the saturation temperature of the refrigerant corresponding to the detected temperature by the discharge pressure sensor 161 from the detected temperature by the second excurrent-side heat exchange temperature sensor 187, for example.

The refrigerant that has passed through the first utilization-side expansion mechanism 133 passes through a part of the first utilization-side bridge circuit 154 and flows out to the outside of the first utilization-side unit 130. Similarly, the refrigerant that has passed through the second utilization-side expansion mechanism 138 passes through a part of the second utilization-side bridge circuit 155 and flows out to the outside of the second utilization-side unit 135. The refrigerant that has flowed out of the first utilization-side unit 130 and the refrigerant that has flowed out of the second utilization-side unit 135 are combined, pass through the liquid-side refrigerant communication piping 106, and then flow into the heat source-side unit 120.

The refrigerant that has flowed into the heat source-side unit 120 passes through the liquid-side shut-off valve 129, and is decompressed in the heat source-side expansion mechanism 124 until it reaches the low pressure in the refrigeration cycle.

Note that, as for the bypass expansion valve 149 of the bypass piping 140, the valve opening degree may be controlled depending on the situation of occurrence of excess refrigerant as in the case of cooling operation, or it may be controlled to be in a fully closed state.

Here, the valve opening degree of the heat source-side expansion mechanism 124 is controlled so as to satisfy predetermined conditions, for example, the degree of superheating of the refrigerant inhaled by the compressor 121 becomes the target value. Note that the approach for controlling the valve opening degree of the heat source-side expansion mechanism 124 is not limited, and for example, it may be controlled such that the discharge temperature of the refrigerant discharged from the compressor 121 becomes a predetermined temperature, or it may be controlled such that the degree of superheating of the refrigerant discharged from the compressor 121 satisfies predetermined conditions.

The refrigerant that has been decompressed in the heat source-side expansion mechanism 124 is evaporated in the heat source-side heat exchanger 123. Note that, in the heat source-side heat exchanger 123, the refrigerant flows in the opposite direction from the direction of the air flow formed by the heat source-side fan 125. In other words, during operation of the air conditioning device 100*a* that uses the heat source-side heat exchanger 123 as an evaporator, the flow of the refrigerant and the flow of the heat medium that exchanges heat with the refrigerant in the heat source-side heat exchanger 123 are in counter flow. The refrigerant that has passed through the heat source-side heat exchanger 123 passes through the flow path switching mechanism 122 and the low-pressure receiver 141, and is again inhaled into the compressor 121. Note that, in the low-pressure receiver 141, the liquid refrigerant that could not be fully evaporated in the heat source-side heat exchanger 123 is stored as excess refrigerant.

(22-1-3-3) Characteristics of Air Conditioning Device 100*a*

The air conditioning device 100*a* can carry out a refrigeration cycle using a refrigerant containing 1,2-difluoroethylene, and thus makes it possible to carry out a refrigeration cycle using a refrigerant having a small GWP.

Also, by providing the low-pressure receiver 141, the air conditioning device 100*a* can suppress occurrence of liquid compression even without carrying out control (control of the heat source-side expansion mechanism 124) that ensures that the degree of superheating of the refrigerant inhaled into the compressor 121 is at or above a predetermined value. Also, during heating operation, it becomes possible to make it easier to sufficiently demonstrate the capacities of the first utilization-side heat exchanger 131 and the second utilization-side heat exchanger 136 by controlling the degree of subcooling with the first utilization-side expansion mechanism 133 and the second utilization-side expansion mechanism 138.

Also, in the heat source-side heat exchanger 123, both during cooling operation and during heating operation, the refrigerant flows in the opposite direction from the direction of the air flow formed by the heat source-side fan 125 (they are in counter flow). Furthermore, in the first utilization-side heat exchanger 131, both during cooling operation and during heating operation, the refrigerant flows in the opposite direction from the direction of the air flow formed by the first utilization-side fan 132 (they are in counter flow). Similarly, in the second utilization-side heat exchanger 136, both during cooling operation and during heating operation, the refrigerant flows in the opposite direction from the direction of the air flow formed by the second utilization-side fan 137 (they are in counter flow).

As a result of this, the capacity of both the heat exchanger that functions as the evaporator and the heat exchanger that functions as the condenser can be sufficiently demonstrated in both cooling operation and heating operation, even when temperature glide occurs in the evaporator and in the condenser due to the use of a zeotropic mixed refrigerant as the refrigerant.

(23) EMBODIMENT OF TECHNOLOGY OF TWENTY-THIRD GROUP

(23-1)

FIG. 23A is a schematic configuration diagram of a refrigerant circuit 10 according to one embodiment of the present disclosure. Also, FIG. 23B is a schematic control block configuration diagram of a refrigeration cycle device according to one embodiment of the present disclosure. Hereinafter, while referring to FIG. 23A and FIG. 23B, an air conditioning device 1 as a refrigeration cycle device according to the present embodiment will be described.

The air conditioning device 1 is a device that conditions the air in the target space by carrying out a vapor compression type refrigeration cycle.

The air conditioning device 1 mainly has an outdoor unit 20, an indoor unit 30, liquid-side refrigerant communication piping 6 and gas-side refrigerant communication piping 5 that connect the outdoor unit 20 and the indoor unit 30, a remote control not shown in the figure as an input device and an output device, and a controller 7 that controls the motion of the air conditioning device 1.

In the air conditioning device 1, a refrigeration cycle is carried out in which a refrigerant enclosed in the refrigerant circuit 10 is compressed, condensed, decompressed, evaporated, and then compressed again. In the present embodiment, the refrigerant circuit 10 is filled with a refrigerant for carrying out a vapor compression type refrigeration cycle. That refrigerant is a refrigerant containing 1,2-difluoroethylene, and any Refrigerant A can be used. The refrigerant circuit 10 is also filled with a refrigerator oil together with that refrigerant.

(23-1-1) Outdoor Unit 20

The outdoor unit 20 is in the shape of an approximately rectangular box in appearance, and has a structure (so-called trunk-type structure) in which the inside thereof is divided by a partition plate or the like to form a blower room and a machine room.

This outdoor unit 20 is connected to the indoor unit 30 via the liquid-side refrigerant communication piping 6 and the gas-side refrigerant communication piping 5, and constitutes a part of the refrigerant circuit 10. The outdoor unit 20 mainly has a compressor 21, a four-way switching valve 22, an outdoor heat exchanger 23, an outdoor expansion valve 24, an outdoor fan 25, a liquid-side shut-off valve 29, and a gas-side shut-off valve 28.

The compressor 21 is equipment that compresses a low-pressure refrigerant in the refrigeration cycle until it reaches a high pressure. Here, as the compressor 21, a compressor with a sealed structure in which a positive displacement compression element (omitted in the figure) such as a rotary type or scroll type is rotationally driven by a compressor motor is used.

The compressor motor is for changing the volume, and the operation frequency can be controlled by an inverter. Note that the compressor 21 is provided with an accompanying accumulator, which is not shown in the figure, on the inlet side thereof. Note that the outdoor unit 20 of the present embodiment does not have a refrigerant container (such as a low-pressure receiver arranged on the inlet side of the compressor 21 or a high-pressure receiver arranged on the liquid side of the outdoor heat exchanger 23) that is larger than such an accompanying accumulator.

The four-way switching valve 22 can switch the state of connection between a cooling operation connection state in which the inlet side of the compressor 21 and the gas-side shut-off valve 28 are connected while connecting the discharge side of the compressor 21 and the outdoor heat exchanger 23, and a heating operation connection state in which the inlet side of the compressor 21 and the outdoor heat exchanger 23 are connected while connecting the discharge side of the compressor 21 and the gas-side shut-off valve 28.

The outdoor heat exchanger 23 is a heat exchanger that functions as a condenser for a high-pressure refrigerant in the refrigeration cycle during cooling operation and as an evaporator for a low-pressure refrigerant in the refrigeration cycle during heating operation. The outdoor heat exchanger 23 has multiple heat transfer fins and multiple heat transfer pipes penetrating and fixed to them.

The outdoor fan 25 generates an air flow for inhaling outdoor air into the outdoor unit 20, causing heat exchange between it and the refrigerant in the outdoor heat exchanger 23, and then discharging it outside. The outdoor fan 25 is rotationally driven by an outdoor fan motor. Note that, in the present embodiment, only one outdoor fan 25 is provided.

As for the outdoor expansion valve 24, its valve opening degree can be controlled, and it is provided between the liquid-side end of the outdoor heat exchanger 23 and the liquid-side shut-off valve 29.

The liquid-side shut-off valve 29 is a manual valve arranged at the connection part in the outdoor unit 20 with the liquid-side refrigerant communication piping 6.

The gas-side shut-off valve 28 is a manual valve arranged at the connection part in the outdoor unit 20 with the gas-side refrigerant communication piping 5.

The outdoor unit 20 has an outdoor unit control section 27 that controls the motion of each section that constitutes the outdoor unit 20. The outdoor unit control section 27 has a microcomputer that includes a CPU, a memory, and other elements. The outdoor unit control section 27 is connected to an indoor unit control section 34 of each indoor unit 30 via a communication line, and sends and receives control signals and the like. Also, the outdoor unit control section 27 is electrically connected to various sensors, which are not shown in the figure, and receives signals from each sensor.

(23-1-2) Indoor Unit 30

The indoor unit 30 is installed on the wall or the like of a room, which is the target space. The indoor unit 30 is connected to the outdoor unit 20 via the liquid-side refrigerant communication piping 6 and the gas-side refrigerant communication piping 5, and constitutes a part of the refrigerant circuit 10.

The indoor unit 30 has an indoor heat exchanger 31, an indoor fan 32, and the like.

The indoor heat exchanger 31 is connected to the liquid-side refrigerant communication piping 6 on the liquid side, and its gas-side end is connected to the gas-side refrigerant communication piping 5. The indoor heat exchanger 31 is a heat exchanger that functions as an evaporator for a low-pressure refrigerant in the refrigeration cycle during cooling operation and as a condenser for a high-pressure refrigerant in the refrigeration cycle during heating operation. The indoor heat exchanger 31 has multiple heat transfer fins and multiple heat transfer pipes penetrating and fixed to them.

The indoor fan 32 generates an air flow for inhaling indoor air into the indoor unit 30, causing heat exchange between it and the refrigerant in the indoor heat exchanger 31, and then discharging it outside. The indoor fan 32 is rotationally driven by an indoor fan motor, which is not shown in the figure.

Also, the indoor unit 30 has an indoor unit control section 34 that controls the motion of each section that constitutes the indoor unit 30. The indoor unit control section 34 has a microcomputer that includes a CPU, a memory, and other elements. The indoor unit control section 34 is connected to the outdoor unit control section 27 via a communication line, and sends and receives control signals and the like.

The indoor unit control section 34 is electrically connected to various sensors provided inside the indoor unit 30, which are not shown in the figure, and receives signals from each sensor.

(23-1-3) Details of Controller 7

In the air conditioning device 1, the outdoor unit control section 27 and the indoor unit control section 34 are connected via a communication line to constitute the controller 7, which controls the motion of the air conditioning device 1.

The controller 7 mainly has a CPU (central processing unit) and a memory such as ROM or RAM. Note that the various processings and controls by the controller 7 are realized by integrated functioning of each section included in the outdoor unit control section 27 and/or the indoor unit control section 34.

(23-1-4) Operation Modes

As for the operation modes, a cooling operation mode and a heating operation mode are set. The controller 7 determines and executes whether to be in the cooling operation mode or the heating operation mode, based on an instruction received from a remote control or the like.

(23-1-4-1) Cooling Operation Mode

In the cooling operation mode, the air conditioning device 1 sets the state of connection of the four-way switching valve 22 to the cooling operation connection state, in which the inlet side of the compressor 21 and the gas-side shut-off valve 28 are connected while connecting the discharge side of the compressor 21 and the outdoor heat exchanger 23, and circulates the refrigerant filled in the refrigerant circuit 10 mainly through the compressor 21, the outdoor heat exchanger 23, the outdoor expansion valve 24, and the indoor heat exchanger 31 in this order.

More specifically, when the cooling operation mode is started, in the refrigerant circuit 10, the refrigerant is inhaled into the compressor 21, compressed, and then discharged.

In the compressor 21, capacity control is carried out depending on cooling load required by the indoor unit 30. The gas refrigerant that has been discharged from the compressor 21 passes through the four-way switching valve 22 and flows into the gas-side end of the outdoor heat exchanger 23.

The gas refrigerant that has flowed into the gas-side end of the outdoor heat exchanger 23 undergoes heat exchange with the outdoor-side air supplied by the outdoor fan 25 and is condensed in the outdoor heat exchanger 23 to become a liquid refrigerant, which flows out of the liquid-side end of the outdoor heat exchanger 23.

The refrigerant that has flowed out of the liquid-side end of the outdoor heat exchanger 23 is decompressed as it passes through the outdoor expansion valve 24. Note that the outdoor expansion valve 24 is controlled such that the degree of subcooling of the refrigerant passing through the liquid-side outlet of the outdoor heat exchanger 23 satisfies predetermined conditions.

The refrigerant that has been decompressed by the outdoor expansion valve 24 passes through the liquid-side shut-off valve 29 and the liquid-side refrigerant communication piping 6, and flows into the indoor unit 30.

The refrigerant that has flowed into the indoor unit 30 flows into the indoor heat exchanger 31, undergoes heat exchange with the indoor air supplied by the indoor fan 32 and is evaporated in the indoor heat exchanger 31 to become a gas refrigerant, which flows out of the gas-side end of the indoor heat exchanger 31. The gas refrigerant that has flowed out of the gas-side end of the indoor heat exchanger 31 flows into the gas-side refrigerant communication piping 5.

The refrigerant that has flowed through the gas-side refrigerant communication piping 5 passes through the gas-side shut-off valve 28 and the four-way switching valve 22, and is again inhaled into the compressor 21.

(23-1-4-2) Heating Operation Mode

In the heating operation mode, the air conditioning device 1 sets the state of connection of the four-way switching valve 22 to the heating operation connection state, in which the inlet side of the compressor 21 and the outdoor heat exchanger 23 are connected while connecting the discharge side of the compressor 21 and the gas-side shut-off valve 28, and circulates the refrigerant filled in the refrigerant circuit 10 mainly through the compressor 21, the indoor heat exchanger 31, the outdoor expansion valve 24, and the outdoor heat exchanger 23 in this order.

More specifically, when the heating operation mode is started, in the refrigerant circuit 10, the refrigerant is inhaled into the compressor 21, compressed, and then discharged.

In the compressor 21, capacity control is carried out depending on heating load required by the indoor unit 30. The gas refrigerant that has been discharged from the compressor 21 flows through the four-way switching valve 22 and the gas-side refrigerant communication piping 5 and then flows into the indoor unit 30.

The refrigerant that has flowed into the indoor unit 30 flows into the gas-side end of the indoor heat exchanger 31, undergoes heat exchange with the indoor air supplied by the indoor fan 32 and is condensed in the indoor heat exchanger 31 to become a refrigerant in a gas-liquid two phase state or liquid refrigerant, which flows out of the liquid-side end of the indoor heat exchanger 31. The refrigerant that has flowed out of the liquid-side end of the indoor heat exchanger 31 flows into the liquid-side refrigerant communication piping 6.

The refrigerant that has flowed through the liquid-side refrigerant communication piping 6 is decompressed in the liquid-side shut-off valve 29 and the outdoor expansion valve 24 until it reaches the low pressure in the refrigeration cycle. Note that the outdoor expansion valve 24 is controlled such that the degree of subcooling of the refrigerant passing through the liquid-side outlet of the indoor heat exchanger 31 satisfies predetermined conditions. The refrigerant that has been decompressed by the outdoor expansion valve 24 flows into the liquid-side end of the outdoor heat exchanger 23.

The refrigerant that has flowed into the outdoor heat exchanger 23 from its liquid-side end undergoes heat exchange with the outdoor air supplied by the outdoor fan 25 and is evaporated in the outdoor heat exchanger 23 to become a gas refrigerant, which flows out of the gas-side end of the outdoor heat exchanger 23.

The refrigerant that has flowed out of the gas-side end of the outdoor heat exchanger 23 passes through the four-way switching valve 22, and is again inhaled into the compressor 21.

(23-1-5) Relationship Between Refrigerant and Pipe Outer Diameter of Refrigerant Communication Piping As for copper pipes, studies by the applicants have confirmed that, when the refrigerant used is Refrigerant A, for a specific rated refrigeration capacity of the air conditioning device 1, it is necessary to use gas-side refrigerant communication piping 5 with a larger pipe outer diameter than the case where the refrigerant used is R32, and liquid-side refrigerant communication piping 6 with a larger pipe outer diameter than the case where the refrigerant used is R32.

In such a case, the cost would be increased, and therefore, the applicants have investigated whether it is possible to employ aluminum pipes, which are lower in cost than copper pipes. The results will be described below.

(23-1-6) Relationship Between Pipe Material and Pipe Outer Diameter of Refrigerant Communication Piping FIG. 23C is a comparison table showing the pipe outer diameters of copper pipes employed for the gas-side refrigerant communication piping 5 and the liquid-side refrigerant communication piping 6 of an air conditioning device in which Refrigerant A is used, and the pipe outer diameters of the gas-side refrigerant communication piping 5 and the liquid-side refrigerant communication piping 6 in the case where pipes made of aluminum or an aluminum alloy (hereinafter, referred to as aluminum pipes) are employed instead of copper pipes, for each rated refrigeration capacity.

(23-1-6-1) Comparison of Pipe Outer Diameters of Gas-Side Refrigerant Communication Piping 5

Here, comparison of pipe outer diameters of the gas-side refrigerant communication piping 5 for each pipe material (copper pipes and aluminum pipes) is carried out for each rated refrigeration capacity.

(23-1-6-1-1) Case of Copper Pipes

In FIG. 23C, when the refrigerant used is Refrigerant A, copper pipes with a pipe outer diameter of 12.7 mm are used in the case where the rated refrigeration capacity of the air conditioning device 1 is less than 5.0 kW; copper pipes with a pipe outer diameter of 15.9 mm are used in the case where the rated refrigeration capacity of the air conditioning device 1 is 5.0 kW or more and less than 10.0 kW; copper pipes with a pipe outer diameter of 19.1 mm are used in the case where the rated refrigeration capacity of the air conditioning device 1 is 10.0 kW or more and less than 19.0 kW; and copper pipes with a pipe outer diameter of 22.2 mm are used in the case where the rated refrigeration capacity of the air conditioning device 1 is 19.0 kW or more and 28 kW or less.

(23-1-6-1-2) Case of Aluminum Pipes

In FIG. 23C, when the refrigerant used is Refrigerant A, aluminum pipes with a pipe outer diameter of 12.7 mm are used in the case where the rated refrigeration capacity of the air conditioning device 1 is less than 5.0 kW; aluminum pipes with a pipe outer diameter of 15.9 mm are used in the case where the rated refrigeration capacity of the air conditioning device 1 is 5.0 kW or more and less than 8.5 kW; aluminum pipes with a pipe outer diameter of 19.1 mm are used in the case where the rated refrigeration capacity of the air conditioning device 1 is 8.5 kW or more and less than 19.0 kW; aluminum pipes with a pipe outer diameter of 22.2 mm are used in the case where the rated refrigeration capacity of the air conditioning device 1 is 19.0 kW or more and less than 25 kW; and aluminum pipes with a pipe outer diameter of 25.4 mm are used in the case where the rated refrigeration capacity of the air conditioning device 1 is 25 kW or more and 28 kW or less.

Note that, even when the rated refrigeration capacity of the air conditioning device 1 is greater than 28 kW, aluminum pipes with a pipe outer diameter of 25.4 mm are used.

(23-1-6-1-3) Comparison Results

As shown in FIG. 23C, in the case of aluminum pipes, it is necessary to use gas-side refrigerant communication piping 5 of aluminum pipes with a larger pipe outer diameter than in the case of copper pipes when the rated refrigeration capacity of the air conditioning device 1 is 9.0 kW and 28 kW.

When the rated refrigeration capacity of the air conditioning device 1 is 9.0 kW and 28 kW, in order to keep the pressure loss at the same level as that of copper pipes, the inner diameter is enlarged while maintaining the pressure resistance, resulting in enlargement of the pipe outer diameter.

However, since the material costs of aluminum pipes are lower than the material costs of copper pipes, there is no cost increase even when the pipe outer diameter is enlarged. Accordingly, by using aluminum pipes instead of copper pipes, it is possible to reduce the cost even though the pipe outer diameter is enlarged.

(23-1-6-2) Comparison of Pipe Outer Diameters of Liquid-Side Refrigerant Communication Piping 6

Here, comparison of pipe outer diameters of the liquid-side refrigerant communication piping 6 for each pipe material (copper pipes and aluminum pipes) is carried out for each cooling rated refrigeration capacity.

(23-1-6-2-1) Case of Copper Pipes

In FIG. 23C, when the refrigerant used is Refrigerant A, copper pipes with a pipe outer diameter of 6.4 mm are used in the case where the rated refrigeration capacity of the air conditioning device 1 is less than 5.0 kW; copper pipes with a pipe outer diameter of 9.5 mm are used in the case where the rated refrigeration capacity of the air conditioning device 1 is 5.0 kW or more and less than 19.0 kW; and copper pipes with a pipe outer diameter of 12.7 mm are used in the case where the rated refrigeration capacity of the air conditioning device 1 is 19.0 kW or more and 28 kW or less.

(23-1-6-2-2) Case of Aluminum Pipes

In FIG. 23C, when the refrigerant used is Refrigerant A, aluminum pipes with a pipe outer diameter of 6.4 mm are used in the case where the rated refrigeration capacity of the air conditioning device 1 is less than 5.0 kW; aluminum pipes with a pipe outer diameter of 9.5 mm are used in the case where the rated refrigeration capacity of the air conditioning device 1 is 5.0 kW or more and less than 19.0 kW; and aluminum pipes with a pipe outer diameter of 12.7 mm are used in the case where the rated refrigeration capacity of the air conditioning device 1 is 19.0 kW or more and 28 kW or less.

Note that, even when the rated refrigeration capacity of the air conditioning device 1 is greater than 28 kW, aluminum pipes with a pipe outer diameter of 12.7 mm are used.

(23-1-6-2-3) Comparison Results

As shown in FIG. 23C, when the refrigerant used is Refrigerant A, liquid-side refrigerant communication piping 6 of aluminum pipes with the same pipe outer diameter as copper pipes can be used. Since the material costs of aluminum pipes are lower than the material costs of copper pipes, by using aluminum pipes instead of copper pipes, it is possible to reduce the cost.

(23-1-7) Wall Thickness and Inner Diameter of Pipes

Here, the above “(23-1-6-1-3) Comparison Results” and “(23-1-6-2-3) Comparison Results” are discussed in terms of the wall thickness and inner diameter of aluminum pipes.

The inner diameters of the gas-side refrigerant communication piping 5 and the liquid-side refrigerant communication piping 6 are designed, taking into account the pressure loss at the maximum circulation amount of refrigerant for each rated refrigeration capacity.

Also, the wall thicknesses of the gas-side refrigerant communication piping 5 and the liquid-side refrigerant communication piping 6 are designed to satisfy the design pressure resistance for each rated refrigeration capacity.

FIG. 23D is a comparison table showing the wall thicknesses of copper pipes and aluminum pipes for each “pipe designation”. Hereinafter, the comparison results will be described for each “pipe designation”.

(Pipe Designations: “φ6.4”, “φ9.5”, and “φ12.7”)

In FIG. 23D, for the tube designations “φ6.4” and “φ9.5”, the inner diameter is the same for both copper pipes and aluminum pipes, and the wall thickness is also the same at 0.8 mm. In such a range where the inner diameter is relatively small, there is no need to increase the wall thickness even when aluminum pipes are used instead of copper pipes because the original strength obtained by the wall thickness of 0.8 mm is more than sufficient.

Also, for the pipes with a designation of “N12.7”, when the design pressure acts on the entire surface of the inner circumferential surface, the wall thickness of aluminum pipes needs to be increased to 1.0 mm, because the same wall thickness as copper pipes, 0.8 mm, is not strong enough for aluminum pipes. Hence, the inner diameter thereof is 10.70 mm, which is 0.4 mm smaller than that of copper pipes, 11.10 mm. However, even when the inner diameter is decreased by 0.4 mm, the impact on pressure loss is small.

Accordingly, for the liquid-side refrigerant communication piping 6, through which the liquid refrigerant, which has a smaller specific volume than the gas refrigerant, flows, when using aluminum pipes instead of copper pipes, aluminum pipes with the same outer diameter as copper pipes can be used in the range of rated refrigeration capacity of 2.2 kW to 28 kW. Hence, the “(23-1-6-2-3) Comparison Results” are obtained.

(Pipe Designations: “φ15.9”, “φ19.1”, “φ22.2”, and “φ25.4”)

In FIG. 23D, for the pipe designations “φ15.9”, “φ19.1”, “φ22.2”, and “φ25.4”, the wall thickness of copper pipes is 1 mm. In contrast, the wall thickness of aluminum pipes is increased to 1.3 mm, 1.5 mm, 1.7 mm, and 2.0 mm. This is because the area of the inner circumferential surface is enlarged along with enlargement of the inner diameter, and when the design pressure acts on the entire surface of the inner circumferential surface, the wall thickness of 1.0 mm, which is the same as that of copper pipes, is insufficient in strength, and therefore the wall thickness is increased to ensure strength to withstand the design pressure.

For the gas-side refrigerant communication piping 5, as shown in FIG. 23C, pipes with a designation of “φ12.7” may be used for both copper pipes and aluminum pipes in the range of rated refrigeration capacity of 2.2 kW to 4.5 kW. In this case, as shown in FIG. 23D, the inner diameter of aluminum pipes is 0.4 mm smaller than that of copper pipes, but the impact on the pressure loss is small even when taking into account the maximum circulation amount of refrigerant. In other words, copper pipes have more allowance against pressure loss.

Similarly, as shown in FIG. 23C, pipes with a designation of "φ15.9" are used for both copper pipes and aluminum pipes in the range of rated refrigeration capacity of 5.6 kW to 8.0 kW. In this case, as shown in FIG. 23D, the inner diameter of aluminum pipes is 0.6 mm smaller than that of copper pipes, but the impact on the pressure loss is small even when taking into account the maximum circulation amount of refrigerant. In other words, copper pipes have more allowance against pressure loss.

On the other hand, as shown in FIG. 23C, for a rated refrigeration capacity of 9.0 kW, pipes with a designation of "φ15.9" are used for copper pipes, whereas pipes with a designation of "φ19.1" need to be used for aluminum pipes. In other words, at the maximum circulation amount of refrigerant at a rated refrigeration capacity of 9.0 kW, the pressure loss is suppressed by using aluminum pipes with a designation of "φ19.1", which have a smaller pressure loss than copper pipes with a designation of "φ15.9".

As shown in FIG. 23C, pipes with a designation of "φ19.1" may be used for both copper pipes and aluminum pipes in the range of rated refrigeration capacity of 11.2 kW to 16 kW. In this case, as shown in FIG. 23D, the inner diameter of aluminum pipes is 1.0 mm smaller than that of copper pipes, but the impact on the pressure loss is small even when taking into account the maximum circulation amount of refrigerant. In other words, copper pipes have more allowance against pressure loss.

Similarly, as shown in FIG. 23C, pipes with a designation of "φ22.2" are used for both copper pipes and aluminum pipes in the range of rated refrigeration capacity of 22.4 kW. In this case, as shown in FIG. 23D, the inner diameter of aluminum pipes is 1.4 mm smaller than that of copper pipes, but the impact on the pressure loss is small even when taking into account the maximum circulation amount of refrigerant. In other words, copper pipes have more allowance against pressure loss.

On the other hand, as shown in FIG. 23C, for a rated refrigeration capacity of 28 kW, pipes with a designation of "φ22.2" are used for copper pipes, whereas pipes with a designation of "φ25.4" need to be used for aluminum pipes. In other words, at the maximum circulation amount of refrigerant at a rated refrigeration capacity of 28 kW, the pressure loss is suppressed by using aluminum pipes with a designation of "φ25.4", which have a smaller pressure loss than copper pipes with a designation of "φ22.2".

Accordingly, for the gas-side refrigerant communication piping 5, when aluminum pipes are used instead of copper pipes at a rated refrigeration capacity of 9 kW and 28 kW, it is necessary to increase the pipe outer diameter, and the results are shown in the "(23-1-6-2-3) Comparison Results".

(23-1-8) Characteristics

In the air conditioning device 1, even when the diameters of the liquid-side refrigerant communication piping and the gas-side refrigerant communication piping are increased in order to suppress the pressure loss upon using the refrigerant containing 1,2-difluoroethylene, by using pipes made of aluminum or an aluminum alloy, reduction in capacity can be kept small and increase in cost can be suppressed.

Note that, in the embodiment, the description has been given based on the assumption that Refrigerant A is used in the air conditioning device 1, but it is common for every Refrigerant A, sharing the point of containing 1,2-difluoroethylene.

(23-1-9) Modification

In the above embodiment, the air conditioning device provided with only one indoor unit has been described as an example, but the air conditioning device may be provided with multiple indoor units connected in parallel to each other (those not having an indoor expansion valve).

(24) EMBODIMENTS OF TECHNOLOGY OF TWENTY-FOURTH GROUP

(24-1) First Embodiment

Next, the first embodiment of an air conditioning device that has a heat storage device according to one example of the present disclosure will be described with reference to drawings.

FIG. 24A shows the entire configuration of an air conditioning device 100 of the first embodiment that has a heat storage device 20 according to one example of the present disclosure. The reference sign 2 indicates a compressor. The reference sign 3 indicates an outdoor heat exchanger as one example of a heat source-side heat exchanger that condenses the discharged gas from the compressor 2. The reference sign 4 indicates a first electronic expansion valve as one example of a first expansion mechanism that decompresses the refrigerant that has been condensed in the outdoor heat exchanger 3. The reference sign 5 indicates an indoor heat exchanger as one example of a load-side heat exchanger for evaporating the refrigerant. Each of the above pieces of equipment 2 to 5 is connected sequentially by refrigerant piping 6 to allow distribution of the refrigerant. By connecting the pieces of equipment 2 to 5 by refrigerant piping 6, a main refrigerant circuit 1 is configured that has a heat pump function of releasing the heat obtained by heat exchange with indoor air in the indoor heat exchanger 5 to the outdoor air in the outdoor heat exchanger 3. The main refrigerant circuit 1 is filled with a refrigerant for carrying out a vapor compression type refrigeration cycle. That refrigerant is a mixed refrigerant containing 1,2-difluoroethylene, and any Refrigerant A can be used.

The main refrigerant circuit 1 is provided with a receiver 7 for temporarily storing the refrigerant on the downstream side of the outdoor heat exchanger 3, and an accumulator 8 for separating the liquid refrigerant in the inlet gas to the compressor 2 on the upstream side of the compressor 2, as accessory equipment. Also, thermistors Th1 and Th2 are arranged on the upstream side of the first electronic expansion valve 4 and on the upstream side of the accumulator 8, respectively. The thermistors Th1 and Th2 each detect the temperature of the refrigerant in the refrigerant piping 6. A pressure sensor Ps is disposed on the upstream side of the accumulator 8. The pressure sensor Ps detects the pressure of the refrigerant in the refrigerant piping 6 on the upstream side (inlet side) of the compressor 2. In the air conditioning device 100, based on the detected refrigerant temperature and refrigerant pressure, the degree of opening of the expansion valve is controlled or the capacity of the compressor 2 is controlled by inverter control.

This air conditioning device 100 has the heat storage device 20. The heat storage device 20 comprises a heat storage tank 9 and a heat exchanger for heat storage 10. The heat storage tank 9 stores water W as a heat storage medium that can store heat. The heat exchanger for heat storage 10 is disposed inside the heat storage tank 9. At least a part of the heat exchanger for heat storage 10 is immersed in the water W as the heat storage medium in the heat storage tank 9. To the heat exchanger for heat storage 10, the main refrigerant circuit 1, as one example of a refrigerant supply device, supplies a refrigerant containing at least 1,2-difluoroethylene (HFO-1132 (E)). The heat exchanger for heat storage 10 causes heat exchange between the refrigerant and the water W. The heat exchanger for heat storage 10 cools the water W with the refrigerant. The heat exchanger for heat storage 10 has multiple cooling pipes 10*a*. These cooling pipes 10*a* are branched and connected to the main refrigerant circuit 1, and one end of the heat exchanger for heat storage 10 is an outdoor-side coupling end 10*b* that is coupled to the downstream side of the receiver 7, and the other end is an indoor-side coupling end 10*c* that is coupled to the upstream side of the first electronic expansion valve 4. The outdoor-side coupling end 10*b* is disposed in the main refrigerant circuit 1 at a position closer to the outdoor heat exchanger 3 than the indoor-side coupling end 10*c*. A second electronic expansion valve 12 that carries out decompression of the refrigerant during heat storage operation is provided in the refrigerant piping 6 between the both coupling ends 10*b* and 10*c* of the heat exchanger for heat storage 10 in the main refrigerant circuit 1. In other words, the cooling pipes 10*a* of the heat exchanger for heat storage 10 are plumbed in parallel to the second electronic expansion valve 12.

In the present disclosure, the cooling pipes 10*a* of the heat exchanger for heat storage 10 have the following disposition structure.

The cooling pipes 10*a* are arranged to meander in the vertical direction inside the heat storage tank 9. Specifically, in the cooling pipes 10*a* of the heat exchanger for heat storage 10, straight parts 10*e* in proximity to U-shaped parts 10*d*, which are the ends in the vertical direction, are arranged in the vertical direction, as shown in FIG. 24B. The cooling pipes 10*a* of the heat exchanger for heat storage 10 are supported by a supporting base 9*a* standing in the heat storage tank 9. The cooling pipes 10*a* are immersed in the water W in the heat storage tank 9.

Also, a short circuit pipe 13 couples the area near the outdoor-side coupling end 10*b* of the heat exchanger for heat storage 10 and the upstream side of the compressor 2.

Also, the present air conditioning device 100 is provided with a circuit switching means 15 for switching the circuit connection depending on the state of operation. The circuit switching means 15 includes a first opening/closing valve 11, a second opening/closing valve 14, and an opening/closing control means 16. The first opening/closing valve 11 is provided between the outdoor-side coupling end 10*b* in the heat exchanger for heat storage 10 and the connection position of the short circuit pipe 13. The second opening/closing valve 14 is provided in the short circuit pipe 13. The opening/closing control means 16 controls the valves depending on the state of operation of the air conditioning device 100 and detection signals from each thermistor Th1 or Th2 and pressure sensor Ps. During heat storage operation, the opening/closing control means 16 makes the first opening/closing valve 11 in a closed state and the second opening/closing valve 14 in an open state, also makes the first electronic expansion valve 4 in a fully closed state, and controls the degree of opening of the second electronic expansion valve 12 based on detection signals from the thermistor Th1 and the pressure sensor Ps. On the other hand, during heat storage recovery cooling operation, the opening/closing control means 16 makes the first opening/closing valve 11 in an open state and the second opening/closing valve 14 in a closed state, and also controls the degree of opening of the first electronic expansion valve 4 and the second electronic expansion valve 12 based on detection signals from the thermistor Th2 and the pressure sensor Ps.

Next, each state of operation of the circuit configured as described above will be described.

During normal cooling operation without heat storage recovery, the first opening/closing valve 11 and the second opening/closing valve 14 are made in a closed state, and the second electronic expansion valve 12 is made in a fully open state. In this state, the refrigerant that has been compressed by the compressor 2 is condensed in the outdoor heat exchanger 3, then decompressed by the first electronic expansion valve 4, and supplied to the indoor heat exchanger 5. Then, the refrigerant is evaporated in the indoor heat exchanger 5 to remove heat from the surroundings and contribute to cooling, and then distributed to the side of the compressor 2 again for circulation.

During heat storage operation, the opening/closing control means 16 of the circuit switching means 15 makes the first opening/closing valve 11 in a closed state, the second opening/closing valve 14 in an open state, and also makes the first electronic expansion valve 4 in a fully closed state. The opening/closing control means 16 controls the degree of opening of the second electronic expansion valve 12 as appropriate, based on detection signals from the thermistor Th1 and the pressure sensor Ps. As a result of the valves being controlled in this way, as shown by the arrows in FIG. 24A, the refrigerant that has been discharged by the compressor 2 and passed through the outdoor heat exchanger 3 is decompressed by the second electronic expansion valve 12 and supplied into the cooling pipes 10*a* from the indoor-side coupling end 10*c*. The refrigerant that has been supplied into the cooling pipes 10*a* undergoes heat exchange with the water W in the heat storage tank 9 and is evaporated in the cooling pipes 10*a*, and ice I is produced on and adhered to the surface of the cooling pipes 10*a*, and cold energy is stored.

When carrying out heat storage recovery cooling operation after heat storage operation, the opening/closing control means 16 makes the first opening/closing valve 11 in an open state and the second opening/closing valve 14 in a closed state, and also controls the degree of opening of the first electronic expansion valve 4 based on detection signals from the thermistor Th2 and the pressure sensor Ps. Also, as shown by the arrows in FIG. 24C, the opening/closing control means 16 controls, by the second electronic expansion valve 12, the distribution amount of refrigerant flowing through the main refrigerant circuit 1 among the refrigerant discharged by the compressor 2 and flowing through the outdoor heat exchanger 3, thereby controlling the flow rate of refrigerant supplied from the outdoor-side coupling end 10*b* to the cooling pipes 10*a*. The refrigerant that has been supplied to the cooling pipes 10*a* is cooled by heat exchange with the ice I stored in the heat storage tank 9, led to the first electronic expansion valve 4 via the indoor-side coupling end 10*c*, and decompressed by controlling the degree of opening of the first electronic expansion valve 4. The refrigerant that has been decompressed by the first electronic expansion valve 4 is led to the indoor heat exchanger 5 and evaporated in the indoor heat exchanger 5, thereby contributing to cooling indoors.

Since the cooling pipes 10*a* are arranged in the vertical direction, in such heat storage recovery cooling operation, the ice I adhered to the cooling pipes 10*a*, as shown in FIG.

24D (a), is melted uniformly in circles concentric with the cooling pipes 10*a*, as shown in FIG. 24D (b). And, since the ice I melted in a predetermined amount floats upward along the cooling pipes 10*a* to the top of the heat storage tank 9, buoyancy force is not likely to act on the cooling pipes 10*a*, preventing deformation of the cooling pipes 10*a* or the like. Also, since the floating ice I is exposed to the water W at a relatively high temperature, melting is accelerated, and the old water W does not always remain in one place and abnormal growth of ice I is prevented. Even when the ice making amount is set at a high ice filling ratio, local blocking is less likely to occur than in the conventional case, thus preventing damage to the cooling pipes 10*a* and the heat storage tank 9 due to the blocking. Furthermore, when making ice again, the part that has been melted during cold energy recovery operation becomes ice again, as shown in FIG. 24D (c), which provides excellent repeatability.

Note that, in the above-mentioned example, the water W is used alone as the heat storage medium stored in the heat storage tank 9, but a brine solution mixed with ethylene glycol or the like may also be employed. Also, as for the disposition location of the heat exchanger for heat storage 10, by allowing the fixing part for the upper end of the cooling pipes 10*a* to protrude above the water surface, as shown in FIG. 24E (a), or by allowing the U-shaped part 10*d* at the lower end of the cooling pipes 10*a* to protrude outside below the heat storage tank 9, as shown in FIG. 24E (b), factors preventing the ice I from floating upward when the ice I is melted are removed, thereby easily enabling the floating motion of the ice I.

(24-2) Second Embodiment

Next, the second embodiment of an air conditioning device that has a heat storage device according to one example of the present disclosure will be described with reference to drawings.

The second embodiment differs from the first in the means for taking cold energy out of the heat storage tank 9. Here, that difference will be mainly described.

As shown in FIG. 24F, the main refrigerant circuit 1 of the air conditioning device 100 in the second embodiment is approximately the same as that described in the first embodiment. However, in the second embodiment, the heat exchanger for heat storage 10 of the heat storage device 20 is connected at one end to the downstream side of the outdoor heat exchanger 3 via the second electronic expansion valve 12 and at the other end to the upstream side (inlet side) of the compressor 2. Furthermore, in the second embodiment, a heat exchange section 17*a* of a heat exchanger for taking out cold energy 17 is accommodated in the heat storage tank 9 of the heat storage device 20. This heat exchanger for taking out cold energy 17 is connected to the upstream side than the first electronic expansion valve 4 in the main refrigerant circuit 1.

The motion of the air conditioning device 100 in the second embodiment will be described.

During heat storage operation, the opening/closing control means 16 makes the first opening/closing valve 11 and the second opening/closing valve 14 in a closed state, and the first electronic expansion valve 4 in a fully closed state. Also, the opening/closing control means 16 controls the degree of opening of the second electronic expansion valve 12. As a result, the refrigerant flows as shown by the arrows in FIG. 24F, and ice I is produced on and adhered to the surface of the cooling pipes 1*a* of the heat exchanger for heat storage 10.

When carrying out heat storage recovery cooling operation after heat storage operation, the opening/closing control means 16 regulates the degree of opening of the first opening/closing valve 11, makes the second opening/closing valve 14 in an open state, also controls the degree of opening of the first electronic expansion valve 4, and makes the second electronic expansion valve 12 in a fully closed state. By controlling the valves in this way, the refrigerant flow as shown by the arrows in FIG. 24G takes cold energy out of the heat exchanger for taking out cold energy 17 and supplies it to the main refrigerant circuit 1, and the cold energy contributes to cooling operation.

During this heat storage recovery cooling operation, a circulation flow is generated from the top of the heat storage tank 9 to the bottom as shown in FIG. 24H. On the cooling pipes 10*a*, the ice I is produced along this circulating flow in the vertical direction, and the water W is thus uniformly convected on the surface of all of the ice I and its melted amount is also uniform, thereby reducing the possibility of localized residual ice and occurrence of blocking phenomenon. Also, even when the ice making amount is large and each ice I is in a fused state as shown in FIG. 24I (*a*), the water W present between each ice I can be convected and the ice is thus melted to eliminate this fusion (see FIG. 24I (*b*)), which increases the area for water W convection and improves the melting efficiency compared to the conventional case.

Note that, in the above-mentioned embodiment, a direct expansion heat exchanger was used as the heat exchanger for heat storage, but it can also be applied in devices that use a secondary refrigerant such as brine to make ice. Also, the second embodiment can be applied to devices that allow a secondary refrigerant to flow through the heat exchanger for taking out cold energy to take out cold energy, or to devices that circulate the water in the heat storage tank to a heat exchanger for taking out cold energy outside the heat storage tank, such as a fine coil unit, to take out cold energy.

(24-3) Characteristics of Heat Storage Device and Air Conditioning Device of Present Disclosure (24-3-1)

The heat storage device 20 of the above embodiments comprises the heat storage tank 9 and the heat exchanger for heat storage 10. The water W, as one example of a heat storage medium, is stored in the heat storage tank 9. The heat exchanger for heat storage 10 is immersed in the water W in the heat storage tank 9. The heat exchanger for heat storage 10 is connected to the main refrigerant circuit 1, as one example of a refrigerant supply device. The heat exchanger for heat storage 10 cools the water W with the refrigerant containing at least 1,2-difluoroethylene (HFO-1132 (E)) supplied from the main refrigerant circuit 1. As the refrigerant here, any Refrigerant A can be used.

Here, the heat storage device uses the refrigerant with a low global warming potential, containing 1,2-difluoroethylene (HFO-1132 (E)), supplied from the main refrigerant circuit 1 to cool the water W and stores cold energy in the heat storage tank 9, and thus can contribute to the leveling of the electric power load.

(24-3-2)

In the heat storage device 20 of the above embodiments, the cooling passage through which the refrigerant passes is formed in the heat exchanger for heat storage 10, and that cooling passage is formed and configured to meander in the vertical direction inside the heat storage tank 9.

(24-3-3)

In the heat storage device 20 of the above embodiments, the heat exchanger for heat storage 10 comprises the multiple cooling pipes 10*a* forming the cooling passage, and the cooling pipes 10*a* are arranged and configured such that the cross sections of the cooling pipes 10*a* are on straight lines in the longitudinal and transverse directions in the horizontal sectional view of the heat storage tank 9.

(24-3-4)

In the air conditioning device 100 of the first embodiment, the main refrigerant circuit 1 is configured by connecting the compressor 2, the outdoor heat exchanger 3 as one example of a heat source-side heat exchanger, the first electronic expansion valve 4 as one example of a first decompression mechanism that decompresses the refrigerant, and the indoor heat exchanger 5 as one example of a load-side heat exchanger with the refrigerant piping 6. The air conditioning device 100 is a heat storage-type air conditioning device formed by disposing the heat storage device 20 comprising the water W as a heat storage medium that can store heat. In the air conditioning device 100, the second electronic expansion valve 12, as one example of a second decompression mechanism that decompresses the refrigerant during heat storage operation, is interposed in the refrigerant piping 6. The heat storage device 20 is configured by storing the water W in the heat storage tank 9 and accommodating the heat exchanger for heat storage 10 immersed in the water W. The heat exchanger for heat storage 10 is connected to the main refrigerant circuit 1 in parallel to the second electronic expansion valve 12. The heat exchanger for heat storage 10 comprises the cooling pipes 10*a* through which the refrigerant passes, and the cooling pipes 10*a* are formed so as to meander in the vertical direction inside the heat storage tank 9. One end of the short circuit pipe 13 is connected to the outdoor-side coupling end 10*b* as one example of the first heat exchanger-side end of the heat exchanger for heat storage 10, and the other end of the short circuit pipe 13 is connected to the refrigerant piping 6 on the upstream side of the compressor 2. During heat storage operation, the refrigerant is allowed to flow from the indoor-side coupling end 10*c*, as one example of the second heat exchanger-side end, via the second electronic expansion valve 12 to the heat exchanger for heat storage 10 to cool the water W in the heat storage tank 9, and then to the upstream side of the compressor 2 via the short circuit pipe 13. The air conditioning device 100 is provided with the circuit switching means 15 that switches the circuit connection so as to allow the refrigerant to flow from the outdoor heat exchanger 3 via the outdoor-side coupling end 10*b* to the heat exchanger for heat storage 10 to cool the refrigerant and then to supply the refrigerant to the indoor heat exchanger 5 during heat storage recovery cooling operation.

(24-3-5)

In the air conditioning device 100 of the second embodiment, the heat storage device 20 includes the heat storage tank 9, and the heat exchanger for heat storage 10 and the heat exchanger for taking out cold energy 17, which are accommodated in the heat storage tank 9 so as to be immersed in the water W. The heat exchanger for heat storage 10 is connected at one end to the downstream side of the outdoor heat exchanger 3 via the second electronic expansion valve 12 and at the other end to the upstream side of the compressor 2, and also comprises the cooling pipes 10*a* through which the refrigerant flows. The cooling pipes 10*a* are formed to meander in the vertical direction inside the heat storage tank 9. The heat exchanger for taking out cold energy 17 is connected to the upstream side of the first electronic expansion valve 4 in the refrigerant piping 6. During heat storage operation, the refrigerant is allowed to flow via the second electronic expansion valve 12 to the heat exchanger for heat storage 10 to cool the water W in the heat storage tank 9, and then flow to the upstream side of the compressor 2. The air conditioning device 100 is provided with the circuit switching means 15 that switches the circuit connection so as to allow the refrigerant to flow from the outdoor heat exchanger 3 to the heat exchanger for taking out cold energy 17 to cool the refrigerant and then to supply the refrigerant to the indoor heat exchanger 5 during heat storage recovery cooling operation.

(24-3-6)

The heat storage device 20 according to the present disclosure has the following effects.

By arranging the heat exchanger for heat storage 10 in the vertical direction, the adhered ice stays in an approximately uniform manner during heat storage recovery cooling operation, which results in uniform melting of the ice, and localized growth of ice does not occur when making ice again, which suppresses ice blocking and improves heat storage efficiency, as well as preventing deformation and damage of the heat exchanger for heat storage 10 and the heat storage tank 9.

Also, since the cooling pipes 10*a* are located with the cross sections of the cooling pipes 10*a* being on straight lines in the longitudinal and transverse directions in the horizontal sectional view of the heat storage tank 9, even if the ice is fused with each other, there is still a part of the ice that has not turned into ice in between, which accelerates melting by convection of the heat storage medium in that part, thereby improving the melting efficiency.

In addition, since the ice melted in a predetermined amount floats upward along the cooling pipes 10*a* and is melted in the upper layer section of the heat storage tank 9, there is no residual old water inside the ice and localized blocking can be prevented.

(25) EMBODIMENT OF TECHNOLOGY OF TWENTY-FIFTH GROUP

(25-1) First Embodiment

With reference to drawings, a heat load treatment system 100, which is a refrigeration device according to the first embodiment, will be described. Note that the following embodiment is a specific example and does not limit the technical scope, and can be modified as appropriate without departing from the feature. Also, in the following description, expressions indicating directions such as "top", "bottom", "left", "right", "front (front)", and "back (rear)" may be used. Unless otherwise noted, these directions indicate the directions shown by the arrows in the figures. Note that these expressions regarding direction are used only to facilitate understanding of the embodiment, and do not limit the ideas pertaining to the present disclosure in any particular way.

(25-1-1) Entire Configuration

FIG. 25A is a schematic configuration diagram of the heat load treatment system 100. The heat load treatment system 100 is a system for treating a heat load in an installation environment. In the present embodiment, the heat load treatment system 100 is an air conditioning system that carries out air conditioning of the target space.

The heat load treatment system 100 mainly has multiple (here, four) heat source-side units 10, a heat exchanger unit 30, multiple (here, four) utilization-side units 60, multiple (here, four) liquid-side communication pipes LP, multiple (here, four) gas-side communication pipes GP, a first heat medium communication pipe H1 and a second heat medium communication pipe H2, a refrigerant leak sensor 70, and a controller 80 that controls the motion of the heat load treatment system 100.

In the heat load treatment system 100, refrigerant circuits RC in which a refrigerant is circulated are configured by connecting the heat source-side units 10 and the heat exchanger unit 30 with the liquid-side communication pipes LP and the gas-side communication pipes GP. In the heat load treatment system 100, multiple (here, four) refrigerant circuits RC are configured in relation to the multiple heat source-side units 10 being arranged in parallel. In other words, in the heat load treatment system 100, the multiple refrigerant circuits RC are configured by the multiple heat source-side units 10 and the heat exchanger unit 30. The heat load treatment system 100 carries out a vapor compression type refrigeration cycle in each refrigerant circuit RC.

In the present embodiment, the refrigerant enclosed in the refrigerant circuits RC is a mixed refrigerant containing 1,2-difluoroethylene, and any Refrigerant A can be used.

In the heat load treatment system 100, a heat medium circuit HC in which a heat medium is circulated is configured by connecting the heat exchanger unit 30 and the utilization-side units 60 with the first heat medium communication pipe H1 and the second heat medium communication pipe H2. In other words, in the heat load treatment system 100, the heat medium circuit HC is configured by the heat exchanger unit 30 and the utilization-side units 60. In the heat medium circuit HC, the heat medium is circulated by driving a pump 36 of the heat exchanger unit 30.

In the present embodiment, the heat medium enclosed in the heat medium circuit HC is, for example, a liquid medium such as water or brine. The brine includes, for example, an aqueous sodium chloride solution, an aqueous calcium chloride solution, an aqueous ethylene glycol solution, an aqueous propylene glycol solution, and the like. The type of liquid medium is not limited to those exemplified here, and may be selected as appropriate. In particular, brine is to be used as the heat medium in the present embodiment.

(25-1-2) Detailed Configuration (25-1-2-1) Heat Source-Side Unit

In the present system, the heat load treatment system 100 has four heat source-side units 10 (see FIG. 25A). And, the heat exchanger unit 30 cools/heats the liquid medium with the refrigerant that has been cooled/heated in the four heat source-side units 10. However, the number of heat source-side units 10 is just an example, and the number is not limited to four. The number of heat source-side units 10 may be one to three, or it may be five or more. Note that, in FIG. 25A, the internal configuration of only one of the four heat source-side units 10 is drawn, and the internal configuration of the other three units is omitted. The heat source-side units 10, which are omitted from the drawing, have the same configuration as the heat source-side unit 10 to be described below.

The heat source-side units 10 are units that use air as the heat source to cool or heat the refrigerant. Each heat source-side unit 10 is individually connected to the heat exchanger unit 30 via the liquid-side communication pipes LP and gas-side communication pipes GP. In other words, each heat source-side unit 10, together with the heat exchanger unit 30, individually constitutes the refrigerant circuits RC. That is, in the heat load treatment system 100, the multiple (here, four) refrigerant circuits RC are configured by individually connecting the multiple (here, four) heat source-side units 10 to the heat exchanger unit 30. Note that each refrigerant circuit RC is separate and not in communication with each other.

The installation place of the heat source-side units 10 is not limited, but for example, they are installed on the rooftop or in the space around the building. The heat source-side units 10 are connected to the heat exchanger unit 30 via the liquid-side communication pipes LP and the gas-side communication pipes GP, and constitute a part of the refrigerant circuits RC.

The heat source-side units 10 mainly has multiple sets of refrigerant piping (first piping P1 to eleventh piping P11), a compressor 11, an accumulator 12, a four-way switching valve 13, a heat source-side heat exchanger 14, a subcooler 15, a heat source-side first control valve 16, a heat source-side second control valve 17, a liquid-side shut-off valve 18, and a gas-side shut-off valve 19 as the equipment constituting the refrigerant circuits RC.

The first piping P1 connects the gas-side shut-off valve 19 to a first port of the four-way switching valve 13. The second piping P2 connects an inlet port of the accumulator 12 to a second port of the four-way switching valve 13. The third piping P3 connects an outlet port of the accumulator 12 to an inlet port of the compressor 11. The fourth piping P4 connects a discharge port of the compressor 11 to a third port of the four-way switching valve 13. The fifth piping P5 connects a fourth port of the four-way switching valve 13 to a gas-side inlet/outlet of the heat source-side heat exchanger 14. The sixth piping P6 connects a liquid-side inlet/outlet of the heat source-side heat exchanger 14 to one end of the heat source-side first control valve 16. The seventh piping P7 connects the other end of the heat source-side first control valve 16 to one end of a main flow path 151 of the subcooler 15. The eighth piping P8 connects the other end of the main flow path 151 of the subcooler 15 to one end of the liquid-side shut-off valve 18.

The ninth piping P9 connects the part between the both ends of the sixth piping P6 to one end of the heat source-side second control valve 17. The tenth piping P10 connects the other end of the heat source-side second control valve 17 to one end of a sub-flow path 152 of the subcooler 15. The eleventh piping P11 connects the other end of the sub-flow path 152 of the subcooler 15 to an injection port of the compressor 11.

Note that these sets of refrigerant piping (P1 to P11) may be actually constituted of single piping, or may be constituted by connecting multiple sets of piping via joints or the like.

The compressor 11 is equipment that compresses a low-pressure refrigerant in the refrigeration cycle until it reaches a high pressure. In the present embodiment, the compressor 11 has a sealed structure in which a positive displacement compression element such as a rotary type or scroll type is rotationally driven by a compressor motor (omitted in the figure). The operation frequency of the compressor motor can be controlled by an inverter. That is, the compressor 11 is configured such that its capacity can be controlled. However, the compressor 11 may be a compressor with a constant capacity.

The accumulator 12 is a container for suppressing excessive inhalation of the liquid refrigerant into the compressor 11. The accumulator 12 has a predetermined volume depending on the amount of refrigerant filled in the refrigerant circuits RC.

The four-way switching valve 13 is a flow path switching mechanism for switching the flow of refrigerant in the refrigerant circuits RC. The four-way switching valve 13 can be switched between a normal cycle state and a reverse cycle state. When the four-way switching valve 13 is in the normal cycle state, it makes the first port (first piping P1) and the second port (second piping P2) be in communication with each other, and also makes the third port (fourth piping P4) and the fourth port (fifth piping P5) be in communication with each other (see the solid line of the four-way switching valve 13 in FIG. 25A). When the four-way switching valve 13 is in the reverse cycle state, it makes the first port (first piping P1) and the third port (fourth piping P4) be in communication with each other, and also makes the second port (second piping P2) and the fourth port (fifth piping P5) be in communication with each other (see the dashed line of the four-way switching valve 13 in FIG. 25A).

The heat source-side heat exchanger 14 is a heat exchanger that functions as a condenser (or heat dissipator) or evaporator for the refrigerant. During normal cycle operation (operation when the four-way switching valve 13 is in the normal cycle state), the heat source-side heat exchanger 14 functions as a condenser for the refrigerant. Also, during reverse cycle operation (operation when the four-way switching valve 13 is in the reverse cycle state), the heat source-side heat exchanger 14 functions as an evaporator for the refrigerant. The heat source-side heat exchanger 14 includes multiple heat transfer pipes and heat transfer fins (not shown in the figure). The heat source-side heat exchanger 14 is configured to carry out heat exchange between the refrigerant in the heat transfer pipes and the air passing through the surroundings of the heat transfer pipes or heat transfer fins (heat source-side air flow mentioned below).

The subcooler 15 is a heat exchanger that makes the refrigerant that flows into it into a liquid refrigerant in a subcooling state. The subcooler 15 is, for example, a double pipe heat exchanger, and the subcooler 15 is configured with the main flow path 151 and the sub-flow path 152. The subcooler 15 is configured such that the refrigerant flowing through the main flow path 151 and the sub-flow path 152 undergoes heat exchange.

The heat source-side first control valve 16 is an electronic expansion valve whose degree of opening can be controlled, and it decompresses or regulates the flow rate of the refrigerant that flows into it depending on the degree of opening. The heat source-side first control valve 16 can be switched between an open state and a closed state. The heat source-side first control valve 16 is arranged between the heat source-side heat exchanger 14 and the subcooler 15 (main flow path 151).

The heat source-side second control valve 17 is an electronic expansion valve whose degree of opening can be controlled, and it decompresses or regulates the flow rate of the refrigerant that flows into it depending on the degree of opening. The heat source-side second control valve 17 can be switched between an open state and a closed state. The heat source-side second control valve 17 is arranged between the heat source-side heat exchanger 14 and the subcooler 15 (sub-flow path 152).

The liquid-side shut-off valve 18 is a manual valve arranged at the connection part between the eighth piping P8 and the liquid-side communication pipe LP. The liquid-side shut-off valve 18 is connected at one end to the eighth piping P8 and at the other end to the liquid-side communication pipe LP.

The gas-side shut-off valve 19 is a manual valve arranged at the connection part between the first piping P1 and the gas-side communication pipe GP. The gas-side shut-off valve 19 is connected at one end to the first piping P1 and at the other end to the gas-side communication pipe GP.

Also, the heat source-side units 10 have a heat source-side fan 20 that generates a heat source-side air flow that passes through the heat source-side heat exchanger 14. The heat source-side fan 20 is a blower that supplies the heat source-side air flow to the heat source-side heat exchanger 14 as the cooling or heating source for the refrigerant flowing through the heat source-side heat exchanger 14. The heat source-side fan 20 includes a heat source-side fan motor (omitted in the figure), which is the drive source, and the starting/stopping and the number of rotations are controlled as appropriate depending on the situation.

Also, in the heat source-side units 10, multiple heat source-side sensors S1 (see FIG. 25C) are arranged for detecting the state (mainly pressure or temperature) of the refrigerant in the refrigerant circuits RC. The heat source-side sensors S1 are pressure sensors or temperature sensors such as thermistors or thermocouples. The heat source-side sensors S1 include, for example, a first temperature sensor 21 that detects the temperature of the refrigerant (inlet temperature) on the inlet side of the compressor 11 (third piping P3), or a second temperature sensor 22 that detects the temperature of the refrigerant (discharge temperature) on the discharge side of the compressor 11 (fourth piping P4). In addition, the heat source-side sensors S1 include, for example, a third temperature sensor 23 that detects the temperature of the refrigerant on the liquid side of the heat source-side heat exchanger 14 (sixth piping P6), a fourth temperature sensor 24 that detects the temperature of the refrigerant in the eighth piping P8, or a fifth temperature sensor 25 that detects the temperature of the refrigerant in the eleventh piping P11. Moreover, the heat source-side sensors S1 include, for example, a first pressure sensor 27 that detects the pressure of the refrigerant (inlet pressure) on the inlet side of the compressor 11 (second piping P2), or a second pressure sensor 28 that detects the pressure of the refrigerant (discharge pressure) on the discharge side of the compressor 11 (fourth piping P4).

Also, the heat source-side units 10 have a heat source-side unit control section 29 that controls the motion and state of each equipment included in the heat source-side units 10. The heat source-side unit control section 29 has various electrical circuits, a microcomputer having a microprocessor and a memory chip in which a program to be executed by the microprocessor is stored, and the like, in order to execute its functions. The heat source-side unit control section 29 is electrically connected to each equipment (11, 13, 16, 17, 20, and the like) included in the heat source-side units 10 and the heat source-side sensors S1, and inputs and outputs signals to and from each other. In addition, the heat source-side unit control section 29 is electrically connected to a heat exchanger unit control section 49 (mentioned below) of the heat exchanger unit 30 and the like via a communication line, and sends and receives control signals to and from each other.

(25-1-2-2) Heat Exchanger Unit

The heat exchanger unit 30 is equipment that carries out at least one of cooling and heating of the heat medium by causing heat exchange between the heat medium and the refrigerant. In the present embodiment, the heat exchanger unit 30 causes heat exchange between the heat medium and the refrigerant, thereby cooling and heating the heat medium. The heat medium that has been cooled or heated by the liquid refrigerant in the heat exchanger unit 30 is sent to the utilization-side units 60.

The heat exchanger unit 30 is a unit that causes heat exchange between the heat medium to be sent to the utilization-side units 60 and the refrigerant, thereby cooling or heating the heat medium. The installation place of the heat exchanger unit 30 is not limited, but for example, it is installed indoors in a facility equipment room. The heat exchanger unit 30 has multiple sets of refrigerant piping (refrigerant piping Pa, Pb, Pc, and Pd), expansion valves 31, and opening/closing valves 32, in the same number (here, four) as the number of heat source-side units 10 (the number of refrigerant circuits RC), as equipment that constitutes each refrigerant circuit RC. Also, the heat exchanger unit 30 has a heat exchanger 33 as equipment that constitutes each refrigerant circuit RC and heat medium circuit HC.

The refrigerant piping Pa connects the liquid-side communication pipe LP to one end of the expansion valve 31. The refrigerant piping Pb connects the other end of the expansion valve 31 to one liquid-side refrigerant inlet/outlet of the heat exchanger 33. The refrigerant piping Pc connects one gas-side refrigerant inlet/outlet of the heat exchanger 33 to one end of the opening/closing valve 32. The refrigerant piping Pd connects the other end of the opening/closing valve 32 and the gas-side communication pipe GP. Note that these sets of refrigerant piping (Pa to Pd) may be actually constituted of single piping, or may be constituted by connecting multiple sets of piping via joints or the like.

The expansion valve 31 is an electronic expansion valve whose degree of opening can be controlled, and it decompresses or regulates the flow rate of the refrigerant that flows into it depending on the degree of opening. The expansion valve 31 can be switched between an open state and a closed state. The expansion valve 31 is arranged between the heat exchanger 33 and the liquid-side communication pipe LP.

The opening/closing valve 32 is a control valve that can be switched between an open state and a closed state. The opening/closing valve 32 blocks the refrigerant when in the closed state. The opening/closing valve 32 is arranged between the heat exchanger 33 and the gas-side communication pipe GP.

In the heat exchanger 33, multiple flow paths (refrigerant flow paths RP) of refrigerant flowing through the refrigerant circuits RC are formed. In the heat exchanger 33, each refrigerant flow path RP is not in communication with another refrigerant flow path RP. In this regard, in the heat exchanger 33, liquid-side inlet/outlets and gas-side inlet/outlets of the refrigerant flow paths RP are each formed in the same number (here, four) as the number of refrigerant flow paths RP. Also, in the heat exchanger 33, a flow path for the heat medium flowing through the heat medium circuit HC (heat medium flow path HP) is formed.

More specifically, the heat exchanger 33 includes a first heat exchanger 34 and a second heat exchanger 35. The first heat exchanger 34 and the second heat exchanger 35 are configured as separate components. In the first heat exchanger 34 and the second heat exchanger 35, two separated refrigerant flow paths RP are formed respectively. In the first heat exchanger 34 and the second heat exchanger 35, one end of each refrigerant flow path RP is connected to the refrigerant piping Pb of the corresponding refrigerant circuit RC, and the other end of each refrigerant flow path RP is connected to the refrigerant piping Pc of the corresponding refrigerant circuit RC. In the first heat exchanger 34, one end of the heat medium flow path HP is connected to heat medium piping Hb, which will be mentioned later, and the other end of the heat medium flow path HP is connected to heat medium piping Hc, which will be mentioned later. In the second heat exchanger 35, one end of the heat medium flow path HP is connected to Hc, which will be mentioned later, and the other end of the heat medium flow path HP is connected to heat medium piping Hd, which will be mentioned later. The heat medium flow paths HP of the first heat exchanger 34 and the second heat exchanger 35 are aligned in series in the heat medium circuit HC. The first heat exchanger 34 and the second heat exchanger 35 are configured so as to cause heat exchange between the refrigerant flowing through each refrigerant flow path RP (refrigerant circuit RC) and the heat medium flowing through the heat medium flow path HP (heat medium circuit HC).

Also, the heat exchanger unit 30 further has multiple sets of heat medium piping (heat medium piping Ha, Hb, Hc, and Hd) and a pump 36 as equipment that constitutes the heat medium circuit HC.

The heat medium piping Ha is connected at one end to a first heat medium communication pipe H1 and at the other end to an inlet-side port of the pump 36. The heat medium piping Hb is connected at one end to a discharge-side port of the pump 36 and at the other end to one end of the heat medium flow path HP of the first heat exchanger 34. The heat medium piping Hc is connected at one end to the other end of the heat medium flow path HP of the first heat exchanger 34 and at the other end to one end of the heat medium flow path HP of the second heat exchanger 35. The heat medium piping Hd is connected at one end to the other end of the heat medium flow path HP of the second heat exchanger 35 and at the other end to a second heat medium communication pipe H2. Note that these sets of heat medium piping (Ha to Hd) may be actually constituted of single piping, or may be constituted by connecting multiple sets of piping via joints or the like.

The pump 36 is arranged in the heat medium circuit HC. During operation, the pump 36 inhales and discharges the heat medium. The pump 36 includes a motor, which is the drive source, and the number of rotations is adjusted by inverter control of the motor. That is, the pump 36 has a variable discharge flow rate. Note that the heat exchanger unit 30 may have multiple pumps 36 connected in series or in parallel in the heat medium circuit HC. Also, the pump 36 may be a constant rate pump.

In addition, in the heat exchanger unit 30, multiple heat exchanger unit sensors S2 (see FIG. 25C) are arranged for detecting the state (mainly pressure or temperature) of the refrigerant in the refrigerant circuits RC. The heat exchanger unit sensors S2 are pressure sensors or temperature sensors such as thermistors or thermocouples. The heat exchanger unit sensors S2 include, for example, a sixth temperature sensor 41 that detects the temperature of the refrigerant on the liquid side (refrigerant piping Pb) of the heat exchanger 33 (refrigerant flow path RP), and a seventh temperature sensor 42 that detects the temperature of the refrigerant on the gas side (refrigerant piping Pc) of the heat exchanger 33 (refrigerant flow path RP). Moreover, the heat exchanger unit sensors S2 include, for example, a third pressure sensor 43 that detects the pressure of the refrigerant on the liquid side (refrigerant piping Pb) of the heat exchanger 33 (refrigerant flow path RP), and a fourth pressure sensor 44 that detects the pressure of the refrigerant on the gas side (refrigerant piping Pc) of the heat exchanger 33 (refrigerant flow path RP).

The heat exchanger unit 30 also has an exhaust fan unit for, in the case where a refrigerant leak occurs in the heat exchanger unit 30 (refrigerant circuit RC), discharging the leaked refrigerant out of the heat exchanger unit 30. The exhaust fan unit includes an exhaust fan 46. The exhaust fan 46 is driven in conjunction with the drive source (such as a fan motor). The exhaust fan 46, when driven, generates a first air flow AF1 that flows out from inside the heat exchanger unit 30 to the outside. The type of exhaust fan 46 is not limited, but is, for example, a sirocco fan or a propeller fan.

The heat exchanger unit 30 also has a cooling fan 48. The cooling fan 48 is driven in conjunction with the drive source (such as a fan motor). The cooling fan 48, when driven, generates a second air flow AF2 for cooling the electrical components (heat generating components) arranged inside the heat exchanger unit 30. The cooling fan 48 is arranged such that the second air flow AF2 passes through the surroundings of the heat generating components to undergo heat exchange and then flows out from inside the heat exchanger unit 30 to the outside. The type of cooling fan 48 is not limited, but is, for example, a sirocco fan or a propeller fan.

Also, the heat exchanger unit 30 have a heat exchanger unit control section 49 that controls the motion and state of each equipment included in the heat exchanger unit 30. The heat exchanger unit control section 49 has a microcomputer having a microprocessor and a memory chip in which a program to be executed by the microprocessor is stored, various electrical components, and the like, in order to execute its functions. The heat exchanger unit control section 49 is electrically connected to each equipment included in the heat exchanger unit 30 and the heat exchanger unit sensors S2, and inputs and outputs signals to and from each other. In addition, the heat exchanger unit control section 49 is electrically connected to the heat source-side unit control section 29, a control section (omitted in the figure) arranged inside the utilization-side units 60, a remote control (omitted in the figure), or the like via a communication line, and sends and receives control signals to and from each other. The electrical components included in the heat exchanger unit control section 49 are cooled by the second air flow AF2 generated by the cooling fan 48.

(25-1-2-3) Utilization-Side Units

The utilization-side units 60 are facilities that utilize the heat medium cooled/heated by the heat exchanger unit 30. Each utilization-side unit 60 is connected to the heat exchanger unit 30 via the first heat medium communication pipe H1, the second heat medium communication pipe H2, and the like. The utilization-side units 60 constitute the heat medium circuit HC together with the heat exchanger unit 30.

In the present embodiment, the utilization-side units 60 are air handling units or fan coil units that carry out air conditioning by causing heat exchange between the heat medium that has been cooled/heated by the heat exchanger unit 30 and the air.

In FIG. 25A, only one utilization-side unit 60 is illustrated. However, the heat load treatment system 100 may include multiple utilization-side units, and the heat medium that has been cooled/heated by the heat exchanger unit 30 may branch off and be sent to multiple utilization-side units. Also, when multiple utilization-side units are included in the heat load treatment system 100, the types of the multiple utilization-side units may all be the same, or the multiple utilization-side units may include multiple types of facilities.

(25-1-2-4) Liquid-Side Communication Pipes and Gas-Side Communication Pipes

Each liquid-side communication pipe LP and each gas-side communication pipe GP connect the heat exchanger unit 30 and the corresponding heat source-side unit 10 to constitute a flow path for refrigerant. The liquid-side communication pipes LP and the gas-side communication pipes GP are executed at installation sites. Note that the liquid-side communication pipes LP or the gas-side communication pipes GP may be actually constituted of single piping, or may be constituted by connecting multiple sets of piping via joints or the like.

(25-1-2-5) First Heat Medium Communication Pipe and Second Heat Medium Communication Pipe The first heat medium communication pipe H1 and the second heat medium communication pipe H2 connect the heat exchanger unit 30 and the corresponding utilization-side unit 60 to constitute a flow path for heat medium. The first heat medium communication pipe H1 and the second heat medium communication pipe H2 are executed at installation sites. Note that the first heat medium communication pipe H1 or the second heat medium communication pipe H2 may be actually constituted of single piping, or may be constituted by connecting multiple sets of piping via joints or the like.

(25-1-2-6) Refrigerant Leak Sensor

A refrigerant leak sensor 70 is a sensor for detecting a refrigerant leak in a space where the heat exchanger unit 30 is arranged (here, a facility equipment room R, which will be mentioned later). More specifically, the refrigerant leak sensor 70 detects a leaked refrigerant in the heat exchanger unit 30. In the present embodiment, as the refrigerant leak sensor 70, a publicly known general purpose product is used depending on the type of refrigerant enclosed in the refrigerant circuits RC. The refrigerant leak sensor 70 is arranged in the space where the heat exchanger unit 30 is arranged. In the present embodiment, the refrigerant leak sensor 70 is arranged inside the heat exchanger unit 30.

The refrigerant leak sensor 70 continuously or intermittently outputs an electrical signal depending on the detected value (refrigerant leak sensor detection signal) to a controller 80. In more details, the refrigerant leak sensor detection signal output from the refrigerant leak sensor 70 varies in voltage depending on the concentration of the refrigerant detected by the refrigerant leak sensor 70. In other words, the refrigerant leak sensor detection signal is output to the controller 80 in an aspect that enables identification of the concentration of the leaked refrigerant in the space where the refrigerant leak sensor 70 is installed (in more details, the concentration of the refrigerant detected by the refrigerant leak sensor 70), in addition to whether there is a refrigerant leak in the refrigerant circuits RC or not.

(25-1-2-7) Controller

The controller 80 shown in FIG. 25C is a computer that controls the motion of the heat load treatment system 100 by controlling the status of each equipment. In the present embodiment, the controller 80 is configured by connecting the heat source-side unit control section 29, the heat exchanger unit control section 49, and equipment connected to them (for example, control sections and remote controls arranged in the utilization-side units) via communication lines. That is, in the present embodiment, the controller 80 is realized by cooperation of the heat source-side unit control section 29, the heat exchanger unit control section 49, and the equipment connected to them.

(25-1-3) Aspect of Installation of Heat Load Treatment System

FIG. 25B is a schematic diagram showing the aspect of installation of the heat load treatment system 100. The heat load treatment system 100 is installed in, for example, buildings, commercial facilities, factories, or the like, although its installation place is not limited. In the present embodiment, the heat load treatment system 100 is installed in a building B1 in an aspect as shown in FIG. 25B. The building B1 has multiple floors. Note that the number of floors, rooms, and the like in the building B1 can be changed as appropriate.

The building B1 is provided with a facility equipment room R. The facility equipment room R is a space where electrical facilities such as a switchboard and a generator, or cooling and heating equipment such as a boiler are arranged. The facility equipment room R is a space where people can enter, leave, and stay. For example, the facility equipment room R is a space where people can walk, such as a basement. In the present embodiment, the facility equipment room R is located on the lowest floor of the building B1. The building B1 is also provided with a living space SP where people carry out activities. The building B1 is provided with multiple living spaces SP. In the present embodiment, the living spaces SP are located on floors above where the facility equipment room R is provided.

In FIG. 25B, the heat source-side unit 10 is installed on a rooftop of the building B1. Also, the heat exchanger unit 30 is installed in the facility equipment room R. In this regard, the liquid-side communication pipe LP and the gas-side communication pipe GP extend along the vertical direction between the rooftop and the facility equipment room R.

In addition, in FIG. 25B, each utilization-side unit 60 is arranged in the corresponding living space SP. In this regard, the first heat medium communication pipe H1 and the second heat medium communication pipe H2 extend along the vertical direction between the living spaces SP and the facility equipment room R.

In the building B1, ventilation devices 200 are provided that carry out ventilation (forced ventilation or natural ventilation) of the facility equipment room R. Each ventilation device 200 is installed in the facility equipment room R. Specifically, in the facility equipment room R, a ventilation fan 210 is installed as a ventilation device 200. The ventilation fan 210 is connected to multiple ventilation ducts D. When driven, the ventilation fan 210 ventilates the facility equipment room R by discharging the air inside the facility equipment room R (indoor air RA) to the outside space as exhaust air EA and supplying the air in the outside space (outdoor air OA) to the facility equipment room R as supply air SA. That is, the ventilation fan 210 corresponds to a "ventilation device" that carries out ventilation in the facility equipment room R. The motion of the ventilation fan 210 (for example, starting/stopping, number of rotations, or the like) can be controlled by the controller 80. As for the control of the ventilation fan 210, an intermittent operation mode, in which the ventilation fan 210 is operated intermittently, and a continuous operation mode, in which it is operated continuously, can be switched as appropriate.

Also, in the facility equipment room R, an opening/closing mechanism 220 is installed as a ventilation device 200. The opening/closing mechanism 220 is a mechanism that can be switched between an open state to make the facility equipment room R and another space (such as the outside space) be in communication with each other, and a closed state to block them. That is, the opening/closing mechanism 220 opens and closes an opening that makes the facility equipment room R and another space be in communication with each other. The opening/closing mechanism 220 is, for example, a door, a hatch, a window, a shutter, or the like that can be controlled to open and close. The opening/closing mechanism 220 is electrically connected to the controller 80 via an adaptor 80*b* (see FIG. 25C). The state of the ventilation fan 210 (open state or closed state) is controlled by the controller 80.

(25-1-4) Characteristics

In the heat load treatment system 100 according to the present embodiment, any of the mixed refrigerants of Refrigerant A is employed as the refrigerant to be enclosed in the refrigerant circuits RC, which are the first cycles, and thus the efficiency of heat exchange in the heat exchanger unit 30 can be improved.

(25-2) Second Embodiment

A refrigerant circuit diagram of a binary refrigeration device 500, which is a refrigeration device according to the present embodiment, is shown in FIG. 25D. The binary refrigeration device 500 comprises a first cycle 510, which is a high-temperature refrigeration cycle on the high temperature side, and a second cycle 520, which is a low-temperature refrigeration cycle on the low temperature side. The first cycle 510 and the second cycle 520 are thermally connected by a cascade condenser 531. Each element that constitutes the first cycle 510 and the second cycle 520 is accommodated in an outdoor unit 501 or a cooling unit 502, which will be mentioned later.

As the refrigerant enclosed in the second cycle 520, carbon dioxide, or CO2, which has a small impact on global warming, is used in consideration of a refrigerant leak. The refrigerant enclosed in the first cycle 510 is a mixed refrigerant containing 1,2-difluoroethylene, and any Refrigerant A mentioned above can be used. Hereinafter, the refrigerant on the low temperature side enclosed in the second cycle 520 is referred to as a second refrigerant, and the refrigerant on the high temperature side enclosed in the first cycle 510 is referred to as a first refrigerant.

The first cycle 510 is a refrigeration cycle in which the first refrigerant is circulated. In the first cycle 510, a first compressor 511, a first condenser 512, a first expansion valve 513, and a first evaporator 514 are sequentially connected by refrigerant piping to constitute a refrigerant circuit. The refrigerant circuit of the first cycle 510 is referred to herein as a first refrigerant circuit.

The second cycle 520 is a refrigeration cycle in which the second refrigerant is circulated. In the second cycle 520, a second compressor 521, a second upstream-side condenser 522, a second downstream-side condenser 523, a liquid receiver 525, a second downstream-side expansion valve 526, and a second evaporator 527 are sequentially connected by refrigerant piping to constitute a refrigerant circuit. Also, the second cycle 520 has a second upstream-side expansion valve 524 provided between the second downstream-side condenser 523 and the liquid receiver 525. The refrigerant circuit of the second cycle 520 is referred to herein as a second refrigerant circuit.

The binary refrigeration device 500 comprises the cascade condenser 531 mentioned above. In the cascade condenser 531, the first evaporator 514 and the second downstream-side condenser 523 are configured to be bonded so as to enable heat exchange between the refrigerant passing through the first evaporator 514 and the refrigerant passing through the second downstream-side condenser 523. That is, the cascade condenser 531 is an inter-refrigerant heat exchanger. By providing the cascade condenser 531, the second refrigerant circuit and the first refrigerant circuit are of a multistage configuration.

The first compressor 511 inhales the first refrigerant flowing through the first refrigerant circuit, compresses the inhaled first refrigerant into a high-temperature, high-pressure gas refrigerant, and discharges it. In the present embodiment, the first compressor 511 is a type of compressor whose number of rotations can be controlled by an inverter circuit to adjust the discharge amount of refrigerant.

The first condenser 512 carries out heat exchange between, for example, air, brine, or the like, and the refrigerant flowing through the first refrigerant circuit to condense and liquefy the refrigerant. In the present embodiment, the first condenser 512 carries out heat exchange between outside air and the refrigerant. The binary refrigeration device 500 has a first condenser fan 512*a*. The first condenser fan 512*a* blows the outside air to the first condenser 512, which promotes heat exchange in the first condenser 512. The first condenser fan 512*a* can adjust the air volume.

The first expansion valve 513 decompresses and expands the first refrigerant flowing through the first refrigerant circuit, and for example, it is an electronic expansion valve.

The first evaporator 514 evaporates and gasifies the refrigerant flowing through the first refrigerant circuit by heat exchange. In the present embodiment, the first evaporator 514 is configured with, for example, heat transfer pipes or the like through which the refrigerant flowing through the first refrigerant circuit in the cascade condenser 531 passes. And, in the cascade condenser 531, the first refrigerant flowing through the first evaporator 514 and the second refrigerant flowing through the second refrigerant circuit undergo heat exchange.

The second compressor 521 inhales the second refrigerant flowing through the second refrigerant circuit, compresses the inhaled second refrigerant into a high-temperature, high-pressure gas refrigerant, and discharges it. In the present embodiment, the second compressor 521 is a type of compressor whose number of rotations can be controlled by an inverter circuit, for example, to adjust the discharge amount of refrigerant.

The second upstream-side condenser 522 carries out heat exchange between, for example, air, brine, or the like, and the refrigerant flowing through the first refrigerant circuit to condense and liquefy the refrigerant. In the present embodiment, the second upstream-side condenser 522 carries out heat exchange between outside air and the refrigerant. The binary refrigeration device 500 has a second condenser fan 522*a*. The second condenser fan 522*a* blows the outside air to the second upstream-side condenser 522, which promotes heat exchange in the second upstream-side condenser 522. The second condenser fan 522*a* is a type of fan whose air volume can be adjusted.

The second downstream-side condenser 523 makes the refrigerant that has been condensed and liquefied in the second upstream-side condenser 522 into a further sub-cooled refrigerant. In the present embodiment, the second downstream-side condenser 523 is configured with heat transfer pipes through which the second refrigerant flowing through the second refrigerant circuit in the cascade condenser 531 passes. And, in the cascade condenser 531, the second refrigerant flowing through the second downstream-side condenser 523 and the first refrigerant flowing through the first refrigerant circuit undergo heat exchange.

The second upstream-side expansion valve 524 decompresses and expands the second refrigerant flowing through the second refrigerant circuit, and here, it is an electronic expansion valve.

The liquid receiver 525 is provided on the downstream side of the second downstream-side condenser 523 and the second upstream-side expansion valve 524. The liquid receiver 525 temporarily stores the refrigerant.

The second downstream-side expansion valve 526 decompresses and expands the second refrigerant flowing through the second refrigerant circuit, and it is an electronic expansion valve.

The second evaporator 527 evaporates and gasifies the first refrigerant flowing through the first refrigerant circuit by heat exchange. By the heat exchange with the refrigerant in the second evaporator 527, the cooling target will be cooled directly or indirectly.

Each component of the binary refrigeration device 500 mentioned above is accommodated in the outdoor unit 501 or the cooling unit 502. The cooling unit 502 is used as, for example, a refrigeration and freezing showcase or a unit cooler. In the present embodiment, the first compressor 511, the first condenser 512, the first expansion valve 513, the first evaporator 514, the second compressor 521, the second upstream-side condenser 522, the second downstream-side condenser 523, the second upstream-side expansion valve 524, the liquid receiver 525, subcooled refrigerant piping 528, vapor refrigerant piping 529, a capillary tube 528*a*, and a check valve 529*a* are accommodated in the outdoor unit 501. Also, the second downstream-side expansion valve 526 and the second evaporator 527 are accommodated in the cooling unit 502. And, the outdoor unit 501 and the cooling unit 502 are connected with two sets of piping, namely liquid piping 551 and gas piping 552.

In the binary refrigeration device 500 with the configuration as described above, the motion and the like of each constituent equipment in ordinary cooling operation to cool the air, which is the cooling target, will be described based on the flow of refrigerant that is circulated in each refrigerant circuit.

At first, the motion of the first cycle 510 will be described with reference to FIG. 25D. The first compressor 511 inhales the first refrigerant, compresses it into a high-temperature, high-pressure gas refrigerant, and discharges it. The discharged first refrigerant flows into the first condenser 512. The first condenser 512 carries out heat exchange between the outside air supplied from the first condenser fan 512*a* and the first refrigerant, which is the gas refrigerant, to condense and liquefy the first refrigerant. The condensed and liquefied first refrigerant passes through the first expansion valve 513. The first expansion valve 513 decompresses the condensed and liquefied first refrigerant. The decompressed first refrigerant flows into the first evaporator 514 in the cascade condenser 531. The first evaporator 514 evaporates and gasifies the first refrigerant by heat exchange with the second refrigerant passing through the second downstream-side condenser 523. The evaporated and gasified first refrigerant is inhaled into the first compressor 511.

Next, the motion of the second cycle 520 will be described with reference to FIG. 25D. The second compressor 521 inhales the second refrigerant, compresses it into a high-temperature, high-pressure gas refrigerant, and discharges it. The discharged second refrigerant flows into the second upstream-side condenser 522. The second upstream-side condenser 522 carries out heat exchange between the outside air supplied from the second condenser fan 522*a* and the second refrigerant to condense the second refrigerant, which then flows into the second downstream-side condenser 523 in the cascade condenser 531. The second downstream-side condenser 523 further subcools and liquefies the first refrigerant by heat exchange with the first refrigerant passing through the first evaporator 514. The subcooled and liquefied second refrigerant passes through the second upstream-side expansion valve 524. The second upstream-side expansion valve 524 decompresses the subcooled and liquefied second refrigerant to an intermediate pressure refrigerant. The second refrigerant that has been decompressed to an intermediate pressure passes through the liquid receiver 525 and then through the second downstream-side expansion valve 526, where it is decompressed to become a low-pressure refrigerant. The second refrigerant that has been decompressed to a low pressure flows into the second evaporator 527. The second evaporator 527 uses a second evaporator fan 527*a* to cause heat exchange between the air inside a freezing warehouse and the second refrigerant, thereby evaporating and gasifying the second refrigerant. The evaporated and gasified second refrigerant is inhaled into the second compressor 521.

In the binary refrigeration device 500 according to the present embodiment, any of the mixed refrigerants of Refrigerant A is employed as the first refrigerant to be enclosed in the first cycle 510, and thus the efficiency of heat exchange in the cascade condenser 531 can be improved. In addition, by employing any of the mixed refrigerants of Refrigerant A as the first refrigerant, it is also possible to lower the GWP (global warming potential) compared to the case of using R32.

(25-2-1) First Modification of Second Embodiment

In the above embodiment, any of the mixed refrigerants of Refrigerant A is employed as the first refrigerant to be enclosed in the first cycle 510 and carbon dioxide is employed as the second refrigerant to be enclosed in the second cycle 520, but any of the mixed refrigerants of Refrigerant A may be employed for both the first refrigerant and the second refrigerant. Here, the first cycle 510 and the second cycle 520 are combined via the cascade condenser 531 to constitute the binary refrigeration device 500, and the amount of refrigerant filled in the cycle that passes through the side of the cooling unit 502 (the second cycle 520) is reduced compared to that in unitary devices. This makes it possible to reduce the cost of safety measures for a refrigerant leak on the side of the cooling unit 502.

(25-2-2) Second Modification of Second Embodiment

In the above embodiment, any of the mixed refrigerants of Refrigerant A is employed as the first refrigerant to be enclosed in the first cycle 510 and carbon dioxide is employed as the second refrigerant to be enclosed in the second cycle 520, but R32 may be employed as the first refrigerant and any of the mixed refrigerants of Refrigerant A may be employed as the second refrigerant. Here, by using the mixed refrigerants, which tend to have a lower design value for pressure resistance compared to carbon dioxide ($CO2$), it becomes possible to lower the pressure resistance level of the piping and components that constitute the second cycle 520.

(25-3) Third Embodiment

(25-3-1) Entire Configuration

FIG. 25E shows an air conditioning hot water supply system 600, which is a refrigeration device according to the third embodiment. FIG. 25E is a circuit configuration diagram of the air conditioning hot water supply system 600. The air conditioning hot water supply system 600 comprises an air conditioning device 610 and a hot water supply device 620. A warm water circuit for hot water supply 640 is connected to the hot water supply device 620.

(25-3-2) Detailed Configuration

(25-3-2-1) Air Conditioning Device

The air conditioning device 610 comprises a refrigerant circuit for air conditioning 615 in which a compressor 611, an outdoor heat exchanger 612, an expansion valve 613, and an indoor heat exchanger 614 are connected. Specifically, a first port P1 of a four-way switching valve 616 is connected to the discharge side of the compressor 611. The gas-side end of the outdoor heat exchanger 612 is connected to a second port P2 of the four-way switching valve 616. The liquid-side end of the outdoor heat exchanger 612 is connected to the liquid-side end of the indoor heat exchanger 614 via the expansion valve 613. The gas-side end of the indoor heat exchanger 614 is connected to a third port P3 of the four-way switching valve 616. And, a fourth port P4 of the four-way switching valve 616 is connected to the inlet side of the compressor 611.

The four-way switching valve 616 switches between a first state of communication in which the first port P1 and the second port P2 are in communication and the third port P3 and the fourth port P4 are in communication (the state in the dashed line in the figure), and a second state of communication in which the first port P1 and the third port P3 are in communication and the second port P2 and the fourth port P4 are in communication (the state in the solid line in the figure). By switching the four-way switching valve 616, the direction in which the refrigerant is circulated can be reversed.

In the third embodiment, the refrigerant circuit for air conditioning 615 is filled with a refrigerant for carrying out a vapor compression type refrigeration cycle. That refrigerant is a mixed refrigerant containing 1,2-difluoroethylene, and any Refrigerant A can be used.

(25-3-2-2) Hot Water Supply Device

The hot water supply device 620 has a refrigerant circuit for hot water supply 625. In the refrigerant circuit for hot water supply 625, a compressor 621, a first heat exchanger 622, an expansion valve 623, and a second heat exchanger 624 are connected in this order. The refrigerant circuit for hot water supply 625 is filled with carbon dioxide refrigerant as the refrigerant. The hot water supply device 620 is one in which each equipment that constitutes the refrigerant circuit for hot water supply 625 is accommodated in one casing, and constitutes one hot water supply unit.

The first heat exchanger 622 is a water/refrigerant heat exchanger in which a heat absorbing section 622*a* and a heat dissipating section 622*b* are integrally configured. In the first heat exchanger 622, the heat dissipating section 622*b* is connected to the refrigerant circuit for hot water supply 625, and the heat absorbing section 622*a* is connected to the warm water circuit for hot water supply 640, which produces warm water from water. In the first heat exchanger 622, warm water is produced from water in the warm water circuit for hot water supply 640 by causing heat exchange between the water in the warm water circuit for hot water supply 640 and the carbon dioxide refrigerant in the refrigerant circuit for hot water supply 625.

The warm water circuit for hot water supply 640 is a circuit in which a circulation pump 641, the heat absorbing section 622*a* of the first heat exchanger 622, and a hot water storage tank 642 are connected. In the warm water circuit for hot water supply 640, water/hot water is circulated such that the warm water that has been heated by the carbon dioxide refrigerant in the first heat exchanger 622 is stored in the hot water storage tank 642. In order to supply water to and drain water out of the hot water storage tank 642, a water supply pipe 643 to the hot water storage tank 642 and a hot water outlet pipe 644 from the hot water storage tank 642 are connected to the warm water circuit for hot water supply 640.

The second heat exchanger 624 is a cascade heat exchanger in which a heat absorbing section 624*a* and a heat dissipating section 624*b* are integrally configured, with the heat absorbing section 624*a* connected to the refrigerant circuit for hot water supply 625 and the heat dissipating section 624*b* connected to the refrigerant circuit for air conditioning 615. By setting the second heat exchanger 624 as a cascade heat exchanger as described above, the refrigerant circuit for air conditioning 615 carries out the motion on the low stage (low temperature) side of the binary heat pump cycle, and the refrigerant circuit for hot water supply 625 carries out the motion on the high stage (high temperature) side.

The second heat exchanger 624 is connected in parallel to the indoor heat exchanger 614 of the refrigerant circuit for air conditioning 615, which is on the low stage side of the binary heat pump cycle. By switching a three-way switching valve 650, the state in which the refrigerant in the refrigerant circuit for air conditioning 615 flows to the second heat exchanger 624 and the state in which the refrigerant flows to the indoor heat exchanger 614 are switched. In other words, in the refrigerant circuit for air conditioning 615, which is on the low stage of the binary heat pump cycle, a first motion in which the refrigerant is circulated between the outdoor heat exchanger 612 and the indoor heat exchanger 614 and a second motion in which the refrigerant is circulated between the outdoor heat exchanger 612 and the second heat exchanger 624 can be switched.

(25-3-3) Operational Motion of Air Conditioning Hot Water Supply System

Next, the operational motion of the air conditioning hot water supply system 600 will be described.

First, air conditioning operation, which is the first motion, can be carried out by switching between cooling operation and heating operation. During cooling operation, the four-way switching valve 616 is set to the first state of communication on the dashed line side, and the three-way switching valve 650 is set to a first state of communication on the dashed line side. In this state, the refrigerant that has been discharged from the compressor 611 passes through the four-way switching valve 616 and flows into the outdoor heat exchanger 612, where it dissipates heat to outside air and is condensed in the outdoor heat exchanger 612. The refrigerant is expanded in the expansion valve 613, and then absorbs heat from indoor air in the indoor heat exchanger 614 and is evaporated to cool the indoor air. Thereafter, the refrigerant passes through the four-way switching valve 616 and is inhaled into the compressor 611. The refrigerant is circulated as described above to repeat the compression process, condensation process, expansion process, and evaporation process, thereby cooling indoors.

Also, during heating operation, the four-way switching valve 616 is set to the second state of communication on the solid line side, and the three-way switching valve 650 is set to a first state of communication on the dashed line side. In this state, the refrigerant that has been discharged from the compressor 611 passes through the four-way switching valve 616 and the three-way switching valve 650 and flows into the indoor heat exchanger 614, where it dissipates heat to indoor air and is condensed in the indoor heat exchanger 614 to heat the indoor air. This refrigerant is expanded in the expansion valve 613, and then absorbs heat from outside air in the outdoor heat exchanger 612 and is evaporated. Thereafter, the refrigerant passes through the four-way switching valve 616 and is inhaled into the compressor 611. The refrigerant is circulated as described above, thereby heating indoors.

On the other hand, hot water storage operation, which is the second motion, is carried out during the midnight time period when air conditioning is not needed. At this time, in the refrigerant circuit for air conditioning 615, the four-way switching valve 616 is set to the second state of communication on the solid line side as in the same case as during heating operation, and the three-way switching valve 650 is set to a second state of communication on the solid line side, contrary to the case during air conditioning operation. At this time, the compressor 621 of the refrigerant circuit for hot water supply 625 and the circulation pump 641 of the warm water circuit for hot water supply 640 are also operated.

In this state, in the refrigerant circuit for air conditioning 615, the refrigerant that has been discharged from the compressor 611 passes through the four-way switching valve 616 and the three-way switching valve 650 and flows into the heat dissipating section 624*b* of the second heat exchanger 624. In the heat dissipating section 624*b*, the refrigerant flowing through the refrigerant circuit for air conditioning 615 dissipates heat to the carbon dioxide refrigerant in the refrigerant circuit for hot water supply 625 and is condensed, heating the carbon dioxide refrigerant. The refrigerant in the refrigerant circuit for air conditioning 615 is then expanded in the expansion valve 613, evaporated in the outdoor heat exchanger 612, and then passes through the four-way switching valve 616 to be inhaled into the compressor 611. The refrigerant in the refrigerant circuit for air conditioning 615 is circulated as described above to repeat the compression process, condensation process, expansion process, and evaporation process.

In the refrigerant circuit for hot water supply 625, the carbon dioxide refrigerant undergoes the following processes in order: the compression process in the compressor 621; the heat dissipation process in the heat dissipating section 622*b* of the first heat exchanger 622; the expansion process in the expansion valve 623; and the heat absorption process in the heat absorbing section 624*a* of the second heat exchanger 624. In the second heat exchanger 624, the carbon dioxide refrigerant absorbs heat from the refrigerant flowing through the refrigerant circuit for air conditioning 615, and in the first heat exchanger 622, the carbon dioxide refrigerant acts to give warm energy to the water in the warm water circuit for hot water supply 640.

In the warm water circuit for hot water supply 640, the water in the hot water storage tank 642 is supplied by the circulation pump 641 to the heat absorbing section 622*a* of the first heat exchanger 622, where it is heated (warm water is produced). The warm water produced by the heating is returned to the hot water storage tank 642, and the circulation of warm water is continued in the warm water circuit for hot water supply 640 until it reaches a predetermined heat storage temperature. The above hot water storage operation is carried out during the midnight time period, as mentioned above. On the other hand, hot water supply operation, in which hot water is sent out from the hot water storage tank 642, is carried out during daytime and nighttime periods. During hot water supply operation, the refrigerant circuit for hot water supply 625 is stopped, and in the refrigerant circuit for air conditioning 615, cooling operation or heating operation can be carried out using the indoor heat exchanger 614.

(25-3-4) Characteristics of Air Conditioning Hot Water Supply System

The air conditioning hot water supply system 600 according to the third embodiment uses a unit-type hot water supply device 620, in which the second heat exchanger 624 on the heat source side in the refrigerant circuit for hot water supply 625 using carbon dioxide as the refrigerant is a cascade heat exchanger. Also, the second heat exchanger 624 is connected to the refrigerant circuit for air conditioning 615, which is the low stage-side refrigerant circuit, to achieve a configuration carrying out binary heat pump cycle motion. In the refrigerant circuit for air conditioning 615, any of the mixed refrigerants of Refrigerant A containing 1,2-difluoroethylene is used. As a result, the efficiency of heat exchange in the second heat exchanger 624 can be improved.

(25-3-5) Modification of Third Embodiment

In the above embodiment, any of the mixed refrigerants of Refrigerant A is employed as the first refrigerant to be enclosed in the refrigerant circuit for air conditioning 615, which is the first cycle and carbon dioxide is employed as the second refrigerant to be enclosed in the refrigerant circuit for hot water supply 625, which is the second cycle, but it is preferable to employ a refrigerant with a lower saturation pressure at a predetermined temperature than the first refrigerant as the second refrigerant to be enclosed in the refrigerant circuit for hot water supply 625. For example, it is preferable to enclose R134a in the refrigerant circuit for hot water supply 625.

While each embodiment regarding the technology of each group has been described above, it will be understood that a wide variety of modifications in form and details can be made without departing from the spirit and scope of the present disclosure as set forth in the claims.

EXAMPLES

Hereinafter, the present disclosure will be described in further details by way of Examples. However, the present disclosure is not limited to these Examples.

Mixed refrigerants were prepared by mixing HFO-1132 (E), HFO-1123 and R1234yf, and R32 at the respective mass percentages shown in Tables 7 to 16, based on their sum.

The GWP of compositions containing a mixture of R410A (R32=50%/R125=50%) was evaluated based on the values in the Fourth Report of the Intergovernmental Panel on Climate Change (IPCC). There is no description for the GWP of HFO-1132 (E), but based on HFO-1132a (GWP=1 or less) and HFO-1123 (GWP=0.3, as described in Patent Literature 1), its GWP was assumed to be 1. The refrigeration capacity of compositions containing R410A and mixtures of HFO-1132 (E) and HFO-1123 was determined by using the National Institute of Science and Technology (NIST) Reference Fluid Thermodynamic and Transport Properties Database (Refprop 9.0) and by performing theoretical refrigeration cycle calculations for the mixed refrigerants under the following conditions.

For each of these mixed refrigerants, both the COP ratio and the refrigeration capacity ratio based on R410 were determined. The calculation conditions were as follows.

Evaporating temperature: 5° C.
Condensation temperature: 45° C.
Degree of superheating: 5K
Degree of subcooling: 5K
Compressor efficiency: 70%

These values are shown in Tables 7 to 16, along with the GWP for each mixed refrigerant. Note that the COP ratio and the refrigeration capacity ratio are shown as the proportion relative to R410A.

The coefficient of performance (COP) was determined by the following equation.

COP=(refrigeration capacity or heating capacity)/power consumption

TABLE 7

| Item | Unit | Com Ex1 | Com Ex2 A | Com Ex3 B | Com Ex4 C | Com Ex5 D' | Com Ex6 J | Example1 L | Example2 M | Example3 N | Com Ex7 K' |
|---|---|---|---|---|---|---|---|---|---|---|---|
| HFO-1132(E) | mass % | R410A | 68.6 | 0.0 | 32.9 | 0.0 | 47.1 | 63.0 | 68.9 | 66.9 | 61.7 |
| HFO-1123 | mass % | | 0.0 | 58.7 | 67.1 | 75.4 | 52.9 | 32.0 | 16.1 | 9.4 | 5.9 |
| R1234yf | mass % | | 31.4 | 41.3 | 0.0 | 24.6 | 0.0 | 5.0 | 15.0 | 23.7 | 32.4 |
| R32 | mass % | | 0.0 | 0.0 | 0.0 | 0.0 | 0.0 | 0.0 | 0.0 | 0.0 | 0.0 |
| GWP | — | 2088 | 2 | 2 | 1 | 2 | 1 | 1 | 1 | 2 | 2 |
| COP ratio | % (relative to R410A) | 100 | 100.0 | 95.5 | 92.5 | 93.1 | 93.8 | 96.1 | 98.0 | 98.8 | 99.4 |
| Refrigeration capacity ratio | % (relative to R410A) | 100 | 85.0 | 85.0 | 107.4 | 95.0 | 106.2 | 101.6 | 95.0 | 90.1 | 85.5 |

TABLE 8

| Item | Unit | Com Ex8 A | Com Ex9 B | Com Ex10 C | Com Ex11 D' | Com Ex12 J | Example4 L | Example5 M | Example6 N | Com Ex13 K' |
|---|---|---|---|---|---|---|---|---|---|---|
| HFO-1132(E) | mass % | 55.3 | 0.0 | 18.4 | 0.0 | 40.5 | 55.3 | 57.9 | 54.1 | 47.0 |
| HFO-1123 | mass % | 0.0 | 47.8 | 74.5 | 83.4 | 52.4 | 32.8 | 21.0 | 12.4 | 7.2 |
| R1234yf | mass % | 37.6 | 45.1 | 0.0 | 9.5 | 0.0 | 5.0 | 14.0 | 26.4 | 38.7 |
| R32 | mass % | 7.1 | 7.1 | 7.1 | 7.1 | 7.1 | 7.1 | 7.1 | 7.1 | 7.1 |
| GWP | — | 50 | 50 | 49 | 49 | 49 | 49 | 49 | 50 | 50 |
| COP ratio | % (relative to R410A) | 99.8 | 96.9 | 92.5 | 92.5 | 94.0 | 95.9 | 97.2 | 98.3 | 99.2 |
| Refrigeration capacity ratio | % (relative to R410A) | 85.0 | 85.0 | 110.5 | 106.0 | 108.9 | 104.5 | 99.0 | 92.2 | 85.5 |

TABLE 9

| Item | Unit | Com Ex14 A | Com Ex15 B | Com Ex16 C = D' | Com Ex17 J | Example7 L | Example8 M | Example9 N | Com Ex18 K' |
|---|---|---|---|---|---|---|---|---|---|
| HFO-1132(E) | mass % | 48.4 | 0.0 | 0.0 | 37.0 | 50.0 | 53.0 | 48.8 | 41.0 |
| HFO-1123 | mass % | 0.0 | 42.3 | 88.9 | 51.9 | 33.9 | 22.9 | 12.9 | 6.5 |
| R1234vf | mass % | 40.5 | 46.6 | 0.0 | 0.0 | 5.0 | 13.0 | 27.2 | 41.4 |
| R32 | mass % | 11.1 | 11.1 | 11.1 | 11.1 | 11.1 | 11.1 | 11.1 | 11.1 |
| GWP | — | 77 | 77 | 76 | 76 | 76 | 76 | 77 | 77 |
| COP ratio | % (relative to R410A) | 99.8 | 97.6 | 92.5 | 94.2 | 95.8 | 96.9 | 98.2 | 99.3 |
| Refrigeration capacity ratio | % (relative to R410A) | 85.0 | 85.0 | 112.0 | 110.2 | 106.0 | 101.1 | 93.2 | 85.4 |

TABLE 10

| Item | Unit | Com Ext19 A | Com Ex20 B | Com Ex21 J | Example10 L | Example11 M | Example12 N | Com Ex22 K' |
|---|---|---|---|---|---|---|---|---|
| HFO-1132(E) | mass % | 42.8 | 0.0 | 34.3 | 46.7 | 49.4 | 45.0 | 36.5 |
| HFO-1123 | mass % | 0.0 | 37.8 | 51.2 | 33.8 | 24.1 | 12.8 | 5.6 |
| R1234yf | mass % | 42.7 | 47.7 | 0.0 | 5.0 | 12.0 | 27.7 | 43.4 |
| R32 | mass % | 14.5 | 14.5 | 14.5 | 14.5 | 14.5 | 14.5 | 14.5 |
| GWP | — | 100 | 100 | 99 | 99 | 99 | 100 | 100 |
| COP ratio | % (relative to R410A) | 99.9 | 98.1 | 94.4 | 95.9 | 96.8 | 98.2 | 99.5 |
| Refrigeration capacity ratio | % (relative to R410A) | 85.0 | 85.0 | 111.1 | 107.1 | 102.8 | 94.0 | 85.3 |

TABLE 11

| Item | Unit | Com Ex23 A | Com Ex24 B | Com Ex25 J | Example13 L | Example14 M | Example15 N | Com Ex26 K' |
|---|---|---|---|---|---|---|---|---|
| HFO-1132(E) | mass % | 37.0 | 0.0 | 32.0 | 43.6 | 46.0 | 41.1 | 32.5 |
| HFO-1123 | mass % | 0.0 | 33.1 | 49.8 | 33.2 | 23.8 | 12.1 | 4.0 |
| R1234yf | mass % | 44.8 | 48.7 | 0.0 | 5.0 | 12.0 | 28.6 | 45.3 |
| R32 | mass % | 18.2 | 18.2 | 18.2 | 18.2 | 18.2 | 18.2 | 18.2 |
| GWP | — | 125 | 125 | 124 | 124 | 124 | 125 | 125 |
| COP ratio | % (relative to R410A) | 100.0 | 98.6 | 94.7 | 96.1 | 96.9 | 98.3 | 99.8 |
| Refrigeration capacity ratio | % (relative to R410A) | 85.0 | 85.0 | 111.9 | 108.0 | 103.8 | 94.6 | 85.2 |

TABLE 12

| Item | Unit | Com Ex26 A | Com Ex27 B | Com Ex28 J | Example16 L | Example17 M | Example18 N | Com Ex29 K' |
|---|---|---|---|---|---|---|---|---|
| HFO-1132(E) | mass % | 31.5 | 0.0 | 30.3 | 40.9 | 43.0 | 37.5 | 28.8 |
| HFO-1123 | mass % | 0.0 | 28.5 | 47.8 | 32.2 | 23.1 | 11.1 | 2.4 |
| R1234yf | mass % | 46.6 | 49.6 | 0.0 | 5.0 | 12.0 | 29.5 | 46.9 |
| R32 | mass % | 21.9 | 21.9 | 21.9 | 21.9 | 21.9 | 21.9 | 21.9 |
| GWP | — | 150 | 150 | 149 | 149 | 149 | 149 | 150 |
| COP ratio | % (relative to R410A) | 100.2 | 99.1 | 95.1 | 96.3 | 97.1 | 98.5 | 100.0 |
| Refrigeration capacity ratio | % (relative to R410A) | 85.0 | 85.0 | 112.6 | 108.8 | 104.6 | 95.0 | 85.1 |

TABLE 13

| Item | Unit | Com Ex30 A | Com Ex31 B | Com Ex32 J | Example19 L | Example20 M | Example21 N | Com Ex33 K' |
|---|---|---|---|---|---|---|---|---|
| HFO-1132(E) | mass % | 24.8 | 0.0 | 29.1 | 38.2 | 39.7 | 33.7 | 24.8 |
| HFO-1123 | mass % | 0.0 | 22.9 | 44.2 | 30.1 | 22.6 | 9.8 | 0.0 |
| R1234yf | mass % | 48.5 | 50.4 | 0.0 | 5.0 | 11.0 | 29.8 | 48.5 |
| R32 | mass % | 26.7 | 26.7 | 26.7 | 26.7 | 26.7 | 26.7 | 26.7 |
| GWP | — | 182 | 182 | 181 | 181 | 181 | 182 | 182 |
| COP ratio | % (relative to R410A) | 100.4 | 99.8 | 95.6 | 96.7 | 97.3 | 98.8 | 100.4 |
| Refrigeration capacity ratio | % (relative to R410A) | 85.0 | 85.0 | 113.2 | 109.6 | 106.1 | 95.7 | 85.0 |

TABLE 14

| Item | Unit | Com Ex34 A | Com Ex35 B | Com Ex36 J | Example22 L | Example23 M | Example24 N | Com Ex37 K' |
|---|---|---|---|---|---|---|---|---|
| HFO-1132(E) | mass % | 21.3 | 0.0 | 28.8 | 36.9 | 38.2 | 32.4 | 24.3 |
| HFO-1123 | mass % | 0.0 | 19.9 | 41.9 | 28.8 | 21.5 | 9.6 | 0.0 |
| R1234yf | mass % | 49.4 | 50.8 | 0.0 | 5.0 | 11.0 | 28.7 | 46.4 |
| R32 | mass % | 29.3 | 29.3 | 29.3 | 29.3 | 29.3 | 29.3 | 29.3 |
| GWP | — | 200 | 200 | 198 | 199 | 199 | 199 | 200 |
| COP ratio | % (relative to R410A) | 100.6 | 100.1 | 96.1 | 96.9 | 97.5 | 98.9 | 100.4 |
| Refrigeration capacity ratio | % (relative to R410A) | 85.0 | 85.0 | 113.8 | 110.0 | 106.5 | 96.8 | 86.7 |

TABLE 15

| Item | Unit | Com Ex38 A | Com Ex39 B | Com Ex40 J | Example25 L | Example26 M | Example27 N | Com Ex41 K' |
|---|---|---|---|---|---|---|---|---|
| HFO-1132(E) | mass % | 12.1 | 0.0 | 29.3 | 33.8 | 34.3 | 29.5 | 22.5 |
| HFO-1123 | mass % | 0.0 | 11.7 | 34.0 | 24.5 | 21.0 | 9.4 | 0.0 |
| R1234yf | mass % | 51.2 | 51.6 | 0.0 | 5.0 | 8.0 | 24.4 | 40.8 |
| R32 | mass % | 36.7 | 36.7 | 36.7 | 36.7 | 36.7 | 36.7 | 36.7 |
| GWP | — | 250 | 250 | 248 | 249 | 249 | 249 | 250 |
| COP ratio | % (relative to R410A) | 101.2 | 101.0 | 97.0 | 97.6 | 97.8 | 99.1 | 100.4 |
| Refrigeration capacity ratio | % (relative to R410A) | 85.0 | 85.0 | 113.9 | 110.7 | 109.0 | 100.1 | 90.9 |

TABLE 16

| Item | Unit | Example28 | Example29 |
|---|---|---|---|
| HFO-1132(E) | mass % | 20.0 | 10.0 |
| HFO-1123 | mass % | 40.0 | 50.0 |
| R1234yf | mass % | 18.0 | 18.0 |
| R32 | mass % | 22.0 | 22.0 |
| GWP | — | 150 | 150 |
| COP ratio | % (relative to R410A) | 96.2 | 95.8 |
| Refrigeration capacity ratio | % (relative to R410A) | 103.5 | 104.1 |

Also, the composition of each mixture was defined as WCF, and a leak simulation was carried out using the NIST Standard Reference Data Base Refleak Version 4.0 under the conditions of Equipment, Storage, Shipping, Leak, and Recharge according to the ASHRAE Standard 34-2013 to determine the most flammable fraction as WCFF.

In addition, as for the flammability, the burning velocity was measured in accordance with the ANSI/ASHRAE Standard 34-2013. Those with a burning velocity of 10 cm/s or less for both WCF and WCFF were considered to be "Class 2L (slightly flammable).

The burning velocity test was carried out using the device shown in FIG. 1, as follows. At first, the mixed refrigerant used was made to have a purity of 99.5% or more, and was deaerated by repeating a cycle of freezing, pumping, and thawing until no traces of air could be seen on the vacuum gauge. The burning velocity was measured by a closed method. The initial temperature was set to ambient temperature. The ignition was carried out by creating an electrical spark between the electrodes at the center of the sample cell. The duration of discharge was 1.0 to 9.9 ms, and the ignition energy was typically about 0.1 to 1.0 J. The spread of flame was visualized using Schlieren photography. A cylindrical container (inner diameter: 155 mm and length: 198 mm) equipped with two acrylic windows that allow light to pass through was used as the sample cell, and a xenon lamp was used as the light source. The state of flame propagation is captured by a Schlieren system using collimate lenses and a high speed digital video camera (frame rate: 600 fps), and recorded and saved as video data on a PC. From those video images, the flame propagation speed Sb (cm/sec) is measured. The burning velocity (Su) is expressed as the volume of unburned gas consumed by a unit area of flame surface in a unit time, and was calculated using the following equation.

$$Su=Sb*\rho u/\rho b$$

ρu: adiabatic flame temperature (unburned)

ρb: adiabatic flame temperature (already burned)

ρu is the measured temperature, and ρb is calculated from the combustion and specific heat at constant pressure of the combustion gas.

The results are shown in Tables 17 and 18.

TABLE 17

| Item | | | Example3 | Example6 | Example9 | Example12 | Example15 |
|---|---|---|---|---|---|---|---|
| WCF | HFO-1132(E) | mass % | 66.9 | 54.1 | 49.8 | 45.0 | 41.1 |
| | HFO-1123 | mass % | 9.4 | 12.4 | 12.9 | 12.8 | 12.1 |
| | R1234yf | mass % | 23.7 | 26.4 | 27.2 | 27.7 | 28.6 |
| | R32 | mass % | 0.0 | 7.1 | 11.1 | 14.5 | 18.2 |
| Leak conditions to become WCFF | | | and transport −40° C., 34% when released, gas phase side | and transport −40° C., 12% when released, gas phase side | and transport −40° C., 12% when released, gas phase side | Storage and transport −40° C., 10% when released, 液相側 | and transport −40° C., 0% when released, gas phase side |
| WCFF | HFO-1132(E) | mass % | 72.0 | 57.9 | 52.5 | 48.8 | 45.2 |
| | HFO-1123 | mass % | 12.0 | 18.4 | 18.8 | 18.7 | 18.4 |
| | R1234yf | mass % | 16.0 | 14.3 | 14.6 | 14.6 | 14.2 |
| | R32 | mass % | 0.0 | 9.4 | 14.1 | 17.9 | 22.2 |
| Burning velocity (WCF) | | cm/s | 8.4 | 8.1 | 8.0 | 8.0 | 8 or less |
| Burning velocity (WCFF) | | cm/s | 10 | 10 | 10 | 10 | 10 |

| Item | | | Example18 | Example21 | Example24 | Example27 |
|---|---|---|---|---|---|---|
| WCF | HFO-1132(E) | mass % | 37.5 | 33.7 | 32.4 | 29.5 |
| | HFO-1123 | mass % | 11.1 | 9.8 | 9.6 | 9.4 |
| | R1234yf | mass % | 29.5 | 29.8 | 28.7 | 24.4 |
| | R32 | mass % | 21.9 | 26.7 | 29.3 | 36.7 |
| Leak conditions to become WCFF | | | and transport −40° C., 0% when released, gas phase side | and transport −40° C., 0% when released, gas phase side | and transport −40° C., 0% when released, gas phase side | and transport −40° C., 0% when released, gas phase side |
| WCFF | HFO-1132(E) | mass % | 42.2 | 39.0 | 37.6 | 34.4 |
| | HFO-1123 | mass % | 16.9 | 15.0 | 14.6 | 13.9 |
| | R1234yf | mass % | 14.8 | 15.1 | 14.6 | 12.6 |
| | R32 | mass % | 26.1 | 30.9 | 33.2 | 39.1 |
| Burning velocity (WCF) | | cm/s | 8 or less | 8 or less | 8 or less | 8.3 |
| Burning velocity (WCFF) | | cm/s | 10 | 10 | 10 | 10 |

TABLE 18

| Item | | | Example3 | Example6 | Example9 | Example12 | Example15 |
|---|---|---|---|---|---|---|---|
| WCF | HFO-1132(E) | mass % | 66.9 | 54.1 | 48.8 | 45.0 | 41.1 |
| | HFO-1123 | mass % | 9.4 | 12.4 | 12.9 | 12.8 | 12.1 |
| | R1234yf | mass % | 23.7 | 26.4 | 27.2 | 27.7 | 28.6 |
| | R32 | mass % | 0.0 | 7.1 | 11.1 | 14.5 | 18.2 |
| Leak conditions to become WCFF | | | and transport −40° C., 34% when released gas phase side | and transport −40° C., 12% when released gas phase side | and transport −40° C., 12% when released gas phase side | Storage and transport −40° C., 10% when released, 液相側 | and transport −40° C., 0% when released gas phase side |
| WCFF | HFO-1132(E) | mass % | 72.0 | 57.9 | 52.5 | 48.8 | 45.2 |
| | HFO-1123 | mass % | 12.0 | 18.4 | 18.8 | 18.7 | 18.4 |
| | R1234yf | mass % | 16.0 | 14.3 | 14.6 | 14.6 | 14.2 |
| | R32 | mass % | 0.0 | 9.4 | 14.1 | 17.9 | 22.2 |
| Burning velocity (WCF) | | cm/s | 8.4 | 8.1 | 8.0 | 8.0 | 8 or less |
| Burning velocity (WCFF) | | cm/s | 10 | 10 | 10 | 10 | 10 |

| Item | | | Example18 | Example21 | Example24 | Example27 |
|---|---|---|---|---|---|---|
| WCF | HFO-1132(E) | mass % | 37.5 | 33.7 | 32.4 | 29.5 |
| | HFO-1123 | mass % | 11.1 | 9.8 | 9.6 | 9.4 |
| | R1234yf | mass % | 29.5 | 29.8 | 28.7 | 24.4 |
| | R32 | mass % | 21.9 | 26.7 | 29.3 | 36.7 |
| Leak conditions to become WCFF | | | and transport −40° C., 0% when released gas phase side | and transport −40° C., 0% when released gas phase side | and transport −40° C., 0% when released gas phase side | and transport −40° C., 0% when released gas phase side |
| WCFF | HFO-1132(E) | mass % | 42.2 | 39.0 | 37.6 | 34.4 |
| | HFO-1123 | mass % | 16.9 | 15.0 | 14.6 | 13.9 |
| | R1234yf | mass % | 14.8 | 15.1 | 14.6 | 12.6 |
| | R32 | mass % | 26.1 | 30.9 | 33.2 | 39.1 |
| Burning velocity (WCF) | | cm/s | 8 or less | 8 or less | 8 or less | 8.3 |
| Burning velocity (WCFF) | | cm/s | 10 | 10 | 10 | 10 |

From these results, when the mass percentages of HFO-1132 (E), HFO-1123 and R1234yf, and R32, based on their sum are defined as x, y and z, and a, respectively, in a ternary composition diagram in which the sum of HFO-1132 (E), HFO-1123 and R1234yf is (100−a) % by mass, the coordinates (x,y,z) are:

in the case of $0<a\leq 11.1$, within the range of the figure surrounded by lines JL, LM, MN, NK', K'B, BD', D'C, and CJ connecting each of eight points:

point J $(100-a-y, -0.0049a^2-0.0355a+52.9, 0.0)$;

point L $(-0.0217a^2-0.9307a+63.0, 95.0-a-x, 5.0)$;

point M $(0.0292a^2-1.7567a+68.9, -0.0194a^2+0.8278a+16.1, 100-a-x-y)$;

point N $(0.043a^2-2.1084a+66.9, -0.0268a^2+0.6129a+9.4, 100-a-x-y)$;

point K' $(-0.051a^2+0.0929a+25.95, 100-a-x-z, -0.0191a^2+1.0231a+32.4)$;

point B $(0.0, 0.0144a^2-1.6377a+58.7, 100-a-y)$;

point D' $(0.0, 0.0224a^2+0.968a+75.4, 100-a-y)$; and point C $(-0.2304a^2-0.4062a+32.9, 100-a-x, 0.0)$, or on the lines JL, LM, MN, NK', K'B, and D'C (except for point B, point D', point C, and point J);

in the case of $11.1<a\leq 18.2$, within the range of the figure surrounded by lines JL, LM, MN, NK', K'B, BW, and WJ connecting each of seven points:

point J $(100-a-y, -0.0243a^2+0.4161a+50.275, 0.0)$;

point L $(0.0187a^2-1.4492a+63.783, 95.0-a-x, 5.0)$;

point M $(0.0197a^2-1.5633a+67.924, -0.0611a^2+1.9179a+9.1435, 100-a-x-y)$;

point N $(0.009a^2-1.3469a+62.647, -0.0225a^2+0.5467a+9.6045, 100-a-x-y)$;

point K' $(0.0341a^2-2.1977a+61.187, 100-a-x-z, -0.0105a^2+0.8577a+33.177)$;

point B $(0.0, 0.0075a^2-1.5156a+58.199, 100-a-y)$; and point W $(0.0, 100-a, 0.0)$, or on the lines JL, LM, MN, NK', and K'B (except for point B, point W, and point J);

in the case of $18.2<a\leq 26.7$, within the range of the figure surrounded by lines JL, LM, MN, NK', K'B, BW, and WJ connecting each of seven points:

point J $(100-a-y, -0.0246a^2+0.4476a+49.816, 0.0)$;

point L $(0.0197a^2-1.5187a+64.723, 95.0-a-x, 5.0)$;

point M $(0.0145a^2-1.3925a+66.539, 0.01a^2-0.5903a+31.23, 100-a-x-y)$;

point N $(0.0213a^2-1.8283a+67.31, -0.2706a+17.025, 100-a-x-y)$;

point K' $(0.0196a^2-1.7863a+58.515, 100-a-x-z, -0.0117a^2+0.8999a+32.783)$;

point B $(0.0, 0.009a^2-1.6045a+59.318, 100-a-y)$; and point W $(0.0, 100-a, 0.0)$, or on the lines JL, LM, MN, NK', and K'B (except for point B, point W, and point J); and in the case of $26.7<a\leq 36.7$, within the range of the figure surrounded by lines JL, LM, MN, NK', K'A, AB, BW, and WJ connecting each of eight points:

point J ($100-a-y$, $-0.0183a^2+0.1399a+53.507$, 0.0);
point L ($0.0081a^2-0.9541a+57.893$, $95.0-a-x$, 5.0);
point M ($0.005a^2-0.8563a+59.007$, $0.03558a^2-2.4139a+61.708$, $100-a-x-y$);
point N ($0.0108a^2-1.1054a+55.507$, $0.005a^2-0.3563a+15.757$, $100-a-x-y$);
point K' ($-0.0051a^2+0.0929a+25.95$, 0.0, $100-a-x$);
point A ($0.0103a^2-1.9225a+68.793$, 0.0, $100-a-x$);
point B (0.0, $0.0046a^2-1.41a+57.286$, $100-a-y$); and
point W (0.0, $100-a$, 0.0), or on the lines JL, LM, MN, NK', K'A, and AB (except for point K', point A, point B, point W, and point J). It has been revealed that, when the above requirement is satisfied, the refrigerant of the present disclosure has a coefficient of performance (COP) ratio of 92.5% or more and a refrigeration capacity ratio of 85% or more based on R410A, and is ASHRAE slightly flammable.

Note that, for each point, three points were determined for each of the following four ranges by calculation, and the approximation equation for these points was determined.

TABLE 19

Point A

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 68.6 | 55.3 | 48.4 | 48.4 | 42.8 | 37 | 37 | 31.5 | 24.8 |
| HFO-1123 | 0 | 0 | 0 | 0 | 0 | 0 | 0 | 0 | 0 |
| R1234yf | 31.4 | 37.6 | 40.5 | 40.5 | 42.7 | 44.8 | 44.8 | 46.6 | 48.5 |
| R32 | | x | | | x | | | x | |
| HFO-1132(E) Approximation equation | | $0.0134x^2 - 1.9681x + 68.6$ | | | $0.0112x^2 - 1.9337x + 68.484$ | | | $0.0107x^2 - 1.9142x + 68.305$ | |
| HFO-1123 Approximation equation | | 0 | | | 0 | | | 0 | |
| R1234yf Approximation equation | | 100 − R32 − HFO-1132(E) | | | 100 − R32 − HFO-1132(E) | | | 100 − R32 − HFO-1132(E) | |

| Item | 36.7 ≥ R32 ≥ 26.7 | | |
|---|---|---|---|
| R32 | 26.7 | 29.3 | 36.7 |
| HFO-1132(E) | 24.8 | 21.3 | 12.1 |
| HFO-1123 | 0 | 0 | 0 |
| R1234yf | 48.5 | 49.4 | 51.2 |
| R32 | | x | |
| HFO-1132(E) Approximation equation | | $0.0103x^2 - 1.9225x + 68.793$ | |
| HFO-1123 Approximation equation | | 0 | |
| R1234yf Approximation equation | | 100 − R32 − HFO-1132(E) | |

TABLE 20

Point B

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 0 | 0 | 0 | 0 | 0 | 0 | 0 | 0 | 0 |
| HFO-1123 | 58.7 | 47.8 | 42.3 | 42.3 | 37.8 | 33.1 | 33.1 | 28.5 | 22.9 |
| R1234yf | 41.3 | 45.1 | 46.6 | 46.6 | 47.7 | 48.7 | 48.7 | 49.6 | 50.4 |
| R32 | | x | | | x | | | x | |
| HFO-1132(E) Approximation equation | | 0 | | | 0 | | | 0 | |
| HFO-1123 Approximation equation | | $0.0144x^2 - 1.6377x + 58.7$ | | | $0.0075x^2 - 1.5156x + 58.199$ | | | $0.009x^2 - 1.6045x + 59.318$ | |
| R1234yf Approximation equation | | 100 − R32 − HFO-1132(E) | | | 100 − R32 − HFO-1132(E) | | | 100 − R32 − HFO-1132(E) | |

| Item | 36.7 ≥ R32 ≥ 26.7 | | |
|---|---|---|---|
| R32 | 26.7 | 29.3 | 36.7 |
| HFO-1132(E) | 0 | 0 | 0 |
| HFO-1123 | 22.9 | 19.9 | 11.7 |

TABLE 20-continued

| Point B | | | |
|---|---|---|---|
| R1234yf | 50.4 | 50.8 | 51.6 |
| R32 | | x | |
| HFO-1132(E) Approximation equation | | 0 | |
| HFO-1123 Approximation equation | | $0.0046x^2 - 1.41x + 57.286$ | |
| R1234yf Approximation equation | | 100 − R32 − HFO-1132(E) | |

TABLE 21

| Point C | | | |
|---|---|---|---|
| Item | | 11.1 ≥ R32 > 0 | |
| R32 | 0 | 7.1 | 11.1 |
| HFO-1132(E) | 32.9 | 18.4 | 0 |
| HFO-1123 | 67.1 | 74.5 | 88.9 |
| R1234yf | 0 | 0 | 0 |
| R32 | | x | |
| HFO-1132(E) Approximation equation | | −0.2304x2 − 0.4062x + 32.9 | |
| HFO-1123 Approximation equation | | 100 − R32 − HFO-1132(E) | |
| R1234yf Approximation equation | | 0 | |

TABLE 21-continued

| Point D' | | | |
|---|---|---|---|
| Item | | 11.1 ≥ R32 > 0 | |
| R32 | 0 | 7.1 | 11.1 |
| HFO-1132(E) | 0 | 0 | 0 |
| HFO-1123 | 75.4 | 83.4 | 88.9 |
| R1234yf | 24.6 | 9.5 | 0 |
| R32 | | x | |
| HFO-1132(E) Approximation equation | | 0 | |
| HFO-1123 Approximation equation | | $0.0224x^2 + 0.968x + 75.4$ | |
| R1234yf Approximation equation | | 100 − R32 − HFO-1132(E) | |

TABLE 22

| Point L | | | | | | | | | |
|---|---|---|---|---|---|---|---|---|---|
| Item | 11.1 ≥ R32 > 0 | | | 18.2 ≥ R32 ≥ 11.1 | | | 26.7 ≥ R32 ≥ 18.2 | | |
| R32 | 0 | 7.1 | 11.1 | 11.1 | 14.5 | 18.2 | 18.2 | 21.9 | 26.7 |
| HFO-1132(E) | 63.0 | 55.3 | 50 | 50 | 46.7 | 43.6 | 43.6 | 40.9 | 38.2 |
| HFO-1123 | 32.0 | 32.6 | 33.9 | 33.9 | 33.8 | 33.2 | 33.2 | 322 | 30.1 |
| R1234yf | 5.0 | 5.0 | 5.0 | 5.0 | 5.0 | 5.0 | 5.0 | 5.0 | 5.0 |
| R32 | | x | | | x | | | x | |
| HFO-1132(E) Approximation equation | | −0.0217x2 − 0.9307x + 63.0 | | | 0.0187x2 − 1.4492x − 63.783 | | | 0.0197x2 − 1.5187x − 64.723 | |
| HFO-1123 Approximation equation | | 95.0 − R32 − HFO-1132(E) | | | 95.0 − R32 − HFO-1132(E) | | | 95.0 − R32 − HFO-1132(E) | |
| R1234yf Approximation equation | | 5.0 | | | 5.0 | | | 5.0 | |

| Item | | 36.7 ≥ R32 ≥ 26.7 | |
|---|---|---|---|
| R32 | 26.7 | 29.3 | 36.7 |
| HFO-1132(E) | 38.2 | 36.9 | 33.8 |
| HFO-1123 | 30.1 | 28.8 | 24.5 |
| R1234yf | 5.0 | 5.0 | 5.0 |
| R32 | | x | |
| HFO-1132(E) Approximation equation | | 0.0081x2 − 0.9541x + 57.893 | |
| HFO-1123 Approximation equation | | 95.0 − R32 − HFO-1132(E) | |
| R1234yf Approximation equation | | 5.0 | |

TABLE 23

| Point M | | | | | | | | | |
|---|---|---|---|---|---|---|---|---|---|
| Item | 11.1 ≥ R32 > 0 | | | 18.2 ≥ R32 ≥ 11.1 | | | 26.7 ≥ R32 ≥ 18.2 | | |
| R32 | 0.0 | 7.1 | 11.1 | 11.1 | 14.5 | 18.2 | 18.2 | 21.9 | 26.7 |
| HFO-1132(E) | 68.9 | 57.9 | 53.0 | 53.0 | 49.4 | 46.0 | 46.0 | 43.0 | 39.7 |
| HFO-1123 | 16.1 | 21.0 | 22.9 | 22.9 | 24.1 | 23.8 | 23.8 | 23.1 | 22.6 |
| R1234yf | 15.0 | 14.0 | 13.0 | 13.0 | 12.0 | 12.0 | 12.0 | 12.0 | 11.0 |
| R32 | x | | | x | | | x | | |
| HFO-1132(E) Approximation equation | 0.0292x2 − 1.7567x + 68.9 | | | $0.0197x^2$ − 1.5633x + 67.924 | | | 0.0145x2 − 1.3925x + 66.539 | | |
| HFO-1123 Approximation equation | −0.0194x2 + 0.8278x + 16.1 | | | $-0.0611x^2$ + 1.9179x + 9.1435 | | | 0.01x2 − 0.5903x + 31.23 | | |
| R1234yf Approximation equation | 100 − R32 − HFO-1132(E) − HFO-1123 | | | 100 − R32 − HFO-1132(E) − HFO-1123 | | | 100 − R32 − HFO-1132(E) − HFO-1123 | | |

| Item | 36.7 ≥ R32 ≥ 26.7 | | |
|---|---|---|---|
| R32 | 26.7 | 29.3 | 36.7 |
| HFO-1132(E) | 39.7 | 38.2 | 34.3 |
| HFO-1123 | 22.6 | 21.5 | 21.0 |
| R1234yf | 11.0 | 11.0 | 8.0 |
| R32 | x | | |
| HFO-1132(E) Approximation equation | 0.005x2 − 0.8563x + 59.007 | | |
| HFO-1123 Approximation equation | 0.03558x2 − 2.4139x + 61.708 | | |
| R1234yf Approximation equation | 100 − R32 − HFO-1132(E) − HFO-1123 | | |

TABLE 24

| Point N | | | | | | | | | |
|---|---|---|---|---|---|---|---|---|---|
| Item | 11.1 ≥ R32 > 0 | | | 18.2 ≥ R32 ≥ 11.1 | | | 26.7 ≥ R32 ≥ 18.2 | | |
| R32 | 0.0 | 7.1 | 11.1 | 11.1 | 14.5 | 18.2 | 18.2 | 21.9 | 26.7 |
| HFO-1132(E) | 66.9 | 54.1 | 48.8 | 48.8 | 45 | 41.1 | 41.1 | 37.5 | 33.7 |
| HFO-1123 | 9.4 | 12.4 | 12.9 | 12.9 | 12.8 | 12.1 | 12.1 | 11.1 | 9.8 |
| R1234yf | 23.7 | 26.4 | 27.2 | 27.2 | 27.7 | 28.6 | 28.6 | 29.5 | 29.8 |
| R32 | x | | | x | | | x | | |
| HFO-1132(E) Approximation equation | 0.043x2 − 2.1084x + 66.9 | | | 0.009x2 − 1.3469x + 62.647 | | | 0.0213x2 − 1.8283x + 67.31 | | |
| HFO-1123 Approximation equation | −0.0268x2 + 0.6129x + 9.4 | | | −0.0225x2 + 0.5467x + 9.6045 | | | −0.2706x + 17.025 | | |
| R1234yf Approximation equation | 100 − R32 − HFO-1132(E) − HFO-1123 | | | 100 − R32 − HFO-1132(E) − HFO-1123 | | | 100 − R32 − HFO-1132(E) − HFO-1123 | | |

| Item | 36.7 ≥ R32 ≥ 26.7 | | |
|---|---|---|---|
| R32 | 26.7 | 29.3 | 36.7 |
| HFO-1132(E) | 33.7 | 32.4 | 29.5 |
| HFO-1123 | 9.8 | 9.6 | 9.4 |
| R1234yf | 29.8 | 28.7 | 24.4 |
| R32 | x | | |
| HFO-1132(E) Approximation equation | 0.0108x2 − 1.1054x + 55.507 | | |
| HFO-1123 Approximation equation | 0.005x2 − 0.3563x + 15.757 | | |
| R1234yf Approximation equation | 100 − R32 − HFO-1132(E) − HFO-1123 | | |

TABLE 25

| Point J | | | | | | | | | |
|---|---|---|---|---|---|---|---|---|---|
| Item | 11.1 ≥ R32 > 0 | | | 18.2 ≥ R32 ≥ 11.1 | | | 26.7 ≥ R32 ≥ 18.2 | | |
| R32 | 0 | 7.1 | 11.1 | 11.1 | 14.5 | 18.2 | 18.2 | 21.9 | 26.7 |
| HFO-1132(E) | 47.1 | 40.5 | 37 | 37.0 | 34.3 | 32.0 | 32.0 | 30.3 | 29.1 |
| HFO-1123 | 52.9 | 52.4 | 51.9 | 51.9 | 51.2 | 49.8 | 49.8 | 47.8 | 44.2 |
| R1234yf | 0 | 0 | 0 | 0 | 0 | 0 | 0 | 0 | 0 |
| R32 | x | | | x | | | x | | |
| HFO-1132(E) Approximation equation | 100 − R32 − HFO-1132(E) | | | 100 − R32 − HFO-1132(E) | | | 100 − R32 − HFO-1132(E) | | |
| HFO-1123 Approximation equation | $-0.0049x^2 - 0.0355x + 52.9$ | | | $-0.0243x^2 + 0.4161 x + 50.275$ | | | $-0.0246x^2 + 0.4476x + 49.816$ | | |
| R1234yf Approximation equation | 0 | | | 0 | | | 0 | | |

| Item | 36.7 ≥ R32 ≥ 26.7 | | |
|---|---|---|---|
| R32 | 26.7 | 29.3 | 36.7 |
| HFO-1132(E) | 29.1 | 28.8 | 29.3 |
| HFO-1123 | 44.2 | 41.9 | 34.0 |
| R1234yf | 0 | 0 | 0 |
| R32 | x | | |
| HFO-1132(E) Approximation equation | 100 − R32 − HFO-1132(E) | | |
| HFO-1123 Approximation equation | $-0.0183x^2 + 0.1399x + 53.507$ | | |
| R1234yf Approximation equation | 0 | | |

TABLE 26

| Point K' | | | | | | | | | |
|---|---|---|---|---|---|---|---|---|---|
| Item | 11.1 ≥ R32 > 0 | | | 18.2 ≥ R32 ≥ 11.1 | | | 26.7 ≥ R32 ≥ 18.2 | | |
| R32 | 0 | 7.1 | 11.1 | 11.1 | 14.5 | 18.2 | 18.2 | 21.9 | 26.7 |
| HFO-1132(E) | 61.7 | 47.0 | 41.0 | 41.0 | 36.5 | 32.5 | 32.5 | 28.8 | 24.8 |
| HFO-1123 | 5.9 | 7.2 | 6.5 | 6.5 | 5.6 | 4.0 | 4.0 | 2.4 | 0 |
| R1234yf | 32.4 | 38.7 | 41.4 | 41.4 | 43.4 | 45.3 | 45.3 | 46.9 | 48.5 |
| R32 | x | | | x | | | x | | |
| HFO-1132(E) Approximation equation | $-0.051x^2 + 0.0929x + 25.95$ | | | $0.0341x^2 - 2.1977x + 61.187$ | | | $0.0196x^2 - 1.7863x + 58.515$ | | |
| HFO-1123 Approximation equation | 100 − R32 − HFO-1132(E) | | | 100 − R32 − HFO-1132(E) | | | 100 − R32 − HFO-1132(E) | | |
| R1234yf Approximation equation | $-0.0191x^2 + 1.0231x + 32.4$ | | | $-0.0105x^2 + 0.8577x + 33.177$ | | | $-0.0117x^2 + 0.8999x + 32.783$ | | |

| Item | 36.7 ≥ R32 ≥ 26.7 | | |
|---|---|---|---|
| R32 | 26.7 | 29.3 | 36.7 |
| HFO-1132(E) | 24.8 | 24.3 | 22.5 |
| HFO-1123 | 0 | 0 | 0 |
| R1234yf | 48.5 | 46.4 | 40.8 |
| R32 | x | | |
| HFO-1132(E) Approximation equation | $-0.0051x^2 + 0.0929x + 25.95$ | | |
| HFO-1123 Approximation equation | 0 | | |
| R1234yf Approximation equation | 100 − R32 − HFO-1132(E) | | |

Item 1

A composition comprising a refrigerant, wherein the refrigerant contains trans-1,2-difluoroethylene (HFO-1132 (E)), trifluoroethylene (HFO-1123) and 2,3,3,3-tetrafluoro-1-propene (R1234yf), and difluoromethane (R32), and wherein, in the refrigerant, when mass percentages of HFO-1132 (E), HFO-1123 and R1234yf, and R32, based on their sum are defined as x, y and z, and a, respectively, in a ternary composition diagram in which a sum of HFO-1132 (E), HFO-1123 and R1234yf is (100−a) % by mass, coordinates (x,y,z) are:

in a case of $0<a\leq11.1$, within a range of a figure surrounded by lines JL, LM, MN, NK', K'B, BD', D'C, and CJ connecting each of eight points:

point J (100−a−y, $-0.0049a^2-0.0355a+52.9$, 0.0);

point L ($-0.0217a^2-0.9307a+63.0$, 95.0−a−x, 5.0);

point M ($0.0292a^2-1.7567a+68.9$, $-0.0194a^2+0.8278a+16.1$, 100−a−x−y);

point N ($0.043a^2-2.1084a+66.9$, $-0.0268a^2+0.6129a+9.4$, 100−a−x−y);

point K' ($-0.051a^2+0.0929a+25.95$, 100−a−x−z, $-0.0191a^2+1.0231a+32.4$);

point B (0.0, $0.0144a^2-1.6377a+58.7$, 100−a−y);

point D' (0.0, $0.0224a^2+0.968a+75.4$, 100−a−y); and point C ($-0.2304a^2-0.4062a+32.9$, 100−a−x, 0.0), or on the lines JL, LM, MN, NK', K'B, and D'C (except for point B, point D', point C, and point J);

in a case of $11.1<a\leq18.2$, within a range of a figure surrounded by lines JL, LM, MN, NK', K'B, BW, and WJ connecting each of seven points:

point J (100−a−y, $-0.0243a^2+0.4161a+50.275$, 0.0);

point L ($0.0187a^2-1.4492a+63.783$, 95.0−a−x, 5.0);

point M ($0.0197a^2-1.5633a+67.924$, $-0.0611a^2+1.9179a+9.1435$, 100−a−x−y);

point N ($0.009a^2-1.3469a+62.647$, $-0.0225a^2+0.5467a+9.6045$, 100−a−x−y);

point K' ($0.0341a^2-2.1977a+61.187$, 100−a−x−z, $-0.0105a^2+0.8577a+33.177$);

point B (0.0, $0.0075a^2-1.5156a+58.199$, 100−a−y); and point W (0.0, 100−a, 0.0), or on the lines JL, LM, MN, NK', and K'B (except for point B, point W, and point J);

in a case of $18.2<a\leq26.7$, within a range of a figure surrounded by lines JL, LM, MN, NK', K'B, BW, and WJ connecting each of seven points:

point J (100−a−y, $-0.0246a^2+0.4476a+49.816$, 0.0);

point L ($0.0197a^2-1.5187a+64.723$, 95.0−a−x, 5.0);

point M ($0.0145a^2-1.3925a+66.539$, $0.01a^2-0.5903a+31.23$, 100−a−x−y);

point N ($0.0213a^2-1.8283a+67.31$, $-0.2706a+17.025$, 100−a−x−y);

point K' ($0.0196a^2-1.7863a+58.515$, 100−a−x−z, $-0.0117a^2+0.8999a+32.783$);

point B (0.0, $0.009a^2-1.6045a+59.318$, 100−a−y); and point W (0.0, 100−a, 0.0), or on the lines JL, LM, MN, NK', and K'B (except for point B, point W, and point J); and in a case of $26.7<a\leq36.7$, within a range of a figure surrounded by lines JL, LM, MN, NK', K'A, AB, BW, and WJ connecting each of eight points:

point J (100−a−y, $-0.0183a^2+0.1399a+53.507$, 0.0);

point L ($0.0081a^2-0.9541a+57.893$, 95.0−a−x, 5.0);

point M ($0.005a^2-0.8563a+59.007$, $0.03558a^2-2.4139a+61.708$, 100−a−x−y);

point N ($0.0108a^2-1.1054a+55.507$, $0.005a^2-0.3563a+15.757$, 100−a−x−y);

point K' ($-0.0051a^2+0.0929a+25.95$, 0.0, 100−a−x);

point A ($0.0103a^2-1.9225a+68.793$, 0.0, 100−a−x);

point B (0.0, $0.0046a^2-1.41a+57.286$, 100−a−y); and point W (0.0, 100−a, 0.0), or on the lines JL, LM, MN, NK', K'A, and AB (except for point K', point A, point B, point W, and point J).

Item 2

The composition according to item 1, further comprising a refrigerator oil and used as a working fluid for a refrigerator.

Item 3

The composition according to item 1 or 2, used as an alternative refrigerant to R410A.

Item 4

Use of the composition according to item 1 or 2 as an alternative refrigerant to R410A.

Item 5

A refrigerator comprising the composition according to item 1 or 2 as a working fluid.

Item 6

A method for operating a refrigerator, comprising circulating the composition according to item 1 or 2 as a working fluid in the refrigerator.

Item 7

A refrigeration cycle device comprising:

a refrigerant circuit (10) having a compressor (21), condensers (23, 31, 36), decompression sections (24, 44, 45, 33, 38), and evaporators (31, 36, 23); and the composition according to any one of items 1 to 3 enclosed in the refrigerant circuit.

REFERENCE SIGNS LIST

1: Sample cell
2: High speed camera
3: Xenon lamp
4: Collimate lens
5: Collimate lens
6: Ring filter

The invention claimed is:

1. A composition comprising a refrigerant, wherein the refrigerant contains trans-1,2-difluoroethylene (HFO-1132 (E)), trifluoroethylene (HFO-1123) and 2,3,3,3-tetrafluoro-1-propene (R1234yf), and difluoromethane (R32), and wherein, in the refrigerant, when mass percentages of HFO-1132 (E), HFO-1123 and R1234yf, and R32, based on their sum are defined as x, y and z, and a, respectively, in a ternary composition diagram in which a sum of HFO-1132 (E), HFO-1123 and R1234yf is (100−a) % by mass, coordinates (x,y,z) are:

in a case of $0<a\leq 11.1$, within a range of a figure surrounded by lines JL, LM, MN, NK', K'B, BD', D'C, and CJ connecting each of eight points:

point J (100−a−y, $-0.0049a^2-0.0355a+52.9$, 0.0);

point L ($-0.0217a^2-0.9307a+63.0$, 95.0−a−x, 5.0);

point M ($0.0292a^2-1.7567a+68.9$, $-0.0194a^2+0.8278a+16.1$, 100−a−x−y);

point N ($0.043a^2-2.1084a+66.9$, $-0.0268a^2+0.6129a+9.4$, 100−a−x−y);

point K' ($-0.051a^2+0.0929a+25.95$, 100−a−x−z, $-0.0191a^2+1.0231a+32.4$);

point B (0.0, $0.0144a^2-1.6377a+58.7$, 100−a−y);

point D' (0.0, $0.0224a^2+0.968a+75.4$, 100−a−y); and point C ($-0.2304a^2-0.4062a+32.9$, 100−a−x, 0.0), or on the lines JL, LM, MN, NK', K'B, and D'C (except for point B, point D', point C, and point J);

in a case of $11.1<a\leq 18.2$, within a range of a figure surrounded by lines JL, LM, MN, NK', K'B, BW, and WJ connecting each of seven points:

point J (100−a−y, $-0.0243a^2+0.4161a+50.275$, 0.0);

point L ($0.0187a^2-1.4492a+63.783$, 95.0−a−x, 5.0);

point M ($0.0197a^2-1.5633a+67.924$, $-0.0611a^2+1.9179a+9.1435$, 100−a−x−y);

point N ($0.009a^2-1.3469a+62.647$, $-0.0225a^2+0.5467a+9.6045$, 100−a−x−y);

point K' ($0.0341a^2-2.1977a+61.187$, 100−a−x−z, $-0.0105a^2+0.8577a+33.177$);

point B (0.0, $0.0075a^2-1.5156a+58.199$, 100−a−y); and point W (0.0, 100−a, 0.0), or on the lines JL, LM, MN, NK', and K'B (except for point B, point W, and point J);

in a case of $18.2<a\leq 26.7$, within a range of a figure surrounded by lines JL, LM, MN, NK', K'B, BW, and WJ connecting each of seven points:

point J (100−a−y, $-0.0246a^2+0.4476a+49.816$, 0.0);

point L ($0.0197a^2-1.5187a+64.723$, 95.0−a−x, 5.0);

point M ($0.0145a^2-1.3925a+66.539$, $0.01a^2-0.5903a+31.23$, 100−a−x−y);

point N ($0.0213a^2-1.8283a+67.31$, $-0.2706a+17.025$, 100−a−x−y);

point K' ($0.0196a^2-1.7863a+58.515$, 100−a−x−z, $-0.0117a^2+0.8999a+32.783$);

point B (0.0, $0.009a^2-1.6045a+59.318$, 100−a−y); and point W (0.0, 100−a, 0.0), or on the lines JL, LM, MN, NK', and K'B (except for point B, point W, and point J); and in a case of $26.7<a\leq 36.7$, within a range of a figure surrounded by lines JL, LM, MN, NK', K'A, AB, BW, and WJ connecting each of eight points:

point J (100−a−y, $-0.0183a^2+0.1399a+53.507$, 0.0);

point L ($0.0081a^2-0.9541a+57.893$, 95.0−a−x, 5.0);

point M ($0.005a^2-0.8563a+59.007$, $0.03558a^2-2.4139a+61.708$, 100−a−x− y);

point N ($0.0108a^2-1.1054a+55.507$, $0.005a^2-0.3563a+15.757$, 100−a−x−y);

point K' ($-0.0051a^2+0.0929a+25.95$, 0.0, 100−a−x);

point A ($0.0103a^2-1.9225a+68.793$, 0.0, 100−a−x);

point B (0.0, $0.0046a^2-1.41a+57.286$, 100−a−y); and point W (0.0, 100−a, 0.0), or on the lines JL, LM, MN, NK', K'A, and AB (except for point K', point A, point B, point W, and point J).

2. The composition according to claim 1, further comprising a refrigerator oil and used as a working fluid for a refrigerator.

3. The composition according to claim 1, used as an alternative refrigerant to R410A.

4. A method for operating a refrigerator, comprising circulating the composition according to claim 1 as a working fluid in the refrigerator.

5. A refrigerator comprising the composition according to claim 1 as a working fluid.

6. The method for operating a refrigerator according to claim 4, wherein the composition is an alternative refrigerant to R410A.

7. A refrigeration cycle device comprising:

a refrigerant circuit having a compressor, condensers, decompression sections, and evaporators; and the composition according to claim 1 enclosed in the refrigerant circuit.

8. A method for operating a refrigerator, comprising circulating the composition according to claim 2 as a working fluid in the refrigerator.

9. A refrigerator comprising the composition according to claim 2 as a working fluid.

10. The method for operating a refrigerator according to claim 8, wherein the composition is an alternative refrigerant to R410A.

11. A refrigeration cycle device comprising:

a refrigerant circuit having a compressor, condensers, decompression sections, and evaporators; and the composition according to claim 2 enclosed in the refrigerant circuit.

* * * * *